US011080336B2

(12) United States Patent
Van Dusen

(10) Patent No.: US 11,080,336 B2
(45) Date of Patent: Aug. 3, 2021

(54) SYSTEM AND METHOD FOR FUZZY CONCEPT MAPPING, VOTING ONTOLOGY CROWD SOURCING, AND TECHNOLOGY PREDICTION

(71) Applicant: Dennis Van Dusen, Halethorpe, MD (US)

(72) Inventor: Dennis Van Dusen, Halethorpe, MD (US)

( * ) Notice: Subject to any disclaimer, the term of this patent is extended or adjusted under 35 U.S.C. 154(b) by 144 days.

(21) Appl. No.: 15/263,373

(22) Filed: Sep. 13, 2016

(65) Prior Publication Data

US 2017/0235848 A1 Aug. 17, 2017

Related U.S. Application Data

(62) Division of application No. 14/014,229, filed on Aug. 29, 2013, now Pat. No. 9,461,876.

(Continued)

(51) Int. Cl.

| | |
|---|---|
| ***G06F 17/30*** | (2006.01) |
| ***G06Q 30/02*** | (2012.01) |
| ***G06N 5/02*** | (2006.01) |
| ***G06F 16/903*** | (2019.01) |
| ***H04L 12/24*** | (2006.01) |
| ***G06N 20/00*** | (2019.01) |
| ***G06F 16/904*** | (2019.01) |
| ***G06Q 10/10*** | (2012.01) |
| ***G06F 17/50*** | (2006.01) |
| ***G06N 5/04*** | (2006.01) |

(Continued)

(52) U.S. Cl.

CPC ...... *G06F 16/90335* (2019.01); *G06F 16/904* (2019.01); *G06F 17/5009* (2013.01); *G06N 5/02* (2013.01); *G06N 5/04* (2013.01); *G06N 20/00* (2019.01); *G06Q 10/10* (2013.01); *G06Q 30/0201* (2013.01); *G06Q 30/0241* (2013.01); *G06Q 30/0279* (2013.01); *G06Q 50/01* (2013.01); *G06Q 50/184* (2013.01); *G07C 13/00* (2013.01); *H04L 41/04* (2013.01); *G06F 2217/16* (2013.01); *G06Q 50/18* (2013.01); *G06Q 50/20* (2013.01); *G06Q 2230/00* (2013.01)

(58) Field of Classification Search

None

See application file for complete search history.

(56) References Cited

U.S. PATENT DOCUMENTS 6,711,585 B1 * 3/2004 Copperman .......... G06F 16/367
6,983,227 B1 * 1/2006 Thalhammer-Reyero .................. G05B 17/02 703/2

(Continued)

*Primary Examiner* — Kenny S Lin

(57) ABSTRACT

The invention provides a system and method for providing ttx-based categorization services and a categorized commonplace of shared information. Currency of the contents is improved by a process called conjuring/concretizing wherein users' thoughts are rapidly infused into the Map. As a new idea is sought, a goal is created for a search. After the goal idea is found, a ttx is concretized and categorized. The needs met by such a Map are prior art searching, competitive environmental scanning, competitive analysis study repository management and reuse, innovation gap analysis indication, novelty checking, technology value prediction, investment area indication and planning, and product technology comparison and feature planning.

302 Claims, 5 Drawing Sheets

Related U.S. Application Data

(60) Provisional application No. 61/694,259, filed on Aug. 29, 2012.

(51) Int. Cl.

*G06Q 50/00* (2012.01)
*G06Q 50/18* (2012.01)
*G07C 13/00* (2006.01)
*G06Q 50/20* (2012.01)

(56) References Cited

U.S. PATENT DOCUMENTS 8,135,576 B2 * 3/2012 Haley ................. G06F 17/2785 704/9
8,301,606 B2 * 10/2012 Futatsugi ............ G06F 16/1787 707/694
8,306,987 B2 * 11/2012 Ber ....................... G06F 16/907 707/752
9,292,262 B2 * 3/2016 Gabel .................... G06Q 30/02
9,798,773 B2 * 10/2017 Buehler .............. G06F 16/2453
9,811,791 B2 * 11/2017 Koerner ........... G06Q 10/06311
10,019,531 B2 * 7/2018 Kent ...................... G06Q 50/01
10,043,155 B2 * 8/2018 Baldwin ............... G06F 16/972
10,339,452 B2 * 7/2019 Romano ................ G06N 5/022
2002/0016954 A1 * 2/2002 Charisius .................. G06F 8/20 717/106
2006/0218000 A1 * 9/2006 Smith .................... G06Q 10/00 709/204
2007/0067712 A1 * 3/2007 Baker ................... G06F 16/958 715/234
2007/0112714 A1 * 5/2007 Fairweather ............ G06F 8/427 706/46
2007/0143398 A1 * 6/2007 Graham ................. G06Q 40/02 709/204
2008/0027834 A1 * 1/2008 Meyer .................. G06Q 10/087 705/28
2008/0147797 A1 * 6/2008 Ramaswamy ......... G06Q 10/10 709/204
2009/0037299 A1 * 2/2009 Powell ................. G06Q 10/087 705/28
2009/0183251 A1 * 7/2009 Deinlein ................. G06F 16/95 726/12
2011/0145210 A1 * 6/2011 Rathinam ............. G06F 16/907 707/705
2012/0102050 A1 * 4/2012 Button ................ G06F 16/9535 707/749
2013/0246908 A1 * 9/2013 Buehler ................ G06F 16/958 715/234

* cited by examiner

SYSTEM AND METHOD FOR FUZZY CONCEPT MAPPING, VOTING ONTOLOGY CROWD SOURCING, AND TECHNOLOGY PREDICTION

This application references and is derived from provisional patent application numbered 61694259 with EFS ID of Ser. No. 13/611,226, and this application claims priority from that provisional application. This application is divisional from non-provisional patent application Ser. No. 14/014,229. This specification is substantially the same as the finalized non-provisional patent application Ser. No. 14/014,229 as corrected for informalities.

FIELD OF INVENTION

The invention relates generally to the field of information technology. More specifically, but not by way of limitation, the invention relates to a system and method for concept-based management of categorizations or classifications to organize a commonplace, enhancing the navigability of very large information bases by providing in-depth sub-categorization of terminology bases, providing users with incentives to be creative, protecting crowd sourced contributions, managing searches for what is known either within, or in some accessible location outside of it, and establishing communities associated especially with the concepts, or its narrow categories, and particularly in Intellectual Property. It provides a user a searching tool for something known or unknown, capturing the concept if unknown to be reused as if known. This invention extends to new forms of fuzzy clustering and hierarchical self-organizing maps.

BACKGROUND

The poet's eye, in a fine frenzy rolling
Doth glance from heaven to earth, from earth to heaven;
And as imagination bodes forth
The forms of things unknown, the poet's pen
Turns them to shapes and gives to airy nothing
A local habitation and a name.
Such tricks hath strong imagination, . . . "

Theseus in Shakespeare's A Midsummer Night's Dream.

To think outside the box, you have to know what is in it. This system provides a map of what is inside.

Today, in fields ranging from the general use of conceptual diagramming to specific purposes such as prior art searching, competitive environmental scanning, competitive analysis study repository management and reuse, innovation gap analysis identification, novelty checking, technology prediction, investment identification and planning, and product technology comparison and feature planning, users are ever more in need of finding very specific and highly relevant information from a mass of data that is not organized.

Known systems for ideation and innovation, developed over centuries, are closed so that the ideas generated are hidden for long periods. While this is somewhat effective in a commercial sense, the attitude fostered and results are often counter-productive for society. Modern concepts of open software and crowd sourcing, coming from the utopian view, also have faults.

Intellectual Property Classification management services may include, for instance, ideation, intellectual property categorization, information asset categorization, product management, product line management, competitive analysis, study management, study outsourcing, development outsourcing, information categorization and retrieval management, contract management, communities, technology advertising, incentives management, collaboration management, and, emergence games involving technology.

Known systems and methods for providing complex conceptual data for searching associatively, along with the connected management of search, retrieval, and categorization services have many disadvantages, however. Present topic maps are of limited use because firm and precise identification of subjects in topic maps works only with a limited set of locators. They cannot easily be kept current or organized. They fail to predict, and they are inefficient. Previous systems have not used capturing of conjuring and only one known project has incorporated the idea of consensus through voting. Previous research efforts have not focused on the business process elements of the problem.

What is needed is an improved categorization, search and retrieval management paradigm combined into a tool that: empowers users to proactively seek a better understanding of the best available knowledge; stirs imagination; provides deep and dynamic prior art classification; addresses the full life cycle of knowledge refinement; and manages the progress of ideas from conception to description to protection to collaboration to securitization and to public release and use for the next great idea. It must bring in knowledge so that a user sees it as already having the knowledge in order for the user to trust it as a search tool. While we extend beyond present inventions, we acknowledge the prior work done in:

- Taxonomy, ontology, C-spaces, concept maps, topic maps, Common Mental Map, and intellectual property valuation methods;
- Authority maintenance and ontological merging techniques for collective categorization;
- Semantic distancing, self-organizing mapping, cluster analysis, cross-citation, crawling and other techniques for automatic categorization operations.
- Gap analysis, TRIZ, road mapping, gestation period analysis, Delphi, and ideation/brainstorming techniques.

SUMMARY OF THE INVENTION

The invention provides, in one embodiment, a system and method for providing crowd sourced consensus building, topic categorization services, a commonplace, and on-line community services by topics.

A result of the system and method is a Common Mental Map (CMM) for navigation. Visualization maps provide a customized view of this 'best available' information commonplace. Different visualizations and views provide efficient tools to communities. Information from users and disparate external sources is combined and merged to form a more complete commonplace.

A user searching for something, known or unknown, provides one source of information for the commonplace. By capturing the concept searched for, the system saves the creative thought for reuse, and captures the fact of the search for that concept for value prediction.

As a goal-based search is performed for what a user believes is a concept already known, the goal is moved in the map to a location where the concept may most likely be found, and if the user is not successful in finding a match, the goal itself is concretized as representing the concept being search for, and categorized into where the goal was moved to, thus making a new concept out of a mere thought of the user. When a user conjures a concept and wishes to save it in the system, a representation is concretized and one or more categorization techniques are considered for categorizing the concept. The representation becomes an indexing point for attachment of information resources. After the concept is described, it may be shared with others, form the basis for investment or social interaction, used in a classification index or a mashup, or be used as a category for new ideas. Finally, the concept's characteristics, its categorization, and its importance may be reviewed by the crowd to determine changes needed, and new ideas are discovered, closing the lifecycle. The commonplace provides for analysis and prediction on a 'best available' data basis.

The term concept is too general to be used in the following. Generally, concepts are ttxs represented by cnxpts. The Topic Map Standard 'subject' is similar to the ttx, and the 'topic' is similar to the cnxpt, but more general.

The following outlines a search and categorization tool useful, in one embodiment, for rapidly finding tcepts, TPLs, or appcepts stored in a CMMDB that contains a structured list of categories including, but not limited to: fields of study, categories of tcepts, and categories of appcepts.

In one embodiment, the categorization is visualized, in one CMMV visualization technique called a map, as a visible 'skin' of a sphere that represents, including, but not limited to, a: cnxpt, goal, tcept, tcept category, TPL, tplxpt, appcept, appcept category. The CMMV 'category' spheres may contain internal spheres that represent, including, but not limited to, a: tcept, tcept category, appcept, appcept category, or another ttx. The CMMV 'category' structure is derived from various relationships in the CMMDB. The CMMDB is initially populated by automated consolidation of existing indices and tools such as cluster and cross-citation analysis, but is maintained and extended by crowd source collaboration, the ease of which is improved by effective visualization and editing interfaces. 'Votes' on the existence, validity, relationships, categorization, relevance of external information, and data quality of info-items within the CMMDB are the basis for reaching consensus on the accuracy of the categorization, prediction, naming, and description.

The utility of this is that it provides a facility to assist users in their daily activities involving, including, but not limited to: ideation, innovation, product planning, and competitive intelligence. Users are often expected to be technology workers or intellectual property workers. In each case, the users will need to organize their work. This system provides a toolset for staying organized. It is intended to contain the basis of categorization for, including, but not limited to, ttxs and tcepts. The tcepts are not only historic, but prospective.

The utility of this is that it provides a management tool for crowd sourcing in innovation to bridge from older patent protection systems to first to file patent systems, to utopian open source systems while protecting inventors. It provides a management tool to serve various sets of users needing information at different phases of its gestation, including but not limited to: armchair inventors and science fiction writers conjuring futuristic ideas, entrepreneurs and investors concerned about practical ideas not yet developed, product planners and competitive analysis working on product lines, and researchers, educators, individuals and governments concerned with new ideas and networking, providing to each answers they need. Futurists and creative people effectively 'out' their technology ideas into the 'map' and then, on a collaborative basis, the ideas are improved and re-categorized, making it usable for the users having funds who can pay for the information. The constraint of data quality is reduced into a positive because the impurities in the data become a force toward innovation itself, giving other users a spark known as an 'adjacent possible'. The result is a proactive system for creativity measurement and tool for affecting and directing technology.

Purposes

An embodiment of the invention provides management of a CMMDB in a specific domain of the owner's choice.

An embodiment of the invention provides a visualization tool for depicting a map of the ttxs in a CMMDB, allowing map navigation, searching, refinement operations, execution of analytics, and interaction with associated communities.

An embodiment of the invention provides the mechanisms and procedures to achieve a CMMDB that is the best available source for a list of ttxs.

An embodiment of the invention provides the mechanisms and procedures to achieve a CMMDB database that is the best available source for a list of txpts and appcepts.

An embodiment of the invention provides the mechanisms and procedures to utilize a combination of user discussions, categorizations from outside, collected concretizations of conjurings, and the prior state of the stored Common Mental Map to provide a base upon which to users can search for abstract thoughts that are converted to new categorized ttxs to provide a continually improved and explicit formal specification of the ttxs that are assumed to exist in some Area of Interest and the relationships that hold among them.

An embodiment of the invention provides a method and apparatus for providing ttx categorization visualizations ("maps"), comprising: 1) the Preparation step comprising planning the ttx map study, 2) the Generation step comprising: receiving data indicating a ttx, the data including at least one of a defining of a search goal, a defining of a query, a marking of a place on a visualization derived from the CMMDB, an extension of a ttx, a subdividing of a ttx, a combining of two ttxs to form a convergence, a defining of a new ttx, a defining of a contradictory feature or requirement for an existing ttx, a coalescing of a ttx into the CMMDB, a stating that a ttx is defined by an information resource; 3) the Structuring step comprising: categorizing the data indicating the ttx to associate the data with one of a predetermined plurality of categories or into a new category; 4) the Representation step comprising: calculating the similarities of ttxs; summarizing fxxt calculation specifications to extract pertinent ttxs and relationships; forming representative scene graph maps; distributing the scene graphs to a user computing system; generating the visualization on the user computing system; accepting user navigation of and interaction with the visualization; accepting votes for refinement; accumulating user interest information; reforming the visualization; 5) the Interpretation step comprising: adjust their CMMV view by altering the map filters and fxxt formulas; predicting the gestation timeframe of the ttx based on the one of the predetermined plurality of categories or metrics calculated from the ttx characteristics; executing analytics and modeling; reinterpret the CMMDB for an alternative but related purpose; change the CMMDB to use their own labels, cnxpt relationships, fxxts, and filters to provide a custom map for their own interpretation; and 6) the Utilization step comprising use of the ttx visualization for searching; developing product comparisons; displaying modeling results; sharing of searches, tours, etc.; collaboration on consortiums; investing; competitive intelligence; monitoring; use as the basis for derivative or periodic studies; etc.

An embodiment of the invention provides a method and apparatus for managing the lifecycle of a ttx, comprising: receiving data indicating a ttx; categorizing the data indicating the ttx to associate the data with one of a predetermined plurality of categories or a new category; setting access controls for the ttx data, disseminating the ttx data to user computing systems for view and use; accepting extensions, improvements, and refinements of the ttx characteristics; accumulating user interest information; selling or licensing the ttx data.

An embodiment of the invention provides management of a crowd sourcing paradigm for ideation providing teasing out of new innovations into a global common ground to share information; confidentiality in handling of the new ideas; confidential comparison to similar ideas; empowering patent protection; establishing collaborative development; predicting fruition and value; and securitizing innovations, all while language issues are reduced or eliminated by utilizing language independent storage and visualization with a multi-dimensional structure of symbols and diagrams and filters providing for display of language specific information when available.

An embodiment of the invention provides the mechanisms and procedures to create and expand a CMMDB to a number of users in a 'crowd sourcing' construct to conceptualize, or to add, concretize, and refine information about: including but not limited to: tpxs, ttxs, tcepts, and appcepts.

An embodiment of the invention provides a method for providing ttx categorization by consensus clustering within a fxxt, comprising: receiving data indicating a ttx within a fxxt, the data including at least one of a defining of a search goal, a defining of a query, a marking of a place on a visualization derived from the CMMDB, an extension of a ttx, a subdividing of a ttx, a combining of two ttxs to form a convergence, a defining of a new ttx, a stating that a ttx is different from another ttx, a defining of a contradictory feature or requirement for an existing ttx, a coalescing of a ttx into the CMMDB, a stating that a ttx is defined by an information resource, a stating that an information resource is relevant to the definition of a ttx, a showing of interest in a ttx; calculating pairwise ttx identity indicator similarity values within a fxxt, the identity indicator similarities including at least one of: a semantic distance between ttx textual definitions, a semantic distance between ttx descriptions, a semantic distance between ttx names, commonality of occurrence relationships between each ttx and a information resource or relevant entity, commonality of association references between each ttx and a third ttx, a consensus vote toward similarity of the ttx pair, a prior ranking of semantic similarity recognized as generally accurate, or some combination of these; iteratively forming cluster ttxs to indicate a grouping of similar ttxs by a pairwise clustering algorithm utilizing the identity indicator similarity values; and merging, bottom up, the cluster ttxs with pre-existing category ttxs that share the exact same set of member ttxs; converting the remaining cluster ttxs to category ttxs.

An embodiment of the invention provides a method for monetizing ttx categorizations, including: registering at least one ttx category; offering registered ttx categorizations for sale; licensing for use the ttx categorizations and information associated the ttx categorization, granting access and enabling the ttx categorizations to be used by a customer on their local system; selling licenses to access communities associated with registered ttxs, accepting private data to be associated with ttxs, selling private data associated with ttxs, accepting registrations of consortiums formed for collaborative development of ttxs, accepting and processing collaboration and investment transactions involving consortiums, accepting and processing investment transactions involving innovation investment pools.

An embodiment of the invention provides a method for at least one of creation of, naming, specifying a scopx for, listing, voting on, rejecting, linking information to, or describing relationships between the at least two info-items of a field of science; tcept category; tcept; appcept; inventor; patent; product; or roadblock stopping satisfaction of an appcept by a tcept.

An embodiment of the invention provides a method for improving a ttx, including: providing incentives for improving a ttx definition, description, or characteristics; providing a ttx definition system; providing a ttx description system; providing a ttx characteristic change system; and providing community access to the ttx definition system, the ttx description system and the ttx characteristic change system.

An embodiment of the invention provides a method for improving the CMMSYS, including: providing incentives for improving a tpx definition, description, or characteristics; providing an information package requirement description system for stating CMMSYS specifications; providing a tpx definition system; providing a tpx description system; providing a tpx characteristic change system; and providing administrative and developer community access to the information package requirement description system and CMMSYS specifications; tpx definition system, the tpx description system and the tpx characteristic change system.

An embodiment of the invention provides user procedures and a toolset for obtaining one of entertainment, education, personal gratification, esteem for participation in the communities based upon the CMMDB.

An embodiment of the invention provides a method and a toolset for calculating and mining ttx value data from the CMMDB.

An embodiment of the invention provides a method for sharing ttx-based information, including but not limited to: providing related descriptions, analysis articles, identifying at least one of a value, strategy, purpose, application, feature, requirement, roadblock, related to the ttx; sharing visualization experiences including but not limited to: tours taken, visualization viewpoints.

An embodiment of the invention provides a method for customer purchase of at least one of a DataSet, an access right, a registration right, a methodology, an analytic, a model, an execution of a methodology, an execution of an analytic, an execution of a model, a license, a subscription, a CMMSYS component; including: viewing a list of at least one of DataSet packages for a selected ttx element or category, other DataSet package, an access right, a registration right, a methodology, an analytic, a model, an execution, a license, a subscription, a CMMSYS component; and accepting a selecting for purchase at least one DataSet package from the list of DataSet packages.

An embodiment of the invention provides a system configured to manage a customer purchase process, including: an e-commerce catalog module configured to present to a buyer a list of at least one of: DataSet package, an access right, a registration right, a methodology, an analytic, a model, an execution of a methodology, an execution of an analytic, an execution of a model, a license, a subscription, a CMMSYS component, the e-commerce catalog module further configured to receive from a buyer a selection of the at least one of a DataSet package, an access right, a registration right, a methodology, an analytic, a model, an execution of a methodology, an execution of an analytic, an execution of a model, a license, a subscription, a CMMSYS component from the list; a license and access control module coupled to the e-commerce catalog module, the license and access control module configured to limit access to the system to authorized users; a distribution module coupled to the e-commerce catalog module, the distribution module configured to connect with a user system and to provision the user system as needed to install, configure, and grant access to the selected at least one of a DataSet package, an access right, a registration right, a methodology, an analytic, a model, an execution of a methodology, an execution of an analytic, an execution of a model, a license, a subscription, a CMMSYS component.

An embodiment of the invention provides a system configured to share ttx-based analysis, including: a library configured to contain descriptions of tools and application elements, including but not limited to: methodologies, analytics, and models; and a CMMSYS information package catalog linked to the library, the CMMSYS information package catalog containing categorizations for the available elements described in the ttx library and e-commerce functions to enable users to obtain access to the elements for use.

An embodiment of the invention provides a method for alerting in a categorization system, including: notification regarding a change of, including but not limited to: a tpx or its characteristics; a ttx or its characteristics, a specified result from an analytic, the presence of a new developer, provider, or investor.

An embodiment of the invention provides a system configured to provide categorization services to a customer, including: a distribution engine; CMMSYS local system components, and an interface to a customer system, the interface coupled to the distribution engine, the distribution engine configured to distribute, including but not limited to, CMMSYS framework components and CMMDB data sets, the CMMSYS local system components configured to operate on one of a mid-tier server or a workstation, the interface configured to collect data from the customer system, the mid-tier server configured to serve CMMDB data, to manage access, to store and aggregate the collected data, and to release collected data to the central CMMDB, and workstation configured to store and aggregate the collected data, and to release collected data to the mid-tier and central CMMDBs.

An embodiment of the invention provides a method for protecting against full or uncontrolled disclosure of the information held regarding a tpx or ttx, such that only authorized users may obtain controlled information related to the ttx, and the access may be cut off where a license is exceeded or authorization has been terminated.

An embodiment of the invention provides management of a set of communities that each are connected to a ttx of a CMMDB in a specific domain of the owner's choice.

An embodiment of the invention provides methods for initiating and adding community information connected with a ttx, including: facilities for narrow topic chats, blogs, advertisements by nature of transaction desired, discussion forums, meeting, conversation, online-discussion, conference, or other event information, tokens for use to gain access to meetings or other events or to obtain discounts, articles, search scripts, search retrieval results, navigation tours, bookmarks or links to other information, information, information available for purchase or subscription, surveys, contact lists, personal profiles, inventor/conjurer information, development consortium information, and access rights and management information for each of the community facilities.

An embodiment of the invention provides a method to at least one of become developer, become publisher, become customer, become member, advertise, offer, search for, sell, select, purchase, register, distribute, offer for download, request, opt-in for, offer access to, sell access to, grant access to, join, or publish the at least one of the new, enhanced, improved, corrected, or revised at least one of portal function, body of information, subscription, DataSet, or access right.

An embodiment of the invention provides a method to incentivize use by users by at least one of offering awards, membership in a community, access rights, right to own, right to advertise, information, on-line personality/presence, discounts, prizes, recognition as at least one of expert, being creative, added knowledge, provided editing, made significant leap in invention; inclusion by at least one of a developer; a contributor; a publisher; a member of a development consortium; a member of a special group of achievers.

An embodiment of the invention provides a system configured to distribute ttx categorizations in a network, the system including a framework, the framework configured to distribute CMMDB information packages and included tpx and ttx information with restricted use IDs, to configure and control access, and to collect tpx and ttx data, imports, and categorization data from the network.

An embodiment of the invention provides a method for registering a CMMSYS information package, including: registering as a user on a portal to the system; provisioning the CMMSYS information package; establishing access; connecting to a CMMDB; and accessing and collaboratively improving the CMMDB, portal tools enabling the user to access tpx and ttx information and to submit tpxs, ttxs, and descriptive information to the CMMDB, and tools enabling administrators and developers to improve the CMMSYS.

An embodiment of the invention provides a method for managing a CMMSYS information package lifecycle, including: stating a requirement for the package, developing the package, certifying the package, distributing the package during provisioning, licensing the use of the package, registering the package, configuring the package, authorizing the package for use, granting access to the package, providing access to the package, terminating access to the package, terminating the license for the package, terminating the registration for the package, reconfiguring the package, re-provisioning the package by update.

An embodiment of the invention provides a method for managing a consortium for collaborative ttx development, preparing and submitting patent applications, forming a business, accepting or offering investment, including but not limited to: providing a consortium member exchange; coordinating member to candidate communications for negotiations for joining the consortium, registering members into the collaborative, managing secure storage of consortium documentation and tracking contributions, coordinating member to investor communications for negotiations for funding the consortium, registering members into the collaborative, collecting and distributing investment funds, and providing a contribution submission tool.

An embodiment of the invention provides a method for managing a collaborative development process, including: providing a developer exchange Website; registering a developer on the exchange Website; and providing information package submission tools via the exchange Website.

An embodiment of the invention provides a system and method for managing the rapid application for patents suitable in a first to file patent system, consisting of: ideation; methodology based completion of the minimum necessary for patent application; online collaboration mechanism for assisted preparation of an application; preparation for electronic patent application; assistance for electronically filing the application; electronic application and payment mechanism and process; online auction mechanism and process for licensing and assignment of patent rights; online investment mechanism and process for funding invention and for funding development; online option investment mechanism and process for funding invention and for securing future patent rights; and online intellectual property portfolio management.

The features and advantages of the invention will become apparent from the following drawings and detailed description.

BRIEF DESCRIPTION OF THE DRAWINGS

Embodiments of the invention are described with reference to the following drawings, wherein.

DETAILED DESCRIPTION

Figure 1:
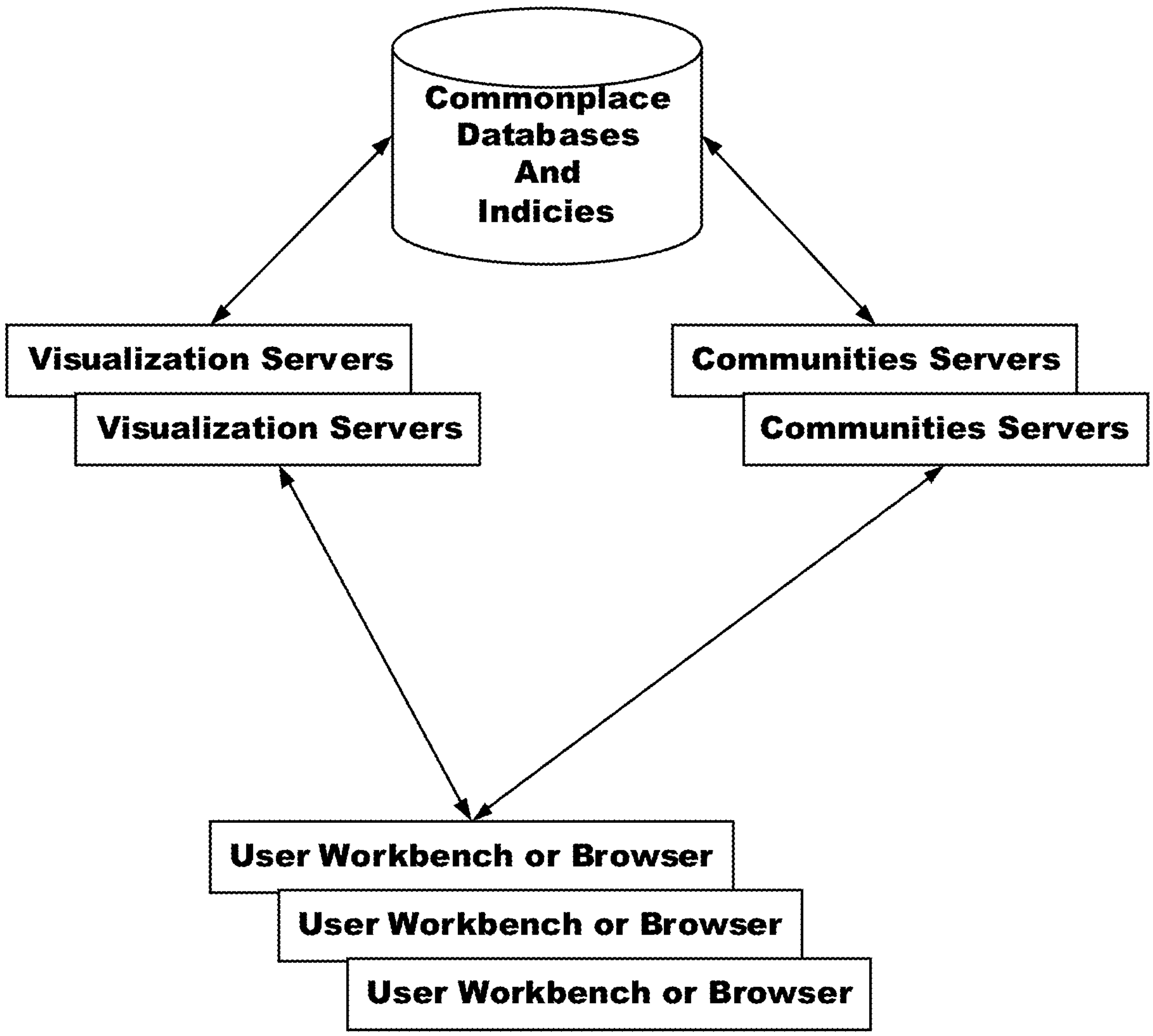
FIG. 1 is a block diagram of a system architecture, according to an embodiment of the invention.
Figure 2:
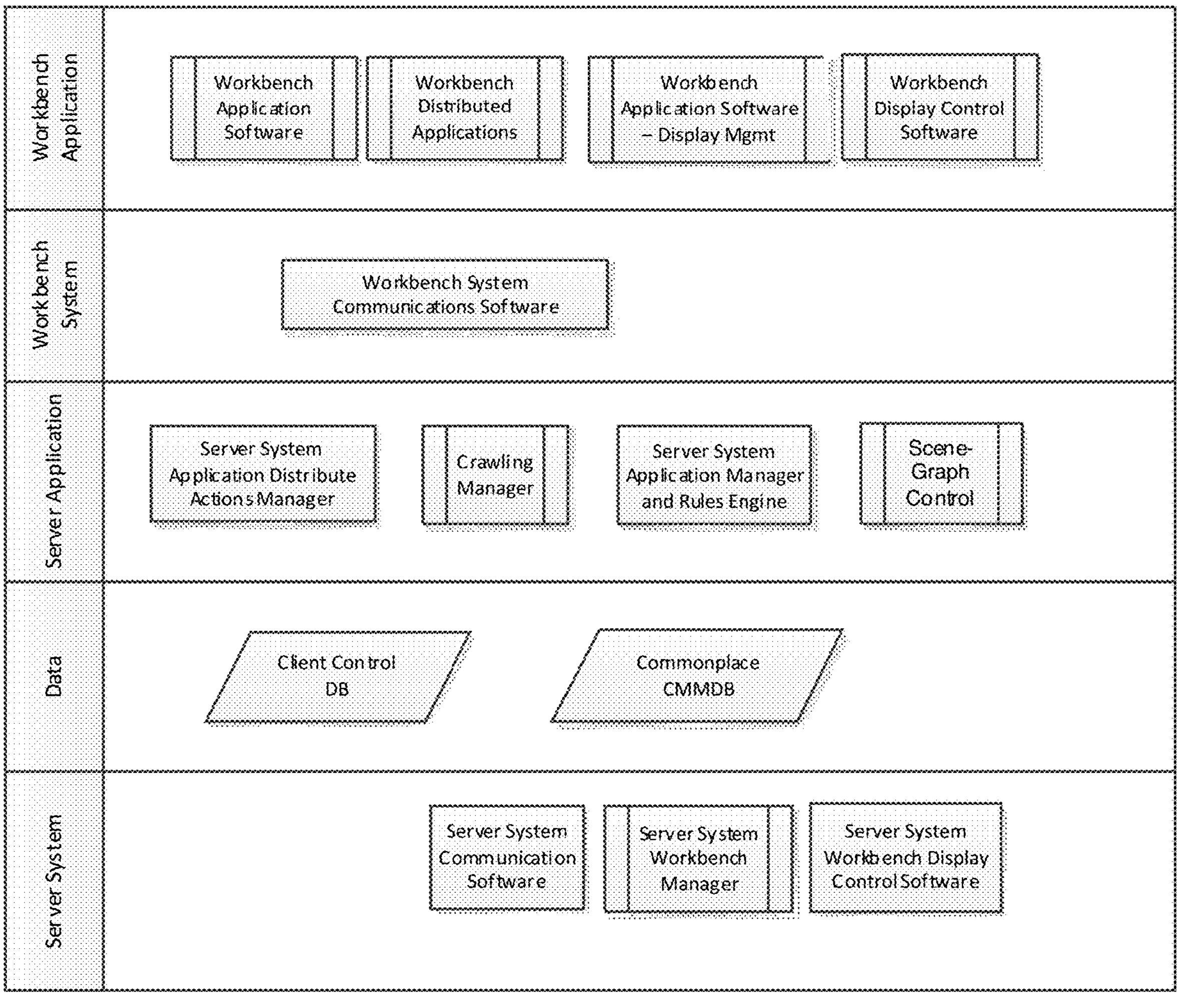
FIG. 2 is a block diagram of a functional architecture, according to an embodiment of the invention.
Figure 3:
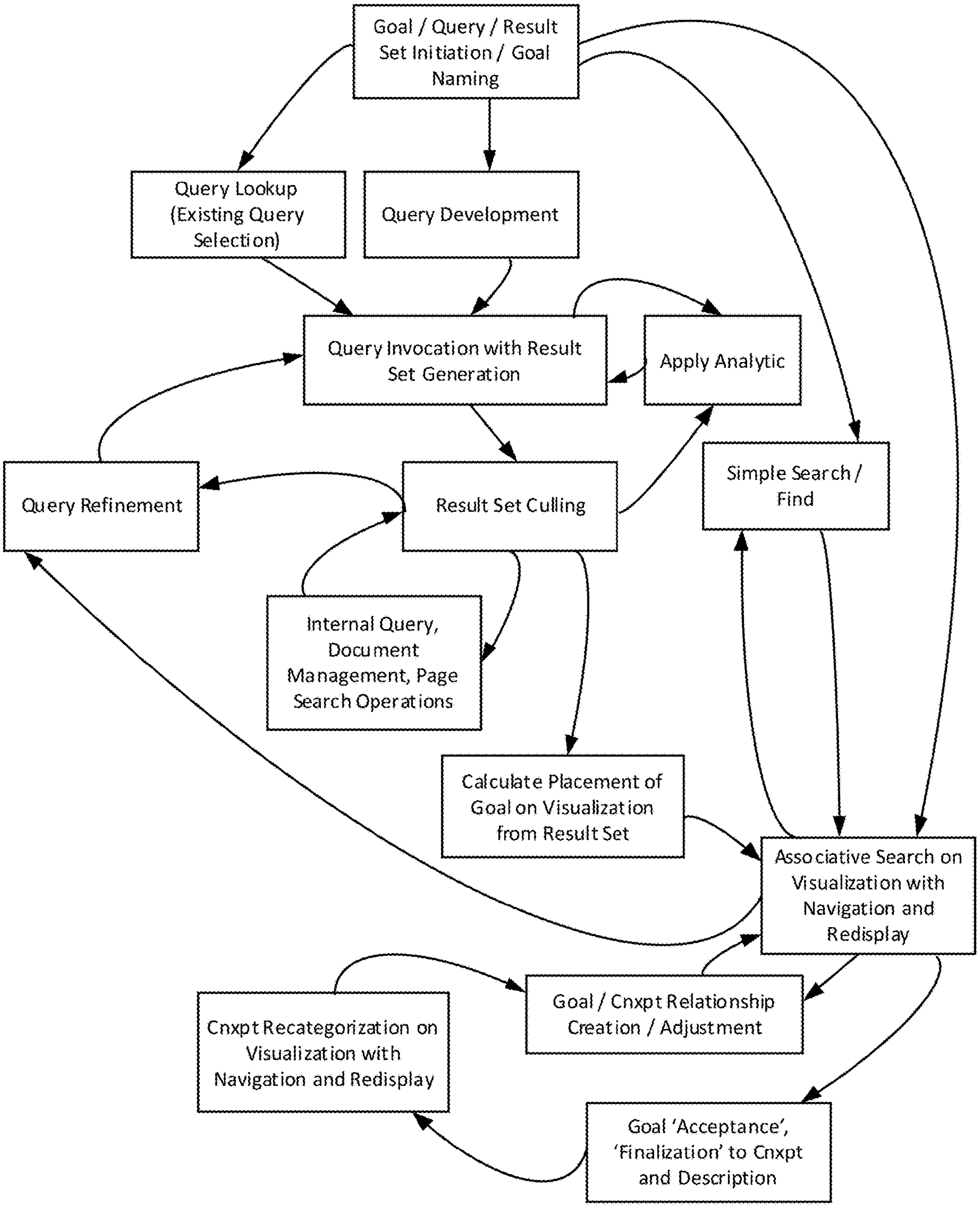
FIG. 3 is a block diagram of the query and conjure process, according to an embodiment of the invention.
Figure 4:
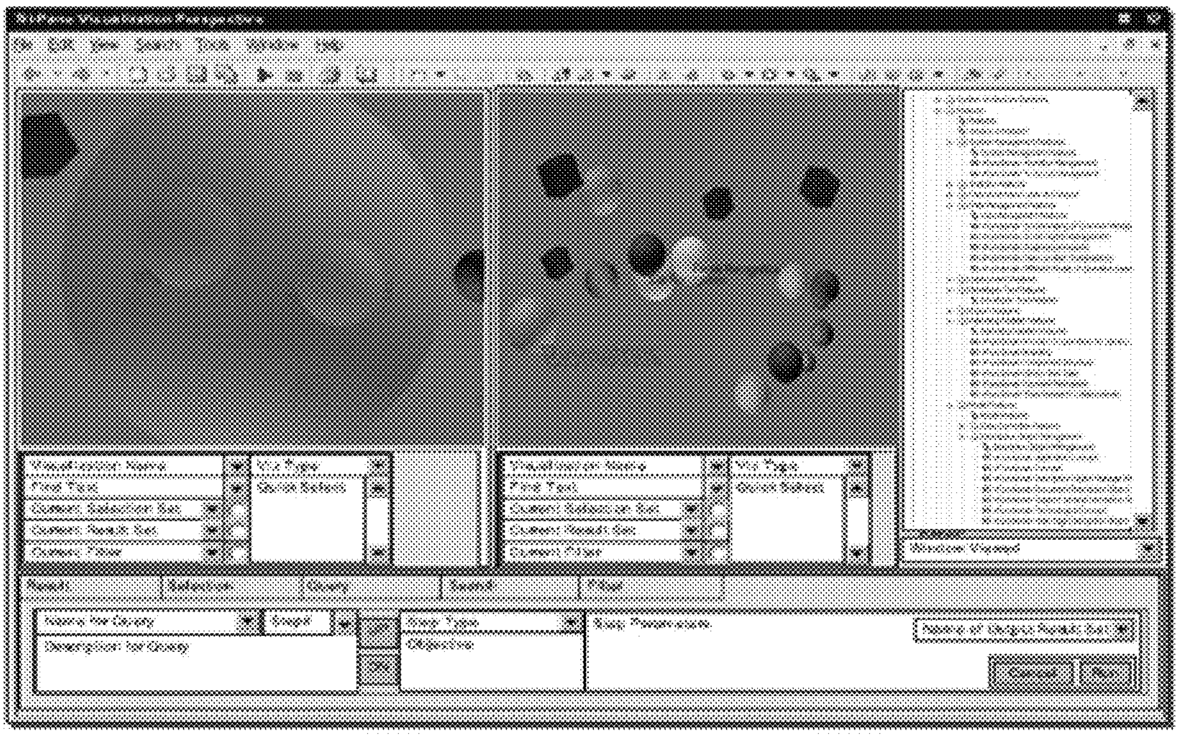
FIG. 4 is a workbench user interface view showing the visualizations and maps for navigation, according to an embodiment of the invention.
Figure 5:
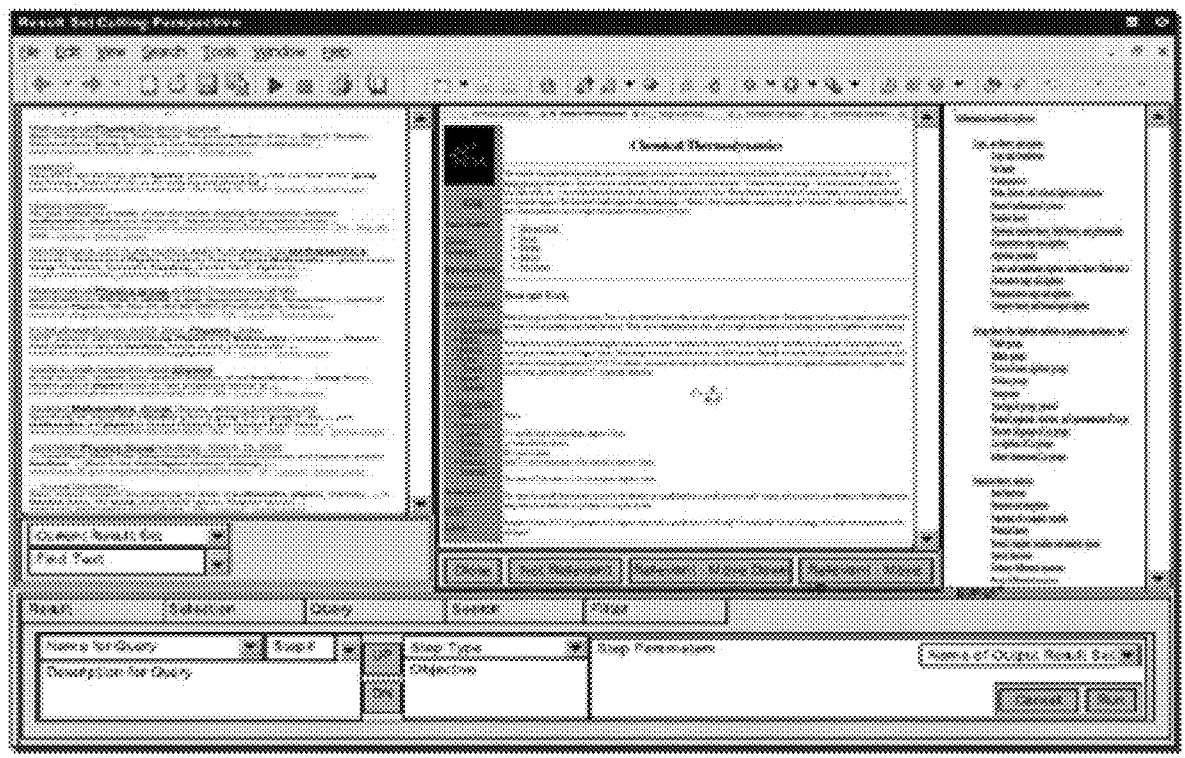
FIG. 5 is a a workbench user interface view showing culling views, according to an embodiment of the invention.

The invention is directed to an improved information creativity, collection, categorization, and retrieval lifecycle, a functional architecture (also described hereinafter as a framework), and improved methods for providing network-based creativity, ttx collection, categorization, retrieval, and exploitation. Embodiments of the invention provide general tools for creativity, categorizing, virtual mapping, visualization, search, and retrieval of ttxs and its extensions for web communities and analytics. Embodiments of the invention also provide a specialization of the general tools directed to technology innovation, creativity, and categorizations, as well as the procedures for manipulating categorizations and use of the tools, technical information categorization and retrieval controls, and business processes for incentivization and fee collection.

Sub-headings are used below for organizational convenience, but do not necessarily limit the disclosure of any particular feature to any particular section of this specification. An improved information categorization and retrieval lifecycle including the process flows involved is presented first, followed by the tool descriptions and the related process flows. The Functional Architecture is presented after the lifecycle, tools, and process flows.

Observations: Advantages and Disadvantages

One use of creativity is in technology innovation. One use of creativity is in legal argument, resulting in development of law.

Creativity

There is a need to better organize for and incentivize creativity and innovation. This creativity begins with the general case of 'new idea' to be collected and categorized, but extends to: by way of example, technology innovation and entrepreneurship. The need extends to incentivizing entrepreneurs to start businesses based upon needed technologies and for technical people to be incentivized to work on clearing the roadblocks to use of technologies. There is an additional need to improve the capturing and use of creativity and the reusability of innovation workers' results, and to otherwise use the information collected for more efficient and effective innovation. There is a need to provide continuous quality improvement of ideas and an iterative process that yields a continuous flow of new ideas and improvements for predictions.

There is a need to reuse the efforts of others over time, incorporating and improving other's understanding of relationships among tcepts, their purlieu timeframes or contexts, and their cncpttrrts. As an example, competitive strategists draw a breakdown diagram of the field they are studying, and summarize their research on the basis of the diagram, resulting in a paper based but reusable understanding of the relationships between technology application domains and players. There is a need is to make this structure available and efficient for users, so that understanding of the knowledge is progressive and the amount of work required of each individual user is small.

There is a need to foster innovation within society and within companies. This need extends to more effective collective development of innovations. Sharing of innovation globally or within a project or company, coupled with protections and collective development, is needed.

Legal Clarity

There is a need to decrease an inventors time to file for patent protection. The economic benefit of immediately filing has changed dramatically through reduced cost to file and reduced burden on best mode and possibility of non-public inventorship.

There is a need to improve the common understanding of the issues and ttxs as recorded by others in legal documents, research papers, and more generally. People around the world have different opinions on definitions of a ttx, and what categorization it should fall under. The difference increases over time partly due to generalization chauvinism theory—since people judge past eras by present standards. For example: When someone said the word 'pipes' (referring to the instrument used as a medium of transportation), it was defined as lead pipes two decades ago, concrete pipes a decade ago, and Carbon nano-tubes in today's world.

There is a need to show ttxs and issues side by side other sources regarding similar ttxs, and products offering these classification indices must be improved to become more dynamically organized to improve efficiency. Examples of such systems abound, including the Shepard's system, Lexis and Westlaw, all of the various patent research systems. Google performs this function with loosened constraints and poorer results for a wider market of topics, but none of these systems offer all that is needed by a researcher who must work effectively, retain and update his work effortlessly, combine the results needed from several sources, and spend less to get the satisfactory result sought. Legal analysis could be built on the shoulders of what others considered rather than merely on their results in court opinions. The strength of an argument could be predicted where prior success at use of a position could be measured, but it can also be predicted by an attorney considered and rejected its use, given a similar fact pattern.

Sharing of Creative Results

There is a need to answer the currently existing demand for technology by uncovering the available technologies isolated in the mind of any of the thousands of potential inventors now unable to find the appropriate means to get an idea into the reach of those able to make use of it.

There is a need to improve the current burdensome common ground for inventors, technology seekers, and technology holders called the patent system. Efficiency demands allowing these groups to come together and share their knowledge, their problems and their potential solutions to avoid replication of technology invention and solve the chaos created due to disorganization existing in today's world.

There is an additional need to variously balance or reconcile the ease of global sharing of knowledge and the cost of exposing valuable Intellectual Property (utility patents or other secrets). Owners of IP need to know what is known by others about technologies they own. They also need access to technologies that surpass their own to solve larger appcepts as is seen within make or buy studies.

There is a need to incentivize and award creativity and thus to protect the new ttxs as they are shaped into marketable products and services. Team formation and investment must occur within the parameters of these protections, but must occur.

There is thus a need to move ideas from those who have them to those who can generate higher value from them. To do so, this need demands that the ideas have to be collected, managed, organized, made retrievable, made useful for valuation and analysis, and, set to be the anchoring point to which new material can be related in a cognitive structure.

Learning

There is an additional need to empower meaningful learning. "Meaningful learning results when new information is acquired by deliberate effort on the part of the learner to connect the new information with relevant, preexisting topics or propositions in the learner's own cognitive structure." Ausubel. Here, meaningful learning involves the assimilation of new ttxs and propositions into existing cognitive structures.

There is an additional need to empower serendipitous learning to make it fun to learn of ttxs that a user had previously not studied or known about through browsing within ttx categories (subject areas) and frequently discovering resources that are tangentially related to known ttxs. This need is not adequately addressed by today's online resources or by search engines like Google, even though the ability widely enjoyed.

There is an additional need to provide the mental excitement as would occur in game program to keep the speed of learning high. Incremental explorative browsing should be provided alongside other techniques to look for something specific, such as performing a search to get to the area showing the required information.

Information Management Tools

There is a need for improvement in technology information management, a broad field today hobbled by a lack of effective tools and proper incentives. In the past, technology information categorization and retrieval meant prior art searching at the patent office, a competitive intelligence study, or a technology road mapping project at a product company. Each of these ad hoc exercises consistently result in one time reports that become stale rapidly. The infrastructure for the studies—the queries and intermediate results—are usually lost soon after the report is written, and have to be recreated when the inevitable need for a repeat of the effort occurs.

There is a need for users to decrease their costs for legal research. The presents Shepard's system, while widely used, is costly yet restricted in abilities relative to what is possible today with dynamic indexing and refinement, akin to but beyond Google's systems.

There is a need for professionals to become proactive in using and managing intellectual property as the need for rapid innovation and more efficient utilization of resources increases, and the amazing amount of information becoming available and the new paradigms of work such as open source expand. For instance, prior art searching must be more efficient than ever because of the extreme waste of resources spent on reinvention and poor utilization of the knowledge of others.

Another need is in environmental scanning within competitive intelligence. Management is driven to see farther out strategically and they often realize how ineffective their tools and organizations are when they are blind-sided by a competitor from another part of the world or another industry.

The rise of data mining and investment vehicles and products improves the market for new analytic and investment products.

The disintermediation of investing and teaming, allowing ventures to form online and be invested in directly establishes a need for vetting, effort management, investment portfolio management, pooled investments, and communities online for entities seeking investment, etc.

Name and Relationship Based Information Management Tools

There is a need to provide deeper classification. Experts are held back when only superficial descriptions of ttxs are available, meant only for the novice. Novices need to start at a general level and progress toward detail only to the degree they must based upon their task. Experts need to be concerned about the future, while investors need to be concerned about the timing of invention, inventors need to know about the details of prior art, and competitive analysts need detailed information about very specific topics. Novices need little of these, but want to find out whether an idea they have considered may have been invented already. What is needed is a tool to mitigate the differentials in understanding levels between experts and novices while addressing the needs of each, and managing the authority and quality issues related to dynamic classification complexity.

A missing element from traditional information categorization and retrieval product solutions is the equivalent of a personal command and control system (a 'Dashboard') coordinated with a consistent management system and database. The command and control system would have to connect the point solution results to a user's view of the CMM when appropriate to achieve consistency, harmonization, and traceability.

There is a need to reduce redundancy and provide authority control in the presence of multiple manifestations—ttxs that are identical in meaning but have different names, names in different languages, misspelled names, or different explanations that are equivalent. Among normal textual works, this problem is relatively small, but not so where the system is ideation centric.

There is a need to name ttx categories in an automated categorization process, such as in clustering, and a need to name ttxs where they are collected automatically as occurs in scraping. When such ttxs are entered into the system automatically, a name should be created for ease of user understanding of visualizations. Keywords are a limiting mechanism and as newer ideas are generated, the ability of keyword lists for use as differentiators decreases. In addition, because the human vocabulary is limited, similar words are often used to name different ttxs even if user entered. People simply cannot generate new words quickly enough and need to rely on existing language to explain new ttxs.

Human input is often the only possible method for correcting such naming to obtain unique names, and even so, it is sometimes unrealistic to expect that uniqueness is possible. There is a need for some ability to improve understandability and adherence to explicit or implicit naming conventions.

There is a need to reduce the burden of choosing ttx names, now a critical activity for the user. In many present systems, naming a ttx has been left to the user who had to choose a unique name and generally stick with it to establish and maintain the 'authorities'. Unique naming has also been required because references are made to the ttx using that name, and since names were tightly connected to the implementation of the system and were 'sufficient' item identifiers, as well as identity indicators, for ttxs. This has had several consequences:

In order to prevent confusion, the user had to: 1) be consistent with existing naming conventions; 2) avoid names already used, and 3) anticipate the addition of other ttxs with similar names.

The user often could not choose names that mirrored those in natural language. Where a natural language name has several meanings, the user was forced to invent a new name. Where several natural language names were synonyms for the same thing, the user had to choose among them.

The user was often not able to utilize synonyms and homonyms, which occur frequently.

There is a need to edit relationships in databases. Databases with deep relationship chains, deep taxonomies, and ontologies are in greater use as more information objects are managed. Some applications, such as intelligence, law, internet, or intellectual property, continuously grow in chain or classification depth. No tool currently provides an ability to efficiently edit an ontology visually. No ability exists for viewing or editing by fxxts, or for viewing with information hiding. Ontologies are little used because, in part, practitioners have little recognition of or means to provide incentives toward use, and thus few incentives for refining or entering new information into the ontology are put into practice. Often, the objects involved in these chains are of interest by specific communities, and online communities centered on the object could be helpful to increase communication efficiency for the interest group.

What is needed is a tool to mitigate the authority and quality issues related to naming and relationship complexity.

What is needed is a tool that is effective enough to provide answers, offer initial values, and also to become the tool for cleanup. Users not obtaining good results for their needs will not be willing to clean up their data or the data from others. The answers must be effective, while possibly imperfect, even where the data is 'fuzzy' and ttx meanings are poorly constructed. The tool must be helpful but not overbearing, providing assistance to reduce user burden and making mere suggestions for improvement rather than denying progress where, for example, a value such as a name is not entered. The cleanup should support, including but not limited to: fix errant data; complete entries; improve understandability; assign best names; clarify description to remove ambiguities; obtain translations; fix grammar; enforce adherence to civility in discussion; enforce adherence to naming conventions and use of authorities; or approve use of suggested synonyms, translations, and homonyms. Each such cleanup need must cause an editorial workflow item to be entered suggesting that a review is needed. A user's prior use forms a context they are familiar with, and thus old names must remain with the named entities for historic purposes.

Currency of Technology Description

Currency is the up-to-datedness of information provided from a repository.

To provide currency, a system must be updated, and the data held in it must be improved.

Problems in Searching Prior Art—Complexity and Detail

Problems in Searching Prior Art—Language

Categorization Services

Known categorization services provide slowly changing and superficial categorization indices. While technologies, led by the Internet, have increasingly allowed for the easy sharing of knowledge and valuable IP, the information for categorization has been lacking, causing wild attempts at 'semantic web' and other research. Companies, such as Derwent, have developed tools aimed at helping IP owners manage their own property (embodied in patents and copyrights), by providing a software solution that allows them to categorize their property with that of others, but these are costly, not dynamic, and limited as well.

Known methods provide inadequate business models for ttx creativity in general, but also where utilizing categorization services. Such services fail to provide modern techniques for analyzing the ttxs, extending the value of the categorizations provided, or providing infrastructure around the ttxs.

There is a commercial need to maximize the value of the information in the CMM, and to be competitive. This need can be met if the information contained is the best available. To achieve data supremacy, users must be incentivized to enter as many new tcepts and appcepts as possible, and to clean up as much database information as possible. Thus an additional need is to provide sufficient value to users to get them to use the system so that they will add or refine information in the database.

There is a commercial need to add incentives to connect in other data and opportunities and to catch user interaction with the data to show user interests, because the value of the data is multiplied by data mining, and for determining the health of innovation.

There is a need for greater ease of use of categorization services and tools. Their present limited audience and purpose has caused them to be tuned for limited purposes and to be tedious for use outside of IP management, further limiting their utility.

In one respect, known methods for procuring categorization services and data provide little or no effective harmonization between new locally defined ttx categorizations and newly defined ttxs from the central data store or even with new locally defined ttx categorizations at another user location. Thus, it falls to the buyer of such services or data to ensure that the categorizations and object definitions in their local system are reconciled with those of a central standard or with other buyer's local systems.

In another example, known methods provide inadequate business models for traceability and version control over changes made in central data stores (vendor's or private) and local systems that might be managed by users and might contain data not privy to the categorization service vendor. Again, it falls to the user of such services to ensure that the data is valid and up-to-date.

Further, known systems for providing categorization information from a central data store are lacking. For instance, they may be configured to distribute categorization information, or collect categorization information (data related to the categorization services), but not both effectively. Moreover, where systems are configured to collect categorization information, they may only be configured to report the collected categorization information, without a capability to timely reconcile and publish the collected knowledge to assist others in categorization, even within the users own organization.

In addition, known systems and methods fail to take into account the full lifecycle of creativity, of categorization delivery, or of categorization refinement and reuse, or to coordinate the information needed for process improvement. For example, known systems do not sufficiently provide a cost-effective way to update categorizations based on changing categorization information from other users.

Also, known tools aimed at helping Intellectual Property owners manage their own property provide solutions that allow them to categorize their property with that of others, but the categorization structures fail to recognize the complexity of the need. The insufficient tools cannot effectively serve product departments more generally causing both unnecessary infringement and wasteful reinvention.

There is an additional need to extend deeper the level of categorization of technologies. Current approaches require the user to develop the queries and filters needed to establish the membership of a particular category below the categories provided or where information needed is classified in multiple categories as defined by the categorization vendor. This constrains the sharing of the knowledge and forces inefficiency.

What is needed is a system and a technique for managing the various categorizations in their various fxxts, enabling an architecture of participation around categorization.

What is needed is a more robust system and method for managing categorization services, including the improved creativity methods, business methods, functional architecture, and lifecycle management processes associated with such management.

In addition, known systems and methods fail to address the vertical markets or the horizontal markets where the needs exist, notably from their inability to provide the generality needed for extension of purpose beyond basic search and retrieval. The competition now, in most vertical markets, is the spreadsheet or a word processing document, leading to a vast under-utilization of prior work.

What is also needed is an improved txo-based information categorization and retrieval management paradigm to deal with a multi-source environment with few standards, providing streamlined methods for incentivized creation of new knowledge; retrieval and inclusion of current knowledge; incentivized refinement of stored knowledge; efficient access, reuse, sharing, and distribution of the stored knowledge; and management of the studies that require all of these. The need is not for unassembled pieces but a working combination. This often involves 'harmonization' of topic indexes from various sources. A need exists for a generalized specification language for scripting the process of finding an index taxonomy from an ontology in a way that ensures that the best structure for the resulting taxonomy.

Search and Retrieval

There is a need to greatly improve searching of highly categorized ttxs. Failure to provide effective searching leads to superficial searching and unnecessary culling of results. By way of example, the field of Prior Art Searching has limited and costly facilities for accurately finding prior art, and the effect is that the cost of each search is high and that results are poor. This leads inventors to forego searches, to spend large sums on fruitless patent prosecution, to claim excessively on patent applications, etc. Patent offices are hard pressed to maintain performance as well. Lack of good quality searches leads to major costs for all concerned as patents are issued and must then be defended against similar technologies.

Similar searches are often performed repetitively when the community as a whole is considered. Often the information sought has been lost due to poor cataloging or categorization when the search is first attempted, or has become stale due to passing of time.

As the quantity of information available on the Internet grows, it is becoming more and more important to provide more advanced search and retrieval capabilities. Keyword indexing, thesauri, meta-searching, and taxonomies alone are proving inadequate in providing a search system that permits a user to effectively locate and access the best available information on the internet and in their organizations.

There is a need for expansive searching, tying information from disparate sources into the result. Present search engines such as Google provide limited sourcing, including local files, corporate knowledge bases, Google knowledge bases, and internet searches. Even this wide set is limited, failing to provide for searches of fee sources and deep web data.

There is a need to better manage returned results of searches. The output of data from Google is in form of links that the user may cull, but the Google facilities stop there. These links are not easily reusable, and the tracking of the links ceases immediately. The links are not easily retained in a sorted list by search query and are not retained by topic. Multi-step queries are not available in some search facilities.

Most available content is unstructured so that it is difficult to locate pertinent data. As the cost of access and disk space has decreased, the volume of information available has grown tremendously. Elementary search engines that simply create indexes of keywords are becoming increasingly ineffective in identifying relevant information. There is a growing need for more effective search systems.

There is an additional need to provide a search system that can be used to perform a search across many heterogeneous information retrieval systems. For example, many organizations have built information retrieval systems to permit users to obtain documents and aggregated data sets published by that organization. It is desirable to provide a search system that can index and catalogue information stored in many different formats on different websites, permitting users to perform a smaller number of searches through a single web portal to achieve a wide search goal on several sites and to obtain disaggregated data in addition to documents. Providing a user the ability to penetrate the content of some sites by more sophisticated searching techniques or by use of an account while at the same time searching other simpler engines would greatly speed the overall search effort.

There is an additional need to provide a system for performing automated cataloging and indexing of information resources. Prior art systems have simply created keyword indexes or use thesauri. There is a need for a system that uses a strong classification system to assist in finding data by keywords, thesauri, translated keywords, and classifications. The system should utilize internet meta-search techniques to find and index information resources not previously indexed, but also search internal data stores and indexed information resources. Information resources should be ranked by relevance to a specific ttx by the meta-search facility, internal analytics, and with the aid of the user to permit more effective search and retrieval of information and reuse of the newly gained knowledge.

Again, by way of example, the complexity and detail involved in Prior Art searching are well known, as is the issue of language, where legal speak is difficult or where patents may be obtained in other jurisdictions.

There is an additional need to provide a system for performing search and categorization for rapidly finding tcepts or appcepts. The categorization must be a stored data CMMDB that contains a structured list of fields of study, tcepts, and appcepts where the structure is provided by various relationships.

There is an additional need to provide content and categorization currency or the users will not find the tool useful over time. The content and categorization should be the 'best available' or it will be seen as stale.

An additional need is that the returned results must be managed for a user during the query process and as a record of the query for reference later. These 'scan hits' are cumulatively important but are also in need of refreshing and any ability to rerun the query and notify the user of new information would be important to a user.

Even if the forgoing needs are addressed, there is an additional need to present the information in a way that users may be educated, may remember context, and may search associatively (by co-location). This need has often been served by map making Prediction The need for currency does not stop at the present. Professionals plan ahead and need to share the information at least internal to their organization Individuals want to see ttxs before they are real. Inventors want to know what ideas others have disclosed, not just which ones have been realized into a product. This need is the bridging of the abstract and reality.

There is an additional need to provide worthwhile assessments of value and importance of tcepts. The average accuracy of these assessments is a measure of collected intelligence. The difficulty is perhaps best illustrated by the frustration most people experience with committees and meetings where the result is rarely much better than the result if the different participants had tackled the problem individually.

Although committees are obviously important and useful, in practice it appears difficult for them to realize their full potential. They fail to organize and they disband rapidly. At the same time, they do yield what may be called the 'best available' information and predictions because of the consensus reached. Small groups and other outliers may and often do believe that they can do better than the public in general, and they are too often correct to be ignored.

There is an additional need to raise the collective intelligence by speeding the evaluations of opinions, and to increase the efficiency of sharing the alternatives.

There is a need to present technologies from varying points of view. As examples, technologies must be seen with their antecedents for prior art, with their contemporaries for competitive intelligence and product assessment, along side yet to be developed technologies for looking ahead, by ownership, by application, and by importance. The need for mapping by these fxxts is needed for associative searching, to communicate current reality, and to stir imagination.

There is an additional need to provide prediction management so that the estimates of users about when some tcept may become real, and what value the reality will have can be stored, assessed, reconsidered, and totaled to obtain the 'best available' guess about the future. Predictions of outcomes, based upon modeling rules for, as examples, market share, investment, risk, competitive position, etc. are a needed additional facility for business decisions and gaming analysis.

An additional need to improve the efficiency of searching is apparent. In one aspect of searching, the number of queries needed to find the proper collection of information for a study could better be reduced. In another aspect, the results of a study involving many queries could be reused, at least as a basis, or at least by sharing the queries.

The need for currency, best availability, and provision of future, the presence of abstract ttxs presents a significant need for collaboration by many users for refinement to decrease the abstraction toward reality. This leads to the need for consensus building to choose the better of multiple user contributions.

Collaboration

There is an additional need to enable effective collaboration. Collaboration in tcept categorization and description already exists widely in the patent system and in research. There many, many experts already involved are not working together well. Every company, every professional organization, every government department, every inventor, and every scientist has some form of categorization scheme and description tool that they use for their own work, but these and the content are almost never shared consistently at any more than a superficial level. This is strikingly obvious when an engineer has to learn something about an unfamiliar tcept and cannot find the experts or the prior work.

The collaboration of various parties in a study, even if unaware, could serve to improve the results for one or more of the group. Naturally, many users will be experts in what they are studying. However, few can know more about a particular topic than the sum of his or her colleagues. Having the additional benefit of outsider information, if handled properly, only improves results. This presents a new need, to provide a mechanism to weigh the opinions and results of collaborators.

The additional need exists to add the assessment of different experts on different fxxts of categorization content to provide better quality in the content and categorizations as the number of fxxts grow. Improvement of data is obviously important. Once new ttxs are entered, they must be examined by someone to determine if they are well-formed and meaningful. No limit exists on the number of poorly formed ideas that could be entered into a ttx system, and so the number of editors needed is very high. Perfection is out of the question because this form of knowledge changes rapidly.

The additional need exists to incentivize users to perform cleanup. The objective to be achieved is acceptability of information AFTER some cleanup. Impediments to use or to clean up must be reduced.

There is also a need to manage ownership interests both in the existing and newly contributed information.

List, Taxonomy, Ontology Comparison, Integration, Harmonization

Few solutions exist for the realistic management of lists, taxonomies, and ontologies to allow operations such as comparison, combination, and differencing on the basis of factors used to limit and organize the data (such as categories, strengths of relationships, etc.); integration by complex equation and factors including the differencing and comparison operations; or harmonization where the combination depends upon very complex factors including personal opinions and voting regarding the naming, relationship strengths, categorizations, rationale for classifications, etc. Few provide those functions for collaboration among thousands of users over thousands of list items and over extended timeframes. Yet all of these abilities are possible and achieved here.

List, Taxonomy, Ontology Statistical Analysis and Modeling

The ability to build models communally is not readily available today. Models based upon lists, taxonomies, and ontologies are possible with the techniques and infrastructure here, because of the combination of relationship based formulas which affect the strengths used in categorization and importance strengths and the other factors here, including the combination and differencing above resulting in fxxt level formulas and multi-level heuristic application. Clustering algorithms are applicable to generate relationship strengths to obtain initial relationship discovery from unstructured data as well as, including but not limited to: determination of similarity of classifications based upon overall opinions on approximately the same base set of data; determination of similarity of classifications resulting from different fxxt specification calculations on approximately the same base set; determination of the similarity of internally held ideas (thoughts in the mind of users) based upon various classifications (children of parents) and characteristics data (cnxpt identifiers).

Communities and Ecosystems and Narrow Networking

There is a need to connect people through and centered upon ttxs. Social networks are not focused upon problem solution or are purposely constructed to serve an audience for a general rather than a very specific topic. Rapid social networking between those interested in a narrow topic will incentivize communication because the efficiency of communication about the topic with other experts is higher than when experts are forced to discuss the topic widely with those less well trained or less interested in the specific topic.

There is a need to provide the ttxs, as an authority control file resource, an information utility, and as a classification structure, to others for use on a dynamic mash-up basis or for use by them to organize content on their system or web site, statically or dynamically.

Audience Segmentation

There is a need to address people based upon ttxs. To serve a specific audience to achieve a sales objective based upon a product or service that is specific to a technology requires collection and maintenance of the interests of the people. Social networking rarely provides the incentive for maintenance of such lists, making their value low. A technology list (classification structure) that rapidly improves and is maintained, along with the incentive provided to those using it is needed. Events or meetings, discussions, teaming, networking, and other ecosystem mechanisms are all in need of audience selection, and where they are associated with technologies, then the classification structure is needed.

Methodologies and Study Management

An additional need to improve the efficiency of the sophisticated studies that professionals in intellectual property and product management perform prescribes better multi-stage query, study management, and collaboration tools. Also, there is a need to impart best practices and sophisticated methods to those who have an immediate need and a general lack of resources to pay for service providers. The delivery of those methodologies to a specific user in a measured fashion and allowing self-help, work management, and any eventual recognition of a need for professional assistance and the coincident customer qualification all show a need for methodology attachment and delivery to users in a managed and measured process.

In specific market segments, where professionals must utilize deeper content and delay is costly, the importance of sophistication in many elements of the search, retrieve, evaluate, and refine cycle interact and compound.

These studies are costly and the present internet environment provides for the disintermediation of these service providers by at least the guidance of the person in need of the services to self-perform various portions of the needed work as stated in well developed best practices and other methodologies though guided workflows, guided self-education, and guided development of documents.

State of Innovation

There is a need to obtain metrics on innovation both within a company and nationally. We don't know how well we are managing the innovation process except by a simplistic R&D and Patent processing metrics. We feel uneasy about our success rate, and yet cannot easily justify spending on improvements.

There is a need to properly describe an 'ideal'—a specific state of technologies at some future point. We cannot predict the 'distance' to it, measure our rate of achievement against it, or show areas where the quality of our attempts is good or bad. We have no Map giving a destination or distances. We do not know if we make good use of our collective intellect because we do not know what we are thinking or what is possible. We do not know what a good direction is for the longer term. Our employees are consistently underutilized in innovation. We cannot easily find technology we need, or the experts in it, etc. We cannot determine easily what specific technologies to invest in. We don't know how well we manage, execute, innovate, or invest.

Employment

There is a need to better manage human resources. Today, the common internet job boards are constructed around needed technology skills on a superficial, vague level. When searching for a job, a candidate first must suffer through a long list of vague job descriptions, then must answer many more than possibly needed where they might have a special skill needed but not well called for in the descriptions. A candidates chance on a job posting is considerably decreased largely because of the lack of a tcept based job board. Further, where a candidate is known by others who show there expertise relative to a tcept, or participate in communities related to tcept, knowledge by others of their skills could be significantly increased.

Response

Recently however, many new technologies have enabled the solution. A CMM offering a structured 'best available' understanding of an area of knowledge, limited in scope, can now be built to serve as a commonplace. A graphical interface aligned with a query facility can bring efficient and reusable mapping to users. Content will improve if incentives are available to users who focus on incrementally defining new tcepts or new appcepts. Content will improve if an ecosystem for the users of a tcept offers community website structures specific to the tcept.

A database that is the best available source for a list of tcepts and appcepts provides significant value from the accumulated CMM information. Tcepts gain liquidity because a market is created where the tcepts can be licensed and sold. Tcept and appcept data also gains value and can be used, licensed, or sold. The holder/owner of the database can extract value from that accumulated CMM information and the interest information from use. Also, users can be offered access to that value for a fee. An ability to allow users ownership and control of their search results is valuable.

A visualization display showing ttxs that are very similar in close proximity provides at least a visual clue to users that the similarity exists. Collocation (a more precise matching) by self-organizing mapping is useful to essentially combine ttxs by apparent similarity. The CMM is more permanently improved by automated merging and categorization, and a user ability to note that two ttxs are so similar that they really should be considered to be in the same category or that they should be the same by combining them.

Such a commonplace can provide prior art searching, competitive environmental scanning, competitive analysis study repository management and reuse, innovation gap analysis identification, novelty checking, technology prediction, investment area assessment and planning, and product comparison and feature planning.

The answer to gaining a common understanding and a common categorization of technology that can be as fluid as the real world, be as current as needed, and still support a substantial set of the needs of intellectual property managers, product managers, and inventors is to use a form of computer assisted and internet assisted Delphi technique in combination with the commonplace and a wiki like system to obtain the deep classification as well as the roll-up needed to provide users the information needed, and to provide the breadth that the real world set of users require.

Early and efficient capture of users' imagination into an accurate structure of the commonplace will empower the most imaginative/expert users in specific areas of technology to efficiently create in the most detailed categories—the fringe areas or the most futuristic ttxs. Early capture maximizes the currency of the categorization. Improving the authority or quality of the information held by proper consensus will ensure the CMM's 'best available' status.

The answer to better innovation metrics lies in having categorization so that statistical measurement based upon the newness of a technological category and its parentage (which changes more slowly) can provide rate of change metrics by technology area on a disaggregated basis.

The answer to improved job search is placement of job availability notices connected to one or more specific tcepts relevant to the job. In addition, use of the collaboration and community structures connected with a specific tcept, if available, would serve to improve the chance that a person involved with a tcept would know and be known sufficiently to connect for the job.

The answer to these needs is a search and categorization tool useful for rapidly concretizing, categorizing, and finding ttxs, tcepts or appcepts. The user views the structure of the underlying data from various points of view using visualizations called Maps, in one embodiment akin to video game displays. Each of the several available Maps is based upon data and the relationships of many varieties stored in the CMMDB ontology. A Map is produced by an analysis of these relationships in the CMM and thus have a structure based upon the typing, scopxing, and fxxt analysis used.

Along the lines of tallying votes about how to organize the map and the underlying index it is based upon, this system interprets a user's 'fxxt specification' to find an index taxonomy from an ontology in a way that ensures that the best structure for the taxonomy results. The taxonomy is then used to form the map.

Searching is like playing charades. A search engine as described here attempts to find what a person is trying to describe, from what they can 'verbalize', about the thought they have. When a person tells the search engine what s/he is searching for, s/he is acting in ways meant to convey their 'charade idea'—a concept hidden in their mind That idea is not necessarily being simply described in words directly into the search engine, but rather through this set of acts such as keyword/phrase searching and document relevance culling, 'survey' question answering, focusing selection display and serendipitous discovery of possible ways to classify the thought, search goal 'avatar' repositioning, technology combination, stating that an application is being solved, stating the traits of the concept, etc., all placed/combined into multiple 'action' or 'step' discussions with the search engine, possibly over a very extended timeframe, and sometimes involving more than one person (sometimes many) into the 'collaborative' search process. Collecting and using all of these combined indicators effectively to 'understand' the concept being searched for is the base technical purpose of the search engine, but the building of the knowledge base from it for later reuse is the key to effectiveness in crowd sourcing.

Data Collection and Collective Creativity

The base of data described above will surely be in need of 'maintenance'. The categories established by the patents and prior art documentation may not be precise. Not all of the ttxs found will be real or meaningful ttxs. The categories will not always be cohesive, or well named. Relations may be missing or odd. Little agreement would be available on some descriptions or names. But, with some work, improvement will occur. Just to understand where editing is needed, a good navigation tool (user interface) is needed. To simplify the data sufficiently for understanding the relationships effectively, a very special user interface will be important.

New users will want to quickly understand the data and find out whether specific ttxs exist, and will use goals.

There are issues involved in building a common memory map of innovation. First, no single person will understand the entirety of the data, but many will have an opinion about one aspect or another when they see the detail. Any information added will have to identify the user and the expertise level of the user making the addition (or change). Different users will feel that they are experts in certain ttxs and will wish to have their contact information related to the ttx (ego, advertising, or notoriety).

A large number of interested parties are needed to update the data. To get a large number of qualified users to start adding and repairing data, incentives such as allowing users to attach their name to new ttxs are used. Second, analysts who wish to obtain improved results will adjust data and make new filters, etc. which will be left for reuse.

Additional Purposes, Features, and Advantages

This section presents summaries of some of the system's other purposes and why the system has value in achieving those purposes.

Document Management and File Systems

Today, document management is most often seen in a personal computer where it is typical to have 300,000 files, most of which are hidden. In typical law offices, the number of paper documents and files is much higher. These documents and files must be controlled, categorized, and accessible, yet the control varies between the document tracking the football pool and the document key to a $Billion verdict. Categorization is extremely differentiated because one document may be relevant to many issues. No one wants to wait for the documents to become 'useable'. This system provides cnxpts to categorize information, and allows documents, as information resource info-items, to be 'occurrences' of the cnxpt. The cnxpts may be changed, recategorized, categorized in multiple ways, etc., but the documents stay with cnxpts unless moved, and documents can be 'occurrences' of multiple cnxpts. Workflows can manage documents as information resource info-items, and cnxpts. Alerts and several other paradigms greatly assist the user to find, obtain, categorize, and access the information resources. Goals are useful to add notes and new areas.

News Collection and Publishing

Traditional news consisted of trusted reporters spreading out and digging up facts. The spreading out is costly as is the digging up. Trust is costly as well. This system cannot fully supplant all of the news operation, but it greatly diminishes the costs involved by crowd collection and trust model operation. News collection will naturally become more rapid, and many 'readers' will have the opportunity to obtain news specifically relevant to them faster with fewer intermediaries, with or without 'filtering' by quality of source, amount of editorial review, translation, or print layout. The instant application can form a bridge between "Twitter" and online newspapers, while naturally also building interrelationships between stories; categorizing the stories by issue, time, interest, etc.; and mapping the topics of the stories for more rapid associative searching.

Law

The business of law has the major areas of Law—Precedent; Litigation—Theory of the Case and presentation; and Evidence—Discovery and presentation, among others. These each evolve over time and require detailed categorization of information within them. Each is 'crowd' oriented, where precedent is established by many jurisdictions, litigation always involves at least two theories of a case, and facts must be supported by evidence that must be obtained and analyzed by many participants. As a document or information management problem, each of these areas can be made more efficient with the instant application. The application of evidence to facts involves the detailing of the specific evidence relevant to the fact, or, in terms here, the establishment of 'occurrences' to cnxpts representing facts. The breakdown of law to elements is a categorization of elements to be associated with law, precedent, contract, legal opinion, other elements, or doctrine, often hierarchically. The application of facts to law involves the establishment of associations between facts and elements. Precedent and statutory law is now and can be better categorized over time by issues as well as citation. The repeated searching for pertinent law by a large number of attorneys is an expert level crowd sourcing wisdom of crowds operation already, but it is inefficient and costly. The instant application provides efficiency, where issues are represented by cnxpts, specific opinion text is represented by cnxpts, and court orders, trial documents, statutes, and other documents are represented by information resource info-items. The issue and opinion text cnxpts are associated and categorized by associations between cnxpts by the searching or manual operations as discussed below. The mapping process below provides better searching results. The result sets enable better searching not only for the first user interested in an issue but for all subsequent users. The associative search queries track issue development. The shared queries, paths, and results assist secondary users of many ilks, such as clerks and law students. The cnxpt categorization provides element sub-element structuring, and the reapplication of elements across precedent and theory, with differentiations. The connection of facts to law by association gives refinement tools to an attorney, providing a review mechanism to his supervisors, an assembly mechanism for legal teams, and a structuring tool for writing or analysis. Discovery involves process/workflow management, document management, setting objectives (information sought), document review (classification, analysis, ranking, presentation arrangement), etc. all of which involve information resource info-items, people (and other txo's), and cnxpts, and all of which must be performed in cycles or in refinement. Litigation is the process of setting a strategy to present a theory and then presenting the evidence relevant to it. Litigation, in terms here, is the assembly of the facts in a theory, and the assembly of the evidence relevant to those fact into a presentation. In terms of the instant application, litigation is the establishment of cnxpts representing the theories, elements, and facts, and the setting of relationship strengths on associations and occurrences to show priorities or importance or for otherwise setting presentation order.

Other Advantages

Further objects and advantages of this invention will become apparent from a consideration of the drawings and ensuing descriptions.

Definitions

Definition of terms used herein are given in alphabetical order.

Alerts

As used herein, the term "alert" refers generally to a notification to a user regarding a change in the CMM, a workflow task, or a new system event that the user has registered interest in.

Collaboration Alerts

A collaboration alert is a notification to users who have previously participated in the definition of a ttx or made comments about, including but not limited to: ttxs, associations, or cncpttrrts which has been changed.

Analytic

As used herein, the term "analytic" refers generally to a package of all of the automation structures that are put into place to effect automation of categorization paradigms required and that are not already a part of the infrastructure. In one embodiment, the analytic information package may consist of a series of items, including, but not limited to:

- programmed components such as plug-ins,
- build scripts,
- deployment and provision rules,
- templates,
- descriptions,
- analysis, workflow, and analysis rules,
- reports,
- naming and definitions of tpxs, categorizations, and information asset groups, etc.,
- low-level txo directives,
- schedules,
- plans,
- analysis queries and metrics,
- workflow process definitions,
- configuration rules for various connections or installations,
- information and analysis displays,
- data structures,
- audit criteria,
- evaluation criteria,
- described calculations, and
- other programmed objects.

When properly arranged, the items are sufficient to perform some automation of, including, but not limited to: data collection, data reporting, and/or categorization actions within a planned context within a system. Analytics, when deployed to the various components of the framework, customize and configure the framework to, in one embodiment, enable specialized operations on information resources and database information during information retrieval query sessions to classify the information resources by query relevance (with levels of relevance recorded by those items selected, those abstracts read, those articles read extensively, those articles reacted to negatively, those visited, etc.), to classify the information resources into categorical groupings, to extract categorization definitions from the information resources, to extract categorization relationships from the information resource information, or to perform other specialized operations within categorization procedures or query processing.

Application Domain

As used herein, the term "application domain" refers to a family of appcepts. Application domains define the bundle of requirements of a wider range of solutions needed to solve a class of similar problems than what a single specific solution at a specific timeframe would require. An application domain description serves as a reference to resolve ambiguities later in the process of, or deeper down in the planning of a product line. It is a repository of knowledge about the characteristics and definition of needs and requirements at a more general level of specification than what is needed to describe a single product. It is also used to state what a company is good at (a 'core asset') and where they focus their attention. Application domains are known as 'domains' in systems engineering and competitive intelligence, or 'product lines' from product management. Domains define a strategic focus for a company for defining a series or family of products. Domains cannot be solved by a single tcept, but appcepts may be solved by one or more tcepts, if at all.

Area of Consideration

As used herein, the term "Area of Consideration" refers generally to a cognitive area of a CMM or of a CMMV virtual map, and thus includes the ttxs, represented by cnxpts, therein, for which a user has shown interest by, including but not limited to: the making of a FindAll (with further action), selection (with further action), search, query, setting of a 'goal', or defining a result set for a goal. It is what the user would say he is studying, although the list of cnxpts contained in the area may not all be relevant to what is his real interest. The cnxpts within the Area of Consideration have an increased probability as being relevant as compared to those not in the Area of Consideration, and that a cnxpts is not within the area does not entirely rule out its relevance to the user's interest.

The root of the "Area of Consideration" is the cnxpt that is the cntexxt of the basis of the area, such that the cnxpt is the lowest parent cnxpt that has all the cnxpts of the area as children or grandchildren, etc. If no such single cnxpt exists, then there will be multiple roots in the Area. All areas are based upon a fxxt specification for derivation of the categorization. (A base fxxt specification is always stated in the commonplace.)

An "Area of Consideration" is a specialization of a Selection Set where the rsxitems are all cnxpts. Dxos may appear in an Area of Consideration in the same manner as a enhanced map.

Area of Interest

As used herein, the term "Area of Interest" refers generally to a cognitive area of a CMM or of a CMMV virtual map, and thus includes the ttxs, represented by cnxpts, therein, for which a user has shown interest by, including but not limited to: the making of a FindAll (with further action), selection (with further action), search, query, setting of a 'goal', or defining a result set for a goal. It is what the user would say he is studying, although the list of cnxpts contained in the area may not all be relevant to what is his real interest. The cnxpts within the Area of Interest have an increased probability as being relevant as compared to those not in the Area of Interest, and that a cnxpts is not within the area does not entirely rule out its relevance to the user's interest.

An "Area of Interest" is a specialization of a Selection Set where the rsxitems are all ttxs.

The root of the "Area of Interest" is the cnxpt that is the cntexxt of the basis of the area, such that the cnxpt is the lowest parent cnxpt that has all the cnxpts of the area as children or grandchildren, etc. If no such single cnxpt exists, then there will be multiple roots in the Area. All areas are based upon a fxxt specification for derivation of the categorization. (A base fxxt specification is always stated in the commonplace.)

Attribute

As used herein, the term "attribute" refers to a property of an info-item that has a value or is unassigned a value. Description fields are specialized attributes used for wild style data for community editing.

Authority Control

As used herein, the term "authority control" refers to the library science principle of quality control over index terms for bibliographic material in a catalog to maintain the consistency in the naming or category naming of exposed ttxs in the CMMDB ontology. The CMMDB will serve as a virtual international authority file for ttxs, and provides for quality improvement by consensus-based naming, description, and interconnection among category cnxpts, ttxs, and information resources to improve the value of the combined data.

Authority control ensures that every entry name, description, or ttx exposed to users are either unique or at least does not inappropriately conflict with any other entry that is already in the CMMDB or may be included at a later date. Names overlap naturally, and interrelationships among ttxs vary considerably by scope.

As part of the facility promoting authority control, authority records are maintained in the CMMDB by use of synonym associations, description variants, and name variants. Synonym associations are affinitive associations formed from votes stating that two ttxs are the same. Name variants provide for synonyms, translations, as well as historic, 'superseded' or deprecated names. The objectives of authority control are to facilitate and make transparent the tracking of the decisions made toward identifying and collocating so that users can assume that a term or phrase will refer to a particular ttx, that name variations will be brought together under the one form, and that relationships are proper. Identification methods are used to determine if a relationship exists between ttx names by whether a ttx is duplicated or merely similar. Various methods, primarily suggestions (votes) from users, will be used to create, weight, and update these authority records, and vote tallying provides a consensus result. In each of the methods above, users will be the primary participants in researching for variants; choosing one among many; analyzing parts of the term; adding, omitting or modifying the term; handling special language cases; linking the used and the unused and documenting the process. The information retained can be as authority records closely mirrors library catalog records, and provide both authority, the voting structure, and for maintenance such as error detection and correction by providing a change log for the other records.

Authority control is used to reduce redundancy by first identifying ttxs through authority based identity indicators, then increasing co-location of ttxs for display (giving notice to users and allowing them to vote), then by suggestion workflow tasks asking what the differences between the ttxs are to generate votes or more creativity. The CMMDB is a Terminological Ontology structured to avoid repetition of information, and to provide continuous improvement in the precision of information on relevancy to ttxs discussed.

Avatar

As used herein, the term "avatar" refers to a specialized Dxo, possibly animated, displayed on a map, that including but not limited to: 1) an 'assistant' for holding a spot on the map and as a bookmark, providing the user an access path to a display of a set of dxos, for providing tools associated with a search, query, or goal and a storage manager for search artifacts, a guide to the user to provide the next steps for a goal or its searches; 2) to show where another person is currently viewing a visualization; 3) to show where a person or company wants to be seen on a visualization as experts, or service providers or product suppliers; or 4) to represent other free or paid position objects such as, including but not limited to: reports available, comparisons, or response analytics that can answer questions. (Signposts are similar to advertisement avatars except that they do not answer questions.)

The avatar may also provide an access path to sets of dxos, txos, or cnxpts as derived from relationships and mappings according to information for various fxxts from a selection, search, query, etc. Each such set can be visualized as a map or a highlighted marking of a map. Refinement of searches, relevance ranking of documents, result set culling, and movement of the avatar by the user will affect the size and placement of the avatar on the map.

Goal avatars are placed at a position where a goal is best located (so far). As a goal is better refined and described, the avatar is moved into the map and more strongly related to, often, fewer txos. A change of position of the Goal avatar changes the description of the goal, and thus the change of position is permanent but alterable.

Question Mark Bubbles and Money Mark Bubbles are avatars placed at a position where new innovative concepts are being sought. Suggestion Bubbles are avatars place at a position and thus in a context where the system has been able to generate a differentiation, keyword trigger, or some other triggering thought that a user could form into an actual innovative concept.

View avatars are placed at a position that user is focused upon (essentially the focus of a camera viewpoint that the other user currently is or was viewing) in the visualization, and may be saved. View avatars may also follow a user's navigations ready for the user to save it for jumping back or sharing. View avatars incentivize communication with other users. A change of position of the view avatar changes the description of the view, and thus the change of position is permanent but alterable if saved.

Advertisement avatars are placed at positions on the map as either fixed or relative to other cnxpts or dxos, as set by a company or individual wishing the avatar to be seen. Advertisement avatars may also follow a user's navigations ready for the user to activate the avatar to obtain a benefit or a service. Advertisement avatars incentivize communication with companies, communities, or other users.

Signpost avatars are placed at positions on the map defined by a user as either fixed or relative to other cnxpts or dxos.

Path avatars are placed at visible points on the map along the path taken or tour defined by a user.

Selection set, Area, and result set avatars are placed at the centroid of the set's objects on the map.

Avatars may act as an assistant to a user where the user is performing searches. The Goal Avatar, Search Avatar, Find Avatar, Query Avatar, and Area Avatars are each a special concept to enable access the information related to searching, to 'apparently' hold that information (in the avatar's accessible contents 'bag'), to make suggestions, and to offer tools and actions to the user.

In one embodiment, an avatar will have a 'go back'/'go forward' or 'undo'/'redo' ability to take it and the underlying meaning (the search, path, view, selection, etc.) back to a prior state, or forward to a previously attained state.

In one embodiment, selection of an avatar changes the user's current selection to the set represented by the avatar. In one embodiment, indication of an avatar highlights the elements of the set represented by the avatar. In one embodiment, indication of an avatar lists the list of information available in its 'bag'.

Avatars provide access paths to tools. For a Goal Avatar, tools include but are not limited to: 'complete goal', 'new query', 'show map', 'show map with filtering', 'apply fxxt and show resulting map', 'apply scopx and show resulting map', 'compare against', and any actions which apply to txos, such as (not exhaustive) 'view web home', 'initiate consortium', 'export list' to export a prior art list, 'file patent application' to prepare and file a provisional application.

Avatars give guidance. Guidance actions available from an avatar include but are not limited to: 'Please Answer' (where the avatar asks a question or provides a survey to the user), 'Please Consider' (where an avatar offers some contextually appropriate information), 'Please Act' (where an avatar provides a methodology driven process for the user to follow, or to continue in), 'Please Describe Me' (where further descriptive and meta information is requested of the user), 'Please Resolve' (where an issue is present in an avatar which needs to be resolved and voting is elicited).

Avatars form a basis for comparisons, provide study results, and summarize model results. Actions associated with avatars include but are not limited to: 'visualize model', 'visualize report', 'compare against', 'detail investment opportunities' and others.

Avatars form a basis for communications, providing actions as available on txos including but not limited to: 'view blog/email entries', 'connect with expert', 'view interest shown', 'blog'. Such avatars may show images of, including but not limited to: individuals, company logos.

Avatars communicate their status and demographic information, including but not limited to: the phase of development the avatar's technology is present in (such as 'Field of Science', theory, patent applied for, patented, productized), the amount of interest shown in the technology represented or the information represented by the avatar, the generality versus specificity or the state (new, recent, bogus) of the avatar's technology concept (as calculated or voted by users).

Avatars with images of inventions or abstracted images of inventions indicate the concept or category without text titles.

Avatars may link to, including but not limited to: web page for cnxpt, cnxpt originator or owner sites, a ticker showing a metric, a news/activity feed, portfolio visualization page, advertising page, expertise page, 'community' or 'ecosystem' pages, job description pages, Consortia/team building pages, negotiation tracking pages, workflow control pages. Such links allow a commercial and/or social mechanism where the idea maker can help others with innovation or state perspectives.

Categorization

As used herein, the term "categorization" refers to a division of items into classes or groups (called categories) according to a particular system. The categories may be mere 'parents' or may have a greater semantic meaning. It is the basic cognitive process of arranging items into classes or categories defined to contain items only of the same type by some definition. More specifically, a categorization is a classification of items within in the CMM into logically hierarchical classes, subclasses, and sub-subclasses based on the characteristics they have in common and those that distinguish them.

Categorizations hold onto the effort put into performing the original classification by defining the relationships. Lists may be used to display the contents of a categorization but are not powerful enough where an item might properly be a member of multiple categories. For instance, a categorization by field of science is useful to show where the science behind a technology was developed. Of course, most technologies stem from multiple fields of science (and business). The field of science categorization is useful for learning about the technology field progressively from the general to the specific, and is used for general searching. The separate categorization for TPLs, also categorizable from fields of science, is useful for determining how outmoded or obsolete a technology is, or where gaps in technology exist.

Technology categorizations, as a basis for communities, offer narrow groupings of members that have a greater sense of trust in what is discussed and a heightened expectation that the other members wish to be efficient in discussion. The members of the group are more homogeneous due to their common interest in the technology of the categorization.

Also, categorizations provide a basis for calculation and modeling, especially for roll-up or for holding of aggregated data not available in a disaggregated form. A categorization based upon a company's product lines is needed for each company for comparing the revenue, for instance, with that of other product lines. Or, a company would like to show how their R&D lab is benefiting various product lines. These categorizations form a technology management, research management, product management, or competitive intelligence categorization. Each company would have their own version of each, and the categorizations would each change over time, etc.

Categories in Comparison to Taxonomies, Classifications, and Ontologies

Tpx Categorizations

As used herein, the term "tpx categorization" refers to a division of tpxs into classes or groups according to at least one of a particular algorithm to describe an organization of the tpxs in the CMMDB.

Tpx categorizations are based upon unscopxd relationships, such as, including but not limited to: member tpx and the category it is in, specialization txo and the more general class txo it is based on, as well as those relationships without scopxs listed elsewhere in this document.

In one embodiment, tpxs can be organized by, including but not limited to: when a tpx was 'conceived'; who should have access to a tpx; who owns a tpx; which license a tpx packaged into; which techniques can be applied to analyze a tpx; the lexicon used a to define a tpx; the language of the original tpx description; a workflow category set up to encompass tpxs needing improvement; a category set up to encompass tpxs of a specific interest; a result set of a query or an analytic converted to a tpx possibly not yet named, now representing a tpx encompassing other tpxs that were set as rsxitems by the query or analytic; a tpx, possibly named, stemming from the import by a user where the tpx was a category in the import; a tpx, possibly not yet named, stemming from the indication that a set tpxs are members of the new category.

Ttx Categorizations

As used herein, the term "ttx categorization" refers to a division of cnxpts representing the ttxs into classes or groups according to at least one of a particular algorithm to describe an organization of the cnxpts in the CMMDB.

Ttx categorizations are based upon one of: scopxd associations, such as, including but not limited to: sub-category and its parent category, cnxpt and the ttx category it is in, cnxpt and a more general ttx it stems from, as well as those association scopxs listed elsewhere in this document; an analysis of cnxpts by an analytic or other algorithm separating the cnxpts into groups; or by a fxxt calculation. In all cases, the categorizations are retained by construction of (or use of preexisting) scopxd associations which may be held only temporarily.

In one embodiment, ttx categories are 'soft' in that all cnxpts are susceptible of becoming categories: categories may be formed around a cnxpt even if the cnxpt would not normally be considered a category where, for instance, a new ttx is created as an improvement from the ttx represented by the original cnxpt, and thus the original cnxpt then appears to be a category encompassing the new cnxpt.

In one embodiment, ttxs can be organized by, including but not limited to: when a ttx was 'conceived'; what predecessor ttx is a ttx stemming from; who should have access to a cnxpt; who owns a ttx; what field of study is a ttx related to; which users have queried for the ttx; which users have visited the cnxpt; which license is a cnxpt packaged into; which techniques can be applied to analyze a ttx; the lexicon used a to define a ttx; the language of the original ttx description; a category set up to encompass cnxpts needing improvement; a category set up to encompass ttxs of a specific interest, represented by a category cnxpt; a goal converted to a cnxpt not yet named, now representing a ttx encompassing other ttxs that were rsxitems in the goal; a cluster converted to a cnxpt not yet named, now representing a ttx encompassing other ttxs that were found to be in the cluster; a result set of an analytic converted to a cnxpt not yet named, now representing a ttx encompassing other ttxs that were set as rsxitems by the analytic; a cnxpt, possibly named, stemming from the import by a user where the ttx was a category in the import; a cnxpt, not yet named, stemming from the indication that a set of ttxs are members of the new category represented by the cnxpt.

In one embodiment, cnxpts can be organized by, including but not limited to: scopxd associations and scopxd category cnxpts.

In one embodiment, tcepts can be organized by, including but not limited to: fields of study; technology area; application domain; its applications; when a tcept was 'conceived'; how a tcept is described; the tcept name; who named a tcept; what the parts of a tcept are; how a tcept works; the features/characteristics of a tcept; the requirements description of a problem it needs to solve; the tcept's predecessor; the department set to manage a tcept in a specific organization (professional organizations, lobbying organizations, publishers, companies); patent index for each patent classification and country; who has been granted access to a tcept in a specific organization; who owns intellectual property associated with a tcept; the products associated with the tcept; the first product based on the tcept to become available; the product line of the first product based upon the tcept; the research field the tcept is assigned to; the tcept's competitive intelligence category; the stage a tcept is in; how qualified is a tcept for investment; what field of study a tcept is related to; which intellectual property license package it is in; the techniques that can be applied to analyze a tcept; the team analyzing the tcept; the tcept's inventor; and the categories a ttx may be organized by.

There may be considerable overlap between categorizations in that one tcept, for example, may be listed under a technical categorization in each of several categorizations, and not in some others. This might lead a novice to conclude that the tcept is misfiled in some of the categorizations though it is not. It is simply that the ttx's relationship to another ttx is different in different classifications. Each cnxpt is still correct and well described, but the relationships are simply different in different fxxts.

Categorizations are needed to show which technologies are needed for solving a large business problem or are needed to produce an end product. To make the end product improve or to find a new one to takes its place, new technologies or improvements in older technologies will be needed, and some categorization of those technologies is needed to track their availability or to compare their usefulness. These categorizations form a replacement technology genealogy or technology improvement/replacement roadmaps.

Ttx categorizations are used for, including but not limited to:

- Organizing knowledge;
- Simplifying knowledge by segmenting it into smaller, better defined, concrete areas;
- Providing focus to information; getting a foothold position on a body of knowledge;
- Organizing research, analysis; or
- Organizing new information into a fabric of previous understanding
- Intellectual Property Categorization, Analysis, Evaluation, and Comparison
- Managing Intellectual Property department
- Compartmentalization of security regarding Intellectual Property
- Determining ownership of ttx
- Determining protection needed for a ttx or whether exposure may occur
- Focus Intellectual Property Analysis on specific element (claim) of inventions (detailed)
- Focus Intellectual Property Analysis on specific groupings of elements of invention(s) (expansive)
- Evaluate Groupings of ttxs (claims)
- Coordinating with others within specialty area
- Obtain input/evaluations from others by specific Intellectual Property
- Organizing Competitive Product Analysis
- Provide structure for determining ownership based upon ownership of prior art
- Categorization structure for internal knowledge base and cross reference to external knowledge bases
- Provide some organizational learning and foster reusability of prior efforts and analysis; (continuity of organization)
- Licensing negotiation and packaging
- As a basis for analytics—to apply different analysis patterns for different tcepts
- As a tool in comparisons:
  - to properly compare values of groupings of IP—members of groups cannot vary between comparison periods, and members may not vary from one analysis to another.
  - to provide for consistent summation and characterization of value
- As a tool in Litigation and Patent Prosecution
  - in Prior Art Studies
  - to focus and control litigation
  - to coordinate language across many lexicons (each patent has its own)
- Patent awareness management for bureaucracy reduction, efficiency, organizational management Ttx categories may be used for searching, including, but not limited to as a:

- basis for a fxxt;
- aid in finding specific information within a category;
- aid in finding contextual information in surrounding (inclusive) categories; and
- aid in finding results by Impulse Retrieval.

Categorization Hierarchy

As used herein, the term "categorization hierarchy" refers to an ordered set of cnxpts within a fxxt after reduction to a directed graph, where each cnxpt other than a root cnxpt must be related to another cnxpt within the hierarchy by an association according to rules specified for the fxxt. While hierarchical, at the same time, categories may be located in different orderings in multiple different categorization hierarchies. In one embodiment, cnxpts may be repeated (possibly by reference only) within the directed graph so long as no cycles exist.

Where a categorization hierarchy is formed, the set of ttxs that fall into any category are those whose representative cnxpts participate in an association of the proper nature and direction with the cnxpt representing the category, based upon the fxxt specification. A cnxpt (C1) may be a category in one fxxt and have cnxpt (C2) as a 'sub-category' (member) in that fxxt, but in another fxxt the cnxpt (C1) may be a member of category cnxpt (C2). Cnxpts are connected by an arbitrary number of associations.

Characteristic

As used herein, the term "characteristic", "cnxpt characteristic" or "ttx characteristic" refers to an expansive set of assertions tending to describe a ttx, assigned to a cnxpt representing the ttx. In the use of the term characteristic to explain an abstract ttx, the term refers to a list of elements, including, but not limited to a cnxpt's: names, definition, description, purpose, scopx, infxtypx, occurrences involving the ttx, attributes, purlieu timeframes or contexts, cncpttrrts, and roles it plays in associations with other cnxpts or in relations with other txos.

Txo Characteristics

As used herein, the term "txo characteristic" or "tpx characteristic" refers to an expansive set of assertions tending to describe a tpx assigned a txo representing the tpx. When applied to tpxs or txos, the term refers to a closed set of computational constructs that can serve to hold a representation of the information explaining the represented tpx, including, but not limited to: names, attributes, infxtypxs, description fields, relationship participation, and for every relationship in which they participate, their role.

Clump

As used herein, the term "clump" refers to one or more bundles of information that a server transmits to a client user interface that may be translated into a map easily.

Cntexxt

As used herein, the term "cntexxt" refers generally to a cognitive area of a CMM and thus includes the ttxs therein. A cntexxt is defined by a parent category represented by a cnxpt where all of the ttxs under consideration are represented by children or grandchildren cnxpts of the parent cnxpt. A cntexxt is not an info-item or represented by an info-item other than the parent cnxpt. To exist, a cntexxt must be identified within a categorization.

In addition, when used in the context of a CMMDB, an area of a virtual mapping of a specific categorization limited to the area defined by the visual representation of the parent cnxpt and thus including the child cnxpts therein, and necessarily includes the parent cnxpt itself.

Collaboration Blogs

As used herein, the term "collaboration blogs" refers generally to a display of change history. Votes regarding, including but not limited to: ttxs, associations, or cncpttrrts form threaded lists and may be seen as a history or 'blog' regarding the ttx stating that changes occurred.

Collective Intelligence

As used herein, the term "Collective intelligence" refers generally to the ability of a group to solve more problems than its individual members can. It is argued that the obstacles created by individual cognitive limits and the difficulty of coordination can be overcome by using a commonplace or CMM. Here, it is the collected set of cnxpts, associations, occurrences, irxts, and other info-items along with votes regarding cnxpt properties, cnxpt existence, cnxpt association's strengths and existence, and occurrence's strengths and existence.

Collocation

As used herein, the term "collocation" is used in its "co-location" sense, referring to the act of positioning dxos close together, in a grouping, or into a certain order in a visualization to indicate, including, but not limited to: similarity of meaning, common purpose, common membership, common interest, or common categorization. Collocation is also used to convey the combination, for summarization, of similar cnxpts into a single representative object. The purpose of collocation is to achieve the "collocation objective;" and provide binding points from which everything that is known about a given ttx can be reached. The literary meaning of collocation as being words that are often used together is not used here except in the narrow use as a technique for semantic analysis.

Commonplace

As used herein, the term "commonplace" refers to a knowledge base tuned to capture the ttxs imagined by creative thinkers and to efficiently provide detailed information to innovation and intellectual property workers about those ttxs to share, search, discuss, base calculations on, stay current with. A visualization provides an organization to the information where a user can easily understand that an 'outer view' can represent a field of science or top level category, or a very old predecessor technology, and that a leaf represents a newly added recent or future technology.

Social networks and communities built on the commonplace provide forums to users to collaborate and to present their questions to specific educated groups pertaining to their ttxs of interest.

Ttxs exist in the human brain. As a human invents or discovers something new, they 'conjure' a new mental ttx to represent it and all of the parts of it Humans also learn about ttxs, but their learning is quite often imperfect, and again they essentially form a mental ttx that serves as a placeholder for their understanding. In any case, these mental ttxs become related to other ttxs to place it into perspective, characterize it, differentiate it from others, or to connect it to others. Commonplaces are formed where these mental ttxs are shared with others.

Common Mental Map

As used herein, the term "Common Mental Map" ("CMM") (sometimes referred to in the literature as a Collective Mental Map) refers to a shared collection of explanatory constructs, or a commonplace, that individuals can use to make connections with their own cognitive categories and which contains a common understanding of a domain of knowledge used to facilitate dialogue. Participants in the dialogue can establish the credibility of the data, the accuracy of the categorizations, ttxs, and relationships, and their descriptions that are critical to moving discussion toward deeper collective understandings and to reach a consensus on the language, relationships, and descriptions used.

The CMM, a specialization of a term of art, refers to the collection of data used as a basis for forming maps rather than a graphical or textual map itself. Common Mental Mapping is an attempt to foster a consensus regarding the naming and definitions of accumulated ttxs and categorizations of knowledge to facilitate the process of producing indices and for providing a structure for deeper, incremental ideas. In one embodiment, the accumulated consensus is held in the CMMDB.

The CMM paradigm provides access to information based on a model of the knowledge it contains. The basic mechanisms of CMM development include averaging of individual inputs, amplification of weak links by positive feedback, and integration of specialized sub-networks through division of labor.

A CMM can be formalized as a weighted, directed graph. (Here, weights on relationships are effectively synonymous with relationship 'strengths') A CMM is composed of different element types, derived from a basic set of architectural forms, used to represent, including but not limited to: ttxs, occurrences of ttxs, and associations between ttxs. Dxos for visualizations and infrastructure txos as control structures augment the CMM. Other info-items that extend the expressive power of the CMM, include but are not limited to: information resources, purlieu, cncpttrrts, scopxs, and fxxts.

The CMM involves a series of three thesauri, organized into three interconnected levels of knowledge. The most rudimentary level of thesaurus term is a keyword phrase, which, if cleaned up and described, serves as a basic thesaurus entry. A second level thesaurus is formed by ttxs represented by cnxpts, providing a general purpose and loosely constrained structure of knowledge. The third level thesaurus is formed by a tightly controlled structuring of knowledge within a specific knowledge area, such as technology, medicine, or law, where specific relationships are useful and specific modeling or domain knowledge based prediction is possible.

Limitations of Common Mental Map Purpose

In one embodiment, strong limits are placed upon the scope of the CMM to reduce the burdens caused by over generality. In one embodiment, the purpose of the system is exclusively for mapping certain types of abstract ttxs rather than other forms of objects, such as places, general objects, materials and so on.

The CMM here is not merely a registry of change events or an edited collection of notes, it is a highly selective representation of the consensus resolved from the suggested changes of authorities (names, categorizations, relationships, etc.) regarding ttxs.

In one embodiment, this system does not attempt to understand the ttxs or to solve problems, but it does attempt to help solve the users' main problem of understanding the abstract model of the ttxs.

Common Mental Map Database (CMMDB)

As used herein, the term "Common Mental Map Database" (CMMDB) refers to a stored collection of explanatory constructs making up a CMM, and all structural control and website data necessary for establishing and controlling the system. The CMMDB will hold many hierarchical structures or poly-hierarchies, but such trees are not required. In one embodiment, the ontology used will be a terminological ontology.

In one embodiment, the CMMDB may be a database, possibly distributed. In one embodiment, the CMMDB may be replicated. In one embodiment, the CMMDB may be exported in part, still retaining their nature as being a part of the CMMDB, and the export(s) may be recombined into the whole carrying any changes back into the whole in an appropriate, deterministic fashion.

A CMMDB functions first of all as a shared memory. Various discoveries by users are entered and stored in this memory, so that the information will remain available for as long as necessary.

Terminological Ontology

As used herein, the term "Terminological ontology" refers to an ontology described by Sowa whose ttxs and relations are not fully specified by axioms and definitions that determine the necessary and sufficient conditions of their use. The ttxs may be partially specified by relations that determine the relative positions of the ttxs with respect to one another, but do not completely define them.

The CMM will contain poly-hierarchies and is not designed to be as pure as an Axiomatized Ontology (A terminological ontology whose ttxs and relations have associated axioms and definitions that are stated in logic or in some computer-oriented language that can be automatically translated to logic.) that might be used as the basis of artificial intelligence.

Topic Map Paradigm as Related to the CMM

The CMM is similar to a Topic Map as it is a container for abstract ttxs that are described to some degree. The CMM is used for the purpose of collecting what is known in specific subject areas. In one embodiment, it is to be used by those trying to invent new ttxs, and those seeking to determine if a ttx is known either within the CMMDB or in some accessible location outside of it. It is not a conforming Topic Map because not all ttxs are fully formed and there is an intention NOT to require them to be fully formed. It is a pre-resolution (some things included may not become well stated or 'real') map rather than a post-resolution (everything included being a current or historic description).

Assimilation theory stresses that meaningful learning requires that the learner's cognitive structure contain anchoring ttxs to which new material can be related. For this reason, Ausubel argued that "the most important single factor influencing learning is what the learner already knows. Ascertain this and teach him accordingly."

The Topic Map is assimilation theory's major methodological tool for ascertaining what is already known. The CMM here focuses on the polishing of the knowledge already known, and the extension of that knowledge toward what was not known by capturing the thoughts of users early on.

Topic and concept maps structure a set of ttxs into a hierarchical framework. More general, inclusive ttxs are found at the highest levels, with progressively more specific and less inclusive ttxs arranged below them. This CMM displays Ausubel's notion of subsumption, namely that new information is often relative to and subsumable under more inclusive ttxs. The CMM here is not as constrained as a topic or concept map. Here, undirected relationships and cycles may exist, and the graph is not necessarily a tree, or even a forest of trees. The ttxs in this CMM are only forced into a hierarchical by extraction into a map.

Common Mental Map Visualization→(CMMV)

As used herein, the term "common mental map visualization" (CMMV) refers to at least one of a specifically formatted visualizations resulting from the CNVP and displaying an abstract of the data in the CMMDB.

Ttx Mapping Visualization Process→(CNVP)

As used herein, the term "ttx mapping visualization process" (CNVP) refers to at least one of a specific process for developing and displaying a visualization based upon data in the CMMDB.

Communities

As used herein, the term "communities" refers to the social mechanisms allowing a user to interact with others using the system. Each community focuses the resources of the system to the defined needs and wishes of a specific group of users to heighten their perceived, real, and expected value of use and involvement. The communities are structured to be professional and social. Communities are intended to be based upon specific value models to enhance efficiency of use for the user.

Communities are website based, and integrate into the web structure of the CMM. Communities are usually tied to ttxs, such that the users interested in that ttx may join the community tied to it. This increases the efficiency of communications because the members of the community feel greater kinship as they believe that each user in the smaller community has a greater affinity for the community and greater knowledge of the ttx. As a ttx is concretized, communities are created around it. The communities may be migrated to new ttxs, and users may move their affiliation with a community to a new ttx, so long as the new ttx is a sibling or child of the ttx that the old community was tied to. This also allows the user to move his interest to ttxs that are newer offshoots of a ttx, becoming more tuned to a specific topic, narrowing the community involved to only those highly involved with a ttx, and refreshing the user's context for involvement.

Communities include mechanisms to incent a user to interact with the others using the system. Each community focuses the resources of the system to the defined needs and wishes of a specific group of users to heighten their perceived, real, and expected value of use and involvement with the system. The communities are structured to be professional and social.

The communities will be 'ecosystem' oriented offering services which allow a user to obtain value while in a specific phase of the innovation or development cycle, such as pre-invention (education, browsing, watching, gaming), brainstorming toward initial conjuring, ttx consortium initiation, refinement and editing, incremental innovation, business formation, team building, patent prosecution, product development, competitive analysis, investment raising, IP licensing and commercialization, information e-commerce, product sale e-commerce, project management e-commerce, roadblock busting, expertise sharing, futurist analysis, and sci-fi enthusiasts (dreaming, gaming), investor/portfolio management (gaming, investment, data mining), policy and governance/government, and intelligence.

The communities offer a range of ecosystem tools, including event (online meeting/offline meeting/public/private/project/social/multi-media/conversation/task/objective/deliverable/etc.) management; information resource/content management (blog/shared wisdom, searches, tours, and link bookmarking/project discussion/team communications/shared editing/etc.); resource management (product/project/expertise/license/people/etc.); outreach, advertising, and social tools, and other tools.

As a user moves from one phase of his involvement with a technology to the next, he will be able to migrate his community information into the community of the next phase. As a user migrates his interest in a specific tcept to one or more specific tcepts (sub-tcepts or adjacent tcepts), he can migrate his community information to the newer tcepts with ease. This migration ability keeps the user efficient and refreshed, but also moves his subscriptions, licenses, membership fees, incentive discounts, and account information from a specific tcept based community to another along the development progression of the ttx, increasing the expected value and stickiness of the system, enhancing the currency of information, and retaining cohesiveness for the user's workbench.

Communities may also be formed around map 'locales.' For instance, a fxxt based upon tcept timing, or timeframe of tcept fruition, might yield communities such as 'products available 100 years ago' or products just becoming available in 2025. A fxxt based upon geography of inventorship might yield a community of inventors in upstate New York in 1810.

Community Establishment

In one embodiment, when a new tcept is created, however it is created, a landing web page for that tcept is instantiated, along with a new set of community websites. Other community pages may be established over time. The pages and sites will available to users with proper access rights and roles.

In one embodiment, community access and authorship authorities will be sold.

A user will be able to migrate his access rights and content to deeper tcept names to focus his blog or community. In one embodiment, a user can add new tcept names to his blog or community to make it more wide in applicability and potential audience.

Forming Community

Communities involving a ttx are represented by comxos, a specialization of a txo. Communities available here are, including but not limited to:

Technology Communities
Roadblocked Technology status
Development and Expert Opportunities
'Undisclosed Technology'
'Subject of patent application'
Project in by stage of growth
Brainstorm Contests
Most Incremental Additions contests
Triz contests
Highest valued new idea contest
Most hit new idea contest
Most hit idea monthly contest
Predict, mock invest (bet on), or invest (jump in) in above.
Get rated on predictions, mock, real investments.
Anonymous/Secure comments, notes, changes requested (negotiations)
Ask for a job
Outreach/Advertise—Timing for Advertising:

Concretization

As used herein, the term "concretization" refers to the process of declaring that a ttx exists even if it is abstract, unnamed, or un-described. Concretization allows users to consider an abstract ttx to be real by creating a representative for it called a cnxpt in the CMMDB to act as its placeholder. For some period of its existence, the ttx represented may appear to be poorly defined, but over time, the representative, as the collection point for information regarding the ttx, will likely become more and more well defined as the ttx becomes understood or increases in importance.

In concretization, users may declare the existence of the abstract ttx to the system without knowing that they have done so in some cases. To declare to the system that a ttx exists, even before describing or naming the ttx, is to concretize the ttx and create a representative cnxpt.

Concretization is telling the system, and thus all of the users of the system, that a cnxpt exists.

Conjuring

As used herein, the term "conjuring" or "conjure" refers to a process within at the initial phase of ideation where an inventive thought comes into a person's head—ideas that may not have been stated and are even poorly formed—constituting a ttx formed to the point where a user could search for the ttx. This might occur prior to the person's use of the system described herein, if the person forms a complete and novel ttx prior to searching. More normally, it occurs just after the person begins wondering about the idea and performs a search for what they conceived. It may occur, during a search, where they see some additional triggering ttx, or when they revise the ttx to an alternative that is novel within the system. It may occur, during undirected perusal without a goal, perhaps where the person sees a triggering 'adjacent possible' or a stated need, that summons into action or brings into existence, often as if by magic, a new ttx that is novel within the system.

Here, the process is the nearly automatic means of bringing this type of thought into the system and the potential refinement of the idea during search or creation into an different ttx through exaptation. The gradual refinement of the idea into an understandable ttx after it is originally represented as a ttx is also conjuring even if separated in time and occurring after concretization.

In this description, we name the result of conjuring, or this type of thought that is near the farthest fringes of the thought process, a conjuring (noun).

Consensus

As used herein, the term "consensus" refers to the result of the tallying of votes regarding, including but not limited to: the existence of a ttx or of a relationship, the importance of a ttx or a relationship, or the correctness of specific value of a description, purlieu assignment, cncpttrrt, or value of an attribute of a cnxpt, based upon and intertwined with fxxt extraction and including, but not limited to: identity indicator based subject identification, merger. The consensus incorporates crowd-sourced information to obtain the 'best available' result from the CMMDB until a new consensus calculation occurs.

Ttxs may be interpreted differently by different users; sometimes one user will see a differentiation that another one does not. Arguably this would invoke confusion, but it will also lead to modification, separation of ideas, decisions and consensus over time.

Only the consensus regarding a ttx should be exposed, unless a user has made a vote regarding the ttx. If a user has made a vote, the user's vote should take precedence over the consensus.

A consensus can hold only for a certain period of time. Most often, cnxpts will be consistent in meaning for a long period of time if they are on a general level, but the consensus will vary on the detailed, recent cnxpts. This detail is most often a change in an off-shoot cnxpt that is seen as a detail of the more general cnxpt category.

In one embodiment, the understanding of a ttx by the system is limited by design to recognition that one ttx is not another unless users have reached a consensus that they are the same, and that if users have reached a consensus that a ttx is related to another in a certain way, then they are. In other words, all of the work of understanding ttxs and relating them to one another depend upon users reaching a consensus about the identification, naming, meaning, categorization, or relationships of the cnxpt representing it.

The objective here is to manipulate the state of the CMMDB so that its cnxpts match those of the consensus of a set of users. This is not seen as machine learning.

Consensus Determination

As used herein, the term "consensus determination" refers to the process of forming a consensus result based upon fxxt extraction and results from, including, but not limited to: identity indicator based subject identification, categorization, and merger. This collected result gives users a single interpretation of all the available information with resolved descriptions and relationships for all entered cnxpts within the fxxt specification considered. This 'best available' collection of information will hold for that fxxt specification until a new consensus calculation occurs for that fxxt specification.

The consensus determination is the agreement of most participants, seeking to resolve or mitigate the objections of the minority to achieve the most agreeable decision, utilizing subject identification and other available information. Private users can use fxxt arithmetic to add weight to the votes that they have entered.

Each individual user votes to move the CMMDB toward their internal map when they see a poor definition in the CMMDB. At some point, the authority of the CMMDB will improve to a point where it matches most users' internal maps. However, individual mental maps are not objective reflections of the real world, and even if they were, at some point the individual will get creative or the world will change. Thus the user's internal understanding and the CMM may always be to an important degree different. This constant differential is healthy because it means that different individuals can complement each others' weaknesses.

In one embodiment, the voting ontology mechanisms evaluate the various opinions submitted in three ways:

- Those opinions submitted as text narratives are accumulated and then provided to users as a basis for new voting where the changes made are accepted if the editing user has a specified level of expertise in the area where the text narrative resides, the change is not overruled by negative comment votes to a degree greater than positive comment votes, the change is 'appropriate' for content 'civility', and the user is authorized to vote on the edit.
- The opinions submitted regarding the existence of a category or the existence of an association between categories are used as numeric votes and accumulated, where and the users are authorized to vote on the edits.
- Other opinions are submitted as numeric statements of correctness and are summarized numerically, where and the users are authorized to vote on the edits.

Consignment Data

As used herein, the term "consignment data" refers to private data registered as protected-third-party-owned and offered for access, sale, or licensing as a part of a 'DD-DataSet'.

Consortiums

As used herein, the term "innovation consortium", or "consortium" refers generally to small virtual organizations formed in an attempt to invent and patent a worthwhile idea, with individuals joining by stating worthwhile additions to the patent application description, diagrams, or claims; or the design and development of the ttx; that are voted on by the other members and tracked by the system. Negotiations regarding ownership are based upon the votes by the contributors and, possibly, by the findings regarding novelty by the patent office (in accepting the various claims)

Correspondence

As used herein, the term "correspondence" refers to the degree of correctness of the definition of a txo as compared to the tpx it represents.

Crawling

As used herein, the term "crawling" refers to the process of browsing the World Wide Web, a heterogeneous repository, or document management systems in a methodical, automated manner to analyze data on web pages or in corporate documents and to scrape information for import into the CMMDB. As used herein, the term "crawling" also refers to the specification of what to crawl, including how, when, and other parameters for controlling the process. As used herein, the term "crawling instance" refers to one execution of a crawling.

Crawl Result

As used herein, the term "crawl result" is a system construct created when a user begins a new search for a ttx. Crawl results represent an uncharacterized set of information resources collected during a crawling (or scraping). A user defines a 'crawling' to find information resources.

A crawl result is created to hold, including but not limited to: a crawling instance identity and crawling instance status; a list of the locators of information resources found as a result set with rsxitems related to irxt info-items representing information resources found by the crawling instance; optionally a name; and optionally a description.

Crawl results may be used as input to queries, since they contain result sets.

In one embodiment, a crawl result may be intended to become an ad hoc resultant data table in which all keys are masked for externalization.

When a crawling is specified for a crawl result that matches an existing crawl result's crawling, information resources found and entered into the older crawl result are not entered into the newer crawl result even if seen.

Crowd Sourcing

As used herein, the term "crowd sourcing" refers generally to the act of outsourcing the tasks of, including, but not limited to: ideation, collaboration, prediction (wisdom of crowds), valuation (options market pricing), surveying (crowd questions) and investment (crowd funding), to a wide user community (the "crowd") to tap into the collective intelligence of the public at large to speed innovation and creativity of other users and to reduce overall costs. Rather than the unrestrained model of granting access to all of the ideas coming in from crowd sourcing, here the exposure of an individual's ideas are hidden until released, but the individual's contributions still affect the collective intelligence in other important ways, including, but not limited to classification of ideas. Crowd source results speed deeper insight into what individuals need for innovation, and yet the structure present here is more narrow then open innovation. Crowd sourcing here similarly involves a narrow form of crowd-funding, and a narrow form of mass collaboration.

Currency of Information

As used herein, the term "currency of information" refers to the up-to-datedness (the property of belonging to the present time) of information held by and provided from the CMMDB or other repository. Currency may be highly important depending upon the ttx searched or the specific information need.

The evaluation of how up-to-date an information source is leads to the credibility with which it is regarded. Is the data store learning? Is there evidence of appropriate updating? Is the information in vogue? Is the information at a current state of general acceptance and use?

Currency can be measured by how new the ideas are in the CMMDB. Alternatively, currency is a measure of how precise the information about each ttx is on the basis of whether recent understandings regarding the ttx have been included into the CMMDB. Currency is an overall measure based upon segments of the data that are examined. If a user feels that any segment examined is out of date, then the user believes that the measure of the overall currency is low, even though segments may be very well updated.

A spectrum of currency ranges from 'clearly out of date' to 'just thought up'.

To provide currency, a system must be updated, and the data held in it must be improved.

Any bureaucratic delays in updating the CMMDB decrease currency. If users who are experts directly update the CMMDB contents falling within their area of expertise, then the likelihood that the information is current grows. If these users consider the repository to be their tool for information storage, it is easy enough to use, and the users are otherwise properly incentivized to keep the information in it current, then the likelihood of currency again improves.

Finally, if the system becomes a search tool of choice for users, then conjuring and concretization on the basis of queries can take place. A user comes up with a thought, an idea, a cnxpt. They ask the system to find information about it. At that point, the system could just as well believe that it is receiving a description of a cnxpt it has not been given previously. This process brings a user's thoughts into the CMMDB as cnxpts as soon as they complete a query. While it is certainly true that these formative thoughts are low in quality, it is also true that they are the most current available. The more users seeking information, the more current the system is.

Improvement of data is obviously important. Once the new cnxpts are entered, they should be examined by someone to determine if they are well-formed. Here, the use of crowd sourcing coupled with the existence of the concretized idea provides improvement toward well-formedness.

DataSet

As used herein, the term "DataSet" (differentiated from "data set" which is obtained or created and imported or created by a user within the system by any process) refers to an identified subset of data stored in the CMMDB offered for licensing, use, or sale. DataSets include, but are not limited to: "TTX-DataSets" consisting of ttx definitions, descriptions, and characteristics and related data, with specified limitations; Interest-DataSets which are TTX-DataSets bundled with, including, but not limited to, the interest data (counts of how many users viewed the ttx, including, but not limited to: Resultant-DataSets; and "DD-DataSets".

Decoration

As used herein, the term "decoration" refers to adornment of objects being displayed. The decoration may be a graphical texture, a 'skin', a covering, or another form of adornment.

Deployment

As used herein, the term "deployment" refers to the process of determining the specific device to send a component or configuration specifications to, to inform that device that it needs the component, to manage the process of sending the component, to receive confirmation that the component is received, and to persist the status of the delivery.

DESCRIPTION

As used herein, the term "description" refers to a textual statement purporting to identify a ttx. It may take the form of an abstract or a full statement.

Descriptions are for human consumption and can contain textual strings of characters, and multimedia references to some additional textual or non-textual representations.

Descriptions exist in all shapes and forms: as formal descriptions, symbolic descriptions, technical descriptions, everyday descriptions, process descriptions, etc.

Infxtypx may be specified for descriptions, including but not limited to: base description or standard description (baseDescription) (also the default infxtypx); display description (dispDescription); technical description (techDescription); formal description; symbolic description; audio description; presentation. Default rules apply for use of other infxtypxd descriptions where a base description, display description, or technical description is absent. Other application-specific description infxtypxs may be specified. In one embodiment, zero or more descriptions of each infxtypx may be specified for an info-item.

Descriptions may be marked as invisible or may be associated with an access control list (ACL) for controlling visibility.

Where descriptions must serve as a basis for identity indicators, weights are imparted based upon the infxtypx of a description used for matching, or by fxxt specifications. Descriptions may be voted upon, and vote weights are also used for matching and relevance. Weights so imparted are summarized by an algorithm which fairly states the weight so that no bias is created when a multitude of descriptions exist for any given info-item.

In one embodiment, descriptions are held in hierarchical structures, where at the root is the base description, if one exists. A description hierarchy is also a container for any number of alternate forms (known as description variants) that may be specified for use in various contexts. Description variants may be the root of subtrees in the hierarchy. Position in the hierarchy affects the weighting of the description when used in matching, with base descriptions receiving a significantly higher weight than those within the subtree. The alternate forms of a description may be, including but not limited to: string values; or references to multimedia resources to be referenced as description variants. Base descriptions and description variants can be given a scopx in which they are valid. In one embodiment, practical limits are imposed to constrain the size and depth of description hierarchies.

Description Variant

As used herein, the term "description variant" refers generally to an alternative description, optimized for a particular purpose or containing different information, such as a technical description or a simple description; or for use in localization for a different language.

Relationship Descriptions

Relationships may be described. As a default, the infxtypx of an association is used for its relationship description.

Disaggregated Data

As used herein, the term "disaggregated data" refers to data associated with cnxpts or relationships. This data may be sold or licensed within bundles called "DD-DataSets" that include data associated with one or more cnxpts.

Dxos

As used herein, the term "dxo" refers to a type of info-item: that may be displayed by the system in a visualization of any nature; that may represent any thing whatsoever, regardless of whether it exists or has any other specific characteristics; about which anything whatsoever may be asserted by any means whatsoever. A dxo is not a Topic as defined in the TNMS, but rather the base class in the display object structure, from which other displayed objects are sub-classed in a multiple inheritance object structure where either txos or relationships are the other base class.

In one embodiment, Dxos are similar to video game objects or avatars, groups of video game objects, scene graphs, images, text displays, graphic symbols in drawings, multimedia, or groups of any of these.

Displayed relationships are specializations of dxos that connect dxos (other than displayed relationships) in a visualization Displayed relationships multiply inherit from dxos and from relationships.

Dxo Characteristics

A dxo has a dxo type specified by an infxtypx. The types in the CMM are limited to foster simplicity. Dxo types represent a typical class-instance relationship. In one embodiment, dxo types include, but are not limited to:

- Argument
- Avatar
- Collateral Information Resource/File Path
- Collateral Information Web Page/URL
- Any txo
- Any cnxpt
- Decoration
- Expert Advertisement
- Impression Advertisement
- Modeling Rule based upon assumptions or calculations
- Note
- Placeholder
- Pointer
- Signpost
- Registered Item
- Relation
- Rsxitem
- Video game objects
- Groups of video game objects
- Scene graphs, as objects
- Images
- Text displays
- Graphic symbols as for drawings
- Multimedia or groups of any of these.

Dxo Graphical Representations

In one embodiment, each type of dxo may be given a graphical representation by a user or administrator. Default graphical representations are provided for each type of dxo. Individual users, in one embodiment, may also provide their own graphical representations for dxo types in filter specifications, subject to stated constraints.

In one embodiment, each dxo may be given a graphical representation by a user or administrator. In one embodiment, individual users may also provide their own graphical representations for specific dxos in filter specifications, subject to stated constraints.

Dxo Graphical Personalities

In one embodiment, each type of dxo may be given a graphical personality by a user or administrator. Default graphical personalities are provided for each type of dxo. Individual users, in one embodiment, may also provide their own graphical personalities for dxo types in filter specifications, subject to stated constraints.

In one embodiment, each dxo may be given a graphical personality by a user or administrator. Individual users, in one embodiment, may also provide their own graphical personalities for specific dxos in filter specifications, subject to stated constraints.

Dxo Decorations

In one embodiment, Decorations are used during visualization to adorn dxos. The decoration may be a graphical texture, a 'skin', a covering, or another form of adornment that may be offered.

In one embodiment, 'decorations' may be associated with dxo types or specific dxos by a user, subject to stated constraints. Default decorations may be provided for each dxo type. Individual users, in one embodiment, may also associate specific decorations with a dxo type or with specific dxos, subject to stated constraints. In one embodiment, decorations may be associated with a dxo type or with specific dxos in filter specifications, subject to stated constraints.

In one embodiment, Decorations may be used in conjunction with Graphical Representations and Personalities.

Dxo Mannerisms

In one embodiment, personalities may carry mannerisms. Mannerisms are actions of dxos that may occur at specific, planned, or random times. The actions may be in reaction to a user's action, or in reaction to another user's actions when viewing the same map in a collaboration or sharing scenario. System or external events may also cause reactions by dxos based upon the mannerisms specified for it.

Dxos, personalities, and graphical representations may, in one embodiment, be adorned by mannerisms. In one embodiment, collaborative scenarios, a map may be shared with the user's mannerism specifications attached, subject to stated constraints. In one embodiment, mannerisms are used during visualization to adorn dxos, giving them an animated effect, an aural effect, or another form of activity.

In one embodiment, 'mannerisms' may be associated with dxo types or specific dxos by a user, subject to stated constraints. Individual users, in one embodiment, may also associate specific mannerisms with a dxo type or with specific dxos, subject to stated constraints. In one embodiment, mannerisms may be associated with a dxo type or with specific dxos in filter specifications, subject to stated constraints.

In one embodiment, mannerisms may be used in conjunction with Graphical Representations and Personalities. In one embodiment, 'mannerisms' may be associated with specific Graphical Representations by a user or may associate specific mannerisms with a specific personality, subject to stated constraints.

Dxo Groups

In one embodiment, groups may be formed from dxo objects. Each of the grouped objects is connected by an 'anchor' to the group, in all or a set of scopx, and in all or a set of fxxts. The anchor states the position of the centroid of the object relative to the centroid of the group, in three dimensions (or more), and in all or a set of fxxts. The anchor may also describe behaviors of the included object in all or a set of fxxts.

The geometry nodes in a scene-graph may be replaced by anchors to dxos to form a group based upon scene-graph and encompassing txo or cnxpt info-items.

Alias-Hyperlink Dxos

As used herein, the term "alias-hyperlink dxo" or "hyperlink dxo" refers to any of various types of dxos used to show that a dxo, txo or cnxpt would be seen at the location on a visualization or list except that it already exists in the visualization or list another location. (The alias-hyperlink dxo indicates a primary location of a 'real' dxo, txo or cnxpt.) If a user clicks appropriately on a hyperlink dxo, the visualization or list is immediately moved to the primary location. If the alias-hyperlink dxo indicates another map or view, clicking on it displays the referenced map or view. A user is provided with a 'back up' tool to move back to the prior context (where the hyperlink dxo is displayed). Hyperlinks other than alias-hyperlink dxos are cross references to other 'pages' (html href links are an example; these hyperlinks provide a URI reference in most cases).

Display Object Inheritance Hierarchy

As used herein, the term "display object inheritance hierarchy" refers to an ordered set of info-item subclasses and superclasses. The objects of the subclass behave, subject to the restrictions of the specialization, like objects of the superclass. Here, the dxo is but one base class in the multiple inheritance structure.

The behaviors inherited from the dxo are limited to display attributes, response to display control, susceptibility to selection, drag and drop and participation in other visualization and display structures. Here, the subclasses of the base class dxo include but are not limited to: certain txo specializations, cnxpts, goals, traits, purlieu, signposts, avatars, alerts, relationships, and information resources.

Display Object Hierarchy

As used herein, the term "display object hierarchy" refers to an ordered set of dxos where each dxo other than a root dxo must be related to another dxo within the hierarchy. This structure is highly related to a 'scene-graph'.

Distributed

As used herein, the term "distributed" refers to a computational task or function that is broken into sub-functions or processes to execute on more than one distinct computing device so that all of the devices act harmoniously to deliver the desired result or overall function.

The term "distributed" also refers to the data of a database that is spread out and resides on more than one distinct computing device, so that all of data, if collected back onto a single device, would be consistent and complete.

Distribution

As used herein, the term "distribution" refers to the overall process of determining what software components, content, data, or configuration specifications should be sent to 'client' systems, to deploy the components to those systems, and to then set the component into execution by invoking it.

Domain Engineering and Analysis

As used herein, the term "domain engineering" or more precisely "application domain engineering" refers to the definition of product lines, and is divided into three primary phases: analysis/strategy, design/product line planning, and implementation/productization/product planning Domain engineering focuses on a family of product lines and their products. As used herein, the term "domain analysis" refers to the studies of a domain to define the domain, collect information about the domain, and produce a domain description, including a series of classifications for products called appcepts. Domain analysis identifies the common requirements and characteristics in a domain and the varying requirements and characteristics in the domain Drag and Drop, Moving Objects As used herein, the term "Drag and Drop" is used collectively to refer to the process of moving objects on a map or between maps, or of selecting the properties of an object and instructing the system to use those properties for some purpose in a different context. Here, there are several uses for drag and drop, including but not limited to: when a user searches, they will sometimes drag a goal to a different category to provide more information about what they are seeking; when a user wants to re-categorize a cnxpt, they need to drag the cnxpt from one map to drop it on a cnxpt in the same or another map; when a user wants to utilize a cnxpt as a member of a group (result set, an 'area of consideration', etc.), they might need to drag a sphere from one map to drop it on an another map (which is the container for the 'area' or set); when a user wants to use a cnxpt's properties on a community or other web page, for obtaining the properties of the cnxpt for use as a basis for the content of the page, then they drop the cnxpt onto the page; when a user wants to place a 'DXO' next to a cnxpt for display, they need to place it onto the map near the cnxpt.

Duality Mapping & Map Dualities

As used herein, the term "duality mapping" refers to the process of forming a set of maps from an N-dimensional ontology where hierarchical taxonomy trees may be extracted both for a descent from general to specific (for some set of trees where the root is considered the general ttx) as well as an ascent from a specific ttx to the set of general categories it is a sub-category of (may relate too). In the descendant map, the relationships of sub-categories to other general ttxs (not being used as the root of the taxonomy hierarchy) are hidden or shown as hyperlink dxos, but are all shown in the dual ascendant map.

In one embodiment, side by side (or window within window) viewing of the descendant and the ascendant maps make it possible to provide a view analogous to what a driver of a spaceship might see at any instant both out of their front window and through their rear view mirror.

Descendent Map

As used herein, the term "descendent map" refers to a visualization supporting a fly-through from general categories to very detailed cnxpts. In one embodiment, maps are often three-dimensional hierarchies. For normal use, a 'descendent' taxonometric tree is extracted from the ontology of the CMMDB to form a clump that will provide the information needed to produce a 'descendant' fly-through map from general categories to very detailed cnxpts deep within those categories.

Ascendant Map

As used herein, the term "ascendant map" refers to a visualization supporting a fly-through from very detailed cnxpts to general categories such that the multiple categories a cnxpt is a member of, if it is, are viewable. In one embodiment, the 'descendent' extract is a forest of trees but the ontology is N-dimensional. Because of this, it is possible that for some cnxpt deep within the 'descendent' extracted tree, that the cnxpt or its ancestors will have multiple parents. For such a cnxpt, an 'ascendant' tree could be formed where the cnxpt is a root for the tree, where the first branches from the root connect to all of the parents (nodes on other end of the reversed directed edges), where branches from those parents connect to all their parents in turn, etc., and the leaves are the most general categories in the ancestry. This tree would be the basis of an 'ascendant' map.

Expertise Level

As used herein, the term "expertise level" or "expertise" refers to a value set as a surrogate for the true knowledge level of a user, the higher value being assigned to a user whose changes are expected to be closer to the correct answer in a circumstance, or closer to an objective assessment in nearly every circumstance.

To move from one expertise level to another in a specific cnxpt, a person (user or otherwise known by system) gains and loses points associated with expertise, as determined first by searching for or within the cnxpt, then by points awarded for, including but not limited to: interest shown by person in cnxpt, creating new cnxpts immediately related to the cnxpt, creating consortia, entities, IP applications or other activities related to the cnxpt, improving the description of the cnxpt, performing methodologies, studies, or models regarding the cnxpt, adding disaggregated data for consignment to the cnxpt, improvement in speed of completions of these activity/progress indicators. As time passes, points are taken away from the expertise total as a recognition that a person's expertise may change or that their expertise becomes less specific if they do not show new expertise on more detailed follow-on cnxpts. This decrease acts as a penalty to provide a structure for incentive as well as a structure for recalibrating overall present expertise. The expertise level is locked at a system parameter set age of cnxpt so that for older or more general cnxpts no further experts are admitted and no further expertise data is collected. Expertise levels for those frozen cnxpts is still available by calculating expertise according to more specific cnxpts which stem from or are included in the more general.

Features

As used herein, the term "feature" refers to a cncpttrrt of a tcept that a user or engineer may use to describe a tcept, product, or its abilities.

Filters

As used herein, the term "filters" refers to parameterized procedures that limit the data retrieved or used for, including but not limited to: visualization displays, pages, analyses, exports, or reporting; or sets or changes positions of or alters the appearance of the data retrieved on, including but not limited to: visualization displays, pages, exports, or reports. Filters may also add style information, additional dxos, titling, legends, etc. In one embodiment, filters take effect on the data resulting from a fxxt specification resolution. Filters may be based upon, including but not limited to: fxxts, templates, visualization defaults, page designs, analysis defaults, report specifications, export defaults, result sets, attribute values, scopx, infxtypx, areas of consideration, areas of interest, access control lists (ACLs).

In one embodiment, filters can be compounded.

Query filters produce restricted subsets of resources, for example those whose language is Spanish and user profile is secondary school student.

Navigation filters allow selection of relationships to navigate by, such as 'prior art', 'cited by', 'sub-tcept of', 'solution for', and 'used in', or combinations of relationships.

Interest filters narrow the ttxs considered by 'attributes', 'cncpttrrts', 'purlieus', 'features', or 'requirements' limitation In one embodiment, security filters will suppress data not accessible due to lack of access permission, possibly replacing it with markers for display. Sensitivity filtering can apply changes or present markers based upon security, privacy, legal issues, or information locking of dxos or their metadata.

In one embodiment, calculation filters based upon the value of an attribute of dxos or relationships, including attributes whose values are set by calculation. Calculations may either be made at the retrieval server (often by analytics) or at the display client.

In one embodiment, extraction filters limit the data retrieved for, including but not limited to: visualization displays, analysis, exports, or reporting. In one embodiment, extraction filters only affect the data included in extract sets (clumps) from the CMMDB.

In one embodiment, Priority and Marking Filters mark displayed objects for importance or priority or other purpose utilizing shape enhancement, colors, fonts, shading, modified dimensions, etc.

In one embodiment, authorship filters, based upon the authorship of votes, allow a user's views to have priority in extraction, positioning, and display.

In one embodiment, advertising filters adjust or remove advertising for certain subscribers.

In one embodiment, the language used for names and descriptions may be changed by application of extraction or display filtering, or by fxxt resolution.

Display Filters

In one embodiment, filters may be applied to affect displays at the display level.

Display filters provide for, including but not limited to: information hiding; dxo highlighting; customizing of display language, styles to improve the map design, fonts, dxo images, lines, and background; forcing the sort or display order of the visualized data; limiting, altering, or enhancing the data used for, or the appearance on, including but not limited to: visualization displays, analysis, exports, or reporting. Display-filtering may, including but not limited to: set or adjust positions for the data; add style information; additional dxos; titling; legends, etc.

In one embodiment, display-filters provide dynamic view-filtering to allow a user to change 1) how dxos are displayed, and 2) which dxos are displayed. These filters will be applied to the dxos late in the visualization stage, acting after the extraction of dxo information from the ontology and after the calculation of positioning of the dxos. These filters only affect the presence or look of the data displayed by the user, not the data stored in or retrieved from the CMMDB.

In one embodiment, information hiding is provided by limit filtering to eliminate from the display all elements that are not selected by a limiting filter specification. Filters can be based upon, including but not limited to: scopx and infxtypx of relationships, generality, user identity or type, date of relationship, or metrics on relationships. Filters act on, including but not limited to: dxos, relationships, rsx-items, parameters, templates, display graphics, and database values.

In one embodiment, filters highlight dxos to show importance or priority utilizing, including but not limited to: shape enhancement, colors, fonts, shading, modified dimensions. Filters can adjust the display image of each type of dxo. For each dxo type, a template will be provided for each type of output (export, report, visualization). In one embodiment, each template can be overridden by the user by filter settings, and each override can be saved and named.

Filtering

As used herein, the term "filtering" refers to the application of filters. In one embodiment, filtering is the application of filters to data resulting from a fxxt specification resolution.

Finding

As used herein, the term "finding" refers to a specific form of searching consisting of entering a (wild-carded) 'find' string to find each location (the next instance) of a combination of any characters, including uppercase and lowercase characters, whole words, or parts of words, or regular expression in the data or info-item names/titles or information within a view.

Forgetting

As used herein, the term "forgetting" refers to a specific form of ideation where certain details get integrated and lose their individual identity. Often, humans combine categories to remember the ttxs within the categories, or when learning of a new detail they combine it into a broader ttx. In each case, the meaning becomes undifferentiated and is lost for analysis. Luckily, the loss of the specific information sometimes leads a user to think of new information, so forgetting may spur creativity.

Goals

As used herein, the term "goal" is an info-item system construct created when a user begins a new search for a ttx. Goals represent a ttx in the mind of the user that could potentially be represented as a cnxpt. A user defines a 'Search Goal' or 'Goal' based upon some felt need to find out about the ttx, whether or not the ttx is represented by a cnxpt, possibly without being able to state the ttx, and possibly without being able to name the ttx. A user's stating of a goal most often implies that the user is thinking of a ttx, even if it is abstract, unnamed, or un-described. Goals allow users to see something to represent the abstract ttx. The user attempts to describe, in a goal, a ttx that may exist and that they are interested in, then starts searching for that ttx, even if it has not yet been created in the CMM, and even if they change their own understanding of what they are interested in as they progress.

In one embodiment, in searching, a user forms queries within a goal to find information.

During the searching and querying process within the goal, the user's original idea, or personal ttx may undergo change (exaptation) as the user continues thinking Put a different way, the goal serves to collect all of the searching and querying that occurs to attain the goal, and then encapsulates the result into a cnxpt that represents the ttx actually resulting after the user resolves his thoughts.

At a point of acceptance that the goal has been met by its categorization placement and that no such idea was previously entered (the idea is real and novel), the goal is concretized as a ttx by converting the goal to a cnxpt or by creating a representative cnxpt to replace the goal. For some period of its existence, the ttx represented may appear to be poorly defined, but over time, the representative, as the collection point for information regarding the ttx, will likely become more and more well defined. Goals thus may declare the existence of the abstract ttx to the system without the user knowing that he has done so. The goal may later become a variant of an existing cnxpt, subject to later merger, but is then essentially considered the same by the user and visually overlaps the existing cnxpt on visualizations.

In one embodiment, the searching is carried out through the goal, by navigating, searching, meta-searching, by analytic, or manually.

In one embodiment a goal is created to hold, including but not limited to: a query script consisting of one or more of queries and the result sets resulting from each such query; other result sets, navigation tours taken by the user during the search; user indications from a navigation; optionally a name; and optionally a description. Goals are also displayable objects.

Goals and cnxpts may be used as input to queries, since they may be considered single rsxitems, they may contain result sets and they may have occurrences.

In one embodiment, a goal may be intended to result in a cnxpt with a new scopx and not intended to represent a cnxpt with an existing infxtypx.

In one embodiment, a goal may be intended to result in an ad hoc resultant data table rather than a cnxpt.

In one embodiment, when a query is specified for a goal that matches an existing cnxpt's query, relationships are created between the goal and the existing cnxpt. The utility of this is that scripts that yield result sets specifically containing occurrences usable for describing cnxpts may be used to initiate the definition of a new cnxpt.

Graphical Personality

As used herein, the term "graphical personality" refers to the sum of the ways that a dxo may, including, but not limited to: act, respond, animate itself, enunciate, etc.

Graphical Representation

As used herein, the term "graphical representation" refers to the look of a dxo on a display.

Harmonization

As used herein, the term "harmonization" refers to the systematization, regulation, standardization, management, reconciliation, and coordination of the classification and codification for all txo identities, their definitions, and any associated information placed into the central CMMDB and affiliated CMM ontologies to ensure that redundancy and confusion are removed and/or minimized harmonization is permanent.

The CMMDB will contain private data that must be held confidentially and unpublishable. The affiliated CMM ontologies, located elsewhere, contain other private data under the care of a customer but still requiring harmonization when portions of that data are released into the CMMDB or otherwise. Upon harmonization, confidential and other items are merged into the CMMDB commonplace while still being kept confidential and unpublishable, so that the categorization on the central system can be used for categorizing information on the affiliated ontologies as well. Upon authorized release, the confidential and unpublishable items, one at a time, will be made available for other users. Prior to that, the information may be seen, at most, as an empty sphere on the map, according to the instructions of the user.

Heuristic

As used herein, the term "heuristic" refers to either a simple experience based algorithm or a more complex user specified or system tuning algorithm applied to base data, and changed as needed to improve the effect of the overall operation of the system or the operation as applied to a specific user's need. Heuristics are cataloged for ease of controlled and transparent alteration.

Hierarchy

As used herein, the term "hierarchy" refers to an ordered set of objects where each object other than a root object must be related to another object within the hierarchy. A forest, where there are multiple root objects, is considered a hierarchy in general.

Horizon

As used herein, the term "horizon" refers to a context in time for which to predict the expected state of gestation of all tcepts in a fxxt. The horizon is stated as a parameter to a model based upon a user or plan requirement. It is either in the future or the past. A horizon timeframe is a specific time plus or minus a prediction error, and can also be indicated by use of a time differential from a current date.

Identification

As used herein, the term "identification" refers to the capability used to find, retrieve, report, change, or delete a txo representing a specific tpx without ambiguity, or to distinguish between two tpxs that are similar. Because of the general nature of the term, we subdivide it into "infrastructure identification", "ttx identification" and "info-item identification" to be specific.

Info-Item Identification

Info-items must all be non-ambiguously identifiable for internal addressing. Info-items should normally be identifiable by a human by a name.

Infrastructure Txo Identification

As used herein, the term "txo identification" refers to the use of identity indicators to improve the correspondence between a tpx and its representative txo; to inform the user about what the ttx represented actually is, and to serve as a specific subject where used as a property or characteristic of other tpxs or ttxs.

The objective with topic maps, as it is with the infrastructure info-items here, is to achieve a one-to-one relationship between topics and the subjects that they represent. Identity by indicators enables mergers for topic maps as it does for the infrastructure txos here. Before topic map merger, the same subject may be represented by more than one topic. It is crucially important to know when two txos represent the same tpx when aggregating information (for example, cncpt-trrts, purlieus, information resources, or scopxs from a private CMM into the central CMMDB), or matching vocabularies; when merging categorization schemes and indices into the CMMDB, when comparing an infrastructure tpx to determine if it matches an existing tpx; or when comparing ontologies. To achieve this, the correspondence between a txo and the tpx that it represents needs to be made clear. This in turn requires tpxs to be identified to a sufficiently non-ambiguous degree by information other than their unique item identifier (ID). This objective is not achievable to perfection, but refinement by respected experts and staff, and the use of identity indicator ranking by weights leads to a high degree of clarity as well as a means to direct attention to poor specification. Identity indicators provide an information basis for the identification mechanism that resolves agreement on the identity of txos by administrators and expert users who most often administer the infrastructure. Identity indicators assist in automatically determining the degree of dissimilarity of infrastructure info-items to alert administrators of confusion in the infrastructure.

The Identification of Ttxs in Crowd Sourcing

Direct Ttx Identification

As used herein, the term "ttx identification" refers to the use of identity indicators to inform the user about what the ttx represented actually is by detailing the cnxpt and differentiating it from others; in merging categorization schemes and indices into the CMMDB; for comparing a user idea to determine if it matches an existing idea; and indirectly, to show where the ttx should be on visualizations relative to other ttxs.

The objective of the present system in ttx identification is different from that of a topic map in that the subjects—the ttxs—are not well understood for cnxpts. There is still the need to achieve a one-to-one relationship between cnxpts in the CMMDB and ttxs that they represent, but because the ttxs are still formative, the need is defined by: what the user was originally thinking; what the user might have been thinking; what the system could add to the user's thinking to create some original idea; what the user was or might have been looking for; what the user refined his thoughts to be; and what the consensus view of the ttx became, in order to ensure that all knowledge about a particular ttx can be connected properly to the representative cnxpt. Note that these are not identities as used in topic maps, and the more important issue here is deep categorization and differentiation of ttxs.

A second objective in aggregating ttx information is to reduce redundancy by refining the vast set of merged entries into a reduced collection of concisely described and understandable ttxs. Ttxs will be obtained from many sources in this system. Some will be well defined, such as by patents. Others will be simple category names which might be meaningless to anyone other than the author.

Fuzzy Ttx Identification for Collocation

To promote the ability to see 'nearly identical' ttxs to allow crowd sourced cleanup or to highlight interesting differences, the system must achieve a "collocation objective." To do so, one or more of five methods may be utilized to obtain additional identity indicators: to measure the semantic difference between two ttxs; to accept arrangement information from users stating that the ttx is a sub-ttx of another; to accept similarity or differentiation information from users stating that the ttx is similar/identical to another or that there is a definable difference between them; or to accept relevance information from users stating that some information external to the ttx is relevant to describing the ttx.

To implement semantic differences, pairwise analysis between descriptions must be performed efficiently and results summarized.

To implement the arrangement method, it is necessary to allow general and specific ttxs, where the general ttx is a categorization of more specific ttxs, and to allow a user to move a cnxpt into or out of a category.

To implement the relevance method, binding points must be provided from which everything that is known about a given ttx can be reached. In topic maps, binding points take the form of topics that represent the subject for which the bound information is relevant; for a topic map application to fully achieve the collocation objective there must be an exact one-to-one correspondence between subjects and topics: every topic must represent exactly one subject and every subject must be represented by exactly one topic. In a crowd sourcing system where consensus must build in the definition of a ttx that is most often extremely nebulous at its inception, the objective is to manage the refinement, allowing and expecting that most recent ttxs will not have an exact one-to-one correspondence between ttxs and cnxpts. Collecting and managing information resource indicators is beneficial. Pragmatically, any cnxpt may represent one or more ttxs, and any ttx may be represented by more than one cnxpt, at least for an initial period.

Here, imprecision will definitely exist, and when a cnxpt representing a ttx is recognized as imprecise, refinement by users, including inexpert users, may provide, including but not limited to: definition improvement; subdivision by creation of two more precisely identified cnxpts that become children of the original cnxpt; combination with another cnxpt; or deletion. The use of identity indicator ranking by weights leads to a higher degree of clarity by ranking, and the use of fxxts reduces conflicts between meaning confusion caused by similarity of terms across different categorization bases.

In one embodiment, a single cnxpt results from combining the characteristics of the two cnxpts only if all of the characteristics are the same, but where a substantial disagreement is seen regarding the characteristics of a cnxpt, a workflowed suggestion is made that the cnxpt be split into three cnxpts, where one parent is formed from the characteristics in the intersection of characteristics (those agreed upon), and two child cnxpts having the characteristics in dispute on each side.

Identity

As used herein, the term "identity" refers to the set of all indicators of an info-item usable for identification.

Info-Item Identities

All info-items must be identified non-ambiguously for internal addressing. This is accomplished by assignment of a unique item identifier (ID) to every info-item. This unique ID is not assigned by meaning but is rather an identity for computer processing of info-items. It has an internal and an external form.

Names are used on most info-items to provide user recognizable identities, but are not un-ambiguous due to issues with language.

Identity Indicator

As used herein, the term "identity indicator" refers generally to any one of a set of specific indications from data and relationships in the CMM that tends to establish a compelling and unambiguous identity of a tpx to humans, to establish that the txo representing a tpx has a correct correspondence to the tpx, and to establish the same identity for two seemingly disparate txos which are actually representing the same subject. Subject indicators are but one form of identity indicator used here. An identity indicator is distinct from the item identifier (unique ID) of the info-item.

Identity indicators provide an information basis for the identification mechanism that resolves agreement on the identity of ttxs by all users. For ttxs and cnxpts, the subject indicators address the primary issues here of whether a goal matches a cnxpt and the degree of similarity between ttxs. Where applied to a ttx or a cnxpt, identity indicators may be scopx and fxxt specific so that the indications tend to establish a compelling and unambiguous identity of the ttx to humans in certain aspects but not in others according to the fxxt specification (which includes the scopx effects).

Identity indicators assist to enable comparison of goals to cnxpts and differentiation of cnxpts based upon a 'fuzzy' degree of similarity. Identity indicators establish that the cnxpt representing the ttx has a correct correspondence to the ttx, to establish the differential between two disparate cnxpts which have nearly the same characteristics, and to identity seemingly disparate cnxpts which are actually the same even though their (pre-fxxt calculation) characteristics are somewhat different.

The same identity indicator may be specified for multiple txos to allow, including but not limited to: relationship voting, fuzzy logic based comparison, matching, and merging, and accommodation of versions and temporary txos, goals, and cnxpts. Specifically, the same subject indicator may be specified for (or related to) more than one cnxpt.

In one embodiment, if two cnxpts have all of the same identity indicators in a resolution of a fxxt specification, then by definition they should represent the same ttx within that fxxt, even if not actually the same. In one embodiment, if two cnxpts have all the same identity indicators in a resolution of a fxxt specification, then by definition they should represent the same ttx within that fxxt only if they share the same identity indicators in all fxxts. In one embodiment, where two cnxpts share the same identity indicators in all fxxts for longer than a set period, then a to-do tickler alert or other call for action is created for attention by administrators or the crowd. In one embodiment, and in the present description, if two cnxpts share the same identity indicators in a resolution of a fxxt specification, they are merely presumed to represent the same ttx in that fxxt and are no more than temporarily considered to be very strongly related, so that they are not considered identical generally.

General Forms of Identity Indicators

A txo can have zero or more of each of the following forms of subject identity indicators, and thus can be identified by a number of different indicators, including but not limited to:

Characteristic Identity Indicators

As used herein, the term "characteristic identity indicators" refers to those info-item characteristics such as attribute values, names, and descriptions, each optionally with a scopx, which may be useful to indicate that the info-item represents something specific, and which are thus usable for identification.

To determine identity similarity and differentiation automatically, characteristic identity indicators are used in pairwise analysis of txos, often to determine 'semantic distance'.

Characteristic identity indicators include but are not limited to: a human-readable label, an attribute value, a textual definition, description or name; a visual, audio or other representation; a consensus vote toward similarity, a ranking of semantic similarity recognized as generally accurate; or some combination of these. Txo description and name variant characteristics may each be optionally assigned one or more scopxs. Cnxpt description and name variant characteristics may each be optionally assigned one or more scopxs and one or more fxxts. In one embodiment, txo attribute characteristics may each be optionally assigned one or more scopxs and cnxpt attribute characteristics may each be optionally assigned one or more scopxs and one or more fxxts.

Names, labels, and descriptions act as one or both a human readable subject indicator or a basis for semantic comparison resulting in an affinity relationship when compared to other names, labels, or descriptions.

Subject Identity Indicators

As used herein, the term "subject identity" refers to an identity indicator established by some further detail, held in a separate info-item, that somewhat describes an info-item's subject. The further details might include, but are not limited to: a characteristic of the separate info-item such as a description, name, or value, or an external identifier like a social security number or the address of an information resource known as an addressable information resource (an "addressable subject"). A subject identity is useful because it is a pointer to the separate info-item and the pointer is a unique and comparable resource as a surrogate of the detail. For example, a cnxpt may reference a patent to unambiguously show to a user that the cnxpt represents the ttx as described by that patent.

Example: Identifying the Ttx "Apple"

Subject identity is implemented here by an occurrence relationship to a subject indicator info-item of some type. This states: "This cnxpt (or txo) is identified by the characteristics of that info-item" or "This cnxpt (or txo) is identified by the information resource as represented by that info-item."

Subject indicator info-items can be used to hold indicator characteristics directly, such as a name, a description, an external identity value, or an information resource address locator. Infrastructure txos may represent internal tpx such as traits, purlieu, or other tpx, and are useful as subject indicators. Other information resource subject indicator info-items provide external reference identities or addresses. Many of the things that a cnxpt (or txo) can represent are not things that a computer can resolve a reference to. For example, a person may have any number of database records about himself or online biographies or pictures, but none of those addressable resources are the person—they are merely some form of descriptor for the person. Yet, the person may have a social security number, or an external identification. These descriptors are enclosed into the subject indicator info-item as descriptions or characteristics to improve the related cnxpt's (or txo's) correspondence with the ttx (or tpx) that the cnxpt (or txo) represents.

Occurrences as Indicators

All occurrences are identity indicators because they indicate a relationship between the cnxpt (or txo) and some detail relevant to, but not actually describing the ttx (tpx or subject), that a user believes relates to the subject, such as by narrowing the subject or by referencing differentiators. A very high weighted occurrence relationship is intended to show that some info-item is very relevant to the ttx (tpx or subject). A highly negative occurrence weight would show a strong differentiator. The identity given by the individual occurrences is greatly improved when the occurrences are considered as a group, and here the weighting of occurrences improves the identification accuracy further. An occurrence is useful because it is a pointer to the separate info-item and the pointer is a unique and comparable resource as a surrogate of the relevant information.

The relevant details might include, but are not limited to: a characteristic of the separate info-item such as a description, name, or value, a description of a trait, requirement, or need; a purlieu; or the characteristic of another infrastructure txo.

Associations as Indicators

Associations are, only indirectly, identity indicators because they assist in discriminating between similar cnxpts (or txos), or in showing strong affinity which juxtaposes the cnxpts closely on displays. In the aggregate, associations, when considered as a group, also form a differentiator in comparing two similar cnxpts (or txos), and the weighting of the associations improves the accuracy further. The effects of hierarchical and affinitive associations on identity are different, with hierarchical associations more directly indicative of identity for child role cnxpts. After fxxt analysis, the hierarchical associations are more indicative.

Published Subject Indicator

As used herein, the term "published subject indicator" refers generally to a subject indicator that is published and maintained at an advertised address for the purpose of facilitating topic map interchange and mergeability.

Subject Identifier

As used herein, the term "subject identifier" refers generally to an occurrence relationship (rather than a property as in the TNMS) that relates a cnxpt (or txo) to a subject indicator info-item. A subject identifier occurrence relationship is often given a higher weight than some other forms of occurrence because subject descriptions are a stronger indicator of a subject's true identity than, for instance, a trait or a purlieu.

Subject Locator

As used herein, the term "subject locator" refers to an indicator usable for identification directly based upon the address of an information resource known as an addressable information resource (an "addressable subject") that is the subject of a topic. Subject locators are not implemented specifically here, their function being subsumed by subject indicators. The use of the term 'subject locator' is merely for convenience otherwise.

In general, subject indicators are related to cnxpts (or txos) by subject identifier occurrence relationships. The weighting of the occurrence relationships indicate which occurrence is most strongly believed to be the true identity or best possible description for the ttx represented by the cnxpt (or tpx for a txo). If there is one such highly weighted occurrence, then it is the subject locator.

In deviation from the TNMS, where a subject is often described fully by one information resource, here multiple information resources may be relevant to the described tpx. When only one information resource is in an occurrence relationship with a txo or cnxpt, the address of that information resource is called a 'subject locator' in conformity with the TNMS unless marked otherwise. A user may vote to mark an information resource as a 'subject locator', and the 'subject identifier' occurrence relationship with the irxt representing the information resource would receive a high weighting. Where no single information resource is apparent, and thus there is no single unambiguous and resolvable address, the identity of the ttx can only be established indirectly through the notion of identity indicators, one type of which is the subject indicator information resource.

Item Identifiers

As used herein, the terms "item identifier", "unique identifier" ("ID") or "unique ID identifier" refer to a unique, internal, numeric format database identities (UID) of an info-item that facilitates its addressing by, including but not limited to: relationships, processing functions. The ID is not assigned by meaning but is rather an identity for computer processing of info-items. Info-item identification by Unique ID Identifiers is differentiated from "identification" here as it is not based upon the meaning of objects.

In one embodiment, the unique internal ID is converted to be an external (export) ID prior to exposure outside of the CMMDB by the 'key encryption process' so that the CMMDB may not be copied. On re-import the altered IDs will be reconciled with the internal database identities.

The unique external (export) ID that is unique across that CMMDB and all exports is a unique generated key consisting of:

- Key encryption method version ID, including noise element;
- Date and time stamp of internal format, including noise element;
- Expiration date and time for the key (in one embodiment, not included in uniqueness);
- Timeframe specific ID for encryption algorithm used, including noise elements; and
- Encrypted ID, including noise elements;

In one embodiment, Unique IDs are collected from remote systems and reconciled. Unique ID Identifiers are not identity indicators.

Impulse Retrieval

As used herein, the term "impulse retrieval" refers to a spontaneous recognition of interest by a searcher in a ttx that the searcher hadn't queried for when they began their search. As a user visually traverses a visualization map, following the elements in a field of view, s/he may add info-items found to their goal result set.

Users are not always aware of the reasons why they look at 'off topic' items as they browse, but it is largely because they have not been able to properly state a query or that the query mechanism is simply too constraining to return all of the ttxs that the user really wanted to see. However, when they click through the visualization, they are seeing the breadth of the ttxs available. Where ttxs are the analog to both the categories and the products on the on-line catalog, searches (queries) will not yield any more than a starting point for the user's effort, and that their traversal through the categories will take them to the ttx they are really seeking or to ttxs that are even more interesting.

In reality, very few users are "search dominant" where they always use search, no matter what the catalog design. No users use search exclusively. It is the design of the site that drives users to decide whether to use categories or search to locate products.

This type of action is referred to as Impulse Retrieval because of its similarity to an Impulse Purchase. Impulse Retrieval was found to be an effective tool for users of card catalogs in libraries. Some new library systems provide improved searching systems that improve on co-location cataloging, but the CMM is designed to improve on those facilities by providing very deep (multiple level) co-location facilities.

Incentivize

As used herein, the term "incentivize" refers to a management tool for increasing the desire of users to participate effectively by offering a tangible reward based upon the completion of a specific achievement. In addition, the term "Incentive Programs" includes the convincing showing that a tangible or intangible result will be received by the participant based upon the completion of a specific achievement, even if a specific reward is not offered. Incentivization is aimed at, including but not limited to: greater intensity of use by each user; quality improvements for the data; map improvement based upon Thinking Style; greater investment, more outreach; more excitement; expanded resources such as methodologies, analytics, surveys, DataSets. Incentives are offered to users to entice them into adding information and into using the information available through the system. Increased use will yield refinement of information more rapidly and a greater base of users. Incentives are provided to improve the quality, quantity, and understandability of the data in the CMMDB. Compensation is provided to obtain effort by a user on a specific task or within a specific consortium. Major incentives will be offered for users who disclose new novel tcepts because they may be valuable as Intellectual Property. Communities increase value to users and channel users toward transactions; registries to take in information about users, their needs, or their offerings; a storefront as a charging control mechanism for fee based services; and multitier ownership of data for private information control.

Incentives, include but are not limited to:
- Recognition, including but not limited to: allowing attachment of their name to new tcepts; promotion to a new level of user; identification as expert
- improved results to analysts adjusting data
- Easter eggs at points in navigation (Tidbits of information shown on the map during navigation)
- Bumping into others in navigation (especially similar others—those who have attributes in common.)
- Announcements of events about ttxs and updates of ttxs at points in navigation.
- Commonality with others—Mr. X (a famous expert) recently visited this very area of the map (a deep area).
- Education
- Fee reduction
- Prizes.

A significant source of incentives stem from a community based approaches, including communities aimed at: inclusion, information input, information use, attribution, acknowledgement, common goals (to make it correct), pride of authorship, pride of inventorship, making something available, inventing something needed, ego attachment, (quasi) gambling through investment (shares), collaboration, and fundraising.

To incentivize viewing we specifically incentivize the user by empowering them to obtain pertinent and high quality data quickly (immediate and rapid gratification), to increase their knowledge breadth and depth, to assist in context management and process management, and to keep their burdens low, enthusiasm high, to raise expectations of more to come back to, including but not limited to:
- Efficiency of getting something done without burden
- Ease of goal statement and starting point selection for user
- Speed of navigation from starting point to goal
- Effective focusing ability for narrowing results
- Complexity reduction by information hiding and filtering
- Saving context in case of user interruptions
- Effective search and result review management
- Saving result sets for update, culling, review, sharing
- Availability of serendipitous results which are relevant
- Managing 'side trips' and reducing fear of side trips as being an inefficient use of time
- Speed and ease to establish Intellectual Property protection.
- Availability of methodologies in the form of, including, but not limited to: managed workflow steps, survey questionnaires, and resources. The methodologies provide for, including, but not limited to:
  - Inventors—Protection of Intellectual Property:
    - To self-evaluate the status of their ideas
    - To self-evaluate the potential of their ideas
    - To develop components of a patent application
    - To strategize on the defense of their ideas and patents
    - To find resources
  - Entrepreneurs:
    - To self-evaluate their strengths and core assets
    - To self-evaluate the value of alternative development areas and ideas
    - To analyze their competitive stance and opportunities
    - To develop components of a business plan and presentations
    - To strategize on the defense of their businesses, ideas and patents
    - To find resources
  - Investors:
    - To self-evaluate their strengths as an investor
    - To self-evaluate the value of alternative development areas, consortia (collectives), technologies, and ideas
    - To find investment advice
    - To proceed in investments and mitigate risks in various investment vehicles.

When the technologies are out, they can be viewed by any number of investment bankers/people wanting to buy/commercialize the new technology. The inventor has choice depending upon their objectives at each point of this process to choose if they would like to sell/patent/license/commercialize their technology. When the technologies are out, they can be viewed by recruiters searching for creative talent.

Enticement and Viral Marketing Incentives

As an incentive for use and an additional value stream, a feed of teaser stories about, including but not limited to: new inventions; new investments; new investment 'value events'; new inventors; each providing a short headline, story line, and links to a ttx on visualization and community page for the ttx to provide a news feed for use by other sites.

For notification and to expand the user base, an outreach mechanism to notify those whose works are added to the CMM as information resources that their contributions are being cited. The mechanism includes email outreach, 'friend' outreach, and entries on each of organization based 'feed' and 'blog' to notify colleagues of the attributions of works.

For notification and to expand the user base, an outreach mechanism to notify friends of those whose works are added to the CMM as information resources, new ideas, or inventions that the work is being included into the CMM. The mechanism includes email outreach to those who have not 'opted out' and have shown interest in a related technology area or in the author/contributor outside of the use of the CMM, and are not present users of the CMM.

Paid Incentives

Companies can pay for brainstorming by others, and can put the brainstorming into a game context. Brainstorm or online development games will provide spectator and player excitement and increase the quantity of ideas in the system. The players and spectators may pay a fee to help cover the cost of the 'purse' paid to the winner. The payments may take on a speculative nature in support of the higher perceived expertise of certain players. The appearance of this type of game will be as a Reality TV show where a spectator can watch the contestants think and create.

Brainstorming Game

The brainstorming game is essentially to ask the player to describe an 'game entry' idea that would be suitably categorized as being within the parent cnxpt identified, where the idea was differentiable from the cnxpts already in the parent cnxpt. A sort of 'pin the tail on the donkey' choice of the category selection to choose a parent could substitute for the specific identification of a parent by the game moderator.

Incentive Indications

Question Mark Bubbles serve as the user's indicator of an incentive to add or define a cnxpt, or as a place to enter a game entry in the Brainstorming Game. Once a description is entered by a user, the Question Mark Bubble would change to a different indicator showing an answer being given. A portfolio list of Question Mark Bubbles would be available to players. Users would be able to sort the portfolio list by value of incentive, or could, including but not limited to: limit it by game involved. Question Mark Bubbles carrying an incentive other than a mere game reward show desired areas of the fxxt where contributions are desired or where work is requested. Workflows are involved when entries are made by a user in game or incentivized Question Mark Bubbles.

Money Mark Bubbles serve as the user's indicator of fertile areas for innovative thought. A Money Mark Bubble shows that the parent cnxpt should have more children.

Suggestion Bubbles serve as the user's starting point for thought toward innovation. A Suggestion Bubble has a description that is machine generated and likely not a proper description of anything. Such generated suggestions are of the nature of 'TRIZ' suggestions where a differentiator is stated within a context of a cnxpt. TRIZ or its derivatives have defined a concept of 'contradictions' in design criteria that lead to 'inventive situations'. TRIZ 'system features' lead a designer or inventor to consider specific limited improvements with the understanding that contradictions may or may not be solved. These 'system features' are a type of 'differentiation' that could trigger an inventor to think in a certain direction toward innovation. Differentiations, keyword triggers, gaps, TPL change triggers, or some other triggering thought that a user could form into an actual innovative concept are generated by methodology based generation algorithms developed and added to the system, including but not limited to TRIZ, TPL, Feature Differentiators, vocabulary trigger generators. The number of such available suggestions is a predictor used to show fertility of a category, whether or not they are all displayed.

Fun Incentives

Games such as expert watching or investor watching can be expanded to 'fantasy investor' games.

Single person games such as "Are you thinking like a great innovator?" can offer students a challenge. 'View Innovation Pulse' is a viewing of a display of activity; by community interaction, by investment; by value growth; of some system data.

Users may Opt-in to be 'Followed,' (possibly for an incentive discount), and allow for establishment of personal ratings. Trust and Expertise Ratings provide for reporting on statistics of prior system interaction results; Trust Story anecdotes or reviews; Experience measures (such as What they looked at; What they are interested in)

Invention tracking is a spectator sport where a user is informed of the progress of an invention, tcept, investment, investment pool, or investment team. People can watch experts, and even 'guide' them or bet on them to be able to come up with a new concept.

One Reality TV show could be 'watch the inventor action', where a challenge is set up to rapidly improve on an idea within some specific set of constraints (solve this appcept, make this cheaper, etc.).

Another will be 'watch the investor action' where new private placements are published and spectators bet on the investment level made, time to close, etc.

Indication

As used herein, the term "indication" refers to the act of informing the system through the user interface that a specific dxo or relationship is to be acted upon based on a request to the system for action.

Ideas—Subjects, Topics, Ttxs

Tpx→Represented by Txo

As used herein, the term "tpx" refers to anything whatsoever, regardless of whether it exists or has any other specific characteristics, about which anything whatsoever may be asserted by any means whatsoever. A 'tpx' corresponds exactly to the term 'resource' in RDF (defined in RFC 2396 as "anything that has identity"). The address of a tpx that happens to be an information resource is called a subject address.

The TNMS's subject is a tpx in the sense used here.

Concept→Ttx→Represented by Cnxpt

As used herein, the term "ttx" refers to a cognitive unit of meaning. It is an abstract idea of something formed by combining a set of characteristics. Ttxs are perceived regularities in events or objects, usually designated by a label in a language. Ttxs are also thought of as categories. As categories, they may hold sub-categories. Each ttx may additionally be described by its relationships to other ttxs in a categorization or classification structure, and by its characteristics. Each ttx may be additionally described by (including, but not limited to): name variants, descriptive information, description variants, relationships to other ttxs in a knowledge domain (e g in a classification hierarchy), purlieus, cncpttrrts, scopxs, information resources, and attribute values. Ttxs need not be fully described or given names during their infancy. Identity indicators apply to ttxs. In one embodiment, strong limits are placed on what may be defined as being a ttx to reduce the burdens caused by over generality.

Technology Concept→Tcept→Represented by Txpt

As used herein, the term "tcept" refers to a cognitive unit of meaning or knowledge perception of at least one of a field of science, a scientific discovery, an industrial design, a business process, a procedure, a tcept category, an innovation, an invention, a utility patent invention, a means, a method, a tcept with an additional or changed feature from another tcept, a generic branding. Tcepts are elements of scientific knowledge or creative ideas for techniques or apparatuses from the human mind Tcepts are the application of knowledge and understanding, embodied into a piece of equipment or a technique for performing a particular activity in order to control processes and/or fabricate products. They each represent the sum of the study of a specific technique, method, procedure, formula, device, means, or apparatus, but need not consist of any more than a simple info-item identifier (for internal identity) and a simple characterization by a set of characteristics such as a definition or name (for external identity indication).

Tcept examples include but are not limited to: pencils; paper; devices, tools, systems, or equipment; techniques, products; processes, procedures, programs, or methods; drugs; reagents, compounds; diagnostics, metrics, or indicators; organizational styles or managerial system, etc. They might be cutting-edge products, or broad fields of technology. They need not be commercially available or feasible. They need not be concrete at present, nor do they need to be well defined or meet a human need. They may or might not represent advances in theoretical knowledge, tools and equipment. They might be considered to fall within any technological or scientific field, including but not limited to communications, media, transportation, energy, computing, chemistry, biotechnology, etc. Tcepts are not the use of, purpose or result (artifact) of a process or application of a device.

Tcepts do not define property rights but can be the basis of definitions for creative ideas of the human mind that have commercial value and could receive the legal protection of a property right under the legal mechanism of a patent or a trade secret. If an idea is patentable, then it can be a tcept.

Each tcept may be named and described by, including, but not limited to: name variants, descriptive information, description variants, its relationships to other ttxs in a knowledge domain (e g in a classification hierarchy), its purlieus, cncpttrrts, information resources, and attribute values, or by combining a set of characteristics that includes what are here called features. Each tcept is also a ttx.

Application of Technology Concept→Appcept→Represented by Axpt

As used herein, the term "appcept" refers to a cognitive unit of meaning or knowledge perception of at least one of a potential purpose, need, or use for technology, system, or product, probably to help to solve human problems or to create a result or product, or where needs for technologies share relevant commonalities; or a categorization of needs for a technology. It is the problem that someone believes can be solved by a technology. Appcepts are represented by axpts. Axpts are specializations of cnxpts.

Each appcept may be named and described by including, but not limited to: name variants, descriptive information, description variants, its relationships to other ttxs in a knowledge domain (e g in a classification hierarchy), its purlieus, cncpttrrts, information resources, and attribute values, or by combining a set of characteristics that includes what are here called needs or requirements. Each appcept may also be a tcept.

Because appcepts may be seen as tcepts, it is possible to use an appcept one day as an application without a solution, and at a later time as a tcept potentially satisfying the requirements of another appcept—in other words, an appcept, such as a 'display screen' needed to show the results of a computer program, would later be a tcept used as a part of a computer.

Because appcepts may be Application Domains, or may be one of the applications in an Application Domain, appcepts may form trees consisting of only appcepts, where one appcept, such as a domain, may be seen as encompassing several more specific applications and thus be a root. Also, a tree may be formed where an appcept not a domain is a root, and several domains may be leaves.

Special relationships may exist between appcepts and tcepts to show that the tcept may be a solution for the application. These include but are not limited to imputed associations based upon "application suitability matching", gap relationships, roadblock relationships, derived value relationships, and dependency relationships.

Appcepts and their connections to tcepts are one example of a structure used for determining predictions regarding one type of cnxpt because of relationships with another type of cnxpt.

Keyword

As used herein, the term "keywords" or "keyword phrases" refer to phrases found in, including but not limited to: info-item descriptions; info-item names; queries; information resources, collected to serve to index other information or provide a basis for semantic distance calculation or syntactic analysis. Keyword phrases may be thesaurus entries. Keywords and keyword phrases are not considered to be ttxs in that they are not described in the CMM unless they are also included into a thesaurus made for viewing by users. The keywords phrases may significantly overlap in similarity of naming to other ttxs, but no significance should be attached to this overlap. Use of information collected regarding keywords may, in one embodiment, be useful in populating information in a cnxpt regarding a ttx.

Purlieu→Represented by Purxpt

As used herein, the term "purlieu" refers to a context either in time or in some other aspect or regime. A horizon purlieu is a timeframe for which to determine or relate an expected state of gestation of a tcept in the future or past. A geographical purlieu might state that tcepts are useful in a region. A stage of development purlieu might state that tcepts are very new or, alternatively, already a product. A patent effectiveness period provides a basis for a purlieu for a technology cnxpt.

Trait→Cncpttrrt→Represented by Trxrt

As used herein, the term "trait" or "Cncpttrrt" refers to an assertion regarding a ttx, including, but not limited to: discrete value attributal information or descriptive information. Specializations of cncpttrrts include, but are not limited to: consignment data, features, needs, or requirements.

The cncpttrrts may significantly overlap in similarity of naming to other cncpttrrts and ttxs, but no significance should be attached to this overlap.

Info-Item

As used herein, the term "info-item" refers to a system data object or an attribute if used to refer to a specific form of data object. The term is equivalent to "information item" or "item" in the Topic Navigation Map Standard Some info-items may be locked to improve reliability of information and efficiency of operations. Note that this does not imply that a locked cnxpt may not have new hierarchical associations added to it, since hierarchical associations with a locked cnxpt (or txo) in the parent (supertype, predecessor, etc.) role may be added to the locked cnxpt (or hierarchical relationships for a locked txo).

Info-Items for Ttxs, Topics, and Representing Other Information

Info-items fall into one or more categories generally of 'infrastructure', 'categorizable', 'displayable'.

Topic Info-Item→Txxo

As used herein, the term "txxo" refers to a type of knowledge info-item as defined in the ISO's Topic Navigation Map Standard (TNMS) (ISO 13250) and is a symbol used within a topic map to represent one, and only one, subject. A txxo is a machine-processable representation of a unique, clearly identified, and non-ambiguous subject. The set of subjects that can be represented by txxos is not restricted in any way other than needed for civility and legality. Txxos can be used in the CMM to represent tangible things and things that have no tangible form at all, but txxos are not supported by most of the facilities of the CMM, since the "txo" is available.

Txo Info-Item

As used herein, the term "txo" refers to a type of stored knowledge info-item, that may be instantiated in the CMMDB, intended to represent one and only one tpx in order to allow statements to be made about the tpx, or a category of other tpxs in order to allow statements to be made about the tpxs in the category in general. Txos share some similarity to txxos, but a txo is not a 'txxo' as defined in the TNMS. A txo is a machine-processable object that is intended to represent a non-ambiguous tpx. Some specializations of txos, herein called cnxpts, while merely intended to represent non-ambiguous ttxs, are expected to represent less clearly delineated tpxs for the early portion of their existence. The set of tpxs that a txo may represent is not restricted in any way. Txos can be used to represent tangible things and things that have no tangible form at all.

Txos serve as 'Infrastructure Concepts' so that an info-item is available to represent a person, company, product, project, or some other entity not directly addressed or categorized as a cnxpt would be. Specializations of txos also provide for management of infrastructure of the system.

To avoid confusion, the mapping between tpx—txo, and ttx—cnxpt are distinguished. To conform with the standards, here we formally uses the name txxo where the standard would use the term 'topic link' and the name tpx where the standard uses the term 'subject'. While topic maps have no predefined set of infxtypxs because they are not domain-specific, in one embodiment, the CMMDB relies upon a number of predefined infxtypxs: cnxpts are defined to be representatives of ttxs.

In the CMM, txos provide a structure for the system, while cnxpts are used to represent user domain data. Specializations of txos represent, including but not limited to: scopxs, infxtypxs, irxts, comxos, rexos, fxxt specifications, data sets, result sets, rsxitems, goals, query scripts, methodologies, analytics, workflows, workflow 'To Do' items.

Cnxpt Info-Item→Cnxpt

As used herein, the term "cnxpt" refers to a type of knowledge info-item that represents a ttx. The invisible heart of every cnxpt is the ttx that its author had in mind when it was created. A cnxpt is more a container for an idea or the placeholder for an idea.

Cnxpts also represent ttx categories. Each cnxpt may additionally be described by its relationships to other cnxpts in a categorization or classification structure, and by its infxtypx, scopxs, purlieus, cncpttrrts, characteristics, and attribute values. Cnxpts are restricted specializations of txos, designated by a infxtypx.

In one embodiment, a cnxpt is merely intended to represent a unique, clearly identified, and non-ambiguous ttx. In one embodiment, a cnxpt may represent a less clearly identified, possibly ambiguous ttx.

Technology Cnxpt Info-Item→Txpt

As used herein, the term "txpt" refers to a type of stored knowledge info-item that may be instantiated in the CMMDB and represents a tcept. Txpts represent perceptions of at least one of a field of science, a tcept category, an innovation, a utility patent invention, a business process, a means, a method, a txpt with an additional or changed feature from another txpt, a generic branding. Each txpt may be named, and may be described by one or more of: a textual description; an abstract; by its relationships to other txpts; purlieus; or by its cncpttrrts (here often referred to as traits, features or requirements), or attribute values.

Application of Technology Cnxpt Info-Item→Axpt

As used herein, the term "axpt" refers to a type of stored knowledge info-item that may be instantiated in the CMMDB and represents an appcept that is a purpose, need, or usage for technology or where needs for technologies share relevant commonalities; or a categorization of needs for a technology; or use or potential use of a technology, even if no technology currently exists to support that use. Axpts represent perceptions of, including but not limited to: an application domain, product domain, product line, a generic market, a benefit from technology, a problem that a tcept could solve, a purpose for use of technology, a grouping of requirements that a tcept should address, or a mere bundle of needs. Each axpt may be named, and may be described by one or more of: a textual description; an abstract; by its relationships to other axpts, txpts, tplxpts, or core asset descriptions; purlieus; or by its cncpttrrts (here often referred to as requirements or needs), or attribute values. Appcepts are often considered to be tcepts because the application, if solved, could be utilized to solve a 'larger' problem, and thus appcepts may be also and additionally described as tcepts are described, and may be converted to tcepts or play the role of tcepts in various contexts.

TPL Cnxpt Info-Item→Tplxpt

As used herein, the term "tplxpt" refers to a type of stored knowledge info-item that may be instantiated in the CMMDB and represents a TPL. Tplxpts are specializations of cnxpt info-items and are associated with other cnxpts. Tplxpts represent perceptions of, including but not limited to: a field of science; tplcept category; theory; principle; law of science; hypothesis; innovative methodology; industrial practice; engineering practice; quality control practice; methodology; TRIZ 'contradiction' (which may be seen to have two parents); "TRIZ Substance-field analysis" model or law; TRIZ 'Resource'; TRIZ "Well Solved Problem to Analogous Solution transformation"; other TRIZ practice element; a tplxpt with an additional or changed feature from another tplxpt; other ideation methodology; or a generic branding of a service offering for a methodology. Each tplxpt may be named, and may be described by one or more of: a textual description; an abstract; by its relationships to other cnxpts; purlieus; or by its cncpttrrts (here often referred to as traits, scientific constraints, scientific impact area, or scientific effects), or attribute values.

Keyword Index Entry Info-Item→Kwx

As used herein, the term "kwx" refers to a type of knowledge info-item that represents a keyword index, search term, or thesaurus entry. A kwx is a specialization of a txo.

While kwxs are specializations of txos, keyword phrases are not considered to be txo names and are not considered to participate in hierarchies in the same nature as txos and other specializations of txos normally do. That said, nothing here limits the keywords to be treated as other txos or from being involved in hierarchies which consist of only kwxs.

Purlieu Info-Item→Purxpt

As used herein, the term "purxpt" refers to a type of stored knowledge info-item representing a purlieu context either in time or in some other regime. A horizon purxpt is a CMM info-item representing a timeframe for which to determine or relate an expected state of gestation of a tcept in the future or past.

Purxpts may be related to cnxpts due to user suggested purlieu relationships.

Purxpts are specializations of txos. Characteristics of purxpts include but are not limited to named value attributal information, textual descriptive information, and information resources. Purxpts provide greater flexibility than merely relying upon attributes held within the cnxpt for stating contexts, since the purlieu may be specified for multiple cnxpts, may have a scopx different from the cnxpt, and many purxpts may be related to a single cnxpt, representing different contexts that a cnxpt is related to.

Purxpts may participate in linear lists and hierarchies in the same nature as cnxpts and other specializations of cnxpts normally do. Horizon purxpts are arranged in a list or hierarchy by directed temporal order relationships and undirected concurrent relationships.

Trait Info-Item→Trxrt

As used herein, the term "Trxrt" refers to a type of stored knowledge info-item that may be instantiated in the CMMDB and represent cncpttrrts. Trxrts are specializations of txos and represent cncpttrrts. Characteristics of Trxrts include but are not limited to named value attributal information, textual descriptive information, and information resources. Trxrts provide greater flexibility than merely relying upon attributes held within the cnxpt, since the cncpttrrt may be specified for multiple cnxpts, may have a scopx different from the cnxpt, and many cncpttrrts of the same type, possibly having different scopxs, may be related to a single cnxpt.

In one embodiment, cnxpts may have cncpttrrts because more is known about specific aspect of a cnxpt, and that specific aspect may be characterized in a self-contained manner.

While trxrts are specializations of txos, trxrts are not considered to participate in hierarchies in the same nature as cnxpts and other specializations of txo do. That said, nothing here limits the trxrts to be treated as other txos or from being involved in hierarchies which consist of only trxrts.

For tcepts, features are represented by specializations of trxrts known as feature trxrts. The feature trxrt should be tightly associated with a cnxpt in the CMMDB to specifically state that the cnxpt has a specific feature. A single feature trxrt may be related to more than one specific cnxpt, showing that two different tcepts have the same feature.

In one embodiment, requirements may be tightly associated with an appcept cnxpt in the CMMDB to specifically state that a specific need or requirement is or should be fulfilled by the appcept. These requirements are represented by specializations of trxrts known as requirements trxrts. A single requirements trxrt may be related to more than one specific appcept, showing that two different appcepts have the same requirement.

Authors of trxrt descriptions may make additional statements or otherwise improve on the description and attribute values. Care must be taken to allow for notification to other users making comments about a trxrt or users initiating relationship connecting a trxrt to a cnxpt that the trxrt has been changed, so votes about a trxrt are threaded additions to the trxrt, and comments may be changed by an author. Comments and change histories are provided as a collaboration blog.

Consortium Txo→Conxtv

As used herein, the term "conxtv" refers to a type of knowledge info-item that represents an innovation consortium. It is a specialization of a txo. Conxtvs do not participate in hierarchies.

Registration Txo-rexo

As used herein, the term "rexo" refers to a type of knowledge info-item that represents registration associated with a ttx. It is a specialization of a txo. Rexos are further specialized by infxtypxs into info-items representing, including but not limited to: people, companies, business plans, portfolios, portfolio items. Rexos do not participate in hierarchies.

Community Txo-Comxo

As used herein, the term "comxo" refers to a type of knowledge info-item that represents a Community. It is a specialization of a txo. Comxos are further specialized by infxtypxs into info-items representing, including but not limited to: interest based communities, investment communities, ecosystem communities. Comxos may participate in hierarchies of comxos. Consortia, companies and individuals can participate in communities.

Product Txo

As used herein, the term "product txo" refers to a type of knowledge info-item that represents a product. Product txos may participate in hierarchies of product txos.

Dxos

Dxos, defined above, are info-items of a general nature used for display control. Dxos may participate in hierarchies of dxos.

Info-Item Object Inheritance Hierarchy

As used herein, the term "info-item object inheritance hierarchy" refers to an ordered set of info-item subclasses and superclasses, where the superclass-subclass relationship shows that the definition of the subclass is a specialization of the superclass, or the subclass is "a kind of" or "instance of" its superclass. The objects of the subclass thus behave, subject to the restrictions of the specialization, like objects of the superclass. Here, the subclasses of the root superclass txo include but are not limited to: scopxs, infxtypx, fxxt specifications, data sets, result sets, rsxitems, query scripts, methodologies, analytics, workflows, workflow 'To Do' items, goals, cnxpts, conxtv, and irxts. The subclasses of the superclass cnxpt include but are not limited to: kwxs, purxpts, trxrts, txpts, and axpts. The subclasses of the superclass txpt include but are not limited to: axpt.

Information Resource

As used herein, the term "information resource" refers generally to, including but not limited to: a "network retrievable information resource", or any internal resource that is useful as an information resource. It is not a 'resource' as defined in RDF (see RFC 2396). An information resource, if still available at its recorded address and not altered, can be retrieved and displayed, but, importantly, its address can be used as a unique identity indicator. Both its address and, more efficiently, its assigned info-item identifier can be used for the purpose of automated merging. Information resources include, but are not limited to: documents, web pages, articles, diagrams, photos, hyperlinked pages, cached web pages, metadata regarding the documents or pages, etc. Information resources may be external or internal to the CMMDB.

Collateral Information Resource

As used herein, the term "collateral information resource" refers generally to an information resource that tends to explain a ttx or is at least considered relevant to the ttx. The information resource is similar to an "addressable subject" (in the TNMS) that enables "subject identity" but the collateral information resource cannot be relied upon to rise to the ability of a TNMS "subject indicator" to be "a resource that is intended . . . to provide a positive, unambiguous indication of the identity of a subject." Nevertheless, in one embodiment, the collateral information resource is considered to be a "subject indicator" here, useful as an identity indicator. The collateral information resource is represented by a stored info-item called an irxt. Irxts are linked with cnxpts by occurrence relationships.

Information Resource Info-Item→Irxt

As used herein, the term "irxt" refers to a type of knowledge info-item that represents an information resource. It is a specialization of a txo. Irxts serve as surrogates or placeholders for, including but not limited to: externally or internally held collateral information resources; internal resources which serve additionally as information resources.

Irxts are used to maintain identity by reference. When an irxt is used to represent a resource that already has its own unique URI, that URI can be used as an identity indicator of the txo having an occurrence relationship with the irxt. In the topic map standard, this form of identity indicator is closest in meaning to a subject locator if the indicator specifically defines the tpx, or a subject indicator if it is merely relevant. Here the addressability of the irxt itself, the info-item identifier, is used to provide a surrogate of the subject locator address or subject indicator. The info-item identifier address is used in an subject identifier occurrence relationship role. Irxts may participate in hierarchies of irxts where an information resource is available in separately locatable sections.

Internal Resources Serving as Information Resources

As used herein, the term "internal resource serving as an information resource" refers generally to an item stored in the system knowledge base that tends to be relevant in describing a ttx. Examples include, but are not limited to: a document registered by a user to explain his business idea (medium weighting); resumes of individuals in the field (low weighing); thesaurus listing (relevance weighting); registered 'consortium' mission statement (very high weighting); idea contest entries (weightings based upon ranking in contest); interest statements (relevance ranking weighting based upon readership); blog entries commenting on an information resource or the ttx; Class, Meetup, Event, Conference descriptions (medium weightings depending upon number of experts viewing event listing).

Infrastructure Software

As used herein, the term "infrastructure software" refers generally to programming, documentation, rules, configuration settings and configuration policies, and more specifically to framework components. Framework components in combination enable the operation of the system apparatus. Application elements and analytics are invoked by infrastructure software. Infrastructure software, when deployed to the various components of the framework, customize and configure the framework to enable information entry, retrieval, and editing; to manage data storage, to communicate and to manage communications with other framework components, and to display information to or to receive information from the user.

Innovation Consortium Contributor

As used herein, the term "innovation consortium contributor" refers to a person who wishes to contribute ideas or other intellectual input for an ownership proportion of the proceeds from licenses of a tcept may seek to participate in an Innovation Consortium.

Innovation Consortium Investor

As used herein, the term "innovation consortium investor" refers to a person who wishes to invest money for an ownership proportion of the proceeds from licenses of a ttx by seeking to invest in an innovation consortium.

Interest Information

As used herein, the term "interest information" refers to the collected information on use of the system, including but not limited to interest shown in: ttxs visited, relationships traversed. Interest information is collected in interest relationship records.

Innovation Investment Pool

As used herein, the term "innovation investment pool" or "investment pool" refers to a securitization mechanism, governance rules, reporting structures, and market that 1) transfers a future right in the value of an idea to the pool; 2) transfers present value or a promise to develop an invention to the inventor; 3) transfers a determinable amount of risk to the pool; 4) acts as a shield to isolate the pool of assets from selling inventors or their assignees; 5) acts as a shield between investors and the sellers; 6) makes a particular investor's ownership in the pool transferable without regard to the pool's ownership of a property right in any particular invention in the pool; 7) establishes any needed legal structure for the pool; 8) provides for value (bid/ask) reporting, investment participation transfers, and sales transactions. The effect of this process is that a number of positions in ideas may be bundled and the bundle offered to investors in a market for price determination, creating the market, and letting inventors obtain liquidity early on.

Prediction by Investment Pool

To be sustainable, users must enter new ideas. Incentives are provide to the users to do so, one of which is that they can determine that that their idea is or is not 'known' (the user confirms to the system that the idea is not known). At that point, some prediction of when the 'parent' cnxpt will come about and some prediction of its applications' value probably exist, and that prediction can be inherited by the new idea, with an 'incremental' period added on and a decreased value (the other sub-types of the category have value too).

Funding is also an incentive. Sustainability requires vetting of the idea, to qualify it for investment. Crowd sourcing is appropriate to this, so long as the system does not misinform users to a point where they blindly trust the mechanism Investment pool methodologies provide a user learning and self-evaluation tools to allow them to graduate to higher level pools, leaving behind a trail of documentation for further comparison and qualification. Ideas are later evaluated by trusted others, allowing graduation from very low level investment pools to higher ones. Entities (the assignee) can be formed and their value can be determined in an options market style by the negotiation process connected with graduation. The investment pools are milestone specific. When the graduation occurs, a negotiation takes place, giving a value for an entity at that point in time. These negotiations are extremely loosey-goosey at the lowest level, and much tighter in higher levels of investment pools. The results from these predictions are combined with the results of prior predictions for the higher level categories around the technology, and with predictions about what applications of the technology would have, and a better prediction of value and time of fruition are formed.

The prediction of the higher levels (the categories, and applications) thus also help to form a basis for values of the new ideas and in the investment pools based upon them. It generates new interest because of the excitement in specific markets. The predictions of the past give presumptions to the predictions of the future (incremental ideas) and thus also the value of an investment pool (where other factors are also considered). It does not matter that some pools are charitable, are 'virtual games', or are 'test markets'. Each can cause a prediction and the ones where real money are involved are 'market based' predictions with a higher probability of being accurate.

By the time that an 'entity' gets to the investment pool level just below the 'Crowd Funding' (under JOBs act) stage, an understanding of their value, their positioning versus others, their amount of progress made, etc. will be in the system, including documentation, level of communication, etc. This allows for the 'vetting' and qualification required by the law.

Investment; Markets; Exchanges

Markets

Markets for very early valuation of technologies and for rapid creation of liquidity. Overall, the exchanges and markets comprise options markets for price setting of innovations by market value estimation and negotiation.

Real-Money Exchange

The real-money exchange provides a real-life market for valuing and securitizing ideas. By submitting a technology and providing an ownership assignment, the owner 1) gains assistance in establishing a business entity around the innovation; 2) obtains an ownership position in a business entity; 3) allocates a part ownership in an entity to a pool managing special purpose vehicle; 4) obtains assistance available only for pool members; 5) obtains objectives to meet to progress into higher value pools where greater liquidity becomes available along with opportunities for greater investment or transfer.

Prediction Gaming Virtual Value Market

The Prediction Gaming Market is a shadow (or virtual) market for playing an investment game. The range of technologies for which an investment may be made is much wider than those available in the real-money exchange. Shadow markets assist the real-money markets in valuation establishment by establishing rough valuations earlier in the innovation lifecycle.

Prediction Gaming Market

The Prediction Gaming Market is a speculative or betting market created to make verifiable predictions on outcomes, based upon the game. Market participants bet by answering questions like: "What will the future value of a technology be at gate 'X'." "Which tcept do you think will first satisfy the requirements stated by this appcept?" etc. and models predict the outcomes based upon wisdom of crowds input and exchange activity. Assets are cash values tied to specific outcomes (e.g., Tcept X will win by satisfying the need) or parameters (e.g., appcept Y represents $Z revenue in the horizon 4 years from now). The current market prices are interpreted as predictions of the probability of the event or the expected value of the parameter.

Other Markets

The tech transfer market offers the ability to advertise, buy, sell and license patents. This makes the ownership of patents more liquid, thereby creating incentives to innovate and patent.

Aggregating patents in the hands of specialized licensing companies facilitates access to technology by more efficiently organizing ownership of patent rights.

Key Encryption Process

As used herein, the term "key encryption process" refers to a security procedure in which a translation from a unique internal format database ID for an info-item to a unique external (export) ID occurs at the central system, and involves an obfuscation process carried out on info-item identifiers (unique ID identifiers) or other system identity 'keys' to cut-off the ability to recombine exported data sets into a re-creation of the central CMMDB.

Keyword Index

As used herein, the term "keyword index" refers to a list of phrases found in, including but not limited to: info-item descriptions; info-item names; queries; information resources, and that serves as an index for the referenced information. Keyword phrases are thesaurus entries. A keyword phrase in the list is represented by a kwx specialization of a txo.

Locale

As used herein, the term "locale" refers to an area of the map formed from one fxxt analysis.

Mannerism

As used herein, the term "mannerism" refers to actions dxos may perform at certain or random times. The actions may be in reaction to a user's action or to a system or external event.

Map

As used herein, the term "map" refers both to the visualizations which result from the mapping process, as well as the information held in the CMM which is used as a basis for the mapping process. A fxxt may be used to provide context for the organization of the map. A list of tpx info-items may be used as a top level for a map in a portfolio.

Ttx Map

As used herein, the term "ttx map" refers to a visual aid for understanding ttxs and their interrelationships as developed from and based upon the contents of the CMMDB by at least one Ttx Mapping Visualization Process.

Result Set Map, Selection Set Map

As used herein, the term "Result Set Map Object" or "Selection Set Map Object" refer to visual aids for understanding info-items and their interrelationships as developed from and based upon the contents of the CMMDB by at least one Set Mapping Visualization Process.

Area Map

As used herein, the term "Area Map Object" refers to visual aids for understanding info-items and their interrelationships as developed from and based upon the contents of the CMMDB by at least one Set Mapping Visualization Process operating upon an Area of Consideration or an Area of Interest.

Portfolio Map

As used herein, the term "Portfolio Map" refers to visual aids for understanding info-items and their interrelationships. Each portfolio is a collection of cnxpts of a set type marked with a set fxxt for the portfolio. The highest level of the portfolio is a list of tpx info-items. The cnxpts related to a tpx info-item in the list and within the fxxt of the portfolio are in a map accessible via the list item. Each portfolio fxxt is 'built' starting with this initial collection and augmented, as specified in the fxxt specification, with other info-items.

The map formed contains all of the cnxpts related to the list items and in the fxxt, but is subdivided according to the list to show the cnxpts by the list items.

Mapping

As used herein, the term "mapping" refers to the process of forming a textual or graphic image to convey information about ttxs, other dxos, and the relationships between them. The visualization of the map is a communications medium that provides a sense of co-location based upon an underlying nearness of the pictured ttxs and display objects based upon the strength of relationships between the cnxpts or dxos representing the displayed objects. The map user "reads" the visualization of the map and interprets its information content in the context of his or her own objectives and knowledge of the knowledge domain and the real or abstract relationships that the map is intended to describe. In this way, the visualization of the map is an outward manifestation of the map, so the visualization of the map is a map. For this reason, here the use of the word map refers both to the information prior to the mapping process and the result.

Maps and Communication

Map Development for User Expectations

To form a map, spatial relationships among the individual pieces of data have to be set, since the ttxs have no geographic nature. The positions are developed based upon the relationship information present and by fxxt analysis, Merger and Comparison, and ontology reduction.

Focusing can be accomplished in many ways. When contexts are categories and the categories have sub-categories, then the focusing can be accomplished by moving from a display of the categories to a display of one (or more) category's sub-categories.

When two or more map visualizations are displayed by a user, the user may select a cnxpt info-item on one map and "sync" one or more other visualizations in order to move the focus of display of the other map to be the cnxpt selected on the first, regardless of the fxxt of the other map. If that cnxpt is not on the other map, the focus is moved to a cnxpt in the fxxt of the other map where the cnxpt is a parent of the selected cnxpt in the first map. If the focus cannot be moved because a cnxpt cannot be found to serve as the focus, then the user is informed. Other info-items may be focused upon.

Different maps may be formed for different fxxts. Multiple types of visualizations provide for the display of the various relationships held in the Map. Each visualization type emphasizes a certain set of relationships between cnxpts as defined by the fxxt specification. A visualization of cnxpts based upon nation of invention will be very different from a visualization of cnxpts ordered by field of study only (unless, of course, the countries are focused on specific technologies and monopolize research on them). Each visualization type generalizes the information available from the Map, omitting certain features from the display to simplify and rapidly convey the context of the content.

Maps in this System

In one embodiment, the map can be re-arranged and new objects can be created, or 'concretized'. Context-clicking anywhere on the map screen allows the addition of a new ttx, either by starting a goal, or new query within a goal, or by providing a shell for a ttx to be described. It is also possible to create mashups on the visualizations, adding, including but not limited to: knowledge in the form of links, videos, text, web pages, figures, tables, graphics and sound. Ttxs are linked easily to other ttxs to define relationships when the user drags them into another map or list in another window. This information is entered into the CMMDB that the map is derived from, so the map is updated.

In one embodiment, maps can be shared and collaborated upon. View positions and tours (animations showing the process of navigation) of maps may be sent to other users. Written collaboration discussions are retained by the use of votes and discussion threads that can be seen reflected on the map.

Maps by Age

Maps are based upon data from a fxxt as extracted from the CMMDB. In an example of a fxxt, in one embodiment, a map of ttxs anticipated to exist at a set time in the future may be available. As an example of the utilization of dxo personalities and graphical representations, this same map may be displayed in a way that the user will see mannerisms manifested by the personalities of the dxos on the visualization in a way that actions taken by the user within the visualization may cause reactions from the dxos.

Value of Maps

The work of many people goes into each map. Since the map is constructed from data that is obtained from many sources, only small additions to the map (through the CMMDB) will have to be constructed by any individual. This is a form of reuse of prior contributor's efforts.

Data can be collected by importing other categorizations and rationally merging it with existing conceptual information based upon the expertise weighted voting and consensus facility. Maps can be exported for use in organizing other work and for driving drill down analysis in areas such as competitive intelligence and prior art studies.

Mapping by Ttx and Ttx Mapping Design Process

As used herein, the term "ttx mapping" and "ttx mapping design process" refer to a specific design process for developing visual aids for understanding ttxs and their interrelationships. In one embodiment, the Ttx Mapping Design Process will produce one or more designs for visualizations of the ttxs in the CMM, involving but not limited to: dxo positioning, dxo behavior, visualization selection, and visualization content design. In one embodiment, the Ttx Mapping Design Process will produce one or more designs for visualizations of the cnxpts in the CMMDB.

Mapping Relationship

As used herein, the term "mapping relationship" or "mapping function" serves similarly to the mathematical concept of function. A mapping relationship can be thought of as an edge that is also a computing stage that takes an input and produces a single output. For example, a temperature mapping relationship takes an object as input and returns the temperature of that object. A mapping relationship that represents a function that could return multiple objects can instead return a single object representing a single set containing those objects. Mapping relationships, like other relationships, associate two txo info-items.

Traditional mapping relationships have directionality to show that they perform a computation from one object to another, but this directedness is not presumed in this invention, since fxxt specifications may provide roll-ups of various natures and mapping relationships may be used to effect them, resulting in a different directionality in different fxxts.

Matching, Merger and Comparison

As used herein, the term "matching, merger and comparison" refers to the three main processes for automatically determining semantic closeness and reducing the number of info-items a user would see as redundant in a map derived from the CMM. When multiple users concretize ttxs, inevitably there will be redundancy. It may be due to language, laziness, low expertise, etc., but the important contributions users make will usually contain indications of the differences in the ttxs. These differences, or disagreements must be addressed over time, without delaying a user in their work. The automatic operations attempt preliminary actions to work with or around the less than perfect information, and also prepare 'ticklers' or 'to do' items to provide an opportunity to have a human (one of the crowd) work to review the differences to repair them at a later time.

Merger

As used herein, the term "merger" or "txo merger" refers to the process of merging two info-items (esp. txos) that are known to represent the same 'thing' (esp. the same tpx). The CMMSYS facilitates merging of info-items without requiring the merged info-items to be copied or modified. Merging occurs prior to and without regard to fxxt analysis.

Identifying when two infrastructure txos represent the same tpx is achieved by applying heuristics without weights and without regard to fxxts:

If an administrative user has stated that two infrastructure txos represent the same tpx, then the two are combined, subject to undo, and the transaction is recorded, so long as the authority of the user is sufficient.

If an administrative user has stated that one infrastructure txo represents a member of a category or a sub-class of another txo's tpx, then a directed relationship between the two is created, subject to undo, and the transaction is recorded, so long as the authority of the user is sufficient.

If two txos have a subject identifier occurrence relationship with an 'absolute highest' weighting to the same specific subject indicator irxt, then they both identify, as a subject locator, the same network resource as being the thing that they represent and must be merged (so long as the subject locator resolves to a web resource which has not changed between the time the txos were created and the present).

If two irxts share the same source locator, then they should be considered to represent the same tpx but only if the locator resolves to the same page, document content consistently over time.

Matching

As used herein, the term "matching" refers generally to the setting of a value for the closeness of in meaning between two info-items of the same type to provide an identity indicator.

Trait and Suitability Matching

As used herein, the term "trait matching" or specifically "cncpttrrts matching" refers generally to the setting of a value for the closeness in meaning between two cncpttrrts. In one embodiment, in the included specializations called "similarity matching" or the deeper specialization "feature matching", two cncpttrrts are close if they are semantically similar, such as where a cncpttrrt of a car may be 'tan', while another car may be 'light brown', and those cncpttrrts would thus be given a high value for closeness. In one embodiment, in the specialization called "suitability matching" or "application suitability matching", closeness is measured by satisfaction rather than similarity. As an example, where an appcept calls for high temperature resistance, and a feature cncpttrrt of a candidate tcept states that the components made from that tcept will melt at room temperature, the trxrt representing the requirement and the feature trxrt represent the tcept's ability will have a very low 'closeness' relationship to show that feature fails to meet or satisfy the requirement even though the trxrts each refer to operating temperature.

In one embodiment, where multiple trxrts of a single ttx are similar, as found by users or automatically, a suggestion to users to merge the two trxrts is generated.

In one embodiment, in the specialization called "tpx trait matching", a trait of an infrastructure txo is compared against a trait of another txo.

Trait and TPL Matching

As used herein, the term "TPL matching" refers generally to the setting of a value for the closeness of an implementation of a technology to a design criterion caused by addressing a TPL (theory, principle, or law of science). In one embodiment, in the included specializations called "conformance to science", two cncpttrrts are close if the technology trait addressed with significant care a scientific principle and achieved the implemented design to maximize performance with that scientific principle in mind regardless of whether other scientific constraints were also considered in the implementation. An example is the design of a wing where the principles of aerodynamics available at a specific timeframe were considered. A match would exist between the traits of the wing such as the surface design and specific principles of aerodynamics A match might not exist or be considered strong between a principle of aerodynamics that was disruptive to the field and was discovered far after the design of the wing occurred. In one embodiment, in the specialization called "conformance to science", closeness is measured by satisfaction rather than similarity. As an example, where an law of science describes high speed flight and a plane is ill-designed for it due to other factors such as a requirement for low fuel consumption, the trxrt representing the "conformance to science" and the feature trxrt represent the tcept's ability to fly fast will have a very low 'closeness' relationship to show that feature was not designed to answer the scientific principle.

Semantic Matching

As used herein, the term "semantic matching" refers generally matching of info-items on the basis of semantic distance calculations on their descriptions. Where the descriptions of two ttxs are very close semantically, then the two are matched, and, in one embodiment, a suggestion to users to merge the two ttxs is generated.

Interest Matching

As used herein, the term "interest matching" refers generally to assessing the closeness of two ttxs where a number of users who have stated a similar search goal normally visited a specific set of ttxs, implying that they found that the specific set of ttxs were apparently relevant to their goal. Where users often visit, somewhat equally, one or another of two ttxs after stating similar goals, in one embodiment, a suggestion to users to merge the two ttxs is generated.

Comparison

As used herein, the term "comparison", "cnxpt merger" or "cnxpt comparison" refers to the process of determining if two cnxpts represent the same ttx. Comparison is based upon a resolved fxxt (a derived ontology resulting from a fxxt analysis). Because of the dependence upon the fxxt analysis process, it is impossible to state that two cnxpts represent the same ttx in all circumstances unless all fxxts would allow that conclusion.

In one embodiment, the CMMDB will, at one point or another, contain info-items that appear to represent the same ttx. In one embodiment, the CMMDB will, at one point or another, contain occurrences related to two or more info-items. The info-items in each case might appropriately be merged, or it may be premature to merge the info-items until it is quite clear that no differential in meaning represented is present.

In one embodiment, a single cnxpt results from combining the characteristics of the two cnxpts only if all of the characteristics are the same, but where a substantial disagreement is seen regarding the characteristics of a cnxpt, a suggestion is made that the cnxpt be split into three cnxpts, where one parent is formed from the characteristics in the intersection of characteristics (those agreed upon), and two child cnxpts having the characteristics in dispute on each side.

The matching process is completed prior to comparison, for any given comparison.

Visualization Structuring Propositional Relationships

As used herein, the term "Visualization Structuring Propositional Relationships" refers generally to a system of relationships needed to extract a visualization from the CMM. Each knowledge domain has more specific relationships, but those relationships, when summarized, must provide a set of specific relationships:

- A ttx is more specific and included in the parent ttx (subsumption, categorization, classification).
- A ttx is similar or equivalent to another ttx.

Knowledge Domain Centric Visualization Structuring Propositional Relationships

Knowledge Domain Centric Visualization Structuring Propositional Relationships in the CMM for technology mapping will at least include the following types:

- A ttx is more specific and included in the parent ttx (subsumption, categorization, classification).
- A tcept was invented later than its parent (parent is potential prior art)
- A tcept was based upon a dependent claim stemming from one of the claims that could 'read on' its parent.
- A ttx was defined (originally mentioned) in relevant information resources that cited the articles defining the parent.
- A ttx was entered as a query (by a user) with a starting point of the parent.
- A ttx was moved or pasted as a child of the parent.
- A ttx is somehow related to the parent (partitive—part of).
- A ttx is somehow related to another ttx.
- A ttx is similar or equivalent to another ttx.

Meta-Search

As used herein, the term "Meta-search" refers to getting the best combined results from a variety of search engines. Meta-searches allow users to find relevant information from, including but not limited to: leading search engines (Google, Yahoo! Search, and Bing), specialty engines, internal knowledge bases, internal analytics, internet servers, cloud servers, database providers, newsgroups, patent databases, local files, internal drives, file servers, and corporate sources. The meta-search engine, in one embodiment, returns information resources or links to information resources, as well as information resource metadata. In one embodiment, meta-searches are used within queries.

In one embodiment, the meta-search will result in a ranking of the rsxitems in the result set according to relevance, and possibly according to which search engine or database the rsxitem was found in. In one embodiment, the meta-search will combine, and raise the relevance of duplicates in the result set, and the most relevant rsxitems will be sorted to appear at the top of a result set display for culling.

In one embodiment, more complex 'meta-searches' return result sets consisting of cnxpts and information resources which are called 'scanning hits', and which are information resources which previously existed in the CMMDB or were formed to reference newly found external information resources (in other words, locators of external resources newly found or already known) from one or more search engines. The 'scanning hits' rsxitems are all related as occurrences to the goal through the result set of the meta-search. The cnxpts are all related as associations to the goal through the result set of the meta-search.

In one embodiment, meta-searches include structured or unstructured data queries, or information resource queries.

Methodology

As used herein, the term "methodology" refers generally to a system of methods used in a particular area of study or to complete a specific task. A methodology entails a description of a generic process for carrying out a coherent concept or theory of a particular discipline or inquiry, or the rationale that underlies a particular study. Here, it provides a set of defined steps for one or more users to carry out to achieve a specific status, level of understanding, or result, and may support workflow.

In one embodiment, users would pay for the steps in a methodology and the system would assist them by workflow management, such as 'tasks' and 'status'. The fees would be for the use of the methodology or for costs associated with submissions of documents or services.

Methodologies provide a framework to each user and explain the 'best practice' approach to using the system, assist in tracking their work and incentivize them to keep going, measure their use, set their expectations, and do training.

Examples of methodologies include but are not limited to:

- Methodology to follow for newly entered tcept that appears to be novel to obtain IP protection, including but not limited to the following steps: completion of the minimum necessary writing for patent application; online collaboration for assisted preparation of the application; preparation for electronic patent application; assistance for electronically filing the application; electronic application and payment; online auction process for licensing and assignment of patent rights; online investment process for funding invention; online investment process for funding development; preparation of IP defenses; assessing IP value.
- Methodology for users who own a new tcept but wish to get resources by forming an 'innovation consortium'
- Methodology for completing Components of the patent
- Methodology for Prosecution of a Patent to answer the issues with the patent application as the patent office tells you about them.
- Methodology for selling services, including but not limited to the following steps: describing services offered, specifying and testing methodology for customer qualification and preparation to purchase services, electronic application and payment for services; online collaboration for services or assistance being offered.
- Methodology for Outreach, including but not limited to the following steps: state purpose for outreach; select outreach method; prepare outreach message; electronic application and payment for outreach; obtain outreach permission; initiate outreach; initiate follow-ups.
- Methodology for getting some data filled in on a tcept.
- Methodology for better stating a person's purpose for an invention.
- Methodology for determining whether information can be registered for sale as a DataSet; what the information is about, etc.
- Methodology for self-evaluation of business progress, where the questions in the survey are, including but not limited to: milestone questions (has the entity reached a milestone), are 'vetting' (background check, creditworthiness), or are educational. The answers of the self-evaluation questions are used to show progress (as in, including but not limited to: check mark charts, or mnemonic devices such as a thermometer (like used in fundraising) to show how well they are doing either toward graduation from their current investment pool or status, toward 'high probability of success' (probability might be derived from the score), or other ranking). Samples of questions are:

for Survey:

When did you complete the first business plan for the company?

When did you first present your business plan to angel investors?

then output to Evaluation:

Company Formed:

Company Completed first draft of Business Plan: (this answer may not show up if following is filled in . . . .)

Company Completed first presented Business Plan to angel investors:

Methodology for securitization and for innovation investment pools, along with valuation at stages of IP, of gestation (this is a portion of a whole apparatus for investing on the 'unknowns' where the reward comes from the increased value as a ttx moves from one stage of 'unknown' to another, to another, and then to reality, and as the investment risk decreases.) Each pool defined by business progress is defined by a starting and an ending business milestone.

Mid-Tier

As used herein, the term "mid-tier" refers to a computer system dedicated to a customer to allow the customer to retain private data related to and usable in conjunction with the data in the CMMDB. The data in the mid-tier system is under the company's control, and may be released to the central system only when the company chooses to do so. It may include private information resources which may be searched and which may become collateral information resources represented in the CMMDB.

Modeling and Outcomes

Outcome

As used herein, the term "outcomes" refer to specifications of modeling conditions that, if met, imply that the outcome will occur. Outcomes provide a result name for calculations for expected monetary values, decision analysis with risk/reward, and competitive scenario gaming. The likelihood of the actuality of the state of the future (or of who will prevail) is calculated based upon the base data and base assumptions, fxxt definitions, fxxt summarizations, extraction descriptions, primitive's properties, primitive's associated spreadsheets, and 'Modeling Rule' descriptions.

Models

As used herein, the term "model" refers to a prescribed framework for calculating an economic, benefit, or other form of value or prediction. The activity includes planning, constructing, and executing the process for automatically completing the analysis.

Modeling Rules

As used herein, the term "modeling rule" refers to a formula for calculating, including but not limited to compute: the weight of the relationship, expected monetary values, decision analysis with risk/reward, and competitive scenario gaming, based upon CMM data to which they are associated with.

Modeling Rules provide a modeling structure. The definitions may be associated with, including but not limited to: txos, relationships, cnxpts, axpt, txpt, tplxpts, tcepts, appcepts, fields of science, dxos, as well as to spreadsheets attached to those info-items. These connections may be reconfigured to change the basis for the Modeling rule. Modeling Rules may be re-associated to change the basis for the Modeling Rule.

The formulas specified will generally follow the style used for spreadsheet formulas, where relationship infxtypx reference iterators are similar to range specifications and specify, including, but not limited to a: relationship infxtypx, fxxts, scopxs, relationship role, relationship list; and cnxpt infxtypx references are similar to cell specifications and refer to, including, but not limited to: characteristic references, scopxs, cnxpt ranges, cnxpt lists, cnxpt characteristics, fxxts, txos, infxtypxs, txo characteristics, txo lists, and qualifications by txo characteristic.

Calculations are performed on the CMM data based upon, including but not limited to: base data and base assumptions, fxxt definitions, fxxt summarizations, extraction descriptions, primitive's properties, primitive's associated spreadsheets, and 'Modeling Rule' descriptions.

In one embodiment, relationships may be mapping functions that serve similarly to the mathematical concept of function. Relationships do not need to specify any particular computation, but may by being used as a mapping relationship.

Modeling Rule Functions

Formula Functions

In general, the functions available on spreadsheets will be available for use in formulas here.

Ontology Txo Calculations

The ability to calculate some type of value based upon attributes (including results of calculations) of a sibling, parent, child, or grandparent, grandchild (generation skipping), etc. This ability can include the calculation of values:

1) based upon named txos;
2) along specific relationships; or
3) based upon set or specific functions.

Calculations may either be made at server (often by analytics) or at client.

Calculations made on the client update automatically as changes are made to the data.

Calculations made on the server update on a scheduled basis rather than automatically as changes are made to the data.

All updates are performed based upon data dependency derivation relationships between txos (akin to cells in the spreadsheet) called derivation trees. Derivation trees are based upon derivation relationships between txos. Automatic re-computation based on dependencies among txos (cells) reduces the burden of invocation by users.

Fxxt Based

Fxxt based modeling rule formulas are applied on the relationships as mentioned, but note that depending upon the fxxt chosen, the relationships may apply in different directions depending upon how the Descendant Trees are formed, since directionality does not have to be stated on relationships of this nature, and the endpoint that is a child is determined from the result of the Spanning Tree operation for the Descendant Tree. That means that in one fxxt a sum of children could be of one set, while in another, the sum could be of another set of children.

Fxxt Specified

Modeling rule formulas for relationships may be specified to be applied on the relationships of an infxtypx globally, by scopx, or on a relationship directly (single relationship specific), by relationship scopx in fxxt specifications on a specific fxxt calculation step of the fxxt specification or globally for the fxxt.

Fxxt specified modeling rule formulas for cnxpts (or, in some cases, txos) may be specified to be applied on the cnxpts (txos) of an infxtypx globally, by scopx, or be specified for a type of cnxpt or a single cnxpt instance (txo) directly (single cnxpt (txo) specific), by scopx or infxtypx, or to be applied in fxxt specifications on a specific fxxt calculation step of the fxxt specification or globally for the fxxt.

Ontology Txo Constraint Modeling Rule Formulas

Constraints are rules that are declared once and then maintained by the system. Characteristics of ontology txos or relationships may be constrained by equations and inequalities.

Changes requested by users or the system which would cause the constraint to no longer be met would be blocked by the system and cause a to do list entry or a problem entry.

During calculations on the tree or summarizations of relationships, constraints may be used to, including but not limited to: force values, to nullify a characteristic, to remove an relationship or txo from inclusion or consideration, etc. The constraints will not be allowed to stop a calculation during a summarization or tree formation process for mapping.

Constraints may be either one-way (using single-direction data propagation) or multi-way (where data propagation occurs in both directions).

Fxxt Based

Fxxt based equality or inequality rule formulas are applied on the relationships as mentioned, but note that depending upon the fxxt chosen, the relationships may apply in different directions depending upon how the Descendant Trees are formed. In different fxxts a constraint would apply to different sets of children.

Fxxt Specified

Constraint equality or inequality formulas for relationships may be specified on the relationships by infxtypx globally, by scopx, or on a relationship directly (single relationship specific), by relationship scopx or by relationship in Fxxt Specifications on a specific fxxt calculation step of the Fxxt Specification or globally for the fxxt.

Constraint equality or inequality formulas for txos may be specified on the txos by infxtypx globally, by scopx, on a cnxpts (or in some cases, txos) directly (single cnxpt (txo) specific), by scopx or infxtypx in Fxxt Specifications on a specific fxxt calculation step of the Fxxt Specification or globally for the fxxt.

Operators Using Iterators on Objects

Iterators provide access and traversal control over a collection of objects.

Iterative Modeling Rule Formula for Txo Oriented Calculations

The system provides for iterator formulas on cnxpts (or in some cases, txos) such as:

- sum zzz characteristic value of all children by relationship xxx
- form a sum of zzz characteristic value of all children by relationship xxx other than children by relationship yyy.
- apply formula fff to characteristic aaa, bbb, and ccc values of all children by relationship xxx other than children by relationship yyy.
- characteristic value ttt is result of formula fff on aaa, bbb, and ccc characteristics of info-item in child roles for relationships of (scopx and infxtypx) ttt.
- characteristic value ttt is result of formula fff on aaa, bbb, and ccc characteristics of all of its children by relationships zzz, yyy, xxx, and etc.
- characteristic value ttt is result of formula fff on aaa, bbb, and ccc characteristics of parent info-item by relationships zzz or yyy or xxx or etc.
- characteristic value ttt is result of formula fff on aaa, bbb, and ccc characteristics of outbound relationships of (scopx and infxtypx) zzz, yyy, xxx, and etc.
- mm characteristic ttt, an object mmm, is formed by listing all info-items within the sub-tree of info-item mm which are of infxtypx xxx, etc.
- mm characteristic ttt, an object mmm, is formed by listing all info-items on the path to the root of the tree from mm which are of infxtypxs xxx, etc.
- characteristic value ttt is the result of formula fff on the object mmm which is also a characteristic.

Iterative Modeling Rules for Relationship Oriented Calculations

The system provides for iterative modeling rule formulas on relationships such as:

- relationship weight of relationship is result of formula fff on aaa, bbb, and ccc characteristics of txo in child role.
- relationship characteristic value ttt is result of formula fff on aaa, bbb, and ccc characteristics of txo in child role.
- relationship weight of relationship is result of formula fff on aaa, bbb, and ccc characteristics of txo in child role and all of its children by relationship zzz.
- relationship characteristic value ttt is result of formula fff on aaa, bbb, and ccc characteristics of txo in parent role.
- relationship weight is result of formula fff on aaa, bbb, and ccc characteristics of relationship.
- relationship characteristic, an object mmm, is formed by listing all children of infxtypx xxx within the sub-tree of the relationship.
- relationship characteristic ddd, a value, is the result of formula fff on the object mmm which is also a characteristic of the relationship.

Naming

As used herein, the term "name" refers generally to zero or more labels for an info-item. Names act as labels for human consumption and can be either textual strings of characters or a reference to some non-textual representation (for example, an icon, a sound clip, an animation clip).

Names exist in all shapes and forms: as formal names, symbolic names, nicknames, pet names, everyday names, login names, etc. An internal ID, present for each info-item, is not considered a name.

Infxtypx may be specified for names, including but not limited to: base name (basename) (also the default infxtypx); display name (dispname); sort name to be used as sort key (sortname); standard name; formal name; symbolic name; nickname; audio name; icon. Default rules apply for use of other infxtypxd names where a base name, display name, or sort name is absent. Other application-specific name infxtypxs may be specified. In one embodiment, zero or more names of each infxtypx may be specified for an info-item.

Names may be marked as invisible or may be associated with an access control list (ACL) for controlling visibility.

Where names must serve as identity indicators, weights are imparted based upon the infxtypx of a name used for matching, or by fxxt specifications. Names may be voted upon, and vote weights are also used for matching and relevance. Weights so imparted are summarized by an algorithm which fairly states the weight so that no bias is created when a multitude of names exist for any given info-item.

In one embodiment, names are held in hierarchical structures, where at the root is the base name, if one exists, which has a string representation. A name hierarchy is also a container for any number of alternate forms (known as name variants) that may be specified for use in various contexts. Name variants may be the root of subtrees in the hierarchy. Names in the hierarchy that serve as the root of a tree or subtree represent the group of name variants below them. Position in the hierarchy affects the weighting of the name when used in matching, with base names receiving a significantly higher weight than those within the subtree. The alternate forms of a name may be, including but not limited to: string values; references to resources; representations such as icons or sound clips to be referenced as name variants. Base names and name variants can be given a scopx in which they are valid. In one embodiment, practical limits are imposed to constrain the size and depth of name hierarchies.

Txo Names

Normally tpxs have explicit names, since that makes them easier to talk about. However, tpxs don't always have names: goals need not be named, confidential and unpublishable tpxs need not have a visible name, tpxs may not have a name in every scopx.

The ability to be able to specify more than one txo name can be used to name tpx within different scopxs, such as language, style, domain, geographical area, historical period, etc. The scopx mechanism allows for the case of homonyms (where a single word is used to refer to two or more different ttxs).

In one embodiment, base names within the same scopx need not be unique.

Dxo Names

A dxo can have a name or more than one name.

In one embodiment, dxos have explicit user given names, since that makes them easier to talk about. However, dxos don't always have names: A simple cross reference, such as a hyperlink (more generally than mere "alias-hyperlink dxo") ("see URL . . . ") is considered to be a link dxo that has no (explicit) name.

Name Variant

As used herein, the term "name variant" refers generally to an alternative form of a name, optimized for a particular computational purpose, such as sorting or display or use in localization for a different language.

Relationship Names

Relationships may be named. As a default, the infxtypx of an association is used for its relationship name. The relationship does not directly have this name assigned. The scopx of a relationship is used as a qualifier of the display name as a default. Simple tpx cross references are considered to be a link that has no explicit name.

Bidirectional Association Names

As used herein, the term "bidirectional name" refers generally to a name for an association derived from the association infxtypx and scopx, and used to label or express the relationship in either direction and for each role.

Directed Association Names

As used herein, the term "directed name" refers generally to a name for an association derived from the association infxtypx and scopx. For describing the endpoints, the role infxtypx of the 'from' role is appended when describing the 'from' ttx, or the role infxtypx of the 'to' role is appended when describing the 'to' ttx. So the "employs" association with the role types "employer" and "employee" should have a name "employed by" which is in the scopx of "employee".

Neighborhood

As used herein, the term "neighborhood" refers generally to a cognitive area of a CMM and thus includes the ttxs therein, which is near, in some semantic sense, an area or ttx that is under consideration, but does not necessarily include the ttx under consideration.

In addition, when used in the context of a CMMDB, an area of a virtual mapping and thus including the cnxpts therein, which is near, in some sense as defined by the user, an area or cnxpt that is under consideration, but does not necessarily include the cnxpt under consideration itself.

Occurrence

As used herein, the term "occurrence" refers to an information resource or another object or entity of some type that is relevant to the description of a ttx, trxrt, purxpt, or other info-item, and is related by an occurrence relationship to the cnxpt, trxrt, purxpt, or other txo representing the info-item.

Ontology

As used herein, the term "ontology" refers to a data structure of information where 'nodes' (here, 'txos') may be linked by 'edges' (here, 'relationships') to represent an N-dimensional knowledge domain and information regarding it.

Because ontologies do more than just control a vocabulary, they are thought of as knowledge representations. The oft-quoted definition of ontology is "the specification of one's conceptualization of a knowledge domain."

In one embodiment, the CMMDB is an ontology used to store the various categorizations in their various fxxts. Ontology nodes of this ontology may represent, including, but not limited to: txos, dxos, and the specializations of each. Ontology edges may represent, including, but not limited to: relationships between txos, relationships between dxos, relationships between txos and dxos, and the specializations of each such relationship.

Outreach

As used herein, the term "outreach" refers to connecting to others by using the system to send out, including but not limited to: emails, registration offers, social network invitations, contest invitations. Incentivize Interaction The system must increase the number of users and must increase the proportion of use by users. The system will use viral marketing approaches to provide an ability for user to reach out appropriately, including, but not limited to:

- Alert potential users that an information resource that was written by a person with their name is being added to the CMMDB.
- User sharing value with others: allow user to send link, tour, information resource, etc. to others
- User creating value by increased opportunity for others: allow posting to get connection with others, to obtain or to provide something.

Patent Preparation

As used herein, the term "patent preparation" refers to the development of a mere idea into a patent application, including but not limited to: the development of the idea, its productization and commercialization, preparation of its patent application, fund raising. The effort may be eased by system staff that are licensed as patent agents, and may be paid by investments from the contributors or others wishing to share in the ownership.

Path

As used herein, the term "path" refers to the ordered set of visits made by a user to ttxs in, including but not limited to: a navigation of a visualization, a reviewing of a result set, a review of an Area of Consideration or interest.

Placing

As used herein, the term "placing" refers to the creation of a ttx by pointing to an unoccupied location on a visualization and stating that the ttx should exist at that location. "Placing" also refers to the creation of a goal by pointing to an unoccupied location on a visualization and stating that the user believes that the ttx he is thinking about and which is the goal should be near that location or within the category.

Prediction

As used herein, the term "prediction" refers to the ability to determine a value that a user will find useful as an indicator of the strength, timing, probability, value, or some other relevant quantitative statement about the way things will happen in the future, or a probability of an outcome.

Here, prediction may result from, including but not limited to: a model or analytic, or a summarization of user inputs, or an analysis of a forest produced from a fxxt specification or the map resulting from it.

When the forest is analyzed, the prediction may stem from the structure forming the trees or the maps, or it may be based upon that structure but use data separate from the data used to form the trees or the maps. For instance, the prediction may be based upon the size of a display object after the formation of the map, or it may be based upon data not used to form the forest or the map but summarized or viewed in a certain way because of the structure of the map. An example of the former is the prediction of the gestational ordering of technologies, and an example of the latter is the prediction of value of a technology based upon the position of the technology plus its suitability for an application of technology where the added data is the strength of connections to appcepts from the leaf tcepts.

Predictions can be inherited, to some degree, from the predictions of the context where a cnxpt exists in a fxxt. This implies that a prediction for a cnxpt may be different for different fxxts because the context is different in a second fxxt. This provides a technique for determining an average or weighted average for the prediction based upon multi-fxxted analysis—the analysis of multiple fxxt specifications. To calculate the weighted average, the fxxts used for a basis are selected and given a weighting coefficient and the total is summed and normalized. More specific algorithms are discussed below.

Predictive Intelligence

As used herein, the term "predictive intelligence" refers to the ability to predict the future presence of a tcept. A system is more intelligent than another system if in a given time interval it can better predict if and when a tcept will appear or other related metrics such as whether more purchases of one product will be made than another. A group can then be said to exhibit collective intelligence if it can more accurately predict than the average of the members working individually. Prediction based upon a map of ttxs and true Wisdom of Crowds yields a 'collective best guess' of each technology horizon that evokes further opinion and refinement of near in dates and values as time passes:

- between vast crowds, avoiding direct confrontation of those with opposing views, and yielding 'best available basis' predictions and forecasts;
- soliciting massive numbers of expert and lay opinions on a particular ttx, providing coordinated group interaction without face-to-face meetings;
- huge numbers of minor but cumulatively important refinements and improvement in predictions and forecasts;
- based upon assessments about technologies that are only a glimmer in someone's eye can occur;
- stretching of the imagination of users, beginning with tracking of abstract, 'crazy', or previously unknown ttxs from an early point, vetting them, and managing an iterative, collaborative process to yield continuous refinement, detailing, and categorization toward improvement of predictions.

Predictor

As used herein, the term "predictor" refers to a weighted summarization of modeling formula results for a fxxt.

Prediction of Gestation Period

As used herein, the term "gestation prediction" or "prediction of fruition" refers to the calculation of how and when some element of "the" future will, in fact, materialize, by calculating for a target tcept as a basis, including but not limited to: when the most recent productized predecessor of a predecessor tcept became real by when a product utilizing that tcept was delivered or when that tcept was used in production; what the patent status is for a predecessor or target tcept; what the research status is for a predecessor or target tcept; what the rate of innovation has been for the incremental innovations prior to and in the ancestry of the target tcept, and generating a timeline for the timing of gestations of the target and the predecessors between the known productized predecessor and the target tcept.

Accurate assessments of the probability that a ttx will become real are developed through teasing out predictors of a ttx's fruition and summarizing those predictors to a series of probabilities for timeframes, resulting in a best available overall prediction of the status of each tcept based upon a mass incremental characterization;

The nature or description of tcepts are not conjured by the mapping system any more than oil is generated by an oil field mapping system.

Prediction of gestation extends to prediction state of a tcept or the satisfaction level of an Appcept by, including but not limited to: predicting the state of a complex environment by predicting the inception or state of its components; predicting the state of the components of a complex environment by incremental extrapolation from predictions of its predecessors or from requirements as seen from successors.

Prediction by Space

As used herein, the term "prediction by space" refers to the calculation of value by space consumed on a map of tcepts. Space taken is related to innovation that has taken place in each area of technology, up to the horizon shown, or can be based upon, including but not limited to: interest shown, known investment made, market size per past product sales, predictions of satisfaction of appcepts, present market size according to current values for sales (market demand) of appcepts, future market size by estimates of demand for appcepts by planning horizon. The proportion of space allotted to a tcept, in specific fxxts, can be based upon, including but not limited to: value, interest shown, how well one tcept satisfies an appcept relative to other candidates, stage of gestation or stage of or other metrics. The resulting size for a tcept can be used as a basis for predicting, including but not limited to: future market demand, investment value, specific tcept future value, when a projection is available for the overall demand, funds available for investment, or of a metric such as GDP. The calculation is straight forward, where the proportion of space actually occupied by a tcept is multiplied by the projected metric for the total to be used. Roll-up is straightforward, by the ttx categories used in the fxxt.

The calculations are akin to those used to predict value of oil field prospects.

The calculation of predictions by space may require turning off or customization of the fxxt roll-up and positioning heuristics below.

Prediction of Satisfaction

As used herein, the term "prediction of satisfaction" refers to the calculation of the likelihood that a tcept will actually satisfy/solve an appcept in a certain timeframe from Modal Logic possibility, probability, and necessity estimates as used to determine if a technology horizon will contain certain or other tcepts. The satisfaction predictions are used to generate weighted relationships used for later calculations of tcept display size relative to other candidates where the display size is to represent market share for a tcept based upon appcept market demand.

The satisfaction predictions may be generated from imputed suitability association in combination with user input data stating that a roadblock or a gap exists affecting the tcept, or that a value strength should be applied during the use of an appcept's value to determine the tcepts value, and interest data collected tending to elevate the value.

Prediction of Innovation Gap

As used herein, the term "Prediction of Innovation Gap" refers to the identifying of technological gaps to allow more pointed inspiration toward entrepreneurial activity, where a tcept is unavailable to fill the requirements of an appcept. Gaps can also be stated by users manifesting a belief that the tcept will not fulfill the requirements of the application for a specific reason.

Prediction of Innovation Gap by TPL

TPL methods and suggestion generation methods provide additional predictors for gap prediction. A lack of TPL or TRIZ method suggestions suggest a need for more innovation and thus specific gap areas. TRIZ 'Laws of Technical Systems Evolution' are methodologies also useful to predict how much innovation is not yet completed in a technical area.

Prediction of Tcept Roadblock

As used herein, the term "Prediction of Tcept Roadblock" refers to the identifying of tcepts failing to meet the requirements of an appcept even though anticipated. The roadblock may be stated by a user to manifest a belief that a tcept may not occur until a problem is solved, and the roadblock may be placed between any two tcepts, one or more of which have not come to fruition, so that the roadblock affecting the fulfillment of an appcept may be affected by a roadblock that is not connected to it but is connected to a predecessor technology.

Prediction of Value

As used herein, the term "prediction of value" refers to the calculation of, including but not limited to: product demand, investment expected return on value; investment value at a point in time; market price per unit; market share; in future tcepts relying upon the 'best available data' of the refined list of innovative future tcepts (cnxpts), including but not limited to: interest shown; negotiated transfer value; investment buy in prices; relationships to other cnxpts; stated user estimates of their, including but not limited to: value, status, progress; and related information to form a basis for prediction.

Prediction of Features Available

As used herein, the term "prediction of features available" refers to the process of producing a timeframe based list of features implemented in a product or product line useful in, including but not limited to: comparing products over time; product line comparisons between competitors; satisfaction by a product line of: predicted market drivers, competing efforts, business objectives; and technology forecasts of expected future tcepts, by analyzing the commonality of cncpttrrts that two products or two tcepts share and the ways in which they vary at a point in time.

Prediction of Trends

As used herein, the term "prediction of trends" refers to the process of identifying and estimating predictions of technology trends regarding contextual areas of a complex environment based upon first predicting the state of being of related components. Example of trends include but are not limited to:

Environmental trends
Industry trends
Legal and regulatory trends
International trends
Technology development trends
Political developments
Economic conditions Prediction by Interest As used herein, the term "prediction by interest" refers to the process of estimating the value of a technology by evaluating the interest shown in, including but not limited to: each technology, in applications of that technology (cnxpt), in applications related to the technology's predecessor cnxpts and the technology's category cnxpts (may be multiple levels of categorization). Interest is shown in a cnxpt (technology, application, or other) by, including but not limited to: finding of, searching for, querying for, or retrieval of data either inside the category cnxpt or the cnxpt itself; use of the cnxpt in a model; ideating within a category cnxpt; improving a cnxpt; discussing or participating in a community related to a cnxpt; investing in a pool related to a cnxpt; comparisons of cnxpt traits with axpt requirements; development status of the cnxpt; progress of entities formed from the cnxpt; negotiated pricing from investment vehicles in transfers of entity shares between vehicles; presence of articles, documents, blog entries, patents, discussions regarding the cnxpt; investments in the cnxpt; game play regarding the cnxpt; seeking or advertising a product, service, or project related to a cnxpt.

Private Data

As used herein, the term "private data" refers to data including, but not limited to: attributes of cnxpts, txos, dxos, or data associated with relationships, which may be registered as private and stored confidentially and unpublishable for access only by the owner or specifically authorized others.

Querying

As used herein, the term "querying" refers to performance of one or more queries. If a query is requested and no context indicates that the query is attached to a goal or a cnxpt, then a new goal is created to provide the needed framework. Querying refers to the finding and retrieval of data either inside the CMM, hidden in any number of fields in the CMMDB, or outside the CMM. See also 'Goals'.

Query

As used herein, the term "query" refers to 1) a type of search that has the intention to find information (normally, but not limited to cnxpts that represent ttxs) that the user wishes to know about or to define a set of results that are relevant to a goal the user has in his/her mind; and/or 2) a request for information from a set of sources. In one embodiment, queries are used within goals explicitly or implicitly.

One purpose of querying is to find relevant information using a sophisticated structure of commands through parametric query operations. The result of the query depends upon the query type and query parameters used. Queries result in result sets containing rsxitems. Rsxitems may represent any info-item type or a string value with an identified source.

In one embodiment, queries may involve multiple steps. Each step would produce a result set or alter a previously existing result set. The result set is a central focus of managing query operations in that the result set often becomes the basis, referenced as a parameter, for a subsequent step. By querying, he user is seeking to add rsxitems obtained result set only if they are relevant, along some nature of relationship, even if merely generally germane. The user normally will cull out rsxitems which are not relevant.

Each of these steps is defined by its own query specification, and together the steps combine into a Query Script. Scripts which are still being created and which do not yet have a final result set defined may still be considered a Query Script.

In one embodiment, query scripts may be copied, altered, and shared with others.

Queries and query steps are represented by specializations of txos, each having a specification. Queries may be related to goals or cnxpts. In one embodiment, queries may be lists of labeled steps with named results, such that the query steps are to be executed in a specific order or by a specific algorithm.

Query steps may include but are not limited to: meta-search specification, analytic invocation, result set culling operation. Each command takes a set of parameters and produces a result set. The parameters and type of result set differ for each command Algorithms for interpreting query steps may be added to the system.

Query step commands may be entered interactively and recorded into a script as it is entered. Each entered command is normally executed interactively and the results returned. In one embodiment, query scripts may be edited in several ways. Query scripts may be re-executed, generating new versions of the result sets, and can be reused on existing result sets to find changes.

Queries are general because they have many possible steps and interpretation methods. Queries may request information from a database, a document management system, the internet via meta-searching, data abstraction sources, or the ontology itself. Query steps may perform Boolean arithmetic on result sets, and may perform automated culling on previously created result sets, or repeat previously performed culling on result sets.

Complex query script results may be based upon, including, but not limited to: prior goals and cnxpts; fxxt specifications; the multiple queries stated as applying to the goals/cnxpts; use of site/engine specific query mechanisms; meta search techniques; DeepWeb and Database techniques; use of a result sets, result set culling, and result set manipulation by 'result set arithmetic'; re-running of queries and culling; optimizing of queries where search engine subscription is available and payment rules are set; query partitioning for incremental innovation splitting; use of cluster analysis, cross citation analysis, within goals; and anticipatory site indexing and scraping.

In one embodiment, the user may invoke analytics as part of the query process, which then return newly created result sets (or item lists that can be used as rsxitems).

In one embodiment, the user may find information resources in any data or document management systems that can be accessed.

In one embodiment, the user may query against structured data (internal or external database data, including information resource metadata). The utility of this is that it provides a range of customizable database query options that is broad and flexible enough to allow users to produce query results that are useful and accurate.

Structured Query

As used herein, the term "structured query" refers to queries against structured data, including but not limited to: internal or external database data, deep web data, information resource metadata; resulting in result sets of data items which may or may not be useful as information resource or rsxitems referencing cnxpt.

DeepWeb Query

As used herein, the term "DeepWeb query" refers to queries databases accessible on the internet through a website, on a private system, or associated with the CMMDB. The objective is to find data matching the command criteria by use of one or more analytics.

The utility of DeepWeb and database searching is that it allows for a wealth of search structures for obtaining both ttx description and characteristic data, including, but not limited to: DeepWeb data related to ttxs, unstructured database searches, structured data searches with SQL-like (FROM and WHERE clauses) search requests returning information resources, topic map searching, private and custom knowledge base and database searches, and combinations thereof.

In one embodiment, the analytic may be within the system or external.

Unstructured Query

As used herein, the term "unstructured query" refers to queries against unstructured data, including but not limited to: documents, hyperlinked pages, web pages, cached web pages, including metadata regarding the documents or pages, by Boolean, keyword, natural language, or other forms of searches to form information resource rsxitems with locators.

Result Track

As used herein, the term "result track" or "track" refers to a saved execution of a query script.

In one embodiment, a saved "project file" is created for each query. A user is able to close their work on a query and re-open it at a later time, thus saving culling status on result sets and query states. Tracks may be retained for a specific execution of a script. If another execution occurs, the results of a saved track are protected by renaming the result sets as they are built and stored in the second track. For parameterized analytics, result set operations, and query commands, the parameters used will be stored in the history for each step of the script.

Reduction

As used herein, the term "reduction" refers to the extraction, or identification in place, of objects useful and appropriate to exist in a result, along with the calculations needed to determine how they will participate and where the objects will be in the result. Reduction is temporary and used to, including but not limited to: extract one scopx from the ontology; extract one fxxt from the ontology; extract one hierarchy for scene-graph production; reduce clutter in the visualization; extract a filtered result for display.

Registries→Rexo

As used herein, the term "registries" refers to opt-in or sign-up facilities of a website to allow users to, including but not limited to: gain access to community features and services; post specific interests, specific content, etc.; obtain benefits; participate in collaboration; manifest acceptance of an agreement; participate in contests; take on tasks. Users may register for a community or register by migration. The may opt-in or opt-out, and may control the access to them or set/pay for access to features of the community. They may migrate their communities progressing forward in phase and forward in tcept specificity. In one embodiment, users may not migrate back beyond the generality of the tcept that they joined initially. Registrations in the registry are represented by 'rexo' info-items.

For instance, a user in a ttx consortium initiation phase may define the parameters of the consortium for confidentiality, publishing, contract, etc.; a user building a team may post a position description; a user interested in raising investment may post a business plan; an inventor or agent may register an idea, description and claim for filling out a patent application; a founder may post a private or public placement memorandum; a company may post a product for sale; a writer may post content for sale; a company may post a 'brainstorming project meeting' for initiating a brainstorming event on a ttx, and users may register to be gain access to the brainstorming meeting and to be compensated if their results are of value; etc. Projects may be registered for research and analysis, for prior art searching, competitive analysis, games, course material control and access, shared access, corporate security and control over results of studies, etc.

Game registration may involve establishing a team, registering a handicap, such as year in school or prior scores, joining a team, putting up a contribution toward a 'purse', registration as spectator, etc.

Many registrations will require a fee. Some registrations may result in payment of compensation or discounts. Some registrations may have multi-level fees where, for instance, the outreach for a business plan may increase with a higher fee, or the number of tcepts a business plan is applied to may be higher where a higher fee is paid.

Registrations involving a ttx are represented by rexos, a specialization of a txo. Registrations can state what a user has or what they want, can be anonymous or signed.

Registries List
- Products
- Company
- Opportunity
- Need for product/solution/technology
- Award for novel idea (brainstorm award)
- Award for solution
- Tech spec
- Business plans
- Investor status/profile/interest area
- Expertise
- Availability to work in a field
- Formation of a community
- Ownership of an idea
- Formation of a consortium
- Request for a better expertise level
- Fund Raising—interest in funding
- Investment in tcept
- Projection/prediction
- 'Undisclosed Technology'
  - 'Subject of patent application'
  - Consortium Project by stage of growth
- Brainstorm contests
  - Most Incremental Additions contests
  - Triz contests
  - Highest valued new idea contest
  - Most hit new idea contest
  - Most hit idea monthly contest
- Mock investment (a bet on)

Interest Registries

A user may opt-in to various types of outreach/announcements/interest areas, including but not limited to:
- Interest against another registration
- Interest against a ttx
- Interest in feedback on: predictions, mock, real investments, tcept, ttx.
- For negotiations: Anonymous/Secure comments, notes, changes requested (negotiations)

A user may opt-into, including but not limited to:
- Fill out/submit government forms: patent, securities registrations, license, trademark (where not already online)
- Obtain services Reification As used herein, the term "reification" refers generally to the use of an info-item to support typing of relationships and txos, and is not given the meaning it would have in philosophy. In the TNMS, the act of reification is the act of making a txxo represent the tpx of another topic map construct in the same topic map, and thus also provides support for flexible typing. A txxo reifying a topic map construct actually represents the real-world thing represented by that topic map construct. Here, while the function of reification for attaching additional information to info-items is provided and useful in the best mode, the reification function is extended to allow for changing of infxtypxs dynamically. To reduce confusion, the txo info-item is retained for this purpose, and cnxpts may not reify other info-items.

In one embodiment, reification is utilized for the general purpose as specified in the TNMS of providing flexible typing of an info-item.

Relationships

As used herein, the term "relationship" refers to an edge in the CMMDB ontology between nodes of specific types, including, but not limited to txos.

Relationships can be asserted conforming to the following rules:
- The roles property shall contain two or more role items, in an ordered set.
- In one embodiment, a relationship may have no more than one 'from' role.
- In one embodiment, a relationship may have no more than one identifier for any role.

(This definition does not constrain the physical implementation, where a relationship can be implemented in a list of tuples, all under a single entity which occupies one role, or in a relational schema.) Associations are specific specializations of relationships.

Ttx Associations

As used herein, the term "association", "ttx relationship", or "cnxpt relationship" refers generally to a infxtypxd relationship representing an n-ary aggregate of cnxpts. Associations are the general form for the representation of relationships between cnxpts. That is, an association is a grouping of cnxpts with no implied direction or order, and there is no restriction on the number of cnxpts that can be grouped together.

An association can be assigned a infxtypx that specifies the nature of the relationship represented by the association. In addition, each cnxpt that participates in the association plays an infxtypxd role that specifies the way in which the cnxpt participates.

For example to describe the relationship between a person, "John Smith," and the company he works for, "ABC Limited," we would create an association infxtypxd by the cnxpt "Employment" and with role infxtypxs "Employee" (for the role played by "John Smith") and "Employer" (for the role played by "ABC Limited").

Associations may be directed, bi-directed, undirected, or symmetrical (optionally directed). They may have a weight associated with them, and may also have other characteristics such as, including but not limited to: infxtypxs, scopxs, values, or attached info-items such as trxrts and purxpts. In one embodiment, the objects at each endpoint of an association have roles as defined collectively by:

their infxtypx;

their scopx;

the endpoint of the relationship they are on;

the scopx of the relationship;

the infxtypx of the relationship; and the fxxt specification being used.

Associations are formal representations of relationships between ttxs, represented by ontology edges between cnxpts that assert the relationship between the two ttxs. Ttx associations are completely independent of whatever information resources may or may not exist or be considered as occurrences of those cnxpts.

Associations can be grouped according to infxtypx, including, but not limited to: categorical, affinitive, other. Ttx associations may have other characteristics such as, including but not limited to: values, scopxs, date applicable, timeframe applicable, horizon applicable, date created, creator, infxtypx.

Associations may be established manually by authorized users. In one embodiment, associations may be established by automated analysis, including but not limited to: semantic distance calculation, relevance analysis.

The Ttx association between two cnxpts can be asserted using an association that conforms to the rules for all relationships, and the following:

The type property shall be set to a Ttx Association type.

For categorical, classification, membership, or other hierarchy associations, the first roles (the 'from' role) will be the type or parent and the second (the 'to' role) is the instance or child. For affinitive associations, the role order for the first two roles has no meaning except in quasi-symmetrical affinitive associations (husband and wife are roles for 'married-to' relationship).

A fxxt may be specified for the Ttx association.

Scopx applies to this association type in the same way as it does to any other.

Association Roles

Each cnxpt that participates in an association has a corresponding association role which states the role played by the cnxpt in the association. In the case of the relationship Fred was born in Canada, expressed by the association between Fred and Canada, those roles might be person and birthplace. Roles may become acceptable endpoint types for an association type in a Fxxt Specification.

Association Direction

Associations may be directed, quasi-symmetrical, or symmetrical in the sense that in a symmetrical relationship the nature of the relationship is the same whichever way you look at it. Associations are symmetrical in the sense that the strength of the relationship is the same either way it is viewed. For example, a directed association is present where a cnxpt is in a category represented by a second cnxpt. An example of a symmetric association is collaboration, so that the corollary of "Lorca collaborated with de Falla" would (likely) be that "de Falla collaborated with Lorca". Sometimes the anchor roles in a symmetrical relationships are the same (in this case: collaborator and collaborator), sometimes they are different (as in the case of the husband and wife roles in a married-to quasi-symmetrical affinitive association).

Association Transitivity

Other association types, such as those that express class/instance and part/whole (meronymy/holonymy) relationships, are transitive: If we say that Lorca is a poet, and that a poet is a writer, we have implicitly said that Lorca is a writer. Similarly, by asserting that Granada is in Andalusia, and that Andalusia is in Spain, we have automatically asserted that Granada is in Spain and any Topic Map-aware search engine should be able to draw the necessary conclusions without the need for making the assertion explicitly.

Ttx Categorical, Classification, Membership, Hierarchy, Type-Instance, Class-Instance Relationships As used herein, the term "hierarchical relationship", "categorical association", "classification association", "membership association", or "hierarchical association" refer to a infxtypxd relationships each representing a parent child relationship, and collectively forming hierarchies. Hierarchical relationships are of several kinds, the primary ones being: genus/species and whole/part. When used to describe relationships between cnxpts here, the "hierarchical association" specialization is most accurate.

The classic rule for validity in hierarchical relationships may be stated as: "Terms are hierarchically related only if both are members of the same fundamental category (fxxt); that is, they represent entities, activities, agents, or properties, etc." Here, "subjective" hierarchies created by consensus building by votes and crowdsourcing cause this rule to be violated and the CMM is thus more adaptable.

Ttx categorical, classification, subsumption, membership, hierarchy, Type-Instance, and Class-Instance relationships may be established manually by authorized users.

Hierarchical—Broader/Narrower Term (BT/NT)

As used herein, the term "hierarchical—broader/narrower term", or "BT/NT" refer to a infxtypxd relationship expressing a hierarchical relationship based on levels of superordination and subordination, where the superordinate term represents a class or a whole and is labeled as the broader term (BT), and subordinate terms refer to its parts, or narrower aspects of the class (NT).

Broader Term (BT) and Narrower Term (NT) relationships are shown through hierarchies in classified tools and with Broader and Narrower Term codes in alphabetical tools.

Hierarchical—Partitive (Whole—Part)

As used herein, the term "hierarchical—Partitive", or "Whole—Part" refer to a infxtypxd relationship expressing a hierarchical relationship between tpxs of the same type, where 'the name of the part implies the name of the possessing whole in any context'. Here, the CMM is open to allow more partitive relationships, but ISO 2788 currently allows just four partitive cases: Systems and organs of the body Geographical location or containment—'is in', 'born in'

Discipline (or field of study)

Social structures

Ttx Type-Instance Association

In one embodiment, the type-instance association, stating that a ttx is an instance of another ttx, is asserted using a scopxd association between cnxpts. Instances may include 'Variant of a Technology' where the 'Class' is the ttx defining the tcept and the Variant tcept is the 'Instance'.

Cycles in this relationship are allowed, and should be interpreted to mean merely that different rationales exist for the inclusion of one ttx as represented by a cnxpt into a category as represented by another cnxpt, where one rationale conflicts with another.

The type-instance association is not transitive. That is, if B is an instance of the type A, and C is an instance of the type B, it does not follow that C is an instance of A.

Temporal Order Association

As used herein, the term "temporal order association" refers to an infxtypxd binary relationship between cnxpts that reflects a relationship based upon whether one cnxpt occurred or will occur after another cnxpts. Example: "steel furnaces occurred after copper smelting techniques".

Cause and Effect Association

As used herein, the term "cause and effect association" refers to an infxtypxd binary relationship between cnxpts that reflects a relationship based upon whether a ttx was the cause for another or effected another ttx. Example: "is propulsion of".

Ttx Citation (Cited-Citing) Associations

As used herein, the term "ttx citation association" or "ttx citation hierarchical association" refers to an infxtypxd binary relationship between cnxpts that represents the referencing or citation in a description of one ttx (the citing ttx) of the other ttx (the cited ttx as a whole) by specific referencing of the cnxpt's description (as a whole). A ttx citation association is a directed association, but not necessarily a reliable hierarchical association. Specializations of the ttx citation association provide for heightened accuracy based upon the nature of the citations and references and who created them. Ttx citation associations are given weights, depending upon the nature of the citation. Where a high weight is provided, the relationship is seen as more reliable as a hierarchical association, and is interpreted as a "ttx citation hierarchical association".

The reference may be in the form of a "ttx description content reference citation association". Any citation in a "ttx description content author-placed reference citation tag" found may only serve as a basis for a weaker association and thus are not to be considered as a basis for a hierarchical association, unless the user specifically states a very high weight.

In the general case, the cited ttx, or at least something seemingly related to it, must have been known by the author of the citing ttx description. Because an inference or presumption could be made that the cited ttx existed before the citing ttx, a "ttx citation association" representing that the cited ttx's cnxpt was relevant to the citing ttx's cnxpt is appropriate and relevant, and a "ttx citation hierarchical association" representing that the cited ttx's cnxpt was a predecessor (or category) of the citing ttx's cnxpt may be appropriate and relevant. Weights assigned are established by system parameters set and altered over time and the nature of the reference.

Ttx citation associations may be established manually by authorized users with restrictions.

The ttx citation association is not based upon any occurrence relationship. A different form of hierarchical association called an "imputed cnxpt citation association" is automatically created, prior to map generation, between cnxpts based upon citations between occurrence items.

Ttx Description Content Reference Citation Associations

As used herein, the term "ttx description content reference citation association" refers to an infxtypxd binary relationship between cnxpts that represents the referencing or citation in a description of one ttx (the citing ttx) of specific content in another ttx's cnxpt's description by specific citation. It is a specialization of a "ttx citation association".

The cited cnxpt description must have been known by the author of the citing ttx description. Because the cited ttx existed before the citing ttx, a "ttx description content reference citation association" representing that the cited ttx's cnxpt was a predecessor (or category) of the citing ttx's cnxpt is appropriate and relevant. Ttx description content reference citation associations are given substantially higher effective weights than other ttx citation associations. Weights assigned are established by system parameters set and altered over time and the nature of the reference.

Ttx description content reference citation associations may be established manually by authorized users only where a translated name is in the citing document because it would not be caught automatically.

Cnxpt Name Reference Citation Associations

As used herein, the term "cnxpt name reference citation association" refers to an infxtypxd binary relationship between cnxpts that represents the referencing or citation in a description of one ttx (the citing ttx) of the name of another ttx's cnxpt (the cited ttx) by specific use. It is a specialization of a "ttx citation association".

The cited ttx, or at least something seemingly related to it by common name, must have been known by the author of the citing ttx description. Because a presumption could be made that the cited ttx existed before the citing ttx, a "cnxpt name reference citation association" representing that the cited ttx's cnxpt was a predecessor (or category) of the citing ttx's cnxpt is appropriate and relevant. Cnxpt name reference citation associations are given medium weights. Weights assigned are established by system parameters set and altered over time and the nature of the

REFERENCE

Cnxpt name reference citation associations may be established manually by authorized users only where a translated name is in the citing document because it would not be caught automatically.

Ttx Description Content Later-Added Reference Citation Associations

As used herein, the term "ttx description content later-added reference citation association" refers to an infxtypxd binary relationship between cnxpts that represents the referencing or citation in a description of one ttx (the citing ttx) of specific content in another ttx's cnxpt's description by specific citation added later by an authorized user. It is a specialization of a "ttx citation association".

The cited cnxpt description might have been known by the author of the citing ttx description, but no inference can be made to that. Instead, only a weaker presumption, based upon a user's analysis and a manifestation of a belief, can be made to establish a "ttx description content reference citation association" representing that the cited ttx's cnxpt was a predecessor (or category) of the citing ttx's cnxpt is appropriate and relevant. Ttx description content reference citation associations are given slightly higher effective weights than a "cnxpt name reference citation association". Weights assigned are established by system parameters set and altered over time and the nature of the reference, but a user may state a higher weight.

Ttx description content reference citation associations may be established manually by authorized users only where a translated name is in the citing document because it would not be caught automatically.

Discontinuity in Innovation Association

As used herein, the term "discontinuity in innovation association" refers to an infxtypxd, directed, binary relationship between txpts that reflects a relationship based upon whether a tcept was the discontinuous successor for another tcept. Examples: "personal computers were the replacement technology for manual typewriters"; "digital electronic imaging has substituted for Daguerreotypes". In one embodiment, the discontinuity in innovation association refers to an infxtypxd, directed, ternary association between two txpts and one appcept that reflects a relationship based upon whether a tcept was the discontinuous successor for another tcept where addressing a need stated by an appcept. Examples: "personal computers were the replacement technology for manual typewriters for production of correspondence, creating broader market"; "digital electronic imaging has substituted for Daguerreotypes for family photography, as a substitute".

The nature of the discontinuity is an important attribute or trait of the discontinuity in innovation association, stating, including but not limited to: is the discontinuity a substitution, create a broader market, affects competitive competences.

Technological innovation is not entirely incremental. Disruptive tcepts may substitute for a certain appcept, may solve a wider requirement than for a specific appcept, and may enhance or destroy the competence established firms have in an appcept family Periods of market continuity, during which innovation is incremental, and rates of innovation remain steady, and significant product or market changes are infrequent, may end abruptly, giving way to periods of discontinuity, where businesses transform or die, new businesses thrive, and major product and process changes occur.

Field of Study Association

As used herein, the term "Field of Study Association" refers to an infxtypxd binary relationship between cnxpts that reflects a relationship based upon whether a ttx is taught in a particular field of study that is described as another ttx. This is a directional association.

For example, 'computer programming techniques' are taught in engineering, mathematics, business, etc. This would illustrate that those three fields of study are related indirectly by the second level of a hierarchy consisting of a ttx called 'computer programming techniques'.

Instruments Association

As used herein, the term "Instruments association" refers to an infxtypxd binary relationship between cnxpts that reflects a relationship based upon whether a ttx was instrumental in producing another ttx. This relationship states that one ttx facilitates another. (teaching—overhead projectors).

Materials Association

As used herein, the term "materials Association" refers to an infxtypxd binary relationship between cnxpts that represent relationships based upon whether a ttx defined a material used in another. Materials Associations state that one ttx is used to construct another. Example: plastic film—transparencies.

Product of or By-product of Association

As used herein, the term "product of or by-product of Association" refers to an infxtypxd binary relationship between cnxpts that represent relationships based upon whether a ttx was a "product of" or "by-product of" another. This relationship states that one ttx is produced by another, hence requiring a parent-child direction.

Satisfies Requirements Association

As used herein, the term "Satisfies Requirements Association" refers to a weighted, scopxd, infxtypxd binary relationship between cnxpts that reflects a relationship based upon whether and the degree to which a tcept will satisfy requirements as stated for an appcept. This association states that a tcept can be used to solve the needed function for an appcept's purpose. The weight is a projection or an entered estimate of the ability to solve the requirements successfully relative to all other competitive tcepts. This association may be added manually or automatically based upon trait matching. It is directional.

Subsumption Associations

As used herein, the term "subsumption Association" refers to an infxtypxd binary relationship between cnxpts that represent relationships based upon whether a ttx is more specific and included in the parent ttx (subsumption, categorization, classification). This is a general form where a more specific reasoning for a more specific scopx and infxtypx of relationship may not be available. This could be the case when a categorization from another source is being used directly. This is a directional relationship.

Document-Retrieval Definition of Subsumption Association

As used herein, the term "document-retrieval subsumption Association" refers to an infxtypxd binary relationship between cnxpts that represent relationships based upon whether a ttx is narrower than its parent according to the document-retrieval definition of 'broader-narrower':

"Ttx A is broader than ttx B whenever the following holds: in any inclusive search for A all items dealing with B should be found. Conversely B is narrower than A."

This is a directional relationship. This definition introduces subjectivity. Concrete hierarchical links are backed up by a majority count based on expert judgments or an analysis of search requests.

Extensional Definition of Subsumption Association

As used herein, the term "extensional subsumption Association" refers to an infxtypxd binary relationship between cnxpts that represent relationships based upon whether a ttx is narrower than its parent according to "logical considerations". These occur when other labels for 'broader-narrower' such as "genus-species" or "is kind of" (for 'broader') are used to characterize the generic hierarchy relation. This is a directional relationship.

Intensional Definition of Subsumption Association

As used herein, the term "intensional subsumption Association" refers to an infxtypxd binary relationship between cnxpts that represent relationships based upon whether a ttx contains all the attribute values of the broader ttx plus at least one in addition.

This is based upon the German standard formulation of generic subsumption based on the representation of ttxs as sets of property or attribute values. This is a directional relationship.

Subclass Hierarchical Associations

Supertype-Subtype Hierarchical Association

As used herein, the term "ttx supertype-subtype relationship" refers to an infxtypxd binary relationship between cnxpts that represent a relationship between a more general ttx (the supertype) and a specialization of that ttx (the subtype) within a scopx and fxxt. This relationship states that a ttx is a subclass or a superclass of another ttx. This is a directional relationship. Example: Instance of: John F. Kennedy is an instance of Person, which implies that he is also an instance of Living Thing. The converse is not necessarily true. A type may have any number of subtypes and supertypes. The supertype-subtype relationship is transitive, which means that if B is a subtype of A, and C a subtype of B, C is also a subtype of A. Example of 'is subclass of': Pope is subclass of Person, and Person is a subclass of Living Thing, etc.

Cycles in each of these relationships are allowed, and (contrary to TNMS) must not be interpreted to mean that the sets of ttxs included in the relationships are in any way the same.

Category-Member Hierarchical Association

As used herein, the term "ttx category-member hierarchical association" refers to an infxtypxd binary relationship between cnxpts that represent a relationship between a category of ttxs (a categorization or classification) and a member of that category (another classification or the member ttx) within a scopx and fxxt. The converse is not necessarily true. A category may have any number of members and supertypes. Example of 'is component of': CPU is a component of Computer, etc. (express part-to-whole relations)

The category-member relationship is transitive, which means that if B is a member of A, and C a member of B, C is also a member of A albeit indirectly through B. The category-member-subtype relationship is also transitive, such that if B is the member of A, it follows that every subtype of B is also a member of A. Example of 'is member of': Braun is member of Government of Germany, etc.

Predecessor-Successor Hierarchical Associations

As used herein, the term "ttx predecessor-successor hierarchical association" refers to an infxtypxd binary relationship between cnxpts that represent a relationship, within a scopx and fxxt, between a pre-existing ttx (as in prior art for tcepts) and a later defined ttx whether or not stemming from of that pre-existing ttx. A ttx may have any number of predecessors or successors.

Other Subclass—Like Associations

Ttxs may participate in associations which are similar to supertype-subtypes including, but not limited to: General 'is a' classifications; Instance (class/instance); Generic (subclass/superclass); Children—Parents, implies Cis mother of implies 'is parent of', 'is parent of' implies 'is relative of') and a number of others.

Custom Hierarchical associations

As used herein, the term "custom hierarchical association" refers to an infxtypxd binary relationship between cnxpts that represent relationships based upon whether a ttx is somehow related to the parent (defined by some added function). This is a directional relationship.

User Suggested—Ttx Placement Location Associations

As used herein, the term "user suggested—ttx placement location association" refers to an infxtypxd binary relationship between cnxpts that represent relationships based upon where a ttx was created by or recategorized by a user by placement within the indicated parent cnxpt as representing the parent ttx, suggesting that the parent cnxpt should also be a category if not already one. This is a directional relationship and is a vote. Additional user suggested—ttx placement location associations may be established by an authorized user when the user believes that the cnxpt should be located within a different category.

User Suggested—Goal Establishment Location Association

As used herein, the term "user suggested—goal establishment location association" refers to an infxtypxd binary relationship between cnxpts that represent relationships based upon where a goal was created or recategorized as within the parent. This is a directional relationship and is a vote. User suggested—goal establishment location associations may be established by authorized users when the user begins a goal by placing the goal initially in an indicated ttx represented by a cnxpt, suggesting that the cnxpt should also be a category if not already one. The goal process may result in the cnxpt that is created being located in a different category, and thus this relationship may move. In one embodiment, the relationship with the cnxpt category representing the original ttx (location) is also retained but given a very low weight.

Syntactically Suggested Associations

As used herein, the term "syntactically suggested association" refers to an infxtypxd binary relationship between cnxpts that represent relationships based upon a syntax deconstruction or interpretation mle or heuristic. These associations may be directional, hierarchical, or affinitive. Syntactically suggested associations may be imputed based upon syntax rules or syntactic relationships suggesting hierarchical relationships, or may be established by an authorized user when the user believes that the syntax suggests an association.

Affinitive (Related Terms: RTs) Relationships

As used herein, the term "affinitive associations" or "RTs" refers to an infxtypxd binary relationships between cnxpts that represent one of a class of non-hierarchical relationships between ttxs. Affinitive associations are not necessarily directional in nature. At one extreme, an RT may represent nothing more than an extremely vague 'See-also' connection between two ttxs. At the other extreme, it would represent absolute and proven equivalence of the two ttxs, within a constraint of a scopx or fxxt. Affinitive associations are NOT considered directed relationships even if they are set to be for some other purpose.

Ttx affinitive associations may have other characteristics such as, including but not limited to: values, scopxs, date applicable, timeframe applicable, horizon applicable, date created, creator, infxtypx.

Affinitive associations state a close or significant semantic relationship between ttxs but one that is not hierarchical and is probably not a statement of absolute equivalence (synonymous). Where two ttxs are equivalent in all scopxs, they are merged, thus an affinitive association will not continue to exist where absolute equivalence is seen by identity.

The utility of utilizing non-hierarchical relationships is that they can provide placement guidance in 3D hierarchical displays of the ontology information. They also provide information for forming fxxts.

Functionally Related Relationship

As used herein, the term "functionally related relationship" refers to an infxtypxd binary relationship between cnxpts that reflect relationships based upon whether a ttx is somehow Functionally Related another ttx. The way it is related is set as a descriptive attribute that cannot be expressed for the other types of relationships.

Concurrent Relationship

As used herein, the term "concurrent relationship" refers generally to infxtypxd binary relationships between cnxpts based upon whether a ttx was concurrent with another or that two ttxs occur at the same time, or between purxpts based upon whether a purlieu was or will be concurrent with another or that two purlieus occur at the same time.

Delay Relationship

As used herein, the term "delay relationship" refers generally to an infxtypxd binary directed relationship stating that a delay must exist between two cnxpts.

Roadblock Relationship

As used herein, the term "roadblock relationship" refers generally to an infxtypxd binary directed relationship stating that a tcept cannot yet stem from another tcept because of an unsolved technical problem. The roadblock relationship will be 'released' when the problem is stated to be solved, but the roadblock relationship will be retained for historical analysis.

Gap Relationship

As used herein, the term "gap relationship" refers generally to an infxtypxd binary directed relationship stating that a requirement of an appcept is not yet met by any tcept within a context cnxpt or is more specifically not met by a specific tcept. A stated reason should be attached to the relationship.

Value Strength Relationship

As used herein, the term "value strength relationship" refers generally to an infxtypxd binary directed relationship stating that a value established on one 'from' cnxpt may be applied only to the degree set by the strength of the relationship during the use of the 'from' cnxpt's value to determine the derived value for the 'to' cnxpt.

Coordination Relationship

As used herein, the term "coordination relationship" refers generally to infxtypxd binary relationships between cnxpts based upon whether some coordination such as (sibling: a son—a daughter) or (proton—neutron—electron) exist but where a hierarchy is not present.

Custom Affinitive association

As used herein, the term "custom affinitive association" refers generally to scopxd, infxtypxd binary relationships between cnxpts based upon whether a ttx is subjectively similar or strongly related with another ttx, according to a user. This is a subjective vote toward existence of similarity. A user may add a coefficient to increase or decrease the default weight according to their sense of the strength of similarity, so far as the user is authorized to set. Custom affinitive associations may be established manually by authorized users, or by automated procedures, including but not limited to: analytics. Custom affinitive associations are not specific to fxxts, but may be scopxd based upon a user request or, if discernable, by the scopx embodied by the fxxt being visualized Custom Equivalence Relationship As used herein, the term "custom equivalence relationship" refers generally to scopxd, infxtypxd binary relationships between cnxpts based upon whether a ttx is subjectively equivalent to another ttx, according to a user. This is a subjective vote toward equivalence. This is equivalent to an absolute maximum weighted custom affinitive association, so far as the user is authorized to set. Custom equivalence relationships may be established manually by authorized users or by automated procedures, including but not limited to: analytics. Custom equivalence relationships are not specific to fxxts, but may be scopxd based upon a user request or, if discernable, by the scopx embodied by the fxxt being visualized.

Query in Common Affinitive Associations

As used herein, the term "query in common affinitive association" refers generally to scopxd, directed, infxtypxd binary relationships between cnxpts based upon whether a query used to define one cnxpt has been used to define a second cnxpt. This relationship is not dependent upon the relevance of result set items directly, and is thus a low weighted relationship. The relevance is taken into consideration by occurrence relationships. This is a subjective vote toward equivalence. Query in common affinitive associations are not specific to fxxts or scopxs.

Custom Negative Affinitive Associations

As used herein, the term "custom negative affinitive association" refers generally to scopxd, infxtypxd binary relationships between cnxpts based upon whether a ttx is subjectively dissimilar to another ttx, according to a user. This is a subjective vote toward non-existence of similarity. Custom negative affinitive associations may be established manually by authorized users. A user may add a coefficient to increase or decrease the default weight according to their sense of the strength of dissimilarity, so far as the user is authorized to set. Custom negative affinitive associations are not specific to fxxts, but may be scopxd based upon a user request or, if discernable, by the scopx embodied by the fxxt being visualized Genetic Affinitive Associations As used herein, the term "genetic affinitive association" refers generally to infxtypxd binary relationships between cnxpts based upon whether a ttx containing the same genetic structure but not specifying the actual hierarchical association with another ttx.

Other Affinitive Relationships

As used herein, the term "other affinitive relationship" refers generally to scopxd, infxtypxd binary relationships between cnxpts based upon whether a ttx is subjectively related to another ttx in a particular way, according to a user. This is a subjective vote toward existence of the relationship. A weight based upon the type of relationship is set for the relationship, and a user may add a coefficient to increase or decrease the weight according to their sense of the strength of similarity, so far as the user is authorized to set. These relationships may be established manually by authorized users or by automated procedures, including but not limited to: analytics.

Other Affinitive Relationships include but are not limited to:

- a. Synonymy—"is synonym of" (this could even be used to implement redirects)
- b. Hyperlink—"see also"
- c. Comment
- d. Lexical Variant
- e. Quasi-synonyms
- f. Negative—is not like
- g. Negative—is opposite of
- h. Is in same category as
  - Terms with overlapping meanings (e.g. Ships and Boats)
- i. Is in different category from
  - The whole-part affinitive relationship (e.g. Harbors—Wharfs)
  - A discipline or field of study versus the objects or phenomena studied (e.g. Ornithology—Birds)
  - An operation or process versus the agent or instrument (e.g. Photocopying—Photocopier)
  - An occupation versus the person in the occupation (e.g. Nursing—Nurse)
  - An action versus the product of the action (e.g. Photocopying—Photocopies)
  - An action versus its patient (e.g. Food inspection—Food)
  - Ttxs versus causal dependence (e.g. Explosives—Explosions)
  - A thing or action versus its counter-agent (e.g. Head injuries—Helmets)
  - Raw material versus product (e.g. Iron ore—Steel)
  - An action versus an associated property (e.g. Food inspection—Food safety)
  - A ttx versus its opposite (antonym not treated as a quasi-synonym) (e.g. Imports—Exports)

j. Special Relationships exist between Information Resources linked to ttxs
k. Ttxs are Contiguous
l. Definitional affinitive relationships
m. Meaning overlap affinitive relationships
n. Ttxs share Combined ideas
o. Unspecified, but affinitive relationships
p. Scope issues remain, but one ttx describes a wider meaning than another ttx Intellectual Property Relationships Intellectual Property Reads on Relationship As used herein, the term "intellectual property reads on relationship" refers to an infxtypxd binary relationship between irxts, one usually representing a patent or patent application, that states that a technology feature (specific claim) reads on a prior art product or reference. It is anticipated by that product or reference.

Such a statement (and the relationship caused by it) may be used by an examiner or patent professional as a first step toward understanding the true nature of the real read on relationship, and would be useful for tracking workflow during that checking process and as a historical record of the work that went into the checking process. It can also be used for patentability opinion conversations and opinion formation workflows.

Non-professionals may add such relationships. Authors of relationships may make additional statements or otherwise improve on the relationship description and attribute values. Votes about a relationship are actually relationships themselves, and thus a comment may be changed by its author after a notice (alert) stating that a change/improvement occurred.

Each such relationship will have attributes that go into some detail regarding the exact nature of the relationship:

Generality: These relationships can be somewhat general or very specific. A general statement is one where the features of an invention seems to overlap with the feature set of another invention. A very specific statement would be where a specific patent claim for a technology reads on a prior art product feature or a specific description of a feature in a reference information resource. A screening search will show general relationships while patentability opinions and patent office actions must be much more specific.

Legality: This type of relationship can be based upon a legal ruling (by the patent office or by a court).

Alternatively, the relationship can be simply a sense that the read on relationship 'seems' to exist as part of a patentability opinion. A trier of fact legally must identify the elements of the claims, determine their meaning in light of the specification and prosecution history, and identify corresponding elements disclosed in the allegedly anticipating reference.

Timing: The dates involved in these relationships are very important and may lead to legal decisions regarding whether the relationship is real 'in law' or simply real or not. For instance, depending upon the date, the direction of the relationship might change and the meaning of the relationship might be used in just the reverse legally.

Novelty Predecessor Relationship

As used herein, the term "novelty predecessor relationship" refers to an infxtypxd binary relationship between irxts, one usually representing a patent or patent application, that states that a specific feature of an invention is 'similar' to a specific feature of a prior invention and thus the first feature is not novel. Novelty is defined in US Patent Law Section 102.

Obviousness Predecessor Relationship

As used herein, the term "obviousness predecessor relationship" refers to an infxtypxd binary relationship between irxts, one usually representing a patent or patent application, that states that a specific feature of an invention is 'similar, other than a small specific facet' to a specific feature of a prior invention and thus the former feature is obvious.

Possible Prior Art Relationship

As used herein, the term "possible prior art relationship" refers to an infxtypxd binary relationship between irxts, one usually representing a patent or patent application, based upon whether an invention was invented later than its parent (parent is potential prior art). This is a directional relationship.

Independent Claim Irxt Relationship

As used herein, the term "independent claim irxt relationship" refers to an infxtypxd binary relationship between irxts that represent the relationships based upon one irxt being an independent claim of the other irxt. This is a directional relationship.

Dependent Claim Irxt Relationship

As used herein, the term "dependent claim irxt relationship" refers to an infxtypxd binary relationship between irxts that represent the relationship between an independent claim and a dependent claim. This is a directional relationship, and its order in the set of dependent claims of the independent claim is crucially important.

This is based upon the patent claim law and practice such that a dependent claim has an additional element beyond the claim it is dependent upon. In other words, the ttx contains all the attributes of the broader ttx plus at least one in addition.

Patent Classification Association

As used herein, the term "Patent Classification Association" refers to an infxtypxd binary relationship between cnxpts that represent the relationship between a ttx as defined by a patent (or application) and a patent classification index category as published or as indicated in the patent application or issued patent. A "Patent Classification Association" may also represent the relationship between the two ttxs as defined two patent classification index categories as published or as indicated in a patent application or issued patent.

This is a directional, hierarchical relationship. Each such relationship is marked with a scopx (or, in one embodiment, a fxxt) or a specific infxtypx to indicate the patent classification index.

Independent Claim Association

As used herein, the term "independent Claim Association" refers to an infxtypxd binary relationship between txpts that represent the relationships based upon one tcept being an independent claim of the other tcept. This is a directional, hierarchical relationship. This relationship is imputed from a "independent claim irxt relationship"

This is based upon the patent claim law and practice such that more than one independent claim may be claimed in a patent.

Dependent Claim Association

As used herein, the term "dependent Claim Association" refers to an infxtypxd binary relationship between txpts that represent the relationships based upon whether a tcept was based upon a dependent claim stemming from one of the claims that its parent could be read on. This is a directional relationship. This relationship is imputed from a "dependent claim irxt relationship"

This is based upon the patent claim law and practice such that a dependent claim has an additional element beyond the claim it is dependent upon. In other words, the ttx contains all the attributes of the broader ttx plus at least one in addition.

Derivative Work Association

As used herein, the term "Derivative Work Association" refers to an infxtypxd binary relationship between cnxpts that states that a technology was based upon technology known but not owned by the inventor at the time of his claimed inventorship.

Prior Art Predecessor Association

As used herein, the term "prior art predecessor association" refers to an infxtypxd binary relationship between txpts based upon whether a tcept was arguably invented later than its parent (parent is arguably or legally prior art). This is a directional association.

Occurrence Relationships

As used herein, the term "occurrence relationship" refers generally to a infxtypxd relationship connecting txo to a cnxpt, trxrt, purxpt, or other info-item indicating that the tpx represented by the txo is relevant to the information represented by the cnxpt, trxrt, purxpt, or other info-item. In one embodiment, a scopx of validity can be assigned to an occurrence relationship. The infxtypx assigned to an occurrence relationship is based upon the types of its endpoints. Ttx occurrence relationships may have other characteristics such as, including but not limited to: values, scopxs, date applicable, timeframe applicable, horizon applicable, date created, creator, infxtypx.

Occurrence relationships are not applicable only to external information resources here. The variety of relevant information tending to identify a ttx both needs to be considered and to be disciplined.

Subject Identifier Occurrence Relationships to Subject Locators as Indicators

As used herein, the term "subject identifier occurrence relationship" refers generally to a directed infxtypxd occurrence relationship from a cnxpt, trxrt, purxpt, or other info-item referencing a txo indicating that the tpx represented by the txo is relevant to and somewhat identifies the subject represented by the referencing info-item.

Subject Identifier Occurrence Relationships to Subject Locators as Indicators

Subject identifier occurrence relationships involving subject locators include but are not limited to: 'Patent Agent ID' where a referenced info-item is a USPTO ID subject locator txo, and the referencing info-item is an Individual txo; 'US Tax ID' where a referenced info-item is a US Tax ID subject locator txo, and the referencing info-item is an Organization txo or an Individual txo; 'US Patent' where a referenced info-item is a US Patent URI subject locator txo, and the referencing info-item is an cnxpt representing the technology defined in the patent. In each, the subject locator specified can be used automatically to determine where the source information can be found, and human interpretation is not needed to determine whether the content of the referenced txo is actually relevant to the second txo.

Subject Identifier Occurrence Relationships to Other Subject Indicators

Subject identifier occurrence relationships not involving subject locators include but are not limited to: 'analysis by young student' where a referenced info-item is a description subject indicator txo, and the referencing info-item is a txo; 'blog' where a referenced info-item is a blog community txo, and the referencing info-item is a txo. In each, human interaction is required to determine whether the content of the referenced txo is actually relevant to the second txo, and in each case the referenced txo is not a subject locator.

Collateral Information Resource Occurrence Relationship

As used herein, the term "collateral information resource occurrence relationship", a specialization of a "subject identifier occurrence relationship", refers generally to a directed infxtypxd occurrence relationship from a cnxpt, trxrt, purxpt, or other info-item referencing a irxt indicating that the information resource represented by the irxt is relevant to the referencing txo. Collateral information resource occurrence relationships include but are not limited to: 'Patent on a Technology' where a referenced info-item is a Patent irxt, and the referencing info-item is a txpt defining the tcept; 'Information Resource on a Technology' where a referenced info-item is an irxt, and the referencing info-item is a txpt defining the tcept.

Typed Txo Occurrence Relationships

As used herein, the term "typed txo occurrence relationship" refers generally to a infxtypxd occurrence relationship connecting a txo to another other info-item indicating that the tpx represented by the txo is relevant to the information represented by the info-item. Typed txo occurrence relationships include but are not limited to: 'Product of a Technology' where one endpoint is the txpt defining the tcept and the Product txo is the other; 'Inventor of a Technology' where one endpoint is the txpt defining the tcept and the Individual txo is the other; 'Inventor on a Patent' where one endpoint is the irxt for the patent and the Individual txo is the other; 'Assignee on a Patent' where one endpoint is the irxt for the patent and the Organization txo is the other; 'Employee of a Business' where one endpoint is the Organization txo for the business and the Individual txo is the other.

Several sub-types of the typed txo occurrence relationship include, but are not limited to: keywords, purlieu, or trait relationships.

Purlieu Relationships

As used herein, the term "purlieu relationship" refers to a directed infxtypxd binary relationship between cnxpts and purxpts stating that a purlieu applies to a ttx. Purlieu relationships may have other characteristics such as, including but not limited to: values, scopxs, date applicable, timeframe applicable, horizon applicable, date created, creator, infxtypx.

Trait Relationships

As used herein, the term "trait relationship" refers to a directed infxtypxd binary relationship between cnxpts and trxrts stating that a cncpttrrt applies to a ttx. Trait relationships may have other characteristics such as, including but not limited to: values, scopxs, date applicable, timeframe applicable, horizon applicable, date created, creator, infxtypx.

Keyword Index Relationships

As used herein, the term "keyword index relationship" refers generally to a specialized relationship connecting a kwx to a name, cnxpt, trxrt, purxpt, or other info-item, or any other textual resource internal or external to the system that is 'indexed' by the system indicating that the keyword index entry is relevant to the information represented. In one embodiment, a weighted "keyword index relationship" relationship is created between a kwx and, including but not limited to: cnxpts; purxpts, cncpttrrts, trxrts, irxts, rsxitems, and other txos to express a strong or loose relation that the keyword is in the information represented by the info-items. In one embodiment, a scopx of validity can be assigned to a keyword index relationship. Here, keyword indexes are used to improve the speed and accuracy of initial searches by pre-indexing available material.

This is a directional relationship. Keyword index relationships may be established manually only by authorized users or where a translation is being provided by an authorized and qualified user.

Other Relationships

Information Resource Citation (Cited-Citing) Relationships

As used herein, the term "information resource citation relationship" or "document citation relationship" or "indirect citation relationship" refers to infxtypxd binary relationships between irxts representing information resources that represents the referencing or citation by one information resource (the citing information resource or "OIR") of the other information resource (the cited information resource or "CIR"). Information resource citation relationships are given weights. Weights assigned are established by algorithms and parameters set and altered over time.

A cited information resource may have any number citing information resources. A citing information resource may cite any number of information resources. The cited-citing relationship is effectively but not specifically transitive, which means that if B cites A, and C cites B, C is indirectly citing A because the information in A has indirectly been relied upon by C. Specifically though, C is not citing A.

This is a directional relationship. Information resource citation relationships may be established manually only by authorized users or where a translation is being provided by an authorized and qualified user.

A form of imputed hierarchical association called an "imputed cnxpt citation association" is automatically created between cnxpts based upon these relationships, in preparation for map generation.

Prior Art Citation Relationships

As used herein, the term "prior art citation relationship" refers to a specialization of an "information resource citation relationship" between irxts representing a patent or patent application and an information resource that represents the referencing or citation by the patent or application (the citing information resource or "OIR") of the other information resource (the cited information resource or "CIR"). Prior art citation relationships are given higher effective weights than most other relationships where the underlying citation was on an issued patent, and a high weight otherwise. Weights assigned are established by algorithms and parameters set and altered over time.

Direct Information Resource Citation Relationships

As used herein, the term "direct information resource citation relationship" refers to an information resource citation relationship stating that an information resource cites a cnxpt's description in the CMM.

A form of imputed hierarchical association called an "imputed cnxpt citation association" is automatically created between cnxpts based upon these relationships, in preparation for map generation.

Direct Information Resource Name Reference Citation Relationships

As used herein, the term "direct information resource name reference citation relationship" refers to an information resource citation relationship stating that an information resource cites a cnxpt's name or name variant in the CMM.

A form of imputed hierarchical association called an "imputed cnxpt name reference citation association" is automatically created between cnxpts based upon these relationships, in preparation for map generation.

Txo Property Relationships

As used herein, the term "txo property relationship" or "property relationship" refers to a directed infxtypxd binary relationship between a txo and a cnxpt or other info-item stating that the txo's meaning applies as a property to a ttx or other info-item. Txo property relationships may have other characteristics such as, including but not limited to: values, scopxs, date applicable, timeframe applicable, horizon applicable, date created, creator, source, type. Implementation of these relationships may be of a different, more efficient structure than for associations or occurrences.

Several sub-types of the typed txo relationship include, but are not limited to: infxtypx, creator, source, scopx, or fxxt relationships.

Tpx Relationships

As used herein, the term "tpx relationship" refers generally to an infxtypxd relationship representing an n-ary aggregate of txos. Tpx relationship are the general form for the representation of relationships between txos. That is, an tpx relationship is a grouping of txos with no implied direction or order, and there is no restriction on the number of txos that can be grouped together. Here, the term "association" is not meant to refer to these 'infrastructure' relationships.

Tpx relationships describe relationships between tpxs and are represented by an ontology edge that asserts the relationship between the two tpxs. Tpx links may be directed, bi-directed, undirected, or symmetrical (optionally directed). They may have other characteristics such as, including but not limited to: values, date applicable, timeframe applicable, date created, creator, infxtypx.

The Tpx association between two txos can be asserted using an association that conforms to the rules for all relationships, and the following:

If the txos are both cnxpts, see the section on ttx associations below. Otherwise, the type property shall be set to a txo association type, from the list including but not limited to the types below.

Scopx applies to this association type in the same way as it does to any other. Fxxts apply to this association type if stated. Fxxts need not be stated and should not normally be stated for infrastructure txos.

Tpx Type-Instance Relationship

Relationships based upon whether a tpx is an instance of another tpx are stated as Tpx Type-Instance Relationships between txos. A tpx type captures some commonality in a set of tpx. Any tpx that belongs to the extension of a particular tpx type is known as an instance of that tpx type. A tpx type may itself be an instance of another tpx type, and there is no limit to the number of tpx types a tpx may be an instance of, though practical limits may be imposed. Tpx types may be imputed contextually from relationships a tpx has a role in.

Specific tpx type instances include but are not limited to:

'Product' where the 'Instance' is the specifically typed txo representing a specific product by a type txo named 'Product' to represent that the specific product is 'a product'.

'Patent (Application)' where the 'Instance' is the specifically typed irxt representing a specific Patent or Patent Application by a type txo named 'Patent' to represent that the specific document is 'a patent'.

'Patent on a Technology' where the 'Instance' is the specifically typed irxt representing a specific patent filling a document role representing that 'a specific issued patent was related to a txpt' on a specifically typed 'Patent on a Technology' occurrence relationship with a txpt;

Imputed tpx type instances include but are not limited to:

'Author' where the 'Instance' is the imputably typed txo representing a specific person filling a people role representing that 'a specific person wrote something' on a specifically typed 'Author' relationship;

'Assignee Company' where the 'Instance' is the imputably typed txo representing a specific business entity filling an organization role representing that 'a specific entity was assigned ownership of a patent' on a specifically typed 'Assignee' relationship which relates it to the Patent Application irxt;

'Inventor of a Technology' where the 'Instance' is the imputably typed txo representing a specific person filling a people role representing that 'a specific person invented something' on a specifically typed 'Inventor of a Technology' relationship with a txpt where the person has been established to be the inventor of a technology represented by the txpt either because (s)he was the person first entering the txpt, or because (s)he is otherwise authoritatively recognized as the inventor such as where (s)he was an inventor on a patent issued for the technology as established by two relationships: an occurrence relationship between the txpt and a Patent (Application) irxt with one role served by a txo for a Patent or Patent Application, and a second relationship specifically typed 'Inventor on a Patent (Application)' with one role filled by an Individual txo representing that 'a specific person was a registered inventor' and the other role filled by the txo for that patent or patent application;

Though these relationships normally form additional hierarchical levels in Topic Maps, here they are constrained to participate as members of hierarchies only if the fxxts are set to include them, normally, as dxos. This keeps these relationships out of the ontology reduction calculations that could affect the ttx placement on the map. For instance, if the 'South Sea Lines Cruise Ship' Instance was included in the calculation, and the classes were related to the instance by a 'installed on' relationship rather than a more clearly stated 'commercial product or' relationship, then all manner of confusion would ensue because so many different tcepts are used on a cruise ship.

The Type-Instance Relationship

The type-instance relationship is not transitive. That is, if B is an instance of the type A, and C is an instance of the type B, it does not follow that C is an instance of A.

Tpx Supertype-Subtype Relationship

The tpx supertype-subtype relationship is the relationship between a more general type (the supertype) and a specialization of that type (the subtype). If B is the subtype of A, it follows that every instance of B is also an instance of A. The converse is not necessarily true. A type may have any number of subtypes and supertypes.

The supertype-subtype relationship is transitive, which means that if B is a subtype of A, and C a subtype of B, C is also a subtype of A.

Cycles in this relationship are discouraged but allowed, and should be interpreted to mean that the sets of instances for all types in the cycle are the same. This does not, however, necessarily imply that the types are the same.

Tpx supertype-subtype relationships include but are not limited to:

'People Type' where the 'sub-type' is the txo defining a specific type of person or a real world role and a txo named 'People Role' represents the tpx 'a person's role' and is the 'supertype';

'Patent Information Resource Types' where the 'sub-type' is the txo defining a patent type and a txo named 'Information Resource Types' represents the tpx 'information resources in the CMM' and is the 'supertype'.

Tpx Predecessor-Successor Relationship

The tpx predecessor-successor ("successor") relationship is between an event, timeframe, action, or condition represented by a txo (the predecessor) and another txo (the successor) representing a second later event or timeframe or a reaction, result, or response to the event, action or condition represented by the first. The converse is not presumptively true. A txo may have any number of successors and predecessors.

The predecessor-successor relationship is transitive, which means that if B is the successor of A, it follows that every successor of B is also a successor of A.

Cycles in predecessor-successor relationships are discouraged but allowed, and must be interpreted to mean that all txos in the cycle occur at the same time if at all. This will normally cause a warning and an administrative alert.

Temporal Order Relationship

As used herein, the term "temporal order relationship" refers to an infxtypxd binary relationship between purxpts that reflects a relationship based upon whether one purlieu occurred or will occur after another purlieu. Example: "industrial age occurred after iron age".

Cause and Effect Relationship

As used herein, the term "cause and effect relationship" refers to an infxtypxd binary relationship between txos, and especially purxpts that reflects a relationship based upon whether a txo was the cause for another or effected another txo.

Requirement Match Relationship

As used herein, the term "requirement match relationship" refers to a weighted, scopxd, infxtypxd binary relationship between cncpttrrts that reflects a relationship based upon whether and the degree to which a trxrt representing a cncpttrrt will satisfy a requirement represented by another trxrt. This relationship states that a tcept with that trxrt can be used to solve the needed function for an appcept's purpose where the appcept has the requirement trxrt. This relationship may be added manually to set a basis of information for trait matching. It is directional.

Source Relationship

The source relationship states where information was obtained. One role of the relationship is filled by the added txo (any txo, cnxpt, etc.) and a second role is filled by a data set, a Result Set, or some other source info-item identifier, marking (by detailed infxtypx or scopx) the relationship to indicate the type of source and, optionally, its usability, quality, currency or other factors as a basis for a weight or other attribute value. A txo may have any number of sources. A relationship may have a source role. In one embodiment, a relationship item identifier may fill a role in a source relationship.

User Suggested Purlieu Relationship

As used herein, the term "user suggested purlieu relationship" refers to an infxtypxd binary relationship between a cnxpt and a purxpt that states that the ttx was existing within the context described by the purxpt. This is a directional relationship and is a vote. User suggested purlieu relationships may be established by authorized users.

User Suggested—Txo Categorization Relationship

As used herein, the term "user suggested—txo categorization relationship" refers to an infxtypxd binary relationship between a txo and a cnxpt that represents a relevance of the tpx to the ttx based upon where an infrastructure tpx was moved or pasted. This is a directional relationship and is a vote. User suggested—txo categorization relationships may be established by authorized users, and are marked with the user as creator, a weight, and possibly a fxxt and/or scopx.

User Suggested—Dxo Alignment Inclusion Relationship

As used herein, the term "user suggested—dxo alignment inclusion relationship" refers to an infxtypxd binary relationship between a dxo, other than a cnxpt, and a cnxpt that represents an alignment of the dxo to the cnxpt based upon where the user moved or pasted the dxo. This is a directional relationship and is a vote, but strict rules apply for authorization to place or move certain dxos. User suggested—dxo alignment inclusion relationships may be established by authorized users, and are marked with the user as creator, a weight, and possibly a fxxt and/or scopx. In one embodiment, only one vote (one such relationship) may exist for any single user for a specific dxo within a fxxt or for a specific scopx. In one embodiment, for some specific dxo types, only one vote (one such relationship) may exist for any single user for a specific dxo within a fxxt or for a specific scopx. In one embodiment, for some specific dxo types, only one vote (one such relationship) may exist for any specific dxo within a fxxt or for a specific scopx.

User Suggested—Dxo Alignment Affinitive Relationship

As used herein, the term "user suggested—dxo alignment affinitive relationship" refers to an infxtypxd binary relationship between a dxo, other than a cnxpt, and a second dxo, possibly a cnxpt that represents an alignment of the dxo to the second dxo, based either upon where the user moved or pasted the dxo, or more generally based upon the request to always display the first dxo near the second dxo. This is a directional relationship because the reciprocal—to display the second dxo by the first—is not established. This is a vote, but strict rules apply for authorization to place or move certain dxos. User suggested—dxo alignment affinitive relationships may be established by authorized users, and are marked with the user as creator, a weight, and possibly a fxxt and/or scopx. In one embodiment, only one vote (one such relationship) may exist for any single user for a specific dxo within a fxxt or for a specific scopx. In one embodiment, for some specific dxo types, only one vote (one such relationship) may exist for any single user for a specific dxo within a fxxt or for a specific scopx. In one embodiment, for some specific dxo types, only one vote (one such relationship) may exist for any specific dxo within a fxxt or for a specific scopx.

Custom Hierarchical Relationships

As used herein, the term "custom hierarchical relationship" refers to an infxtypxd binary relationship between txos that represent relationships based upon whether a tpx is somehow related to the parent (defined by some added function). This is a directional relationship.

Syntactic Relationships Suggesting Hierarchical Relationships

As used herein, the term "Syntactic Relationships Suggesting Hierarchical Relationship" refer to specific syntactic relationships that denote a categorization between otherwise unrelated topics. Examples are:

Heat treatment of Metals—where heat treatments are separated into treatment of metals and other treatments;

Aluminum windows—where non-aluminum windows are seen as a separate category

Books by English authors—where other books must be in a separate category

Photographs of Albums—shows that a category of photographs of other objects should exist Albums of photographs—shows that a category of albums of objects other than photographs should exist.

Syntactic relationships are displayed according to the syntax of a normal sentence, either through the syntax of the subject string (in precoordinate indexing), or through devices such as facet indicators (in postcoordinate indexing).

In older search engines, postcoordinate index system were used, assigning a document terms like "aluminum" and "window" without the relationship given by their use in the title or in the query. The user conducting a search would finds documents that include one or both of the terms, regardless of the meaning. This provides an expansive model.

In newer search engines, and here, keywords are used as index terms, and repetitive use provides a training as if the collective user set were a single expert indexer who has stated by use that an ordered relationship exists between the keywords. In a precoordinate index system, a document is indexed in using the subject terms. "Books" and "English" are combined as subject and sub-heading (e.g., "Books—English").

The result of not providing for the display of syntactic relationships in postcoordinate systems results in users not being able to distinguish between different contexts for the same term. Here the combination of postcoordinate indexing for expansive searching and precoordinate for identity indication are used.

Special Feature Hierarchical Relationships

As used herein, the term "special feature hierarchical relationship" refers to an infxtypxd binary relationship between txos that relate descriptive elements by directed but not necessarily parent child relationships that can only be used in form hierarchies in certain cases.

Document Reference Relationships

Ttx Description Content Author-Placed Reference Citation Tags

As used herein, the term "ttx description content author-placed reference citation tag" refers to a citation marker made in a document regarding or citing specific content in another ttx's cnxpt's description by specific citation or referencing, or specific content in an information resource (because the information resource may actually be or become a ttx description).

These markers are especially important because of the overt referencing by the author. These markers may appear in many forms, stating general relevance or encompassing a thought, a passage, a word, or a document location in the document where it is placed. It may merely point to the cited cnxpt or a document describing the cnxpt or a document relevant to the cnxpt.

The cited cnxpt description or information resource must have been known by the author of the citing document. Because the cited ttx existed before the citing ttx, a reference citation association is highly appropriate and relevant.

Often, a document containing such citation tags will be found and added to (or a reference will be added to) the CMM. These tags have such potential import that, even if the cited document is not yet in the CMM, that the mere failure to anticipate that it will be added would cause an inefficiency in many (but certainly not all) situations. These tags are captured into the [RAW REFERENCE] property of any new txo (an irxt or cnxpt in most cases) to be available if the cited cnxpt is later added.

Later-Added Ttx Description Content Reference Citation Tags

As used herein, the term "later-added ttx description content reference citation tag" refers to a citation marker made in a document regarding or citing specific content in another ttx's cnxpt's description by specific citation or referencing, or specific content in an information resource (because the information resource may actually be or become a ttx description).

These markers are especially important because of the overt referencing by a reviewer. These markers may appear in many forms, stating general relevance or encompassing a thought, a passage, a word, or a document location in the document where it is placed. It may merely point to the cited cnxpt or a document describing the cnxpt or a document relevant to the cnxpt.

Later-added ttx description content reference citation tags may be established manually by authorized users when reviewing a document available in or referenced by the CMM. The tags are associated with the document and/or associated with the document reference. This provides a facility to pinpoint where a general or specific citing of a ttx or an information resource is being made in and existing document. These non-author citations DO NOT presumptively show that the cited document existed before the document where the tag is placed, but they show that an inference could be made that the citing document was highly relevant to the cited cnxpt, and vice-versa. These tags are thus useful for irxt and cnxpt citation association building.

On occasion, such citation tags will be added before the cited document is in the CMM. The mere failure to anticipate that it will be added would cause an inefficiency in many (but certainly not all) situations. These tags are captured into the [RAW REFERENCE] property of any new txo (an irxt or cnxpt in most cases) to be available if the cited cnxpt is later added.

Comment Relationships

As used herein, the term "comment relationship" refers to an infxtypxd binary relationship that represent comments on other relationships. These relationships are reinforcing or negating to the original relationship. If a comment relationship is reinforcing, suggesting that the basic relationship exists, but that something about its description or attribute values can be improved, than it counts as an additional vote in favor of the original relationship, strengthening it. If it is negative, then the impact is the opposite, but has a greater impact because negatives carry more weight.

Comment relationships may be used for tracking workflow while a user improves their thinking and as a historical record of the work that went into the process.

Authors of relationships may make additional statements or otherwise improve on the relationship description and attribute values. Care must be taken to allow for notification to other users making comments about a relationship that the relationship has been changed, Votes about a relationship are actually relationships themselves or are threaded comments connected to a relationship, and thus a comment may be changed by its author after a notice (alert) stating that a change/improvement occurred.

Comment relationships may have other characteristics such as, including but not limited to: values, scopxs, date applicable, timeframe applicable, horizon applicable, date created, creator, infxtypx.

Generic Relationship

As used herein, the term "generic relationship" refers generally to a vote stating that some unknown relationship exists, but it has to be examined to determine what is represented. Such relationships are queued into the crowd-source review workflow so that someone may earn an incentive by considering the relationship. Generic relationships may have other characteristics such as, including but not limited to: values, scopxs, date applicable, timeframe applicable, horizon applicable, date created, creator, infxtypx.

Negative Relationships

As used herein, the term "negative relationship" refers generally a relationship of any scopx and infxtypx that someone has stated should not be present. It supports objections.

Commonality Relationships

As used herein, the term "commonality relationship" refers to a relationship internally maintained between, including but not limited to: two irxts; two trxrts; two txos (other than cnxpts) or two kwxs stating a relationship stating that the two info-items are highly related. By definition, these relationships do not include cnxpts as their similarity is directly addressed by "Document Level Relationship Generation". (as a practical matter, the two forms of relationship building are different because the latter allows for direct imputing of associations and better handling of changes to metadata.) These relationships are not scopxd or Boded. These relationships are used as a basis for, including but not limited to: searching, querying, relevance measurement, semantic differencing, and identification. Commonality relationships may have other characteristics such as, including but not limited to: values, date applicable, timeframe applicable, horizon applicable, date created, creator, infxtypx. Commonality relationships are formed automatically by, including but not limited to: semantic distance calculation, clustering, citation analysis. Commonality relationships are appropriate where the information needed to determine the relationship is known within stored data in info-items, and it would be inefficient to dedicate a more complex stored relationship. Commonality relationships are inappropriate where the number of relationship is sparse for the number of info-items of the type. Commonality relationships are stored as summations of weights and utilized to create imputed associations or summary associations. Commonality relationships may not be created by users, but may be based upon user created relationships.

The set of commonalities include but are not limited to:

Irxt to irxt

Purxpt to purxpt

Trxrt to trxrt

Keyword to keyword

Txo of specific type (non-cnxpt) to txo of the same specific type

Txo of one specific type (non-cnxpt) to txo of a different specific type (non-cnxpt)

Result Set to Result Set

Result Set Membership Commonality Relationships

As used herein, the term "result set membership commonality relationship" refers to a relationship internally maintained between two irxts stating that the information resources represented by and referenced by the two info-items both occurred as relevant in two or more result sets. Specific criteria for weights, include but are not limited to:

- irxts each holding the same base locator (same basic source address such as a website) to an external source should be given high weights.

- irxts holding disparate base locators should be given medium weights.

Irxt Commonality Relationships

Irxt Commonality Relationships may be established manually by authorized users. Irxt Commonality Relationships are maintained for cached versions of external resources and the object at the external locator location.

Irxt Affinitive Commonality Relationships

As used herein, the term "Irxt Affinitive Commonality Relationship" refers to a relationship internally maintained between two irxts stating a near equivalence between the information resources represented by or referenced by the two info-items. Specific criteria for weights, include but are not limited to:

- irxts each holding the same locator to an external source should be considered to represent the same resource and be merged, so long as the locators are not merely active page locators which will normally generate different content each time they are used, and in the interim, an Irxt Affinitive Commonality Relationship is created between the irxts stating the similarity and assigned a maximum weight. For those information resources with links to active pages and without exactly the same parameters, an Irxt Affinitive Commonality Relationship is created between the irxts stating the similarity and assigned a medium high weight.
- irxts representing information resources having the same content, where one irxt represents an information resource cached in the CMMDB and one holds a locator to an external source, such that the two irxts refer to the same content (other than a lack of any content or minor changes), should be considered to represent the same resource, and an Irxt Affinitive Commonality Relationship is created between the irxts stating the similarity and assigned a highest weight.
- irxts representing information resources having semantically similar content (other than a lack of content) should be considered to represent the same resource in meaning only, and an Irxt Affinitive Commonality Relationship is created between the irxts stating the similarity and assigned a high weight.
- irxts representing information resources having semantically similar descriptions (other than a lack of a description or a null description) should be considered to represent the similar resource in meaning only, and an Irxt Affinitive Commonality Relationship is created between the irxts stating the similarity and assigned a high weight.
- irxts representing information resources having the same names, such that if two irxts share the same specific name and no description, should be considered to represent similar resources in meaning only, and an Irxt Affinitive Commonality Relationship is created between the irxts stating the similarity and assigned a medium weight.
- irxts representing information resources having similar names, such that if two irxts have semantically equivalent names and no description, should be considered to represent the same resource in meaning only, and an Irxt Affinitive Commonality Relationship is created between the irxts stating the similarity and assigned a low weight.
- irxts representing information resources having a text string (regular expressions used) in common in their descriptions, an Irxt Affinitive Commonality Relationship is created between the irxts stating the similarity and assigned a low weight.

Irxt Affinitive Commonality Relationships may be established by automated analysis, including but not limited to: semantic distance calculation, relevance analysis.

Irxt Hierarchical Commonality Relationships

As used herein, the term "Irxt Hierarchical Commonality Relationship" refers to a relationship internally maintained between two irxts stating a precedence between the information resources represented by or referenced by the two info-items. Specific criteria for weights, include but are not limited to:

- irxt representing an issued patent having a date of invention (priority date) prior to another issued patent represented by a second irxt are assigned a low weight.

Irxt Commonality Relationships may be established by automated analysis, including but not limited to: semantic distance calculation, relevance analysis.

Purlieu Commonality Relationships

As used herein, the term "purlieu commonality relationship" refers to a relationship internally maintained between two purxpts stating a strong relationship of context between the purlieus represented by or referenced by the two purxpts. Specific criteria for weights, include but are not limited to: purlieus having a common timeframe, or representing an overlapping context.

Purlieu commonality relationships may be established manually by authorized users. Purlieu commonality relationships may be established manually by authorized users.

Cncpttrrt Commonality Relationships

As used herein, the term "cncpttrrt commonality relationship" refers to a relationship internally maintained between two trxrts stating a near equivalence between the cncpttrrts represented by or referenced by the two trxrts, or that one cncpttrrt satisfies the other cncpttrrt. Specific criteria for weights, include but are not limited to:

- cncpttrrts having semantically similar descriptions, such that if two trxrts share the same specific description (other than a lack of a description or a null description), should be considered to represent the same cncpttrrt, and a cncpttrrt commonality relationship is created between the trxrts stating the similarity and assigned a high weight.
- trxrts having the same names, such that if two trxrts share the same specific name and no description, should be considered to represent the same cncpttrrt, and a cncpttrrt commonality relationship is created between the trxrts stating the similarity and assigned a medium weight.
- cncpttrrts having similar names, such that if two trxrts have semantically equivalent names and no description should be considered to represent the same cncpttrrt, and a cncpttrrt commonality relationship is created between the trxrts stating the similarity and assigned a low weight.
- cncpttrrts having a text string (regular expressions used) in common in their descriptions, a cncpttrrt commonality relationship is created between the trxrts stating the similarity and assigned a low weight.
- cncpttrrts having a.

If one trxrt has a Keyword Index relationship with a kwx that shares an keyword commonality relationship with a kwx related to another trxrt, then those cncpttrrts are presumed to be somewhat similar, and a cncpttrrt commonality relationship is created between the trxrts, and given a weighting based upon that keyword commonality relationship weight.

Cncpttrrt commonality relationships may be established manually by authorized users. Cncpttrrt commonality relationships may be established by automated analysis, including but not limited to: semantic distance calculation, relevance analysis.

Keyword Commonality Relationships

As used herein, the term "keyword commonality relationship" refers to an un-fxxted and un-scopxd relationship internally maintained between two kwxs stating a semantic equivalence between the keywords or phrases represented by or referenced by the two kwxs. A keyword commonality relationship provides a suggestion to consider terms that are commonly linked in various ways in information resources, fields of knowledge, in natural language, or in relevance results from searches. General rules for kwx commonality relationships are:

- One of the terms should be strongly implied, according to the frames of reference shared by the users, whenever the other is employed as an search or indexing term ('implies'); and
- One of the terms is a necessary component in any definition or explanation of the other term ('partial meaning').
- One of the terms may be a translation of the other into a language given by the scopx of the kwx definitions' internal relationships.
- One of the terms is normally seen as equivalent to the other term.

Specific criteria for weights, include but are not limited to:

- keyword phrases having semantically similar descriptions, such that if two kwxs share the same specific description (other than a lack of a description or a null description) should be considered to represent the same meaning, and a keyword commonality relationship is created between the kwxs stating the similarity and assigned a high weight.
- keyword phrases having the same words in different orders may be considered to represent a similar or the same meaning, and a keyword commonality relationship is created between the kwxs stating the similarity and assigned a medium weight.
- keyword phrases having semantic similarities and no description should be considered to represent nearly the same meaning, and a keyword commonality relationship is created between the kwxs stating the similarity and assigned a low weight.
- keyword phrases having a text string (regular expressions used) in common in their descriptions, a keyword commonality relationship is created between the kwxs stating the similarity and assigned a low weight.
- keyword phrases having been used in queries and found interrelated by commonality of relevance because of commonality of relevant rsxitems representing irxts representing information resources should be considered to represent nearly the same meaning, and a keyword commonality relationship is created between the kwxs stating the similarity and assigned a low weight.

Keyword commonality relationships may be established manually by authorized users. These relationships are shown through cross-references in an alphabetical tool, and through juxtaposition in a classified tool.

Keyword commonality relationships include but are not limited to the following basic types: synonyms, quasi-synonyms, translations, lexical variants, phrases, strings, upward (generic) posting relationships, and near-synonymy for keyword or thesaurus entries. synonyms and lexical variant forms in ttx names are not connected by keyword commonality relationships but rather by structure in the cnxpt name. Keyword commonality relationships may be established by automated analysis, including but not limited to: semantic distance calculation, translations, syntactic analysis.

This controlled translation vocabulary has translation relationships between every preferred term and the equivalent term in the other official language where a translation has been identified. This linguistic equivalent may not necessarily be a direct translation. Some terms in one language may have more than one equivalent in the other.

Lexical Variant Relationship

Quasi-Synonyms Relationships

Synonymy Relationship

Upward (Generic) Posting Relationships

Custom Similarity Relationships

As used herein, the term "custom similarity relationships" refers generally to infxtypxd binary relationships between two non-cnxpt txos. Generally, these relationships follow the purpose of commonality relationships, but these are user set and thus must be considered to have a higher relevance and thus weight. These relationships are general, with their specific rationale to be set in their purpose or description by the user or interface. These relationships should not be created where their purpose is covered by other relationship types. The set of similarities include but are not limited to:

Irxt to irxt—For affinitive relationships, represented information resources are semantically very similar. For hierarchical relationships, represented information resources have a certain group—member relationship or other precedence, other than a specific well structured citation (which is covered by other relationship types).

Purxpt to purxpt—For affinitive relationships, represented purlieus are semantically very similar. For hierarchical relationships, represented purlieus have a certain group—member relationship or other precedence.

Trxrt to trxrt—For affinitive relationships, represented cncpttrrts are semantically very similar. For hierarchical relationships, represented cncpttrrts have a certain group—member relationship or other precedence.

Keyword to keyword—Represented keywords or keyword phrases are semantically very similar. For hierarchical relationships, represented keywords have a certain group—member relationship or other precedence.

Txo of specific type (non-cnxpt) to txo of the same specific type—For affinitive relationships, represented tpxs are very similar. For hierarchical relationships, represented tpxs have a certain group—member relationship or other group—member relationship or other precedence.

Txo of one specific type (non-cnxpt) to txo of a different specific type (non-cnxpt)—For affinitive relationships, represented tpxs are strongly related in a particular way. For hierarchical relationships, represented tpxs have a certain group—member relationship or other precedence.

Result Set to Result Set—the results collected by one result set are extremely likely to be relevant wherever the other result set is relevant.

Imputed Relationships

As used herein, the term "imputed relationships" refers generally to infxtypxd binary relationships between non-cnxpt txos or a cnxpt and a non-cnxpt txo that represent a relationship between the represented info-items as determined by a calculation or based upon other relationships, including commonality relationships. These relationships, once found, do not get deleted unless an info-item in one of the roles is altered, deleted, or merged. In one embodiment, these relationships may be deleted and possibly recreated when an info-item in one of their roles is altered or when a commonality relationship is recomputed. In one embodiment, these relationships may be deleted and possibly recreated when an info-item in one of their roles is merged. These relationships will be deleted when an info-item in one of their roles is deleted.

Imputed relationships may not be established manually by users. Relationships having the same result as an imputed relationship may, in some cases, be established manually by authorized users.

Imputed Associations

As used herein, the term "Imputed Associations" refers generally to infxtypxd binary relationships between cnxpts that represent a relationship between the represented ttxs as determined by a calculation or based upon other relationships, including commonality relationships. These relationships are fxxted but not scopxd. These relationships, once found, do not get deleted unless an info-item in one of the roles is altered, deleted, or merged. In one embodiment, these relationships may be deleted and possibly recreated when an info-item in one of their roles is altered or when a commonality relationship is recomputed. In one embodiment, these relationships may be deleted and possibly recreated when an info-item in one of their roles is merged. These relationships will be deleted when an info-item in one of their roles is deleted.

Imputed Associations may not be established manually by users.

Imputed Categorical Associations

As used herein, the term "imputed categorical associations" refers generally to infxtypxd binary directed hierarchical associations between cnxpts that represent a categorical relationship between the ttxs where one ttx is within a grouping as represented by the other endpoint cnxpt. These relationships may be considered hierarchical in the fxxt where they are defined, but also affinitive depending upon their subtype.

Cycles in this relationship are allowed, and should be interpreted to mean merely that the hierarchy resulting from a fxxt analysis is imperfect. Such cycles are eliminated during reduction.

In one embodiment, thresholded imputation of imputed categorical association and assignment of weights is based upon, including but not limited to:

the infxtypx(s) of cnxpts;

In one embodiment, imputed categorical associations may be created where a citation (an indirect citation) relationship exists between information resources where one irxt is an occurrence to a 'child' cnxpt and cites an irxt that is an occurrence to a 'parent' cnxpt. (In cases where an occurrence information resource of a 'child' cnxpt cites information resources which are occurrences of both a parent and a grandparent ttx, two relationships will be imputed.)

In one embodiment, an imputed categorical association is created where a citation (a direct citation) relationship exists between an irxt that is in an occurrence to a 'child' cnxpt and an irxt which has a locator specifying a second cnxpt that is thus the cited 'parent' cnxpt.

In one embodiment, imputed categorical associations may be created where association transitivity exists—by the presence of certain associations exist between each of two sets of two cnxpts where one cnxpt is in each of the two sets. These are sometimes called roll-ups in the heuristics here. As an example, in the following, the first phrase represents how the cnxpts are related: first set cnxpt to first set second cnxpt that is also the second set first cnxpt, and second set first cnxpt to second set second cnxpt. The second phrase states the role types of the imputed categorical association between the first cnxpt of the first set to the second cnxpt of the second set:

is member of—is in an Ancestor Group
is subclass of—is in an Ancestor Class
is member of category—is in an Ancestor Category Imputed categorical associations are specific to fxxts. Imputed categorical associations may be established by automated analysis, including but not limited to: fxxt analysis.

Imputed Prior Art Predecessor Associations

As used herein, the term "imputed prior art predecessor associations" refers generally to infxtypxd binary directed hierarchical associations between cnxpts that represent a categorical relationship between the ttxs where one ttx is within a grouping as represented by the other endpoint cnxpt. These relationships may be considered hierarchical in the fxxt where they are defined, but also affinitive depending upon their subtype.

Cycles in this relationship are allowed, and should be interpreted to mean merely that the hierarchy resulting from a fxxt analysis is imperfect. Such cycles are eliminated during reduction.

In one embodiment, thresholded imputation of imputed categorical association and assignment of weights is based upon, including but not limited to:

the infxtypx(s) of cnxpts;

In one embodiment, imputed categorical associations may be created where a prior art citation relationship exists between information resources where one irxt is an occurrence to a 'child' cnxpt and cites an irxt that is an occurrence to a 'parent' cnxpt. (In cases where an occurrence information resource of a 'child' cnxpt cites information resources which are occurrences of both a parent and a grandparent ttx, two relationships will be imputed.)

In one embodiment, an imputed categorical association is created where a citation (a direct citation) relationship exists between an irxt that is in an occurrence to a 'child' cnxpt and an irxt which has a locator specifying a second cnxpt that is thus the cited 'parent' cnxpt.

In one embodiment, an imputed categorical association is created where a prior art citation of a patent represented by an irxt that is in an occurrence to a 'child' txpt refers to a patent represented by a second irxt which has an occurrence relationship to a second txpt that is thus the 'prior art predecessor parent' txpt. Other intellectual property relationships are also utilized here in this manner. (see Intellectual Property Relationships)

Imputed Cnxpt Citation Associations

As used herein, the term "imputed cnxpt citation association" refers to an infxtypxd binary directed relationship between cnxpts that represents the referencing or citation by an occurrence irxt information resource (the citing irxt representing a citing original information resource here called the "OIR") of one cnxpt of an occurrence irxt information resource (the cited irxt representing a cited information resource here called the "CIR") of the other cnxpt. This sub-type is called an "imputed cnxpt citation association—occurrence". These associations may be considered hierarchical or affinitive depending upon their subtype and possibly their weight.

The CIR ttx must have been known by the author of the OIR or a reviewing user must have manifested that the author was absolutely knowledgeable about the OIR. Because a presumption could be made that the CIR existed before the OIR, establishing an association representing that the CIR cnxpt was a predecessor (or category) of the OIR cnxpt, is appropriate and relevant. The "imputed cnxpt citation association" is one form of the association, created based upon irxt relationships. Another form, the "ttx citation association" has a stronger presumptive relevance, and the "ttx citation hierarchical association" has a stronger presumptive categorization relevance, but each of these are between cnxpts directly rather than between irxts, and are not imputed.

The term "imputed cnxpt citation association" also has a sub-type called an "imputed cnxpt citation association—result set" that represents either:

- the referencing of a CIR represented by an irxt related by an occurrence of a cnxpt by an information resource represented by an irxt linked to an rsxitem in any result set of a query attached to a goal or a second cnxpt, or
- the referencing of a CIR represented by an irxt linked to an rsxitem in any result set of a query attached to a cnxpt by an information resource represented by an irxt related by an occurrence of a goal or a second cnxpt.

Imputed cnxpt citation associations are given weights based upon the weight of the irxt to irxt citation relationship and the type of each irxt. The weight of the irxt to irxt citation relationship is based upon the type of citation or reference in the OIR. Because web links may be used as a basis for such relationships, the weighting of the relationship must be based upon the nature of the citation, with distinctly lower weightings given initially for web link citations, and high weightings given for prior art citations. For that reason, specificity has to be held to in creation of the irxt and the creation of irxt citation relationships and ttx citation associations. Weights assigned for "imputed cnxpt citation association—result set" associations are significantly lower than those for "imputed cnxpt citation association—occurrence" associations. Weights assigned are established by algorithms and parameters set and altered over time. Imputed cnxpt citation associations may be established manually by authorized users.

Imputed cnxpt citation associations are generated in preparation for map generation or, in one embodiment, for positioning of goals.

Nexus Affinitive Associations

As used herein, the term "nexus affinitive association" or "nexus" refers generally to infxtypxd binary affinitive associations between cnxpts that represent, including but not limited to: the relatedness, such as satisfaction of needs by traits between the cncpttrrts of the cnxpts, commonality of cncpttrrts; commonality of purlieu; or similarity or proximity in meaning between the two ttxs represented by the two cnxpts connected by the association, based upon the commonality (or semantic similarity) of identity indicators between cnxpts to represent a match, or other underlying factors. Nexus affinitive associations may have other characteristics such as, including but not limited to: values, date applicable, timeframe applicable, horizon applicable, date created, creator, infxtypx. In one embodiment, scopx are taken into account, and scopx as well as weights are assigned, but this is not seen as efficient, and the disregard of scopx is seen presently as a way to carry a relatedness across scopx to apply it to a fxxt in general.

Cycles in this association are allowed, and should be interpreted to mean merely that the cnxpts involved are similar.

In one embodiment, thresholded imputation of nexus affinitive association and assignment of weights is based upon, including but not limited to:

- the infxtypx(s) of cnxpts;
- If one cnxpt has an occurrence relationship with a irxt that shares an Irxt Commonality Relationship of some scopx with a irxt related by an occurrence to another cnxpt, then those cnxpts are presumed to be somewhat similar, and a nexus affinitive association is created between the cnxpts, and given a weighting based upon that Irxt Commonality Relationship scopx and weight.
- If one cnxpt has a Keyword Index relationship with a kwx that shares an keyword commonality relationship of some scopx with a kwx related to another cnxpt, then those cnxpts are presumed to be somewhat similar, and a nexus affinitive association is created between the cnxpts, and given a weighting based upon that keyword commonality relationship scopx and weight.
- If one cnxpt has a trxrt that shares a cncpttrrt commonality relationship of some scopx with a trxrt of another cnxpt, then the cnxpts are presumed to be somewhat similar, and a nexus affinitive association is created between the cnxpts, and given a weighting based upon that cncpttrrt commonality relationship scopx and weight.
- If one cnxpt has a purxpt that shares a purlieu concurrency or commonality relationship of some scopx with a purxpt of another cnxpt, then the cnxpts are presumed to be somewhat related to the same purlieu context, and a nexus affinitive association is created between the cnxpts, and given a weighting based upon that purlieu concurrency or commonality relationship scopx and weight.
- having a specific value (null is considered a value) in common for some attribute within each of the cnxpts' specification;
- having a value within a specific range for some attribute within the cnxpts' specification;
- having a value for an attribute of one cnxpt and a value for an attribute of another cnxpt meeting a specific comparison criteria;
- having in common a reference to or a linkage from an information resource by each of the cnxpts;
- having in common a relationship of a specific infxtypx and direction to or from a particular txo of a specific infxtypx from each of the cnxpts;
- having some percentage of one cnxpt's references to information resources in common with some percentage of the other cnxpt's references;
- having some percentage of linkages to one cnxpt in common with some percentage of linkages to the other cnxpt;
- by having some defined combination of the foregoing.

Nexus affinitive associations may be established manually by authorized users. Nexus affinitive associations are specific to fxxts. Nexus affinitive associations may be established by automated analysis, including but not limited to: semantic distance calculation, relevance analysis, fxxt analysis.

Summary Relationships

As used herein, the term "summary relationship" refers to a single relationship that is retained as a surrogate for a recalculation summarizing all appropriate relationships between two txos after a specific fxxt analysis.

Summary Associations

As used herein, the term "summary association" refers to a set of hierarchical and affinitive associations that summarize all directed or undirected relationships and to summarize all of their strengths. These associations are created during ontology reduction to prepare for hierarchy extraction and thus for visualization maps. Summarization of prior phase summary associations culminates in zero or one single top summary association between each pair of cnxpts for any given fxxt (or for one 'blank' fxxt).

To provide a better trade-off for performance, a series of summary associations can be retained rather than simply one. Each summary association has a infxtypx and will contain a calculated result based upon a set of prior phase relationships—relationships which were formed during a prior phase of analysis. Only one summary association may exist between two cnxpts for any pair of scopx, infxtypx, and fxxt. Summary associations are designed to be an input to fxxt analysis such that they do not need recalculation upon any recalculation of the fxxt. Summary associations are 'incrementally' recalculated upon changes to underlying data, meaning that only the needed changes are made to the summary associations that are impacted by underlying data changes.

In one embodiment, summary associations form a derivation tree result, where each specifically describes its calculation basis. The last summary association generated prior to fxxt analysis is called a 'BASIC VOTED' summary association.

The weight for the 'BASIC VOTED' summary association between two cnxpts in a fxxt is computed to be a combination (heuristically determined) of all more primitive (generated at a prior phase) summary relationships in the derivation tree, and provides a single weight for all more primitive relationships between those two cnxpts in a fxxt.

Note also that the system does not presume an acyclic directed graph. Because spanning trees will have to serve as hierarchies and the contents of the spanning trees may depend greatly upon the strength (calculated result) of the relationships here, that there will be times that what might seem to be a hierarchical association will end up looking like an affinitive association, and vice-versa. The calculations have to consider and include that nature.

In one embodiment, FXXT BASIS summary associations are derived from 'BASIC VOTED' summary associations as the last step prior to Fxxt Specification analysis.

In one embodiment, FXXT FINAL summary associations are derived from FXXT BASIS summary associations after Fxxt Specification analysis and are the last summary association generated prior to fxxt tree extraction.

Summary associations may have other characteristics such as, including but not limited to: values, scopxs, date applicable, timeframe applicable, horizon applicable, date created, creator, infxtypx.

Summary Hierarchical associations

As used herein, the term "summary hierarchical association" refers to a infxtypxd relationship summarizing the various relationships present between cnxpts into a single relationship that is retained as a surrogate for a recalculation of a specific fxxt. The primitive relationships summarized into the 'BASIC VOTED' summary hierarchical association include, but are not limited to: imputed categorical; custom hierarchical; other categorical; and negative hierarchical associations.

This is a directional relationship and is utilized for hierarchy extraction as an edge selection basis.

Summary Affinitive association

As used herein, the term "summary affinitive association" refers to a infxtypxd relationship summarizing the various affinitive associations present between cnxpts into a single relationship that is retained as a surrogate for a recalculation of a specific fxxt.

The primitive relationships summarized into the 'BASIC VOTED' summary affinitive association include, but are not limited to: nexus; functionally related; concurrent; coordination; custom affinitive; custom equivalence; genetic affinitive; and negative affinitive associations.

A summary affinitive association with a weight higher than a certain parameter set value indicates equivalence of the two cnxpts in that fxxt, and is used as an identity indicator.

Internal Attachment Relationships

As used herein, the term "internal attachment relationship" or "internal relationship" or "internal link" refers to a connection made internally between two objects.

Internal Information Resource Relationships

As used herein, the term "internal information resource relationship" refers to a relationship internally maintained between a CMM irxt and an object not considered a CMM info-item that is retained in the system.

Query Relationships

As used herein, the term "query relationship" refers to an infxtypxd binary relationship between goals or cnxpts and query txos representing queries which fully describe the query and its execution script. In one embodiment, multiple queries may be related to a goal or cnxpt.

Result Set Relationships

As used herein, the term "result set relationship" refers to an infxtypxd binary relationship between result set txos representing result sets and query txos representing queries.

Result Set Item Relationships

As used herein, the term "result set item relationship" refers to an infxtypxd binary relationship between rsxitems and result set txos representing result sets.

A form of hierarchical association called an "imputed cnxpt citation association" is automatically created between cnxpts based upon citations or references between information resources represented by the irxts linked to rsxitems in a result set, in preparation for map generation.

Derivation Relationships

As used herein, the term "derivation relationship" refers to a relationship between txos which states that a data dependency exists between one txo and one or more other txos, so that when the calculation specified on a txo is to be performed, the calculations specified on the txo(s) it is 'dependent' upon must first be completed.

Interest Relationships

As used herein, the term "interest relationship" refers to a relationship between ttxs which states that a user traversed from a cnxpt to another cnxpt.

Dxo Relationships

Dxo Information Resource Relationship

As used herein, the term "Dxo information resource relationship" refers to an internal attachment relationship between txos which states that a dxo is defined by or associated with an external information resource by link.

Relationships on Relationships

Relationship Creator Role

The relationship creator role states who created the relationship. One role of the relationship is filled by the info-item identifier of a user txo. The type of user and, optionally, their expertise, etc. are given by the user txo.

Relationship Source Role

The relationship source role states where relationship information was obtained. One role of the relationship is filled by the info-item identifier of a data set, a Result Set, a business, a URL (base site only) or some other source represented by a source txo. The type of source and, optionally, its usability, quality, expertise, etc. are given by the source txo. The relationship source is optional where a user is marked as creator.

Repository

As used herein, the term "repository" refers to an electronic or non-electronic knowledgebase holding repository documents, files (from file managers), articles (objects warehoused as indexed in a document manager), web pages, web based research papers, patents, information services and products, tpx listings (such as directories), etc. Heterogeneous repositories hold one or more document, article, or object types.

Requirement or Needs

As used herein, the term "requirement" or "need" refers to a trait of an appcept that a user or engineer may use to describe requirements of an appcept, application domain, or product line, or a need or other requirement.

Result Sets

As used herein, the term "result set" refers to the data returned from the successful execution of an operation including, but not limited to: a query, an import, an analytic execution, a manual creation, and a culling of a predecessor result set. Result sets provide for manageable lists of rsxitems of many natures, including but not limited to: environmental scanning scan hit tracking, query retrieval lists. Result sets may contain single ttxs or single txos as rsxitems. Result sets may contain info-items other than ttxs as rsxitems. Result sets may contain data other than info-items as rsxitem characteristics.

A Result Set is a specialization of a selection set, and carries more properties.

In one embodiment, result sets persist so that they may later be reviewed and so that knowledge is retained of actions including, but not limited to: rsxitems added, rsxitems eliminated (culled out), and rankings assigned to rsxitems returned as results of a search. The rsxitem data is marked with a source attribution, a source script ID, etc. Specializations of Result Sets include but are not limited to: Ad Hoc Resultant-DataSets, Ttx Result Sets, Txo Result Sets (capable of holding a wide variety of txos), and Collateral Information Resources Result Sets. In one embodiment, result sets may be named and may be exported, imported, deleted, and saved. The characteristics of the items in a result set are uniform to some specific degree for each type of result set. Result sets may contain many items of one type, or may contain items of different types that share some characteristic that allows the query to find them all. Any kind of result set may be formed as long as the items found can be referenced in some way by (internally linked to) rsxitems.

Result sets are related by result set relationships to, including but not limited to: queries, goals, or cnxpts. Result sets may be considered to represent groupings of ttxs where they contain cnxpts. Result sets containing cnxpts may be considered to represent sets of ttxs which are successors, children, or subtypes of a target ttx (represented by a goal of a cnxpt), sets of ttxs which are predecessors, parents, or supertypes of a target ttx, or simply without any consideration about relation direction.

The query command is simply one way to initially populate a result set. Result sets, in one embodiment, can be manipulated manually (culled) and combined using Boolean operations, etc.

Culling allows adjustment of relevance of rsxitems. In one embodiment, the user may alter the relevance ranking of all rsxitems by culling.

In one embodiment, as the user clicks on an entry in the result set, the user's click will be recorded as a vote for the listed item's relevance. The utility of this is that the user will be assisted in weeding out irrelevant 'matches'. In culling, a Rsxitem may be 'added', 'seen' (displayed in the listing page as in a present day search engine result page listing), 'touched but not rejected' (clicked on as in a present day search engine result page listing), 'rejected' (marked as not relevant), 'relevant' (marked as relevant), 'deleted', or merely 'kept unseen'. Each of these yields a strength of relevance for the relationship of the item to the goal.

In one embodiment, when the result set contains cnxpts, the culling tool will show the result set as a visualization of the Area of Consideration, offering the user the opportunity to transform the area into an Area of Interest by marking cnxpts as relevant or less germane. As the user clicks on an info-item in a visualization or an entry in a list of info-items, the user's click will be recorded as a vote for the cnxpt's relevance to the goal. The utility of this is that the user will be assisted in weeding out irrelevant cnxpt 'matches'. These culling operations result in relevance setting script commands.

In one embodiment, when the result set contains information resources, a list of locators are collected into the result set and the culling tool will show the result set so that it appears, in one embodiment, to a user like the traditional search result page. In one embodiment, the user reviews the list to cull the result set in a manner that is familiar to users using traditional web search engines. As the user clicks on an entry, the user's click will be recorded as a vote for the information resource's relevance. The utility of this is that the user will be assisted in weeding out irrelevant information resource 'matches'.

In one embodiment, these culling operations result in relevance setting script commands which are added to the query script, such as add and remove script commands, and the Boolean operations are added as set operation script commands In one embodiment, result set rsxitems are workflow process managed, such that a workflow for an rsxitem type may be defined, and that rsxitem will be 'flowed' through the workflow process. As it is displayed, the workflow status may be displayed for the rsxitem. Workflow tools for the rsxitem type are provided as system plugins or specifications for a workflow manager Result Set Items→rsxitems As used herein, the term "result set item" refers to a single object returned from the successful execution of a query. Rsxitems are linked by internal relationships to info-items which actually are the results of the search. These "rsxitem locators" relate some type of data to the result set, including information resource locators that may identify external information resources by reference.

Rsxitems are related by result set item relationships to result sets.

Ttx Result Sets

As used herein, the term "ttx result set" refers to a list of cnxpts produced from, including but not limited to: creation of a result set, execution of a specific analytic, or an import; and marked as rsxitems.

Txo Result Sets

As used herein, the term "txo result set" refers to a list of, including but not limited to: cnxpts, purxpts, trxrts, other txos. The txo result set is produced from, including but not limited to: creation of a result set, execution of an analytic, or an import; and marking of info-items as rsxitems.

Occurrence Result Sets

As used herein, the term "occurrence result set" refers to a list of txos which are in an occurrence relationship to a ttx that is produced from, including but not limited to: creation of a result set, execution of an analytic, or an import; and marking of info-items as rsxitems.

In one embodiment, a tpx may be found by a query and a cause the creation of a temporary representative txo (with descriptive summary information and metadata about the tpx), then marking the txo as an rsxitem for the result set. In one embodiment, this would also form an occurrence relationship vote between the goal or a resulting cnxpt and the txo. Existing txos would be used rather than creating new txos where they exist for the tpx.

The appropriateness of the tpx relationship to the ttx remains unsettled until further action is taken by a user, and thus given a very low weighting, until the user examines the item during the process of result set culling. The txo's inclusion in the result set and its occurrence relationship with the goal are tentative, since the user may not have been pleased with the results found. If the user has an opportunity to cull (pick and choose from) the result set, a weighting is given to the relationships between the txo and the goal/cnxpt based upon whether the item is irrelevant (a negative weight), relevant (a medium weight), or fully define (high weight) the ttx according to the nature of the query., then he will be setting relevance ranks for the items in the result set and also establishing more permanent relationships between the items and the resulting cnxpt. This process refines the ontology's understanding of the ttx as he means it by connecting relevant occurrence items to the goal.

Information Resources Result Sets

As used herein, the term "information resources result set" refers to a list of temporary irxts for newly added information resources produced from, including but not limited to: creation of a result set, execution of an analytic, or an import; and marking of info-items as rsxitems.

In one embodiment, an irxt, with descriptive summary information about the information resource (metadata), may be created by a query and marked as an rsxitem. In one embodiment, this would also form an occurrence relationship vote between the goal or a resulting cnxpt and the new irxts. Existing txos would be used rather than creating new txos where they exist for the information resource.

The appropriateness of the information resource is unsettled, and thus given a very low weighting, until the user examines the item during the process of result set culling, so the relationships with the goal are tentative, since the user may not have been pleased with the results found. If the user has an opportunity to cull (pick and choose from) the result set the items that are irrelevant (a negative weight), relevant (a medium weight), or fully define (high weight) his ttx, then he will be setting relevance ranks for the items in the result set and also establishing more permanent relationships between the items and the resulting cnxpt. This process refines the ontology's understanding of the ttx as he means it by connecting relevant occurrence items to the goal.

Ad Hoc Resultant Data Tables

As used herein, the term "ad hoc resultant data tables" refers to a special form of Result Set formed from a data table created by, including but not limited to: a result of a specific analytic, or an import. The tables are created as needed. The data is marked with a source attribution, a source script ID, etc. The structure of the table is based upon the data obtained but is specified by the analytic or import module, and has a form akin to a Result Set, where the rsxitems have characteristics defined by the specific analytic or import and values from the analytic or import.

Result Set Arithmetic

As used herein, the term "result set arithmetic" refers to the merging into a single result set one or more other goal result sets, query result sets, or other result sets, or selection sets, according to, including but not limited to: a Boolean logical formula.

Resultant-DataSets

As used herein, the term "resultant-DataSet" refers to a DataSet packaged from, including but not limited to: a result set, an ad hoc resultant data table, a result of a specific analytic, or an import; and registered as confidential and unpublishable, and offered for consignment sale. The tables are created as needed. The data is marked with a source attribution, a source script ID, etc. The structure of the table is based upon the data obtained but is specified by the result set structure, the analytic, or the import module.

Scanning Term

As used herein, the term "scanning term" refers to a search term used in environmental scanning (the searching of the 'world' for competitive information), for which the returned results (scan hits) must be managed during the query process and a record of the query term and results are kept for reference.

Scopxs, Access Control Lists, and Fxxts

Scopx

As used herein, the term "scopx" refers to an external markup mechanism based upon a context in which a statement is true about a ttx or a characteristic of the ttx. The scopx represents the context within which a statement is valid, or a negative scopx represents the context within which a statement is false or invalid in a context, may be specified, but it is impossible to apply both a positive and a negative scopx for the same scopx. Outside the context represented by the scopx the statement is not known to be valid, but may still be useful in a circumstantial inference. Definitions of info-items which are statements which may have a scopx constraining the usefulness of the statement to a context include but are not limited to whether: the ttx exists within a scopx; a ttx has a particular characteristic; a ttx attribute has a certain value; a name, description, or an occurrence is assigned to a given ttx; a relationship exists within a scopx; two ttxs are related through an association; a ttx exists within a scopx where an attribute value of a cnxpt satisfies a criteria; or a relationship is valid in the scopx where an attribute of the relationship satisfies a criteria. Scopxs are intended to apply to ttx related information rather than structural tpx information, with the exception that structural tpx information (including txos and relationships) are scopxd where it is related to, including but not limited to: localization, system customization, and versioning.

This definition varies from the TNMS description of scopes. Unlike the TNMS, here a scopx is specified in a single scopx txo that defines the context. The multiple scopx specifications defined in the TNMS are defined here by the fxxt. That is, a statement here is known to be valid in the context specified by the scopx where the tpxs represented by the scopx txo are applied, regardless of whether other scopx txos apply. A fxxt defined on a set of scopx txos together define a context. That is, the statement is known to be valid only in a context defined by a fxxt where all the scopx tpxs represented by scopx txos in the fxxt formula, in that combination, apply.

As used herein, the term "scopx" is also intended to refer to entity facets or attribute facets as may be commonly defined elsewhere (in older versions of the Topic Map standards).

Context scopxs are additionally used to facilitate, including but not limited to: the extraction of multiple, concurrent views of sets of info-items; extraction of corporate or personal views of sets of info-items; utilization of multilingual variants; qualifying the content and/or data contained in info-items as specialized ttxs or relationships to enable analysis and varied treatment; bringing ttxs nearer to each other to enable navigation between them; filtering to create views adapted to specific users or purposes; structuring unstructured info-items, or merging unstructured information bases with structured ones. Multi-lingual variants allow, as an example, the ttx "Dog" to have the label "dog" in the context of the English language, "le chien" in French, and "das Hund" in German.

Concurrent views may be, including but not limited to: ad hoc, object oriented, relational, hierarchical, filtered, or a combination of these. Scopx properties assigned to info-items support:

Personal Scopxs

As used herein, the term "personal scopx" refers to a specialization of a scopx by who has defined the scopx. Scopxs can be defined and utilized by a user; a user may share and make public scopx definitions. A user may define a scopx and apply it to any set of ttxs, relationships, or other information that is susceptible to scopxing and that a user is authorized to apply.

Scopx Info-Item

As used herein, the term "scopx info-item" refers to a specialization of a txo that represents the applicability of a constrained statement specifically to another info-item or characteristic it is assigned to. Scopx contexts are defined by a collection of such txos that each can be assigned to an info-item. To apply a particular scopx to a ttx or characteristic, a scopx txo name is assigned to, including, but not limited to: a cnxpt, a cnxpt name, a cnxpt attribute, a purlieu relationship, a cncpttrrt relationship, an occurrence relationship, or an association so that the statement is true for all cnxpts in the association, or, in the case of attributes where a criteria is specified for the scopx, whether the attribute value meets the criteria. The default scopx is where no scopx is assigned, and is known as the unconstrained scopx. An unconstrained scopx implies that no specific context statement is true for the object, but also that no specific context statement is false for the object. An example of the use of scopx is in language. For Finnish, "Suomi" is the name of the country Finland. This corresponds to assigning the cnxpt name "Suomi" to a cnxpt representing Finland, and scopxing it with a scopx txo representing Finnish.

Security Scopx

As used herein, the term "security scopx", "access control list", or "ACL" refers to a specialization of a scopx by who has access to information controlled by the scopx. Security Scopxs implement one access control mechanism on the CMMDB data.

Fxxt

As used herein, the term "fxxt" refers to a way in which txos and relationships can be classified. Fxxts are calculated partitionings, based upon specifications. Fxxts are also tags which may be assigned to info-items and relationships. Scopxs and fxxt tags, and calculation specifications are used to define fxxts, to create a second level external markup mechanism for the CMM. Fxxt specifications specify the fxxt and scopx tags which define the partitioning, but fxxt specifications may also involve 'soft' requirements where info-items are selected-in by property values and where fxxt partitions are subject to set arithmetic to form a resultant partitioning. An info-item or relationship may lie in more than one fxxt. Fxxts provide for pre-filter extraction based on properties of the cnxpts and the relationships they are involved in.

The 'blank' fxxt includes all instances of info-items of all info-item types for which a fxxt may be specified. Where a 'blank' fxxt is specified on an info-item, that info-item is simply not being defined in a fxxt. Where a 'blank' fxxt is specified in a search criteria, the search is not constrained by fxxt.

At any specific time, a fxxt contains a class of cnxpts and associations, the members of which share characteristics that distinguish them from members of other classes. Specifically, the membership in the grouping of cnxpts is determined by meeting one or more of the following criteria as stated in the fxxt specification:

- the type(s) of cnxpt matches the fxxt specification;
- one of the type(s) of relationships that the cnxpt currently participates in matches the fxxt specification;
- a specific value (null is considered a value) for some attribute within the cnxpts' description matches the fxxt specification;
- a value for some attribute within the cnxpts' description is within or overlaps a specific range stated in the fxxt specification;
- a value in an attribute of one cnxpt and a value in an attribute of another cnxpt meeting a specific comparison criteria in the fxxt specification; and/or
- having some defined combination of the foregoing.

Inclusion into the class may also occur by 'inverse extension' whereby cnxpts within the fxxt are 'children' of cnxpts not already in the fxxt, but the parent cnxpts are added to the fxxt because of the relationship relative to the fxxt. For fxxts based upon relationship participation, the relationships in which the cnxpts participate in the way specified are also a part of the fxxt.

A cnxpt may lay in more than one fxxt. Fxxts may be merged to form other fxxts. Two fxxts may be combined or operated on by Boolean operations to form other fxxts. Combined fxxts include the relationships which were in either of the combined fxxts and which relate cnxpts which are members of the combined fxxt after the operation.

Derived ontologies may be defined as external markup mechanism 'containers'. A fxxt is not a real 'container' but is a 'virtual derived ontology'. The 'blank' fxxt is one 'virtual derived ontology'.

Categorizations are not always agreed upon by multiple users. Worse yet, as deep categorization is used, the disagreement grows in a fashion that a mechanism needs to be used to manage the consensus building. When different fxxts of categorization are used, the need expands exponentially Hierarchies in the CMM are often partial orderings of the CMM cnxpts in that a hierarchy built from one relationship scopx and infxtypx and txo type may not encompass a vast majority of the ttxs in the CMM. Fxxts provide a structure for grafting together various relationship to form deeper hierarchies for display and other use. Hierarchies extracted from the CMMDB ontology may contain many contradictory relationships, and the ordering of categories may change from one extraction to another regardless of fxxt.

As used herein, the term "fxxt" is not intended to refer to entity facets or attribute facets as may be commonly defined elsewhere. Fxxts here deviate significantly from facets as defined in various Topic Map standards In one embodiment, the contents of the CMMDB may be viewed by fxxt. Viewing by a fxxt is an extracting process where the extract contains a subset of the txos and relationships from the CMMDB which are defined to be in that fxxt according to a Fxxt Specification. To use a fxxt as a base of a search, find, or query is the equivalent of limiting the information to be retrieved by what is classified as being in the fxxt.

To use a fxxt as a base of a search, find, or query is the equivalent of limiting the information retrieved by what is considered to be in the fxxt.

Fxxt analysis provides for changing the type of data retrieved with regard to:

the set of types of txos and dxos to show;

the relationships used for calculating the positioning of the txos and dxos;

the depth of categorization of txos and dxos where categorization is involved;

other parameter effects.

Personal Fxxts

As used herein, the term "personal fxxt" refers to a specialization of a fxxt by who has defined the fxxt. Fxxts can be defined and utilized by a user; a user may share and make public fxxt definitions.

Fxxt Calculation Scripts

Fxxt calculation scripts are made up of fxxt calculation step descriptions, one per step in the script.

Fxxt calculation step descriptions for info-item validity, existence, membership in a fxxt, Fxxt Calculation Step, generation, and summarization each contain a three part test. Part one ('search criteria') is a general search criteria for locating cnxpts to test, part two ('necessary criteria test') specifies all test criteria that must be satisfied by an info-item, and part three ('action to take') states the precise action to take if an info-item found by the 'search criteria' actually satisfies all necessary criteria.

To generate the list of cnxpts in a fxxt based upon calculated fxxts, for each non-base fxxt, the fxxt specification based calculation is executed on each info-item meeting the general search criteria of part one to determine if the info-item is to be subject to the more specific tests of part two, and then the precise action to take in part three of the step.

Derived Ontologies

In one embodiment, derived ontologies are utilized to control fxxt membership setting on a 'set' basis. Derived ontologies are the result of a fxxt calculation. Derived ontologies are initially empty, and are filled or otherwise altered by the fxxt calculation. More than one derived ontology may be created or utilized during a Fxxt Specification analysis. A resulting derived ontology may exist prior to the step or may be newly created by the step.

In one embodiment, derived ontologies are constructed by marking of additional elements in the fxxt summaries tuples with a derived ontology identifier which identifies a derived ontology txo specifying a fxxt identifier and Fxxt Calculation Step identifier generating the derived ontology.

In one embodiment, derived ontologies are constructed by marking of info-items in the CMMDB with an additional txo property implemented by a tuple consisting of derived ontology identifier, fxxt identifier, Fxxt Calculation Step identifier generating the derived ontology, weight.

A fxxt calculation step is an operation on a derived ontology, according to a step's description, to combine derived ontologies from prior fxxt calculations, to alter a derived ontology by, including but not limited to: an extension step causing the inclusion of more cnxpts and relationships from the ontology into the fxxt, a generating step adding new temporary cnxpts or relationships, a combination step performing a Boolean operation on then existing derived ontologies, an elimination step, a weighting step, a summarization step, or a consensus tallying step. Each of the fxxt calculation steps operates on the derived ontology as constructed by the previous step(s) in the script.

Fxxt Calculation Step Types

Ontology Combination Steps

In one embodiment, derived ontologies resulting from prior fxxt analysis or from a prior calculation step may be combined according to a Boolean logical formula to form a derived ontology.

Combined fxxts include the relationships which were in either of the combined fxxts and which relate cnxpts that are both members of the combined fxxt after the operation. If the same relationship is found in two or more of the fxxts being combined, then the 'committed differentiations' of the fxxts are re-combined into a new 'committed differentiation' for the combined fxxt.

Generation Steps

Additional cnxpts and relationships may be generated during the resolution of a fxxt specification, where, including but not limited to: an analytic is applied during the fxxt calculation, summarization are performed.

Extension Steps

In one embodiment, an extension fxxt calculation step describes a set of cnxpt and relationship info-items valid in a specified combination of infxtypxs and scopxs in the source, and a specified set of rules for treatment of cnxpt and relationship info-items with unconstrained scopx in the source, to merge into the resulting derived ontology for the fxxt. The source of the info-items may be the full CMMDB or a derived ontology resulting from a prior fxxt analysis or from a prior calculation step.

For fxxts based upon relationship participation, the way that a relationship is used in the addition of a cnxpt must be taken into consideration throughout the use of the fxxt. To do so, relationships are given 'committed differentiations' for each fxxt if a difference between the basic relationship and the meaning used to make the Fxxt Calculation Step is found. These exist for the life of the fxxt, but are used as steering hints for each reconstruction of the fxxt and for other new fxxts to provide a familiarity to the user viewing the CMMDB through the use of the fxxt. This technique has the utility of allowing a user to more easily match his mental map (as previously learned) to the present CMMDB.

Access and Retention Steps

Fxxt calculation step descriptions provide rules for granting accessibility and retention specifications.

Weighting Steps

In one embodiment, weighting factors may be specified in the fxxt calculation step description for increasing or decreasing importance of, including but not limited to: relationships, identity indicators, similarity strengths, votes.

Ordering Steps

In one embodiment, ordering rules may be specified in the fxxt calculation step description for, including but not limited to: information prioritization for reduction, path reordering, title or name ordering; relationship elimination priority, cnxpt elimination priority, dxo elimination priority; path construction decisions.

Summarization Steps

In one embodiment, summarization rules may be specified in the fxxt calculation step description for, including but not limited to: information hiding, information reduction, path shortening, title or name shortening; relationships elimination, cnxpt elimination, dxo elimination, interest information reduction, identity indicator alteration or reduction, similarity strengths summarization, vote summarization.

Fxxt Calculation Step Parameters

Each fxxt calculation step description takes a set of parameters. Various methods of specifying the parameters for a step in a query are available, including but not limited to:

- choosing of values of parameters from menus: In this method, a wizard presents list of parameters and their values from which to choose.
- query language. This is the most complex method, but it is also the most powerful.
- specialized query commands formed from parameterized requests for invocations of analytics. Each calculation step may require iterative invocations on the fxxt and may utilize the fxxt as constructed by the previous step(s) in the script.
- Boolean operation commands on fxxts.

Fxxt Analysis Algorithm

As used herein, the term "fxxt analysis algorithm" refers to a method for interpreting the fxxt calculation step descriptions of a fxxt calculation script to determine info-item validity, existence, and membership in a fxxt.

Fxxt Analysis Algorithm Iterations

The methods for interpreting the fxxt calculation step descriptions of a fxxt calculation script to determine info-item validity, existence, and membership in a fxxt are differentiated by the nature of iteration. The choice of iteration is controlled by a system parameter setting, and the choices include but are not limited to:

- Each fxxt extension, generation, or summarization step is executed until it finds nothing to add, and then the next extension is executed.
- Each fxxt extension, generation, or summarization step is attempted multiple times, in the order they appear in the script, each until it finds no changes to make, but collectively until no extension, generation, or summarization step is able to alter the derived ontology. Then each of the non-extension, non-generation, and non-summarization steps are executed until all are complete.
- On each iteration, all steps up to and including the currently considered step are executed successively, and repeated successively in order until no new txos can be found to be added.
- Each fxxt calculation step description independently specifies how it, and its predecessors, is to be considered.

Defined Fxxt Specifications

In one embodiment, base fxxts based upon the representing info-items include but are not limited to:

- Fields of Science (classification of tcept by field of science, patent index category, Derwent category, etc.): Txpts representing fields of science, sub-fields of science, fields of study, sub-fields of study, academic discipline, and tcepts which are clearly within those fields or sub-fields of science or study as defined by an is-a association to one of those fields.
- Prior Art (prior art existing prior to new entries): Txpts representing base tcepts that are reduced to practice and other tcepts that are defined or described before a base tcept.
- Cited: Txpts representing base tcepts that are cited by some other information resource.
- Application: Txpts representing tcepts that are 1) defined to be an application of another tcept, plus any cnxpt that is 2) defined as an appcept. In one embodiment, each such cnxpt would either 1) have an 'application of' relationship from it or 2) would have a type attribute set to show that it is an appcept.
- Patented: Txpts representing tcepts that have been described by an issued patent. In one embodiment, each such cnxpt would have a non-null value in the attribute for 'patent number'. By extension, the fxxt would include cnxpts which included these 'patented' cnxpts as members by an 'is-a' or 'is subclass of' relationship.
- Research: Txpts that a user has classified as research and are not patented and not productized.
- Science Fiction: Txpts that a user has classified science fiction and are not patented and not productized.
- Independent: Txpts representing tcepts which have been described by an issued patent and are the tcept specifically defined by an independent claim of the patent. In one embodiment, each such cnxpt would have a non-null value in the attribute for 'patent number', a non-null value in the attribute for 'claim', and would have 'independent' as the value in the attribute for 'claim type'.
- Dependent: Txpts representing tcepts that have been described by an issued patent and are the tcept specifically defined by a dependent claim and all of the dependent and independent claims above it. In one embodiment, each such cnxpt would have a non-null value in the attribute for 'patent number', a non-null value in the attribute for 'claim', and would have 'dependent' as the value in the attribute for 'claim type'.
- Member: Txpts representing base tcepts that each have an 'is-a' relationship with another cnxpt.
- Funded: Txpts representing tcepts that have a non-zero value for their 'FUNDING' attribute. Note that no relationships are present in this fxxt, but that cnxpts in this fxxt may be related to other cnxpts.
- Unfunded but Patented: Txpts representing tcepts that have been described by an issued patent but that have a zero or null value for their 'FUNDING' attribute. In one embodiment, this fxxt may be formed by a subtraction of the Funded fxxt from the Patented fxxt.
- Superclass to narrower subclass.
- Competitive Product.
- Organization Heredity.

In one embodiment, basic fxxts will be predefined for, including but not limited to:

- Field of Science to most recent technology cnxpt by: Specific Field of Science cnxpt as root; and by relationships including 'is-a' or 'is subclass of'; Member; Cited; Predecessor—Successor; Prior Art; Incremental innovation relationships to other cnxpts.
- Application Domain to most distant axpt by: Specific Application Domain appcept as root; 'is-a' or 'is subclass of' relationships to other axpts.
- Field of Science to most recent TPL cnxpt by: Specific Field of Science cnxpt as root; and by relationships including 'is-new-understanding-of' or 'is sub-science of'; Incremental research result relationships to other cnxpts.

In one embodiment, fxxts calculation step template selections will be predefined for, including but not limited to:

- the infxtypx(s) of cnxpt;
- the infxtypx(s) of relationships that the cnxpt participates in;
- having a specific description (lack of a description or a null are considered a specific description) in common for some trxrt for each of the cnxpts;

having semantically similar descriptions for some trxrt for each of the cnxpts;

having an overlapping context for some purxpt for each of the cnxpts;

having a text string (regular expressions used) in common for some trxrt for each of the cnxpts;

having a specific value (null is considered a value) in common for some attribute within each of the cnxpts' description or characteristic;

having a value within a specific range for some attribute within the cnxpts' description;

having a value in an attribute of one cnxpt and a value in an attribute of another cnxpt meeting a specific comparison criteria;

Innovation by same individual;

Competitive tcepts.

inverse extension whereby cnxpts within the fxxt are 'children' of cnxpts not already in the fxxt, but the parent cnxpts are added to the fxxt because of the relationship relative to the fxxt; and/or by a Boolean combination of two fxxts; and/or by having some defined combination of the foregoing.

Each description takes a set of parameters. The parameters include but are not limited to:

For determining fxxt content, including but not limited to:

- sets of scopxs;
- sets of infxtypxs;
- sets of access control identities;
- sets of relationships with specific scopxs;
- sets of cnxpts with specific scopxs;
- sets of relationships with specific infxtypxs;
- sets of cnxpts with specific infxtypxs;
- for cnxpts, limited SQL-like select statement where-like clauses containing, including, but not limited to:
  - characteristic constraint values ranges of cnxpt attributes;
  - characteristic constraint calculation formulas for the value of cnxpt attributes;
  - characteristic constraint calculation formulas for the types of cnxpt txo properties;
  - pairs of characteristics and comparison expression constraint and, optionally, constraint values ranges or calculation formulas for the values for the cnxpts;
- for relationships, limited SQL-like select statement where-like clauses containing, including, but not limited to:
  - characteristic constraint values ranges of relationship attributes;
  - characteristic constraint calculation formulas for the value of relationship attributes;
  - characteristic constraint calculation formulas for the types of relationship txo properties;
  - pairs of characteristics and comparison expression constraint and, optionally, constraint values ranges or calculation formulas for the values for the relationship attributes;
- invocation parameters for analytics;

For determining fxxt summarization:

- Path reduction rules
- Identity Indicator summarization rules
- Association summarization rules
- Category summarization rules For determining fxxt usage:

- Analytic utilization Rules
- Identity Indicator utilization Rules
- Weighting Rules for relationships
- Calculation Formulas for relationships (mapping functions);
- Calculation Formulas for cnxpts;
- Graphical treatments;
- rules for granting accessibility;
- retention specifications.

For determining fxxt value usage:

- Scopx—Specifies use of specific scopx for value usage
- Collation—Specifies the collating sequence (or sorting sequence) to be used when performing comparison and ordering operations on values of each property.
- Concurrency Mode—States that the value of the property should be used for optimistic concurrency checks.
- Default—Specifies the default value of the property if no value is supplied upon instantiation.
- Nullable—Specifies whether the property can have a null value.

In one embodiment, any cnxpts and relationships specified that do not exist are added to the ontology on a temporary basis. In an alternative embodiment, such added cnxpts and relationships are made permanent. In another embodiment, the specification states how the added cnxpts and relationships are to be treated.

Fxxt Based Inheritance

As used herein, the term "fxxt based inheritance" refers to inheritance from parents to children only within a fxxt.

Fxxt Based Inverse Inheritance

As used herein, the term "fxxt based inverse inheritance" refers to inheritance from children to parents only within a fxxt.

Fxxted Classification

As used herein, the term "fxxted classification" refers to a subdivision of the CMMDB by those info-items in and not in the fxxt, and then the determination of hierarchy based upon the association and imputed categorical associations between cnxpt info-items in the fxxt. It also refers to the description of the resulting hierarchy by use of a fxxt name where a cnxpt is a member of more than one referenced fxxt or of more than one scopx included in the result of the fxxt analysis, such as Tatented:Applications' which refers to those cnxpts which are patented and which are axpts.

Unconsidered Fxxt Relationships

As used herein, the term "unconsidered fxxt relationships" refers to the set of relationships "not considered" to be in a fxxt (the "not considered" set also including the set of "undifferentiated" meanings of relationships where a "committed differentiation" is already present in the fxxt). Due to the ordering of operations used to combine fxxts, in some fxxt analyses it is possible that relationships that were not present in either source before the operation might properly be considered a part of the combination step result. The order of operations for combining fxxts may be changed to result in their inclusion. Those relationships (or certain relationship meanings) that could be included in a result but are not because of the ordering of operations are defined to be "not considered".

Fundamental Fxxt Category

As used herein, the term "fundamental fxxt category" of a hierarchy within a specific fxxted classification refers to the highest parent in that hierarchy. That category must be a cnxpt in a fxxt, and must not be a child of any cnxpt in that fxxt.

Searching

As used herein, the term "searching" refers to the finding and retrieval of data inside the CMM, hidden in any number of fields in the CMM. The result of the search depends upon the search type and search parameters used. See also 'Finding', 'Querying' and 'Goals'.

Searching retrieves data into a result set, and the data may be outside of the view presently holding the focus, either increasing the content of the view as needed or generating a new view where the data in the view includes all info-items containing the search string.

Selection Set

As used herein, the term "selection set" refers to those dxos and txos that have been selected on a visualization or added manually.

Operations can be performed on selection sets. Selection Sets may be named, saved, referenced, visualized, exported, imported, and restored. Selection Sets may be added to, or converted to or from, including but not limited to: results sets, areas of interest, areas of consideration.

A user indicates that one or more displayed objects are important or are to be the subject of a user action. At times this selection set may get very large due to the use of 'find's or other tools. No user wants to lose the work involved in building and using these selection sets. Often, the user will want to make use of a selection set on multiple views or different basic sets of data. They may also want to save the selection set across sessions.

A selection set is a super-type of, including but not limited to: Area of Interest, Area of Consideration, Result Set.

Serendipitous Discovery and Update

As used herein, the term "Serendipitous Discovery and Update" refers generally to the user's ability browse displayed ttx areas and discover ttxs that are tangentially related, but important to their search goal. It also includes the user's determination that a ttx is missing or not apparent where it should be, thus then allowing for the ttx's entry or update to make it appear where it should be.

Software

As used herein, the term "software" refers generally to programming, documentation, rules, configuration settings and configuration policies, and more specifically to framework components. Framework components in combination enable the operation of the system apparatus as defined below. Software is comprised of analytics, scripts for methodologies, surveys, workflows, websites, configuration information, knowledge content, applications, or infrastructure software.

Statement

As used herein, the term "statement" refers to a claim or assertion about a ttx. Statements include but are not limited to: ttx characteristics, descriptions, names, name variants, occurrences, purxpts, trxrts, and associations; whereas assignments of identifying locators to cnxpts are not considered statements.

Stigmergy

As used herein, the term "stigmergy" refers generally to the simple rules used to coordinate the efforts of many individuals without heavy controls. The term, whose Greek components mean "mark" (stigma) and "work" (ergon), is where individuals who follow extremely simple rules and have no memory of either their own or other individual's actions still manage to coordinate their efforts so as to produce a collective result. They coordinate their actions without direct communication.

Survey

As used herein, the term "survey" refers generally to a series of questions about a ttx, or about the parts or particulars of a ttx, to assist a user in developing including but not limited to: a description, or ascertaining characteristics, attributes, relationships, or the condition, quantity, or quality, such as to find the contour, dimensions, position, or other particulars of the ttx, or to find new alternatives or extensions of a ttx, by asking a series of probing 'closed' questions. It may also seek answers regarding a wide array of other information regarding plans, approaches, etc.

Examples of surveys, include but are not limited to: Methodology Questionnaires; Incomplete Answer Questions.

Template

As used herein, the term "template" refers generally to a starting point provided as a basis for each customer defined object, request, etc.

Topic Navigation Map Standard (TNMS)

As used herein, the term "TNMS" refers generally to the Topic Navigation Map Standard, an international industry standard (ISO 13250) for information management and interchange. Because the logical objects of the present invention may easily be compared against the standard's TNMS Data Model, here the mapping to that model is given specifically.

Topic Map Fundamentals

Topic Mapping is an attempt to capture the essence of these models of the structures of knowledge to facilitate the process of merging modeled indexes together. The core of topic maps can be summarized very succinctly: a topic map consists of a collection of topics, each of which represents some subject. Topics are related to each other by associations, which are typed n-ary combinations of topics. A topic may also be related to any number of resources by its occurrences.

Thesaurus

As used herein, the term "thesaurus" refers to the browsable, interactive, expandable list of word and terms used to suggest related keywords based upon those used by other users. A Context Thesaurus shows keywords that exist in the result set under review. Keyword phrases are thesaurus entries, not cnxpt names.

A thesaurus can act as a search aid by providing a set of controlled terms that can be browsed via some form of hypertext representation. The CMM provides this sort of thesaurus by the display of related ttxs—siblings or dxos that are related as shown by proximity on the map. This can assist the user to understand the context of a ttx, how it is used in a particular thesaurus and provide feedback on number of postings in the thesaurus for terms (or combinations of terms). The inclusion of semantic relationships in the index space, moreover, provides the opportunity for knowledge-based approaches where the system takes a more active role in building a query by automatic reasoning over the relationships. Candidate terms can be suggested for a user to consider in refining a query and various forms of query expansion are possible. For example, items indexed by terms semantically close to query terms can be included in a ranked result list and imprecise matching between two media items is useful in 'More like this' options that may be presented to the user. The basis for such automatic term expansion is some kind of semantic distance measure, often based on the minimum number of semantic relationships that must be traversed in order to connect the terms. This system provides the ability for the user to simply hide all of these types of result sets until they 'take a turn' in traversing to begin flying thru a nearby ttx rather than continuing their fly-through directly deeper into the 3D map.

Themes

As used herein, the term "theme" refers to members of a set of scopxs where a scopx is specified as consisting of a set of topics. Each theme contributes to the extent of the scopx that the themes collectively define; a given scopx is the union of the subjects of the set of themes used to specify that scopx. The theme is a carryover from the Topic Map Standard (ISO 13250, 1999).

Ttx Hunting

As used herein, the term "ttx hunting" refers to the process of finding ttx identified, present in, connected with, or cited by a source. In one embodiment the sources may include, but are not limited to: a website, a search engine, submissions, surveys, or a document management system.

Tour

As used herein, the term "tour" refers to the ordered set of visits made by a user to dxos in a visualization Another way to think of a tour is what a user would see as they navigate through a visualization during some period of time. Tours may be recorded, saved, and named. Named tours may be used by those sharing a map so that one user may properly describe what they see to another user viewing a map simultaneously or on a different display or at a different time.

TPL

As used herein, the term "TPL" or "Theories, Principles, Laws" refers to an innovative methodology to utilize changes seen in scientific theories, engineering principles, or laws of nature to determine the aging of a technology engineered to operate in a use or environment where those theories, principals, or laws must be reckoned with to achieve design success. The methodology is evident where the example of where the theory of wingtip vortices improved and thus winglets were added as design features, and an older aircraft wing design became obsolete, requiring engineering changes. This example shows that a predictor is available from detecting significant changes occurring in the theory applicable to the design, here such as the theory of wing vortices. The design of wings must also take into consideration laws of aerodynamics, low and high temperature principles, etc. As each of these theories, principles, or laws is developed, some 'tweak' of the basic technology is needed to improve or modernize the technology. As a large number of important changes are seen, the older technology will be inefficient and obsolete. If the rate of change in a 'relevant' theory, principle, or law is high, the rate of innovation should be high if the market is in need of solutions. This technique varies from the TRIZ 'Laws of Technical Systems Evolution' which is also useful in prediction (see below). In a limited view, the TPL methodology is similar to the use of "scientific effects" of TRIZ to determine 'ideality', but TPL analysis varies as it provides an indicator of a gap based upon an unaddressed new understanding of a theory, law, principle, practice, or other guiding framework which forms a design criterion.

TPL methodologies are also applicable to legal work and this system's applicability there. If the rate of change in a legal theory of a case is rapid, the theory needs work. If the law changes rapidly, those affected must be in tune with the changes.

TPL theories, principles, and laws are represented by tplxpt cnxpt info-items and associated with other cnxpts.

TRIZ

As used herein, the term "TRIZ" refers to a methodology where universal principles of creativity are culled to form a basis for suggesting creative innovations because problems and solutions are repeated across industries and sciences, the "contradictions" predict good creative solutions to that and thus other problems, and creative innovations often use scientific effects outside the field where they were developed.

Types→infxtypx

As used herein, the term "type" refers to the indication that an info-item is a specialization of a native info-item into an instance with specialized properties as defined for the 'type'. A infxtypx is a tpx that captures some commonality in a set of tpxs. Any tpx that belongs to the extension of a particular infxtypx is known as an instance of that infxtypx. A infxtypx may itself be an instance of another infxtypx, and there is no limit to the number of infxtypxs a tpx may be an instance of. Native info-items which may be typed include but are not limited to: txos, dxos, and relationships. The types of an info-item define the class (or classes) of tpx that the tpx represented by the info-item belongs to. Types are treated in topic maps as ttxs in their own right; hence every type is represented by a topic in a topic map, and here, every infxtypx is represented by a txo. The infxtypx of a txo is specified simply by a privileged form of relationship between the info-item and the specialized txo that represents the infxtypx. The relationship between a txo and its type is a typical class-instance relationship, where an instance (the sub-class type) inherits properties of the class, but different instances (different sub-classes) may inherit different properties.

Infxtypxs are severely limited in meaning, characterizing txos to be of one broad knowledge domain construct or another, but not as being a categorization tool for ttxs where other approaches to characterization would be more efficient. Any given txo is an instance of zero or more infxtypx. Here, the use of types is limited to expression of system structure, and while ttxs can be categorized according to their kind, infxtypx are not used to indicate ttx categories other than those in the inheritance hierarchy for the native info-item.

Thus, Puccini would be a cnxpt of type "composer", Tosca and Madame Butterfly cnxpts of type "opera", Rome and Lucca cnxpts of type "city", Italy a cnxpt of type "country", etc. in a CMM for a knowledge domain directly involving music and its local. In a CMM about medicine, Puccini would be a cnxpt of type "person", Tosca and Madame Butterfly would not be cnxpts, Rome, Lucca, and Italy would be cnxpts of type "location" (and have roles in a ttx hierarchy regarding locations), etc.

Core Subject Identifiers

The system of this application relies upon the use of core identifier attributes for specifying identities for infxtypxs, similar to as in the TNMS, to ensure system-wide consistency for typing. All core identifier attributes are distinct, that is, txos representing these tpxs cannot be merged with one another.

In one embodiment, the type-instance relationship is not transitive. That is, if B is an instance of the infxtypx A, and C is an instance of the infxtypx B, it does not follow that C is an instance of A.

Relationship Types

In one embodiment, specializations of relationships are edges between txos of specific infxtypxs, including, but not limited to: association, occurrence, imputed categorical, temporal, purxpt, affinitive, trxrt, scopx, fxxt specification, nexus, query, result set, derivation, internal information resource, citation, and interest relationships.

Association Types

Associations can be grouped according to a type called 'role' according to the roles of the objects at an endpoint of a relationship opposite from a cnxpt, association roles include but are not limited to:

generally accepted;
permanent;
imputed;
summary
temporary.

In one embodiment, association types determine the weighting of the association as an identity indicator.

Occurrences Types

Occurrences can be grouped according to a type called 'role', including, but not limited to: relevant page, patent, patent claim, mention, research paper, precise ttx definition, article, and commentary, or other tpx. In one embodiment, occurrence types determine the weighting of the occurrence as an identity indicator.

Cross References

As used herein, the term "cross reference" refers to an (an informal link), the anchors (or end points) of the hyperlink occur within the information resources (although the link itself might be outside them). It may be a URI.

Visit

As used herein, the term "visit" refers to the bringing into narrow focus of a dxo or the moving of the visualization viewpoint to the proximate location of a dxo. Where applied to txos, the term "visit" refers to the touching of or processing of a txo or cnxpt while traversing the CMMDB ontology.

Visualization

As used herein, the term "visualization process" (or "visualization" used in the context of a process) refers to a specific process for developing and displaying a visual aid based upon data. It results in a display on a user's viewing device showing something that he can look through by navigation, where there is some meaning to the positioning of the info-items and other visualization objects on the screen.

In addition, the term "visualization" where used as a noun (or adjective not used in the context of a process) refers to the result of the visualization process.

Voting

As used herein, the term "voting" refers to the addition of information that describes, including but not limited to: characteristics such as purxpts, trxrts, or attributes of a ttx or a relationship, or a request to change, make an addition to, or delete information from a description, a cncpttrrt description, a value of a characteristic, or a value of an attribute of the ttx or of a relationship. Voting also includes requests to the system stating that, including but not limited to: a ttx should or should not exist; that a relationship should or should not exist; that two ttxs are or are not the same; that one ttx is related to another by a specific relationship scopx; that an information resource is relevant to or defines a ttx and should be in an occurrence relationship with the cnxpt (or goal); that a ttx is derived from (or another relationship infxtypx, fxxt, or scopx) another ttx; that a ttx has a trxrt; that an info-item specified by the rsxitem is relevant to a ttx; that a user has visited a ttx and is thus 'interested' in the ttx, that a goal has been met or has not been met, that a goal has not been met but should be converted to a cnxpt; or that a cnxpt (or goal) is similar or identical in meaning to another.

As the CMMDB is used, information is collected as txo information or as relationship information. Much of the information is considered 'voting' information.

In one embodiment, different types of votes may be tallied differently. This form of 'voting' is really a consensus decision-making decision process that not only seeks the agreement of most participants, but also seeks to resolve or mitigate the objections of the minority to achieve the most agreeable decision.

In one embodiment, for txo or cnxpt voting transactions, new vote records referring to the txo or cnxpt are created one per vote. For cnxpt votes, summarization of votes involves, including but not limited to: 'existence', 'difference', 'information addition', 'interest', and 'improvement' votes, by scopx.

In one embodiment, for relationship voting transactions, new relationship records are created one per vote. For relationship votes, summarization of votes involves, including but not limited to: 'existence', 'interest', and 'correctness' votes, by scopx and infxtypx.

In one embodiment, characteristics information is added as votes. Each edit of a characteristic is a vote, and votes are tallied by the system to come up with the actual description of the characteristic as seen by public users. Private users can utilize scopxs, fxxt analysis, and filters to add weight to the votes that they have entered. Users will be encouraged to narrow to abstraction and to unify entire descriptions for voting.

In one embodiment, attribute edits are added as votes. Each edit of an attribute is a vote, and votes are, where attributes can be converted to numeric values, time weighted averaged according to expertise of the voter to come up with the actual attribute value as seen by public users. Private users can utilize scopxs, fxxt analysis, and filters to add weight to the votes that they have entered.

In one embodiment, descriptions, characteristics, and names may be entered as votes in multiple languages as variants, and each may be voted upon by other users separately. Descriptions, and names may be viewed in multiple languages and displayed according to the language the user has selected by use of scopxs, fxxt analysis, and filters.

In one embodiment, edits to a description are more complex, and are kept simple by allowing only a simple 'replacement is better or not' vote. If anyone disagrees with a newly provided description, then a negative vote is cast, while those that agree cast a positive vote. If the total is greater (with weighting) than 0, then the new description is used.

A name is 'elected' by a weighted tallying process.

Voting Ontology

As used herein, the term "voting ontology" refers to the mechanisms for gaining consensus about the data within an ontology. User entered changes to the txo or relationship information are subject to weighting against and alongside other changes entered by other users, and thus these changes are considered votes for a change rather than an order to make the change itself.

An expertise level for the voter is entered into weighting of the vote. Votes also have to be civil, and can be blocked editorially if they are not.

Generality of relationship is considered in calculating totals in that a very general statement is weighted less and less over time (weighted average strengths decrease strength of new entries).

Forms of voting include but are not limited to: development of queries, every edit (on cnxpts, attributes, or relationships), showing of interest by visiting ttxs.

The mechanism also deals with the issues of 'what if', 'belief', 'assuredness, certitude, or conviction', and 'self-reliance'. For instance, with 'what if', the votes are used temporarily while the user settles on their 'belief.' For 'assuredness, certitude, or conviction', the user is stating that they are really more expert in their opinion than others, and this forcefulness, to a point, can be used to slightly affect the voting for some period of time. With 'self-reliance', the user accepts that their view of the world is different and yet they wish to retain it even if others vote against them. The display technique allowing ones own views to have priority is one form of 'Filtering'.

Of course, security of proprietary information, due regard to privacy, competition, access compartmentalization, and other group dynamics must be considered. Trust increases if people feel that they are equal participants within a collaborative environment, especially if they can make use of the shared, retained knowledge of the system and yet see the impact of facilities that protect their rights.

Weights

As used herein, the term "weight" refers to a value set as a surrogate for the true relevance of an assertion, such as that a relationship should exist, or that a name is appropriate for an info-item. An expertise level for the user making a change, doing a search, or voting is used as a basis in calculating the weight assigned to the relationship or info-item affected.

Workflow

As used herein, the term "workflow" refers to a defined set of task steps managed by the system to help a user or a set of users (not necessarily known by each other) to complete a larger task.

Overall Description of Invention

In a standard topic map the objective is to correctly match topics to a subject, with only expert users. Here, the objective is to use the consensus of users with a range of sophistication to both refine definitions for topics to match them to known subjects, refine definitions for topics to make them better definitions for previously unknown but reasonable subjects, to collect information regarding and relevant to the subjects to characterize and relate them to other information, and to refine categorizations of topics.

Alternative Purpose Description

Comparison with Topic Map Standards

What distinguishes the concept here from the Topic Map Standard and other efforts is the distinct rejection of subject identifications as an issue. Rather than identification, a comparison and placement structure provides a deep organizational structure that is valuable 'enough' for users to gain understanding rapidly, but it does not try to identify any topic as being identical to another. By allowing a deep detailing of a subject and by retaining the thought behind it, the detail can provide a better comparison and better, deep organization A terminology comparison will be made available to the examiner as needed.

See ISO/IEC JTC1/SC34, Topic Maps—Data Model, Jun. 3, 2008, Available at http://www.isotopicmaps.org/sam/sam-model/#terms-and-definitions.

Best Mode—Preferred Embodiment—The CMMSYS Ttx System—Overall Structure and Manner of Making Preferred Embodiment Top Level for Structure FIG. 1 is a block diagram of a functional architecture, according to an embodiment of the invention;

Manner of How Preferred Embodiment Works

Information Categorization and Retrieval Management Lifecycle with Top Level Process Flows To achieve improvements in innovation, the creativity lifecycle must include a facility to capture user 'conjuring' early on into a visualizable Mental Map and provide for effective storage, access, and reuse of the thinking. For collective efficiency in innovation, communities of users must build on a CMM commonplace. In addition, the creativity lifecycle must provide collection and reuse of other information substantive to the innovation and commercialization lifecycles.

Combined Benefits

- A commonplace platform for predicting investment value in future technologies relying upon 'best available data' collected through incentivized crowdsourcing techniques to obtain a refined list of innovative future technologies and estimates of their value, status, and related information to form a basis for prediction;
- Tools to build and visualize the commonplace as a 'map' of technologies based upon their relations and lineage, allowing inventors to see prior inventions, entrepreneurs to find opportunities, and investors to see potential value, increasing possible opportunities and threats to their technologies, thus decreasing chances of failure of their product once introduced to the market;
- An accessible, usable, platform for capturing the imagination of creative thinkers, capturing a user's thoughts as soon as they create a goal for querying, state an aha, or mark a location;
- An accessible, usable, platform for capturing the issues raised by laws, in court opinions, and in other legal documents, and capturing a user's additional thoughts regarding the issues as ttxs to save other's time and to improve the quality of argument before the bench;
- As an incentive for use and an additional value stream, an innovation ecosystem that provides a focusing mechanism for the innovation community that incentivizes creativity, cross-pollination of ideas, reuse of knowledge, and efficiency in collaboration between inventors, entrepreneurs, investors, businesses, and government;
- As an incentive for use and an additional value stream, an online socially interactive engine (Community Based Innovation Mapping Engine) based on an organically evolving set of tcepts and appcepts learned from crowdsourcing, yielding a continually growing source of technologies and intellectual property maps for a high tech ecosystem allowing inventors to learn early on of prior works, product managers to target appcepts better, entrepreneurs to focus on unsolved problems, news feeds of invention, and investors to pick ripe opportunities;
- The pace of research is increased, and researchers gain excitement by seeing other technologies of interest in a matter of seconds;
- A sharing ground for people with ideas who don't have the capabilities to transform their ideas into real technology, to obtain free or low cost coaching by experts in the real world on their tcept, and for sharing an inventors excitement about new product innovations with others with similar interests;
- A mechanism for owning and controlling searches and the artifacts left from searches, a mechanism for obtaining value from entry of small amounts of information and for selling access to a user's ideas, and a mechanism for determination of closeness between similar ideas without obtaining purview to other users' ideas.
- Specific needs met by such a Map are prior art searching, environmental scanning, competitive analysis, repository management and reuse, innovation gap analysis, novelty checking, tcept fruition prediction, investment, and product tcept comparison and feature planning
- A mechanism for minimizing the real cost of innovation, including: reductions in the time a user spends to get what they want and to collaborate; decreases in the setup time for each session; intentional and appropriate simplification to provide an intuitive means for use; decreases in the number of queries and the time needed to find information being sought; increases in reusability and improvement of subsequent results; removal of the need to remember all prior inventions, all ttx, etc.; improvements in the quality and the amount of information available to a user when they enter a query; increase in levels of detail reviewable in a short timeframe; elimination of confusing noise by hiding information; and increases in number of approaches available for finding information, including a variety of search and retrieval facilities;

Top Level for Process

Methods/Process

Ttx Mapping Visualization Planning and Use lifecycle process, and the more specialized Ideation, Innovation, Investment, Intellectual Property Analysis, and Administration lifecycle processes, according to an embodiment of the invention.

Not all steps are required in other embodiments.

Map Development Process—Ttx Mapping Visualization Planning and Use Process

Use Case: Map Development Process—Ttx Mapping Visualization Planning and Use Process.

Map Development Process—Ttx Mapping Visualization Planning and Use process includes:

Preparation Step

Generation Step

Structuring Step

Representation Step

Interpretation Step

Utilization Step.

Not all steps are required in other embodiments.

Map Development Process—Ttx Mapping Visualization Planning and Use Benefits

The steps in the Map Development Process—Ttx Mapping Visualization Planning and Use lifecycle can provide, for example:

- a specific design process for developing a usable visual aid for understanding ttxs, accepting crowd sourced refinement, and making use of the information obtained.
- Concurrency is provided, with some users working on one step while others are working on different steps, and where one user may be performing on two steps concurrently.
- Management is provided over the perpetual state of change of the CMMDB.
- Currency is managed, with refreshing of maps and other results periodically, or on demand.

The Preparation Step focuses on what to map or to study, or how to make use of the system. In one embodiment, it is technology. For each user project, the users prepare their own study focus and thus their own specific methodology beyond what others have provided for reuse. A range of uses and methodologies result among users and over time. Users adjust their plan as they need and may have multiple studies with different purposes in process at once. The range of uses includes not merely viewing maps of information or performing studies, but also, including but not limited to: selling information and services, advertising, networking, investing, obtaining patent protection, teaching, planning products, entrepreneurial activities, finding solutions, offering and obtaining rewards, and playing games. Preparation also provides for system implementation, provisioning for use, and administration.

The Generation Step results in the capture of a large set of descriptive statements regarding the focus. In one embodiment, where the focus is technology, the descriptive statements relate to tcepts and appcepts. Results of ideation methods, whether or not performed within the system, used to accomplish this are entered, including, but not limited to: traditional brainstorming, brain writing, nominal group techniques, focus groups, qualitative text analysis, incremental innovation, from writing of goals or searches, by tours and placing ttx ideas, by stating cncpttrrts, stating purlieus, by connecting ttxs, by result set culling, by assisted methodologies, feature extension, surveys, or others listed below. Generation occurs perpetually, and among a wide set of dissociated users often not involved in a study, and possibly still contributing to the ideation and perhaps without realizing it. Generation also allows for the reuse of prior ideation by the study team and others. Generation generally includes creation of representatives for ttxs called cnxpts; forming of relationships between cnxpts; naming (labeling) the cnxpts; and adding characteristics for the cnxpts; including but not limited to: descriptions, cncpttrrts, purlieus, occurrences, attributes, ratings; forming and culling result sets associated with the cnxpts; and assigning scopxs.

The Structuring Step results in sortings of the accumulated information in preexisting or new categories, based upon formed relationships; defining of scopxs; and forming fxxts. Generation and Structuring are highly intertwined. For example, stating goals and executing their queries and culling their result sets may be used for Structuring as well as Generation. Automatic semantic distancing and other topic merging techniques suggest consolidation of ttxs. Prior interest and past filtering specifications and results augment voting and merging to divine a structuring for the relationships underlying a mapping. Structuring makes use of the efforts of many dissociated users on a perpetual basis and the results are cumulative and reusable. In one embodiment, the accumulated information is a consensus built up from the users' input based upon summarization of ratings and categorizations by statistical analyses of the strength of relationships between cnxpts along various types of relationships, resulting in a measure of closeness of ttxs. Cluster analysis on the output of the multidimensional scaling partitions the map into clusters of statements or ideas.

The Representation Step provides analysis by taking the accumulated information and "representing" it in map form suitable for the purpose of the study. Mathematical analysis of the categorization 'ontology' generates taxonomies based upon various fxxts in the cnxpt structure. Portions of the representation step are performed on a periodic basis, and some is performed as the user wishes to change their view of the data by using different filters, fxxts, etc. Filters, fxxts, tours, and viewpoints may be shared and reused.

The Interpretation Step yields refinements of the accumulated information allowing users to utilize their own labels and interpretations for the various maps they produce from the CMMDB to better suit their purpose. For instance, maps may be used for prior art searching, and one ttx may be designated as the focus of the prior art search study. Also, the user may adjust their CMMV view of the CMMDB to use their own labels, cnxpt relationships, cnxpts, and filters to provide a custom map for their own interpretation. Interpretation may, but does not necessarily remove the opportunity to include newly accumulated CMMDB information and thus the Interpretation provides for new altered and more current maps without additional work by a user.

The Utilization Step involves using the maps to help address the original focus. They can be used as the basis for, including but not limited to: searching, investing, competitive intelligence, performing ad hoc or methodology based studies, developing product comparisons, providing communities with information, displaying results, viewing maps of information, selling information and services, advertising, networking, investing, obtaining patent protection, teaching, planning products, entrepreneurial activities, obtaining investment, finding solutions, offering and obtaining rewards, and playing games. Maps may be shared in collaboration, exported, used as the basis for derivative or periodic studies, etc. Alerts provide for notice when changes occur.

Collective Problem-Solving

In this system, the objective is continual improvement of the data in the CMM and all improvements are intentionally incremental, and are performed under stigmergy.

The efficiency of mental problem-solving depends on the way the problem is represented inside the cognitive system—the mental map. Here, the problem is reduced in complexity to the definition of a ttx and its relationship to other ttxs. This limits the complexity of the system relative to systems where the CMM is used for collected problem solving solution selection.

One way to solve a problem is by trial-and-error in the real world: just try out some action and see whether it brings about the desired effect. Such an approach is obviously inefficient for all but the most trivial problems. Intelligence is characterized by the fact that this exploration of possible actions takes place mentally, so that actions can be selected or rejected "inside one's head", before executing them in reality. The more efficient this mental exploration, that is, the less trial-and-error needed to find the solution, the more intelligent the problem-solver. This relates to the present system in that the consensus is built with the knowledge of the changes suggested by others, so those making suggestions will have their reputation at stake.

Coordinating Individual Problem-Solutions

Because the CMM is limited in purpose, the conceptual framework needs to apply only to the definitional level rather than to collective problem-solving of a different scale. This limitation of scope and purpose seems critical to retain focus and limit issues. Still, that higher scale of problem-solving is incredibly more easy to accomplish where values and priorities can be set first, and where definitional information is available.

Each individual will start with his or her own mental map but will assist in moving the CMM toward their internal map only where they see a lack of definition or a poor definition. At some point, the authority of the CMM will improve to a point where it matches most users internal maps. However, individual mental maps are not objective reflections of the real world, and even if they were, at some point the individual will get creative or the world will change.

Thus the internal and common maps will also be to an important degree different. This constant differential is healthy because it means that different individuals can complement each others' weaknesses.

Address and Reduce Obstacles to Collective Intelligence

Obstacles to Collective Intelligence

First, however competent the participants, their individual intelligence is still limited, and this imposes a fundamental restriction on their ability to cooperate. Another recurrent problem is that people tend to play power games. Everybody would like to be recognized as the smartest or most important person in the group, and is therefore inclined to dismiss any opinion different from his or her own. Such power games often end up with the establishment of a "pecking order", where the one at the top can criticize everyone, while the one at the bottom can criticize no one. The result is that the people at the bottom are rarely ever paid attention to, however smart their suggestions.

It seems that the problem might be tackled by splitting up the committee into small groups. Instead of a single speaker centrally directing the proceedings, the activities might now go on in parallel, thus allowing many more aspects to be discussed simultaneously. However, now a new problem arises: that of coordination. To tackle a problem collectively, the different subgroups must keep close contact. This implies a constant exchange of information so that the different groups would know what the others are doing, and can use each other's results. But this again creates a great information load, taxing both the communication channels and the individual cognitive systems that must process all this incoming information. Such load only becomes larger as the number of participants or groups increases.

Constant Change Request Process

The utility of this is that it provides for high rates and volume of requests for changes in the information held by users. Users will maintain the CMM by making requests that serve as concise votes on the information, and the tallying of the votes must be an extremely easy process not requiring human effort or intervention other than by offering a survey to users.

Constant Improvement in CMM

The utility of this is that it provides the facilities to continually improve the data in the CMMDB. The objective of the system is to improve the data that everyone is getting the value from. All efficient mechanisms for doing so should be provided if feasible.

Incentivization

Incentivize Users toward Map Improvement based upon Thinking Style

The utility of this is that it provides incentives to users with each thinking style: Synthesist; Idealist; Pragmatist; Analyst; Realist.

Ideation process

Use Case: Ideation process.

Ideation process includes:

Setup System

Expand Knowledge Model

Begin to Utilize

Learn/Seek

Add and Refine

Categorize

Methodology Based Add/Refine—Design

Methodology Based Add/Refine

System Functions—System Control Operations

System Functions—Workflow and Analytics

System Functions—Ontology Manipulation

System Functions—Assisted Creativity Automation

System Functions—Visualization

System Functions—User Input Management

Share and Commune

Educate

Incentivize.

Not all steps are required in other embodiments.

Ideation Benefits

The steps in the Ideation lifecycle can provide, for example:

Analysts get a much more detailed categorization and analysis tool, but they require access and tools to get at the information;

Commonplace

Provide a datastore for a loosely controlled knowledge domain with a loosely controlled vocabulary to describe objects and the relations between them in a simplified but formal way, with tools for manipulating the relationships and for describing the objects. Ontological commitments (the formal rules of construction) are minimal and the ontology structure is used as a CMM similar to a Topic Map rather than a specification of a conceptualization of a knowledge domain Categorization structure for internal knowledge base and cross reference to external knowledge bases;

Provide some organizational learning and foster reusability of prior efforts and analysis;

Knowledge and users across different organizations are tied together even where terminology used was different, so that users can find information without knowledge of the "correct" keywords or category names, thus facilitating information sharing across organizations with different terms for similar ttxs.

Analytics provide for workflow and methodology controlled Web scraping and information resource analysis entity extraction, text mining, relevance ranking to identify entities such as person names, places, organizations, phone numbers, etc. and highlight or extract them and to capture, transform, analyze, and digest critical unstructured information across multiple domains regardless of format, language, data type, or location.

Organizing of research, analysis; or new information into a fabric of previous understanding on a continual basis, to:

- aid in finding specific information within a category;
- aid in finding contextual information in surrounding (inclusive) categories; and
- aid in finding impulsive results (see Impulse Retrieval).

Simplifying knowledge by segmenting it into smaller, better defined, concrete ttxs;

Narrowing descriptions of ttxs for more accurate semantic matching and merging;

Providing a focus to information to give a foothold position on a body of knowledge;

A commonplace to search, discuss and refine information, to stay current, to participate in directly related communities and network with experts pertaining to their ttxs of interest;

The commonplace provides an accessible, usable, sufficiently detailed knowledge base tuned to capture the imagination of creative thinkers and to efficiently provide information to others.

A collective memory map, which is built up by those who see involvement as important because of the utility it, provides for improving their own work;

An organized common repository for capturing the imagination of a wide body of users, "a monument raised by a myriad of tiny architects;"

Yields an organizing construct for emerging content and events in communities of interest;

Capturing Imagination

A user comes up with a thought, an idea and at that point, the system could just as well believe that it is receiving a description of a ttx it has not been given previously;

Supports a simplified form of Innovation Management providing structured ideation methodologies for solving problems and generating ideas, such as Brainstorming, Creative Thinking, Triz where, in one embodiment, the computer system generates suggestions according to a prescribed set of rules, and the user reviews the suggestions, eliminating, improving on them, or accepting them, or, in one embodiment, where the user follows certain thinking patterns according to the step rule and principles to add or refine the commonplace information;

Provides management and workflow structured ideation methodologies;

Supports incremental definition of thesauri, ontology, or taxonomy structures;

Retrieval

Impulse retrieval of ttx information upon spontaneous choice of a ttx that a user hadn't planned to choose when they began their query or search;

Finding ttxs with specific goals;

Interactive exploration of the CMM for "incremental explorative browsing" of the knowledge, providing mental excitement as would occur in a game program to keep the speed of learning high, ease of unstructured associative (co-location) searching;

Incentivized and rapidly captured creativity;

Attached Communities

A wealth of effective, while narrow knowledge bases and communities associated with specific ttxs;

Data extracts useable as basis of other analyses;

CMM information can be readily reorganized for use according to personal needs or by standard classification indices;

Organizing ttxs by when a ttx was 'conceived', what predecessor ttx a ttx stems from, who owns a ttx, who should have access to a ttx, what stage a ttx is in, what field of study a ttx is related to, and which techniques can be applied to analyze a ttx;

Visualization

Instantiation of Visualizations from hyperlinks with focusing in on Area of Interest/consideration and filters and access rights applied;

Visualizations of the future of technology and one prediction as the basis;

Visualizations are built to give users a context for imagining the next incremental change to a tcept Visualization has reduction of aspects, pre- and post interest based information hiding and factor based filtering by types, attributes, purlieus, and cncpttrrts;

Visualization allows inclusion of excitement devices and advertising;

Navigation allows for serendipitous results, refinement, interest refinement, and community connection;

Intentionally limited breadth of visible information to eliminate confusing noise during searching and navigation of knowledge base through intentionally simplified and intuitive facilities to decrease confusion by hiding irrelevant information when possible;

Empowering for serendipitous learning, making it fun to learn of ttxs that a user had previously not studied or known about, which may be otherwise unavailable due to language or locale barriers, by browsing and discovering resources that are tangentially related to known ttxs, a mechanism that is not adequately supported by today's online library resources or by search engines like Google;

Improved learning rate for information viewed;

Capturing of specific kinds of imagination into a useful structure and managing the discussion to refine the ttxs;

Use of web technology to structure and incentivize communication on complex topical discussions;

Effective collaboration for creativity where formative thoughts, normally low in quality but often the most current available, are collaboratively weighed, refined, and improved;

A platform for improvement directly from use where as more users seek information, the stored information becomes more current;

Informational assertions called cncpttrrts regarding a ttx may be associated with the ttx and also be separately searchable so that, for example, a characteristic of the ttx can be described as being close to or identical with a characteristic of another ttx;

An alert structure for focusing attention on high interest but very narrow changes of information, improving currency for the user and speeding informed collaboration;

Retained work efforts for 'memory,' or 'common memory,' with reuse and refinement to improve subsequent results;

Serve as repository of prior searches, bookmarking;

A platform for incremental and collaborative ttx identification and specification;

A platform for authority maintenance and ontological merging through voting and dynamic collaborative categorization;

A platform for refinement of knowledge gained from initial analysis by clustering, cross-citation, crawling and other automatic categorization techniques;

A platform for refinement of knowledge by small cuts techniques where users manually narrow ttxs to achieve short descriptions either of the ttx or of its traits, and semantic distance algorithms can be applied to aid in topic merging and need satisfaction matching;

A platform for applying analytic tool plug-ins and spreadsheet formula techniques for analysis;

A platform for coordinated ideation/brainstorming and other conceptualization techniques with appropriate inclusiveness limitations;

A platform for collecting collateral information resources and cross utilizing other information resources;

Pro-active grabbing the imaginative thoughts of its users—knowledge brought into the system seemingly arrives by magic, and even abstract ttxs seem to be real for some period of its existence—until it is well defined;

See what other people are thinking before the thoughts are well defined;

View thoughts that are at the farthest fringe of the creative thought process;

Nearly automatic means of bringing thought into the system;

Gradual refinement of ideas into understandable ttxs;

Continually provide new knowledge to the users;

Remember conceptual contributions as separate conceptual additions;

Provide for security and attribution of conceptual contributions;

A platform to assist users in their daily creative activities;

An endless and bottomless platform for establishing the membership of a particular category below the categories provided;

An endless and bottomless platform for establishing classification of a ttx into multiple categories, and for then reducing the classifications into a taxonomy for better understanding;

A platform for combining the assessments of users on different ttxs and their categorization to provide better quality in the categorizations even as the number of ttxs grow;

A platform for combining the assessments of experts on technology categorization by diverse classification fxxts to provide better quality in the categorizations even as the number of classifications fxxts grow;

A system, processes, and technique for managing the various categorizations of users, enabling participation around categorization of knowledge in a CMM;

Higher likelihood that a user will 'see' what they are looking for earlier;

Wide variety of approaches for finding information, including co-location associative searching and a variety of search and retrieval facilities;

A facility to assist users with organization, collaboration, and retention in their daily information gathering and analysis activities;

A data basis for simplifying the refinement of the knowledge held in the CMM;

A data basis for generating visualizations that simplify the navigation and understanding of the data;

A structure that a user can relate to and that can capture a user's imagination while they user it;

A structured building of consensus regarding knowledge on conceptual descriptions, categorization, and interrelationships;

Consensus regarding the classification of ttxs in the CMM at least according to fxxts;

Reduced work setup time for each session of use and work task;

Facilities for organizing a user's work and for communicating the work within a group;

Collection and connection of conversations, information resources, information, and links to internal and external information to a common and specific ttx;

Lower user burden of administration over data loading, ttx categorization, query control, information resource relevancy ranking, study coordination, ttx data tracking, etc.;

Sharing of knowledge from and reuse of effort by many other users;

Incentivized quality improvement for knowledge bases;

Provide frameworks and methodologies for studies from samples of old studies, best practices;

Choose framework for analysis and study

Filter by cncpttrrts or purlieus

Metrics calculation from cncpttrrts or purlieus

Editorial metrics

Well-definedness of info-items

Survey questions on cncpttrrts provide quick initial descriptions by originator, description structure, and aid in collaboration and crowdsourcing;

Survey questions regarding purlieu allow a cnxpt to be rapidly categorized.

Topics may be associated with cncpttrrts to provide an object structure for complex attribute-like data such as product features, appcept requirements, tcept roadblocks, usefulness beliefs, valuation assertions, etc.;

The trxrt info-item must be tightly associated with a ttx in the CMM to specifically state, in the Map, that a belief exists that the assertion stated in the trxrt is true for the ttx;

- Packaged portions of the CMM ttx data, called packaged "TTX-DataSets", may be purchased, and a limited set of customers may purchase packaged "Interest-DataSets";
- Data, such as txos along with their characteristics, or merely specific items of their characteristics, may be offered for sale;
- Navigation Based Relevance and Interest Collection
- Ontological Merging by Voting with Assisted Semantic Trait Matching and Meta-Relevance Topic Merging
- Relational Delphi Discussion with Automated Suggestion Generation
- Filtered Deep Categorization Visualization with High Serendipity Associative Searching and Relevance Steering
- Overcome passive nature of contributors who wait to see what other people write.
- Visualization Navigation Process Use Case: Visualization Navigation Process.

Visualization Navigation process includes the sub-processes of the other above processes as specialized and:

Navigate Visualization.

Not all steps are required in other embodiments.

Visualization Navigation Benefits

Interest Paths

- When the user navigates, the route that the user chooses to navigate through is saved on the as an 'interest path', with 'interest path segments'. In this process, the user has unknowingly edited the relevance rankings for each txo traversed from so that the txo traversed to in each segment has its ranking value increased in that ranking
- When the user turns around and uses a different navigation through the map, another 'interest path segment' is saved.
- When several similar routes are taken by several users, these fly-in and fly-out 'interest path segments' tend to refine the original goals and categorizations into a collaboratively defined txo classification structure, without user awareness. In one embodiment, the path segment information is collected and packaged into a more cohesive result that becomes available to other users wishing to obtain such interest data. Just as in the rise of transportation routes, over a period of time, these connected paths and the txos create sufficient detail to form a map, and the information content starts making more sense. Trends emerge out of the collaborative generated map. These trends provide a basis for evidence including, but not limited to: an estimator of the time before which commercialization of products by IP classification, estimators of future value of appcepts, likelihood of tcept selection for use in an appcept, etc.;

These trends over time will help in forecasting fruition of future technologies and serve as a guideline for inventors who are uncertain about what to focus on for invention, entrepreneurs who are uncertain where to focus their development efforts, and investors who want to take a less risky gamble on the future of technologies.

The steps in the lifecycles can provide, for example:

- Immersive mapping to situate the user within the structure of the map, emphasizing local information and navigation while preserving the ability to speedily navigate into and around the structure of the map, or globally around a CMM, and allowing the user to understand greater content as visualized with speedy navigation, better comparative retention of the user's mental map against the CMM, simpler extension and refinement;
- Immersive mapping also provides "incremental explorative browsing"—the interactive exploration of coded knowledge—which is an important function for analysts; a very good tool for "learning" something from the data map; and is useful for impulse retrieval where one does not know in advance what he/she is really looking for.
- Visually traversing a visualization of the CMM, following the elements in a field of view on one of the multi-object visualizations (maps or lists), showing interest in info-items;
- Users may navigate to ttxs, see the subttxs inside, view information associated with the ttx such as descriptions;
- Users may collect on their ideas by selling access to the idea, possibly until the idea reaches a certain age or status, and only where the idea has been described; and users may purchase access to specific ideas.
- Navigation through many levels of detail in a short timeframe and decrease querying needed to find information being sought;
- Multiple navigations may be performed simultaneously by a user on multiple windows;
- Basic operations can be performed after navigation, including selection, refinement by voting or making editing suggestions, connecting to associated ttx information and making edits, etc.;
- Claims may be staked on prospect areas—empty spaces on the map
- Generation of approximate, yet unique description of a tcept that would be located in an empty space on the map;
- Descriptions of ttxs may be changed by wiki-editing of their definition;
- Edits to relationships may be made by navigating to different locations on two displays to add a relationship between spheres or move a sphere to a new space;
- Users may socialize around ttxs by joining into the community conversations regarding it or pledging effort on/resources toward it;
- Navigation can be filtered by selection of relationships to navigate by, such as 'prior art', 'cited by', 'sub-tcept of', 'solution for', and 'used in', or combinations of relationships;
- Filtering for interest may be applied to narrow the ttxs considered by 'attributes', 'purlieus', 'traits' 'features', or 'requirements' limitation;
- Display filtering may be applied by specifying dxos to be allowed on display;
- Minimally differentiated tcepts located near each other on a map could be seen as close even if they would not both be found in a taxonomy in a conventional indexing scheme or in a word search because indexing schemes tend to emphasize one attribute, such as a conventional and backward-looking market category, while ignoring other dimensions, and the map need not;
- Empty spaces on the map may be selected and then described to initiate a ttx;

Adaptation

- A platform for implementation of knowledge tools for specific application domains such as Configuration Management, Issue Management, Software Design and Analysis, Enterprise Resource Planning, Process Pattern Recognition, Financial Modeling, Causality and Root-Cause Analysis, and others;
- A platform for extension into of website and browsers for, in one embodiment, Web 2.0 Social Sites, and, in one embodiment, Web 3.0 Semantic Web, and, in one embodiment, network management;

Goal Based Searching Process

Use Case: Goal Based Searching Process.

Goal Based Searching process includes the sub-processes of the other above processes as specialized and:

Setup Goal System

Lookup Simple Find/Locate Searching

Search Topics with Goal

Indirectly Search Causing Goal

Complete Search

Analysis

Sharing (and offering for sale)

System Operations.

Not all steps are required in other embodiments.

Goal Based Searching Benefits

Goal Display and Query Process

In one embodiment, when a user creates a goal, the user is shown a new cnxpt-like object on the map visualization. The goal, if not well specified, may appear to surround all or most dxos on the visualization. The result set for the goal when first created is defined to contain all known cnxpts, but it is not usable or displayable in that state. As the goal is further specified, the number of info-items it encloses would normally decrease. If well specified or created within a txo, it is smaller, enclosing fewer or no dxos. The result set for the goal is not fully usable or displayable until the number of rsxitems in it is reduced to a system set threshold, although some number of rsxitems may be displayable.

If the goal encloses no txos on a visualization specified on a specific fxxt and filter, then it is said to have no results within the displayed fxxt or filtering applied, but it may not actually have an empty result set. If it encloses no txos and has no txos in its result set in any fxxt, it is said to be a leaf txo. If it is a goal for finding a tcept and it encloses no txpts, it is said to be an incremental innovation that may or may not be novel. If it is a goal for finding an appcept and it encloses no axpt, it is said to be a new appcept.

The categorization of the txo defined initially by the goal is refined by, including, but not limited to: movement votes by users placing the txo in a different txo category; merging with one or more other txos; and relevance as derived from the 'interest paths' traveled by the user.

The steps in the goal's lifecycle can provide, for example:

- Combination searches based upon 1) a goal, 2) multiple queries stated as applying to the goal, 3) use of site/engine specific query mechanisms, 4) meta search techniques, 5) use of a result set, result set culling, and result set manipulation by 'result set arithmetic', 6) later re-running of queries and culling, 7) replacement of 'goals' by cnxpts, 8) optimizing of queries where search engine subscription is available and payment rules are set, 9) query partitioning for incremental innovation splitting, 10) paths combined with goals, 11) any ability to rerun the query and notify the user of new information would be important, 12) use of cluster analysis, cross citation analysis, within goals, and 13) anticipatory site indexing and scraping.
- Improved quality and increased amount of information available to a user querying;
- Performing compound queries to find specifically relevant results;
- A platform for effective meta-searching and multi-step querying
- Relevant hits for a goal (query result sets) may be used as a basis to merge topics, and culling the relevant hits for the goal (the collected result set entries) or for refining the ttx for which the goal was established;
- Visually traversing a visualization of the CMM, following the elements in a field of view on one of the multi-info-item visualizations (maps or lists), adding relevant information resources found to a goal's result sets;
- A platform for coordinating automated unstructured text (document) analysis tools and classifying the results by ttx;
- Searching by keyword search queries on strings/terms in descriptions, names, attribute values, purlieus, traits, link contents, link values, analytic results, translated contents, meta-search engine results, community discussion entries, corporate/local document management systems;
- Searching by multi-step queries with result set arithmetic;
- Searching by requests, possibly compensated;
- Searching by crawl and scrape analytics, for both open pages and DeepWeb data;
- Searching by area indication on a visualization, information filters, and by analytic;
- Result Set Arithmetics;
- Results are collected into result sets for culling and combination;
- New info-item naming by naming goal or generated;
- Sharing (and offering for sale) of results, goals, goal templates, survey templates, query templates, result set combination templates;
- Query by, including, but not limited to: ttx, tcept, trait, purlieu, attribute, lineage, stage of development, inventor, assignee, expertise, industry, company, company stage of growth within industry, company technology, related information resources, and locale;
- Query community by survey;
- Market for search assistance;
- Market for templates;
- Facilitate multistep and dynamic queries;
- Facilitate combinations of area, filter, keyword, co-location, associative, and other forms of searching;
- Conversion of goals with culled results to info-items with reference to related information resources;

Administrative Process

Use Case: Administrative process.

Administrative process includes the sub-processes of the other above processes as specialized and:

Establish

Manage

Generate.

Not all steps are required in other embodiments.

Administrative Benefits

The steps in the lifecycles can provide, for example:

- Automatic processes take the burden off of users;
- Roles and responsibilities remain clearly defined;
- Extract and Purchase Ttx-DataSet for specific tcept category;
- Administer Sharing;
- Administer Provisioning;
- Administer Community;

Innovation Process

Use Case: Innovation process.

Innovation process includes the sub-processes of the Ideation process as specialized and:

Setup Innovation System

Innovation System Operations

System Functions

Assisted Creativity

Learn/Seek in Innovation System

Add and Refine in Innovation System
Categorize in Innovation System
Mine/Predict/Forecast
Share and Commune in Innovation System
Provide Services.
Not all steps are required in other embodiments.
Innovation Benefits The steps in the Innovation lifecycle, in conjunction with the Ideation lifecycle, can provide, for example:

- A mechanism for Intellectual Property Protection (jurisdiction dependent!):
  - By getting an idea stated and captured faster, protection of the idea can begin earlier.
  - When a user publishes an entered tcept, the idea may be protected for one year because only that user is able to apply for a patent (for one year) and nobody else can ever apply for a patent on that idea (in the US, or in treaty nations).
  - When a user submits a tcept as a provisional patent, they start down the road to having exclusivity under the patent system.
  - Where a user does not wish to publish a tcept, the record of their statements of the tcept can be retained to serve as evidence of inventorship in 'derivative works' and some other cases. These records will also serve to show that a user has high creativity if reported somehow on his resume, as a basis for suit for disclosure if he registers an NDA contract against it as in patent clearance, etc.
  - Where a user does not wish to publish a tcept, the user has an option to request alerts to warn them if someone else ('subsequent user') searches for the idea or otherwise enters it. The user has an option to request that the subsequent user be alerted that the idea has been entered, and the subsequent user has an option to be warned where their entry is similar to the original. In each case, the alerts and warnings indicate that the user should rapidly file for first to file patent registry.
  - Where a user does not wish to publish a tcept, the user has an option to request alerts to warn them if someone else ('subsequent user') acts regarding the tcept, including but not limited to: involves the tcept in a model, retrieves a publication relevant to the tcept, finds information considered to be under protection (where some tcept information is found by anyone's search (or a scraping, or a specific set of people's searches), the fact of it's existence or its exposure is reported by the alert).
  - The user has an option to request that the subsequent user be alerted that the idea has been entered, and the subsequent user has an option to be warned where their entry is similar to the original. In each case, the alerts and warnings indicate that the user should rapidly file for first to file patent registry.
  - Where a user does not wish to publish a tcept, but where they form an innovation consortium, other users (in or outside of the consortium) adding tcepts or changes in descriptions visible to the consortium which are improvements to the consortium tcept may obtain an evidence trail useful to enforce their inventorship on a patent application of the consortium (principle inventors).
  - Entry of a ttx protects users from opportunity loss in that they can be considered a source for work on the idea by others.
  - Entry of a ttx protects users from opportunity loss in that they can give notice to others—even if the ttx is not fully exposed—that this user has some leg up on those others in the marketplace. This has a wide range of indirect values, such as where a corporate user has stated an idea, then it is valuable for an independent user to know that something similar may have to compete against a giant.
- Inventors can check their inventions against prior art.
- Tech Transfer agents get a structure for finding available technology.
- Identification of market forces and technology change trends;
- Comparisons of tcepts within the context of an encompassing ttx category;
- Feature comparisons and analyses of changes in individual categories;
- Prediction of how and when some element of "the" future will, in fact, materialize;
- Description of the potential progeny of previously described ttxs;
- Gestation (time from conception to product introduction) information is also solicited or calculated;
- Best available forecasts of alternative futures based ttxs' evolutions by following the precursor to progeny relationships;
- Which users get benefits from the system and its data?
- Schools get a valuable method for teaching technology, but the tools they need will take time to build and must be easy to use;
- Project managers get a source for finding solutions to appcept problems;
- Ability to forecast innovations not yet invented, re-use prior art searches;
- A search engine for the reuse of prior art searches
- Coordinate language across many lexicons and patents;
- IT-enablement of a transformation in technology innovation efficiency, speed, and empowerment;
- Timeframe based tcept valuation to create markets for futuristic technologies;
- A 'map' of innovations that exist or might some day, showing whether an invention already exists or where it fits in its lineage or in relation to similar tcepts;
- Intellectual Property Categorization, Analysis, Evaluation, and Comparison;
- Simple additional tools for managing Intellectual Property department for Patent Clearance, including compartmentalization of security regarding Intellectual Property, and determining protection needed for a ttx or whether exposure may, or has occurred;
- Evaluate groupings of technologies as well as groupings of and specific patents;
- A strictly controlled specification for a knowledge domain regarding tcepts and appcepts. The CMMDB ontology uses a controlled object type vocabulary that describes info-items and objects and the relations between them in a formal way, and has a grammar for using the vocabulary terms to express something meaningful within the specified domain of interest. The vocabulary is used to implement the tools for interacting with the CMMDB, and in specifying certain automatic operation scripts.
- The technology commonplace provides an accessible, usable, sufficiently detailed knowledge base tuned to capture the ttxs imagined by creative thinkers and to efficiently provide information to innovation and intellectual property workers.

A combination of a computer and internet assisted Delphi technique, ontologies, and a wiki like system to obtain the deep classification and roll-up needed to provide the breadth and depth of a categorized, common understanding of technology that can be as fluid as the real world, as current as needed, and support a substantial set of the needs of innovation workers;

A platform to assist users in their daily technology innovation and productization activities;

Generates an organizing construct for emerging content and events (taxonomies by stage and by tcept) for communities and websites;

Presentation of fields of technology in an exciting, current study aide offering alternative views and categorizations, virtualizations, map views, and associated navigation and searching facilities, with navigation sharing;

A collective memory map of technologies and inventions, in context of many other technologies, built through the collective and collaborative efforts of many incentivized innovators and users who see involvement as important because of the utility they derive;

A map of inventions, in context of many other technologies, having the best guess of the context of each tcept at a certain past or future timeframe, the succession of innovations within contexts;

Informational trait assertions regarding a tcept or appcept may be associated with the tcept or appcept and also be separately searchable so that, for example, a feature of the tcept can be described as being close to or identical with a feature of another tcept, or a requirement of an Appcept can be described as being close to or identical with a requirement of another appcept;

A platform for applying gap analysis, Triz, road mapping, gestation period analysis, and other innovation tools in a controlled environment;

Substantial knowledge to those who wish to gain a business advantage by understanding technologies;

A 'Best Available' basis of categorization for technologies;

A basis to categorize Intellectual Property for reference and advertising;

An endless and bottomless platform for establishing the lineage of incremental innovations applicable to prior inventions or by categories, appcepts, or features;

A platform for combining the assessments of different experts on market sizing and valuation for innovations;

A single platform structure for combining the knowledge and categorization efforts of the many, many experts already involved in innovation;

A repository of the conceptual technology thoughts of inventors and science fiction writers, youths and elders, from all languages and locales, of small and large ventures, etc.;

A basis for viewing the border between science fiction and workable technology for any given timeframe;

A repository of tcept information, including:

- When was a tcept 'conceived'
- How is a tcept described?
- What is the name for a tcept?
- Who named a tcept?
- What are the parts of a tcept?
- How does a tcept work?
- What are the features/characteristics of a tcept?
- What is the description of a problem/appcept?
- What are the component parts (requirements) of a problem/appcept?
- What predecessor tcept is a tcept stemming from or is a discontinuity substituting for it?;
- What department (either IP department or product department) should manage a tcept in a specific organization?
- Who should have access to a tcept in a specific organization;
- Who owns Intellectual Property associated with a tcept
- What products are associated with a tcept
- When would the first product based on the tcept become available;
- What stage is a tcept in;
- How qualified is a tcept for investment;
- What field of study is a tcept related to;
- Which license is Intellectual Property associated with a tcept packaged into;
- Which techniques can be applied to analyze a tcept
- What team is analyzing the area of technology a tcept is in;
- Who invented (claims invention of) (which elements of) a tcept
- What is the lexicon used a tcept Prediction Weighted relationships are formed by predictions of likelihood that a tcept will actually satisfy/solve an appcept in a certain timeframe from Modal Logic possibility, probability, and necessity estimates as used to determine if a technology horizon will contain certain or other tcepts.

Yields a better map of what exists with identifiable technological gaps to allow more pointed inspiration toward entrepreneurial activity;

Stretching of the imagination of users, beginning with tracking of abstract, 'crazy', or previously unknown ttxs from an early point, vetting them, and managing an iterative, collaborative process to yield continuous refinement, detailing, and categorization toward improvement of predictions;

Stretching of the innovative abilities of users to consider technologies from old to science fiction, managing an incremental, collaborative process to yield huge numbers of minor but cumulatively important refinements and improvement in predictions and forecasts;

A platform for soliciting massive numbers of expert and lay opinions on a particular ttx, providing coordinated group interaction without face-to-face meetings between vast crowds, avoiding direct confrontation of those with opposing views, and yielding 'best available basis' predictions and forecasts;

Prediction based upon a map of ttxs and true Wisdom of Crowds for collective estimation and predictive mapping where the map is re-sorted, refined, and redrawn based upon user's opinions of the gestation of tcepts (whether and when a tcept will come into existence) yields a 'collective best guess' of each technology horizon that evokes further opinion (Technologies are not conjured by the mapping system any more than oil is generated by an oil field mapping system.);

Accurate assessments of the probability that a ttx will become real are improved through learning by users and refinement of predictors of a ttx's, resulting in a best available overall prediction of the status of each tcept based upon a massive, joint, reusable, incremental characterization;

Crowd-sourced, fine-grained basis for predictions of technology trends;

Continuous updating by a large group of empowered users, each more efficiently solving their daily work problems, results in navigation, searching, categorization, and highly particularized, incremental improvements that increase both the value and accuracy of the CMMDB;

A basis for connecting additional information about the tcepts, and information added by others to state their own expertise, advertisements, or other statements;

An accessible, usable, platform providing information to intellectual property managers;

A 'best available' basis to forecast specific technologies into the future;

Awareness of the different types of technologies out in the market;

Refresh awareness of technologies;

A way for an inventor to determine early on if they were reinventing a tcept, and who had already done so or the competitors in the specific area of technology;

Rapid and collaborative description of new ttxs and tcepts;

Tracking of historical to future progress of innovation in tcepts;

Viewing technological horizons past, present, and future;

Serendipitously scanning of tcepts;

Users can identify similar works outside one's expertise;

An easy, rapid, and efficient growth in detailed innovations;

Compound growth in innovation by combined, collaborative effort of crowds;

Near zero cost and near zero delay in addition of new innovations;

Improved granularity and classification of tcepts;

Rapidly refined categorization and mapping of technologies;

Rapidly connect tcepts and appcepts;

Rapidly compare fit of and determine comparative value of tcepts;

Self-managed collaborative results unrestricted by locale and incentivized by investment;

Collaboration with others interested in the same narrow technology for work or investment or with specific expertise, including technology development by consortiums;

Collection and connection of conversations, information resources, information, and references to information to a common and specific tcept;

A wealth of product ideas available to entrepreneurs seeking gaps for which inventions are not addressing a need;

Rapid checking of the commercial viability of ttxs by collaboration or analytics;

Rapid checking of the novelty of a ttx or the existence of equivalent products;

Spotting of potential uses for a tcept;

Spotting tcepts that are nearly appropriate for but failing to actually satisfy an appcept due to a roadblock;

New product ideas for adoption by an entrepreneur;

Collaborative assistance in completing tcept definition, design, planning, and productization;

Collaborative assistance in networking for and obtaining investment;

Rapid checking of the competitive technologies facing a product;

Alternatives analyses for assessing a technology investment that will pull-in a technology solution;

Business procedures and transactions providing commercial revenue opportunities;

Effective collaboration for technological innovation;

Provides a concise body of knowledge where potentially undiscovered connections between ideas are more visible;

Entrepreneurs may effectively identify undeveloped areas and needs for technology by finding opportunities for development by navigating to unfulfilled appcepts on the map;

Inventors may effectively identify undeveloped areas and find opportunities for innovation by navigating to fringe areas of the map;

A leveling of the playing field between large corporate innovation shops and individuals;

A sharing of half-baked tcept and appcept ideas ('possibles');

Established relationships between technologies (re-categorization, integration)

Contents of CMMDB provide structured basis for market segment analysis, history of similar technical problems, and attempted or possible solutions to those problems;

CMMDB information can be readily reorganized for use according to personal needs or by standard technology classification indices Users may search for comparable technologies and locate expertise for those technologies;

Users may search for comparable technologies that have better features;

Valuing technology against the others available in the market;

Collection of user interest shown in ttxs, tcepts, and appcepts;

Multi-fxxted categorization of tcept and axpts and the associated information;

Armchair inventors are be empowered to participate in innovation at a low cost;

Blinders of lingo, language, age, corporate boundaries, and distance separating creativity from assistance are removed;

Contents of CMMDB provide structured basis for technology valuation by traits such as features and needs, expert estimates, interest shown, and gestation analysis;

Confusion is highlighted for correction where general and specific information are poorly segregated;

Currency is high because the data held is refined within the area of expertise of users who consider the repository to be their tool for information storage, because the tool is easy enough to use, and because the users are otherwise properly incentivized to keep the information current;

Overcome 'No ownership' problem for technologies;

Utilize Small Cuts to 'suggest' something novel.

Product Planning Process

Use Case: Product Planning Process.

Product Planning process includes the sub-processes of the of the other above processes as specialized and:

Company/Competitor Profile

Application Requirements Management

Product Line Planning

Product Planning

Product Management.

Not all steps are required in other embodiments.

Product Planning Benefits

The steps in the Product Planning lifecycle, in conjunction with the Innovation and Ideation lifecycles, can provide, for example:

A simplified approach to rough product planning appropriate for cross company competitive analysis and product road mapping, considering product descriptions, tcept features, and appcept requirements and variation requirements, but without stakeholder, business objective, and production constraint analysis;

A platform and commonplace for dynamic product roadmap generation providing graphical views of an organization's product objectives over time on a scenario basis, identifying products and their technologies that will be the focus of the roadmap, the critical system requirements, critical technology drivers, technology alternatives and their time lines to enable communication of long-range strategic plans in a consistent format, help stakeholders spot relationships/dependencies of resources, generate automatic alerts of changes, especially changes in competitor's core assets and product strategy.

Definitional tools for describing multilevel application domain models to hold, organize, communicate, and track relevant information;

A simplified requirements engineering mechanism by which the complete set of requirements for a product line and particular products can be produced quickly and easily, providing requirements statements as differentiation criteria between appcepts, fitness and effectiveness criteria for matching tcepts to appcept and products to market purposes, and inter company and intra product line comparison based upon a discussion commonplace for requirements analysis results of domain analysis, use cases, change cases, and commonality/variation analysis, traceability from requirements and an initiation point for feature-oriented domain analysis, requirements verification, issues regarding features, and configuration management;

A commonplace for descriptions and tools for identifying commonalities and variabilities of products and technologies used in products and product lines for comparison of existing products or technologies and technologies that have not yet been used in products or defined completely;

Organizing tcepts additionally by what department should manage a ttx, when the first product based on the ttx would become available, how qualified a ttx is for investment, what stage of development a ttx is in, what team is analyzing the appcept a tcept is in, which license a tcept is packaged into, and which analytics can be applied to analyze a ttx;

Retained and refined product roadmaps for internal and competitive product lines;

Specification of a set of complementary products that provide a complete, workable solution to specific appcepts by matching features to requirements;

Specification of a product line that fully covers all (or most) market requirements for specific appcepts;

A platform and commonplace for technology planning for speeding commercialization of technology through improved knowledge and better fitness analysis of technology use in products;

Estimate relevant product costs and value;

Estimate product-specific profitability based upon features;

Appcept requirements managed include product constraints such as: behavioral features, standards, performance limits, external interfaces, physical constraints, quality requirements;

Track relevant company and competitor core assets as weightings on requirements to show competitive strength in the area of the requirement;

Generate product comparisons to report commonalities and variations among products in product lines and between competitors;

Planning tool for the evolution of the product line (that is, the incorporation of features) to meet appcept specific requirements by defining product line breadth and by phasing tcept features into product candidates, allowing valuation modeling;

Summarize a product line architecture, stating the commonalities and variabilities identified in the architecturally significant requirements, matching requirements against the features of the products and the technologies involved in the products for each timeframe or phase, assessing the investment value of a product line and the feasibility of producing a particular product as part of the product line;

Domain analysis techniques to assist in requirements elicitation, to identify and plan for anticipated changes, to determine fundamental commonalities and variations in the products of the product line, and to support the creation of robust architectures;

A commonplace for relevant domain analysis for stating areas of expertise for building products or those of a competitor, discussing the recurring problems and known solutions within these domains, and identifying the current and potential future capabilities for the product lines considered;

A commonplace for feature modeling for describing user-visible aspects or other characteristics of a tcept or product based upon a tcept, organized to identify the commonalities and variabilities of technologies and products and to match against requirements, allowing analysis using techniques such as the FODA method, Product Line Analysis (PLA), and the feature-oriented reuse method (FORM), as well as feature traits for use case modeling to describe variation points within a use case, and change-case modeling to specifically describe anticipated product changes;

Phased scoping describes a timeframe-based list of features implemented in a product or product line useful in product comparisons over time and product line comparisons between competitors, as well as satisfaction by a product line of predicted market drivers, competing efforts, business objectives, and technology forecasts of expected future tcepts in the CMMDB by analyzing the commonality that two products or two tcepts share and the ways in which they vary at a point in time;

A platform for examining existing, competitive products to identify competitor plans, market strategies, potential product line core assets that can be mined and used competitively;

Alternatives analyses for assessing a feature change or market strategy that will pull-in a market lock;

Clarification of feature change and need satisfaction scenarios;

A disaggregated, quantitative basis for forecasting market demand and market share by feature;

Crowd-sourced, fine-grained basis for predictions of product demand and value;

Efficient advertising and selling of products;

- Efficient locating and purchasing of products;
- A well categorized online product catalog system for analysis;
- A well categorized online product catalog system for e-commerce sales;
- A basis for market analysis;
- Customer analysis based upon their products, technologies, and market positioning;
- Customer technology needs based upon their requests or upon their product or production inefficiencies and weaknesses;

Competitive Analysis and Environmental Scanning Process

Use Case: Competitive Analysis and Environmental Scanning Process.

Competitive Analysis and Environmental Scanning process includes the sub-processes of the other above processes as specialized and:

- Competitive Analysis Research Task
- Methodology Based Environmental Scanning Design
- Methodology Based Environmental Scanning Automation
- Methodology Based Environmental Scanning Assisted Scanning
- Methodology Based Environmental Scanning Actions
- Methodology Based Survey Design
- Methodology Based Survey Automation
- Methodology Based Assisted Survey Review
- Methodology Based Survey Actions
- Data Analysis
- Competitive Analysis Study
- Calculate Competitive Posture Report.

Not all steps are required in other embodiments.

Competitive Analysis and Environmental Scanning Benefits

The steps in the Competitive Analysis and Environmental Scanning lifecycle, in conjunction with the Innovation, Product Planning, and Ideation lifecycles, can provide, for example:

- Competitive Analysts can view the technological trends and the directions their competitors are taking in innovation;
- A commonplace and methodology based workflow system for controlling automation and managing user and crowd activities for environmental scanning, secondary research document review, survey analysis, and issue research efforts. Combines use of software agent analytics to perform meta-searches through search engines, searches through internet service providers such as Nexcerpt and CyberAlert, scraping of online publications, newswires, newsgroups, DeepWeb and private knowledge bases with manually conducted searches to find information of interest using keywords specified, complex goal oriented queries, and information semantically related to ttxs to locate and develop information on competition and competitors and to monitor the environment external to the firm for information that is relevant for the decision-making process of the company.
- Organizing of knowledge for competitive product analysis;
- Found source hits and survey mentions are classified and queued for review and data analysis, offering alert and importance ranking for prioritization of primary research effort for different information themes, to enhance efficiency, to comprehensively include sources, and rapidly distill information into reports;
- Information disaggregated by ttx and research objective is available for data analysis and use in summarizing strategic knowledge about competitors, position, performance, capabilities and intentions;
- A commonplace for a competitive analysis study, providing a definition umbrella for the study to include the objective and its critical question(s) or hypothesis to test, the scoping statements, each of the primary and secondary research objectives and the body of relevant information found toward those objectives, research findings, and the report;
- Real-time, reusable, automatically repeated (alert based) competitive intelligence and environmental scanning analyses and scan hit management;
- Rapid checking of the specific competition facing a product by feature similarity, satisfaction of requirements, market approach;
- Crowd-sourced, fine-grained basis for predictions of market share and trends;
- Automated and assisted scanning techniques with template scraping requests for data collection;
- Spot and be alerted to market trends;
- Keep updated with market demands and trends;
- Market trend analysis (searching for interesting technologies);
- Search for customers by expertise, locale, interest;
- Trends among successful companies versus unsuccessful companies;
- Corporate tech transfer, product planning, and competitive research with more comprehensiveness and efficiency;
- Services to alert users to events such as new competition or products;
- Determination of development progress by competitors Innovation Investment Planning, Portfolio Analysis, Data Mining, And Metrics process Use Case: Innovation Investment Planning, Portfolio Analysis, Data Mining, And Metrics process.

Innovation Investment Planning, IP Portfolio Management (Intellectual Property With or Without Patent Protection), Portfolio Analysis, Data Mining, And Metrics process includes the sub-processes of the other above processes as specialized and:

- Information Collection Definition
- Patent and Technology Information Collection System Operations
- Manage Portfolios of Technology (Owned, or Competitive)
- Invention Positioning and Description
- Measure Intellectual Property Interest
- Automatic Patent Categorization and Metric Analysis
- Portfolio Exploitation
- Intellectual Property Investment
- Consortium Investment
- Innovation investment pools
- Intellectual Property Procurement
- Patent License Management.

Not all steps are required in other embodiments.

Innovation Investment Planning, Portfolio Analysis, Data Mining

The steps in the Investment Planning, Portfolio Analysis, Data Mining and Metrics lifecycles can provide, for example:

- Prediction of tcept fruition and gestation timeframe;
- Analysis of technology market segments to focus investment;

A wealth of narrowly focused and efficient discussions for locating and funding investment opportunities;
Analysis of a tcept and a specific provider prior to investing;
Efficient placing of investments in technologies or technology companies;
Investment instruments for shared risk and risk spreading in technology investments;
Efficient placing of investments in technology spreads or pools; and
An extreme increase in the pace of innovation;
Tracking and exploitation of a company or organization's patented or patentable property is more efficient and more complete because of the utilization of and connection between a greater amount of information already available to the organization and because of the building of communities of interest specific enough to allow more efficient discovery and control of new ideas and more efficient outreach and awareness regarding sales of rights;
Categorization of research provides simplified description of intellectual property and the ability of those who have high interest in the category to recognize the value in the property for acquisition. Less need to widely publicize IP or to organize separate advertising sites for IP sales. IP owners achieve more accurate expectations regarding IP value so IP negotiation is more rapid. Breadth of IP considered is reduced and efficiency of comparison are improved, so specific value of IP is easier to recognize and calculate. License revenue is easier to track because the system can watch productization and utilization by product of IP technology where the competitive intelligence portion of the system is collecting that information.
Patent, Trademark and Copyright Protection Management
  Intellectual Property Awareness Management
  Intellectual Property Right Protection (Patent Clearance Process)
  Publication Awareness (Patent Clearance Process)
  Litigation Support
  Descriptions for All Purposes—Patent Application/Registration Management
Invention Development Financial Analysis and Budget Planning
Product Design & Engineering Management
Production and Manufacturability Management
Offerings (Securities)
Intellectual Property Tool Management
Internal Knowledge Base
Information Storage and Retrieval Facilities
Analytics
Product Evaluation—Determine the Value of a Product That Is Not Yet Available
Will Your Product (Family) Really Offer Advantages Over the Competition So Compelling, That You'll Actually Earn Market Share?
Consider Together the Interrelated Aspects of the Product Development and Evaluation Process
Get a Realistic Picture of the Overall Strengths and Weaknesses of an Innovative Product Before Introduction;
Must Consider 2 Alternatives: Where Exclusivity to Market Product Exists, and Where Competition Is Allowed Due to Lack of 'Res' (ownership of right)
Factors:
  Product Strategy
  Sales & Marketability Assessment
  Societal Consequences and Environmental Impact Evaluation
  Product Design & Engineering Approaches
  Production and Manufacturability Assessment
  Legal, Liability and Safety Evaluation
  Invention Development Financial Analysis and Budget
Intellectual Property Categorization, Analysis, Evaluation, and Comparison
Categorize for managing IP department
Categorize for compartmentalization of security
Categorize for determining ownership of ttx
Categorize for determining protection needed for a ttx or whether exposure may occur
Organize IP Analysis
Focus the Analysis on specific element (claim) of inventions (detailed)
Focus the Analysis on specific groupings of elements of invention(s) (expansive)
Evaluate Groupings of Ttxs (claims)
Coordinate with others
Obtain input/evaluations from others
Competition and Competitive Product Analysis
Provide structure for determining ownership based upon ownership of prior art
Provide some organizational learning—reusability of prior efforts and analysis; continuity of organization
Licensing negotiation and packaging
Basis for analytics—different analysis patterns for different tcepts
Compare Patents
Properly compare values of groupings of IP—members of groups cannot vary between comparison periods, and members may not vary from one analysis to another;
Provide for consistent summation and characterization of value
Allow for time-based exclusivity calculation
Macro-economic patent value modeling
Product-line planning
Licensing revenue evaluation
Patent Awareness
Control of Distribution of Reports—Burden reduction, efficiency, organizational management
Patent Competitive Intelligence Distribution Lists
Patent Factor Value Analysis and Periodic Tracking
Prediction/Future Investment Value
Who might invent a tcept?
Where might a tcept be invented?
'Best Available Basis' Forecasting By Precedence, Geo-aging, and Technology Valuation Metrics;
What is the potential ordering of inventions like this?
  What is the potential set of tcepts that could solve the same problem as a given tcept?
  What tcepts will be available at a certain point in the future?
  When can a certain problem be solved?
  What can affect the ordering of inventions related to this?
  What tcepts might be conceived of but not invented (or described);
  What problems might be conceived of but not addressed by existing tcepts;

How much interest is there in solving a problem that a tcept might solve?

Intellectual Property Valuation and Metrics

Use Case: Intellectual Property Valuation and Metrics.

Intellectual Property Valuation and Metrics process includes the sub-processes of the other above processes as specialized and:

Patent Value and Legal Quality Analysis

Technology Strength and Valuation Analysis.

Not all steps are required in other embodiments.

Intellectual Property Valuation and Metrics

The steps in the Intellectual Property Valuation and Metrics lifecycles can provide, for example:

IP analysts get a basis for property valuation;

Invention Evaluation—Determine the Value of a Patent or Published Application:

The Difference Between the 2 Alternatives Above (for whole family of products), Tempered by the Probability of Retaining the Exclusivity for some timeframe;

In Other Words, HOW MUCH WOULD A PATENT BE WORTH?

Assess Factors, Then Balance Them to Get a More Accurate Picture of the Impact of Individual Aspects on the Total Evaluated Value Various Analytics:

Stochastic/Patent Analytics

Weighted Estimation, Usually Based Upon Experience

Patent Factors:

Infringement and Product Strategy

Licensing Revenue Development Evaluation

Patent, Trademark and Copyright Protection Assessment

Infringement Constraints Evaluation

Critical to Start Negotiations: Need Solid Understanding of a Patent's Estimated Value—for Venture Capital or Acquisition Due Diligence; Licensing Negotiations; or R&D Investment Analysis;

Will Large Companies Really Want to License It—and Pay a Royalty?

Calculate Metrics for:

Novelty

What is a technology like?

Can a technology work as described?

What specifically is new about a technology?

What other tcepts are related to a technology?

How are other tcepts comparable to a technology?

What information is available about a technology?

What is quality level of patents in a technology?

Expertise

Who knows about a technology?

Who knows about a problem/appcept?

What information is available about a problem/appcept?

IP Portfolio Management/Investment Value (Macro)

What is the history/lineage of a technology?

How do assignees or inventors rank?

What are the trends in a technology category or in patent filings in an area?

What is the density/activity of filing for competitors?

What are the international technological trends?

Are new tcepts being substituted in competitors' portfolios?

Are competitors "Patenting Around"?

Is IP protection a major factor in the market?

Is portfolio aging managed aggressively?

Is inventor population aggressive/active/connected?

Does prior art proportion show inventiveness of team?

What is patent quality in portfolio?

Reality/Present Investment Value (Micro)

Will a technology work?

Who needs a technology?

What problems can a technology solve?

When will a technology work?

What part of a technology is working?

Who (also) makes a (similar/related/competitive) technology?

Who (also) is trying to solve a (similar/related) problem?

Who is interested in a technology?

How much interest is there in a technology?

Who currently makes money from a technology?

Who might make money from a technology?

How much is a technology worth (and to whom)?

How much is being invested in solving a problem/developing a technology?

How can we organize to assess (track) a technology's (or company's) value?

Information Services and Access Sales Process

Use Case: Information Services and Access Sales Process.

Information Services and Access Sales process includes the sub-processes of the other above processes as specialized and:

Acquire Private System

Use Data Externally

Data Commerce

Tools Commerce

Expertise Commerce

Advertising Commerce.

Not all steps are required in other embodiments.

Information Services and Access Sales Benefits

The steps in the Information Services and Access Sales lifecycles can provide, for example:

A way of generating businesses surrounding ideas and the patents on those ideas; A market for access to information about ttxs;

A market for access to information about technologies;

Disaggregated Data Sales;

Incentivization of users to promote the building of a CMM ttx knowledge base;

Incentivization of users to promote the building of a CMMDB tcept knowledge base;

Cooperative preparation for technology patenting with shared, negotiated ownership rights;

Many small consortiums formed online attempting to invent, patent, build, gain funding, and commercialize worthwhile ideas, with individuals joining by stating worthwhile additions to the description, diagrams, or claims that are voted on by the other members and tracked by the system, and negotiations regarding ownership are based upon the votes by the contributors;

Cooperative evaluation of novelty of new inventions both because of reused prior art searching and by appropriate online discussions narrowly focused on the tcept, its characteristics, and its features;

Guided and assisted consortium and venture formation eased by online tools, services, and communities;

Guided and assisted patent preparation eased by online tools, services, and communities;

Game base for emergence game, such as bet on tcept fruition/making investments; Specific Analysis report sales Templates for Study/Reports sales 'Live' report Template sales
Access to information—Individual
Access to information—Study
Access to information—Site
Managed Knowledge service
Search Services
Eliminating Advertising or Hindrances;
Platform to categorize intellectual property along side of properties owned by others to allow IP owners to assess and manage their own property;
Patent Invention Process Use Case: Patent Invention Process.

The Patent Invention process includes the sub-processes of the other above processes as specialized and:

Patent Process Establishment
Patent, Trademark and Copyright Protection Management;
Patent Clearance
Patent Idea Survey
Patent Application Workflow—Prepare for Patent Application
Patent Application Workflow—Apply for Patent.
Not all steps are required in other embodiments.
Patent Invention Benefits The steps in the Patent Invention lifecycle can provide, for example:

Greater efficiency in patent application and prior art searching;
A categorization platform, which reduces the basic problems in searching prior art, especially language;
Efficient advertising and licensing of technologies;
Efficient locating and licensing of technology solutions;
Inventors may easily search prior art by navigating and querying the CMMDB;
The field of Prior Art Searching has limited and costly facilities for finding prior art, and the result is that the cost of each search is high and that results are poor;
This leads inventors to forego searches, to spend large sums on fruitless patent prosecution, to claim excessively on patent applications, etc.;
Lack of good quality searches leads to major costs for all concerned as patents are issued and must then be defended against similar patents;
A dynamic "Best Available" categorization index vastly deeper, multiply fxxted, with collaborative refinement, and not relying upon key words exceeds the capability of the older Derwent World Patents Index, IFI's CLAIMS family of databases, East and West, INPADOC, and all other known search tools. Class codes and reclassification of patents to reflect the newest codes are a thing of the past. Basic relevance searching as in Google and full text searching as in Patents Fulltext, WIPO/PCT Patents Fulltext, European Patents Fulltext and JAPIO cannot match the ability of retained and reusable search mechanisms such as this.
Services to alert users to events such as encroachment on intellectual property such as utility patents;
Other users will be incentivized to record into the system any product they find or any tcept they see that seems to infringe upon the intellectual property registered as ttxs or provides a tcept defined in the system as a ttx;
Patent Clearance
By attaining usefulness to professors and staff as a work tool and a means for incentive and publicity, the system becomes a welcome means to track an honest staffer in his/her conceptualization, and thus to obtain advanced notice that the staffer is at a pre-patent position.
A mechanism for staff disclosure tracking where possible inventions and material with proprietary (of organization or another) should be reported before the material is ready for publication to provide sufficient lead time for patent clearance prior so that publication delays can be avoided;
Patent clearance process provides maintenance of Intellectual Property rights by showing of actual restriction on exposure by publication or disclosure and addresses 'duty of care' to show that organization does protect secrets properly, as well as providing a means for prosecution of employees and others;
Patent clearance process provides maintenance of Intellectual Property rights where disclosure of inventive/novel, and unprotected ttx would set a statutory publication date too early or may bar foreign patent rights entirely;
Patent clearance process provides maintenance of Intellectual Property rights where disclosure is of actual infringement on someone else's patent;
Related to Patent Clearance
A mechanism for awareness of activities of others regarding a technology by an organization, including companies, universities, governments, non-profits, investors, and innovation consortia, including but not limited to: determining where possible value, or possible harm from publication can be acted upon; detecting conflicts of interest; detecting competitive positions; detecting portfolio activity and investment value affecting events;
A mechanism for comparing information found to information to be or considered under protection, so that when some information is found by anyone's search (or a scraping, or a specific set of people's searches), the fact of it's existence or its exposure is reported to the Patent Clearance office.
Socialize Process Use Case: Socialize process.

Socialize process includes the sub-processes of the other above processes as specialized and:

Develop Community
Establish Profile for Communities
Engage with Community
Interact with Community
Administer Community
Outreach.
Not all steps are required in other embodiments.
Socialize Benefits
The steps in the Socialize lifecycle can provide, for example:
  Participation in narrow, effective communities that are centered on specific ttxs;
  Commercial Socialization: High Trust Model/Narrowed Topic Professional Community 'Social Web' for Communication Diversity (activating Wide Networking, Narrow Networking, Intimate Collaboration, Outreach, recognizing disparity between Social, Mixed Social, Professional Discussion, and Competitive Communication)
  Natural audience segmentation provided by matching of newness of technology to nature of user, researcher to theory, entrepreneur to practical, product manager to development;
  Provide efficient social networking interested business people with 'Social Web' techniques such as:

On-line communities: discussion forums, chat rooms, interest groups, blogs, webinars, post class/post school communities Off-line gatherings of interested people: classes, meetups, events, conferences Connect entrepreneurs to focused resources: on-line/off-line information and connections to resources:

On-line information: knowledge bases, recorded lectures, on-line courses, opt-in/subscription information channels;

Off-line information: subscription publications;

Connection sources: classified 'ads' such as opportunity lists, idea lists, links to service providers;

Connection tools: post ads, post requests for assistance, partners; expertise;

Location tools for finding Intellectual Property for purchase: to obtain controlling IP by selective acquisition; for improving internal efficiency;

Management of the Ecosystem by:

User registration, self-assessment, self-identification, opt-in, and subscription Class, Meetup, Event, Conference management and registration Content management and site administration Outreach, Messaging, etc.

A way of connecting structured and social conversations and communities to specific and narrow-focus ideas;

A wealth of narrowly focused and detailed discussions by highly interested users about specific technologies;

Networking for establishing personal or business connections with others interested in the same narrow technology for work or investment or with specific expertise;

Networking for customer advertising of needs for roadblock solutions, etc.;

Common ground to gather together their expertise and share knowledge;

Outreach collects experts' (anyone stating knowledge specific to a ttx or tcept) (publically available) contact information for facilitating contact and business connection, manages connection to experts, coordinates connection with experts, invites experts, lists the expertise with ttx, links publications to ttx, and with opt-in allows sharing of expertise by sharing of expert's involvement with system;

Effective platform for academia-industry-innovator collaboration relationships forms as students, alumni, and faculty connect with engineers, entrepreneurs, innovators through shared interest in specific technologies;

Remove barriers and delays by blending on-line and off-line communities of interest surrounding specific narrow tcept categories;

Focused community members will interact with each other, on deeply specific ttxs of interest, increasing efficiency, interest, and trust by reducing the ambient noise of more superficial interaction present in more socially oriented sites;

Focusing for community extends communication trust model by allowing communication for outreach to small numbers of people interested in a narrow ttx area, while widening access to resources within that narrow group;

Increased value to authors by easing outreach for demand generation, tighter interest connection for sensing current and specific interest areas within a narrow ttx area, and greater potential for reader to reader community building;

Focused community trust model yields efficient connection for staff, editors, authors to respond back and to actively interact with readers;

Authors addressing a narrow ttx area are more productive due to efficiency of outreach, better specificity of reader interest, thus being able to concentrate on specifics, while selecting a greater number of channels over time, and relying on the market needing more general information to connect to a more general ttx area;

A growing, integrated, and well cataloged body of knowledge attracts an equally well defined and growing number of market segments, with better stated interests and greater cohesion, higher engagement, and customer retention;

The searchable, focused, and refined content archive provides deeper relevancy for a community than events or networking alone, keeping members deeply engaged on very specific technologies than other social sites;

Innovation Ecosystem

A set of communities (business, local/remote team building);

Creates organizing construct for emerging content and events (taxonomies by stage and by tcept)

Integration of Services decreases cost and improves efficiency of outreach;

Innovation Focusing Mechanism

Classification table for all existing and yet-to-be fully described technologies Portal giving inventors collaborative research with the ability to see the demand-side of their inventions instead of wasting time on useless inventions A proprietary search mechanism that automatically generates new communities of domain experts and entrepreneurs centered around more and more specific tcept categories over time Cross-Pollination Sharing of Involvement by Experts Efficiency in Collaboration Remove barriers and delays by blending on-line and off-line communities of interest, extending reach, widen pool of resources, channel and reuse knowledge, cross apply chapter efforts Community templates include, as an example:

Topic Description
Library
Library Submission
Consortium Available
Consortium Management
Consortium Investment Opportunity
Utility Patent Preparation
Utility Patent Prosecution
Prior Art Discussion
Novelty Discussion
Product Discussion
Association List and Board
Expert List and Board
Interested Entrepreneur/Worker List and Board
Interested Advisor List and Board
Service Provider List and Board
Business Plan List
Business Plan Preparation
Plan Preparation Competitive Analysis Interest Area
Product Planning Interest Area
Product List and Board
Interested Investor List and Board
Interested Member List and Board
Blog
Discussion Forum
Chat Room
Interest Group Content Site
After Class Activity Board
Post-Graduation Community
Event/Webinar/Class/Conference/Gathering
Alert List
Idea List
Announcement List
Shout-Out List
Shout-Out Submission
Opportunity List
Opportunity Submission
Outreach Facility
Outreach Submission
Side Conversation
Roadblock List
Roadblock Submission
Survey
Trait Discussion
Generated Variant Discussion
Issue/Work List
Issue Submission
Shares Available
Cross-Border, Cross-Language Community
Analytics and Applications Store
Information Store
Templates Store
Analytic/Application/Information/Template Submission
Product Store
Opportunity Store
Work Product Submission
Suggestions Submission
Disconnects (Systemic Problems) List
Grants/Government Assistance/Government Interest Workflow and Alerts process Use Case: Workflow and Alerts process.

Workflow and Alerts process includes the sub-processes of the other above processes as specialized and:

Workflows Processes
Alerts Processes.

Not all steps are required in other embodiments.

Workflow and Alerts Benefits

The steps in the Workflow and Alerts lifecycle can provide, for example:

Automatic operations;
Notification when activity occurs or when pertinent information changes;

Government Purpose Process

Use Case: Government Purpose Process.

Government Purpose process includes the sub-processes of the other above processes as specialized and Patent Management, Intelligence, and Employment, and:

Manage Innovation on Policy Level and/or Research Funding
Manage Demand side such as Defense Purchasing
Manage IP Assets.

Not all steps are required in other embodiments.

Government Purpose Benefits

The steps in the Government Purpose lifecycle can provide, for example:

Improve the quality and efficiency of the patent examination process;
Provide a common search and evaluation environment including some translation capabilities;
Provide tools to document the search process;
Timely measurement of the pace of innovation;
Capturing the quantity of new innovation events of a certain level of quality in each period;
A framework for where innovation is important and fungible, and where money is being directed toward innovation;
A classification structure that is rapidly formed and updated;
A navigable classification that provides serendipitous discovery while allowing a familiar basis and a way of making changes;
A chart of accounts used for statistical measurement based upon the newness of the technological categories and the parentage of the categories;
A way to 'out' tcepts into the 'map' and obtain collaborative improvement;
A proactive system for measurement and a tool for affecting and directing technology;
A relative metric for innovation by locale;
A relative metric for innovation by timeframe;
A sufficiently detailed knowledge base and platform for managing and guiding innovation and investment;
Links entrepreneur needs to locale/technology specific ecosystem participants;
Keys entrepreneur into specific industry/technology communities of interest;
Closes the gap between entrepreneurs and possible resources by better tuning service provider/investor connection to specific tcepts;
Patent examiners, agents, and inventors can quickly find likely prior art, retain the list, and produce the list in a proper format;
Prior art searches are dynamic in that as new information became available it would automatically become a part of the search result and retained lists, and alerts to the examiner, agent, and inventor/assignee could be issued automatically;
Prior art searches are reusable for searches on other patent applications;
Availability of platform for Near Zero Cost/Near Immediate Recognition and Near Zero Cost Protection by presumption of novelty by PTOs in the utility patent area (Near Zero Cost is where an inventor's burden to enter a name and a single descriptive paragraph is sufficient to attain a presumption by PTO that the ttx is novel and that, presumptively, it is reducible to practice, and thus deserves a priority date.) (Near Immediate Protection is the shortest possible timeframe between when a ttx is 'conjured' and when it is granted some form of protection status, even if it is an anointing by the government to recognize apparent novelty of a recognizable yet ill-defined ttx. The anointing will not necessarily cut off others, but a presumption of novelty is granted to the ttx.);
National innovation improvement efforts could be planned, directed, and measured more effectively;
Innovation inefficiencies due to the chilling effect of lack of protection are reduced by allowing publication by registration of a ttx without reduction to practice by description, even if the degree of protection afforded is slight, its timeframe short, and a requirement for prosecution effort exists;

Nascent cnxpts can be 'access controlled' to allow visibility to inventors, owners, and implementers for group development, while also being 'published' for establishing priority dates;

Notice to candidate consumers regarding available technologies to remove 'disconnects' in commerce due to funding, language, description, lingo;

A reduction in 'wide claiming' that complicates the patent approval process, prosecution, and litigation, by innovation incrementalism where protection is dolled out in the approval of only single or a small number of claims;

An efficient basis for measuring innovation on governmental level, with disaggregation by locale, market, field, level of investment, timeframe, nature of business, nature of inventor, etc. to allow innovation management, targeted execution, resource allocation; innovate, and invest?

Improvement in the quality and efficiency of the patent examination process as seen by the inventor and agent—and especially desired by the top Patent Offices, by creating a rapidly improving dynamic yet common classification system; efficient, high-quality searching for already classified and reachable prior art; overcoming language barriers; dynamic and reproducible search results with ability to document the approach and strategy associated with each search;

Work sharing and reuse between users and Patent Offices to understand patentability earlier and to focus on reduction of redundancy in patent process;

Incorporation of all publically and privately available information resources into classification mechanism but with access control and partitioning by organization of proprietary documentation;

Crowd sourced, expert, and analytic based documentation classification with incentivized workflow oriented import and addition review;

Elimination of Language dependency and machine translation by using relationships and classification, along with incentivized translation by workflow for correction of errors;

Search and patent prior art report generation so each inventor and agent has the ability to produce and reproduce search results on a dynamic basis, with the additional benefit of documenting the approach and strategy associated with a search;

Competitive Intelligence (Government)

Competitive Posture—How do we stand (compare), and why? How can we change?
- Manage Military Strength—Defense Analysis/Military Intelligence Analysis
- Military Technology Assessment
- Strategic Intelligence Analysis
- Economic Intelligence Analysis/Economic Espionage/Industrial Intelligence/Industrial Espionage
- Technology Espionage
  - What do they know about X
  - How did they find out about X
  - What do we know about Y
  - What pieces are we missing about Y How do we improve efficiency:
- reduce the cost of development
- increase communication across programs
- shorten development time
- protect against technological obsolescence
- improve alignment between technology development and strategy
- increase technology re-use across command structures
- plan with emerging COTS requirements in mind Learning from Others:
- Environmental Scanning
- Text Mining
  - the capture, transformation, analysis, and dissemination of critical unstructured information across multiple domains regardless of format, language, data type, or location.

Organizing That Which is Known
- Technology Roadmaps (with/or without stating resource requirements)

Determining How Much is Known
- Intelligence teams and Fact Finding with Industry Organizing To Accomplish (Catch-up)
- Technology Roadmaps (for planning)

Determining/Monitoring Efficiency of Accomplishment
- S&T Management Metrics, and
- S&T Management Cost-benefit Analysis Science and Technology (S&T) Management—Intellectual Property Public Policy and Management Innovation and creativity are drivers of economic growth, sources of competitive advantage, and desirable human activities. The Law awards exclusive and tradable property rights to the products of human ingenuity;

International agreements protect the intellectual estates of the global free trade area by minimum standards of copyright, industrial designs, patents, trademarks, and confidential information;

Not all assets lend themselves to intellectual property protection. Effective protection is not cheap. While governmental and inter-governmental bodies see strong intellectual property rights (IPR) as part of a solution, and multinational companies have discovered the strategic use of lobbies and litigation, there is an urgent need for independence in research.

Little empirical work has gone into the effects of IP law on behavior. Best practices are still forming.

The ease of breaking IP has led to disenchantment among technologists. The complex nature of IP Law may also be responsible for a lack of IP awareness among many creative businesses. Perhaps there is a need for training. Perhaps there is a need for better comparison facilities for technologies.

Science and Technology (S&T) Management—Public Policy—Nationalistic

Improve the Art—Provide better means for retaining exclusivity to:

enforce the nation's internal laws

Maintain global competitive advantages due to innovation defend against international economic espionage and provide international basis for exclusivity;

to improve strength of innovation to improve national economy to improve strength of innovation to improve global economy Technology Watch Decision Aids Narrowcast Patent/Research Publication Technology Evaluation Decision Aids Information Management and Retrieval, Categorization Facilities IP Law, Analysis Management, Peer Review, and other Organizational Techniques Technology Roadmaps, Innovation Management, S&T Management Metrics, S&T Management Cost-benefit Analysis, and other Macro Analysis Technologies Coordinating with others within specialty area Obtain input/evaluations from others by specific Intellectual Property As a basis for analytics—to apply different analysis patterns for different tcepts As a tool in Litigation and Patent Prosecution to focus and control litigation to coordinate language across many lexicons (each patent has its own)

Patent awareness management for bureaucracy reduction, efficiency, organizational management.

Second Level for Process:

Map Development Process—Ttx Mapping Visualization Planning and Use Process

The utility of Ttx Mapping facilities are that users may collectively organize their knowledge using a variety of tools, to build new knowledge and keep it organized, and to visualize the knowledge effectively to gain deeper understanding or to communicate it to others.

In one embodiment, the process is altered to allow for parallel operations. Each of the following processes execute in parallel with the others. The actual results forming any map is the cumulative result of all of these taken a specific point in time.

Preparation Step

Use Case: Preparation Step—The Preparation Step consists of the decision about what to map.

Users may form their subject matter maps. In one embodiment, the subject matter is predefined to be technology and the Preparation Step is completed for the user.

For each user project, the users decide on a specific purpose for using the system and prepare their own study's focus. Different users take this step as they need and may have multiple studies with different purposes in process at once, but the maps here generally allow for interaction giving the ability to a user to dig into a topic deeply and quickly.

Map Design

Use Case: Map Design—Produce an effective communication medium for the information of interest to a user from the CMMDB.

Map design is a process of software development or customization where developers devise new map formats and data extract scenarios for those new formats.

Map design includes the definition of one or more fxxt specifications to form the contents of the map. It may also include definitions for segmentations of the map within boundaries set by the elastic surface based upon, including but not limited to a set of: purlieu, time slices, vertical slices, horizontal slices, zones, quadrants, centroid points and diameters, etc.

Data Abstraction

Generation Step

Use Case: Generation Step—The Generation Step consists of the collective development of the CMM, including data collection, category organization, and manipulation.

In the generation step users collectively develop a large set of descriptive statements regarding the Common Focus. This includes descriptions about ttxs and their interrelationships. Collaboratively, the system is updated by a wide collection of individuals with different specific purposes but with a shared interest in the Common Focus.

A wide variety of ideation methods can be used to obtain update information to accomplish this, including: traditional brainstorming, brainwriting, nominal group techniques, focus groups, qualitative text analysis, and so on. This system also utilizes the writing of queries to obtain new cnxpts from users even as they wonder about new ttxs.

One operation is data collection. Users put in data by creating new cnxpts or relationships, or further describing those cnxpts or relationships. They may even request that a cnxpt or relationship should not exist. Users also enter, alter, and delete other dxos that relate to cnxpts.

Another data collection component is the automatic gathering of data for cnxpts or dxos. This process also finds new relationships based upon the new and existing data in the CMMDB.

Result set culling may be used as an ideation tool as a part of this step to jar the imagination of individuals.

The organization of data in the CMMDB is a continual process. Each user may assist in the effort by stating that a change is in order in the data. These changes are tallied as votes, and the result is the best available organization of the data. This raw data is not easily displayed because it is N-dimensional Manipulation is required before the map can be created.

This process step occurs perpetually, with users dissociated from those in a study possibly contributing to the brainstorming, perhaps without realizing it. This also allows for the reuse of prior ideation by the study team and others.

In one embodiment, the history of any manipulations and mappings that users perform on the visualization info-items will be stored in the CMM by user, giving each user the ability to undo, roll back, or roll forward any command that they have made throughout. The utility of this facility is that each user can save their work as a project, come back to it at a later time, and redo prior changes.

Structuring Step

Use Case: Structuring Step—In the Structuring Step the users may participate by sorting the descriptions into preexisting or new categories (thus stating and forming relationships) and naming (labeling) the cnxpts, adding/editing descriptions, and/or rating the descriptions on one or more scales.

Structuring includes the design process culminating in CMM Knowledge Base Definition. If users properly execute queries and effectively cull result sets, categorization will result as a by product. User studies will very often may make use of the efforts of others, since the structuring process is being carried on by multiple, perhaps dissociated users on a perpetual basis.

Periodically, in one embodiment, the system will manipulate the data in the CMMDB to extract specific summaries and relevant cnxpt data that are properly within a map that a user could understand. This process results in one or more bundles of information (called clumps here) that may be translated into a map easily.

Summarization of ratings and categorizations and statistical analyses are used. A form of multidimensional scaling takes the sort data across all participants and develops a summarization of the strength of relationships between cnxpts along various types of relationships (fxxts), resulting in a measure of closeness of cnxpts when cnxpts related by more users are closer to each other on the map.

For some visualizations, cluster analysis is used on the output of the multidimensional scaling and partitions the map into groups of statements or ideas, into clusters if not already categorized into small enough sets within a category.

To form useful mappings of the data, mathematical analysis of the categorization 'ontology' generates taxonomies based upon each of the various fxxts in the CMMDB structure. Portions of the representation step are performed on a periodic basis, and some is performed as the user wishes to change their view of the data by using different filters, etc.

The efficiency of this step is enhanced by doing recalculations only on an as needed basis.

Representation Step

Use Case: Representation Step—The Representation Step is where the analysis is done—this is the process of taking the results and "representing" them in various map forms for expeditious use and for communicating the information to users effectively.

Map representation is a user process of customization to devise new map formats and data extract scenarios for those new formats.

Artwork Preparation

Use Case: Artwork Preparation—Convert the data that is to make up a map into a graphical map.

The actual display artwork will be created by the application program.

Also, in one embodiment, map design can be accomplished to a degree by each user by providing new graphic settings, colors, filtering parameters, etc. that take effect either during the request for the map data or when the data is assembled into a map by the user application program.

Map Artwork Retrieval

A clump of information making up a segment of a map is accessed by a user interface (application program) when the user requests a visual representation of it. The application program requests the data and a server obtains the data from the database to build a map on the user's screen as a visualization, for an export, or for printing.

This clump of information is accessed by a user in that their user interface (application program) obtains the data from the database to build a map on the user's screen as a visualization, for an export, or for printing. In one embodiment, users having different filtering parameters will receive different visual results for the map based upon the same underlying data from the clump, and can each be seeing different portions of the same clump at the same time in one or more of their own windows. They may also be viewing the clump from a Descendant or Ascendant duality.

Users having different filtering parameters will receive different visual results for the map based upon the same underlying data from the clump.

Map Reproduction

Use Case: Map Reproduction—Display a map for a user that has been accessed and saved by a user (possibly the same user).

The map may have been tailored by filters, had annotations added such as 'tours', placeholders, notes, etc. and the user may share it collaboratively with others.

Map reproduction is the process of saving and reopening/reviewing maps, sharing of maps during close collaboration (conferencing), through the process of reuse of the clump of information by distribution to multiple users as a data stream, through printing of portions of the map, or through exportation of map data for use outside the application program.

Interpretation Step

Use Case: Interpretation Step—The Interpretation Step consists of the study of the CMM.

Users may form their own interpretations for the various maps produced from the CMMDB.

For instance, maps may be used for prior art searching, and one cnxpt may be designated as the focus of the study. The user may adjust their view of the CMMV to use their own labels, cnxpt relationships, cnxpts, and filters to provide a custom map for their own interpretation.

Utilization Step

Use Case: Utilization Step—The Utilization Step involves using the maps to help address each user's original focus for their use of the system.

The maps and the collected information can be used as the basis for searching, developing product comparisons, or displaying results, among others. Maps may be shared in collaboration, exported, used as the basis for derivative or periodic studies, etc. With the online interactive system here, generation and utilization occur simultaneously.

Ideation Process

Setup System

Establish Common Mental Map

Use Case: Establish Common Mental Map—Create infrastructure for the CMM and load basic CMM objects to establish a working system and CMMDB.

CMM Initiation Process

The CMM is started by automated consolidation of existing indices and tools such as cluster and cross-citation analysis, described below, but is maintained and extended by crowd sourced collaboration, the ease of which is improved by effective visualization and editing interfaces. Relationships within the Map are the basis for reaching consensus on the accuracy of the categorizations, namings, and descriptions. Currency of the contents is improved by a process called concretizing wherein users' thoughts (conjurings) are rapidly infused into the CMM.

Initial Loading

Available categorization schemes are used to start populating the ontology as the taxonometric relationships are imported as relationships between the categories represented by txpts. Descriptive information is attached to the txos as attributes.

Existing categories are entered as cnxpts, and the classification relationships are entered as relationships between the categories represented by the cnxpts. Information resources that are already categorized are entered, represented by irxts, related as new occurrences of the cnxpts representing those ttxs. Author names and dates of publishing will be added as attributes.

Load Initial Ttxs and Relationships

Use Case: Load Initial Ttxs and Relationships—Load in standard ttxs for a knowledgebase.

Follow the procedure in "Import Ttxs" utilizing a standard data set provided by the system supplier.

Initial Information Resource Loading

Use Case: Initial Information Resource Loading—Documents are loaded into the CMM both by scraping and during searching procedures.

The documents are then analyzed by various analytics when processing power is available in the "Document Level Relationship Generation" processes to generate cluster based cnxpts as presumed ttx categories.

Expand Knowledge Model

Add infrastructure and knowledgebase information expanding the user interface, meta, and algorithmic model for the system.

Create New CMMDB Information

Use Case: Create New Ontology Information—Record standard user information and time stamps when any new information is added into the CMMDB, including but not limited to: time entered, userid, expertise level.

Specific information must be recorded with every change requested, and access rights have to be respected. This use case describes these administrative details.

Define/Edit Txo Template

Use Case: Define/Edit Txo Template.

Define/Edit Txo Information Survey

Use Case: Define/Edit Txo Information Survey.

Define/Edit Cnxpt Template

Use Case: Define/Edit Cnxpt Template.

Define/Edit Cnxpt Survey

Use Case: Define/Edit Cnxpt Survey.

Define/Edit Relationship Template

Use Case: Define/Edit Relationship Template.

Define/Edit Relationship Survey

Use Case: Define/Edit Relationship Survey.

Define/Edit Purlieu Template

Use Case: Define/Edit Purlieu Template.

Define/Edit Purlieu Survey

Use Case: Define/Edit Purlieu Survey.

Define/Edit Cncpttrrt Template

Use Case: Define/Edit Cncpttrrt Template.

Define/Edit Cncpttrrt Survey

Use Case: Define/Edit Cncpttrrt Survey.

Define/Edit Context Template

Use Case: Define/Edit Context Template.

Define/Edit Context Survey

Use Case: Define/Edit Context Survey.

Define/Edit Dxo Template

Use Case: Define/Edit Dxo Template—Define map object template (Dxo Template).

Define or adjust the display of each type of dxo, setting, among other parameters, personalities, avatar or graphic representation, mannerisms, and decorators.

For each dxo sub-type, a template will be provided for each type of output (export, report, visualization). The templates can be attached to one or more display filters that the user has created or obtained. Each template in one filter may be overridden by templates in a filter applied over the first filter. Templates and Filters can be saved and named.

Define/Edit Dxo Information Survey

Use Case: Define/Edit Dxo Information Survey—Define survey questions for the information needed, or useful to build a dxo based upon the template for which the survey is created.

The questions have variants for each language, as set by scopx.

Define/Edit Analytic Template

Use Case: Define/Edit Analytic Template.

Define/Edit Methodology Template

Use Case: Define/Edit Methodology Template.

Define/Edit Methodology Survey

Use Case: Define/Edit Methodology Survey.

Define/Edit Model Template

Use Case: Define/Edit Model Template.

Define/Edit Report Template

Use Case: Define/Edit Report Template.

Define/Edit Announcement Template

Use Case: Define/Edit Announcement Template.

Define/Edit Prize Template

Use Case: Define/Edit Prize Template.

Define/Edit Template for Ttx Extension Suggestion

Use Case: Define/Edit Template for Ttx Extension Suggestion.

CMM Knowledge Base Definition

Define a Map

Use Case: Define A Map—State a name for a map and specify a fxxt for its contents.

Describing Map Objects

Define Map Object (Dxo)

Use Case: Define Map Object (Dxo)—Create a dxo object and describe it.

Position or Categorize Dxo

Use Case: Position or Categorize Dxo—Move a relatively positioned Dxo on a display, or change the positioning of a Dxo to relative and move it.

When a user moves a dxo other than a cnxpt to another ttx area on any fxxt based map, a vote is being made that the dxo should be re-aligned or that a new alignment should be specified for a different fxxt. In either case, the user is given a choice to create either a new "user suggested—dxo alignment inclusion relationship" hierarchical relationship between the cnxpt and the dxo, or a new "user suggested—dxo alignment affinitive relationship" between the displayed dxo and the additional dxo, and either is marked as created by the user, and a weight and a fxxt (and possibly a scopx) are specified for the relationship. In the former, the user is given the option to alter an existing relationship or to create a new one.

Define/Edit Dxo Group

Use Case: Define/Edit Dxo Group—Define map object group items.

Define or adjust the grouping of a set of dxos, including adding, positioning, and aligning a dxo into the group, repositioning it, setting its behaviors, and removing it from the group. It also includes setting, among other parameters, personalities, avatar or graphic representation, mannerisms, and decorators for the group member where those are altered from the basic definition for the dxo. A group may be defined to be different for each of one or more scopx and for each of one or more fxxts. A dxo group may be moved in the same manner as any other dxo other than a cnxpt, to another ttx area on any fxxt based map, by stating that the dxo should be re-aligned or that a new alignment should be specified for a different fxxt or scopx.

Administrative Node Entry

Use Case: Accept New Node into Ontology—Add a new node to the ontology.

The node may be any txo the user is allowed to enter, including, but not limited to: cnxpt, txpt, axpt, information resource, feature of txpt, requirement trxrt of axpt, advertisement, product, or expert.

Describe Other Txos

Use Case: Describe a Company—Create a company txo within the CMMDB.

No voting is involved.

Use Case: Describe a Source—Create a source txo within the CMMDB.

If not already defined, create a source info-item, setting its authority, usability, quality, expertise, etc. [See Procedure—CREATE Source]

No voting is involved.

Use Case: Describe an Infxtypx—Create a infxtypx txo within the CMMDB.

No voting is involved.

Use Case: Describe a Person—Create a person txo for use as an expert, inventor, or other interested party within the CMMDB.

No voting is involved.

Use Case: Describe a Purlieu—Create a purxpt for use as representing a purlieu horizon or purlieu context within the CMMDB.

No voting is involved.

Use Case: Describe a Placeholder—Create an placeholder in the CMMDB.

A placeholder is an aligned point in the visualization space that a user wishes to remember. It is aligned, and can be moved by the user. Alignment includes a role filled by an item identifier of the cnxpt where the placeholder sits, but also a second role filled by an item identifier of a cnxpt which is located in the central portion of the viewing window of the user at the time of placement or after a move.

Placeholders are also a viewing angle on a visualization. The placeholder is a dxo visible on a visualization when the user has not selected it. When a user selects it (perhaps from a list of placeholders), the visualization reorients to the camera viewpoint that the placeholder represents. It is somewhat similar to a note type Signpost but is specifically owned by the user or shared by a user to another user.

Use Case: Describe a Pointer—Create an Pointer in the CMMDB.

Pointers are used during collaboration to share a viewing angle on a visualization. The pointer is essentially the camera viewpoint that the a user wishes others to view. Alignment includes a role filled by an item identifier of the cnxpt where the pointer sits, but also a second role filled by an item identifier of a cnxpt pointed to or which is located in the central portion of the viewing window of the user at the time of placement or after a move.

Use Case: Describe a Product—Create a product txo for a tcept within the CMMDB.

Specify information regarding a product, optionally specifying scopx and fxxt. [See Procedure—CREATE Product]

Use Case: Make a Note—Enter a note about a cnxpt or other txo in the CMMDB.

Specify all information regarding the note, optionally specifying scopx and fxxt. The note may be aligned as a non-cnxpt dxo by placement within cnxpts.

Use Case: Describe a User Avatar—Create a View Avatar in the CMMDB.

Create an avatar for the user based upon his submitted or selected graphic or on a default icon. A user's 'avatar' is positioned at essentially the location that the user currently is focused at in a shared view, represented on screen by a specialized Dxo, and visible by other authorized users. It is also useful for other purposes.

Use Case: Describe a User View Avatar—Create a View Avatar in the CMMDB.

A user's 'viewer avatar' is essentially the camera viewpoint that the user currently is using, represented on screen by a specialized Dxo, and usable by other authorized users.

Use Case: Describe a Signpost—Describe a Signpost hyperlink.

Specify all information regarding the hyperlink dxo. No voting is involved. Enter information and attach images as appropriate. Signposts may only be added by administrators or by the system itself. They are used for displaying for the user some form of cross referencing of information inside of the CMMDB, to show existence of information of a special nature in the CMMDB, or for other purposes.

Because of the variety of purposes, Signposts may be related to specific cnxpts, specific information resources, or other specific dxos, may be related to types of dxos rather than specific instances, may be related to 'depth' of categorization, or may be 'sprinkled' around the visualization on some basis. Signposts may be entered in multiple languages and displayed according to the language the user has selected using scopxs. Signposts are displayed according to filters and subscription basis. Signposts may show, among other things, that:

- an information resource is unavailable;
- an information resource is not available unless the user is authorized;
- a cnxpt has been changed recently;
- a cnxpt is still 'private' (has not been submitted to the central CMMDB);
- etc.

Companies can pay to be seen as Signposts on the map.

Enter Cncpttrrts for a Tpx

Use Case: State the Cncpttrrts of a Tpx—Add or edit trait assertions and their descriptions regarding a txo.

Add or edit assertion information regarding a txo where the assertion information is a cncpttrrt, or add a vote to change, make an addition to, or delete information from a description of a cncpttrrt of the txo. This process and facility involves only infrastructure txos and is included to allow generality.

Describe Display Object Characteristics

Use Case: Describe a Decoration—Create a Decoration in the CMMDB for use in displaying dxos.

Decorations are used during visualization to adorn objects being displayed. The decoration may be a graphical texture, a 'skin', a covering, or another form of adornment that may be offered.

Use Case: Describe a Mannerism—Create a Mannerism in the CMMDB for use in displaying dxos.

Mannerisms are used during visualization to adorn objects.

Use Case: Describe a Graphical Representation—Create a Graphical Representation in the CMMDB for use in displaying dxos.

Graphical Representation are used during visualization to display dxos with a visual effect. The Graphical Representation may have adornments by Decorations or Mannerisms.

Use Case: Describe a Personality—Create a Personality in the CMMDB for use in displaying dxos.

Personalities are used cause activity on the part of dxos, to give them kinetic abilities, aural abilities, etc.

The Personalities may have adornments by Mannerisms.

Impression Advertisements

Use Case: Describe an Impression Advertisement—Describe an impression/click-thru advertisement.

Specify all information regarding the advertisement, optionally specifying scopx and fxxt. The advertisement may be aligned as a non-cnxpt dxo by placement. Enter information and attach images as appropriate, specifying scopxs. Information may be entered in multiple languages. Information may be viewed in multiple languages and displayed according to the language the user has selected, using scopxs. Billing and other accounting information will be entered upon checkout.

Use Case: Describe an Advertisement for a Product—Describe an advertisement for a product.

Specify all information regarding an advertisement, optionally specifying scopx and fxxt. The advertisement may be aligned as a non-cnxpt dxo by placement within cnxpts. Enter information and attach images as appropriate. Information may be entered in multiple languages. Information may be viewed in multiple languages and displayed according to the language the user has selected using scopxs. Billing and other accounting information will be entered upon checkout.

Use Case: Describe an Advertisement for an Expert—Describe an advertisement for an expert offering services.

Specify all information regarding the advertisement, optionally specifying scopx and fxxt. The advertisement may be aligned as a non-cnxpt dxo by placement within cnxpts. Enter information and attach images as appropriate. Information may be entered in multiple languages. Information may be viewed in multiple languages and displayed according to the language the user has selected using scopxs. Billing and other accounting information will be entered upon checkout.

Use Case: Describe a Question—Enter a question about a cnxpt representing a ttx or other txo in the CMMDB.

Specify all information regarding a question or a request for assistance, optionally specifying scopx and fxxt. The advertisement may be aligned as a non-cnxpt dxo by placement within cnxpts. Enter information and attach images as appropriate. Information may be entered in multiple languages. Information may be viewed in multiple languages and displayed according to the language the user has selected using scopxs. Billing and other accounting information will be entered upon checkout.

Define Fxxt

Use Case: Define Fxxt—Request that a new fxxt be developed in the CMMDB.

In one embodiment, the user forms a fxxt specification and submits it in the request. In one embodiment, to submit the request, the user is presented with e-commerce wizards to purchase the creation of the fxxt. In another embodiment, the fxxt is created on the local server.

Define Fxxt Specification

Use Case: Define Fxxt Specification—Define a fxxt by defining the fxxt calculation script rules used to differentiate between txos and relationships that are members of the fxxt and those which are not.

Editing changes the scopxs and infxtypxs of relationships (and their priority) that the map generation will be based upon in constructing a visualization map.

Define Filter

Use Case: Define Filter—Create a filter and describe it sufficiently so that it can be executed.

Set Dxo Information Resource Relationship

Use Case: Set Dxo Information Resource Relationship—Associate dxo with external information resource by link.

Begin to Utilize

Obtain Access to Information

In one embodiment, this process involves the customer e-commerce, licensing, deployment, installation, and registration of users to gain access to the data of the CMM. Thus, a user who is working from a single location can use the application as a client while connected to a remote server, and a corporation can set up a private (licensed software) server for multiple users with clients.

Initiate Session

Use Case: Initiate Session.

Change User Interface Language

Use Case: Change User Interface Language—Set display language for the user interface and visualizations.

This application setting provides for localization of the application so that more users may use and refine the CMM and specifically that they may select the language used for names and descriptions of objects on visualizations and the GUI language.

User Registration

Each user must register if they wish to make changes to the data in the CMM. Public users are registered anonymously but uniquely, or recording their identities, or by achieving a method for uniquely identifying them by their actions and context of use, prior utilization, etc.

Create Account—Initial Customer Registration

Use Case: Create Account—Initial Customer Registration—The process begins by collecting registration information from the customer after they begin using the customer website.

The user's objective in this process is to create a new account with the user registration database. The user's personal and organizational information is persisted.

Set Profile, Persona

Use Case: Set Profile, Persona.

Accept Usage Fee

Use Case: Accept Usage Fee.

Purchase of Access Right

Use Case: Purchase of Access Right—Select a 'right', and then pay fees to obtain access to the facility.

Move Access Right

Use Case: Move Access Right—Move access rights to a different ttx, to save on fees or for other reasons.

Subscribe to DataSet

Use Case: Subscribe to DataSet

Set Limits on Fee for Use Data

Use Case: Set Limits on Fee for Use Data.

Set Purchase Limits on Usage

Use Case: Set Purchase Limits on Usage.

System Function—Usage Data Capture

Collect User Interest Information

The utility of this is that it provides various ways to collect data to help determine how interested users are in ttxs (and tcepts, and appcepts or other specializations of ttxs).

Collect Interest Data

Use Case: Collect Interest Data—Collect data to help determine how interested users are in ttxs, tcepts, and appcepts.

Record User Interest Activity

Use Case: Record User Interest Activity—Record specific administrative information about paths followed when navigating the visualizations.

Track and Store User Access Information

Store information regarding user access to the system. This information is needed for ensuring correctness (through oversight) of data entered or edited during collaboration. It is also needed to track subscription use information and for advertising revenue justification. Wherever possible, keep the minimal amount of information and maximize the amount of de-personalization (retaining data as if user was anonymous) performed.

Collect Access Data

Use Case: Collect Access Data—Store information regarding user access to the system.

This information is needed for ensuring correctness (through oversight) of data entered or edited during collaboration. It is also needed to track subscription use information and for advertising revenue justification. Wherever possible, keep the minimal amount of information and maximize the amount of de-personalization (retaining data as if user was anonymous) performed.

Record User Voting Activity

Use Case: Record User Voting Activity—Record specific administrative information about a user transaction where a vote was entered or a txo was created.

Visualization Traversal Histories

Visualization histories will be saved as scripts to track users' activities and allow for rollback/roll forward/undo.

Record User Visualization Activity

Use Case: Record User Visualization Activity—Record specific administrative information about a user's use of the visualization tools.

Query, analysis, and visualization history Retention

Query, analysis, and visualization histories can be saved as scripts to track users' activities, allow for rollback/roll forward/undo, and to encourage reuse Record User Query Activity Use Case: Record User Query Activity—Record specific administrative information about user transactions involving a query.

Learn/Seek

General Learning

For uses where the purpose of the interaction is discovery, provide tools to improve opportunistic interaction. In these situations, the user actions are dictated by the surrounding environment—what they see in the visualization that they did not expect, or what turns up in a query that is important or irrelevant.

Each time the user displays a visualization of a segment of the contents of the Map, they see a simplified depiction of the ttx space within a navigational aid that highlights relationships between the cnxpts or other dxos (including but not limited to: tcepts, appcepts, patents, research papers, people, signs, symbols, etc.) within that space. The user views the Map from various points of view using visualizations. The additional dxos give additional spatial relationships among the ttxs and their real world connection with other information, in part based upon the semantic similarity of the 'occurrences'. Each visualization type emphasizes a certain set of 'associations' between ttx info-items, and each generalizes the information available from the Map, omitting certain information from the display to meet design objectives so that the text or illustrative material is subordinate in extent or importance to conveying the context of the content.

Visualization Navigation

See Visualization Navigation Process below.

Run Tools

Request Run of Analytic

Use Case: Request Run of Analytic—Specify which analytic to invoke and then invoke execution of the analytic.

Request Continual Run of Analytic

Use Case: Request Continual Run of Analytic—Specify which analytic to invoke and then invoke execution of the analytic so that the analytic continues to execute.

Parameters for execution can set, including but not limited to: period prior to reinvocation if an analytic terminates (inter-invocation delay); maximum number of executions of the analytic; maximum total time (elapsed) during which executions of the analytic may occur; maximum number of resources to add to the CMMDB on any execution of the analytic; maximum number of txos to add to the CMMDB on any execution of the analytic; maximum number of megabytes of data to add to the CMMDB on any execution of the analytic; maximum cost to be expended for the execution; minimum cost to be expended for the execution, if able; trigger event or condition for terminating execution on a single invocation; trigger event or condition for terminating execution for any invocation which will terminate all further invocation of the analytic; external trigger event to reinvoke prior to the end of the stated inter-invocation delay.

Request Run of Model

Use Case: Request Run of Model.

Request Run of Crawling or Other Technique

Use Case: Request Run of Crawling or Other Technique. Specify the parameters to invoke a crawling and specify a crawl result construct to receive the results.

Since the crawling has properties for each of the above, invocation itself may be all that is needed to get the crawling done.

Drop Interest Marker/Bookmark

Use Case: Drop Interest Marker/Bookmark.

Specify/Invoke Reports

Use Case: Specify/Invoke Report—Specify and then invoke execution of a report.

Manage Personal Interface—Display Control

User Interface Actions

User interface will provide the controls to, including but not limited to:

- The ability to display visualizations in appropriate containers, e.g. windows or applets;
- specify Visualization Tools;
- The ability to control operations through the use of appropriate mechanisms, such as right-click, menus, or web page buttons;

Changing Perspectives

Standard windowing system view control mechanisms and specialized window control mechanisms can be used to ease viewing of visualization and control windows. A view may also be supersized temporarily. Visualization and control views can be moved around by dragging them using their title bars, docked to other views, closed, duplicated, be opened fresh, or locked, named, and saved for later use.

Open Perspective

Additional perspectives may be opened in a window. The application will also change the perspective automatically when appropriate.

Open and Display Result Sets

Use Case: Open and Display Result Sets—Open and display Result Sets.

Change Language of Display

Use Case: Change Language of Display—The language used for names and descriptions may be changed as needed but will be applied through extraction filtering rather than display filtering.

View Saving and Naming

Use Case: View Saving and Naming—Save and recall the state, content, and graphical display parameters of a view of the data.

The saved state will include at least:

- the indicated dxo;
- the selected set being displayed;
- the result set being displayed;
- the content of the window including the position of each item;
- the position of cnxpts or other displayed objects in the content and their color state, etc.;
- the zoom factor and other graphical display parameters;
- the focus point;
- etc.

Add and Refine

Users put in data by creating new ttxs or relationships, or further describing those ttxs or relationships. They may even request that a ttx or relationship should not exist. Users also enter, alter, and delete other txos and dxos that relate to ttxs.

Contribute Information

Use Case: Contribute Information—Obtain an accessible, managed, usable, sufficiently detailed knowledge base of the imagination of creative thinkers to provide information to innovation/intellectual property managers that currently work inefficiently.

The problem addressed is the capturing of specific kinds of imagination into a useful structure yielding a 'best available basis' for describing and forecasting the nature of specific tcepts at points into the future.

The information obtained forms a collective memory map that is built up from the collaboration of innovators who see involvement as important because of the utility it provides for improving their own efficiency in innovation. It serves as a commonplace for ideas and their relationships, and is to become a part of the creative process.

Select Objects

Use Case: Select Objects—Form a set of objects that are 'Selected' and may then be used as the subject of certain actions.

This ability allows a user to select a number of displayed objects OR specific objects that are not currently being displayed.

Act on Objects

Act on Specific Indicated Object

Use Case: Act on Specific Indicated Object—Display and pass control to Action Window for Single Technology which is indicated as context by pointer.

Collection of User Data

Track and Store User Traversals

Use Case: Track and Store User Traversals—During the process, each step that the user takes through a visualization will be recorded.

This information will provide user interest levels for ttxs. As much as possible, de-personalize this information.

Track Invention Improvements

Use Case: Track Invention Improvements—The system must remember conceptual contributions as separate conceptual additions to provide for security and attribution.

Vote Entry—Accept Relationship Voting Information into Ontology

User entered changes to the ttx information is subject to weighting against and alongside other changes entered by other users, and thus these changes are considered votes for a change rather than a change of its own.

Add Non-Ttx Object

Use Case: Add Non-Ttx Object—Add an object other than a cnxpt.

While this operation involves conjuring and concretization of some sort, the addition of objects other than ttxs does not involve the same nature of concretization as is important to ttxs and thus is not explained here. The operation of creating an object requires the creation of a txo. The adding of an object to a ttx, dxo, or txo requires a new relationship (entry of a vote to create a new relationship with a new parent with the default relationship for the view) such as an occurrence relationship to relate the new object to the ttx, dxo, or txo as relevant information, or (much less common and very special) a hierarchical association to establish the object as a special sub-type or as specially related.

Copy and Paste Ttx Object without Modification

Use Case: Copy and Paste Ttx Object Without Modification—Copy a cnxpt object, causing a new association between the cnxpt and a different ttx category.

Copying and pasting a ttx by copying and pasting or by dragging and dropping causes a vote for a second association from a different category cnxpt to the cnxpt being pasted or dropped, in the fxxt of the view, or generally, depending on further choices made by the user in a dialog.

When a user moves a cnxpt to another ttx area on any fxxt based map, a vote is being made that the cnxpt should be re-categorized or that a categorization should be specified for a different fxxt. In the former, a new "user suggested—ttx placement location association" hierarchical association is created between the cnxpt and the goal, marked as created by the user, and a weight and a fxxt (and possibly a scopx) are specified for the association. In the latter, a new "user suggested—ttx placement location association" hierarchical association is created between the destination cnxpt and the moved cnxpt, marked as created by the user, and the new fxxt (and possibly a scopx) is specified for the association.

Copy and Paste Ttx Object With Modification

Use Case: Copy and Paste Ttx Object With Modification—Copy a cnxpt object, causing a new cnxpt to be created and a new association between the cnxpt and a ttx category.

Copying and pasting a cnxpt by copying and pasting or by dragging and dropping, with intent to change it to a new cnxpt, causes a new, but temporary cnxpt to be created and causes a vote for a series of duplicated associations from the new, although temporary cnxpt, for each association with the copied cnxpt. If the new cnxpt is dragged into a different category cnxpt, then the association of the copied cnxpt to its category (in the viewed fxxt) is not copied, but one new "user suggested—ttx placement location association" is created from the destination category cnxpt to the cnxpt being pasted or dropped, in the fxxt of the view, or generally, depending on further choices made by the user in a dialog. If alterations are not timely made to the pasted cnxpt, it, and all of its associations, are deleted. The new cnxpt is treated as a Goal in nearly all respects.

Cut and Paste Ttx Object

Use Case: Cut and Paste Ttx Object—Cut a cnxpt object, causing a change in association between the cnxpt and a different ttx category.

Cutting and pasting causes a change of the category association the pasted cnxpt has a role in, in the fxxt of the view, or generally, depending on further choices made by the user in a dialog.

Copy and Paste Non-Ttx Object

Use Case: Copy Non-Ttx Object—Copy a non-ttx object.

Copy and paste of a non-ttx object does not involve new conjuring or concretization of an object, but does include the statement of new information to the CMM. If a paste occurs into a visualization, the operation actually suggests a new relationship as explained for Add Non-Ttx Object. A change in alignment relationship will be required or a new alignment relationship may be required.

Cut and Paste Non-Ttx Object

Use Case: Cut and Paste Non-Ttx Object—Cut and paste a non-ttx object.

Cut and paste of a non-ttx object does not involve new conjuring or concretization of an object, but does include the statement of new information to the CMM. If a paste occurs into a visualization, the operation actually suggests a change in the relationships as explained for Add Non-Ttx Object to change the ttx, dxo, or txo it is to be related to as relevant. A change in or a new alignment relationship will be required.

Conjuring Facility and Concretization

This system has a pro-active purpose of grabbing the imaginative thoughts of its users. Users think up new ttxs and search for them.

The nearly automatic means of bringing in this type of thought into the system and for the gradual refinement of the idea into an understandable topic is the main objective of this system because it is the only way to continually provide new knowledge to the users and to gain a business advantage Excitement builds on a user's belief that the knowledge brought into the system seemingly arrives by magic, and is stunning in its novelty. The user's abstract ttx is immediately made real and is retained as real for some period until it is well defined or is found to be deletable from non-interest or rejection. This is concretization.

At the point of thinking up a new ttx, during the 'ideation' process, users wonder what is in other people's minds and ask the system to locate the cnxpt representing the ttx. It is at this point that those new thoughts are locked into the CMM by capturing the question asked and its refinement into a ttx represented by a cnxpt. Users think up new ttxs to search for, and thus provide ideas that are not well defined but new nonetheless. There is no wait for cataloguers, etc. to restrict the flow of information into the CMM. Along with the possible creation of a new ttx, within the search process, new information, possibly relevant, is brought into the knowledgebase and culled for relevance to the ttx being sought. During the search, the user may alter his goal by exaptation.

To give a name for the type of thoughts that are at the farthest fringe of that thought process, we have used the term conjuring.

Use Case: Capturing Specific Kinds of Imagination into a Useful Structure—Capturing of specific kinds of imagination into a useful structure.

Conjure

Ttx Conjuring

Use Case: Conjure Ttx—Think up a ttx.

Form an inventive thought constituting a ttx to the point where a user could search for the cnxpt representing it using some set of keywords.

Conjuring is limited, meaning that it ends at a transition point from a manual step into a next step in ideation that utilizes the system either to form a goal or to immediately concretize a ttx. Conjuring of a ttx occurs by at least one of:

- externally by at least one of
  - having a fleeting thought,
  - or naming the thought,
- or, internally by at least one of initiating a named or unnamed search goal for a nebulous thought, or by concretization The task of conjuring is performed by user outside of system. This consists of a user thinking up a ttx of some nature before looking for it on a CMMV or entering a query to find it.

When a user logs in, he is asked "What innovation will you be working on today?", "Which of your innovations will you be working with today?" or some similar question to elicit a name for use to capture his work, and to catch some title for the conjuring he is in the middle of in his own mind, linking his conjuring to his system context. This will place his work within a Goal of his own for the session, or until he begins a new goal. If there is no answer to the question, a default 'dummy' goal will be used for the session.

Incrementally Conjure

Use Case: Incrementally Conjure—Extend a ttx by, including, but not limited to: 'subdividing' it to, for instance, refine the ttx by splitting its cnxpt into two cnxpts; or 'incrementally conjuring' by creating an offshoot of the ttx.

The task of conjuring is performed by user outside of system, but, in this use case, there is a reliance on the system for information prior to and during conjuring.

Incrementally Conjure by Composition

Use Case: Incrementally Conjure by Composition—Extend a ttx by compositing, combining the idea of the ttx of one cnxpt with another cnxpt's ttx to 'converge' (form or integrate) a new ttx.

The task of conjuring is performed by user outside of system, but, in this use case, there is a reliance on the system for information prior to and during conjuring.

Concretize/Reify/Define Ttx

Ttx Concretization

Use Case: Concretize New Ttx Manually—Make a conjured ttx into a cnxpt known by the CMMDB to represent the ttx.

Create, or concretize into the CMM a new cnxpt to represent the ttx in a user's mind that may or may not be real, and may or may not have been defined previously.

Add new cnxpt representing the ttx, and thus 'vote' that the ttx will exist. [See Procedure—CREATE Cnxpt]

The new cnxpt is treated as a finalized goal.

Concretization by Query Goal

One type of information creator is the user who makes up queries. Goals are an individual's tool for defining a ttx that they wish to know about. Goals not satisfied, meaning that no existing cnxpt was found that properly defined the ttx in a user's mind was present in the CMM, are then converted to ttxs. See goals below.

Collection by Voting

What happens if multiple users have nearly identical ttxs in their minds when they form goals? First, the ttxs may be different, and separate cnxpts for representing the ttxs would be important as contributions. But, if the ttxs were really the same, and the result sets were culled differently, then: 1) the cnxpts would be redundant, but the difference may not be apparent, and 2) the specific disagreement(s) would be available. These votes to one user they are much more 'factual' than for another user. Over time, with 'elections', ttxs and relationships such as these can become 'settled' and can be seen as generally accepted. This is referred to as 'Consensus Building' in a Voting Ontology. The utility of what is being created is the continuous quality improvement of the crowd sourced data in representations of ttxs and ttx relationships.

Describing Ttxs

Specify a ttx more deeply by adding a name, description, information resources, or stating attributes, purlieus, or cncpttrrts. Where a user enters additional descriptive information not intended to edit or correct the present information, it is considered a variant and is a vote. Each edit of a description, characteristic attribute, purlieu, or a cncpttrrt is a vote, and votes are tallied by the system to come up with the actual consensus description, characteristic attribute value, purlieu, or cncpttrrt as seen by public users. Users who have the appropriate access rights can filter or add weight to the votes that they have entered.

Security and Access Control information may be set by the creator of a ttx or by an administrator.

Use Case: Describe Ttx—Describe a ttx of any nature.

Cnxpts may represent any ttxs allowed by the system.

Descriptions are intended to be textual and free form, so should not contain information provided as characteristics in attribute values, purlieus, or in cncpttrrts for the ttx as that information will become useless, confusing, or redundant as the characteristics and cncpttrrts are filled in.

Descriptions may be entered in multiple languages, and each may be voted upon as a variant.

Descriptions may be viewed in multiple languages and displayed according to the language the user has selected.

Characteristics and Attributes

Use Case: Name a Ttx—Enter a name for a ttx on its cnxpt.

Further voting may alter the name. Names are stored as attributes but have special uses.

Cnxpt names are optional and not required.

Names may be entered in multiple languages, and each may be voted upon as a variant.

Names may be viewed in multiple languages and displayed according to the language the user has selected.

Use Case: State a Characteristics of a Ttx—Add information that describes characteristics or attributes of a cnxpt, or add a vote to change, make an addition to, add a variant of, or delete information from a description of a characteristic or value of an attribute of the cnxpt.

State to the CMMDB that a ttx has a certain characteristic by stating that its cnxpt has a value for an attribute by which the characteristic can be described.

Attributes of a cnxpt include but are not limited to:

Who first stated the cnxpt

Who named the cnxpt

Who may access the cnxpt.

Characteristics are stored as attribute values.

Characteristics are added as votes. Characteristics may be set to be a variant and an entry is then a vote on that variant.

Characteristics, and names may be entered in multiple languages, and each may be voted upon. Each entry in a different language is considered a variant and an entry is then a vote on that variant.

Characteristics, and names may be viewed in multiple languages and displayed according to the language the user has selected.

Each edit of an attribute or characteristic is a vote, and votes are tallied by the system to come up with the actual consensus description of characteristics as seen by public users. Private users can filter to add weight to the votes that they have entered.

Data in attributes may be registered as private and may be offered for sale or licensing as a part of a 'DataSet', or may be stored confidentially and unpublishable for access only by the owner or specifically authorized others.

Enter Description

Use Case: Enter Description—Describe or categorize the ttx by at least one of naming it, translating, refining, or rejecting a name, description, placement, relationship.

Enter Translation

Use Case: Enter Translation—Enter a translation of a name or description for an object.

This process results in a scopxd name variant or a scopxd description variant.

Respond to Ttx Information Survey

Use Case: Respond to Ttx Information Survey.

Creating Txos as Members of a Category, Subtypes, or Successors

Infrastructure txos may be categorized, given a type, made into a subtype, set as a successor, added to a list, or may be concretized as a member of an infrastructure category, or a subtype of or successor to another txo, resulting in a relationship with the enveloping txo or category.

Infrastructure txos may be converted into categories by adding a member txo.

Infrastructure txos must be placed in the categories they reasonably fit in. For example, a fxxt specification may only contain fxxt calculation step descriptions, and a result set may only contain rsxitems. Infrastructure txos may be assigned to two lists but not to two categories, implying that infrastructure txo categories are strictly hierarchical, and infrastructure txo lists may have items also included in other lists.

If the placement of an infrastructure txo is in dispute (like whether or not it's meaning is the same as another), administrative users are cautioned to take action. Disputes have to be addressed in a workflow process by administrative and development staff.

If a user has stated that one infrastructure txo represents a member of a category or a sub-class or other 'is-a' of another txo's tpx, then a relationship is formed between them.

Use Case: Categorize a Txo—Force a txo into a category.

Create a "tpx type-instance relationship" hierarchical relationship between two txos within all fxxts and within all, one, or more stated scopxs, marking (by infxtypx) the relationship to indicate it is a category (type-instance) membership relationship, mark it as created by the user, assign it a weight.

Use Case: Subtype a Txo—Force a txo to be a subtype of another txo.

Create a "tpx supertype-subtype relationship" hierarchical relationship between two txos within all fxxts and within all, one, or more stated scopxs, marking (by infxtypx) the relationship to indicate it is a subtype relationship, mark it as created by the user, assign it a weight.

Use Case: Create a Successor Txo—Force a txo to be a successor of another txo.

Create a "tpx predecessor-successor relationship" hierarchical relationship between two txos within all fxxts and within all, one, or more stated scopxs, marking (by infxtypx) the relationship to indicate it is a predecessor-successor relationship, mark it as created by the user, assign it a weight.

When a txo is to be displayed on a ttx visualization, it may be aligned to a cnxpt as a non-cnxpt dxo, by creation of a "user suggested—dxo alignment inclusion relationship" or a "user suggested—dxo alignment affinitive relationship".

Create a Ttx by Relationship

Use Case: Create a Ttx by Relationship—Add a new ttx by creating a relationship from another info-item which requires an opposing endpoint (the new endpoint) to be a ttx.

Create a new cnxpt, marking user, etc. [See Procedure—CREATE Cnxpt] Create a new "custom affinitive association" between the two cnxpts within all, one, or more stated fxxts and within all, one, or more stated scopxs. [See Procedure—CREATE custom affinitive association]

Creating Ttxs as Members of a Category, Subtypes, or Successors

Ttxs may be categorized, made into a subtype, set as a successor, or may be concretized as a member of a category ttx, or a subtype of or successor to another ttx, resulting in an association with the enveloping ttx or category.

Ttxs may be converted into categories by adding a member ttx.

Ttxs should be placed in the most specific categories they reasonably fit in. For example, Barak Obama should not be listed directly under People, but rather under Presidents. Cnxpt may be assigned to two categories, even if one of which is a direct or indirect subcategory of another.

Whatever categories a user makes should not implicitly violate the neutral point of view policy. If the nature of something is in dispute (like whether or not it's fictional or scientific or whatever), the user and others are cautioned to take action. They are told to move it, causing a 'vote' for a different categorization. They are allowed to mark the ttx as being poorly categorized or as disputed, but this simply places the burden of categorization on others, which is frowned upon. Disputes have to be addressed in a workflow process using collaboration and review by volunteers and staff.

If a user has stated that one cnxpt represents a member of a category or a sub-class or other 'is-a' of another cnxpt's ttx, then an association is formed between them and a weighting is imparted for it based upon the expertise level and authority of the user.

Use Case: Concretize a Ttx as a Member of a Category—Create a cnxpt while in a second cnxpt and enter a vote to categorize the cnxpt as in a category.

Create a new cnxpt. [See Procedure—CREATE Cnxpt] Perform the procedure for Categorize a Ttx.

Use Case: Concretize a Ttx as a Subtype of a Ttx—Create a cnxpt while in a second cnxpt and enter a vote to make it a subtype of the second cnxpt.

Create a new cnxpt. [See Procedure—CREATE Cnxpt] Perform the procedure for Subtype a Ttx.

Use Case: Concretize a Ttx as a Successor—Create a cnxpt while in a second cnxpt and enter a vote to make it a successor of the second cnxpt.

Create a new cnxpt. [See Procedure—CREATE Cnxpt] Perform the procedure for Mark a Ttx as a Successor.

Categorize a Ttx

Use Case: Categorize a Ttx—Enter a vote to place a ttx into a category.

Create a "user suggested—ttx placement location association" hierarchical association between two cnxpts within all, one, or more stated fxxts and within all, one, or more stated scopxs, marking (by detailed infxtypx, scopx, or fxxt) the association to indicate it is a category membership association, mark it as created by the user, and assign a weight and a fxxt (and possibly a scopx). This process can be completed by Copy and Paste Ttx where no modification other than an additional categorization is intended. [See Procedure—PROCESS a CNXPT as PARENT for Target Cnxpt]

Use Case: Subtype a Ttx—Enter a vote to place make a ttx into a subtype of another ttx.

Create a "user suggested—ttx placement location association" hierarchical association, as above, to establish a subtype association. This process can be completed by Copy and Paste Ttx where no modification other than an additional subtyping is intended.

Use Case: Mark a Ttx as a Successor—Enter a vote to place make a ttx into a successor of another ttx.

Create a "user suggested—ttx placement location association" hierarchical association, as above, to establish a successor association. This process can be completed by Copy and Paste Ttx where no modification other than an additional successor association is intended.

Prospect and Stake Claim

Use Case: Prospect and Stake Claim—Claim, as a ttx without any other description or characteristics, a space (position) on a map.

In one case, the user selects a spot in an empty space on the map and calls up a description of the space. In one embodiment, an approximate, yet unique description of a ttx that would be located in that space is presented, as if the ttx existed.

In another case, the user selects a spot in an existing ttx on the map and calls up a description of the space, as stated from the cnxpt. In one embodiment, an approximate, yet unique description of a new ttx that would be located as a subcategory or child under the ttx in the area of the spot selected is presented, as if the ttx that would be located in that spot existed.

In one embodiment, approximate, yet unique descriptions are generated based upon methodologies, such as, including but not limited to: 'TRIZ', utilizing the descriptions of the category and various thought provoking mechanisms as available, such as, including but not limited to: traits, purlieus.

When a user places a new ttx onto any fxxt based map in such a spot, the ttx is being given a categorization because it is being inserted into the area defined by some cnxpt representing a broader, or earlier, or 'parent' ttx, according to that fxxt.

Create a new cnxpt for the user's new ttx. [See Procedure—CREATE Cnxpt] A "user suggested—ttx placement location association" hierarchical association is created between the cnxpt and the new cnxpt for the ttx, marked as created by the user, and assigned a weight and a fxxt (and possibly a scopx). [See Procedure—PROCESS a CNXPT as PARENT for Target Cnxpt] If the new cnxpt is placed where it is not inside of any current cnxpt, no association is created.

Show Ttx Properties

Use Case: Show Ttx Properties—Show a cnxpt representing a ttx.

By indicating the cnxpt on the visualization the user is able to enter information about the ttx or take action on the cnxpt.

Stating Equality of Tpxs

If a administrator or developer has stated that two txos represent the same tpx, then the txos are combined so long as the administrator or developer has authority to make the change.

Use Case: State Equality of Tpxs—Force the merger of two txos.

Stating Similarity of Ttxs

If a user has stated that two cnxpts represent the same ttx, or are closely similar, then an association is formed between them and a weighting is imparted for it based upon the degree of similarity stated, expertise level and authority of the user.

Use Case: State Similarity of Ttxs—Enter a vote to state that two ttxs are similar, creating an association between the cnxpts.

Create a new "custom affinitive association" between the two cnxpts within all, one, or more stated fxxts and within all, one, or more stated scopxs. [See Procedure—CREATE custom affinitive association]

State Specific Similarity between Ttxs

Use Case: State Similarity between Ttxs—Enter a vote to state that one ttx is similar to another ttx in a particular way by specifying one of the available forms of affinity for ttxs.

Create a new affinitive association of a specific type between the two cnxpts within all, one, or more stated fxxts and within all, one, or more stated scopxs, marking (by detailed infxtypx, scopx, or fxxt) the association to indicate it is a category membership association, mark it as created by the user, and assign a weight and a fxxt (and possibly a scopx). Set the infxtypx as specifically as possible to better detail the user's knowledge and intent. [See Procedure—CREATE custom affinitive association]

If the user has already created a "custom affinitive association" between the two cnxpts within the same stated fxxts and the same stated scopxs, then convert that custom affinitive association to a specific type.

Enter Information Resource for a Ttx

Use Case: Enter Information Resource for a Ttx—Supply information resources to the CMMDB on a manual, an assisted, or an automated basis by creating an occurrence relationship for the cnxpt to reference an external information resource or an internal information resource imported to or held in a backend file system.

If not already defined, create a source info-item for the source of the information, setting its authority, usability, quality, expertise, etc. [See Procedure—CREATE Source]

If needed, create an irxt for the information resource (the primary document), marking the fxxt as "specific add" or, if automated, "bulk add". [See Procedure—CREATE Irxt]

Create "information resource citation relationships", "direct information resource name reference citation relationships", and "direct information resource citation relationships" as appropriate, marking the fxxt as "bulk add". [See Procedure—CREATE Information Resource Citation Relationship] [See Procedure—CREATE Direct Information Resource Citation Relationship] [See Procedure—CREATE Direct Information Resource Name Reference Citation Relationship]

If a cnxpt was indicated manually, create a subject identifier occurrence relationship between the cnxpt and each irxt within the fxxt of the irxt and within all, one, or more stated scopxs, marking (by detailed infxtypx) the relationship to indicate it as a particular form of occurrence relationship where possible, and marking the fxxt as set on the new irxt. [See Procedure—CREATE Occurrence to irxt]

The occurrence relationship from the txo for which the collateral is being added is a vote, but the reference by the txo to the information resource itself is not considered a vote.

Use Case: Categorize Ttx by Relating Information Resources to the Ttx—Provide as a basis for the definition of a ttx or its categorization a series of information resources that somewhat define the ttx, represented by irxts.

If not already defined, create a source info-item for the source of the information, setting its authority, usability, quality, expertise, etc. [See Procedure—CREATE Source]

If needed, create an irxt for the information resource (the primary document). [See Procedure—CREATE Irxt]

Create a subject identifier occurrence relationship between a cnxpt and each irxt within all, one, or more stated fxxts and within all, one, or more stated scopxs, marking (by detailed infxtypx, scopx, or fxxt) the relationship to indicate each as a particular form of occurrence relationship where possible. [See Procedure—CREATE Occurrence to irxt]

Use Case: Enter a Cited-Citing Relationship for Information Resources—Create a relationship between information resources representing a cited-citing relationship among the information resources.

If needed, create an irxt for each information resource. [See Procedure—CREATE Irxt] Create an information resource citation relationship indicate a particular form of citation where possible. [See Procedure—CREATE Information Resource Citation Relationship]

Create a "direct information resource citation relationship" or "direct information resource name reference citation relationship", as appropriate, between the irxt and each cited cnxpt. [See Procedure—CREATE Direct Information Resource Citation Relationship] [See Procedure—CREATE Direct Information Resource Name Reference Citation Relationship]

Ttx citation (cited-citing) associations are not created based upon this circumstance. A hierarchical association called an "imputed cnxpt citation association" is automatically created between cnxpts based upon information resource citations, in preparation for map generation.

Add a Taxonomy

Use Case: Add a Taxonomy—Coalesce into the CMM a ttx taxonomy or ttx list.

If not already defined, create a source info-item for the source of the information, setting its authority, usability, quality, expertise, etc. [See Procedure—CREATE Source]

If not already defined, create a fxxt info-item for the taxonomy, setting its authority, usability, quality, expertise, etc. and adding a source relationship to its source info-item. [See Procedure—CREATE FXXT]

If needed, create an irxt for the information resource (the primary document) which the taxonomy is stated in. [See Procedure—CREATE Irxt]

If information resources are associated with the ttxs in the taxonomy data set or other source, and if an irxt is not in the CMM for any information resource, then create an irxt for the information resource. [See Procedure—CREATE Irxt]

If needed, create a cnxpt for the ttx which is at the top of the taxonomy, adding a source relationship to its source info-item and marking its fxxt with the new fxxt info-item. If the data set contains other information regarding the ttx, such as names, descriptions, etc., add them as characteristics to the cnxpt. If other descriptions are not available, utilize irxt descriptions if available after being created as above. [See Procedure—CREATE Cnxpt]

Create a subject identifier occurrence relationship between the cnxpt and the irxt(s) representing information resources provided within the taxonomy source, marking them with the taxonomy fxxt and within all, one, or more stated scopxs. [See Procedure—CREATE Occurrence to irxt] A restriction applies so as not to create ttx citation associations or cnxpt name reference citation associations from the taxonomy source document itself to other cnxpts in the system: no ttx citation associations or cnxpt name reference citation associations based upon the contents of the taxonomy information resource will be created as a byproduct of creating the subject identifier occurrence relationship.

If needed, create a cnxpt for each additional ttx included in the taxonomy, adding a source relationship to its source info-item and marking its fxxt with the new fxxt info-item. If the taxonomy data set contains other information regarding the ttx, such as names, descriptions, etc., add them as characteristics to the cnxpt. If other descriptions are not available, utilize irxt descriptions if available after being created as above. [See Procedure—CREATE Cnxpt] Create a new "custom hierarchical association" between each set of two cnxpts as appropriate with the new taxonomy fxxt. [See Procedure—CREATE custom hierarchical association] In one embodiment, create a new "custom affinitive association" between each set of cnxpts appearing in the taxonomy as siblings, marking the relationship with a high weight, with the new taxonomy fxxt, and within all, one, or more stated scopxs. [See Procedure—CREATE custom affinitive association]

Import Taxonomy, Ontology, C-space, Concept Map, or Topic Map

Use Case: Import Taxonomy, Ontology, C-space, Concept Map, or Topic Map.

Follow the procedure in "Add a Taxonomy".

Import Ttxs

Use Case: Import Ttxs—Coalesce into the CMM an import of ttxs not all of which had been named previously in the CMMDB.

Create a new data set txo. [See Procedure—CREATE Data Set]

If not already defined, create a source info-item for the source of the information to be the provider of the data set, setting its authority, usability, quality, expertise, etc. [See Procedure—CREATE Source]

Optionally, create a fxxt info-item for the data set, setting its authority, usability, quality, expertise, etc. and adding a source relationship to its source info-item. [See Procedure—CREATE FXXT]

If the data set is a taxonomy, follow the procedure in "Add a Taxonomy".

If information resources are associated with the ttx in the data set, and if an irxt is not in the CMM for the information resource, then create an irxt for the information resource. [See Procedure—CREATE Irxt]

If needed, create a cnxpt for each ttx in the data set, adding a source relationship to its source info-item and marking its fxxt with the new fxxt info-item if created. If the data set contains other information regarding the ttx, such as names, descriptions, etc., add them as characteristics to the cnxpt. If other descriptions are not available, utilize irxt descriptions if available after being created as above. [See Procedure—CREATE Cnxpt]

If an irxt was created for an information resource associated with the ttx, create a subject identifier occurrence relationship between the cnxpt and the irxt, marking them with the source and the fxxt and within all, one, or more stated scopxs. [See Procedure—CREATE Occurrence to irxt]

Create a Ttx Category by Indicating Member

Use Case: Create a Ttx Category by Indicating Member—Form a ttx category by indicating one or more member ttxs.

Create a new "custom hierarchical association" between the two cnxpts with the stated fxxt. [See Procedure—CREATE custom hierarchical association]

Create a Ttx by Requesting Definition or Solution

Use Case: Create a Ttx by Requesting Definition or Solution—Form a ttx, to be associated with a ttx not yet in the CMM, that is merely a placeholder for definition by a user, offering a reward to anyone who can provide a definition or a solution, optionally by indicating a spot for the ttx.

Where a user has specific information about a ttx, such as the value to his company of having the ttx, but the details of the ttx are not yet represented by a cnxpt, then the user may enter the information and create the cnxpt for the ttx in the process, marking the cnxpt with the user as creator and a fxxt for "Information Requested" and within all, one, or more stated scopxs. [See Procedure—CREATE Cnxpt].

The new cnxpt may be categorized as within an existing cnxpt due to the indication of a spot, and thus a new "custom hierarchical association" between the encompassing cnxpt and the new cnxpt must be created, being detailed with a fxxt representing "Information Requested". [See Procedure—CREATE custom hierarchical association]

Also create the appropriate relationships for offering a reward and registering an information request. [See Procedure—CREATE offer a reward] [See Procedure—CREATE register information request]

Create a subject identifier occurrence relationship between the cnxpt and the reward, marking it with the user as creator and a fxxt for "Information Requested" and within all, one, or more stated scopxs. [See Procedure—CREATE Occurrence to special txo]

Create a subject identifier occurrence relationship between the cnxpt and the registration, marking it with the user as creator and a fxxt for 'registrations' and within all, one, or more stated scopxs. [See Procedure—CREATE Occurrence to special txo]

Create a Ttx by Advertising Crowd Sourcing Opportunity

Use Case: Create a Ttx by Advertising Crowd Sourcing Opportunity—Form a ttx by entering an advertisement, to be associated with a ttx not yet in the CMM, optionally by indicating a spot for the crowd sourcing opportunity advertisement.

In one circumstance, known as a solution crowd sourcing advertisement, create a cnxpt which states a requirement for a ttx, being detailed with a fxxt representing "Information Requested", offering a reward for those developing the ttx needed sufficiently to solve the stated problem, and also create the appropriate relationships for offering a reward and registering an information request. [See Procedure—CREATE Cnxpt] [See Procedure—CREATE offer a reward] [See Procedure—CREATE register information request]

Create a subject identifier occurrence relationship between the cnxpt and the reward, marking it with the user as creator and a fxxt for 'Information Offered' and within all, one, or more stated scopxs. [See Procedure—CREATE Occurrence to special txo]

Create a subject identifier occurrence relationship between the cnxpt and the registration, marking it with the user as creator and a fxxt for 'registrations' and within all, one, or more stated scopxs. [See Procedure—CREATE Occurrence to special txo]

The new cnxpt may be categorized as within an existing cnxpt due to the indication of a spot, and thus a new "custom hierarchical association" between the encompassing cnxpt and the new cnxpt must be created, being detailed with a fxxt representing "Information Offered". [See Procedure—CREATE custom hierarchical association]

Create a Ttx by Offering Data

Use Case: Create a Ttx by Offering Data—Form a ttx by specifying data, to be associated with a ttx not yet in the CMM, that is to be offered for sale or access, optionally by indicating a spot for the ttx.

Where a user has specific information about a ttx, such as details regarding sales volume, value or market need, and the ttx is not yet represented by a cnxpt, then the user may enter the information and create the cnxpt for the ttx in the process, marking the cnxpt as restricted to purchasers, with the user as creator and a fxxt for "Information Offered" and within all, one, or more stated scopxs. [See Procedure—CREATE Cnxpt].

The new cnxpt may be categorized as within an existing cnxpt due to the indication of a spot, and thus a new "custom hierarchical association" between the encompassing cnxpt and the new cnxpt must be created, being detailed with a fxxt representing "Information Offered". [See Procedure—CREATE custom hierarchical association]

Also create the appropriate relationships for the sale of and registering an information availability. [See Procedure—CREATE sales offer] [See Procedure—CREATE register information availability]

Create a subject identifier occurrence relationship between the cnxpt and the sale, marking it with the user as creator and a fxxt for "Information Offered" and within all, one, or more stated scopxs. [See Procedure—CREATE Occurrence to special txo]

Create a subject identifier occurrence relationship between the cnxpt and the registration for information availability, marking it with the user as creator and a fxxt for 'registrations' and within all, one, or more stated scopxs. [See Procedure—CREATE Occurrence to special txo]

Create a Ttx by Tech Transfer Advertising

Use Case: Create a Ttx by Tech Transfer Advertising—Form a ttx by entering an advertisement for tech transfer, to be associated with a ttx not yet in the CMM, optionally by indicating a spot for the advertisement.

In a tech transfer advertisement, create a cnxpt which states a ttx that is well solved, being detailed with a fxxt representing "Information Offered", offering a license for exploitation or offering the ttx for sale, and also create the appropriate relationships for offering a license and registering an information request. [See Procedure—CREATE Cnxpt] [See Procedure—CREATE offer a license]

Create a subject identifier occurrence relationship between the cnxpt and the advertisement, marking it with the user as creator and a fxxt for "Information Offered" and within all, one, or more stated scopxs. [See Procedure—CREATE Occurrence to special txo]

Create a subject identifier occurrence relationship between the cnxpt and the advertisement, marking it with the user as creator and a fxxt for 'advertisements' and within all, one, or more stated scopxs. [See Procedure—CREATE Occurrence to special txo]

The new cnxpt may be categorized as within an existing cnxpt, and thus a new "custom hierarchical association" between the encompassing cnxpt and the new cnxpt must be created, being detailed with a fxxt representing "Information Offered". [See Procedure—CREATE custom hierarchical association]

Create a Ttx by Adding Product

Use Case: Create a Ttx by Adding Product—Form a ttx by entering an product, to be associated with a ttx, tcept, or appcept not yet in the CMM.

Where a user has specific information about a product using or built upon a ttx, but the details of the ttx are not yet represented by a cnxpt, then the user may enter the information and create the cnxpt for the ttx in the process [See Procedure—CREATE Cnxpt], and also create the appropriate relationships. [See Procedure—CREATE Product] [See Procedure—CREATE Product]

If not already defined, create a source info-item for the source of the information, setting its authority, usability, quality, expertise, etc. [See Procedure—CREATE Source]

Optionally, if not already defined, create a fxxt info-item for 'Product Descriptions' or some more appropriate aspect, setting its authority, usability, quality, expertise, etc. and adding a source relationship to its source info-item. [See Procedure—CREATE FXXT]

If information resources are associated with the product, and if an irxt is not in the CMM for the information resource, then create an irxt for the information resource. [See Procedure—CREATE Irxt]

If not already defined, create a product info-item based upon the available information, setting its name, description, etc. as available from the information available in the irxt or the information resource it represents. [See Procedure—CREATE Product]

Create a cnxpt for the ttx based upon the product, adding a source relationship to its source info-item and marking its fxxt with the new fxxt info-item if created. If the product info-item contains other information, such as names, descriptions, etc., add it as characteristics to the cnxpt. [See Procedure—CREATE Cnxpt]

Create a 'Product of a Technology' typed txo occurrence relationship between the cnxpt and the product info-item, marking it with the user as creator and the new fxxt info-item if created. [See Procedure—CREATE Occurrence to typed txo]

Create a Ttx by Redefinition

Use Case: Create a Ttx by Redefinition—Form a ttx by redefining or retyping a non-cnxpt info-item to be a cnxpt.

A user may convert specific information represented by an info-item to be a description of a ttx not yet represented by a cnxpt, and create the cnxpt for the ttx in the process. [See Procedure—CREATE Cnxpt] Create any appropriate relationships between the object containing the information and the new cnxpt.

Create a Ttx by Adding Cncpttrrt

Use Case: Create a Ttx by Adding Cncpttrrt—Form a ttx by entering an unassociated cncpttrrt, and specifying a name of a ttx that it should be, but is not yet associated with in the CMM.

After creating a trxrt info-item representing a Cncpttrrt, where a user has specific information about the cncpttrrt (such as a trait, feature, need, or requirement), but the details of a ttx for which it pertains are not yet represented by a cnxpt, then the user may enter the information and create the cnxpt for the ttx in the process, and also create the appropriate trait relationship.

Create a cnxpt for the ttx based upon the cncpttrrt. If the trxrt info-item contains other information, such as names, descriptions, etc., add it as characteristics to the cnxpt. [See Procedure—CREATE Cnxpt]

Create a "trait relationship" occurrence relationship between the cnxpt and the trxrt info-item, marking it with the user as creator. [See Procedure—CREATE Occurrence to trxrt]

Create a Ttx by Registering Interest

Use Case: Create a Ttx by Registering Interest—Form a tcept by stating on a profile that the user has an interest in a ttx, tcept, or appcept not yet in the CMM.

Create a cnxpt for the ttx based upon the name supplied by the user, marking its creator as the user. If the user provides other information, such as a description, etc., add it as characteristics to the cnxpt. [See Procedure—CREATE Cnxpt]

Create a 'User Interest' typed txo occurrence relationship between the cnxpt and the user info-item, marking it with the user as creator and the "User Profile" fxxt. [See Procedure—CREATE User Interest occurrence]

Start a Community about a Ttx

Use Case: Start a Community about a Ttx—Create a 'community' and then create a ttx for the community to link to.

Communities and ttxs are closely coupled, but distinct. A community can (and, in one embodiment, will) automatically be initiated where a ttx requires one, such as where a user clicks on the ttx and wishes to see the community. On the other hand, a community may be established without a ttx as a basis. In that event, when requested, a ttx can be established to be the basis of the community.

In one embodiment, a community can migrate from a ttx to another ttx, such as for when a community becomes focused upon a subcategory of the ttx. In such a case, the community might spur the creation of a new ttx, or the community can be merged into the community of an existing ttx.

Create a comxo info-item representing the community based upon the name supplied by the user or taken from a cnxpt name, marking its creator as the user. If the user provides other information, such as a description, etc., add it as characteristics to the comxo. [See Procedure—CREATE Comxo]

Create a 'Community' typed txo occurrence relationship between the cnxpt and the comxo info-item, marking it with the user as creator and the "Communities" fxxt. [See Procedure—CREATE Occurrence to Community]

Add a Page Link as Occurrence

Use Case: Add a Page Link as Occurrence—Coalesce into the CMM a link of a page at a URL describing a ttx not previously in the CMMDB, connecting the linked information to the ttx as an occurrence.

If an irxt is not in the CMM for the linked page, then create an irxt for the linked page as an information resource, adding a source relationship to a source info-item representing the website. Extract other information regarding the ttx, such as names, descriptions, etc. from the web page and add them as characteristics to the irxt and mark its fxxt as "user web link". In one embodiment, mark its fxxt as "web link based". [See Procedure—CREATE Irxt]

In one embodiment, also add irxt info-items representing the information resources for the pages which the linked page cites or references to obtain a hierarchy of linked information resources, to a certain specified depth of referencing only, adding a source relationship to a source info-item representing the website, and mark its fxxt as "web link based". Extract other information regarding the ttx, such as names, descriptions, etc. from the web page and add them as characteristics to the irxt. [See Procedure—CREATE Irxt]

Create information resource citation relationships where possible to indicate a particular form of citation and mark their fxxt as "web link based". [See Procedure—CREATE Information Resource Citation Relationship]

Where a linked page directly references a cnxpt, create a "direct information resource citation relationship" or "direct information resource name reference citation relationship", as appropriate, between the irxt representing the page and the cited cnxpt and mark its fxxt as "reference from web page". [See Procedure—CREATE Direct Information Resource Citation Relationship] [See Procedure—CREATE Direct Information Resource Name Reference Citation Relationship]

Create a cnxpt for the ttx as described by the linked page, adding a source relationship to a source info-item representing the website, and marking its fxxt as the fxxt specified for the irxt. If other descriptions are not available, utilize irxt descriptions created as above. [See Procedure—CREATE Cnxpt]

Create a subject identifier occurrence relationship between the cnxpt and the irxt representing the linked page, marking it with the source, and mark the fxxt as the fxxt specified for the irxt and within all, one, or more stated scopxs. [See Procedure—CREATE Occurrence to irxt]

Ttx citation (cited-citing) associations are not created based upon this circumstance. A hierarchical association called an "imputed cnxpt citation association" is automatically created between cnxpts based upon information resource citations, in preparation for map generation.

Add a Page Link as an Occurrence of an Object

Use Case: Add a Page Link as an Occurrence of an Object—Coalesce into the CMM a link of a page at a URL describing an object (a txo other than a cnxpt) not previously in the CMMDB, connecting the linked information to the object as an occurrence.

In one embodiment, also add information resources for the pages which the linked page cites or references to obtain a hierarchy of linked information resources.

Create a 'Community' typed txo occurrence relationship between the cnxpt and the comxo info-item, marking it with the user as creator and the "Communities" fxxt. [See Procedure—CREATE Occurrence to Community]

Add a Later-Added Ttx Description Content Reference Citation Tag to a Document

Use Case: Add a Later-Added Ttx Description Content Reference Citation Tag to a Document—Add specific citation marker to a document regarding or citing specific content in another ttx's cnxpt's description or an information resource.

This action may be performed outside of the system, affecting only the document prior to it's import, or within the system so that an immediate creation of additional relationships takes place.

Add a Later-Added Ttx Description Content Reference Citation Tag to a Document

REFERENCE

Use Case: Add a Later-Added Ttx Description Content Reference Citation Tag to a Document Reference—Add specific citation marker to a reference (irxt) to a document regarding or citing specific content in another ttx's cnxpt's description or an information resource.

This action may be performed inside of the system, affecting the document after it's import, within the system, so that an immediate creation of additional relationships takes place.

Later-added ttx description content reference citation tags may be established manually by authorized users when reviewing a document available in or referenced by the CMM.

If a "later-added ttx description content reference citation tag" exists or is added for the description of a ttx, create a "ttx description content later-added reference citation association".

Trait Information

The utility of this process is that cncpttrrts may be used for ttx comparison.

Many ttxs share the same cncpttrrt. In the case where a cncpttrrt is the same for two ttxs, redundant information would be retained if a single stored representation of the cncpttrrt characteristics were incapable of being associated with two or more ttxs. On the other hand, confusion could ensue where a cncpttrrt of one ttx was not the exact equivalent of another ttx's cncpttrrt, especially over time. In one embodiment, both regimes are provided to reduce redundancy, improve similarity determination, and to address similar but not identical cncpttrrts. More generally, where a cncpttrrt is sufficiently similar to another cncpttrrt, an affinitive relationship will be created in the CMMDB that will be used in merging and matching to indicate the degree of semantic similarity.

Trait descriptions should be written at the abstract level and not be overly detailed relative to the level of description needed so that semantic distances can be calculated to obtain a rough match. Further descriptions can be added.

Enter or Refine Cncpttrrt Information

Use Case: Enter or Refine Cncpttrrt Information—Enter cncpttrrt information as a description or notes on a trxrt.

Enter Cncpttrrts for a Ttx

Use Case: State the Cncpttrrts of a Ttx—Add or edit cncpttrrts (assertions) and their descriptions regarding a ttx.

Add or edit assertion information regarding a ttx where the assertion information is a cncpttrrt, or add a vote to change, make an addition to, or delete information from a description of a trxrt representing a cncpttrrt of the ttx.

Create a new "trait relationship" occurrence relationship between the trxrt and the cnxpt within all, one, or more stated fxxts and within all, one, or more stated scopxs, marking by infxtypx to indicate that it is a trait relationship. [See Procedure—CREATE Occurrence to trxrt]

Associate Cncpttrrt with Ttx

Use Case: Associate Cncpttrrt with Ttx—Relate an existing cncpttrrt (trait assertion) to a ttx represented by a cnxpt.

[See Procedure—CREATE Occurrence to trxrt]

Cncpttrrt Characteristics and Attributes

State to the CMMDB that a cncpttrrt has a certain characteristic by stating that it has a value for an attribute by which the characteristic can be described.

Use Case: State Characteristics of a Cncpttrrt—Add information that describes characteristics or attributes of a trxrt, or add a vote to change, make an addition to, add a variant of, or delete information from a description of a characteristic or value of an attribute of the trxrt.

Attributes of a trxrt include but are not limited to:

Who first stated the cncpttrrt

Who may access the trxrt.

Use Case: Describe an Argument Regarding a Cncpttrrt—Give a deeper explanation why a certain statement regarding a cncpttrrt is as purported.

Categorizing Cncpttrrts

Cncpttrrts may be categorized, resulting in a relationship with the enveloping cncpttrrt category and thus indirectly with other cncpttrrts.

Cncpttrrts may be converted into categories by adding a hierarchical association between the trxrt representing a member cncpttrrt and the trxrt representing the category cncpttrrt. Cncpttrrts so converted do not lose usefulness as mere cncpttrrts.

Use Case: Categorize a Cncpttrrt—Enter a vote to place a cncpttrrt into a category.

Add a hierarchical association between two trxrts, stating that one cncpttrrt is in a cncpttrrt category as described by the second cncpttrrt.

Enter Information Resource for a Cncpttrrt

Use Case: Enter Information Resource for a Cncpttrrt—Supply information resources to the CMMDB on a manual, an assisted, or an automated basis by creating an occurrence relationship for the cncpttrrt to reference an external information resource or an internal information resource that is imported to or held in a backend file system.

The information resources can be related to trxrts already in the system or may be unrelated when first entered.

Use Case: Detail Cncpttrrt by Relating Information Resources to the Cncpttrrt—Provide as a basis for the definition of a cncpttrrt or its categorization a series of information resources that somewhat detail the cncpttrrt.

Match Cncpttrrts to Other Cncpttrrts

Use Case: Match Cncpttrrts to Other Cncpttrrts—Inform the CMMDB on a manual, an assisted, or an automated basis by creating an affinitive relationship between two trxrts to represent that a match of some type exists between the two cncpttrrts.

The entry is a vote. Each trxrt may be connected to zero or more cnxpts.

Match Cncpttrrts

State Equivalence of Cncpttrrts

Use Case: State Equivalence of Cncpttrrts—Manually state a belief that a cncpttrrt matches a second cncpttrrt in some way and record it in the CMMDB.

State Satisfaction of Requirement by Feature

Use Case: State Satisfaction of Requirement by Feature—Manually state a belief that a feature satisfies a requirement and record it in the CMMDB.

Match Feature Cncpttrrts to Requirement Cncpttrrts

Use Case: Match Feature Cncpttrrts to Requirement Cncpttrrts—State, on a manual, an assisted, or an automated basis by creating an 'satisfaction' relationship for a feature trxrt to reference a requirement trxrt to represent that a feature meets, fulfills or satisfies a requirement.

The entry is a vote. The feature may be connected to zero or more txpts, and the requirement may be connected to zero or more axpts.

Purlieu Information

The utility of this process is that purlieus may be used for ttx comparison.

Many ttxs may share the same purlieu. In the case where a purlieu is the same for two ttxs, the ttxs are thought to exist within that context but may otherwise not be similar Where a purlieu is sufficiently similar to another purlieu, an affinitive relationship will be created in the CMM that will be used in merging and matching to indicate the degree of similarity due to sharing (being within) a purlieu.

Enter Purlieus for a Ttx

Use Case: State the Purlieus of a Ttx—Add or edit purxpts (assertions) and their descriptions regarding a Txo.

Add or edit relationships stating that the ttx exists within the purlieu context.

Purlieu Characteristics and Attributes

State that a purlieu has a certain characteristic by stating that it has a value for an attribute by which the characteristic can be described.

Use Case: State Characteristics of a Purlieu—Add information that describes characteristics or attributes of a purxpt, or add a vote to change, make an addition to, add a variant of, or delete information from a description of a characteristic or value of an attribute of the purxpt.

Attributes of a purxpt include but are not limited to:

Who first stated the purlieu.

Who may access the purxpt.

When did the purlieu exist.

Use Case: Describe an Argument Regarding a Purlieu—Give a deeper explanation why a certain statement regarding a purlieu is as purported.

Categorizing Purlieus

Purlieus may be categorized, resulting in a relationship with the a purlieu category and thus indirectly with other purlieus. Purxpts may be ordered, stating that one purlieu occurred prior to another.

Purlieus may be converted into categories by adding a member purlieu. Purlieus so converted do not lose usefulness as mere purlieus.

Use Case: Categorize a Purlieu—Enter a vote to place a purxpt into a category.

Use Case: Order a Purlieu—Enter a vote to place a purxpt into a later timeframe (temporal category).

Enter Information Resource for a Purlieu

Use Case: Enter Information Resource for a Purlieu—Supply information resources to the CMM on a manual, an assisted, or an automated basis by creating an occurrence relationship for the purxpt to reference an external information resource or an internal information resource that is imported to or held in a backend file system.

The information resources can be related to purxpts already in the system or may be unrelated when first entered.

Use Case: Detail Purlieu by Relating Information Resources to the Purlieu—Provide as a basis for the definition of a purlieu or its categorization a series of information resources that somewhat detail the purlieu.

Match Purlieus to Other Purlieus

Use Case: Match Purlieu to Other Purlieus—State, on a manual, an assisted, or an automated basis by creating an affinitive relationship between two purxpts to represent that a commonality of some type exists between the two.

The entry is a vote. Each purxpt may be connected to zero or more cnxpts.

System Functions—Voting and Objection Features

Expertise Factoring

The expertise of users or other factors will be considered when elections take place.

Expertise Calculation

Use Case: Expertise Calculation—Adjust expertise as entries are made by a specific user and by other users regarding the entries made by the specific user.

Expertise Utilization

Use Case: Expertise Utilization—Apply preferences in the elections based upon the expertise of a user.

Expertise by Ontology Segment

Use Case: Expertise by Ontology Segment—Calculate a user's expertise and to utilize a user's expertise based upon the specific segment of the ontology under consideration.

Weight Votes According to User's Expertise

Use Case: Weight Votes According to User's Expertise—Assign a weight to every vote based upon who the user is as given by their profile and by any other information available about them, the categorical context where the vote will appear in the CMMDB (such as by ttx category), and by the context of the vote being made (such as being made regarding a new ttx or an old ttx that the user has never before considered).

Opinions

Enter Opinions Regarding a Ttx

Use Case: Enter Opinion on a Ttx—User enters their 'vote' on a certain ttx, and the votes are weighted according to the user's expertise or other factors.

The first vote entered about a ttx occurs during the entry process itself. A non-specific vote as specified here implies that a user believes that the ttx has merit only in so far as it represents something.

Objections

Use Case: Objections—Users register objections to content in the CMMDB.

Objections will be reviewed at various levels of control in the management of the system. Objections are user votes that carry additional weight and garner additional attention by system management.

Request Delete of Ttx

Use Case: Request Delete of Ttx—Request the deletion of a ttx.

Deleting a ttx from the CMMDB requires a vote. The cnxpt representing the ttx is not deleted right away, but the deletion appears to have happened for the user voting for the deletion. Deleted cnxpts will be placed into a trashcan like facility for that user. The cnxpt will be marked for deletion in the CMMDB ontology but will not be deleted if there is other activity on it by other users, and deletion is subject to the vote tallying process, such that if there are sufficient votes stating that there is merit in the ttx, it will not be deleted.

The actual deletion of the information regarding the info-item from the CMMDB will only occur after a set period of time.

Voting on Importance of Ttxs

Vote on the relative importance of a ttx compared to other ttxs.

Use Case: Vote on the Importance of a Ttx—Enter a vote on the relative importance of a cnxpt representing a ttx compared to other cnxpts.

Register User's Interest in Ttx

Use Case: Register User's Interest in Ttx—Establish metrics for importance of a ttx.

In one embodiment, interest in a ttx, tcept, or an appcept is initially expressed by its concretization. It is also expressed when the ttx, tcept, appcept is a result in a search. The following are additional processes where interest is expressed.

Change Other Attributes

Use Case: Change Other Attributes—Enter values for specific attributes of ttxs.

Add a Purlieu Page Link

Use Case: Add a Purlieu Page Link—Coalesce into the CMM a link of a page at a URL describing a purlieu not previously in the CMMDB, connecting the linked information to the purxpt as an occurrence.

In one embodiment, also add information resources for the pages which the linked page cites or references to obtain a hierarchy of linked information resources.

Add a Cncpttrrt Page Link

Use Case: Add a Cncpttrrt Page Link—Coalesce into the CMM a link of a page at a URL describing a cncpttrrt not previously in the CMMDB, connecting the linked information to the trxrt as an occurrence.

In one embodiment, also add information resources for the pages which the linked page cites or references to obtain a hierarchy of linked information resources.

Add an Object Useful as an Occurrence

Use Case: Add an Object Useful as an Occurrence—Coalesce into the CMM an object (including but not limited to a: product, company, person, component, ingredient), as represented by a txo, useable as an occurrence.

Add an Occurrence to a Ttx

Use Case: Add an Occurrence to a Ttx—Coalesce into the CMM an occurrence relationship between an object (including but not limited to a: product, company, person, component, ingredient), as represented by a txo, and a ttx, adding the object if not already in the CMM.

Add an Occurrence to a Purlieu

Use Case: Add an Occurrence to a Purlieu—Coalesce into the CMM an occurrence relationship between an object (including but not limited to a: information resource), as represented by a txo, and a purxpt, adding the object if not already in the CMM.

Add an Occurrence to a Cncpttrrt

Use Case: Add an Occurrence to a Cncpttrrt—Coalesce into the CMM an occurrence relationship between an object (including but not limited to a: information resource, product, company, person, component, ingredient), as represented by a txo, and a trxrt, adding the object if not already in the CMM.

Add an Occurrence to an Object

Use Case: Add an Occurrence to a Object—Coalesce into the CMM an occurrence relationship between an object (including but not limited to a: product, company, person, component, ingredient), as represented by a txo, and another object, adding new objects if not already in the CMM.

Assign a Communication about a Ttx to a new Ttx

Use Case: Assign a Communication about a Ttx to a new Ttx—Communicate on the basis of the ttx using at least one of social tool interactions, result sharing, sharing the ttx for collaboration.

Add Information or Link Information to Ttx

Use Case: Add Information or Link Information to Ttx—Further describe a ttx by adding an occurrence relationship to connect information to it.

Respond to Cncpttrrt Survey

Use Case: Respond to Cncpttrrt Survey.

Respond to Purlieu Survey

Use Case: Respond to Purlieu Survey.

Moderate

Use Case: Moderate.

Enter Assumption

Use Case: Enter Assumption.

Comment on Assumption

Use Case: Comment on Assumption.

Enter Question

Use Case: Enter Question.

Respond to Question

Use Case: Respond to Question.

Mark Suspected Error

Use Case: Mark Suspected Error.

Enter Issue

Use Case: Enter Issue.

Respond to Issue

Use Case: Respond to Issue.

Enter Problem Report

Use Case: Enter Problem Report.

Respond to Problem Report

Use Case: Respond to Problem Report.

Translate Issue to Issue-Resolution Workflow Activity

Use Case: Translate Issue to Issue-Resolution Workflow Activity.

Reach Consensus

Use Case: Reach Consensus.

Refine/Vote/Resolve Descriptions

Use Case: Refine/Vote/Resolve Descriptions.

Manually Match Purlieus

Use Case: Manually Match Purlieus.

Manually Merge Txos

Use Case: Manually Merge Txos.

Incentivize Creativity

Use Case: Incentivize Creativity.

Access Management for Ttxs

Access to information about ttxs may be controlled by the originator.

Set Ttx Ownership

Use Case: Set Ttx Ownership.

Set Ttx Protection

Use Case: Set Ttx Protection—Provide for security concerns for corporations and other classified information holders.

In one embodiment, a special classification system package is available for corporate users and others who purchase the package. With this special package, access to all the classified information within that organization's system is limited to those authorized to use it. However, general information is left open to the public for sharing. The information inflow to the organization holding the classified information is not limited except by fees; only information outflow is regulated and access by the public is allowed only within the limitations set by the organization Set Ttx Protection Options Use Case: Set Ttx Protection Options—State that ttxs entered by a user are to be protected from publishing.

The degree of protection may involve, including but not limited to: time, content, existence, access, or warning/alert levels. By way of example, a ttx may be set for publishing after a certain specified delay; existence of a ttx may be published by display of a 'shell' dxo without a title, with a title but without access to a description, with a title or description only available to specific users or groups; a ttx may be subject to warnings or alerts on access by others or duplication.

Set Ttx Recording Options

Use Case: Set Ttx Recording Options—State that statements (votes) regarding ttxs, either entered by a user or not, are to be retained.

A record of statements regarding a tcept can be retained to serve as, including but not limited to: evidence of inventorship in 'derivative works' and some other cases, or as a basis for suit for disclosure if he registers an NDA contract against it as in Patent Clearance, etc. Retention requests need not be made by the user creating a ttx, but a user may specify a blanket retention request for the ttxs which he does enter. Retention requests are for set time periods.

Where an innovation consortium is formed, all statements are retained for a specified time, and include statements by other users (in or outside of the consortium) adding tcepts or changes in descriptions visible to the consortium which are improvements to the consortium tcept may obtain an evidence trail useful to enforce their inventorship on a patent application of the consortium.

Register Ttx Match Alert

Use Case: Register Ttx Match Alert—Request alerts to warn of a subsequent user's searches for a ttx or other entries regarding it.

A user may request an alert, on any ttx that has been entered, to be issued where a new entry or search is similar to the original or where an offshoot ttx or member of the original ttx, now a ttx category, is entered.

A user may make a blanket request for alerts, on any ttx that they later enter, to be issued where a new entry or search is similar to their entry or where an offshoot ttx or member of the ttx category is entered.

A user may make a blanket request for alerts, on any ttx or ttx category that is entered by any user, to be issued where a new entry or search is similar to the original or where an offshoot ttx or member of the ttx category is entered.

Entry of a ttx protects users from opportunity loss in that they can be considered a source for work on the idea by others.

Register Ttx Intellectual Property Exposure Alert

Use Case: Register Ttx Intellectual Property Exposure Alert—Request alerts to warn of a subsequent user's activity regarding the tcept, including but not limited to: involves the tcept in a model, retrieves a publication relevant to the tcept, finds information considered to be under protection, or acts on other entries regarding it.

A user may request an alert, on any ttx that has been entered, to be issued where a specific relevant document is found by any user's search or a scraping.

A user may make a blanket request for alerts on a specific document (by specifying signature string(s) or other characteristics) or specific phraseology such that the alert is triggered when that document, signature, or phraseology is found by any user's search or a scraping.

Entry of these alerts protects users from loss of rights in IP to others where possible value, or possible harm from publication can be acted upon by comparing information found to information to be or considered under protection, so that when some information is found by anyone's search (or a scraping, or a specific set of people's searches), the fact of it's existence or its exposure is reported to the alert requester.

Register Ttx Match Warning

Use Case: Register Ttx Match Warning—Request warnings to subsequent users who searches for their ttx or otherwise enters information against it.

Protect a user from opportunity loss by giving notice, or advertising to others that the originally entering user has some right or knowledge in the ttx and thus a leg up on those others in the marketplace, even if the ttx is not fully exposed.

Set Fee for Viewing of Ttx

Use Case: Set Fee for Viewing of Ttx.

Purchase View of Ttx

Use Case: Purchase View of Ttx.

Categorize

Define Category/Classification

Use Case: Define Category/Classification.

Subdivide Ttx

Use Case: Subdivide Ttx.

Distinguish Ttx and Manually Narrow

Use Case: Distinguish Ttx and Manually Narrow.

Classify Txo into Category

Use Case: Classify Txo into Category.

Enter Objection

Use Case: Enter Objection.

Refine/Vote/Resolve Classifications

Use Case: Refine/Vote/Resolve Classifications.

Define Thesaurus Term

Use Case: Define Thesaurus Term—Enter keywords or keyword phrases.

A user may manually enter phrases or may manually write detailed descriptions for a phrase's meaning. More generally, keyword phrases will be obtained from queries and internet scrapes.

Categorize an Object

Use Case: Categorize an Object—Add a tpx relationship between an object and a ttx.

Add a tpx relationship between an object (including but not limited to a: comxo, conxtv, rexo, individual, organization, product, irxt, component, ingredient, note, question), as represented by a txo, and a ttx, as represented by a cnxpt, adding the object if not already in the CMM.

Edit the CMMDB Categorization by Describing Relationships between Ttxs

Connect Appcept to Another Ttx to State an Association

Use Case: Connect Appcept to Another Ttx to State An Association—State that an association to another ttx in the CMMDB should exist from the axpt under consideration (being described).

Make new relations on CMMDB

Use Case: Vote to Relate Ttxs—Connect cnxpts in the CMMDB to form an association and specify the meaning of the association.

When a user wishes to form an association between two ttxs, he will view 2 different places in the map and then select a ttx on one map, and indicate or select a ttx on the other map. Then he will enter a command to form an association (enter a vote to create an association) between the indicated ttxs. The display system sends the metadata about the operation to the CMMDB to record the vote.

Describe Associations between Ttxs

Use Case: Describe associations between Txs—Create, delete, or alter associations as needed.

To enter opinions regarding associations between ttxs.

The crowd has the ability to create, delete, or alter associations between Ttxs as they see fit within certain guidelines. This is accomplished by voting on the existence and nature of an association between Ttxs or information resources stored or linked to by the CMMDB ontology. The opinion of a specific user may not be accepted by the crowd.

Create New Relationships By Direct Edits

Use Case: Create New Relationships By Direct Edits—Manually define a previously unknown relationship or vote that the relationship should exist.

Such relationships may be created by several individuals at about the same time, before they appear on each other's view. In all cases, the relationship 'creations' are seen internally as 'votes'.

Connect Ttxs to State Existence of Association

Use Case: Connect Ttxs to State Existence of Association—Create new association between two ttxs.

State that an association to another cnxpt in the CMMDB should exist from the cnxpt under consideration (being described).

Place or Move Ttx to Create or Change Associations

Use Case: Place or Move Ttx to Create or Change associations—Vote to Change the association of a cnxpt with another cnxpt.

Associations fall within many types.

The movement of a ttx to a deeper level or a more shallow level in the apparent taxonomy being viewed submits a vote to change an association that may not be involved in some other taxonomies including the same cnxpt and derived from the CMMDB ontology.

State Agreement or Disagreement on a Selected Relationship

Use Case: State Agreement or Disagreement on a Selected Relationship—Add an opinion regarding the existence or a characteristic of a previously existing relationship between a ttx being described and another ttx indicated.

Categorizing Ttxs to Add Metric

Use Case: Categorizing Ttxs to Add Metrics—Alter an existing ttx categorization so that metrics can be derived from information specifically 'attached to', 'associated with', or 'concerning' the ttxs.

Vote to Add a Categorization for a Ttx

Use Case: Vote to Add a Categorization for a Ttx—Add a categorization vote for a Ttx by moving it into another ttx in the visualization using drag and drop, or, alternatively by entering a command, or alternatively by select and add reference.

When a user wishes to re-categorize a ttx, he will view 2 different places in the map, possibly on two different visualization windows, and then select a ttx on one map, and indicate and then move (enter a vote to re-categorize) the indicated ttx from one place into the selected (first) ttx using 'drag and drop'. Alternatively, he will enter a command to add a category (enter a vote to add categorization) to the indicated ttx. Alternatively, he will 'select and add category reference' by selecting the second ttx, then indicating the first ttx, and entering a 'paste reference' command. The display system sends the metadata about the operation to the CMMDB to record the vote.

Move Ttxs on Map

Use Case: Vote to Move (re-categorize) a Ttx—Enter a change categorization vote for a Ttx by moving it on the visualization using drag and drop, or, alternatively by entering a command, or alternatively by select and move

REFERENCE

When a user wishes to re-categorize a ttx, he will view 2 different places in the map, possibly on two different visualization windows, and then select a ttx on one map, and indicate and then move (enter a vote to re-categorize) the indicated ttx from one place into the selected (first) ttx using 'drag and drop' with the modifier to remove prior categorization. Alternatively, he will enter a command to re-categorize (enter a vote to re-categorize) the indicated ttx. Alternatively, he will 'select and change reference' by selecting the second ttx, then indicating the first ttx, and entering a 'move reference' command. The display system sends the metadata about the operation to the CMMDB to record the vote.

Request Deletion of Relationship

Use Case: Request Deletion of Relationship—Request the deletion of a relationship.

Deleting a relationship from the CMMDB requires a vote. The relationship is not deleted right away, but appears to be for the user. Deleted relationships will be placed into a trash can like facility for the user. The relationship will be marked for deletion in the CMMDB ontology but will not be deleted if there is other activity on it by other users, and will be subject to the vote tallying process.

The actual deletion of the information regarding the info-item from the CMMDB will only occur after a set period of time.

Describe Other Relationships.

Use Case: Describe Relationships between Ttxs and other Objects—Create, delete, or alter relationships as needed between cnxpts and other dxos.

Users and the system have the ability to create, delete, or alter relationships between cnxpts as they see fit within certain guidelines and design parameters.

This is accomplished by voting on the existence and nature of a relationship between ttxs and information resources stored or linked to by the CMMDB ontology. The opinion, as expressed by a vote, of a specific user may not be accepted as the consensus when the votes are tallied.

Enter Editorial Vote/Comment

Use Case: Enter Editorial Vote/Comment—Discuss a ttx.

Discussion by any media connected to ttx.

Vote on a Ttx Relationship

Use Case: Vote on a Ttx Relationship—User enters their 'vote' on a certain relationship, and the votes are weighted according to the user's expertise or other factors.

Entering a vote about two ttxs may occur when no prior votes have been recorded regarding the two ttxs, but this is no different during the entry process itself.

Edit Relationships by Culling Result Sets

Use Case: Edit Relationships by Culling Result Sets—Create new relationships with information resources by culling result sets, possibly stemming from queries of research information resources.

Culling a query result set states that changes are needed to improve the effectiveness of the query manually by refining the overall relevance of the results to using only (or adding better) information resources, txos, or cnxpts that are relevant to the ttx that the user has in his mind Defining previously unknown relationships, or deleting inappropriate relationships are the intended side effects of culling. Different users will have different opinions about what the ttx for a cnxpt really is; many users may be making different refinements at about the same time before they appear on each other's view; and an averaging of these fuzzy opinions, seen internally as 'votes', allows a consensus to form for an objective opinion rather than a set of subjective opinions. The simple addition and deletion of relationships does not provide the consensus because no averaging takes place, but redundancy in the CMMDB does occur, so cleanup and summarization are required.

Culling of result sets for goals occurs over a short time by one or a small number of users causes rapid improvement of the positioning of the goal based upon subjective opinion(s). After the goal becomes a cnxpt, further culling of the result sets continues over a long period of time, resulting in constant subtle refinement of positioning by many users. [See Procedure—REPROCESS a RESULT SET for Goal]

Visualizations and Reports must provide proper orderings

Use Case: Edit Visualizations and Reports to set Proper Orderings—Order categories, criteria and elements.

(Deciding which categories are more important and which should be listed first.).

Actions Issues

Understanding the effects of actions or declarations

Categorizing Issues

Categorizing

Conceptual Correctness Issues

Correcting Conceptual Correctness Errors

Detecting Conceptual Correctness Errors

Issues Regarding Making Distinctions

Making Distinctions

Knowledge Extraction Issues

Knowledge Extraction

Naming Issues

Entering Information as a Vocation

Use Case: Entering Information as a Vocation—Add or edit information to the CMMDB regarding an appcept or a tcept itself that is obtained from a reputable source and not simply imagined.

For those significant number of people interested in simply participating in the process of defining the tcepts of the future mostly to satisfy themselves—due to ego/attract attention.

Define a to do List Item

Use Case: Define a To Do List Item—Create a To Do list item for tracking a task needing effort in the system.

The To Do list is structured around the individual, role, or system function as assigned to the task and the state of progress in resolving the To Do task. A workflow management structure for the To Do list is provided.

Import Collateral Information Resource

Use Case: Import Collateral Information Resource—Supply collateral information resources to the CMMDB on an assisted or automated basis by pointing to or referencing the source.

If not already defined, create a source info-item for the source of the information, setting its authority, usability, quality, expertise, etc. [See Procedure—CREATE Source]

If needed, create an irxt for the information resource (the primary document), marking the fxxt as "bulk add". [See Procedure—CREATE Irxt]

Create information resource citation relationships where appropriate, marking the fxxt as "bulk add". [See Procedure—CREATE Direct Information Resource Citation Relationship]

Where the collateral information resource directly references a cnxpt, create a "direct information resource citation relationship" or "direct information resource name reference citation relationship", as appropriate, between the irxt representing the page and the cited cnxpt and mark its fxxt as "bulk add". [See Procedure—CREATE Direct Information Resource Citation Relationship] [See Procedure—CREATE Direct Information Resource Name Reference Citation Relationship]

Follow the procedure in "Enter Single Collateral Information Resource or Locator" for each collateral information resource at the source.

Use Case: Enter Single Collateral Information Resource or Locator—State that a collateral information resource exists for a cnxpt or other txo in the CMMDB.

Create an irxt for the collateral information resource at the source. The external information resource may have to be referenced by a URL or file path by the irxt. If not, it may be necessary to import the information resource to be held in a backend file system. Each irxt representing a collateral information resource can then be related to ttxs already in the system or may remain unrelated after entry. Create a new occurrence relationship between a txo and a irxt representing an information resource.

Follow the procedure in Enter Information Resource for a Ttx for the collateral information resource and cnxpt or txo.

System Function—Summarize Set

Use Case: Summarize Set—Show view containing specific types of summarization of selected ttxs.

Consensus Correction

The purpose of this is to recognize that if someone feels strongly enough to make a correction, then they have probably studied the issue sufficiently to recognize that a change is needed that the originator did not see in time to make the change. It may occur that imports occur after data is entered that is more expert than what was entered previously. Imports are usually considered to be expert in nature.

Use Case: Correction Precedence—As changes are requested, additional weight may be given to the change, or taken away from the change, based upon tuning studies.

Use Case: Problem Weighting—Alter weightings on votes where problems have been reported.

System Functions—Consensus Tallying

Generate Consensus from Votes to Determine Similarity of Ttxs

Use Case: Generate Consensus from Votes to Determine Similarity of Ttxs—Calculate closeness factors for ttxs in a pairwise fashion based upon identity indicators of the most recently changed ttx.

This is an incremental process. In one embodiment, it is performed on a client system. In one embodiment, it is performed on a server system. In one embodiment, it is performed so that a user can see a near real time change of position of ttxs based upon the changes in identity indicators. Use of closeness factors to combine similar ttxs is performed in the "Merge/Coalesce Ttxs" process. Use of closeness factors to adjust all ttx positions occurs after fxxt analysis in "System Functions—Map Preparation".

Generate Consensus from Votes to Select Best Names

Use Case: Generate Consensus from Votes to Select Best Names—Elect a name from the recorded votes.

This is an incremental process. In one embodiment, it is performed on a client system. In one embodiment, it is performed on a server system. In one embodiment, it is performed so that a user can see a near real time change of name.

Methodology Based Add/Refine—Design

Define Add/Refine Methodology

Use Case: Define Add/Refine Methodology.

Define Add/Refine Methodology Procedure Step (stating principals and rules)

Use Case: Define Add/Refine Methodology Procedure Step (stating principals and rules).

Methodology Based Add/Refine

Invoke Methodology

Use Case: Invoke Methodology.

Start and Perform Methodology Step

Use Case: Start and Perform Methodology Step.

Enter Completion of Methodology Step

Use Case: Enter Completion of Methodology Step.

Review Suggestions to Refine or Reject

Use Case: Review Suggestions to Refine or Reject.

Keyword and Thesaurus Changes

Lack of Specificity Improvement encompassing query and to classify the information based upon a more refined term.

Define Keyword Meaning Equivalence Relationship

Use Case: Define Keyword Meaning Equivalence Relationship—Defining a keyword meaning equivalence relationship can be done manually, but is more often done on the basis of relevance found in searching.

Manual definition is useful in translation.

Define Synonym

Use Case: Define Synonym—This is a special case of defining a keyword meaning equivalence relationship.

Define Antonym

Use Case: Define Antonym—This is a special case of defining a negative weighted keyword meaning equivalence relationship.

System Functions—System Control Operations

Perform Authentication

Use Case: Perform Authentication.

Generate Fee for Access Right

Use Case: Generate Fee for Access Right—Compute/recompute the fees for a specific user's purchase of access rights.

Authorize Use

Use Case: Authorize Use.

Perform Personalization

Use Case: Perform Personalization.

Perform Security, Control of IDs, Data, Provisioning

Use Case: Perform Security, Control of IDs, Data, Provisioning.

Generate Community Connection

Use Case: Generate Community Connection.

Autosave

Use Case: Autosave—Save user changes automatically at regular intervals so their work is not lost.

Autosave State of Interface

Use Case: Autosave State of Interface—Save user interface state automatically at regular intervals so the user's context setup effort is not lost.

System Functions—Workflow and Analytics

Execute Analytic

Use Case: Execute Analytic—Execute a requested analytic and return results.

Execute Model

Use Case: Execute Model.

Execute Crawling or Other Information Discovery Technique

Use Case: Execute Crawling or Other Information Discovery Technique—Find documents relevant to potential search queries. This action may invoke a crawling.

Administer Review and Error Correction Workflows

Use Case: Administer Review and Error Correction Workflows.

Execute Review and Error Correction Workflows

Use Case: Execute Review and Error Correction Workflows.

Methodology Procedure Workflow Administration

Use Case: Methodology Procedure Workflow Administration.

Assign Add/Refine Methodology Step

Use Case: Assign Add/Refine Methodology Step.

System Functions—Assisted Creativity Automation

Generate Gap Analysis

Use Case: Generate Gap Analysis.

Generate Area of Consideration

Use Case: Generate Area of Consideration.

Generate Area of Interest from Area of Consideration

Use Case: Generate Area of Interest from Area of Consideration.

Execute Add/Refine Analytic

Use Case: Execute Add/Refine Analytic.

Execute Add/Refine Web Scraping Analytic

Use Case: Execute Add/Refine Web Scraping Analytic.

Execute Add/Refine Document Analysis

Use Case: Execute Add/Refine Document Analysis.

Execute Entity Extraction Analytic

Use Case: Execute Entity Extraction Analytic.

Execute Text Mining Analytic

Use Case: Execute Text Mining Analytic.

Execute Relevance Ranking Analytic

Use Case: Execute Relevance Ranking Analytic.

Generate Suggestions According to Methodology Step Rule

Use Case: Generate Suggestions According to Methodology Step Rule.

Generate Suggestions According to Analytic

Use Case: Generate Suggestions According to Analytic.

Txo Suggestion Generation

Use Case: Txo Suggestion Generation.

Purlieu Suggestion Generation

Use Case: Purlieu Suggestion Generation.

Cncpttrrt Suggestion Generation

Use Case: Cncpttrrt Suggestion Generation.

Determine Attribute Default Value

Use Case: Determine Attribute Default Value.

Generate Description Suggestion

Use Case: Generate Description Suggestion.

List Entry Suggestion Generation

Use Case: List Entry Suggestion Generation.

Suggest Matchings of Cncpttrrts

Use Case: Suggest Matchings of Cncpttrrts.

Suggest Matchings of Tcepts to Appcepts

Use Case: Suggest Matchings of Tcepts to Appcepts.

Generate Road Map

Use Case: Generate Road Map.

Generate Report

Use Case: Generate Report.

Generate Suggested Translation

Use Case: Generate Suggested Translation.

System Functions—Visualization Visualization Control Open Interface

Use Case: Open Map Visualization—Using a stored visualization name, specify visualization type, fxxt, starting point for view, filters, etc. to be displayed in Map visualization window.

Start the application or open the browser window to start using the system.

View Control

Use Case: View Control—Display all the names of rsxitems in the current display that contain the string that a user enters into the panel's input field.

The number of dxos that may be on a display at a specific time may be quite large. Locating a specific rsxitem among the dxos is tedious without a tool to do so.

To locate a specific cnxpt, the user begins typing a string to fill the list of names. When the number of names is short enough, the user finds the rsxitem name of interest in the list and clicks on it.

At this time the display will locate the rsxitem and automatically scroll the window (or move the viewpoint) to bring that rsxitem into focus.

View Map

Use Case: View Map—Specify visualization type, fxxt, starting point for view, filters, etc. to be displayed in Map visualization window.

View Map with Query Result Set

Use Case: View Map with Query Result Set—Specify visualization type, fxxt, starting point for view, filters, result set, etc. to be displayed in Map visualization window.

View Map without Query Result Set

Use Case: View Map without Query Result Set—Specify visualization type, fxxt, starting point for view, filters, etc. to be displayed in Map visualization window.

Specify no result set.

Fly-Through Control

Display a planet space where the planets represent ttxs. The planet space is a visualization of (in graph theory terminology) a forest of trees of dxos in the form of spheres that enclose other spheres where the enclosed spheres represent child dxos. The user will be able to fly around and through the spheres by controlling the 'viewpoint' with their pointer. When the 'user eye' viewpoint is distant from a sphere, the sphere skin is solid, and when the viewpoint is approaching a sphere, first the sphere name appears then as the viewpoint closes in on the sphere, the skin becomes translucent, then transparent, exposing the internal spheres.

The number of spheres gets large, but not all have to be on the scene. The spheres have to be selectable, and each has to be essentially an object with attributes and methods.

Choose Default Starting Point

Use Case: Choose Default Starting Point—Position the visualization (move view point into close proximity with) to a default starting point.

Use Case: Navigate Through Map—Cause movement of display viewpoint around map or list.

Generate requests for new data as needed.

Use Case: Re-Focus Map Viewpoint by Query Result Item—Move to specific rsxitem in display.

The system provides a Focus To Rsxitem panel in order speed-up the search. This panel displays all the names of cnxpts referenced by rsxitems and, optionally, non-cnxpt info-items referenced by rsxitems, in the current display that contain the string that a user enters into the panel's input field.

To locate a specific rsxitem, the user 'context clicks' on the item and selects 'locate'. At this time the display will locate the rsxitem and automatically scroll the visualization window (or move the viewpoint, possibly expanding the hierarchy in the list if needed) to bring that rsxitem into focus.

Result Set Based Starting Point Selection

Use Case: Result Set Based Starting Point Selection—Position the visualization (move view point into close proximity with) to a rsxitem representing a result set member having the highest relevance or listed first in results from a search engine.

Select Starting Viewpoint on Map

Use Case: Select Starting Viewpoint on Map—Position the visualization (move view point into close proximity with) to a particular starting point for viewing and navigation.

Simple Query based Starting Point Selection

Use Case: Simple Query based Starting Point Selection—Position the visualization (move view point into close proximity with) to a dxo found by entering a simple query or a find command Navigation Control Use Case: Indicate Displayed Object to be context—Move pointer to specific object on display to indicate that it should be the context for an action.

Use Case: Position Objects for Viewpoint by Dxo List—Jump viewpoint to the proximate location of a dxo by using a dropdown dxo list with name completion feature.

Define a Tour

Use Case: Record Tour—Begin to save a tour with a name starting from the current point of view.

Use Case: Name Tour—Assign a name to a tour just taken (remembered) or to be taken (recorded).

Save Tour

Use Case: Save Tour—Save the most recently remembered tour with a name.

Select Tour for Starting Point

Use Case: Select Tour for Starting Point—Position the visualization (move view point into close proximity with) to a point defined by a tour that was previously saved.

Use Case: View Details of Specific Indicated Appcept—Display and pass control to Properties Window for appcept which is indicated as context by pointer.

Use Case: View Details of Specific Indicated Tcept—Display and pass control to Properties Window for Tcept which is indicated as context by pointer.

Tree Visualization Control

Use Case: Navigate Through List—Cause movement of display viewpoint around map or list.

Select Starting Viewpoint on List

Use Case: Select Starting Viewpoint on List—Position the list visualization (move view point into close proximity with) to a particular starting point for viewing and navigation.

View List

Use Case: View List—Specify visualization type, fxxt, starting point for view, filters, etc. to be displayed in List visualization window.

View List with Query Result Set

Use Case: View List with Query Result Set—Specify visualization type, fxxt, starting point for view, filters, result set, etc. to be displayed in List visualization window.

View List without Query Result Set

Use Case: View List without Query Result Set—Specify visualization type, fxxt, starting point for view, filters, etc. to be displayed in List visualization window.

Specify no result set.

Open List Visualization

Use Case: Open List Visualization—Specify, using a stored visualization name, visualization type, fxxt, starting point for view, filters, etc. to be displayed in List visualization window.

Display Visualization

Use Case: Display Visualization

Instantiate Visualization from Hyperlink

Use Case: Instantiate Visualization from Hyperlink.

Filter Control

Apply Factor-Based Filtering by Fxxt

Use Case: Apply Factor-Based Filtering by Fxxt.

Apply Factor-Based Filtering by Type

Use Case: Apply Factor-Based Filtering by Type.

Apply Factor-Based Filtering by Attribute

Use Case: Apply Factor-Based Filtering by Attribute.

Apply Factor-Based Filtering by Purlieu

Use Case: Apply Factor-Based Filtering by Purlieu.

Apply Factor-Based Filtering by Cncpttrrt

Use Case: Apply Factor-Based Filtering by Cncpttrrt.

System Functions—Assisted Creativity Suggestion Generation

Perform Quality and Completeness Assessments of Ttx's Characteristics

Use Case: Perform Quality and Completeness Assessments of Ttx's Characteristics.

Generate Suggestions According to Quality and Completeness Assessments

Use Case: Generate Suggestions According to Quality and Completeness Assessments.

Perform Well-definedness Checking of Fxxt Arithmetic Relationships

Use Case: Perform Well-definedness Checking of Fxxt Arithmetic Relationships.

Generate Suggestions According to Well-definedness Checking

Use Case: Generate Suggestions According to Well-definedness Checking.

Generate Suggestions for Topic Subdivisions According to Quantitative Separation Determination Based Upon Interest and Link Analysis Use Case: Generate Suggestions for Topic Subdivisions According to Quantitative Separation Determination Based Upon Interest and Link Analysis.

Generate Suggestions for Abstraction of Descriptions and Simplification of Cncpttrrts Use Case: Generate Suggestions for Abstraction of Descriptions and Simplification of Cncpttrrts.

System Functions—User Input Management

Accept Incentivized Crowd Refinement 'Vote'

Use Case: Accept Incentivized Crowd Refinement 'Vote'.

Share and Commune

Collaboration

Users will collaborate to improve the quality and completeness of the CMMDB. Collaborations may be made more formal and identifiable by initiating and assigning them names. Work and results of named collaborations may be shared with other collaborators.

Sharing with Collaborators

The purpose of sharing is to provide connection information to a collaborator to view a shared visualization map or list using a viewing angle on a visualization created by the sharing user, but without necessarily sharing the Avatars, Decorations, Mannerisms, etc. that a user has set up, while not requiring the user to copy the map and send it outside of the system as a movie, etc. The purpose of this collaboration style is to obtain contributions of information from each collaborator into a common understanding—the CMM.

Use Case: Collaborate to Improve CMMDB—Contribute effort in order to obtain a better common understanding of cnxpts and to otherwise improve the content of the CMMDB.

Initiate Named Collaborative Effort

Use Case: Initiate Named Collaborative Effort—Start a named collaborative effort not attached to specific innovation consortium.

Specify a purpose for the collaboration and other descriptive information.

Collaboration may be under auspices of a specific collaborative effort by citing the collaborative effort name when collaborating. When collaborating under a named collaborative effort, access may be granted to resources associated with that collaborative effort.

Share Information

Use Case: Share Queries and Results—Share query scripts, as well as their processing results and visualizations.

The utility of this is that query scripts may be retained for long periods of time, re-used extensively, adjusted for currency, version controlled, and controlled by access rights.

Additional utility stems from allowing multiple users to use the same queries as well as the same processing results and visualizations. Query scripts, result sets, and visualization configurations will be sharable.

In one embodiment, when a query is specified for a goal or cnxpt that matches another goal's or cnxpt's query, a query in common affinitive association with a low weight is created between the new goal or cnxpt and the existing goal or cnxpt, marked with the user as creator, and with direction from new goal or cnxpt to existing goal or cnxpt.

Visualization Sharing

Visualization Synchronization

The sharing of visualizations can be simultaneous, such that the configuration is updated by a user when desired, and other users could then 'synchronize' to the newly (last) saved configuration. Synchronization can be 'immediate' such that when a user updates the configuration, the users with 'immediate' synchronization set will immediately see the visualization with the new configuration.

Share Visualization

Use Case: Share Visualization—Share a visualization, under access control, with other users (unlimited).

Additional Visualization Sharing Tasks

In one embodiment, the user would be able to perform additional visualization sharing tasks, including, but not limited to:

Set starting position

Share routings

Share tours

Share the starting position for others to use

Change Contents to Show Sharing Dxo or other objects

Sharing Visualization Views

Use Case: Visualization Synchronization—Share visualizations for simultaneous viewing, such that the configuration is updated by a user when desired, and other users could then 'synchronize' to the newly (last) saved configuration.

Synchronization can be 'immediate' such that when a user updates the configuration, the users with 'immediate' synchronization set will immediately see the visualization with the new configuration.

Visualizations may be shared under access control with an unlimited number of other users.

Use Case: Send View Share to Collaborator—Provide connection information to a collaborator to view a shared visualization map, report, export, or list from the same perspective and with the same information that a user is seeing, while not requiring the user to copy the map and send it outside of the system.

The Share contains authorization information for accessing the data including the Tours, Placeholders, Avatars, Decorations, Mannerisms, etc. that a user has set up.

Use Case: Send Pointer to Collaborator—Provide connection information to a collaborator to view a specific location on a shared visualization map or list.

Pointers may be recorded, saved, and named. Named pointers may be used by those sharing a map so that one user may properly describe where they were at on the map and took note of the location. The pointer may allow the user or another user to go to a specific point on a map while viewing a map simultaneously or on a different display or at a different time.

Share Navigation

Use Case: Share Navigation.

Sharing Tours

Named 'tours' may be shared so that one user may properly describe what they see to another user viewing a map or list simultaneously or on a different display or at a different time.

Use Case: Send Tour to Collaborator—Provide connection information to a collaborator to view a shared visualization map or list using a tour created by the sharing user.

Share Library Items

Use Case: Prepare Library Items—Prepare information for sharing through the library by naming it and setting proper sharing settings and permissions.

The Library will contain many items, including, but not limited to: descriptions, tours, filters, personalities, mannerisms, decorations, graphical representations, dxo, fxxt specifications, data sets, calculation formulas, metrics, analytics, exports, result sets, scripts for queries, etc.

Sponsor Targeted Ideation/Brainstorming Collaboration

Use Case: Sponsor Targeted Ideation/Brainstorming Collaboration.

Share Activity

Use Case: Share Activity.

Commune/Network (Seek Connections)

Use Case: Commune/Network (Seek Connections).

Purchase Answer/Assistance from Expert

Use Case: Purchase Answer/Assistance from Expert.

Enter Answer for Compensation

Use Case: Enter Answer for Compensation.

Enter Assistance Shout-out

Use Case: Enter Assistance Shout-out.

Submit Local Votes

Use Case: Submit Local Votes—Submit a specific set of votes and new txo information to the CMMDB.

Organizations may work on their local systems with no intention of disclosing all of their work to others, until they have decided to make contributions by publishing their locally collected data and interactions. The content to be published by a license holder is limited to what they have opted-in to publish. This content is called 'votes' because it is data that must be considered along side what other users have entered. This process allows the licensed private user to make single submissions or bundles of submissions to the central data store ontology, and to have the information they have entered merged appropriately into the CMMDB to be shared by others, under access constraints where necessary and as provided in their options settings and license.

This process also encompasses the local construction of information that will be added to the central data store in bulk or on a scheduled basis. The nature of information that may be added include but are not limited to: data sets of changes; new ttxs; new trxrts and other txos; new dxos; catalogs of products; or study project results. Some results should be retained as a unit, viewed for consistency or added cohesively.

Submit Private Data to CMMDB

Use Case: Submit Private Data to CMMDB—Submit information to the central system either for sale or for public use, including, but not limited to: descriptions, tours, filters, personalities, mannerisms, decorations, graphical representations, dxo, fxxt specifications, data sets, export scripts, import scripts, etc.

In one embodiment, the user may assign a consignment price for each item.

Educate

Watch Shared Activities

Use Case: Watch Shared Activities.

Incentivize

Define Announcement

Use Case: Define Announcement.

Place Announcement

Use Case: Place Announcement.

Define Prize

Use Case: Define Prize.

Place Prize

Use Case: Place Prize.

Earn Prize

Use Case: Earn Prize.

Obtain Information

Use Case: Obtain Information—Obtain information from the system.

This process may be used in conjunction with other processes such as within studies.

Information can be obtained by, including but not limited to: export, visualization viewing, community viewing, report viewing.

Visualization Processes

View the CMMV

Visualization is the method by which the user sees and interacts with the data that is the result of their work with queries. Visualization will occur throughout the entire process of querying and processing data. It is through this interactive and kinetic display of the data that the user will be able to better understand the data the system holds, or to view what they have imported into the CMM. It is through this view that the user will be able to better see what steps need to be taken to obtain a result they need and what steps need to be taken to further clarify it.

Visualizations will include tables, lists, hierarchical lists (trees/taxonomies), co-citation, cluster, collocations (collocate the various manifestations of a work or all the works by a given author, or to find all the works under a given ttx), and map displays.

The data navigation will be provided by presenting at a glance visual hierarchical relationships within the information searched using technology supporting smooth blending between focus and content as well as continuous redirection of focus (to search results). The user will be provided with hierarchal ttx map that would display a variety of ttxs relative to the user's ttx search. These ttxs are ranked with respect to the relevance of the ttx searched, where higher relevance ttxs are displayed with highlighting.

CMM data is converted to a hierarchy for display.

Descendant and Ascendant Map Dualities

The utility of providing Descendant and Ascendant Map Dualities is they allow co-location and impulse retrieval in two directions at once. As a user navigates to a sub-category on one map or display, that they may also see a 'look-back' map not of where they have come from, but what is behind them on the descending traversal. For a descendant map, the associated ascendant map will be this look back map, and will include the descendant route as well as the set of other descendant routes to the category from other encompassing categories.

View Map of Ttxs and/or Dxos in Cluster, Sphere or other Categorical Display

Use Case: View Map of Ttxs and/or Dxos in Cluster, Sphere or other Categorical Display—Use maps that allow for interaction with and within ttxs, giving the ability to a user to dig into a ttx deeply and quickly.

The utility of this process is that it displays data with relationships in views where the ttxs in a category are shown with their inter-relationships and the strength of the inter-relationships are shown by co-location (closeness). In one embodiment, the hierarchical nature of the ttxs may diminish in importance to improve information hiding by reducing levels. Map views provide the following functionality, including, but not limited to:

- Marquees and lassos for selecting objects and subsets;
- Indicating and drilling down into a ttx uncovers hidden information;
- Dynamic reorientation of the map, with the ability to preserve or replace previous map views;
- The ability to set the levels of relationships to be displayed, and to navigate to ttxs that aren't displayed;
- The ability to display results on a timeline, where time is a relevant variable, or by some other fxxt;
- Mouse over effects, including custom dwell labels and relationship information visualization Co-location visualization of categories or clusters provides the utility that ttxs having, for example, semantically similar descriptions, the same name for the author or the same for the name of the owner, etc. will appear nearby each other on the display.

The user will gain great query speed by performing a query at one level and getting a large number of results at sub-levels of the results at the level queried. The user will understand more content as visualized because they will repeatedly see only relatively minor differences to the same map, and this will promote better comparative retention of the user's mental map against the CMM. The map will be easier to draw, and the user will be able to navigate on a single basis throughout the map.

View List of Ttxs and/or Dxos in Tree, or Tabular Display

Specifically, the objective of this process is to use lists to view categorizations of ttxs, giving the ability to a user to dig into a topic deeply and quickly. Lists, in one embodiment, communicate the ttxs deeply inside of a category by hierarchical expansion. In one embodiment, lists are interactive representations of taxonomies of ttxs, selection sets, result sets, and/or other system objects. Interacting with lists can produce new selection sets and result sets. Lists will be fully interactive with the Result Set Management, Query, and Analytic components in order to invoke further operations.

In one embodiment, CMM ttx data may be displayed in a tabular interface with functionality including, but not limited to:

- The ability to sort, delete, highlight, find, customize font, group, save, etc. based on the fields selected in the import tool;
- The ability to select and change the fields displayed in the tabular interface;
- The ability to Expand branches of the Taxonomy that are contracted, and to contract branches that are expanded.

This utility of the visualization display system is that it can act as a search aid by providing a set of controlled terms that can be browsed via a set of hypertext representations. This system will provide this by the display of related ttxs—siblings or dxos that are related as shown by inclusion within the same parent (in the same container) or proximity on the map.

Additional utility stems from making it easy to understand the CMM to reduce the cost to a user of obtaining information and in reducing the cost to a user of collaborating in improving the quality and scope of the data in the.

Control Visualization

Specify/Invoke Visualization

Use Case: Specify/Invoke Visualization—Display visualizations in appropriate containers, e.g. window views or applets.

Once the visualization space is defined, there are several operations that the user can perform, including but not limited to:

Lookup. Find ttx display objects, see inside, and view their descriptions.

Compare Immediately see related but differentiated ttxs even though often, two ttxs located near each other would not be listed together in a conventional indexing scheme because indexing schemes tend to emphasize only a small number of dimensional attributes, such as a conventional and backward-looking market category, while ignoring other dimensions.

Concretize. Go to an empty space on the map and create and then describe a sphere representing a ttx.

Display Alternative Visualization

Use Case: Display Alternative Visualization—Change to view a different visualization In one embodiment, the process of displaying the newest ideas in a web page, showing on a related visualization the idea in context and allowing a user to navigate the visualization In one embodiment, the process of displaying the hottest areas for new ideas in a web page, showing on a related visualization the area in context and allowing a user to navigate the visualization.

In one embodiment, the process of displaying the hottest areas for new investment in a web page, showing on a related visualization the area in context and allowing a user to navigate the visualization.

Change Fxxt

Use Case: Change Fxxt—Change which fxxt is being shown on a visualization display.

In one embodiment, the user selects another named fxxt for the display, and the display reloads the same form of visualization into the display window and positions it at the dxo nearest to the dxo being displayed most prominently in the prior fxxt.

Change Visualization Type

Use Case: Change Visualization Type—Within a visualization pane, change the visualization method but retain the same focus, viewpoint, window size, contents, selections, indications, etc.

Set Graphical View

Use Case: Set Graphical View—Change how data objects are displayed without changing the underlying data.

View Visualization Properties

Use Case: View Visualization Properties—Open visualization properties window in a view.

The utility of the interface includes that it facilitates exploration and discovery of novel relationships in the data and provide various interfaces for graphically manipulating result sets using specialized entity and relationship display techniques that convey information appropriate to the nature of the data.

A utility of visualizations is that they allows users to gain insight into the broad context of the information base while reducing confusion caused by less important data.

Name Visualization

A specific visualization configuration may be named and saved. The configuration would include:

the current filtering specification;
the current focus and viewpoint (camera) angle;
the current graphics parameters for the display;
the current indicated elements;
the current result set; and
the current selection set.

Additional Visualization Control Tasks

In one embodiment, the user would be able to perform additional visualization control tasks, including, but not limited to:

Set starting position
Alter Display or Visualization Mode
Change perspective
Save Position (View Point)
Save Tour
Change ‘Look’ to another ‘skin’
Change Contents to Show Sharing Dxo or other objects Visualization Description Process In one embodiment, the user would be able to perform additional visualization description tasks, including, but not limited to:

Identify Visualization
Describe Visualization
Reporting about Visualization
Compare/recognize Visualization
Contrast Visualization against another
Discriminate
Delimit
Verify
Generalize Visualization Navigation Process Navigate Visualization Use Case: Navigate Visualization.

Incrementally Explore

Use Case: Incrementally Explore—Once the user selects their ttx of interest the map is displayed with some more details relating to the ttx that the user was searching about.

The user can select the most relevant ttx by clicking their mouse or the link that they are most interested in, or browse through other ttxs (links) available to look for further available options for search. The user can go deeper and deeper into the hierarchy until they reach the exact result/information they are looking for relating to the ttx searched.

Scan Topics without Specific Plan

Use Case: Scan Topics without Specific Plan.

Explore By Flying

Use Case: Explore By Flying.

Show or Hide Sub-Tree

Use Case: Show or Hide Sub-Tree—Expand and hide information about children of a displayed object.

Specify/Invoke Lookup Query

Use Case: Specify/Invoke Lookup Query—Specify and then invoke execution of a query outside of a goal.

Jump to Lookup Result

Use Case: Jump to Lookup Result.

Additional Visualization Navigation Tasks

Use Case: Visualization Navigation Tasks.

In one embodiment, the user would be able to perform additional visualization navigation/map reading tasks as well as taxonomy reading tasks, including, but not limited to:

Identify own position
Orient map
Traverse forward
Traverse backward
Descend
Ascend
Zoom in
Zoom out
Search
Find
Search for destination
Search for optimal route
Search for landmarks, markers, or placeholders
Navigate to landmark, marker, or placeholder
Recognize landmarks
Recognize destination
Verify location
Indicate a marker or placeholder
Change to dual map (ascendant to descendant, etc.)
Take hyperlink dxo to other view
Measurement Tasks
Interpolate importance from proximity Estimate measurements Re-fly Tour Use Case: Re-fly Tour.

Applying User Changes Locally—User Change Application

User Change Application operations only affect the presence or look of the data displayed by the user, not the data stored in the CMMDB. When a user makes a change, the visualization must conform to his view of the CMM, at least in so far as the user is paying for such responsiveness by the system. As a user builds up a large number of changes, significant local processing may be required to apply the changes.

User Change Application may alter the positioning of CMM objects in the visualization, only their presence, appearance, and behaviors.

Apply User Changes

Use Case: Apply DXO Changes for positioning, naming, or appearance—Change positioning, naming, or appearance of dxos based upon changes made by user.

User Changes Affecting Fxxt Analysis

Where a user has made a change that, for that user, a fxxt must be reanalyzed, the execution of fxxt analysis will occur prior to visualization for the fxxt being visualized, and will encompass all such user changes for that user.

User Changes Not Affecting Fxxt Analysis

Where a user has made a change that, for that user, whether or not a fxxt was reanalyzed, the execution of visualization development will occur prior to visualization for the fxxt being visualized, and will encompass all user changes for that user.

Filtering of Visualizations—Filter Control

Visualizations may be filtered. The following tasks describe the processes involved in applying filters. The purpose of these processes is to apply, request, or invoke filters and provide parameter values for the operation of the filters.

Control Dynamic View-filtering

The system will provide dynamic view-filtering which will allow a user to change 1) how dxos are displayed, and 2) which dxos are displayed.

These filters will be applied to the dxos late in the visualization stage, acting after the extraction of object information from the ontology and after the calculation of positioning of the dxos. Filters do not alter the positioning of CMM objects in the visualization, only their presence, appearance, and behaviors.

Set Information Hiding Parameters—Filtering for Information Hiding

Use Case: Set Information Hiding Parameters—Filtering for Information Hiding—Set a cut-off value for various parameters to limit visualized data.

Aside from selection, indication, and result set display control, the user may apply additional information hiding facilities. Filtering is available to eliminate from the display all elements that are not selected by a limiting filter specification. Among the several methods available, the main filter methods for information hiding are:

- Act on relationships, dxos, result sets and database values to dynamically limit a display according to certain parameters.
- Act on information resource result sets with include percentage relationship filters and relationship depth-of-display settings.
- Act by scopx and infxtypx of relationships, generality, user identity or type, date of relationship, or metrics on relationships can be used, among others.

Change Filtering and Adjust Data Displayed

Use Case: Change Filtering and Adjust Data Displayed.

Filter by Data Value

Use Case: Filter by Data Value—Filter based upon the value of an attribute of the dxo, including attributes whose values are set by calculation.

Calculations may either be made at server (often by analytics) or at client.

Apply Display Filters

Use Case: Apply Display Filters—Apply the effect requested by the display filter specification set by the user immediately on a visualization, and/or as the specification is changed.

Use Navigation Filter

Use Case: Use Navigation Filter.

Use Interest Filter

Use Case: Use Interest Filter.

Filter Visualization by Area of Consideration

Use Case: Filter Visualization by Area of Consideration.

Filter Visualization by Area of Interest

Use Case: Filter Visualization by Area of Interest.

Specify Extraction Filtering

Use Case: Specify Extraction Filtering—Request that only certain data be retrieved from the CMMDB during the clump extraction phase at the server.

The system will provide for changing the type of data retrieved for display (visualization, export, or reporting) with regard to one or more of:

1) the set of types of dxos (which type of dxos);
2) the relationships used for calculating the positioning of the dxos;
3) the depth of categorization of dxos;
4) other parameter effects.

These filters only affect the data obtained in extract sets from the CMMDB.

Request Extraction Filtering

Use Case: Request Extraction Filtering—Request and parameterize the application of extraction filters.

In one embodiment, extractions are not accomplished at the client level. The server provides extraction filtering.

Apply Priority and Marking Filters

Use Case: Apply Priority and Marking Filters—Apply marking filters for dxos to highlight importance or priority or other status utilizing shape enhancement, colors, fonts, shading, modified dimensions, etc.

Request Reorder Filter

Use Case: Request Reorder Filter—Force the sort order of the visualized data for certain visualizations.

Request Filtering by Analytics

Use Case: Request Filtering by Analytics—Request that an analytic be invoked on a fxxt of the CMMDB and to produce a new set of maps for the fxxt.

Display Active Filtering

Use Case: Display Active Filtering—View the status of display specifications for various dxos.

Request Advertising Filtering

Use Case: Request Advertising Filtering—Purchase a license for restricted advertising on visualizations and reports, and to remove restrictions on exports of data.

This process will be useful only if a user subscribes properly. This process invokes e-commerce processes.

Request Filtering Plug-ins

Use Case: Request Filtering Plug-ins—Obtain new plug-ins and data for filtering.

This process invokes e-commerce processes.

Selection Set Management

Selection sets may be manipulated manually or by keyboard/mouse actions.

Create Selection Set

Use Case: Create Selection Set—Create a selection set manually

Creating an empty selection set is useful for managing specialized sets of dxos.

Name Selection Set

Use Case: Name Selection Set—Associate a name with the Selection Set.

This does not cause the selection set to become a result set or to represent any new object.

The utility of this is that the name may be used as a reference to apply the selection set in another window or to save it, The utility of selection set Multi-Windowing is that it provides the ability to display one selection set in two or more juxtaposed and different visual representations, and to focus to any one data point on all visual representations simultaneously. The ability to seamlessly toggle between visualization types on the same selection set.

Save and restore a selection set

Use Case: Save and restore a selection set—Save a selection set and to restore the selection set on a display.

The system provides a Selection Set Admin panel in order ease the hassle involved in using selection sets. This panel displays all the names of selection sets the user has saved and named. To save a selection set, a name input field and save button will be available on the panel.

To apply a selection set, the user finds the set name of interest in the selection set list and clicks on it. At this time the display will re-select the locate the dxos, without changing the focus of the view.

Selection Set Manipulation

Use Case: Selection Set Manipulation—Manipulate selection set of objects.

A user is also provided the ability to add the selection set to the selection set of objects already selected on the view, combining the two selection sets (union). Other selection set combining techniques include but are not limited to: intersection, exclusive or, subtraction.

Selection sets can be applied to create Areas of Consideration or Interest. In these cases, the application of the selection set is implemented through the copying or conversion of the selection set into an Area of Consideration or Interest structure.

Selection sets may be combined with result sets, to yield a result set, in the same way as other result sets. All selection set items are presumed to be marked as 'relevant' in such combinations. Selection sets can be applied in the same way as result sets to: including but not limited to: create cnxpts or goals; to be added to a goal. Selection sets may be added to a cnxpt as category members. Selection sets members may be added to a cnxpt as being affinitively related. In all of these cases, the application of the selection set in this manner is implemented through the copying or conversion of the selection set into a result set.

Selection sets can be created by copying of an Areas of Consideration or Interest into the selection set structure, but this is likely less efficient for the user than conversion of the Area into a result set and using the result set.

Swap Selection Set

Use Case: Swap Selection Set—Display an alternate selection set, optionally saving current selection set.

Save Selection Set

Use Case: Save Selection Set—Save a selection set.

Delete Selection Set

Use Case: Delete Selection Set—Delete a selection set.

Change Selection Set

Use Case: Change Selection Set—Change which selection set is being shown on a visualization display.

The user selects another named selection set for the display.

Select Additional Displayed Object

Use Case: Select Additional Dxo or Deselect Dxo—Add an additional displayed object into a selection set.

Change the info-items in a selection set either by adding additional dxos into the selected set or by deleting dxos from the selection set. The user may use any one of several procedures to add new info-items to the selection set, including, but not limited to:

Select/Deselect Group of Ttxs, Tcepts, Appcepts on List

Select/Deselect Group of Ttxs, Tcepts, Appcepts on Map

Select/Deselect Specific Ttx, Tcept or Appcept on List

Select/Deselect Specific Ttx, Tcept or Appcept on Map.

Add in or Remove Result Set Dxos from Selection Set

Use Case: Select Additional Dxos From Result Sets—Add additional displayed object into a selection set by adding those in a Result Set.

Use Case: Deselect Dxos From Result Sets—Remove info-items from a selection set by deleting dxos listed in a Result Set from the selection set.

Add Area of Consideration to Selection Set

Use Case: Add Area of Consideration to Selection Set—Add additional objects from an Area of Consideration into a selection set.

Subtract Areas of Consideration from Selection Set

Use Case: Subtract Areas of Consideration from Selection Set—Remove info-items from a selection set by deleting dxos listed in an Area of Consideration from the selection set.

Focus on Information

Compare Areas of Consideration

Use Case: Compare Areas of Consideration.

Alter Information Through Visualization

Indicate a Dxo for an Action

Use Case: Indicate a Dxo for an Action—Indicate a displayed object to be the subject for a user's action.

This object becomes known as the Indicated Object. It is not necessarily a part of a selection set. An action list applicable to the Indicated Object is called a 'contextual command list'.

Refine By Indication

Use Case: Refine By Indication—Navigate to a sphere and change (wild) the definition; navigate to different locations on two displays and add a relationship between spheres or move a sphere to a new space; or build result sets of relevant hits for a query and thus refine the ttx of the result set.

View Dxo Properties

Use Case: View Dxo Properties—Open dxo properties window in a view.

Select by Click and Drag

Use Case: Selection by Click and Drag—Select a subset of dxos on a visualization (map, list, or other) by clicking and dragging a marquee to surround them.

Only the visible items surrounded will be selected. It is possible that this operation may not be suitable to some visualizations.

Refine Positioning of Ttx

Use Case: Refine Positioning of Ttx.

Socialize

Use Case: Socialize—Show interest about the ttx by joining into the conversation regarding it or pledging effort on/resources toward it.

Show Web Page

Use Case: Show Web Page—Show a page that is an information resource located by a URL and represented by a dxo.

If a user clicks appropriately on a web page dxo, the page opens in a browser (editor) view that also provides for relevance assessment. By indicating the dxo the user is able to enter a relevance assessment or other information.

Show Information Resource

Use Case: Show Information Resource—Show an information resource.

If a user clicks appropriately on an information resource display object, the information resource opens in a browser (or editor) view that also provides for relevance assessment. By indicating the display object the user is also entering a relevance assessment and may also enter other information.

Open Information Resource into Editor

Use Case: Open Information Resource into Editor—Invoke an external program into an editor window so that an information resource can be displayed or edited in a familiar way with the native editor.

Additional Visualization Indication and Action Tasks

In one embodiment, the user would be able to perform additional tasks for acting on Dxos or Relationships, including, but not limited to:

- Indicate a Relationship for Action
- Act on Dxos that are Indicated or Selected
- Act on Relationships that are Indicated or Selected
- Add Dxos at Specific Locations on Visualization
- Add Dxos without Specifying Location
- Add, Change or Request Delete of Relationships
- Copy, Paste, Drag, Drop Dxos
- Delete Dxos
- Enter Queries within a Dxo, stating that the context of the Dxo is relevant.

Additional Utilization Tasks on Visualization Information

Use Case: Utilize Visualization Information—Perform editing of visualization or use the visualized information.

In one embodiment, the user would be able to perform additional tasks for utilizing visualization information, including, but not limited to:

- Recycle information: Move, Edit, Cut, Copy, Paste, link, group (associate actor to use case element).
- Toggle between windows, screens
- Information taxonomy and hierarchy in each classification—Filtering
- Payment Mechanism: connection to credit card companies, banks, other financial institutions.
- Enhance model: Formatting—Resize, Reshape, Zoom
- Preview info within different categories and subcategories at different levels with use of 'compartment visibility control'
- Observe patterns: Grouping
- Prioritize information: Enhance shapes, colors, fonts, adding dimensions etc.
- Information flow monitor and management system: Database memory organization (to direct information inflow and outflow), filters, firewall,
- Quality of information
  - Quantity of information
  - Rate of information flow: Wave like demand flow: fast/slow (rate) . . .
  - Pattern of information flow: continuous/exponential/wavy in bulks
  - Information inflow versus outflow access to end users
- Internet connectivity
- Saving changes made automatically at regular intervals
- Q&A section
- Helpdesk, Contact us info (automatically opening email when clicked on with email address pre-typed).
- History information (about the info researched earlier on the user side locally)
- Ranking:
  - popularity ttxs
  - Sensitivity issue (security, privacy, legal)
  - Etc.
- Navigation options—arrows, shortcut keys→pilot
- Alerts: News, Subscription to particular ttxs of interest
- Advertisement section Finding, Searching, Query and Retrieval Process The purpose, in one embodiment of searching is to find one ttx or a set of ttxs, or to determine that no ttx has been entered matching the criteria.

In one embodiment, these search frameworks, processes, and facilities are applicable to tpxs and txos. (While a tpx may be the object of a search as well, here we discuss searching for ttxs because the same framework may be applied to tpx as an option setting by the user. All CMM txo info-items may be searched using this framework, so that in the following, where the term 'ttx' is used, the term tpx could be used and where the term 'cnxpt' is used, the term txo could be used.)

Cnxpts representing the ttxs are the actual result returned as they are the stored object known that describes the ttx. Likewise, where tpxs are sought, txos are the result. Specialized txos are also the result returned where the sought after information includes but is not limited to: information resources; purlieus; cncpttrrts; information related to dxos; and scopx, fxxt, and typing information.

Search and Query Contexts

In one embodiment, searching across many search engine systems will be provided. For example, many organizations have built information retrieval systems to permit users to obtain documents published by that organization. In one embodiment, a search system that can index and catalogue information stored in many different formats on different websites, permitting users to perform a search through a single web portal, is provided. The ability to penetrate the content of some sites by more sophisticated searching techniques such as DeepWeb and/or by use of an account while at the same time searching other simpler engines greatly speeds the overall search effort.

In one embodiment, there are various distinct forms of searching in, including, but not limited to: the CMMDB, in external data stores, on the internet, in an editor pane, on the visualization display, etc. This provides a range of customizable query options that is broad and flexible enough to allow users to produce query results that are useful and accurate.

The info-items involved in searching and querying are, including but not limited to: search txos, query txos, goals, result sets, selection sets, Areas of Consideration, Areas of Interest, selection set items, and rsxitems.

Impulse Retrieval Procedure

Use Case: Impulse Retrieval Procedure—Wander around the data in the CMMV and to serendipitously find ttxs of interest.

The change from navigation to a recognition of interest and an indication of a dxo on the visualization is the point at which the process is completed.

This facility allows users to find something of interest without finding, searching, or querying or after finding, searching, or querying narrows their search. This procedure may be begun at any point in the navigation of the visualization. The utility of this is that it provides users with the ability to retrieve ttxs as they see them.

In combination with indication and goal placement, impulse retrieval adds to the users' ability to refine a search for a ttx by adding relevant information as criteria for the goal.

Lookup—Simple Finding—Focus to a Specific Dxo

The purpose of Finding is to locate one or more Dxos in a visualization or listing, or in multiple visualizations or listings, or rsxitems in a result set the user is viewing. The number of dxos that may be on a display at a specific time may be quite large. Locating a specific dxo is tedious without a tool to do so.

In one embodiment, when finding, the user is seeking to find an existing dxo having a specific name or name variant. In one embodiment, when finding, the user is additionally seeking to find an existing dxo having a specific string in a description or description variant. In one embodiment, when finding, the user is additionally seeking to find an existing dxo having a specific string in an associated trxrt.

In one embodiment, the user uses the Focus Selection panel in order speed-up the search. This panel displays all the names of dxos in the current display that contain the string that a user enters into the panel input field. In one embodiment, this panel additionally displays all the names of dxos in the current display whose descriptions contain the string that a user enters into the panel input field. In one embodiment, this panel additionally displays all the names of dxos in the current display which have an associated trxrt that contains the string that a user enters into the panel input field.

In one embodiment, the user uses the Focus Selection Tree View panel to speed-up the search. This panel displays a table of contents in the form of a tree visualization or a 3D tree visualization containing all the names of dxos in the current display that contain the string that a user enters into the panel input field. In one embodiment, a Focus Selection Tree View panel may contain two columns, one containing description terms and one containing the associated dxo names. In one embodiment, a Focus Selection Tree View panel may contain two columns, one containing cncpttrrt terms and one containing the associated dxo names. Other visualizations usable in the Focus Selection Tree View panel include self-organizing graphs of nodes or hierarchical constructs.

To locate a specific dxo, the user begins typing a string to fill the list of names (or terms). When the number of names (or terms) is short enough, the user finds the dxo of interest in the list and clicks on it.

At this time the display will locate the dxo and automatically scroll the window (or move the viewpoint) to bring that dxo into focus.

In combination with indication and goal placement, finding adds to the users' ability to refine a search for a ttx by adding relevant information as criteria for the goal.

Find

Finding is valuable for finding data INSIDE the visualization or list being viewed.

The objective of the Find procedure is, in one embodiment, to search for a string of characters to navigate to and to show the next instance of the string in the view or the data behind the view that a user is 'finding' in. The dxo containing the next instance of the find string is brought into focus (viewpoint is moved) and indicated.

A Find consists of entering a (wild-carded) 'find' string to find each match (the next instance) of a combination of any characters, including uppercase and lowercase characters, whole words, or parts of words, or regular expression, in the dxo names, titles, descriptions, cncpttrrts or connected information within a CMMV view. Find acts like the typical 'find next' command because the next instance found is the next FROM the current context, and wrapping is optional. Find First will take a user all the way to the 'top' of the context, and that is not usually well understood by the user until they become familiar with the tool.

Find may be used to populate the Focus Selection panels.

Use Case: Specify/Invoke Find—Specify and then invoke execution of a Find lookup to adjust positioning of the visualization to the first item containing the string sought.

Use Case: Specify/Invoke Find Again—Specify and then invoke execution of a Find Again lookup to adjust positioning of the visualization to the next item containing the string sought.

FindAll

The objective of the FindAll procedure is, in one embodiment, to use an entered (wild-carded) 'find' string to find all matches of a combination of any characters, including uppercase and lowercase characters, whole words, or parts of words, or regular expression, in the dxo names, titles, or connected information within a CMMV view. In a single object, all of the found strings will be highlighted. In a list or visualization, all of the items containing the string will be selected and become members of the selection set.

FindAll may be used to populate the Focus Selection panels.

Use Case: Specify/Invoke FindAll—Specify and then invoke execution of a FindAll lookup to adjust positioning of the visualization and fill the table of contents views on Focus Selection panels.

FindIntoView Procedure

The objective of the FindIntoView procedure is, in one embodiment, to use an entered (wild-carded) 'find' string to find each match of a combination of any characters, including uppercase and lowercase characters, whole words, or parts of words, or regular expression, in the dxo names, titles, or connected information within a CMMV view presently holding the focus, and bring it into the view. This is equivalent to increasing the content of the view as needed. The data in the view will be changed to include all dxos containing the find string with the FindIntoView command. To cause less trouble for the user, only a proportionate increase in the number of dxos in the view will be allowed, and the user will be suitably notified that more can be added by repeating the FindIntoView and the total number of dxos that would be found.

FindIntoView may be used to populate the Focus Selection panels.

Use Case: Specify/Invoke FindIntoView—Specify and then invoke execution of a FindIntoView lookup to adjust positioning of the visualization and fill the table of contents views on Focus Selection panels.

Result Set Find

The objective of the Result Set Find procedure is to use a result set as a basis for a FindAll command to find info-items listed in the result set on the current visualization, if they are on the visualization Visualizations display one or more specific info-item types. This command provides the utility to choose from dynamic searching options to populate a result set that is then used to focus a visualization Finding is additionally controlled through the use of parameters.

In one embodiment, where a result set contains rsxitems other than the info-items shown in the visualization, the info-items in the visualization which are related to the rsxitems by occurrence relationships will also be 'found'.

Use Case: Specify/Invoke ResultSetFindAll—Specify and then invoke execution of a ResultSetFindAll lookup to adjust positioning of the visualization and fill the table of contents views on Focus Selection panels based upon a result set.

Create a FindAll execution script and execute it, creating a result set. [See Procedure—CREATE FindAll Search] [See Procedure—EXECUTE FindAll Search and Attach Result Set to Goal]

Term Find on Info-item Names, Descriptions

Use Case: Term Find on Info-item Names, Descriptions.

Narrow Area of Consideration to Area of Interest

Use Case: Narrow Area of Consideration to Area of Interest—Cull the dxos, ttxs, or txos in an area to form an Area of Interest.

In combination with indication, finding and result set culling add to the users' ability to refine by culling a set of retrieved dxos, ttxs, or txos.

Searching

A searching operation yields, in one embodiment, a single level of retrieval results in a result set. The result set, whenever possible and depending upon the search command, is used to focus a current visualization, to create a new selection set of dxos on the view presently holding the focus, to create a new visualization or list, and/or to fill a table of contents view on Focus Selection panels.

Searching is valuable for finding data INSIDE the CMM, hidden in any number of fields. All of the data in the system is structured, but some of the data is information resource locator (hyperlink) information referencing data outside the system. The result of the search depends upon the search procedure and parameters used.

In one embodiment, with proper parameters set, the search will encompass those external information resources for which information resource locators are in the CMM.

Visualizations display one or more specific info-item types. When a search is performed that is to result (by parameters specified or by visualization definition) in a certain set of info-item types in the visualization, info-items of other types listed in the result set of the search as rsxitems are not displayed in the visualization.

In one embodiment, the search will result in a new selection set of dxos on the visualization view presently holding the focus. If this is inappropriate because of the nature of data retrieved due to the parameters, then a new view with the proper format and procedures will be opened to display the data found. The system will always attempt to form a selection set of cnxpts and display it as a default process.

In combination with indication and goal placement, searching adds to the users' ability to refine a search for a ttx by adding relevant information as criteria for the goal.

Where the search may result in a cnxpt, or may result in information useful as relevant to a new cnxpt, searching may generate a temporary goal that may later become a new cnxpt in the CMM. For example, a search for traits may result in a list of rsxitems which could be relevant to describe a new cnxpt, and in one embodiment, the system would suggest that the search and results be used for a goal by creating the goal and attaching the search and results by internal relationships. In one embodiment, the user would be required to request that the goal be created.

Search for Interesting Ttxs

Use Case: Search for Interesting Ttxs—See ttxs represented by cnxpts that a user wishes to know about.

Searching directly for a cnxpt involves standard name or subject searching, or associative searching by visualization, covered below.

Searching indirectly for a cnxpt involves searching of attached information and involves result set searching by, including, but not limited to the following types.

Search for Interesting Tpxs

Use Case: Search for Interesting Tpxs—See tpxs represented by txos that a user wishes to know about, including infrastructure tpxs.

Search for Interesting Cncpttrrts

Use Case: Search for Interesting Cncpttrrts—See cncpttrrts represented by trxrts that a user wishes to know about.

Search for Interesting Purlieus

Use Case: Search for Interesting Purlieus—See purlieus represented by purxpts that a user wishes to know about.

Search for Interesting Keywords

Use Case: Search for Interesting Keywords—See Keywords represented by kwxs that a user wishes to know about.

Word Search Procedure

The objective of the Word Search procedure is, in one embodiment, to use an entered 'word search' command to find data INSIDE the CMM matching the command criteria.

The process a user takes to find a set of words is: the user enters any number of search words, each separated by a space character or otherwise following the search syntax, and then presses the 'SEARCH' button. In one embodiment, the system will search its entire CMM in user visible data fields. In one embodiment, alternative search locations are available.

In one embodiment, with proper parameters set, the search will encompass those external information resources for which information resource locators are in the CMM.

The utility of searching is that it allows for a wealth of search structures, including, but not limited to Boolean word search, advanced searches involving attribute names, unstructured database searches, structured data searches, returning collateral information resources, re-utilizing internal information resources, topic map searching, and combinations thereof.

Term Search on Info-item Names, Descriptions

Use Case: Term Search on Info-item Names, Descriptions—Search specific user accessible and viewable CMM info-items that contain a phrase a user wishes to know about.

Search for Phrase Anywhere

Use Case: Search for Phrase Anywhere—Search all user accessible and viewable CMM info-items that contain a phrase a user wishes to know about.

Result Set Search

The objective of the Result Set Search procedure is to use a result set as a basis for a Search command to locate in the CMM those info-items that are listed in the result set. This command provides the utility to choose from dynamic searching options to populate a result set that is then used to populate a visualization or a second, new result set with related info-items not necessarily in the original result set. Searching is additionally controlled through the use of parameters.

Visualizations display one or more specific info-item types. When a search is performed that is to result (by parameters specified or by visualization definition) in a certain set of info-item types in the visualization, info-items of other types listed in the original result set as rsxitems are not displayed in the visualization In one embodiment, where a result set contains rsxitem info-items of types (e.g. patent information resources) not appropriate to the visualization (by parameters specified or by visualization definition) other than the info-items sought in the search (e.g. tcepts), the info-items (the tcepts) in the CMM which are related to the rsxitems (the patent information resources) by occurrence relationships will be added into a new result set along with all of the rsxitems in the original result set of the proper type as sought (other tcepts). This new result set would be used as the basis for the visualization Otherwise the original result set would be used as the basis for the visualization.

In one embodiment, one result set may be used to find relevant information of a different type. As an example, a result set of traits may be used to find all ttxs with that precise set of traits as occurrences.

In one embodiment, one result set containing a mixture of info-item types may be used to find a specific info-item type. As an example, a result set of traits, purlieus, and patents may be used to find all ttxs with that precise set of traits, purlieus, and patents as occurrences.

In one embodiment, one result set containing a mixture of info-item types may be used to find a specific info-item type based upon a specific fuzziness. As an example, a result set of traits, purlieus, and patents may be used to find all ttxs with that precise set of traits, purlieus, and patents as occurrences, but only where those occurrences carry weights above a certain value. In one embodiment, a fxxt may be specified as well. In one embodiment, a scopx may be specified as well.

Result set search adds to the users' ability to refine a search for a ttx by adding relevant information as criteria for the goal.

Use Case: Specify/Invoke Result Set Search—Specify and then invoke execution of a ResultSetSearch to build a visualization and fill the table of contents views on Focus Selection panels based upon a result set.

Querying

The objective of query procedures are to locate information INSIDE and OUTSIDE the CMM conforming to a parameterized specification command, to retrieve that information, to determine the relevance of the information, and to make it available to users. Where the query may result in a cnxpt, or may result in information useful as relevant to a new cnxpt, querying may generate a temporary goal that may later become a new cnxpt in the CMM. For example, a query for traits may result in a list of rsxitems which could be relevant to describe a new cnxpt, and in one embodiment, the system would suggest that the query and results be used for a goal by creating the goal and attaching the query and results by internal relationships. In one embodiment, the user would be required to request that the goal be created.

Cut-Off Values for Querying

In one embodiment, a user may specify cut-off values for any field in the query. In one embodiment, if a member of a result set is present only in quantities below the cut-off, then it will be considered to be in an 'others' category and, for relationship creation, its weight should be added to the "others" category score.

Query Control

Create Query

Use Case: Create and Define a Query—Begin a query without regard to the visualization.

This process begins a new query script. The utility of this is the obtaining of a result set of data of interest, and possibly of a wide variety in terms of type. The new query script is then presented to the user for editing. [See Procedure—CREATE Query]

Where the query may result in a cnxpt, this process also generates a temporary goal that may later become a new cnxpt in the CMM. [See Procedure—CREATE Goal] The new query script is then attached, by internal relationship, to the goal. [See Procedure—CREATE Query and Attach to Goal]

Form a Goal by Applying a Query to Find a Ttx

Use Case: Form a Goal by Applying a Query to Find a Ttx—Connect the description as given by the results of a query to a goal for a ttx that the user believes is new and has not found.

This process generates a goal that may later become a new cnxpt in the CMMDB. [See Procedure—CREATE Cnxpt] This process then begins a new query script attached, by internal relationship, to the goal, offering it to the user for editing. The new query script is then attached, by internal relationship, to the goal. [See Procedure—CREATE Query and Attach to Cnxpt]

Define Query Script

Use Case: Define Query Script—Enter a query.

Queries may be multiple step procedures combining a number of tactics and a number of query methods. The editor for queries provides the tools for each type of query operation allowed in a step and for step order editing. A user may enter one or more query script steps, and perform result set operations to specify some steps in the query.

In one embodiment, during the process of querying, each query step command within a specific query and each result set culling that the user performs will be recorded by the Query and Result Set Managers into the query. This ensures that the user's work can be saved without altering the original source data. These actions will be combined into an editable query script and query step scripts so that they can be re-run at a later time and receive new rsxitems.

Create a Query Based Upon a Query Script

Use Case: Create a Query Based Upon a Query Script—Begin a query without regard to the visualization, but based upon a previously existing query script.

This process begins by copying a query script into a new query. [See Procedure—CREATE Query]

This process then begins a new query editing process based upon the copied query script, offering it to the user for editing. The utility of this is the obtaining of a result set of data of interest by making relatively small changes to a query script.

Create Query as a New 'Personal' Ttx

Use Case: Create Query as a New 'Personal' Ttx—Connect the description as given by the results of a query to a goal for a ttx that the user does not want to be seen as one of a predefined infxtypx, does not appear in standard fxxts, but that is locatable by being in a scopx.

This process generates a goal that may later become a new cnxpt in the CMMDB but has a special scopx as set by the user, and a special 'personal' infxtypx. [See Procedure—CREATE Goal] This process then begins a new query script attached to the goal, offering it to the user for editing. [See Procedure—CREATE Query and Attach to Goal] The utility of this is that scripts will be created that yield result sets specifically containing objects usable for the user's special purposes.

In one embodiment, when a query is specified for a goal that matches another goal's or cnxpt's query, a query in common affinitive association with a low weight is created between the new goal and the existing goal or cnxpt, marked with the user as creator, and with direction from new goal to existing goal or cnxpt.

Define Query by Meta-search

Use Case: Define Query by Meta-search.

Where a search has occurred, the search and its results may be memorialized by converting it to a query. The selection set created for the search is converted to a result set. [See Procedure—CONVERT search to query]

Define Query by Analytic

Use Case: Define Query by Analytic.

Define Query by Survey

Use Case: Define Query by Survey.

Explain Query

Use Case: Explain Query.

Query for Ttx

Use Case: Query for Ttx—Find relevant information about a ttx from external sources or captured information resources that are not necessarily structured—a collection of point findings rather than an understandable/outlined/grouped result.

This process generates a goal that may later become a new cnxpt in the CMMDB but has a special 'personal-isolated temp' infxtypx. This process then begins a new query script attached to the goal, offering it to the user for editing. The utility of this is that scripts will be created that yield result sets specifically containing objects usable for the user's special purposes in a streamlined process not positioning, at that time, the goal on a visualization, but still using the same system functions and gaining user knowledge for reuse.

In one embodiment, when a query is specified for a goal that matches another goal's or cnxpt's query, a query in common affinitive association with a low weight is created between the new goal and the existing goal or cnxpt, marked with the user as creator, and with direction from new goal to existing goal or cnxpt.

Script Undo

Use Case: Script Undo—Undo Made to a query script by a user, and, in one embodiment, to also roll back the results obtained if the changes made were executed.

Result Undo

Use Case: Result Undo—Undo or roll back the result of a step in a query script so that it appears that the script was not executed past the script step before the step rolled back.

Set New Result Track

Use Case: Set New Result Track—Start a new track for the execution without destroying any of the prior tracks for that script.

During the execution of a query, the results for each step that is executed will be recorded along with the parameter information and step specifications that are the cause of the results obtained. This ensures that the user's work can be saved without altering the original source data. The data reader will store the locations and types of the original data sources, and the Query and Result Set Manager will record the actions of the user on that data. All of this will be saved in a "result track" that will be created by the application locally.

Create Query Script Step

Use Case: Create Query Script Step—Create and store a query command into a script step, and to run the single query command.

The step is initiated by creating a new script, or, for a second or later step in the script, by a simple 'new' command, in one embodiment.

In one embodiment, various methods of specifying the parameters for a step in a query are available. The first is the choosing of values of parameters from a menu: In this method, the system presents a list of parameters and their values from which you can choose. This is the easiest way to pose a query, but it is also the least flexible. Boolean operations on result sets may be specified in this manner.

The second form is a query language. This is the most complex method, but it is also the most powerful. The language is somewhat adapted from other search engines because many of these commands are simply passed through to external systems.

Specialized query commands can also be formed from parameterized requests for invocations of analytics. Each of these should also result in populating a result set.

Finally, a culling facility is usable for reviewing lists of information resource references (or other data) and deleting or ranking the items. Additions to the list may also be made. Result sets consisting of rsxitems internally linked to information resource irxts may be used to access the information resources. As these rsxitems are culled, the system will add a relevance ranking to the rsxitem that references the information resource. Each add, delete, or rank change command is considered a parameterized query step.

Create Analytics Invocation Query Script Step

Use Case: Create Analytics Invocation Query Script Step—Specify an Analytics Invocation query command, and to run the command In one embodiment, the user may invoke analytics as part of the query process, which return newly created result sets (or item lists that can be used as rsxitems) and the result sets may be 'clustered', related to existing cnxpts, or categorized internally and ready for integration by manually attaching a result set root category to a pre-existing cnxpt.

Create Structured Data Query Script Step

Use Case: Create Structured Data Query Script Step—Specify a Structured Data query command, and to run the command.

This provides a range of customizable database query options that is broad and flexible enough to allow users to produce query results that are useful and accurate.

Create Unstructured Data Query Script Step

Use Case: Create Unstructured Data Query Script Step—Specify an Unstructured Data query command, and to run the command.

These queries are generally Meta-searches.

In each case, in one embodiment, metadata of the results will first be captured as entries into a result set. Then the result set will be visualized for the user to select from. The visualization for result set culling may be but is not limited to either a list or a co-citation clustering display.

The utility of the meta-search engine is that it maximizes ease of use and offers a high probability of finding the desired information resources to describe the ttx. The engine, in one embodiment, will rank the rsxitems according to relevance, then according to which search engine or database it was found in. Duplicate hits will be removed from the result set, and the most relevant ones will be sorted to appear at the top of the result set.

Refine Query

Use Case: Refine Query—Visualize, edit, and re-save stored query scripts and the query commands in them, and re-invoke then query, or edit and re-execute a query step of a query (single-step).

Refine Query Step

Use Case: Refine Query Step—Add, edit, or delete a step in the query.

The user selects the method for the step and sets parameter values for the step. After one step is completed, he may enter or refine another. The utility of this is that scripts will be constructed that yield result sets of interest. Each of these scripts is called a Query Script. Scripts may be used in other scripts, and script steps may be cut, copied, or pasted within a script or into another script.

Perform Query Step

Use Case: Perform Query Step—Perform the step of a query script as specified and to obtain the results.

Parameters will be redisplayed in control forms for each step when a script step is run, and can be altered individually by step.

Perform Query Script up to Step

Use Case: Perform Query Script up to Step—Perform the steps of a query script from the beginning as specified and to obtain the results for all steps up to and including the one indicated.

The steps before the one indicated are run in 'silent mode'.

Perform Query Script to Completion

Use Case: Perform Query Script to Completion—Perform the steps of a query script from the step before an edited step (from the last step which was executed and which was not altered by the user) up to and including the last step in the script as specified and to obtain the results.

The steps are run in 'silent mode'.

Perform Query Script

Use Case: Perform Query Script—Perform all steps of a query script as specified and to obtain the results.

The steps are run in 'silent mode'.

Delete Query History and Scripts

Use Case: Delete Query History and Scripts—Delete a query script and its history.

In one embodiment, the history of the queries and their result sets will be stored in the CMMDB. Users will be able to take their project back to any point in history to insert or replace commands that they previously made; thus giving the user the ability to undo, roll back, or roll forward any command that they have made throughout the project. In addition, any manipulations and mappings that the user performs on the data will also be stored through this same device. The utility of this facility is that the user can save their work as a project, come back to it at a later time, and even share their project files with other users.

Request Query Script

Use Case: Request Query Script—Obtain new query scripts from the library.

In one embodiment, not all query scripts are offered with the data (as descriptive information on cnxpts) in the CMMDB. The utility of this process is that new scripts may be obtained by a user or sold by another user. This process invokes e-commerce processes.

The utility of this process is that it allows script commands to be implemented and installed easily.

Request Query Command Plug-in

Use Case: Request Query Command Plug-in—Obtain new query command plug-ins from the library.

Query command plug-ins provide the processing software to carry out a step in a query script. In one embodiment, not all query command plug-ins are offered with the application. The utility of this process is that new query command plug-ins may be obtained by a user or sold by another user. This process invokes e-commerce processes.

An additional utility of this process is that it allows query command plug-ins to be implemented and installed easily.

View Results of Query

Use Case: View Results of Query—See what the results of a query are based upon each step of the query.

Accept Query Results

Use Case: Accept Query Results—Accept the results of a query to complete each step of a goal.

Apply a Query to a Ttx

Use Case: Apply a Query to a Ttx—Connect the description as given by the results of a query to a ttx that is represented by a cnxpt which the user has found in the CMM.

This process then begins a new query script attached to the cnxpt, offering it to the user for editing. The utility of this is that scripts that yield result sets specifically containing objects usable for describing ttxs, such as but not limited to information resources, may be used to refine the definition of a ttx or its status. The user is stating that each relevant rsxitem of the query is relevant to the ttx, and that each irrelevant rsxitem is specifically not relevant. The rsxitems of the query are used to form occurrence (if the result is not a cnxpt) or affinitive associations (if the result is a cnxpt) with the cnxpt. The result set analysis attempts to find existing cnxpts that are similar to clusters of results, or more simply existing cnxpts that have occurrences to the same irxt as is in a result set. Where there is significant matching, the user can believe that the ttx he is searching for is closer to that cntexxt than another. These may cause a repositioning of the cnxpt. See Result Set Evaluation. See Result Set Application.

In one embodiment, when a query is specified for a cnxpt that matches another goal's or cnxpt's query, a query in common affinitive association with a low weight is created between the new cnxpt and the existing goal or cnxpt, marked with the user as creator, and with direction from new cnxpt to existing goal or cnxpt.

Concretize New Ttx by Specifying a Query

Use Case: Concretize New Ttx by Specifying a Query—Make a conjured ttx into a representative cnxpt known by the CMMDB.

As a Goal based query is defined and executed for the first time, upon completion of the search it is used as the basis of a new cnxpt in the CMMDB ontology. The cnxpt represents an idea (ttx) in a user's mind that may or may not be real, and may or may not have been defined previously with other query specifications (not an identical specification). The results of the query are used to form occurrence or affinitive associations with the cnxpt. These may cause a repositioning of the cnxpt. See Result Set Evaluation. See Result Set Application.

In one embodiment, when a query is specified for a cnxpt that matches another goal's or cnxpt's query, a query in common affinitive association with a low weight is created between the new cnxpt and the existing goal or cnxpt, marked with the user as creator, and with direction from new cnxpt to existing goal or cnxpt.

Concretize New Tcept by Specifying a Query

Use Case: Concretize New Tcept by Specifying a Query—Make a conjured tcept into a txpt known by the CMMDB.

As a goal based query is defined and executed for the first time, a user can specify it to result in a new txpt in the CMM if the goal ends up with a unique result. The txpt goal represents an idea for a technology in a user's mind that may or may not be possible or describable, and may or may not have been defined previously with other query specifications or in any other way, and may or may not have been concretized as a cnxpt representing a ttx. See Concretize New Ttx by Specifying a Query.

Use Case: Name a Tcept by Naming Goal—Enter a name for a tcept by entering a name for the Goal.

Further voting may alter the name.

Concretize New Appcept by Specifying a Query

Use Case: Concretize New Appcept by Specifying a Query—Represent a conjured appcept into a axpt known by the CMM.

As a goal based query is defined and executed for the first time, a user can specify it to result in a new axpt in the CMM if the goal ends up with a unique result. The axpt goal represents an idea for an appcept in a user's mind that may or may not be possible or purposeful, and may or may not have been defined previously with other query specifications or in any other way, and may or may not have been concretized as a cnxpt representing a ttx. See Concretize New Ttx by Specifying a Query.

Use Case: Name an Appcept by Naming Goal—Enter a name for an Appcept by entering a name for the Goal.

Further voting may alter the name.

DeepWeb and Database Search Procedure

DeepWeb and database querying finds data matching the parameterized command as submitted to one or more analytics INSIDE or OUTSIDE the CMMDB.

The process a user takes to find DeepWeb and database data is: the user selects an analytic for use, enters any number of properly formatted commands for that analytic, and presses the 'EXECUTE' button.

In one embodiment, the analytic engine will execute the analytic, the analytic will search the databases it is constructed for, and, in one embodiment, the retrieved data will be returned into a custom import file containing some combination of, including, but not limited to: ttx descriptions, ttx characteristics, information resources referenced as occurrences, general (undescribed) and ttx attributal data. The import is then converted and set for review as a result set, a document, or an ad hoc resultant data table for entry into the library.

Where a DeepWeb and database search is used, the import file contents are displayed as result set of ttxs and information resources where the ttxs and information resources may be shown even if they already exist in the CMMDB, where the data retrieved is characteristic data for those ttxs or information resources.

Use Case: Specify/Invoke a DeepWeb Query—Specify a query command for input to an analytic, and invoke the analytic.

Results for an analytic are returned as a result set, a document, or an ad hoc resultant data table.

Associative Search

Use Case: Associative Search—Navigate a visualization to find a ttx by navigating between and into categories until the proper category or the ttx itself is found.

The associative search visualization will display a forest of trees of category cnxpts that enclose other categories as sub-categories or enclose cnxpts representing a ttx. The searching user navigates around and into the categories. Each cnxpt is at a level in a taxonomy. The strength of relationships between cnxpts determines their locations in the visualization Each category cnxpt also represents a cntexxt a new ttx might be added. Associative searching, by itself, does not leave behind a cnxpt stemming from the user's ttx, but the interest shown in an area of cnxpts is highly useful. Also, the user at any time may indicate that his ttx should be at a certain place it is not, and thus concretize it at that spot in that category with that cnxpt as a parent in that fxxt he is navigating in. He may also navigate other fxxt visualizations and place the same ttx under different parents in that visualization of that fxxt.

Without the categorization of associative search, entry of new cnxpts is highly manual.

The strongest indicator of where a ttx belongs is provided when a user moves the goal to become a child of a cnxpt on a visualization of a certain fxxt. To locate that new spot may involve significant navigation.

Automated assistance to find a ttx is provided by queries and searches. These may be used to move a user's context to a different cntexxt. This is accomplished by evaluating a result set and determining based upon the result set where the ttx should be placed in the category if the result set was a sufficient knowledgebase to provide it. The result set is manipulated to find cntexxts where the ttx should be placed, in the order by strength of the cntexxt. The placement is fxxt dependent only if cntexxts involving descendency were found, and then only if the strength of such a cntexxt was higher than those cntexxts not involving descendency. [See Procedure—New Category Generation and Category Relation Generation From Result Set] The strongest result set based placement occurs when the Result Set is attached to a goal as a parent. [See Procedure—ATTACH a Result Set to Goal as PARENTS] Secondary placements occur where the result set is attached as a sibling or children list. [See Procedure—ATTACH a Result Set to Goal as SIBLINGS] [See Procedure—ATTACH a Result Set to Goal as CHILDREN]

While these automated tools assist, they are not perfect, so the user must navigate as well.

In building the CMM, the assistance tools above are used to obtain ttxs from existing information and then to form cnxpts automatically for later use and refinement by users. Without assistance in cataloging, the new cnxpt, categorizing of new cnxpts is highly manual Both Associative search and assistance in cataloging are heavily dependent upon the existence of the categorization structure itself.

Goal Based Searching Process

Goals

The overall purpose of pursuing a goal is to find a preexisting ttx. Additionally, where the goal ttx is not found, the purpose of the goal it to define a ttx. The ttx can inherit from its context, so categorization is very important. The ttx in a user's mind is formed in the CMM by categorizing the goal representing it; by finding relevant information about it due to its similarity to another ttx, or a set of ttxs, and indirectly relating that information to the user's the goal by relating to those cnxpts; by connecting information from external sources or captured information resources (that are not necessarily structured—a collection of point findings rather than an understandable/outlined/grouped result) to the goal; or by connecting information from the characteristics such as attributes and descriptions of other info-items to the goal. This other information serves first to narrow searches by specifying additional yet fuzzy criteria, but sometimes involving expansion due to the inclusion of important terms in other languages or lexicons. The information serves to position the goal to improve the potential for further co-location associative searching. Finally, the information can assist the system in modeling, predictions, investment structuring, advertising, community structuring, and subsequent searching.

A goal is an enumerated, but unexplained, combination of features of ttxs as defined by an initially empty set of cnxpts or information resources as occurrences. As the user progresses in the search, the set of cnxpts or occurrences is built up with, hopefully, relevant additions, to narrow and clarify the meaning of the ttx to what could be resolved from these collected references. As each new subsuming ttx or new occurrence is added, the goal becomes more narrow in its definition.

One or more queries may be used within a goal, and each may result in connection of the goal to existing cnxpts and to other information by occurrences according to the union of the final result sets for each query (the last query step's result set) and the result set of the goal if one exists. (Intermediate queries need not have a direct result involving cnxpts and/or occurrences because an intermediate result may have a purpose in later steps.)

The process of searching for a ttx begins with defining a goal to encompass all information about a ttx which the user has in his mind. The user may simply use associative searching to navigate to the cnxpt representing the ttx, without a lot of information entry. The user might also enter one or more single or multiple step queries for the goal ttx and obtain a result set of possibly relevant sources or cnxpts as a result of each of the queries. The user may navigate further to find the ttx, with each navigation possibly resulting in generation of a query step specification in the currently open query or in a new default query if none is open. The combined results cause creation of relationships and cause positioning of the goal on visualizations. These actions are effectively combined into an overall editable scripts so that they can be re-run at a later time and receive new rsxitems and thus new relationships and relationship weighting based upon the results, and thus changes in position on the visualizations.

In one embodiment, queries may be used to concretize a goal.

Because goals become cnxpts, they are reusable and may be copied, altered, and shared with others. This reuse mechanism provides the utility that the stored query logic can be reused and for new searching. An added utility is that it provides functionality to save 'chained queries,' which are scripted series of queries applied against successively developed result sets. The goal need not be considered a ttx as it may be given a special purpose.

In one embodiment, placing a cnxpt for a ttx under an existing ttx category cnxpt with no description causes the cnxpt to be a goal as if the user placed a new goal at a specific location (under an existing ttx in the map). The goal is converted to a cnxpt when a user states that no cnxpt representing the ttx has been found.

In one embodiment, the goal is converted to a cnxpt when the user states a name or a description for the ttx, or when the user's activity on the goal has not continued for some period.

Visually, a user navigates a visualization with the goal as a 'cursor' icon so that the cursor is moved toward and into ttx symbols in the visualization When navigating visualizations while using the goal, the user is seeking to serendipitously find ttx categories which the user's ttx would fit into, or ttxs which are predecessors in time to the user's ttx. The user is also seeking to categorize the goal ttx or to show that the ttx stems from other ttxs. When a user navigates into a ttx category, they add the ttx category as a 'predecessor' or another specific endpoint in a directed hierarchical association where the goal/cnxpt is to be a successor or have another specified role. (Alternatively, the relationship applied could be an extensional subsumption Association.) The relationship is assigned a set scopx, infxtypx, and weight. If the user navigates out of that ttx category, this hierarchical association weight is reduced considerably, or deleted. The fxxt of the visualization provides type information for the relationships categorizing the children of ttx categories, and this typing information is used for typing resulting categorization relationships for the goal when it is moved into a ttx.

In a goal, the user is seeking to add rsxitems to the goal as being relevant occurrences, along some nature of relationship, even if merely generally germane. The greater the relevance, the greater the weight on the occurrence relationship. Rsxitems used to create occurrences may refer to infrastructure txos, irxt information resources, traits, purlieus, etc.

Additionally, the user is seeking to add rsxitems referencing cnxpts. Relevant cnxpts are used to move the focus of the user to specific ttx categories and to similar ttxs, by creation of affinity associations. In some cases, these rsxitems may be used for creation of hierarchical or directed associations.

When navigating while as part of the goal, the user is also seeking ttxs which are similar to add as relevant to their goal, even though they might possibly not be germane enough or be the specific ttx being sought. When a user touches a ttx or indicates that the ttx is relevant, or traverses to a different point on the visualization using a ttx, they add the ttx as a 'generally similar' endpoint in an undirected affinitive association where the goal/cnxpt is to have a specified role. The relationship is assigned a set scopx, infxtypx, and weight.

In one embodiment, the result set items found as a result of the query script will be added as txo info-items and occurrence relationships will be created with the goals and carried over as the goal is converted to a cnxpt. In one embodiment, the result set items will be added as specific txo types with specific type-instance relationships and specific occurrence relationship types.

In one embodiment, in manual goal use, a user may add or delete item references to/from the Goal. Result sets can be created manually or obtained from external sources. User selected info-items (called selection sets) may be converted to result sets, and indicated info-items may be manually added to result sets. These info-items may be cnxpts or information resources, and are related to the Goal as associations or occurrences through a 'base' result set.

The cnxpts referenced by rsxitems remaining in a result set for the goal are added as 'generally similar' endpoints in undirected affinitive associations where the goal/cnxpt is to have a specified role. The relationship is assigned a set scopx, infxtypx, and weight. Those cnxpts referenced by rsxitems in the goal are also made endpoints in intensional subsumption Associations with the goal, where the goal is given the subsumed endpoint role.

These new ttxs and relationships are tentative, since the user may not have been pleased with the results found and must cull the result set. If the user has an opportunity to pick and choose the rsxitems that really fit in his ttx, then he will actually be refining the ontology's understanding of the ttx as he means it. The culling process will cause a repositioning of the goal. When result set culling is complete, the rsxitems retained as relevant will likely cause the creation of occurrences or associations. This mechanism is lacking in intellectual property searching today, and the addition of this facility alone will have major ramifications.

Setup Goal System

Define Query Template

Use Case: Define Query Template—Create templates for searching for certain things, with certain methods, or in certain places.

Create templates for searching for specific result set item types, including but not limited to: specific infrastructure txo such as 'business'; traits; purlieus; products; or for searching within specific source types, including but not limited to: web sites; patents; legal articles.

Define Site Specific Query Template

Use Case: Define Site Specific Query Template.

Define Engine Specific Query Template

Use Case: Define Engine Specific Query Template.

Define Analytic Specific Query Template

Use Case: Define Analytic Specific Query Template.

Define Survey Specific Query Template

Use Case: Define Survey Specific Query Template.

Set up Meta-search

Use Case: Set up Meta-search.

Manage Search Engine Subscription

Use Case: Manage Search Engine Subscription.

Define Site Scraping Rule

Use Case: Define Site Scraping Rule.

State a site name and a metadata mapping definition for describing what is found in a scraping, state what to search for, and define a Crawl Result to hold the result set of the scraping.

Define Site Indexing Rule

Use Case: Define Site Indexing Rule.

State a site name and a metadata mapping definition for describing what is found in a scraping, state what to search for, and define a Crawl Result to hold the result set of the indexing.

Define Alert Template

Use Case: Define Alert Template.

Search with Goal

In the following, a search causes or is added to a Goal and the search is used to narrow the ttx represented by the goal to be what is in the user's mind. That may involve clarifications of what the user is thinking. It may also involve a recognition that someone else has thought of and entered the same ttx. It may also be concluded by the user that his ttx is different from all others either because it is entirely new or because it is an incrementally different ttx.

Where the user has recognized that his ttx matches an existing ttx, the goal is combined, being merged into the existing cnxpt unless that cnxpt is locked (unless the goal provides translated information or information in another language or scopx, or information for a fxxt not yet valid for the cnxpt). If the information for the goal cannot be added, the goal is simply abandoned as sufficient information has been collected to position the cnxpt.

Where the user believes the goal represents a new ttx, the goal is 'finalized' by the user to become a cnxpt.

A user may choose to add repositioning information to an existing cnxpt (which the cnxpt has not been locked, or where translated information or information in another language or scopx, or information for a fxxt not yet valid for the cnxpt is needed) without trying to change the represented ttx. In that case, many of the use cases here may be read as applying to an existing cnxpt rather than a goal. For instance, a query or result set may be added to an existing cnxpt, and the cnxpt may be repositioned as a result.

Set Goal/Search Ttxs with Goal

Use Case: Set Goal—Initiate a goal to find a ttx the user is interested in with or without stating a name or description for the goal, or adding a result.

Create, or concretize into the CMM a new goal to represent the ttx in a user's mind that may or may not be real, may be ill-defined, and may or may not have been defined previously. [See Procedure—CREATE Goal] The new goal is specifically not a 'vote' that the ttx will exist.

One type of information creator is the user who makes up queries. Goals are an individual's tool for defining a ttx that they wish to know about. Goals not satisfied define a ttx that does not exist in the CMM, and thus are converted to ttxs.

A new goal can be added by at least one of: merely requesting creation, by marking a location on the view indicating an initial placement for the cnxpt on a visualization based upon a belief that the goal ttx is within that category or similar to a technology, or starting a search.

When a user places the goal onto any fxxt based map, the goal is being given an expected and limiting categorization because it is being inserted into the area defined by some cnxpt representing a broader or earlier or 'parent' ttx. A "user suggested—goal establishment location association" hierarchical association is created between the cnxpt and the goal, marked as created by the user, and a weight and a fxxt (and possibly a scopx) are specified for the relationship. If the new cnxpt is placed where it is not inside of any current ttx, no relationship is created.

Name a Ttx by Naming Goal

Use Case: Name a Ttx by Naming Goal—Indirectly enter a name for a ttx by entering a name for the Goal.

Further voting may alter the name.

Navigate with Goal/Re-categorize Goal

Use Case: Navigate with Goal—Move a goal avatar around on a map to refine its definition by categorization, by adding search criteria and by changing relationships.

Perform one or more navigations of a CMMV, a derived taxonomy, or list of cnxpts to find a closely related ttx or to end navigating unsatisfied that a cnxpt exists for the ttx sought.

When a user moves his goal to another ttx area on any fxxt based map, the goal is being re-categorized or a categorization is being specified for a different fxxt. In the former, the "user suggested—goal establishment location association" hierarchical association is altered to reference the different cnxpt. In the latter, a second "user suggested—goal establishment location association" hierarchical association is created between the destination cnxpt and the goal, marked as created by the user, and a weight and the new fxxt (and possibly a scopx) are specified for the relationship.

Convert Area of Interest or Consideration as Children, or Siblings to Goal

Use Case: Convert Area of Interest or Consideration to Goal—Specify an Area by name or by indication and request that it be the basis of a goal.

Use Case: Convert Area of Interest or Consideration Items to Children of Goal—Specify an Area by name or by indication and request that it be the basis of a goal because the items in the Area are all successors, children, or subtypes of the goal.

Use Case: Convert Area of Interest or Consideration Items to Siblings of Goal—Specify an Area by name or by indication and request that it be the basis of a goal because the items in the Area are all relevant to the goal.

A new goal info-item is created to represent the ttx in the user's mind, where the user believes that the collection of ttxs in the Area are all likely to be relevant to the ttx in his mind [See Procedure—CREATE Goal]

Areas of Interest and Consideration nearly always share some common 'parent' in chosen fxxt. Where the user chooses a fxxt and an Area, and then converts the Area, then the user is setting both an expected and a limiting categorization for the goal. First, the lowest level cnxpt which encompasses all cnxpts in the Area is used as a broader or earlier or 'parent' ttx role for a newly created "user suggested—goal establishment location association" hierarchical association with the goal, marked as created by the user, and a weight and a fxxt (and possibly a scopx) are specified for the relationship. If there is no such encompassing cnxpt, then no relationship is created. Such a relationship is established for only the fxxt which the Area was visualized in, or is not given a fxxt if the Area was not fxxt based.

Secondly, the user is stating that each member of the Area is relevant, so a new custom affinitive association between the goal and each member of the Area is created for only the fxxt which the Area was visualized in (or is not given a fxxt if the Area was not fxxt based), marked as created by the user, and a low weight and a fxxt (and possibly a scopx) are specified for each such relationship. These affinitive associations may have no purpose where the user is intending that the members of the Area are 'children' of the goal, but are created because they may assist to position the goal in other fxxts.

Copy the Area of Consideration or Area of Interest to a Result Set and attach the result set to the goal to make it ready for culling. [See Procedure—CONVERT Area to Result Set] [See Procedure—ATTACH a Result Set to Goal as CHILDREN] [See Procedure—ATTACH a Result Set to Goal as SIBLINGS] [See Procedure—REPROCESS a Result Set for Goal]

Convert Area of Interest or Consideration Items to Parents of Goal

Use Case: Convert Area of Interest or Consideration Items to Parents of Goal—Specify an Area by name or by indication and request that it be the basis of a goal because the items in the Area are all predecessors, parents, or supertypes of the goal.

A new goal info-item is created to represent the ttx in the user's mind, where the user believes that the collection of ttxs in the Area are all parents of the ttx in his mind. [See Procedure—CREATE Goal]

The user is stating that each member of the Area is relevant, so a new custom affinitive association between the goal and each member of the Area is created for only the fxxt which the Area was visualized in (or is not given a fxxt if the Area was not fxxt based), marked as created by the user, and a low weight and a fxxt (and possibly a scopx) are specified for each such relationship. These affinitive associations may have no purpose where the user is intending that the members of the Area are 'parents' or 'children' of the goal, but are created because they may assist to position the goal in other fxxts.

Copy the Area of Consideration or Area of Interest to a Result Set and attach the result set to the goal to make it ready for culling. [See Procedure—CONVERT Area to Result Set] [See Procedure—ATTACH a Result Set to Goal as PARENTS] [See Procedure—REPROCESS a RESULT SET for Goal]

Convert Filter to Goal

Use Case: Convert Filter to Goal—Specify a filter by name or by indication and request that it be the basis of a goal.

A new goal info-item is created to represent the ttx in the user's mind. The filter result is treated as an Area, and the process for either of Convert Area of Interest or Consideration to Goal, Convert Area of Interest or Consideration Items to Children of Goal, Convert Area of Interest or Consideration Items to Parents of Goal, or Convert Area of Interest or Consideration Items to Siblings of Goal is invoked on the filter result.

Set Search Context for Generality

Use Case: Set Search Context for Generality.

Indirectly Search Causing Goal

Set Goal by Indicating Area

Use Case: Set Goal by Indicating Area—Indicate a polygonal area on a map and request that it be the basis of a goal.

A new goal info-item is created to represent the ttx in the user's mind, where the user believes that the collection of ttxs in the Area are all likely to be sub-types, successors, or derivatives of the ttx in his mind. [See Procedure—CREATE Goal] The set of cnxpts within the indicated area is treated as an Area of Interest, and the process for either of Convert Area of Interest or Consideration to Goal, or Convert Area of Interest or Consideration Items to Children of Goal is invoked on the set of cnxpts within the indicated area.

Set Goal Parents by Indicating Area

Use Case: Set Goal Parents by Indicating Area—Indicate a polygonal area on a map and request that it be the basis of a goal, as including parents.

A new goal info-item is created to represent the ttx in the user's mind, where the user believes that the collection of ttxs in the Area are all likely to be supertypes, predecessors, or parents of the ttx in his mind. [See Procedure—CREATE Goal] The set of cnxpts within the indicated area is treated as an Area of Interest, and the process for Convert Area of Interest or Consideration Items to Parents of Goal is invoked on the set of cnxpts within the indicated area.

Set Goal Siblings by Indicating Area

Use Case: Set Goal Siblings by Indicating Area—Indicate a polygonal area on a map and request that it be the basis of a goal, as including siblings.

A new goal info-item is created to represent the ttx in the user's mind, where the user believes that the collection of ttxs in the Area are all likely to be relevant to the ttx in his mind [See Procedure—CREATE Goal] The set of cnxpts within the indicated area is treated as an Area of Interest, and the process for Convert Area of Interest or Consideration Items to Siblings of Goal is invoked on the set of cnxpts within the indicated area.

Set Goal by Indicating Spot

Use Case: Set Goal by Indicating Spot—Indicate a spot on a map and request that it be the basis of a goal.

A new goal info-item is created to represent the ttx in the user's mind. In one embodiment, an approximate, yet unique description of a ttx that would be located in that space is established as a description for the goal. In one embodiment, an approximate, yet unique description of a new ttx that would be located as a subcategory or child under the cnxpt encompassing the area of the spot selected is established as a description for the goal. [See Procedure—CREATE Goal]

When a user places a new goal onto any fxxt based map in such a spot, the goal is being given a categorization because it is being inserted into the area defined by some cnxpt representing a broader, or earlier, or 'parent' ttx, according to that fxxt. A "user suggested—goal establishment location association" hierarchical association is created between the cnxpt and the new goal, marked as created by the user, and assigned a high weight and a fxxt based upon the map in which the goal is being created (and possibly a scopx). If the new goal is placed where it is not inside of any current cnxpt, no relationship is created.

In one embodiment, additional approximate, yet unique descriptions are generated based upon methodologies, such as, including but not limited to: 'TRIZ', utilizing the descriptions of the category and various thought provoking mechanisms as available, such as, including but not limited to: traits, purlieus, and these are presented to the user as suggestions for describing the new goal.

In one embodiment, the queries and result sets for the cnxpt encompassing the area of the spot are copied to the goal, with its relevance rankings for rsxitems, and a new query step is added but marked incomplete, and opened to be ready for a new qualifying query specification to differentiate the new goal from the encompassing cnxpt.

Set Goal by Information Item

Use Case: Set Goal by Information Item—Indicate an info-item and request that it be the basis of a goal.

If necessary, a new goal info-item is created to represent the ttx in the user's mind [See Procedure—CREATE Goal]

Perform the procedure in "Info-item Tagging Based Relationship Building" for the goal and the info-item. The categorization of the goal is adjusted when the properties and relationships are added.

Set Goal by Query

Use Case: Set Goal by Query—Request that a query and its results be the basis of a goal as children.

A new goal info-item is created to represent the ttx in the user's mind, as specified, at least in part, by the query, where the user believes that the collection of cnxpts found by the query are all likely to be sub-types, successors, or derivatives of the ttx in his mind [See Procedure—CREATE Goal] The query is attached to the goal. [See Procedure—ATTACH a Query to Goal]

In one embodiment, when a query is specified for a goal that matches another goal's or cnxpt's query, the user is stating that each result of the existing query may be relevant, so a query in common affinitive association with a low weight is created between the new goal and the existing goal or cnxpt, marked with the user as creator, and with direction from new goal to existing goal or cnxpt.

When the query is executed, the query's result set is applied to the goal. Any culling of the result set affects the relationships and properties of the goal. [See Procedure—PROCESS a Result Set as CHILDREN for Goal] [See Procedure—REPROCESS a Result Set for Goal]

This use case may be read as applying to an existing cnxpt rather than a goal.

Set Goal Parents by Query

Use Case: Set Goal Parents by Query—Request that a query and its results be the basis of a goal's parentage.

A new goal info-item is created to represent the ttx in the user's mind, as specified, at least in part, by the query, where the user believes that the collection of cnxpts found by the query are all likely to be predecessors, parents, or supertypes of the ttx in his mind [See Procedure—CREATE Goal] The query is attached to the goal. [See Procedure—ATTACH a Query to Goal as PARENTS]

In one embodiment, when a query is specified for a goal that matches another goal's or cnxpt's query, the user is stating that each result of the existing query may be relevant, so a query in common affinitive association with a low weight is created between the new goal and the existing goal or cnxpt, marked with the user as creator, and with direction from new goal to existing goal or cnxpt.

When the query is executed, the query's result set is applied to the goal. Any culling of the result set affects the relationships and properties of the goal. [See Procedure—PROCESS a Result Set as PARENTS for Goal] [See Procedure—REPROCESS a Result Set for Goal]

This use case may be read as applying to an existing cnxpt rather than a goal.

Set Goal Siblings by Query

Use Case: Set Goal Siblings by Query—Request that a query and its results be the basis of a goal's affinitive associations.

A new goal info-item is created to represent the ttx in the user's mind, as specified, at least in part, by the query, where the user believes that the collection of cnxpts found by the query are all likely to have an affinity with the ttx in his mind [See Procedure—CREATE Goal] The query is attached to the goal. [See Procedure—ATTACH a Query to Goal as SIBLINGS]

In one embodiment, when a query is specified for a goal that matches another goal's or cnxpt's query, the user is stating that each result of the existing query may be relevant, so a query in common affinitive association with a low weight is created between the new goal and the existing goal or cnxpt, marked with the user as creator, and with direction from new goal to existing goal or cnxpt.

When the query is executed, the query's result set is applied to the goal. Any culling of the result set affects the relationships and properties of the goal. [See Procedure—PROCESS a Result Set as SIBLINGS for Goal] [See Procedure—REPROCESS a Result Set for Goal]

This use case may be read as applying to an existing cnxpt rather than a goal.

Result Set Processes

Result Sets

Result sets are formed and populated by a user when he indicates an appropriate entity (a list, data set) as a result, a crawling produces a crawl result, or a query is executed, returning rsxitems.

Normally, result set items will predominantly be locators to external information resources, but result sets are more generally useful and the nature of rsxitem content is general.

Rsxitem relevance settings, selections, markings, and grouping are saved with the result set.

Result Set Evaluation for Positioning

Use Case: Evaluate Result Set for Positioning—Use a result set to position a query goal by finding the strongest cntexxt of the result set.

Result sets are analyzed in stages toward determining a cntexxt. Only result sets that can be reduced to cntexxts may be used to find a position in a categorization. To do so, the result set is segmented into rsxitems that may have occurrences to cnxpts, rsxconxs, cnxpts, and cntexxts. Initially, there are no cntexxts. If the result set is being reevaluated, the weights of any previously found cntexxts are reduced by a factor to set a presumption but to lessen the effect of the prior evaluation. For each cnxpt in the result set, a culling relevance weight between −1 and 1 is set according to culling votes where 1 represents absolute relevance and −1 represents absolute irrelevance. Also, for each cnxpt in the result set, a 'knowledge' relevance strength is set to zero before evaluation. Finally, a 'modal' relevance strength is set to zero before evaluation.

Algorithm:

Reduction of Occurrences

1. The non-cnxpt rsxitems of the result set are analyzed to determine their set of known occurrences to cnxpts, if any. For each occurrence, a rsxconx relationship is created connecting the rsxitem to the cnxpt of the occurrence, setting the strength of the rsxconx to be the strength of the occurrence times the strength of the culling relevance of the rsxitem divided by the number of occurrences connected to the cnxpt. The existing relevance (culling, knowledge or modal) to the result set of a cnxpt rsxitem is not utilized in this equation. The cnxpts of the rsxconx are then added to the result set, initially with a 'culling', 'knowledge' and 'modal' relevance strengths of zero. All rsxconx of the result set are then summarized by cnxpt and their values are normalized to be between −1 and 1, and the summarized, normalized value is added, by weighted averaging, to the 'knowledge' strength of the cnxpt of the summary such that the effect of finding rsxitems that have occurrences to cnxpts is in the 'knowledge' property, and is between −1 and 1. The knowledge property combines the culling relevance of the rsxitem and the strength of the occurrence to cnxpts, but not the culling relevances of the cnxpt itself. The 'knowledge relevance' weights of all cnxpt rsxitems are then renormalized. The result is a list of cnxpts with knowledge relevance weights between −1 and 1.

2. The knowledge relevance is then combined with the culling relevance for each cnxpt to obtain a modal relevance, by averaging them. The modal relevance combine the effect of finding rsxitems that occur to cnxpts and the culling relevances of the cnxpts as rsxitems.

Reduction of Cnxpts

3. The relevance of the cnxpts and the structure of the fxxt (from either the visualization on which positioning is being done, or, for analysis for clustering, the analytics assigned fxxt) of the result set are then combined to obtain cntexxts for the result set. Considering each cnxpt in the order of modal relevancy highest first, the cnxpt is added as a cntexxt to the list of cntexxts of the result set such that: a) if the considered cnxpt is a descendant of a cntexxt already in the result set, the strength of relevance of the parent cntexxt is increased (possibly exceeding 1) by a positive factor (a 'fudge' factor) times the modal relevance of the considered descendant cnxpt, and the considered cnxpt is not added; b) if the cnxpt of an existing cntexxt is a descendant of the considered cnxpt, the considered cnxpt is added as a cntexxt with a strength given by the modal relevance and increased (possibly exceeding 1), for each descendant cntexxt found, by a positive factor (a second 'fudge' factor) times the strength of the descendant cntexxt found; and c) otherwise add the cnxpt as a cntexxt with a strength given by the modal relevance.

Goal Placement by Result Set Evaluation

The resulting set of cntexxts provides the direct list of cntexxts where the result set should be placed, in the order by strength of the cntexxt. The placement is fxxt dependent only if cntexxts involving descendency were found, and then only if the strength of such a cntexxt was higher than those cntexxts not involving descendency. [See Procedure—New Category Generation and Category Relation Generation From Result Set] The strongest result set based placement occurs when the Result Set is attached to a goal as a parent. [See Procedure—ATTACH a Result Set to Goal as PARENTS] Secondary placements occur where the result set is attached as a sibling or children list. [See Procedure—ATTACH a Result Set to Goal as SIBLINGS] [See Procedure—ATTACH a Result Set to Goal as CHILDREN]

Result Set Management

Use Case: Manage Result Set—Customizable management of specified, constrained lists of rsxitems retrieved through a manual or scripted query process and through analytics.

This provides a process management system with list management and document control tools that is powerful and intuitive, and that emphasizes the reusability of operations. The users can easily extend to manage data in their own data stores and databases;

Result Set Management Procedures

This process benefits the user by allowing the user to, including but not limited to:

state access rights for result sets and rsxitems, and set release dates for result sets and rsxitems; In one embodiment, the visibility of items that the user has no access rights for may be blocked.

contextually display data from result sets utilize facilities for graphical Result Set Management, including manual query facilities and seamless integration of Analytic components.

Query Step Definition with Result Sets

Create Result Set Boolean Operation Query Script Step

Use Case: Create Result Set Boolean Operation Query Script Step—Specify a Result Set Boolean Operation query command, and run the command.

The parameters for the operation are result sets and the operation may include but are not limited to: Union (OR), Exclusive Or, Intersection (AND), Subtraction, etc.

Create Result Set Culling Query Script Step

Use Case: Create Result Set Culling Query Script Step—Create and execute culling operations and to record the results of each operation simultaneously with the execution.

Result sets, in one embodiment, can be manipulated manually (culled). These culling operations result in add and remove script commands.

View Result Set Properties

Use Case: View Result Set Properties—Display the properties/metadata of result sets to determine which queries, imports, exports, analytics and visualizations/reports are applicable to them.

Result Set Access Control

Use Case: Result Set Access Control—Generate and share specialized 'meta' result sets between users who have different levels of access to the base data; Change the access rights for a user to provide visibility of items that the user has access rights for, for example if result sets contain locators to information that a user has no access rights to, change the access rights so that the user can access the information.

Result Set Analysis

Use Case: Result Set Analysis—Result sets may be submitted for analysis by analytics.

To submit a result set, preliminary analysis of the properties/metadata of result sets is used to determine which queries, imports, exports, analytics and visualizations/reports are applicable;

Name and Save Result Sets

Use Case: Name Result Sets—Results may be named, saved, and described.

Users may save result sets and their context, including the saving of selections, additions, deletions, etc. The saved result set would include the current selections (which rsxitems were 'selected' by the user at the time of the save), and records of any additions or deletions made to the result set by the user.

Export Result Set

Use Case: Export Result Set—Result sets may be exported.

Delete Result Set

Use Case: Delete Result Set—Result sets may be deleted.

Share Result Set

Use Case: Share Result Set—Result sets may be shared.

Users may share result sets and their context. Users will be able to generate and share specialized 'meta' result sets between users who have different levels of access to the base data.

In one embodiment, rsxitem relevance settings, selections, markings, and grouping are shared with the result set.

In one embodiment, rsxitem relevance setting changes and setting changes are merged and saved on the original of the shared result set.

In one embodiment, rsxitem relevance setting changes are re-propagated to the shared versions of the original of the shared result set.

Set Result Set Access Rights

Use Case: Set Result Set Access Rights—Users may set parameters for sharing of result sets.

Users may, including but not limited to:

- generate and share specialized 'meta' result sets between users who have different levels of access to the base data;
- constrain visibility of items that the user has access rights for, for example if result sets contain locators to information that a user has no access rights to;
- set retention time or access permissions for a result set;
- set release dates for result sets and rsxitems;
- block visibility of items that the user has no access rights for.

Result Set Creation Alternatives

Create Result Set Manually

Use Case: Create Result Set Manually—Result sets can be created manually.

Create an empty result set. An empty result set is useful for managing specialized tables. [See Procedure—CREATE Result Set]

Create Result Set from Selection Set

Use Case: Create Result Set from Selection Set—The set of info-items in a selection set each are attached to a new rsxitem in one new result set.

State that a selected set should be used as the basis for a result set. By stating that the user believes that the members of the result set all are relevant descriptive elements for the ttx, the user is also stating that the ttx may be described by the items in the result set. [See Procedure—CREATE Result Set]

Create Result Set from Ttx

Use Case: Create Result Set from Ttx—A single cnxpt info-item is attached to a new rsxitem in one new result set.

[See Procedure—CREATE Result Set]

Create Result Set from Area of Consideration

Use Case: Create Result Set from Area of Consideration—The set of cnxpt info-items in an Area of Consideration are each attached to a new rsxitem in one new result set.

Copy an Area of Consideration to become a Result Set, to make it ready for culling. [See Procedure—CREATE Result Set] [See Procedure—CONVERT Area to Result Set]

Create Result Set from Area of Interest

Use Case: Create Result Set from Area of Interest—The set of cnxpt info-items in an Area of Interest are each attached to a new rsxitem in one new result set.

Copy an Area of Interest to become a Result Set, to make it ready for culling. [See Procedure—CREATE Result Set] [See Procedure—CONVERT Area to Result Set]

Result Set Display and Control

This provides a means of contextually displaying data from result sets along with facilities for graphical Result Set Management, including manual query facilities and seamless integration of Analytic components.

Open Result Set Display

Use Case: Open Result Set Display.

The objective of this process is, in one embodiment, to invoke various visualizations on selected or marked items in a result set. Visualizations of result sets will be fully interactive, allowing for result set culling or other manual result set operations to be conducted through, including, but not limited to, graphical, map, or list interfaces, or another appropriate visualization tool.

Open Result Set Sub-Display

Use Case: Open Result Set Sub-Display—Invoke various visualizations on selected or marked items in a result set.

Invoke a Filter on a Result Set Display

Use Case: Invoke a Filter on a Result Set Display—Select a filter for altering the content sort order, or other information on a result set display.

Result Set Information Hiding Filtering

Use Case: Result Set Information Hiding Filtering—Select an information hiding filter to invoke on a result set to hide data or to select it for removal.

Result Set Selection

Use Case: Select a result set to view or to provide context for an operation—Select a result set to view or to provide context for an operation.

View Result Set as Extracted List

Use Case: View Result Set as Extracted List—Display result set for culling and management.

This case provides for editing and culling result sets in a specialized user interface providing more control than with maps or hierarchical lists displays.

Use Case: View Result Set as List of Locators—Display result set for culling and management.

This provides for editing and culling result sets in a specialized user interface providing more control than with maps or hierarchical lists displays.

Result Set Operations

Culling consists of operations on result sets as a whole and operations on one or more result set items.

Combine Result Sets

Use Case: Combine Result Sets—Manually combine result sets.

Perform one or more of the following operations on result sets, including but not limited to:

- Invoke a re-culling of a result set by applying previous additions and deletions from a saved query that is rerun (When a query is re-executed, it forms a new set of result sets, but the query also contains command steps which set relevance rankings and additions and deletions. If a user makes manual changes to a result set that is used by subsequent query command steps in the query script, then the subsequent result sets may not have the same contents but the relevance setting and culling commands may still be applied.);
- Perform Boolean arithmetic on result sets to add (union), subtract, difference (intersection), and 'exclusively or' result sets to form new result sets, including but not limited to:
  - Combine items in multiple result sets into a single result set (combine entire result sets) according to the Boolean operation;
  - Combine items selected by a filter applied to each of multiple result sets into a single result set according to the Boolean operation;

In one embodiment, the results of the changes made to a result set will be coded as command steps in the query script used to generate the result set originally.

Cull Result Set Items

Use Case: Cull Result Set Items—Examine and alter (cull) a single result set to add, change, delete specific rsxitems.

In one embodiment, this process may be accomplished on any of several visualization user interfaces, including, but not limited to a list display, a typical meta-search result page, a map visualization, a list visualization, etc.

In one embodiment, this process may be invoked by a user on any opened result set.

In one embodiment, these culling operations result in add and remove script step commands stored in the result set.

In one embodiment, these culling operations result in add and remove query script step commands stored in the result set query step specification script.

In one embodiment, this process may provide the ability to undo addition of, changing of, or deletion of items in a result set.

In one embodiment, result sets may be re-culled by applying previous additions and deletions to the new result set of a saved query that is rerun.

In one embodiment, relevance rankings on rsxitems may be set.

In one embodiment, a new result may be formed by selecting, marking, and grouping items in a result set as those to become members of the new result set (manually selective searching).

Relevance Ranking of Items

The process of relevance ranking begins with the selection of a rsxitem. Most often, the rsxitem represents a locator to an information resource (including, but not limited to a URL), displayed in a result set in the form of a search result page, but result sets are much more general and the rsxitems need not be locators. After selection, optionally open information display (properties, the information resource, etc.) of the rsxitem, and perform one of the following cases.

Use Case: Mark Relevant but Too General.

Use Case: Mark Irrelevant.

Use Case: Mark Relevant.

Add to Result Set Manually

Use Case: Add to Result Set Manually

Add to Result Set by Pointing

Use Case: Add to Result Set by Pointing.

Combine Result Sets by Formula

Use Case: Combine Result Sets by Formula.

Result Set Relevance Management

Use Case: Result Set Relevance Management.

The objective of this process is, in one embodiment, to edit the relevance of items in a result set so that if the same or a similar query, analytic or other automatic function is executed subsequently the rsxitems will still be listed in relevance order—best first, and deletions previously occurring will be repeated. To capture relevance, the system watches what a user clicks on as they cull a result set, raising the relevance of items clicked, In one embodiment, any deleted items are marked as deleted but not removed, and are then hidden from users. In one embodiment, as the user culls, the system also downgrades as less relevant any item deleted from the result set.

Explain Result Set Action Reason

Use Case: Explain Result Set Action Reason.

Result Set Adjustment

Narrow Focus of Results Found

Use Case: Narrow Focus of Results Found—Adjust a query to reduce the number of rsxitems in the query's result set parametrically.

Accept Narrowing Suggestion

Use Case: Accept Narrowing Suggestion—Accept a generated suggestion to adjust a query to reduce the number of rsxitems in the query's result set.

Partition Query for Ttx Splitting

Use Case: Partition Query for Ttx Splitting.

Result Set Application

Attach Result Set to Cnxpt

Use Case: Attach Result Set to Cnxpt—Attach one or more result sets directly to the cnxpt.

Using an existing result set (possibly copied from a selection set or an Area), and an existing cnxpt, add the result set to the cnxpt as either a 'parent', 'child', or 'sibling' result set, with an overall weight for indicating the result set's overall ability to differentiate the ttx. In this section, the non-cnxpt info-items referenced by rsxitems which are most important for considering consist of, including but not limited to: purxpt, trxrt, kwx, irxt, comxo, conxtv, rexo, individual, organization, product, component, ingredient, note, question. Generate relationships from the rsxitems. [See Procedure—ATTACH a Result Set to Cnxpt]

Attach Result Set to Goal

Use Case: Attach Result Set to Goal—Attach one or more result sets directly to the goal.

Generate relationships from the rsxitems. [See Procedure—ATTACH a Result Set to Goal]

Convert Result Set to Ttx

Use Case: Convert Result Set to Ttx—Create a ttx based upon a result set.

This is accomplished by creating a goal and then finalizing the goal, if appropriate. Perform the procedure in "Convert Result Set to Goal".

Analytics run on a result set also provide for creating a small map of the clustering possible in the Result Set, and the clusters become cnxpts if appropriate quality of the cluster generation is achieved for a cluster.

Convert Result Set to Goal

Use Case: Convert Result Set to Goal—Create a goal based upon a result set.

Create, or concretize into the CMM a new goal to represent the ttx in a user's mind that may or may not be real, and may or may not have been defined previously, but which the rsxitems marked as relevant tend to describe, and the rsxitems marked as irrelevant tend to differentiate. [See Procedure—CREATE Goal] Generate relationships from the rsxitems. [See Procedure—ATTACH a Result Set to Goal]

Relevance Based Relationship Building

Use Case: Relevance Based Relationship Building—Create weighted relationships from relevance data.

Generate relationships from the rsxitems in a Result Set. [See Procedure—ATTACH a Result Set to Goal]

Info-item Tagging Based Relationship Building

Use Case: Info-item Tagging Based Relationship Building—Create weighted relationships from use of an info-item as an identity indicator for a goal or cnxpt.

Tagging occurs when an info-item is indicated and an instruction to add it to a goal or cnxpt is entered. The following presents the system actions regarding a goal, but the same actions can be applied if the cnxpt is not locked or if the lock is overridden.

The info-item can be any one of a number of types. This process is intentionally wide-open.

If the info-item is a cnxpt, then an approximate, yet unique description and position based upon the description of the cnxpt is established as a description for the goal. In one embodiment, additional approximate, yet unique descriptions are generated based upon methodologies, such as, including but not limited to: 'TRIZ', utilizing the descriptions of the category and various thought provoking mechanisms as available, such as, including but not limited to: traits, purlieus, and these are presented to the user as suggestions for describing the new goal, based upon the occurrences of the info-item.

If the info-item is a cnxpt, then an approximate, yet unique position based upon the position of the cnxpt is established as a position for the goal, and thus the new goal is given the context of the cnxpt info-item on a fxxt based map, and the goal is being given a categorization because it is being inserted into the area defined by some cnxpt representing a broader, or earlier, or 'parent' ttx, according to that fxxt. This is implemented by giving the goal the associations of the cnxpt, but with a separating relationship between the cnxpt and the goal. In one embodiment, the associations of the cnxpt info-item are copied to the new goal, with changes to the created by role and changes to the source role, and a negative affinitive association with a medium weight is created between the cnxpt and the goal, marked as created by the user, and assigned a medium weight and a fxxt (and possibly a scopx). In one embodiment, only a "user suggested—goal establishment location association" hierarchical association is created between the cnxpt encompassing the cnxpt info-item and the new goal, marked as created by the user, and assigned a medium weight and a fxxt (and possibly a scopx). If the new goal is placed where it is not inside of any current cnxpt, no hierarchical association is created.

In one embodiment, if the info-item is a cnxpt, then the occurrences of the info-item are copied to the new goal, with changes to the created by role and changes to the source role.

If the info-item is a fxxt or a scopx, the goal is merely marked with that fxxt or that scopx.

If the info-item is a txo but not a cnxpt, then the info-item can either serve as an occurrence or a property or both for the new goal, depending upon the txo and how it can be relevant to the goal. The goal may be recategorized because of the new occurrence or property.

It the txo is an irxt, create a temporary subject identifier occurrence relationship between the goal and the irxt within the stated fxxts and scopxs of the irxt, and marking (by detailed infxtypx, scopx, or fxxt) the relationship to indicate it as a particular form of occurrence relationship where possible. Mark the relationship with a medium weight. Set the new relationship's properties as follows: TEMPORARY INDICATOR (to TRUE), DELETE INDICATOR (to FALSE). [See Procedure—CREATE Occurrence to irxt]

It the txo is a type for which an occurrence property may be created for a cnxpt, create a new temporary occurrence relationship between the txo and the goal within the stated fxxts and scopxs of the txo, and marking (by detailed infxtypx, scopx, or fxxt) the relationship to indicate it as a particular form of occurrence relationship where possible. Mark the relationship with a medium weight. Set the new relationship's properties as follows: TEMPORARY INDICATOR (to TRUE), DELETE INDICATOR (to FALSE).

It the txo is a type for which a txo property may be created for a cnxpt, create a new temporary txo property for the goal, setting the new property's name, setting a medium weight, with the stated fxxts and scopxs of the txo.

In one embodiment, if the txo is a type containing attribute information for which an attribute property may be created for a cnxpt, create a new temporary attribute property for the goal, setting the new property's name, setting a medium weight, with the stated fxxts and scopxs of the txo.

In one embodiment, if the txo specifically contains description information to be registered with the new cnxpt or goal as descriptions, and it includes a reference to an existing cnxpt's:

- description, create a "ttx citation association" between the goal and the cited cnxpt with a low weight (owing to the weakness of this approach). [See Procedure—CREATE ttx citation association]
- name, create a "cnxpt name reference citation association" between the goal and the cited cnxpt with a low weight (owing to the weakness of this approach). [See Procedure—CREATE Cnxpt Name Reference Citation association]

If a "later-added ttx description content reference citation tag" exists for the description of the ttx, create a "ttx description content later-added reference citation association".

Form Area of Consideration from Results

Use Case: Form Area of Consideration from Results—Convert a result set of retrieved dxos, ttxs, or txos into an Area of Consideration.

Result Set Workflow Management

Set Result Set Workflow Status

Use Case: Set Result Set Workflow Status—Result sets may be 'new', 'needing review', 'in review', or 'reviewed'.

Where a result set is altered, its status goes back to 'needing review'. A status can be assigned to the result set, but only the system may set the status to 'new'.

Set Result Item Workflow Status

Use Case: Set Result Item Workflow Status.

Report Completion of Result Item Workflow Step

Use Case: Report Completion of Result Item Workflow Step.

System Function—Assisted Result Set Culling

Generate Narrowing Suggestions

Use Case: Generate Narrowing Suggestions.

Generate Additions of Information or Link Information to Topic

Use Case: Generate Additions of Information or Link Information to Topic.

Set Goal by Metasearch

Use Case: Set Goal by Metasearch.

Set Goal by Stating an Aha

Use Case: Set Goal by Stating an Aha.

System Functions—Search System Operations

Create Goal Relationships

Use Case: Create Goal Relationships—Create relationships for goals based upon queries in common with existing cnxpts.

In one embodiment, when a query is specified for a goal that matches another cnxpt's query, a query in common affinitive association with a low weight is created between the goal and the existing cnxpt, marked with the user as creator, and with direction from new goal to existing cnxpt.

In one embodiment, when a query is specified for a goal that matches another cnxpt's query, the result set for the second, existing query's result set is copied, with its relevance rankings for rsxitems, to the new query's result set, and a "query in common affinitive association" with a weight depending upon the amount of definition present on the existing cnxpt's query is created between the goal and the existing cnxpt.

Perform Query

Use Case: Perform Query—Take all automatic steps to perform a query and return results.

This requires meta-searching, changing placement of goal in visualization, creation of result sets, obtaining of information resources, creating occurrences, performing initial relevance rankings on new (and existing) occurrences. For queries as part of a goal, it includes, but is not limited to: calculating identity indicators for goal, and comparing identity indicators against existing ttxs.

Retrieve Query Scripts

Use Case: Retrieve Query Scripts—Retrieve query scripts that were saved previously, shared by another user, or are available from a library.

Retrieve Import from Analytic and Convert

Use Case: Retrieve Import from Analytic and Convert—Retrieve an import file from an analytic and convert it to a result sets for review or into a document, or an ad hoc resultant data table to retain in the library.

Retrieve Result Sets

Use Case: Retrieve Result Sets—Retrieve result sets stored previously or shared by another user, or are available from a library.

Result Set Collateral Information Resource Import

Use Case: Result Set Collateral Information Resource Import—For information resources for which metadata has not been entered into the database, place the information resource into the CMMDB along with the query used to obtain the retrieval, or place the URL to it into the CMMDB to save only a locator.

The objective of this process is, in one embodiment, to import information resources and place them into the system database where only references and possibly metadata had been stored previously.

Retrieve Data or Information Resources from Corporate Sources

Use Case: Retrieve Data or Information Resources from Corporate Sources—Retrieve data in the range of formats in which data is available from corporate sources.

Perform a crawl and use an analytic to analyze the resulting clustering to obtain new ttx entries.

Retrieve Data or Information Resources from Online Services

Use Case: Retrieve Data or Information Resources from Online Services—Retrieve data in the range of formats in which data is exported by patent professionals' online services Access rights and attribution must be retained.

Automatic Result Set Relevance Setting

Use Case: Automatic Result Set Relevance Setting—Manage relevance of rsxitems, and cull result sets automatically, with full control.

Culling involves removing any items picked out for rejection because they do not meet certain specifications, as well as adding items found because they meet the specifications but were not found by the query. Automatic relevance setting is performed to, including but not limited to:

- Polish relevance by citation, word use, description, etc.
- Polish relevance data by reviewing queries and interest against results
- Polish relationships by cross citation, word use
- Polish relevance within cluster by 'clarity'

Display Calculated Similarity of Goal to Nearby Ttx

Use Case: Display Calculated Similarity of Goal to Nearby Ttx.

Display Calculated Similarity of Ttx to Nearby Ttx

Use Case: Display Calculated Similarity of Ttx to Nearby Ttx.

Display Calculated Satisfaction Value for Txpt to Axpt

Use Case: Display Calculated Satisfaction Value for Txpt to Axpt.

Track Goal Results

Use Case: Track Goal Results.

Track Document Search Scan Hit

Use Case: Track Document Search Scan Hit.

Completing Searches

Accept Goal

Use Case: Accept Goal—State whether or not the goal is achieved and the user found the exact ttx sought.

Form Cnxpt from accepted goal. Complete the goal. [See Procedure—FINALIZE Goal into Cnxpt]

Convert Goal to Selection Set, Area of Interest, or Area of Consideration

Use Case: Convert Goal to Selection Set, Area of Interest, or Area of Consideration.

Convert the relevant contents of the result sets attached to the goal into a selection set or an Area. For an Area of Interest, remove non-cnxpts from the Area.

Make Goal Dynamic

Use Case: Make Goal Dynamic—Adjust priority of processing goal to move it in real time.

Recalculate the position of a goal more frequently. [See Procedure—REPOSITION a Goal]

Reposition Goal

Use Case: Reposition Goal.

Recalculate the position of a goal. [See Procedure—REPOSITION a Goal]

Reposition Cnxpt

Use Case: Reposition Cnxpt—Recalculate the position of a cnxpt.

[See Procedure—REPOSITION a Cnxpt]

Request Goal Re-executions

Use Case: Request Goal Re-executions—Reevaluate the queries of a goal, and recalculate its position.

[See Procedure—REPROCESS Queries for Goal]

Re-execute Goals and Generate Alerts

Use Case: Re-execute Goals and Generate Alerts.

Set Alert on Goal Changes

Use Case: Set Alert on Goal Changes.

Convert Area of Interest to Txo, Dxo, or Scope

Use Case: Convert Area of Interest to Txo, Dxo, or Scope.

Convert the area of interest to a result set. [See Procedure—CONVERT Area to Result Set] Create positioning and affinitive relationships for the cnxpt of the cntexxt of the area that relate it to other cnxpts, and occurrence relationships of appropriate types and properties to relate it to txos in the area. For txos in the area, change the txo to the proper type and mark it with properties as appropriate to that type of txo and relate the txo to an rsxitem. [See Procedure—CREATE Txo from Result Set]

Link Relevant Rsxitems to Formed info-item

Use Case: Link Relevant Rsxitems to Formed info-item.

Create positioning and affinitive relationships for the info-item that relate it to other txos, and occurrence relationships and properties to relate it to txos of appropriate types. Change the txo to the proper type and mark it with properties as appropriate to the type of txo. [See Procedure—CREATE Txo from Result Set]

Execute New info-item Workflow Procedure Instance

Use Case: Execute New info-item Workflow Procedure Instance.

Execute New info-item Survey Questionnaire Instance

Use Case: Execute New info-item Survey Questionnaire Instance.

Generate Names for new info-items where possible

Use Case: Generate Names for new info-items where possible.

Analysis Tools—Analytics

Define Analytic

Use Case: Define Analytic—Generate a set of procedures and programming to provide additional function to the system to assist the user in further researching the data, collect new empirical data, find new relationships, help organize the data, define relationships in the data that did not previously exist.

In one embodiment, the analytic engine retrieves into a custom import file containing some combination of, including, but not limited to: ttx descriptions, ttx characteristics, information resources referenced as occurrences, general (undescribed), and ttx attributal data. The import is then converted and set for review as a result set, a document, or an ad hoc resultant data table for entry into the library.

Define Add/Refine Analytic

Use Case: Define Add/Refine Analytic.

Offer Analytic Tool

Use Case: Offer Analytic Tool.

Define an Analytic Invocation Script

Use Case: Define an Analytic Invocation Script—Create a script for invoking analytics.

The script will be redisplayed in control forms showing step parameters for each step when the script is run, and can be altered individually by step. It can also be run in silent mode. The definition process includes the definition of each step and the testing of the script with alterations as needed.

Request Run of Analytic on Area of Consideration, Area of Interest, or Goal

Use Case: Request Run of Analytic on Area of Consideration, Area of Interest, or Goal.

Execute Analytic on Area of Consideration, Area of Interest, or Goal

Use Case: Execute Analytic on Area of Consideration, Area of Interest, or Goal.

Run Model (on Area of Interest or Map)

Use Case: Run Model (on Area of Interest or Map).

Sharing (and offering for sale)

Share Search Goal and Results

Use Case: Share Search Goal and Results.

Define Goal, Query, Result Set Combination Template

Use Case: Define Goal, Query, Result Set Combination Template.

Define Survey Template

Use Case: Define Survey Template.

Searching by Alert

Gain New Information by Alert

Find out about changes to the CMMDB on the basis of alerts sent out to inform users.

Use Case: Alert Setup—Register to receive alerts, including, but not limited to the creation of new ttxs within certain categories as they are entered or of changes made in cnxpts within certain categories.

Need Alert

Use Case: Need Alert—Register to receive alerts, including, but not limited to alerts specifically about a need expressed by another user for a appcept that appears to fall within an area for which the alert is registered.

The utility of this is that it provides an both an early warning system for interest in a tcept plus an opportunity to obtain statements of interest in a tcept category for which a user can offer services or may have technology transfer intellectual property for sale.

Issue Alert when Satisfaction Calculation is Satisfied

Use Case: Issue Alert When Satisfaction Calculation is Satisfied—Issue alert based upon new or updated ttx which now Satisfies a given Satisfaction calculation.

Issue Alert when Ttx Similarity Calculation is Satisfied

Use Case: Issue Alert When Ttx Similarity Calculation is Satisfied—Issue alert based upon new or updated ttx which now is similar above a given similarity calculation.

Administrative process

Establish

Establish System

Use Case: Establish System.

Provision System Components

Use Case: Provision System Components.

Manage

Manage Accounts

Use Case: Manage Accounts.

Manage Users

The system is required to store and maintain a list of client accounts in a persistent repository. All user access is to be secure and encrypted, and the user accounts enable this.

Close Account

Use Case: Close Account—The System User's objective is to close a client account, whether support or store account.

Users within the repository may be deleted if required. If the user has existing transactions against their account, the delete is a logical delete only. An archive of inactive accounts will be maintained Constrain User Privileges Use Case: Constrain User Privileges—Restrict a user from certain use in the system.

This could occur because of bad behavior, etc.

Delete User

The Administrator's objective is to delete a user from the system and close their account.

Report on User Account

A report is required covering all details of a user's account including current open transactions, transaction history and activity.

Validate User

The system must provide for secure access and user validation via pin and password. The Pin is to be provided by system. The user may change their password according to a set of defined rules.

Manage Accounting

Use Case: Manage Accounting.

Manage Inventory

The system design includes a complete inventory management facility to store and track stock of items for the on-line store. These items include all downloads such as data sets, all physical items, and all information access rights available other than clump data.

Add New Titles into Catalog and Stock lists

This defines the process for adding new titles. This allows the receiving and adding of items such as software updates, downloads, information packages, collateral information resource, etc. to the stock lists.

E-Commerce Administration

Manage E-Commerce Transactions

Use Case: Manage E-Commerce Transactions.

Order Products

An order facility is provided to users for on-line ordering from product catalog list.

List Stock Levels

A facility will exist to list current stock levels and to manually update stock quantities if physical checking reveals inconsistencies. The utility of this is that it provides the means to list stock levels for a selection of titles.

Manage Products

System for managing product items that are listed as available for purchase.

Update Inventory

In processing the orders the inventory needs to be updated to show what items have been subtracted from the stock.

Take Orders: Receive Orders

An on-line product ordering system is required. This will allow web users to browse and purchase products from the current inventory. Pre-orders will not be required. On receipt an fulfilling of a large corporate order, the quantity of physical inventory items received must be registered against the original purchase order. Any discrepancies between quantity ordered and quantity received need to be resolved as well as any change to pricing on receipt of the items.

Payment Receipt

Use Case: Payment Receipt—Receive payments made by corporate check for large transactions.

Process Credit Card Payment

All payments will be via credit card. All major credit card types will be accepted and approval time shall be less than 2 minutes except where fraud checks fail.

List Current Orders

The utility of this is that it provides a listing of the orders that are current.

Fulfill Orders: Process Order

Carry out the processing of the order. This will ensure that for an order the products are retrieved, packaged and the Inventory is updated.

Retrieve Products

In processing the orders it is required that the correct set of items in the order need to be retrieved.

Package Order

Each order needs to packaged appropriately for shipping to the customer.

Ship Order, Set Access Right, or Email License

Send out the packaged products to the client if to be mailed physically or if to be unlocked directly or by emailed licenses. The shipping is determined by the user preference for shipping.

Manage Deliveries

A system for managing Deliveries is required for some products. This will allow orders placed to be delivered to the online users or to users or companies by mail In the case of orders for many products, the software or data will be downloaded to the user system or remote server. This process will manage the delivery.

Bill

Use Case: Bill—Bill for purchases made by corporate purchase order for large transactions, or for subscriptions.

Framework Sale and Distribution Process

A framework (or enterprise) sale can be initiated after customer log in. A menu of framework components from a catalog is displayed based on products available in the warehouse. Once the sale has completed, a framework CMMSYS is customized according to the configuration of the target host system, and the CMMSYS distributes the purchased framework components. The framework CMMSYS likewise may trigger the distribution of warehouse and administrative data, as shown.

CMMSYS information package Sale and Distribution Process

The result of the transaction is that one or more CMMSYS information packages become active on the user device or network. A user is prompted to log in. Like the framework process above, a user is presented with a menu of choices, here, CMMSYS choices, based on products available in the warehouse catalog. A CMMSYS information package is customized based on user selections and the configuration of the target host system. Controllers retrieve agents, plug-ins, or other components of the selected CMMSYS from the warehouse, via the distribution service, as described above with reference to framework components.

Services Sale Process

Services consist of standard consulting and are accomplished by contract.

Third Party Sales

Before a 3rd party service provider may supply CMMSYS information packages, and before the information packages will be available to a customer through e-commerce transactions (whether for framework or CMMSYS), as described above, the 3rd Party CMMSYS information package must be completed and certified.

Generate Control Transactions

Licensing and Information Categorization and Retrieval for Infrastructure

All users of the user interfaces of the system should be registered to move beyond the basic informational elements of the websites of the system. All devices that connect to framework components must be registered and known by the components to which they connect.

All Infrastructure components must be sanctioned to serve as a component of the system framework other than 'external devices'. The sanctioning process is distinct from the licensing process as it applies to the operation of a certain framework component on a certain device.

All CMMSYS information package components should be installed on devices that are covered under a proper license for the CMMSYS information package to operate or to be deployed.

Manage Provisioning, IDs, and Digital Rights

Use Case: Manage Provisioning, IDs, and Digital Rights.

Fulfill Subscriptions

Use Case: Fulfill Subscriptions.

CMMDB Administration Ontology Backup and Security Deployment and Provisioning Management Managing Ideas Keep track of information about ttxs of interest or to share some set of the information with others. This includes the indexing of information resources against the tracking categories, the use of the categories of ttxs in analysis, etc.

Asset Management

Manage ownership rights for information assets.

Assign Permissions to Control the use of Data

Use Case: Assign Permissions to Control the use of Data—Enter security and access control information for various data.

The access rights information may be set by the creator of a ttx or by an administrator. The user edits an Access List for enforcing access control for the information. The Access List is structured around the individual, role, or system function.

Synchronize Access Rights across Users and Systems

Use Case: Synchronize Access Rights across Users and Systems—Maintain control and consistency of data that is moved between standalone systems, to ensure interactivity between users or accounts with different permissions and data.

Manage Sharing and Access

Use Case: Manage Sharing and Access.

Manage Roles

Use Case: Manage Roles.

Administer Categorization scheme

Use Case: Administer Categorization scheme.

Make Merge Decisions in Workflow

Use Case: Make Merge Decisions in Workflow—Make decisions regarding apparent overlapping of tpxs when submitting local data to the CMMDB.

It is possible that information in a local CMMDB becomes out of sync with data in the central CMMDB in a way that a tpx in the local CMMDB becomes seriously redefined by the central system users between submissions and the concurrent synchronization process. This process provides a controlled method for repairing the problems. Other problems that may arise due to changes at either the local or the central CMMDB include txos that have been split, txos that represent the same tpx but have been added to each ontology between submissions and have different identities, names, or parent relationships.

Manage Communities

Use Case: Manage Communities.

Manage Consortiums and Investment Negotiations

Use Case: Manage Consortiums and Investment Negotiations.

Manage Innovation Investment Pool

Use Case: Manage Innovation Investment Pool.

Manage Export/Import

Use Case: Manage Export/Import.

Manage Editorial Board and Content Approval Workflows

Use Case: Manage Editorial Board and Content Approval Workflows.

Manage Game

Use Case: Manage Game.

Innovation process

Setup Innovation System

Initial Tcept Loading

Use Case: Initial Tcept Loading.

Fields of science, scientific taxonomies, and existing patent categories are entered as cnxpts, and the classification relationships are entered as relationships between the categories represented by the cnxpts. Follow the procedure in "Add a Taxonomy", creating "Patent Classification Associations" between the taxonomy categories where given by external patent classification indexes. Follow the procedure in "Load Tcepts from Patents", creating patent related information resource references, tcepts and relationships.

Load Tcepts from Patents

Use Case: Load Tcepts from Patents.

Load Patents and create irxts for each. Patents and other information resources, which are already categorized based upon external patent classification indexes, are entered, represented by irxts, related as new occurrences of the txpts representing those tcepts the patents define, and the txpts are related to the cnxpts representing the categories the patents are classified into, creating "Patent Classification Associations". Specific information regarding each patent will be added as attributes to the new irxts that will represent the patent. Author and inventor names and dates of invention or publishing will be added as attributes. The original patent material will be hyperlinked from the new information resource irxt by a locator. A 'PATENT' fxxt is assigned for those information resource irxts. All patent irxts will be given a scopx based upon the country issuing the patent or accepting the application (or the PCT receiving office). [See Procedure—CREATE Irxt] If no txpt has been created for the patent specifically, a txpt is created and marked with a fxxt and source set according to the categorization index, with specific information regarding the patent added as attributes to the new txpt to show that the patent tcept is being represented by the txpt, and locking it as such by setting locked attributes for 'patent number' with the patent number, and 'claim type' to indicate that the txpt is representing a patent, each with a scopx for the country of the patent. (In one embodiment, where independent and dependent claims are also entered as represented by txpts, the claim number is set in a locked 'claim' attribute as well, and a locked 'claim type' attribute is set to indicate whether the txpt is representing an independent, or a dependent claim.) A description and name for the txpt is set from the irxt, and an occurrence relationship is created to the irxt. [See Procedure—CREATE Cnxpt from Irxt] Where a patent is categorized under multiple external patent classification indexes, or multiple categorizations within an index, the tcept generated from the patent is entered as a member for each of those categorizations, as represented by a cnxpt, and the hierarchical association is marked with a fxxt and source set according to the categorization index. [See Procedure—CREATE Occurrence to irxt]

Prior art material referenced by each patent or patent application is also analyzed, causing the creation of irxts. Specific information regarding each non-patent prior art document will be added as attributes to the new irxts that will represent the prior art. Author names will be added as attributes. Dates of publishing will be added as attributes. The original prior art material will be hyperlinked from the new information resource irxt by a locator. A 'PRIOR ART' fxxt is assigned for those information resource irxts. All non-patent prior art material irxts will be given a scopx based upon the country where first published, or the scopx assigned to the patent irxt for which the prior art is listed if the published location is unavailable. [See Procedure—CREATE Irxt] Prior art information resources, represented by irxts, are related as new occurrences of the txpts representing those txpts formed from the patents on which the prior art is listed. [See Procedure—CREATE Occurrence to irxt]

Other relationships are also created automatically between patent irxts and between irxts and existing cnxpts, or will be saved in [RAW REFERENCE] properties to be connected at a later time.

Citations in a patent to other patents cause the creation of "prior art citation relationships" with high (if citing document is a patent application) or very high (if citing patent is issued) weights. Citations in a patent to other prior art cause the creation of "prior art citation relationships" with high weight. [See Procedure—CREATE Information Resource Citation Relationship]

Ttx citation (cited-citing) associations are not created based upon this circumstance. A hierarchical association called an "imputed cnxpt citation association" is automatically created between cnxpts based upon information resource citations, in preparation for map generation.

In one embodiment, irxts representing each independent claim will be created [See Procedure—CREATE Irxt] In one embodiment, txpts representing the tcept of each independent claim will be created. [See Procedure—CREATE Cnxpt from Irxt] In one embodiment, irxts representing each independent claim will be related back to the tcept of the independent claim as an occurrence. [See Procedure—CREATE Occurrence to irxt] The irxt of the independent claim will be related back to the parent patent irxt by an "independent claim irxt relationship". [See Procedure—CREATE Information Resource Citation Relationship] For efficiency, the txpt of the independent claim will be related back to the parent patent txpt by an immediately imputed "independent Claim Association" based upon the "independent claim irxt relationship". [See Procedure—IMPUTE Relationship immediately]

In one embodiment, irxts representing each dependent claim will be created, recording the order of the dependent claim within the independent claim [See Procedure—CREATE Irxt] In one embodiment, txpts representing the tcept of each dependent claim will be created. [See Procedure—CREATE Cnxpt from Irxt] In one embodiment, irxts representing each independent claim will be related back to the tcept of the independent claim as an occurrence. [See Procedure—CREATE Occurrence to irxt] The irxt of the dependent claim will be related back to the independent claim irxt by a "dependent claim irxt relationship". [See Procedure—CREATE Information Resource Citation Relationship] For efficiency, the txpt of the dependent claim will be related back to the independent claim txpt by an immediately imputed "dependent Claim Association" based upon the "dependent claim irxt relationship". [See Procedure—IMPUTE Relationship immediately]

Other Ttx citation (cited-citing) associations are not created based upon this circumstance unless the abstract used to create a txpt description specifically cites another cnxpt in this system. An imputed hierarchical association called a "imputed cnxpt citation association" is automatically created between cnxpts based upon citations in the occurrences generated here, in preparation for map generation.

Load Tcepts

Use Case: Load Tcepts.

For each record of or document regarding a tcept, follow the procedure in "Import Ttxs", setting the infxtypx of the cnxpt info-items to be a txpt.

Use Case: Load Appcepts.

For each record of or document regarding an appcept, follow the procedure in "Import Ttxs", setting the infxtypx of the cnxpt info-items to be a axpt.

Define Template for Tcept Extension Suggestion

Use Case: Define Template for Tcept Extension Suggestion.

Learn/Seek in Innovation System

View Categorization Map of Technology

Use Case: View Categorization Map of Technology—Uncover information about a ttx previously not understood by the user by viewing visualizations of maps.

This provides a well-organized database of tcepts usable for analysis, invention, prediction, and investment. The collection of descriptions of tcepts and the thoughts of inventors and science fiction writers, etc. regarding those tcepts are available through the map.

Learn How Technologies Work

Use Case: Learn How Technologies Work—Uncover information about a ttx previously not understood by the user.

Track Invention Improvements

The system must remember conceptual contributions as separate conceptual additions to provide for security and attribution.

To measure the pace of innovation, the quantity of new innovation events of a certain level of quality in each period is captured. The common element of these is the classification structure. To accomplish empowerment at the same time, the mechanism has to provide a value such as a framework for where innovation is important, where money is being directed toward innovation, etc.

A classification structure is useful for competitive evaluation, prior art searching, and self-evaluation of ttxs. The navigable classification provides serendipitous discovery while allowing a familiar basis for making changes.

Search for Interesting Tcepts

Use Case: Search for Interesting Tcepts—Check out what technology will be like in future.

Another objective is to keep updated with current technology market trends.

Searching for Comparable Tcept

Use Case: Searching for Comparable Tcept—Find a tcept that is similar to the one in hand to check suitability to meeting an appcept's requirements.

Locate Products

Use Case: Locate Products—Locate specific technological products or services to deliver a specific appcept.

Find Product Idea

Use Case: Find Product Idea.

Check Viability

Use Case: Check Viability.

Find Potentials/Check Roadblocks

Use Case: Find Potentials/Check Roadblocks.

Invention Checking

Use Case: Invention Checking—Check the novelty and the non-obviousness of one's own invention.

Check Novelty/Existence

Use Case: Check Novelty/Existence.

Check Well-formedness and Meaningfulness

Use Case: Check Well-formedness and Meaningfulness.

Locate Expertise

Use Case: Locate Expertise—Locate specific technological expertise or services.

In one embodiment, provide a way of characterizing certain contracts to illustrate specific expertise.

Check Competition

Use Case: Check Competition.

Add and Refine in Innovation

Innovating involves:

Participation in the extension of tcepts.

Stating, naming, or describing incremental improvements to previously described tcepts.

Entering new appcepts and their requirements and benefits needed.

Finding gaps between existing tcepts and previously described appcepts.

Conjuring Tcepts

Use Case: Conjure Tcept—Think up a tcept.

(Task is Performed by User outside of system.)

This consists of a user thinking up a tcept of some nature before looking for it in the CMMDB or entering a query to find it.

Use Case: Conjure Appcept—Think up an appcept.

(Task is Performed by User outside of system.)

This consists of a user thinking up an appcept before looking for it in the CMMDB or entering a query to find it. An appcept might start with a requirement.

Concretizing Tcepts

In one embodiment, this process is a specialization of the process for description of ttxs as above. Many aspects of the processes here are similar to those above and these processes inherit those similarities unless a specialization or differentiation is stated here.

Use Case: Concretize New Tcept Manually—Create, or concretize a tcept by instantiating a txpt in the CMMDB ontology.

The txpt represents an idea in a user's mind that may or may not be real, and may or may not have been defined previously. [See Procedure—CREATE Cnxpt]

Enter Science Fiction Imagination

Use Case: Enter Science Fiction Imagination—Add information to the CMMDB regarding an imagined appcept or an imagined tcept itself.

This sort of 'crazy' information provides an 'outer bound' for other horizons. [See Procedure—CREATE Cnxpt]

Create a Tcept by Investment

Use Case: Create a Tcept by Investment—Add a new tcept by creating a new portfolio investment centered on a tcept not yet entered.

[See Procedure—CREATE Cnxpt]

Create a Tcept by Requesting Services

Use Case: Create a Tcept by Requesting Services—Form a tcept by completing an application for patent agent services, to be provided in connection with a ttx or tcept not yet in the CMM.

[See Procedure—CREATE Cnxpt]

Create a Ttx by Registering

Use Case: Create a Ttx by Registering—Form a tcept by completing a registration for a 'registry', in connection with a ttx or tcept not yet in the CMM.

[See Procedure—CREATE Cnxpt]

Create a Tcept by Adding Feature

Use Case: Create a Ttx by Adding Feature—Form a ttx by entering an unassociated feature, and listing a name of a tcept that it should be associated with but is not yet in the CMM.

[See Procedure—CREATE Cnxpt]

Create an Appcept by Adding Requirement

Use Case: Create a Ttx by Adding Requirement—Form an Appcept by entering an unassociated need or requirement, and listing a name of an Appcept that it should be associated with but is not yet in the CMM.

[See Procedure—CREATE Cnxpt]

Add a Patent Link

Use Case: Add a Patent Link—Coalesce into the CMM a reference to a Patent describing a ttx not previously in the CMM, connecting the linked information to the ttx as an occurrence.

In one embodiment, also add information resources for the patents and prior art which the newly linked patent cites or references to obtain a hierarchy of linked information resources.

Describing Tcepts

Specify a tcept more deeply by adding a name, description, information resources, or stating attribute values. Where a user enters additional descriptive information not intended to edit or correct the present information, it is considered a variant and is a vote. Each edit of an attribute of the description is a vote, and votes are tallied by the system to come up with the actual consensus description seen by public users. Users who have the appropriate access rights can filter or add weight to the votes that they have entered.

Use Case: Describe Tcept—Add information to the description in a txpt, or add a vote to change, make an addition to, add a variant of, or delete information from a description in the txpt.

Descriptions should not contain information provided as characteristics in attribute values, purlieus, or in cncpttrrts for the tcept. Information that may be used in a description includes but is not limited to:

What is the tcept?

What are the parts of the tcept?

How does the tcept work?

Enter Characteristics and Attributes for Tcepts

Specify a tcept more deeply by adding a name or stating attribute values.

Use Case: Name a Tcept—Enter a name for a tcept.

Further voting may alter the name.

Tcept names are optional and not required.

Names may be entered in multiple languages, and each may be voted upon as a variant.

Names may be viewed in multiple languages and displayed according to the language the user has selected.

Use Case: State the Attributes of a Tcept—State to the CMMDB that a txpt has a certain characteristic by stating that it has a value for an attribute by which the characteristic can be described.

Attributes of an tcept include but are not limited to:

Who named the tcept

Who invented the tcept

Concretizing Appcepts

In one embodiment, this process is a specialization of the processes for description of ttxs and tcepts as above. Many aspects of the processes here are similar to those above and these processes inherit those similarities unless a specialization or differentiation is stated here.

Use Case: Concretize New Appcept Manually—Create, or concretize an appcept by instantiating a new axpt in the CMMDB ontology.

The axpt represents an idea in a user's mind that may or may not be possible to provide, and may or may not have been defined previously, for an appcept.

Use Case: Describe an Appcept—Add information to the description in an axpt, or add a vote to change, make an addition to, add a variant of, or delete information from a description in the axpt.

Information that may be used in a description includes but is not limited to:

The appcept

What are the parts required of the appcept

How the appcept must work

What the general characteristics of the appcept are.

Enter Characteristics and Attributes for Appcepts

Specify an appcept more deeply by adding a name or stating attribute values.

Use Case: Name an Appcept—Enter a name for an appcept.

Further voting may alter the name.

Appcept names are optional and not required. Names may be entered in multiple languages, and each may be voted upon as a variant. Names may be viewed in multiple languages and displayed according to the language the user has selected.

Use Case: State the Attributes of an Appcept—State to the CMMDB that an appcept has a certain characteristic by stating that an axpt has a value for an attribute by which the characteristic can be described.

Attributes of an appcept include but are not limited to:

Who first stated the appcept

When the appcept was first stated

Who named the appcept.

Incrementally Innovate

Use Case: Incrementally Innovate—Extend a ttx by, including, but not limited to: 'subdividing' it to, for instance, refine the ttx by splitting its cnxpt into two cnxpts; 'incrementally innovating' an offshoot of it.

Incrementally Innovate by Composition

Use Case: Incrementally Innovate by Composition—Extend a ttx by compositing, combining the idea of the ttx of one cnxpt with another cnxpt's ttx to 'converge' (form or integrate) a new ttx.

Categorizing of Innovation

Provide a structure for analyzing tcepts which are somehow comparable or derivative; Specifically, to organize the comparison by 'application' or some feature or purpose so that metrics can be derived from information specifically 'attached to', 'associated with', or 'concerning' the tcepts. This is really a step above the sale of the categorization scheme.

Distinguish Tcepts

Use Case: Distinguish Tcepts—Manually distinguish tcepts by stating, including but not limited to: distinguishing cncpttrrts, differing descriptions.

Subdivide Tcept

Use Case: Subdivide Tcept—Manually distinguish tcepts by subdividing a tcept into three, one being a category tcept encompassing two new tcepts which are differentiated; or into two, where a new tcept is derived from the original.

Categorize a Tcept

Use Case: Categorize a Tcept—Enter a vote to place a txpt into a category.

Use Case: Subtype a Tcept—Enter a vote to make a txpt a subtype of another tcept.

Use Case: Mark a Tcept as a Successor—Enter a vote to make a txpt a successor of another tcept.

Use Case: Mark a Tcept as a Discontinuous Successor—Enter a vote to make a txpt a successor of another tcept, showing that the successor is a major change in technology meeting the requirements of the same appcept.

Create a "user suggested—ttx placement location association" hierarchical association between two txpts within one or more stated fxxts.

Optionally enter the appcept being satisfied by the discontinuous replacement.

The utility of this categorization process is that it provides a structure for analyzing tcepts which are somehow comparable or derivative; specifically to organize the comparison by 'appcept' or some feature or purpose so that metrics can be derived from information specifically 'attached to', 'associated with', or 'concerning' the tcepts.

A tcept may be categorized into zero or more distinct taxonomies, into the same taxonomy as a sub-tcept of different parents, and may stand alone.

Concretize a Tcept while Categorizing a Tcept

Use Case: Concretize a Tcept as a Member of a Category—Create a txpt while in a second txpt and enter a vote to categorize the txpt as being in a category.

Use Case: Concretize a Tcept as a Subtype of a Tcept—Create a txpt while in a second txpt and enter a vote to make it a subtype of the second txpt.

Use Case: Concretize a Tcept as a Successor—Create a txpt while in a second txpt and enter a vote to make it a successor of the second txpt.

Categorize Owned Intellectual Property

Use Case: Categorize Owned Intellectual Property—Categorize Intellectual Property for management of IP Portfolios in relation to the IP of other owners.

State Similarity between Tcepts

Use Case: State Similarity between Tcepts—Enter a vote to state that one tcept is similar to another tcept in a particular way by specifying one of the available forms of affinity.

Categorize an Appcept

The utility of this categorization process is that it provides a structure for analyzing appcept which are somehow comparable or derivative; specifically to organize the comparison by 'application family', 'application domain', or some need so that metrics can be derived from information specifically 'attached to', 'associated with', or 'concerning' the appcepts.

An appcept may be categorized into zero or more distinct taxonomies, into the same taxonomy as a sub-ttx of different parents, and may stand alone.

Use Case: Categorize an Appcept—State that an appcept should be categorized as being within a category represented by another txpt or axpt.

An appcept may be categorized into zero or more distinct taxonomies, into the same taxonomy as a sub-ttx of different parents, and may stand alone.

Use Case: Categorize an Appcept as a member of an Appcept Family—State that an appcept should be categorized as being within a appcept family as represented by another axpt.

State Similarity between Appcepts

Use Case: State Similarity between Appcepts—Enter a vote to state that one appcept is similar to another appcept in a particular way by specifying one of the available forms of affinity for appcepts.

Match Tcepts to Appcepts

Use Case: Match Tcepts to Appcepts—Inform the CMMDB on a manual, an assisted, or an automated basis by creating a 'satisfaction' affinitive association for the txpt to reference an axpt to represent that a tcept fulfills or satisfies an appcept.

The entry is a vote.

Match Requirements to Features

Use Case: Match Requirements to Features—Manually match requirements to tcept features.

Connect Tcepts to Appcepts as Meeting Requirements

Use Case: Connect Tcepts to Appcepts as Meeting Requirements—Manually state that an association to an axpt in the CMMDB should exist from the txpt under consideration (indicated or being described).

This relationship may also be implied by having all requirements of the appcept met by a set of features all provided by the same tcept.

Convert Txpt to Axpt

Use Case: Convert Txpt to Axpt—Enter a vote to change the nature of a txpt representing a tcept to an appcept to be thought of as a problem or axpt needing a solution rather than as a txpt providing a solution.

Convert Appcept to Tcept

Use Case: Convert Appcept to Tcept—Enter a vote to change the nature of an appcept to be thought of as a tcept providing a solution rather than as a problem needing a solution.

Move a Development Consortium to a New Ttx

Use Case: Move a Development Consortium to a New Ttx—Redirect the efforts of a consortium to a different ttx without reformation.

Access Management

Access to information about tcepts must be granted. The purpose of the system is to build a map of tcepts that users can utilize to be more effective at inventing and investing, so information protection is paramount. Set access rights for the research, use, and analysis of Patent related information Use Case: Set access rights for Patent Related Information—Allow Patent Professionals to control the research, use, and analysis of Patent related information that they own.

Share IP Portfolio Information with Others

Use Case: Share IP Portfolio Information with Others—Expose some of the information regarding the Intellectual Property owned with others who may wish to license it.

Share Research with Others Collaboratively

Use Case: Share Research with Others Collaboratively—Share a principal investigator's research with others or to obtain collaboration on the research from possibly unknown outsiders.

Further Define

Define Tcept Features

Use Case: Define Tcept Features.

Enter Information Resource for a Tcept

Use Case: Enter Information Resource for a Tcept—Supply information resources to the CMMDB on a manual, an assisted, or an automated basis by creating an occurrence relationship for the txpt to reference an external information resource or an internal information resource that is imported to or held in a backend file system.

The information resource can be related to txpts already in the system or may be unrelated when first entered.

Use Case: Categorize Tcept by Relating Information Resources to the Tcept—Provide as a basis for the definition of a tcept or its categorization a series of information resources that somewhat define the tcept, represented by irxts.

Enter Information Resource for an Appcept

Use Case: Enter Information Resource for an Appcept—Supply information resources to the CMMDB on a manual, an assisted, or an automated basis by creating an occurrence relationship for the axpt to reference an external information resource or an internal information resource that is imported to or held in a backend file system.

The information resource can be related to appcepts already in the system or may be unrelated when first entered.

Use Case: Categorize Appcept by Relating Information Resources to it—Provide as a basis for a definition of an appcept a series of information resources, represented by irxts, that somewhat define the appcept by adding occurrence relationships to the axpt representing it.

Cncpttrrts of a Tcept

In one embodiment, this process is a specialization of the process for description of cncpttrrts above. Many aspects of the processes here are similar to those above and these cncpttrrt processes and trxrt info-items inherit those similarities unless a specialization or differentiation is stated here.

Cncpttrrts of a tcept include cncpttrrts that may be stated for ttxs in general.

Cncpttrrts of a tcept include features. Features are activities that the inventor believes the technology performs or that a normal user would expect the technology to perform. They describe the benefits to the user or the solutions provided in a functional architectural sense or a more detailed design feature or performance level.

Many tcepts may provide the same feature and thus the same cncpttrrt.

Use Case: State the Cncpttrrts of a Tcept—Add or edit cncpttrrts of a tcept to provide criteria for comparing tcepts.

Use Case: State the Features of a Tcept—Add or edit cncpttrrt (trait assertion) statements regarding the features of a tcept.

The features described include but are not limited to:

Functional Benefits

Product Features

Behavioral Features

Standards Met

Performance Levels Achieved

External Interfaces Provided

Physical Attributes

Quality Levels.

Use Case: Further Describe Feature—Describe a feature of a tcept.

Add or edit feature cncpttrrts useful for describing tcepts by adding a name, description, information resources, or stating attributes.

Use Case: Describe an Argument Regarding a Feature—Give a deeper explanation why a certain statement regarding a feature is as purported.

Cncpttrrts of an Appcept

In one embodiment, this process is a specialization of the processes for description of cncpttrrts of ttxs and tcepts above. Many aspects of the processes here are similar to those above and these cncpttrrt processes and trxrt info-items inherit those similarities unless a specialization or differentiation is stated here.

Cncpttrrts of an appcept include cncpttrrts that may be stated for ttxs in general and cncpttrrts that may be stated for tcepts.

Cncpttrrts of an appcept include requirements. These give a list of, including, but not limited to: problems that users would expect the tcept to solve, performance levels that must be achieved, the environment where the appcept must work, and the needs that must be met by the solution. They normally describe the component parts of the problem rather than the parts of the solution.

Many appcept may have the same requirement. In the case where a requirement exists and is to be met for two different appcepts, caution suggests that the requirement should be replicated but cross connection should be provided to show that a close similarity exists.

Cncpttrrt descriptions should be written at the abstract level and not be overly detailed relative to the level of description needed so that semantic distances can be calculated to obtain a rough match. Further descriptions can be added as notes.

Many appcepts may have the same requirement and thus the same cncpttrrt.

Use Case: State the Requirements of an Appcept—Add or edit requirement cncpttrrts of an appcept to provide criteria for comparing appcepts.

The requirements described include but are not limited to:

User Stated Functional Requirements

Product Functional Requirements

Functional Requirements

Business Requirements

Installation Requirements

Documentation Requirements

Solved Example Problem Requirements

Software Graphical User Interface (GUI) Requirements

Usability Testing Steps Guide

Environmental Requirements

Performance Requirements.

Use Case: Further Describe Requirement—Describe a requirement of an appcept.

Add or edit requirement cncpttrrts useful for describing tcepts by adding a name, description, information resources, or stating attributes.

Use Case: Describe an Argument Regarding a Requirement—Give a deeper explanation why a certain statement regarding a requirement is as purported.

Purlieus of a Tcept

In one embodiment, this process is a specialization of the process for description of ttx purlieus above. Many aspects of the processes here are similar to those above and these purlieu processes and purxpt info-items inherit those similarities unless a specialization or differentiation is stated here.

Purlieus of a tcept include purlieus that may be stated for ttxs in general. Purlieus of a tcept include timeframes of existence, or other contexts where the tcept existed or was known (e.g. 'Retro' or 'Iron Age').

Many tcepts may exist in the same purlieu.

Use Case: State the Purlieus of a Tcept—Add or edit purlieus of a tcept to provide criteria for comparing tcepts.

Purlieus of an Appcept

In one embodiment, this process is a specialization of the processes for description of purlieus of ttxs and tcepts above. Many aspects of the processes here are similar to those above and these purlieu processes and purxpt info-items inherit those similarities unless a specialization or differentiation is stated here.

Purlieus of an appcept include purlieus that may be stated for ttxs in general and purlieus that may be stated for tcepts.

Purlieus of an appcept include requirement deadlines and applicability timeframes.

Use Case: State the Requirement Deadlines of an Appcept—Add or edit requirement purlieus of an appcept to provide criteria for comparing appcepts.

Act on Selected Group of Tcepts

Use Case: Act on Selected Group of Tcepts—Display and pass control to Action Window for Groups of tcepts.

Act on Selected Group of Appcepts

Use Case: Act on Selected Group of Appcepts—Display and pass control to Action Window for Groups of appcepts.

Act on Specific Indicated Tcept

Use Case: Act on Specific Indicated Tcept—Display and pass control to Action Window for Single Tcept which is indicated as context by pointer.

Act on Specific Indicated Appcept

Use Case: Act on Specific Indicated Appcept—Display and pass control to Action Window for Single appcept which is indicated as context by pointer.

Add Information or Link Information to Tcept

Use Case: Add Information or Link Information to Tcept—Further describe a tcept by adding an occurrence relationship to connect information to it.

Add Information or Link Information to Appcept

Use Case: Add Information or Link Information to Appcept—Further describe a appcept by adding an occurrence relationship to connect information to it.

Opinions in Innovation

Register User's Interest in Tcept

Use Case: Register User's Interest in Ttx—Establish metrics for importance and potential use of tcepts.

Register User's Interest in Tcept

Use Case: Register User's Interest in Ttx—Establish metrics for market sizes for appcepts.

Enter Opinions Regarding a Tcept

Use Case: Enter Opinion on a Tcept—User enters their 'vote' on a certain tcept, and the votes are weighted according to the user's expertise or other factors.

The first vote entered about a tcept occurs during the entry process itself.

A non-specific vote as specified here implies that a user believes that the tcept has merit only in so far as it represents some tcept.

Additional vote types may be entered to state that a user has a more specific belief (as opposed to a fact or characteristic) regarding the tcept, including, but not limited to:

Date tcept is anticipated to become usable;

Value tcept is anticipated to provide

Number of units anticipated to be sold

Request Delete of Tcept

Use Case: Request Delete of Tcept—Request the deletion of a txpt.

Enter Opinions Regarding an Appcept

Use Case: Enter Opinion on an Appcept—User enters their 'vote' on a certain appcept, and the votes are weighted according to the user's expertise or other factors.

The first vote entered about an appcept occurs during the entry process itself, and is a non-specific vote implying that a user believes that the appcept has merit only in so far as it represents some appcept.

Additional vote types may be entered to state that a user has a more specific belief (as opposed to a fact or characteristic) regarding the appcept, including, but not limited to:

Value appcept is anticipated to provide

Number of units anticipated to be sold.

Request Delete of Appcept

Use Case: Request Delete of Axpt—Request the deletion of an appcept representing an axpt.

Voting on Importance of Txpts

Vote on the relative importance of a txpt compared to other txpts.

Use Case: Vote on the Importance of a Txpt—Enter a vote on the relative importance of a tcept representing a txpt compared to other tcepts.

Importance includes but is not limited to:

Importance to other txpts as a base of knowledge (stepping stone txpt);

Importance to society as a txpt that will fill a substantial need or solve a major problem;

Importance within a txpt family (among siblings, cousins, or of those txpts which may solve an appcept) as a better way to solve a problem.

Importance to the user, with a reason given when they wish to provide one.

Voting on Importance of Appcepts

Vote on the relative importance of an axpt compared to other axpts.

Use Case: Vote on the Importance of a Axpt—Enter a vote on the relative importance of an appcept representing an axpt compared to other appcepts.

Importance includes but is not limited to:

Importance to society as a axpt that will fill a substantial need or solve a major problem;

Importance within an axpt family as a better way to solve a problem.

Importance to the user, with a reason given when they wish to provide one.

Voting on Success of Tcepts

Use Case: Voting on Success of Tcepts—Obtain user estimates on the viability of a tcept.

The process involves registering a vote on the probability that a tcept will be realized and be available for use in a specified timeframe.

Vote on the Probability of Success of Tcept

Use Case: Vote on the Probability of Success of Tcept—Enter a vote on the probability that a tcept will become useful.

Vote on the Probability of Success of Appcept

Use Case: Voting on Success of Appcept—Obtain user estimates on the viability of the availability of tcepts fulfilling the requirements of an appcept.

The process involves registering a vote on the probability that an appcept will be realized as a successful product in a specified timeframe, without stating which tcepts may cause the success.

System Functions—Data Analysis and Categorization

Coalesce Tcepts

Use Case: Coalesce Tcepts—Combine tcepts proven to be equivalent.

Determine Semantic Similarities (such as Requirements met by Features)

Use Case: Determine Semantic Similarities (such as Requirements met by Features).

Execute Ttx Web Page Discovery Request

Use Case: Execute Ttx Web Page Discovery Request.

Perform Citation Based Ttx Categorization

Use Case: Perform Citation Based Ttx Categorization—Invoke the immediate calculation of imputed hierarchical associations for cnxpt positioning on a map.

Perform Reverse-Citation Based Ttx Categorization

Use Case: Perform Reverse-Citation Based Ttx Categorization—Invoke the immediate calculation of imputed hierarchical associations for cnxpt positioning on a map (Process reverse-citations in higher priority).

Perform External Classification Based Ttx Categorization Using External Classification Indices for Intellectual Property- Use Case: Perform External Classification Based Ttx Categorization Using External Classification Indices for Intellectual Property.

Execute Mining Analytic

Use Case: Execute Mining Analytic.

Generate IP Valuation Based Upon Analytic Based Metrics

Use Case: Generate IP Valuation Based Upon Analytic Based Metrics.

Generate Weighted Solution Tcept to Appcept Relationships

Use Case: Generate Weighted Solution Tcept to Appcept Relationships.

Execute Need Satisfaction Matching

Use Case: Execute Need Satisfaction Matching.

Assisted Creativity

Activate Suggestion Generation

Use Case: Activate Suggestion Generation.

System Functions—Assisted Creativity

Generate Suggestions for Purlieus

Use Case: Generate Suggestions for Purlieus.

Generate Suggestions for Cncpttrrts

Use Case: Generate Suggestions for Cncpttrrts.

Generate Template Based Candidate Suggestions for Cncpttrrts

Use Case: Generate Template Based Candidate Suggestions for Cncpttrrts.

Generate Template Based Candidate Suggestions for Tcept

Use Case: Generate Template Based Candidate Suggestions for Tcept.

Generate TRIZ Based Candidate Suggestions for Cncpttrrts

Use Case: Generate TRIZ Based Candidate Suggestions for Cncpttrrts.

Generate TRIZ Based Candidate Suggestions for Tcept

Use Case: Generate TRIZ Based Candidate Suggestions for Tcept.

Generate Invention Roadmap (intended inventions to pursue)

Use Case: Generate Invention Roadmap (intended inventions to pursue).

Generate Suggested Alternative Technology Pull-in Strategies with Geo-Aging

Use Case: Generate Suggested Alternative Technology Pull-in Strategies with Geo-Aging.

Generate Technology Horizon Forecast

Use Case: Generate Technology Horizon Forecast.

Study

Study Management

The utility of study management is that it provides a facility to attach to do lists, access lists, query scripts, views, reports, import scripts, etc. to a 'Study' object which acts as a project folder.

Launch Study—Establish Framework

Use Case: Launch Study—Establish Framework—Obtain a structure for assembling and tracking information regarding technology projects to achieve continuity of data.

Describe the study objectives, and select, define, or state the components and tools to be used to perform the study, including but not limited to: access controls, methodology, reports, outcomes, models, analytics.

Categorize Projects or Experience By Field

Use Case: Categorize Projects or Experience By Field—Organize a set of projects or subprojects by characterizing them by technology to illustrate specific expertise.

Define a Study—Establish Analysis Project

Define the Competitive Intelligence Project, allocate resources, establish a statement of work, and issue a quick plan for execution.

Use Case: Compare Tcepts—Compare competitive products within specific tcepts for any purpose.

Use Case: Competitive Tcepts Comparison—Competitive Intelligence comparison of (potential) products against what other companies have or MIGHT release.

Define a Report

Use Case: Define a Report—Define a parameterized static or dynamic report based upon one of the available templates.

The templates include but are not limited to static or dynamic captures of basic visualizations (maps or lists), result sets (or visualizations in general), etc. with customizable options for report display, as well as static printable snapshots of the data such as tables, charts, or graphs; or can also take the form of dynamic animations that can be delivered as Java applets so that non-users can interact with the data in a way that is easy for them to understand.

The utility of reporting is that it provides a means for generating dynamic and printing static reports based on result sets (or visualizations in general), with customizable options for report display.

Predefined Reports (i.e. by company/patent assignee, date, classification or Patent categorization codes, technology) may be provided.

Perform Analysis Study

Use Case: Perform Analysis Study—Launch secondary research—collect and organize data.

Where the purpose of the interaction for a study is directed, such as in a structured decision making process or a straight forward data analysis with a series of specific questions and answers, specialized tools are provided for methodology directed interaction. In these situations, the study is often taken on repetitively or the department performing the study often performs other similar studies. Also, the user actions are usually dictated by specific best practices stemming from the overall task and are more concrete and less exploratory in nature. In one embodiment, the system supports these best practices.

Initiate Analysis Cycle

Use Case: Initiate Analysis Cycle.

Reuse Analysis Structure

Use Case: Reuse Analysis Structure—Refine an analysis context and to and re-analyze context to derive up-to-date meaning, rather than to reconstruct or redefine it upon each new need.

Report Generation and Display

Use Case: Report Generation and Display—Display a report to convey findings.

The application also provides the ability to send visualizations as static or dynamic reports, where access to the underlying data is controlled by the established permissions.

Trend Analysis

Use Case: Trend Analysis—Display a comparison between past information and present situation beliefs or metrics.

State Action Plan to Act on new knowledge

Use Case: State Action Plan to Act on new knowledge—Form an action plan and execute action plan.

Modeling and Studies

Define Study—Describe Potential Outcomes

Use Case: Describe Potential Outcome—Define a condition equation for a result based upon specific variables attached to referenced cnxpts.

Specifically describe the expected or potential outcomes in terms of conditions which must be met based upon modeling rules.

Describing Modeling Rules

Describe Calculations and Operations in Modeling Rule Formulas

Use Case: Enter Txo Formulas for Calculations or Constraints—Enter formulas for calculations or constraints.

Use Case: Enter Relationship Formulas for Calculations or Constraints—Enter formulas for calculations or constraints.

Import of Modeling Rule Formulas

Formulas may be specified for Modeling Rules to be calculated during modeling based upon the CMMDB. Formulas from spreadsheets are convertible manually but generalizable where, including but not limited to: a spreadsheet cell has been used to represent a ttx having a specific role in a relationship and the formula is in another cell that represents a ttx having the role associated with the opposite end of a specific scopx and infxtypx of relationship; or where a cell represents a scopx and infxtypx of relationship, and the formula in that cell references two cells, each representing a ttx having a role in that relationship. Such formulas, when converted to operate on the elements of the ontology, are Modeling Rules attached to and calculating the values for the info-items to which they are attached. This construct provides a tool for the user to recalculate values on a global basis after construction of a what-if spreadsheet.

Some formulas may not be importable because of limitations of the spreadsheet tool or because of the limitations of the ontology, or because the formula cannot be converted because it lacks specificity when it is applied to the CMMDB ontology.

Manage, Analyze, and Visualize Owned Intellectual Property

Use Case: Manage, Analyze, and Visualize Owned Intellectual Property—Keep track of intellectual property owned in a portfolio or to share some set of the information with others.

This includes the indexing of information resources against the tracking categories, the use of the categories of txpts in analysis, etc.

Mine/Predict/Forecast Generation

Predicting Trends and Scenarios

Use Case: Predict Trends and Scenarios Regarding Contextual Areas of a Complex Environment—This is the process of using modeling on the CMM to predict trends and scenarios regarding contextual areas of a complex environment by first predicting the state of being of many related components in or near the same context of the overall environment.

Use Case: Predict the State of a Complex Environment—Predict the state of a complex environment by predicting the inception or state of its components in a model.

Use Case: Predict the State of the Components of a Complex Environment by Extrapolation—Predicting the state of the components of a complex environment by incremental extrapolation from predictions of its predecessors or from requirements as seen from successors by modeling.

System Functions—Prediction of Fruition, Satisfaction, or Outcome

Generate Prediction of when a Certain Need, Requirement, or Problem Will be Solved Use Case: Generate Prediction of When a Certain Need, Requirement, or Problem will be Solved.

Purlieu entered, previously collected, or imputed from the hierarchy of a taxonomy of applications of technology or matched technologies are converted to prediction timeframes, and summarized to create predictions for existence of technologies meeting the need stated at a given time. Competing technologies are primarily found by their matching of a large proportion of the need or requirement traits of the application of technologies, but are also found from those other 'children' of an ancestor of the technology, or those technology satisfying related applications of technology.

Generate Prediction of Who Might Invent a Tcept

Use Case: Generate Prediction of Who Might Invent a Tcept.

Generate this prediction by ordering a list of those able to invent and who have interest in the field and who will likely be active in the field at the anticipated time of innovation, and estimate probabilities based upon the levels found for the timeframes.

Generate Prediction of the Potential Ordering of Inventions Like this

Use Case: Generate Prediction of the Potential Ordering of Inventions Like This.

Purlieu entered, previously collected, or imputed from the hierarchy of a taxonomy of technologies in a fxxt, the purlieu of applicable TPLs, and the nature of information resources associated with the technology. The collected purlieu are converted to prediction timeframes, and predictions of likelihood of existence are generated and summarized to impute hierarchical precedence relationships between cnxpts, causing an additional set of associations upon which to base predictions for existence of technologies existing at a given time.

Generate Prediction of Future Investment Value

Use Case: Generate Prediction of Future Investment Value.

For the technologies likely to exist as being in each stage of development in a certain timeframe, the amount of investment likely for the technology area and the degree of interest shown in the technology are used to determine a distribution proportion for the technology. In addition, the amount of interest shown in applications of technology satisfiable by the technology is used to distribute the potential market value by timeframe of each technology to impute a probable investment by assuming a specific return on investment.

Generate Prediction of the Set of Tcepts that could Solve the Same Problem as a Given Tcept Use Case: Generate Prediction of the Set of Tcepts That Could Solve The Same Problem as a Given Tcept.

Using the predicted existence by timeframe above, the interest shown in the application of technology, the interest shown in and the rate of innovation in the TPLs as shown by TPL "conformance to science" relationships, the rate of commercialization in the area of technology, and the investment available by purlieu, a probability distribution is generated for each competing technology.

Generate Prediction of the Interest in Solving a Problem That a Tcept Might Solve Use Case: Predict the Interest in Solving a Problem That a Tcept Might Solve.

This prediction relies on the interest shown in applications of technology at various purlieu and the combination with the above predictions to generate probabilities for the competitive technologies at various timeframes, and then a summarization by the tcept for the timeframes.

Generate Prediction of Problems Not Addressed by Existing Tcepts

Use Case: Generate Prediction of Problems Not Addressed by Existing Tcepts.

The lack of traits matching requirements at the timeframe of the applicable purlieu is used to predict what will not be solved at given timeframe and thus the list of problems not addressed for the tcepts existing at that timeframe.

Generate Prediction of Satisfaction

Use Case: Generate Prediction of Satisfaction.

The prediction of when a certain need, requirement, or problem will be solved, coupled with minimum expectation metrics for what realistic satisfaction means provide a prediction of satisfaction timeframe.

Generate Prediction of Innovation Gap

Use Case: Generate Prediction of Innovation Gap.

The prediction of problems not addressed by existing tcepts is used along with the TPL matches to show what applications of technology are not solved, what technologies would likely be closest to a solution, and when the solution might be available if certain TPL improve or yield technology innovations.

Generate Prediction of Tcept Roadblock

Use Case: Generate Prediction of Tcept Roadblock.

The prediction of innovation gaps along with the TPL applicable show the TRIZ 'contradictions' or other gap indicators associated with the potential solutions for an application of technology.

Generate Prediction of Tcept Gestation

Use Case: Generate Prediction of Tcept Gestation.

This prediction stems from the above ordering of technology existence.

Enter Intellectual Property Valuation Estimate

Use Case: Enter Intellectual Property Valuation Estimate.

The prediction of a valuation depends heavily upon the prediction of value of a set of technologies, the existence timeframe for those technologies, the matching of the technologies to the specific patent or to other patents, the timing of the patent application, and the specifics of jurisdictions to determine the value a specific patent has.

Alternatively, estimates of the value of a technology, the value of a patent, or the value of the market of the technology of the patent are all useful for input and 'steering' of the predictor in a Bayesian approach.

Valuation of Technology

Use Case: Valuation of Technology—Calculate a tcept's value in relation to similar tcepts; or to see the market position of products based upon the tcept, appcept or tcept category.

The objective of technology valuation is to determine a monetary valuation of a group of tcepts being assessed by a user. Collected estimates of the value of a technology, the value of a patent, or the value of the market of the technology of the patent are used in a Bayesian approach, and combined with other analytical approaches. Valuation can be estimated by patent metrics such as invention importance, uniqueness, type and number of inventors, stage of prosecution, citations, etc. Market oriented valuation can be based upon the appcept purportedly solved, the number of requirements purportedly met, and/or the number of sales made or estimated of products in the technology group, etc. The use of the hierarchical structure of a fxxt taxonomy provides a collection tool for obtaining the impressions of users regarding realistic estimates of competition between technologies for refining the estimates over time.

Model the Value of Owned Intellectual Property

Use Case: Model the Value of Owned Intellectual Property—Calculate an IP Portfolio's value based upon tcepts held in it; to determine where the portfolio's IP each stand in relation to similar tcepts; or to see the market position of products based upon the IP.

The objective of technology valuation is to determine a monetary valuation of a group of tcepts owned by (or being assessed by) a user. Valuation can be estimated by patent metrics such as invention importance, uniqueness, type and number of inventors, stage of prosecution, citations, etc. Market oriented valuation can be based upon the appcept purportedly solved, the number of requirements purportedly met, the number of sales made or estimated, etc.

Enter Appcept Demand History or Projection

Use Case: Enter Appcept Demand History or Projection.

Mining

Search for potentially undiscovered markets

Use Case: Search for potentially undiscovered markets.

Mining for developable incomplete tcepts (roadblocks or 'slow hunches')

Use Case: Mining for developable incomplete tcepts (roadblocks or 'slow hunches').

Mining for past approaches that failed or were impractical (errors)

Use Case: Mining for past approaches that failed or were impractical (errors).

Mining for unsolved appcept (unmet needs)

Use Case: Mining for unsolved appcept (unmet needs).

Find tcept categories needing direction (general and specific information confused)

Use Case: Find tcept categories needing direction (general and specific information confused).

Mining for 'adjacent possibles' that can be connected

Use Case: Mining for 'adjacent possibles' that can be connected.

Mining for inefficiently or expensively solved appcept (poorly met needs)

Use Case: Mining for inefficiently or expensively solved appcept (poorly met needs).

Share and Commune in Innovation

The ability to form small Innovation Consortiums in the attempt to invent and patent a worthwhile idea has never been easier because each tcept potentially becomes the locus of an invention commune, with individuals joining by stating worthwhile additions to the description, diagrams, or claims that are voted on by the other members and tracked by the system. The negotiations regarding ownership are based upon the votes by the contributors and by the findings regarding novelty by the patent office. Patent preparation is eased by system staff that is licensed, and that is paid by investments from the contributors or others wishing to share in the ownership, or otherwise support the consortium.

Define Consortium

Use Case: Define Consortium.

Specify a description while creating a conxtv for the consortium.

Formation of Innovation Consortiums

Use Case: Form Innovation Consortium for Invention Tcept—Create a consortium for owning an invention represented by a txpt in the CMMDB.

Set Ownership of Consortium

Use Case: Set Ownership of Consortium.

Negotiate Consortium Incentive Plan

Use Case: Negotiate Consortium Incentive Plan.

Incentives offered to users will promote the building of the information base and will have the added benefit of establishing an important second business model of cooperative preparation for technology patenting with shared, negotiated ownership rights.

Negotiate into Consortium

Use Case: Negotiate into Consortium—Formally participate to make worthwhile additions to the description, diagrams, or claims that are voted on by the other members and tracked by the system.

The negotiations regarding ownership are based upon the votes by the contributors and by the findings regarding novelty by the patent office. Another utility of this process is that it may promote and enable patent preparation services by system staff which is licensed, and which is paid by investments from the contributors or others wishing to share in the ownership.

Participate in Innovation Consortium

A user may join into the group involved in defining a novel technology. The user will be welcomed or rejected based upon his contribution, and user contributions are remembered as a separate conceptual addition so that the members of the group may not ‘steal’ the conceptual addition.

Use Case: Joint Preparation for Technology Patenting—Joining into a collaboration for cooperative preparation for technology patenting with shared, negotiated ownership rights.

Form small Innovation Consortiums in the attempt to invent and patent a worthwhile idea.

Participate in the Extension of a Tcept in a Consortium

Use Case: Participate in the Extension of a Tcept in a Consortium—Participate in the extension of a tcept within the consortium to state, name, or describe incremental improvements to previously described tcepts.

Use Case: Suggest a Modification of a Tcept Controlled by an Innovation Consortium—Attempt to contribute a new idea to a consortium that is related to or is a modification of the tcept controlled by the consortium.

Use Case: (Re)Request Share of Innovation Consortium for Making Contribution—Request a specific share of ownership for making a specific intellectual contribution to a consortium.

This process will be repeated (request proportion may be revised) until a counter offer and a request match up to become an acceptable deal.

This process provides an ability to bid on a portion of the proceeds from a patent on a tcept controlled by a consortium. The investment is risky even if only an intellectual thought is being added because the thought might be useful on another tcept or by itself as a tcept. The involvement in the invention as an inventor will not grant the right to use the tcept without licensing under the patent.

Vote on Adding New Contributor to Innovation Consortium

Use Case: Vote on Adding New Contributor to Innovation Consortium—Vote whether to allow a contributor into the consortium to which they have contributed some new conceptual addition.

If a contributor is voted in, then they will be named on any patent or disclosure as an inventor of the tcept.

If the contributor is voted out, then they will have a record retained by the system of their contribution and of the fact that they could have been considered an inventor, but were rejected. This could be used to prove that they should have been an inventor. They will be informed of appropriate patent prosecution actions for the patent work and any patent agent working on the patent based upon the tcept will be informed of their contribution. Also, their contribution will be a basis for a new tcept because it is ‘differentiable’ by their contribution from the tcept formed within the consortium.

Accept Contributions to an Innovation Consortium's Tcept

Determine acceptability and value of a contribution to a consortium surrounding a tcept.

Vote on Allocation of Ownership to Contributor

Use Case: Vote on Allocation of Ownership to Contributor—Vote to accept a contribution of a conceptual addition into the consortium's tcept at a bid amounting to an ownership proportion for the distinct addition.

The lowest percentage agreed to forms a counter offer to the contributor for the contribution.

This process will be repeated (bid may be revised) until an a counter offer and a bid match up to become an acceptable deal.

Each new contribution requires the reassessment of ownership. The ownership reassessment affects only the ownership proportion owned by the technical contributors if any investments of money have been made. In other words, the monetary investment proportion does not get diluted by new technical contributions.

This process provides an ability to bid on a portion of the proceeds from a patent on a tcept controlled by a consortium. The investment is risky. The investment will not grant the right to use the tcept without licensing under the patent.

Cooperate to Define

Use Case: Cooperate to Define.

Cooperate to Design

Use Case: Cooperate to Design.

Cooperate to Build

Use Case: Cooperate to Build.

Cooperate on Investment Offering and Negotiation

Use Case: Cooperate on Investment Offering and Negotiation.

Obtain Assistance in Offering Consortium for Investment

Use Case: Obtain Assistance in Offering Consortium for Investment.

Publish Consortium Offering Statement

Use Case: Publish Consortium Offering Statement.

Vote on Allocation of Ownership to Investor

Use Case: Vote on Allocation of Ownership to Investor—Vote to accept an investment into the consortium at a bid amount and price per ownership proportion basis.

The lowest percentage agreed to forms a counter offer to the bidder. This process will be repeated (bid may be revised) until an a counter offer and a bid match up to become an acceptable deal.

This is similar to voting to accept a purchase of shares in a mutual fund by an investor offering a specific amount for a specific percentage of the ownership of the mutual fund.

Each new investment requires the reassessment of ownership, and the vote is granted to all consortium contributors and investors but a response must be made to enter a vote within a specific period of time. The monetary investment proportion does not get diluted by new technical contributions.

Provide Services

Advertise

Use Case: Advertise Products—Advertising specific products which deliver a tcept or satisfy requirements for a specific appcept.

Advertise Expertise

Use Case: Advertise Expertise—State the availability and location of specific technological expertise on a tcept.

Advertise Opportunity

Use Case: Advertise Opportunity—Advertising specific need for a tcept, stating requirements as is done for a specific appcept.

Advertise Solution

Use Case: Advertise Solution—Advertising specific tcept which will satisfy requirements for a specific appcept.

Locate Solutions

Use Case: Locate Solutions—Search for a specific tcept which will satisfy requirements for a specific appcept.

Negotiate License
Use Case: Negotiate License.
License Intellectual Property
Use Case: License Intellectual Property.
Purchase Intellectual Property
Use Case: Purchase Intellectual Property.
Sell Intellectual Property
Use Case: Sell Intellectual Property.
Watch Shared Analyses
Use Case: Watch Shared Analyses.
Share Analyses
Use Case: Share Analyses.
Serve Tcept Categorizations
Use Case: Serve Tcept Categorizations.
Product Planning Process
Company/Competitor Profile
Define Company/Competitor Profile
Use Case: Define Company/Competitor Profile.
Identify Core Asset
Use Case: Identify Core Asset.
Identify Strategic Investment Direction
Use Case: Identify Strategic Investment Direction.
Application Requirements Management
Define Appcept Domain
Use Case: Define Appcept Domain.
Define Appcept Requirement
Use Case: Define Appcept Requirement.
Weight Match of Core Assets to Requirements
Use Case: Weight Match of Core Assets to Requirements.
Weight Match between Core Assets and Competitive Factors
Use Case: Weight Match between Core Assets and Competitive Factors.
Product Line Planning
Define Product Line
Use Case: Define Product Line.
Define Product Line Committed Milestone
Use Case: Define Product Line Committed Milestone.
Define Roadmap
Use Case: Define Roadmap.
Identify Criticality of Requirements to Product Line
Use Case: Identify Criticality of Requirements to Product Line.
Relate Product Line to Appcept Domain
Use Case: Relate Product Line to Appcept Domain.
Relate Product Line to Technology Alternative
Use Case: Relate Product Line to Technology Alternative.
Specify Criticality and Timeline for Technology Use in Product Line
Use Case: Specify Criticality and Timeline for Technology Use in Product Line.
Suggest Technology Alternatives for Product Line
Use Case: Suggest Technology Alternatives For Product Line.
Phase Anticipated Variations over Product Line Lifetime
Use Case: Phase Anticipated Variations over Product Line Lifetime.
Model Product Line
Use Case: Model Product Line.
Manage Product Line
Use Case: Manage Product Line.
Product Planning
Define Product Candidate
Use Case: Define Product Candidate.
Identify Criticality of Requirements to Product
Use Case: Identify Criticality of Requirements to Product.
Define Variation Requirement
Use Case: Define Variation Requirement.
Phase Anticipated Variations over Product Lifetime
Use Case: Phase Anticipated Variations over Product Lifetime.
Suggest Variation
Use Case: Suggest Variation.
Relate Product to Technology Alternative
Use Case: Relate Product to Technology Alternative.
Specify Criticality and Timeline for Technology Use in Product
Use Case: Specify Criticality and Timeline for Technology Use in Product.
Suggest Technology Alternatives for Product
Use Case: Suggest Technology Alternatives For Product.
Phase Product Feature Integration
Use Case: Phase Product Feature Integration.
Weight Match of Features to Requirements
Use Case: Weight Match of Features to Requirements.
Weight Match of Core Assets to Features
Use Case: Weight Match of Core Assets to Features.
Estimate Associated Costs
Use Case: Estimate Associated Costs.
Enter Demand History or Projection
Use Case: Enter Demand History or Projection.
Enter Valuation Estimate of Feature
Use Case: Enter Valuation Estimate of Feature.
Generate Product Roadmap
Use Case: Generate Product Roadmap.
Generate Technology Roadmap
Use Case: Generate Technology Roadmap.
Generate Product Comparison
Use Case: Generate Product Comparison.
Model Product Roadmap Valuation
Use Case: Model Product Roadmap Valuation.
Generate Competitive Product Technology Comparison
Use Case: Generate Competitive Product Technology Comparison.
Generate Feature Change Sensitivity Analysis
Use Case: Generate Feature Change Sensitivity Analysis.
Product Management
Product Feature Discovery
Use Case: Product Feature Discovery—Discover potentially beneficial undiscovered connections between appcepts and the tcepts that may meet the requirements.
Define Available Product
Use Case: Define Available Product.
Enter/Import Product Information
Use Case: Enter/Import Product Information.
Enter/Import Product Sales Volume Information
Use Case: Enter/Import Product Sales Volume Information.
Competitive Profitability Comparison
Use Case: Competitive Profitability Comparison.
Competitive Analysis and Environmental Scanning Process Competitive Intelligence is a formalized, yet continuously evolving process by which the management team assesses the evolution of its industry and the capabilities and behavior of its current and potential competitors to assist in maintaining or developing a competitive advantage. An attempt is made to ensure that the organization has accurate, current information about its competitors and a plan for using that information to its advantage CI traditionally uses public sources to find and develop information on competition, competitors, and the market environment without business espionage or other illegal means.

Effective implementation of a company's CI Program (CIP) requires not only information about the competitors, but also information on other environmental trends such as industry trends, legal and regulatory trends, international trends, technology developments, political developments and economic conditions. The relative strength of the competitor can be judged accurately only by assessing it with respect to the factors listed above. In the increasingly complex and uncertain business environment, the external factors are assuming greater importance in effecting organizational change. Therefore, the determination of CI information needs is based upon the firm's relative competitive advantage over the competitor assessed within the 'network' of 'environmental' factors.

The competitive intelligence information obtained can be used in programs that supplement planning, mergers and acquisitions, restructuring, marketing, pricing, advertising, and R&D activities.

Competitive Analysis Research Tasks

The purpose of a CIP is to gather accurate and reliable information under cost constraints. The groundwork for the CIP is done through audits and studies. Traditionally, relevant data was gathered from the organization's own sales force, customers, industry periodicals, competitor's promotional materials, own marketing research staff, analysis of competitor's products, competitor's annual reports, trade shows and distributors. Specific CIP techniques included querying government resources and online databases, selective surveys of consumers and distributors about competitor's products, on-site observations of competitor's plant or headquarters, "shadowing" the markets, conducting defensive CI, competitive benchmarking, and reverse engineering of competitor's products and services.

The objective of the CIP is to gather relevant information that is valid and accurate. Incomplete or inaccurate information may jeopardize the organization's CI efforts. This collected information has been difficult to maintain, and loses currency quickly, showing that reuse and collaborative efforts for update would be highly valuable if done properly. Associations have often performed this collaborative function.

With a CMM, collection is greatly simplified where the organization for the study is structured along the lines of the categorization structure of the CMM, and the collected results will be shared by many users and customers out of their own need to reduce costs, or sold as Disaggregated Data DataSets.

CI is also more efficient here because the user may be able to see information already collected and catalogued by others within their area of search. They could easily see entries made by others about a competitor that would not be locatable by keyword search but are available for impulse retrieval.

Competitive Analysis Studies

Analysts will use the Project Study process to prepare to inform management about their competitors. They will use the information in the system, but they will also use the system to search for new information and to categorize information for their study. The collected information may be marked as internal use only, and as such will not be collected back into the central CMMDB until they release it, Exports of the categorization structure can provide content for the analyst's report. It can also be used to form the basis of spreadsheet analysis. The fxxt oriented ontology database and the calculation facilities of the system can be used for data manipulation and analysis, and provide export of formulas as well as data for use in spreadsheets.

The data abstraction layer and import facility can be used to obtain data from external sources for inclusion in the system's calculations and analysis.

Define Competitive Trend Study Objective

Use Case: Define Competitive Trend Study Objective—Find trends in specific markets.

Repetitively collect competitive product data, study the data for changes, and update findings.

Search for Comparable Tcept

Use Case: Search for Comparable Tcept—This process includes searching for preexisting tcepts.

Define Competitive Analysis Research Objective

Use Case: Define Competitive Analysis Research Objective.

Launch Competitive Analysis Research

Use Case: Launch Competitive Analysis Research.

Sponsor surveys

Use Case: Sponsor surveys.

Import external competitive analysis information

Use Case: Import external competitive analysis information.

Manage Competitive Analysis Study Repository for Reuse

Use Case: Manage Competitive Analysis Study Repository for Reuse.

Sponsor scanning projects

Use Case: Sponsor scanning projects.

Methodology Based Environmental Scanning Design

Define Environmental Scanning Methodology

Use Case: Define Environmental Scanning Methodology.

Define Environmental Scanning Methodology Procedure Step (stating principals and rules)

Use Case: Define Environmental Scanning Methodology Procedure Step (stating principals and rules).

Define Environmental Scanning Analytic

Use Case: Define Environmental Scanning Analytic.

Define Scanning Alert Template

Use Case: Define Scanning Alert Template.

Define Scanning Term with Importance

Use Case: Define Scanning Term with Importance.

Assign Scanning Importance to Dxo

Use Case: Assign Scanning Importance to Dxo.

Assign Scanning Importance to Txo

Use Case: Assign Scanning Importance to Txo.

Assign Scanning Importance to Area of Interest

Use Case: Assign Scanning Importance to Area of Interest.

Methodology Based Environmental Scanning Automation

Assign Environmental Scanning Methodology Step

Use Case: Assign Environmental Scanning Methodology Step.

Methodology Based Environmental Scanning Assisted Scanning

Execute Environmental Scanning Analytic

Use Case: Execute Environmental Scanning Analytic.

Execute Environmental Scanning Web Scraping Analytic

Use Case: Execute Environmental Scanning Web Scraping Analytic.

Execute Environmental Scanning Document Analysis

Use Case: Execute Environmental Scanning Document Analysis.

Suggest Scanning Hit Classification

Use Case: Suggest Scanning Hit Classification.

Execute Hit Importance Ranking Analytic

Use Case: Execute Hit Importance Ranking Analytic.

Generate Scanning Hit Review Queue Entry

Use Case: Generate Scanning Hit Review Queue Entry.

Competition Alert Setup

Use Case: Competition Alert Setup—Register to receive alerts specifically along the lines of environmental scanning where more criteria may constrain the alert, including, but not limited to information about the creation of new ttxs within certain categories as they are entered or of changes made in cnxpts within certain categories.

Alerts provide an environmental scanning mechanism for companies to be alerted to moves by the competition.

Suggest Scanning Alert

Use Case: Suggest Scanning Alert.

Methodology Based Environmental Scanning Actions

Start and Perform Scan Hit Review Methodology Step

Use Case: Start and Perform Scan Hit Review Methodology Step.

Enter Completion of Scan Hit Review Methodology Step

Use Case: Enter Completion of Scan Hit Review Methodology Step.

Re-categorize Scanning Hit

Use Case: Re-categorize Scanning Hit.

Review Scan Hit Alert Suggestions to Refine or Reject

Use Case: Review Scan Hit Alert Suggestions to Refine or Reject.

Start and Perform Manual Environmental Scanning Methodology Step

Use Case: Start and Perform Manual Environmental Scanning Methodology Step.

Enter Completion of Manual Environmental Scanning Methodology Step

Use Case: Enter Completion of Manual Environmental Scanning Methodology Step.

Associate Scanning Hit with Research Objective

Use Case: Associate Scanning Hit with Research Objective.

Methodology Based Survey Design

Define Survey

Use Case: Define Survey.

Define Survey Analysis Step (stating principals and rules)

Use Case: Define Survey Analysis Step (stating principals and rules).

Define Survey Questionnaire

Use Case: Define Survey Questionnaire

Define Survey Analytic

Use Case: Define Survey Analytic.

Define Survey Alert Template

Use Case: Define Survey Alert Template.

Define Survey Mention Term with Importance

Use Case: Define Survey Mention Term with Importance.

Assign Survey Mention Importance to Dxo

Use Case: Assign Survey Mention Importance to Dxo.

Assign Survey Mention Importance to Txo

Use Case: Assign Survey Mention Importance to Txo.

Assign Survey Mention Importance to Area of Interest

Use Case: Assign Survey Mention Importance to Area of Interest.

Methodology Based Survey Automation

Administer Survey

Use Case: Administer Survey.

Assign Survey Methodology Step

Use Case: Assign Survey Methodology Step.

Present Survey to User

Use Case: Present Survey to User.

Methodology Based Assisted Survey Review

Execute Survey Response Analytic

Use Case: Execute Survey Response Analytic.

Suggest Survey Mention Classification

Use Case: Suggest Survey Mention Classification.

Execute Mention Importance Ranking Analytic

Use Case: Execute Mention Importance Ranking Analytic.

Suggest Survey Alert

Use Case: Suggest Survey Alert.

Generate Survey Mention Review Queue Entry

Use Case: Generate Survey Mention Review Queue Entry.

Methodology Based Survey Actions

Start and Perform Survey Mention Review Methodology Step

Use Case: Start and Perform Survey Mention Review Methodology Step.

Enter Completion of Survey Mention Review Methodology Step

Use Case: Enter Completion of Survey Mention Review Methodology Step.

Re-categorize Survey Mention

Use Case: Re-categorize Survey Mention.

Review Survey Mention Alert Suggestions to Refine or Reject

Use Case: Review Survey Mention Alert Suggestions to Refine or Reject.

Start and Perform Manual Survey Methodology Step

Use Case: Start and Perform Manual Survey Methodology Step.

Enter Completion of Manual Survey Methodology Step

Use Case: Enter Completion of Manual Survey Methodology Step.

Associate Survey Mention with Research Objective

Use Case: Associate Survey Mention with Research Objective.

Data Analysis

Filter and Compare by Competitor/Product/Market Segment

Use Case: Filter and Compare by Competitor/Product/Market Segment.

Filter and Compare by Features

Use Case: Filter and Compare by Features.

Filter and Compare by Requirements/Needs Met

Use Case: Filter and Compare by Requirements/Needs Met.

Filter and Compare by Product Family/Strategy

Use Case: Filter and Compare by Product Family/Strategy.

Generate Product Technology Comparison

Use Case: Generate Product Technology Comparison—Compare the technologies which can be used for a product.

Generate Trend Analysis

Use Case: Generate Trend Analysis.

Generate Competitive Feature Change Sensitivity Analysis

Use Case: Generate Competitive Feature Change Sensitivity Analysis.

Competitive Analysis Study

Define Competitive Analysis Study

Use Case: Define Competitive Analysis Study.

Generate Innovation Gap Analysis

Use Case: Generate Innovation Gap Analysis.

Enter Competitive Assessment or Projection

Use Case: Enter Competitive Assessment or Projection.

Enter Competitive Technology Prediction

Use Case: Enter Competitive Technology Prediction.

Calculate Competitive Posture Report

Generate Competitive Posture Report

Use Case: Generate Competitive Posture Report.

Competitive posture reports include but are not limited to:

Who is interested in the same tcepts that we are?

What is our Competitive Horizon

Competitor descriptive information

Environmental trends

- Industry trends
- Legal and regulatory trends

International trends

Technology development trends

Political developments

Economic conditions

Competitive Sales

Competitive Costs

Competitive Market Recognition/Acceptance

How does our patent portfolio stack up against others (by some classification)?

How does our IP team stack up against others (by some classification)?

Innovation Investment Planning, Portfolio Analysis, Data Mining

Information Collection Definition

Define Patent Discovery Request

Use Case: Define Patent Discovery Request.

Define Technology Information Discovery Request

Use Case: Define Technology Information Discovery Request.

Define Patent Mining Analytic

Use Case: Define Patent Mining Analytic.

Define Technology Information Mining Analytic

Use Case: Define Technology Information Mining Analytic.

System Functions—Patent and Technology Information Collection

Execute Valuation Analytic

Use Case: Execute Valuation Analytic.

Execute Patent Data Discovery Request

Use Case: Execute Patent Data Discovery Request.

Execute Patent Mining Analytic

Use Case: Execute Patent Mining Analytic.

Determine Patent Similarities (citation, back citation, other metrics)

Use Case: Determine Patent Similarities (citation, back citation, other metrics).

Categorize or Convert Ttx Descriptions into Cnxpts

Use Case: Categorize or Convert Ttx Descriptions into Cnxpts—Create a cnxpt from each document describing a ttx, such as a research report, a grant request, etc.

If not already defined, create a source info-item for the source of the information, setting its authority, usability, quality, expertise, etc. [See Procedure—CREATE Source]

For each description (the primary document), and if not already existing, create an irxt for the document, marking the fxxt as "user add" if less than 10 (parameter setting) documents are being converted, or "bulk add" if more are being added. [See Procedure—CREATE Irxt]

Create "information resource citation relationships", "direct information resource name reference citation relationships", and "direct information resource citation relationships" as appropriate, marking the fxxt as "user add". [See Procedure—CREATE Information Resource Citation Relationship] [See Procedure—CREATE Direct Information Resource Citation Relationship] [See Procedure—CREATE Direct Information Resource Name Reference Citation Relationship]

Complete the creation of the cnxpt. [See Procedure—CREATE Cnxpt from Irxt]

Categorize or Convert Patents into Tcepts

Use Case: Categorize or Convert Patents into Tcepts—Create a tcept from a patent, patent application, or disclosure.

Perform the procedure in "Categorize or Convert Ttx Descriptions into Cnxpts" to create tcepts from the patent-like documents.

Categorize or Convert Project Descriptions into Tcepts

Use Case: Categorize or Convert Project Descriptions into Tcepts—Create a tcept from a project descriptions, research report, grant request, etc.

Perform the procedure in "Categorize or Convert Ttx Descriptions into Cnxpts" to create tcepts from the documents.

Manage Portfolios of Technology (Owned, or Competitive)

Define Technology Portfolio

Use Case: Define Technology Portfolio.

Define Utility Patent Intellectual Property Portfolio

Use Case: Define Utility Patent Intellectual Property Portfolio.

Add Patent to Utility Patent Intellectual Property Portfolio

Use Case: Add Patent to Utility Patent Intellectual Property Portfolio.

Add Tcept to Portfolio

Use Case: Add Tcept to Portfolio.

Add Patent to Portfolio under Tcept

Use Case: Add Patent to Portfolio under Tcept.

Add Descriptions for All Purposes—Patent Application/Registration Management

Use Case: Add Descriptions for All Purposes—Patent Application/Registration Management.

Refine Cncpttrrts/Features Regarding Patent

Use Case: Refine Cncpttrrts/Features Regarding Patent.

Match Patent to Axpts

Use Case: Match Patent to Axpts.

Suggest Matches of Patent to Competitive IP

Use Case: Suggest Matches of Patent to Competitive IP.

Suggest Matches of Patent to Products

Use Case: Suggest Matches of Patent to Products.

Refine Matches of Patent to Competitive IP

Use Case: Refine Matches of Patent to Competitive IP.

Refine Matches of Patent to Products

Use Case: Refine Matches of Patent to Products.

Weight Match of Patent to Appcept Requirement

Use Case: Weight Match of Patent to Appcept Requirement.

Weight Match between Patent and Competitive IP Features

Use Case: Weight Match between Patent and Competitive IP Features.

Alert on Portfolio Technology's Use in Product

Use Case: Alert on Portfolio Technology's Use in Product.

Invention Positioning and Description

Refine Product Design & Engineering Factors and Cost Estimates

Use Case: Refine Product Design & Engineering Factors and Cost Estimates.

Refine Product Production and Manufacturability Factors and Cost Estimates

Use Case: Refine Product Production and Manufacturability Factors and Cost Estimates.

Refine Product Strategy

Use Case: Refine Product Strategy.

Refine Sales & Marketability Assessment

Use Case: Refine Sales & Marketability Assessment.

Refine Product Legal, Liability and Safety Evaluation

Use Case: Refine Product Legal, Liability and Safety Evaluation.

Refine Societal Consequences and Environmental Impact Evaluation

Use Case: Refine Societal Consequences and Environmental Impact Evaluation.

Refine Protection, Infringement, and Product Impact Analysis

Use Case: Refine Protection, Infringement, and Product Impact Analysis.

Measure Intellectual Property Interest

Track and Store User Traversals

Use Case: Track and Store User Traversals.

Track and Store User Expert Watching

Use Case: Track and Store User Expert Watching.

Analyze Interest Data

Use Case: Analyze Interest Data.

Track Invention Improvements

Use Case: Track Invention Improvements.

Analyze Innovation Metrics

Use Case: Analyze Innovation Metrics.

Issue Technology Interest Surveys

Use Case: Issue Technology Interest Surveys.

Review Technology Interest Survey Results

Use Case: Review Technology Interest Survey Results.

Conduct Investment Scenario Games

Use Case: Conduct Investment Scenario Games.

Analyze Selections in Investment Games

Use Case: Analyze Selections in Investment Games.

Offer 'Stock' Picker for Choosing Technology Investments

Use Case: Offer 'Stock' Picker for Choosing Technology Investments.

Analyze Selections in Investment Stock Picker

Use Case: Analyze Selections in Investment Stock Picker.

System Functions—Automatic Patent Categorization and Metric Analysis

Detect and Highlight Concentrations of Patent Activity

Use Case: Detect and Highlight Concentrations of Patent Activity.

Detect and Highlight Most Active Companies

Use Case: Detect and Highlight Most Active Companies.

Detect Patent Precedence

Use Case: Detect Patent Precedence.

Detect Cross-organization, Inter-organization Relationships

Use Case: Detect Cross-organization, Inter-organization Relationships.

Detect Prolific Inventors

Use Case: Detect Prolific Inventors.

Detect Geographical Patenting Trend

Use Case: Detect Geographical Patenting Trend.

Detect Length of Patent Protection

Use Case: Detect Length of Patent Protection.

Track Inventor Location, Organization, and Interest Movement

Use Case: Track Inventor Location, Organization, and Interest Movement.

Track Patent Holdings by Market Sectors

Use Case: Track Patent Holdings by Market Sectors.

Track Patent Holdings Development Pipelines

Use Case: Track Patent Holdings Development Pipelines.

Track Patent Litigation Activities

Use Case: Track Patent Litigation Activities.

Track Patent Portfolio due to mergers and acquisitions

Use Case: Track Patent Portfolio due to mergers and acquisitions.

Generate Patent Applicability Roadmap

Use Case: Generate Patent Applicability Roadmap.

Generate List of Citation Relationships Between Patents

Use Case: Generate List of Citation Relationships Between Patents.

Generate Company's Patent Portfolio Intra-citation Relationship List

Use Case: Generate Company's Patent Portfolio Intra-citation Relationship List.

Generate Inventor Patenting Activity Timeline

Use Case: Generate Inventor Patenting Activity Timeline.

Generate Key Patent List

Use Case: Generate Key Patent List.

Generate Patent Comparison

Use Case: Generate Patent Comparison.

Model Patent Roadmap Valuation

Use Case: Model Patent Roadmap Valuation.

Generate Patent Licensing Revenue Prediction

Use Case: Generate Patent Licensing Revenue Prediction.

Portfolio Exploitation

Mark IP/Patent as Available for License/Sale

Use Case: Mark IP/Patent as Available For License/Sale.

Obtain Assistance in Selling Patent License or Rights

Use Case: Obtain Assistance in Selling Patent License or Rights.

Advertise Patent or Patent Pending

Use Case: Advertise Patent or Patent Pending.

Refine and Release IP/Patent Description

Use Case: Refine and Release IP/Patent Description.

Post Initial Intellectual Property License Terms

Use Case: Post Initial Intellectual Property License Terms.

Enter Intellectual Property License Purchase

Use Case: Enter Intellectual Property License Purchase.

Generate Interested Parties List

Use Case: Generate Interested Parties List.

Generate Patent Licensing Potential Buyers List

Use Case: Generate Patent Licensing Potential Buyers List.

Refine Potential Buyers Outreach List

Use Case: Refine Potential Buyers Outreach List.

Request Run of Outreach to List

Use Case: Request Run of Outreach to List.

Execute Outreach to List

Use Case: Execute Outreach to List.

Suggest Un-tapped Appcepts for Patent Licensing (Revenue Optimization)

Use Case: Suggest Un-tapped Appcepts for Patent Licensing (Revenue Optimization).

Sell Patent License or Rights

Use Case: Sell Patent License or Rights.

Register Sale of Patent License or Rights

Use Case: Register Sale of Patent License or Rights.

Place Patent Auction

Use Case: Place Patent Auction.

Manage Patent Auction

Use Case: Manage Patent Auction.

Intellectual Property Investment

Define Portfolio for Technology Investment

Use Case: Define Portfolio for Technology Investment.

Constructively Define Portfolio for Technology Investment

Use Case: Constructively Define Portfolio for Technology Investment.

Generate List of Available Technology Investments

Use Case: Generate List of Available Technology Investments.

Purchase Analysis of Potential Investment

Use Case: Purchase Analysis of Potential Investment.

Specify Confidential Analysis of IP Investment

Use Case: Specify Confidential Analysis of IP Investment.

Register Interest in Investment by Tcept or Appcept

Use Case: Register Interest in Investment by Tcept or Appcept.

Specify Investment Made

Use Case: Specify Investment Made.

Invest in Technology IP

Use Case: Invest in Technology IP.

Sell Out of Technology Investment

Use Case: Sell Out of Technology Investment.

Manage Investment Portfolio

Use Case: Manage Investment Portfolio.

Consortium Investment

Register Interest in Investment in Consortium

Use Case: Register Interest in Investment in Consortium.

Obtain Assistance in Investment in Consortium

Use Case: Obtain Assistance in Investment in Consortium.

View Consortium Offering (Securities Statements)

Use Case: View Consortium Offering (Securities Statements).

Negotiate Investment in Invitation Only Consortium

Use Case: Negotiate Investment in Invitation Only Consortium.

Place Consortium Investment Offering Auction

Use Case: Place Consortium Investment Offering Auction.

Manage Consortium Investment Offering Auction

Use Case: Manage Consortium Investment Offering Auction.

Enter Bid on Consortium Investment Offering Auction

Use Case: Enter Bid on Consortium Investment Offering Auction.

Innovation Investment Pools

Operation of Markets

Stages of progress toward product sales for various markets, along with gates for 'graduating' from the stage to the next are defined to establish processes, to form definitions for investment pool. The pools are defined by these stages of development of innovations, and additionally by, including but not limited to: market segment, investment form, risk, gestation timeframe, 'valuation at graduation' range, invention ownership proportion, geography, jurisdiction, type (entity, idea, license, consortium, or other) or other subdivisions.

For each 'real money' investment pools, independent special purpose vehicles are formed to handle the securitization of the asset backed securities, to create and sell the investment pool securities, use the proceeds of the sale to pay back the investors, and to manage relationships with the entities formed around the innovations that are the underlying assets. Shadow vehicle accounts are formed for either 'shadow' investment pools, or for 'communal' investment pools. Initially, these pools will not have investors.

Memberships in an investment pool are offered to inventors who progress their invention past a certain success gate. To get into an 'real money' pool they either, including but not limited to: 1) allow their invention to be assigned to a business entity that they will form, and which is owned to a certain (low) percentage (non-dilutable) by the 'pool' special purpose vehicle; 2) assign their patent rights to a license portfolio management company which is owned to a certain (low) percentage (non-dilutable) by the 'pool' special purpose vehicle; or 3) form a consortium around the idea and assign a portion of the consortium to a 'pool' special purpose vehicle. Depending upon stage of progress, the new pool member entity, idea, or consortium obtains either a set of services for this initial assignment, or cash, or both. They are not owners of or investors in the pool except in the special case where the pool is a collective owned by the, including but not limited to: entities, inventors, or consortia.

Securitization of the 'real money' pools will take the form of shares, options, or asset-backed derivatives to allow the risk of investing in the underlying assets to be diversified for actual investors. Each security will represent a fraction of the total value of the diverse pool of underlying assets. An on-line exchange for these securities is established, with membership subscriptions sold for varying fees.

Shadow shares, shadow options, or shadow asset-backed derivatives are sold on the 'shadow' pools to users who have purchased service subscriptions in the shadow facility. Incremensa will assign initial shares, or options (possibly maturing on the success of their own invention) to the members of communal investment pools. An on-line exchange for these securities is established, with membership subscriptions sold for varying fees.

To move from one pool to another, an entity, idea to be licensed, or consortium must make progress, as determined first by self-evaluation but also by points awarded for, including but not limited to: interest shown in it, external money raised, business progress, IP protection progress, exterior evaluations and appraisals, completion of methodologies, increases in staff, resources, or sales, improvement in speed of completions of these activity/progress indicators. As time passes, points are taken away from the entity, idea, or consortium as a penalty and the penalty provides a structure for incentive as well as a structure for removal from the pool to a different pool for lower performers. When sufficient points are earned, the entity, idea, or consortium reaches a graduation gate. When sufficient points are lost as penalties, the entity, idea, or consortium reaches a removal gate. As an invention passes the gate defined as the graduation point for the pool it moves into a pool for the next stage, usually of higher anticipated value, and a 'purchase transaction payment' is made from the subsequent pool to the earlier stage pool, set by the value set, predicted, or priced based upon a group-based crowdsourced negotiation process price (or market price or option price) for the invention graduating.

As an invention/innovation graduates from the final pool, the share in the business entity formed originally, or its assigns, is sold on the market and the funds received are placed into the treasury of the pool for distribution. For shadow markets, the market value is added to the shadow treasury account.

Request Membership in Pool

Use Case: Request Membership in Pool.

Obtain Assistance in Initiating Membership in Pool

Use Case: Obtain Assistance in Initiating Membership in Pool—Gain assistance in establishing a business entity around the innovation.

Obtain assistance available only for pool members or those seeking membership.

Grant Membership in Pool

Use Case: Grant Membership in Pool.

Memberships in an investment pool are offered to inventors who progress their invention past a certain success gate. The new member entity obtains either a set of services for this initial assignment, or cash, or both as part of this transaction.

Form Special Purpose Vehicle for Pool

Use Case: Form Special Purpose Vehicle for Pool—Independent special purpose vehicles are formed to handle the securitization of the asset backed securities, to create and sell the investment pool securities, use the proceeds of the sale to pay back the investors, and to manage relationships with the entities formed around the innovations that are the underlying assets.

The vehicle:

Acts as a shield to isolate the pool of assets from selling inventors or their assignees;

Acts as a shield between investors and the sellers;

Makes a particular investor's ownership in the pool transferrable without regard to the pool's ownership of a property right in any particular invention in the pool;

Establishes any needed legal structure for the pool;

Create and Register Pool Innovation Business Entity

Use Case: Create and Register Pool Innovation Business Entity.

Transfers a future right in the value of an idea to the pool;

Transfers present value or a promise to develop an invention to the inventor;

Transfers a determinable amount of risk to the pool;

Assign Ownership of Pool Innovation Business Entity to Pool

Use Case: Request Membership in Pool—Allocate a part ownership in an entity to a pool managing special purpose vehicle.

Inventor also obtains a large ownership position in the business entity. Agreement establishes objectives to meet to progress into higher value pools where greater liquidity becomes available along with opportunities for greater investment or transfer.

Structure Innovation Investment Pool

Use Case: Structure Innovation Investment Pool—Establish investment pool based upon stages of development of innovations, and additionally by, including but not limited to: market segment, investment form, risk, gestation timeframe, 'valuation at graduation' range, invention ownership proportion, or other subdivisions.

For each 'real money', 'shadow', or 'communal' investment pool, accounts are formed for providing pool accounting, for value (bid/ask) reporting, investment participation transfers, and sales transactions.

Publish Innovation Investment Pool Offering Statement

Use Case: Publish Innovation Investment Pool Offering Statement.

Notify Special Purpose Vehicle

Use Case: Notify Special Purpose Vehicle—Business entity sends notice to pool special purpose vehicle regarding status or issues.

Provide Benefit to Pool Innovation Business Entity

Use Case: Provide Benefit to Pool Innovation Business Entity—A pool managing special purpose vehicle provides an investment or other benefit to a pool entity.

Inventor and the business entity obtain benefits based upon the agreement established with the pool special purpose vehicle.

Report Gate Completion to Special Purpose Vehicle

Use Case: Report Gate Completion to Special Purpose Vehicle—Business entity notifies pool special purpose vehicle of its success and readiness for graduation.

Special Purpose Vehicle Negotiations on Graduation

Use Case: Special Purpose Vehicle Negotiations on Graduation—Two or more pool special purpose vehicles negotiate for sale/purchase of graduating entity.

Complete Sale of Graduating Entity by Special Purpose Vehicle

Use Case: Complete Sale of Graduating Entity by Special Purpose Vehicle—Business entity partial ownership is transferred to purchasing pool special purpose vehicle after graduation, or is sold on open market.

Define Security in Innovation Investment Pool

Use Case: Define Security in Innovation Investment Pool—Define and create a security instrument for innovations that are the underlying assets in the investment pool.

Securities take the form of shares, options, or asset-backed derivatives to allow the risk of investing in the underlying assets to be diversified for investors. Each security will represent a fraction of the total value of the diverse pool of underlying assets.

Purchase Subscription to Shadow Innovation Investment Pool

Use Case: Purchase Subscription to Shadow Innovation Investment Pool—Define and create a security instrument for innovations that are the underlying assets in the investment pool.

An on-line exchange for these securities is established, with membership subscriptions sold for varying fees Shadow shares, shadow options, or shadow asset-backed derivatives are sold on the 'shadow' pools to users who have purchased service subscriptions in the shadow facility.

Purchase Subscription to Communal Investment Pool

Use Case: Purchase Subscription to Communal Investment Pool—Define and create a security instrument for innovations that are the underlying assets in the communal investment pool.

An on-line exchange for these securities is established, with membership subscriptions sold for varying fees, including a sponsorship contribution.

Request Membership in Communal Investment Pool

Use Case: Request Membership in Communal Investment Pool.

Obtain Assistance in Initiating Membership in Communal Investment Pool

Use Case: Obtain Assistance in Initiating Membership in Communal Investment Pool—Gain assistance in establishing a business entity around the communally structured innovation project.

Obtain assistance available only for communal investment pool members or those seeking membership.

Grant Membership in Communal Investment Pool

Use Case: Grant Membership in Communal Investment Pool.

Memberships in a communal investment pool are offered to certain innovators who progress their innovation past a certain success gate. These innovations carry a special purpose sufficient for recognition and sponsorship. The new member entity obtains either a set of services for this initial assignment, or cash, or both as part of this transaction.

Initial shares, or options are granted to the members of communal investment pools.

System Function—Innovation Investment Pools

Execute Exchange for Investment Pool

Use Case: Execute Exchange for Investment Pool—Perform calculations for markets.

The real-money exchange provides a real-life market for valuing and securitizing ideas The Prediction Gaming Market is a shadow (or virtual) market for playing an investment game. The range of technologies for which an investment may be made is much wider than those available in the real-money exchange.

The Prediction Gaming Market is a speculative or betting market created to make verifiable predictions on outcomes, based upon the game.

Communal Investment Innovation Investment exchange provides a specialized market for innovation projects of special merit often garnering sponsorship.

Subscribe to Innovation Investment Pool Offering

Use Case: Subscribe to Innovation Investment Pool Offering—Request and be granted right to invest in an investment pool.

Subscribe to Innovation Investment Pool Exchange

Use Case: Subscribe to Innovation Investment Pool Exchange—Request and be granted right to access an investment pool exchange, and provide subscription fee payment.

Sponsor Communal Innovation Investment Pool

Use Case: Sponsor Communal Innovation Investment Pool—Request and be granted right to sponsor a communal innovation investment pool, and provide sponsorship payment.

Offer Access Right to View Innovation Investment Pool Portfolio

Use Case: Offer Access Right to View Innovation Investment Pool Portfolio.

View Offerings (Securities Statements)

Use Case: View Offerings (Securities Statements).

Invest in Innovation Investment Pool

Use Case: Invest in Innovation Investment Pool.

Sell Out of Innovation Investment Pool

Use Case: Sell Out of Innovation Investment Pool.

Manage Innovation Investment Pool Structure

Use Case: Manage Innovation Investment Pool Structure.

Manage Innovation Investment Pool Investment

Use Case: Manage Innovation Investment Pool Investment.

Intellectual Property Procurement and Tech Transfer

The tech transfer market offers the ability to advertise, buy, sell and license patents.

Register Offering of Tcept

Use Case: Register Offering of Tcept—State readiness to sell or license a tcept or to obtain specific assistance for an ownership share.

Register Advertisement for Tcept Offering

Use Case: Register Advertisement for Tcept Offering—Provide an advertisement to sell or license a tcept and pay a fee.

Define Portfolio for IP Procurement

Use Case: Define Portfolio for IP Procurement.

Obtain Assistance in Investment in Purchasing IP License

Use Case: Obtain Assistance in Investment in Purchasing IP License.

Register Interest in Tcept

Use Case: Register Interest in Tcept—State readiness to acquire a tcept.

Register Interest in Tcept Category

Use Case: Register Interest in Tcept Category—State readiness to acquire tcepts listed in a specific category.

Register Interest in Appcept

Use Case: Register Interest in Appcept—State a need for a solution to meet specific requirements.

Register Interest in Patent

Use Case: Register Interest in Patent.

Register Requested License Changes

Use Case: Register Requested License Changes.

Register Bid on IP License

Use Case: Register Bid on IP License.

Negotiate Purchase of License

Use Case: Negotiate Purchase of License.

Purchase Patent License or Rights

Use Case: Purchase Patent License or Rights.

Register Purchase of Patent License or Rights

Use Case: Register Purchase of Patent License or Rights.

Patent License Management

Alert on Patent Technology's Use in Product

Use Case: Alert on Patent Technology's Use in Product.

Generate Licensing Revenue Measurement

Use Case: Generate Licensing Revenue Measurement.

Intellectual Property Valuation and Metrics process

Patent Value and Legal Quality Analysis

Purchase Patent Analytics Report

Use Case: Purchase Patent Analytics Report.

Define Patent Valuation Model

Use Case: Define Patent Valuation Model.

Determine Degree of Patent Similarity

Use Case: Determine Degree of Patent Similarity.

Refine Patent Niche Classifications

Use Case: Refine Patent Niche Classifications.

Identify Blocking Publication

Use Case: Identify Blocking Publication.

Identify Picket Fence

Use Case: Identify Picket Fence.

Identify Patent Claim Gaps

Use Case: Identify Patent Claim Gaps.

Identify Patent Validity Challenges

Use Case: Identify Patent Validity Challenges.

Identify Additional Patent Licensing Opportunities

Use Case: Identify Additional Patent Licensing Opportunities.

Technology Strength and Valuation Analysis

Define Technology Valuation Model

Use Case: Define Technology Valuation Model.

Generate Competitive Technology Comparison

Use Case: Generate Competitive Technology Comparison.

Generate Feature Advantage Sensitivity Analysis

Use Case: Generate Feature Advantage Sensitivity Analysis.

Analyze Intellectual Property and Research Reports to Focus Investment

Use Case: Analyze Intellectual Property and Research Reports to Focus Investment.

Generate Technology Time-Based Value Prediction

Use Case: Generate Technology Time-Based Value Prediction.

Generate Portfolio Time-Based Value Prediction

Use Case: Generate Portfolio Time-Based Value Prediction.

Generate Multi-Portfolio Value Comparison

Use Case: Generate Multi-Portfolio Value Comparison.

Information Services and Access Sales Process

Acquire Private System

Obtain Mid-tier System

Use Case: Obtain Mid-tier System.

Obtain User System

Use Case: Obtain User System.

Provision Mid-tier System

Use Case: Provision Mid-tier System.

Provision User System

Use Case: Provision User System.

Administer Mid-Tier Roles

Use Case: Administer Mid-Tier Roles.

License System for Use

Use Case: License System for Use.

Use Data Externally

Export Control

The objective of exporting is to generate usable external format data sets that can be imported and used for further analyses by, including, but not limited to office software, or standard analysis, data mining, or visualization software packages.

In one embodiment, exports will be performed on the basis of result set contents. An export would contain the result set data and some subset of the base data related to the result set.

In one embodiment, exports will additionally contain the script used to create the result set.

In one embodiment, exports will be performed on the basis of a selection set's contents. An export would contain the selection set data and some subset of the base data related to the selection set;

In one embodiment, exported data will be provided in multiple formats to be saved for easy use in office productivity software, re-imported into the system, or be used by external systems.

This process, in one embodiment, would provide:

The ability to maintain control and consistency of data that is moved between standalone systems, to ensure interactivity between users or accounts with different permissions and data;

The ability to compare exported data sets to ensure the consistency of reloaded data, for the elimination of re-classified records;

The ability to export to a linked database;

The ability to repeat all or part of a previous export such that, in one embodiment the data changed in the CMMDB relating to the previously exported txos would be updated to that which was now present in the CMMDB, and the script used to create the result set would be re-executed and the new result set data would be exported.

In one embodiment, locators of the txos exported would be encrypted such that the exported data could not be combined with other exported data to recreate a substantial amount of the CMMDB without the revalidation by the central system.

Key Encryption Process

This process is used to secure the main data of the central CMMDB from replication by recombination of multiple exports.

In one embodiment, this is carried out by translating an internal ID from the CMMDB by:

1) Choosing a specific 'key encryption algorithm' from a number of such algorithms by executing an 'encryption algorithm selection algorithm' using as parameters the customer number and a number assigned to represent the time-period when the choice is being made.

2) Executing the chosen specific 'key encryption algorithm' on the internal unique ID of the info-item.

3) Returning as the translation result an ID value including the customer number, the time-period number, and the result of the 'key encryption algorithm.'

4) When accessing, converting the ID to an unusable value (effectively deleting the info-item) when the expiration date is sufficiently surpassed, or if the date has recently passed or will soon pass, signaling to the system that the ID is to expire and a new subscription is needed, triggering an additional system event.

Export/Import

Define an Export

Use Case: Define an Export—Define an export definition script.

Export definition scripts may be named, saved, and submitted to the libraries for use by others.

Select Data for export

Use Case: Select Data for export—Filter the content of data in a result set or selection set to increase the effectiveness and decrease the size of an export file.

Select a result set or selection set for use in an export and to optionally apply filters to the content of data in a result set or selection set to improve effectiveness of an export file.

Execute an Export

Use Case: Execute an Export—Invoke an export definition script to output the resulting data in the form of export files based upon an export definition script.

Request Export Definition

Use Case: Request Export Definition—Purchase or obtain a license for use of an export script and to obtain the script.

This process invokes e-commerce processes.

Request Export DataSet

Use Case: Request Export DataSet—Purchase or obtain a license for use of an export DataSet and to obtain the DataSet.

This process invokes e-commerce processes.

Prepare Export DataSet

Use Case: Prepare Export DataSet—Extract the data from the central CMMDB or its local, previously extracted copy.

For data extracted from the central CMMDB, the key encryption process will be executed to obtain obfuscated keys.

Request Exporting Plug-ins

Use Case: Request Exporting Plug-ins—Obtain new plug-ins and data for Exporting.

This process invokes e-commerce processes.

Specify/Invoke Import

Use Case: Specify/Invoke Import—Specify and then invoke execution of an import.

Execute Coordination of Txo ID Keys on Imports

Use Case: Execute Coordination of Txo Internal ID Keys on Imports—Reconnect an import data set's txo internal ID keys to the internal ID keys in the CMMDB.

If the data set's data is to be reexported, it will contain obfuscated keys.

Execute Coordination of Txo Identities on Affiliated Private CMMDBs

Use Case: Execute Coordination of Txo Internal ID Keys on Affiliated Private CMMDBs—Reconnect the txo internal ID keys of an affiliated CMMDB to the internal ID keys in the central CMMDB.

Reconnection will occur when, including but not limited to: submitting private data to the central CMMDB, when needed to utilize new txos in the affiliated CMMDB in the central CMMDB, or when equivalent txos are in both the affiliated CMMDB and the central CMMDB which have different internal ID keys. If the data set's data is to be reexported, it will contain obfuscated keys.

Data Commerce

Communities and User Incentives

Selling Value of Database

Storefront

A system-wide storefront facility will provide for users to establish a payment method, to top up their account balance, to set maximum monthly spending limits, to pay for registrations or purchases, to apply incentive discounts and compensation, to establish refund methods, to request refund payments, etc. The system is based upon small transaction fees where possible. The storefront also allows for users to list sales criteria regarding items they register, including goods, expertise and services, access rights to information, etc. Users may also establish compensation and incentives for actions other users may take or services they perform.

Users may also set up investment accounts and investment vehicles, portfolios, gaming postures, investments in consortiums, etc.

Purchase Access from Catalog

Use Case: Purchase Access from Catalog—Purchase subscription for access for packages of services as listed in the catalog.

Access fees are required for many usages of the system. As an example, some visualization maps may be viewed to a certain level without any fee, but a free subscription may be needed. A map may be exported or printed for a fee.

Mashup ability based upon map of technologies

Mashup ability based upon virtual map based upon fxxts

Purchase Disaggregated DataSet Subscription

Use Case: Purchase Disaggregated DataSet Subscription—Purchase subscription for access to a specific set of data stored as associated with one or more txos, as listed in the catalog.

An embodiment of the invention provides a method for sales or licensing of disaggregated data to one or more customers.

Purchase Access Blanket Subscription

Use Case: Purchase Access Blanket Subscription—Purchase subscription for access to unspecified packages of data or services which would be required to complete a task the user has initiated, such as a search, a report, or a model, or some combination of tasks.

Limits are utilized to constrain expenditures for services to amounts prescribed by the user.

DataSets

Use Case: Purchase DataSet—Purchase an export file of a packaged DataSet.

An embodiment of the invention provides a method for sales or licensing of "DataSets" to one or more customers.

Purchase From Catalog

Use Case: Purchase From Catalog—Purchase an item from the catalog.

An order facility is used to allow on-line ordering from stock list which may include but is not limited to DataSets, information packages, software packages, licenses, scripts, descriptions, media, etc.

Execute Retail Store for Deep Web Data

Use Case: Execute Retail Store for Deep Web Data.

Mark Data as Fee for Use

Use Case: Mark Data as Fee for Use.

Set Fee for Use Pricing

Use Case: Set Fee for Use Pricing.

Review Fee for Use Pricing

Use Case: Review Fee for Use Pricing.

Sell Access to Fee for Use Data

Use Case: Sell Access to Fee for Use Data.

Mark Data Snippet as Part of DD-DataSet

Use Case: Mark Data Snippet as Part of DD-DataSet.

Set DataSet Pricing

Use Case: Set DataSet Pricing.

Review DataSet Pricing

Use Case: Review DataSet Pricing.

Offer DataSet

Use Case: Offer DataSet

Sell Pre-packaged DataSet

Use Case: Sell Pre-packaged DataSet.

Sell DataSets for Specific Tcept Categories

Use Case: Sell DataSets for Specific Tcept Categories.

Sell Packaged TTX-DataSets

Use Case: Sell Packaged TTX-DataSets.

Sell Packaged Interest-DataSets

Use Case: Sell Packaged Interest-DataSets.

Sell Interest Data

Use Case: Sell Interest Data.

Sell Right to Use

Use Case: Sell Right to Use.

Sell Access to Information By Site License

Use Case: Sell Access to Information By Site License.

Sell Access to Information By Subscription

Use Case: Sell Access to Information By Subscription.

Sell Right to Register

Use Case: Sell Right to Register.

Tools Commerce

Manage Templates

Use Case: Manage Templates.

Sell Intellectual Property Analytics

Use Case: Sell Intellectual Property Analytics.

Sell Notification of Change Service

Use Case: Sell Notification of Change Service.

Expertise Commerce

Obtain Referrals via Catalog of Expertise or Products

Use Case: Obtain Referrals via Catalog of Expertise or Products.

Sell Patent Agent Services

Use Case: Sell Patent Agent Services.

Advertising Commerce

Sell Impression Advertising

Use Case: Sell Impression Advertising.

Play Emergence Games

Use Case: Play Emergence Games.

Game Control

Use Case: Start a Game—Begin a new valuation game for a tcept.

Play Valuation Game

Use Case: Play Valuation Game—Play valuation game.

Patent Invention Process

Patent Process Establishment

Define Alert Template for Patent Clearance Review

Use Case: Define Alert Template for Patent Clearance Review.

Define Intellectual Property Right Protection Program

Use Case: Define Intellectual Property Right Protection Program.

Define Patent Idea Survey Workflow

Use Case: Define Patent Idea Survey Workflow.

Define Patent Idea Survey Questionnaire

Use Case: Define Patent Idea Survey Questionnaire

Define Patent Idea Review/Notification Workflow

Use Case: Define Patent Idea Review/Notification Workflow.

Define Patent Application Workflow

Use Case: Define Patent Application Workflow.

Patent, Trademark and Copyright Protection Management

Publish Intellectual Property Right Protection Program and Patent Clearance Process Use Case: Publish Intellectual Property Right Protection Program and Patent Clearance Process.

Outreach for Intellectual Property Awareness Management

Use Case: Outreach for Intellectual Property Awareness Management.

Obtain Assistance in Investment in Licensing

Use Case: Obtain Assistance in Investment in Licensing.

Patent Clearance

Register Staff Obligation

Use Case: Register Staff Obligation—Register employment or contractual obligation by individual or organization to another organization generally or by specific technology.

These obligations involve ownership or potential ownership in intellectual property (including but not limited to patent or trade secrets), promises not to disclose, promises to protect, publicity awareness and control promises, and other obligations.

Register Staff Participation in Tcept category

Use Case: Register Staff Participation in Tcept category.

Register Staff Interest in Publishing in Tcept category

Use Case: Register Staff Interest in Publishing in Tcept category.

Detect Published Articles by Staff

Use Case: Detect Published Articles by Staff.

Detect Staff Participation in Tcept category

Use Case: Detect Staff Participation in Tcept category.

Register Intended Staff Article in Tcept category

Use Case: Register Intended Staff Article in Tcept category.

Register Intended Staff Disclosure in Tcept category

Use Case: Register Intended Staff Disclosure in Tcept category.

Suggest Alert for Non-disclosure Commitment Breach Review

Use Case: Suggest Alert for Non-disclosure Commitment Breach Review.

Clearance Review of Potential Article/Disclosure on Publication Status

Use Case: Clearance Review of Potential Article/Disclosure on Publication Status.

Clearance Review of Potential Article on Novelty, Inventiveness, and Protection

Use Case: Clearance Review of Potential Article on Novelty, Inventiveness, and Protection.

Clearance Review of Potential Article on Infringement

Use Case: Clearance Review of Potential Article on Infringement.

Clearance Review of Potential Article for Proprietary Information Disclosure

Use Case: Clearance Review of Potential Article for Proprietary Information Disclosure.

Clearance Review of Potential Article on Status as Offering

Use Case: Clearance Review of Potential Article on Status as Offering.

Mark Article Cleared for Publishing

Use Case: Mark Article Cleared for Publishing.

Mark Disclosure Approval

Use Case: Mark Disclosure Approval.

Register Staff Article Publication Citation in Tcept category

Use Case: Register Staff Article Publication Citation in Tcept category.

Patent Idea Survey

Register Staff Patent Idea Suggestion in Tcept category

Use Case: Register Staff Patent Idea Suggestion in Tcept category.

Register Non-disclosure Commitment on Tcept for Tracking Duties of Care

Use Case: Register Non-disclosure Commitment on Tcept for Tracking Duties of Care.

Invoke Patent Idea Survey Workflow

Use Case: Invoke Patent Idea Survey Workflow.

Answer Patent Idea Survey Questionnaire

Use Case: Answer Patent Idea Survey Questionnaire

Invoke Patent Idea Review/Notification Workflow

Use Case: Invoke Patent Idea Review/Notification Workflow.

Patent Application Workflow—Prepare for Patent Application

Define Patent Lexicon Term

Use Case: Define Patent Lexicon Term.

Re-categorize Idea into All Appropriate Tcepts

Use Case: Re-categorize Idea into All Appropriate Tcepts.

Generate Prior Art Suggestion List

Use Case: Generate Prior Art Suggestion List.

Verify Prior Art

Use Case: Verify Prior Art.

Enter Additional Prior Art

Use Case: Enter Additional Prior Art.

Generate Prior Art List in Patent Application Format

Use Case: Generate Prior Art List in Patent Application Format.

Review Patent Idea Survey Responses on Novelty, Inventiveness, and Protection

Use Case: Review Patent Idea Survey Responses on Novelty, Inventiveness, and Protection.

Review Patent Idea Survey Responses for Proprietary Information Disclosure

Use Case: Review Patent Idea Survey Responses for Proprietary Information Disclosure.

Invoke Patent Application Workflow

Use Case: Invoke Patent Application Workflow.

Define Preliminary Patent Description Static Component and Benefit List

Use Case: Define Preliminary Patent Description Static Component and Benefit List.

Define Preliminary Patent Claim Concept

Use Case: Define Preliminary Patent Claim Concept.

Determine Potential Application Domain

Use Case: Determine Potential Application Domain

Determine Potential Market

Use Case: Determine Potential Market.

Participate in Utility Patent Peer Review

Use Case: Participate in Utility Patent Peer Review.

Patent Application Workflow—Apply for Patent

Submit Provisional Patent Application

Use Case: Submit Provisional Patent Application—A provisional patent application is prepared based upon self-help survey questions, entered information and assistance from others.

The provisional application covers a tree of tcepts from the same inventor, such that if the inventor (the owning user who initiated the tcept) has requested a ttx category (a tcept umbrella) upon which to apply, the application will include the characteristics associated with that tcept and all of the tcepts below (incremental tcepts/sub-parts) that the user has stated as being incremental improvements to the tcept category selected, unless the user has decided not to include a 'child' tcept. The application will be subdivided appropriately by the structure of the tree of tcepts. If the user selects two or more 'root' ttx categories for the application, they will first be assisted to form a new ttx category which will be used as the root of the tree, and each of the selected two or more 'root' categories will be made children of the new root for the application so that the application will involve a single overall invention.

Patent/Publication Search and Analysis and Patent Prosecution

Prior Art Search for Patenting

Use Case: Prior Art Search for Patenting—Find information about comparable tcepts that are older than but have common technical features to one in hand.

Searching for published documents, patents, etc. to be sure of novelty and non-obviousness of technology under consideration. This objective extends to recording the search query and all its steps for repetition at another time and to the organization of prior art search projects.

Prosecute Non-provisional Patent

Use Case: Prosecute Non-provisional Patent.

Prosecute Patent

Use Case: Prosecute Patent—Utilize a search and organization tool for any appropriate need during the process of prosecuting patents—mostly utility patents, such as tracking blocking patent activity, being alerted to activity in the tcept category, etc.

Secure a patent on a tcept.

The process of patent prosecution involves considerable information management. Governments provide a structure for determining ownership based upon ownership of prior art, novelty, and specification.

Defend Patent

Use Case: Defend Patent.

Support Litigation

Use Case: Support Litigation.

Encroachment Alert Setup

Use Case: Encroachment Alert Setup—Register to receive alerts, including, but not limited to alerts specifically about changes affecting a specific cnxpt or category.

The utility of this is that it provides an early warning system with the ability to alert registered patent holders if someone is encroaching on their patent.

Socialize Process

Users may participate in communities and activities that may or may not be connected to specific ttxs in the CMMDB.

Communities Usage

Incremental creativity is key, so to get a large number of qualified users to start adding and repairing data communities are used to increase value to users and to channel users toward transactions; registries to take in information about users, their needs, or their offerings; a storefront as a charging control mechanism for fee based services; and multitier ownership of data for private information control.

Develop Community

Define Community Template

Use Case: Define Community Template.

Set Rights and Access Rules for Community

Use Case: Set Rights and Access Rules for Community.

Define Registry Template

Use Case: Define Registry Template.

Establish Profile for Communities

Opt-In for Community Access

Use Case: Opt-In for Community Access.

E-commerce for Access Rights

Use Case: E-commerce for Access Rights.

Set Role

Use Case: Set Role.

Manage Personal Profile

Use Case: Manage Personal Profile.

Tailor Persona

Use Case: Tailor Persona.

Engage with Community

Initiate blog

Use Case: Initiate blog.

Initiate Community

Use Case: Initiate Community.

Join Community

Use Case: Join Community.

Initiate discussion forum

Use Case: Initiate discussion forum.

Enter Discussion

Use Case: Enter Discussion.

Raise Visualization from Community Page

Use Case: Raise Visualization from Community Page.

Interact with Community

Author in Community

Use Case: Author in Community.

Post Entry

Use Case: Post Entry.

Post Document

Use Case: Post Document.

Post Link

Use Case: Post Link.

Enter Registration

Use Case: Enter Registration.

Initiate recorded webinar

Use Case: Initiate recorded webinar.

Initiate/Schedule on-line or off-line event

Use Case: Initiate/Schedule on-line or off-line event.

Offer Information Packages

Use Case: Offer on-line/off-line Information Packages—Information Packages may be offered for use on-line or off-line.

Information Packages include but are not limited to: knowledge bases, recorded lectures, opt-in/subscription information channels, classified 'ads' streams such as opportunity lists, idea lists, links to service providers, assistance request posts.

Sign-up/Connect for 'Social Web' Networking

Use Case: Sign-up/Connect for 'Social Web' Networking.

Sign-up/Connect for 'Social Web' networking, such as:

- On-line communities discussion forums, chat rooms, interest groups, blogs, webinars, post class/post school communities
- Off-line gatherings of interested people classes, meetups, events, conferences Subscribe to Focused Resources Use Case: Subscribe to Focused Resources.

Subscribe to focused resources, such as:

- On-line information library, knowledge bases, recorded lectures, on-line courses, opt-in/subscription information channels
- Off-line information subscription publications
- Opportunity sources classified 'ads' such as opportunity lists, idea lists, links to service providers Administer Community Manage User Registration, Self-Assessment, Self-Identification, Opt-In, or Subscription Use Case: Manage User Registration, Self-Assessment, Self-Identification, Opt-In, or Subscription.

Manage Class, Meetup, Event, Conference

Use Case: Manage Class, Meetup, Event, Conference.

Manage and Administer Content

Use Case: Manage and Administer Content.

Outreach

Generate Outreach, Messaging, etc.

Use Case: Generate Outreach, Messaging, etc..

Administer Community

Use Case: Administer Community.

- Initiate All-Topic Community—Analytic/Application/Information/Template Submission Board
- Initiate All-Topic Community—Analytics and Applications Store
- Initiate All-Topic Community—Announcement List and Board
- Initiate All-Topic Community—Association List and Discussion Board
- Initiate All-Topic Community—Consortium Available, Signup, and Short Descriptions
- Initiate All-Topic Community—Consortium Investment Advertising and Investor Community
- Initiate All-Topic Community—Competitive Analysis Interest Area
- Initiate All-Topic Community—Cross-Border, Cross-Language Community
- Initiate All-Topic Community—Information Store Initiate All-Topic Community—Issue/Work List and Board
Initiate All-Topic Community—Issue Submission Board
Initiate All-Topic Community—Opportunities List for Employment, Consortium Involvement, Incentives, etc.
Initiate All-Topic Community—Opportunity Templates, Advertise, Signup, Buy, Submit, Complete, and Payment Store
Initiate All-Topic Community—Outreach Facility
Initiate All-Topic Community—Product Planning Interest Area
Initiate All-Topic Community—Roadblock List and Board
Initiate All-Topic Community—Shares Available
Initiate All-Topic Community—ShoutOut List and Board
Initiate All-Topic Community—Suggestions Submission Board
Initiate All-Topic Community—Survey Discussion Board
Initiate All-Topic Community—Templates Store
Initiate Ttx Specific Community—Business Plan List and Discussion Board
Initiate Ttx Specific Community—Business Plan Preparation
Initiate Ttx Specific Community—Consortium Management, Governance, Legal
Initiate Ttx Specific Community—Disconnects (Systemic Problems) List
Initiate Ttx Specific Community—Event/Webinar/Class/Conference/Gathering Management Site
Initiate Ttx Specific Community—Expert List and Board
Initiate Ttx Specific Community—Generated Variant Discussion Board
Initiate Ttx Specific Community—Grants/Government Assistance/Government Interest
Initiate Ttx Specific Community—Interested Advisor List and Board
Initiate Ttx Specific Community—Interested Entrepreneur/Worker List and Board
Initiate Ttx Specific Community—Interested Investor List and Board
Initiate Ttx Specific Community—Interested Member List and Board
Initiate Ttx Specific Community—Library Submission Board
Initiate Ttx Specific Community—Library, Document Descriptions and Discussions
Initiate Ttx Specific Community—Novelty Discussion
Initiate Ttx Specific Community—Opportunity Submission Board
Initiate Ttx Specific Community—Outreach Submission Board
Initiate Ttx Specific Community—Prior Art Discussion
Initiate Ttx Specific Community—Product Discussion
Initiate Ttx Specific Community—Product List and Board
Initiate Ttx Specific Community—Product Plan Preparation
Initiate Ttx Specific Community—Product Store
Initiate Ttx Specific Community—Roadblock Submission Board
Initiate Ttx Specific Community—Service Provider List and Board
Initiate Ttx Specific Community—ShoutOut Submission Board
Initiate Ttx Specific Community—Side Conversation Board
Initiate Ttx Specific Community—Students' After Technology Activity Board
Initiate Ttx Specific Community—Students' Post-Graduation Technology Community
Initiate Ttx Specific Community—Technology Alert List and Discussion Board
Initiate Ttx Specific Community—Technology Chat Room
Initiate Ttx Specific Community—Technology Discussion Forum
Initiate Ttx Specific Community—Technology Improvement Idea List and Discussion Board
Initiate Ttx Specific Community—Technology Interest Group Content Site
Initiate Ttx Specific Community—Topic Blog
Initiate Ttx Specific Community—Topic Description and Properties, Cncpttrrts, Discussion
Initiate Ttx Specific Community—Cncpttrrt Discussion Board
Initiate Ttx Specific Community—Utility Patent Preparation
Initiate Ttx Specific Community—Utility Patent Prosecution
Initiate Ttx Specific Community—Work Product Submission Suite Workflow and Alerts process Workflows Processes Define Workflow Use Case: Define Workflow.

Define Workflow Step

Use Case: Define Workflow Step.

Administer Workflow

Use Case: Administer Workflow.

Alerts Processes

Define Alert

Use Case: Define Alert.

Request Alert

Use Case: Request Alert—Enter a request for alerts to be sent when specific changes are made to a dxo.

The request is made against an object being indicated by the user and may include all members of the category being indicated if a cnxpt category is being indicated.

Request Alert on Ttx

Use Case: Request Alert on Ttx—Sign up to be informed about changes to a cnxpt representing a ttx.

Request Alert on Tcept

Use Case: Request Alert on Tcept—Sign up to be informed about changes to a tcept, including, but not limited to stating a monetary assessment of the value due to the usefulness of the tcept in satisfying the requirements of an appcept if available in a specified timeframe.

Request Alert on Appcept

Use Case: Request Alert on Appcept—Sign up to be informed about changes to an axpt, including, but not limited to stating a monetary assessment of the value of the solution for the user if available in a specified timeframe.

Receive Alert

Use Case: Receive Alert.

Link Alert, Workflow Activation

Use Case: Link Alert, Workflow Activation.

Set Workflow Step to Issue Alert

Use Case: Set Workflow Step to Issue Alert.

Administer Alert

Use Case: Administer Alert.

Government Purpose Process

Manage Innovation on Policy Level and/or Research Funding

Set Incentives on Tcepts

Use Case: Set Incentives on Tcepts—Set incentives based upon need for ideas to solve policy issues.

Provide and Advertise for Special Opportunities for Ttx categories

Use Case: Provide and Advertise for Special Opportunities for Ttx categories.

Advertise Employment or Consulting Opportunity

Use Case: Advertise Employment or Consulting Opportunity—Advertise as on a job board to state that a position or consulting role, however long, is available.

When advertised in relation to one or more specific ttxs or ttx categories, the statement includes by relation the meaning that the opportunity involves the ttxs it is related to. Less formal advertisements or even casual statements about possible openings are included here.

Register a Response to Employment or Consulting Opportunity

Use Case: Register a Response to Employment or Consulting Opportunity—Respond to a job board announcement for a position or consulting role.

When responding to an advertisement in relation to a specific ttx or ttx category, the registration statement includes by reference the meaning that the registrant has sufficient skills within that ttx area.

Register a Willingness to Take Employment or Consulting Opportunities

Use Case: Register a Willingness to Take Employment or Consulting Opportunities—Register a statement that the user will consider taking on work related to a ttx.

When registering a willingness in relation to a specific ttx or ttx category, the registration statement includes by reference the meaning that the registrant has sufficient skills within that ttx area to complete related work.

All registrations should be related to a ttx, or will most likely not be considered.

Manage Demand Side Such as Defense Purchasing

Advertise for Brainstorming and Set Incentives on Ttxs

Use Case: Advertise for Brainstorming and Set Incentives on Ttxs.

Manage IP Assets

Advertise for Tech Transfer

Use Case: Advertise for Tech Transfer.

Data Structures for Mapping

Dxo Info-Items

Dxo info-items, without specialization, represent only a graphic. In one embodiment, dxo info-items have values for various properties including, but not limited to: (see txo, and additionally:)

Other Properties:

[position:size]: World coordinates by fxxt in tuple form with size for the positioning. Each position can be implemented as a tuple consisting of a 'dirtied' flag, a 'last calculated timestamp', a fxxt or blank, a basis heuristic identifier, a summary association identifier serving as the basis for the position, a set of world coordinates (x, y, z). Referred to in the algorithms as 'Dxo or Txo Position Tuple for Fxxt Map'. Positioning is fxxt and fxxt map specific, and many positions may exist for any single dxo or txo on a fxxt map. Relative size by importance by fxxt. Each size can be implemented as a tuple consisting of a 'dirtied' flag, a 'last calculated timestamp', a fxxt or blank, a basis heuristic identifier, a summary association identifier serving as the basis for the size, a size. Referred to in the algorithms as 'Dxo or Txo Size Tuple for Fxxt Map'. Sizing is fxxt and fxxt map specific, and specific to a single occurrence of the positioned dxo or txo, and many sizes may exist for any single dxo or txo on a fxxt map. Size and position may be stored in the same tuple, and the tuple may have a 'parent radius size' to allow for later resizing on a scaled basis.)

[type:timeframe:timestamp:prediction]: A calculated value, one type per fxxt in tuple form with a set meaning based upon the type. Each prediction can be implemented as a tuple consisting of a timeframe applicable, 'dirtied' flag, a 'last calculated timestamp', a type; a fxxt or blank, a basis heuristic identifier, a summary association identifier serving as the basis for the prediction, a value. Referred to in the algorithms as 'Dxo or Txo Prediction Tuple for Fxxt Map'. Prediction is timeframe, type, fxxt and fxxt map specific, and many predictions may exist for any single dxo or txo in any fxxt map, but each must have a different type:timeframe.

[type:source:timeframe:metric]: A set value, from a source, one type per source per fxxt in tuple form with a set meaning based upon the type. Each metric can be implemented as a tuple consisting of a timeframe applicable, 'dirtied' flag, a 'last set timestamp', a type; a fxxt or blank, a source identifier, a value. Referred to in the algorithms as 'Dxo or Txo Metric Tuple for Fxxt Map'. Metric is type, timeframe, source, fxxt and fxxt map specific, and many metrics may exist for any single dxo or txo in any fxxt map, but each must have a different type:source:timeframe.

Txo Info-Items

Txo info-items represent tpxs. In one embodiment, txo info-items have values for various properties including, but not limited to:

[txo names]: A set of txo name objects. This is the set of txo names assigned to this txo info-item.

[txo descriptions]: A set of tpx description objects. This is the set of tpx descriptions assigned to this txo info-item.

[info-item identifier]: A single locator. The info-item identifier of the txo.

[attributes]: A set of attributes with values. Each attribute can be implemented as a tuple consisting of a property name, an attribute datatype, and an attribute value. Multiple tuples may exist with the same property name. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property. In one embodiment, the tuple would also optionally contain an rsxitem property, and a TEMPORARY Boolean to show the basis of the property, and a weight (positive or negative) stating a subjective opinion strength by the person creating it.

Required attribute properties include:

- [TEMPORARY INDICATOR]: A single Boolean. If true, the info-item is temporary.
- [DELETE INDICATOR]: A single Boolean. If true, the info-item is to be deleted during cleanup.

Optional attribute properties include:

- [LOCKED INDICATOR]: A single Boolean. If true, the info-item may not be altered unless this attribute is overridden.
- [RAW REFERENCE]: A string containing a reference, which may later cause a citation relationship, found in the source material represented by this txo info-item.

[txo properties]: A set of properties as specified by a reference to a txo defining the property value. Each txo property can be implemented as a tuple consisting of a property name, and a reference to a txo. Multiple tuples may exist with the same property name. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property. In one embodiment, the tuple would also optionally contain an rsxitem property, and a TEMPORARY Boolean to show the source of the property.

Required txo properties include:

[TYPE]: An info-item identifier for an infxtypx txo specifying the type of txo info-item.

Optional txo properties include:

[CREATOR]: An info-item identifier for a user txo representing the person in editorial control of the txo info-item, defaulted to the user first creating or causing the creation of the txo info-item.

[SCOPX]: An info-item identifier for a scopx txo.

[SOURCE]: An info-item identifier for a source txo.

[AVATAR]: An info-item identifier for an Avatar dxo for the txo info-item.

[access control list]: A set of permissions for accessing the txo info-item. Each permission can be implemented as a tuple consisting of a property name (or null if applicable generally to the txo info-item), an action type, a permission level, and a reference to a user role, class, or a specific user info-item identifier for the type of user allowed to access the information or to make the change. If no permission is listed, then no access is granted to anyone other than the 'system owner class' of users.

[queries]: A set of query info-items. This is the set of queries assigned to this txo info-item.

[result sets]: A set of result set items. This is the set of result sets assigned to this txo info-item. (Other result sets may be assigned to queries and not be assigned directly to the txo info-item.)

[occurrences]: A set of occurrence items. This is the set of occurrences assigned to this txo info-item.

[affinitive associations]: A set of affinitive relationships. This is the set of affinitive relationships assigned to this txo info-item, in special relationship to a specific cnxpt only.

[hierarchical associations]: A set of hierarchical associations. This is the set of hierarchical relationships assigned to this txo info-item, in special relationship to a specific cnxpt. (In one embodiment, these may stem only from relationships with cnxpts.) (In one embodiment, these may stem from relationships with cnxpts or with other txos.) (In one embodiment, these are all set based only upon user entries without further analysis. In one embodiment, these are based upon simple merging heuristics.)

[prior]: An info-item, or null. If given, the info-item construct in a older VERSION that is equivalent to this info-item.

[parent]: An info-item. An info-item identifier of the installation and version of the ontology containing the txo info-item.

[merged info-item identifiers]: A set of locators. The info-item identifiers of txos now deleted due to merger with a txo info-item. These info-item identifiers have the form of [parent][item identifier] to allow for merging of txos across ontology installations and versions.

[alteration audit trail]: A set of actions taken to alter the txo info-item, retained as a change history. Each change can be implemented as a tuple consisting of a property name, an old value, a new value, a change timestamp, an optional rationale for the change, and a reference to a user info-item identifier for the person making the change.

Other Properties:

[position:size] see dxo, above.

[type:timeframe:timestamp:prediction]: see dxo, above.

[type:source:timeframe:metric]: see dxo, above.

Cnxpt Info-Items

Cnxpt info-items represent ttxs. In one embodiment, cnxpt info-items have values for various properties including, but not limited to:

[cnxpt names]: A set of ttx name objects. This is the set of ttx names assigned to this cnxpt.

[cnxpt descriptions]: A set of ttx description objects. This is the set of ttx descriptions assigned to this cnxpt.

[info-item identifier]: A single locator. The info-item identifier of the cnxpt.

[attributes]: A set of attributes with values. Each attribute can be implemented as a tuple consisting of a property name, an attribute datatype, and an attribute value. Multiple tuples may exist with the same property name. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property. In one embodiment, the tuple would also optionally contain an rsxitem property, and a TEMPORARY Boolean to show the basis of the property, and a weight (positive or negative) stating a subjective opinion strength by the person creating it.

Required attribute properties include:

[GOAL INDICATOR]: A single Boolean. If true, the info-item is a Goal.

[TEMPORARY INDICATOR]: A single Boolean. If true, the info-item is temporary.

[DELETE INDICATOR]: A single Boolean. If true, the info-item is to be deleted during cleanup.

Optional attribute properties include:

[LOCKED INDICATOR]: A single Boolean. If true, the info-item may not be altered unless this attribute is overridden.

[RAW REFERENCE]: A string containing a reference, which may later cause a citation relationship, found in the source material represented by this cnxpt.

[txo properties]: A set of properties as specified by a reference to a txo defining the property value. Each txo property can be implemented as a tuple consisting of a property name, and a reference to a txo. Multiple tuples may exist with the same property name. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property. In one embodiment, the tuple would also optionally contain an rsxitem property, a TEMPORARY Boolean to show the basis of the property, and a weight (positive or negative) stating a subjective opinion strength by the person creating it.

Required txo properties include:

[TYPE]: An info-item identifier for an infxtypx txo specifying the type of cnxpt.

Optional txo properties include:

[CREATOR]: An info-item identifier for a user txo representing the person in editorial control of the cnxpt, defaulted to the user first creating or causing the creation of the cnxpt.

[SCOPX]: An info-item identifier for a scopx txo.

[FXXT]: An info-item identifier for a fxxt txo.

[SOURCE]: An info-item identifier for a source txo.

[AVATAR]: An info-item identifier for an Avatar dxo for the cnxpt info-item.

[access control list]: A set of permissions for accessing the cnxpt. Each permission can be implemented as a tuple consisting of a property name (or null if applicable generally to the cnxpt), an action type, a permission level, and a reference to a user role, class, or a specific user info-item identifier for the type of user allowed to access the information or to make the change. If no permission is listed, then no access is granted to anyone other than the 'system owner class' of users.

[queries]: A set of tuples specifying queries and their purpose for the cnxpt. This is the set of queries assigned to this cnxpt. In one embodiment, each query specifier can be implemented as a tuple consisting of a property name, a permission level, a reference to a user info-item (EDITOR—the person in editorial control of the query, defaulted to the user first creating or causing the creation of the cnxpt, or if not set, the user creating the query.), a reference to a query info-item identifier, and a DIRECTION (indicating whether the query is a list of Parents (TRUE) or a list of Children (FALSE) (default) cnxpts).

[result sets]: A set of tuples specifying result sets and their purpose for the cnxpt. This is the set of result sets assigned to this cnxpt specifically. (Other result sets may be assigned to queries and not be assigned directly to the cnxpt.) Each Result Set specifier can be implemented as a tuple consisting of a property name, a permission level, a 'last change timestamp', a reference to a user info-item (EDITOR—the person in editorial control of the Result Set, defaulted to the user first creating or causing the creation of the cnxpt.), and a reference to a result set info-item, and a DIRECTION (indicating whether the query is a list of Parents (PARENTS) or a list of Children (CHILDREN) (default) or a list of siblings (SIBLINGS) cnxpts). In one embodiment, a weight may be specified to state the strength of the result set in determining the identity of the goal or cnxpt, to be applied to relationships stemming from the result set.

[occurrences]: A set of occurrence items. This is the set of occurrences assigned to this cnxpt.

[affinitive associations]: A set of affinitive associations. This is the set of affinitive associations assigned to this cnxpt.

[hierarchical associations]: A set of hierarchical associations. This is the set of hierarchical associations assigned to this cnxpt.

[prior]: An info-item, or null. If given, the info-item construct in a older VERSION that is equivalent to this info-item.

[parent]: An info-item. An info-item identifier of the installation and version of the ontology containing the cnxpt.

[merged info-item identifiers]: A set of locators. The info-item identifiers of cnxpts now deleted due to merger with a cnxpt. These info-item identifiers have the form of [parent] [item identifier] to allow for merging of cnxpts across ontology installations and versions.

[existence votes]: A set of votes in favor or against the existence of the cnxpt. Each vote can be implemented as a tuple consisting of a vote weight (positive or negative) stating a subjective opinion strength, an optional rationale for the vote, and a reference to a user info-item identifier.

Vote Properties:

[importance votes]: A set of votes specifically stating opinions regarding the importance of the cnxpt. Each vote can be implemented as a tuple consisting of a vote weight (positive or negative) stating a subjective opinion strength, an optional rationale for the vote, and a reference to a user info-item identifier.

[alteration votes]: A set of votes in favor or against a value of a property of the cnxpt. Each vote can be implemented as a tuple consisting of a vote weight (positive or negative) stating a subjective opinion strength, an optional rationale for the vote, and a reference to a user info-item identifier.

[interest votes]: A set of votes showing interest in the cnxpt. Each vote can be implemented as a tuple consisting of an interest type info-item identifier, a timestamp for uniqueness, a fxxt where the interest was shown, and a reference to a user info-item identifier.

Summary Properties:

[attribute summaries]: A set of attribute vote summary items calculated for this cnxpt. Each attribute summary can be implemented as a tuple consisting of an attribute name, a 'dirtied' flag, a 'last calculated timestamp', a fxxt or blank, a scopx or blank, a basis heuristic name, a summarized weight, an attribute datatype, and an attribute value.

[txo property summaries]: A set of txo property vote summary items calculated for this cnxpt. Each summary can be implemented as a tuple consisting of a txo property name, a 'dirtied' flag, a 'last calculated timestamp', a basis heuristic name, a summarized weight, a summary value, and a txo identifier. In one embodiment, the tuple would also optionally contain a scopx property. In one embodiment, the tuple would also optionally contain a fxxt property.

[existence summaries]: A set of vote summary items calculated for this cnxpt. Each summary can be implemented as a tuple consisting of a summary name, a 'dirtied' flag, a 'last calculated timestamp', a fxxt or blank, a scopx or blank, a basis heuristic name, and a summary weight value.

[interest summaries]: A set of vote summary items showing interest in the cnxpt. Each vote can be implemented as a tuple consisting of an interest type info-item identifier, a 'dirtied' flag, a 'last calculated timestamp', an optional fxxt where the interest was shown, an optional basis heuristic identifier, and a summary value for the interest.

[importance summaries]: A set of importance summary metric items, one for each fxxt, showing overall perceived importance of the cnxpt. Each metric can be implemented as a tuple consisting of a 'dirtied' flag, a 'last calculated timestamp', a fxxt where the interest was shown (or blank), an optional basis heuristic identifier, and a summary value for the importance.

[fxxt summaries]: A set of fxxt summary items calculated for this cnxpt. Each fxxt summary can be implemented as a tuple consisting of a 'dirtied' flag, a 'calculated but rejected' flag (stating that the cnxpt was tested for membership and rejected as not being in the fxxt), a 'last calculated timestamp', a basis heuristic identifier, a set of txo property identifiers serving as the basis for the summary, an optional derived ontology identifier, and a fxxt identifier. (The fxxt identifier also provides the fxxt calculation specification if not a base fxxt.)

Other Properties:

[position:size]: World coordinates by fxxt in tuple with size for the positioning. Each position can be implemented as a tuple consisting of a 'dirtied' flag, a 'last calculated timestamp', a fxxt or blank, a basis heuristic identifier, a summary association identifier serving as the basis for the position, a set of world coordinates (x, y, z). Referred to in the algorithms as 'Cnxpt Position Tuple for Fxxt'. Positioning is fxxt and fxxt map specific. Relative size by importance by fxxt. Each size can be implemented as a tuple consisting of a 'dirtied' flag, a 'last calculated timestamp', a fxxt or blank, a basis heuristic identifier, a summary association identifier serving as the basis for the size, a size. Referred to in the algorithms as 'Cnxpt Size Tuple for Fxxt'.

Sizing is fxxt and fxxt map specific, and specific to a single occurrence of the positioned cnxpt.

(in the above, and wherever heuristics result in a record below, wherever an 'identifier serving as the basis' is listed, the actual implementation will be more effective if the identifier of the derived record is placed into the basis record, inverting the tree to create a derivation tree. This will be adjusted in a later draft and will have ramifications in all the remaining text as well. The actual intention is to be building the derivation trees as the processing takes place.)

Sizes and positions may be stored in the same tuple. All size and positions for any cnxpt are stored in separate tuples, with a foreign key to a fxxt. Prior positions are also stored in separate tuples (many per cnxpt, with a foreign key to a fxxt, with A radius of the cnxpt and a radius of the parent cnxpt each taken when the prior position was created), with an additional index to allow for determining generational differences (thru 'generation history') per fxxt, and to allow for roll-back during testing. Prior positions allow for faster resolution of the positioning heuristics.

[type:timeframe:timestamp:prediction]: A calculated value, one type per fxxt in tuple form with a set meaning based upon the type. Each prediction can be implemented as a tuple consisting of a timeframe applicable, 'dirtied' flag, a 'last calculated timestamp', a type; a fxxt or blank, a basis heuristic identifier, a summary association identifier serving as the basis for the prediction, a value. Referred to in the algorithms as 'Cnxpt Prediction Tuple for Fxxt Map'. Prediction is timeframe, type, fxxt and fxxt map specific, and many predictions may exist for any single cnxpt in any fxxt map, but each must have a different type:timeframe.

[type:source:timeframe:metric]: A set value, from a source, one type per source per fxxt in tuple form with a set meaning based upon the type. Each metric can be implemented as a tuple consisting of a timeframe applicable, 'dirtied' flag, a 'last set timestamp', a type; a fxxt or blank, a source identifier, a value. Referred to in the algorithms as 'Cnxpt Metric Tuple for Fxxt Map'. Metric is type, timeframe, source, fxxt and fxxt map specific, and many metrics may exist for any single cnxpt in any fxxt map, but each must have a different type:source:timeframe.

Relationships:

[occurrence summaries]: A set of occurrence summary items calculated for this cnxpt. Each summary can be implemented as a tuple consisting of a summary name, a 'dirtied' flag, a 'last calculated timestamp', and a relationship identifier.

[affinitive association summaries]: A set of affinitive association summary items calculated for this cnxpt. Each summary can be implemented as a tuple consisting of a summary name, a 'dirtied' flag, a 'last calculated timestamp' and a relationship identifier.

[hierarchical association summaries]: A set of hierarchical association summary items calculated for this cnxpt. Each summary can be implemented as a tuple consisting of a summary name, a 'dirtied' flag, an 'effective' weight, a 'last calculated timestamp', and a relationship identifier.

[affinitive tensors]: A set of affinitive summary tensors calculated for this cnxpt. Each tensor can be implemented as a tuple consisting of a 'dirtied' flag, a 'last calculated timestamp', a fxxt or blank, a basis heuristic identifier, a set of summary association serving as the basis for the summary, and a cnxpt identifier. Each tensor states a relative strength of the 'gravity' to the sibling or cousin (cnxpts at same depth from some ancestor, but with different immediate parent) cnxpt identified in the fxxt.

[hierarchical tensors]: A set of hierarchical tensors calculated for this cnxpt, one per fxxt. Each tensor can be implemented as a tuple consisting of a 'dirtied' flag, a 'last calculated timestamp', a fxxt or blank, a basis heuristic identifier, a set of summary association identifiers serving as the basis for the tensor, a weight, the depth (from the root of the tree, where the root in the fxxt would be 0), and a cnxpt identifier that is the parent of this cnxpt in the fxxt.

[child tensors]: A set of hierarchical child tensors calculated for this cnxpt in the fxxt. Each tensor can be implemented as a tuple consisting of a 'dirtied' flag, a 'last calculated timestamp', a fxxt or blank, a basis heuristic identifier, a set of summary association identifiers serving as the basis for the tensor, a weight, the depth (of the CHILD, for symmetry) (from the root of the tree plus 1, where the child tensors connected to a root would have the value of 1), and a cnxpt identifier that is the child of this cnxpt in the fxxt. Zero or more of these child tensors may exist for each fxxt.

Search and Query Info-Items

Query info-items provide scripts for performing multi-step searches and are a binding point for search artifacts. Search and Find info-items are specializations of the query info-item, limited by the number of steps (to one) and by the nature of the results (to selection sets and Areas of Consideration). In one embodiment, Search and Find info-items are not subject to re-execution without a change of the search specification. In one embodiment, query info-items have values for various properties including, but not limited to:

[query names]: A set of zero or more query name objects. This is the set of ttx names assigned to this query.

[query descriptions]: A set of zero or more query description objects assigned to this query.

[info-item identifier]: A single locator. The info-item identifier of the query.

[attributes]: A set of zero or more attributes with values. Each attribute can be implemented as a tuple consisting of a property name, an attribute datatype, and an attribute value. In one embodiment, multiple tuples may not exist with the same property name.

Required attribute properties include:

- [LOCKED INDICATOR]: A single Boolean. If true, the info-item is may not be rerun unless this attribute is overridden.
- [TEMPORARY INDICATOR]: A single Boolean. If true, the info-item is temporary.
- [DELETE INDICATOR]: A single Boolean. If true, the info-item is to be deleted during cleanup.
- [LAST EXECUTED TIMESTAMP]: A timestamp stating when the query was last executed.
- [COMPLETION STATUS]: A single Boolean. If true, the query has been executed or re-executed since the most recent event or scheduled re-execution time.

Optional attribute properties include:

- [AUTOMATIC RERUN INDICATOR]: A single Boolean. If true, the query may be rerun automatically upon a system change event, at the end of a period, or a specific time.
- [AUTOMATIC RERUN INDICATOR]: A time period specification stating the cycle time after which the query should be re-executed.
- [AUTOMATIC RERUN INDICATOR]: A timestamp stating when the query should next be re-executed.
- [WEIGHT]: A weight. In one embodiment, a weight may be specified to state the strength of the result set in determining the identity of the goal or cnxpt, to be applied to relationships stemming from the result set.

[txo properties]: A set of properties as specified by a reference to a txo defining the property value. Each txo property can be implemented as a tuple consisting of a property name, and a reference to a txo. In one embodiment, multiple tuples may not exist with the same property name.

Required txo properties include:

[TYPE]: An info-item identifier for an infxtypx txo specifying the type of info-item, from the list including but not limited to: 'query', 'search', 'FindAll'.

Optional txo properties include:

[CREATOR]: An info-item identifier for a user txo representing the person in editorial control of the query, defaulted to the user first creating or causing the creation of the query.

[FXXT]: An info-item identifier for a fxxt txo.

[AVATAR]: An info-item identifier for an Avatar dxo for the query.

[AUTOMATIC RERUN EVENT TYPE]: An info-item identifier for an event type, which, if it occurs, will trigger a re-execution of this query.

[access control list]: A set of permissions for accessing the query. Each permission can be implemented as a tuple consisting of a property name (or null if applicable generally to the query), an action type, a permission level, and a reference to a user role, class, or a specific user info-item identifier for the type of user allowed to access the information or to make the change. If no permission is listed, then no access is granted to anyone other than the 'system owner class' of users.

[query script steps]: A set of tuples specifying query step specifications, their execution status, and their processing order for the query. This is the set of steps required to complete the query. Each query script step can be implemented as a tuple consisting of an ordering number, an 'automatic rerun indicator', a completion status, a 'last executed timestamp', a reference to a result set (or selection set) info-item identifier (which must exist in the result set property below.

[result set]: A set of tuples specifying result sets and their purpose for the query. This is the set of result sets assigned to this query. One of these will be the last step's result set and is the result for the query. Each Result Set specifier can be implemented as a tuple consisting of a property name, a permission level, a 'last change timestamp', a reference to a user info-item (EDITOR), and a reference to a result set info-item.

Required Result Set specifier properties include:

[RESULT SET]: An info-item identifier for a Result Set.

[LAST CHANGE TIMESTAMP]: A timestamp stating when the last change was made to a Result Set.

Optional Result Set specifier properties include:

[EDITOR]: An info-item identifier for a user txo representing the person in editorial control of the Result Set, defaulted to the user first creating or causing the creation of the cnxpt.

[DIRECTION]: A value indicating whether the Result Set is a list of Parents, a list of Children (default), or a list of Sibling cnxpts.

[derived from]: An info-item, or null. If given, the info-item is a query from which this info-item was derived, but is not equivalent to.

[prior]: An info-item, or null. If given, the info-item construct in a older VERSION that is equivalent to this info-item.

[parent]: An info-item. An info-item identifier of the installation and version of the ontology containing the query.

(in the above, and wherever heuristics result in a record below, wherever an 'identifier serving as the basis' is listed, the actual implementation will be more effective if the identifier of the derived record is placed into the basis record, inverting the tree to create a derivation tree. This will be adjusted in a later draft and will have ramifications in all the remaining text as well. The actual intention is to be building the derivation trees as the processing takes place.)

Relationships

In one embodiment, relationship info-items (relationships other than commonality relationships or internal attachment relationships) have values for various properties including, but not limited to:

[info-item identifier]: A single locator. The info-item identifier of the relationship.

[relationship names]: An optional set of relationship name objects. This is the set of names assigned to this relationship.

[attributes]: A set of attributes with values. Each attribute can be implemented as a tuple consisting of an property name, an attribute datatype, and an attribute value. In one embodiment, multiple tuples may exist with the same property name. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property.

Required attribute properties include:

[TEMPORARY INDICATOR]: A single Boolean. If true, the info-item is temporary.

[DELETE INDICATOR]: A single Boolean. If true, the info-item is to be deleted during cleanup.

Optional attribute properties include:

[LOCKED INDICATOR]: A single Boolean. If true, the relationship may not be altered unless this attribute is overridden or an info-item in one of its roles is deleted or replaced.

[txo properties]: A set of properties as specified by a reference to a txo defining the property value. Each txo property can be implemented as a tuple consisting of a property name, and a reference to a txo. In one embodiment, multiple tuples may exist with the same property name. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property.

Required txo properties include:

[TYPE]: An info-item identifier for an infxtypx txo specifying the type of relationship.

Optional txo properties include:

[CREATOR]: An info-item identifier for a user txo representing the person in editorial control of the relationship, defaulted to the user first creating or causing the creation of the relationship.

[SCOPX]: An info-item identifier for a scopx txo.

[FXXT]: An info-item identifier for a fxxt txo.

[SOURCE]: An info-item identifier for a source txo.

Required txo properties for summary relationships include:

[HEURISTIC]: An info-item identifier for a heuristic txo which was the basis for the relationship's generation.

[access control list]: A set of permissions for accessing the relationship. Each permission can be implemented as a tuple consisting of a property name (or null if applicable generally to the relationship), an action type, a permission level, and a reference to a user role, class, or a specific user info-item identifier for the type of user allowed to access the information or to make the change. If no permission is listed, then no access is granted to anyone other than the 'system owner class' of users.

[roles]: An ordered set of roles with info-item identifiers as values. Each role can be implemented as a tuple consisting of a role name and an info-item identifier value. Multiple tuples may not exist for the same role name. In one embodiment, multiple tuples may optionally exist for the same role name to allow multiple info-items to play a role. Roles may be optional, as specified in a relationship template. No relationship may exist without a valid info-item identifier in a required role. In one embodiment, whether multiple identifiers may exist with the same role is set by the template for the relationship.

[prior]: An info-item, or null. If given, the info-item construct in a older VERSION that is equivalent to this info-item.

[parent]: An info-item. An info-item identifier of the installation and version of the ontology containing the relationship.

[merged info-item identifiers]: A set of locators. The info-item identifiers of relationships now deleted due to merger with a relationship. These info-item identifiers have the form of [parent][item identifier] to allow for merging of relationships across ontology installations and versions.

[summary basis roles]: An ordered set of roles held by relationship identifiers which were the basis for the summary relationship's generation.

[heuristic statuses]: A set of statuses regarding the stage of processing completed for a heuristic for a summary relationship. Each status may be implemented as a tuple consisting of a heuristic identifier, a 'status number' which is known by the heuristic as an indicator of what has been completed for the summary relationship, a fxxt for which the heuristic is being executed, and a timestamp. A status of −1 is useful for the status that the summary relationship has been rejected for further processing. A status of 0 is useful for the status that the summary relationship has not yet been processed for the heuristic. Other negative numbers are useful to indicate unsuccessful processing conditions.

[basis]: A list of rsxitem sources. Each basis property can be implemented as a tuple consisting of a TEMPORARY Boolean to show the source of the property, a weight (positive or negative) stating a subjective opinion strength by the person creating and attaching the result set, and an rsxitem identifier value.

[existence votes]: A set of votes in favor or against the existence of the relationship. Each vote can be implemented as a tuple consisting of a vote weight (positive or negative) stating a subjective opinion strength, an optional rationale for the vote, and a reference to a user info-item identifier.

[alteration votes]: A set of votes in favor or against a value of a property of the relationship. Each vote can be implemented as a tuple consisting of a vote weight (positive or negative) stating a subjective opinion strength, an optional rationale for the vote, and a reference to a user info-item identifier.

(in the above, and wherever heuristics result in a record below, wherever an 'identifier serving as the basis' is listed, the actual implementation will be more effective if the identifier of the derived record is placed into the basis record, inverting the tree to create a derivation tree. This will be adjusted in a later draft and will have ramifications in all the remaining text as well. The actual intention is to be building the derivation trees as the processing takes place.)

Name objects

Name objects contain names of info-items. In one embodiment, name objects have values for various properties including, but not limited to:

[object identifier]: A single locator. The object identifier of the name object.

[attributes]: A set of attributes with values. Each attribute can be implemented as a tuple consisting of a property name element, an attribute datatype element stating the format of the value element, and an attribute value element. Multiple tuples may not exist with the same property name.

Required attribute properties include:

- [VALUE]: A name.

Optional attribute properties include:

- [REPLACED BY]: A name object identifier.
- [WEIGHT]: A weight stating quality or priority for the name.
- [LOCKED INDICATOR]: A single Boolean. If true, the object may not be altered unless this attribute is overridden.

[txo properties]: A set of properties as specified by a reference to a txo defining the property value. Each txo property can be implemented as a tuple consisting of a property name, and a reference to a txo. Multiple tuples may not exist with the same property name.

Required txo properties include:

Optional txo properties include:

- [SCOPX]: An info-item identifier for a scopx txo.
- [FXXT]: An info-item identifier for a fxxt txo.
- [TYPE]: An info-item identifier for an infxtypx txo.
- [CREATOR]: An info-item identifier for a user txo representing the person in editorial control of the name, defaulted to the user first creating or causing the creation of the name.
- [SOURCE]: An info-item identifier for a source txo.

[access control list]: A set of permissions for accessing the name. Each permission can be implemented as a tuple consisting of a property name (or null if applicable generally to the name), an action type, a permission level, and a reference to a user role, class, or a specific user info-item identifier for the type of user allowed to access the information or to make the change. If no permission is listed, then no access is granted to anyone other than the 'system owner class' of users.

[variants]: A set of name variant objects. This is the set of alternative names for the name in this object.

Name variant objects contain alternative names of info-items. In one embodiment, name objects have values for various properties including, but not limited to:

[object identifier]: A single locator. The object identifier of the name variant object.

[attributes]: A set of attributes with values. Each attribute can be implemented as a tuple consisting of a property name element, an attribute datatype element stating the format of the value element, and an attribute value element. Multiple tuples may not exist with the same property name.

Required attribute properties include:

- [VALUE]: An alternative name considered better than the primary name by the creator.

Optional attribute properties include:

- [REPLACED BY]: A name variant object identifier.
- [WEIGHT]: A weight stating quality or priority for the name variant, set by default or calculated from votes.
- [ISSUE]: A statement objecting to the primary name with a rationale why the variant is better.

[LOCKED INDICATOR]: A single Boolean. If true, the object may not be altered unless this attribute is overridden.

[txo properties]: A set of properties as specified by a reference to a txo defining the property value. Each txo property can be implemented as a tuple consisting of a property name, and a reference to a txo. Multiple tuples may not exist with the same property name.

Required txo properties include:

[CREATOR]: An info-item identifier for a user txo representing the person in editorial control of the variant.

Optional txo properties include:

[SCOPX]: An info-item identifier for a scopx txo.

[FXXT]: An info-item identifier for a fxxt txo.

[SOURCE]: An info-item identifier for a source txo.

[votes]: A set of votes in favor or against the name. Each vote can be implemented as a tuple consisting of a vote weight (positive or negative) stating a subjective opinion strength, an optional rationale for the vote, and a reference to a user info-item identifier.

Description Objects

Description objects contain descriptions for info-items. In one embodiment, description objects have values for various properties including, but not limited to:

[object identifier]: A single locator. The object identifier of the description object.

[attributes]: A set of attributes with values. Each attribute can be implemented as a tuple consisting of a property name element, an attribute datatype element stating the format of the value element, and an attribute value element. Multiple tuples may not exist with the same property name.

Required attribute properties include:

[VALUE]: A description.

Optional attribute properties include:

[REPLACED BY]: A description object identifier.

[WEIGHT]: A weight stating quality or priority for the description.

[LOCKED INDICATOR]: A single Boolean. If true, the object may not be altered unless this attribute is overridden.

[txo properties]: A set of properties as specified by a reference to a txo defining the property value. Each txo property can be implemented as a tuple consisting of a property name, and a reference to a txo. Multiple tuples may not exist with the same property name.

Required txo properties include:

Optional txo properties include:

[SCOPX]: An info-item identifier for a scopx txo.

[FXXT]: An info-item identifier for a fxxt txo.

[TYPE]: An info-item identifier for an infxtypx txo.

[CREATOR]: An info-item identifier for a user txo representing the person in editorial control of the description, defaulted to the user first creating or causing the creation of the description.

[SOURCE]: An info-item identifier for a source txo.

[access control list]: A set of permissions for accessing the description. Each permission can be implemented as a tuple consisting of a property name (or null if applicable generally to the description), an action type, a permission level, and a reference to a user role, class, or a specific user info-item identifier for the type of user allowed to access the information or to make the change. If no permission is listed, then no access is granted to anyone other than the 'system owner class' of users.

[variants]: A set of description variant objects. This is the set of alternative descriptions for the description in this object.

Description variant objects contain alternative descriptions of info-items. In one embodiment, description objects have values for various properties including, but not limited to:

[object identifier]: A single locator. The object identifier of the description variant object.

[attributes]: A set of attributes with values. Each attribute can be implemented as a tuple consisting of a property name element, an attribute datatype element stating the format of the value element, and an attribute value element. Multiple tuples may not exist with the same property name.

Required attribute properties include:

[VALUE]: A description.

Optional attribute properties include:

[REPLACED BY]: A description variant object identifier.

[WEIGHT]: A weight stating quality or priority for the description variant.

[ISSUE]: A statement summarizing a rationale regarding why the variant is better.

[LOCKED INDICATOR]: A single Boolean. If true, the object may not be altered unless this attribute is overridden.

[txo properties]: A set of properties as specified by a reference to a txo defining the property value. Each txo property can be implemented as a tuple consisting of a property name, and a reference to a txo. Multiple tuples may not exist with the same property name.

Required txo properties include:

[CREATOR]: An info-item identifier for a user txo representing the person in editorial control of the variant.

Optional txo properties include:

[SCOPX]: An info-item identifier for a scopx txo.

[FXXT]: An info-item identifier for a fxxt txo.

[SOURCE]: An info-item identifier for a source txo.

[votes]: A set of votes in favor or against the description variant. Each vote can be implemented as a tuple consisting of a vote weight (positive or negative) stating a subjective opinion strength, an optional rationale for the vote, and a reference to a user info-item identifier.

Survey Info-Items

Survey info-items are binding points for survey questions. In one embodiment, survey info-items have values for various properties including, but not limited to:

[survey names]: A set of survey name objects. This is the set of survey names assigned to this survey.

[survey descriptions]: A set of tpx description objects. This is the set of tpx descriptions assigned to this survey.

[info-item identifier]: A single locator. The info-item identifier of the survey.

[attributes]: A set of attributes with values. Each attribute can be implemented as a tuple consisting of a property name, an attribute datatype, and an attribute value. Multiple tuples may not exist with the same property name. In one embodiment, the tuple would also optionally contain a creator txo property.

Required attribute properties include:

[DELETE INDICATOR]: A single Boolean. If true, the info-item is to be deleted during cleanup.

Optional attribute properties include:

[LOCKED INDICATOR]: A single Boolean. If true, the info-item may not be altered unless this attribute is overridden.

[txo properties]: A set of properties as specified by a reference to a txo defining the property value. Each txo property can be implemented as a tuple consisting of a property name, and a reference to a txo. Multiple tuples may not exist with the same property name. In one embodiment, the tuple would also optionally contain a creator txo property.

Required txo properties include:

[TYPE]: An info-item identifier for an infxtypx txo specifying the type of survey.

Optional txo properties include:

[CREATOR]: An info-item identifier for a user txo representing the person in editorial control of the survey, defaulted to the user first creating or causing the creation of the template for which the survey is created, or the survey itself if not for a template.

[SOURCE]: An info-item identifier for a source txo.

[TEMPLATE]: An info-item identifier for the template for which the survey is to be used for building an object from.

[BUILT TYPE]: An info-item identifier for an infxtypx txo specifying the type of info-item being generated when the survey is used for building an object.

[SCOPX]: An info-item identifier for a scopx txo indicating the scopx to assign to the object created by filling out this survey.

[FXXT]: An info-item identifier for a fxxt txo indicating the fxxt to assign to the object created by filling out this survey.

[AVATAR]: An info-item identifier for an Avatar dxo indicating the avatar to assign to the object created by filling out this survey.

[access control list]: A set of permissions for accessing the survey info-item. Each permission can be implemented as a tuple consisting of a property name (or null if applicable generally to the survey info-item), an action type, a permission level, and a reference to a user role, class, or a specific user info-item identifier for the type of user allowed to access the information or to make the change. If no permission is listed, then no access is granted to anyone other than the 'system owner class' of users.

[prior]: An info-item, or null. If given, the info-item construct in a older VERSION that is equivalent to this info-item.

[parent]: An info-item. An info-item identifier of the installation and version of the ontology containing the survey info-item.

[merged info-item identifiers]: A set of locators. The info-item identifiers of survey info-items now deleted due to merger with a survey info-item. These info-item identifiers have the form of [parent][item identifier] to allow for merging of survey info-items across ontology installations and versions.

[alteration audit trail]: A set of actions taken to alter the survey info-item, retained as a change history. Each change can be implemented as a tuple consisting of a property name, an old value, a new value, a change timestamp, an optional rationale for the change, and a reference to a user info-item identifier for the person making the change.

Question Objects

Question objects contain questions for info-items. In one embodiment, question objects have values for various properties including, but not limited to:

[object identifier]: A single locator. The object identifier of the question object.

[attributes]: A set of attributes with values. Each attribute can be implemented as a tuple consisting of a property name element, an attribute datatype element stating the format of the value element, and an attribute value element. Multiple tuples may not exist with the same property name.

Required attribute properties include:

[PROPERTY NAME]: A name for the property about which this question pertains.

[VALUE]: A question.

Optional attribute properties include:

[ORDER]: An ordinal stating the order of presentation of the question.

[FORMAT]: The format of the question specifying how the VALUE is to be interpreted, to be displayed, and to be responded to. Required for formats other than text question and text answer.

[LOCKED INDICATOR]: A single Boolean. If true, the object may not be altered unless this attribute is overridden.

[txo properties]: A set of properties as specified by a reference to a txo defining the property value. Each txo property can be implemented as a tuple consisting of a property name, and a reference to a txo. Multiple tuples may not exist with the same property name.

Required txo properties include:

Optional txo properties include:

[SCOPX]: An info-item identifier for a scopx txo specifying which scopx the question pertains to if the survey can be applied by scopx, or the scopx of the question.

[FXXT]: An info-item identifier for a fxxt txo specifying which fxxt the question pertains to if the survey can be applied by fxxt.

[CREATOR]: An info-item identifier for a user txo representing the person in editorial control of the question, defaulted to the user first creating or causing the creation of the question.

[SOURCE]: An info-item identifier for a source txo.

[access control list]: A set of permissions for accessing the question. Each permission can be implemented as a tuple consisting of a property name (or null if applicable generally to the question), an action type, a permission level, and a reference to a user role, class, or a specific user info-item identifier for the type of user allowed to access the information or to make the change. If no permission is listed, then no access is granted to anyone other than the 'system owner class' of users.

[variants]: A set of question variant objects. This is the set of alternative questions for the question in this object.

Question variant objects contain alternative questions of info-items. In one embodiment, question objects have values for various properties including, but not limited to:

[object identifier]: A single locator. The object identifier of the question variant object.

[attributes]: A set of attributes with values. Each attribute can be implemented as a tuple consisting of a property name element, an attribute datatype element stating the format of the value element, and an attribute value element. Multiple tuples may not exist with the same property name.

Required attribute properties include:

[VALUE]: A question.

Optional attribute properties include:

[FORMAT]: The format of the question specifying how the VALUE is to be interpreted, to be displayed, and to be responded to.

[WEIGHT]: A weight stating quality or priority for the question variant.

[ISSUE]: A statement summarizing a rationale regarding why the variant is better.

[LOCKED INDICATOR]: A single Boolean. If true, the object may not be altered unless this attribute is overridden.

[txo properties]: A set of properties as specified by a reference to a txo defining the property value. Each txo property can be implemented as a tuple consisting of a property name, and a reference to a txo. Multiple tuples may not exist with the same property name.

Required txo properties include:

[CREATOR]: An info-item identifier for a user txo representing the person in editorial control of the variant.

Optional txo properties include:

[SCOPX]: An info-item identifier for a scopx txo specifying which scopx the question pertains to if the survey can be applied by scopx, or the scopx of the question.

[FXXT]: An info-item identifier for a fxxt txo specifying which fxxt the question pertains to if the survey can be applied by fxxt.

[SOURCE]: An info-item identifier for a source txo.

[votes]: A set of votes in favor or against the question variant. Each vote can be implemented as a tuple consisting of a vote weight (positive or negative) stating a subjective opinion strength, an optional rationale for the vote, and a reference to a user info-item identifier.

Survey Response Info-Items

Survey response info-items are binding points for survey answers. In one embodiment, survey response info-items have values for various properties including, but not limited to:

[survey response names]: A survey response name object.

[survey response descriptions]: A survey response description object.

[info-item identifier]: A single locator. The info-item identifier of the survey response.

[attributes]: A set of attributes with values. Each attribute can be implemented as a tuple consisting of a property name, an attribute datatype, and an attribute value. Multiple tuples may not exist with the same property name. In one embodiment, the tuple would also optionally contain a creator txo property.

Required attribute properties include:

[DELETE INDICATOR]: A single Boolean. If true, the info-item is to be deleted during cleanup.

Optional attribute properties include:

[LOCKED INDICATOR]: A single Boolean. If true, the info-item may not be altered unless this attribute is overridden.

[txo properties]: A set of properties as specified by a reference to a txo defining the property value. Each txo property can be implemented as a tuple consisting of a property name, and a reference to a txo. Multiple tuples may not exist with the same property name. In one embodiment, the tuple would also optionally contain a creator txo property.

Required txo properties include:

[TYPE]: An info-item identifier for an infxtypx txo specifying the type of survey response, as obtained from the survey [BUILT TYPE] parameter.

[TEMPLATE]: An info-item identifier for the template for which the survey response is to be used for building an object from.

[CREATOR]: An info-item identifier for a user txo representing the person in editorial control of the survey response, defaulted to the user first creating or causing the creation of the survey response itself.

Optional txo properties include:

[SOURCE]: An info-item identifier for a source txo.

[SCOPX]: An info-item identifier for a scopx txo as set in the survey template, if set.

[FXXT]: An info-item identifier for a fxxt txo as set in the survey template, if set.

[AVATAR]: An info-item identifier for an Avatar dxo indicating the avatar as set in the survey template, if set.

[access control list]: A set of permissions for accessing the survey response info-item. Each permission can be implemented as a tuple consisting of a property name (or null if applicable generally to the survey response info-item), an action type, a permission level, and a reference to a user role, class, or a specific user info-item identifier for the type of user allowed to access the information or to make the change. If no permission is listed, then no access is granted to anyone other than the 'system owner class' of users.

[prior]: An info-item, or null. If given, the info-item construct in a older VERSION that is equivalent to this info-item.

[parent]: An info-item. An info-item identifier of the installation and version of the ontology containing the survey response info-item.

[merged info-item identifiers]: A set of locators. The info-item identifiers of survey response info-items now deleted due to merger with a survey response info-item. These info-item identifiers have the form of

[parent][item identifier] to allow for merging of survey response info-items across ontology installations and versions.

[alteration audit trail]: A set of actions taken to alter the survey response info-item, retained as a change history. Each change can be implemented as a tuple consisting of a property name, an old value, a new value, a change timestamp, an optional rationale for the change, and a reference to a user info-item identifier for the person making the change.

Answer Objects

Answer objects contain answers for question info-items for survey response info-items. In one embodiment, answer objects have values for various properties including, but not limited to:

[object identifier]: A single locator. The object identifier of the answer object.

[attributes]: A set of attributes with values. Each attribute can be implemented as a tuple consisting of a property name element, an attribute datatype element stating the format of the value element, and an attribute value element. Multiple tuples may not exist with the same property name.

Required attribute properties include:

[PROPERTY NAME]: A name for the property about which this answer pertains.

[VALUE]: A answer.

[FORMAT]: The format of the answer specifying how the VALUE is to be interpreted, and to be displayed.

Optional attribute properties include:

[ORDER]: An ordinal stating the order of presentation of the answer as given in the question.

[LOCKED INDICATOR]: A single Boolean. If true, the object may not be altered unless this attribute is overridden.

[txo properties]: A set of properties as specified by a reference to a txo defining the property value. Each txo property can be implemented as a tuple consisting of a property name, and a reference to a txo. Multiple tuples may not exist with the same property name.

Required txo properties include:

[CREATOR]: An info-item identifier for a user txo representing the person in editorial control of the answer, defaulted to the user first creating or causing the creation of the answer.

[TYPE]: An info-item identifier for an infxtypx txo.

Optional txo properties include:

[SCOPX]: An info-item identifier for a scopx txo specifying which scopx the answer pertains to if the survey response can be applied by scopx, or the scopx of the answer.

[FXXT]: An info-item identifier for a fxxt txo specifying which fxxt the answer pertains to if the survey response can be applied by fxxt.

[SOURCE]: An info-item identifier for a source txo.

[access control list]: A set of permissions for accessing the answer. Each permission can be implemented as a tuple consisting of a property name (or null if applicable generally to the answer), an action type, a permission level, and a reference to a user role, class, or a specific user info-item identifier for the type of user allowed to access the information or to make the change. If no permission is listed, then no access is granted to anyone other than the 'system owner class' of users.

[variants]: A set of answer variant objects. This is the set of alternative answers for the question in this survey response.

Answer variant objects contain alternative answers for survey response info-items. In one embodiment, answer objects have values for various properties including, but not limited to:

[object identifier]: A single locator. The object identifier of the answer variant object.

[attributes]: A set of attributes with values. Each attribute can be implemented as a tuple consisting of a property name element, an attribute datatype element stating the format of the value element, and an attribute value element. Multiple tuples may not exist with the same property name.

Required attribute properties include:

[VALUE]: A answer.

[FORMAT]: The format of the answer specifying how the VALUE is to be interpreted, to be displayed, and to be responded to.

Optional attribute properties include:

[REPLACED BY]: A answer variant object identifier.

[WEIGHT]: A weight stating quality or priority for the answer variant.

[ISSUE]: A statement summarizing a rationale regarding why the variant is better.

[LOCKED INDICATOR]: A single Boolean. If true, the object may not be altered unless this attribute is overridden.

[txo properties]: A set of properties as specified by a reference to a txo defining the property value. Each txo property can be implemented as a tuple consisting of a property name, and a reference to a txo. Multiple tuples may not exist with the same property name.

Required txo properties include:

[CREATOR]: An info-item identifier for a user txo representing the person in editorial control of the variant.

Optional txo properties include:

[SCOPX]: An info-item identifier for a scopx txo specifying which scopx the answer pertains to if the survey response can be applied by scopx, or the scopx of the answer.

[FXXT]: An info-item identifier for a fxxt txo specifying which fxxt the answer pertains to if the survey response can be applied by fxxt.

[SOURCE]: An info-item identifier for a source txo.

[votes]: A set of votes in favor or against the answer. Each vote can be implemented as a tuple consisting of a vote weight (positive or negative) stating a subjective opinion strength, an optional rationale for the vote, and a reference to a user info-item identifier.

Result Set Rsxitems

In one embodiment, rsxitems have values for various properties including, but not limited to:

[info-item identifier]: A single locator. The info-item identifier of the rsxitem.

[attributes]: A set of attributes with values. Each attribute can be implemented as a tuple consisting of an property name, an attribute datatype, and an attribute value. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property. Multiple tuples may not exist with the same property name.

Required attribute properties include:

[RELEVANCE STRENGTH]: A weight summarizing present votes or assessments for the relevance of the rsxitem.

[REVIEWED]: A Boolean stating whether any user has reviewed the rsxitem for relevance, at least to the point of 'clicking' on it.

Optional attribute properties include:

[ORDER]: A number stating (original) display order or priority for the rsxitem.

[ISSUE]: A statement summarizing a rationale regarding why the rsxitem is or is not relevant.

[LOCKED INDICATOR]: A single Boolean. If true, the rsxitem may not be altered unless this attribute is overridden or an info-item in one of its roles is deleted or replaced.

[txo properties]: A set of properties as specified by a reference to a txo defining the property value. Each txo property can be implemented as a tuple consisting of a property name, and a reference to a txo. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property. Multiple tuples may not exist with the same property name.

Required txo properties include:

[TYPE]: An info-item identifier for an infxtypx txo specifying the type of result info-item in the RESULT role.

Optional txo properties include:

[CREATOR]: An info-item identifier for a user txo representing the person in editorial control of the item, defaulted to the user first creating or causing the creation of the rsxitem.

[SCOPX]: An info-item identifier for a scopx txo.

[FXXT]: An info-item identifier for a fxxt txo.

[SOURCE]: An info-item identifier for a source txo.

[roles]: An ordered set of roles with info-item identifiers as values. Each role can be implemented as a tuple consisting of a role name and an info-item identifier value. In one embodiment, multiple identifiers may not exist with the same role in the rsxitem and thus multiple tuples may not exist for the same role name. In one embodiment, multiple tuples may optionally exist for the same role name to allow multiple info-items to play a role. Roles may be optional, as specified in a relationship template. No relationship may exist without a valid info-item identifier in a required role.

Required roles include:

[RESULT]: An info-item identifier for a txo specifying the result, such as an irxt. The culling history property alteration votes apply to the properties of this info-item.

[RESULT SET]: A Result Set info-item. An info-item identifier of the Result Set containing the rsxitem.

[Culling History]

[existence votes]: A set of votes in favor or against the existence of the item in the result set. Each vote can be implemented as a tuple consisting of a timestamp, a vote weight (positive or negative) stating a subjective opinion strength, an optional rationale for the vote, and a reference to a user info-item identifier.

[relevance votes]: A set of votes in favor or against the relevance of the result info-item in the RESULT role to the result set's purpose as an indicator. Each vote can be implemented as a tuple consisting of a timestamp, vote weight (positive or negative) stating a subjective opinion strength on relevance, an optional rationale for the vote, and a reference to a user info-item identifier.

[property alteration votes]: A set of votes in favor or against a value of a property of the result info-item in the RESULT role. Each vote can be implemented as a tuple consisting of a timestamp, a vote weight (positive or negative) stating a subjective opinion strength, an optional rationale for the vote, and a reference to a user info-item identifier.

Selection Sets and Selection Set Items

In one embodiment, selection set items have values for various properties including, but not limited to:

[info-item identifier]: A single locator. The info-item identifier of the selection set item.

[attributes]: A set of attributes with values. Each attribute can be implemented as a tuple consisting of an property name, an attribute datatype, and an attribute value. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property. Multiple tuples may not exist with the same property name.

Required attribute properties include:

[RELEVANCE STRENGTH]: A weight summarizing present votes or assessments for the relevance of the selection set item.

[REVIEWED]: A Boolean stating whether any user has reviewed the selection set item for relevance, at least to the point of 'clicking' on it.

Optional attribute properties include:

[ORDER]: A number stating (original) display order or priority for the selection set item.

[ISSUE]: A statement summarizing a rationale regarding why the selection set item is or is not relevant.

[txo properties]: A set of properties as specified by a reference to a txo defining the property value. Each txo property can be implemented as a tuple consisting of a property name, and a reference to a txo. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property. Multiple tuples may not exist with the same property name.

Required txo properties include:

[TYPE]: An info-item identifier for an infxtypx txo specifying the type of selection info-item in the SELECTION role.

Optional txo properties include:

[CREATOR]: An info-item identifier for a user txo representing the person in editorial control of the item, defaulted to the user first creating or causing the creation of the selection set item.

[SCOPX]: An info-item identifier for a scopx txo.

[FXXT]: An info-item identifier for a fxxt txo.

[SOURCE]: An info-item identifier for a source txo.

[roles]: An ordered set of roles with info-item identifiers as values. Each role can be implemented as a tuple consisting of a role name and an info-item identifier value. In one embodiment, multiple identifiers may not exist with the same role and thus multiple tuples may not exist for the same role name. In one embodiment, multiple tuples may optionally exist for the same role name to allow multiple info-items to play a role. Roles may be optional, as specified in a role template. No relationship may exist without a valid info-item identifier in a required role.

Required roles include:

[SELECTION]: An info-item identifier for a txo specifying the selection, such as an irxt.

[PARENT]: A Selection Set info-item. An info-item identifier of the Selection Set containing the selection set item.

[Culling History] (Optional)

[existence votes]: A set of votes in favor or against the existence of the info-item in the SELECTION role being in the selection set. Each vote can be implemented as a tuple consisting of a timestamp, a vote weight (positive or negative) stating a subjective opinion strength, an optional rationale for the vote, and a reference to a user info-item identifier.

Result Sets, Selection Sets, Areas of Consideration, or Areas of Interest

In one embodiment, result sets, selection sets, Areas of Consideration, or Areas of Interest have values for various properties including, but not limited to:

[info-item identifier]: A single locator. The info-item identifier of the set or Area.

[attributes]: A set of attributes with values. Each attribute can be implemented as a tuple consisting of an property name, an attribute datatype, and an attribute value. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property. Multiple tuples may not exist with the same property name.

Required attribute properties include:

[LAST CHANGE TIMESTAMP]: A timestamp stating when the last change was made to the set or area.

Optional attribute properties include:

[TEMPORARY INDICATOR]: A single Boolean. If true, the info-item is temporary.

[DELETE INDICATOR]: A single Boolean. If true, the info-item is to be deleted during cleanup.

[LOCKED INDICATOR]: A single Boolean. If true, the info-item may not be altered unless this attribute is overridden.

[WEIGHT]: A weight. In one embodiment, a weight may be specified to state the strength of the result set in determining the identity of the goal or cnxpt, to be applied to relationships stemming from the result set.

[ISSUE]: A statement summarizing a rationale regarding why the set or Area is or is not relevant.

[DIRECTION]: A value indicating whether the Result Set is a list of Parents, a list of Children (default), or a list of Sibling cnxpts.

[txo properties]: A set of properties as specified by a reference to a txo defining the property value. Each txo property can be implemented as a tuple consisting of a property name, and a reference to a txo. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property. Multiple tuples may not exist with the same property name.

Required txo properties include:

[TYPE]: An info-item identifier for an infxtypx txo specifying the type of selection info-item in the SELECTION role.

[CREATOR]: An info-item identifier for a user txo representing the person in editorial control of the set, defaulted to the user first creating or causing the creation of the set or Area.

Optional txo properties include:

[SCOPX]: An info-item identifier for a scopx txo.

[FXXT]: An info-item identifier for a fxxt txo.

[SOURCE]: An info-item identifier for a source txo.

Info-Item Templates

In one embodiment, info-item templates have values for various properties including, but not limited to:

[Template Name—Info-item Type Name]: A required info-item name string.

[info-item identifier]: A single locator. The info-item identifier of the info-item template.

[attributes]: A set of attributes with values. Each attribute can be implemented as a tuple consisting of an property name, an attribute datatype, and an attribute value. In one embodiment, the tuple would also optionally contain a creator txo property. In one embodiment, the tuple would also optionally contain a scopx property. In one embodiment, the tuple would also optionally contain a fxxt property.

[txo properties]: A set of properties as specified by a reference to a txo defining the property value. Each txo property can be implemented as a tuple consisting of a property name, and a reference to a txo by info-item identifier. In one embodiment, the tuple would also optionally contain a creator txo property. In one embodiment, the tuple would also optionally contain a weight property. In one embodiment, the tuple would also optionally contain a scopx property. In one embodiment, the tuple would also optionally contain a fxxt property. In one embodiment, required txo properties include: TYPE as specified by an infxtypx. In one embodiment, optional txo properties include: CREATOR as specified by an individual txo; SOURCE as specified by an source or organization txo.

[template access control list]: A set of permissions for accessing the template. Each permission can be implemented as a tuple consisting of a property name (or null if applicable generally to the template), an action type, a permission level, and a reference to a user role, class, or a specific user info-item identifier for the type of user allowed to access the information or to make the change. If no permission is listed, then no access is granted to anyone other than the 'system owner class' of users.

[base info-item access control list]: A set of permissions for accessing any instance of the info-item specified by the template. Each permission can be implemented as a tuple consisting of a property name (or null if applicable generally to any instance of the info-item specified by the template), an action type, a permission level, and a reference to a user role, class, or a specific user info-item identifier for the type of user allowed to access the information or to make the change. If no permission is listed, then no access is granted any instance of the info-item to anyone other than the 'system owner class' of users unless additional permissions are granted as a part of instantiation or afterward.

[property templates]: For each type of entry, such as 'attribute', 'txo property', 'role', 'occurrence', 'hierarchical association', 'affinitive association', 'vote', one of the following sets of tuples will specify conformance required. Each tuple allowed or required in the specified section of an info-item instance of the type of info-item defined by the template will be constructed conforming to one of the tuples defined in the section of that type here. [For each, this set (referenced as 'the other values') of additional tuple entries (at end of specification for each and where referenced only) are required: the order of the property, whether the property is optional or required, the minimum number of entries of tuples of the property, the maximum number of entries of tuples of the property, whether the creator property is optional or required, whether the source property is optional or required, whether the scopx property is optional or required, whether the fxxt property is optional or required; and a set of access control rule tuples authorizing specific user classes or groups of classes to cause changes to the tuple by various actions, as stated by, including but not limited to: 'add', 'delete', 'modify', 'utilize'.

[attribute property templates]: A set of property specifiers for attribute tuples. Each attribute property template specifier is an ordered tuple consisting of values stating: a property name, an attribute datatype (from a list of basic datatypes, including but not limited to: 'string', 'integer', 'number', 'weight'), and 'the other values';

[txo property templates]: A set of property specifiers for txo property tuples. Each txo property template specifier is an ordered tuple consisting of values stating: a property name, a txo type as specified by an infxtypx which the instance may reference, and 'the other values';

[access control list templates]: A set of default permissions for accessing info-item instantiated. Each default permission can be implemented as a tuple consisting of a property name (or null if applicable generally to the template), an action type, a permission level, and a reference to a user role, class, or a specific user info-item identifier for the type of user allowed to access the information or to make the change. If no permission is listed, then no default rules are assigned to the instantiated info-item. The set of access control rule tuples authorizes specific user classes or groups of classes or specific users to cause changes to the info-item or its properties by various actions, as stated by, including but not limited to: 'add', 'delete', 'modify', 'utilize'

[role property templates]: A set of property specifiers for role tuples. Each role property template specifier is an ordered tuple consisting of values stating: a role property name, a txo type as specified by an infxtypx which the instance may reference, and 'the other values';

[occurrence property templates]: A set of property specifiers for occurrence tuples. Each occurrence template specifier is an ordered tuple consisting of values stating: a occurrence property name, a txo type as specified by an infxtypx which the instance may reference, and 'the other values';

[hierarchical association property templates]: A set of property specifiers for hierarchical association tuples. Each hierarchical association template specifier is an ordered tuple consisting of values stating: a hierarchical association property name, a txo type as specified by an infxtypx which the instance may reference, and 'the other values';

[affinitive association property templates]: A set of property specifiers for affinitive association tuples. Each affinitive association template specifier is an ordered tuple consisting of values stating: a hierarchical association property name, a txo type as specified by an infxtypx which the instance may reference, and 'the other values';

[queries templates]: A set of specifiers for attaching queries. Each query template specifier is an ordered tuple consisting of values stating: a query type name, a query type txo as specified by an infxtypx which the instance may reference, a status name indicating the query is freshly completed, and values for the order of the query, the minimum number of entries of tuples of the query, the maximum number of entries of tuples of the query, whether the creator property is optional or required; and a set of access control rule tuples authorizing specific user classes or groups of classes to cause changes to the tuple by various actions, as stated by, including but not limited to: 'add', 'delete', 'modify', 'invoke', 'copy', 'utilize';

[result sets templates]: A set of specifiers for attaching result sets. Each result set template specifier is an ordered tuple consisting of values stating: a result set type name, a result set type txo as specified by an infxtypx which the instance may reference, a status name indicating the result set is freshly altered, and values for the order of the result set, whether the result set rsxitems are to be merged with the core 'result set' of the info-item, the maximum number of rsxitems allowed into the result set, the maximum number of entries of tuples of the result set, whether the creator property is optional or required; and a set of access control rule tuples authorizing specific user classes or groups of classes to cause changes to the tuple by various actions, as stated by, including but not limited to: 'add', 'delete', 'modify', 'combine', 'copy', 'utilize', 'import', 'export';

[votes]: A set of property specifiers for voting tuples. Each vote template specifier is an ordered tuple consisting of values stating: a rationale, a txo type as specified by an infxtypx which the instance may reference, and 'the other values';

[audit trail]: A set of property specifiers for voting tuples. Each vote template specifier is an ordered tuple consisting of values stating: a rationale, a txo type as specified by an infxtypx which the instance may reference, and 'the other values';

[processing rules]: A set of procedures applicable to the info-item at various points in its lifecycle, as stated by 'status'. Each processing rule specification is a tuple consisting of a status name, an invocation event upon which a status change is required, a processing rule procedure reference, a 'next' status name for where the procedure terminates without failure, a 'failure' status name for where the procedure terminates with a failure, and an 'incomplete' status name for where the processing rule procedure is still executing.

[presentation rules]: A set of presentation procedure applicable to the info-item at various points in its lifecycle, as stated by 'status'. Each presentation rule specification is a tuple consisting of a status name, and a presentation procedure reference.

[info-item status change access rules]: A set of access control rules authorizing specific user classes or groups of classes to cause changes to the info-item at various points in its lifecycle, as stated by 'status'. Each access control rule specification is a tuple consisting of a status name, and an access control authorization by user class.

Fxxt Calculation Step Templates

Fxxt calculation step templates provide, including but not limited to:

[Search Criteria and Necessary Criteria Tests]

- the infxtypx(s) of a txo;
- the infxtypx(s) of relationships that the txo participates in;
- having a specific commonality relationship that the txo participates in, specifically including
  - common trxrt;
  - overlapping context for some purxpt;
  - custom commonalities, such as: common text string; common specific value or range for some characteristic (attribute or txo property); other custom and specific comparison criteria; Innovation by same individual; mutually competitive tcepts.
- inverse extension whereby txos within the fxxt are 'children' of txos not already in the fxxt, but the parent txos are added to the fxxt because of the relationship relative to the fxxt; and/or
- by a Boolean combination of two fxxts; and/or
- by having some defined combination of the foregoing.

[Action to Take]

- Generate FXXT BASIS fxxt summaries for a fxxt wherever a cnxpt meets a fxxt calculation step 'search criteria' and 'necessary criteria test'.
- Generate FXXT BASIS association summaries for a fxxt wherever a cnxpt meets a fxxt calculation step 'search criteria' and 'necessary criteria test' or wherever a cnxpt holding a role in an association meets a fxxt calculation step 'search criteria' and 'necessary criteria test'.
- Combine 'derived ontologies'.

Commonality Relationships

In one embodiment, commonality relationships are implemented as a matrix of tuples for efficiency. The axis of the matrix is the list of item identifiers of the type for which the commonality is defined. Only item identifiers of info-items having a commonality with another info-item are listed. Each type of commonality relationship is defined by an algorithm (which may be complex) and a set of info-item types on its axes. The set of info-item types will usually consist of just one type, but may be two different info-item types. Where only one info-item type is specified and the resultant relationship is directional, or where two different info-items are specified, then the matrix is only a 'top right (no diagonal)' matrix. Where two info-item types are specified and the resultant relationship is directional, then the matrix is full but for the diagonal which is meaningless.

Each cell of the matrix can be implemented as a tuple consisting of an 'is calculated' Boolean value, a weight value, and an 'is generated' Boolean value. The date of last calculation of each column and each row of the matrix are also retained.

When a change occurs to one info-item that defines a row, then the tuples on the row are 'dirtied' and a recalculation of the tuple values in the row begins. When a change occurs to one info-item that defines a column, then the tuples on the column are 'dirtied' and a recalculation of the tuple values in the column begins.

Thesaurus Matrix

In one embodiment, keyword (key phrase) thesauri are implemented in a thesaurus matrix of tuples for efficiency. The axes of the matrix are the list of kwx item identifiers of a certain scopx for which the thesaurus is defined. Only item identifiers of kwxs having the scopx and a commonality of meaning with another kwx info-item are listed. The matrix is only a 'top right (no diagonal)' matrix.

Each cell of the matrix can be implemented as a tuple consisting of an 'is calculated' Boolean value, a weight value, and an 'is generated' Boolean value. The date of last calculation of each column and each row of the matrix are also retained.

When a change occurs to a kwx info-item that defines a row, then the tuples on the row are 'dirtied' and a recalculation of the tuple values in the row begins. When a change occurs to one kwx info-item that defines a column, then the tuples on the column are 'dirtied' and a recalculation of the tuple values in the column begins Third Level for Process: Local or Distributed Processes Low Level Procedure Models for Use Cases Procedure—CREATE Source Use Case: Procedure—CREATE Source.

Procedure—CREATE FXXT

Use Case: Procedure—CREATE FXXT.

Procedure—CREATE Data Set

Use Case: Procedure—CREATE Data Set.

Procedure—CREATE Comxo

Use Case: Procedure—CREATE Comxo—Create a comxo info-item representing the community based upon the name supplied by the user or taken from a cnxpt name, marking its creator as the user.

If the user provides other information, such as a description, etc., add it as characteristics to the comxo.

Procedure—CREATE Product

Use Case: Procedure—CREATE Product—Specify information regarding a product, optionally specifying scopx and fxxt.

The product should be aligned as a non-cnxpt dxo by placement within cnxpts. Enter information and attach images as appropriate. Information may be entered in multiple languages. Information may be viewed in multiple languages and displayed according to the language the user has selected using scopxs. If any advertising is involved, a separate advertisement must be created.

Procedure—CREATE Irxt

Use Case: Procedure—CREATE Irxt—If needed, create an irxt for the (the primary or original) information resource (document or prior art material) (here called the "OIR").

Form one or more descriptions for the irxt from the abstracts of the document provided, one for each language available, as descriptions and description variants marked by scopxs. Create a name for the irxt from the name of the document, and create a name variants marked by scopxs, one for each name available in an additional language. Mark the source for the document, and mark the user requesting the conversion as the creator. No fxxt is needed, but can be supplied. In one embodiment, mark the scopx with the country of origin or primary language of the document.

When an irxt is created for an information resource which references a previously created irxt, create an "information resource citation relationship" between the new citing irxt and the existing, cited irxt, marking the fxxt as given by the referencing irxt, and marking (by detailed infxtypx) the relationship to indicate each as a particular form of citation where possible. [See Procedure—CREATE Information Resource Citation Relationship]

At the time when an irxt for the OIR is created, it is not known whether other information resources (or prior art material) (here called the "CIR") it references will ever be represented by other irxts. For that reason, in one embodiment, the citations or references to CIRs which cannot be immediately resolved to an existing or newly created irxt or cnxpt are saved as raw text in the irxt representing the OIR for later resolution. Wherever an OIR references a CIR which is not yet represented by an irxt, mark the OIR's irxt with a reference property attribute with a raw text locator to the referenced CIR.

In one embodiment, an immediate attempt is made to resolve the CIR references and to create irxts representing the CIRs, and possibly to create cnxpts representing the ttx discussed in the CIR into the CMM, and then to create citation relationships from the OIR's irxt to the new CIR's irxt ("irxt citation relationship") or cnxpt ("direct information resource citation relationship"), and to form additional occurrence relationships, between the CIR cnxpts and the CIR irxts. In one embodiment, for each other CIR referenced by the OIR, repeat the process of irxt creation to a specified depth of referencing.

When an irxt is created for an information resource which was referenced by a previously created irxt, create an "information resource citation relationship" between the existing citing irxt and the new, cited irxt, marking the fxxt as given by the citing irxt, and marking (by detailed infx-typx) the relationship to indicate it as a particular form of citation where possible. [See Procedure—CREATE Information Resource Citation Relationship] Once the CIR's irxt and the "information resource citation relationship" are created, the raw text locator property attribute can be deleted from the previously created citing irxt.

Where an OIR directly references a ttx represented by an existing cnxpt, by using the cnxpt's description or name, a "direct information resource citation relationship" will be added from the cnxpt to the irxt for the OIR, marking the fxxt as the fxxt specified by the citing irxt. Create "direct information resource name reference citation relationships", and "direct information resource citation relationships" as appropriate, marking the fxxt as the fxxt specified by the citing irxt. [See Procedure—CREATE Direct Information Resource Citation Relationship] [See Procedure—CREATE Direct Information Resource Name Reference Citation Relationship]

Create irxt occurrences between each cnxpt and a new irxt where the irxt is relevant to the cnxpt. [See Procedure—Automatically Generate irxt occurrences]

Procedure—CREATE Goal

Use Case: Procedure—CREATE Goal—Create, or concretize into the CMM a new temporary cnxpt or goal to represent the ttx a user is thinking of.

The user begins the process for searching by identifying a separate goal to find a ttx. No fxxt is needed, but may be supplied. If the user is searching in a visualization, the fxxt of the visualization is used for the part of the search using the visualization.

The basic goal is established as a temporary cnxpt and will be converted to a cnxpt if the user confirms that the goal is achieved and the ttx found or a position for the ttx is found in a category cnxpt. Various tools and procedures are involved in locating the goal and several are stated below as procedures. [See Procedure—CREATE Goal from Result Set] [See Procedure—CREATE Goal from Irxt] [See Procedure—FINALIZE Goal into Cnxpt]

Procedure—CREATE Cnxpt

Use Case: Procedure—CREATE Cnxpt—Create, or concretize into the CMM a new cnxpt to represent the ttx a user is thinking of.

No fxxt is needed, but may be supplied. If the user is in a visualization, the fxxt of the visualization is used for the part of the search using the visualization.

If a description is provided (but not if a description was formed from an irxt), and it includes a reference to another cnxpt's:

description, create a "ttx citation association" between the new cnxpt and the cited cnxpt. [See Procedure—CREATE ttx citation association]

name, create a "cnxpt name reference citation association" between the new cnxpt and the cited cnxpt. [See Procedure—CREATE Cnxpt Name Reference Citation association]

If a description is provided and if a "later-added ttx description content reference citation tag" exists for the description of the ttx, create a "ttx description content later-added reference citation association".

In one embodiment, if a RAW REFERENCE entry of a previously defined cnxpt references the new cnxpt's:

description, create a "ttx citation association" between the previously exiting cnxpt and the new, cited cnxpt. [See Procedure—CREATE ttx citation association]

name, create a "cnxpt name reference citation association" between the previously exiting cnxpt and the new, cited cnxpt. [See Procedure—CREATE Cnxpt Name Reference Citation association]

Procedure—CREATE Goal from Result Set

Use Case: Procedure—CREATE Goal from Result Set—Create, or concretize into the CMM a new temporary cnxpt or goal to represent the ttx a user is thinking of.

No fxxt is needed, but may be supplied. [See Procedure—CREATE Goal] [See Evaluate Result Set for Positioning] [See Procedure—ATTACH a Result Set to Goal as PARENT] [See Procedure—ATTACH a Result Set to Goal as CHILDREN]

Procedure—CREATE Goal from Irxt

Use Case: Procedure—CREATE Goal from Irxt—Create a goal with a result set having the irxt as a rsxitem.

[See Procedure—CREATE Cnxpt from Irxt] [See Procedure—CREATE Goal] [See Evaluate Result Set for Positioning] [See Procedure—ATTACH a Result Set to Goal as PARENT] [See Procedure—ATTACH a Result Set to Goal as CHILDREN]

Procedure—CREATE Cnxpt from Irxt

Use Case: Procedure—CREATE Cnxpt from Irxt—Create, or concretize into the CMM a new cnxpt or goal, which may or may not have been defined previously, to represent the ttx described in the primary document as represented by the irxt.

No fxxt is needed, but may be supplied by the irxt if set.

For each irxt, and if the cnxpt does not already exist, create, or concretize into the CMM a new target cnxpt to represent the ttx described, or refer to the previously defined cnxpt as the target cnxpt.

Form a description from the primary document, and one or more descriptions for the cnxpt or goal from abstracts of the primary document as set in the irxt, and one for each additional language available, as variants marked by scopx. Also, create a name (and variants) for the goal from the name of the primary document, and a variant if the irxt name is different, copying other names and variants from the irxt, including any available for each additional language available, as variants marked by scopx.

Mark the source for the cnxpt as the source of the information resource as set in the irxt and mark the user requesting the conversion as the creator.

Create a 'subject identifier' occurrence relationship between the cnxpt and the irxt of the primary document. [See Procedure—CREATE Occurrence to irxt]

Because a ttx description document is provided, if it includes a reference to another cnxpt's:

description, create a "ttx citation association" or "ttx description content reference citation association" between the new cnxpt and the cited cnxpt. [See Procedure—CREATE ttx citation association]

name, create a "cnxpt name reference citation association" between the new cnxpt and the cited cnxpt. [See Procedure—CREATE Cnxpt Name Reference Citation association]

If a "later-added ttx description content reference citation tag" exists for the description of the ttx, create a "ttx description content later-added reference citation association".

In one embodiment, if a RAW REFERENCE entry of a previously defined cnxpt references the new cnxpt's:

description, create a "ttx citation association" or "ttx description content reference citation association" between the previously exiting cnxpt and the new, cited cnxpt. [See Procedure—CREATE ttx citation association]

name, create a "cnxpt name reference citation association" between the previously exiting cnxpt and the new, cited cnxpt. [See Procedure—CREATE Cnxpt Name Reference Citation association]

In one embodiment, this process is repeated for all newly created irxts, but the value of the new cnxpts may be unacceptably low.

Procedure—CREATE Information Resource Citation Relationship

Use Case: Procedure—CREATE Information Resource Citation Relationship—Citations found in the original information resource (document or prior art material) (here called the "OIR") will be used to add additional cited information resources (or prior art material) (here called the "CIR").

For each irxt created for a referenced or cited document, create an "information resource citation relationship" between the citing irxt, if it exists in the CMM, and the cited irxt, marking (by detailed infxtypx) the relationship to indicate the relationship to be a particular form of citation where possible, mark the relationship source as the source for the document, mark the user requesting the conversion as the creator, and mark the fxxt as the fxxt specified by the citing irxt. Set a predetermined weight for the relationship.

Ttx citation (cited-citing) associations are not created based upon this circumstance. A hierarchical association called an "imputed cnxpt citation association" is automatically created between cnxpts based upon information resource citations, in preparation for map generation.

Procedure—CREATE Direct Information Resource Citation Relationship

Use Case: Procedure—CREATE Direct Information Resource Citation Relationship—Create a "direct information resource citation relationship" between the citing irxt and the cited cnxpt.

If the primary document represented by the irxt cites a cnxpt's description in this system, create a "direct information resource citation relationship" between the citing irxt and the cited cnxpt, marking (by detailed infxtypx) the relationship to indicate the relationship to be a particular form of citation where possible, mark the relationship source as the source for the document, mark the user requesting the action as the creator, and mark its fxxt as the fxxt specified by the citing irxt, based upon the document type containing the reference. Citation relationships are given weights. Set a predetermined weight for the relationship. Weights assigned are established by algorithms and parameters set and possibly altered over time.

This procedure may occur well after the creation of the irxt, as part of the rescanning of a document an irxt represents, when the cited cnxpt is created (possibly then due to the presence of a stored raw reference in the irxt), or when a cnxpt is altered in its description or a new description variant is entered (editor approved) for the cnxpt.

Procedure—CREATE Direct Information Resource Name Reference Citation Relationship Use Case: Procedure—CREATE Direct Information Resource Name Reference Citation Relationship—Create a "direct information resource name reference citation relationship" between the citing irxt and the cited cnxpt.

If the primary document represented by the irxt cites a cnxpt's name in this system, create a "direct information resource name reference citation relationship" between the citing irxt and the cited cnxpt, marking (by detailed infxtypx) the relationship to indicate the relationship to be a particular form of citation where possible, mark the relationship source as the source for the document, mark the user requesting the action as the creator, and mark its fxxt as the fxxt specified by the citing irxt, based upon the document type containing the reference. Citation relationships are given weights. Set a predetermined weight for the relationship. Weights assigned are established by algorithms and parameters set and possibly altered over time.

This procedure may occur well after the creation of the irxt, as part of the rescanning of a document an irxt represents, when the cited cnxpt is created (possibly then due to the presence of a stored raw reference in the irxt), or when a cnxpt is altered in its naming or a new name variant is entered (editor approved) for the cnxpt.

Procedure—CREATE Cnxpt Name Reference Citation Association

Use Case: Procedure—CREATE Cnxpt Name Reference Citation association—Create a "cnxpt name reference citation association" between the citing cnxpt and the cited cnxpt.

If the description of a ttx entered into a cnxpt cites a cnxpt's name (or, in one embodiment, name variant) in this system, create a "cnxpt name reference citation association" between the citing cnxpt and the cited cnxpt, marking (by detailed infxtypx) the relationship to be a particular form of citation where possible, marking the relationship source as the source for the citing cnxpt, and marking the user the editor of the description, or if new, the user requesting the creation of the cnxpt, or as the creator on the relationship. No fxxt is needed. Set a predetermined weight for the relationship, possibly adjusted by an algorithm determining uniqueness of names, so that citing of an uncommon cnxpt name receives a higher weight.

This procedure may occur well after the creation of the cnxpt, as part of the rescanning of a cnxpt, when a citing cnxpt is altered in its description or a description variant is entered (editor approved), or when a cited cnxpt is altered in its naming or a new name variant is entered (editor approved) for the cnxpt. Where such a change occurs and indicates that a previously established "cnxpt name reference citation association" is no longer valid, that relationship may either be deleted or have its weight decreased.

Procedure—CREATE Ttx Citation Association

Use Case: Procedure—CREATE ttx citation association—Create a "ttx citation association" or "ttx description content reference citation association" between the citing cnxpt and the cited cnxpt.

If the description of a ttx entered into a cnxpt cites a cnxpt's description in this system, create a "ttx citation association" or "ttx description content reference citation association" between the citing cnxpt and the cited cnxpt. If "later-added ttx description content reference citation tags" exist for the description of the ttx, create a "ttx description content later-added reference citation association". In either case, mark (by detailed infxtypx) the relationship to be a particular form of citation where possible, marking the relationship source as the source for the citing cnxpt, and marking the user the editor of the description, or if new, the user requesting the creation of the cnxpt, or as the creator on the relationship. No fxxt is needed. Set a predetermined weight for the relationship, possibly adjusted by an algorithm determining semantic similarity.

This procedure may occur well after the creation of the cnxpt, as part of the rescanning of a cnxpt, when a citing cnxpt is altered in its description or a description variant is entered (editor approved) for the cnxpt. Where such a change occurs and indicates that a previously established "ttx citation association" is no longer valid, that relationship may either be deleted or have its weight decreased.

Procedure—CREATE Occurrence

Use Case: Procedure—CREATE Occurrence.

Procedure—CREATE Occurrence to irxt

Use Case: Procedure—CREATE Occurrence to irxt—Create a 'subject identifier' occurrence relationship between the cnxpt and the irxt of the primary document.

Create a 'subject identifier' occurrence relationship between the cnxpt and the irxt of the primary document, marking (by detailed infxtypx) the relationship to indicate it as a particular form of 'subject identifier' occurrence relationship where possible. In one embodiment, optionally mark the occurrence with the scopx of the language or country of origin of the document. If the information resource was found from a result set, mark the occurrence relationship with the result set info-item identifier and the rsxitem info-item identifier and set the weight of the occurrence to a high value. If the information resource was found from a data set, mark the occurrence relationship with the data set info-item identifier and set the weight of the occurrence to a maximum value. Otherwise, mark the source for the relationship as the source of the document as set in the irxt and set the weight of the occurrence to a middle value. Mark the user requesting the conversion as the creator. No fxxt is needed.

Procedure—Automatically Generate irxt occurrences

Use Case: Procedure—Automatically Generate irxt occurrences.

The information resources can be related to ttxs already in the system. In one embodiment, information resources automatically determined to be relevant to but not yet participating in an occurrence relationship with a ttx represented by a cnxpt already in the system may be automatically linked to the cnxpt and the weighting of the occurrence relationship thereby created will be set at a low value so that nearly anyone may offer a stronger vote to effectively move the occurrence to a more appropriate cnxpt. [See Procedure—CREATE Occurrence to irxt]

Procedure—CREATE Occurrence to special txo

Use Case: Procedure—CREATE Occurrence to special txo.

Procedure—CREATE Occurrence to typed txo

Use Case: Procedure—CREATE Occurrence to typed txo.

Procedure—CREATE Occurrence to Community

Use Case: Procedure—CREATE Occurrence to Community—Create a 'Community' typed txo occurrence relationship between the cnxpt and the comxo info-item, marking it with the user as creator and the "Communities" fxxt.

Procedure—CREATE User Interest occurrence

Use Case: Procedure—CREATE User Interest occurrence—Create a 'User Interest' typed txo occurrence relationship between the cnxpt and the user info-item, marking it with the user as creator and the "User Profile" fxxt.

Procedure—CREATE Occurrence to trxrt

Use Case: Procedure—CREATE Occurrence to trxrt—Create a "trait relationship" occurrence relationship between the cnxpt and the trxrt info-item, marking it with the user as creator.

Procedure—PROCESS a CNXPT as PARENT for Target Cnxpt

Use Case: Procedure—PROCESS a CNXPT as PARENT for Target Cnxpt—Create a new "user suggested—ttx placement location association" between a target cnxpt and the cnxpt.

For the cnxpt indicated as parent of the target, create a new "user suggested—ttx placement location association" between the target cnxpt and the cnxpt so that the cnxpt is considered the parent, category, supertype, or predecessor of the target cnxpt, setting the new relationship's properties as follows: TEMPORARY INDICATOR (to TRUE), DELETE INDICATOR (to FALSE), creator property to the info-item identifier of the user. Set a relevance weight for relationship based upon the user's expertise. Set the fxxt to be one, or more stated fxxts.

Create a new custom affinitive association between the target cnxpt and the category cnxpt, setting the new relationship's properties as follows: creator as user, TYPE as given for user stated custom affinitive association, DELETE INDICATOR (to FALSE). A more specific affinitive association infxtypx may be specified by the user and utilized as a type on each new relationship. Set a relevance weight for relationship based upon the user's expertise.

Procedure—CREATE custom affinitive association

Use Case: Procedure—CREATE custom affinitive association—Create a new "custom affinitive association" between two cnxpts.

Create a new "custom affinitive association" between the two cnxpts within all, one, or more stated fxxts and within all, one, or more stated scopxs, marking (by detailed infxtypx, scopx, or fxxt) the relationship to indicate it is a category membership relationship, mark it as created by the user, and assign it a weight. Set the infxtypx as specifically as possible to better detail the user's knowledge and intent.

Procedure—CREATE custom hierarchical association

Use Case: Procedure—CREATE custom hierarchical association—Create a new "custom hierarchical association" between each set of two cnxpts.

Create a new "custom hierarchical association" between each set of two cnxpts as appropriate with the stated fxxt and, possibly, the stated scopx. If more than one fxxt is indicated by the situation, then mark the relationship as within all, one, or more stated fxxts. If more than one scopx is indicated by the situation, then mark the relationship as within all, one, or more stated scopxs. Mark (by detailed infxtypx or scopx) the relationship to indicate it is a category membership relationship, setting a high weight for the relationship, and mark as creator the user creating it, if available, with the user info-item identifier in its creator role, and the source of the information if trusted and if available, with the source info-item identifier in its source role. If the taxonomy was found from a data set, mark the associations with the data set info-item identifier in its source role. Set the infxtypx as specifically as possible to better detail the user's or source's knowledge and intent.

Procedure—CREATE offer a reward

Use Case: Procedure—CREATE offer a reward.

Procedure—CREATE offer a license

Use Case: Procedure—CREATE offer a license.

Procedure—CREATE register information request

Use Case: Procedure—CREATE register information request.

Procedure—REPOSITION a Goal

Use Case: Procedure—REPOSITION a Goal—Recalculate the position of a goal.

Recalculate the position of a goal from a summarization of its identity indicators, recalculating their distance in respect to other cnxpts. Goals are repositioned locally in most cases. [See Procedure—REPROCESS Queries for Goal]

Procedure—REPOSITION a Cnxpt

Use Case: Procedure—REPOSITION a Cnxpt—Recalculate the position of a cnxpt.

Recalculate the position of a cnxpt from a summarization of its identity indicators, recalculating their distance in respect to other cnxpts. Cnxpts are repositioned centrally in most cases, during scheduled repositioning. This procedure allows for local repositioning or for out of cycle repositioning. [See Procedure—REPROCESS Queries for Goal]

Procedure—REPROCESS Queries for Goal

Use Case: Procedure—REPROCESS Queries for Goal—Carryout a reevaluation of all queries and all result sets attached to a goal.

Reevaluation includes reapplication of all culling operations performed as recorded. [See Procedure—EXECUTE Query and Attach Result Set to Goal]

Procedure—REPROCESS a Cnxpt

Use Case: Procedure—REPROCESS a Cnxpt—Carryout a reevaluation of all queries and all result sets attached to a cnxpt.

Reevaluation includes reapplication of all culling operations performed as recorded. A locked cnxpt may not be moved. In one embodiment, if the cnxpt is locked, no reevaluation is allowed. [See Procedure—PROCESS a Query for Cnxpt] [See Procedure—PROCESS a Result Set for Cnxpt]

Procedure—REPROCESS a Query for Goal

Use Case: Procedure—REPROCESS a Query for Goal—Carryout a reevaluation of a query and all result sets attached to a goal to achieve a status as if those processes had just executed.

Reevaluation includes reapplication of all culling operations performed as recorded. [See Procedure—EXECUTE Query and Attach Result Set to Goal]

Procedure—REPROCESS a Result Set for Goal

Use Case: Procedure—REPROCESS a Result Set for Goal—Carryout corrections to the relationships and properties created by previous result set processing to achieve a status as if those processes had just executed.

[See Procedure—PROCESS a Result Set for Goal] [See Procedure—PROCESS a Result Set as PARENTS for Goal] [See Procedure—PROCESS a Result Set of Txos for Goal]

Procedure—REPROCESS a Result Set for Cnxpt

Use Case: Procedure—REPROCESS a Result Set for Cnxpt—Carryout corrections to the relationships and properties created by previous result set processing to achieve a status as if those processes had just executed.

[See Procedure—PROCESS a Result Set for Cnxpt] [See Procedure—PROCESS a Result Set as PARENTS for Cnxpt] [See Procedure—PROCESS Other Result Set Items for Cnxpt]

Procedure—FINALIZE Query for Cnxpt

Use Case: Procedure—FINALIZE Query for Cnxpt—Make the query permanent but revisable.

If and when a query is finalized for a cnxpt, so that the user states that the query is high enough in quality to be retained, and the cnxpt is not already LOCKED, set all still existing TEMPORARY INDICATOR properties to FALSE on all relationships stemming from the result sets attached to the query.

Procedure—FINALIZE Goal into Cnxpt

Use Case: Procedure—FINALIZE Goal into Cnxpt—Make the goal permanent but revisable by converting it to a cnxpt.

If and when a goal is finalized into being a cnxpt, set all still existing TEMPORARY INDICATOR properties to FALSE on all relationships stemming from the result sets on the goal or attached to queries for the goal, and change the goal type to a cnxpt of the proper type.

Procedure—CONVERT Search or FindAll to Query

Use Case: Procedure—CONVERT Search or FindAll to Query—Create a query info-item from a simpler search or FindAll.

Create a query info-item, setting the creator property to the user and set the fxxt as set for the search or FindAll. Copy the search specification to become a single query step specification. Create a result set info-item in the CMM, attaching it to the query info-item to become a result set for the query step. Copy the properties and contents of the selection set for the search or FindAll, if it exists, to be properties of the result set, and mark it as executed, setting the creator property to the user and set the fxxt as set for the search or FindAll, if set. [See Procedure—CONVERT Selection Set to Result Set]

Procedure—CONVERT Selection Set to Result Set

Use Case: Procedure—CONVERT Selection Set to Result Set—Copy a Selection Set to become a Result Set, to make it ready for culling.

Create a result set info-item in the CMM, setting the user identifier as creator. Copy the properties and contents of the selection set for the search, if it exists, to be properties of the result set, and mark it as executed, setting the creator property to the user and set the fxxt as set for the selection set (or to the search, FindAll, data set, or query it stems from), setting other properties as for the selection set. Copy the selection set items, if they exist, to become rsxitems for the result set, and mark their properties as for the selection set, setting default values for the RELEVANCE STRENGTH (to “relevant”), REVIEWED (to “not reviewed”), and ORDER property of each rsxitem. Make the result set active for culling.

Procedure—CONVERT Data Set to Result Set

Use Case: Procedure—CONVERT Data Set to Result Set—Copy a data set to become a locked Result Set, to make it ready for culling.

The user must override any lock. Create a data set source txo. Create a result set info-item in the CMM, setting the user identifier as creator and the source as the data set source info-item identifier. Copy the data set set properties, if they exist, to become properties of the result set, and mark it as executed, setting the creator property to the user and set the fxxt and other properties as set for the data set, and a source as the data set. Form a representative for the information of each data set item by establishing an identifier, by either identifying a previously existing irxt, txo, or cnxpt (as determined by the nature of the data set item) that the data set item matches, or creating a new irxt, txo, or cnxpt and copying the data set item’s properties to the irxt, txo, or cnxpt. Create a new rsxitem to link the representative’s identifier to the Result Set and mark their properties as for the data set set, setting default values for the RELEVANCE STRENGTH (to “relevant”), REVIEWED (to “reviewed”), and ORDER property of each rsxitem. Mark the Result Set and the result set item as LOCKED (because they were submitted in a data set). In one embodiment, make the result set active for culling, even though the rsxitems are LOCKED.

Procedure—CONVERT Area to Result Set

Use Case: Procedure—CONVERT Area to Result Set—Copy an Area of Consideration or Area of Interest to become a Result Set, to make it ready for culling Create a Result Set info-item, setting its properties to match those of the Area and the user identifier as creator, and mark it as executed. Create a new rsxitem in the new Result Set for each item in the Area, setting its properties to match those of the Area item. Set default values for the RELEVANCE STRENGTH (to “relevant”), REVIEWED (to “not reviewed”), and ORDER property of each rsxitem. Make the result set active for culling.

Procedure—CREATE Query and Attach to Goal

Use Case: Procedure—CREATE Query and Attach to Goal—Create a query info-item, setting the creator property to the user and set the fxxt to a default.

Procedure—CREATE Query and Attach to Cnxpt

Use Case: Procedure—CREATE Query and Attach to Cnxpt—Create a query info-item, setting the creator property to the user and set the fxxt to a default.

Procedure—CREATE Query Step Specification

Use Case: Procedure—CREATE Query Step Specification—Create a query step specification for a query.

Create a result set info-item in the CMM, attaching it to the query info-item to become a result set for the query step. Set the properties of the result set to defaults based upon the query properties and the step specification, and mark it as unexecuted.

Procedure—PROCESS a Query for Goal

Use Case: Procedure—PROCESS a Query for Goal—Evaluate all queries and generate result sets into the goal.

Set up for user culling operations. [See Procedure—EXECUTE Query and Attach Result Set to Goal]

Procedure—EXECUTE Query and Attach Result Set to Goal

Use Case: Procedure—EXECUTE Query and Attach Result Set to Goal—Carryout an evaluation of a query.

Evaluate each query step specification and generate result sets, attaching the result sets to the query in the goal. [See Procedure—PROCESS Query Step Specification, generating result set] Set up for user culling operations. [See Procedure—PROCESS a Result Set for Goal]

Procedure—PROCESS Query Step Specification, generating result set

Use Case: Procedure—PROCESS Query Step Specification, generating result set—Interpret a query step specification and generate a result set.

Interpret a query step specification and generate a result set, setting properties of the result set and associating rsxitems to the result set, then marking it as executed, setting the creator property to the user and the fxxt as a default or by the query step specification, if set. If the query is associated with a goal or cnxpt, then invoke the processing of the result set. [See Procedure—PROCESS a Result Set for Goal or Cnxpt]

Procedure—CREATE Result Set

Use Case: Procedure—CREATE Result Set—Create, or concretize into the CMM a new result set.

No fxxt is needed, but may be supplied by the user. Set the creator as user. Set overall weight value by default or by algorithm or by user setting. As the culling progress continues, the weight of the result set, representing the strength of the user's conviction of the relevance of the result set to the ttx, will be increased.

Procedure—ATTACH a Query to Goal

Use Case: Procedure—ATTACH a Query to Goal—Attach Query info-item to goal as a Query Property.

Attach Query info-item to goal as a Query Property where the ttxs represented by cnxpts in the result are to be considered child, subtype, or successor of the goal. If the query has been executed, process the results into the goal to reposition the goal. [See Procedure—PROCESS a Result Set for Goal]

Reset overall weight value by default or by algorithm or by user setting. As the querying progress continues, the weight of the query, representing the strength of the user's conviction of the relevance of the result set to the ttx, will be increased.

Procedure—ATTACH a Query to Goal as PARENTS

Use Case: Procedure—ATTACH a Query to Goal as PARENTS—Attach Query info-item to the goal as a Query Property.

Attach Query info-item to the goal as a Query Property where the ttxs represented by the strongest cntexxts in the result are to be considered parent or supertypes or predecessors of the goal in the fxxt specified. Process the results into the goal to reposition the goal. [See Procedure—PROCESS a Result Set as PARENTS for Goal]

Procedure—ATTACH a Query to Cnxpt as PARENTS

Use Case: Procedure—ATTACH a Query to Cnxpt as PARENTS—Attach Query info-item to the target cnxpt as a Query Property.

Attach Query info-item to the cnxpt as a Query Property where the ttxs represented by the strongest cntexxts in the result are to be considered parent or supertypes or predecessors of the cnxpt in the fxxt specified. Process the results into the cnxpt to reposition the cnxpt. [See Procedure—PROCESS a Result Set as PARENTS for Cnxpt]

Procedure—ATTACH a Result Set to Goal as PARENTS

Use Case: Procedure—ATTACH a Result Set to Goal as PARENTS—Attach Result Set info-item to the goal as a Result Set Property.

Attach Result Set info-item to the goal as a Result Set Property where the ttxs represented by the strongest cntexxts in the result are to be considered parent or supertypes or predecessors of the goal in the fxxt specified. Process the results into the goal to reposition the goal. [See Procedure—PROCESS a Result Set as PARENTS for Goal]

Procedure—ATTACH a Result Set to Cnxpt as PARENTS

Use Case: Procedure—ATTACH a Result Set to Cnxpt as PARENTS—Attach Result Set info-item to the target cnxpt as a Result Set Property.

Attach Result Set info-item to the target cnxpt as a Result Set Property where the ttxs represented by the strongest cntexxts in the result are to be considered parent or supertypes or predecessors of the target cnxpt in the fxxt specified. Process the results into the cnxpt to reposition the cnxpt. [See Procedure—PROCESS a Result Set as PARENTS for Cnxpt]

Procedure—PROCESS a Result Set for Goal or Cnxpt

Use Case: Procedure—PROCESS a Result Set for Goal or Cnxpt—Combine a result set into a summary result set.

Relations from a cnxpt to other info-items, especially including those representing documents, is based upon only certain result sets attached directly or indirectly to a cnxpt. The relevance of the info-items to the cnxpt, for a specific query, will be held in a specific result set which is the summary (the final specification step's result set) for the query, and for each info-item, an rsxitem (result set element) in that summary result set for the query.

A cnxpt can have more than one query, and more than one result set—and a query can have more than one step, and each can have a result set. The cnxpt can have result sets outside of the queries as well. The only actual result set items counted for actual relevance for the cnxpt, or that are used as a basis for building relationships from the cnxpt, are the rsxitems in the last step of the query(s) (the summary result set) and the rsxitems in result sets attached to the cnxpt but not to any query.

Procedure—PROCESS a Result Set for Goal

Use Case: Procedure—PROCESS a Result Set for Goal—Combine a result set into the goal's summary result set.

Procedure—PROCESS a Result Set for Cnxpt

Use Case: Procedure—PROCESS a Result Set for Cnxpt—Combine a result set into the cnxpt's summary result set.

Depending upon which type of result set and whether the result set is attached to a cnxpt or a goal, perform the appropriate procedure:

[See Procedure—PROCESS a Result Set as PARENTS for Goal]

[See Procedure—PROCESS a Result Set as PARENTS for Cnxpt]

[See Procedure—PROCESS a Result Set as SIBLINGS for Goal]

[See Procedure—PROCESS a Result Set as SIBLINGS for Cnxpt]

[See Procedure—PROCESS a Result Set as CHILDREN for Goal]

[See Procedure—PROCESS a Result Set as CHILDREN for Cnxpt]

[See Procedure—REPROCESS a Result Set for Goal]

[See Procedure—REPROCESS a Result Set for Cnxpt]

Procedure—Calculate Weight for Rsxitem Relevance

Use Case: Procedure—Calculate Weight for Rsxitem Relevance—Calculate a weight for the relationships or properties generated from the rsxitems to the cnxpt.

Calculate a weight for the relationships or properties according to the relevance weight of the rsxitem as adjusted according to the overall weight property assigned to the result set. The weight of the result set is a sense of the quality of that search as a whole (the summary result set for a query is to have the summary of the user's sense of the success of the query), growing if the user has marked every element for relevance or has taken many steps to determine the rsxitems. The relevance value for each rsxitem is set based upon the overall weight property assigned to the result set in concert with the weight on the individual rsxitem. The relevance weight used as a weight in a generated relationship or in any other use of the result set is the weight of a specific rsxitem MULTIPLIED by the weight of the overall weight property assigned to the result set during summarizing and for calculating weights for relationships generated. If any rsxitem weight is not set, it should (except in the case of an error) imply that the rsxitem was not yet viewed for relevance marking. In general, if the rsxitem is marked relevant, set a high weight, adjusted according to the overall weight property assigned to the result set. If the rsxitem is marked relevant but too general, set a low weight, as adjusted. If the rsxitem is marked irrelevant, set a very high negative weight, as adjusted.

Procedure—PROCESS a Result Set as PARENTS for Goal

Use Case: Procedure—PROCESS a Result Set as PARENTS for Goal—Create a new association between one or more of the cntexxts of the result set and the goal.

Evaluate the result set. [See Result Set Evaluation.] For each cntexxt found, strongest first up to the set number of cntexxts to be used as parents, create a new temporary hierarchical association between the cnxpt of the cntexxt and the goal so that the goal is considered the child, subtype, or successor of the cntexxt cnxpt, setting the new relationship's properties as follows: TEMPORARY INDICATOR (to TRUE), DELETE INDICATOR (to FALSE). Set the weight property of the new association to the strength of the cntexxt. Add a basis to the relationship with the cntexxt as a source, the 'TEMPORARY' value set to TRUE, and the weight set as above.

For each rsxitem in the Result Set that represents a txo other than a cnxpt, carryout the process for that type of txo to add an occurrence to the goal, setting the strength of the occurrence to be a factor less than the weight for the relevance of the rsxitem times the weight of the result set to the goal. [See Procedure—PROCESS a Result Set of Txos for Goal] This process will cause the connection of txos by occurrences to different levels in a categorization, but the problem is mitigated by the weightings.

Procedure—PROCESS a Result Set as PARENTS for Cnxpt

Use Case: Procedure—PROCESS a Result Set as PARENTS for Cnxpt—Create a new association between one or more of the cntexxts of the result set and the cnxpt.

Evaluate the result set. [See Result Set Evaluation.] For each cntexxt found, strongest first up to the set number of cntexxts to be used as parents, create a new temporary hierarchical association between the cnxpt of the cntexxt and the cnxpt so that the cnxpt is considered the child, subtype, or successor of the cntexxt cnxpt, setting the new relationship's properties as follows: TEMPORARY INDICATOR (to TRUE), DELETE INDICATOR (to FALSE). Set the weight property of the new association to the strength of the cntexxt. Add a basis to the relationship with the cntexxt as a source, the 'TEMPORARY' value set to TRUE, and the weight set as above.

For each rsxitem in the Result Set that represents a txo other than a cnxpt, carryout the process for that type of txo to add an occurrence to the cnxpt, setting the strength of the occurrence to be a factor less than the weight for the relevance of the rsxitem times the weight of the result set to the cnxpt. [See Procedure—PROCESS a Result Set of Txos for Cnxpt] This process will cause the connection of txos by occurrences to different levels in a categorization, but the problem is mitigated by the weightings.

Procedure—ATTACH a Query to Goal as SIBLINGS

Use Case: Procedure—ATTACH a Query to Goal as SIBLINGS—Attach Query info-item to a goal as a Query Property.

Attach Query info-item to a goal as a Query Property where the ttxs represented by cnxpts in the result are to be considered merely to have an affinity with the goal. If the query has been executed, process the results into the goal to reposition the goal. [See Procedure—PROCESS a Result Set as SIBLINGS for Goal]

Procedure—ATTACH a Query to Cnxpt as SIBLINGS

Use Case: Procedure—ATTACH a Query to Cnxpt as SIBLINGS—Attach Query info-item to the target cnxpt as a Query Property.

Attach Query info-item to the target cnxpt as a Query Property where the ttxs represented by cnxpts in the result are to be considered merely to have an affinity with the target cnxpt. If the query has been executed, process the results into the target cnxpt to reposition the target cnxpt. [See Procedure—PROCESS a Result Set as SIBLINGS for Cnxpt]

Procedure—ATTACH a Result Set to Goal as SIBLINGS

Use Case: Procedure—ATTACH a Result Set to Goal as SIBLINGS—Attach Result Set info-item to the goal as a Result Set Property.

Attach Result Set info-item to the goal as a Result Set Property where the ttxs represented by cnxpts in the result are to be considered affinitive siblings of the goal. Process the results into relationships to the goal to reposition the goal. [See Procedure—PROCESS a Result Set as SIBLINGS for Cnxpt]

Procedure—ATTACH a Result Set to Cnxpt as SIBLINGS

Use Case: Procedure—ATTACH a Result Set to Cnxpt as SIBLINGS—Attach Result Set info-item to the target cnxpt as a Result Set Property.

Attach Result Set info-item to the target cnxpt as a Result Set Property where the ttxs represented by cnxpts in the result are to be considered affinitive siblings of the target cnxpt. Process the results into relationships to the cnxpt to reposition the cnxpt. [See Procedure—PROCESS a Result Set as SIBLINGS for Cnxpt]

Procedure—PROCESS a Result Set as SIBLINGS for Goal

Use Case: Procedure—PROCESS a Result Set as SIBLINGS for Goal—Create a new hierarchical association between the common parent of the cntexxts of the result set and the goal, associations between the rsxitem cnxpts and the goal, and occurrences between the rsxitem txos and the goal.

Result sets indicating only sibling relationships with the ttx to be represented by the goal generate only one hierarchical association and affinitive associations. The hierarchical association provides a parent to the goal based upon all of the relevant siblings in the result set. If the result set changes, then the parent may change.

Evaluate the Result Set. See Result Set Evaluation.

For the set of cntexxts in the Result Set, determine the lowest cnxpt that is a common parent to all of the cnxpts of cntexxts of the result set. Create a new temporary hierarchical association between the common parent cntexxt cnxpt and the goal so that the goal is considered the child of the common parent cnxpt, setting the new relationship's properties as follows: TEMPORARY INDICATOR (to TRUE), DELETE INDICATOR (to FALSE). Calculate a strength for the hierarchical association as the cntexxts strength adjusted by the overall weight of the result set.

For each rsxitem in the Result Set that represents a txo other than a cnxpt, carryout the process for that type of txo to add an occurrence to the goal, setting the strength of the occurrence to be a factor less than the weight for the relevance of the rsxitem times the weight of the result set to the goal. [See Procedure—PROCESS a Result Set of Txos for Goal] This process will cause the connection of txos by occurrences to different levels in a categorization, but the problem is mitigated by the weightings.

Procedure—PROCESS a Result Set as SIBLINGS for Cnxpt

Use Case: Procedure—PROCESS a Result Set as SIBLINGS for Cnxpt—Create a new hierarchical association between the common parent of the cntexxts of the result set and the cnxpt, associations between the rsxitem cnxpts and the cnxpt, and occurrences between the rsxitem txos and the cnxpt.

Result sets indicating only sibling relationships with the ttx to be represented by the cnxpt generate only one hierarchical association and affinitive associations. The hierarchical association provides a parent to the cnxpt based upon all of the relevant siblings in the result set. If the result set changes, then the parent may change.

Evaluate the Result Set. See Result Set Evaluation.

For the set of cntexxts in the Result Set, determine the lowest cnxpt that is a common parent to all of the cnxpts of cntexxts of the result set. Create a new temporary hierarchical association between the common parent cntexxt cnxpt and the cnxpt so that the cnxpt is considered the child of the common parent cnxpt, setting the new relationship's properties as follows: TEMPORARY INDICATOR (to TRUE), DELETE INDICATOR (to FALSE). Calculate a strength for the hierarchical association as the cntexxts strength adjusted by the overall weight of the result set.

For each rsxitem in the Result Set that represents a txo other than a cnxpt, carryout the process for that type of txo to add an occurrence to the cnxpt, setting the strength of the occurrence to be a factor less than the weight for the relevance of the rsxitem times the weight of the result set to the cnxpt. [See Procedure—PROCESS a Result Set of Txos for Cnxpt] This process will cause the connection of txos by occurrences to different levels in a categorization, but the problem is mitigated by the weightings.

Procedure—ATTACH a Query to Goal as CHILDREN

Use Case: Procedure—ATTACH a Query to Goal as CHILDREN—Attach Query info-item to goal as a Query Property.

Attach Query info-item to goal as a Query Property where the ttxs represented by cnxpts in the result set are to be considered children or sub-type or successor of the goal in the fxxt specified. If the query has been executed, process the results into the goal to reposition the goal. [See Procedure—PROCESS a Result Set as CHILDREN for Goal]

Procedure—ATTACH a Query to Cnxpt as CHILDREN

Use Case: Procedure—ATTACH a Query to Cnxpt as CHILDREN—Attach Query info-item to the target cnxpt as a Query Property.

Attach Query info-item to the target cnxpt as a Query Property where the ttxs represented by cnxpts in the result are to be considered children or sub-type or successor of the target cnxpt in the fxxt specified. If the query has been executed, process the results into the target cnxpt to reposition the target cnxpt. [See Procedure—PROCESS a Result Set as CHILDREN for Cnxpt]

Procedure—ATTACH a Result Set to Goal as CHILDREN

Use Case: Procedure—ATTACH a Result Set to Goal as CHILDREN—Attach Result Set info-item to the goal as a Result Set Property.

Attach Result Set info-item to the goal as a Result Set Property where the ttxs represented by cnxpts in the result are to be considered child, subtype, or successor of the goal in the fxxt specified. Process the results into the goal to reposition the goal. [See Procedure—PROCESS a Result Set as CHILDREN for Goal]

Procedure—ATTACH a Result Set to Cnxpt as CHILDREN

Use Case: Procedure—ATTACH a Result Set to Cnxpt as CHILDREN—Attach Result Set info-item to the target cnxpt as a Result Set Property.

Attach Result Set info-item to the target cnxpt as a Result Set Property where the ttxs represented by cnxpts in the result are to be considered child, subtype, or successor of the target cnxpt in the fxxt specified. Process the results into the target cnxpt to reposition the target cnxpt. [See Procedure—PROCESS a Result Set as CHILDREN for Cnxpt]

Procedure—PROCESS a Result Set as CHILDREN for Goal

Use Case: Procedure—PROCESS a Result Set as CHILDREN for Goal—Create a new hierarchical association between a set number of the rsxitem cnxpts of the result set and the goal, and occurrences between the rsxitem txos and the goal.

Result sets indicating only children relationships with the ttx to be represented by the goal generate one or more hierarchical association to show the goal as parent of the cnxpts of the result set. Cntexxts are not considered because their use is superfluous at this stage of the fxxt development, but this belief is an implementation detail. The hierarchical association provides a parent to the most relevant rsxitem cnxpts. If the result set changes, then the parentage of those cnxpts may change, so the hierarchical association existence is a mere vote. To improve stability, the vote is recorded and averaged in with other such votes whenever the result set is changed.

Evaluation of the result set is unnecessary here. See Result Set Evaluation.

For the set of cnxpt or goal rsxitems in the result set, determine the cnxpts to set as children of this goal by relevance strength. For each rsxitem cnxpt to be used, create a new existence vote for a temporary hierarchical association between the goal as parent and the rsxitem cnxpt, so that the goal is considered the parent or supertype or predecessor of the cnxpt, setting the new relationship's properties as follows: TEMPORARY INDICATOR (to TRUE), DELETE INDICATOR (to FALSE). Calculate a strength vote for the hierarchical association as the rsxitem's relevance strength adjusted by the overall weight of the result set and adjusted by a fudge factor to indicate that this operation is normally lower in effective quality. Add a basis to the relationship with the rsxitem as a source, the 'TEMPORARY' value set to TRUE, and the weight set as above.

For each rsxitem in the Result Set that represents a txo other than a cnxpt, carryout the process for that type of txo to add an occurrence to the goal, setting the strength of the occurrence to be a factor less than the weight for the relevance of the rsxitem times the weight of the result set to the goal. [See Procedure—PROCESS a Result Set of Txos for Goal] This process will cause the connection of txos by occurrences to different levels in a categorization, but the problem is mitigated by the weightings.

Procedure—PROCESS a Result Set as CHILDREN for Cnxpt

Use Case: Procedure—PROCESS a Result Set as CHILDREN for Cnxpt—Create a new hierarchical association between a set number of the rsxitem cnxpts of the result set and the cnxpt, and occurrences between the rsxitem txos and the cnxpt.

Result sets indicating only children relationships with the ttx to be represented by the cnxpt generate one or more hierarchical association to show the cnxpt as parent of the cnxpts of the result set. Cntexxts are not considered because their use is superfluous at this stage of the fxxt development, but this belief is an implementation detail. The hierarchical association provides a parent to the most relevant rsxitem cnxpts. If the result set changes, then the parentage of those cnxpts may change, so the hierarchical association existence is a mere vote. To improve stability, the vote is recorded and averaged in with other such votes whenever the result set is changed.

Evaluation of the result set is unnecessary here. See Result Set Evaluation.

For the set of cnxpt or cnxpt rsxitems in the result set, determine the cnxpts to set as children of this cnxpt by relevance strength. For each rsxitem cnxpt to be used, create a new existence vote for a temporary hierarchical association between the cnxpt as parent and the rsxitem cnxpt, so that the cnxpt is considered the parent or supertype or predecessor of the cnxpt, setting the new relationship's properties as follows: TEMPORARY INDICATOR (to TRUE), DELETE INDICATOR (to FALSE). Calculate a strength vote for the hierarchical association as the rsxitem's relevance strength adjusted by the overall weight of the result set and adjusted by a fudge factor to indicate that this operation is normally lower in effective quality. Add a basis to the relationship with the rsxitem as a source, the 'TEMPORARY' value set to TRUE, and the weight set as above.

For each rsxitem in the Result Set that represents a txo other than a cnxpt, carryout the process for that type of txo to add an occurrence to the cnxpt, setting the strength of the occurrence to be a factor less than the weight for the relevance of the rsxitem times the weight of the result set to the cnxpt. [See Procedure—PROCESS a Result Set of Txos for Cnxpt] This process will cause the connection of txos by occurrences to different levels in a categorization, but the problem is mitigated by the weightings.

Procedure—PROCESS Other Result Set Items for Goal

Use Case: Procedure—PROCESS Other Result Set Items for Goal—Generate other relationships between rsxitems and the goal.

Cnxpt result set members may be added to a goal as being affinitively related not as a sibling. [See Procedure—PROCESS a Result Set of Cnxpts for Affinity with Goal]

Txo result set members may cause occurrence and other relationships for a goal. For each rsxitem in the Result Set that represents a txo other than a cnxpt, carryout the process for that type of txo to add an occurrence to the goal, setting the strength of the occurrence to be a factor less than the weight for the relevance of the rsxitem times the weight of the result set to the goal. [See Procedure—PROCESS a Result Set of Txos for Goal] This process will cause the connection of txos by occurrences to different levels in a categorization, but the problem is mitigated by the weightings.

Procedure—PROCESS Other Result Set Items for Cnxpt

Use Case: Procedure—PROCESS Other Result Set Items for Cnxpt—Generate other relationships between rsxitems and the cnxpt.

Cnxpt result set members may be added to a cnxpt as being affinitively related not as a sibling. [See Procedure—PROCESS a Result Set of Cnxpts for Affinity with Cnxpt]

Txo result set members may cause occurrence and other relationships for a cnxpt. For each rsxitem in the Result Set that represents a txo other than a cnxpt, carryout the process for that type of txo to add an occurrence to the cnxpt, setting the strength of the occurrence to be a factor less than the weight for the relevance of the rsxitem times the weight of the result set to the cnxpt. [See Procedure—PROCESS a Result Set of Txos for Cnxpt] This process will cause the connection of txos by occurrences to different levels in a categorization, but the problem is mitigated by the weightings.

Procedure—PROCESS a Result Set of Cnxpts for Affinity with Goal

Use Case: Procedure—PROCESS a Result Set of Cnxpts for Affinity with Goal—Create a new custom affinitive association between the goal and the cnxpt.

For each rsxitem in the Result Set that represents a cnxpt other than the target, create a new custom affinitive association between the goal and the cnxpt specified by the rsxitem, setting the new relationship's properties as follows: source as set for rsxitem, creator as user attaching result set, TYPE as given for result set stated custom affinitive association, DELETE INDICATOR (to FALSE). A more specific affinitive association infxtypx may be specified by the user and utilized as a type on each new relationship. Calculate a relevance weight for the rsxitem. [See Procedure—Calculate Weight for Rsxitem Relevance] Set the weight property of the new relationship to the calculated weight. Add a basis to the relationship with the rsxitem as a source, the 'TEMPORARY' value set to TRUE, and the weight set as above.

Procedure—PROCESS a Result Set of Cnxpts for Affinity with Target Cnxpt

Use Case: Procedure—PROCESS a Result Set of Cnxpts for Affinity with Target Cnxpt—Create a new custom affinitive association between the target cnxpt and the cnxpt.

For each rsxitem in the Result Set that represents a cnxpt other than the target, create a new custom affinitive association between the target cnxpt and the cnxpt specified by the rsxitem, setting the new relationship's properties as follows: source as set for rsxitem, creator as user attaching result set, TYPE as given for occurrence relationships for that txo type, DELETE INDICATOR (to FALSE). A more specific affinitive association infxtypx may be specified by the user and utilized as a type on each new relationship. Calculate a relevance weight for the rsxitem. [See Procedure—Calculate Weight for Rsxitem Relevance] Set the weight property of the new relationship to the calculated weight. Add a basis to the relationship with the rsxitem as a source, the 'TEMPORARY' value set to TRUE, and the weight set as above.

Procedure—PROCESS a Result Set of Txos for Goal

Use Case: Procedure—PROCESS a Result Set of Txos for Goal—For each remaining rsxitem in the Result Set, calculate a relevance weight for the rsxitem.

[See Procedure—Calculate Weight for Rsxitem Relevance]

If the rsxitem represents a txo for which an occurrence property may be created for a cnxpt, create a new temporary occurrence relationship between the txo and the goal with a weight as calculated above for relevance to the goal. Set the new relationship's properties as follows: TEMPORARY INDICATOR (to TRUE), DELETE INDICATOR (to FALSE). Add a basis to the relationship with the rsxitem as a source, the 'TEMPORARY' value set to TRUE, and the calculated weight.

If the rsxitem represents a txo for which a txo property may be created for a cnxpt, create a new temporary txo property for the goal, and that the property's strength has relevance to the goal according to the calculated weight as set above. Set the new property's TYPE. Add a basis to the property with the rsxitem as a source, the 'TEMPORARY' value set to TRUE, and the calculated weight.

If the rsxitem represents a txo containing attribute information for which an attribute property may be created for a cnxpt, create a new attribute property for the goal, setting the new property's TYPE, and a weight according to the calculated weight. Add a basis to the property with the rsxitem as a source, the 'TEMPORARY' value set to TRUE, and the calculated weight.

Procedure—PROCESS a Result Set of Txos for Cnxpt

Use Case: Procedure—PROCESS a Result Set of Txos for Cnxpt—For each remaining rsxitem in the Result Set, calculate a relevance weight for the rsxitem.

[See Procedure—Calculate Weight for Rsxitem Relevance]

If the rsxitem represents a txo for which an occurrence property may be created for a cnxpt, create a new temporary occurrence relationship between the txo and the target cnxpt with a weight as calculated above for relevance to the target cnxpt. Set the new relationship's properties as follows: TEMPORARY INDICATOR (to TRUE), DELETE INDICATOR (to FALSE). Add a basis to the relationship with the rsxitem as a source, the 'TEMPORARY' value set to TRUE, and the calculated weight.

If the rsxitem represents a txo for which a txo property may be created for a cnxpt, create a new temporary txo property for the target cnxpt, and that the property's strength has relevance to the target cnxpt according to the calculated weight as set above. Set the new property's TYPE. Add a basis to the property with the rsxitem as a source, the 'TEMPORARY' value set to TRUE, and the calculated weight.

If the rsxitem represents a txo containing attribute information for which an attribute property may be created for a cnxpt, create a new attribute property for the target cnxpt, setting the new property's TYPE, and a weight according to the calculated weight. Add a basis to the property with the rsxitem as a source, the 'TEMPORARY' value set to TRUE, and the calculated weight Procedure—CREATE Cnxpt from Result Set Use Case: Procedure—CREATE Cnxpt from Result Set—Create and position a new cnxpt.

Utilize the result set to position a new cnxpt, where the ttxs represented by cnxpts in the result are to be considered mere siblings with affinitive relationships for the positioning of the cnxpt, and non-cnxpts of the result set are to be occurrences.

Set an overall weight value by default, by algorithm, or by user setting, to represent the strength of the user's conviction of the relevance of the result set to the cnxpt.

Generate one hierarchical relationship to provide a parent to the cnxpt based upon all of the relevant siblings in the result set. If the result set changes, then the parent may change. For the set of relevant cnxpts represented by rsxitems in the Result Set, determine the lowest cnxpt that is a common parent to all of the cnxpts. Create a new temporary hierarchical association between the common parent cnxpt and the new cnxpt so that the new cnxpt is considered the child of the common parent cnxpt, setting the new relationship's properties as follows: TEMPORARY INDICATOR (to TRUE), DELETE INDICATOR (to FALSE). Calculate a relevance weight for the rsxitem as being medium as adjusted by the overall weight of the result set.

For each rsxitem, the weight for the relationships or properties derived is the relevance weight of the rsxitem as adjusted by the overall weight. If the rsxitem is marked relevant, set a high weight, adjusted by the overall weight. If the rsxitem is marked relevant but too general, set a low weight, adjusted by the overall weight. If the rsxitem is marked irrelevant, set a very high negative weight, adjusted by the overall weight.

If the rsxitem represents an existing cnxpt of the same type as the new cnxpt, create a new temporary affinitive association between the existing cnxpt and the new cnxpt so that the new cnxpt is considered only a sibling of the existing cnxpt, setting the new relationship's properties as follows: TEMPORARY INDICATOR (to TRUE), DELETE INDICATOR (to FALSE), and the weight to the calculated weight. Add a basis to the relationship with the rsxitem as a source, the 'TEMPORARY' value set to TRUE, and the weight set as above. A more specific affinitive relationship infxtypx may be specified by the user and utilized as a type on each new relationship.

If the rsxitem represents a cnxpt for which an occurrence property may be created for the type of the new cnxpt, create a new temporary occurrence relationship between the cnxpt and the new cnxpt with a weight as calculated above for relevance to the new cnxpt. Set the new relationship's properties as follows: TEMPORARY INDICATOR (to TRUE), DELETE INDICATOR (to FALSE). Add a basis to the relationship with the rsxitem as a source, the 'TEMPORARY' value set to TRUE, and the calculated weight.

If the rsxitem represents a cnxpt for which a cnxpt property may be created for the type of the new cnxpt, create a new temporary cnxpt property for the new cnxpt, and that the property's strength has relevance to the new cnxpt according to the calculated weight as set above. Set the new property's TYPE. Add a basis to the property with the rsxitem as a source, the 'TEMPORARY' value set to TRUE, and the calculated weight.

If the rsxitem represents a cnxpt containing attribute information for which an attribute property may be created for the type of the new txo, create a new attribute property for the new txo, setting the new property's TYPE, and a weight according to the calculated weight. Add a basis to the property with the rsxitem as a source, the 'TEMPORARY' value set to TRUE, and the calculated weight.

Procedure—CREATE Txo from Result Set

Use Case: Procedure—CREATE Txo from Result Set—Create txos from the rsxitems of a result set, attaching the occurrences to the target info-item intended to be formed or added to from the result set.

Utilize the result set to add non-cnxpts of the result set to become occurrences to an info-item. The target info-item is specified by the search, but is normally a cnxpt.

Set an overall weight value by default, by algorithm, or by user setting, to represent the strength of the user's conviction of the relevance of the result set to the target info-item.

If the rsxitem represents a txo for which an occurrence property may be created for the type of the target info-item, create a new temporary occurrence relationship between the txo and the target info-item with a weight as calculated above for relevance to the new txo. Set the new relationship's properties as follows: TEMPORARY INDICATOR (to TRUE), DELETE INDICATOR (to FALSE). Add a basis to the relationship with the rsxitem as a source, the 'TEMPORARY' value set to TRUE, and the calculated weight.

If the rsxitem represents a txo for which a txo property may be created for the type of the target info-item, create a new temporary txo property for the target info-item, and that the property's strength has relevance to the target info-item according to the calculated weight as set above. Set the new property's TYPE. Add a basis to the property with the rsxitem as a source, the 'TEMPORARY' value set to TRUE, and the calculated weight.

If the rsxitem represents a txo containing attribute information for which an attribute property may be created for the type of target info-item, create a new attribute property for the target info-item, setting the new attributes property's TYPE, and a weight according to the calculated weight. Add a basis to the attribute property with the rsxitem as a source, the 'TEMPORARY' value set to TRUE, and the calculated weight.

Procedure—IMPUTE Relationship immediately

Use Case: Procedure—IMPUTE Relationship immediately—Create a relationship immediately that would normally be created on an imputation basis for efficiency.

Local Positioning

User Changes Causing Repositioning

Where a user has made a change that, for that user, a fxxt must be reanalyzed, the execution of fxxt analysis will occur prior to visualization for the fxxt being visualized, and will encompass all such user changes for that user. The change application algorithm will be applied so as to be minimally invasive on the existing fxxt data.

Goal Positioning

Use Case: Calculate New Goal Position—User changes regarding a goal cause a repositioning of it, as calculated based upon categorization and other relationships.

Goal positioning occurs outside of the positioning algorithms for cnxpts. A goal is positioned based primarily upon its placement by a user (or a sharing user) on a fxxt based map, then by its user stated connectedness by fxxted associations with other ttxs as represented by cnxpts, then by its user stated relatedness by fxxted, infxtypxd, and/or scopxd associations with txos, then by its relevance as calculated from result set culling and otherwise entered or refined occurrences, then by its trxrts, and finally by its membership in purlieus. Each of these bases, along with the timeframe of the first and last change to the basis, the fxxt, and the scopx for the basis, are inputs to an algorithm for positioning the goal or its resultant ttx. The algorithm may be reapplied when changes to any of the bases occurs.

In one embodiment, the goal (and thus its avatar) is positioned only on the user's local system, although the goal info-item is entered into the CMMDB.

Positioning based upon the following are inputs to an algorithm for positioning the goal and thus the initial placement of its resultant cnxpt.

The timeframe of the first and last change to the basis, and the fxxt, are also inputs to each algorithm for positioning the goal so that if the goal is not changed, or if the goal would not appear on the displayed map, then no repositioning is needed.

Upon Placement or Repositioning on a Fxxt Based Map

Upon placement of a goal into a ttx category, as represented by a displayed cnxpt, by movement of the goal's avatar on the display, if there is a current temporary hierarchical association between the former encompassing category cnxpt and the goal, alter the category cnxpt to be the new category cnxpt. If there is not a current temporary hierarchical association, create a new temporary hierarchical association between the encompassing category cnxpt and the goal so that the goal is considered the child of the encompassing category cnxpt, setting the new relationship's properties as follows: TEMPORARY INDICATOR (to TRUE), DELETE INDICATOR (to FALSE). This is by far the most important positioning information for a goal.

Upon Changes in Properties, or Rsxitem Relevance as Calculated from Result Set Culling and Otherwise Entered or Refined Occurrences The following is structured for processing on the local system with decreased processing abilities and constrained retained CMM data (CMMDB is not at local system). Until processors and communication are more capable, it appears that a distributed approach is best.

In each of the following, invoke server processes to obtain a new world coordinate position for the goal. The new position will be calculated as often as is practical during updates by a user and communication of those changes to the central (or distributed) CMM. The changes to mark relevance of a document, or to view a document in the result set will cause an update at the central (or distributed) CMM. Additionally, changes to goal properties, association with trxrts or purlieus, changes of fxxt associations or scopx, or stating of similarities will each cause an update at the central (or distributed) CMM. At best, these changes will cause an immediate repositioning of the goal avatar on the local system.

Conflict Resolution in Goal Positioning

Use Case: Inform the User and Receive Guidance on Conflicts Goal Positioning—Give notice to user of conflicts found based upon changes made by user.

Conflicts can occur between the positioning within a category cnxpt by the user and other identity indicator derived positioning. Where this occurs, the user is asked whether the goal should be moved to a deeper categorization if indicated by the identity indicators, or whether the new category is better than the indicated category. The user's changes are then fed back into the positioning algorithms above.

Applying User Goal Positioning Changes

Use Case: Apply User Goal Positioning Changes—Change positioning, naming, or appearance of goals based upon changes made by user due to conflict resolution.

User goal positioning is applied locally, as rapidly as possible. The positioning is not applied within the CMM until it can be done efficiently. If other user's are following the user's goal, then the goal positioning is communicated from the goal owner to the following user from local system to local system, possibly indirectly.

Applying User Dxo Positioning Changes

Use Case: Apply User Changes—Change positioning, naming, or appearance of dxos based upon changes made by user.

Third Level for Process: Utilize Collective Consensus Through Vote Tallying

System Functions—Ontology Manipulation for Mapping—Utilize Collective Consensus

Determine Consensus

The mechanism for gaining consensus about the data within an ontology evaluates the various opinions submitted in specific ways. The mechanism also deals with the issues of 'what if', 'belief', 'assuredness, relevance, certitude, or conviction', and 'self-reliance'. For instance, with 'what if', the votes are used temporarily while the user settles on their 'belief.' For 'assuredness, certitude, or conviction', the user is stating that they are really more expert in their opinion than others, and this forcefulness, to a point, can be used to slightly affect the voting for some period of time. With 'self-reliance', the user accepts that their view of the world is different and yet they wish to retain it even if others vote against them.

Reaching consensus is still difficult in complex topical areas and a means of structuring and incentivizing the communication is missing. Delphi, as only a starting point, provides a basis for design of an appropriate technique and a mechanism for realizing structured communication among experts.

Security and privacy measure: this system provides an option for the inventors to put their CMMDB on a private system and maintain the level of privacy as desired by them. Inventors have the choice to keep their uploads of their tcepts limited to some particular groups, as well as to keep them hidden from public view to avoid forgery of ideas while under patent approval process.

In one embodiment, this system records conceptualization so that its contents can be kept as current as reasonably possible.

Calculating Consensus

Consensus is a result, at a point in time, of a wide number of factors taken into the CMM. It is inefficient for any given user to wait for an entire recalculation of the consensus to be completed, and inefficient overall to recalculate consensus in a single batch mode encompassing all CMM data. The calculations are completed upon various events and conditions to improve on those efficiencies. The best determination of the consensus is considered to be whatever is calculated as of the last calculation completed, rather than what an as yet incomplete calculation would provide at a point in time.

Principal types of algorithms provided for consensus determination are: 1) managing infrastructure data; 2) maintaining data that can be summarized or deleted; 3) using users' adjustments of the position of ttxs in the visualization to compute a matrix of relationship strengths, expanding the technique of "collaborative filtering"; 4) checking relevance rankings of rsxitems in queries defining ttxs and summarizing the occurrences of ttxs to add to the matrix of relationship strengths, generalizing the technique of "collaborative filtering"; 5) considering scopx and fxxts to improve the understanding of the relationships of the ttxs by combining basic organization paradigms; 6) determining the identity and the pairwise similarity of ttxs by one or more methods and summarizing, combining, or regrouping ttxs (permanent or temporary association updates).

These algorithms are presented below by the event or process where they predominantly are performed.

Use Case: Add up Votes Considering Relationship Weights—Calculate a weighted total and weighted average of relationship votes between two cnxpts for each scopx and each infxtypx, and label it as a summary association called 'BASIC VOTED' for that scopx and that infxtypx between those cnxpts.

Votes are used to determine positions of the cnxpts. In one embodiment, this process is carried out once initially on every cnxpt, and again when the attributes, txo properties, existence votes, interest displayed, occurrences, similarity statements, or associations of the cnxpt change, which is when a new vote is received for the cnxpt or its important relationships, or when the results of a query associated with the cnxpt, or the results in a result set associated with the cnxpt change. Adding, changing, or deleting a vote relationship 'dirties' the summary association for that relationship fxxt, scopx, and infxtypx, and these 'dirtied' summary associations are recalculated. This is done efficiently by utilizing timestamps.

The process to count votes begins with generation of occurrences and properties from the result sets, generation of commonality matrices for non-cnxpt similarities, citations, and applied heuristics. Additional relationships between cnxpts are generated based upon the commonalities found, and converting all occurrences to affinitive associations.

Data cleanup is continuous. Duplication is reduced by eliminating equivalent info-items.

Summarizations of properties and relationships are performed to reduce the inefficiencies of redundancies in storage and processing. Summarizations of certain properties and occurrence relationships become affinitive association summaries at a next level. Summarizations exist on three or more levels of a hierarchy of summaries, with the third level (votes, imputed relationships, Imputed Associations) being summarized into the second level (the 'BASIC VOTED' relationship) and finally the second into the first to provide a set of affinitive associations and hierarchies for each 'base' fxxt (fxxt actually specified on info-items).

Depending upon scopx and fxxt calculation step parameters and options, for each cnxpt pair where each cnxpt may be considered and which are related by an association, the weighted counts of relationships (votes) for each scopx and each infxtypx of relationship are collected into a 'BASIC VOTED' relationship for that scopx and that infxtypx of relationship for that cnxpt pair.

The weighted average will provide the significance as well as the 'winner' or 'best pick' for every relationship vote, resulting in Summary Associations. The calculation will have entailed factors such as expertise, 'correction precedence', problem consideration, statements by the user, research results, heuristics, search results, etc. The relationship weights will consider expertise levels of users entering the information and the source from which the information was imported.

Obtaining Summarized Hierarchical Relationships, Associations, and Hierarchical Tensors The set of hierarchical association summary items is generated in several steps, to result in relationships retained in [hierarchical association summaries] and [hierarchical tensors] (for txos, [hierarchical relationship summaries]). For each generated summary, the basis (heuristic identity and basis relationships), a timestamp is set to show when the generation occurred, and a 'DIRTIED' flag is reset to speed regeneration.

The steps in the following sections are required to prepare to generate summary hierarchical associations and hierarchical tensors.

Obtaining Summarized Affinitive Associations and Affinitive Tensors

The set of affinitive association summary items is generated in several steps, to result in relationships retained in [affinitive association summaries] and [affinitive tensors].

The following sections describe the steps required to prepare to generate the relationships needed for creating maps, including but not limited to associations, commonalities, summary associations, vote summaries, and tensors. For each generated summary or tensor, the basis (heuristic identity and basis relationships), a timestamp is set to show when the generation occurred, and a 'DIRTIED' flag is reset to speed regeneration.

Map Preparation

Use Case: Data Manipulation for Mapping—Manipulate and extract data from the CMMDB that provides a basis for map development.

The data in the CMMDB is raw data that is not easily displayed because it is N-dimensional Manipulation is required before the map can be created.

Periodically, the system will manipulate the data in the CMMDB to extract specific summaries and relevant ttx data that are properly within a map that a user could understand. This process results in one or more bundles of information (called clumps here) that may be translated into a map easily.

Continuous Processing

The organization of data in the CMMDB is a continual process. Each user may assist in the effort by stating that a change is in order in the data, but those immediate effects may each spur major changes in the map, so batching is necessary for efficient operation.

The continuous processing algorithm provides a functional basis for adding 'plug-in' algorithms to provide general operation. Each 'plug-in' will be invoked sufficiently to perform as constrained by the processing power of the computers on which the function is invoked.

Data Cleanup

Use Case: Perform Data Cleanup—Remove data by deletion and merger.

Remove redundant data by merging info-items and relationships where possible and where important data is not lost. Data Cleanup is an ongoing process, performed whenever processor power is available and cleanup is appropriate because of efficiency degradation, and without regard to the processing status of other Data Manipulation processes.

Merge Irxts with Same Locator

Use Case: Merge Irxts with Same Locator—Merge irxts which are duplicative.

Irxts each holding the same locator to an external source should be considered to represent the same resource and be merged, so long as the locators are not merely active page locators which will normally generate different content each time they are used. In the interim, an Irxt Commonality Relationship is created between the irxts.

Manage Deletion Requests

Use Case: Manage Deletion Requests—Delete info-items which were subjects of delete requests and where the requests have survived for a set period, and where no reason is seen to retain the info-item.

Perform Ontology Reduction by Topic De-Emphasis and Entropy

Use Case: Perform Ontology Reduction by Topic De-emphasis and Entropy—Remove or suppress questionable txos, cnxpts, and relationships.

Depending upon scopx and fxxt calculation step parameters and options, remove (suppress consideration) of cnxpts and txos whose existence vote tally suggests that they should not exist.

Depending upon scopx and fxxt calculation step parameters and options, remove (suppress consideration) of 'summary relationships' whose existence vote tally suggests that the relationship between the endpoint cnxpts or txos should not exist.

Txo Reduction by Equivalences

Calculate Basic Merging

Any change to the CMM that causes two info-items to become equal to each other, for all non-null properties other than names, in all fxxts and scopxs, shall be followed by the merging of those two info-items according to the rules given below for the type of info-item to which the two equal info-items belong.

Merge/Coalesce Tpxs

Use Case: Merge/Coalesce System Infrastructure Tpxs—Merge txos other than cnxpts (i.e., for merging infrastructure txos only).

The procedure for merging two txos A and B is given below. It is an error if A and B both have non-null valued attributes or txo properties other than name which are different.

1. Txo Elimination Method
2. Freeze B.
3. Perform Merge/Coalesce Info-item Name Variants procedure for txo B.
4. Perform Merge/Coalesce Info-item Names procedure for txo B.
5. Perform Merge/Coalesce Info-item Description Variants procedure for txo B.
6. Perform Merge/Coalesce Info-item Description procedure for txo B.
7. Replace B by A wherever B appears in any relationship, including but not limited to associations with, occurrences of, or memberships in.
8. Replace B by A wherever it appears as a property or characteristic of an info-item.
9. Set A's names property to the union of the values of A and B's names properties.
10. Perform Merge/Coalesce Info-item Name Variants procedure for txo A.
11. Perform Merge/Coalesce Info-item Names procedure for txo A.
12. Perform Merge/Coalesce Info-item Description Variants procedure for txo A.
13. Perform Merge/Coalesce Info-item Description procedure for txo A.
14. Set A's occurrences property to the union of the values of A and B's occurrences properties. Here, this results in the replacement of B, on an endpoint of each occurrence relationship it is on, with A.
15. Set A's hierarchical associations property to the union of the values of A and B's hierarchical associations properties. Here, this results in the replacement of B, on an endpoint of each hierarchical associations relationship it is on, with A.
16. Set A's merged info-item identifiers property to the union of the values of the merged info-item identifiers properties of A and B, and the info-item item identifier of B.
17. Set A's access control list entries to the union of the values of the access control list entries of A and B.
18. Set A's alteration audit trail entries to the union of the values of the alteration audit trail entries of A and B.
19. In one embodiment, fill a property of B to state that it is replaced by A. In one embodiment, archive B. In one embodiment, delete B from CMM.

Merging Name Items

Use Case: Merge/Coalesce Txo Info-item Names—Merge info-item names.

Use Case: Merge/Coalesce Txo Info-item Descriptions—Merge info-item descriptions.

The procedure for merging two txo name (or, alternatively, description) items A and B having the same value, scopx (if any), fxxt (if any), and type properties is:

1. Create a new txo name item C.
2. Set C's value property to the value of the value property of A.
3. Set C's type property to the value of the type property of A, if any.
4. Set C's scopx property to the value of the scopx property of A, if any.
5. Set C's fxxt properties to the value of the fxxt properties of A, if any.
6. Set C's variants property to the union of the values of the variants properties of A and B.
7. Remove A and B from the txo names (or, alternatively, description) property of the txo in their parent properties, and add C.
8. In one embodiment, fill a property of B to state that it is replaced by C. In one embodiment, archive B. In one embodiment, delete B from CMM.
9. In one embodiment, fill a property of A to state that it is replaced by C. In one embodiment, archive A. In one embodiment, delete A from CMM.

Merging Variant Items

Use Case: Merge/Coalesce Txo Info-item Name Variants—Merge info-item name variants.

Use Case: Merge/Coalesce Txo Info-item Description Variants—Merge info-item description variants.

The procedure for merging two variant items A and B having the same value, scopx, fxxt (if any), datatype, and fxxt properties is:

1. Create a new variant item, C.
2. For each attribute in A:
3. Set C's value property to the value of A's value property.
4. Set C's datatype property to the value of A's datatype property.
5. Set C's scopx property to the value of A's scopx property, if any.
6. Set C's fxxt properties to the value of A's fxxt properties, if any.
7. Remove A and B from the variants property of the name object in their parent properties, and add C.
8. In one embodiment, fill a property of B to state that it is replaced by C. In one embodiment, archive B. In one embodiment, delete B from CMM.
9. In one embodiment, fill a property of A to state that it is replaced by C. In one embodiment, archive A. In one embodiment, delete A from CMM.

Merge/Coalesce Non-Cnxpt Info-Items

Merge info-items other than cnxpts. Many such info-items are specializations of txos, and the merger process is similar to the txo elimination method txo merger procedure.

Merging Purlieu

Use Case: Merge/Coalesce Purlieus—Merge purxpt info-items.

Follow the txo elimination method, above, for the purxpt info-items.

Merging Cncpttrrts

Use Case: Merge/Coalesce Cncpttrrts—Merge trxrt info-items.

Follow the txo elimination method for the trxrt info-items.

Merging Scopxs

Use Case: Merge/Coalesce Scopxs—Merge scopx info-items.

Follow the txo elimination method for the scopx info-items.

Merging Fxxts

Use Case: Merge/Coalesce Fxxts—Merge fxxt info-items.

Follow the txo elimination method for the fxxt info-items.

Merging Information Resources,

Use Case: Merge/Coalesce Information Resources—Merge information resource info-items.

Follow the txo elimination method for the information resource info-items.

The procedure for merging two txos A and B is given below. It is an error if A and B both have non-null valued properties other than name which are different.

Relationship Reduction

Execute Cncpttrrt Reduction by Equivalences

Use Case: Execute Cncpttrrt Reduction by Equivalences.

Merging Occurrence items

Use Case: Merging Occurrence items.

The procedure for merging two occurrence items A and B having the same value, fxxt (if any), scopx, and type properties is:

(In the following, B's value, scopx, fxxt, type, role, and datatype (if present) properties are equal to that of A and need not be taken into account.)

1. Create a new occurrence item, C.
2. Set C's value property to the value of A's value property.
3. Set C's scopx property to the value of A's scopx property.
4. Set C's type property to the value of A's type property.
5. Set C's fxxt properties to the value of A's fxxt properties.
6. Set C's role properties to the value of A's role properties.
7. Set C's weight property to the result of an algorithm which uses as inputs the values of A's and B's weight properties, the algorithm being chosen based upon the type property of occurrence A.
8. Remove A and B from the occurrences property of the txo (must be the same txo) in their parent properties, and add C.
   1. Set C's merged info-item identifiers property to the union of the values of the merged info-item identifiers properties of A and B, and the info-item item identifiers of A and B.
   2. In one embodiment, fill a property of B to state that it is replaced by C. In one embodiment, archive B. In one embodiment, delete B from CMM.
   3. In one embodiment, fill a property of A to state that it is replaced by C. In one embodiment, archive A. In one embodiment, delete A from CMM.

Ttx Reduction by Equivalences

Merge/Coalesce Ttxs

Use Case: Merge/Coalesce Ttxs—Merge cnxpts.

Merging Cnxpts—Node Combination Method

Any change to the CMM that causes two cnxpt info-items to become highly similar (not equal to each other due to existence of one or more properties having different values, but equal properties for nearly all non-null properties other than names, in all fxxts and scopxs) shall be followed by the linking of those two cnxpt info-items according to the rules given below.

1. Create a new cnxpt C.
2. Assign attribute properties to C wherever A and B each have the same property in the same scopx and fxxt.
3. Set C's names property to the intersection of the values of A and B's names properties, removing those names from A and B.
4. Set C's merged info-item identifiers property to the union of the values of the merged info-item identifiers properties of A and B, and the info-item item identifiers of A and B.
5. Depending upon the setting of a system operation parameter, either:
   1. Set C's queries property to the intersection of the values of A's and B's queries properties, removing those queries from A and B; (same as setting all queries for A to C where the same query is connected to B.). Set all result set entries for A or B to C where the result set is attached to a query moved to C. Or,
   2. Set C's query entries to the union of the values of the query entries of A and B (Set all queries for A to C, and all queries for B to C.) Set all result set entries for A or B to C where the result set is attached to a query moved to C.
6. Depending upon the setting of a system operation parameter, either:
   1. For all rsxitems in result sets whose identifiers exist in A's result sets where the result set is not associated with a query, and all rsxitems in result sets whose identifiers exist in B's result sets where the result set is not associated with a query, move the rsxitem identifiers to a new result set and place the new result set's identifier in C's result sets. For any rsxitem referencing the same 'result' item as any other rsxitem (an rsxitem that would be duplicated), add the weights of the rsxitems and add only one such rsxitem to the new result set. Or, 2. For all rsxitems in result sets whose identifiers exist in A's result sets where the result set is not associated with a query, and all rsxitems in result sets whose identifiers exist in B's result sets where the result set is not associated with a query, move the rsxitem identifiers to a new result set and place the new result set's identifier in C's result sets. Even if an rsxitem referencing the same 'result' item is found in both A and B, include both into C without combination.

7. Depending upon the setting of a system operation parameter, either:
   1. Set C's occurrences property to the intersection of the non-summary occurrence identifiers of A's and B's occurrences properties, removing those non-summary occurrences from A and B; (same as setting all non-summary occurrences for A to C where the same occurrence is connected to B.). Or,
   2. Set C's occurrence entries to the union of the non-summary occurrence identifiers of the occurrence entries of A and B (Change all non-summary occurrences for A to C, and all non-summary occurrences for B to C.)
8. Re-summarize the occurrences of C to create summary occurrence entries.
9. Depending upon the setting of a system operation parameter, either:
   1. Set C's affinitive associations property to the intersection of the non-summary affinitive association identifiers of A's and B's affinitive associations properties, removing those non-summary affinitive associations from A and B; (same as setting all non-summary affinitive associations for A to C where the same affinitive association is connected to B.). Or,
   2. Set C's affinitive association entries to the union of the non-summary affinitive association identifiers of the affinitive association entries of A and B (Change all non-summary affinitive associations for A to C, and all non-summary affinitive associations for B to C.)
10. Re-summarize the affinitive associations of C to create summary affinitive association entries.
11. Depending upon the setting of a system operation parameter, either:
   1. Set C's hierarchical associations property to the intersection of the non-summary hierarchical association identifiers of A's and B's hierarchical associations properties, removing those non-summary hierarchical associations from A and B; (same as setting all non-summary hierarchical associations for A to C where the same hierarchical association is connected to B.). Or,
   2. Set C's hierarchical association entries to the union of the non-summary hierarchical association identifiers of the hierarchical association entries of A and B (Change all non-summary hierarchical associations for A to C, and all non-summary hierarchical associations for B to C.)
12. Re-summarize the hierarchical associations of C to create summary hierarchical association entries.
13. In one embodiment, create an association property of A to state that it is a sub-technology of C, and re-summarize the occurrences, affinitive associations, and hierarchical associations of A to create summary entries.
14. In one embodiment, create an association property of B to state that it is a sub-technology of C, and re-summarize the occurrences, affinitive associations, and hierarchical associations of B to create summary entries.
15. Set C's existence vote entries to the union of the values of the existence vote entries of A and B.
16. Set C's alteration vote entries to the union of the values of the alteration vote entries of A and B.
17. Set C's interest vote entries to the union of the values of the interest vote entries of A and B.
18. Set C's attribute summary entries to the merger and re-summarization of the values of the attribute summary entries of A and B.
19. Set C's txo properties summary entries to the merger and re-summarization of the values of the txo properties summary entries of A and B.
20. Set C's existence summary entries to the merger and re-summarization of the values of the existence summary entries of A and B.
21. Set C's interest summary entries to the merger and re-summarization of the values of the interest summary entries of A and B.
22. Set C's fxxt summary entries to the merger and re-summarization of the values of the fxxt summary entries of A and B.
23. Recompute A, B, and C's affinitive tensors entries.
24. Recompute A, B, and C's hierarchical tensors entries.
25. Set C's access control list entries to the union of the values of the access control list entries of A and B.
26. Set C's avatar entry to the value of A's avatar entry unless that entry is null, in which case set it to B's avatar entry.
27. Set C's audit trail entries to the union of the values of the audit trail entries of A and B.
28. If A has no attribute or txo properties distinct from C, in any scopx or fxxt, no remaining associations, occurrences, result set entries, names, identifiers, or locators, then in one embodiment, fill a property of A to state that it is replaced by C, then in one embodiment, archive A, then, in one embodiment, delete A from the CMM.
29. If B has no attribute or txo properties distinct from C, in any scopx or fxxt, no remaining associations, occurrences, result set entries, names, identifiers, or locators, then in one embodiment, fill a property of B to state that it is replaced by C, then in one embodiment, archive B, then, in one embodiment, delete B from the CMM.
30. Recompute C's position and size.
31. Recompute A's position and size if A exists.
32. Recompute B's position and size if B exists.

Relationship Reduction by Equivalences

Relationship Summarization

Use Case: Relationship Summarization—Perform continuous improvement by summarizing relationships to improve query expansion and to reduce result set sizes.

User entered relationships are used to provide more flexible retrieval for queries incorporating the related ttxs.

Merging Association or Occurrence Info-Items

The procedure for merging two association or occurrence info-items X and Y is given below.

(In the following, Y's value, scopx, fxxt, type (infxtypx), roles, and (if present) source, heuristic, creator, and datatype properties are equal to that of X and need not be taken into account.) Merging association or occurrence info-items is largely a matter of combining weights for otherwise equivalent relationships.

1. Set X's new weight property to the result of an algorithm which uses as inputs the values of X's and Y's weight properties, the algorithm being chosen based upon the type property of association or occurrence info-item X.
2. Remove Y from the association (or occurrence) property of the txo (must be the same txo as for X) in their parent properties.
3. Set X's merged info-item identifiers property to the union of the values of the merged info-item identifiers properties of X and Y, and the info-item item identifiers of X and Y.
4. In one embodiment, fill a property of Y to state that it is replaced by X. In one embodiment, archive Y. In one embodiment, delete Y from the CMM.

Merging Association or Occurrence Role Items

In some relationships or occurrences, multiple info-items may hold the same role. (Here, A and B indicate info-items holding a specific role in the X and Y relationship, respectively.) For only those types of relationships, the procedure for merging two otherwise 'similar' (where X's scopx, fxxt, type (infxtypx), other roles (those not where B and A are holding the same role in the respective relationships), and (if present) source, heuristic, creator, and datatype properties are equal to that of Y's) relationships X and Y is given below.

1. Set X's weight property to the result of an algorithm which uses as inputs the values of X's and Y's weight properties, the algorithm being chosen based upon the type property of relationship X and the role type held by A or B.
2. Set X's merged info-item identifiers property to the union of the values of the merged info-item identifiers properties of X and Y, and the info-item item identifiers of Y.
3. Add B to the roles property of the proper type (where A already exists) in the X relationship.
4. In one embodiment, fill a property of Y to state that it is replaced by X. In one embodiment, archive Y. In one embodiment, delete Y from the CMM.

Perform Occurrence Reduction

Use Case: Perform Occurrence Reduction—Remove occurrences from cnxpts where they are unnecessary, as established by a system parameter.

In one embodiment, if for all scopxs and fxxts, an occurrence is on a category and on all members of the category, then it can be deleted from all of the members.

In one embodiment, if for all scopxs and fxxts, an occurrence is on a category and on all members of the category, then it can be deleted from the category.

In one embodiment, if for all scopxs and fxxts, an occurrence is on a category and on all members of the category, then it cannot be deleted from the category or any of its members.

Manage Interest Data

Use Case: Manage Interest Data—Delete interest data where appropriate.

Manage 'Junk' Data

Use Case: Manage 'Junk' Data—Delete data which has become inconsistent or is editorially inappropriate.

Manage Commonality Relationship Matrices

Use Case: Manage Commonality Relationship Matrices—Delete unneeded columns and rows from commonality relationship matrices.

Relationship Purification

Use Case: Relationship Purification—Improve relationships over time so that portions of the Terminological Ontology resolves to an Axiomatized ontology so as to improve authoritativeness of the ontology.

Ttx Merger Algorithm for Summarizing Equivalent Ttx to a Single Representative

This algorithm marks a single cnxpt as the representative of each equivalence set of ttxs based upon one or more of a number of factors. Each of the cnxpts representing the ttxs in any equivalence set must be of the same set of cnxpt types (NT).

Equivalence Generation—All Identity Indicators in Common Test

If two cnxpts have all of their identity indicators in common, then the cnxpts may be considered to represent the same ttx, with a weighting appropriate to the identity indicator.

Where all properties, names, descriptions, relationships, associations, and occurrences of any two cnxpts are equivalent (to within a specific low degree of 'fuzziness'), then combine the cnxpts as is done for merging txos.

Equivalence Generation—All irxts related by occurrences to a temporary cnxpt match a subset of the irxts related to a non-temporary cnxpt If a new cnxpt has all of its irxt occurrences matching an existing cnxpt, then the new cnxpt has no value and should be merged with the existing cnxpt, and all relationships should be moved to the existing cnxpt, combining the cnxpts as is done for merging txos.

New Category Generation and Category Relation Generation from Result Set

Use Case: New Category Generation and Category Relation Generation From Result Set—Create new cnxpts from information resource lists.

Build specialized category cnxpts from semantic or other relationships between documents based upon document content or document metadata. The cnxpts will be unnamed initially, and will be described by some textual result of the analysis algorithm. Cluster and cross citation analytics, among others, are used to provide tuned analysis of different types of documents. Automated algorithms periodically search the information resources in the underlying database, noting connections between information resources that have similar or related content.

After the entry of new Crawl Result or data set batches of citation rich documentation, additional backend processing is initiated to find new categories of ttxs to become represented by new cnxpts based upon clustering, cross citation, and other analysis techniques. Classification relationships are entered as relationships between the generated categories represented by the new cnxpts and the cnxpts in the clusters.

Clustering for Categorization Generation

Use Case: Generate Cnxpt Categorizations and Relationships by Clustering.

All Crawl Result or data set batches of information resources are cataloged by a source. If not already defined, create a source info-item for the source of the information, setting its authority, usability, quality, expertise, etc. [See Procedure—CREATE Source]. Batches of information resources may also be cataloged by a fxxt. If not already defined, create a fxxt info-item for the clustering process, setting its authority, usability, quality, expertise, etc. and adding a source relationship to the source info-item above. [See Procedure—CREATE FXXT]

Set an overall weight value by default, by algorithm, or by user setting, to represent the strength of the user's conviction of the reliability of the clustering algorithm. For each info-item generated by the clustering, assign a weight for the info-item properties or relationships as any weight given by the algorithm (or a default), as adjusted by this overall weight.

Irxts are generated to represent each information resource, receiving the source and fxxt, as well as a creator property. If an irxt is not in the CMM for any information resource, then create an irxt for the information resource. [See Procedure—CREATE Irxt] The original material will be hyperlinked from the new irxt by a locator. Author names will be added as attributes. Dates of publishing will be added as attributes. All citations within the information resources will be added as [RAW REFERENCE] properties of the irxt representing the information resource, unless the referenced information resource is also represented by an irxt, in which case citation relationships will be created for the citing-cited irxt pair.

Technical research material may be catalogued into the ontology by clustering. The clustering analysis (cross-citation or other technique) finds ttxs formed by definition by the clusters found within the technical material, and these ttxs are then represented by txpts. Those clusters from other material may be represented by cnxpts. Occurrence relationships are then created between the cnxpts or txpts formed for the clusters and the irxts representing information resources. (This may appear to cause unnecessary duplication where the irxt is already an occurrence of a cnxpt or txpt which are within categories encompassed by the cnxpts or txpts representing the clusters, but this duplication may be removed later or may serve to provide better categorization.)

A clustering algorithm (cross citation analysis, etc.) will be executed on a set of irxts listed as rsxitems in a result set. The result of the algorithm is a set of new cnxpts which were not previously existing in the CMM. The algorithms all generate new cnxpts as needed and add to those cnxpts any information found by the clustering as a result set attached as the primary result set for the cnxpt, usually setting the fxxt of the cnxpt. The algorithms will all be structured to not regenerate a cnxpt already existing, but to add to those cnxpts any information found by the clustering as secondary result set attached to the cnxpt, unless that information already existed in another result set or the cnxpt was locked.

If needed, create a cnxpt for the ttx which is defined by the cluster, adding a source relationship to the clustering source info-item and marking its fxxt with the clustering fxxt info-item. If the clustering algorithm or user defines other information regarding the cluster ttxs, such as fxxt, names (or name algorithms), descriptions (or description algorithms), etc., add the information as characteristics to the cnxpt. If other names or descriptions are not available, utilize irxt descriptions and the rationale from the clustering algorithm to create a name and description for the cnxpt. [See Procedure—CREATE Cnxpt]

Create a subject identifier occurrence relationship between the cluster cnxpt and the irxt(s) representing information resources defining the cluster ttx represented by the cnxpt, marking them with the clustering source, with the clustering fxxt or fxxts and as being within all, one, or more stated scopxs. [See Procedure—CREATE Occurrence to irxt] A restriction applies so as not to create ttx citation associations or cnxpt name reference citation associations from the clustering source description document itself (for instance, the list of information resources or irxts to be included in the clustering analysis) to other cnxpts in the system: no ttx citation associations or cnxpt name reference citation associations based upon the contents of the clustering description information resource will be created as a byproduct of creating the subject identifier occurrence relationship.

If the clustering algorithm generates sub-clusterings, then create hierarchical categorization relationships between the parent and child clusters as needed, adding a source relationship to the clustering source info-item and marking its fxxt with the clustering fxxt info-item (depending upon the analytic, more than one fxxt may be marked, and different generated cnxpts may have different fxxts). [See Procedure—CREATE custom hierarchical association] In one embodiment, create a new "custom affinitive association" between each set of cnxpts appearing in the cluster as siblings, marking the relationship with a high weight, with the new clustering fxxt, and within all, one, or more stated scopxs. [See Procedure—CREATE custom affinitive association]

Procedure Clustering Algorithm with Citation Relationship Building (Result Set)

```
For Each Information Resource:
For each reference detected in an information resource or
  its metadata to another information resource:
  generate citation relationship between irxt info-items;
  set citation relationship properties to indicate the char-
    acteristics of found citation reference to indicate its
    source and the likely quality level of the citation
    reference according to Procedure—CREATE Infor-
    mation Resource Citation Relationship, Procedure—
    CREATE Direct Information Resource Citation
    Relationship, Procedure—CREATE Direct Informa-
    tion Resource Name Reference Citation;
end for;
end for;
Execute Clustering/Mining Analytic tool on Result Set
rsxitems;
For each cluster of one or more irxts found not already
represented by a cnxpt:
Create a temporary cnxpt info-item to represent the clus-
  ter to represent the ttx that might be explained by the
  information resources represented by irxts in the clus-
  ter;
Fill that temporary cnxpt's properties based on informa-
  tion from the Clustering/Mining Analytic according to
  the analytic;
end for;
For each cluster of one or more irxts:
For each irxt in the cluster but not in any parent cluster:
  generate an occurrence to the irxt to the temporary
    cnxpt for the cluster;
End for;
For each sub-cluster in a cluster:
  Generate a hierarchical association of type describing
    the mining analytic between the sub-cluster tempo-
    rary cnxpt and the temporary cnxpt representing its
    parent cluster;
End for;
For each pair of sub-clusters in a cluster:
  Generate one affinitive association between the tempo-
    rary cnxpts representing the sibling sub-clusters;
End for;
End for;
For each irxt to irxt relationship formed above where the
irxts are related by an ordered relationship:
```

If the same cnxpt is related to each of the two irxts by occurrence, form a new cnxpt and move the occurrence of the 'referencing' irxt to the new 'child' cnxpt;

If the cnxpts related to each of the two irxts by occurrence are different, form a hierarchical association between the cnxpts so that cnxpt with the occurrence to the 'referencing' irxt becomes the new 'child' cnxpt of the new association;

End for;

For each temporary cnxpt remaining:

Merging temporary cnxpt into already existing cnxpts according to Ttx Merger Algorithm for Summarizing Equivalent Ttx to a Single Representative if possible;

Determine a quality for the temporary cnxpt, and delete it if the quality level is too low.

End For;

For each temporary cnxpt remaining:

Place the temporary cnxpt onto a work queue to have a name and description added. Order the queue by quality level (Any temporary cnxpt given a name will be converted to a permanent cnxpt.)

End For;

End Procedure;

Execute Document Clustering Analytic

Use Case: Execute Document Clustering Analytic—Build relationships between irxts representing documents, associations between cnxpts representing document groupings, and occurrences between the irxts and the cnxpts from Document Clustering analysis.

Execute Document Cross-Citation Analytic

Use Case: Execute Document Cross-Citation Analytic—Build relationships between irxts representing documents, associations between cnxpts representing document groupings, and occurrences between the irxts and the cnxpts from Cross-Citation analysis.

Result Set Conversion to Properties, Occurrences, and Categorizations

Use Case: Result Set Conversion to Properties, Occurrences, and Categorizations—Create weighted properties, occurrences, citations, and relationships from relevance data.

Process a result set by performing the processes in one of the following, depending upon the type of query the result set is defined by. If the result set is not attached to a query, process the result set as children of the cnxpt.

Procedure—PROCESS a Result Set as PARENTS for Cnxpt

Procedure—PROCESS a Result Set as SIBLINGS for Cnxpt

Procedure—PROCESS a Result Set as CHILDREN for Cnxpt

For each generated relationship, the basis (heuristic identity and basis relationships), a timestamp is set to show when the generation occurred, and a 'DIRTIED' flag is reset to speed regeneration.

Keyword Index Relationship

Use Case: Generate Keyword Relationships and Thesauri—User changes regarding the keyword index are summarized into different thesaurus matrices for each scopx.

Over time, a thesaurus is collected and refined to provide a basis for the semantic comparison and matching of the text in documents and phrases in queries. The thesaurus is held in specialized relationships and organized into matrices. The thesaurus matrices are later summarized into keyword commonality relationships.

Calculate the scopx based summaries between two keywords of the same scopx, and generate a weight for the relationship in the commonality relationship data structure. Specific criteria for weights, include but are not limited to:

Keywords and keyword phrases having user set or imported 'meaning equivalence', 'synonym', or 'antonym' are assigned a high weight multiplied by the summary of all such keyword meaning equivalence related votes.

Relationships on keywords and keyword phrases set or imported stating lexical variants.

Relationships on keywords and keyword phrases set or imported stating quasi-synonyms.

Relationships on keywords and keyword phrases set or imported stating synonymy.

Relationships on keywords and keyword phrases set or imported stating upward (generic) postings.

Relationships on keywords and keyword phrases set or imported stating terms belonging to the same category, such as siblings or frequently interchangeable/near synonyms Relationships on keywords and keyword phrases set or imported stating another relationship such as 'meaning connection', 'meaning overlap', 'distinguished from', 'conjuncted terms', 'dependency/requires', 'spatial and temporal connections', 'partitive' (taken broadly), 'constituent parts', 'aggregate group', or 'property/attribute'.

In one embodiment, perform additional calculations based upon phrases of a specific scopx. Specific criteria for weights, include but are not limited to:

keyword phrases within a scopx having semantically similar descriptions within a scopx are assigned a high weight.

keyword phrases within a scopx having the same words in different orders are assigned a medium weight.

keyword phrases within a scopx having semantic similarities and no description should be considered to represent nearly the same meaning and are assigned a low weight.

keyword phrases within a scopx having a text string (regular expressions used) in common in their descriptions are assigned a low weight.

keyword phrases within a scopx having been used in queries and found interrelated by commonality of relevance, within a scopx, because of commonality of relevant rsxitems representing irxts are assigned a low weight.

Generate Commonality Relationships

Use Case: Generate Commonality Relationships—Create weighted internal format relationships between info-items which will be the basis for later generation of nexus affinitive association, cnxpt citation, or other associations between cnxpts.

Commonalities exist where two non-cnxpt txos have a relationship or are similar in a way that it would be relevant to a later comparison, identification, or differentiation of cnxpts to which the txos are related. Commonalities are built between non-cnxpt txos as a basis for later generation of cnxpt affinitive and hierarchical associations. The number of commonality relationship structures is an implementation issue based upon efficiency. One or more of these algorithms may result in a single commonality relationship structure.

Commonality relationships are generated by heuristic algorithms that are plugged into the continuous processing backbone. The algorithms are described here and below.

Fxxt Specification Based Commonality Relationships

Use Case: Generate Fxxt Specification Based Commonality Relationships.

Calculate the commonalities required as specified in a Fxxt Calculation Step. Any of the following types of commonalities may be called for by a fxxt calculation step, and a fxxt calculation step may also specify a custom commonality based upon a wide variety of criteria. (Note that, for implementation, these calculations may not be performed redundantly, but rather segmented or marked by a fxxt after the commonality is found without regard to fxxt.)

Commonality relationships are based upon, including but not limited to, the following relationships (as grouped into groupings including but not limited to:).

Irxt to irxt—Irxt Affinitive Commonality Relationships

Use Case: Generate Irxt to irxt—Irxt Affinitive Commonality Relationships.

Calculate the commonalities between two irxts, and generate a weight for the relationship in the Irxt Affinitive Commonality relationship data structure. Specific criteria for weights, include but are not limited to:

- Irxt Similarity Affinitive Relationship exists—Average stated weights and compound to give a high effective weight in calculating the commonality.
- Irxt Affinitive Commonality Relationship—Same Locator are given very high weights (and should be merged), so long as the locators are not merely active page locators which will normally generate different content each time they are used. For those information resources with links to active pages and without exactly the same parameters, an Irxt Commonality Relationship is created between the irxts stating the similarity and assigned a low weight depending upon the number of matching parameters.
- Irxt Reference Affinitive Commonality Relationship exists—Where two irxts each represent an information resource (other than the same information resource) that contain references to the same cited document, create an Affinitive Commonality relationship with a weight multiplied by the number of such references in common from the two irxts and compounded to give a high effective weight in calculating the commonality where a high percentage of the total references in both irxts, taken as a set, are in common.
- Irxt Affinitive Commonality Relationship—same 'Author' should be given medium weights.
- Irxt Affinitive Commonality Relationship—same 'Assignee Company' are given low weights.
- Irxt Affinitive Commonality Relationship—same 'Inventor of a Technology' are given medium weights.
- Irxt Affinitive Commonality Relationship—Very Similar Content such that the two irxts essentially refer to the same content (other than a lack of any content or minor changes), are given high weights.
- Irxt Affinitive Commonality Relationship—Semantically Similar Content such that the two irxts essentially refer to almost the same content, are assigned a medium weight.
- Irxt Affinitive Commonality Relationship—Semantically Similar Description such that the two irxts essentially refer to almost the same content, are assigned a medium weight.
- Irxt Affinitive Commonality Relationship—Same Name such that the two irxts share the same specific name and no description, should be considered to represent similar resources in meaning only, are assigned a medium weight.

- Irxt Affinitive Commonality Relationship—Similar Name such that if two irxts have semantically equivalent names and no description, are assigned a low weight.
- Irxt Affinitive Commonality Relationship—Common Text String such that the represented information resources have a text string (regular expressions used) in common in their descriptions, are assigned a low weight.

Irxt to irxt—Irxt Hierarchical Commonality Relationships

Use Case: Generate Irxt to irxt—Irxt Hierarchical Commonality Relationships.

Calculate the precedence between two irxts, and generate a weight for the relationship in the Irxt Hierarchical Commonality relationship data structure. Specific criteria for weights, include but are not limited to:

- Irxt Similarity Hierarchical Relationship exists—Average stated weights and compound to give a high effective weight in calculating the strength of the precedence.
- Irxt Hierarchical Commonality Relationship—irxt representing an issued patent having a date of invention (priority date) prior to another issued patent represented by a second irxt should be given medium weights.

Patent to Prior Art—Intellectual Property commonality relationships

Use Case: Generate Patent to Prior Art—Intellectual Property Commonality relationships.

Calculate the precedence between two products, and generate a weight for the relationship in the Patent Novelty Hierarchical Commonality relationship data structure. Specific criteria for weights, include but are not limited to:

- A Patent Novelty Irxt Similarity Hierarchical Relationship exists stating that a patent application represented by one irxt is a novelty successor of a patent or prior art represented by a second irxt—Average the stated weights and compound by expertise to give a high effective weight in calculating the strength of the precedence.
- A Patent Obviousness Irxt Similarity Hierarchical Relationship exists stating that a patent application represented by one irxt is an obviousness successor of a patent or prior art represented by a second irxt—Average the stated weights and compound by expertise to give a high effective weight in calculating the strength of the precedence.

Purxpt to Purxpt—Purlieu Affinitive Commonality Relationships

Use Case: Generate Purxpt to purxpt—Purlieu Affinitive Commonality relationships.

Calculate the commonalities between two purlieus, and generate a weight for the relationship in the commonality relationship data structure. Specific criteria for weights, include but are not limited to:

- Purlieu Similarity Affinitive Relationship exists—Average stated weights and compound to give a high effective weight in calculating the commonality.
- Purlieu Concurrency Commonality Relationship—purxpts each referring to the same effective timeframe should be given high weights.
- Purlieu Grouping Commonality Relationship—purxpts each referring to the same effective grouping should be given high weights.

Purxpt to purxpt—Purlieu Hierarchical Commonality Relationships

Use Case: Generate Purxpt to purxpt—Purlieu Hierarchical Commonality Relationships.

Calculate the precedence between two Purlieus, and generate a weight for the relationship in the Purlieu Hierarchical Commonality relationship data structure. Specific criteria for weights, include but are not limited to:

- Purlieu Similarity Hierarchical Relationship exists—Average stated weights and compound to give a high effective weight in calculating the strength of the precedence.
- Purlieu Temporal Hierarchical Relationship exists—Assign weights to give a strength of precedence based upon timeframe differentials and orderings.
- Purlieu Hierarchical Commonality Relationship—Where a purxpt representing a grouping that encompasses another purlieu or a period that comes or occurred prior to another purlieu, or other purlieu precedence should be given medium weights.

Trxrt to Trxrt—Cncpttrrt Commonality Relationships

Use Case: Generate Trxrt to trxrt—cncpttrrt commonality relationships.

Use Case: Execute Trait Matching By Semantic Distance Calculation—Match cncpttrrts to assess similarity by semantic content.

Use Case: Execute Trait Matching By Consensus—Match cncpttrrts to assess similarity by counting similarity votes.

Use Case: Execute Trait Matching By Conformance to Science—Match cncpttrrts to assess conformance of a technology's design, implementation, or possible implementation to a TPL by counting votes regarding the conformance and by analyzing conformance to older TPL understandings compared to new TPL understandings (modern science).

Calculate the commonalities between two cncpttrrts, and generate a weight for the relationship in the commonality relationship data structure. Specific criteria for weights, include but are not limited to:

- Cncpttrrts Similarity Affinitive Relationship exists—Average stated weights and compound to give a high effective weight in calculating the commonality.

Cncpttrrts each referring to the same effective trait should be given high weights. Cncpttrrts each having the same name (other than a lack of a name or a null name) should be given high weights if in the same scopx, and medium weights if not. Cncpttrrts each having semantically similar descriptions (other than a lack of a description or a null description), should be given high weights. Cncpttrrts each having similar names (other than a lack of a name or a null name) should be given low weights. Cncpttrrts each referring to the same effective trait within a trait group should be given low weights.

- Heuristic based Cncpttrrt common text string Commonality Relationship—for each set of trxrts having a text string (regular expressions used) in common in their descriptions, according to a heuristic, an affinitive cncpttrrt commonality relationship is created between the trxrts stating the similarity and assigning a stated weighting, scopx, and fxxt, according to the heuristic.

Trxrt to Trxrt—Cncpttrrt Hierarchical Commonality Relationships

Use Case: Generate Trxrt to trxrt—cncpttrrt Hierarchical Commonality Relationships.

Calculate the precedence between two cncpttrrts, and generate a weight for the relationship in the Cncpttrrt Hierarchical Commonality relationship data structure. Specific criteria for weights, include but are not limited to:

- Cncpttrrt Similarity Hierarchical Relationship exists—Average stated weights and compound to give a high effective weight in calculating the strength of the precedence.
- Cncpttrrt Hierarchical Commonality Relationship—Where a trxrt representing a grouping that encompasses another cncpttrrt, or other cncpttrrt precedence should be given medium weights.

Trxrt to Trxrt—Requirement Match Relationships

Use Case: Generate Trxrt to trxrt—Requirement Match Relationships.

Calculate the precedence between two cncpttrrts, and generate a weight for the relationship in the Cncpttrrt Hierarchical Commonality relationship data structure. Specific criteria for weights, include but are not limited to:

- Cncpttrrt Similarity Requirement Match Relationship exists—Average stated weights and compound to give a high effective weight in calculating the strength of the precedence.

Cncpttrrts which are a match of a need or requirement to a trait satisfying the need or requirement should be given high weights. Cncpttrrts which are a match of a need or requirement to a trait in a group where other traits might satisfy the need or requirement should be given low weights.

Trxrt to trxrt—Conformance to Science Match Relationships

Use Case: Generate Trxrt to trxrt—Conformance to Science Match Relationships.

Calculate the precedence between two cncpttrrts, and generate a weight for the relationship in the Cncpttrrt Hierarchical Commonality relationship data structure. Specific criteria for weights, include but are not limited to:

- Conformance to Science match exists but match was to old science on one cnxpt, where on an other cnxpt, a conformance to science match exists to a newer understanding of science in the same line of TPLs (tplxpt). The difference in age of the TPLs set the weight of the commonality where a large timeframe difference causes a high effective strength of the precedence. A weighting is used to reduce the effect of generality where a difference in the hierarchical level in the TPL is caused by a narrowing of the general TPL 'theory' to a specific theory rather than an actual improvement of the TPL by discovering a new understanding Keyword to Keyword—Keyword Commonality Relationships Use Case: Generate Keyword to keyword—keyword commonality relationships.

Calculate the commonalities between two keywords, and generate a weight for the relationship in the commonality relationship data structure. Specific criteria for weights, include but are not limited to:

- keyword thesaurus matrices for each scopx are summarized across scopx by translation entry effects and are assigned a high weight.

Txo of Specific Type (Non-Cnxpt) to Txo of the Same Specific Type

Use Case: Generate Txo of specific type (non-cnxpt) to txo of the same specific type.

Calculate the commonalities between two (non-cnxpt) txos of the same infxtypx, and generate a weight for the relationship in the commonality relationship data structure. Specific criteria for weights, include but are not limited to:

- Txo Similarity Affinitive Relationship exists for the txo type—Average stated weights and compound to give a high effective weight in calculating the commonality.
- Txo Attribute Condition exists for the txo type—For each specified heuristic for the txo type, compare the txo attribute values of a specified (or of two different specified) type in each pair of txos to determine if the condition exists, giving a specified weight if it does.

Where multiple values exist for the same attribute in any txo, determine a single value for the attribute according to the heuristic (a separate portion of the specification) for input to the heuristic. Specific heuristics may (will often) cause new instances of the commonality relationship.

Txo to Txo—Txo Hierarchical Commonality Relationships—Same Type

Use Case: Generate Txo to txo—txo Hierarchical Commonality Relationships—same type.

Calculate the precedence between two tpxs, and generate a weight for the relationship in the Txo Hierarchical Commonality relationship data structure. Specific criteria for weights, include but are not limited to:

Txo Similarity Hierarchical Relationship exists for the txo type—Average stated weights and compound to give a high effective weight in calculating the strength of the precedence.

Txo Hierarchical Commonality Relationship—Where a txo representing a grouping that encompasses another txo of the same type or other txo precedence should be given medium weights.

Txo Attribute Hierarchy Condition exists for the txo type—For each specified heuristic for the txo type, compare the txo attribute values of a specified (or of two different specified) type in each pair of txos to determine if the condition exists, giving a specified weight if it does. Where multiple values exist for the same attribute in any txo, determine a single value for the attribute according to the heuristic (a separate portion of the specification) for input to the heuristic. Specific heuristics may (will often) cause new instances of the commonality relationship.

Product to Product—Product Assembly commonality relationships

Use Case: Product to Product—Product Assembly commonality relationships.

Calculate the precedence between two products, and generate a weight for the relationship in the Product Assembly Hierarchical Commonality relationship data structure. Specific criteria for weights, include but are not limited to:

A Product Assembly Txo Similarity Hierarchical Relationship exists stating that a material or sub-assembly represented by one product txo is a component of a product represented by a second txo—Average the stated weights and compound by expertise to give a high effective weight in calculating the strength of the precedence.

Product to Product—By-product commonality relationships

Use Case: Product to Product—By-product commonality relationships.

Calculate the precedence between two products, and generate a weight for the relationship in the By-product Hierarchical Commonality relationship data structure. Specific criteria for weights, include but are not limited to:

A Process By-product Txo Similarity Hierarchical Relationship exists stating that a process represented by one product (as a process or service) txo is a byproduct or result as represented by a second txo. Average stated weights and compound to give a high effective weight in calculating the strength of the precedence.

Txo of One Specific Type (Non-Cnxpt) to Txo of a Different Specific Type (Non-Cnxpt)

Use Case: Generate Txo of one specific type (non-cnxpt) to txo of a different specific type (non-cnxpt).

Calculate the commonalities between two (non-cnxpt) txos of different infxtypx, and generate a weight for the relationship in the commonality relationship data structure. Specific criteria for weights, include but are not limited to:

Txo Similarity Affinitive Relationship exists for the two specific txo types—Average stated weights and compound to give a high effective weight in calculating the commonality.

Mixed Txo Attribute Condition exists for the two txo types—For each specified heuristic for the two txo types, compare the txo attribute values of the specified types in each pair of txos to determine if the condition exists, giving a specified weight if it does. Where multiple values exist for the same attribute in any txo, determine a single value for the attribute according to the heuristic (a separate portion of the specification) for input to the heuristic. Specific heuristics may (will often) cause new instances of the commonality relationship.

Txo to Txo—Txo Hierarchical Commonality Relationships—Different Specific Type

Use Case: Generate Txo to txo—txo Hierarchical Commonality Relationships—different specific type.

Calculate the precedence between two tpxs of different types, and generate a weight for the relationship in the Txo Hierarchical Commonality relationship data structure. Specific criteria for weights, include but are not limited to:

Txo Similarity Hierarchical Relationship exists for the two specific txo types—Average stated weights and compound to give a high effective weight in calculating the strength of the precedence.

Txo Hierarchical Commonality Relationship—Where a txo representing a grouping that encompasses another txo of another type or other txo precedence should be given medium weights.

Mixed Txo Attribute Hierarchy Condition exists for the two txo types—For each specified heuristic for the two txo types, compare the txo attribute values of the specified types in each pair of txos to determine if the condition exists, giving a specified weight if it does. Where multiple values exist for the same attribute in any txo, determine a single value for the attribute according to the heuristic (a separate portion of the specification) for input to the heuristic. Specific heuristics may (will often) cause new instances of the commonality relationship.

Process to Product—Manufacturing Commonality Relationships

Use Case: Generate Process to Product—Manufacturing commonality relationships.

Calculate the precedence between a product txo and process txo, and generate a weight for the relationship in the Manufacturing Hierarchical Commonality relationship data structure. Specific criteria for weights, include but are not limited to:

A Manufacturing Txo Similarity Hierarchical Relationship exists stating that a material or sub-assembly represented by one product txo results from a process represented by a second txo—Average stated weights and compound to give a high effective weight in calculating the strength of the precedence.

Result Set Membership Commonality Relationships

Use Case: Generate Result Set Membership Commonality Relationships.

Calculate the commonalities between two result sets to summarize the rsxitem commonality where one info-item occurred as relevant in two or more result sets. Specific criteria for weights, include but are not limited to:

Result Set Similarity Affinitive Relationship exists—Average stated weights and compound to give a high effective weight in calculating the commonality.

Rsxitems representing the same irxt are summed in as high weights.

Rsxitems representing irxts each holding the same base locator (same basic source address such as a website) to an external source are summed in as low weights.

Rsxitems representing the same txo are summed in as high weights.

Vote Summarizations—Calculate Summaries of All 'Votes'

Use Case: Summarize Voting—Form one summary relationship for all relationships of a specific type for a specific txo.

Form one summary relationship for all relationships of each scopx and each infxtypx for any txo pair. Where an relationship retention rule for an infxtypx states that only summary relationships are retained, relationships of that infxtypx other than a summary relationship will be destroyed.

Form one summary association for all associations of each scopx and each infxtypx for any cnxpt pair. Where an association retention rule for an infxtypx states that only summary associations are retained, associations of that infxtypx other than a summary association will be destroyed.

Data Summarization is an ongoing process, performed whenever processor power is available, and without regard to the processing status of other Data Manipulation processes.

For each generated summary, the basis (heuristic identity and basis relationships) is recorded, a timestamp is set to show when the generation occurred, and a 'DIRTIED' flag is reset to speed regeneration.

Summarization are generated by algorithms that are plugged into the continuous processing backbone. The algorithms are described here and below.

Object Property Summarization

Attribute Vote Summarization

Use Case: Attribute Vote Summarization—Create weighted average summaries of attribute data to de-'fuzzy' an attribute.

Generate a set of attribute vote summary items calculated for this cnxpt to generate a 'fuzzy' value for a single attribute of the cnxpt. Each summary will be marked with an attribute name, a 'dirtied' flag, a 'last calculated timestamp', a fxxt or blank, a scopx or blank, a summarized weight, an attribute datatype, and an attribute value. Summaries will be retained in [attribute summaries] and marked as 'BASIC VOTED'.

Txo Property Vote Summarization and Fxxt Summarization

Use Case: Txo Property Vote Summarization—Create a summary from weighted choices of property values as defined by references to txos to de-'fuzzy' an property value.

Generate a set of txo property vote summary items calculated for this cnxpt to generate a 'fuzzy' value for a single property of the cnxpt. Each summary will be marked with a txo property name, a 'dirtied' flag, a 'last calculated timestamp', a fxxt or blank, a scopx or blank, a summarized weight, a summary value, and a txo identifier. Txo Property summaries, other than fxxt txo properties, will be retained in [txo property summaries] with combined weightings and marked as 'BASIC VOTED'. Base fxxt (fxxt actually specified on cnxpt info-items within txo properties) summaries will be retained, without duplications in [txo property summaries], in [fxxt summaries] with combined weightings and marked as 'BASIC VOTED'.

Existence Vote Summarization

Use Case: Existence Vote Summarization—Create weighted average summaries of vote data for use in map generation and analysis.

Generate a set of existence vote summary items calculated for this cnxpt to show the consensus regarding whether the cnxpt is or will ever be real, or whether it should be deleted for any explainable and appropriate reason. Each summary will be marked with a summary name, a 'dirtied' flag, a 'last calculated timestamp', a fxxt or blank, a scopx or blank, and a summary weight value. Summaries will be retained in [existence summaries] and marked as 'BASIC VOTED'.

Interest Summarization

Use Case: Interest Summarization—Create weighted average summaries of interest data to conserve space and for use in map generation and analysis.

Generate a set of interest summary items calculated for this cnxpt to show the relative degree of interest in the cnxpt. Each summary will be marked with an interest type info-item identifier, a 'dirtied' flag, a 'last calculated timestamp', a fxxt where the interest was shown, and a summary value for the interest. Summaries will be retained in [interest summaries] and marked as 'BASIC VOTED'.

Sum into one interest summary item all of the interest tuples having the same fxxt for the cnxpt. In one embodiment, sum into one interest summary item all of the interest tuples having the same fxxt for the txo, or dxo.

Imputed Association Generation by Heuristic

Use Case: Imputed Association Generation by Heuristic—Create weighted relationships from underlying info-items and relationships to identify or differentiate cnxpts.

These relationships specifically involve only cnxpts. The following relationships are generated to provide affinitive associations between pairs of cnxpts to determine similarities and differentiation distances. The relationships (some possibly implemented as bias calculations in later processing steps) are generated based upon heuristics. Some are generated based upon heuristics which accept user specifications for weights or which accept user parameters for the calculations. Whenever an underlying relationship changes or info-items change which these heuristics rely upon, the specific relationship generated will be 'dirtied' and a new relationship will later (or immediately) replace it. The basis for the generated relationships are, including but not limited to calculations in the categories here.

For each generated relationship, the basis (heuristic identity and basis relationships) is recorded, a timestamp is set to show when the generation occurred, and a 'DIRTIED' flag is reset to speed regeneration.

Imputed relationships are generated by heuristic algorithms that are plugged into the continuous processing backbone. The algorithms are described here and below.

Associations Imputed from Commonalities

Impute Cnxpt Associations from Commonalities

Use Case: Impute Cnxpt Associations from Commonalities—Create weighted relationships from commonality relationships.

Apply heuristics within a fxxt using commonality relationship weights to form new (or replace old) hierarchical or affinitive associations.

An association is created from one cnxpt to another when a commonality exists for an occurrence or property of each of the cnxpts. For example, and as a general pattern for all affinitive commonalities, if trxrt X is specified for cnxpt A, trxrt Y has a commonality with trxrt X, and trxrt Y is specified for cnxpt B, then an Imputed Affinitive association from the Cncpttrrt Affinitive Commonality Relationship is created between cnxpt A and cnxpt B, in the proper direction if one is required, if the commonality was an affinitive commonality. (The pattern can be followed by substituting 'trxrt' and 'cncpttrrt' by another type.)

An association is created from one cnxpt to another when a directed 'hierarchical' commonality exists for an occurrence or property of each of the cnxpts. For example, and as a general pattern for all hierarchical commonalities, if txo X is specified for cnxpt A, txo Y has a commonality with txo X, and txo Y is specified for cnxpt B, then an Imputed Hierarchical association from the Hierarchical Commonality Relationship is created between cnxpt A and cnxpt B, in the proper direction, where the commonality is a hierarchical commonality. (The pattern can be followed by substituting 'txo' and 'cnxpt' by specific types.)

As a specific example, an association is created from one txpt to another when a directed 'hierarchical' commonality exists for a 'product' occurrence of the txpts. More specifically, if product txo X is specified for txpt A, product txo Y has a By-product of commonality with product txo X, and product txo Y is specified for txpt B, then an Imputed By-product Hierarchical association from the By-product Hierarchical Commonality Relationship is created between txpt A and txpt B, in the proper direction, with a fxxt from the By-product of Association if the commonality was a hierarchical commonality.

If product txo X is specified for txpt A, product txo Y has a product assembly commonality with product txo X, and product txo Y is specified for txpt B, then an Imputed product assembly Hierarchical association from the product assembly Hierarchical Commonality Relationship is created between txpt A and txpt B, in the proper direction, with a fxxt from the 'used as component in' relationship if the commonality was a hierarchical commonality.

Associations Imputed from Similarities not in Commonalities

Impute Cnxpt Associations from Similarities

Use Case: Impute Cnxpt Associations from Similarities—Create weighted relationships from similarity relationships.

Apply heuristics within a fxxt using similarity relationship weights, where a corresponding commonality relationship has not been implemented, to form new (or replace old) hierarchical or affinitive associations. Calculate the Imputed Associations in the same manner as is done for commonalities.

Associations Imputed From Citation Relationships and Associations

Apply heuristics within a fxxt using citation relationships with weights to form new (or replace old) hierarchical associations. The basis for the generated relationships are, including but not limited to:

Hierarchical—Citation

Impute Cnxpt citation associations

Use Case: Impute Cnxpt citation associations—Create weighted categorical hierarchical associations from citation relationships between irxts or between irxts and cnxpts.

Perform Citation Based Categorization

Use Case: Perform Citation Based Categorization—Build associations from Citation analysis.

Perform Reverse-Citation Based Categorization

Use Case: Perform Reverse-Citation Based Categorization—Build associations from Reverse-Citation analysis.

In each of the following, generate a categorical hierarchical imputed cnxpt citation association—occurrence from the citing cnxpt or txpt to the second cnxpt or txpt, setting the weight, scopx, and fxxt according to the citation relationship:

- indirect imputed cnxpt citation association—citations from the references in a non-patent information resource as captured by indirect citation relationships between irxts representing the citing ("OIR") and a cited information resource ("CIR"). For each indirect citation relationship from an ("OIR") irxt that is in an occurrence to a 'citing' cnxpt and referring to an information resource represented by a second ("CIR") irxt and which has an occurrence relationship from a second cnxpt.
- direct imputed cnxpt citation association—citations from an information resource's references to a cnxpt's description or description variant as captured by direct information resource citation relationships between irxts representing the citing ("OIR") and a cited information resource ("CIR"). For each direct information resource citation relationship from an ("OIR") irxt that is in an occurrence to a 'citing' cnxpt and referring to an information resource represented by a second ("CIR") irxt and which has an occurrence relationship from a second cnxpt.
- imputed cnxpt name reference citation association—citations from an information resource's references to a cnxpt's name or name variant as captured by direct information resource name reference citation relationships between an irxt representing the citing information resource ("OIR") and the cited cnxpt. For each direct information resource name reference citation relationship from an ("OIR") irxt that is in an occurrence to a 'citing' cnxpt and referring to a second cnxpt.
- prior art imputed cnxpt citation association—prior art citations from the references in a patent as captured by prior art citation relationships between irxts representing the patent and cited prior art. For each prior art citation relationship from an ("OIR") irxt that is in an occurrence to a 'citing' txpt and referring to a patent or other prior art represented by a second ("CIR") irxt and which has an occurrence relationship from a second txpt (the 'possible prior art parent' txpt).
- independent claim imputed cnxpt citation association—structuring references as captured by independent claim irxt relationships between irxts representing the specific sectional document stating an independent claim, and an irxt representing the patent having the independent claim. For each independent claim irxt relationship from an ("OIR") irxt that is in an occurrence to a 'citing' txpt representing the independent claim tcept and a patent represented by a second ("CIR") irxt and which has an occurrence relationship from a second txpt (the patent txpt).
- dependent claim imputed cnxpt citation association—structuring references as captured by dependent claim irxt relationships between irxts representing the specific sectional document stating a dependent claim, and an irxt representing the independent claim having the dependent claim. For each dependent claim irxt relationship from an ("OIR") irxt that is in an occurrence to a 'citing' txpt representing the dependent claim tcept and a independent claim represented by a second ("CIR") irxt and which has an occurrence relationship from a second txpt (the patent txpt).

Associations and Relationships Imputed From Certain Base Relationships

Impute Non-cnxpt Relations From Base Data or Relationships

Use Case: Impute Non-cnxpt Relations From Certain Base Relationships—Create weighted relationships from certain data or other relationships between Non-cnxpts or between a non-cnxpt and a cnxpt.

Apply heuristics to form new (or replace old) relationships. The basis for the generated relationships are, including but not limited to:

Custom heuristics.

Impute Cnxpt Associations From Certain Base Relationships

Use Case: Impute Cnxpt Associations From Certain Base Relationships—Create weighted categorical hierarchical or affinitive associations from certain relationships between cnxpts.

Apply heuristics within a fxxt using other basic relationships with weights to form new (or replace old) hierarchical and affinitive associations. The basis for the generated relationships are, including but not limited to:

Hierarchical—

Affinitive—

Impute Cnxpt Associations From Siblings in Same Category

Use Case: Impute Cnxpt Associations From Siblings in Same Category—Create weighted affinitive associations from sibling relationships between cnxpts.

If two cnxpts are members of the same category cnxpt in one fxxt, then a nexus affinitive association is formed between them and a weighting is imparted for similarity by membership, and a very low weight is assigned, and the fxxt is assigned to the relationship.

Associations Imputed from Heuristics on Cnxpt Characteristics

Impute Cnxpt Associations Based upon Characteristic Heuristics

Use Case: Impute Cnxpt Associations Based upon Characteristic Heuristics—Create weighted hierarchical and affinitive associations between cnxpts based upon heuristics on characteristics of the cnxpt.

Apply heuristics within a fxxt using attribute value heuristics specified by authorized users, with specified weights set for existence of the condition specified, to form new (or replace old) affinitive or hierarchical associations.

Hierarchical or Affinitive—

Impute Associations from Attribute Heuristics

Use Case: Impute Associations from Attribute Heuristics—Create weighted affinitive associations from attribute matching or comparisons.

Where multiple values exist for the same attribute in any cnxpt, determine a single value for the attribute according to the heuristic (a separate portion of the specification) for input to the heuristic. For each heuristic specifying a condition, a fxxt, and a weight (algorithm), compare the cnxpt attribute values of the specified types in each pair of cnxpts to determine if the condition exists, and where it does, create an "Imputed Association from Attribute Heuristic" between the pair of cnxpts with a fxxt set by the heuristic and the specified weight. The basis for the generated relationships are, including but not limited to:

Imputed Attribute Value Nexus affinitive association—If two cnxpts have a specific value (null is considered a value) in common for some attribute, then the cnxpts are presumed to be somewhat similar, a nexus affinitive association is formed between them and a very low cumulative trait weighting is imparted.

Imputed Attribute Range Nexus affinitive association—If two cnxpts have a specific value range in common for some attribute, then the cnxpts are presumed to be somewhat similar, and a very low cumulative trait weighting is imparted.

Imputed Attribute Comparison Nexus affinitive association—If two cnxpts have a value for an attribute of one cnxpt and a value for an attribute of another cnxpt meeting a specific comparison criteria, a nexus affinitive association is formed between them and a stated weighting is imparted.

Impute Associations from Name Heuristics

Use Case: Impute Associations from Name Heuristics—Create weighted affinitive associations from name matching or comparisons.

Where multiple names and variants exist for a cnxpt, determine a single name according to the heuristic (a separate portion of the specification) for input to the heuristic, or apply the heuristic on some heuristically selected set of names. For each heuristic specifying a condition, a fxxt, and a weight (algorithm), compare the cnxpt names in each pair of cnxpts to determine if the condition exists, and where it does, create an "Imputed Association from Name Heuristic" between the pair of cnxpts with a fxxt set by the heuristic and the specified weight. The basis for the generated relationships are, including but not limited to:

Imputed Association Generation by Name Heuristic—Common Name—If two cnxpts each have the same base name and the scopx of the base names are the same, then the cnxpts are presumed to represent the same ttx. Various alternative heuristics for variants and names are obvious alternatives.

Imputed Association Generation by Name Heuristic—Name with Common Text String—If two cnxpts each have a base name with the same string representation and the scopx of the base names are the same, then the cnxpts are presumed to represent the same ttx.

Impute Associations from Description Heuristics

Use Case: Impute Associations from Description Heuristics—Create weighted affinitive associations from description matching or comparisons.

Where multiple descriptions and variants exist for a cnxpt, determine a single description according to the heuristic (a separate portion of the specification) for input to the heuristic, or apply the heuristic on some heuristically selected set of descriptions. For each heuristic specifying a condition, a fxxt, and a weight (algorithm), compare the cnxpt descriptions in each pair of cnxpts to determine if the condition exists, and where it does, create an "Imputed Association from Description Heuristic" between the pair of cnxpts with a fxxt set by the heuristic and the specified weight. The basis for the generated relationships are, including but not limited to:

Imputed Association Generation by Description Heuristic—Common Description—If two cnxpts each have the same base description and the scopx of the base descriptions are the same, then the cnxpts are presumed to represent the same ttx. Various alternative heuristics for variants and descriptions are obvious alternatives.

Imputed Association Generation by Description Heuristic—Description with Common Text String—If two cnxpts each have a base description with the same string representation and the scopx of the base descriptions are the same, then the cnxpts are presumed to represent the same ttx.

Impute Associations from Txo Property Heuristics

Use Case: Impute Associations from Txo Property Heuristics—Create weighted affinitive associations from Txo Property matching or comparisons.

Where multiple Txo Properties exist for a cnxpt, determine a single txo property according to the heuristic (a separate portion of the specification) for input to the heuristic, or apply the heuristic on some heuristically selected set of txo properties.

For each heuristic specifying a condition, a fxxt, and a weight (algorithm), compare the cnxpt txo properties in each pair of cnxpts to determine if the condition exists, and where it does, create an "Imputed Association from Txo Property Heuristic" between the pair of cnxpts with a fxxt set by the heuristic and the specified weight. The basis for the generated relationships are, including but not limited to:

Imputed Association Generation by Txo Property Heuristic—Property in Common—For each info-item which is related to two or more cnxpts by a txo property relationship, create a "property match imputed from txo Affinitive Commonality relationship" between each pair of cnxpts with a fxxt of the property which is higher weighted and with a combined weight of the sum of the two property relationships. In one embodiment, create the "property match imputed from txo Affinitive Commonality relationship" with the set of all fxxts specified on either of the properties.

Imputed Association Generation by Txo Property Heuristic—Relationship Test—If two cnxpts have a txo property of one cnxpt and a txo property of the other cnxpt meeting a specific comparison criteria, an association is formed between them and a stated weighting, scopx, and fxxt is imparted according to the heuristic.

Impute Associations from Keyword Heuristics

Use Case: Impute Associations from Keyword Heuristics—Create weighted hierarchical or affinitive associations from Keyword comparisons.

Where multiple keywords exist for a cnxpt, determine a single keyword according to the heuristic (a separate portion of the specification) for input to the heuristic, or apply the heuristic on some heuristically selected set of keywords. For each heuristic specifying a condition, a fxxt, and a weight (algorithm), compare the cnxpt keywords in each pair of cnxpts to determine if the condition exists, and where it does, create an "Imputed Association from Keyword Heuristic" between the pair of cnxpts with a fxxt set by the heuristic, the type (hierarchical or affinitive, and direction), and the specified weight. The basis for the generated relationships are, including but not limited to:

Imputed Keyword In Common Nexus affinitive association—If two cnxpts share a Keyword Index relationship to a kwx (or, in one embodiment, a kwx group), then they both identify the same keyword phrase as being relevant to the ttx that they represent, and a learned relevance weighting is imparted.

Imputed Association Generation by Keyword Heuristic—Relationship Test—If two cnxpts have a keyword of one cnxpt and a keyword of the other cnxpt meeting a specific comparison criteria, an association is formed between them and a stated weighting, scopx, and fxxt is imparted according to the heuristic.

Imputed Association Generation by Heuristic—Common Group of Keywords—If two cnxpts have some percentage of one cnxpt's Keyword Index relationships in common with some percentage of the other cnxpt's Keyword Index relationships, a stated weighting is imparted based upon the percentage.

(see also Keyword Commonalities as a pattern of Associations Imputed from Commonalities)

Associations Imputed from Heuristics on Occurrences of Cnxpt

Summarize Occurrences and Impute Associations from Occurrence Matches

Use Case: Summarize Occurrences for Imputing Relationships—Create summary weighted occurrence relationships from occurrences of the same type, fxxt, and scopx.

Use Case: Occurrence Summarization—Create weighted average summaries of relevance data to conserve space and provide trend analysis.

Generate a set of occurrence summary items calculated for each cnxpt. Each summary will be marked with a summary name, a 'dirtied' flag, a 'last calculated timestamp', an optional fxxt, an optional scopx, and a relationship identifier. Summaries will be retained in [occurrence summaries].

The relationship summarization process involves taking an existing summarization relationship and adding into it all the changes due to relationship changes that would affect that summarization on a weighted average basis, or replacing the summarization relationship by a recalculation of all of the current relationships.

Where multiple occurrences of: 1) a certain required type, 2) the same (or the same lack of) a scopx, and 3) the same (or the same lack of) a fxxt, exist for a cnxpt, (re)generate a single 'occurrence summary relationship' of the type according to a specified summarization heuristic for the type of occurrence. For the summary occurrence, assign a weight based on the heuristic, and specify the fxxt, and the scopx for which the summary was created.

Use Case: Occurrence Matching Imputation—Create weighted affinitive associations from occurrence summaries to identify cnxpts.

For each info-item which is related to two or more cnxpts by a 'occurrence summary relationship' (in [occurrence summaries]) (two relationships, one from each cnxpt to the info-item) with the same fxxt and scopx (or the lack thereof), create an "occurrence from match imputed affinitive association" between the pair of cnxpts, assigning that fxxt and that scopx, and a combined weight of the sum of the two occurrence relationships. In one embodiment, create the "occurrence from match imputed affinitive association" with the set of all fxxts specified on either of the occurrences. In one embodiment, create an additional "occurrence from match imputed all-fxxt affinitive association" with no fxxt and with no scopx specified, and with a weight based upon the combined weight but with a great reduction heuristic to provide a cross-fxxt basis.

Impute Associations from Occurrence Heuristics

Use Case: Impute Associations from Occurrence Heuristics—Create weighted hierarchical or affinitive associations from Occurrence comparisons.

(First follow the procedure in Summarize Occurrences for Imputing Relationships where incomplete for the occurrences of a cnxpt.)

Utilizing 'occurrence summary relationships' (in [occurrence summaries]), generate relationships where, including but not limited to:

Imputed Association Generation by Occurrence Heuristic—Relationship Test—If two cnxpts each have an 'occurrence summary relationship' meeting a specific comparison criteria, according to a heuristic, a hierarchical or affinitive association is formed between them and a stated weighting, scopx, and fxxt is imparted according to the heuristic.

Trait Subsumption imputed categorical association—If two cnxpts each have ‘occurrence summary relationships’ to a set of trxrts, and the set related to a ‘base’ cnxpt are a proper subset of the set of trxrts related to a ‘subsumed’ cnxpt, according to a heuristic, a hierarchical association is formed with the base type as a parent and the subsumed cnxpt as a child, and a stated weighting, scopx, and fxxt is imparted according to the heuristic.

pigeon-hole imputed categorical association—If two cnxpts each have ‘occurrence summary relationships’ to a set of purxpts, and the set related to a cnxpt (the ‘pigeon-holed’ cnxpt) are a proper subset of the set of purxpts related to a second cnxpt (the ‘wider’ cnxpt), according to a heuristic, a hierarchical association is formed with the ‘wider’ type as a parent and the ‘pigeon-holed’ cnxpt as a child, and a stated weighting, scopx, and fxxt is imparted according to the heuristic. This is presently thought likely to be a very low weight relationship.

Subsumption imputed categorical association—If two cnxpts each have ‘occurrence summary relationships’ to a set of occurrences of a certain type (other than trxrt or purxpt), and the set related to a ‘base’ cnxpt are a proper subset of the set of occurrences of the same type related to a ‘subsumed’ cnxpt, according to a heuristic, a hierarchical association is formed with the base type as a parent and the subsumed cnxpt as a child, and a stated weighting, scopx, and fxxt is imparted according to the heuristic. (see Subsumption Associations and Special Feature Hierarchical associations)

Imputed Association Generation by Heuristic—Purlieu Group in Common—If two cnxpts each have ‘occurrence summary relationships’ to a set of purxpts, and some percentage of one cnxpt’s purxpts in common with some percentage of the other cnxpt’s purxpts, according to a heuristic, an affinitive association is formed, and a stated weighting, scopx, and fxxt is imparted according to the heuristic. This is presently thought likely to be a medium weight relationship.

Imputed Association Generation by Heuristic—Cncpttrrt Group in Common—If two cnxpts each have ‘occurrence summary relationships’ to a set of trxrts, and some percentage of one cnxpt’s trxrts in common with some percentage of the other cnxpt’s trxrts, according to a heuristic, an affinitive association is formed, and a stated weighting, scopx, and fxxt is imparted according to the heuristic. This is presently thought likely to be a very low weight relationship.

Imputed Association Generation by Heuristic—Occurrences Group in Common—If two cnxpts each have ‘occurrence summary relationships’ to a set of occurrences of a specific type (other than trxrt or purxpt), and some percentage of one cnxpt’s occurrences of that type in common with some percentage of the other cnxpt’s occurrences of that type, an affinitive association is formed, a stated weighting is imparted based upon the percentage (perhaps according to a heuristic), and a scopx and fxxt is imparted according to the heuristic.

(see also Occurrence Commonalities as a pattern of Associations Imputed from Commonalities)

Associations Imputed Across Fxxts

See also imputed across fxxt associations described above.

Impute Cnxpt Associations Across Fxxts

Use Case: Impute Cnxpt Associations Across Fxxts—Create weighted hierarchical and affinitive associations between cnxpts to provide base tensors.

Apply heuristics on relationships from one fxxt into other fxxts to infer associations, setting weights to form new (or replace old) hierarchical and affinitive associations.

Hierarchical—

Impute Ancestor Cnxpt Associations Across Fxxts

Use Case: Impute Ancestor Cnxpt Associations Across Fxxts—Create weighted hierarchical and affinitive associations between cnxpts to provide base tensors.

Impute associations based upon association transitivity based upon the presence of indirect hierarchical cnxpt associations existing between each of two sets of two cnxpts where one cnxpt is in each of the two sets:

is member of—is in an Ancestor Group is subclass of—is in an Ancestor Class is member of category—is in an Ancestor Category The operational effect of the system will be that the cnxpts not in both sets will be perceived to have a hierarchical association between them and a very low weighting is imparted for similarity by type, and no fxxt is assigned. This may be implemented as a real association or a bias in later calculations where pairwise comparisons are made.

In one embodiment, different weights may be assigned depending upon the type of the cnxpts in the sets.

Affinitive—

Citation-Based Associations Imputed Across Fxxts

Use Case: Impute Citation-Based Associations Imputed Across Fxxts—Create weighted affinitive associations from imputed citation associations.

In each of the following, generate an affinitive imputed cnxpt citation association from the citing cnxpt or txpt to the second cnxpt or txpt, setting the weight to be steeply but proportionately lower (by a parameter setting, specific to base type) and no scopx or fxxt, according to the imputed cnxpt citation association:

indirect imputed cnxpt citation association direct imputed cnxpt citation association imputed cnxpt name reference citation association prior art imputed cnxpt citation association independent claim imputed cnxpt citation association dependent claim imputed cnxpt citation association.

Imputed Association Generation by Heuristic—Same Type

If two cnxpts have the same infxtypx, the operational effect of the system will be that they will be perceived to have a nexus affinitive association between them and a very low weighting is imparted for similarity by type, and no fxxt is assigned. This may be implemented as a real relationship or a bias in later calculations where pairwise comparisons are made.

Impute Cnxpt Associations from Siblings in Same Category—Across Fxxts

In one embodiment, if two cnxpts are members of the same category cnxpt in any fxxt, then a nexus affinitive association is formed between them and a weighting is imparted for similarity by membership, and a very low weight is assigned, and no fxxt is assigned to the association.

Imputed Association Generation by Other Heuristics

Use Case: Imputed Association Generation by Other Heuristics—Create weighted affinitive associations from underlying info-items and relationships to identify or differentiate cnxpts.

These associations specifically involve only cnxpts. The following associations are generated to serve as additional, less direct means of identifying when two cnxpts represent the same ttx, are nearly the same but differentiable, or are merely related. The associations are generated based upon heuristics, including some which accept user specifications for weights or which accept user parameters for the calculations. These include but are not limited to:

Imputed Association Based Upon Other identity indicator (or Subject Indicator) in Common—If two cnxpts have the same identity indicators, other than the indicators considered above, then create a nexus affinitive association between them with a medium weighting and with the fxxt and scopx appropriate to the identity indicator, such as the fxxt of the relationship from the cnxpt for the indicator.

Imputed Association Based Upon Common Children—If two cnxpts have some percentage of one cnxpt's 'children' cnxpt hierarchical associations in common with some percentage of the other cnxpt's 'children' cnxpt hierarchical associations, create a nexus affinitive association between them with a low weighting multiplied by the percentage, and assign no fxxt or scopx.

For each generated association, the basis (heuristic identity and basis relationships) is recorded, a timestamp is set to show when the generation occurred, and a 'DIRTIED' flag is reset to speed regeneration.

Associations Imputed from Heuristics on Other Relationships and Associations

Hierarchical—

Impute Hierarchical Association Strengths from Affinitive Associations

Use Case: Impute Hierarchical Association Strengths from Affinitive Associations—Increase weights on hierarchical associations where certain affinitive associations between the cnxpts also exist, because an inference of greater strength may be made based upon certain affinities.

Generate replacement or augmentative hierarchical associations based upon the affinitive associations and the original hierarchical associations. These replacement or augmentative associations will be deleted if the basis hierarchical association is deleted.

Affinitive—

Impute Affinitive Associations from Hierarchical Associations

Use Case: Impute low weight Affinitive Associations from Hierarchical Associations—Utilize explicitly stated hierarchical associations to indicate that certain affinitive associations between the cnxpts also exist, because an inference of a relationship may be made.

Impute Associations from Interest Shown and Navigation

Use Case: Impute Associations from Interest Shown and Navigation—Create weighted affinitive associations from navigation paths taken by users or other interest data to associate two cnxpts relative to each other because, for instance, one is very often visited after another one; or, more highly weighted, users often go back and forth between two cnxpts.

Other

Imputed Association Generation by Heuristic—Domain-Specific Information Test

Use Case: Imputed Association Generation by Domain-specific Heuristic—Create weighted associations based upon domain specific heuristics.

Make use of any domain-specific information to determine that two cnxpts don't represent the same ttx or are related in a determinable way.

Impute Cnxpt Associations from Fxxt calculation step Criteria

Use Case: Impute Cnxpt Associations from Fxxt Calculation Step Criteria—Create weighted relationships from search criteria in Fxxt calculation steps.

Fxxt calculation steps state criteria that show, at least for a specific fxxt, that some relationship is important between cnxpts. These criteria are useful for generating relationships and associations. The relationships are created in a commonality matrix if dense enough, or are simply utilized directly to impute a lower weighted association.

Calculate the commonalities required as specified in a Fxxt Calculation Step to form new (or replace old) hierarchical or affinitive associations. Calculate the Imputed Associations in the same manner as is done for commonalities. Any of the above types of commonalities may be called for by a fxxt calculation step, and a fxxt calculation step may also specify a custom commonality based upon a wide variety of criteria.

Where multiple values exist for the same attribute in any cnxpt, determine a single value for the attribute according to the heuristic (a separate portion of the specification) for input to the heuristic. All fxxt calculation step criteria state a condition and a fxxt. Compare the cnxpt characteristics of the specified types in each pair of cnxpts to determine if the condition exists, and where it does, create an "Imputed Association from Fxxt calculation step Criteria" between the pair of cnxpts with the fxxt, this heuristic, the fxxt specification basis, the infxtypx for fxxt calculation step criteria associations, and a nominal, specified weight.

In one embodiment, these associations are summarized by fxxt to form 'BASIC VOTED' summary associations of either the affinitive or hierarchical type. The summarization takes place as a final step in this imputed relationship generation process.

Pre Fxxt Analysis Data Summarization

Complete Generation of Summaries of Occurrences

Use Case: Complete Generation of Summaries of Occurrences.

Follow the procedure in Summarize Occurrences for Imputing Associations where incomplete for the occurrences of a cnxpt.

Summary Association Generation

Use Case: Summary Association Generation.

Generate a set of association summary items calculated for each pair of cnxpts where associations exist. Each summary will be marked with a summary name, a 'dirtied' flag, a 'last calculated timestamp', an optional fxxt, an optional scopx, and a relationship identifier. Summaries will be marked as 'BASIC VOTED'.

Summary Hierarchical association

Use Case: Summary Hierarchical association Summarization—Create weighted average summaries of hierarchical association data to conserve space and provide for map generation.

Generate a set of hierarchical association summary items calculated for this cnxpt. Each summary will be marked with a summary name, a 'dirtied' flag, a 'last calculated timestamp', an optional fxxt, an optional scopx, and a relationship identifier. Summaries will be retained in [hierarchical association summaries] and marked as 'BASIC VOTED'.

Combine, by every combination of fxxt and scopx available within a cnxpt, all hierarchical associations from the cnxpt to another cnxpt. Place the association into the [hierarchical association summaries] list as all Summary Hierarchical associations for the cnxpt, assigning the fxxt, the scopx, and a single weight value which is the total calculated by a heuristic (initially, this heuristic will be the average weight of all the relationships of the type for that cnxpt multiplied by the number of relationships being summarized times a factor based upon the number of relationships (1 initially)).

Summary Affinitive Association

Use Case: Summary Affinitive Association Summarization—Create weighted average summaries of affinitive association data to conserve space and provide for map generation.

Generate a set of affinitive association summary items calculated for this cnxpt. Each summary will be marked with a summary name, a 'dirtied' flag, a 'last calculated timestamp', an optional fxxt, an optional scopx, and a relationship identifier. Summaries will be retained in [affinitive association summaries] and marked as 'BASIC VOTED'.

Combine, by every combination of fxxt and scopx available within a cnxpt, all affinitive associations from the cnxpt to another cnxpt. Place the association into the [affinitive association summaries] list as all Summary Affinitive associations for the cnxpt, assigning the fxxt, the scopx, and a single weight value which is the total calculated by a heuristic (initially, this heuristic will be the average weight of all the relationships of the type for that cnxpt multiplied by the number of relationships being summarized times a factor based upon the number of relationships (1 initially)).

Third Level for Process: Map Generation

Use Case: Generate Map without Fxxt Consideration

Generate a categorization without using a fxxt specification where the fxxt information is disregarded, all commonplace cnxpts and associations are considered, descendant and ascendant trees are generated for map generation, and visualization is performed.

Based upon the counted votes (above), generation starts with summarization of 'BASIC VOTED' summaries for the cnxpts eliminating discrimination by association type (except that ordered associations are summarized only with other associations with the same orderings, and hierarchical associations are summarized only with other hierarchical associations), scopx, or fxxt membership in generating association summaries to obtain at most a single association (for any set of an ordering and/or hierarchy association nature) between any pair of cnxpts to obtain a Final Association Summarization.

Use Case: Apply Fxxt Specification

Generate a fxxt construct based upon a fxxt specification for map generation.

Based upon the counted votes (above), fxxt generation starts with determination of fxxt membership based upon Fxxt Specification analysis on the basis of 'BASIC VOTED' summaries for the cnxpt as summarized in the [fxxt summaries] characteristic and in association summaries of the cnxpt, and fxxt specifications. Other cnxpt characteristics and relationship characteristics may also be taken into consideration to determine fxxt membership.

For all generated information, the basis (heuristic identity and basis relationships) is recorded, a timestamp is set to show when the generation occurred, and a 'DIRTIED' flag is reset to speed regeneration. Because of the complexity and duration of the process, heuristic statuses can be maintained on various info-items to control processing to reduce redundancy. In each case, when any cnxpt, summary association, or tensor is processed within the following procedures, the heuristic status for the fxxt and heuristic will be updated. This updating is left out of the descriptions below but is assumed.

Basic Fxxt Formation

Algorithm for Fxxt Marking with Extension Fxxt Calculation Steps

Use Case: Fxxt Marking with Extension Fxxt Calculation Steps—Mark cnxpts and associations to form a cnxpt based ontology for a fxxt for map generation.

This algorithm gathers and marks the components of a fxxt from the CMMDB ontology as defined by a fxxt specification which has a base and possibly has extensions.

This algorithm creates a set of cnxpts in a calculated fxxt, and the set of hierarchical and affinitive associations in the calculated fxxt. The graph used is based upon all of the Fxxt Calculation Step descriptions in the Fxxt Specification, including the base description and all extensions. If no fxxt specification is available, use the entire graph.

This algorithm enforces the layering of Fxxt Calculation Steps, but also constrains the growth of the fxxt but imposes fewer rules on which FXXT BASIS Hierarchical associations may be used at that time by using costs rather than absolute constraints.

Design variation: The process of finding FXXT BASIS Hierarchical associations to be added to the queue as given in the FindFxxtExtensionRelationships procedure may process a single extension—the current one—to find FXXT BASIS Hierarchical associations, or it may process all Fxxt Calculation Steps up to and including the current one. This option is a design feature that may be altered depending upon results.

The graph extracted will be simplified from the original graph. Initially the graph is empty, with no fxxt markings (and no FXXT BASIS Hierarchical associations). Cnxpts and associations (and possibly txos in some cases) where each cnxpt is in the fxxt under consideration according to a Fxxt Specification which has one or more Fxxt Calculation Step descriptions plus the base description for the fxxt. At each step, add the fxxt extension cnxpts and FXXT BASIS Hierarchical associations with a cost premium.

The MarkFxxt graph construction algorithm is:

```
null MarkFxxt ( FxxtedGraph fg, Fxxt fxxt, FxxtSpec fS, double fxxtPremParam, int maxAddCnxpts )
{
    RelationshipWeightedGraph gExt;
    Queue txoQ;
    Queue cnxptQ;
    Queue affinAssocQ;
    Queue hierAssocQ;
    FxxtExtension fE; // a single FxxtSpec Fxxt Calculation Step specification with rules for extending or revising fxxt
marking
    HierarchicalAssoc e;
    Boolean changesMade;
    Boolean overallchangesMade;
    Boolean stillMore;
    int cntIterations;
    int maxIterations = 15;
```

```
int i, j, n, m, cur_fE, last_fE, fE_Cnt;
//
fE_Cnt = stepCnt (fS);
last_fE = 1;
for ( last_fE = 1; last_fE <= fE_Cnt; last_fE++ )
{
    do
    {
        cntIterations = 1;
        stillMore = FALSE;
        for ( cur_fE = 1; cur_fE <= last_Cnt; cur_fE++ )
        {
            fE = fS.fE[cur_fE];
            /* On each iteration, all steps up to and including the currently considered step are executed
successively,
            and repeated successively in order until no new txos can be found to be added. */
            /* Each fxxt extension, generation, or summarization step is executed until it finds nothing to add,
and then the next extension is executed. */
            /* Each fxxt extension, generation, or summarization step is attempted multiple times, in the order
they appear in the script, each until it finds
                no changes to make, but collectively until no extension, generation, or summarization step is
able to alter the derived ontology. */
            /* Then each of the non-extension, non-generation, and non-summarization steps are executed until
all are complete. */
            /* in each cycle, the queues may increase or decrease depending upon the rules. Each rule gets an
opportunity to alter the queue contents */
            /* if programmed correctly, one rule will be involved that checks the queue, either to determine if all
prior rules have had the opportunity to complete their work
                or at least, on a presumption that all queue elements have been examined by the proper rules,
then to delete the queue elements as having been processed */
            switch ( fE.type )
            {
                Simple_Extension:
                Complex_Extension:
                Generation:
                Summarization:
                    changesMade = MarkByExtensionGenerationSummarization ( fxxt, fS, cur_fE,
fxxtPremiumExtend, cnxptQ, affinAssocQ, hierAssocQ )
                    break;
                Access:
                Retention:
                Weighting:
                Ordering:
                Standard_Fxxt_Marking:
                Base_Fxxt_Marking:
                Base_Association_Marking:
                    changesMade = executeFxxtExtenRule ( fxxt, fS, fE, fxxtPremiumExtend, cnxptQ,
affinAssocQ, hierAssocQ );
                    break;
                Ontology_Combination:
                    changesMade = executeFxxtExtenRule ( fxxt, fS, fE, fxxtPremiumExtend, cnxptQ,
affinAssocQ, hierAssocQ );
                    break;
                default:
            } end case;
            stillMore = stillMore || changesMade;
            overallchangesMade = overallchangesMade || changesMade;
        };
        cntIterations++;
    } while (( (cntIterations < maxIterations) && stillMore);
};
/* returns TRUE if anything was added to the New Markings Queues */
return overallchangesMade;
};
//
// Triggered Interpretation
Boolean Fxxt_Sys_Reval (Proc_Hook prchk, Fxxt fxxt, FxxtSpec fS, String operationType, HierarchicalAssoc e, Decimal
costpenalty);
    Queue txoQ;
    Queue cnxptQ;
    Queue affinAssocQ;
    Queue hierAssocQ;
    double fxxtPremiumExtend;
    FxxtExtension fE; // a single FxxtSpec Fxxt Calculation Step specification with rules for extending or revising fxxt
marking
    Boolean changesMade, overallchangesMade;
    Boolean stillMore;
    int cntIterations;
    int maxIterations = 15;
```

```
    int i, j, n, m, cur_fE, last_fE, fE_Cnt;
    //
    fE_Cnt = stepCnt (fS);
    changesMade = FALSE;
    overallchangesMade = FALSE;
    for ( cur_fE = 1; cur_fE <= fE_Cnt; cur_fE++ )
    {
        fE = fS.fE[cur_fE];
        switch ( fE.type )
        {
            Triggered:
                if ( operationType == fE.contextType )
                {
                    /* context types include but are not limited to: "TEST_HIERREL", "TEST_JOIN", "POST_JOIN",
"TEST_NONADD_HIERREL" */
                    changesMade = executeFxxtExtenRule ( fxxt, fS, fE, fxxtPremiumExtend, cnxptQ, affinAssocQ,
hierAssocQ );
                    break;
                }
            Complex_Extension:
            Generation:
            Summarization:
            Access:
            Retention:
            Weighting:
            Ordering:
            Standard_Fxxt_Marking:
            Base_Fxxt_Marking:
            Base_Association_Marking:
            Ontology_Combination:
            default:
                break;
        } end case;
        overallchangesMade = overallchangesMade || changesMade;
    };
    if ( overallchangesMade == TRUE )
    {
        do
        {
            cntIterations = 1;
            stillMore = FALSE;
            for ( cur_fE = 1; cur_fE <= fE_Cnt; cur_fE++ )
            {
                fE = fS.fE[cur_fE];
                /* On each iteration, all steps up to and including the currently considered step are executed
successively,
                and repeated successively in order until no new txos can be found to be added. */
                /* Each fxxt extension, generation, or summarization step is executed until it finds nothing to add,
and then the next extension is executed. */
                /* Each fxxt extension, generation, or summarization step is attempted multiple times, in the order
they appear in the script, each until it finds
                    no changes to make, but collectively until no extension, generation, or summarization step is
able to alter the derived ontology. */
                /* Then each of the non-extension, non-generation, and non-summarization steps are executed until
all are complete. */
                /* in each cycle, the queues may increase or decrease depending upon the rules. Each rule gets an
opportunity to alter the queue contents */
                /* if programmed correctly, one rule will be involved that checks the queue, either to determine if all
prior rules have had the opportunity to complete their work
                    or at least, on a presumption that all queue elements have been examined by the proper rules,
then to delete the queue elements as having been processed */
                switch ( fE.type )
                {
                    Simple_Extension:
                    Complex_Extension:
                    Generation:
                    Summarization:
                        changesMade = MarkByExtensionGenerationSummarization ( fxxt, fS, cur_fE,
fxxtPremiumExtend, cnxptQ, affinAssocQ, hierAssocQ )
                        break;
                    Access:
                    Retention:
                    Weighting:
                    Ordering:
                    Standard_Fxxt_Marking:
                    Base_Fxxt_Marking:
                    Base_Association_Marking:
                        changesMade = executeFxxtExtenRule ( fxxt, fS, fE, fxxtPremiumExtend, cnxptQ,
affinAssocQ, hierAssocQ );
```

-continued

```
                        break;
                    Ontology_Combination:
                        changesMade = executeFxxtExtenRule ( fxxt, fS, fE, fxxtPremiumExtend, cnxptQ,
affinAssocQ, hierAssocQ );
                        break;
                    default:
                } end case;
                stillMore = stillMore || changesMade;
                overallchangesMade = overallchangesMade || changesMade;
            };
            cntIterations++;
        } while (( (cntIterations < maxIterations) && stillMore);
    };
    /* returns TRUE if anything was added to the New Markings Queues */
    return overallchangesMade;
};
//
//
Proc_Hook Fxxt_Sys_Reg (fxxt, fS)
{
/* returns HOOK for fxxt processing while in fxxt tree extraction for NOT “Easily Determined” fxxts */
/* register with fxxt calculation subsystem for efficient processing. */
/* also initializes fxxt calculation subsystem */
    return process_ID;
        };
```

Design Variations

Design variation: The process of finding FXXT FINAL Hierarchical associations to be added to the queue as given in the FindFxxtExtensionRelationships procedure may process a single extension—the current one—to find FXXT FINAL Hierarchical associations, or it may process all Fxxt Calculation Steps up to and including the current one. This option is a design feature that may be altered depending upon results.

Fxxt Calculation Script Interpretation

Status and Objective

The determination of membership in a calculated fxxt is always based upon all of the Fxxt Calculation Step descriptions in the Fxxt Specification, which contains a series of Fxxt Calculation Steps. In each Fxxt calculation step Interpretation Heuristic, a determination is made whether to add new info-items to the fxxt according to a fxxt analysis algorithm. To generate the list of cnxpts in a fxxt based upon calculated fxxts, for each non-base fxxt, the fxxt specification based calculation is executed on each cnxpt to determine if the cnxpt belongs in the fxxt.

This processing implements categorization differentiation, using characteristics and scopx to distinguish clearly among those cnxpts (topics, concepts, subjects) to merge into the resulting fxxt and those not to merge. This processing also implements cnxpt relevance because the fxxt calculation steps clearly implement and reflect the purpose, subject, and scope of the classification system as applied to a cnxpt or relationship to merge. This processing also implements Ascertainability because it utilizes weights set during the accumulation of data from objective and subjective settings of weights, and makes ‘transparent’ adjustments on those weights to specifically set the definiteness of the determination for inclusion of a cnxpt or relationship in the fxxt result.

The fxxt calculation will utilize then summarize away the scopx information to calculate the fxxt. The scopx information will be useful during display. Further editing of the base information used in the fxxt calculation may change the scopxs and infxtypxs of relationships (and their priority) that the fxxt map generation will be based upon. These changes may require a recalculation for the fxxt.

The range of complexity of these specifications will vary over the potential implementations, and various heuristics or design variations with different algorithms will be used improve results and increase efficiency.

In one embodiment, it is assumed that all hierarchical and affinitive Summary Associations are available within ANY fxxt. One additional initial directed graph is fxxt free (any summary hierarchical or affinitive association where no fxxt is applied, and all cnxpts within the roles of those relationships).

Fxxt Processing Constructs

Processing Flow

Fxxt calculation script interpretation is of the nature of execution of a computer program. Scripts are made up of one or more subscripts or sections which are made up of fxxt calculation step (extension) specifications. Scripts may have sections which are procedural, requiring completion of the script steps in sequence. Other script sections may be ‘exhaustive’ in that they are to be repeated, where each fxxt extension, generation, or summarization step multiple times, in cycles through the whole script, in the order they appear in the script, each until it finds no changes to make, but collectively until no extension, generation, or summarization step is able to alter the derived ontology. Other steps may be ‘triggered’ by some condition. One script may form multiple fxxts, all but one of are temporary.

When a fxxt is ‘calculated’ by executing the calculation script, each step called for is performed as specified. Upon completion, or before certain types of script step, summarization are executed automatically on the forming fxxt (or on a fxxt that is used as a parameter in the certain type of script steps mentioned, such as a fxxt combination calculation step).

For ease, a script section may be marked for controlling ‘first calculation’ (default) or ‘recalculation’. The ‘first calculation’ script sections would only be invoked when a fxxt was first calculated. The ‘recalculation’ script sections would only be invoked when a fxxt is being recalculated as a part of a “Complex Annealing” algorithm tree extraction for a NOT ‘Easily Determined’ fxxt, which might involve condition detection or mere requests for recalculation, and the ‘first calculation’ script sections would not be invoked for the recalculation. The 'recalculation' script sections thus provide a tool to extend the "Complex Annealing" algorithms.

Processing Language

The fxxt calculation script language contains traditional programming language flow control statements as well as 'trigger' definition statements of the 'On Condition x, do y' nature where the condition is tested for outside of the normal procedural process. An 'UNTIL DONE' statement allows for cycling through calculation steps until no change is made to the fxxt being formed.

Fxxt calculation step templates are used to describe the processing to occur and conditions to be met within a calculation step. A template will be available for each calculation step type.

Fxxt Calculation Steps

Each of the fxxt calculation steps may change the fxxt membership, as recorded in the CMMDB, of info-items within the fxxt it is a fxxt calculation step for. It may also change the membership of an info-item (where the info-item may be marked with a fxxt) in a derived ontology as constructed for the specific fxxt calculation step in the script.

Each of the fxxt calculation steps may operate, as a source only, on the derived ontology as constructed by any previous step(s) in the script, or on the CMMDB as a whole, or on the ontology formed by those info-items marked with another specific fxxt (or the 'blank' fxxt) in the CMMDB.

Fxxt calculation steps may generate new info-items and relationships in the fxxt it is a part of, including but not limited to: 'BASIC VOTED' summaries, cnxpts, relationships, dxos (possibly fxxt agnostic), txos (possibly fxxt agnostic), 'committed differentiation steering hints', derived ontologies.

Automatic Processing

Before a fxxt is calculated, generate FXXT BASIS summaries from 'BASIC VOTED' summaries and other CMMDB information.

Prior to the execution of certain types of calculation steps, wherever a cnxpt meets a fxxt calculation step 'search criteria' and 'necessary criteria test', at the conclusion of the generation of certain types fxxt calculation steps, or at the end of processing, re-summarize FXXT BASIS summaries from 'BASIC VOTED' summaries to prepare for fxxt arithmetic calculation steps. All calculated fxxt associations for each cnxpt are to be summarized into FXXT BASIS summary associations. Generate FXXT BASIS association summaries for a cnxpt wherever a cnxpt meets a fxxt calculation step 'search criteria' and 'necessary criteria test' or wherever a cnxpt holding a role in an association meets a fxxt calculation step 'search criteria' and 'necessary criteria test'.

Conditions Prior to Fxxt Calculation

Prior to fxxt calculation, all associations will have been summarized in 'BASIC VOTED' summary associations for cnxpts. All characteristic fxxts for cnxpts are set in txo properties for the cnxpt and summarized in the [fxxt summaries] characteristic of the cnxpt as 'BASIC VOTED' fxxt summary tuples. All calculated fxxts for the cnxpt are to be added into the [fxxt summaries] characteristic as FXXT BASIS fxxt summary tuples. The 'BASIC VOTED' summaries are used in fxxt tree extraction after fxxt calculation.

Fxxt Calculation Step Parameters

Each fxxt calculation step description takes a set of parameters. Various methods of specifying the parameters for a step in a query are available, including but not limited to:

- choosing of values of parameters from menus: In this method, a wizard presents list of parameters and their values from which to choose.
- query language. This is the most complex method, but it is also the most powerful.
- specialized query commands formed from parameterized requests for invocations of analytics. Each calculation step may require iterative invocations on the fxxt and may utilize the fxxt as constructed by the previous step(s) in the script.

Boolean operation commands on fxxts.

The Fxxt Calculation Step descriptions in the Fxxt Specification may be functions of the fxxt txo properties, or scopxs, infxtypxs, attribute values, other txo properties or other characteristics of the cnxpts or relationships it participates in, base fxxts defined on infxtypxs, and of the results of prior phases of fxxt analysis toward map generation.

Committed Differentiations

For fxxts based upon relationship participation, the way that an association is used in the addition of a cnxpt must be taken into consideration throughout the use of the fxxt. To do so, relationships are given 'committed differentiations' for each fxxt if a difference between the basic relationship and the meaning used to make the fxxt extension is found. These exist for the life of the fxxt, but are used as steering hints for each reconstruction of the fxxt and for other new fxxts to provide a familiarity to the user viewing the CMMDB through the use of the fxxt. This technique has the utility of allowing a user to more easily match his mental map (as previously learned) to the present CMMDB.

Derived Ontology Creation and Utilization

The execution of the heuristics defined in Fxxt Calculation Steps creates a 'Derived Ontology' Derived ontologies may serve as a source to other heuristics of Fxxt Calculation Steps, and the result of such a heuristic need not be the same derived ontology. Derived Ontologies may be but one 'possible result' of the heuristics.

Based upon the final summaries of votes, fxxt processing results in the creation of directed graphs of cnxpts by fxxt, with all hierarchical and affinitive summary associations as available within a specific or in ANY fxxt. One additional resulting directed graph is fxxt free (any summary hierarchical or affinitive association without regard to fxxt, and all cnxpts within the roles of those relationships). Another additional resulting directed graph is unconstrained by fxxt (any summary hierarchical or affinitive association without any fxxt assignment, and all cnxpts within the roles of those relationships). Each of these graphs may be used as a basis for fxxt arithmetic within fxxt processing.

After fxxt processing, the graphs are submitted to graph extraction by fxxt, and to hierarchy extraction. Then the graphs are processed for cnxpt positioning.

Fxxt calculation script Interpretation Heuristic 1—Access and Retention Steps

Use Case: Fxxt calculation script Interpretation Heuristic 1—Access and Retention Steps.

For this heuristic, the accessibility of fxxt related information in a calculated fxxt is based upon specifications for setting of administrative settings, including but not limited to: access granting and retention rules. Access and retention rules apply to, including but not limited to: fxxt specifications in general, the display of information via a fxxt, the use of and retention of derived ontologies.

Settings made in this heuristic apply forward to the results of other heuristics. The rules also provide settings for automatic rerunning of the heuristic upon specific events.

Search Criteria

Each Fxxt Calculation Step describes 'search criteria' to find info-items as determined by the accessibility and retention specifications.

Necessary Criteria Test

Each Fxxt Calculation Step describes a 'necessary criteria test' to finally determine if the info-items may be acted upon, as determined by the accessibility and retention specifications.

Action to Take

Each Fxxt Calculation Step describes an 'action to take', including, but not limited to:

Generate Access Control List entries for info-items, including but not limited to fxxts, derived ontologies.

Generate retention rules for info-items, including but not limited to derived ontologies.

Fxxt calculation script Interpretation Heuristic 2—Weighting Steps

Use Case: Fxxt calculation script Interpretation Heuristic 2—Weighting Steps.

For this heuristic, the determination of weights applied to fxxt settings of info-items and importance of those weights in manipulation of fxxt information in a calculated fxxt is based upon the setting of weighting factors. This heuristic implements Ascertainability because it specifically adjust the definiteness of the consensus resulting from crowd weightings to affect determination for inclusion.

Settings made in this heuristic apply forward to the results of other heuristics. The heuristic, if rerun, may alter the weighting factors, or apply weighting factors to different info-items. The rules also provide settings for automatic rerunning of the heuristic upon specific events.

Search Criteria

Each Fxxt Calculation Step describes 'search criteria' to find info-items as determined by the weighting factor specifications. Weighting factors may be specified in the fxxt calculation step description for increasing or decreasing importance of, including but not limited to: relationships, identity indicators, similarity strengths, votes, fxxt summaries, association summaries, or derived ontologies.

Necessary Criteria Test

Each Fxxt Calculation Step describes a 'necessary criteria test' to finally determine if the info-items may be acted upon, as determined by the weighting factor specifications.

Action to Take

Each Fxxt Calculation Step Describes an 'Action to Take' of Applying a Weighting Factor Including, but not limited to: fxxt specifications in general, multipliers for the weights set for specific Fxxt Calculation Steps, changes applied to fxxt weights that would be set for relationships, identity indicators, similarity strengths, votes, fxxt summaries, or association summaries resulting from specific Fxxt Calculation Steps, weights set for derived ontologies where the derived ontology is combined with another.

Fxxt calculation script Interpretation Heuristic 3—Ordering Steps

Use Case: Fxxt calculation script Interpretation Heuristic 3—Ordering Steps.

For this heuristic, the prioritization of processing within sets of info-items to be processed and several other ordering rules are set for a calculated fxxt by ordering rules. This heuristic implements relevant succession, to use an ordering relevant to the nature, subject, and scope of a classification system, such as by chronological, alphabetical, canonical, spatial, or geometric orderings; or ordering by complexity or quantity. This heuristic also implements the establishment of consistency in successions because once an ordering, within a specific fxxt, has been established, it should not be possible to modify it unless there is a change in the fxxt specification (due to a change in the purpose, subject, or scope of the system) or the underlying categorization.

Settings made in this heuristic apply forward to the results of other heuristics. The heuristic, if rerun, may alter the ordering of previous orderings, or apply new ordering to different info-items. The rules also provide settings for automatic rerunning of the heuristic upon specific events.

Search Criteria

Each Fxxt Calculation Step describes 'search criteria' to find info-items to apply ordering to as determined by the Ordering Specifications.

Necessary Criteria Test

Each Fxxt Calculation Step describes a 'necessary criteria test' to finally determine if the info-items may be acted upon, as determined by the ordering specifications.

Action to Take

Each Fxxt Calculation Step describes an 'action to take', including, but not limited to: prioritization of processing, information prioritization for reduction, path reordering, title or name ordering; relationship elimination priority, info-item elimination priority; path construction decisions, ordering of display of information for a fxxt.

Fxxt Calculation Script Interpretation Heuristic 4—Summarization Steps

Use Case: Fxxt calculation script Interpretation Heuristic 4—Summarization Steps.

For this heuristic, the determination of intensity or importance of an info-item's fxxt membership, or its appearance, or its membership itself in a calculated fxxt is based upon prior Fxxt calculation script Interpretation Heuristics, as well as summarization rules.

Info-items 'hidden', 'reduced', or 'eliminated' are marked with highly negative weights for the fxxt under consideration only (to eliminate the need for, or to block their regeneration), and are not deleted from the CMMDB.

Settings made in this heuristic may apply forward to the results of other heuristics. The heuristic, if rerun, may eliminate other info-items, or may alter previous eliminations. The rules also provide settings for automatic rerunning of the heuristic upon specific events.

Search Criteria

Each Fxxt Calculation Step describes 'search criteria' to find info-items as determined by the summarization specifications.

Necessary Criteria Test

Each Fxxt Calculation Step describes a 'necessary criteria test' to finally determine if the info-items may be acted upon, as determined by the summarization specifications.

Action to Take

Each Fxxt Calculation Step describes an 'action to take', including, but not limited to: information hiding, information reduction, path shortening, title or name shortening; relationships elimination, cnxpt elimination, info-item elimination, interest information reduction, identity indicator alteration or reduction, similarity strengths summarization, vote summarization.

The results of this heuristic may be confined to affect only the info-items and relationships in a particular derived ontology, which may be empty when the heuristic is started, or, optionally, when it is rerun.

Fxxt Calculation Script Interpretation Heuristic 5—Standard and Base Fxxts

Use Case: Fxxt calculation script Interpretation Heuristic 5—Standard and Base Fxxts.

For this heuristic, the determination of cnxpt membership in a calculated fxxt is based upon prior Fxxt calculation script Interpretation Heuristics, and upon the fxxt of the cnxpt only, as determined from scopxs, infxtypxs, txo properties for fxxts on the cnxpt and fxxt membership by base fxxt definitions for specific infxtypxs. In this heuristic, an association is only a member of the fxxt if it is marked in the fxxt, if it is between two cnxpts having the fxxt, or if it is not fxxt specific.

Generate FXXT BASIS fxxt summaries for a fxxt wherever a cnxpt meets a fxxt calculation step 'search criteria' and 'necessary criteria test' based upon its attributes, scopxs, infxtypxs, and txo properties for the fxxt being processed, specifically on the cnxpt's fxxt membership by standard and base fxxt definitions according to the cnxpt's infxtypx(s).

Standard Fxxt Definitions

Generate additional fxxt summaries for the cnxpt, to be added into the [fxxt summaries] characteristic of the cnxpt, by standard fxxt heuristics, including but, not limited to:

- Application—generate an 'application' fxxt summary on each axpt not otherwise having an 'application' fxxt.
- Patented—generate a 'patented' fxxt summary on each txpt (or axpt, cnxpt) described by an issued patent in that a 'claim type' attribute is set for the txpt. Each such cnxpt would also have a non-null value in the attribute for 'patent number'. By extension, the fxxt would include cnxpts which included these 'patented' cnxpts as members by an 'is-a' or 'is subclass of' relationship.
- Research—generate a 'research' fxxt summary on each txpt (or axpt, cnxpt) that a user has classified as research, and is not patented and is not productized.
- Science Fiction—generate a 'fiction' fxxt summary on each txpt (or axpt, cnxpt) that a user has classified as science fiction, which has a low 'existence vote', and is not patented and is not productized.
- Independent—generate a 'independent' fxxt summary on each txpt (or axpt, cnxpt) described by an issued patent and specifically defined by an independent claim of the patent, in that it has non-null values in the attributes for 'claim type' (as 'independent') and for 'claim'. Each such cnxpt would also have a non-null value in the attribute for 'patent number'.
- Dependent—generate a 'dependent' fxxt summary on each txpt (or axpt, cnxpt) described by an issued patent and specifically defined by a dependent claim of the patent, in that it has non-null values in the attributes for 'claim type' (as 'dependent') and for 'claim'. Each such cnxpt would also have a non-null value in the attribute for 'patent number'.
- Funded—generate a 'funded' fxxt summary on each txpt having a non-zero value for their 'FUNDING' attribute.
- Unfunded but Patented—generate a 'unfunded but patented' fxxt summary on each txpt having been described by an issued patent but that has a zero or null value for their 'FUNDING' attribute. In one embodiment, this fxxt may be formed by a subtraction of the Funded fxxt from the Patented fxxt.

Definitions of Base Fxxts

Generate additional fxxt summaries for the cnxpt, to be added into the [fxxt summaries] characteristic of the cnxpt, by base fxxt heuristics by identifying the infxtypx of the cnxpt, including but, not limited to:

- Fields of Science: Txpts representing fields of science, sub-fields of science, fields of study, sub-fields of study, academic discipline. The Field of Science can be extended to a most recent/most detailed tcept by: Fields of Science tcepts as root; Member; Patented; Cited; Predecessor—Successor; Prior Art; Incremental innovation.
- Patent Classifications: Txpts representing classification of tcept by patent index category, Derwent category, etc. The Patent Classification can be extended to a most recent/most detailed tcept by: Patent Field tcepts as root; Member; Patented; Cited; Predecessor—Successor; Prior Art; and perhaps Incremental innovation.
- Application Domains: Axpts representing classification of Axpts by Domain to most specific sub-function appcept by: Appcept as root; Member; Application.

The results of this heuristic may be confined to affect only the info-items and relationships in a particular derived ontology, which may be empty when the heuristic is started, or, optionally, when it is rerun.

Fxxt Calculation Script Interpretation Heuristic 6—Base Association Fxxts

Use Case: Fxxt calculation script Interpretation Heuristic 6—Base Association Fxxts.

For this heuristic, the determination of cnxpt and relationship membership in a calculated fxxt is based upon Fxxt calculation script Interpretation Heuristic 1 as well as generating memberships based upon the fxxt of the relationships it holds a role in, as determined from scopxs, infxtypxs, txo properties for fxxts on the relationships and fxxt membership by base fxxt definitions for associations based on their infxtypx(s). After applying this heuristic, an association would only be a member of the fxxt if it is marked in the fxxt, if it is between two cnxpts having the fxxt, if it has membership based upon a base fxxt for its infxtypx, or if it is not fxxt specific (has membership in all fxxts).

Generate FXXT BASIS association summaries for a fxxt wherever a cnxpt is holding a role in an association that meets a base fxxt specification based upon its characteristics or the characteristics of the cnxpts holding its roles.

Definitions of Base Association Fxxts

Some associations are immediately identifiable from the infxtypx of the association as indicating that the cnxpts holding their roles are in a specific fxxt. These include but are not limited to:

- Fields of Science—generate a 'field of science' fxxt summary where an is-a association exists to a parent which has a 'field of science' fxxt.
- Fxxt Member by 'is-a' association—for a child, generate a fxxt summary of the fxxt type of the parent (each type if multiple fxxts exist) where an 'is-a' association exists to a parent.
- Fxxt Member by 'is subclass of' association—for a child, generate a fxxt summary of the fxxt type of the parent (each type if multiple fxxts exist) where an 'is subclass of' association exists to a parent.
- Application—generate a 'application' fxxt summary where a txpt, axpt, or cnxpt participates in a 'from' role in an 'application of' association with another txpt, axpt, or cnxpt.
- Prior Art—generate a 'prior art' fxxt summary where a txpt, axpt, or cnxpt participates in a 'to' role in a prior art citation association with another txpt, axpt, or cnxpt having a 'patent' fxxt, or having a 'predecessor' role in a predecessor-successor association with another txpt, axpt, or cnxpt having a 'patent' fxxt.

Cited—generate a 'prior art' fxxt summary where a txpt, axpt, or cnxpt participates in a 'to' role in a citation association with another txpt, axpt, or cnxpt.

The results of this heuristic may be confined to affect only the info-items and relationships in a particular derived ontology, which may be empty when the heuristic is started, or, optionally, when it is rerun.

Fxxt Calculation Script Interpretation Heuristic 7—Simple Extension Steps

Use Case: Fxxt calculation script Interpretation Heuristic 7—Simple Extension Steps.

For this heuristic, the determination of cnxpt and relationship membership in a calculated fxxt is based upon prior Fxxt calculation script Interpretation Heuristics, as well as including cnxpts which are added to the fxxt due to extensions based upon Simple Extension Fxxt Calculation Steps.

Search Criteria

Each simple extension Fxxt Calculation Step describes 'search criteria' to find cnxpts and relationships including, but not limited to:

- cnxpts with a specified combination of attributes, txo properties, infxtypxs, scopxs, and other fxxts in the source.
- relationships with a specified combination of attributes, txo properties, infxtypxs, scopxs, and other fxxts in the source.

Criteria may specify handling of info-items with unconstrained scopx. The search criteria specifies a source as either the CMMDB in general, or in an specific, existing derived ontology.

Necessary Criteria Test

Each simple extension Fxxt Calculation Step describes a 'necessary criteria test' to finally determine if the cnxpts and relationships may be acted upon, including, but not limited to:

- An info-item in the source is of a infxtypx specified.
- A cnxpt in the source is of a infxtypx specified.
- A cnxpt in the source has a role in an association of a infxtypx specified.
- A cnxpt in the source has an unconstrained scopx 'is-a' relationship with another cnxpt or has a role in an unconstrained scopx relationship within the source; but the cnxpt does not hold a role in an association with another cnxpt where one of the cnxpts is not in the result (where the relationship is n-ary, only the relationships to cnxpts not in the source are excluded).
- A cnxpt in the source has a role in an association not in the source but in the result, where the other cnxpt having a role in the association has a infxtypx specified.

Action to Take

Each simple extension Fxxt Calculation Step describes an 'action to take', including, but not limited to:

- Generate FXXT BASIS fxxt summaries for a fxxt wherever a cnxpt meets a fxxt calculation step 'search criteria' and 'necessary criteria test' based upon its attributes, scopxs, infxtypxs, and txo properties for the fxxt being processed, and on the cnxpt's existing fxxt memberships according to the cnxpt's infxtypx(s).
- Generate FXXT BASIS association summaries for a fxxt wherever a cnxpt is holding a specified role in an association that meets a fxxt calculation step 'search criteria' and 'necessary criteria test' based upon its characteristics or the characteristics of the cnxpts holding its roles, or on the association's existing fxxt memberships according to the association's infxtypx(s).

The results of this heuristic may be confined to affect only the info-items and relationships in a particular derived ontology, which may be empty when the heuristic is started, or, optionally, when it is rerun.

Fxxt Calculation Script Interpretation Heuristic 8—Complex Extension Steps

Use Case: Fxxt calculation script Interpretation Heuristic 8—Complex Extension Steps.

For this heuristic, the determination of cnxpt and relationship membership in a calculated fxxt is based upon prior Fxxt calculation script Interpretation Heuristics, as well as including cnxpts which are added to the fxxt due to extensions based upon Complex Extension Fxxt Calculation Steps.

Search Criteria

Each complex extension Fxxt Calculation Step describes 'search criteria' to find cnxpts and relationships including, but not limited to:

- Existence of an association imputed due to the fxxt calculation step search criteria.
  - custom commonalities, such as: common text string; common specific value or range for some characteristic (attribute or txo property); other custom and specific comparison criteria; Innovation by same individual; mutually competitive tcepts.
- Existence of an association imputed due to a commonality.
  - common trxrt;
  - overlapping context for some purxpt;
- Dxos or txos with a specified combination of attributes, txo properties, infxtypxs, scopxs, and other fxxts in the source.
- Associations or relationships with a specified combination of attributes, txo properties, infxtypxs, scopxs, and other fxxts in the source.
- Cases of inverse extension whereby txos within the fxxt are 'children' of txos not already in the fxxt, but the parent txos are added to the fxxt because of the relationship relative to the fxxt;
- Existence in a Boolean combination of two fxxts
- Combinations of the above.

Criteria may specify handling of info-items with unconstrained scopx. The search criteria specifies a source as either the CMMDB in general, or in an specific, existing derived ontology.

Necessary Criteria Test

Each complex extension Fxxt Calculation Step describes a 'necessary criteria test' to finally determine if the cnxpts and relationships may be acted upon, including, but not limited to:

- The satisfaction of the search criteria;
- A txo or dxo in the source has a role in a constrained scopx relationship, of a specific scopx, with a cnxpt or has a role in an unconstrained scopx relationship with a cnxpt within the source.

Action to Take

Each complex extension Fxxt Calculation Step describes an 'action to take', including, but not limited to:

- Generate FXXT BASIS fxxt summaries for a fxxt wherever a cnxpt meets the fxxt calculation step 'search criteria' and 'necessary criteria test' for the fxxt being processed.
- Generate FXXT BASIS association summaries for a fxxt wherever a cnxpt is holding a specified role in an association that meets the fxxt calculation step 'search criteria' and 'necessary criteria test' for the fxxt being processed.

The results of this heuristic may be confined to affect only the info-items and relationships in a particular derived ontology, which may be empty when the heuristic is started, or, optionally, when it is rerun.

Fxxt Calculation Script Interpretation Heuristic 9—Generation Steps

Use Case: Fxxt calculation script Interpretation Heuristic 9—Generation Steps.

For this heuristic, the determination of cnxpt and relationship membership in a calculated fxxt is based upon prior Fxxt calculation script Interpretation Heuristics, as well as including cnxpts and relationships generated according to the fxxt calculation step, including but not limited to: where an analytic is applied during the fxxt calculation.

Search Criteria

Each Fxxt Calculation Step describes 'search criteria' to find cnxpts and relationships as determined by the analytic.

Necessary Criteria Test

Each Fxxt Calculation Step describes a 'necessary criteria test' to finally determine if the cnxpts and relationships may be acted upon, as determined by the analytic.

Action to Take

Each Fxxt Calculation Step describes an 'action to take', including, but not limited to:

- Generate txo, dxo, or other info-items as determined by the analytic.
- Generate Cnxpt as determined by the analytic.
- Generate Relationship as determined by the analytic.
- Generate FXXT BASIS fxxt summaries for a fxxt wherever a cnxpt meets a fxxt calculation step 'search criteria' and 'necessary criteria test' as determined by the analytic.
- Generate FXXT BASIS association summaries for a fxxt wherever a cnxpt is holding a specified role in an association that meets a fxxt calculation step 'search criteria' and 'necessary criteria test' as determined by the analytic.

The results of this heuristic may be confined to affect only the info-items and relationships in a particular derived ontology, which may be empty when the heuristic is started, or, optionally, when it is rerun.

Ontology Combination and Fxxt Arithmetic

Fxxt Calculation Script Interpretation Heuristic 10—Ontology Combination Steps

Use Case: Fxxt calculation script Interpretation Heuristic 10—Ontology Combination steps.

For this heuristic, the determination of cnxpt and relationship membership in a calculated fxxt is based upon prior Fxxt calculation script Interpretation Heuristics, and Boolean operations on derived ontologies created in other heuristics, or on 'virtual derived ontologies' which consist of all of the info-items marked in a fxxt, or on one derived ontology and one 'virtual derived ontology'. This heuristic establishes the Boolean operation to be performed, and the rules for when the Boolean operation is to be performed or is to be re-performed.

This heuristic allows a wide range of purposes. With it, a fxxt may be copied, combined (or differenced) with another fxxt, combined (or differenced) with a derived ontology and saved as an extract, etc.

A form of cluster analysis is available in another heuristic for ontology combination called 'Clustering by Position'. That algorithm provides an alternative structure of combining information from multiple fxxts. Both forms of ontology combination may be used together to be obtain a specific result.

Combined fxxts include the relationships which were in either of the combined fxxts and which relate cnxpts (and possibly txos or dxos) that are both members of the combined fxxt after the operation. If the same relationship is found in two or more of the fxxts being combined, then the 'committed differentiations' of the fxxts are re-combined into a new 'committed differentiation' for the combined fxxt.

Because of the presence of Hierarchical Relationships between cnxpts in a fxxt, each of the following fxxt directed graphs is effectively supported as a basis for fxxt arithmetic:

- Extraction of directed graphs of cnxpts by base fxxt (fxxt actually specified on info-items), with all hierarchical and affinitive Summary Associations as available within the same fxxt.
- Extraction of directed graphs of cnxpts by base fxxt (fxxt actually specified on info-items), with all hierarchical and affinitive Summary Associations as available within ANY fxxt.
- Extraction of one additional initial directed graph is fxxt free (any summary hierarchical or affinitive association where no fxxt is applied, and all cnxpts within the roles of those relationships).

The fxxt directed graphs are actually 'fuzzy' because the hierarchy they embody is based upon weightings which may change.

This heuristic implements Fxxt Arithmetic for derived ontologies containing cnxpts and relationships, or between a derived ontology and the CMMDB. This heuristic, in conjunction with 'selection' heuristic steps (including but not limited to: Weighting Steps, Ordering Steps, Summarization Steps, Standard and Base Fxxts Steps, Base Association Fxxts Steps, Simple Extension Steps, Complex Extension Steps, Generation Steps) also implements Fxxt Arithmetic for derived ontologies containing cnxpts and relationships of different fxxts, or between a derived ontology of a specific fxxt and the CMMDB.

Search Criteria

Each Boolean operation Fxxt Calculation Step describes a set of two or more derived ontologies created in prior or yet to execute heuristics.

Necessary Criteria Test

Each Boolean operation will only be effective if the derived ontologies specified have been populated (an unpopulated derived ontology is null, but an empty (or non-empty, non-null) derived ontology has been populated). In addition, the Boolean operation must be achievable on the derived ontologies.

Action to Take

Perform the Boolean Operation, as specified in the Fxxt Calculation Step 'action to take', on the derived ontologies specified, generating a new, or overwriting an existing derived ontology, or placing the resulting markings of membership into the CMMDB without regard to a derived ontology.

The results of this heuristic may be confined to affect only the info-items and relationships in a particular derived ontology, which may be empty when the heuristic is started, or, optionally, when it is rerun.

Fxxt Interpretation Script Triggering

Fxxt calculation script Interpretation Heuristic 11—Triggered Interpretation

Use Case: Fxxt calculation script Interpretation Heuristic 11—Triggered Interpretation—Trigger the Interpretation of a fxxt calculation script step.

For NOT 'Easily Determined' fxxts, a fxxt script interpretation may be triggered whenever, including but not limited to: a cnxpt is determined to be a classification cnxpt;

a cnxpt is added to the spanning tree for the fxxt; a FXXT FINAL hierarchical summary association (found during the fxxt tree extraction algorithm below) or a just added FXXT BASIS hierarchical summary association (as found above) is examined and a determination is made by the algorithm to trigger based upon a fxxt script specification (this includes circumstances where the tree extraction is progressing and an association is examined to determine if it should be used to expand an extracted tree—it triggers before the association is utilized); a cnxpt is examined and a determination is made by the algorithm to trigger based upon a fxxt script specification (this includes circumstances where the tree extraction is progressing and a cnxpt is being added to the extracted tree—it triggers after the association is utilized but before the cnxpt is added to the extracted tree); a cnxpt is added to the extracted tree a determination is made by the algorithm to trigger based upon a fxxt script specification (this includes circumstances where the tree extraction is progressing and a cnxpt has been added to the extracted tree—it triggers after the association is utilized and after the cnxpt is added to the extracted tree).

Without triggering rules, the interpretation of the Fxxt can complete prior to the extraction of a spanning tree, below. Triggering rules encompass and execute other rule types, often Complex Extension Steps and Generation Steps.

Search Criteria

Each Triggered Interpretation Fxxt Calculation Step describes a triggering condition rather than a search criterion to determine the cnxpts and relationships on which to operate, as determined by the analytic. When a cnxpt is examined within the "Complex Annealing" algorithms below, a determination is made by the algorithm to trigger based upon each Triggered Interpretation Fxxt Calculation Step fxxt script specification for that type of condition.

The set of triggering conditions include, but are not limited to: a cnxpt is determined to be a classification cnxpt; a cnxpt is added to the spanning tree for the fxxt; a relationship or association is found to be most highly weighted; a cnxpt alias-hyperlink is found; a relationship or association is considered that matches a specified combination of attributes, txo properties, infxtypxs, scopxs; a cnxpt, dxo or txo is considered with a specified combination of attributes, txo properties, infxtypxs, scopxs; combinations of the above.

Necessary Criteria Test

Secondary tests will be performed by the Triggered Interpretation Fxxt Calculation Step and the Step will invoke other rules or carryout its own actions as specified if the secondary test is passed.

Action to Take

Perform the operations, as specified in the Fxxt Calculation Step 'action to take', on the derived ontology with the triggering cnxpt or relationship as a parameter. The completion of the processing of the triggered step may trigger other step interpretation. When All triggered step interpretation is completed, the Final Fxxt Summarization process is triggered. Then, control is returned to the fxxt tree extraction "Complex Annealing" algorithm.

Fxxt Calculation Script Interpretation Heuristic 12—Metadata Alteration Steps

Use Case: Fxxt calculation script Interpretation Heuristic 12—Metadata Alteration Steps.

In this heuristic, association, relationship, dxo, txo, trait, purlieu, irxt and cnxpt metadata may be altered by the script step. This alteration may be applied permanently or temporarily depending upon the present authority of the fxxt specification author, the present authority of the person invoking the fxxt specification, the timing settings for the invocation if any, the validity of the passkey used, the account used for accounting, the system upon which the specification is invoked, and the settings for use of the specification.

Settings made in this heuristic apply forward to the results of other heuristics within the fxxt specification interpretation. The heuristic, if rerun, may again alter metadata, or apply alteration of metadata to different info-items.

Search Criteria

Each Fxxt Calculation Step describes 'search criteria' to find info-items as determined by the metadata alteration specifications.

Necessary Criteria Test

Each Fxxt Calculation Step describes a 'necessary criteria test' to finally determine if the info-items may be acted upon, as determined by the metadata alteration specifications.

Action to Take

Each Fxxt Calculation Step describes an 'action to take' of applying a metadata alteration including, but not limited to: changes applied to metadata to be set for relationships, cnxpts, dxos, txos, traits, purlieu, irxts resulting from specific Fxxt Calculation Step.

Fxxt Specification Script Interpretation Control Algorithm

Use Case: Fxxt Specification Interpretation Script Interpretation Control—Mark cnxpts and associations to be in the fxxt by interpreting the fxxt specification script steps.

The Fxxt Specification Interpretation Script control algorithm for specific step interpretation is:

```
Boolean executeFxxtExtenRule ( Fxxt fxxt, FxxtSpec fS, FxxtExtension fE, double fxxtPremiumExtend, Queue cnxptQ,
Queue affinAssocQ, Queue hierAssocQ )
    /* returns TRUE if anything was added to the New Markings Queues */
    cnxptList cLst;
    RelationshipWeightedGraph gExt;
    double fxxtPremiumExtend;
    HierarchicalAssoc e;
    Boolean stillMore;
    Boolean addToQ_Occurred;
    Boolean changesMade;
    Cnxpt cnxptElement;
    Assoc assocElement;
    int nNewCnxpts;
    int nNewAffinAssocs;
    int nNewHierAssocs;
    int addedQ_Count;
    int incomingQ_Count;
    //
    /* common preparation processing */
```

-continued

```
    nNewCnxpts = Count(cnxptQ);
    nNewAffinAssocs = Count(affinAssocQ);
    nNewHierAssocs = Count(hierAssocQ);
    incomingQ_Count = (nNewCnxpts + nNewAffinAssocs + nNewHierAssocs);
    addToQ_Occurred = FALSE;
    //
    /* processing to interpret rules of addition/removal/marking of cnxpts, hierarchical associations, affinitive
associations, txos to fxxt. */
    /* processing may alter only information associated with fxxt under consideration */
    //
    /* following are common code snippits -- interpretation of the fxxt specifications rules is straightforward */
    //
    /* processing may involve adding cnxpts into the fxxt, as in: */
    cLst = FindFxxtExtensionCnxpts( fg, F, fE );
    do {
        cnxptElement = cLst.next( );
        if (cnxptElement != null) addCnxptFxxt(cnxptElement, fxxt);
    } while (cnxptElement != null);
    //
    /* processing may involve adding cnxpts into the queue, as in: */
    cLst = FindFxxtExtensionCnxpts( fg, F, fE );
    cnxptQ += cLst;
    //
    /* processing may involve adding associations into the fxxt, as in: */
    gExt = FindFxxtExtensionRelationships( fg, gExt, fS, fE, fxxtPremiumExtend );
    do {
        assocElement = gExt.next( );
        if (assocElement != null) addAssocFxxt(assocElement, fxxt);
    } while (assocElement != null);
    //
    /* processing may involve adding hierarchical associations into the queue, as in: */
    hierAssocQ += FindFxxtExtensionRelationships( fg, gExt, fS, fE, fxxtPremiumExtend );
    nNewCnxpts = Count(cnxptQ);
    //
    /* processing may involve adding affinitive associations into the queue, as in: */
    affinAssocQ += FindFxxtExtensionRelationships( fg, gExt, fS, fE, fxxtPremiumExtend );
    //
    //
    /* common results processing */
    nNewCnxpts = Count(cnxptQ);
    nNewAffinAssocs = Count(affinAssocQ);
    nNewHierAssocs = Count(hierAssocQ);
    addedQ_Count = (nNewCnxpts + nNewAffinAssocs + nNewHierAssocs);
    addToQ_Occurred = (addedQ_Count > 0);
    return addToQ_Occurred;
};
```

The Fxxt Specification Interpretation Script control algorithm for extension, generation, and summarization control is:

```
Boolean MarkByExtensionGenerationSummarization ( Fxxt fxxt, FxxtSpec fS, int top_fE, double fxxtPremiumExtend,
Queue cnxptQ, Queue affinAssocQ, Queue hierAssocQ )
    /* returns TRUE if anything was added to the New Markings Queues */
    Boolean addToQ_Occurred;
    Boolean changesMade;
    int nNewCnxpts;
    int nNewAffinAssocs;
    int nNewHierAssocs;
    int addedQ_Count;
    int incomingQ_Count;
    int cntInnerIterations;
    int cntIterations;
    FxxtExtension fE;
    int maxInnerIterations = 15;
    int maxIterations = 15;
    int i, j, n, m, cur_fE, fE_Cnt;
    nNewCnxpts = Count(cnxptQ);
    nNewAffinAssocs = Count(affinAssocQ);
    nNewHierAssocs = Count(hierAssocQ);
    incomingQ_Count = (nNewCnxpts + nNewAffinAssocs + nNewHierAssocs);
    addToQ_Occurred = FALSE;
    fE_Cnt = stepCnt (fS);
    do
    {
        for ( cur_fE = 1; ((cur_fE <= top_Cnt) && (cur_fE <= fE_Cnt)); cur_fE++ )
```

-continued

```
        {
            fE = fS.fE[cur_fE];
            /* Each fxxt extension, generation, or summarization step is attempted multiple times, in the order they
appear in the script, each until it finds
                no changes to make, but collectively until no extension, generation, or summarization step is able to
alter the derived ontology. */
            changesMade = FALSE;
            switch ( fE.type )
            {
                Simple_Extension:
                Complex_Extension:
                Summarization:
                Generation:
                    do
                    {
                        /* Each fxxt extension, generation, or summarization step is executed until it finds nothing
to add, and then the next extension is executed. */
                        changesMade = FALSE;
                        changesMade = executeFxxtExtenRule ( fxxt, fS, fE, fxxtPremiumExtend, cnxptQ,
affinAssocQ, hierAssocQ );
                        cntInnerIterations++;
                    } while (changesMade && (cntInnerIterations < maxInnerIterations));
                    break;
                default:
            } end case;
        } endfor;
        nNewCnxpts = Count(cnxptQ);
        nNewAffinAssocs = Count(affinAssocQ);
        nNewHierAssocs = Count(hierAssocQ);
        cntIterations++;
        addedQ_Count = (nNewCnxpts + nNewAffinAssocs + nNewHierAssocs);
    } while (changesMade && (cntIterations < maxIterations));
    addToQ_Occurred = changesMade || (addedQ_Count > 0);
    return addToQ_Occurred;
};
```

System Functions—Ontology Manipulation for Mapping—Final Association Summarizations After fxxt determination and arithmetic, the fxxt ontologies are submitted to graph extraction by fxxt, and to hierarchy extraction.

FXXT FINAL Summarization

Use Case: Fxxt Summarization—Create a summary from weighted fxxt summaries to remove redundancies.

Generate a set of fxxt summary items calculated for each cnxpt where more than one [fxxt summaries] tuple exists for the same fxxt. Each summary will be marked with a txo property name, a 'dirtied' flag, a 'last calculated timestamp', a summarized weight, and a fxxt identifier or blank Txo Summaries will be retained in [fxxt summaries] with combined weightings and marked as FXXT FINAL.

Generate Summary FXXT FINAL Hierarchical Associations

Use Case: FXXT FINAL Hierarchical Association Generation—Create weighted average summaries of FXXT FINAL hierarchical association data to conserve space and provide for map generation.

Generate a set of hierarchical association summary items calculated for each cnxpt. Each summary will be marked with a summary name, a 'dirtied' flag, a 'last calculated timestamp', an optional fxxt, an optional scopx, and a relationship identifier. Summaries will be retained in [hierarchical association summaries] and marked as FXXT FINAL.

Combine, by every combination of fxxt and scopx available within a cnxpt, all hierarchical associations from the cnxpt to another specific cnxpt. Place the FXXT FINAL hierarchical association into the [hierarchical association summaries] list for the cnxpt, assigning the fxxt, the scopx, and a single weight value which is the total calculated by a heuristic for a specific cnxpt pair as follows: sum the weights of all associations where the cnxpt being considered is holding the 'child' role and the opposite, 'parent' role is a specific cnxpt 'c'. Subtract from that sum the weights of all associations where the cnxpt being considered is holding the 'parent' role and the opposite, 'child' role is the same specific cnxpt 'c'. As an adjustable heuristic, divide the resulting weight by the number of associations considered for the cnxpt pair of the fxxt and scopx cnxpt and multiply that result by a system parameter setting factor chosen based upon the number of relationships summarized (1 initially)).

At each step, if more than one connected FXXT FINAL Hierarchical associations exists for any cnxpt pair within a fxxt, re-summarize the FXXT FINAL Hierarchical associations between that pair, summarizing their weights, subtracting the weight for each inbound FXXT FINAL Hierarchical association and adding weights for each outbound FXXT FINAL Hierarchical association according to the fxxt summarization heuristic if one is specified. If the weight of the combined inbound FXXT FINAL Hierarchical associations is greater than the weight of the combined outbound FXXT FINAL Hierarchical associations in the cnxpt pair for the fxxt, then merge the outbound FXXT FINAL Hierarchical associations into the inbound, and set the weight of the combined FXXT FINAL Hierarchical association to the summarized weight. If the weight of the combined outbound FXXT FINAL Hierarchical associations is greater than the weight of the combined inbound FXXT FINAL Hierarchical associations in the cnxpt pair for the fxxt, then merge the inbound FXXT FINAL Hierarchical associations into the outbound, and set the weight of the combined FXXT FINAL Hierarchical association to the summarized weight.

For efficiency, place a FXXT FINAL hierarchical association into the [hierarchical association summaries] list for the cnxpt which is opposite in the pair, setting its weight to the negative of the weight found above.

Generate Summary FXXT FINAL Affinitive Associations

Use Case: FXXT FINAL Affinitive association Summarization—Create weighted average summaries of FXXT FINAL affinitive association data to conserve space and provide for map generation.

Generate a set of affinitive association summary items calculated for this cnxpt. Each summary will be marked with a summary name, a 'dirtied' flag, a 'last calculated timestamp', an optional fxxt, an optional scopx, and a relationship identifier. Summaries will be retained in [affinitive association summaries] and marked as FXXT FINAL.

Combine, by every combination of fxxt and scopx available within a cnxpt, all affinitive associations from the cnxpt to another cnxpt. Place the association into the [affinitive association summaries] list as all Summary Affinitive associations for the cnxpt, assigning the fxxt, the scopx, and a single weight value which is the total calculated by a heuristic (initially, this heuristic will be the average weight of all the relationships of the type for that cnxpt multiplied by the number of relationships being summarized times a factor based upon the number of relationships (1 initially)).

'FXXT FINAL' Hierarchical Association Re-Summarization

Use Case: 'FXXT FINAL' Hierarchical Association Re-Summarization—Create weighted average summaries of 'FXXT FINAL' hierarchical association summaries to provide for re-extraction of fxxt tree.

Re-generate a set of hierarchical association summary items calculated for each cnxpt, specifically for a specified fxxt. Combine, for the fxxt considered, all hierarchical associations from the cnxpt to another cnxpt. This algorithm is necessary for NOT 'Easily Determined' Fxxt specification. In addition, in one embodiment, the Calculate Fxxt Trees for 'Easily Determined' Fxxts tree extraction algorithm below is re-executed based upon the result of this algorithm if any changes are made when this algorithm is executed outside of the context of the algorithms below and where the fxxt is marked 'Easily Determined'.

FXXT FINAL Summary Association Generation Algorithm

Combine by fxxt all summary associations with any single cnxpt into a single weighted value association.

Use Case: Fxxt Association (Re-)Summarization—Summarize the Associations in the fxxt to generate FXXT FINAL summary associations.

```
Resummarize_Hierarchical Assoc( ) {
    // Hierarchical Association Re-Summarization
    // see explanation
};
Resummarize_Affinitive_Assoc( ) {
    // Affinitive Association Re-Summarization
    // see explanation
};
```

System Functions—Ontology Manipulation for Mapping—Fxxt Specific Ttx Map Generation Based upon the final summaries of votes, map generation starts with extraction of trees from the directed graphs of cnxpt based ontologies by fxxt, with all hierarchical and affinitive summary associations as available within ANY fxxt being considered. After hierarchy extraction, the trees are processed for affinitive tensor generation. Then the trees are processed for cnxpt positioning.

Two major categories of algorithm are needed here, based upon the complexity of fxxt specifications implemented. The difference in 'easily determined' and "Complex Annealing" fxxt development algorithms is based upon the calculation structure in the fxxt specifications, especially where a trigger specification exists. If a cnxpt membership test for the fxxt is not dependent upon the fxxt of neighboring cnxpts or based upon whether an attached relationship is in a fxxt, the cnxpt's membership is 'easily determined'. If an association membership test is dependent only upon the fxxt of a cnxpt holding a role in the relationship, then the relationship's membership is 'easily determined'. If all specifications of the fxxt state 'easily determined' rules, then the fxxt is 'easily determined'. In most cases, if no triggering rules are present, then the fxxt is 'easily determined'. Otherwise it is a "Complex Annealing" fxxt development fxxt and marked NOT 'Easily Determined'. If the fxxt is 'easily determined', the 'Fxxt Calculation Script Interpretation' is complete upon entry to this step. If at some point in the execution of an algorithm to extract an 'Easily Determined' fxxt a condition is found in the fxxt specification that causes a recognition that the fxxt specification is NOT 'Easily Determined', the processing will cease and the fxxt will be marked NOT 'Easily Determined', and a "Complex Annealing" algorithm will execute instead on the fxxt.

For NOT 'Easily Determined' fxxt specifications, the 'Fxxt Calculation Script Interpretation' is not complete upon entry to this step, and thus the list of FXXT FINAL Hierarchical and Affinitive associations will grow (and possibly contract) as the "Complex Annealing" algorithm is executed and as steps in 'Fxxt Calculation Script Interpretation' are triggered and completed. This is difficult computationally, but in some instances may be beneficial. To perform these algorithms, a repetitive application of the FXXT FINAL Summary Association Generation steps above will be needed whenever the fxxt is expanded (or contracted). To maintain computability, constraints will be imposed upon the processing, such as, including but not limited to: 'no reversal of utilization of FXXT FINAL Hierarchical Associations once used'.

Fxxt Basic Descendant Spanning Tree Extraction

Use Case: Fxxt Descendant Tree Extraction—Extract trees from the directed graphs of cnxpt based ontologies by fxxt for map generation.

Form a spanning forest (called the Basic Descendant Spanning Forest) of the ontology, including spanning trees using FXXT FINAL summary hierarchical associations with weightings as relationships. Only specific types of cnxpts will be used in the Basic Descendant Spanning Forest and Trees. Other types may be added to form an Enhanced Descendant Spanning Forest. The scopxs and infxtypxs of relationships used to form the trees may be limited by the Fxxt Specification.

Introduction to Process

We are seeking a maximum weight forest of out-trees which is a sub-graph of the original graph, including all cnxpts as specified in the fxxt specification, if it exists. This is called a Maximal Branching or a Least Cost Branching. The trees in the forest are called Descendant Trees in this use. Though we are using a minimum cost spanning tree algorithm, the maximum vote tallies within the fxxt taken as a whole are being collected for relationships in the trees if the trees can be constructed properly using the relationships. The set of all relationships in the forest found is called a Robust Spanning Forest only if the sum of all relationship costs is the minimum for any possible spanning forests for the graph, and we do not know if the algorithm guarantees that the set of spanning trees found will be such a minimum. Other algorithms may be used. Kruskal's Algorithm has been utilized in some algorithms here.

We are also seeking to simplify the later process of generating Ascendant Trees. To aid in that process, we will retain the relationships that are placed in the priority queue but are not used to form the Descendant Trees. Some of those relationships—the ones that would cause cycles, are used to build a list of hyperlinks for the various visualizations for each tree found. The remainder are higher cost relationships that may help to form Ascendant Trees.

Presumptions:

1. We are using directed relationships with weights in the form of hierarchical associations with 'weights' (weights on relationships are equivalent to relationship 'strengths')—the 'costs' are essentially inverses of the calculated weights from voting results (or from certain formulas based upon Fxxt Specifications), so that a smaller value of cost is better for minimums. Only 'existing' relationships are used.

2. All relationships that exist have weights, but not all cnxpt pairs have relationships between them. Costs are available when needed due to the use of high value for the cost when no relationship and thus no weight is present.

3. Two or more cnxpts may be considered equivalent based upon special relationships or other criteria, and will be considered to be the same cnxpt in the formation of the Enhanced Descendent Spanning Forest.

4. We can expect a forest of trees as a result of the spanning algorithm.

5. We may have a default/distinct set of roots for the start of the process, only because we anticipate that in some fxxts that the cnxpts will be descendant from 'fields of study'. For axpts, application domain axpts are considered the root and individual application axpts are the leaves. For product lines, the product line axpt is considered the root and individual products or the tcepts the products are built upon may be the leaves. In a combined txpt and axpt, because of the matching of tcepts (or products) to appcept, product lines, or domains, various root and leaf configurations are possible. In some fxxts, we may not have any objective understanding of what roots will turn up.

This is a discovery process for finding those ancestors and updating the roots to add these new parents based upon the definition of the fxxt being extracted from.

Preliminary Steps

Fxxt tree extraction takes place in one of the following algorithms. For each, the presumption is that the all fxxt summaries, hierarchical associations, and affinitive associations are summarized by fxxt and cnxpt-pair initially. For the NOT 'Easily Determined' "Complex Annealing" algorithms, this is relaxed as cnxpts and associations may be marked or unmarked as the tree is constructed coincidentally with the interpretation of the fxxt specification.

Derivation Tree Creation

In the following, for efficiency, form and retain derivation trees on all fxxt calculation specifications. Then, order the fxxts, so that all non-base fxxts based upon "Complex Annealing" fxxt development algorithms are calculated after those based upon 'easily determined' calculations.

Determine Fxxt Type to Select Applicable Algorithms

Use Case: Find 'Easily Determined' Fxxt Types—Check each Fxxt Calculation Step to determine if it is 'Easily Determined' and mark the fxxt as 'Easily Determined' if all Fxxt Calculation Steps are 'Easily Determined'.

Perform the following for each fxxt. If the fxxt has no specifications, mark it as a 'base' fxxt and as 'Easily Determined'. For each fxxt with specifications, 1) if the fxxt has any specification that tests a cnxpt for membership and relies on fxxt membership of an attached relationship or a neighbor cnxpt to determine cnxpt membership, mark the fxxt as NOT 'Easily Determined'; and 2) if the fxxt has a specification that tests an association for membership and relies on fxxt membership of a cnxpt holding a role in the relationship, mark the fxxt as NOT 'Easily Determined'; otherwise, mark the fxxt as 'Easily Determined'.

Effective Weight Determination for Hierarchical Relationship Candidates

In nearly all of the algorithms for Fxxt Tree Extraction, the algorithm requires a choice of FXXT FINAL summary hierarchical association to be used for choosing the next parent or representative of a set of children cnxpts. This set of procedures provides the algorithm for that determination. Each operates to reorder the queue of the potential parents/representatives.

Use Case: Effective Weight Determination for Relationship Candidates—Determine the effective weight of the candidate relationships to choose how to grow the fxxt tree.

Find the 'candidate' with the highest 'effective' weight for a cnxpt so that the next hierarchical tensor created would be the best choice within the ability of the algorithm. The effective weight determination heuristic used in the following is determined by a setting of a system parameter or a fxxt setting.

Use Case: Effective Weight Determination Heuristic 1. Simple Weight determination—Use the weighting of one level of summary hierarchical associations only.

For each of the candidate FXXT FINAL summary hierarchical associations in the 'candidate' list, find the 'effective' weight from the weight on the summary hierarchical association. Reorder the priority queue based upon the highest of the 'effective weights' found for each cnxpt.

Use Case: Effective Weight Determination Heuristic 2. One-level Lookahead—Use the weighting of two levels of summary hierarchical associations to improve the choice of a next cnxpt for the tree.

For each of the candidate FXXT FINAL summary hierarchical associations in the 'candidate' list, find a similar list of '1-lookahead candidate' FXXT FINAL summary hierarchical associations from the cnxpt having a child role in the relationship. Following a heuristic for assessing an 'effective weight', combine the weight of the 'candidate' relationship and the 'summarized' '1-lookahead candidate' weights to obtain an 'effective' weight for the 'candidate'. (Note that this summation will include all weight reductions caused by reverse direction summary hierarchical associations which would potentially be cycles, where the 'child' of the relationship is 'closer' to the root.) In one embodiment, the 'summarized weight' would be a sum of the weights of the '1-lookahead candidate' relationships. In one embodiment, the 'summarized weight' would be the highest of the weights of the '1-lookahead candidate' relationships. In one embodiment, the heuristic would be based upon a combination of these metrics.

Reorder the priority queue based upon the highest of the 'effective weights' found for each cnxpt.

Use Case: Effective Weight Determination Heuristic 3. N-level Lookahead—Use the weighting of n levels of summary hierarchical associations to improve the choice of a next cnxpt for the tree.

For each of the candidate FXXT FINAL summary hierarchical associations in the 'candidate' list, find a similar list of '1-lookahead candidate' FXXT FINAL summary hierarchical associations from the cnxpt having a child role in the relationship. For n>1, for each of the '1-lookahead candidate' FXXT FINAL summary hierarchical associations in the '1-lookahead candidate' list, find a similar list of '1-lookahead candidate' FXXT FINAL summary hierarchical associations from the cnxpt having a child role in the relationship (these are '2-lookahead candidate' FXXT FINAL summary hierarchical associations). Repeat the process for n levels.

Working from the n−1th level up, following a heuristic for assessing an 'effective weight' for the leg, combine the weight of the 'candidate' relationship (the (ith)-lookahead candidate, where i is the loop variable and starts at n−1) and the 'summarized' '1-lookahead candidate' (the (i+1th)-lookahead candidate) weights to obtain an 'effective' weight for the 'candidate' (the (ith)-lookahead candidate). (Note that this summation will include all weight reductions caused by reverse direction summary hierarchical associations which would potentially be cycles, where the 'child' of the relationship is 'closer' to the root.) Then repeat the summarization at the next level upward until completed for the candidate relationship. In one embodiment, the 'summarized weight' would be a sum of the weights of the '1-lookahead candidate' relationships. In one embodiment, the 'summarized weight' would be the highest of the weights of the '1-lookahead candidate' relationships. In one embodiment, the heuristic would be based upon a combination of these metrics.

Reorder the priority queue based upon the highest of the 'effective weights' found for each cnxpt.

Create Next Hierarchical Tensor

In all of the algorithms for Fxxt Tree Extraction, the algorithm requires a choice of the next parent or representative of a set of children cnxpts. This set of procedures provides the algorithm for establishing the chosen cnxpt as the parent/representative. For each cnxpt (the 'selected parent') chosen, perform the following.

Use Case: Create Next Hierarchical Tensor—Choose a 'candidate' hierarchical association and generate a hierarchical tensor into the fxxt.

Select the highest 'effective' weighted 'candidate' FXXT FINAL summary hierarchical association and attach a hierarchical tensor to the 'candidate' relationship's 'child' cnxpt with a cnxpt identifier of the 'selected parent' and setting the proper heuristic and infxtypx, setting the proper depth, setting the summary basis role with the identifier of that FXXT FINAL summary hierarchical association, and the same weight as that FXXT FINAL summary hierarchical association. Attach a child tensor to the 'selected parent' with a cnxpt identifier of the 'candidate' relationship's 'child' cnxpt and setting the proper heuristic and infxtypx, setting the proper depth, setting the summary basis role with the identifier of that FXXT FINAL summary hierarchical association, and the same weight as that FXXT FINAL summary hierarchical association. Remove that 'candidate' FXXT FINAL summary hierarchical association from the list, setting its heuristic status accordingly.

Depending upon a system parameter setting guiding use of a heuristic, or for the heuristic setting in a fxxt specification, either continue marking children for 'selected parent' cnxpt, or change 'selected parent' cnxpt.

Use Case: Heuristic A. Mark All Children for 'selected parent'—Continue to mark from each 'selected parent' until all 'children' of the 'selected parent' are marked, then choose another 'selected parent'.

Use Case: Heuristic B. Mark One Child for 'selected parent'—Mark only one new tree branch from any 'selected parent', then make a new choice for a 'selected parent'.

Find 'Candidate' Relationships for 'Selected Parent' Cnxpts

In each algorithm for tree extraction, a 'Candidate' list of summary hierarchical associations is formed. The procedure to do so is dependent upon whether the fxxt is 'Easily Determined'. The following describes the process in general.

Use Case: Form 'Candidate' list of summary hierarchical associations of 'Selected Parent' cnxpt—Determine the set of 'candidate' FXXT FINAL summary hierarchical associations that already exist in the fxxt and were not created by a 'Fxxt Member Marking' procedure prior to the 'start point'.

More than one such 'candidate' may exist. Add to the list any FXXT FINAL summary hierarchical association that should also exist in the fxxt based upon the fxxt specification (this may stem from changes caused by this procedure where the fxxt is NOT 'Easily Determined').

Remove from that list any summary hierarchical associations which should not exist in the fxxt based upon the fxxt specification (this may stem from changes caused by this procedure where the fxxt is NOT 'Easily Determined').

If the hierarchical association forms a cycle reject it. If it is to an interior child, reject it, but save it as a hyperlink. This includes all summary hierarchical associations for which the cnxpt in the child role has already been connected with any other cnxpt by a hierarchical tensor in this fxxt with a timestamp later than the 'start point' (and not 'dirtied'). Then, delete each such association from the list (but not from the CMMDB).

In one embodiment, if there are no summary hierarchical associations remaining in the list, then the cnxpt is to be removed from the priority queue, and the heuristic status for it is to be marked as completed for this stage of the heuristic. In one embodiment, the cnxpt remains in the queue for a later re-check until no cnxpts are found to have remaining 'candidate' FXXT FINAL summary hierarchical associations. In one embodiment, the cnxpt remains in the queue for a later re-check until no cnxpts in the queue at the same depth are found to have remaining 'candidate' FXXT FINAL summary hierarchical associations.

'Easily Determined' Fxxt Analysis

'Easily Determined' Fxxt Member Marking

Use Case: Calculate Fxxt Membership for Cnxpts in 'Easily Determined' Fxxts—For all cnxpts within an 'Easily Determined' fxxt, find and mark the unmarked cnxpts with a fxxt summary item to mark the cnxpt as being a member within a fxxt.

The result of this procedure will be the marking of a tree involving all potential cnxpt members of the fxxt and all hierarchical associations pertinent to that structure and within the fxxt. Also, all lower weighted hierarchical associations pertinent to the fxxt will become otherwise meaningless. In some variants of this procedure, lower weighted hierarchical associations will have been considered in the choice of branches for addition.

This procedure operates on a matrix, possibly sparse, of cnxpt info-item identifiers (rows) and fxxts (columns). For each 'base' fxxt, and then for each (other) 'Easily Determined' fxxt, perform the following procedure.

Generate a 'start point' timestamp and mark the fxxt txo with that timestamp to show that the process is restarted. For a selected fxxt, 'effectively' delete all existing hierarchical tensors and child tensors within the fxxt. (This is done by setting timestamps in the LAST cycle and using them to detect 'dirty' tensors as 'deleted' in THIS cycle.) Also, reset all heuristics statuses for the fxxt and the heuristics described here.

Find all cnxpts that have not been marked as being a member of the fxxt (have no fxxt summary item for the fxxt or have a fxxt summary item that was formed from a 'Fxxt Member Marking' procedure prior to the 'start point' timestamp, or was "DIRTIED"), and perform the test for fxxt membership stated in the specifications for the fxxt. If a cnxpt is found to be an appropriate member of the fxxt, create a fxxt summary item for the fxxt on that cnxpt, marking the fxxt summary item with a timestamp later than the 'start point' timestamp, clearing the 'DIRTIED' and 'calculated but rejected' flags, setting the fxxt, and marking its heuristic as this 'Fxxt Member Marking' procedure.

If the cnxpt is found NOT to be an appropriate member of the fxxt, create a fxxt summary item for the fxxt on that cnxpt, marking the fxxt summary item with a timestamp later than the 'start point' timestamp, clearing the 'DIRTIED' flag, SETTING the 'calculated but rejected' flag, setting the fxxt, and marking its heuristic as this 'Fxxt Member Marking' procedure.

Use Case: Calculate Fxxt Membership for Relationships in 'Easily Determined' Fxxts—For all hierarchical summary associations within an 'Easily Determined' fxxt, mark the unmarked relationships by generating a new copy of the hierarchical summary associations with the fxxt.

Find all cnxpt pairs where each cnxpt is in the fxxt and a hierarchical summary association exists between the cnxpts that has not been marked as being a member of the fxxt, but appears to meet criteria to meet a fxxt specification for the fxxt, and perform the test for fxxt membership stated in the specifications for the fxxt on the relationship. If a hierarchical summary association is found to be an appropriate member of the fxxt, generate a new copy of the hierarchical summary association with the new fxxt, marking the relationship as a FXXT FINAL hierarchical summary association with a timestamp later than the 'start point' timestamp, setting the summary basis role to be the original hierarchical summary association, and marking its heuristic as this 'Fxxt Member Marking' procedure. Add the FXXT FINAL hierarchical summary association in the fxxt to a candidate hierarchical association priority queue for the fxxt, retaining a weight-child sorting on the queue as described below.

Calculate Fxxt Trees for 'Easily Determined' Fxxts

Use Case: Calculate Fxxt Trees for 'Easily Determined' Fxxts—For all cnxpts within an 'Easily Determined' fxxt, find and mark the unmarked cnxpts (those not having an attached hierarchical or child tensor with that fxxt and a timestamp later than the 'start point' timestamp) with a hierarchical tensor and/or child tensors.

Use Case: Generate Hierarchical Tensors to Form Spanning Trees—For each fxxt, create weighted hierarchical tensors to point specifically to at most one parent cnxpt in any fxxt to provide for map generation.

Generate hierarchical tensors by fxxt to make up the backbone of a spanning forest for the fxxt. The tensors will be between a parent and a child cnxpt, to encapsulate and summarize into a single weighted value hierarchical relationship all of the appropriate highest relationship importance (strength, relevance) association data. In addition, a list of redundant hierarchical associations will be constructed to utilize in building enhanced trees containing alias-hyperlinks for cnxpts. A second list may be built containing hierarchical associations not properly fitting the fxxt, as errors.

Fxxt Tree Extraction—Algorithm 1—for 'Easily Determined' Fxxted Ontology—Union-Find Use Case: Fxxt Tree Extraction—Algorithm 1—Union-Find—Extract trees from the directed graphs of cnxpt based ontologies by fxxt for map generation, where the subtrees are generated by Union-Find, root cnxpts are not processed first, and the algorithm is constrained for use to where Extension Fxxt Calculation Steps are not used.

Union-Find Structure

The following algorithm makes use of a union-find structure for partition oriented fxxt tree extraction to improve the processing efficiency. The n-lookahead ability of the partitioning algorithm improves the result.

Partitions

A partition is a set of sets of elements of a set.

- Every element of the set belongs to one of the sets in the partition,
- No element of the set belongs to more than one of the sub-sets, In other words, every element of a set belongs to one and only one of the sets of a partition.

The forest of trees F is a partitioning of the original set of cnxpts. Initially all the sub-sets have exactly one cnxpt in them, and we call that sub-set a forming tree. After initiation, on each processing cycle in the algorithm, the forming tree is built from a generated hierarchical tensor, the cnxpts in one tree called the joined subtree where the representative is the root and that root cnxpt is in the child role of the hierarchical association being used as the basis of the generated tensor, and another tree called the joined supertree where the cnxpt joined at is in the parent role of the hierarchical association being used as the basis of the generated tensor. A generated tensor thus links two subtrees together into the forming tree. The hierarchical association used as the basis of the tensor is called the generating association. The highest weighted hierarchical associations are used first, so that the partitioning and the extracted tree are the 'best' available given the information available for the fxxt. As the algorithm progresses, the unions of two of the trees (sub-sets), until eventually the partitioning has only one sub-set containing all the cnxpts, or no more unions are possible.

Algorithm Theory

A partitioning of a set creates a set of equivalence classes. In the tree extraction algorithm here, each sub-set of the partitioning contains a set of 'equivalent' elements: the cnxpts connected into one of the trees of the forest. For each sub-set, we denote one element as the representative of that sub-set or equivalence class: it is, importantly, the root of the subtree. Each element in the sub-set is equivalent in that they are all represented by the nominated representative because they are all descendants of that representative or are the representative itself.

As elements are added to a subtree, all the elements point to their representative directly or indirectly due to prior additions. As we form a union of two sets, or two trees here, by the definition of the addition, the representative of one of the sets is set to become a child of one of the elements of the other set, forming a branch on the tree of the other set, not necessarily at a leaf. The representative tests disallow cycles to form because no cnxpt can have more than one representative. This notion is the key to the cycle detection algorithm. Efficient structures are used to apply representative updates when trees are joined.

Each cnxpt will have a representative locator. Initially, each cnxpt is its own representative, so the locator is set to NULL. As the initial pairs of cnxpts, stated as roles of the generating hierarchical association, are joined to form a tree, the representative locator of the cnxpt in the child role of the hierarchical association is made to point to the representative of the cnxpt in the parent role of that association, which becomes the representative of all of the new tree. As trees are joined, the representative locator of the representative of the tree becoming a sub tree is set to point to any element (here, at least the joining element) of the other tree (forming an indirect representation). (Obviously, representative searches will be somewhat faster if one of the representatives (the representative of the subtree) is made to point directly to the other (the representative of the supertree).) Here, at the same time, a hierarchical tensor is created from the hierarchical association between the (old) representative (the root) of the subtree—the child cnxpt of the hierarchical association—to the cnxpt just becoming the direct parent of the subtree—the parent cnxpt of the hierarchical association.

The search for the representative simply follows a chain of links. This test (by itself) is faster if additional, redundant links are inserted for direct links to the representative, and which are changed when a new representative is found and utilized (becoming the new root of the new parent set).

A priority list of candidate hierarchical associations for the fxxt is formed from the FXXT FINAL Importance and Processing of Excess Hierarchical Associations Excess hierarchical associations will exist in the queue. During the checking of hierarchical associations, those found to be improper for use as generating associations (joining relationships) must be eliminated The additional hierarchical associations have value as well, even if they are not the basis for generating a hierarchical tensor. The additional associations may indicate either alias-hyperlink situations or simply relationships which would be cycles if carried into the extracted tree for the fxxt. (A cycle in a tree is indicated where a cnxpt in the generating hierarchical association parent role is actually a child of the cnxpt in the child role in the tree as thus far extracted.) The cycle forming associations are all removed by the tree extraction algorithms, and only those indicating alias-hyperlinks are useful in the Enhanced trees.

The removal of the hierarchical association which are not used for generating tensors is differentiated by whether the parent is in the same or another ‘set’ or tree. The test for a cycle reduces to: for the two cnxpts at the ends of the candidate hierarchical association, find their representatives. If the two representatives are the same, the two cnxpts are already in a connected tree and adding this relationship might form a cycle. If a cycle would not be formed, the hierarchical association indicates an alias-hyperlink.

Efficient Testing for Cycles

Implementing this algorithm efficiently is paramount. If the priority queue of hierarchical associations is ordered by weight rather than by child or parent, there is no alternative but that analysis of associations with lower weights is delayed. If both roles of the association are in the same set, either a lookahead in the queue is required or a determination of pedigree of the parent is required, since the cnxpt in the parent role of the association may or may not be a descendent, in the new extracted tree, of the cnxpt in the child role of the association. If it is a descendent, then a cycle is indicated. If it is not a descendant, then it is a low weight hierarchical association between an (great) uncle of the child, and an alias-hyperlink, wholly in the sub-tree, should be formed.

For the alias-hyperlinks found after a series of tests for cycles, the algorithm testing for the cycle will likely end only after reaching the representative of the sub-tree or primary root level of the forest if all other edges have higher weights.

Weight-Child Sorted Priority Queue

The priority queue of hierarchical associations is sorted by weight and child combined, so that the highest weight hierarchical association for any child is in front of all of the other hierarchical associations for that child, but all hierarchical associations for any child are listed adjacent to one-another, and the highest weight hierarchical association of any child is first, and the highest weight hierarchical association of the remaining children is listed after the last association for the first child and so forth.

The result of weight-child ordering is that any non-cycle causing hierarchical association will generate a list item in the hyperlinkAssocs list efficiently because such hierarchical associations will be caught before they are buried in the tree where a cycle test would then require extensive processing.

If the representative of the cnxpts in both roles of a hierarchical association under consideration, but not the generating hierarchical association, are different before the representatives in the subtree are changed to be the representative of the supertree due to the generating association, but the representatives of the cnxpts in both roles are the same after the representatives are reset, then the hierarchical association is a cycle if the child role cnxpt is in the supertree, but an alias-hyperlink if the child role cnxpt is in the subtree. This is easy to determine for those candidate hierarchical associations with a child just being processed for generating.

Some candidates cannot be tested at that point and must wait. If the representative of the cnxpts in both roles of the association are different, then it is still possible that the parent's representative will become a child of a cnxpt in the tree with the child's representative, and will thus form a cycle at a later processing step, and cannot be tested at this point. Those candidates of this nature are put into a re-try queue sorted by ascending parent ID, then child ID for testing when either of the association's cnxpts' representative is going to be changed during generation so that the representative of the parent role cnxpt becomes the same as the representative of the child role cnxpt. The representative of the cnxpts at the time of placement onto the re-try queue is saved with the entry.

If a hierarchical association is found where the representative of the re-try association has a representative for the child role which is the representative for a sub-tree being attached, and the representative of the parent role cnxpt is in the super tree, then it is moved to the hyperlink list. If a hierarchical association is found where the representative of the re-try association has a representative for the parent role which is the representative for a sub-tree being attached, and the representative of the child role cnxpt is in the supertree, then it is moved to the cycles list. Otherwise, it remains in the re-try queue. If it is still in that queue when the full extraction is complete and all tensors are created, then it is tested to be sure that the representatives of the role cnxpts are different, and each association is placed into the alias-hyperlink list as they do not represent cycles. If the representatives are the same, something is wrong with the algorithm or processing, but they are added to the cycles list.

Use Case: Build and Reorder Hierarchical Association Priority Queue—Create or reorder the Hierarchical Associations priority queue by weight—child method.

```
Queue ConsHierAssocQueue ( fg ) {
    // Hierarchical Association Construction by weight - child method
    // See above for steps
};
Queue reorderHierAssocQ(Queue hierAssocQ) {
    /* Order the queue by weight-child */
    (straightforward programming)
};
```

Algorithm

This algorithm creates a forest of trees from the ontology based upon the set of FXXT FINAL Hierarchical associations and the set of cnxpts (NT—the cnxpts which are members of a fxxt) resulting from Fxxt Specification analysis. Trees are formed by generating Hierarchical tensors between 'parent' cnxpts outside of a tree to a 'representative' root of another tree to form multiple cnxpt trees from single cnxpt trees (or other multiple cnxpt trees). (Hierarchical tensors as implemented here are 'from parent' tuples attached to a 'parent' cnxpt, and 'to child' tuples attached to a 'child' cnxpt, but the tensors could be implemented as relationships equivalently.)

A fxxt includes FXXT FINAL Hierarchical associations and cnxpts as members. The direction value of FXXT FINAL Hierarchical associations is set by the order of roles and thus role occupants are 'parent' or 'child'. (FROM' implies 'parent') Each FXXT FINAL Hierarchical association will have an associated cost based upon the additive inverse (negative) of the weight (the lower the total weight, the greater the cost). A cost premium may also be given in to each element, such as for elements other than the first in some test, the cost premium may be used to prioritize the order of tree building.

The algorithm demands that only one FXXT FINAL Hierarchical association summary exists between any two cnxpts. Re-summarize immediately before execution if needed, but no re-summarization during the execution is allowed as it would invalidate the tree extraction.

(No notion of equivalence sets is necessary in this algorithm because categories are already marked and all cnxpts are differentiable.)

All alias-hyperlinks from 'multiple parent' cnxpts are found, and saved into a list. In a later step, special alias—hyperlink object dxo may be inserted into the fxxt specific forest underlying the map prior to positioning cnxpts. (Note that without having a 'referenced cnxpt' in place for an alias—hyperlink, the calculation process for weights would not be able to utilize the cnxpts.) Similarly, other dxos and txos are added to the map and relationships between them (and between them and cnxpts) are used to generate positioning tensors.

The steps are:

1. The forest is constructed—with each cnxpt in a separate tree—either based upon Fxxt Specification or without one. (Cons Forest)

Initially the forest consists of n single cnxpt trees (and no hierarchical tensor relationships) where each cnxpt is in NT. Each cnxpt is the representative of the tree initially. Cnxpts may lose their status as representatives, in this algorithm, when the tree which they represent becomes a subtree of another tree. Cnxpts may be category or non-category Clean cnxpts, but this is irrelevant to the algorithm since the fxxt is a subset of the CMM.

2. The FXXT FINAL Hierarchical associations are placed in a priority queue. (ConsHierAssocQueue).

Create a priority queue of summarized FXXT FINAL Hierarchical associations in the fxxt, ordering them by increasing cost (decreasing weight), and by child, as above. Each queue element represents a FXXT FINAL Hierarchical association with its cost and weight values.

3. Until we've added n−1 FXXT FINAL Hierarchical associations or none remain in the priority queue, Reorder the priority queue if needed to keep the lowest cost (highest weight) association first in the queue, whenever any hierarchical association is removed from the queue. (Note that if a hierarchical association is tested and not found to be generating, or is removed after it has generated a tensor, then it may be followed by others with the same child, and those may have lower weights than other later associations in the queue order. This must be adjusted. Also, if the association is used for generating, then the other associations for the same child role cnxpt cannot be used for generating, and must also be removed from the queue.)

A. Extract the cheapest FXXT FINAL Hierarchical association from the queue, (ExtractCheapestHierAssoc)

Test the cheapest summarized FXXT FINAL Hierarchical association (greatest positive weight FXXT FINAL Hierarchical association) to determine if it can generate a hierarchical tensor into the extracted fxxt to show an edge due to the hierarchical association. It must have:

A child role held by a cnxpt that is the representative (the current 'root' of a tree), and A parent role held by a cnxpt not in the same tree.

B. If test is passed, add a hierarchical tensor for the association as an edge between the parent role cnxpt and its supertree and the child role cnxpt and its subtree in the forest. Adding it to the forest will join two trees together where the connection is to a proper subtree.

Then delete each such association from the priority queue (but not from the CMMDB).

Then process all other hierarchical associations with the same child role cnxpt still on the priority queue, either adding them to the hyperlinkAssocs list, HierAssocsCycles list—residualHierAssocs list, or the re-try queue, and deleting each such association from the priority queue (but not from the CMMDB). When placing onto the re-try queue, save the current representative IDs for each role with the entry as a part of the queue entry tuple.

Then reset the representatives for the subtree, not changing the representative saved in re-try queue entries, but changing the representative on the cnxpts themselves.

Then process all re-try queue entries having a parent or child representative that has changed in this generating step to determine if the hierarchical association has become an indication of a cycle so that it can be discarded by adding it to the HierAssocsCycles list, if merely redundant it is added to the residualHierAssocs list, or if the hierarchical association is clearly an indication of an alias-hyperlink so that it can be placed into the hyperlinkAssocs list. If the hierarchical association has been placed onto a list, delete it from the re-try queue. If not, then change the saved representative for the list entry to its new representative.

C. If the hierarchical association being considered (the highest weight hierarchical association of those where the child role is a certain cnxpt, and the highest weight hierarchical association still in the priority queue) is to an interior child of the subtree (the child role cnxpt is a non-root cnxpt in the subtree), reject it for tensor generation, but check it for use to indicate a hyperlink or if it forms a cycle:

If the hierarchical association is already an indication of a cycle, discard it by adding it to the HierAssocsCycles list. This is only where a parent role is held by a cnxpt in the same extracted tree as the cnxpt holding the child role, and the parent is a descendent, in that tree, of the child.

If the hierarchical association is clearly an indication of an alias-hyperlink, place it into the hyperlinkAssocs list. This is only where a parent role is held by a cnxpt in the same extracted tree as the cnxpt holding the child role, where the parent is NOT a descendent, in that tree, of the child.

Otherwise, add the hierarchical association to the re-try queue.

In any case, then delete each such hierarchical association from the priority queue (but not from the CMMDB).

D. In any case, then re-sort the priority queue.

4. Process all remaining entries in the re-try priority queue to determine if the entry indicates a hyperlink or forms a cycle.

If the hierarchical association is already an indication of a cycle, discard it by adding it to the HierAssocsCycles list. This is only where a parent role is held by a cnxpt in the same extracted tree as the cnxpt holding the child role, and the parent is a descendent, in that tree, of the child.

Otherwise, place it into the hyperlinkAssocs list.

In any case, then delete each such hierarchical association from the re-try priority queue (but not from the CMMDB).

Note that if a FXXT FINAL Hierarchical association does not exist where the representative of a (sub)tree is the child, then the tree is NOT a subtree in the fxxt, even if another cnxpt in that tree is in the child role on another FXXT FINAL Hierarchical association. Such FXXT FINAL Hierarchical associations are used to indicate the presence of that cnxpt as an alias-hyperlink in the tree where the cnxpt in the parent role of the FXXT FINAL Hierarchical association sits.

Use Case: Create Next Hierarchical Tensor for Union-Find 'Easily Determined' Fxxt—Choose a 'candidate' hierarchical association and generate a hierarchical tensor into the fxxt.

Generate a tensor from the chosen and utilized FXXT FINAL Hierarchical association a hierarchical tensor that joins the two trees together. (This eliminates the 'representative' status of the 'child' cnxpt.) Perform the process in Create Next Hierarchical Tensor for 'Easily Determined' Fxxt. Depths cannot be determined at generation of the tensor in this algorithm, so they must be left blank until a later walk of the tree.

Delete the chosen and utilized hierarchical association from the priority queue (but not from the CMMDB).

4. Save all remaining queued FXXT FINAL Hierarchical associations for use in Ascendant Tree formation.

When complete, every algorithm interior step will have joined two trees in the forest together forming Hierarchical Tensors, or will discard a cycle, so that at the end, the highest weighted associations will be used to generate the least number of trees possible into F. A list of hyperlink associations is created. A residual list of FXXT FINAL Hierarchical associations is also created, but no entries are anticipated as it would show an error.

The basic 'Easily Determined' fxxt algorithm is:

```
Cnxpt HierAssocGenTest(HierarchicalAssoc e, Forest F ) {
/* Return representative of the supertree holding e's parent role cnxpt if e's child role is held by a cnxpt that is the
representative (the current 'root') of some tree, and e's parent role is held by a cnxpt in another tree (the supertree). */
/* parentCnxptRepresentativeis the representative of the parent role cnxpt of the hierarchical association */
/* Return Null if e is null, or if both ends of e are in the same tree in F or if e's child role cnxpt is not the representative of
any tree (it must then be an internal cnxpt of some tree) */
   Cnxpt childCnxpt, child PriorCnxpt;
   Cnxpt parentCnxpt;
   Cnxpt childCnxptRepresentative;
   Cnxpt parentCnxptRepresentative;
   if (e == null) break;
   childCnxpt = e.child;
   parentCnxpt = e.parent;
   parentCnxptRepresentative= CnxptRep ( e, F, "Parent"); /* find representative for the Hierarchical Association
Parent role cnxpt */
childCnxptRepresentative = CnxptRep ( e, F, "Child"); r find representative for the Hierarchical Association child
role cnxpt */
   if (parentCnxptRepresentative != childCnxptRepresentative)
   {/* not a possible cycle */
     if (childCnxptRepresentative == childCnxpt)
     }
       return parentCnxptRepresentative;
     };
   };
   return null;
};
//
Cnxpt repCycle(HierarchicalAssoc e, Forest F ){
/* Return representative of tree if e's child role is held by a cnxpt that has the same representative as the representative of
e's parent role cnxpt and the parent role cnxpt is a descendant of the child role cnxpt in the same tree. */
   Algorithm: ---- climb hierarchical tensors forming extracted tree toward the root of the tree starting at the tensor
having a child role cnxpt which is the same as the parent role cnxpt of the hierarchical association e, and return true if the
child role cnxpt of the hierarchical association e is encountered as the parent role cnxpt of a hierarchical tensor on the
path.
};
//
Null SetRepresentative (Forest F, Cnxpt parentTreeRep, Cnxpt childTreeRep ){
/* sets the new 'representative' for cnxpts in newly added sub-tree, currently represented by childTreeRep, to the
'representative' of the tree being added onto, now represented by parentTreeRep */
        /* in one embodiment, sets only the representative of the join point, since it is more efficient than
```

```
changing all nodes */
   Algorithm: ---- walk the subtree changing all representatives to parentTreeRep where they are presently set to
childTreeRep ---
};
null addRetryHierAssoc (Queue retryQ, HierarchicalAssoc e, Cnxpt parentCnxptRep, Cnxpt childCnxptRep){
/* optimally for later comparisons, sorting by parent then by level of child would be best, but the level of child is going to
change too often, so optimality is lost. */
   HierarchicalAssoc qe;
   do {
      qe = retryQ.Next( );
      if (qe.parent < parentCnxptRep) continue;
      if ((qe.parent = parentCnxptRep) && (qe.child < childCnxptRep)) continue;
      break;
   }while ( (qe.parent <= parentCnxptRep) && (qe != null) && retryQ.hasNext( ));
   retryQ.InsertBefore (e, parentCnxptRep, childCnxptRep);
   return;
};
//
//
Forest Minimum FxxtedSpanningTree ( FxxtedGraph fg, Fxxt fxxt, List residualHierAssocs, List HierAssocsCycles, List
hyperlinkAssocs ){
   Forest F;
   Cnxpt childCnxpt;
   Cnxpt parentCnxpt;
   Cnxpt childNonGenCnxpt;
   Cnxpt parentNonGenCnxpt;
   Cnxpt childCnxptRep;
   Cnxpt childNonGenCnxptRep;
   Cnxpt childRetryCnxptRep;
   Cnxpt parentCnxptRep;
   Cnxpt parentNonGenCnxptRep;
   Cnxpt parentRetryCnxptRep;
   Boolean assocType;
   Queue hierAssocQ;
   Queue retryQ;
   HierarchicalTensor tE;
   HierarchicalAssoc e;
   /* Build Initial objects for a fxxt */
   F = ConsForest( fg ); /* Build Initial Forest F */
   hierAssocQ = ConsHierAssocQueue ( fg ); /* Build priority queue hierAssocQ */
   /* clear external lists */
   set_empty(residualHierAssocs); /* remove all entries */
   set_empty(HierAssocsCycles); /* remove all entries */
   set_empty (hyperlinkAssocs); /* remove all entries */
   n = CnxptCount(F);
   i=0;
   fail_on_fxxt_complexity = FALSE;
   do {
      e = ExtractCheapestHierAssoc ( hierAssocQ );
      if (e == null) break;
      childCnxpt = e.child;
      parentCnxpt = e.parent;
      childCnxptRep = CnxptRep ( e, F, "Child"); /* find representative for the Hierarchical Association child role
cnxpt */
      parentCnxptRep = CnxptRep ( e, F, "Parent"); /* find representative for the Hierarchical Association parent role
cnxpt */
      /* */
      /* test if hierarchical association is forming cycle or is redundant as it is joining two cnxpts in the same tree */
      if (HierAssocGenTest ( e, F) != null)
      {
         /* Parent Representative is different from Child, and Child is root of tree, so generate */
         if (Fxxt_NOT_EASY_test( ))
         {
            fail_on_fxxt_complexity = TRUE;
            break;
         };
         AddHierTensor ( F, e ); /* add the association into the fxxt by creating a hierarchical tensor. */
         /* retain cost and weight on e */
         i++;
         hierAssocQ.remove (e); r remove generating association from queue after adding tensor */
         /* */
         /* Other hierarchical associations with the same child role cnxpt are NON-GENERATING */
         /* Must process before representatives change on subtree being added to forming tree
         /* Process all NON-GENERATING hierarchical associations with the same child role cnxpt */
         /* MUST remove all NON-GENERATING hierarchical associations with the same child role cnxpt */
         do {
         /* process all other hierarchical associations with the same child role cnxpt after generating tensor */
         /* process all other hierarchical associations with the same child role cnxpt still on the priority queue,
either adding them to the hyperlinkAssocs list, HierAssocsCycles list, residualHierAssocs list, or the re-try queue, and
```

-continued

```
deleting each such association from the priority queue (but not from the CMMDB). When placing onto the re-try queue,
save the current representative IDs for each role with the entry. */
        child NonGenCnxpt = null;
        e = ExtractCheapestHierAssoc ( hierAssocQ );
        if (e == null) break;
        child NonGenCnxpt = e.child;
        if (childNonGenCnxpt != childCnxpt) break;
        parentNonGenCnxptRep = CnxptRep ( e, F, "Parent"); /* find representative for the Hierarchical
Association Parent role cnxpt */
        childNonGenCnxptRep = childCnxptRep; /* USE OUTDATED representative for the Hierarchical
Association Child role cnxpt */
        /* remove as many of thenon-generating hierarchical associations to the hyperlink or residuals lists
as possible */
        /* was non-generating Hierarchical Association Parent in child cnxpt tree prior to generation? */
        if (parentNonGenCnxptRep == childCnxptRep)
        {
           /* definite cycle because now we know that child was root of that subtree /
           /* cycle found */
           addRedundantHierAssoc (HierAssocsCycles, e);
        }
        /* was non-generating Hierarchical Association Parent in Parent cnxpt tree prior to generation? */
        elseif (parentNonGenCnxptRep == parentCnxptRep)
        {
           /* NOT any possible cycle, since parent could not be descendant of child, since it was not in
that tree before and that tree is now descendant of some leaf of the parent's tree */
           /* note that this saves the parent and relationship scopx and infxtypx */
           /* note that this implies that we cannot tell if the parent is a direct ascendant of the child -- we
may have an issue but it is not major */
           addRedundantHierAssoc (hyperlinkAssocs, e);
        }
        /* non-generating Hierarchical Association Parent was not in same tree as child before or after
generation!!!!! */
        else
        { /* Parent and Child are Not in same tree -- */
           /* these are added into the retryQ because we cannot determine if the hierarchical association
will form a cycle or not in a later generation step */
           /* note that this saves the current parent and child representatives as part of the tuple for the
queue entry */
           /* Note that the CHILD REP will change to be the PARENT REP just after this processing
occurs. Because of that, use the GENERATING PARENT here for the child */
           addRetryHierAssoc (retryQ, e, parentNonGenCnxptRep, parentCnxptRep);
        };
        /* remove all non-generating associations with same child after adding tensor */
        hierAssocQ.remove (e);
     }while ( (childNonGenCnxpt == childCnxpt) && (e != null) && hierAssocQ.hasNext( ));
     /* set the new 'representative' for cnxpts in newly added sub-tree to the 'representative' of the tree being
added onto */
     SetRepresentative (F, parentCnxptRep, childCnxptRep );
     /* Don't change the representative saved for re-try queue entry tuples, but do change it for the cnxpts
themselves. */
     /* */
     \/* Process re-try queue entries after generating tensor */
     do{ /* Process re-try queue entries */
        /* process all re-try queue entries having a parent or child representative that has changed in this
generating step to determine if the hierarchical association has become an indication of a cycle so that it can be discarded
by adding it to the HierAssocsCycles list, or if the hierarchical association is clearly an indication of an alias-hyperlink so
that it can be placed into the hyperlinkAssocs list. */
        /* If the hierarchical association has been placed onto a list, delete it from the re-try queue. */
        /* If a re-try entry remains on the queue, change the saved representative for the list entry to its new
representative. */
        /* the retry queue entry has a saved child rep from a prior (OR CURRENT) generation step */
        /* the retry queue entry has a saved parent rep from a prior (OR CURRENT) generation step */
        /* the retry queue entry, as a set of cnxpt roles, has a parent cnxpt whose representative is
changeable without changing the queue tuple */
        /* the retry queue entry, as a set of cnxpt roles, has a child cnxpt whose representative is
changeable without changing the queue tuple */
        /* perform retryQ processing now because of the added context from the above generation, since
the context is useful toward efficiency */
        childNonGenCnxpt = null;
        e = retryQ.next;
        if (e == null) break;
        childNonGenCnxpt = e.child;
        childRetryCnxptRep= CnxptRep (e, F, "Child-Retry"); /* find representative for the queue entry tuple
for child role as saved */
        childNonGenCnxptRep= (e, F, "Child"); /* find representative for the Hierarchical
Association child role cnxpt */
        parentNonGenCnxpt = e.parent;
        parentRetryCnxptRep= CnxptRep (e, F, "Parent-Retry"); /* find representative for the queue entry
tuple for Parent role as saved */
```

```
        parentNonGenCnxptRep= CnxptRep (e, F, "Parent"); /* find representative for the Hierarchiacal
Association Parent role cnxpt */
        if ((childRetryCnxptRep != childNonGenCnxptRep) || (parentRetryCnxptRep !=
parentNonGenCnxptRep))
        {
          /* something changed due to this generation step */
          /* entries added on this generation step WILL NOT be found here because of the way the
saved child representative is set */
          if (childRetryCnxptRep != childNonGenCnxptRep)
          ( /* child subtree representative changed */
            /* implies that child was in subtree in generation step
            /* implies that child WAS NOT root of subtree, or it would have just been added and thus
would NOT show up in this generation step */
            /* implies that the generating hierarchical association above child role cnxpt was the
representative of this child */
            /* we don't know where parent was. If it was in the subtree where the child's subtree was
attached, then we don't know if there is a cycle. */
            /* because of above if, here we know that the child changed. If the parent also changed,
then we can check if either was the subtree's root */
            if (parentRetryCnxptRep != parentNonGenCnxptRep) /* parent also changed during
processing for generation */
            {
              if (parentNonGenCnxpt == childCnxpt) /* parent was child role cnxpt during
processing for generation */
            {
              /* no cycle found, since parent was root of subtree -- this is merely redundant
because the child is already within the tree */
              addRedundantHierAssoc (residualHierAssocs, e);
              retryQ.remove (e); /* remove non-generating association from queue */
            }
            /* it is possible that Hierarchical Association Parent role cnxpt was root of subtree,
but not possible that child role cnxpt was root */
            elseif (childNonGenCnxpt == childCnxpt) /* child was child role cnxpt during
processing for generation */
            {
              /* should not occur due to above (implies that child WAS NOT root of subtree)
*/
              /* cycle found, since parent was not root of subtree but child was */
              addRedundantHierAssoc (HierAssocsCycles, e);
              retryQ.remove (e); r remove non-generating association from queue */
            }
            else
            {
              /* neither parent or child of this retryQ entry was the root of the subtree, so we
cannot easily determine if there is a cycle */
              /* child tree did change, update saved representative on retry tuple */
              e.childRetryRep = childNonGenCnxptRep;
              /* parent tree did change, update saved representative on retry tuple */
              e.parentRetryRep = parentNonGenCnxptRep;
            };
            continue;
            }
            /* we don't know where parent was. If it was in the supertree where the child's subtree
was attached, then we know there is no cycle. */
            elseif (parentRetryCnxptRep == parentCnxptRep) /* parentCnxptRep from above
processing for generation */
            { if (childNonGenCnxptRep == parentCnxptRep)
            } /* above also confirms that the processing for generation did change this
child's representative */
              /* child subtree was joined to parent tree in this generation step */
              /* note that this saves the parent and relationship scopx and infxtypx */
              /* note that this implies that we cannot tell if the parent is a direct ascendant of
the child -- we may have an issue but it is not major */
              addRedundantHierAssoc (hyperlinkAssocs, e);
              retryQ.remove (e); /* remove non-generating association from queue */
            }
            else
            {
              /* error condition, since child representative changed this generation step, it
must be in the subtree added to forming tree */
              /* child tree did change, update saved representative on retry tuple */
              e.childRetryRep = childNonGenCnxptRep;
            };
            continue;
          }
          /* because of above if statements, here we know that: */
            /* the child representative changed; and */
            /* the parent representative did not change; and */
            /* the parent was not in the supertree being joined. */
```

```
            /* we don't know where parent was. If it is not now in the same tree, then we let it go for
now and wait to see what else happens that is easier to test. */
            elseif (parentNonGenCnxptRep != childNonGenCnxptRep) /* test if still not in same tree */
            {
               /* child tree did change, update saved representative on retry tuple */
               e.childRetryRep = childNonGenCnxptRep;
               continue;
            }
            /* because of above if statements, here we know that: */
               /* the child representative changed; and */
               /* the parent representative did not change in this generation step; and */
               /* the parent was not in the supertree being joined; and */
               /* the parent is not in a different tree as the child now --- it is in the same tree now. */
            /* we don't know where parent was. It appears that the parent and child are both in the
same tree now, and were in the same tree before
            but that the parent representative did not change in this generation step so it appears that
an error is occurring. */
            elseif (parentRetryCnxptRep ==childCnxptRep) /* childCnxptRep from above processing
for generation */
            }
               /* confirmation: this implies that the parent and child were in the same tree before
this generation step, and that parentNonGenCnxptRep must now equal childNonGenCnxptRep, and thus that the parent
and child are still in the same tree */
               if (parentNonGenCnxptRep == childNonGenCnxptRep)
               {
                  /* confirmation of correctness.... */
                  /* still same tree for both parent and child */
                  /* is this ever possible>??????? I don't think so,,,, Test anyway, */
                  /* since parent and child are in the same tree, not being concerned whether
some error occurred, either the parent tree had been made a subtree of the child, and so a cycle might have been formed.
It is not always true that the child would have become a real grandparent in the extracted tree, so an exhaustive check of
pedigree is required to test for a cycle here */
                  assocType =repCycleTest ( e, F );/* TRUE if cycle; FALSE if clearly hyperlink;
null otherwise */
                  /* find if hierarchical association is forming cycle, or useful for hyperlink */
if (assocType == TRUE)
                  {
                     /* cycle found */
                     addRedundantHierAssoc (HierAssocsCycles, e);
                     retryQ.remove (e); /* remove non-generating association from queue */
                     continue;
                  };
                  if (assocType == FALSE)
                  {
                     /* note that this saves the parent and relationship scopx and infxtypx */
                     addRedundantHierAssoc (hyperlinkAssocs, e);
                     retryQ.remove (e); /* remove non-generating association from queue */
                     continue;
                  };
                  if (assocType == null)
                  {
                     /* parent tree did change, but not to same tree as child */
                     /* update saved representative on retry tuple */
                     e.parentRetryRep = parentNonGenCnxptRep;
                     continue;
                  };
               }
               else
               {
                  /* parent tree did change, but not to same tree as child */
                  /* update saved representative on retry tuple */
                  e.parentRetryRep = parentNonGenCnxptRep;
                  continue;
               };
               continue;
            }
            else
            { /* child tree did change, but not to same tree as parent */
               /* update saved representative on retry tuple */
               e.childRetryRep = childNonGenCnxptRep;
            };
            continue;
         }
         elseif (parentRetryCnxptRep != parentNonGenCnxptRep)
         {
            /* parent subtree changed, and child did not */
            /* the parent role cnxpt's tree may have been made a subtree of the child role cnxpt's tree
in this generation step. */
            /* if so, a cycle might have been formed if parent was in subtree and child was in
```

-continued

```
supertree. */
            if (parentRetryCnxptRep ==childCnxptRep) /* comparing old parent representative vs.
newly generated child's old representative set above in generation */
            {
               if (parentNonGenCnxptRep == parentCnxptRep ) /* comparing new parent
representative vs. newly generated parent's representative */
               { /* since parentCnxptRep is now representative of ChildCnxpt, the parent and
child are now in same tree, in SPECIFIC CONFIGURATION */
                  /* current retry association forms a cycle! */
                  addRedundantHierAssoc (HierAssocsCycles, e);
                  retryQ.remove (e); r remove non-generating association from queue */
                  continue;
               }
               elseif (parentNoGenCnxptRep == childNoGenCnxptRep) /* comparing parent's new
representative vs. child's new (and old) representative */
               { /* since parentCnxptRep is now representative of ChildCnxpt, the parent and
child are now in same tree, but we don't know configuration of child relative to parent! */
                  /* current retry association might not form a cycle, since parent changed but
not to be descendant of child involved in this generation step - could still be descendant of child anyway, or might not be
as too early. */
                  assocType = repCycleTest ( e, F );/* TRUE if cycle; FALSE if clearly hyperlink;
null otherwise */
                  /* find if hierarchical association is forming cycle, or useful for hyperlink */
                  if (assocType == TRUE)
                  {
                     /* cycle found */
                     addRedundantHierAssoc (HierAssocsCycles, e);
                     retryQ.remove (e); /* remove non-generating association from queue */
continue;
                  };
                  if (assocType == FALSE)
                  {
                     /* note that this saves the parent and relationship scopx and infxtypx */
                     addRedundantHierAssoc (hyperlinkAssocs, e);
                     retryQ.remove (e); r remove non-generating association from queue */
                     continue;
                  };
               };
               /* It is not always true that the child would have become a real grandparent in the
extracted tree, so an exhaustive check of pedigree is required to test for a cycle here */
               /* parent tree did change, but not to same tree as child */
               /* update saved representative on retry tuple */
               e.parentRetryRep = parentNonGenCnxptRep;
            };
         };
      }
      /* */
      /* Nothing changed for this hierarchical association for this generation step, but ... */
      /* both ends of the association might STILL be in the same tree */
      /* (THIS CAN HAPPEN - IT IS ONE REASON FOR THE RE-TRY QUEUE TO EXIST) */
elseif (childNonGenCnxptRep == parentNonGenCnxptRep)
      {
         /* re-try queue entries MAY stay on re-try queue if the parent and child are both on same tree!
*/
         /* Check for cycle */
         assocType = repCycleTest ( e, F );/* TRUE if cycle; FALSE if clearly hyperlink; null otherwise */
         /* find if hierarchical association is forming cycle, or useful for hyperlink */
         if (assocType == TRUE)
         {
            /* cycle found */
            addRedundantHierAssoc (HierAssocsCycles, e);
         }
         else
         {
            /*if not a cycle, then all other circumstance causes an alias-hyperlink. */
            /* The alias-hyperlink can not be within the same parent as the actual cnxpt as that would
imply that there were two hierarchical associations with the same parent and child. */
            /* no need to delay, as parent and child are already in place */
            /* note that this saves the parent and relationship scopx and infxtypx */
            addRedundantHierAssoc (hyperlinkAssocs, e); */
            };
            hierAssocQ.remove (e); /* remove non-generating association from queue */
            continue;
         };
         /* nothing changed for this retryQ hierarchical association, and the parent and child are in different
trees */
         /* no retryQ entries currently have both parent and child in same tree */
      } while ((e != null) && retryQ.hasNext( ));
   } /* end of if (HierAssocGenTest ( e, F) != null)*/
```

-continued

```
/* Test for Non-Generating Conditions */
/* Non-generating if parent and child are already in same tree */
elseif (childCnxptRep == parentCnxptRep)
{ /* Here if: HierAssocGenTest ( e, F) == null and */
   /* Generation was not possible, since both parent and child are in same tree */
   /* Child might be root of tree --- In fact, Child MUST be root of tree if here. */
   /* If cycle, discard --- In fact, We MUST have a cycle if here */
   /* If the child is a root of the tree, and the parent role cnxpt is in the same tree, then this hierarchical
association definitely causes a cycle. */
   /* note that no possibility exists that the child role cnxpt is an interior cnxpt, as that would require a
hierarchical association with the same child role cnxpt to have already been processed, and have caused a generation of
a tensor, but none has been or we would not be processing one here. */
   /* Note that if the child role cnxpt must be the root here if it is in the tree with the parent role cnxpt, then
the parent role cnxpt must be a descendent of the child, and a loop exists. */
   if (parentCnxptRep == childCnxpt)
   {
      /* THIS SHOULD ALWAYS BE TRUE */
      /* cycle found */
      addRedundantHierAssoc (HierAssocsCycles, e);
   }
   else
   {
      /* impossible condition - child cannot be interior if here */
   };
   hierAssocQ.remove (e); /* remove generating association from queue */
      reorderHierAssocQ(hierAssocQ);
   }
   /* */
   /* Test for Non-Generating Conditions */
   /*Non-generating if child is not root of tree */
   else /* the child is not a root cnxpt for the tree it is in */
   {
   /* impossible condition - child cannot be interior if here */
   /* Here if: HierAssocGenTest ( e, F) == null and the child is an interior cnxpt */
   /* Generation was not possible, since child role cnxpt is not a root of its tree, and thus is an interior element of
the tree, but the parent tree and the child tree are different (or we would not be here). */
   /* Parent role cnxpt has Tree Representative different from Child role cnxpt, and Child is not root of tree */
   /* should never happen: If the child role cnxpt is an interior cnxpt, no other cnxpts should be left on the
hierAssocQ with that same child role cnxpt because all would have been removed when the first one with that child cnxpt
is processed (a child cannot have multiple parents). If the hierarchical association is still there, it would mean that not all
hierarchical associations for the child were removed from the queue after the highest weighted one had made the tree
where the child cnxpt was root into a subtree so that the child cnxpt became internal.) */
   /* If the hierarchical association being considered (the highest weight hierarchical association of those where
the child role is a certain cnxpt, and the highest weight hierarchical association still in the priority queue) is to an interior
child of the subtree (the child role cnxpt is a non-root cnxpt in the subtree), reject it for tensor generation, but check it for
use to indicate a hyperlink or if it forms a cycle */
   /* If interior and parent is in the same tree, then maybe parent is not descendant - and is thus an alias-
hyperlink. (this should never occur, since it would mean that not all hierarchical associations for the child were removed
from the queue after one had made the subtree where the child cnxpt is into a subtree so that the child cnxpt became
internal.) */
   /* If interior and parent is external, then maybe parent will become descendant - have to wait, so place on re-
try queue. (this should never occur, since it would mean that not all hierarchical associations for the child were removed
from the queue after one had made the subtree where the child cnxpt is into a subtree so that the child cnxpt became
internal.) */
   /* if here there is a problem with the algorithm. */
      hierAssocQ.remove (e); /* remove generating association from queue */
      reorderHierAssocQ(hierAssocQ);
   };
}while ((i<(n-1)) && (e != null) && hierAssocQ.hasNext( ));
/* */
/* Tensor Generation is Completed */
/* retain remaining Hierarchical Associations */
do
{ /* NO more tensors will be generated */
   /* retain remaining Hierarchical Associations */
   /* process all other hierarchical associations still on the priority queue, either adding them to the
hyperlinkAssocs list, HierAssocsCycles list, or residualHierAssocs list, and deleting each such association from the priority
queue (but not from the CMMDB). */
   e = ExtractCheapestHierAssoc ( hierAssocQ );
   if (e == null) break;
   childCnxpt = e.child;
   parentCnxpt = e.parent;
   parentCnxptRep =CnxptRep ( e, F, "Parent" ); /* find representative for the Hierarchical Association Parent role
cnxpt */
   childCnxptRep = CnxptRep ( e, F, "Child"); /* find representative for the Hierarchical Association Child role
cnxpt */
   if (parentCnxptRep == childCnxptRep)
   { /* possible cycle */
      assocType = repCycleTest ( e, F );/* TRUE if cycle; FALSE if clearly hyperlink; null otherwise */
```

```
        /* find if hierarchical association is forming cycle, or useful for hyperlink */
        if (assocType == TRUE)
        {
          /* cycle found */
          addRedundantHierAssoc (HierAssocsCycles, e);
        }
        else
        { /* no need to delay, as no other generation will occur to connect trees */
          /* note that this saves the parent and relationship scopx and infxtypx */
          addRedundantHierAssoc (hyperlinkAssocs, e);
        };
        hierAssocQ.remove (e); r remove non-generating association from queue */
      };
  }while (NOT(fail_on_fxxt_complexity) && (e != null) && hierAssocQ.hasNext( ));
  /* */
  /* Process re-try queue entries still remaining */
  do
  {
      /* Process re-try queue entries */
      /* process all re-try queue entries to determine if the hierarchical association has become an indication of a
cycle so that it can be discarded by adding it to the HierAssocsCycles list, or it is an indication of an alias-hyperlink that
can be placed into the hyperlinkAssocs list, or it is redundant and can be placed on the residualHierAssocs list*/
      e = retryQ.next;
      if (e == null) break;
      childCnxpt = e.child;
      childCnxptRep= CnxptRep ( e, F, "Child"); /* find representative for the Hierarchical Association child role cnxpt
*/
      parentCnxpt = e.parent;
      parentCnxptRep= CnxptRep ( e, F, "Parent"); /* find representative for the Hierarchical Association Parent role
cnxpt */
      if (childCnxptRep == parentCnxptRep)
      {
        assocType = repCycleTest ( e, F );/* true if cycle; false if clearly hyperlink; null otherwise */
        /* find if hierarchical association is forming cycle, or useful for hyperlink */
        if (assocType == true)
        {
          /* cycle found */
          addRedundantHierAssoc (HierAssocsCycles, e);
        }
        else
        { /* no need to delay, as no other generation will occur to connect trees */
          /* note that this saves the parent and relationship scopx and infxtypx */
          addRedundantHierAssoc (hyperlinkAssocs, e);
        };
        retryQ.remove (e); r remove non-generating association from queue */
      };
  }while (NOT(fail on fxxt complexity) && (e != null) && retryQ.hasNext( ));
  do
  {
      /* post process hyper link list to determine if there are merely redundant hierarchical associations that should
be removed. */
      /* not all redundant hierarchical associations will be removed in this process. Some hyperlinks will overlap
others, and the easiest way to check those is in the building of the Enhanced Descendant Tree */
      e = hyperlinkAssocs.next;
      if (e == null) break;
      childCnxpt = e.child;
      parentCnxpt = e.parent;
      child PriorCnxpt = childCnxpt;
      do
      {
        tE = hierTensorFindParent(F, childPriorCnxpt); /* find parent of child */
        if (tE == null) break;
        parentTensorCnxpt = te.parent;
        if (parentTensorCnxpt == parentCnxpt)
        {
          /* no cycle found, since parent was root of subtree including child */
          /* problem is that parent role cnxpt is already in tree as ancestor of child */
          /* -- this is merely redundant because the parent is already within the tree */
          addRedundantHierAssoc (residualHierAssocs, e);
          hyperlinkAssocs.remove (e); /* remove redundant association */
          tE = null;
          break;
        };
        child PriorCnxpt = parentTensorCnxpt;
```

-continued

```
    }while ((tE != null));
  }while (NOT(fail_on_fxxt_complexity) && (e != null) && hyperlinkAssocs.hasNext( ));
  if fail_on_fxxt_complexity return NULL;
  return F;
};
```

Fxxt Tree Extraction—Algorithm 2—Limited Root First

Use Case: Fxxt Tree Extraction—Algorithm 2—Limited Root First—Extract trees from the directed graphs of cnxpt based ontologies by fxxt for map generation, where the root cnxpts are processed first and the algorithm is constrained for use to only 'easily determined' fxxts.

This algorithm is limited to application where a FXXT FINAL fxxt summary item or an 'easily determined' non-base fxxt summary item is found for a cnxpt.

This process generally follows the pattern: 1) select best next 'selected parent' cnxpt; 2) select best 'candidate' summary hierarchical association from that 'selected parent'; 3) add the 'child' of that relationship to the tree by generating a hierarchical and a child tensor.

For each 'Easily Determined' fxxt, perform the following procedures:

Use Case: Form Priority Queue of Cnxpts for Walk to Mark 'Easily Determined' Fxxts—For all cnxpts within an 'Easily Determined' fxxt, order the unprocessed cnxpts for processing.

Find all cnxpts that have been marked (have a fxxt summary item for the fxxt) as being a member of the fxxt, and enter them into a priority queue for processing in the following procedures. Reorder the priority queue on the basis of the weight of their fxxt summary items, highest weight first. Any cnxpts which do not have a summary hierarchical association in the fxxt where they hold a role as 'child' (a 'to' role) are to be moved to the front of the queue, retaining the ordering based upon the weight of their fxxt summary items (highest weight root cnxpts first, then highest weighted non-roots that may become children).

Any cnxpts which do not have a summary hierarchical association in the fxxt where they hold a role as 'parent' (a 'from' role) are to be moved to the back of the queue, retaining the ordering based upon the weight of their fxxt summary items.

Reorder the priority queue based upon the highest of the 'effective weights' found for each cnxpt whenever those weights are recalculated.

In one embodiment, as the processing below is completed for any cnxpt (all tensors are generated that can be for the cnxpt), it is removed from the priority queue. (Note that in a "Complex Annealing" algorithm, this may cause errors if triggered fxxt steps cause subsequent determinations of fxxt membership of other relationships or cnxpts and cause a cnxpt to have more legitimate 'children' or 'parents' in the fxxt.)

Select Next 'Selected Parent'

Use Case: Select Next 'Selected Parent' from the priority queue—Depending upon the heuristic setting in a fxxt specification, or a system parameter setting guiding use of a heuristic, choose a next 'selected parent' cnxpt.

Some heuristics for selecting the next cnxpt are tree walking oriented. The nature of the walk algorithm is complicated by the dual basis of the choices: processing within a cnxpt's set of 'children', and processing within the priority queue of cnxpts. The first choice is whether all candidate children of a single cnxpt are to be processed before moving to a different 'selected parent'. This decision causes a differentiation between a 'pure' depth first search and a 'relaxed' depth first search. The second choice is whether to use a depth first or breadth first choice.

Unless the fxxt specification might cause the addition of an association for such cnxpts, never choose cnxpts which do not have any summary hierarchical association in the fxxt where they hold a role as 'parent' (a 'from' role), and delete them from the priority queue.

The same 'selected parent' may be chosen twice if no other cnxpt is appropriate.

Use Case: Heuristic 1. Choose next 'selected parent' by head of queue—Choose next 'selected parent' by priority queue position only.

(BASE) Choose as next 'selected parent' the first cnxpt on the queue.

Use Case: Heuristic 2. Choose next 'selected parent' by head of queue, roots first—Choose next 'selected parent' by priority queue position only, roots first.

(MODIFICATION) Choose as next 'selected parent' the first cnxpt on the queue, but limit this choice to first choose those cnxpts which do not have a summary hierarchical association in the fxxt where they hold a role as 'child' (a 'to' role) until no more of those remain.

Use Case: Heuristic 3. Choose next 'selected parent' by round robin—Choose next 'selected parent' by round robin priority queue choice only.

(MODIFICATION) Choose as next 'selected parent' the first cnxpt on the queue that has not had a turn as 'selected parent' in the current cycle, or choose the head of the queue if every cnxpt has had a turn as 'selected parent' in this cycle.

Use Case: Heuristic 4. Choose next 'selected parent' by round robin, roots first—Choose next 'selected parent' by round robin priority queue choice only, roots first.

(MODIFICATION) Choose as next 'selected parent' the first cnxpt on the queue that has not had a turn as 'selected parent' in the current cycle, or choose the head of the queue if every cnxpt has had a turn as 'selected parent' in this cycle, but limit this choice to those cnxpts which do not have a summary hierarchical association in the fxxt where they hold a role as 'child' (a 'to' role) until no more of those remain.

Use Case: Heuristic 5. Choose next 'selected parent' by relationship weight—Choose next 'selected parent' by round robin priority queue choice only.

(MODIFICATION) Choose as next 'selected parent' the first cnxpt on the queue that has the highest 'effective weight' 'candidate' FXXT FINAL summary hierarchical association as calculated by a weight determination heuristic.

This heuristic requires a pre-calculation of 'effective weights' to be completed prior to the selection. The 'effective weights' are summarized into the hierarchical association summaries of the cnxpt and updated when impacted only, for efficiency.

Use Case: Heuristic 6. Choose next 'selected parent' by relationship weight, roots first—Choose next 'selected parent' by round robin priority queue choice only, roots first.

(MODIFICATION) Choose as next 'selected parent' the first cnxpt on the queue that has the highest 'effective weight' 'candidate' FXXT FINAL summary hierarchical association as calculated by a weight determination heuristic, but limit this choice to those cnxpts which do not have a summary hierarchical association in the fxxt where they hold a role as 'child' (a 'to' role) until no more of those remain.

This heuristic also requires a pre-calculation of 'effective weights' to be completed prior to the selection. The 'effective weights' are summarized into the hierarchical association summaries of the cnxpt and updated when impacted only, for efficiency.

Use Case: Heuristic 7. Simple Depth First Walk to Find Next Cnxpt—Select the next 'selected parent' cnxpt by Simple Depth First tree walk.

(MODIFICATION) If no 'selected parent' has been chosen for the fxxt, then choose the first cnxpt on the priority queue that is a root as the 'selected parent'. Otherwise, choose as next 'selected parent' the last child connected by a tensor from the current 'selected parent'. Otherwise, repeat the following until a new cnxpt is found and chosen as next 'selected parent': 1) if the current 'selected parent' has no children that had not yet been processed, then reselect the next most recent 'selected parent' as the current 'selected parent' and retry. (This is accomplished by creating a push down stack of cnxpts as they are newly added to the tree, and popping them off for use as a 'next most recent' 'selected parent'.); otherwise 2) retain the current 'selected parent'. Otherwise, if the stack is emptied, choose the cnxpt on the front of the priority queue.

Use Case: Heuristic 8. Weight Based Modified Depth First Walk to Find Next Cnxpt—Select the next 'selected parent' cnxpt by comparisons of weight and by a modified depth first tree walk.

(MODIFICATION) Choose the first cnxpt on the queue from all cnxpts on the queue that 1) have the highest 'effective weight'; and 2) have the most shallow depth (the lowest depth number) of the fxxt tree; and 3) have not been fully processed. The 'effective weights' are calculated according to the Effective Weight Determination procedures below. Otherwise, choose as next 'selected parent' the last child connected by a tensor from the current 'selected parent'. Otherwise, repeat the following until a new cnxpt is found and chosen as next 'selected parent': 1) if the current 'selected parent' has no children that had not yet been processed, then reselect the next most recent 'selected parent' as the current 'selected parent' and retry (This is accomplished by creating a push down stack of cnxpts as they are newly added to the tree, and popping them off for use as a 'next most recent' 'selected parent'.); otherwise 2) retain the current 'selected parent'. Otherwise, if the stack is emptied, repeat (at '(START)') until no cnxpts are on the priority queue. The heuristic utilized here is marking all possible tree branches from any 'selected parent' before making a new choice for a 'selected parent'.

Use Case: Heuristic 9. Simple Breadth First Walk to Find Next Cnxpt—Select the next 'selected parent' cnxpt by Simple Breadth First tree walk, using priority queue position of those cnxpts at the same depth from the root of the tree.

(MODIFICATION) Choose as next 'selected parent' the first cnxpt on the queue that is at the most shallow depth (the lowest depth number) of the fxxt tree and that has not been fully processed. (This depth choice will encompass the same depth as the just processed cnxpt, or a deeper depth if no other cnxpts are available on the same level. Cnxpts not marked with a depth because the depth is indeterminate are considered to have a depth 1 deeper than any marked depth. The depth of each root cnxpt is 0 and being a root is the primary basis for depth determinations. The depth of every cnxpt having a hierarchical tensor is known and used as a secondary basis for this choice.)

Use Case: Heuristic 10. Weight Based Simple Breadth First Walk to Find Next Cnxpt—Select the next 'selected parent' cnxpt by comparisons of weight and by a simple breadth first tree walk, using priority queue position of those cnxpts at the same depth from the root of the tree.

(MODIFICATION) Choose as next 'selected parent' the first cnxpt on the queue from all cnxpts on the queue that 1) have the highest 'effective weight'; and 2) have the most shallow depth (the lowest depth number) of the fxxt tree; and 3) have not been fully processed. The 'effective weights' are calculated according to the Effective Weight Determination procedures below. The heuristic utilized here is marking only one new tree branch from any 'selected parent' before making a new choice for a 'selected parent'.

Use Case: Heuristic 11. Weight Based Pure Breadth First Walk to Find Next Cnxpt—Select the next 'selected parent' cnxpt by comparisons of weight and by a simple breadth first tree walk, using priority queue position of those cnxpts at the same depth from the root of the tree.

(MODIFICATION) Choose as next 'selected parent' the first cnxpt on the queue from all cnxpts on the queue that 1) have the highest 'effective weight'; and 2) have the most shallow depth (the lowest depth number) of the fxxt tree; and 3) have not been fully processed. The 'effective weights' are calculated according to the Effective Weight Determination procedures below. The heuristic utilized here is marking all possible tree branches from any 'selected parent' before making a new choice for a 'selected parent'.

"Complex Annealing" Fxxt Development Fxxt Analysis

The following algorithms treat NOT 'Easily Determined' fxxts. These algorithms are applicable where the fxxt membership for a cnxpt can only be determined by a complex "Complex Annealing" Fxxt Development algorithm.

Initially the forest consists of single cnxpt trees (and no FXXT FINAL Hierarchical associations) where each cnxpt is of the scopx(s) and infxtypx(s) as specified in the fxxt base extension description or is marked as being specifically in the fxxt. FXXT FINAL Hierarchical associations of the scopx(s) and infxtypx(s) specified in the fxxt base extension description are entered into the queue with cost information based upon the weights from the original graph representation of the ontology.

These algorithms enforce the layering of Fxxt Calculation Steps, but also constrain the growth of the fxxt and impose rules on which FXXT FINAL Hierarchical associations may be used at which time based upon weights and fxxt specifications.

Design variation: There are two ways to specify fxxts: either FXXT FINAL Hierarchical association scopxs and infxtypxs as specified by a Fxxt Calculation Step description between cnxpts may be retained for use on ensuing extension processing rounds or not. If they are not allowed, then FXXT FINAL Hierarchical associations of scopxs and infxtypxs not specified in an extension must not be used while that extension is being processed, and must be taken off the queue so that they are not used improperly. If they are allowed, then the queue does not need to be emptied between processing steps.

Algorithm for Fxxts with Extension Fxxt Calculation Steps, Version 1

Use Case: Fxxt Tree Extraction—Algorithm 1—"Complex Annealing" Fxxt Development—Extract trees from the directed graphs of cnxpt based ontologies by fxxt for map generation, where the root cnxpts are processed first.

The preferred "Complex Annealing" forest construction algorithm is:

```
            /* problem is that parent role cnxpt is already in tree as ancestor of child */
            /* -- this is merely redundant because the parent is already within the tree */
            addRedundantHierAssoc (residualHierAssocs, e);
            hyperlinkAssocs.remove (e); /* remove redundant association */
            tE = null;
            break;
         };
         child PriorCnxpt = parentTensorCnxpt;
      } while ((tE != null));
   } while (NOT(fxxt_altered) && (e != null) && hyperlinkAssocs.hasNext( ));
   costpenalty = max(.9,costpenalty * 1.005);
   /* Set penalty to be added for each layer of extension onto the costs of the original FXXT FINAL Hierarchical
associations as they are added */
  } while (NOT(fxxt_completed)) && fxxt_altered);
  return F;
};
```

The internal loop steps are:

1. The simplified graph is extracted from the fxxted graph using the base and all extensions of the Fxxt Specification, adding a cost penalty for each layer of extension onto the costs of the original FXXT FINAL Hierarchical associations as they are added into the simplified graph. Note that only specified fxxt FXXT FINAL Hierarchical association scopxs and infxtypxs are used.
2. The forest is constructed from the simplified graph with each cnxpt in a separate tree.
3. The simplified graph FXXT FINAL Hierarchical associations are placed into a priority queue based upon cost.
4. Until we've added n−1 FXXT FINAL Hierarchical associations,
   1. Extract the cheapest FXXT FINAL Hierarchical association from the queue,
   2. If it forms a cycle, reject it, but save it as a hyperlink,
   3. Else add it to the forest. Adding it to the forest will join two trees together within the fxxt.
5. Save all remaining queued FXXT FINAL Hierarchical associations for use in Ascendant Tree formation.

Every internal loop step will have joined two trees in the forest together or discarded cycle forming FXXT FINAL Hierarchical associations, so that at the end, the least number of trees will be in F forming a map basis.

Algorithm for Fxxts with Extension Fxxt Calculation Steps, Version 2

Use Case: Fxxt Tree Extraction—Algorithm 2—Fxxts with Extension Fxxt Calculation Steps—Extract trees from the directed graphs of cnxpt based ontologies by fxxt for map generation, where the root cnxpts are processed first.

Design variation: FXXT FINAL Hierarchical associations must be queued so that the Fxxt calculation step descriptions are applied in order: so that FXXT FINAL Hierarchical associations added because of a Fxxt Calculation Step are only used when adding FXXT FINAL Hierarchical associations to trees during processing for that Fxxt Calculation Step.

Initially the forest consists of single cnxpt trees (and no FXXT FINAL Hierarchical associations) where each cnxpt is of the scopx(s) and infxtypx(s) as specified in the fxxt base extension description or is marked as being specifically in the fxxt. FXXT FINAL Hierarchical associations of the scopx(s) and infxtypx(s) specified in the fxxt base extension description are entered into the queue with cost information based upon the weights from the original graph representation of the ontology. At the end of each stage of tree formation where no FXXT FINAL Hierarchical associations are found to extend the trees based upon a current Fxxt Calculation Step description, a new Fxxt Calculation Step description is applied to expand the basic forest by adding new cnxpts as single cnxpt trees. A cost premium is applied to FXXT FINAL Hierarchical associations that exist between the newly added cnxpts and the existing cnxpts in the trees in the forest as they are added to the queue during the expansion. Tree building then continues. Again, for each stage in the tree building, add the cheapest FXXT FINAL Hierarchical association from the queue so that it joins two trees together without causing cycles.

The summary for a second forest construction algorithm is:

```
Forest MinimumExtendedFxxtSpanningTree( FxxtedGraph fg, Fxxt fxxt, FxxtSpec fS, List residualHierAssocs, List
HierAssocsCycles, List hyperlinkAssocs, double fxxtPremParam, Mode modeSwitch ) {
    Forest F;
    Forest FEF;
    RelationshipWeightedGraph gEXT;
    Queue hierAssocQ;
    double fxxtPremiumExtend;
    FxxtExtension fE;
    Iterator f = fS.iterator( );
    HierarchicalAssoc e;
    /* clear external lists */
    set_empty(HierAssocsCycles); /* remove all entries */
    set_empty(residualHierAssocs); // remove all entries
    set_empty (hyperlinkAssocs); // remove all entries
    Cnxpt parentCnxptRepresentative, childPriorCnxpt;
    int m, n;
    if ((f.hasNext( )) {
        while ((f.hasNext( )) {
            fE = f.next( );
            gEXT = FindFxxtExtensionCnxpts( fg, F, fE );
            F += gEXT;
            fxxtPremiumExtend += f.fxxtPremium( );
```

-continued

```
                hierAssocQ += FindFxxtExtensionRelationships( fg, gEXT, fS, fE, fxxtPremiumExtend );
                n = TreeCount(F);
                for(i=0;i<(n−1);i++) {
                    do {
                        e = ExtractCheapestHierAssoc( hierAssocQ );
                        parentCnxptRepresentative = repCycle( e, F );
                        if ( parentCnxptRepresentative == null ) /* both ends of e are in the same tree in F (have the
same representative) */
                        {
                            // note that this saves the parent and relationship scopx and infxtypx
                            addRedundantHierAssoc(hyperlinkAssocs, e);
                            hierAssocQ.remove(e); // remove all cycle relationships after adding to links
                            e = null;
                        };
                    } while ((e == null) && hierAssocQ.hasNext( ));
                    if (e = = null) break;
                    AddHierTensor ( F, e ); /* add the association into the fxxt by creating a hierarchical tensor.*/
                                        // retain cost and weight on e
                    SetRepresentative (F, e, parentCnxptRepresentative ); /* sets the new 'representative' for cnxpts in
newly added sub-tree to the 'representative' of the tree being added onto */
                    /* sets only the representative of the join point, since it is more efficient than changing all nodes */
                    hierAssocQ.remove(e); // remove the relationship from the queue after use
                };
                fxxtPremiumExtend += fxxtPremParam;
                while (hierAssocQ.hasNext( ))
                {
                    e = ExtractCheapestHierAssoc( hierAssocQ );
                    parentCnxptRepresentative = repCycle( e, F );
                    if ( parentCnxptRepresentative == null ) /* both ends of e are in the same tree in F (have the same
representative) */
                    {
                        // note that this saves the parent and relationship scopx and infxtypx
                        addRedundantHierAssoc(hyperlinkAssocs, e);
                        hierAssocQ.remove(e); // remove all cycle relationships after adding to links
                        e = null;
                    }
                    else {
                        addRedundantHierAssoc(HierAssocsCycles, e);
                        /* The following may or may not be used depending upon Fxxt Specification design and results
obtained */
                        switch (modeSwitch) {
                        case (DONOT_NULL):
                            break;
                        case (DO_NULL):
                            hierAssocQ.remove(e); // remove the relationship from the queue
                        };
                    };
                };
            };
        }
        else {
            F = ConsForest( fg );
            hierAssocQ = ConsRelationshipQueue( fg );
            n = CnxptCount(F);
            for(i=0;i<(n−1);i++) {
                do {
                    e = ExtractCheapestHierAssoc( hierAssocQ );
                    parentCnxptRepresentative = repCycle( e, F );
                    if ( parentCnxptRepresentative == null ) /* both ends of e are in the same tree in F (have the same
representative) */
                    {
                        // note that this saves the parent and relationship scopx and infxtypx
                        addRedundantHierAssoc(hyperlinkAssocs, e);
                        hierAssocQ.remove(e); // remove all cycle relationships after adding to links
                        e = null;
                    };
                } while ((e == null) && hierAssocQ.hasNext( ));
                if (e == null) break;
            AddHierTensor ( F, e ); /* add the association into the fxxt by creating a hierarchical tensor.*/
                                    // retain cost and weight on e
            SetRepresentative (F, e, parentCnxptRepresentative ); /* sets the new 'representative' for cnxpts in newly
added sub-tree to the 'representative' of the tree being added onto */
                    /* sets only the representative of the join point, since it is more efficient than changing all nodes */
                hierAssocQ.remove(e); // remove the relationship from the queue after use
            };
            while (hierAssocQ.hasNext( ))
            {
                e = ExtractCheapestHierAssoc( hierAssocQ );
                parentCnxptRepresentative = repCycle( e, F );
```

-continued

```
                if ( parentCnxptRepresentative == null ) /* both ends of e are in the same tree in F (have the same
representative) */
                {
                    // note that this saves the parent and relationship scopx and infxtypx
                    addRedundantHierAssoc(hyperlinkAssocs, e);
                }
                else {
                    addRedundantHierAssoc(HierAssocsCycles, e);
                };
                hierAssocQ.remove(e); // remove all cycle relationships after adding to links
                e = null;
            };
        };
            costpenalty = max(.9,costpenalty * 1.005);
            /* Set penalty to be added for each layer of extension onto the costs of the original FXXT FINAL Hierarchical
associations as they are added */
        } while (NOT(fxxt_completed)) && fxxt_altered);
        do
        {
            /* post process hyper link list to determine if there are merely redundant hierarchical associations that should
be removed. */
            /* not all redundant hierarchical associations will be removed in this process. Some hyperlinks will overlap
others, and the easiest way to check those is in the building of the Enhanced Descendant Tree */
            e = hyperlinkAssocs.next;
            if (e == null) break;
            childCnxpt = e.child;
            parentCnxpt = e.parent;
            childPriorCnxpt = childCnxpt;
            do
            {
                tE = hierTensorFindParent(F, childPriorCnxpt); /* find parent of child */
                if (tE == null) break;
                parentTensorCnxpt = tE.parent;
                if (parentTensorCnxpt == parentCnxpt)
                {
                    /* no cycle found, since parent was root of subtree including child */
                    /* problem is that parent role cnxpt is already in tree as ancestor of child */
                    /* -- this is merely redundant because the parent is already within the tree */
                    addRedundantHierAssoc (residualHierAssocs, e);
                    hyperlinkAssocs.remove (e); /* remove redundant association */
                    tE = null;
                    break;
                };
                child PriorCnxpt = parentTensorCnxpt;
            } while ((tE != null));
        } while ((e != null) && hyperlinkAssocs.hasNext( ));
        return F;
};
```

The steps are:

1. Create the tree with cnxpts from the base Fxxt Calculation Step description of the fxxted graph. If no Fxxt Specification is available, use the entire graph. The forest is constructed with each cnxpt being in a separate tree.
2. For FXXT FINAL Hierarchical associations from the ontology FXXT FINAL Hierarchical associations of the proper scopx and infxtypx according to the Fxxt Calculation Step description that connect cnxpts in the forest, the FXXT FINAL
Hierarchical associations are placed in a priority queue.
3. Until at most n−1 FXXT FINAL Hierarchical associations have been added:
    1. Extract the cheapest FXXT FINAL Hierarchical association from the queue,
    2. If it forms a cycle, reject it, but save it as a hyperlink,
    3. Else add it to the forest. Adding it to the forest will join two trees together.
4. Save all remaining queued FXXT FINAL Hierarchical associations for use in Ascendant Tree formation.
5. Depending upon mode, empty queue.
6. Until no more Fxxt Calculation Steps are available,
    1. Expand the tree with cnxpts from the next Fxxt Calculation Step description for each extension in the Fxxt Specification.
    2. Expand the queue with newly available FXXT FINAL Hierarchical associations with a premium cost.
    3. Recalculate n as the number of trees (some of which may be only one cnxpt large).
    4. Until at most n−1 FXXT FINAL Hierarchical associations have been added,
        1. Extract the cheapest FXXT FINAL Hierarchical association from the queue,
        2. If it forms a cycle, reject it, but save it as a hyperlink,
        3. Else add it to the forest. Adding it to the forest will join two trees together.
    5. Save all remaining queued FXXT FINAL Hierarchical associations for use in Ascendant Tree formation.
    6. Depending upon mode, empty queue.

Every inner loop iteration will have joined two trees in the forest F together or discarded cycle forming FXXT FINAL Hierarchical associations, so that at the end of the inner loop, the trees in F will be maximized in size for that iteration of the outer loop.

Every outer loop iteration will increase the size of the forest F based upon FXXT FINAL Hierarchical associations that are not in the base fxxt but are allowed as extensions to the fxxt. In this manner, the trees in the forest F may be expanded by adding cnxpts that are related by the Fxxt Calculation Step(s) as they are applied in order.

In each of the above algorithms, we retain the costs used for choosing FXXT FINAL Hierarchical associations with the FXXT FINAL Hierarchical association for the later calculation of Ascendant Trees.

In each of the above algorithms, we can use a heap for the priority queue. The trick here is to detect cycles. For this, we need a union-find structure.

In each algorithm, the Union-find 'representatives' structure obtained will be retained for use in the Ascendant Trees algorithm.

Build Enhanced Descendant Spanning Trees

Use Case: Build Enhanced Descendant Spanning Trees—Build a forest of trees from a Basic Descendant Spanning Tree Forest to contain other dxos based upon the Fxxt Specification.

The Basic Descendant Spanning Tree Forest contains only a specific set of cnxpts and relationships and forms a framework for the Enhanced Descendant Spanning Forest and the Ascendant Forest. Other dxos may need to be added for display, including alias-hyperlinks and non-cnxpts such as dxos and txos. Add alias-hyperlinks and (references to) all dxos specified in the fxxt that relate to the cnxpts in the Basic Descendant Spanning Tree Forest as children of the cnxpts already in the trees.

Design Consideration: Since the trees used as the basis of the enhancement process have already been constructed, and since the dxos to be added will not be a part of the tree building process itself, a reference to a dxo can be added as is done for alias-hyperlinks. Each reference will have its own positioning and sizing information and will be controlled by tensors which relate it to its context.

Algorithm:

1. [Initialize:] Make a copy of the Basic Descendant Spanning Forest of Hierarchical Tensors and refer to it as the Enhanced Descendant Forest 'EF'. Create lists for holding tuples referencing each instance of an added alias-hyperlink (hyperlinkInstanceAdded list), non-cnxpt object (noncnxptInstanceAdded list), hierarchical tensor added for an alias-hyperlink (hyperlinkHierTensorAdded list), or hierarchical tensor added for a non-cnxpt (noncnxptHierTensorAdded list). When initially walking the tree, create a priority queue, called descForestHierTensors, of all hierarchical tensors in the Basic Descendant Spanning Forest of Hierarchical Tensors.

2. [Add Alias-hyperlinks:] Perform Tensor Generation for Alias-hyperlinks, below.

3. [Add Dxos:] Perform Tensor Generation for Other Objects, below.

4. [Add Dummy cnxpts:] Add Dummy Cnxpts and perform tensor generation to connect Dummy Cnxpts to the Enhanced Descendant Forest cnxpts, according to Dummy Cnxpt Generation, below.

Tensor Generation for Alias-hyperlinks

Use Case: Tensor Generation for Alias-hyperlinks—Generate alias-hyperlink surrogate cnxpts and needed positioning tensors from the hyperlinkAssocs list.

The hyperlinkAssocs list provides indications of cnxpts with additional parents, causing the need for an alias-hyperlink to appear as a parent where the cnxpt would otherwise be orphaned. The list also includes indications of cnxpts where a parent is an alias-hyperlink (the base cnxpt is the parent) but the cnxpt has another parent that is a fxxt-member cnxpt. Each of the former are added to the Enhanced Descendant Forest here. Some, but not necessarily all of the latter would logically be added in building the Ascendant Forest, but are added here instead to ensure space is allocated for them in the Ascendant Forest map. In one embodiment, alias-hyperlinks that would cause circuits to appear in the Ascendant Forest map are added here but with a different display form and effect due to the confusion that would ensue for the user. The specialized alias-hyperlink added indicates a circuit and is displayed with a different size and importance than other alias-hyperlinks.

Note that the roll-up summarization later will consider the hierarchical tensors and affinitive associations with the surrogate as if the basis cnxpt were in its place, and that many of those associations (especially uncle forming associations) may be used once for the original and once for each surrogate within the summarization. The alias-hyperlink cnxpt is a reference to the real cnxpt but is treated like a cnxpt for positioning to the degree that it is positioned only within the parent role cnxpt of the Hierarchical Association (and thus the Hierarchical Tensor).

Algorithm:

```
Forest GenEnhancedDescendantTree( Forest fxxtDescendantTree, FxxtedGraph fg, Fxxt fxxt, FxxtSpec fS, List
residualHierAssocs, List HierAssocsCycles, List hyperlinkAssocs, double fxxtPremParam )
{
    Forest F;
    Cnxpt childCnxpt;
    Cnxpt parentCnxpt;
    Cnxpt childChkCnxpt;
    Cnxpt parentChkCnxpt;
    Queue hierAssocQ;
    HierarchicalTensor tE, tEChk;
    HierarchicalAssoc e, eChk;
    Perform: Order the hyperlinkAssocs list by child, then by decreasing weight.
    do
    {
        /* post process hyper link list to determine if there are merely redundant hierarchical associations that should
be removed. */
        /* not all redundant hierarchical associations will be removed in this process. Some hyperlinks will overlap
others, and the easiest way to check those is in the building of the Enhanced Descendant Tree */
        e = hyperlinkAssocs.next;
        if (e == null) break;
        childCnxpt = e.child;
        parentCnxpt = e.parent;
        do
        {
            /* the first hyperlink of each set for any child role cnxpt should be added but..... some others should not
        be, where the second association is weaker and has a parent in the same tree as the first. */
            /* Generate into the fxxt tree an alias-hyperlink dxo of the proper type (alias-hyperlinks may have differing
types) as a surrogate cnxpt for the child role cnxpt of the Hierarchical Association in the hyperlinkAssocs list, and copy its
```

-continued

```
positioning information. */
                surrogateCnxpt = CnxptSurrogate.new(f, childCnxpt, e);
                /* Connect the surrogate cnxpt as the child under the parent called for by the FXXT FINAL hierarchical
association in the hyperlinkAssocs list, replacing the child role cnxpt identifier of the original cnxpt with the identifier of the
alias - hyperlink in a new FXXT FINAL hierarchical tensor based upon the hierarchical association from the list, setting the
scopx and infxtypx, and weight of according to that on the Hierarchical Association in the hyperlinkAssocs list. Alias-
hyperlinks are not allowed to have subtrees. In addition, treat alias-hyperlinks as if they were the original cnxpts by
generating copies of all FXXT FINAL affinitive associations for the fxxt from that the basis cnxpt participates in, replacing
the cnxpt identifier in the role containing that basis cnxpt to be the identifier of the alias-hyperlink. (The weight used for
each type of alias-hyperlink to be added varies by hyperlink type, as established by a system parameter. Hyperlinks
needed because of cnxpt references will generally be weighted much more highly than those needed due to dxo
references so as to draw alias-hyperlinks closer to where the cnxpt is. Here the original association weight is used
directly.) */
                hierTensorSurrogateParent = HierTensor.new(f, surrogateCnxpt, parentCnxpt, e);
                if (hierTensorSurrogateParent == null) break;
                /* For every added alias-hyperlink, add the identifier of the surrogate cnxpt to the hyperlinkInstanceAdded
list, and the generated hierarchical tensor hyperlinkHierTensorAdded list. */
                hyperlinkInstanceAdded.add(surrogateCnxpt);
                hyperlinkHierTensorAdded.add(hierTensorSurrogateParent);
                hyperlinkAssocs.remove (e); /* remove redundant association */
                /* Check each subsequent hierarchical association indicating an alias-hyperlink for the same child role
cnxpt. */
                do
                {
                    /* post process hyper link list to determine if there are merely redundant hierarchical associations
that should be removed. */
                    /* not all redundant hierarchical associations will be removed in this process. Some hyperlinks will
overlap others, and the easiest way to check those is in the building of the Enhanced Descendant Tree */
                    eChk = hyperlinkAssocs.previewNext; /* non-destructive 'next' - does not change ptr */
                        /* this association may be removed from hyperlinkAssocs below, or used to form new alias, so
don't move pointer past it */
                    if (eChk == null) break;
                    childChkCnxpt = eChk.child;
                    if (childChkCnxpt != childCnxpt) break;
                    parentChkCnxpt = eChk.parent;
                    child PriorCnxpt = surrogateCnxpt;
                    do
                    {
                        tEChk = hierTensorFindParent(f, childPriorCnxpt); /* find parent of child */
                        if (tEChk == null) break;
                        parentChkTensorCnxpt = tEChk.parent;
                        if (parentChkTensorCnxpt == parentChkCnxpt)
                        {
                            /* no cycle found, since parent was root of subtree including child */
                            /* problem is that parent role cnxpt is already in tree as ancestor of child */
                            /* -- this is merely redundant because the parent is already within the tree */
                            addRedundantHierAssoc (residualHierAssocs, e);
                            hyperlinkAssocs.remove (eChk); /* remove redundant association */
                            tEChk = null;
                            break;
                        };
                        childPriorCnxpt = parentChkTensorCnxpt;
                    } while ((tEChk != null));
                } while ((eChk != null) && hyperlinkAssocs.hasNext( ));
            } while ((hierTensorSurrogateParent != null));
        } while ((e != null) && hyperlinkAssocs.hasNext( ));
};
```

Tensor Generation for Other Objects

Use Case: Tensor Generation for Other Objects—Generate non-cnxpt objects and needed positioning tensors from txo and dxo relationships with cnxpts.

Dxos to be added are indicated by relationships between cnxpts and either a dxo or a txo, including but not limited to: User Suggested—Txo Categorization Relationship; User Suggested—Dxo Alignment Inclusion Relationship; User Suggested—Dxo Alignment Affinitive Relationship; Custom Hierarchical Relationships; Special Feature Hierarchical Relationships; Document Reference Relationships; Comment Relationships. For positioning, these objects are considered to be non-cnxpt objects, related to cnxpts by affinitive associations and hierarchical tensors.

For all relationships added to the fxxt of the above nature indicating that a dxo or txo is to be added to the fxxt map, and in which a cnxpt of the fxxt participates as an anchor point, generate hierarchical tensors and affinitive associations based upon the relationship to place the txo or dxo into the fxxt and map. Where an alias-hyperlink of such a participating cnxpt is in the fxxt map, also generate hierarchical tensors and affinitive associations based upon the relationship to place the txo or dxo into the fxxt and map relative to the alias-hyperlink if the relationship is of the appropriate type for such use.

Note that the later roll-up summarization will consider the hierarchical tensors and affinitive associations with the non-cnxpt txo or dxo as if a cnxpt were in its place, and that many copies of those associations may be used in the summarization if the same txo or dxo is connected to a cnxpt with aliases or if many of the same txo or dxo are related to various cnxpts.

Algorithm:

For each relationship added to the fxxt indicating that a dxo or txo is to be added to the fxxt map, and for the related cnxpt and each alias-hyperlink surrogate cnxpt for that cnxpt, generate into the fxxt tree a reference to the dxo or txo of the proper type, with association and tensor data for positioning it, as follows:

Depending upon the relationship indicating inclusion of the non-cnxpt object, choose a parent cnxpt for generating a hierarchical tensor to the non-cnxpt object from the parent cnxpt in the map. If the relationship shows that a cnxpt (perhaps filling a role on the relationship, or being a parent of the cnxpt filling the role) is a category under which the non-cnxpt should be categorized or within which the non-cnxpt should be displayed, that cnxpt becomes the parent role cnxpt of the hierarchical tensor. Otherwise, use the cnxpt associated with the indicating relationship as the parent role cnxpt. Note that Alias-hyperlinks are not allowed to have subtrees, and may not be used as parents for the non-cnxpt. In each case, connect the non-cnxpt as the child role in the hierarchical tensor, setting the scopx and infx-typx, and weight accordingly. Set a weight for the hierarchical tensor based upon the type and strength of the indicating relationship.

For every added non-cnxpt object, add the identifier of the non-cnxpt object to the noncnxptInstanceAdded list, and the generated hierarchical tensor to the noncnxptHierTensorAdded list.

Based upon the indicating relationship, generate FXXT FINAL affinitive associations between the non-cnxpt and each cnxpt or alias-hyperlink, setting the scopx and infx-typx, and weight accordingly.

Dummy Cnxpt Generation

Use Case: Dummy Cnxpt Generation—Generate dummy cnxpt info-item objects (unnamed position holders appearing to act as cnxpts but not allowing user data to be attached to the info-item object) to reserve space and set levels of subtrees of extracted fxxt trees.

For positioning, these objects are considered to be cnxpt objects, related to other cnxpts by affinitive associations, and tensors. In many cases, an alias-hyperlink will not have some parent (descendant tree sense) or ancestor at a root level, and will require a dummy cnxpt to be added, but other situations also require a dummy cnxpt.

Specialized cnxpt info-items are generated and made parents of objects of an extracted tree where the object can be determined to be at a depth lower (further toward leaves) than the root of the forest. Alias-hyperlinks are always considered to be at a level deeper than the roots of a Basic Descendant Spanning Tree Forest. Only one dummy cnxpt info-item will be added as parent for all of the alias-hyperlinks referring to and single base cnxpt. Only one dummy cnxpt info-item will be added as parent for all of the instances of any dxo or of any txo added to the forest.

Note that the later roll-up summarization will consider the hierarchical tensors and affinitive associations with the dummy cnxpt, and that many copies of those associations may be used in the summarization if the same txo or dxo is connected to a cnxpt with aliases or if many of the same txo or dxo are related to various cnxpts.

Where a look back view is being developed as a tree, the space on a map to allocate to show a parent (in descendant tree sense) that was not a member of the set of cnxpts of the fxxt must be given some position. This occurs regularly with alias-hyperlinks, but also where children of a non-fxxt-member cnxpt are members of the fxxt. Especially in the latter circumstance, information may be available from outside the tree extraction process above to indicate that cnxpt appearing as a root cnxpt in a descendant tree above should actually appear to be at a tree level deeper in the tree toward the leaves. In each of these circumstances, one or more dummy cnxpts may be added into the fxxt to reserve space at the root level for the 'orphaned' subtree.

The position chosen for the 'orphaned' subtree should never be a space blocking the display of cnxpts that are members of the fxxt, and in one embodiment, should be outside of the normal view. To accomplish the positioning, the dummy cnxpt is created and made a temporary member of the fxxt to act as a parent (in descendant tree sense) of the highest member parent (in descendant tree sense) cnxpt of any cnxpt or object not already existing as a child in the descendant tree, except the one or more 'root' cnxpts known to be at the highest level (away from leaves) of the extracted tree (or where no information is available to determine the actual level). In the sense of the ascendant tree, this new dummy cnxpt will be a leaf.

To work properly, the space for the 'orphaned' subtree must be allocated when the roots are first analyzed by the algorithm. This dummy cnxpt is made a parent to that highest parent by adding a hierarchical tensor from the highest parent to the dummy cnxpt. This dummy cnxpt is made an uncle any sibling of the highest parent that is also a member of the fxxt. If no such sibling is found, any sibling of the highest parent's children is used as this uncle, or of the children's children, etc. Where the 'orphaned' subtree has as root an alias-hyperlink, the dummy cnxpt is also made an uncle to the cnxpt that the alias-hyperlink refers to (the base cnxpt). To make it an uncle, an 'uncle' roll-up association is added from the fxxt member to the dummy cnxpt. The intention is that the dummy cnxpt will be on the periphery of the elastic surface, and, in one embodiment, once the basic positioning of all cnxpts is completed, the dummy cnxpt positions will be moved toward or off to the edge of the elastic surface. Initially, the dummy cnxpt will be given a 'bias' tensor position from the edge of the elastic space nearest the 'bias' tensor position of the base cnxpt for the alias-hyperlink or other 'child' if such a 'bias' tensor is set. Dummy cnxpts will be sized to be no larger than its child. To make the dummy cnxpt begin as a small object on the display, the importance and size of it are set to zero. Alias-hyperlink cnxpts are sized to be the same as their base cnxpt.

Algorithm:

For each root cnxpt of the Enhanced Descendant Tree (including dummy cnxpts), until no more dummy cnxpts should be added:

If information is available that the root cnxpt should be at a level more distant from the root level of the tree, insert a dummy cnxpt as a parent to the root cnxpt.

If the root is an alias-hyperlink, insert a dummy cnxpt as a parent to the alias-hyperlink.

End for;

Calculate Ascendant Trees

Use Case: Calculate Ascendant Trees—Find the trees (not necessarily spanning) that show ancestors of cnxpts (in the sense as defined by the Descendant Trees) from each leaf cnxpt in each of the Descendant Trees.

Obtain an Ascendant Tree from each leaf of the Descendant Trees back to the roots that could be reachable to provide a navigation structure for the user such that when a user is viewing a cnxpt, and they 'turn around', they should see a choice of routes if the cnxpt had multiple parents. Each tree that provides the choice of routes is called a Basic Ascendant Tree, and the complete set of results is called the Basic Ascendant Forest. Each Basic Ascendant Forest is specific to a fxxt, and is based upon the calculations performed for construction of the Descendant Forest and Enhanced Descendant Forest for the fxxt. We start with a set of weighted directed tensors from those that are connecting the cnxpts of the Descendant Trees, plus the additional weighted directed tensors in the hyperlinkHierTensorAdded list.

Ascendant Trees use a reversed understanding of the directed hierarchical relationships (tensors) of the Descendant Tree. A root in the Ascendant Tree is always a leaf in a Descendant Tree. A parent in an Ascendant Tree is a child in the Descendant Tree. Because the Descendant Trees are found first, and because they have a structure formed from the tensors with least cost as found for that calculation, and no cycles were added, only a select set of tensors are missing from the set needed for this Ascendant Tree calculation. Those tensors are based upon the FINAL FXXT Hierarchical Tensors that are in the hyperlinkHierTensorAdded list. Some of these tensors will have to be used to show a look-back view that is correct from some cnxpt.

A cnxpt may exist in two or more Ascendant Trees wherever a cnxpt had two or more parents in the Descendant trees, at least two of which were in different Descendant Trees, so that an alias-hyperlink was established from a cnxpt in one tree to a cnxpt in another tree. The hyperlinkHierTensorAdded list items are used to build this structure as they are the set of tensors actually added to create the alias-hyperlinks. Not all of these tensors are useful!

Hierarchical associations not producing tensors in the (Unenhanced) Descendant Forest are saved in the residualHierAssocs list and may prove useful, but these may be redundant and the value of adding them is questionable.

Where a look back view is being developed as a tree, the space on a map to allocate to show a parent (in descendant tree sense) that was not a member of the set of cnxpts of the fxxt must be given some position. The position chosen should never be a space blocking the display of cnxpts that are members of the fxxt, and in one embodiment, should be outside of the normal view. To accomplish the positioning, a dummy cnxpt is created.

To work properly, the leaf in an ascendant tree has to be moved to the level of a root in the descendant tree so that space will be allocated to it when the roots are first analyzed by the algorithm. This is implemented by use of dummy cnxpts. Alias-hyperlink cnxpts are sized to be the same as their base cnxpt.

No tensors in the hyperlinkHierTensorAdded indicating outbound associations from the leaves of the Descendant Trees are usable (no such tensors should exist, since they would have formed a larger spanning tree out of two trees in the Descendant Tree formation process).

Alias-hyperlinks for a cnxpt which would be a leaf in an Enhanced Descendant Tree are not useful as they would be a root node of the Ascendant Tree and are not valuable to the user (this may be a bad presumption, but the constraint can easily be relaxed by removing the limitation). These alias-hyperlinks are potentially still in the hyperlinkHierTensorAdded list and have to be removed by condition detection and elimination.

Cycles are not allowed in the Ascendant Trees. No associations in the hyperlinkHierTensorAdded list will be cycles, since they are all in the HierAssocsCycles list.

No associations in the hyperlinkHierTensorAdded list will be redundant associations, where a child is descendant from multiple direct ascendants (both parent as well as grandparent or great grandparent, etc.), as these should now be in the residualHierAssocs list.

More than one route from a root of the Ascendant Tree (leaf on the Descendant Tree) to a leaf in the Ascendant Tree (root of the Descendant Tree) must not exist in the Ascendant Tree, but these could show up from alias-hyperlinks even as are potentially still in the hyperlinkHierTensorAdded list. The alias-hyperlinks that will cause problems are those where two tensors for the same alias-hyperlink (the same basis cnxpt) have the parent in the same tree, or where such a parent is in the same tree as the parent of the basis cnxpt itself. These have to be removed from use on the basis of the representatives found in the Descendant Tree Extraction or using the same type of process and considering the strength or some other determinant for selection decisions.

Terminology

In the following, the leaf and root mentioned are consistently as seen from their positions in Descendant Trees. Each cnxpt or surrogate cnxpt has its own single identity, and markings ('processed', 'represented by', etc. are not duplicated for any cnxpt or surrogate cnxpt. Copying a cnxpt only means that a reference to it is to appear in a new use as a member of a path, tree, etc. Still, the routes from any cnxpt to its parents are applicable from any surrogate cnxpt serving as an alias-hyperlink for that cnxpt.

Algorithm:

1. Create a new forest FA to contain all new Ascendant Trees for the fxxt and include the dummy cnxpts created above and the associations and tensors attaching to the dummy cnxpts.
2. Walk the Simple Descendant Forest tree by tree, generating a priority queue, named 'candidateAscForestCnxpts', of cnxpts that are in the tree. For each tree, set as a representative of the tree the identity of the root of the tree (descendant tree sense), and assign that identity as the representative of each cnxpt in the tree. The cnxpts are in the parent role of the hierarchical tensors in the Forest, or are leaf cnxpts such that they are in the child role of a hierarchical tensor but not in a parent role, or are not in a role in any hierarchical tensor as they are single cnxpt trees. Order the priority queue primarily by path length from the cnxpt to any root, shortest first, and secondarily by hierarchical tensor strength, highest first.
   1. In the same walk, generate a priority queue, named 'candidateAscForestTensors', of hierarchical tensors in the Forest, ordering them by their child role cnxpts according to the order of the cnxpts in the ordered candidateAscForestCnxpts queue.
3. Sort the hyperlinkHierTensorAdded list into and generate a priority queue, named 'candidateAscForestHyperlinkTensors', ordering the hierarchical tensors by the basis cnxpt that the hierarchical tensor's child role cnxpt is a surrogate of, and according to the order of cnxpts in the candidateAscForestCnxpts queue, secondarily by representative, and finally by decreasing strength of the hierarchical tensor, so that all entries with the same cnxpt are together. In doing so, delete all hierarchical tensors of lesser strength for any child role cnxpt and representative pair. This will delete lower strength alias-hyperlinks between a surrogate for a cnxpt and a parent in the same tree so that all ascending trees are proper trees.
4. Initially add all cnxpts in the candidateAscForestCnxpts queue to the forest FA. The trees that consist of only a single cnxpt will not have alias—hyperlink surrogates.
5. For each cnxpt Ci remaining on the candidateAscForestCnxpts queue:

1. If a hierarchical tensor exists in the candidateAscForestTensors queue for the cnxpt Ci, then reverse the parent and child role values and add the hierarchical tensor to the forest FA.

2. For each hierarchical tensor in the candidateAscForestHyperlinkTensors queue for a surrogate Sj of the cnxpt Ci, 1. Add a surrogate cnxpt (and a Dxo of the proper type) for surrogate Sj to the forest FA.
   2. Generate a copy of the hierarchical tensor in the candidateAscForestTensors queue for the cnxpt Ci, changing the child role cnxpt to be the surrogate Sj, and then reverse the parent and child role values and add the hierarchical tensor to the forest FA.
   3. For each other hierarchical tensor in the candidateAscForestHyperlinkTensors queue for a different surrogate Sk (k!=j) of the same cnxpt Ci,
      1. Generate a copy of that other hierarchical tensor in the candidateAscForestHyperlinkTensors queue for the different surrogate Sk of the cnxpt Ci, changing the child role cnxpt to be the surrogate Sj, and then reverse the parent and child role values and add the hierarchical tensor to the forest FA.
   4. Generate a copy of the hierarchical tensor in the candidateAscForestHyperlinkTensors queue for the surrogate Sj of the cnxpt Ci, changing the child role cnxpt to be the cnxpt Ci, and then reverse the parent and child role values and add the hierarchical tensor to the forest FA.
   5. Generate a copy of the hierarchical tensor in the candidateAscForestHyperlinkTensors queue for the surrogate Sj of the cnxpt Ci without changing the child role cnxpt, and then reverse the parent and child role values and add the hierarchical tensor to the forest FA.

3. Mark all hierarchical tensors in the candidateAscForestHyperlinkTensors queue for any surrogate of the cnxpt Ci as processed.

4. Mark the hierarchical tensor in the candidateAscForestTensors queue for the cnxpt Ci as having been processed 5. Mark the cnxpt Ci as having been processed.

Terminate

Build Enhanced Ascendant Tree Forest

Use Case: Build Enhanced Ascendant Tree Forest—Build a forest of trees from a Basic Ascendant Tree Forest to contain other dxos based upon the Fxxt Specification.

The result is the Enhanced Ascendant Forest.

The Basic Ascendant Tree Forest contains only a specific set of cnxpts and tensors and forms a framework for the Enhanced Ascendant Forest. Other dxos may need to be added for display.

Add references to all dxos specified in the fxxt that relate to the cnxpts in the Basic Ascendant Tree Forest as children of the cnxpts already in the trees.

Design Consideration:

Since the trees used as the basis of the enhancement process have already been constructed, and since the dxos to be added will not be a part of the tree building process, then either a reference to a dxo can be added or a hyperlink to it could be added. Since there are benefits to finding situations where hyperlinks can be used (where we can gain knowledge from the hyperlink's presence regarding the closeness of real relationships between cnxpts), then we will generate hyperlinks for certain types of added dxos, while still only adding references into the trees for the dxos. This allows the best of both.

Algorithm:

1. Make a copy of the Basic Ascendant Tree Forest and refer to it as the Enhanced Forest 'FEA'.

2. For each relationship added to the fxxt indicating that a dxo or txo is to be added to the fxxt map, and for the related cnxpt and each alias-hyperlink surrogate cnxpt for that cnxpt, generate into the fxxt tree a reference to the dxo or txo of the proper type, with association and tensor data for positioning it, as follows:

1. Depending upon the relationship indicating inclusion of the non-cnxpt object, choose a parent cnxpt for generating a hierarchical tensor to the non-cnxpt object from the parent cnxpt (here in the sense that of the ascendant tree where the parent is closer to the root of the ascendant tree that is a child) in the map. For non-cnxpt dxos in the ascendant map, in one embodiment the sense of the relationship indicating inclusion is the same as it is for descendant maps, and in one embodiment it is the opposite of the descendant maps; this causes dxos which are children of a cnxpt to be inside of the cnxpt in one embodiment, and outside of the cnxpt in the other embodiment, but clearly related to the cnxpt in each. If the relationship shows that a cnxpt (perhaps filling a role on the relationship, or being a parent of the cnxpt filling the role—child in one embodiment) is a category under which the non-cnxpt should be categorized or within which the non-cnxpt should be displayed, that cnxpt becomes the parent role cnxpt of the hierarchical tensor. Otherwise, use the cnxpt associated with the indicating relationship as the parent role cnxpt. Note that Alias-hyperlinks in an ascendant tree are not allowed to have parents that are dxos. In each case, connect the non-cnxpt as the child role in the hierarchical tensor, setting the scopx and infxtypx, and weight accordingly. Set a weight for the hierarchical tensor based upon the type and strength of the indicating relationship.
   2. Based upon the indicating relationship, generate FXXT FINAL affinitive associations between the non-cnxpt and each cnxpt or alias-hyperlink, setting the scopx and infxtypx, and weight accordingly.

Calculate Bottom Up Importance Metrics for Cnxpt Categories

Use Case: Bottom Up Importance Summarization—Create weighted average summaries of importance metrics for use in cnxpt display size determination, map generation and analysis based upon a Top Down summarization of the fxxt's importance values.

Perform a breadth first walk of the Descendant tree for the fxxt and generate a pushdown stack of cnxpt identifiers, resulting with the deepest cnxpt at the top of the stack. For each cnxpt on the top of the stack, determine a metric value for importance based upon a heuristic (basic: simple summation of ((importance vote system parameter setting)*('BASIC VOTED' importance votes (votes for importance—votes against))+((existence importance system parameter setting)*('BASIC VOTED' existence votes (votes for existence—votes against))+((interest importance system parameter setting)*('BASIC VOTED' interest summarization))+((interest importance system parameter setting)*sum of all child importance metrics)). (For efficiency, retain a running total for all children of a parent until the parent is processed from the top of the stack.) Generate an importance summary metric tuple consisting of a 'dirtied' flag, a 'last calculated timestamp', a fxxt or blank, and a summary importance metric value. Summaries will be retained in [importance summaries] and marked as a FXXT COMPLETE Importance summary.

Process Trees for Affinitive Tensor Generation

Use Case: Process Trees for Affinitive Tensor Generation—Calculate weighted affinitive tensors from weighted affinitive association summaries to prepare the tree for position and sizing for map generation.

After hierarchy extraction, the trees are processed for affinitive tensor generation based upon rolling up of affinitive associations. Then the trees are processed for cnxpt positioning.

Note that hierarchical associations and directed affinitive associations from the fxxt are processed in this step as well as undirected affinitive associations. This provides an inclusive structure for determining relatedness. The hierarchical associations are mirrored into directed affinitive associations under the control of the fxxt specification so that they can be disregarded (removed from the fxxt or never generated so as they never affect the position in the map) prior to this step. The directed associations are used to give flow and map relative location structures in the heuristics based positioning algorithms. The directed associations are also used to impute relative positions between cnxpts where the relative distances are based upon the strength of the association as set for a specific type of directed affinitive association such as, including but not limited to: 'time delay', 'relative importance difference', 'distance between' to give greater meaning to the directionality of the affinitive association. When affinitive associations are summarized and when they are used as the basis of Affinitive Tensor generation, their directionality (by its type) is retained. In some summarization steps within heuristics, the directionality (and/or the directionality types) is dropped to yield pure relation strength. Where the directionality or type is dropped, the resulting summary is formed by resolving the directionality by first 'netting out' the direction—adding the 'left facing' strengths and subtracting the 'right facing' strengths of the association, and if positive, a 'left facing' association/tensor is created, while if negative, a 'right facing' association/tensor is created (and strength value is the inverted). The netting out takes place prior to adding strengths of undirected affinitive associations.

'FLOW' Tensor Generation

Use Case: Generate 'FLOW' Tensors for Enforcing Map Segment Positioning—Generate special tensors for enforcing a FLOW to keep cnxpts near to the segment of a map appropriate to a metric specified for a fxxt based map.

Create weighted 'FLOW' tensors based upon previously established map segmentation (representative fractions of the elastic surface of the nature of a 'scale' of a map, in one, two, or three dimensions) in the current fxxt, to provide for positioning to describe lateral positioning (representative fraction positioning) relationships between map objects in map generation.

Generate FLOW Tensor position tuples based on the segment of a map a cnxpt should be relative in the fxxt to force positions of the cnxpts to show specialized information, such as, including but not limited to: flows, time relationships, cnxpt interactions over time, etc., regardless of level in the tree. The value of the tensor will be the centroid of a segment defined for the map based upon, including but not limited to: a property, a trait, a 'purlieu', time slice, vertical slice, horizontal slice, zone, quadrant, etc., a weight based upon the importance of being within the segment (this can be seen as a tolerance measure for being within the segment).

FLOW Tensor position tuples may be generated by an analysis of a plurality of, including but not limited to: cnxpt associations, traits, purlieus, occurrences to information resources.

Calculate Roll-up Association Weights to form Positioning Tensors

Use Case: Calculate Roll-up Association Weights to form Positioning Tensors—Calculate rolled-up association weights by generating affinitive tensors between cnxpts that are both at the same depth of the forest of trees or between cnxpts that are in adjacent levels.

The purpose of this step is prepare for co-location displays on maps by generating affinitive tensors between cnxpts that are at most one depth level apart in the forest of trees. When we have a tree to display, our problem is that first level below tree may have several nodes, and we have to figure out which are most strongly related to properly position them. The relatedness comes from the whole tree, not just the top node. so, we need to recursively determine the relatedness. We manage it by forming a queue to work bottom up and tally. In the meantime, we can build a derivation tree for doing it again, since the higher toward the root we go, the more stable the data is. This algorithm assesses the strength of associations between cnxpts at the same depth of the forest (either Descendant or Ascendant) and at one level of difference in depth from the FXXT FINAL affinitive associations. Where the association is strong, the cnxpts should appear close to one another on the displayed map. Otherwise, we do not care as much about how close the cnxpts appear to one another.

Implementation Shortcut: If a proper forest is not input to this process, loops will be problematic because the roll-ups process will not be deterministic. We can determine that rather quickly though if the algorithm has a check to see if a node has been visited in generating the queue (if so, discard/do not use it, as a loop exists).

Two major position determinations of the fxxt specific TTX map display are based upon affinitive relationships: the positions of siblings, and the orientation of each cnxpt in relation to it's 'uncles'. The position determinations for a cnxpt are primarily determined by its being within its parent cnxpt. Within the parent, its position is based upon a number of factors including its importance, and its relationship strength to its siblings. 'Sibling ROLL-UP' affinitive associations provide these strengths.

Where a cnxpt is strongly related, as compared to its siblings, to an 'uncle', we additionally orient the cnxpt to be on the side of the parent's displayed image (in 3D, within the encompassing display for the children) that is closest to the 'uncle'. The 'Uncle ROLL-UP' affinitive associations are utilized for this decision.

For each fxxt, obtain these different sets of weightings by generating three different forms of 'ROLL-UP' affinitive associations, and summarize those associations to form tensors. For each cnxpt, determine three components of affinitive association strength.

- Determine how relatively distant from each cousin a cnxpt should be on a fxxt specific TTX map. This is an indirect positioning determination, since it causes the position of the parent to change. It also indirectly creates weighting between cnxpts and uncles. This requires raising up the weightings of all associations between a cnxpt and a cousin (neither a parent or grandparent of the other) to their parents, so long as their parents are different. The weightings are moved up on both ends, and where one cnxpt is on a level different from the other, the level differential is maintained until one end of the raised-up copy is a root cnxpt. Where one end is raised to a root, additional raised-up copies are created by raising up only one end until it is connected to a root or to a sibling of the other end. This is iterative, resulting in leaving the cousin to cousin association in place, but also raising a copy up to the parents. These new associations are called 'Cousin ROLL-UP' affinitive associations where they are at children of different parents and at the same level. They are called 'Sibling ROLL-UP' affinitive associations where they are at children of the same parent (or both at roots). They are called 'Uncle ROLL-UP' affinitive associations where they are between a cnxpt and the cousin's parent, where the cnxpt is exactly one level lower than the uncle in the fxxt tree.

Determine how relatively distant from each other each set of sibling cnxpts (children cnxpts of a common parent (category) cnxpt) should be when displayed on a fxxt specific TTX map. This requires raising up the weightings of all associations between cousins (and 'Cousin ROLL-UP' affinitive associations) to their parents until the endpoints of the new association are siblings. This association is generated by raising up a copy of a top cousin to cousin affinitive association one more level, if possible, resulting in leaving the cousin to cousin association in place, but also raising a up a copy to be between siblings. These new associations are called 'Sibling ROLL-UP' affinitive associations.

Determine how relatively distant from each uncle (one of the siblings and cousins of the cnxpt's parent) a cnxpt should be on a fxxt specific TTX map. This requires raising up the weightings of all associations between a cnxpt and a cousin to become associations between the cnxpt and the cousin's parent, where the cnxpt is exactly one level lower than the uncle in the fxxt tree. This is iterative, resulting in both leaving the cousin to cousin association in place, but also raising a copy up on the opposite endpoint, until a copy is between the original cnxpt and the parent of the sibling or cousin. These new associations are called 'Uncle ROLL-UP' affinitive associations.

As the determination of level differentials may be difficult or inefficient, all associations between cousins (and 'Cousin ROLL-UP' affinitive associations) may be raised in three different configurations at the same time: both endpoints to their parents, one endpoint to its parent, or the other endpoint to its parent. The coefficient for raised weights can, in this method, be set to 0.5, 0.25, and 0.25 times the normal single raising coefficient as set by a system parameter setting.

The degree to raise up a value of a strength of an association is dependent upon the differential in the levels of the endpoint cnxpts of an affinitive association being considered. If a deep cnxpt is at one end of an affinitive association and the depth of the other endpoint is many levels higher, then raise the 'Uncle ROLL-UP' affinitive association to have an impact at one level lower than the higher cnxpt. The positioning of the ancestor of the lower endpoint will force the lower endpoint cnxpt to be positioned somewhat relative due to the accumulation of such strengths.

A later calculation determines the actual positioning of cnxpts out from the parent (root) down on a breadth first basis. This positioning is based upon the summarization process involving 'ROLL-UP' affinitive associations between cnxpt pairs, resulting in affinitive tensors. The FXXT FINAL affinitive associations are not later utilized for the generation of tensors, having been replaced by the 'ROLL-UP' affinitive associations and then by tensors.

Start by raising up associations where the depths of the endpoints are greatest. After an 'uncle' association has been raised up to its needed level (a depth differential of 1), then raise it up as a 'cousin' if possible. After a 'cousin' association has been raised up to its needed level (highest level where the endpoints have a different parent), then raise it up as a 'sibling' if possible. After all 'uncle' associations have been raised, raise 'cousins'. After all 'cousins' associations have been raised, summarize all 'ROLL-UP' affinitive associations into 'Between-Sibling-Ring Attractor' and 'To-Uncle Attractor' tensors, and then terminate. The summarization into tensors may occur coincidentally by generating tensors directly rather than by generating 'ROLL-UP' affinitive associations first.

Algorithm:

Collect all FXXT FINAL affinitive association information for associations between the cnxpts in the fxxt being considered into a priority queue of affinitive associations 'EQbase'.

1. Form a priority queue 'ECn' of tuples consisting of 1) cnxpts, non-cnxpts, and alias-hyperlinks, 2) parent cnxpts, 3) depth, ordering them by depth from the forest roots, and secondarily by parent cnxpt identifier or null if no parent exists cnxpt (all alias-hyperlinks must have cnxpts as parents, as do any txo or dxo non-cnxpts added to the 'forest' for the fxxt.). Roots are listed last.

If processing an Ascendant Forest, a cnxpt may appear with multiple parents in various tuples in the list, and have different depths.

In this process, do a breadth first walk of all trees in the forest, calculating and marking the depth of all cnxpts and alias-hyperlinks in the forest and forming a priority queue of all cnxpts and alias-hyperlinks by depth, deepest first.

(This can be done more efficiently if this process is combined with alias-hyperlink creation and if the depths are already marked on all cnxpts in the FXXT FINAL hierarchical associations.)

2. For each tuple in the priority queue 'ECn', consider the cnxpt or alias-hyperlink on the front of the list:

2.1. Create a second priority queue 'EQn' of tuples consisting of 1) 'association identifier' to the identifier of a FXXT FINAL, 'Uncle ROLL-UP', or 'Cousin ROLL-UP' affinitive association (those within the fxxt) of the cnxpt or alias-hyperlink being considered, that has not been marked as 'processed' by this procedure; 2) 'from cnxpt' set initially as the identifier of the cnxpt or alias-hyperlink being considered; 3) 'to cnxpt' set initially as the identifier of the cnxpt on the opposite endpoint role; 4) 'from depth' set initially as the depth of the cnxpt or alias-hyperlink being considered; 5) 'to depth' set initially as the depth of the cnxpt on the opposite endpoint role; 6) a 'basis identifier', initially the identifier of the affinitive association; 7) a weight, initially the weight of the affinitive association.

2.2. Sort the priority queue 'EQn' by depth of the opposite endpoint as a major ordering with deepest (closest to leaf) first; and then by the identity of the cnxpt at the opposite endpoint.

2.3. For each tuple remaining in the 'EQn' queue:

2.3.1 If the 'to depth' is greater than the 'from depth', 1) mark the association whose identifier is given in the tuple as 'processed' and remove the tuple for the affinitive association from 'EQn'. (This condition occurs when an association was already processed, but not properly marked as processed.)

2.3.2 Determine the parents of the endpoint role holders, as 'from parent' and 'to parent'.

2.3.3 If the 'to depth' is the same as the 'from depth', then:

2.3.3.1 Generate a 'ROLL-UP' affinitive association from the tuple in 'EQn' and the affinitive association identified in the tuple. Assign the new 'ROLL-UP' affinitive association a new identifier. Assign to its roles the 'from cnxpt' identifier and the 'to cnxpt' identifier of the tuple. Assign the 'association identifier' identifier of the tuple to the summary basis role. (In one embodiment, assign the 'basis identifier' identifier of the tuple to the summary basis role.) Assign the weight in the tuple to the 'ROLL-UP' affinitive association.

2.3.3.2 If the 'from parent' is the same as the 'to parent', or if both are null, then make the generated 'ROLL-UP' affinitive association a 'Sibling ROLL-UP', mark the new 'ROLL-UP' as processed, mark the association given by the 'association identifier' identifier as processed, and remove the tuple from the list.

2.3.3.3 If the 'from parent' is not the same as the 'to parent', then:

2.3.3.3.1 make the generated 'ROLL-UP' affinitive association a 'Cousin ROLL-UP' and do not mark it as 'processed'.

2.3.3.3.2 add a new tuple in 'EQn', setting 1) the 'association identifier' to the identifier of the just generated affinitive association; 2) 'from cnxpt' as the identifier of the 'from parent'; 3) 'to cnxpt' as the identifier of the 'to parent'; 4) 'from depth' set as currently considered 'from depth' minus 1; 5) 'to depth' set as currently considered 'to depth' minus 1; 6) a 'basis identifier' as the currently considered 'basis identifier'; 7) Calculate a weight based upon the currently considered weight (in the currently considered tuple) by multiplying that weight by a system parameter set 'fudge factor'.

2.3.3.3.3 mark the association given by the 'association identifier' identifier as processed, and remove the tuple from the list.

2.3.4 If the 'to depth' is less than the 'from depth', then:

2.3.4.1 Generate an 'Uncle ROLL-UP' affinitive association from the tuple in 'EQn' and the affinitive association identified in the tuple. Assign the new 'ROLL-UP' affinitive association a new identifier. Assign to its roles the 'from cnxpt' identifier and the 'to cnxpt' identifier of the tuple. Assign the 'association identifier' identifier of the tuple to the summary basis role. (In one embodiment, assign the 'basis identifier' identifier of the tuple to the summary basis role.) Assign a weight based upon the weight in the tuple to the 'Uncle ROLL-UP' affinitive association. (Do not mark the new 'ROLL-UP' association as 'processed'.)

2.3.4.2 add a new tuple in 'EQn', setting 1) the 'association identifier' to the identifier of the just generated affinitive association; 2) 'from cnxpt' as the identifier of the 'from parent'; 3) 'to cnxpt' as the identifier of the 'to cnxpt' (thus not raising the opposite endpoint); 4) 'from depth' set as currently considered 'from depth' minus 1; 5) 'to depth' set as currently considered 'to depth'; 6) a 'basis identifier' as the currently considered 'basis identifier'; 7) Calculate a weight based upon the currently considered weight (in the currently considered tuple) by multiplying that weight by a system parameter set 'fudge factor'.

2.3.4.3 mark the association given by the 'association identifier' identifier as processed, and remove the tuple from the list.

3. Summarize all Roll-up affinitive associations of each cnxpt pair, generating 'Between-Sibling-Ring Attractor' tensors from the 'Sibling ROLL-UP' associations and 'To-Uncle Attractor' tensors from the 'Uncle ROLL-UP' associations for the cnxpt-pair.

In one embodiment, the directed nature of directed affinitive associations is rolled up, where each summarization involving them is performed on a 'netting out' basis for the directionality or the association to have the effect in later positioning to force a cnxpt's ancestors to be in a relative position not simply based upon distance but also on direction.

In one embodiment, 'FLOW' tensors are rolled up into 'FLOW Roll-up' Affinitive Tensors to have the effect in positioning to force a cnxpt to be in a position relative to a defined representative fractional segment of a map and thus necessarily to force a cnxpt's ancestors to be in positions such that the cnxpt itself is able to both be positioned inside the ancestor as well as being in the defined segment. Being positioned within one representative fraction does not suggest that the cnxpt only fits in that single representative fractional area, since the analysis may have yielded a range of representative fractional areas where the cnxpt would fit.

'FXXT COMPLETE' Summary Tensor Generation

Combine by fxxt all summary tensors of the same type and between a single cnxpt pair into a single weighted value tensor.

'FXXT COMPLETE' Hierarchical Tensor Summarization

Use Case: 'FXXT COMPLETE' Hierarchical tensor Summarization—Create weighted average summaries of 'FXXT COMPLETE' hierarchical tensor data to conserve space and provide for map generation.

Generate a set of hierarchical tensor summary items calculated for each cnxpt. Each summary will be marked with a summary name, a 'dirtied' flag, a 'last calculated timestamp', an optional fxxt, an optional scopx, and a relationship identifier. Summaries will be retained in [hierarchical tensor summaries] and marked as 'FXXT COMPLETE'.

This algorithm may be necessary for clean up only. No re-execution of tree extraction will occur.

Combine, by every combination of fxxt and scopx available within a cnxpt, all hierarchical tensors from the cnxpt to another cnxpt. Place the tensor into the [hierarchical tensor summaries] list as all Summary Hierarchical tensors for the cnxpt, assigning the fxxt, the scopx, and a single weight value which is the total calculated by a heuristic (initially, this heuristic will be the average weight of all the relationships of the type for that cnxpt multiplied by the number of relationships being summarized times a factor based upon the number of relationships (1 initially)).

'FLOW' Tensor Summarization

Use Case: Summarize 'FLOW' Tensors based upon Fxxt Specification—Create weighted 'Summary FLOW' tensors based upon previously established map segmentation in the current fxxt, to provide for positioning to describe lateral positioning (representative fraction positioning) relationships between map objects in map generation.

'BIAS' Tensor Summarization

Use Case: Generate 'BIAS' Tensors Enforcing Prior Positions—Generate special tensors for enforcing a bias to keep cnxpts near to their prior positions for a fxxt based map.

Use Case: Summarize 'BIAS' Tensors based upon Fxxt Specification—Create weighted 'Summary BIAS' tensors based upon previously assigned positions in the current fxxt and currently assigned positions in another fxxt, for each cnxpt in the fxxt, to provide for position based cluster analysis and map generation.

Generate Bias Tensor position tuples based on the position of a cnxpt relative to its parent in the fxxt to force positions of the cnxpts to be similar to prior calculated positions for the fxxt. Generate a 'same-fxxt BIAS' tensor for any cnxpt previously having a position in the fxxt, regardless of level in the tree. The value of the tensor will be the position and a weight based upon the number of previous times a similar (differential in distance is minimal (error <0.1*radius of parent) between the past several positionings) position was assigned for the cnxpt. The 'same-fxxt BIAS' tensors generated for one fxxt are exactly 'Different-fxxt BIAS' tensors for other fxxts.

Auxiliary Tensor Generation for Category Object (Sphere) Constraints

The positioning algorithm provides for automatic generation or calculation of tensors for forcing positions of siblings to stay within boundaries set by the elastic surface or their parent; within a parent based upon their importance, overlap elimination, and sibling relationship weights. The first algorithms here are for additional tensor generations, if any. Cnxpt sizes and positions determined here, if any are reset later. Cnxpt sizes and positions in tuples will be reset for the fxxt when the positioning algorithms execute.

Use Case: Process Trees for Tensor Generation—Generate special tensors and sizes for enforcing object spacing for a fxxt based map.

Generate additional tensors to force positions of siblings to be within parent areas or, for root cnxpts, to be within a circle which can be inscribed within the elastic surface times a heuristic set by a system parameter. The cnxpts will be dispersed naturally within the space in a later step.

Generate additional tensors to force positions of siblings to be within parent cnxpt areas. The tensor strength is set to the distance from the center of the parent or from the centroid of the elastic surface for root cnxpts. While this is not a precise positioning metric on its own, it provides for a gap setting open to heuristic adjustment. These distances will affect positioning in a later heuristic.

Generate sizes from FXXT COMPLETE Importance summaries for each cnxpt into 'Cnxpt Size Tuple for Fxxt' tuples. While this is not a precise sizing metric on its own, it provides for a good approximation also open to heuristic adjustment.

Use Case: Process Root Cnxpts for Tensor Generation for Distances—Generate special tensors for enforcing root cnxpt spacing for a fxxt based map.

Generate additional Importance-Ring Attractor tensors to force positions of the root cnxpts to be certain distances from the centroid of the elastic surface. Generate an 'Importance-Ring Attractor-ROOT' tensor from the FXXT COMPLETE Importance summaries for root cnxpts in the fxxt being considered.

The purpose of the tensor strength is to spread the root cnxpts around the elastic surface such that the highest importance cnxpts are closest to the center, but the least important are no further than the radius of the circle inscribed sufficiently inside the elastic surface. The strength for this tensor is a distance from the centroid of the of the elastic surface rather than to a real cnxpt object. It is an attractor to a position defined as being closer to the centroid of the elastic surface than the position held by other root cnxpts which are considered less important, and being further away from the centroid of the elastic surface than the position held by other root cnxpts which are considered more important.

Consider each root cnxpt. For each root cnxpt in the fxxt being considered, divide ((the difference between the maximum of the importance values from all root cnxpt FXXT COMPLETE Importance summaries minus the importance value from the FXXT COMPLETE Importance summary of the considered root cnxpt) times (the radius of the inscribed circle (as determined from the quantity ½ the smaller aspect of the elastic surface times 0.9 (or a system parameter setting 'q' 0.5<q <1)) minus ½ of the minimum of the importance values from all root cnxpt FXXT COMPLETE Importance summaries)) by (the difference between the maximum and the minimum of the importance values from all root cnxpt FXXT COMPLETE Importance summaries) and set the Importance-Ring Attractor tensor weight value. In addition, set the cnxpt's initial position distance from the centroid of the elastic surface to that distance in the cnxpt's Cnxpt Position Tuple for Fxxt tuple based upon the importance.

Set the initial position distance from the centroid of the parent to that distance in the cnxpt's Cnxpt Position Tuple for Fxxt tuple.

Use Case: Process Root Cnxpts for Sizing—Generate display object sizing for root cnxpts for a fxxt based map.

Determine the relative cnxpt sizes of all root cnxpts of the fxxt based upon the importance of each cnxpt as summarized. To do so, first determine a normalization factor as the square root of (0.6 (or a system parameter setting 'p' 0.5<p<1) times (the sum of the squares of the importance values) divided by (the area of a circle inscribed by the elastic surface [as given by pi times the square of ½ of the length of the smaller aspect])). Multiply the FXXT COMPLETE Importance summary strength for each cnxpt by the factor to determine the cnxpt's size, and store the size in a [size] Cnxpt Size Tuple for Fxxt tuple for the cnxpt and for the fxxt to that size.

Use Case: Process Root Cnxpts for non-overlapping Tensor Generation—Generate special tensors for enforcing the non-overlapping of root cnxpts for a fxxt based map.

Generate additional tensors to force positions of the root cnxpts to be spaced at certain minimum distances from one another by generating minimum centroid to centroid distances of the root cnxpts. Generate a 'Between-Category Repulsor' tensor from the sizes set for the root cnxpts in the fxxt being considered. Consider each pair of root cnxpts of the fxxt. Generate a 'Between-Category Repulsor' tensor from the sum of the computed size records for the two cnxpts.

The purpose of the tensor strength for 'Between-Category Repulsor' tensors is to ensure that cnxpts never overlap within a specific fxxt. A cnxpt overlap would imply that the hierarchical categorization within the fxxt is incorrect.

The use of these tensors may be rejected during implementation and replaced by the use of object distance minimums and object radius calculations wherein the separation (distance) between objects is a constraint and is maximized during positioning while constrained by the map size.

These tensors may ultimately also be based, in part, upon the inter-sibling strengths. This additional feature is not fully described in this section because the algorithm described considers those strengths effectively.

Use Case: Process non-Root Cnxpts for Tensor Generation for Distances—Generate special tensors for enforcing non-root cnxpt spacing for a fxxt based map.

Generate additional Importance-Ring Attractor tensors to force positions of the non-root cnxpts to be certain distances from the centroid of the parent cnxpt. Generate a 'Importance-Ring Attractor-CHILD' tensor from the FXXT COMPLETE Importance summaries for child cnxpts of a parent cnxpt in the fxxt being considered.

The purpose of the tensor strength is to spread the child cnxpts around the display object of the parent cnxpt such that the highest importance cnxpts are closest to the center, but the least important are no further than the radius of the circle inscribed sufficiently inside the parent cnxpt. The strength for this tensor is a distance from the centroid of the of the parent cnxpt and is thus related to a cnxpt object—the parent. It is an attractor to a position defined as being closer to the centroid of the parent cnxpt than the position held by other sibling cnxpts which are considered less important, and being further away from the centroid of the parent cnxpt than the position held by other sibling cnxpts which are considered more important.

Consider each child cnxpt of a parent cnxpt. For each child cnxpt of that parent in the fxxt being considered, divide ((the difference between the maximum of the importance values from all child cnxpt FXXT COMPLETE Importance summaries minus the importance value from the FXXT COMPLETE Importance summary of the considered child cnxpt) times (the radius of the inscribed circle (as determined from the quantity ½ the smaller aspect of the elastic surface times 0.9 (or a system parameter setting 'q' $0.5<q<1$)) minus ½ of the minimum of the importance values from all child cnxpt FXXT COMPLETE Importance summaries for the children of that parent)) by (the difference between the maximum and the minimum of the importance values from all child cnxpt FXXT COMPLETE Importance summaries for the children of that parent) and set the Importance-Ring Attractor tensor weight value. In addition, set the cnxpt's initial position distance from the centroid of the parent to that distance in the cnxpt's Cnxpt Position Tuple for Fxxt tuple based upon the importance.

Use Case: Process Child Cnxpts for Sizing—Generate display object sizing for all non-root cnxpts for a fxxt based map.

In a top down walk (or a walk of the queue), for each parent cnxpt in the fxxt, determine the relative cnxpt sizes of all child cnxpts of the fxxt based upon the importance of each cnxpt as summarized. To do so, first determine a normalization factor as the square root of (0.6 (or a system parameter setting 'p' $0.5<p<1$) times (the sum of the squares of the importance values) divided by (the area of a circle inscribed by the parent cnxpt [as given by pi times the square of the radius of the parent cnxpt])). Multiply the FXXT COMPLETE Importance summary strength for each child cnxpt by the factor to determine the cnxpt's size, and store the size in a [size] Cnxpt Size Tuple for Fxxt tuple for the cnxpt and for the fxxt to that size.

Use Case: Process Child Cnxpts for non-overlapping Tensor Generation—Generate special tensors for enforcing the non-overlapping of child cnxpts for a fxxt based map.

Generate additional tensors to force positions of the non-root cnxpts to be spaced at certain minimum distances from one another by generating minimum centroid to centroid distances of the child cnxpts. Generate a 'Between-Category Repulsor' tensor from the sizes set for the child cnxpts of each parent cnxpt in the fxxt being considered. Consider each pair of child cnxpts of each parent cnxpt of the fxxt. Generate a 'Between-Category Repulsor' tensor from the sum of the computed size records for the two cnxpts.

The purpose of the tensor strength for 'Between-Category Repulsor' tensors is to ensure that cnxpts never overlap within a parent cnxpt. A cnxpt overlap would imply that the hierarchical categorization within the fxxt is incorrect for the parent cnxpt. In reality, there should be an overlap between many ttxs that are represented by the cnxpts, but it is anticipated that this circumstance would be used by a user to form a new category and differentiate the cnxpts more clearly within the category, where the intersection is attributed to the parent and the differences define the child cnxpts.

The use of these tensors may be rejected during implementation and replaced by the use of object distance minimums and object radius calculations wherein the separation (distance) between objects is a constraint and is maximized during positioning while constrained by the map size.

Summarize 'FXXT COMPLETE' Affinitive tensors

Use Case: 'FXXT COMPLETE' Affinitive tensor Summarization—Create weighted average summaries of 'FXXT COMPLETE' affinitive tensor data to conserve space and provide for map generation.

Generate a set of affinitive tensor summary items calculated for this cnxpt. Each summary will be marked with a summary name, a 'dirtied' flag, a 'last calculated timestamp', an optional fxxt, an optional scopx, and a relationship identifier. Summaries will be retained in [affinitive tensor summaries] and marked as 'FXXT COMPLETE'. Directed affinitive tensors are 'netted out' in this summarization process. The directedness of directed affinitive tensors is retained where it exists. In one embodiment, directed affinitive tensors have the effect in positioning to force a cnxpt to be in a relative position not simply based upon distance but also on direction.

Combine, by every combination of fxxt and scopx available within a cnxpt, all affinitive tensors from the cnxpt to another cnxpt. Place the tensor into the [affinitive tensor summaries] list as all Summary Affinitive tensors for the cnxpt, assigning the fxxt, the scopx, and a single weight value which is the total calculated by a heuristic (initially, this heuristic will be the average weight of all the relationships of the type for that cnxpt multiplied by the number of relationships being summarized times a factor based upon the number of relationships (1 initially)).

Use Case: Process Cnxpts for Sibling-Attraction Tensor Generation—Generate special tensors for enforcing the inter-relatedness of sibling cnxpts for a fxxt based map.

Use Case: Generate Summary Affinitive Tensors—Create weighted summaries of affinitive tensors for each cnxpt in each fxxt to point specifically to at most one opposite end cnxpt in any fxxt to provide for map generation.

Combine by fxxt all of a cnxpt's Summary Affinitive associations with any single opposite end cnxpt into a single weighted value affinitive tensor, with either one or zero fxxts, and with at most one opposing end cnxpt identifier. For efficiency, set or update the 'mirror' affinitive tensor in the opposite end cnxpt where possible. Place the tensors into the [affinitive tensors] list, assigning the fxxt and a single weight value which is the total calculated by a heuristic (initially, this heuristic will be the average weight of all the tensors of the type for that cnxpt multiplied by the number of associations being summarized times a factor based upon the number of associations (1 initially, or set by a system parameter)).

Uncles

Combine by fxxt all of a cnxpt's 'Uncle ROLL-UP' affinitive associations with any single opposite end cnxpt into a single weighted value 'To-Uncle Attractor' tensor, with either one or zero fxxts, and with at most one opposing end cnxpt identifier. For efficiency, set or update the 'mirror' affinitive tensor in the opposite end cnxpt where possible. The combination is a simple addition of weights, since the roll-up process compensates for de-emphasis of lower level weights.

Siblings

Generate additional tensors to force positions of sibling cnxpts to be nearer to related siblings than to unrelated siblings. Generate a 'Between-Sibling-Ring Attractor'—tensor from the ranking of inter-cnxpt relationship strengths based upon the 'Sibling ROLL-UP' affinitive associations between siblings for the child cnxpts of each parent cnxpt in the fxxt being considered, and for the root cnxpts. Combine by fxxt all of a cnxpt's 'Sibling ROLL-UP' affinitive association weights with any single opposite end cnxpt into a single weighted value 'Between-Sibling-Ring Attractor' tensor, with either one or zero fxxts, and with at most one opposing end cnxpt identifier. The purpose of the tensor strength for 'Between-Sibling-Ring Attractor' tensors is to ensure that each cnxpt stays at an appropriate (not either too close or too far away) distance from its sibling cnxpts based upon the inter-sibling strengths. For efficiency, set or update the 'mirror' 'Between-Sibling-Ring Attractor' tensor in the opposite end cnxpt where possible. The combination is a simple addition of weights, since the roll-up process compensates for de-emphasis of lower level weights.

Process Trees for Visualization Generation, Position Determination and Final Sizing The resulting weighted tensors and identities are used for positioning and repositioning cnxpts in a virtual map based upon the scopx and fxxts analyzed. This map is filtered, communicated, and displayed for the user.

In one embodiment, user changes cause a modified display of the map. In one embodiment, user changes cause an immediately modified local display of the map for that user.

In one embodiment, directed affinitive tensors have the effect in positioning to force a cnxpt to be in a relative position not simply based upon distance but also on direction.

In one embodiment, 'FLOW' tensors have the effect in positioning to force a cnxpt to be in a position relative to a defined segment of a map.

In one embodiment, Enhanced Descendant forests of trees are positioned by this algorithm, and in that embodiment, the algorithms for this section apply to the more general dxo info-item rather than the limited cnxpt info-item. In that embodiment, additional tensors are generated to direct positioning of displayable objects on the map including but not limited to cnxpts in the fxxt, alias-hyperlinks, and others.

Enhanced forests of trees are positioned by this algorithm. For those, the algorithms for this section apply to the more general dxo info-item rather than the limited cnxpt info-item. Additional tensors are generated to direct positioning of displayable objects on the map including but not limited to cnxpts in the fxxt, alias-hyperlinks, and other info-items.

Use Case: Process Trees for Position Determination—Generate map positions for cnxpts on a fxxt based map.

Use Case: Generate Visualization Data.

Use Case: Create Maps for each Fxxt—When relationships in a fxxt are dirtied, and when an appropriate time arrives for a recalculation of the map for a fxxt, then use the summarized votes to calculate a new mapping for a fxxt.

Use Case: Position Objects for Visualization—Place objects for map onto a 3D world coordinate system in a position related to the closeness of the object to others logically according to a fxxt.

Use Case: Perform Cnxpt and Relationship Calculations—Using the Enhanced Descendant Forest, calculate all formulas based upon the derivation tree dependencies for the formula.

Use Case: Place Root Dxos—Determine positions for the root Dxos of a forest on the 3D world coordinate canvas.

Determine positions for cnxpts (including goals, alias-hyperlink, 'dummy' cnxpts, and other dxos) on a elastic surface canvas in 3D. The result of this process is a map with fixed positions in 3 space for use by client applications. The positions are fixed by world coordinates. The clients will show the map segments within view ports that utilize the fixed coordinate positions, but are navigable and the view port position may be moved.

This algorithm provides for a series of constraints to force the root cnxpts into a set of 'comfortable' positions in the 3D space provided for the map. This 3D space is based upon 0 to 1 valued axes. The algorithm determines a positioning for each root cnxpt so that it is assigned an area that is unoccupied as its 'region', and so that it is fully on the elastic surface. The constraints force the child cnxpts into a set of 'comfortable' positions within their respective parents so that it is nearer to its closely related siblings and possibly further from its less closely related siblings. There is no need here to achieve an optimal positioning, as an approximate one will suffice in most cases, and the positioning will improve over time.

The algorithm takes into account several aesthetics and drawing conventions, and support user-defined constraints specified in filters and Fxxt Specifications using filters.

There are various modes of operation of this algorithm that either show or hide relationships, provide different constraint models, etc. Generally, we attempt to eliminate the concern that relationships cross.

An objective of the approach is to preserve the mental map the user has of the resulting map by limiting the changes to those affecting the new layout of children of each cnxpt when the CMMDB undergoes a series of updates. Most changes will be local, causing changes to ancestors far less frequently than for children. The client applications will utilize the objects at will but not alter the positions as set on the server, although the user changes will cause changes on a next iteration or cause local changes. In one embodiment, changes will occur as soon as possible.

A level consists of all cnxpts of a certain depth from the root of the tree that they are in. The root level, considered by the prior process, is considered the 0th level. The cnxpts on a level k are the child cnxpts of the cnxpts on the level k−1. The parent cnxpts of a level are positioned in a prior iteration of this process or in the root positioning process. Parents of cnxpts in a level are really not in the level, but for communication, we speak of them as parents on the level.

In one embodiment, this procedure operates on a level of one tree of the forest being considered, positioning the roots of the trees in the forest, or positioning the child cnxpts of only one parent on the level in each cycle.

In one embodiment, this procedure operates on all child cnxpts on one level of the forest in one cycle, so that all cnxpts on the level retain their relative sizing based upon their individual importance. (The difference in implementation is merely that when a change in size of cnxpts is required for any cnxpt at the level, the same adjustment in size is applied to all cnxpts at that level (including goals, alias-hyperlink, 'dummy' cnxpts, other dxos, etc.)

The specific positioning requirements can be viewed as constraints input to the drawing algorithm. A position constraint assigns to a cnxpt a topologically connected region where the cnxpt should remain Examples of prescribed regions include:

- a single point, equivalent to 'pinning down' the cnxpt at a specific location;
- a sphere, which allows to place groups of cnxpts into distinct regions.

a parent object's body, which allows to place groups of child cnxpts into distinct regions.

The algorithm design requirements include, but are not limited to:

A given subset of cnxpts are placed 'closer together' where their interrelationships are more strongly weighted.

A subset of cnxpts which share membership in a category are placed within that category cnxpt. In cases where a cnxpt is in multiple categories (has multiple 'parents'), a surrogate alias-hyperlink is used to replace the cnxpt where the strength between the cnxpt and its parent is not the strongest over all such parents (tie breaking is also used).

Category cnxpts prescribe their sub graph constraints.

Each cnxpt is sized appropriately according to its relative importance and fit within its parent category cnxpt or grouping.

Cnxpts are drawn with appropriate predefined shapes based upon their type.

Where possible, positions previously calculated for a cnxpt, relative to its parent category, and secondarily relative to the elastic surface, are retained where no changes have occurred to the base information for the cnxpt.

Cnxpts are kept from overlapping.

Cnxpts are kept from extending outside of the bounds of the elastic surface canvas or their parent cnxpt.

Less important cnxpts are placed nearer to the outer reaches of the elastic surface canvas or nearer the skin of their parent cnxpt, and more important cnxpts are placed nearer the center of the elastic surface canvas or parent cnxpt.

All cnxpts at the same level should have a similarly advantageous positioning.

In one embodiment, this calculation is performed on each fxxt's Enhanced Descendant Forest. The position results of the calculation is then copied into all of the fxxt's Enhanced Ascendant Forest Trees so that the cnxpts in common (including goals, alias-hyperlink, 'dummy' cnxpts, and other dxos where involved) all get the same positioning (overlapping may be present, and not all cnxpts in the Ascendant Forest will have position information). In another design variation, this calculation is performed on each fxxt's Enhanced Ascendant Forest. The position results of the calculation are then copied into the fxxt's Enhanced Descendant Forest so that the cnxpts in common (including goals, alias-hyperlink, 'dummy' cnxpts, and other dxos where involved) all get the same positioning (no overlapping will be present, and all cnxpts in the Descendant Forest will have position information, but the operation will be slower).

Positioning Overview: Sphere Packing—Calculate Sphere Filling

Use Case: Calculate Sphere Filling.

Use Case: Position Objects for Sphere Visualization—Position objects for the visualization based upon spheres.

Use Case: Pack Spheres for All Deeper Levels in Breadth First Order—Determine positions for the children cnxpts of a level in the forest on the 3D world coordinate canvas to properly represent where the cnxpt is categorized according to a fxxt of the CMMDB.

The force-directed animated graph drawing algorithm used here is somewhat similar to the Fruchterman and Reingold algorithm and utilizes portions of the Eades algorithms. Fruchterman and Reingold use a complex system of forces similar to that of subatomic particles and celestial bodies; also, they control the size of the drawing by assuming that the boundary of the pre-specified drawing region acts as a 'wall'. In non-root level calculations, the 'skins' of the parents are used as walls for the children to be retained by.

The primary objects to be positioned are cnxpts and surrogate cnxpts (alias-hyperlinks). In some maps, non-cnxpts are also positioned. Non-cnxpts are treated as cnxpts for positioning but are often assigned a 'null' importance to eliminate any effect by them on the positioning of cnxpts Alias-hyperlink surrogate cnxpts are positioned as if they were actual cnxpts, but are constrained by their parent—the parent of the surrogate, not the parent of the primary cnxpt. Summary tensors used for positioning the surrogate stem from the hierarchical associations and affinitive associations between the surrogate cnxpt as if the original cnxpt were in the same position, but again, constrained by the parent. In other words, where a surrogate sits, there may be considered associations between that surrogate and its siblings and uncles. These associations will not usually be (could be if all siblings were aliased into the same parent) to the same cnxpts for which the basis cnxpt relates to, since most of those will have a different parent than the surrogate.

Hierarchical tensors constraints assign a sub graph of cnxpts (and, for some maps, non-cnxpts) into a sub-drawing, which may appear translated or rotated, but not otherwise deformed, in the overall drawing of the graph and thus in the parent cnxpt. This algorithm considers all sub graphs as rigid bodies internal to their parent, which get translated and rotated according to the overall force and torque applied to it as a result of the summarized individual forces applied to its cnxpts.

Constraints expressed by the tensors used include, but are not limited to:

positions previously calculated where changes have occurred to the base information of the cnxpt.

attractive forces between cnxpts and uncles;

repulsive force between siblings for spacing;

inclusive forces to be held within a parent or within the elastic surface canvas;

relevance forces to align children within an appropriate position relative to relevances of other children;

importance forces to show relative size of cnxpts;

alignment forces for cnxpt face positioning (which have faces);

categorization of cnxpts by orientation of directed relationships (the effect of tree building takes this into account).

for children of parent, inherited repulsive forces between pairs of uncles, between uncles and the parent, and between uncles and cnxpts that are not in a parent (roots);

repulsive forces between cnxpts for non-overlap protection.

The algorithm is then repeated for each deeper level.

Algorithms

For this algorithm, the cnxpts are equivalent to codewords or code vectors which are located at the centroid of the encoding regions, and the set of all root cnxpts is analogous to a codebook. The set of all encoding regions is called a partitioning of the elastic surface. The objective of the algorithm is to adjust the positioning of the regions to effectively minimize the distortion caused by the initial partitioning based upon the tensors, sizes, and initial positionings.

This algorithm can be implemented with non-linear programming, simulated annealing, Markov chain Monte Carlo, neural network, evolutionary programming, or genetic programming techniques. The number of root cnxpts, or the number of children within any parent will likely be low, so 'maximum' differences can be found relatively easily. Massively parallel methods are applicable, so that each of the error components are used to trigger activation of competitive-learning output units which compete among themselves for activation. As a result, only one output unit is active at any given time in a winner-take-all pattern.

Initiation

The algorithm starts by assigning cnxpt (root cnxpts, goals, alias-hyperlinks, or dxos at the root level) positions based upon prior position information if it is available, or randomly, with the most important root cnxpts nearer the center of the canvas, and others somewhere inside the bounds of the canvas.

The algorithm assigns cnxpt positions based upon prior position information if it is available and does not conflict with the confines of a parent, or randomly within the bounds of their parents, with the most important child (whose sub tree is most important) at the center of the parent, and other children just inside the skin of the parent. The constraints are calculated based upon energy-tensor equations and processed for the level. In case a solution cannot be found, the child (or root if level 0 is being considered) cnxpt sizes are all reduced in priority order by type, either per parent or per level depending upon embodiment. When an error metric is reduced to zero (equilibrium is reached) or to a point where it is minimized or sufficiently low (each a different embodiment), a solution has been found. This configuration is fixed by entering the positions found for all cnxpts (including alias-hyperlink and dummy cnxpts, if any) into the trees being considered for the fxxt.

Each of the following algorithms share these initiation steps:

Processing Order

Form a priority queue of all cnxpts in the fxxt. Sort the queue by breadth first walk of the fxxt, with roots first, listing all siblings contiguously, and ordering them by level and secondarily with the most important (largest size) first and other siblings in order by decreasing importance according to their Importance-Ring Attractor tensor weight. The queue will contain both those cnxpts for which position information has been assigned for the fxxt under consideration as well as those which have not yet been. As a position is assigned or reassigned, the cnxpt is marked as processed but not removed from the queue.

Representation

Represent the cnxpts as vectors in 3-dimensional space, given by Xi, i=1, . . . , N. Position these cnxpts first into 2-dimensional space, then into 3-dimensional space to give vectors Yi, i=1, . . . ,N which are more optimally positioned. For simplicity, write dij for the pairwise distance between Yi and Yj, and similarly d*ij for the distance between Xi and Xj. The distance metric is Euclidean.

Initial Partitioning

1. Initialize a population of solutions. Seek positioning of cnxpts in only 2 dimensions initially.

2. Determine the number of codewords, N, as the cnxpts at a single level of the fxxt tree, and let that be the initial codebook.

3. Form initial mapping of root cnxpts onto encoding regions (loosely the same as Voronoi regions) of a two-dimensional fixed aspect ratio elastic surface (for root cnxpts), or of the parent (if a child cnxpt). Utilize previously set positions where possible and acceptable. Assign a 0 value for the third dimension if not set.

1. If a cnxpt has already been positioned in a prior invocation of this algorithm, use the prior positioning for the cnxpt as the codeword even if a collision occurs. The prior positions of the currently considered fxxt are one form of 'preferred positions' and others, taken from other fxxts as indicated, may also be used as initial positions. In any case, 'Bias' tensors based upon the present position within the parent (or relative to the centroid of the elastic surface canvas), and 'Flow' tensors based upon the representative fraction of the elastic surface may be available at this point in the processing to steer the algorithm. If the encoding regions first overlap, then the overlapping will be removed as the later processing occurs.

2. If no prior positioning has occurred, the partitioning begins by placing the highest importance root cnxpt into the center of the elastic surface (or, if processing below the roots, each highest importance child cnxpt into the center of its parent), assigning it a size of 0.8 (or a value set by a system parameter setting) times the distance from edge to edge of the smallest aspect. Mark as processed but do not remove the cnxpt from the priority queue.

3. If the cnxpt has no assigned position, then set it according to a modified Archimedean spiral as follows: 1) from the priority queue positioning of the cnxpt, set T to the ordinal value of the cnxpt among its siblings (or the set of roots for the roots); 2) set the polar coordinates of the position to be (r, e=modulo (j*Θ, 2π)) where r is the cnxpt's distance from the centroid as set by its 'Importance-Ring Attractor-CHILD' tensor for the fxxt, and 0<Θ<2π is a system parameter setting. 3) convert the polar coordinates to assign a position to the cnxpt as (x=r*cos(θ), y=r*sin(θ)). (Disregard that a collision or overlapping of one cnxpt by another may occur, as this will be repaired in the following. This may be caused where a cnxpt has either been added and is in the priority queue in importance order, but may be greater in importance than those already positioned.) Mark as processed but do not remove the cnxpt from the priority queue.

Improving Positioning

The fxxt specific TTX map data set of cnxpt centroid points is first initialized by the initiation step above on the base data (any random initialization is sufficient, but using the prior positioning improves user familiarity with the resulting map cnxpt positions, even if obtained from a different fxxt). Then, that data set is repeatedly updated with changes that have the 'best' (usually the largest impact on the error metric, but also where out of bounds circumstances must be corrected first) error reduction effect, using steepest descent, considering the gradient of the Error Metric with respect to the cycle of the algorithm, until satisfactory convergence is achieved (where the error metric is reduced to a sufficient level or the descent is limited in its improvement per cycle, or a maximum number of iterations has occurred).

For each root cnxpt on the queue, from the head, determine if the position previously assigned, if any, is still valid. It must be within the bounds of the elastic surface. If it is not, then adjust its coordinates along the vector from the centroid of the elastic surface to position the cnxpt within the elastic surface. (New coordinates will potentially be outside of the inscribed circle with a diameter given by the smaller aspect.) For each non-root cnxpt on the queue among the siblings within the parent (within the same level), from the head, determine if the position previously assigned, if any, is still valid. It must be within the bounds of the parent. If it is not, then adjust its coordinates along the vector from the centroid of the parent to position the cnxpt within the parent.

Distortion Error Metric

Where the current position does not provide an optimal position for a cnxpt, the differential from the current to the optimal position is called a distortion. Distortion occurs because of any one or more of a set of bad positioning factors, seen as a whole. To determine which cnxpt and which positioning factor is presently the most important one to correct, an error detection ranking metric must be used. Each individual factor has its own defined error detection ranking metric and coefficient for priority setting. The overall error metric will stem from intermediate values for determining which heuristic rule to apply. Only the 'worst' of the error indicators will be used to 'fire' the correction, so only portions of the overall error metric data needs to be calculated on any cycle, and the corrections do not need to be done for every row or at least not for all data on every row in any cycle.

The procedure in every case is begun by computing a value for the basis for distortion comparison for a metric. Then a ranking by that basis is computed between all of the cnxpts analyzed along the line of a student-t procedure, where the base discriminator between cnxpt position 'badness' relative to other cnxpts at a level is by itself ranked. The difference from the discriminator's value and the mean (or perhaps median to make more robust) of the discriminators (the discriminator's residual) is divided by the sample standard deviation. These values are multiplied by an error detection ranking metric coefficient for that distortion and the 'worst' of all cnxpt positionings is corrected based upon this ranking. The error detection therefor ranks to determine the correction prioritization for all the cnxpts at the level, and points to a specific correction for each next change. Because many of these calculations need not change in every cycle of the calculation, great efficiency in the algorithm is possible.

Where an obstacle condition occurs, such as is caused by inability to remove an overlap due to region size versus size of cnxpts, adjustments will be made to the size of all of the cnxpts (all roots if at the root level, and all children if at the child level). In that adjustment process, the positions of the cnxpts are not altered.

Formally, X vectors represent starting point positions for the cnxpts for any specific iteration of the algorithm. Y vectors (the better codewords) represent a positioning which minimizes the distortion based upon relationship strengths and cnxpt importance values (and thus derived distances and sizes) as previously calculated.

The lack of quality of a positioning, taken over all cnxpts, all cnxpts at a level, or all cnxpts within a category, is the amount of correct structure present in the 'more optimal' but lost in the present codebook data set. For a specific cnxpt, the distortion, is measured by an error Ei, defined as having the following components, combined into a single value with each component affected by a system parameter setting coefficient. For all cnxpts at a level the distortion is measured by an error Qi=Sum (Ei) over all i (either for the map, or a level, or for children of the category).

Ei=Err_Det_Coef Out_of_Region*Eout_of_region [xi]+ Err_Det_Coef_Cnxpt_Sizing*ECnxpt_Sizing [xi]+ Err_Det_Coef_Overlap*sum over j (Eoverlap [xi,xj])+ Err_Det_Coef_Prior_Position_Presumption*Epriorpos [xi]+Err_Det_Coef_RepFrac_Presumption*Erepfrac [xi]+ Err_Det_Coef_Sibling_Related_Inter_Sibling_Distance*sum over j (Erel_strength [xi,xj])+ Err_Det_Coef_Uncle_Relation_Attraction*sum over j (Erelu [xi,xj])+ Err_Det_Coef_Importance_Position_Inconsistent*Eimport [xi], where X is a cnxpt, where i or j is the index of cnxpt in the set, j not equal i, and 'Err_Det_Coef_ . . . ' is the 'penalty' for being incorrect.

Another measure of the overall quality level of the positioning is based upon the differentials between the best and worst cnxpt positions.

Error Reduction Heuristics and their Algorithmic Basis

In the following, Cell names based upon Factor Settings 26.xls spreadsheet.

Where a Column name is used without a row, it is intended to mean a child cnxpt row.

Where a Column and Row are both specified, it is intended to mean a special calculation on the set of child cnxpts.

In the following, some terms are abbreviated:

ED_S_S=(Euclidean Distance from Centroid of Sibling 1 Cnxpt to Centroid of Sibling 2 Cnxpt)

ED_P_C=(Euclidean Distance from Centroid of Parent to Centroid of Child Cnxpt)

ED_U_C=(Euclidean Distance from Centroid of Uncle to Centroid of Child Cnxpt)

ED_Prior=(Euclidean Distance from Centroid of Child Cnxpt to prior position)

ED_RepFrac=(Euclidean Distance from Centroid of Child Cnxpt to Centroid of Representative Fraction where Cnxpt belongs)

ED_P_U=(Euclidean Distance from parent centroid to UNCLE)

In the following, X is a cnxpt, where i or j is the index of cnxpt in the set, j not equal i.

Out of Region Error

Each child cnxpt must be situated fully within its 'parent' in 3D or, for roots, the cnxpt must be fully on the elastic surface. If the current distance from centroid of the parent to the centroid of the cnxpt, found by Euclidean Distance, is greater than the radius of the parent less a factor for the size of the skin area of the parent and the radius of the cnxpt, then the cnxpt must be moved toward the centroid of the parent. This is a mandatory correction. It is a one-sided adjustment.

Inclusive forces are generated automatically by this metric based upon the categorization of the cnxpt in its parent. For roots, the lack of categorization is made up by the automatic forces requiring the cnxpt to be held within the elastic surface canvas.

Parameters are prior cnxpt location and radius, parent location and radius, and system parameters.

If the parent cnxpt's radius, reduced by the Edge_Protection_Ratio and further reduced by the child cnxpt's radius is less than the Euclidian Distance from the centroid of the parent to the centroid of the cnxpt, then the cnxpt lies outside of the parent and must be moved into the parent fully.

Detection

Detection=MAX(−(Factor)) where Factor=(((Parent Radius)*(1−Edge_Protection_Ratio))−(Child_Radius)−(ED_P_C)) and is always negative or not counted in the max.

Metric

'Err_Det_Coef Out_of_Region' is the 'penalty' for being out of region.

'Out of region error' Metric is defined as Eout_of_region [xi]=MAX(Err_Det_Coef_Out_of_Region*((−(Factor/stdev(Factor))))) where Factor=(((Parent_Radius)*(1−Edge_Protection_Ratio))−(Child_Radius)−(ED_P_C)) and Factor is always negative; stdev is calculated only upon basis of negative valued Factors (those child cnxpts which are out of bounds)

Correction

Correction of 'out of region error' for a cnxpt is performed by moving the child cnxpt closer to the centroid of the parent (or of the elastic surface) by an amount large enough to bring it fully into the parent (if a child), or fully onto the elastic surface (if a root).

factor for reduction=>−((((Parent_Radius)*(1−Edge_Protection_Ratio))−(Child_Radius)−(ED_P_C))/(ED_P_C))

where (((Parent_Radius)*(1−Edge_Protection_Ratio))−(Child_Radius)−(ED_P_C))<0, meaning that child cnxpt is outside of parent.

A new point for the centroid of the child cnxpt is found by reducing the length of the vector from the centroid of the child cnxpt to the centroid of parent, anchoring the vector at centroid of parent, by Correction Factor=[((Child_X)+(Correction Factor)*((Parent_X)−(Child_X))), ((Child_Y)+(Correction Factor)*((Parent_Y)−(Child_Y))), ((Child_Z)+(Correction Factor)*((Parent_Z)−(Child_Z)))]

The Correction Factor provides a change in length by applying it as a ratio, yielding ratio*vector [xc−xp, yc−yp, zc−zp] to obtain [x', y, z']. Then reapply to find point [x'+xp, y'+yp, z'+zp] as the new centroid.

Siblings Related—Inter-Sibling Distance Error

Siblings should be moved closer together when cnxpt is further from its related sibling then it should be in 3D. Sibling cnxpts with a ratio of distance divided by "between sibling strength" that is higher relative to other sibling pairs will make the user believe that the siblings are not as closely related as they are meant to be based upon the underlying data. The two cnxpts should be moved closer to more fairly represent the relative strength of the relationship by reducing the Euclidean Distance between them, considering sibling strength and minimum gap retention factors. This is a usability correction. It is a two-sided adjustment.

If the distance between one pair of cnxpts is greater than the distance between a second, with the same strength, then the ratio will be higher and wrong. Thus the ratio versus the strength gives a certain distance reduction that is required, and the distance ought to be given by what the ratio should be changed to conform to be about the same as other pairs.

Force a new distance by changing the cnxpt locations. Parameters are: 'Between-Sibling-Ring Attractor' tensor, Cnxpt locations and radii, and system parameters.

The current distance from the centroids of the cnxpt pair is found by Euclidean Distance. If the ratio of that distance to the pair's between sibling strength is the highest of all such ratios for the children of the parent being considered, then the distance must be corrected but a specified gap factor must limit the reduction in distance to preserve the gap between cnxpts.

Detection

Detection=determine most extreme of the basic_calc (Factor) based upon Between Sibling Ring Attractor tensors where "most extreme" is found from IF(ABS(MAX(over all all_basis_calcs)−AVERAGE(over all all_basis_calcs))>ABS(MIN(over all all_basis_calcs)−AVERAGE(over all all_basis_calcs)), MAX(over all all_basis_calcs),MIN(over all all_basis_calcs))

where all_basis_calcs=pairwise values between siblings, where each is:

Factor=

MAX(((0.9*(parent_radius*(1−Edge_Protection_Ratio)*2−parent_radius*(Inter_Cnxpt_Gap_Ratio)−MAX(MAX(over all child_radius), parent_radius*0.002)−average(over all child_radius all children))/(MAX(over all Between_Sibling_Ring_Attractor_tensor_Weight)−MIN(over all Between_Sibling_Ring_Attractor_tensor_Weight)))*(MAX (over all Between_Sibling_Ring_Attractor_tensor_Weight)−(Between_Sibling_Ring_Attractor_tensor_Weight_sibling_1_to_sibling_2))), (parent_radius*Inter_Cnxpt_Gap_Ratio)+((child_radius_sibling_1)+(child_radius_sibling_2)))−(Euclidean_Distance_sibling_1_to_sibling_2)

And MAX(MAX(over all child_radius), parent_radius*0.002) is a fudge to be sure that the sibling cnxpts will stay within the parent comfortably. The first component is the maximum child radius, but if that radius is very small, the proportion of the parent is used. The 0.002 may be set by a system parameter. It is likely to be low at this value.

Metric

'Err_Det_Coef_Sibling_Related_Inter_Sibling Distance' is the 'penalty' for poor positioning based upon strength of relationships between siblings.

'Not well sibling related error' Metric for a cnxpt pair that is positioned too near or too far apart is defined by Erel strength [xi,xj]=MAX(Err_Det_Coef_Sibling_Related_Inter_Sibling_Distance*(most extreme of the basic_calc (Factor) based upon Between_Sibling_Ring_Attractor_tensors)) where extreme and Factor are as above.

(note: the Erel strength between xg and xh is the same as the Erel strength for xh and xg).

Correction

Correction of 'Not well sibling related error' for a cnxpt is performed by moving the sibling cnxpts farther apart or closer as needed to adjust the relationship, but never to move them outside of the parent. The correction factor here is simplified for the present, and must be adjusted in use to constrain each of the cnxpts from moving outside of the parent. This is accomplished by checking the new centroid of each sibling after the correction is applied, and using the correction for that sibling only if the sibling is not moved outside of the parent. The factor for movement is given by 0.5 times the 'Factor' above:

A new point for the centroid of each sibling cnxpt is found by increasing the length of the vector from the centroid of the first sibling cnxpt to the centroid of the second sibling cnxpt, by twice the Correction Factor (which is ½ of the Factor above). The correction factor is not applied if the child would be moved out of the parent, giving:

Sibling 1 centroid=[((Sibling_1_X)−(Correction Factor)*((Sibling_2_X)−(Sibling_1_X))), ((Sibling_1_Y)−(Correction Factor)*((Sibling_2_Y)−(Sibling_1_Y))), ((Sibling_1_Z)−(Correction Factor)*((Sibling_2_Z)−(Sibling_1_Z)))] IFF the correction does not move Sibling 1 outside of the parent.

Sibling 2 centroid=[((Sibling_2_X)+(Correction Factor)*((Sibling_1_X)−(Sibling_2_X))), ((Sibling_2_Y)+(Correction Factor)*((Sibling_1_Y)−(Sibling_2_Y))), ((Sibling_2_Z)+(Correction Factor)*((Sibling_1_Z)−(Sibling_2_Z)))] IFF the correction does not move Sibling 2 outside of the parent.

Ideally, correction of 'not well sibling related error' for a cnxpt pair is performed by moving one cnxpt closer to or farther away from the other by an amount large enough to reduce the distance to sibling strength ratio appropriately.

Cnxpt Sizing Error

All cnxpt sizes should have a size directly related to their importance relative to all the other cnxpts on its level.

Cnxpts with a ratio of their size versus their importance that is higher than other cnxpts at the level (or the children of the parent at the level) will make the user believe that the cnxpt is more important then they are meant to be based upon the underlying data. The cnxpt's size should be adjusted to more fairly represent its importance, without immediate regard to minimum gap retention factors or out of region, as these will be adjusted in other cycles. This is a usability correction. It is a one-sided adjustment. This cannot be allowed to cause an unchecked placement of a cnxpt out of region Parameters involved are: Cnxpt Size Tuple for Fxxt provides the importance forces to initially show relative size of cnxpts at a level.

Detection

The cnxpt with the largest differential in appropriate size based upon importance to current size, based upon the size/importance ratio, is chosen for correction.

Detection=determine Max (Normalized Error) based upon importance of a child cnxpt where Normalized Error=(ABS(Factor−child_radius))/STDEVP(over all (ABS(Factor−child_radius)))

where Factor=((weighted_change_factor)*(SUM(over all child_radius)/SUM(over all weighted_change_factors))

where weighted_change_factor=(((child_radius)+4*(FXXT COMPLETE Importance summary))/5)

where Importance is taken from the cnxpt FXXT COMPLETE Importance summary for the fxxt, and cnxpt sizes are stored in Cnxpt Size Tuple for Fxxt tuples.

Metric

'Err_Det_Coef Cnxpt_Sizing' is the 'penalty' for being sized improperly.

'Not well importance sizing error' Metric is defined as Ecnxpt_sizing [xi]=

(Err_Det_Coef_Cnxpt_Sizing*Normalized Error) where Factor is as above.

Correction

The Correction Factor provides a change in cnxpt representation size. Correction of 'not well importance sizing error' for a cnxpt is performed by changing the radius of one cnxpt by an amount large enough to make it properly represent its importance relative to other children of the parent (if a child), or relative to its siblings, or, in one embodiment, relative to all cnxpts on the level.

Correction of 'Not well importance sizing error' for a cnxpt is performed by changing the cnxpt radius to:

Correction Factor=Factor above.

Importance Position Inconsistent Error

Importance versus distance from centroid of parent is inconsistent. A cnxpt should be nearer to its parent's centroid if it is very important among its siblings relative to its parent, and more distant from the centroid if it is not important.

Cnxpts with a higher than appropriate ratio of their distance from the centroid of their parent to their importance than all the other children of the parent at the level will make the user believe that the cnxpt is less strongly related to its parent than they are meant to be based upon the underlying data. The two cnxpts should be moved to more fairly represent the relative strength of the relationship by increasing the Euclidean Distance between them, considering sibling strength and minimum gap retention factors. This is a usability correction. It is a one-sided adjustment.

The Importance ring attractor should push the cnxpt into a position as close to an appropriate distance from a perfect importance position within a parent as possible, not too close and not too distant from the patent's centroid relative to other cnxpts within the parent (or within the elastic surface canvas) by importance. Parameters include: 'Importance-Ring Attractor-CHILD' tensor; 'Importance-Ring Attractor-ROOT' tensor.

Detection

Detection=determine max (Factor) based upon importance of a child cnxpt

==max(Factor)

==max(ABS(MJ35−MJ$30)/MJ$29)

==max(ABS(ImportBasedDist_AdjNeeded−MJ$30)/MJ$29)

==max(ABS(ImportBasedDist_AdjNeeded−AVERAGE (over all ImportBasedDist_AdjNeeded))/STDEVP(over all ImportBasedDist_AdjNeeded))

where Factor=

ABS(ImportBasedDist_AdjNeeded−AVERAGE(over all ImportBasedDist_AdjNeeded))/STDEVP(over all ImportBasedDist_AdjNeeded)

And where:

ImportBasedDist_AdjNeeded→MJ35→(MI34—MB34)→(ImportBasedDist_Factor−ED_P_C)

MJ$30→AVERAGE(MJ31:MJ72)→AVERAGE(over all ImportBasedDist_AdjNeeded)

MJ$29→STDEVP(MJ31:MJ72)→STDEVP(over all ImportBasedDist_AdjNeeded)

ED_P_C→$MB→SQRT(($EQ$27−$EQ)^2+($ER$27−$ER)^2+($ES$27−$ES)^2)→(ED_P_C)

ImportBasedDist_Factor→MI→(($MH)+4*($ME))/5

==(((Max_Import_Dist__Avail*MB32/MB$28)+4*(Rel_Pos+Max_Import_Dist_Avail))/5)

==(((Max_Import_Dist_Avail*ED_P_C/MAX(over all ED_P_C))+4*(((Max_Import_Dist*(MAX(over all child_Importance_Metric)−child_Importance_Metric)/(AVERAGE(over all child_radius))))+Max_Import_Dist_Avail))/5)

Metric

'Err_Det_Coef Importance_Position_Inconsistent' is the 'penalty' for not displaying relative importance of siblings well.

'Not well importance positioned error' metric for a cnxpt is defined by Eimport [xi]=

( ) where Factor is as above. (note: the Erel is the same for all x1)

Err_Det_Coef_Importance Position Inconsistent*Factor where Factor=

MM35→((MJ35−MJ$30)/MJ$29)→ABS(ImportBasedDist_AdjNeeded−AVERAGE(over all ImportBasedDist_AdjNeeded))/STDEVP(over all ImportBasedDist_AdjNeeded)

Correction

Correction of 'not well importance positioned error' for a cnxpt is performed by moving the centroid of the child cnxpt away from or toward the centroid of the parent by an amount large enough to reduce the standard deviation of the distance to importance ratio for the child cnxpt within the parent. This cannot cause an unchecked placement of a cnxpt out of region Correction of 'Not well importance positioned error' for a cnxpt is performed by changing the location of the centroid of the child cnxpt to:

Correction Factor=

→(((($MH32)+4*($ME32))/5)→(ED_P_C))/(ED_P_C)

→((((Max_Import_Dist_Avail*MB32/MB$28)+4*(Rel_Pos+Max_Import_Dist_Avail))/5)→(ED_P_C))/(ED_P_C)

→((((Max_Import_Dist_Avail*ED_P_C/MAX(over all ED_P_C))+4*(((Max_Import_Dist*(MAX(over all child_Importance_Metric)−child_Importance_Metric)/(AVERAGE(over all child_radius))))+Max_Import_Dist_Avail))/5)−(ED_P_C))/(ED_P_C)

where:

ImportBasedDist_Factor→MI→(($MH)+4*($ME))/5

==(((Max_Import_Dist_Avail*MB32/MB$28)+4*(Rel_Pos+Max_Import_Dist_Avail))/5)

==(((Max_Import_Dist_Avail*ED_P_C/MAX(over all ED_P_C))+4*(Rel_Pos+Max_Import_Dist_Avail))/5)

and where:

Max_Import_Dist→MD$27→(1−Edge_Protection_Ratio)*($ET$27)−$ET30−($ET30/4)

Max_Import_Dist→MD27=(1−Edge_Protection_Ratio)*(parent_radius)−(MAX(MAX(over all child_radius), parent_radius*0.002))−((MAX(MAX(over all child_radius), parent_radius*0.002))/4)

Rel_Pos→MD→(Max_Import_Dist*($FA$30−$FA32)/WD$28)

Max_Import_Dist_Avail=ABS(Max_Import_Dist−Rel_Pos Range)/2

Rel_Pos_Range→MD30→MAX(over all Rel_Pos)−MIN (over all Rel_Pos)

$AR$82→(AQ82−AP82)/AP82

AQ82→OFFSET($MI$30,AL84,0)

AP82→OFFSET($MB$30,AL84,0)

$MI→(($MH32)+4*($ME32))/5

ED_P_C→$MB→SQRT(($EQ$27−$EQ)^2+($ER$27−$ER)^2+($ES$27−$ES)^2)→(ED_P_C)

$MH→IF($MB$28>0,$MD$27*MB32/MB$28,MB32)

$ME→MD32+ME$27

ME$27→ABS(MD27−MD30)/2

MI→,(($MH)+4*($ME))/5

MD→(MD$27*($FA$30−$FA32)/WD$28)

Md27→‘=(1−Edge_Protection_Ratio)*(parent_radius)−$ET30−($ET30/4)

ET30→MAX(MAX(over all child_radius), parent_radius*0.002)

MB28→MAX(over all ED_P_C)

$MD$28→AVERAGE(over all child_radius)

FA30→MAX(over all child_Importance_Metric)

MD30→MAX(MD31:MD72)−MIN(MD31:MD72)

Rel_Pos_Range→MD30→MAX(over all Rel_Pos)−MIN (over all Rel_Pos)

A new point for the centroid of each child cnxpt is found by increasing or decreasing the length of the vector from the centroid of the child cnxpt to the centroid of the parent cnxpt, by the Correction Factor, giving:

Child centroid=[((Child_X)−(Correction Factor)*(Child_X)), ((Child_Y)−(Correction Factor)*(Child_Y)), ((Child_Z)−(Correction Factor)*(Child_Z))] The correction will not move the Child outside of the parent.

Overlap Error

A cnxpt must not overlap its siblings. If the current distance from centroid of one cnxpt to the centroid of the other cnxpt, found by Euclidean Distance, is greater than the combined radii plus a factor for the size of the buffer area separating cnxpts, then the cnxpts are each moved away from each other by an amount large enough to remove the overlap. This is a mandatory correction. This is a two-sided adjustment.

Automatically imposed repulsive forces between cnxpts create non-overlap protection between siblings for spacing, but apply it as a secondary effect to promote other adjustments.

This cannot cause an unchecked placement of a cnxpt out of region

Detection

Detection=determine max (score (Factor)) based upon Overlap of two child cnxpts

→MAX(OM)

→MAX((OK−OK$30)/OK$29)

score→(OK−OK$30)/OK$29 where Factor=

OK→−OJ but only if OJ<0

OK$29→STDEVP(OK31:OK72)

OK$29→STDEVP(over all OK)

OK$29→STDEVP(over all (−MIN(base_factor)))

OK$30→AVERAGE(OK31:OK72)

OK$30→AVERAGE(over all OK)

OK$30→AVERAGE(over all (−MIN(base_factor)))

OJ→MIN(base_factor)

Factor=−MIN(base_factor) only where base_factor is negative base_factor→SQRT(($EQ34−OFFSET($EQ$30,OF$22,0))^2+($ER34−OFFSET($ER$30,OF$22,0))^2+($ES34−OFFSET($ES$30,OF$22,0))^2)−($ET$27*Inter_Cnxpt_Gap_Ratio)−(($ET34)+(OFFSET($ET$30,OF$22,0)))

base_factor→SQRT((Sibling_1_X−Sibling_2_X)^2+(Sibling_1_Y−Sibling_2_Y)^2+(Sibling_1_Z−Sibling_2_Z)^2)−(parent_radius*Inter_Cnxpt_Gap_Ratio)−((sibling_1_radius)+(sibling_2_radius))

Metric

‘Err_Det_Coef_Overlap’ is the ‘penalty’ for overlapping of cnxpts.

‘Overlap error’ metric for a cnxpt pair is defined as Eoverlap [xi,xj]=

==Err_Det_Coef_Overlap*OM35

==Err_Det_Coef_Overlap*max (score (Factor))

where Factor is as above.

Correction

Correction of ‘Overlap error’ for two sibling cnxpts is performed by moving the centroids of the child cnxpts away from one another by an amount large enough to remove the overlap (so long as they do not move out of the parent) by:

Correction Factor=BB

BB→−BA82/AZ93/2

AZ93→=(SQRT((AY85−AY84)^2±(AZ85−AZ84)^2±(BA85−BA84)^2))

AZ93→ED_S_S=(Euclidean Distance from Centroid of Sibling 1 Cnxpt to Centroid of Sibling 2 Cnxpt)

BA82→AZ93−AY82

AY82→(BB85+BB84)+($ET$27*Inter_Cnxpt_Gap_Ratio)

AY82→(Sibling_1_Radius+Sibling_2_Radius)+(Parent_Radius*Inter_Cnxpt_Gap_Ratio)

Correction Factor=−(ED_S_S−((Sibling_1_Radius+Sibling_2_Radius)+(Parent_Radius*Inter_Cnxpt_Gap_Ratio)))/ED_S_S/2

A new point for the centroid of each sibling cnxpt is found by increasing the length of the vector from the centroid of the first sibling cnxpt to the centroid of the second sibling cnxpt, by twice the Correction Factor. The correction factor is not applied if the child would be moved out of the parent, giving:

Sibling 1 centroid=[((Sibling_1_X)−(Correction Factor)*((Sibling_2_X)−(Sibling_1_X))), ((Sibling_1_Y)−(Correction Factor)*((Sibling_2_Y)−(Sibling_1_Y))), ((Sibling_1_Z)−(Correction Factor)*((Sibling_2_Z)−(Sibling_1_Z)))] IFF the correction does not move Sibling 1 outside of the parent.

Sibling 2 centroid=[((Sibling_2_X)+(Correction Factor)*((Sibling_1_X)−(Sibling_2_X))), ((Sibling_2_Y)+(Correction Factor)*((Sibling_1_Y)−(Sibling_2_Y))), ((Sibling_2_Z)+(Correction Factor)*((Sibling_1_Z)−(Sibling_2_Z)))] IFF the correction does not move Sibling 2 outside of the parent. If neither move is possible due to each causing a move to outside of the parent, then resize all cnxpts at the level (or, in one embodiment, of those within the parent only) by a system parameter set decrease in size.

Prior Position Related Error

A cnxpt should be relatively close to the position it previously had on the map within its parent, when possible, to give the user greater familiarity with the map.

When a cnxpt has been moved by map recalculation, the user will lose their bearings based upon the memory they have of where cnxpts were in prior views of the map. To compensate for that as much as possible, a top down enforcement of old map positions is imposed. To do so, where a cnxpt has been moved, and the map can allow adjustment, a cnxpt is moved as near to its old position as possible. This is a usability correction. This is a one-sided adjustment.

Parameters include "positions previously calculated where changes have occurred to the base information of the cnxpt, as given by the Bias Tensors, and automatically generated repulsive force between siblings for spacing. 'BIAS' tensor [j] is a selected tensor from set which may include both same-fxxt tensors, and different-fxxt tensors for those specified in the fxxt definition, but where the same-fxxt tensor has priority for selection; and where 'BIAS' tensor position values are relative to the parent of the cnxpt when the 'BIAS' tensor is set.

Detection

Detection=determine max (score (Factor)) based upon Prior Position of a child cnxpt score→((PM−PM$30)/PM$29)

score→((Factor−AVERAGE(over all (Factor)))/STDEVP (over all (Factor)))

where Factor=PM→PK only if PK>0

Factor=see below:

To find the factor for each child cnxpt, we use a calculation based upon Quadratic Solution to find the proper P or P', giving a value for the distance that the child cnxpt can move toward the prior position given by the bias tensor (the direction is set by the present child position—prior position vector), as follows:

A=1

B=2*(((xo−xc)*(xo−xt)+(yo−yc)*(yo−yt)+(zo−zc)*(zo−zt))/(SQRT((xt−xo)^2+(yt−yo)^2+(zt−zo)^2)))

C=(((xo−xc)*(xo−xc)+(yo−yc)*(yo−yc)+(zo−zc)*(zo−zc))) *(r*(1−Edge_Protection_Ratio)−radius of the child cnxpt)^2

Discriminant (Disc)=(b^2−4ac)=b^2−4c

√(b^2−4ac)

P=[−b+√(b^2−4ac)]/2a

P'=[−b−√(b^2−4ac)]/2a

And the use of P or P' depends upon the discriminant and the side on which the prior position resides.

A=1

PD→B=2*((xo−xc)*(xo−xt)+(yo−yc)*(yo−yt)+(zo−zc)*(zo−zt))/(SQRT((xt−xo)^2+(yt−yo)^2+(zt−zo)^2))

PD→B=2*(($EQ−$EQ$27)*($EQ−($EQ$27+$FD))+($ER−$ER$27)*($ER−($ER$27+$FE))+($ES−$ES$27)*($ES−($ES$27+$FF)))/(SQRT((($EQ−($EQ$27+$FD))^2)+(($EEJ−($ER$27+$FE))^2)+(($ES−($ES$27+$FF))^2)))

$FD=Bias_Tensor_PriorPos_X $FE=Bias_Tensor_PriorPos_Y $FF=Bias_Tensor_PriorPos_Z PD→B=2*((Child_X−Parent_X)*(Child_X−(Parent_X+Bias_Tensor_PriorPos_X))+(Child_Y−Parent_Y)*(Child_Y−(Parent_Y+Bias_Tensor_PriorPos_Y))+(Child_Z−Parent_Z)*(Child_Z−(Parent_Z+Bias_Tensor_PriorPos_Z)))/(SQRT(((Child_X−(Parent_X+Bias_Tensor_PriorPos_X))^2)+((Child_Y−(Parent_Y+Bias_Tensor_PriorPos_Y))^2)+((Child_Z−(Parent_Z+Bias_Tensor_PriorPos_Z))^2)))

PE→C=(((xo−xc)*(xo−xc)+(yo−yc)*(yo−yc)+(zo−zc)*(zo−zc)))−(r*(1−Edge_Protection_Ratio)−radius of the child cnxpt)^2

Sq_of_limit_on_How_Far_Child_May_Move_Outward→PE→C=(($EQ−$EQ$27)^2+($ER-$ER$27)^2+($ES−$ES$27)^2)−((($ET$27*(1−Edge_Protection_Ratio))−$ET)^2)

Sq_of_limit_on_How_Far_Child_May_Move_Outward→PE→C=((Child_X−Parent_X)^2+(Child_Y−Parent_Y)^2+(Child_Z−Parent_Z)^2)−(((Parent_Radius*(1−Edge_Protection_Ratio))−Child_Radius)^2)

Discriminant=(b^2−4ac)=b^2−4c

Calculate only for child cnxpts where Discriminant>=0→Discriminant→PF→(PD^2−4*PE)>=0

PF→(PD^2−4*PE)

PF→(PD^2−4*Sq_of_limit_on_How_Far_Child_May_Move_Outward)

PM$29→STDEVP(PM31:PM72)

PM$29→STDEVP(over all PM)

PM$29→STDEVP(over all (factor))

PM$30→AVERAGE(PM31:PM72)

PM$30→AVERAGE(over all PM)

PM$30→AVERAGE(over all (factor))

PM→PK only if PK>0

Factor=PK→OZ or PJ depending upon: if(AND(PJ>0, OZ>PJ),PJ,OZ) only if OZ>0 or if PJ>0

Factor=PK→OZ or PJ depending upon: if(AND(PJ>0, OZ>PJ),PJ,OZ) only if OZ>0 or if PJ>0

Distance from Child cnxpt to just inside of parent along path to prior position→PJ→PH or PI depending upon: if(AND(PH>0,PH>PI),PH, IF(AND(PI>0,PI>PH),PI,IF(PH>0,PH,IF(PI>0,PI,0))))

PH→((−PD+PG)/(2))

PH→((−B+SQRT(Discriminant))/(2))

PI→((−PD−PG)/(2))

PI→(−B−SQRT(Discriminant)/(2))

PG→SQRT(PF)

ED_Prior→OZ→=SQRT(($EQ−OV)^2+($ER−OW)^2+($ES−OX)^2)

ED_Prior→OZ→=SQRT((Child_X−OV)^2+(Child_Y−OW)^2+(Child_Z−OX)^2)

ED_Prior→OZ→=SQRT(((Child_X−(Parent_X+Bias_Tensor_PriorPos_X))^2)+((Child_Y−(Parent_Y+Bias_Tensor_PriorPos_Y))^2)+((Child_Z−(Parent_Z+Bias_Tensor_PriorPos_Z))^2))

OV→EQ$27+FD32

OW→ER$27+FE32

OX→ES$27+FF32

OV→Parent_X+Bias_Tensor_PriorPos_X

OW→Parent_Y+Bias_Tensor_PriorPos_Y

OX→Parent_Z+Bias_Tensor_PriorPos_Z

Metric

'Err_Det_Coef_Prior_Position_Presumption' is the 'penalty' for moving cnxpts between major repositionings.

'Not well prior position related error' metric for a cnxpt i is defined as Epriorpos [xi]

==Err_Det_Coef_Prior_Position_Presumption*PO34

==Err_Det_Coef_Prior_Position_Presumption*score (Factor)

where Factor is as above and 'BIAS' tensors include both same-fxxt tensors, and different-fxxt tensors for those specified in the fxxt definition.

Correction

Correction of 'not well prior position related error' for a new cnxpt positioning is found by moving along vector toward bias tensor point from centroid of cnxpt, but staying inside of Parent Move the cnxpt nearer its prior position, which is toward where the utilized BIAS tensor places it, but may be only in the direction toward that position, but for a limited distance if the cnxpt would be moved out of its region—out of its parent or off the elastic canvas.

Move cnxpt along the vector from the present position to the prior position by a length based upon the position given by the Bias Tensor, but limited by the surrogate sphere of the parent, as adjusted by constraints.

This algorithm needs to be applied relative to the parent's centroid rather than to an actual point to be more accurate.

This cannot cause an unchecked placement of a cnxpt out of region if constrained to be relative to parent.

Correction of 'not well prior position related error' for a cnxpt by moving the cnxpt nearer its prior position according to where the BIAS tensors place it.

Correction of 'Prior Position error' sets a new point for the centroid of each child cnxpt by moving the child cnxpt toward the prior position along the vector from the centroid of the child cnxpt to the prior position, by the Correction Factor, (so long as they do not move out of the parent) giving:

Correction Factor=($BM82)
Correction Factor=(BK82/BJ82)
Correction Factor=(BI82/OZ)
Correction Factor=(PR$31/ED_Prior)
Correction Factor=(MAX(PM)/ED_Prior)
Correction Factor=(Factor/ED_Prior)
$BM82→BK82/BJ82
BK82→BI82
BJ82→OZ
BJ82→ED_Prior→OZ
BI82→PR$31
PR$31→MAX(PM)

Child centroid=[((Child_X)−(Correction Factor)*(Child_X)), ((Child_Y)−(Correction Factor)*(Child_Y)), ((Child_Z)−(Correction Factor)*(Child_Z))] The correction will not move the Child outside of the parent.

The prior position has a parent_radius basis and is scaled by use of proportions of the size of the parent so that parent resizing does not affect the user's view. The new position is to be on the same side of the parent centroid as the old position, and it should be about the same distance from the centroid on the scaled basis.

Flow Segment Related Error

A cnxpt should be relatively close to the representative fraction of the elastic surface it is related to, but within its parent, to give the user an understanding of across surface flow relationships in the map.

A top down enforcement of flow related positions is imposed. To do so, a cnxpt is moved as near to the center of the median representative fraction of the set of representative fractions it relates to as possible. This is a one-sided adjustment.

Parameters include "median representative fraction related to, as given by the Flow Tensors, and automatically generated repulsive force between siblings for spacing. 'Flow' tensor [j] is a selected tensor.

Detection

Detection=determine max (score (Factor)) based upon Flow segment of a child cnxpt
score→((ST−ST$30)/ST$29)
score→((Factor−AVERAGE(over all (Factor)))/STDEVP (over all (Factor)))

where Factor=ST→SQ only if SQ>0

Factor=see below:

To find the factor for each child cnxpt, we use a calculation based upon Quadratic Solution to find the proper P or P', giving a value for the distance that the child cnxpt can move toward the representative fractional segment center given by the flow tensor (the direction is set by the present child position—flow segment center vector), as follows:

A=1
B=2*(((xo−xe)*(xo−xt)+(yo−ye)*(yo−yt)+(zo−zc)*(zo−zt))/(SQRT((xt−xo)^2+(yt−yo)^2+(zt−zo)^2)))
C=(((xo−xe)*(xo−xc)+(yo−ye)*(yo−ye)+(zo−zc)*(zo−zc)))−(r* (1−Edge_Protection_Ratio)−radius of the child cnxpt)^2
Discriminant (Disc)=(b^2−4ac)=b^2−4c
√(b^2−4ac)
P=[−b+√(b^2−4ac)]/2a
P'=[−b−√(b^2−4ac)]/2a And the use of P or P' depends upon the discriminant and the side on which the flow segment resides. (xo, yo, zo) is the centroid, (xc, yc, zc) is the parent or category centroid, and (xt, yt, zt) is the center of the representative fractional segment. (The use of a point rather than a line as center focuses the flow toward the center, and allows for 3D representative fractions.)

A=1
SF→B=2*((xo−xe)*(xo−xt)+(yo−ye)*(yo−yt)+(zo−zc)*(zo−zt))/(SQRT((xt−xo)^2+(yt−yo)^2+(zt−zo)^2))
SF→B=2*(($RQ−$RQ$27)*($RQ−($RQ$27+$RX))+($RR−$RR$27)*($RR−RR$27+$RY))+($RS−$RS$27)*($RS−($RS$27+$RZ)))/(SQRT((($RQ−($RQ$27+$RX))^2)+(($EEJ−($RR$27+$RY))^2)+(($RS−($RS$27+$RZ))^2)))
$RX=Flow_Tensor_RepFrac_X
$RY=Flow_Tensor_RepFrac_Y
$RZ=Flow_Tensor_RepFrac_Z
SF→B=2*((Child_X−Parent_X)*(Child_X−(Parent_X+Flow_Tensor_RepFrac_X))+(Child_Y−Parent_Y)*(Child_Y−(Parent_Y+Flow_Tensor_RepFrac_Y))+(Child_Z−Parent_Z)*(Child_Z−(Parent_Z+Flow_Tensor_RepFrac_Z)))/(SQRT(((Child_X−(Parent_X+Flow_Tensor_RepFrac_X))^2)+((Child_Y−(Parent_Y+Flow_Tensor_RepFrac_Y))^2)+((Child_Z−(Parent_Z+Flow_Tensor_RepFrac_Z))^2)))
SG→C=(((xo−xc)*(xo−xc)+(yo−ye)*(yo−ye)+(zo−zc)*(zo−zc)))−(r*(1−Edge_Protection_Ratio)−radius of the child cnxpt)^2
Sq_of_limit_on_How_Far_Child_May_Move_Outward→SG→C=(($RQ−$RQ$27)^2+($RR−$RR$27)^2+($RS−$RS$27)^2)−((($ET$27*(1−Edge_Protection_Ratio))−$ET)^2)
Sq_of_limit_on_How_Far_Child_May_Move_Outward→SG→C=((Child_X−Parent_X)^2+(Child_Y−Parent_Y)^2+(Child_Z−Parent_Z)^2)−(((Parent_Radius*(1−Edge_Protection_Ratio))−Child_Radius)^2)
Discriminant=(b^2−4ac)=b^2−4c
Calculate only for child cnxpts where Discriminant>=0→
Discriminant→SH→(SF^2−4*SG)>=0
SH→(SF^2−4*SG)
SH→(SF^2−4*Sq_of_limit_on_How_Far_Child_May_Move_Outward)
ST$29→STDEVP(ST31:ST72)
ST$29→STDEVP(over all ST)
ST$29→STDEVP(over all (factor))
ST$30→AVERAGE(ST31:ST72)
ST$30→AVERAGE(over all ST)
ST$30→AVERAGE(over all (factor))
ST→SQ only if SQ>0

Factor=SQ→RW or SP depending upon: if(AND(SP>0, RW>SP),SP,RW) only if RW>0 or if SP>0
Factor=SQ→RW or SP depending upon: if(AND(SP>0, RW>SP),SP,RW) only if RW>0 or if SP>0
Distance from Child cnxpt to just inside of parent along path to flow segment→SP→SM or SN depending upon:
if(AND(SM>0,SM>SN),SM, IF(AND(SN>0,SN>SM),SN, IF(SM>0,SM,IF(SN>0,SN,0))))
SM→((−SF+SJ)/(2))
SM→((−B+SQRT(Discriminant))/(2))
SN→((−SF−SJ)/(2))
SN→(−B−SQRT(Discriminant)/(2))
SJ→SQRT(SH)
ED_RepFrac→RW→=SQRT(($RQ−SX)^2+($RR−SY)^2+($RS−SZ)^2)
ED_RepFrac→RW→=SQRT((Child_X−SX)^2+(Child_Y−SY)^2+(Child_Z−SZ)^2)
ED_RepFrac→RW→=SQRT(((Child_X−(Parent_X+Flow-_Tensor_RepFrac_X))^2)+((Child_Y−(Parent_Y+Flow-_Tensor_RepFrac_Y))^2)+((Child_Z−(Parent_Z+Flow-_Tensor_RepFrac_Z))^2))
SX→RQ$27+RX32
SY→RR$27+RY32
SZ→RS$27+RZ32
SX→Parent_X+Flow_Tensor_RepFrac_X
SY→Parent_Y+Flow_Tensor_RepFrac_Y
SZ→Parent_Z+Flow_Tensor_RepFrac_Z Metric 'Err_Det_Coef_RepFrac_Presumption' is the 'penalty' for moving cnxpts between major repositionings.
'Not well flow segment related error' metric for a cnxpt i is defined as Erepfrac [xi]
==Err_Det_Coef_RepFrac_Presumption*score (Factor)

where Factor is as above.

Correction

Correction of 'not well flow segment related error' for a new cnxpt positioning is found by moving along vector toward the center of the representative fractional segment of the flow tensor from centroid of cnxpt, but staying inside of Parent Move the cnxpt nearer its flow representative fractional segment, but only in the direction toward that position, but for a limited distance if the cnxpt would be moved out of its region—out of its parent or off the elastic canvas.

Move cnxpt along the vector from the present position to the flow representative fractional segment by a length limited by the surrogate sphere of the parent, as adjusted by constraints.

This cannot cause an unchecked placement of a cnxpt out of region if constrained to be relative to parent.

Correction of 'not well flow segment related error' for a cnxpt by moving the cnxpt nearer its flow representative fractional segment according to where the Flow tensors place it.

Correction of 'Flow segment error' sets a new point for the centroid of each child cnxpt by moving the child cnxpt toward the flow representative fractional segment along the vector from the centroid of the child cnxpt to the flow representative fractional segment, by the Correction Factor, (so long as they do not move out of the parent) giving:
Correction Factor=($SD82)
Correction Factor=(SC82/SB82)
Correction Factor=(SA82/RW)
Correction Factor=(SR$31/ED_RepFrac)
Correction Factor=(MAX(ST)/ED_RepFrac)
Correction Factor=(Factor/ED_RepFrac)
$SD82→SC82/SB82
SC82→SA82
SB82→RW
SB82→ED_RepFrac→RW
SA82→SR$31
SR$31→MAX(ST)
Child centroid=[((Child_X)−(Correction Factor)*(Child_X)), ((Child_Y)−(Correction Factor)*(Child_Y)), ((Child_Z)−(Correction Factor)*(Child_Z))] The correction will not move the Child outside of the parent.

Not Well Uncle Related Error

Inform the user of the strength of the attractive forces between cnxpts and their strongest uncles. A child cnxpt should be on the side of its parent that is relatively closest to the position of its most directly related uncle, when possible, to give the user greater associative understanding of the relations shown.

When a child cnxpt is related to certain uncles more than others, it should be on the side of its own parent that is closest to its most strongly related uncle, and adjusted where appropriate, toward the second most strongly related uncle. Movement to that position in its parent is the correction. This is a usability correction. This is a one-sided adjustment.

Parameters include 'To-Uncle Attractor' tensor, Cnxpt location, parent location, system parameters.

If the child cnxpt is too distant from the side of the parent which is closest to the strongest uncle, less factors, then the cnxpt's position should be corrected.

Detection

Detection=determine max (score (Factor)) based upon Uncle of a child cnxpt
score→UB→((TZ−TZ$30)TTZ$29)
score→((TZ−TZ$30)TTZ$29)
score→((Factor−AVERAGE(over all (Factor)))/STDEVP (over all (Factor)))
Factor→TZ→(TE*((TY−TY$30)))
only if TY>0
TZ$29→STDEVP(TZ31:TZ72)
TZ$29→STDEVP(over all TZ)
TZ$29→STDEVP(over all (factor))
TZ$30→AVERAGE(TZ31:TZ72)
TZ$30→AVERAGE(over all TZ)
TZ$30→AVERAGE(over all (factor))
Factor=see below:
To find the factor for each child cnxpt, we use a calculation based upon Quadratic Solution to find the proper P or P', giving a value for the distance that the child cnxpt can move toward the uncle (the direction is set by the present child position—uncle position vector), as follows:
A=1
B=2*(((xo−xc)*(xo−xt)+(yo−yc)*(yo−yt)+(zo−zc)*(zo−zt))/(SQRT((xt−xo)^2+(yt−yo)^2+(zt−zo)^2)))
C=(((xo−xc)*(xo−xc)+(yo−yc)*(yo−yc)+(zo−zc)*(zo−zc)))−(r*(1−Edge_Protection_Ratio)−radius of the child cnxpt)^2
Discriminant (Disc)=(b^2−4ac)=b^2−4c
√(b^2−4ac)
P=[−b+√(b^2−4ac)]/ 2a
P'=[−b−√(b^2−4ac)]/2a
And the use of P or P' depends upon the discriminant and the side on which the uncle resides.
where:
TR→A=1
TS→B=2*((xo−xc)*(xo−xt)+(yo−yc)*(yo−yt)+(zo−zc)*(zo−zt))/(SQRT((xt−xo)^2+(yt−yo)^2+(zt−zo)^2))

TS→2*(($EQ−$EQ$27)*($EQ−$TJ)+($ER−$ER$27)*($ER−$TK)+($ES−$ES$27)*($ES−$TL))/(SQRT((($EQ−$TJ)^2)+(($ER−$TK)^2)+(($ES−$TL)^2)))

TS→2*(($EQ−$EQ$27)*($EQ−$TJ)+($ER−$ER$27)*($ER−$TK)+($ES−$ES$27)*($ES−$TL))/(SQRT((($EQ−$TJ)^2)+(($ER−$TK)^2)+(($ES−$TL)^2)))

TJ→Uncle_Pos_X

TK→Uncle_Pos_Y

TL→Uncle_Pos_Z

TS→B=2*((Child_X−Parent_X)*(Child_X−Uncle_Pos_X)+(Child_Y−Parent_Y)*(Child_Y−Uncle_Pos_Y)+(Child_Z−Parent_Z)*(Child_Z−Uncle_Pos_Z))/(SQRT(((Child_X−Uncle_Pos_X)^2)+((Child_Y−Uncle_Pos_Y)^2)+((Child_Z−Uncle_Pos_Z)^2)))

TS→B=2*((Child_X−Parent_X)*(Child_X−Uncle_Pos_X)+(Child_Y−Parent_Y)*(Child_Y−Uncle_Pos_Y)+(Child_Z−Parent_Z)*(Child_Z−Uncle_Pos_Z))/(ED_U_C)

Sq_of_limit_on_How_Far_Child_May_Move_Toward_Uncle→TT→C=(((xo−xc)*(xo−xc)+(yo−yc)*(yo−yc)+(zo−zc)*(zo−zc)))−(r*(1−Edge_Protection_Ratio)−radius of the child cnxpt)^2

Sq_of_limit_on_How_Far_Child_May_Move_Toward_Uncle→TT→C=(($EQ−$EQ$27)^2+($ER−$ER$27)^2+($ES−$ES$27)^2)−((($ET$27*(1−Edge_Protection_Ratio))−$ET)^2)

Sq_of_limit_on_How_Far_Child_May_Move_Toward_Uncle→TT→C=((Child_X−Parent_X)^2+(Child_Y−Parent_Y)^2+(Child_Z−Parent_Z)^2)−(((Parent_Radius*(1−Edge_Protection_Ratio))−Child_Radius)^2)

Discriminant=(b^2−4ac)=b^2−4c

Calculate only for child cnxpts where Discriminant>=0→Discriminant→TU→(TS^2−4*TT)>=0

TU→(TS^2−4*TT)

TU→(TS^2−4*Sq_of_limit_on_How_Far_Child_May_Move_Toward_Uncle)

√(b^2−4ac)→TV→SQRT(TU)

Highest Weighted Uncle Relationship for Child→TE→=MAX(RO:TD)

Highest Weighted Uncle Relationship for Child→TE→=MAX(Uncle Attractor tensor Weight)

TF→=IF(ISNA(MATCH(TE,RO:TD,O)),O,MATCH(TE,RO:TD,O))

TG→=IF(TF>0,OFFSET($RN$30,0,TF),0)

TH→=INDIRECT(BAS_DTA_stem&"R"&(Cnxpt_ID_data_start_row−1+TG)&"C"&Cnxpt_ID_data_col,FALSE)

TI→=INDIRECT(BAS_DTA_stem&"R"&(Names_data_start_row−1+$TG)&"C"&Names_data_col,FALSE)

Uncle_Pos_X→TJ→=INDIRECT(BAS_DTA_stem&"R"&(X_data_start_row−1+$TG)&"C"&X_data_col,FALSE)

Uncle_Pos_Y→TK→=INDIRECT(BAS_DTA_stem&"R"&(Y_data_start_row−1+$TG)&"C"&Y_data_col,FALSE)

Uncle_Pos_Z→TL→=INDIRECT(BAS_DTA_stem&"R"&(Z_data_start_row−1+$TG)&"C"&Z_data_col,FALSE)

Uncle_Radius→TM→=iNDIRECT(BAS_DTA_stem&"R"&(Size_data_start_row−1+$TG)&"C"&Size_data_col,FALSE)

Factor=TZ→(TE*((TY−TY$30))) but only if IF(TU>=0),IF(TY>0)

Distance from Child cnxpt to just inside of parent along path to Uncle→=TY→TW or TX depending upon:

IF(TW>TX,TW,TX) but only if TW>0 or if TX >0 (if(AND(TW>0,TW>TX),TW, IF(AND(TX>0,TX>TW),TX,IF(TW>0,TW,IF(TX>0,TX,0)))))

TY$30→AVERAGE(TY31:TY72)

TX→IF(TU>=0,((−TS−TV)/(2)))

TW→IF(TU>=0,((−TS+TV)/(2)))

TW→((−TS+TV)/(2))

TW→((−B+SQRT(Discriminant))/(2))

TX→((−TS−TV)/(2))

TX→((−B−SQRT(Discriminant)/(2)))

√(b^2−4ac)→TV→SQRT(TU)

ED_U_C→Distance from Child Centroid to Uncle position→TN→SQRT((EQ−TJ)^2+(ER−TK)^2±(ES−TL)^2)

Distance from parent centroid to child centroid→TO4=SQRT(($EQ−$EQ$27)^2+(ER−$ER$27)^2+(ES−$ES$27)^2)

Distance from parent centroid to UNCLE→TP→=SQRT(($EQ$27−TJ)^2+($ER$27−TK)^2+($ES$27−TL)^2)

TO→=IF(TO>(TO$27),"WATCH OUT−OUTSIDE"," ")

ED_U_C→TN→=(SQRT(((Child_X−Uncle_Pos_X)^2)+((Child_Y−Uncle_Pos_Y)^2)+((Child_Z−Uncle_Pos_Z)^2)))

Metric

'Err_Det_Coef_Uncle_Relation_Attraction' is the 'penalty' for poor positioning based upon strength of relationships between cnxpts and uncles.

'Not well uncle related error' metric for a child cnxpt is defined by Erelu [xi]=

==Err_Det_Coef_Uncle_Relation_Attraction*UB32

==Err_Det_Coef_Uncle_Relation_Attraction*score (Factor)

where Factor is as above.

Correction

Correction of 'Uncle error' sets a new point for the centroid of each child cnxpt by moving the child cnxpt toward the Uncle along the vector from the centroid of the child cnxpt to the Uncle, by the Correction Factor, (so long as they do not move out of the parent) giving:

Correction Factor=(($BX82))

Correction Factor=(BV82/BU82)

Correction Factor=(BT82/ED_U_C)

Correction Factor=(TY/ED_U_C)

Correction Factor=(Factor/ED_U_C)

$BX82→BV82/BU82

BV82→BT82

BU82→TN

BJ82→ED_U_C→OZ

BT82→TY

TY→Factor above

New Child is at:

Child centroid=[((Child_X)−(Correction Factor)*(Child_X)), ((Child_Y)−(Correction Factor)*(Child_Y)), ((Child_Z)−(Correction Factor)*(Child_Z))] The correction will not move the Child outside of the parent.

The actual 'best' quality correction here is to determine the locus of the centroids of the most important uncles (perhaps by a quartile based upon the number of children) establishing an attraction to that set of uncles, since if only the top relationship is considered, and there are three uncles with a very strong relationship but they are not all on the same side of the parent, then the map will not well reflect the reality of those strengths, or will 'jiggle' between versions. This will create greater complexity in the algorithm.

Eventually, the Correction of 'not well uncle related error' for a child cnxpt will be performed by moving the centroid of the cnxpt closer to the vector from the centroid of the uncle to the centroid of the parent, and within the parent, but positioned along that vector closer to the uncle or closer to the centroid of the parent by an amount large enough to reduce the standard deviation of the distance to uncle strength ratio, so that those child cnxpts which are highly related to the uncle are closer to the edge of the parent sphere, and those child cnxpts not highly related to the uncle are closer to the centroid of the parent. In addition, all of the relationships from a child cnxpt to all of its uncles will be taken into consideration.

Mathematical Formulation for Uncles and Prior Position Adjustments

This algorithm segment provides the process to determine how far a point (a centroid of a cnxpt) can be moved toward a specific second point without moving it outside of the parent sphere. The start position is called 0 (the vector or ray's origin) (the centroid of the cnxpt whose position is moving). It is (xo, yo, zo). The other point is the target position T (the position which we are comparing against which gives us directionality but not necessarily a destination for movement). It is (xt, yt, zt).

For Prior Position calculations, the target is provided by the Bias Tensors which provide the position of the prior cnxpt position relative to the centroid of its parent at the prior time, and that target must be adjusted by the present position of the parent. For uncle calculations, the target is the position of the uncle.

To determine how far a cnxpt's centroid may be moved without moving it outside of the parent, the boundary caused by the parent must be determined. If the movement is toward a prior position, then that prior position might be inside or outside of the parent. If the movement is toward an uncle, that uncle must be outside of the parent (because of prior level calculations). In each case, the new child position has to be within the parent or an error has occurred and must be corrected. For a prior position at most one intersection with the sphere of the parent will matter, and for an uncle exactly one intersection will matter, or an error condition exists and must be corrected before this algorithm segment is applied.

Again, the longest possible position change is given by a vector OT between two points, one being the cnxpt's centroid and one is either a prior position or an uncle's centroid. The line that has the direction of the vector will intersect the boundary of the parent (a sphere) if either of those points is within the parent. We are not seeking merely the intersection with the parent sphere's boundary that is closest to the child cnxpt, since the uncle or the prior position may be on the other side of the parent. One of the two intersections, P1 (it is unlikely, but possible, that there will be only one intersection) will be between the two points (the cnxpt and the prior or uncle position), and one, P2, should not be. Here the point P1 between the child cnxpt and the uncle or prior position that is an intersection with the inner reaches of the surrogate (see below) of the parent boundary is to be found, if it exists, so that the full child cnxpt remains within the parent. This gives us a maximum value for the target use which is to determine where the cnxpt centroid should be moved to. P1 is at length p or p' from 0, and we have to determine if it is at p or p'. The distance p or p' gives us the point of intersection and all the needed information to determine the distance to move the child cnxpt while not moving it outside of the surrogate sphere.

The intersection calculation is for an interior point of the parent on an inner contained sphere of the parent wherein all children must remain, because we don't allow the interior children spheres to overlap the outer, parent's edge or even be near it. This gives a constraint of looking at the effective skin of the outer sphere to be inside the radius by a factor, so we don't use the actual radius but rather a surrogate of it. The parametric equations for a ray(v) are: X=xo+xd*v, Y=yo+yd*v, Z=zo+zd*v where d is a normalized direction vector (a unit vector) [xd, yd, zd] for the line and X, Y, Z are all coordinates for a point on the line, and v is a parameter for some other point on the line. In other notation, the line between 0 and the point (xv, yv, zv) is given by the normalized direction vector (a unit vector) d, such that ray(v)=0+vd, v>=0. A point 0, or (xq, yq, zq) is on a sphere if (xq−xc)ˆ2+(yq−yc)ˆ2+(zq−zc)ˆ2−rˆ2=0.

Ray(v) intersects the sphere at a point P if P lies on ray(v) (so P=O+vd) and if (p−c)−(p−c)=rˆ2. Find the value v to find where ray(v) intersects the sphere by setting ray(v) to P, or (o+vd−c)−(o+vd−c)=rˆ2

To solve for v, expand using (x+y+z)ˆ2=xˆ2+yˆ2+zˆ2+2xy+2xz+2yz, to obtain (d·d)vˆ2+2(o−c)·dv+(o−c)·(o−c)·rˆ2=0 and solve with a quadratic equation solution, or A=(d·d)

B=2(o−c)·d

C=(o−c)·(o−c)−rˆ2

And, in quadratic equation form

Avˆ2+Bv+C=0

Here, d=[xd, yd, zd], a unit vector for the line OT. Since 1=SQRT(dˆ2), d=((xt−xo, yt−yo, zt−zo)/(SQRT((xt−xo)ˆ2+(yt−yo)ˆ2+(zt−zo)ˆ2))).

A=1.1

B=2 (o−c)·d

=2*((xo, yo, zo)−(xc, yc, zc))·((xt−xo, yt−yo, zt−zo)/(SQRT((xt−xo)ˆ2+(yt−yo)ˆ2+(zt−zo)ˆ2)))

=2*(xo−xc, yo−yc, zo−zc)·((xt−xo, yt−yo, zt−zo)/(SQRT((xt−xo)ˆ2+(yt−yo)ˆ2+(zt−zo)ˆ2)))

B=2*((xo−xc)*(xo−xt)+(yo−yc)*(yo−yt)+(zo−zc)*(zo−zt))/(SQRT((xt−xo)ˆ2+(yt−yo)ˆ2+(zt−zo)ˆ2)))

C=(o−c)·(o−c)−rˆ2

=(((xo, yo, zo)→(xc, yc, zc))·((xo, yo, zo)−(xc, yc, zc)))−rˆ2

=(((xo−xc)*(xo−xc)+(yo−yc)*(yo−yc)+(zo−zc)*(zo−zc)))−rˆ2

[1] The dot product of two vectors A and B is A·B=A.x*B.x+A.y*B.y+A.z*B.z, so (d·d)=((xt−xo, yt−yo, zt−zo)/(SQRT((xt−xo)ˆ2+(yt−yo)ˆ2+(zt−zo)ˆ2)))·((xt−xo, yt−yo, zt−zo)/(SQRT((xt−xo)ˆ2+(yt−yo)ˆ2+(zt−zo)ˆ2)))=((xt−zo)/(SQRT((xt−xo)ˆ2+(yt−yo)ˆ2+(zt−zo)ˆ2)))ˆ2+((yt−yo)/(SQRT((xt−xo)ˆ2+(yt−yo)ˆ2+(zt−zo)ˆ2)))ˆ2+((zt−zo)/(SQRT((xt−xo)ˆ2+(yt−yo)ˆ2+(zt−zo)ˆ2)))ˆ2 =(xt−xo)ˆ2/(xt−xo)ˆ2+(yt−yo)ˆ2+(zt−zo)ˆ2)+(yt−yo)ˆ2+(xt−xo)ˆ2+(yt−yo)ˆ2+(zt−zo)ˆ2)+(zt−zo)ˆ2+(zt−zo)ˆ2+(yt−yo)ˆ2+(zt−zo)ˆ2)=((xt−xo)ˆ2+(yt−yo)ˆ2+(zt−zo)ˆ2)/((xt−xo)ˆ2+(yt−yo)ˆ2+(zt−zo)ˆ2)=1 Of course, this is true because A and B are both unit vectors, and in tact are the same unit vectors, so cos(Θ)=1 because Θ=0 degrees, and A·B =1*1*1. So A need not be calculated.

In our specific circumstances, a surrogate sphere inside of the parent must be established based upon a buffer metric (the Edge_Protection_Ratio) and the radius of the child, since the child's outer boundary rather than the centroid must not breach the parent's surface. Because the points O, C, and T are the same, we need only change the r to the new surrogate sphere radius value.

So,

A=(dp·dp)=1

B=2*((xo−xc)*(xo−xt)+(yo−yc)*(yo−yt)+(zo−zc)*(zo−zt))/(SQRT((xt−xo)ˆ2+(yt−yo)ˆ2+(zt−zo)ˆ2)))

C=(((xo−xc)*(xo−xc)+(yo−yc)*(yo−yc)+(zo−zc)*(zo−zc)))−(r*(1−Edge_Protection_Ratio)−radius of the child cnxpt)ˆ2 and the distance from the origin to the intersection with the surrogate sphere on the vector OT is p=[−b±√(b2−4ac)]/2a We are seeking an answer regarding which direction the centroid has to be moved, and whether that movement will be limited by the boundary of the parent. The Discriminant (b2-4ac) should always be positive only. If it is zero or negative, something is really wrong.

Discriminant (Disc)=(b2−4ac)

(2*((xo−xc)*(xo−xt)+(yo−yc)*(yo−yt)+(zo−zc)*(zo−zt))/(SQRT((xt−xo)ˆ2+(yt−yo)ˆ2+(zt−zo)ˆ2))))ˆ2−4*((((xo−xc)*(xo−xc)+(yo−yc)*(yo−yc)+(zo−zc)*(zo−zc)))−(r*(1−Edge_Protection_Ratio)−radius of the child cnxpt)ˆ2))

With that, then solve for the actual distance p=[−b±√(b2-4ac)]/2a, or p=[−b+√(b^2−4ac)]/2a=(−b+SQRT(Disc))/2 p'=[−b −√(^2−4ac)]/2a=(−b−SQRT(Disc))/2

And choose which distance p1 should be from p and p' to set the length limit. If p is positive, and greater than p', then use p because it is on the vector OT between O and T. If p' is positive and greater than p, that it is on the vector OT between O and T.

For T, for the uncle calculation, use: (xt, yt, zt).

For Prior Position calculations, (xt, yt, zt) is the position of the prior position relative to the centroid of its parent at that time, and:

xt=(xc+xtensor)

yt=(yc+ytensor)

zt=(zc+ztensor)

Where p1 is positive, the length to the point t must be capped by that length.

Brute Force Algorithm Summary

For each fxxt under consideration, the procedure for cnxpt positioning used here is:

Procedure Brute Force Sphere Positioning for a Level of the Forest (or for a level of a single tree)

Initialize:

Generate an initial ordered list. The Population is limited to the objects on the list at a certain level of depth (, and within a certain tree).

Generate initial positions by partitioning the canvas space allocated to the parent (or the elastic surface)

(Compute 3D codewords) Evaluate all individuals in the population. Find error metric for each cnxpt and total error metric (for level of forest or for level of tree).

while Stopping conditions are not satisfied (stopping conditions: the error metric is smaller than a system parameter setting; the change in the error is smaller than a system parameter setting; or a fixed number (system parameter setting) of iterations have occurred.)

do

Evolve a new population to generate a priority list for change, by ordering the cnxpts by their Ei error metric values Select the ‘k’ cnxpts with the highest error Ei to improve where ‘k’>0 is set by system parameter (in one embodiment, chose only the first T unrelated cnxpts, 0<‘j’<=‘k’)

for each such individual do

Calculate individual cnxpt position correction adjustment and apply change.

end for (Compute the new set of 3D codewords) Find error metric for each (affected) cnxpt and total error metric (for level of forest or for level of tree).

If error metric does not show a lower distortion error E, Reject change; Else, apply it.

end while end procedure

Brute Force Algorithm Detail a) Select a ‘best’ candidate sub-algorithm for repositioning a cnxpt that has a very bad (not necessarily the ‘worst’ in some implementations) codeword.

b) Determine a better codeword for that cnxpt by moving the cnxpt to a ‘better’ position. If the error improves (is reduced), in the next error recalculation, accept the newly set position for the cnxpt. The better codeword has thus positioned the cnxpt a) so that it is within its ‘parent’ in 3D or, for roots, it is fully on the elastic surface; b) so that it does not overlap its siblings (in 3D); c) so that it is relatively close to the position it previously had on the map; d) so that it is nearer to its closely related siblings and possibly further from its less closely related siblings in 3D; e) for child cnxpts, so that it is nearer to its closely related Uncles and possibly further from its less closely related Uncles, in 3D; f) so that it is nearer to its parent’s centroid if is very important, and more distant from the centroid if not important; g) so that all cnxpt sizes have a size related to their importance; h) so that all other cnxpts at the same level also have a similarly advantageous position.

c) Recalculate the error metric using the 3D Euclidean distance measures. This is done by generating a test vector for a cnxpt and finding the Euclidean distance between it and each codeword in 3D. The test vector must conform to the rules for size, distance, location, and strength for the cnxpt, but still be at a significant distance from the existing codeword so that it yields a lower error.

d) Repeat steps a thru c until the either the codewords don’t change or the change in the codewords is smaller than a system parameter setting.

Evolutionary Algorithm Summary

In this algorithm, the solution domain consists of lists, each containing a satisfactory positioning and sizing of the cnxpts in the fxxt. The best list is the one with the lowest error metric, but any list is useful because the solution domain contains only lists with satisfactory positioning and sizing. The fitness function, given by the error metric, measures the quality of the list for any list, or if no list exists, is 0.

Improvement is performed by changing the position of cnxpts through repetitive application of the selection, adjustment, and mutation operators.

Heredity is inherent to the overall processing of the fxxt specific TTX map because of the top down passing of category traits to children cnxpts (and related dxos).

Procedure Evolutionary Sphere Positioning for a Level of the Forest (or for a level of a single tree)

Initialize:

Generate an initial ordered list. The Population is limited to the objects on the list at a certain level of depth (, and within a certain tree).

Generate initial positions by partitioning the canvas space allocated to the parent (or the elastic surface)

while Stopping conditions are not satisfied (stopping conditions: the error metric is smaller than a system parameter setting; the change in the error is smaller than a system parameter setting; or a fixed number (system parameter setting) of iterations have occurred.)

do

Evaluate all individuals in the population. Find error metric for each cnxpt and total error metric (for level of forest or for level of tree).

Evolve a new population using stochastic search operators to generate a priority list for change, by:

a) ordering the cnxpts by their Ei error metrics b) adding a random mutation element for one cnxpt position c) applying a heuristic pattern factor to select a cnxpt for repositioning d) by applying random selection of a cnxpt for repositioning Select the ‘1<’ cnxpts with the highest priority from the list to improve, where ‘k’>0 is set by system parameter (in one embodiment, chose only the first ‘j’ unrelated cnxpts, 0<‘j’<=‘k’)

for each such individual
do
Calculate individual cnxpt position correction adjustment and add to candidate change list
end for
Re-evaluate total error metric (for level of forest or for level of tree) based upon corrections.
If improvement in error occurred, then apply change list.
end while
end procedure Evolutionary Algorithm Detail Here, heuristic pattern factors can include but are not limited to: basis for choice of cnxpt is one term of the error metric which is larger than some level; basis for choice of cnxpt is where most important cnxpt is chosen if its error metric is greater than some percentage of the overall error metric for those cnxpts considered.

Post Visualization Actions

Effects of User Change Application on Fxxt Analysis or Post Fxxt Analysis Data Summarization Where a user makes a change that must be shown for him alone, special procedures are required. Due to the very high cost of re-computation for changes, only certain personalized computations are allowed.

Insert Cnxpts into Hierarchy Based upon Similarity and Parent Size

Use Case: Insert Cnxpts into Hierarchy Based upon Similarity and Parent Size—Where the affinitive tensors are so strong and the parent cnxpt so large, include the similar non-child cnxpt into the category of the parent by adding a (temporary) hierarchical summary association, hierarchical tensor, and child tensor.

If a tensor between a child and an uncle that is also a root would cause a spacing between the cnxpts to be closer than 1/10 (or other system set parameter setting) of the radius of the child's parent, and the diameter of the uncle is less than the diameter of the parent by a second system parameter setting, then add it as a sub-category of the parent. A recalculation of the position of the child is necessary to move it fully into the parent, but a full recalculation for the fxxt is not needed.

In one embodiment, the added hierarchical summary association is made a permanent association of a infxtypx type.

System Functions—Ontology Manipulation for Set Mapping Visualization Process

The following Set Mapping Visualization Process tasks convert a result set, selection set, or area of consideration to a taxonomy and a map for display. Result sets are either associated with goals or cnxpts, or a temporary txo, and may or may not contain cnxpts as rsxitems. Selection sets may or may not contain cnxpts as elements. Areas contain at least one cnxpt. Result sets and selection sets contain elements that may have occurrence relationships with cnxpts even if the set does not contain cnxpts.

The taxonomy derived for the sets or areas can be organized on the basis of the cnxpts associated with the elements or which are elements of the set or area. The map will normally require the cnxpt organization for creation. A fxxt provides a context for classification of the info-items and other elements of the set. In each case, one existing fxxt will provide the cnxpt organization for the taxonomy or map. The fxxt also provides cnxpt positioning and sizing from the TTX Map to the Set or Area Map. Non-cnxpt objects in the Set or Area Map will be positioned within the Cnxpt they are associated with according to positioning rules stated in this section and the tensors created for the objects above.

Overall, the process involves formation of a taxonomy structure and a map structure to be associated with the set or area and the fxxt for the context. These are then populated with the elements of the set or area, and with the associated cnxpts. The taxonomy is then sorted for use, without adding the full complexity of the cnxpt organization from the fxxt. The map is then augmented with the cnxpt organization from the fxxt to fully structure it for use. The map data can be displayed in multiple formats, one of which is a full taxonomy with the full organization from the fxxt. Culling can take place on either the taxonomy display or the map.

Even though the result set is intended to include elements relevant to only one cnxpt, goal, or txo, in many cases those elements may have already been found to be relevant to other cnxpts. Selection sets need not relate to a single cnxpt. Areas do not relate to single cnxpts in nearly any case.

Generate Selection Set Taxonomy

Use Case: Extract and Generate Ordering for Taxonomy from Selection Set for Culling—Extract a single hierarchical taxonomy from the Selection Set to provide a Culling Perspective based upon a fxxt.

Algorithm:

For each info-item in the selection set,

If the selected item is an information resource that has not been related to an irxt, create an irxt for the information resource.

Associate with the taxonomy the cnxpt, irxt, or txo of the selected item.

For txo or irxt selections, associate with the taxonomy all cnxpts for which the selected item's txo or irxt has an occurrence.

For the fxxt utilized as the context, form a forest of trees based upon the 'FXXT COMPLETE' hierarchical tensors existing for the cnxpts associated with the taxonomy.

Selection items or cnxpts form the roots of the taxonomy. Order non cnxpt selection items first in the taxonomy, followed by a sorted list of all cnxpt based roots in the hierarchy by their level in the fxxt specific TTX map, root level first and deepest level last.

Cnxpts for which no element is associated in the Selection Set and for which no progeny have associated elements in the Selection Set are not shown and not added to the taxonomy or the resulting map below.

Generate Result Set Taxonomy

Use Case: Extract and Generate Ordering for Taxonomy from Result Set for Culling by fxxt—Extract a single hierarchical taxonomy from the Result Set to provide a Culling Perspective based upon a fxxt.

After locating information and applying result set culling, a taxonomy containing cnxpts if possible, and other txos in an ordering. The ordering is set by a fxxt where fxxt based tensors exist between the target goal or cnxpt and other cnxpts indicated by the result set. If no such tensors exist, then the fxxt is irrelevant.

Algorithm:

If the Result Set is associated with a cnxpt, goal, or txo, then associate the result set's cnxpt, goal, or txo with the taxonomy object.

For each rsxitem in the result set,

If the rsxitem is an information resource that has no irxt, create an irxt for the information resource.

If the rsxitem is not an information resource, and does not have a txo representing it, then create a txo for the information.

Associate with the taxonomy the irxt or txo of the rsxitem.

Associate with the taxonomy all cnxpts for which the rsxitem's txo or irxt has an occurrence.

If any rsxitem is not associated with any cnxpt, goal, or txo, and the result set is associated with a cnxpt, goal, or txo, then associate the rsxitem with the result set's cnxpt, goal, or txo by creating an occurrence with a weight according to the relevance (as the relevance is stated, this will change, so it is a function of the stated relevance).

For the fxxt utilized as the context, form a forest of trees based upon the 'FXXT COMPLETE' hierarchical tensors existing for the cnxpts associated with the taxonomy. Also use the occurrence relationships such that the parent is the result set's cnxpt, goal, or txo, or a cnxpt that is an rsxitem, or a cnxpt that has an occurrence relationship with an rsxitem. No rsxitem is ever a root unless it is a cnxpt.

Cnxpts, goals, or txos form the roots of the taxonomy. Order non cnxpt related rsxitems first in the taxonomy, followed by a sorted list of all cnxpt based roots in the hierarchy by their level in the fxxt specific TTX map, root level first and deepest level last. The result is a list of rsxitems for a txo if the txo is the result set's target, or a goal, or a cnxpt.

Cnxpts for which no rsxitem is associated in the set and for which no progeny have associated rsxitems in the set are not shown and not added to the taxonomy or the resulting map below.

Generate Result Set Taxonomy By Citations

Use Case: Extract and Generate Ordering for Taxonomy from Result Set for Culling by fxxt and citation—Extract a single hierarchical taxonomy from the Result Set to provide a Culling Perspective based upon citations and fxxts.

Algorithm:

If the Result Set is associated with a cnxpt, goal, or txo, then associate the result set's cnxpt, goal, or txo with the taxonomy object.

For each rsxitem in the result set,

If the rsxitem is an information resource that has no irxt, create an irxt for the information resource. If the information resource references other information resources, create an irxt for the referenced information resource and optionally obtain it. Relate the two irxts by a citation relationship.

If the rsxitem is not an information resource, and does not have a txo representing it, then create a txo for the information.

Associate with the taxonomy the irxt or txo of the rsxitem and any cited irxts.

Associate with the taxonomy all cnxpts for which the rsxitem's txo or any of the irxts has an occurrence.

If an irxt citation relationship exists, create a citation hierarchical association between the cnxpts involved.

If any rsxitem is not associated with any cnxpt, goal, or txo, and the result set is associated with a cnxpt, goal, or txo, then associate the rsxitem with the result set's cnxpt, goal, or txo by creating an occurrence with a weight according to the relevance (as the relevance is stated, this will change, so it is a function of the stated relevance).

For the fxxt utilized as the context, form a forest of trees based upon the 'FXXT COMPLETE' hierarchical tensors existing for the cnxpts associated with the taxonomy. Also use all citation hierarchical associations found regardless of their fxxt unless a cycle is formed. Also use the occurrence relationships such that the parent is the result set's cnxpt, goal, or txo, or a cnxpt that is an rsxitem, or a cnxpt that has an occurrence relationship with an rsxitem. No rsxitem is ever a root unless it is a cnxpt.

Cnxpts, goals, or txos form the roots of the taxonomy. Order non cnxpt related rsxitems first in the taxonomy, followed by a sorted list of all cnxpt based roots in the hierarchy by their level in the fxxt specific TTX map, root level first and deepest level last. The result is a list of rsxitems for a txo if the txo is the result set's target, or a goal, or a cnxpt.

Cnxpts for which no rsxitem is associated in the set and for which no progeny have associated rsxitems in the set are not shown and not added to the taxonomy or the resulting map below.

Generate Area Taxonomy

Use Case: Extract and Generate Ordering for Taxonomy from Area for Culling—Extract a single hierarchical taxonomy from the Area of Interest, or Area of Consideration to provide a Culling Perspective based upon a fxxt.

Algorithm:

For each cnxpt in the Area,

Associate with the taxonomy the cnxpt in the Area.

For the fxxt utilized as the context, form a forest of trees based upon the 'FXXT COMPLETE' hierarchical tensors existing for the cnxpts associated with the taxonomy.

Cnxpts form the roots of the taxonomy. Order the taxonomy by a sorting of all cnxpt based roots in the hierarchy by their level in the fxxt specific TTX map, root level first and deepest level last.

This ordered forest may be displayed as a hierarchy.

Add Alias-hyperlinks to Taxonomy

For each cnxpt in the taxonomy, if a hierarchical association exists in the hyperlinkAssocs list where the child role cnxpt matches, then if the parent role cnxpt for that association is also in the taxonomy, add the surrogate cnxpt to the taxonomy for that alias-hyperlink. Position information for the surrogate cnxpt is taken from the fxxt map position just as the positioning for the cnxpt is taken from that parent map.

Set or Area Map Generation

Use Case: Extract and Generate Map for a Set or Area for Culling—Augment a taxonomy for a Set or Area to create a single map for the Set or Area and the fxxt providing context to provide a Culling Perspective based upon a fxxt.

To display the set or area as a map, augment the list of cnxpts and surrogate cnxpts associated with the taxonomy with all of their parent cnxpts not already associated with the taxonomy up to the cntexxt cnxpt. Repeat the addition process for alias-hyperlinks wherever a new parent cnxpt is added, such that any possible additions of alias-hyperlinks is completed.

The added cnxpts are displayed as rather more bland objects than those in the Set or Area so that the Set or Area cnxpts are highlighted. For Result Sets, the rsxitems are more intensely highlighted. For Selection Sets, the included elements are more intensely highlighted.

The Map object will be useful to illustrate the relevance of info-items already associated with other cnxpts. Cnxpts which are not in the taxonomy because no set element is associated with them or with their progeny in the taxonomy are not added to the resulting map.

All of the affinity, sizing, importance, and other data is available for the cnxpts (and surrogate cnxpts) of the resulting Map from the master map for the fxxt. To generate new positioning, specific to the new set or area map, copy all of the sizing and positioning data to the new map prior to repositioning.

Positioning

These algorithms execute after the positioning of all cnxpts in the fxxt specific TTX Map. The algorithm assigns non-cnxpt positions based upon prior position information in the Set or Area Map if it is available. No positioning of non-cnxpts may cause a conflict with cnxpts or other non-cnxpts within the parent (or on the elastic surface if at the root level), and non-cnxpts must be within the confines of (inside the skin of) the parent or elastic surface. For non-cnxpts not associated with any cnxpt, place the non-cnxpt that is most important, if known, nearest the center of the elastic surface. For non-cnxpts associated with a cnxpt, place the non-cnxpt that is most relevant (or by a metric for most important if relevance is not known) nearest the center of the cnxpt to which it is associated, and others somewhere inside the bounds of the cnxpt (inside the skin of the parent) they are associated with. The positions and sizes of cnxpts will not change and are obtained from the fxxt specific TTX Map.

The positioning constraints imposed are based upon simple relevance/importance rankings and processed by cnxpt (or at the root level), applying only to the non-cnxpts. In case a solution cannot be found, the 'child' (or root if level 0 is being considered) non-cnxpt sizes are all reduced in priority order by type, per parent or per level depending upon embodiment. When an error metric is reduced to zero (equilibrium is reached) or to a point where it is minimized or sufficiently low (each a different embodiment), a solution has been found. This configuration is then fixed by entering the positions found for all cnxpts (including alias-hyperlink and dummy cnxpts, if any) and non-cnxpts into the Map object.

Processing Order

Form a priority queue of all cnxpts in the Map Object. Sort the queue by top down breadth first walk of the cnxpts based upon the their fxxt specific TTX map hierarchical ordering, with roots first, listing all siblings contiguously, and ordering them by level and secondarily with the most important (largest size) first and other siblings in order by decreasing importance according to their Importance-Ring Attractor tensor weight. The non-cnxpts will be treated as siblings in the positioning. Interleave into that priority queue all of the non-cnxpts in the set, placing the non-cnxpts at a level into the list just after the last cnxpt at that level in the hierarchy, in order by decreasing relevance / importance. The queue will contain both those cnxpts for which position information has been assigned for the fxxt under consideration as well as those cnxpts and non-cnxpts which have not yet been positioned. As a position is assigned or reassigned, the cnxpt or non-cnxpt is marked as processed but not removed from the queue.

Representation

Represent the cnxpts and non-cnxpts as vectors in 3-dimensional space, given by Xi, i=1, . . . , N. Position these cnxpts and non-cnxpts into 3-dimensional space to give vectors Yi, i=1, . . . ,N which are more optimally positioned. For simplicity, write dij for the pairwise distance between Yi and Yj, and similarly d*ij for the distance between Xi and Xj. The distance metric is Euclidean.

Area and Set Map Initial Partitioning

Start by copying cnxpt positions based upon the fxxt specific TTX map information. Next, walk the priority queue assigning non-cnxpt positions based upon prior position information if it is available.

If no prior positioning has occurred, the partitioning begins by placing the highest importance root non-cnxpt into the center of the elastic surface (or, if processing below the roots, each highest importance child non-cnxpt into the center of its parent), assigning it a size of 0.8 (or a value set by a system parameter setting) times the distance from edge to edge of the smallest aspect. Collisions and overlaps are anticipated. Mark as processed for initiation but do not remove the non-cnxpt from the priority queue.

If the non-cnxpt has no assigned position, then set it according to a modified Archimedean spiral as follows: 1) from the priority queue positioning of the cnxpt, set T to the ordinal value of the non-cnxpt among its siblings (or the set of roots for the roots); 2) set the polar coordinates of the position to be (r, θ=modulo (j*Θ, 2π)) where r is the non-cnxpt's distance from the centroid as set by its relevance rank among its siblings, and 0<Θ<2π is a system parameter setting. 3) convert the polar coordinates to assign a position to the non-cnxpt as (x=r*cos(e), y=r*sin(e)). (Disregard that a collision or overlapping of a cnxpt by a non-cnxpt may occur, as this will be repaired in the following.) Mark as processed but do not remove the cnxpt from the priority queue.

Improving Positioning

The fxxt specific TTX map data set of cnxpt centroid points is first initialized by the initiation step above on the base data (any random initialization is sufficient, but using the prior positioning improves user familiarity with the resulting map cnxpt positions, even if obtained from a different fxxt). Then, that data set is repeatedly updated with changes that have the 'best' (usually the largest impact on the error metric, but also where out of bounds circumstances must be corrected first) error reduction effect, using steepest descent, considering the gradient of the Error Metric with respect to the cycle of the algorithm, until satisfactory convergence is achieved (where the error metric is reduced to a sufficient level or the descent is limited in its improvement per cycle, or a maximum number of iterations has occurred).

For each root cnxpt on the queue, from the head, determine if the position previously assigned, if any, is still valid. It must be within the bounds of the elastic surface. If it is not, then adjust its coordinates along the vector from the centroid of the elastic surface to position the cnxpt within the elastic surface. (New coordinates will potentially be outside of the inscribed circle with a diameter given by the smaller aspect.)

For each non-root cnxpt on the queue among the siblings within the parent (within the same level), from the head, determine if the position previously assigned, if any, is still valid. It must be within the bounds of the parent. If it is not, then adjust its coordinates along the vector from the centroid of the parent to position the cnxpt within the parent.

Distortion Error Metric

Where the current position does not provide an optimal position for a non-cnxpt, the differential from the current to the optimal position is called a distortion. Distortion occurs because of any one or more of a set of bad positioning factors, seen as a whole. To determine which non-cnxpt and which positioning factor is presently the most important one to correct, an error detection ranking metric must be used. Each individual factor has its own defined error detection ranking metric and coefficient for priority setting. The overall error metric will stem from intermediate values for determining which heuristic rule to apply. Only the 'worst' of the error indicators will be used to 'fire' the correction, so only portions of the overall error metric data needs to be calculated on any cycle, and the corrections do not need to be done for every row or at least not for all data on every row in any cycle.

The procedure in every case is begun by computing a value for the basis for distortion comparison for a metric. Then a ranking by that basis is computed between all of the non-cnxpts analyzed along the line of a student-t procedure, where the base discriminator between non-cnxpt position 'badness' relative to other non-cnxpts at a level is by itself ranked. The difference from the discriminator's value and the mean (or perhaps median to make more robust) of the discriminators (the discriminator's residual) is divided by the sample standard deviation. These values are multiplied by an error detection ranking metric coefficient for that distortion and the 'worst' of all non-cnxpt positionings is corrected based upon this ranking. The error detection therefor ranks to determine the correction prioritization for all the non-cnxpts at the level, and points to a specific correction for each next change. Because many of these calculations need not change in every cycle of the calculation, great efficiency in the algorithm is possible.

Where an obstacle condition occurs, such as is caused by inability to remove an overlap due to region size versus size of cnxpts and non-cnxpts, adjustments will be made to the size of all of the non-cnxpts (all roots if at the root level, and all children if at the child level). In that adjustment process, the positions of the non-cnxpts are not altered.

Formally, X vectors represent starting point positions for the cnxpts and non-cnxpts for any specific iteration of the algorithm. Y vectors (the better codewords) represent a positioning which minimizes the distortion based upon relationship strengths and non-cnxpt importance values (and thus derived distances and sizes) as previously calculated.

The lack of quality of a positioning, taken over all non-cnxpts, all non-cnxpts at a level, or all non-cnxpts within a category, is the amount of correct structure present in the 'more optimal' but lost in the present codebook data set. For a specific non-cnxpt, the distortion, is measured by an error Ei, defined as having the following components, combined into a single value with each component affected by a system parameter setting coefficient. For all non-cnxpts at a level the distortion is measured by an error Qi=Sum (Ei) over all i (either for the map, or a level, or for children of the category).

Ei=Err_Det_Coef_Out_of_Region*Eout_of_region [xi]+Err_Det_Coef_Cnxpt_Sizing*ECnxpt_Sizing [xi]+Err_Det_Coef Overlap*sum over j (Eoverlap [xi,xj])+Err_Det_Coef_Importance_Position_Inconsistent*Eimport [xi], where X is a non-cnxpt, where i or j is the index of non-cnxpt in the set, j not equal i, and 'Err_Det_Coef_ . . . ' is the 'penalty' for being incorrect.

Another measure of the overall quality level of the positioning is based upon the differentials between the best and worst non-cnxpt positions.

Rsxitem relevance or selection set relevance/importance (abbreviated 'Relevance_Metric') provides the importance forces to initially show relative size of non-cnxpts at a level. Cnxpts are not considered here. The importance or relevance for Areas is set by altering colors/representations of cnxpts and thus a relevance metric is not of concern here.

Error Reduction Heuristics and their Algorithmic Basis

In the following, some terms are abbreviated:

ED_S_S=(Euclidean Distance from Centroid of Sibling 1 Cnxpt or non-cnxpt to Centroid of Sibling 2 Cnxpt or non-cnxpt)

ED_P_C=(Euclidean Distance from Centroid of Parent to Centroid of Child Cnxpt or non-cnxpt)

In the following, X is a Cnxpt or non-cnxpt, where i or j is the index of the Cnxpt or non-cnxpt in the set, j not equal i.

Where a Column name is used without a row, it is intended to mean a child cnxpt or non-cnxpt row.

Where a Column and Row are both specified, it is intended to mean a special calculation on the set of child cnxpts or non-cnxpts.

Non-Cnxpt Out of Region Error

Each child non-cnxpt must be situated fully within its 'parent' in 3D or, for roots, the non-cnxpt must be fully on the elastic surface. If the current distance from centroid of the parent to the centroid of the non-cnxpt, found by Euclidean Distance, is greater than the radius of the parent less a factor for the size of the skin area of the parent and the radius of the non-cnxpt, then the non-cnxpt must be moved toward the centroid of the parent. This is a mandatory correction. It is a one-sided adjustment.

Inclusive forces are generated automatically by this metric based upon the association of the non-cnxpt to its parent. For roots, the lack of association is made up by the automatic forces requiring the non-cnxpt to be held within the elastic surface canvas.

Parameters are prior non-cnxpt location and radius, parent location and radius, and system parameters.

If the parent cnxpt's radius, reduced by the Edge_Protection_Ratio and further reduced by the child non-cnxpt's radius is less than the Euclidian Distance from the centroid of the parent to the centroid of the non-cnxpt, then the non-cnxpt lies outside of the parent and must be moved into the parent fully.

Detection

Detection=MAX(−(Factor)) where Factor=(((Parent_Radius)*(1−Edge_Protection_Ratio))−(Child_Radius)−(ED_P_C)) and is always negative or not counted in the max.

Metric

'Err_Det_Coef Out_of_Region' is the 'penalty' for being out of region.

'Out of region error' Metric is defined as Eout_of_region [xi]=MAX(Err_Det_Coef_Out_of_Region*((−(Factor/stdev(Factor))))) where Factor=(((Parent_Radius)*(1−Edge_Protection_Ratio))−(Child_Radius)−(ED_P_C)) and Factor is always negative; stdev is calculated only upon basis of negative valued Factors (those child non-cnxpts which are out of bounds)

Correction

Correction of 'out of region error' for a non-cnxpt is performed by moving the child non-cnxpt closer to the centroid of the parent (or of the elastic surface) by an amount large enough to bring it fully into the parent (if a child), or fully onto the elastic surface (if a root).

factor for reduction=>−((((Parent_Radius)*(1−Edge_Protection_Ratio))−(Child_Radius)−(ED_P_C))/(ED_P_C)) where (((Parent_Radius)*(1−Edge_Protection_Ratio))−(Child_Radius)−(ED_P_C))<0, meaning that child non-cnxpt is outside of parent.

A new point for the centroid of the child non-cnxpt is found by reducing the length of the vector from the centroid of the child non-cnxpt to the centroid of parent, anchoring the vector at centroid of parent, by Correction Factor=[((Child_X)+(Correction Factor)*((Parent_X)−(Child_X))), ((Child_Y)+(Correction Factor)*((Parent_Y)−(Child_Y))), ((Child_Z)+(Correction Factor)*((Parent_Z)−(Child_Z)))]

The Correction Factor provides a change in length by applying it as a ratio, yielding ratio*vector [xc−xp, yc−yp, zc−zp] to obtain [x', y', z']. Then reapply to find point [x'+xp, y'+yp, z'+zp] as the new centroid.

Non-Cnxpt Sizing Error

All non-cnxpt sizes should have a size directly related to their importance or relevance to the parent relative to all the other non-cnxpts on its level.

Non-cnxpts with a ratio of their size versus their importance/relevance that is higher than other non-cnxpts at the level (or the children of the parent at the level) will make the user believe that the non-cnxpt is more important then they are meant to be based upon the underlying data. The non-cnxpt's size should be adjusted to more fairly represent its importance, without immediate regard to minimum gap retention factors or out of region, as these will be adjusted in other cycles. This is a usability correction. It is a one-sided adjustment. This cannot be allowed to cause an unchecked placement of a non-cnxpt out of region. Where the size change cannot be corrected because it forces the non-cnxpt to be in part out of region, the size will be adjusted for all non-cnxpts of the same level.

Parameters involved are: Relevance_Metric.

Detection

The non-cnxpt with the largest differential in appropriate size based upon importance to current size, based upon the size/importance ratio, is chosen for correction.

Detection=determine Max (Normalized Error) based upon importance of a child non-cnxpt where Normalized Error=(ABS(Factor−child_radius))/STDEVP(over all (ABS(Factor−child_radius)))

where Factor=weighted_change_factor*(SUM(over all child_radius)/SUM(over all weighted_change_factors)))

where weighted_change_factor=(((child_radius)+4*(Relevance Metric))/5)

where Importance is taken from the non-cnxpt Relevance Metric for the fxxt, and non-cnxpt sizes are stored in Rsxitem relevance or selection set relevance/importance tuples.

Metric

'ErrDet_Coef Cnxpt_Sizing' is the 'penalty' for being sized improperly.

'Not well importance sizing error' Metric is defined as Ecnxpt_sizing [xi]=

(Err_Det_Coef_Cnxpt_Sizing*Normalized Error) where Factor is as above.

Correction

The Correction Factor provides a change in non-cnxpt representation size. Correction of 'not well importance sizing error' for a non-cnxpt is performed by changing the radius of one non-cnxpt by an amount large enough to make it properly represent its importance relative to other children of the parent (if a child), or relative to its siblings, or, in one embodiment, relative to all non-cnxpts on the level.

Correction of 'Not well importance sizing error' for a non-cnxpt is performed by changing the non-cnxpt radius to:

Correction Factor=Factor above.

Non-Cnxpt Importance Position Inconsistent Error

Importance versus distance from centroid of parent is inconsistent. A non-cnxpt should be nearer to its parent's centroid if it is very important among its siblings relative to its parent, and more distant from the centroid if it is not important.

Non-cnxpts with a higher than appropriate ratio of their distance from the centroid of their parent to their importance than all the other children of the parent at the level will make the user believe that the non-cnxpt is less strongly related to its parent than they are meant to be based upon the underlying data. The two non-cnxpts should be moved to more fairly represent the relative strength of the relationship by increasing the Euclidean Distance between them, considering sibling strength and minimum gap retention factors. This is a usability correction. It is a one-sided adjustment.

The relevance metric should push the non-cnxpt into a position as close to an appropriate distance from a perfect importance position within a parent as possible, not too close and not too distant from the patent's centroid relative to other non-cnxpts within the parent (or within the elastic surface canvas) by importance. Parameters include: Relevance_Metric.

Detection

Detection=determine max (Factor) based upon importance of a child non-cnxpt

==max(Factor)

where Factor=

ABS(ImportBasedDist_AdjNeeded−AVERAGE(over all ImportBasedDist_AdjNeeded))/STDEVP(over all ImportBasedDist_AdjNeeded)

And where:

ImportBasedDist_AdjNeeded=(ImportBasedDist_Factor−ED_P_C)

ImportBasedDist_Factor=

(((Max_Import_Dist_Avail*ED_P_C/MAX(over all ED_P_C))+4*(((Max_Import_Dist*(MAX(over all child Relevance Metric)−child Relevance Metric)/(AVERAGE (over all child_radius))))+Max_Import_Dist_Avail))/5)

Metric

'Err_Det_Coef Importance_Position_Inconsistent' is the 'penalty' for not displaying relative importance of siblings well.

'Not well importance positioned error' metric for a non-cnxpt is defined by Eimport [xi]=

( ) where Factor is as above. (note: the Erel is the same for all x1)

Err_Det_Coef_Importance_Position_Inconsistent*Factor where Factor=ABS(ImportBasedDist_AdjNeeded−AVERAGE(over all ImportBasedDist_AdjNeeded))/STDEVP (over all ImportBasedDist_AdjNeeded)

Correction

Correction of 'not well importance positioned error' for a non-cnxpt is performed by moving the centroid of the child non-cnxpt away from or toward the centroid of the parent by an amount large enough to reduce the standard deviation of the distance to importance ratio for the child non-cnxpt within the parent. This cannot cause an unchecked placement of a non-cnxpt out of region Correction of 'Not well importance positioned error' for a non-cnxpt is performed by changing the location of the centroid of the child non-cnxpt to:

Correction Factor=((((Max_Import_Dist_Avail*ED_P_C/MAX(over all ED_P_C))+4*(((Max_Import_Dist*(MAX (over all child_Relevance_Metric)−child_Relevance_Metric)/(AVERAGE(over all child_radius))))+Max_Import_Dist_Avail))/5)−(ED_P_C))/(ED_P_C)

where:

ImportBasedDist_Factor=

(((Max_Import_Dist_Avail*ED_P_C/MAX(over all ED_P_C))+4*(Rel_Pos+Max_Import_Dist_Avail))/5)

Max_Import_Dist=(1−Edge_Protection_Ratio)*(parent_radius)−(MAX(MAX(over all child_radius), parent_radius*0.002))−((MAX(MAX(over all child_radius), parent_radius*0.002))/4)

Rel_Pos→(Max_Import_Dist*(MAX(over all child_Relevance_Metric)−child_Relevance_Metric)/AVERAGE (over all child_radius))

Max_Import_Dist_Avail=ABS(Max_Import_Dist−Rel_Pos_Range)/2

Rel_Pos_Range→MAX(over all Rel_Pos)−MIN(over all Rel_Pos)

Or:

Correction Factor=((((1−Edge_Protection_Ratio)*(parent_radius)−MAX(MAX(over all child_radius), parent_radius*0.002)−(MAX(MAX(over all child_radius), parent_radius*0.002)/4)*ED_P_C/MAX(over all ED_P_C))+4*(((1−

Edge_Protection_Ratio)*(parent_radius)−MAX(MAX(over all child_radius), parent_radius*0.002)−(MAX(MAX(over all child_radius), parent_radius*0.002)/4)*(MAX(over all child_Relevance_Metric)−child_Relevance_Metric)/MAX (over all ED_P_C))+ABS((1−Edge_Protection_Ratio)* (parent_radius)−MAX(MAX(over all child_radius), parent_radius*0.002)−(MAX(MAX(over all child_radius), parent_radius*0.002)/4)−(MAX(over all Rel_Pos)−MIN (over all Rel_Pos)))/2))/5−ED_P_C)/ED_P_C A new point for the centroid of each child non-cnxpt is found by increasing or decreasing the length of the vector from the centroid of the child non-cnxpt to the centroid of the parent non-cnxpt, by the Correction Factor, giving:

Child centroid=[((Child_X)−(Correction Factor)*(Child_X)), ((Child_Y)−(Correction Factor)*(Child_Y)), ((Child_Z)−(Correction Factor)*(Child_Z))] The correction will not move the Child outside of the parent.

Non-Cnxpt Overlap Error

A non-cnxpt must not overlap its siblings. If the current distance from centroid of one non-cnxpt to the centroid of the other cnxpt or non-cnxpt, found by Euclidean Distance, is greater than the combined radii plus a factor for the size of the buffer area separating cnxpts or non-cnxpts, then if both objects are non-cnxpts, the non-cnxpts are each moved away from each other by an amount large enough to remove the overlap. If one object is a cnxpt and the other is a non-cnxpt, the non-cnxpt is moved away from the cnxpt by an amount large enough to remove the overlap. This is a mandatory correction. This is a two-sided adjustment in some cases, and a single sided adjustment in other cases.

Automatically imposed repulsive forces between cnxpts and non-cnxpts create non-overlap protection between siblings for spacing, but apply it as a secondary effect to promote other adjustments.

This cannot cause an unchecked placement of a non-cnxpt out of region

Detection

Detection=determine max (score (Factor)) based upon Overlap of a child non-cnxpt over cnxpts or other non-cnxpts score→(OK−OK$30)/OK$29 where Factor=−MIN(base_factor) only where base_factor is negative base_factor→SQRT((Sibling_1_X−Sibling_2_X)^2+(Sibling_1_Y−Sibling_2_Y)^2+(Sibling_1_Z−Sibling_2_Z)^2)−(parent_radius*Inter_Cnxpt_Gap_Ratio)−((sibling_1_radius)+(sibling_2_radius))

Metric

'Err_Det_Coef_Overlap' is the 'penalty' for overlapping of cnxpts.

'Overlap error' metric for a cnxpt/non-cnxpt pair is defined as Eoverlap [xi,xj]=Err_Det_Coef_Overlap*max (score (Factor))

where Factor is as above.

Correction

Correction of 'Overlap error' for a non-cnxpt over a sibling cnxpt or non-cnxpt is performed by moving the centroid of one or two child non-cnxpts away by an amount large enough to remove the overlap (so long as they do not move out of the parent) by:

Correction Factor=−(ED_S_S−((Sibling_1_Radius+Sibling_2_Radius)+(Parent_Radius*Inter_Cnxpt_Gap_Ratio)))/ED_S_S/2

ED_S_S=(Euclidean Distance from Centroid of Sibling 1 Non-cnxpt to Centroid of Sibling 2 Cnxpt or Non-cnxpt)

A new point for the centroid of one or both sibling non-cnxpts is found by increasing the length of the vector from the centroid of the first sibling non-cnxpt to the centroid of the second sibling cnxpt or non-cnxpt, by twice the Correction Factor. The correction factor is not applied if the child would be moved out of the parent, giving:

If both siblings are non-cnxpts:

Sibling 1 centroid=[((Sibling_1_X)−(Correction Factor)*((Sibling_2_X)−(Sibling_1_X))), ((Sibling_1_Y)−(Correction Factor)*((Sibling_2_Y)−(Sibling_1_Y))), ((Sibling_1_Z)−(Correction Factor)*((Sibling_2_Z)−(Sibling_1_Z)))] IFF the correction does not move Sibling 1 outside of the parent.

Sibling 2 centroid=[((Sibling_2_X)+(Correction Factor)*((Sibling_1_X)−(Sibling_2_X))), ((Sibling_2_Y)+(Correction Factor)*((Sibling_1_Y)−(Sibling_2_Y))), ((Sibling_2_Z)+(Correction Factor)*((Sibling_1_Z)−(Sibling_2_Z)))] IFF the correction does not move Sibling 2 outside of the parent.

If only one sibling is a non-cnxpt:

Sibling 1 centroid=[((Sibling_1_X)−2*(Correction Factor)*((Sibling_2_X)−(Sibling_1_X))), ((Sibling_1_Y)−2*(Correction Factor)*((Sibling_2_Y)−(Sibling_1_Y))), ((Sibling_1_Z)−2*(Correction Factor)*((Sibling_2_Z)−(Sibling_1_Z)))] IFF the correction does not move Sibling 1 outside of the parent; otherwise:

Sibling 1 centroid=[((Sibling_1_X)+2*(Correction Factor)*((Sibling_2_X)−(Sibling 1_X))), ((Sibling_1_Y)+2*(Correction Factor)*((Sibling_2_Y)−(Sibling_1_Y))), ((Sibling_1_Z)+2*(Correction Factor)*((Sibling_2_Z)−(Sibling_1_Z)))] IFF the correction does not move Sibling 1 outside of the parent; otherwise:

Sibling 1 centroid=[((Sibling_1_X)−(Correction Factor)*((Sibling_2_X)−(Sibling_1_X))), ((Sibling_1_Y)+(Correction Factor)*((Sibling_2_Y)−(Sibling_1_Y))), ((Sibling_1_Z)−(Correction Factor)*((Sibling_2_Z)−(Sibling_1_Z)))] EVEN IF the change moves Sibling 1 outside of the parent. Note that this is a movement off of the vector between the centroids.

If none of these moves is possible due to each being a move to outside of the parent, then resize all non-cnxpts at the level (or, in one embodiment, of those within the parent only) by a system parameter set decrease in size.

Area and Set Map Brute Force Algorithm Summary

This algorithm provides for positioning of non-cnxpts in an area or set. The positioning depends upon the context provided by a fxxt. In this algorithm, the solution domain consists of lists, each containing a satisfactory positioning and sizing of the non-cnxpts in the fxxt, based upon the positions previously set for the cnxpts within the fxxt. The best list is the one with the lowest error metric, but any list is useful because the solution domain contains only lists with satisfactory positioning and sizing. The fitness function, given by the error metric, measures the quality of the list for any list, or if no list exists, is O.

Improvement is performed by changing the position of non-cnxpts according to the metrics above.

For each area or set under consideration, the procedure for set element positioning used here is:

```
Procedure Brute Force Sphere Positioning for Elements of a Set or Area at a Level of the Fxxt Forest (or for a level of a single tree)
    Initialize:
    {
Generate an initial ordered list from the taxonomy for the set or area. The list contains the cnxpts needed to classify the elements of the area or set and the non-cnxpts themselves. The population is limited to the objects on the list at a certain level of depth (, and within a certain tree).
{
Copy all info-items from the taxonomy object to the map object.
For each root level cnxpt in the taxonomy object, walk the fxxt tree from that cnxpt to its parent and ancestors, associating each parent or ancestor cnxpt of the pedigree to the Map object only if the cnxpt is not yet associated to the Map object. (Note that once any pedigree cnxpt is found to exist in the Map, this step can move on to the next cnxpt still at the root level in the taxonomy.)
For the fxxt utilized as the context, form a forest of trees based upon the 'FXXT COMPLETE' hierarchical tensors existing for the cnxpts associated with the Map object.
        };
Generate an initial positioning by following the Area and Set Map Initial Partitioning section above.
    };
while Stopping conditions are not satisfied (stopping conditions: the error metric is smaller than a system parameter setting; the change in the error is smaller than a system parameter setting; or a fixed number (system parameter setting) of iterations have occurred.)
    {
Evaluate all individual elements in the population. Find error metric for each element and total error metric (for level of forest or for level of tree).
Evolve a new population to generate a priority list for change, by ordering the non-cnxpts by their Ei error metric values;
Select the 'k' non-cnxpts with the highest error Ei to improve where 'k' > 0 is set by system parameter (in one embodiment, chose only the first 'j' unrelated non-cnxpts, 0 < 'j' <= 'k');
        for each such individual
        do {
            Calculate individual non-cnxpt position correction adjustment and apply change.
        } end for;
        Find error metric for each (affected) non-cnxpt and total error metric (for level of forest or for level of tree).
        If error metric does not show a lower distortion error E, Reject change; Else, apply it.
    } end while;
end procedure;
```

Area and Set Map Brute Force Algorithm Detail a) Select a 'best' candidate sub-algorithm for repositioning a non-cnxpt that has a very bad (not necessarily the 'worst' in some implementations) codeword.

b) Determine a better codeword for that non-cnxpt by moving the non-cnxpt to a 'better' position. If the error improves (is reduced) in the next error recalculation, accept the newly set position for the non-cnxpt. The better codeword has thus positioned the non-cnxpt a) so that it is within its 'parent' in 3D or, for roots, it is fully on the elastic surface; b) so that it does not overlap its siblings (cnxpts or non-cnxpts) (in 3D); c) so that it is nearer to its parent's centroid if is very important, and more distant from the centroid if not important; d) so that all non-cnxpt sizes have a size related to their importance; e) so that all other cnxpts at the same level also have a similarly advantageous position.

c) Recalculate the error metric using the 3D Euclidean distance measures. This is done by generating a test vector for a non-cnxpt and finding the Euclidean distance between it and each codeword in 3D. The test vector must conform to the rules for size, distance, location, and strength for the non-cnxpt, but still be at a significant distance from the existing codeword so that it yields a lower error.

d) Repeat steps a thru c until the either the codewords don't change or the change in the codewords is smaller than a system parameter setting.

System Functions—Ontology Manipulation for Other Visualizations Process

The following Process tasks convert a result set, selection set, or area of consideration to a alternative display structures.

These algorithms execute after the positioning of all cnxpts in the fxxt specific TTX Map. The algorithm for each display structure assigns cnxpt and non-cnxpt positions differently from the above but possibly also based upon prior position information in the Set or Area Map if it is available. Generally, for cnxpts and non-cnxpts, place the cnxpt or non-cnxpt that is most important, if known, nearest the center of the elastic surface. The positions and sizes of cnxpts should not fluctuate between versions of the display structure without a change in the underlying data, and are based upon the fxxt specification analysis.

Representation

The representation of the cnxpts and non-cnxpts will vary between the display structures. One common display structure is a Loci, where the most important cnxpt is at the center and the next most important are arrayed around it. Other mind map like structures are also possible.

Background effects, styles, avatar, avatar personalities, decorations and adornments, avatar status indications, and other visual effects will be applied in this process.

Third Level for Process: Forming Predictions

Prediction and estimation analytics can be plugged in to the system to analyze many factors in the CMMDB. This section describes the prediction that becomes possible with fxxt analysis.

When hierarchical relationships based upon timing are seen between events in history they are thought of as either cause and effect relationships or merely inconsequential timing of two events. Either could have been predicted prior to when the second event occurred, but the better rationale would have existed for the cause and effect. Here the hierarchical relationships are seen as progressing from a 'better understood' event to a 'lesser understood' event whether cause and effect or any other sort of relationship. The system information progresses from being 'lesser understood' to 'better understood' because of progression of time where events finally occur at some point (or don't) and because of interest by users causing more thinking about some specific.

When you look forward into the future, making a prediction about the timing of an event is much easier if you know of an antecedent event where a cause and effect relationship is likely to exist with the consequent or 'descendant' event. The CMMDB gathers antecedents as the first half of a 'hypothetical proposition' of a nature. Here the propositions are named by type and many types are allowed, but the fxxt specification selects the type to apply to obtain a rational set of antecedents and consequents into an ordering (if a strict lineage is needed), an ancestry (if looking back), or a categorization (if looking down or into the future). Here all of these are called fxxt maps. The commonplace analysis of the CMM is thus sorting out what information can lead to a prediction based upon a definition for the fxxt map defined to best predict. Other fxxts might be able to predict the same information.

To predict, an ordering is developed where the hierarchical relationships in the ordering are also given estimates of length, strength, and quality. The fxxt analysis takes ordered associations and makes them into hierarchical relationships, but the user most often will be thinking that the relationship they are making an estimate for is a hierarchical relationship when they are working with it or defining it. The hierarchical relationship useful for a prediction may not at all be a cause and effect relationship, but it must be a good predictor for a certain 'stage' or 'level' of the fxxt tree or the resulting prediction will be poor. Such poor predictions, if used properly, are still indicators here, since mechanisms such as post prediction clustering and standard Bayesian statistics for the consequent based upon multiple fxxt based predictions are available to obtain a type of 'central limit theorem' result showing that the a consequent will occur within a window or some other estimation.

Other information attached to a cnxpt is used to describe, for example, when the antecedent will occur or what its value will be. These will be much better understood when the antecedent is already in history—when it has become real or reached 'fruition'. But, the same analysis to be done for its consequent can be done for the antecedent if the antecedent is not yet solid. This prediction is thus of the nature of Bayesian multivariate analysis, where the drawing of the event tree is done by fxxt analysis and the estimation of probabilities stems from opinions of users, with substantial 'defaulting' to set values where possible until a better estimate is made.

A user assists by drilling down into the future first by entering antecedents and then by entering possible consequents. The user does not always know that they are doing that, but the CMM is built up from that set of actions. The user will often be correcting, by entering votes, the relationships between antecedents and consequents. The constant innovation by users in incrementally extending cnxpts provides a tool to generate the predictive relationships. The connection of a cnxpt of one type to a cnxpt of another type (technology to application of technology, technology to TPL) provides for other predictive relationships. Predictive relationships are also generated by the commonalities mechanism The user will often be entering antecedent or consequent properties that assist the prediction by setting boundary conditions on the relationship, such as 'the consequent requires xxx which will not be available until yyy' relationships to other cnxpts, or such as 'the antecedent will not have a market until yyy because no zzz will be available' (such as where zzz is a video and the antecedent is a television). Information resources such as patents, research papers, news articles, product descriptions, etc. are attached to cnxpts and can be used, manually or automatically, to set estimates for boundary conditions. Boundary conditions are also set by adding trait and purlieu occurrence relationships and property values.

Many users will have their on incentives to get this information in, if the system is useful as their workbench, such as product planners, inventors, researchers, educators, futurists, or entrepreneurs. It is because of the sharing of the information that the usefulness of the workbench for yielding a result will be multiplied to make the workbench become indispensible.

As stated above, certain types of prediction are possible only after a fxxt is analyzed and mapped. The fxxt specification sets the base for the prediction by generating the map both because the fxxt specification states the procedure to form a fxxt taxonomy as well as because the prediction is defined as a part of the fxxt specification. Because the map is built first, prediction is based upon the orderings of hierarchical relationships that form the fxxt into a forest, and on the affinitive relationships that form the positions and sizes of cnxpts in the map.

Note that the fxxt specifications have to be written to obtain a high enough accuracy for the predictions or they will clearly yield junk. The use of modeling will improve the accuracy of the predictions because the predictions can be tested for accuracy and model improvement can occur over time. Automated recalculation can provide improvements.

Note that some process steps of the mapping process must be eliminated to obtain valid predictions based upon the fxxt calculations.

The sizing of cnxpts may be based upon a priori values of probability (or value) based upon previously obtained values, including guesses, predictions from other calculations (such as from other fxxt calculation results) and from prior positioning. These sizings must be preserved in the fxxt calculation process.

The use of heuristics in positioning that would resize a cnxpt only within its parent would destroy the accuracy of these calculations—resizing must be global within any level of the tree.

Also, the roll-up process step must not be used where they may have an impact on the accuracy of the prediction, but there are circumstances where no impact will occur. For instance, if the roll-ups do/will not cause resizing of internal (child) cnxpts, then leaf cnxpts' predictions would appear to remain accurate where the calculation for the predictor is cnxpt size based.

The probability calculation is based upon sizes that may be calculated as probabilities within a parent, so the overall structure includes normal Bayesian expected monetary value calculation. The use of alias hyperlinks provides for the occurrence of an outcome under multiple alternative predecessor events, and is comparable to the Bayesian expected monetary value structure if there are values attached to leafs. Here, the more general allowance for using tree and forest building provides for alternatives to trees based upon event outcome analysis.

Prediction of Value is based upon prediction of probability and context, and upon the connection to a value generating cnxpt such as an appcept.

Prediction Specifications

Two types of prediction specifications are allowed. Modeling rules provide specifications for predictors and may be specified for specific info-item types as non-fxxt based predictions, or specified for fxxts to apply generally only within the fxxt.

Info-item Based Predictions

Modeling rules provide a calculation equation for determining a result that is not based upon the parent or child associations of a cnxpt. Modeling rules also provide for calculations on other info-items. These rules are invoked as 'preliminary' predictions before fxxt based predictions are invoked.

Fxxt Based Predictions

Prediction specifications are attached to fxxt specifications. A prediction specification states that a property of a certain type of cnxpt in a certain level (by the type of relationship connecting the cnxpt to the taxonomy) can be calculated based upon: 1) specific other properties of the cnxpt; 2) the properties of its parent and the association connecting the cnxpt to the parent; 3) the properties of its child and the association connecting the cnxpt to the child; 4) the properties of its siblings and the associations connecting the cnxpt to the sibling; 5) specific properties of information attached to the cnxpt by an occurrence and the occurrence. Where multiple values of such properties or relationships exist, the prediction specification states how to combine and summarize the multiple values.

The levels of the fxxt normally represent 'age' levels, where the 'age' is given by history or knowledge, the oldest being long ago historic events or well known and understood information, and the newest being well into the future or no real understanding available about the level. The probability and value calculations are done at an 'age' level as desired, where the calculated or set age of the cnxpt determines whether the cnxpt is involved in the above calculations, rather than for all leaves. The size of the cnxpt wherever it exists in the forest is used, but 1) a strict ordering of the forest is required where a descendant in a tree from the cnxpt being considered is known, in the tree, to have a different age than the cnxpt being considered so that child cnxpts will not have their probability or value counted in twice; and 2) all alias hyperlinks must have the same age. The 'age' of a cnxpt may be divided into one or more segments such that if a cnxpt is expected to exist over a long period, a different analysis can be applied for, as an example, it's early existence, its maturity timeframe, and its old age. The age paradigm is paralleled for predictions based upon any 'depth' measured paradigm.

Primary Predictions

First, 'preliminary' predictions are performed. Then, the fxxt-based probability and value calculations are done at a level, counting from the root of the forest to the level desired, rather than for leaves first.

Preliminary Prediction Calculations

Use Case: Calculate Preliminary Prediction—Calculate properties of info-items based upon the modeling rules specified for the info-item either by info-item type or for a specific instance of the info-item, without regard to any fxxt based taxonomy.

Modeling rules not based upon the parent or child associations of a cnxpt are evaluated for info-items as soon as possible after a change occurs to the information associated with the info-item on a prioritized processing power allocation basis, or on an expedited basis if needed due to a paid request or other rationale for the priority.

Modeling rules are often 'stacked' where one rule cannot be efficiently applied prior to the calculation of its precedent values. The rule for the precedent value is always placed ahead in the priority based processing queue.

Primary Cnxpt Probability Prediction

Use Case: Primary Cnxpt Probability Prediction—Calculate the probability of a cnxpt based upon the sizes of all the cnxpts at that level in the map.

In one embodiment, the probability of a cnxpt or an alias hyperlink at a level of the forest where no leaf cnxpts exist in any level above is the size of the cnxpt divided by the total of the sizes of all cnxpts or alias hyperlinks at that level of the tree. Where a leaf exists in any level above, the probability of a cnxpt at its level of the forest is =(the size of the cnxpt) divided by (the total of the sizes of all cnxpts or alias hyperlinks at that level of the tree+the sum of the sizes of all of the leaves at any higher levels of the forest). In other words, the size of the upper level leaves is factored in to provide a more realistic metric.

To calculate the total probability of one cnxpt at a level without consideration of where it appears at the level, sum the probabilities found for the cnxpt and all the cnxpt's alias hyperlinks at the level. In other words, the probability for cnxpts at a level is based upon all of the cnxpt's alias hyperlinks and all leaf alias hyperlinks at that level.

To calculate the total probability of one cnxpt without consideration of levels, sum the probabilities found for the cnxpt and all the cnxpt's alias hyperlinks at any level. In other words, the probability is based upon all of the cnxpt's alias hyperlinks and all leaf alias hyperlinks.

In one embodiment, levels are set by timeframe and probabilities are by timeframe. In this mode, a cnxpt is presumed to stretch over all timeframes between the last one occupied by its predecessor and the first one occupied by its successor cnxpt, if one.

The foregoing prediction of the probability of a cnxpt presumes that the cnxpt is a possible outcome of some kind, and that only one child of the parent will be an outcome (others will not occur at the same time—zero sum). Here, there are times when that model can be used, and other circumstances where the model is inappropriate but that another similar and valuable structure will be accurate. For instance, for a single potential technology 'winner takes all' model, the former is proper. For a phased win—where for a time one technology will predominate, then the model can generate the probabilities for those phases but segmenting the technologies, possibly, into sub-cnxpts of different 'ages'.

For the situation when we don't know who the competitor is that will win, and that many might share the result, we use the model to predict value (or as accurately, share) where the unit share is determined by sizing.

If the parent of a cnxpt is sized by probability, then the size of the child will have a probability component in determining its sizing. Even if not, the sizing of the parent will have an effect on the child. There are times when the sizing of the parent must be based upon the sizing of the children, and in those instances, roll-up, possibly applied on only certain levels, are useful.

Primary Appcept Value Prediction

Use Case: Primary Appcept Value Prediction—Determine the value of an appcept by timeframe.

In one embodiment, normalize the values of the appcepts in a timeframe by a metric for the presumed total value of all appcepts in that timeframe to determine an improved (more realistic) prediction. Then metric may be from an assessment based upon estimates of GDP, technology assessments, etc.

Primary Tcept Value Prediction

Use Case: Primary Tcept Value Prediction—Determine the value of a tcept by timeframe in concert with the derived value of associated appcepts.

In one embodiment, the value of any cnxpt is a rough estimation determined from the total of all appcepts during the timeframe. The weighted total, based upon some selected coefficient type applied to the tcepts, is set=(((coef*value relationship for a tcept)/(sum over all tcepts (coef*value relationship)))*(sum of all appcept values in the timeframe)).

The way a value is set for an appcept encompasses user input and is enhanced or reduced by the interest shown for that appcept.

A factor (called block factor) is formed for the leaf's contribution to its total value by determining the effect of the existence of a roadblock or gap affecting the leaf tcept for each lineage where the leaf or it's alias hyperlink is, one block factor value per instance or alias hyperlink.

In one embodiment, a set of timeframes is determined for the tcepts to obtain value. The block factors would be used to set the timeframe. The expected value share factors would be determined based upon the competitor tcepts during the timeframe (zero sum basis for each timeframe where the total value of all timeframes would sum to the value of the appcept) and all following calculations would yield a timeframe based prediction for the value. To calculate the value of a tcept, list all tcepts (or their alias hyperlinks) occurring in a timeframe. For each appcept that any one of these tcepts satisfies, total the value strengths (from the value relationships) of all tcepts that satisfy the requirements of the appcept during that timeframe. Then, distribute to each tcept in the timeframe, the total of all the values of the appcepts it is associated with in proportion to the value strengths for the appcepts and that tcept. This is called the expected value share factor for the tcept for the timeframe.

In one embodiment, multiply the expected value share factor by the probability that the tcept will exist during the timeframe.

To calculate the value of a context based upon the values of the tcepts appearing in it, calculate the share of value attributed to each instance of the tcept (from the tcept and its alias hyperlinks), by dividing the expected value share factor by the number of instances of the tcept to yield the instance value share factor. If timeframes are used, calculate the share per each timeframe as the tcept may be expected to obtain value differently at different times in each lineage due to the effect of the competitor tcepts in different lineages.

Secondary Cnxpt Value Prediction

Use Case: Secondary Cnxpt Value Prediction—Calculate the value of a cnxpt at a level based upon the calculated values of its child cnxpts in the map.

For each cnxpt not yet evaluated, add the total value of the cnxpts which are its children to obtain the value for the cnxpt being evaluated. The value total for cnxpt may include values for other cnxpts at the level in a duplicative fashion because of the use of alias hyperlinks, so one embodiment does not allow those values to be included.

Tcept Gestation Prediction

Gestation times always require a beginning time to be presumed. Gestation periods always require a beginning event to be presumed. Gestation timeframes are based upon a center point and a range, where most often the range is longer when the gestation time is distant in the future. Gestation times begin at the present and ends at the center point of the future tcept's timeframe, such that the tcept is anticipated to become a reality after that period of time expires. Gestation periods begin at the present or at some stated event such as when a predecessor tcept comes to fruition, and end at the center of the timeframe of the tcept. No probability is stated.

(Probabilities can be calculated because the distribution for each predecessor—successor is normally distributed. The error for any given center point estimate is greater as time to fruition grows.)

Primary Tcept Gestation Period Prediction

Use Case: Primary Tcept Gestation Period Prediction—Calculate the timeframe when a tcept will become available as a working technology based upon the technologies around it, and other factors.

Calculate the timeframe when a tcept will become available as a working technology based upon the technologies that precede the tcept and possibly based upon the technologies that are offshoots from the tcept, the applications of technology that are related to the technology, prior timeframe center calculations, and other factors.

The center of the timeframe is calculated based upon a weighted average including but not limited to: the factors found in the relationships between the predecessor and the successor; center dates calculated based upon other fxxts; the weights being of the form of coefficients based upon the strengths of the relationships between predecessor and successor; and other coefficients based upon the types. The predecessors are found by enumerating the parent of the tcept and the parents of all of the alias hyperlinks of the successor. Each predecessor has a relationship with a strength (RS) that connects the successor or one of its alias hyperlinks, and that strength is used as the first coefficient. These relationships are the hierarchical associations used to form the forest during fxxt tree extraction, or another system parameter setting. The second coefficient (Ttyp) is a parameter for: including but not limited to: the nature of the hierarchical relationship used to form the parent—child structure; the nature of other directed relationships between the predecessor and successor (or the alias); the type of the predecessor (parent); the type of the successor (child); the type of entity the timeframe of the parent was calculated upon (for instance, patent, product, research paper, estimate each have different defaults); and the 'Delay' constructs (relationships with descriptions and other attributes) such as a 'roadblock problem' that can be placed between predecessor and successor tcepts (actually, parallel to their connections) to provide additional bases for calculating gestation for a successor tcept.

Where the predecessor has a date set for fruition that has actually been reached, the strength of that date in the calculation is increased by a factor set by a system parameter.

Where a prior calculation for the center date has occurred, or an estimate has been made for it, the result may be used as an additional factor. Where a prior calculation for the center date of a sibling has occurred, that result may be used as an additional factor. Each of these factors are combined with a coefficient set by a system parameter.

Several different formulas are useful for calculating the total time delay, including a weighted average, where the weights are system parameters. The total time delay can be a sum, but the weighted average is best mode in our estimate.

To calculate a timeframe for a tcept based upon the technologies that precede the tcept, a value is calculated from the above to set the timeframe center point of the successor to be at a delay from the timeframe center point of the preceding tcept. The formula for the time between centers is time delay(i)=sum over i of ((RS(i)*Ttyp(i)*(timebase)))/(sum over all i of RS(i)*Ttyp(i)) where (i) is the predecessor—successor pair. In addition, a weighted average of that time delay is formed with the time of fruition set, if any, for the successor, to obtain a good estimate of the center of the successor's timeframe for fruition.

In one embodiment, the same process is performed from all of the successors above to their successors, but only where there is already a vetted estimate for the date of fruition for the successor's successor. These collected results are combined with the above by a weighted average to adjust the center point of the timeframe.

Use Case: Secondary Tcept Gestation Prediction—Calculate the timeframe when a tcept will become available as a working technology based upon the structure of the map and all the technologies that precede the tcept.

The Primary calculations for gestation periods above are used to calculate gestations a layer at a time for setting timeframe centers for each successive layer of the forest from the roots. Rather than calculate all successors at a level, if the successor already exists in reality, it is not calculated, but it is used for the next layer calculation.

TPL Based Prediction

Use Case: TPL Prediction—Calculate the anticipated need for innovation in a cnxpt category or incrementally on a cnxpt based upon the theories, principles, and physical laws affecting the design.

Invention prediction based on discoveries of new TPLs.

Prediction of innovation can occur when TPLs are associated with technologies by: listing the TPLs affecting the theory of operation of each technology; b) listing the TPLs of each classification of technology at the deep portions of the technology tree (near leaves); c) determining if the theories of operation of technologies of a classification have been designed to consider all TPLs of the classification where the technologies are listed, d) assigning a higher value prediction K to those technologies where few of the TPLs are considered and a lower value prediction K to those technologies where all or nearly all TPLs have been considered into the theory of operation, the higher the K meaning that the greater the number of new inventions will be generated in that classification area, and thus the average K for a classification area would provide a predictor for the probability of invention in that classification, with a higher average K implying a higher number of new inventions in the classification over some unknown timeframe.

To determine the timeframe, the time since the last change in the underlying TPL of the TPLs in the classification has to be used as a factor, because when a TPL has existed for many years with the same understanding of it by technologists, its use is routine and new innovation will conform but not be rapidly developed because the state of the art will have crested. Where there are changes to the TPL underlying an area of technology, the technologies will be improved to conform to the change in the TPLs.

In the system at hand, TPLs can be considered traits on technologies, traits on applications of technologies, traits on classifications of either, or classifications of either.

For fxxts where the TPLs are listed as traits on the classifications, the above predictor is useful for technologies indexed by the classification if the technology traits list TPLs.

For fxxts where the TPLs are classifications, the above predictor is useful for technologies indexed by the classification if the technology traits list TPLs, but the predictor has to operate differently, on only the TPL that is the classification.

Prediction Correction Mechanism

Incremental correction is necessary for quality improvement on the predictions. It is one thing to say that something is wrong ('the numbers are just bad'), and another to correct the structure (change the fxxt specification), and yet another to be able to locate the offending step in a prediction or the offending data. Correction by 'drill-back' is possible with this system, where a structured walk-back of the derivation trees for predictions is provided to a user who believes that something is wrong. If taken in the large, this would be absolutely overwhelming, but because of the stepwise vote-based refinement process and the incrementality of the hierarchies, the task is manageable. With workflow, an indication of an error will be sharable with others for communal action to solve each debugging problem. Even so, the drill-back mechanism offers the solution itself, since it provides the 'debugging' information, and presentation of it to a user through a proper structure is important. The drill-back system provides a user with fault-isolation questions, starting by asking a user to indicate a number that is likely wrong. When chosen, the system then displays the next prior level of the derivation and asks the user which number seems wrong, in a cycle. When the user gets to a base cause for the number being incorrect, such an errant association of an antecedent with a purlieu, the user can vote to correct the base cause. (Such a vote is considered very strongly because of the analysis context.) The drill-back system provides an automatic recalculation of the prediction upon any change made, even if the change is temporary. Temporary changes can be made at any level in the derivation tree to assist in determining if there are side-effects at work or if the change will actually affect the result to assist the user in aiming at the real cause of the error. When a temporary change is made, even if it is an estimate, it also becomes an indicator that the debugging problem has become focused into two problems, one being likely solved if the other is solved. This breaking apart of the problem is a workflow starting event for the new 'sub-problem' and the user can start on the smaller problem because the workflow retains the status of the larger problem as well as the state of debugging itself.

Multiple fxxts may provide a value for the same prediction. The drill-back system provides for tracking results of each fxxt based prediction for the user debugging the information. The user's assessment that one fxxt prediction was better for a specific prediction is tracked to establish a quality level for the prediction and a status for workarounds. It also provides a mechanism to coordinate the 'meta-prediction' structure where each of two or more fxxt based predictions are combined to form a prediction that is then attached back as a 'property' on the cnxpt where it belongs. When the prediction of one fxxt yields a value substantially different from this meta-prediction, a drill-back workflow is started to raise the apparent discrepancy.

Third Level for Process: Display and Delivery

System Functions—Map Enhancement, Delivery, and Display

Each form of Map above may be enhanced for more effective display.

Apply Avatars and DXOs to Visualization

Use Case: Apply Avatars and DXOs to Visualization—Alter the basic objects to be displayed on the Map by using specialized or alternative display objects for the objects on the map.

Apply DXO Graphical Representations, Personalities, Decorations, Mannerisms to Visualization Use Case: Apply DXO Graphical Representations, Personalities, Decorations, Mannerisms to Visualization—Alter the objects to be displayed on the Map by changing their graphical representations, personalities, decorations, and mannerisms according to customization rules set for the map.

Set Alias-hyperlinks for Visualization

Use Case: Set Alias-hyperlinks for Visualization—Apply specialized display object settings for Alias-hyperlink objects to differentiate them from the underlying object they refer to.

Apply Excitement Devices and Advertising to Visualization

Use Case: Apply Excitement Devices and Advertising to Visualization—Add specialized graphical elements to the map for increasing viewability and content.

Generate Node Elimination for Information Hiding

Use Case: Generate Node Elimination for Information Hiding—Reduce the amount of information on the map or mark the information for invisibility to reduce clutter when displayed.

Generate Visualization Scene-graphs

Use Case: Generate Visualization Scene-graphs—Create display constructs for the visualization.

Generate Visualization by Type

Use Case: Generate Visualization by Type—For each map type, generate a special form of display.

Fxxt Filtering

Various tools in the system will collectively provide filtering. The filters here affect the data after the fxxt is formed by fxxt analysis, but before display processing. Filters may be combined for a compounded effect.

Execute Tree Collapse Filtering

Use Case: Execute Tree Collapse Filtering—Eliminate levels of the tree to reduce the depth of the forest and to decrease complexity.

Execute Low Weight Cnxpt Filtering

Use Case: Execute Low Weight Cnxpt Filtering—Eliminate the less important child cnxpts of each predecessor (parent) cnxpt category to decrees complexity for information hiding.

Execute Timeframe Collapse Filtering

Use Case: Execute Timeframe Collapse Filtering—Eliminate the differentials between gestation timeframes to reduce the depth of the forest and to decrees complexity by removing granularity.

Extract Filtering

Various tools in the system will collectively provide filtering. These filters only affect the data stored in extract sets from the CMM or actually displayed by the user interface, since filtering occurs only after fxxt analysis.

Execute Filtering by Accessibility and Sensitivity

Use Case: Execute Filtering by Accessibility and Sensitivity—Data not accessible due to lack of access permission will be filtered, but may be replaced on the display with markers.

Sensitivity of information filters apply changes or present markers based upon security, privacy, legal issues, or information locking of dxos or their metadata.

Execute Filtering by Analytic

Use Case: Execute Filtering by Analytic—Execute an analytic on a fxxt of the CMM and produce a new set of maps for the fxxt.

Execute Extraction Filtering

Use Case: Execute Extraction Filtering—Extract data from the CMMDB during the clump extraction phase at the server.

Execute Priority and Marking Filters

Use Case: Execute Priority and Marking Filters—Mark displayed objects for importance or priority or other purpose utilizing shape enhancement, colors, fonts, shading, modified dimensions, etc.

Execute Reorder Filter

Use Case: Execute Reorder Filter—Force the sort order of the visualized data.

Map Delivery

Ontology Context Extraction

Use Case: Ontology Context Extraction—Form a clump containing the set of nodes and relationships from the ontology that surround the position (node or world coordinate) sought according to the filter(s) in use.

Perform Segmented Data Delivery

Use Case: Perform Segmented Data Delivery.

Clump Serving

Third Level for Process: Clustering by Position in Multiple Fxxts

Use Case: Generate Cnxpt Categorizations and Relationships by multi-fxxt Position Clustering.

Position clustering yields new understandings of cnxpt categorization and similarity after a fxxt specific TTX map is created. Combining two fxxt specific TTX maps will also serve as a positional clustering tool.

To show the position similarity, use the 'Different Fxxt BIAS' tensor positions to display an overlay map for the cnxpts for a visualization. Also, use the 'Different Fxxt BIAS' tensors and their weights as statistics for clustering.

A clustering algorithm (Self-Organizing Maps, etc.) will be executed on a set of cnxpts based upon the 'Different Fxxt BIAS' tensor values. The result of the algorithm is a set of new cnxpts which were not previously existing in the CMM. The algorithms will be structured to not regenerate a cnxpt already existing, but to add to those cnxpts any information found by the clustering, or to build new categorizations if appropriate.

If needed, create a cnxpt for the ttx which is defined by the cluster, adding a source relationship to the clustering source info-item and marking its fxxt with the clustering fxxt info-item. If the clustering algorithm or user defines other information regarding the cluster ttxs, such as names (or name algorithms), descriptions (or description algorithms), etc., add the information as characteristics to the cnxpt. If other names or descriptions are not available, utilize irxt descriptions and the rationale from the clustering algorithm to create a name and description for the cnxpt. [See Procedure—CREATE Cnxpt]

If the clustering algorithm generates sub-clusterings, then create hierarchical categorization relationships between the parent and child clusters as needed, adding a source relationship to the clustering source info-item and marking its fxxt with the clustering fxxt info-item. [See Procedure—CREATE custom hierarchical association] In one embodiment, create a new "custom affinitive association" between each set of cnxpts appearing in the cluster as siblings, marking the relationship with a high weight, with the new clustering fxxt, and within all, one, or more stated scopxs. [See Procedure—CREATE custom affinitive association]

Other Algorithms

Marketing Facilities

Use Case: Viral Distribution of the Application—Virally distribute elements of the application to speed rollout.

Architecture

SUMMARY

This system is software, similar to a website search tool. It can be described in two parts:

1. User Interface:
   The common public interface is the version that the end user can see. It consists of a browser based map display tool:
      Map Display tools
      Search tools
      Simple Result set display mechanism.
   The paying public interface is the version that more sophisticated end users can see. It consists of several tools such as:
      Map Display tools
      Edit and Search tools
      Result set mechanism
   The industry professional interface version is for industrial users. It contains several tools like the ones in common public interface version plus some extra features such as classified information protection. It consists of several tools such as:
      Map Display tools
      Edit and Search tools
      Result set mechanism
      Filters
2. Hardware Configurations:
   Servers (web server, mid-tier)
   Workstations Architecture—Workbench for data editing The workbench provides an editing and navigating tool for building the database of ttxs and viewing the data through the navigator interface.

Architecture—Desktop Tool and Visualization

Each of several windows of a desktop tool will be used to visualize and edit the system data. Alternative 'views' of the same type of data will be available in the windows of the tool. Editing functions will allow connection/manipulation of nodes in two or more windows as well as within one window. Thus the data in more than one window of the desktop tool may collectively be the object of a user edit.

Visualization will occur throughout the entire process of querying and processing data. It will be the method by which the user interacts with the data and ascertains the results of their work. It is through this interactive and kinetic display of the data that the user will be able to better understand the data they have imported into the system and what steps need to be taken to further clarify it. Visualizations will include collocating, clustering, and mapping.

The associative search visualization will display a forest (in the sense of graph theory) of trees of nodes (also graph theoretic) on the screen in the form of spheres that enclose other spheres where the enclosed spheres represent child nodes of an enclosing sphere. The user will be able to fly around and into the spheres. During this navigation, when the user's eye, or 'camera', is distant from a sphere, the sphere skin is solid, and when the camera is near /approaching a sphere, the sphere's name appears. Then, as the camera closes in on the sphere, the skin becomes translucent, then transparent, exposing the internal spheres that then can be approached to a deeper level. In other words, the camera/viewpoint is used to navigate a star-like space of planets/spheres and to penetrate very deep into each 'planet' as well. Each planet is at a level in a taxonomy. The strength of relationships between spheres determines their locations in the visualization even if they are not children/sub-nodes of the enclosing sphere. The rationale is that the spheres/planets structure is a familiar metaphor for users, navigation is fast, and information hiding is understandable. The co-location of spheres is calculated and is thus meaningful.

The database has to be reduced (done outside) to a taxonomy in order to obtain the sphere visualization basis. The placement of the spheres is all calculated separately (database) and world coordinates will be provided for each node to be displayed along with their position in the display taxonomy. The number of spheres gets large, but not all have to be on the scene. The spheres have to be selectable, and each has to be essentially an object with attributes and methods, and these have to be provided in property sheet like sub-windows.

Property windows and other displays of node—related data will also be available to the users. These could include information about the node or an association involving the node. The information could include wiki description, blog communication/discussion, ownership and rights information, associated multimedia, lists of links, or spreadsheet or database table information about a node or the relationship. This information could be in multiple languages and could be rights access controlled.

Architecture—Export

Extracts of the CMMDB can be exported to form a local copy. The local copy of the data can later be resubmitted to the main database to update the main database such that the node connections would remain. In other words, the exports could be edited by the user and then re-imported such that the updated information or new information could be attached properly to a node/relationship that it involved prior to the export. The exported data contains obfuscated keys prepared by the key encryption process. The import process will resolve the obfuscated keys to allow reconnection of data or addition of data to the central CMMDB.

Architecture—Query and Result Set Manager

The Result Set Management component will provide a framework for various operations to be performed on query result data as called for by processes and use cases specified above.

Architecture—Calculations and Analytics

Analytics will be provided to assist the user in further researching the data, such as to collect new empirical data, find new relationships, etc. These analytics will also help organize the data and define relationships in the data that did not previously exist. Several will be provided in the application for tasks such as improving collocating, mapping, clustering, and text mining.

Each time an analytic is used, its usage and result will be stored using the Query and Result Set Manager.

Architecture—Storage

During use, an option set number of steps that the user takes will be recorded. This ensures that the user's work can be saved without altering the original source data. The user will then be able to close their work and re-open it at a later time, or export their project file to another user so that teams of users can utilize the same data.

In addition, the storage components of the application will have the proper backup and disaster recovery features that any enterprise level application should have.

Architecture Detail

Model Layer

In the application there are two main layers: the model layer and the user interface layer. The underlying model is a collection of resources (CMMDB, query scripts, result sets, selection sets, projects, filters, folders and files). The user interface defines the presentation for those resources.

Data Storage

A database is required, in one embodiment, to save much of the work that the collective set of users have accomplished. This database holds the CMMDB.

Several other data sets must be saved. For all imported data, the source of the data set and its relationships with other data must be stored. The database has to retain the metadata and possibly the data itself for all library entries, and all customer data.

In one embodiment, for a stand-alone systems licensed to work in corporate environments where a server can be devoted, a similar database to the main database will be embedded in the use license. It will communicate with the central (external to customer system) database server as necessary and appropriate. In one embodiment, the CMMDB will be stored centrally and distributed to the corporate level databases according to the subscription. In one embodiment, this tightly controlled replication with the central database server will also provide the ability to publish data to the central database so that other users can view a portion of the corporate results.

The database must accommodate the data of multiple application users, allow for the administration of these users, and allow for security permissions to be established for shared data sources. In addition, in one embodiment, the users of client applications will periodically replicate the data from their embedded cache (small database) to the central database server so that other users can view their collaboration results.

In one embodiment, each application type client will have a "project file" that will be created by the application that will serve as the embedded cache (small database). The user will then be able to close their work and re-open it at a later time without loss of local data.

Data Abstraction Layer and Import

Data Abstraction and Import Architecture

Through the data importer, the user will be able to combine the data of any of several data sources into their system, where it will be combined and treated as one data source. In most instances, the application will parse and import the data into the internal user database. The original data source location will be recorded so that it can be re-imported in the event of future modifications.

In certain instances, however, the user can elect for the application to simply link to the data source so that the application can query it directly, through the use of locators. This will prevent the need for a lengthy data import. Any modifications to this linked data would be referenced in the user database so as not write to the external database.

All of this will be transparent to the user through the use of a Data Abstraction Layer. This device will be able to keep track of internal and external data and present it to the user as one single data source. Users will still be able to re-import data that has changed or change the data in a linked data source, but the Data Abstraction Layer will show the data as if it comes from the same database.

The application will contain several plug-ins that will allow it to communicate with the various data sources. Additional plug-ins can be developed in the future by Patent Professionals or by a third party. The plug-ins will know how to open a particular type of data source and how to query it, and can thus manage the application's relationship with that given data source.

Data Abstraction Facility

The utility of this process is that it allows data from multiple external sources and in multiple formats to be used by the application on an AS NEEDED/WHEN NEEDED basis without being imported into the system. Also, act as a retrieval mechanism for Import Facility. Another utility of this is that it provides a conduit to receive data from an external source so that only caching will be needed and so that the data will not be retained permanently in the system database.

The tools will allow for the capture of data and metadata from patent professional and non-patent professional sources during use of the data while allowing the control of the data to be managed externally.

Flexible Data Retrieval and Import Facility

Develop a system that is flexible enough to allow for the easy retrieval of data in the range of formats in which data is exported by patent professionals' online services, available from corporate sources, or delivered through standard commercial databases.

Incorporate Retrieval Into User Search Result Checking

The utility of this process is that it allows for the capture of data and metadata from patent and non-patent sources during searching and result culling.

The system meta-search engine allows one to ask for content meeting specific criteria (typically those containing a given word or phrase) and retrieves a list of references that match those criteria. At the same time, as relevant information resources are found, they are retrieved and indexed as meta-data or fully imported.

Provide Data Abstraction Plug-In Wizard

The system will simplify the setup of Data Abstraction data retrieval by providing a plug-in wizard.

Access Data from Commercial Databases

Ability to retrieve data in the range of formats in which data is delivered through standard commercial databases.

Access rights and attribution must be retained.

Check Retrieved Data Consistency

The ability to compare retrieved data to ensure the consistency of loaded data for the assurance that no records were missed and no records were retrieved such that they became duplicates of previously existing records.

Data Abstraction Facilities for Non-Document Information

The ability for users to select, retrieve, parse, and import data from a virtually unlimited range of sources, including patent professionals' databases, and spread sheets.

The Data Abstraction component will allow for data to be imported into the system in multiple formats, with the following functionality:

The ability to retrieve and parse ASCII (including online print displays), XML, and CSV;

The ability to select which fields in the data source will be retrieved into the application;

The ability to join and map retrieved data to a customized format, and store commonly used mappings based on data type/source;

Data Abstraction Module Plug-In Architecture

Each input oriented data abstraction plug-in will act as a conduit to receive data from an external source on an AS NEEDED/WHEN NEEDED basis, and the data brought in may be cached but will not be retained permanently in the system database.

Provide modularity so that patent professionals, their affiliates and developers, and end users can add new data input and import mechanisms.

Data Abstraction Plug-in Module

This provides a level of modularity so that patent professionals, their affiliates and developers, and end users can add new import mechanisms.

Each Data Abstraction plug-in will connect with and read specific forms of information. Each will return results that will be cached, stored, and/or will be placed into a result set via the API.

Each input oriented data abstraction plug-in will act as a conduit to receive data from an external source on an AS NEEDED/WHEN NEEDED basis, and the data brought in may be cached but will not be retained permanently in the system database.

Import modules are Import oriented Data Abstraction Plug-ins that save data into the database. Each import oriented data abstraction plug-in will import specific forms of information, relying upon the input oriented data abstraction plug-ins for retrieval, to a specific destination in the database.

Each Import oriented Data Abstraction Plug-in may also return rsxitems via the Result Set Manager API. Ad Hoc Resultant Data Tables or Txo Result Sets will be created by Import oriented Data Abstraction Plug-ins, depending upon the type of data being imported.

Data Abstraction Setup Wizard Plug-in

The system will simplify the establishment of compliant data abstraction connections by providing plug-in wizards.

Direct Database Connection

The ability to directly use external, linked database information in the system through queries such that the data need not go through an export/import process. This will include a means for reconciling loss of linkages within the metadata.

User Interface

The following are user interface displays for common perspectives. The utility of these displays is that a user may accomplish a number of different tasks more effectively by having a CMMV list, tree, or map of the CMM information available for display and effective navigation. The perspectives are customizable allowing a user to piece together and to share the perspectives as needed. The utility of this is that it provides an intuitive menu structure for accessing and invoking the application's operation commands. It also provides menus, control palettes, context menus, etc., in a familiar and intuitive structure.

All of the above features and actions may be accomplished or controlled in one or more of the perspectives designed for the client user interface. The utility of the controls is that they provide an interface to the CMMDB data that allows users to rapidly gain insight into the broad context of the information.

Commonality of Interface

The utility of this process is that it allows for incorporation of the unique functionality of each delivery method while enforcing standards across platforms.

Editor Interface Elements

An editor may occupy a page in a pane of a perspective and is typically used to edit or browse an information resource or input object. Modifications made in an editor follow an open-save-close lifecycle model.

If a user selects a link or a file in the information resource result list navigator, s/he can open a browser or an editor on the contents of the file, each of which appear as editor panes. Once an editor is open, s/he can navigate the structure in the editor data using the Outline view, or edit the properties of the file contents using the Properties view.

There are different types of editors, each of which corresponds to a specific type of information resource. When a user selects (or creates) an information resource, the application does its best to open the information resource using the most appropriate editor.

Interface Layer

In the application there are two main layers: the model layer and the user interface layer. The user interface defines the presentation for the collection of resources in the model. The Perspective feature is used to control the visibility of items in the model and the user interface. It controls what a user sees in the model and what s/he sees in the user interface (which actions or views). These controls make it possible to navigate through and modify the model in a way that suits the user task.

The user accesses all of the system through the interface layer which is intended to be a uniform GUI (graphical user interface) whose top-level consists of multiple windows each of which has one or more panes called pages. The contents of each page is structured by one or more view widgets called editors or views. The widgets are selectable for display by the use of overlapping tabs for compact presentation and for convenient co-editing between them. This "tabbed" top-level design permits an integration of (1) the visualization of a map or list of ttxs (tcepts or appcepts); (2) the editing facility for collecting knowledge; (3) the query facility for controlling the complex query, retrieval, and culling process; (4) the entering of specific instances of data into the knowledge base, and (5) the execution of analytics.

Perspective Interface Elements

Each application window contains one or more containers called perspectives.

Depending on the perspective, one pane might contain a console window while another might contain an outline of the currently selected project.

A perspective is a visual container for a set of views, visualizations, and editors (parts). A perspective is also like a page within a book. It exists within a window along with any number of other perspectives and, like a page within a book, only one perspective is visible at any time in that window. Tabs or a display window are used to show the name of the perspectives that have been opened in the window and are still active, and the user will be able to switch quickly between perspective 'pages'.

Users do not directly choose each of the different views in the application or how they are arranged. Instead, several pre-selected sets of views arranged in a predetermined way are provided; the arrangements are called perspectives, and they can be customized to suit each user's needs.

The initial layout or each page is defined by a perspective definition. Each perspective definition determines the initial division of the window page into panes, and determines the visible actions and views within the panes of a window as well as the set of capabilities aimed at accomplishing a specific type of task. Perspectives also go well beyond this by providing mechanisms for task oriented interaction with resources in the application, multi-tasking and information filtering.

Once a perspective is opened in a window, the perspective may be saved with a user provided name even if changes have been made to its actual display structure so that it no longer conforms to the perspective definition used to create it.

Each perspective's parts exist wholly within the perspective and are not shared with any other perspective even if it is in the same window. These parts define the presentation for the shared (between perspectives) underlying object model.

Every perspective is designed to perform a specific type of task, and each of the views in the perspective is chosen to allow for working on different aspects of that task. For example, in a perspective for scripting, one view in one pane might show the script code at the current command, another pane might show the current result set, and yet another might show the ttx being found in a visualization The ability to have multiple open perspectives provide the ability to perform separate actions simultaneously, suspending work on one task temporarily and working on another for that time.

Each perspective has an input and a type. The input attribute is used to define which resources are visible and the type attribute is used to define which actions and views are visible in the user interface. This design stems from:

1. Information Filtering and Hiding
2. Task Oriented Interaction with Model Information
3. Users will work on multiple activities simultaneously.

View Interface Elements

The application window may at any given time contain a number of different panes holding views. In some cases, a single pane may contain a group of views in a tabbed notebook. Depending on the perspective controlling the content of the window, one pane might contain a console window while another might contain an outline of the currently selected project.

Every perspective is designed to perform a specific task, and the views shown in the perspective are chosen to allow the user to deal with different aspects of that task.

The application contains a number of standard components that demonstrate the role of a view. For instance, the Navigator view is used to display and navigate through the list of objects the user has created or is using. If a user selects a query script in the Navigator, s/he can open an editor on the contents of the script. Once an editor is open, a user can navigate the script structure in the editor using the Outline view, or edit the properties of the script or of script steps using the Properties view.

Views contain control panels, property sheets, lists, hierarchical lists (trees), etc.

A view is typically used to navigate a hierarchy of information, open a visualization, select a result set or selection set, open an editor, or display properties for any of many different types of objects. In contrast to an editor, modifications made in a view are saved immediately.

A user doesn't directly choose each of the different views in the window or how they are arranged. Instead, the application provides several pre-selected sets of views, along with editors and visualizations, arranged in a predetermined way as perspectives, and they can be customized to suit a user's needs.

Dragging one view on top of another will cause them to appear as a single tabbed notebook of views.

Display Control Features

Menus and Toolbars

The Application user interface provides menus and toolbars: the main menu, the main toolbar, and the shortcut toolbar. Like the views and editors in a perspective, the application's menus and toolbars can change depending on the tasks and features available in the current perspective.

Users may add other types of shortcuts to the shortcut toolbar: a Fast View button. Fast Views provide a way to turn a view in a perspective into an icon—similar to the way other applications allow users to minimize windows. For example, to turn the Outline view into a Fast View icon, a user would click on the Outline icon in the view's title bar and select Fast View from the menu that appears. The Outline view is closed, and its icon appears in the shortcut toolbar. Clicking on the icon alternately opens and closes the view. To restore the view in its previous place in the perspective, the user would right-click on the Fast View icon and select Fast View.

Views can also have menus. Every view has a menu you can select by clicking on its icon. This menu allows users to perform actions on the view's window, such as maximizing it or closing it. Generally this menu is not used for any other purpose. Views can also have a view-specific menu, which is represented in the view's title bar by a black triangle. Visualizations have a menu that lets a user set graphical parameters and filtering options.

Some views also have a toolbar. For instance, some views have tool buttons that let you toggle various display options on or off.

Contextual Command Menu

When a user also 'INDICATES' an item in the selection set (meaning all of the selected objects), an action list is formed consisting of the least common set of the actions applicable to the objects in the selection set PLUS the set of actions that can be executed on a selection set. This list is called a 'contextual command list' for the selection set. The user selects the action to perform from the command list, and it is performed on the displayed objects.

A user needs to perform ONLY certain actions on a selection set or a single displayed object.

The contextual command list should be available as a menu for the user.

Standard Edit Commands

User action commands analogous to standard edit commands (Move, Edit, Cut, Copy, Paste, link, group) should be available to the user in the proper context.

View switch commands

The user should be able to easily switch their view of the information in the application by toggling between windows, screens, panes, etc.

Window Graphical Control

The ability for the user to graphically control the parameters of visualization (e.g., window size, background color, parameter value focus, fly-through/animation speed, line color or thickness, dynamic query threshold, view-slider (any purpose) scale setting, zooming, zoom step, font size, font color, etc.). The information display windows should be controllable as to formatting by the user, including window contents (type of view, such as map, tree, list), format, sizing, shape, and zoom.

Invoke Task-Oriented Command

Ability to invoke specific user-level task oriented command.

Controls Plug-Ins

Ability to add additional object operators and controls into the system. The operations may be task-level controls.

Standard Navigation Functions

The ability to control operations through the use of appropriate mechanisms, such as right-click, menus, or web page buttons.

Assist, Remember Work States, and DO NOT Impede

This system will provide the tools needed for a user to continue his/her work without impediment. As the user works, they will constantly branch off to new areas of thought, and will need to track where they are as well as remember where they were. They will have to return easily to their prior work state on one branch.

Autosave

An ability to save user changes automatically at regular intervals so their work is not lost.

Actions on Editors

Actions performable on an information resource in an editor depend upon the type of information resource. A common set of actions will be provided including cut, paste, scroll, select, etc.

Actions on Objects in Selection Sets

Ability to invoke actions on the members of a selection set. This does not involve actions on the selection set itself. but rather on the members only.

Actions on Result Sets

Ability to invoke actions a result set. This does not involve actions on the members of a result set, but rather on the set itself only.

Actions on Selection Sets

Ability to invoke actions a selection set. This does not involve actions on the members of a selection set, but rather on the set itself only.

Actions on Visualizations

Actions performable on a Txo Map or list or result set list may be performed on any other fully conforming visualization Examples of these actions are: select entity, select relationship, select relationship constraint (select all like), select entity constraint (select all entities like), show property sheet for, show constraint sheet for, add selection to result set X, delete selection from result set, merge Result Set X, highlight entity/relationship, remove Result Set X, re-visualize (with visualization Y) starting at selection(s), etc.;

Window Interface Elements

The application contains a collection of windows. Each window contains one or more pages, and each page contains a collection of visualizations, editors, and views. The initial layout of visualizations, editors and views within a page is controlled by the active perspective for that window.

Visualization Interface Elements

The application will incorporate visualizations. Visualizations are graphic (includes lists, trees, maps, etc.), interactive representations of ttxs, their relationships, selection sets, and result sets. Interacting with visualizations can produce new selection sets and result sets. Visualizations will be fully interactive with the Result Set Management, Query, and Analytic components in order to invoke further operations in a graphical context.

A visualization may occupy a page in a pane of a perspective and is typically used to edit or browse the CMMDB of ttxs. Suggestions for modifications to the map are displayed immediately on the visualization of the user making them. The suggestions are immediately cached locally and are submitted to the vote database on a save/submit-close/submit lifecycle model as web requests to be taken into consideration. The suggestions are stored locally immediately so that suggestions are retained for the user to track status or to reapply to his/her visualization Each visualization pane will be accompanied by a display/control panel for the visualization showing the presence of a (optionally 'named') selection set or result set being displayed on the visualization.

Reporting Facility

The application provides the ability to produce static or dynamic captures of basic visualizations (maps or lists), result sets (or visualizations in general), etc. with customizable options for report display.

The application also provides several static and dynamic reports that can be used to communicate findings to non-users. These reports can be static printable snapshots of the data such as tables, charts, or graphs; or can also take the form of dynamic animations that can be delivered as Java applets so that non-users can interact with the data in a way that is easy for them to understand.

Export

It will be necessary to output the resulting data in the form of export files. In one embodiment, IDs exposed outside of the CMMDB will be altered by the 'key encryption process' so that the CMMDB may not be copied.

Export Facility

- Generate results to be exported that can be imported and used for further analyses by standard analysis, data mining, or visualization software packages;
- Provide a rich set of document control tools within the application to facilitate Export
- Exports will be performed on the basis of result set or selection set contents. An export would contain the result set or selection set data and some subset of the base data related to the result set or selection set, as well as the script used to create the result set (if that is the basis);
- The ability to maintain control and consistency of data that is moved between standalone systems, to ensure interactivity between users or accounts with different permissions and data;
- The ability to compare exported data sets to ensure the consistency of reloaded data, for the elimination of re-classified records;
- The ability to export to a linked database;
- The ability to repeat all or part of a previous export;

Exported data will be provided in multiple formats to be saved for easy use in office productivity software, re-imported into the system, or be used by external systems.

Check Export Consistency

The ability to compare exported data sets to ensure the consistency of reloaded data, for the assurance that no records would be re-classified.

Export Access Restriction Metadata Included

Exported data will carry access restriction metadata. Restrictions on export will vary by customer type. Restrictions such as, but not limited to:

- age of data (older than x days may be exported);
- scope (no more than n category descriptions may be exported during a prescribed period);
- data type (category names but not category details may be exported); and
- breadth of information (no links to internal data; links to internal data but no internal information resources; etc.)
- prediction information (only x type of prediction information)

may be applied to the exporting mechanism

Retain Access Right Information

Data access rights are retained according to user or corporate accounts.

Control Ownership of Data on Export

The ability to control ownership of data, such that the metadata for each export will include or reference source and ownership information.

Ensure Consistency of Re-imported Data

The ability to ensure consistency of re-imported data. For example, if a data set is reloaded each month, the mechanism will track any user-generated metadata for the original data set and keep it consistent with the remainder of the database even if the exports themselves are reloaded. In one embodiment, IDs exposed outside of the CMMDB will be altered by the 'key encryption process' so that the CMMDB may not be copied, and these IDs will be converted back into agreement with the CMMDB IDs upon reimport.

Export Contents Include Script for Query

Exports will contain the script used to create the result set. An export would contain the result set data and some subset of the base data related to the result set.

Export Formats follow standards

Generates results to be exported in a format that can be imported and used for further analyses by standard analysis, data mining, or visualization software packages.

Export Tab Delimited or Comma Separated Data

The results can be exported into several popular formats so that they can be explored on another platform such as Excel. The form of export will be in the form of a table or a set of relational tables. Both proprietary formats (Excel, Access, etc.) will be used, as well as standard formats (CSV, ASCII Text).

Export of Formulas

The formulas specified on relationships and nodes of the ontology may be exported to be used in spreadsheets. When a set of node and relationship data is exported, either based upon a Fxxt Specification or not, the formulas that are specified on the nodes and relationships may also be exported. This provides a tool for the user to recalculate values on a what-if basis after exportation even if some value is only changed on the spreadsheet.

Some iterator formulas may not be exportable because of limitations of the spreadsheet tool.

Export Provided by Plug-ins

The application will utilize the same basic engines to output the data and visualize, report, or export it for the users. Separate "plug-ins" will be used to display it in the format requested by the user (Mapping, Table, etc.). The management API of these output plug-ins will be such that Patent Professionals or a third party can create new plug-ins for the application.

Visualization and Export Plug-In Architecture

In following the plug-in architecture, the application will utilize the same basic engines to output the data and visualize, report, or export it for the users. Separate "plug-ins" will be used to display it in the format requested by the user (Mapping, Table, etc.). The management API of these output plug-ins will be such that a third party can create new plug-ins for the application.

Import

Import Facility

These tools will allow data from multiple sources and in multiple formats to be imported into the system.

The tools will allow for the capture of data and metadata from patent professional and non-patent professional sources during import, with wide expandability for experienced users and an intuitive core structure for novice users.

Ad Hoc Resultant Data Tables or Txo Result Sets will be created by Import oriented Data Abstraction Plug-ins, depending upon the type of data being imported.

Import Plug-Ins

This provides a level of modularity so that patent professionals, their affiliates and developers, and end users can add new import mechanisms.

The system will simplify the establishment of imports by providing plug-in wizards.

Import Plug-ins save data into the database. Each import plug-in will import specific forms of information from a data abstraction layer module, relying upon the input oriented data abstraction plug-ins, for retrieval, to a specific destination in the database.

Each Import Plug-in may also return rsxitems via the Result Set Manager API. Ad Hoc Resultant Data Tables or Txo result Sets will be created by Import Plug-ins, depending upon the type of data being imported.

Citation Import Plug-in Module

The citation import plug-in module will import citations information from patents found by an Input Oriented Data Abstraction Plug-in. The citations will be entered into the central database and optionally into a Txo Result Set.

Link Resolution Import Plug-in Module

The utility of this is that it provides meta-search search result link resolution, display, analysis, indexing and storage of the information resources.

As meta-search search result sets are culled by a user (or as the result set is committed), the information resources referred to by the links are resolved so that the user can check for relevance of the content. These information resources are analyzed, indexed, and placed into the database as appropriate for each information resource considered relevant by the user.

The resolution, display, analysis, indexing and the storage of the information resources are all controlled by the Link Resolution Import Plug-in Module.

Link Resolution Import Plug-in Modules

As result sets are culled by a user (or as the result set is committed), the information resources referred to by the links are resolved so that the user can check for relevance of the content. These information resources are analyzed, indexed, and placed into the database as appropriate for each information resource considered relevant by the user.

The resolution, display, analysis, indexing and the storage of the information resources are all controlled by the Link Resolution Import Plug-in Module.

In one embodiment, IDs exposed outside of the CMMDB will be altered by the 'key encryption process' so that the CMMDB may not be copied, and the Link Resolution process will properly reattach imported information to the proper internal ID.

File Link Resolution Import Plug-in Modules

Handles Local File import.

Web Page Link Resolution Import Plug-in Modules

Handles Web Page import.

PDF File Link Resolution Import Plug-in Modules

Handles PDF file import.

Import Plug-In Wizard

The plug-in wizard allows a developer to set up a special installer for adding a compliant import mechanism to the application.

Control Ownership of Data on Import

The ability to control ownership of data, such that the metadata for each imported information resource or record will include or reference the source and ownership information for the information resource or record.

Loading and Importing Data in Bulk

The utility of this is that it provides for adding data to the CMMDB in bulk.

Goal Based Query Tool

Data may be queried, in one embodiment, through parametric query operations, and will facilitate storage and reuse of query logic.

The Query Tool provides for interactive definition of query step commands. All query scripting will be performed within a single scripting facility so that the system can be simplified.

Query Architecture

The user will be able to perform appropriate queries on any data in the CMMDB and on a coordinated basis on data outside of the CMMDB. The creation of these queries and their communication with the proper plug-in will be managed through the Query and Result Set Manager. The user will input their query using the Query Tool use interface. This query will be sent to the plug-in(s), and the corresponding result set will be interpreted and returned to the user. In addition, several "wizards" will be available to allow user with limited knowledge to create these queries.

Query Components

Query Plug-Ins

The meta-search engine will consist of plug-in modules which search the most popular search engines as well as lesser-known engines, newsgroups, patent databases, local files, corporate files, and other databases.

Search engines frequently have different ways they expect requests submitted. For example, some search engines allow the usage of the word "AND" while others require "+" and others only require a space to combine words. The plug-ins will synthesize requests appropriately when submitting them.

The meta-search plug-in module submits a query as if it is a user of the external search engine. The external search engine looks up the query string in its index and provides a listing of best-matching web pages according to its criteria, usually with a short summary containing the information resource's title and sometimes parts of the text. Most search engines support the use of the Boolean terms AND, OR and NOT to further specify the search query. An advanced feature is proximity search, which allows the specification of the distance between keywords.

The meta-search plug-in modules each send a proper search request to a specific external search engine and/or database and returns rsxitems from that search engine into a single result set. This allows users to enter their search criteria only one time and access several search engines simultaneously, while also simplifying the system.

The meta-search engine result set is what is often called as a virtual database, cached on the client. As the result set is culled, the irrelevant entries are simply sorted to the bottom, and when the result set is accepted by the user, all entries lower in relevance than the one the user stopped on will be deleted before the result set entries are committed to the CMMDB database.

The meta-search engine will maximize ease of use and offer a high probability of finding the desired page(s) and still allow the user to cull the result set in a manner that is familiar to them. One version of the culling tool will show the result set so that it appears to a user like the traditional search result page. As the user clicks on an entry, the users click will be recorded as a vote for the information resource's relevance. The user will be assisted in weeding out irrelevant 'matches'.

The engine will rank the results in the result set according to relevance, then according to which search engine or database it was found in. Duplicates hits will be removed from the result set, and the most relevant ones will be sorted to appear at the top of the result set.

Meta-Search Engine

The meta-search engine allows users to find relevant information from internet, database providers, and corporate sources. The meta-search engine coordinates a series of plug-in modules which search the most popular search engines as well as lesser-known engines, newsgroups, patent databases, local files, corporate files, and other databases.

The meta-search engine provides for automatic as well as interactive operation.

The meta-search plug-in modules each send a proper search request to a specific external search engine and/or database and returns the rsxitems from that search engine into a single result set. This allows users to enter their search criteria only one time and access several search engines simultaneously, while also simplifying the system.

In one embodiment, the meta-search engine will allow for the user machine to send the internal search queries of the meta-search to the search engine and to retrieve the rsxitems from the search engine, capturing links only upon a user indication that the link is relevant to his meta-search query.

The list of Meta-search Plug-Ins includes but is not limited to: Meta-search Search Engine Plug-In for each of Google, Bing, Yahoo, each foreign language search engine, etc.; List-serve Meta-search Plug-in for each list-serve type; Local File Meta-search Plug-in for each file system type; Corporate Document Meta-search Plug-in for each file server type; and DeepWeb Search Engine Plug-In for each specialized DeepWeb knowledge base.

Meta-Search Plug-in Architecture

The meta-search engine will consist of a series of similar modules each of which searches a particular database, search web site, or file system. Each will return rsxitems via the API.

Meta-Search Engine Plug-in API

An API will be provided for connecting Meta-search modules into the system and providing parameters to the modules for proper control of the external web search engines.

Scripting for Queries and Analytics

A user utilizes a specialized view dialog within the application to enter and refine queries that are specified by step in a query script. The utility of scripts is their ability to perform repetitive analyses by being applied over and over again. This tool provides the following function.

Script Undo

Script operations may be undone or rolled back.

Analysis Scripts

Ability to perform repetitive analyses by invoking analysis scripts that can be applied over and over again.

Interactive Script Execution

Parameters will be redisplayed in control forms for each step when a script is rerun, and can be altered individually by step. Scripts can also be run in 'silent mode,' where all parameters are retained;

Script operations may be Undone, causing Rollback

Script steps, whether result set operations, queries, analytics, etc. may be undone. The result of the undo will be a rollback or a reversion of the result set data to its state prior to the script step execution.

Scripts will be controllable and should allow for testing

Each step of a script is may be rerun under manual control, and its operation may be adjusted before invocation.

Upon acceptance by the user, scripts can also be run in 'silent mode,' where all parameters are retained.

Parameters Stored within Scripts

For parameterized analytics, result set operations, and query commands, the parameters used will be stored in the history for each step of the script;

Script Command Plug-in Architecture

Each type of script command will be implemented by a specific plug-in.

Script Command Plug-ins

The utility of Script Command Plug-ins is that they allows script commands and command updates to be implemented and installed easily.

Templates for Scripts

Basic scripts and example scripts will provide the ability to start from an understandable basis to implement analyses and queries.

Scripts usable for Queries

Scripts can be used for queries. Most scripts are presumed to be query scripts, but may end up as non-Query Scripts.

Result Set Culling Tool

Result Set Management

A process management system with list management and document control tools that is powerful and intuitive, and that emphasizes the reusability of operations providing customizable management of specified, constrained lists of rsxitems retrieved through a manual query process and through analytics.

The Result Set Management component will provide a framework for various operations to be performed on data using an object-oriented approach.

In one embodiment, certain result set entity IDs to be exposed outside of the CMMDB will be altered by the 'key encryption process' so that the CMMDB may not be copied.

Objectives

The component will be developed with the following objectives in mind:

- Design an architecture that allows for the customizable management of specified, constrained lists of data results retrieved through a manual query process;
- Design an architecture that allows for the customizable management of specified, constrained lists of data results retrieved through analytics;
- Design a process management system with list management and document control tools that is powerful and intuitive, and that emphasizes the reusability of operations;
- Design a system to transparently manage static and dynamic data;
- Design and build a framework to support a high degree of user interactivity between components;
- Design a component structure that is both scalable and modular;
- Design a system that users can easily extend to manage data in their own data stores and databases;

Result Set Multi-Windowing

The utility of this is that it provides the ability to display one result set in two or more juxtaposed and different visual representations, and to focus to any one data point on all visual representations simultaneously. The ability to seamlessly toggle between visualization types on the same result set.

Result Set Relevance Management

Result Set Relevance Management is the ability of the search engine to remember the relevance of items in a result set from a query so that if the same or a similar query is executed subsequently the rsxitems will be listed in relevance order—best first. To capture relevance, the system watches what a user clicks on as they cull a result set, raising the relevance of items clicked, As the user culls, the system also downgrades as less relevant any item deleted from the result set.

Result Set Visualization

The ability to invoke various visualizations on selected or marked items in a result set. Visualizations of result sets will be fully interactive, allowing for the application's operations to be conducted through a graphical interface.

Result sets may be viewed via any appropriate visualization tool.

Result Set Culling Perspective

The utility of the result set culling perspective display is that a user may easily consider rsxitems and assess their relevance, adding that relevance into the CMMDB at the same time they click on a link, click on a relevance button, or dismiss a window. They may also categorize a linked information resource as relevant to a category as shown on the hierarchical list (Tree) view, thereby submitting 'votes', by drag and drop.

Single Pane Visualization Perspective

The utility of the Descendant Tree view display is that a user may enter, edit, and refine a query and see the results on the map in an understandable visualization Tri-Pane Visualization Perspective The utility of the three pane perspective display is that a user may easily show multiple locations in the client and move dxos around between view panes to add or adjust categorizations, thereby submitting 'votes' by drag and drop.

This perspective also shows utility in the flexibility of the application to display a number of different, customized perspectives with a number of different views being displayed within them.

Analytics and Workflow Architecture

Analytics Management

Retrieval and Information Harvesting Analytics

Analytics will be employed to retrieve new information and change the application's base data Analytics Analytics will result in entities or data about entities being added to the application's database or altered within it. In general, the application will be built to accept Analytics that:

1. Get new data about entities (assignee, company, information resource, citing patent, etc.);
2. Get new data about existence and strength of relationships between entities (frequency ranking, sorting, etc.);
3. Form new relationships between existing entities (correlation between assignee/area, co-citations, etc., or to Collocate to group together the various manifestations of a work or all the works by a given author, or to find all the works under a given ttx);
4. Derive new entities from existing entities (based on a cnxpt associated with existing entity);

Architecture for Analytics

The architecture will encourage the use of analytic procedures that add and/or alter data in the application using both standard and novel algorithms for the analysis of structured and unstructured data.

The architecture will facilitate the integration and use of sophisticated, off-the-shelf analytics within the application.

The architecture will improve the logistical facilities for writers of analytics to allow for easier construction and deployment. The application will have an open architecture in this respect that will allow for the future addition of analytics. In addition, an API for analytic management will be provided so that high-end uses will be able to create and integrate their own analytics into the system.

Analytics will also be provided to assist the user in further researching data. These analytics will help organize the data and define relationships in the data that did not previously exist.

Each time an analytic is used, its usage and result will be stored using the Query and Result Set Manager. This will allow the user the ability to undo or redo the analytic on the data, and save the results to their project file.

Analytics for Analysis

Analytics will be available to enable the prediction of trends and behavior and the identification of previously unknown patterns in intellectual property data.

Analytics will be designed according to an architecture that encourages the use of analytic procedures that add and/or alter data in the application using both standard and novel algorithms for the analysis of structured and unstructured data.

Automatic Analysis Facility

The application will include a framework to allow users to automatically identify previously unknown patterns and relationships among intellectual property data, and to predict trends and behavior of entities in the data. A limited number of standard analyses will be provided with the application.

Analytics Usable in Queries

Analytics may act (be invoked/executed) directly upon one or more result sets (or the entire database), or as part of a query, which may include references to external information resources. The operations will result in new data being added to the database, new result sets being formed, or both;

Analytics Output

For analysis analytics that generate result sets, its usage results will be stored using the Query and Result Set Manager. This will allow the user the ability to undo or redo the analytic on the data, and save the results to as a part of a query script result.

Analytics may generate Result Sets

Lists of data generated by Analytics are called result sets. The list generated can be used indirectly in query scripts if the result set created by the Analytic can be used as a query result or if the list is used as input for a query step as a parameter.

Analytics will be controllable by scripts or user forms.

Analytics will be controllable through templated forms filled in by users and/or by command scripts that can be executed automatically.

Analytics can be Undone

The effect of a analytic must be undoable upon request by an appropriate user.

Invocation Reusability

Information entered by users into analytics control forms can be saved as script steps, which makes the invocation reusable;

Permission Levels of Analytics Invocation

The ability for 3rd party analytic providers to control permission levels for how their tools are used. Permissions will allow management of the ownership of data generated through analytics, and may include limits on access, sharing, export, etc.;

Analytics Parameterization

Analytics may be controlled by parameters. Parameters may be specified by script statements or by result set metadata.

Result Sets as Parameters for Analytics

Analytics may be invoked directly on one or more result sets, which thus serve as parameters for the Analytic.

Analytics invoked directly on a result set may be used in a controlled query where the analytic accesses the necessary data;

Analytics from 3rd Parties

Analytics may be provided by any supplier that conforms to the API specification.

Analytics Application Programming Interface

The utility of this is that it provides an API that allows for the simple integration of third party analytic (e.g., enterprise text mining, clustering, co-locating (to collocate the various manifestations of a work or all the works by a given author, or to find all the works under a given ttx), chemical structure mapping) solutions which will augment data in the application and enhance users' comprehension data subsets;

API for Client Side Analytic Management

The API for analytic management allows high-end users to create and integrate their own analytics into the system on the client side.

The general Application Programming Interface (API) will allow for custom analytics to be developed for flexibility in processing the result sets. The Analytics API will allow full programmatic access to the Analytics component, and to appropriate elements of the other components. The API will allow for an extendable range of functionality where new Analytics can be easily written, obtained, plugged-in, and used.

API for Server Side Analytic Management

An API for server side analytic management will be provided so that high-end users will be able to create and integrate their own analytics into the system.

Analytics Control Wizard Plug-in

The system will simplify the creation of compliant analytics by providing plug-in wizards Intensity of Interest Metric Analytic Intensity of interest on a patent, where a variety of metrics (number of documents published, number of citations, number of hits on the Web) are used to determine the level of interest in a patent, tcept, or ttx, and its value;

Non-Patent Citation Analysis Analytic

Citation analysis (title-only) for non-patent information resources, where an analytic is used to determine and retrieve non-patent information resources associated with a patent based on a ttx or actual citation.

Ownership Right Enforcement

The system will include secure mechanisms that will self-check ownership rights before allowing actions on analyzed data. This will enforce the ownership rights protected by 3rd party analytic providers;

Parameter Requests and Control Panel Display

Analytics that require data not included in the result set may only be invoked automatically if searching parameters are supplied in a command script. Whenever parameters are not provided, a user control panel will request information from the user.

Patent Citation Analysis Analytic

Citation analysis for patents, where cited or citing patents are retrieved by the application.

Patent Co-citation Analysis Analytic

Co-citation analysis, where an Analytic is used to determine how strongly patents are related.

Computer Assisted Operations

The utility of this is that it provides facilities that reduce or automate the work required by a user in collaboration or retrieval tasks.

Automatic Operations

The utility of this is that it provides facilities to automate elements of the operations where possible. Ensure that the automatic operations do not reduce the quality of data in the CMMDB.

Workflow Management

System Management Features

System Management includes Problem Management and Data Management.

Data Correction Features

Problem Management Problem List Management

A Problem list must be available for tracking issues found in the data in the system. The Problem list must be able to track To Do tasks related to the problem. A management structure for the Problem list must be provided.

Users May Record Problems

When problems are found in the data of the system, users may report the issue rather than suggesting a change to fix the issue. These problems are entered onto the Problem List.

Problem Management

The utility of this is that it provides various means of finding and solving problems in the data of the system. It also provides management tools for the problem solving process.

Workflow Management

The Workflow manager will use the To Do list to record the individual, role, or system function assigned to the task and the state of progress in resolving the To Do task. The workflow manager works in conjunction with the To Do list manager through the To Do List Manager API.

To Do List Management

The To Do list must be able to record the individual, role, or system function assigned to the task and the state of progress in resolving the To Do task. A management structure for the To Do list must be provided.

Data Management

In addition, the storage components of the application will have the proper backup and disaster recovery features that any enterprise level application should have.

Data Management Features

Synchronizing of CMMDB

A user's local view of the CMMDB data will be synchronized properly and in a timely fashion with the central system and/or their corporate system.

Access Rights Management

The ability to constrain query results to items that the user has access rights for, for example if result sets contain locators to information that a user has no access rights to.

Assigned permissions

Assigned permissions will control the use of data.

Data Location Transparency

In some modes, the database will be local, and in some it will be a combination of local and remote. The mechanism supports an internal database, an external database, a controlled document management system, or on a set of lists of manually culled items of various types.

Managing IDs of Ontology Records

Each remote system and the central ontology must assign IDs to include their system ID to retain uniqueness. The utility of this is that the information submitted from various systems may more easily be merged. In one embodiment, system ID exposed outside of the CMMDB will be altered by the 'key encryption process' so that the CMMDB may not be copied.

Digital Rights Management

The system will respect ownership rights in data obtained from other systems. Any information resource received from another system will be displayed with attribution information. The metadata for each imported information resource or record will include or reference the source and ownership information for the information resource or record.

Web Serving

API Architecture

The application will have an Application Programming Interface structure that will allow for the future addition of externally or internally developed function.

Plug-In Architecture

The system will have an open, plug-in architecture that will allow for the future addition of function. In one embodiment, beyond those plug-ins mentioned above, the system will hold, including but not limited to the following plug-is:

Analytics Plug-In Architecture

The application will have an open architecture that will allow for the future addition of analytics.

Analytics add processing function to the system for special requirements is the utility of Analytics. Analytics will provide specialized abilities such as retrieving new information and changing the CMMDB base data in bulk.

Controls Plug-in Architecture

The system will be designed to provide for extension by allowing additional object controls to be added into the system. Some of these controls are expected to be higher level, user task level semantic operations.

Dxo Manager Plug-in Architecture

The utility of this is that it provides special function plug-ins for managing various dxos.

Filtering Plug-Ins Architecture

A filtering plug-in architecture will be followed.

Import Module Plug-In Architecture

This provides a level of modularity so that patent professionals, their affiliates and developers, and end users can add new data import mechanisms.

Object Display Control Plug-in Architecture

The utility of this is that it provides for easy customization of the look (display) of dxos for various output formats, including export, reports, and visualizations. The utility of this process is that it allows user to save the settings.

Other product types options can be added easily.

The system should be able to adapt to future requirements with respect to new product types. If new types of products become available then they should be able to be added to the system easily.

Relationship Manager Plug-in Architecture

A plug-in architecture for managers for various scopx and infxtypxs of relationships will be provided. Each manager will be responsible for a minimum set of operations regarding relationships.

Relationship Purification Manager

Ability to assist users in finding and fixing relationships that may be incorrect. The existence of conflicting relationships, problem reports, objections, or negative relationships may point out that a relationship is wrong. Various tests and prioritization functions can be added that provide a rational assistance facility to users willing and able to make changes.

Meaningful Relationships in Ttx Map

A series of meaningful Visualization Structuring Propositional Relationships are required for forming visualizations from the CMM. The relationships provided will be managed by plug-in modules.

This architectural component will provide for the addition of a set of questions that will be provided along with implementation logic for finding potentially incorrect or inconsistent relationships, presenting them to the user, and having the user clarify the correctness of them.

Ttx Relationship Manager Plug-ins

Ability to add functions for each of several infxtypxs of relationships.

Relationship Testing Question Plug-ins Architecture

Relationship Testing Question Plug-in

Ability to add questions and implementation logic for finding potentially incorrect or inconsistent relationships, presenting them to the user, and having the user clarify the correctness of them.

Ability to provide questions to users willing to confirm propriety of relationships. Each question will give the user a thought about a relationship that has never been confirmed and was potentially mistaken, based upon the existence of other, contrary, relationships.

For each question, testing logic for finding instances of potentially incorrect relationships of a certain nature and for fixing the relationship will be included in the plug-in.

Visualization, Export, Report Plug-In Architecture

The application will utilize the same basic engines to output the data and visualize, report, or export it for the users. Separate "plug-ins" will be used to display it in the format requested by the user (Mapping, Table, etc.). The management API of these output plug-ins will be such that a third party can create new plug-ins for the application.

Wizard Plug-Ins

Wizards and Control Panel Views will be provided to control the setup of tasks performed by a user. Each of these will be installed into the application as a wizard plug-in.

Marketing Facilities

CMMSYS Component Structure

The tools will be developed as components that can be deployed individually or together, and accessed through the Internet or as a standalone enterprise application.

Library Item Sales

The utility of this is that it provides users with various scripts, metrics, analytics, etc. at a per item fee. Some items may be sold on a different basis, such as studies written by others. These may be provided by third parties and sold thru our sales portal to the system.

Library Architecture

The Library Architecture will provide a standard for the construction of libraries and for data access from the libraries.

Share Research Collaboratively

This is a component-based solution focused on allowing user to control the research, use, and analysis of Patent-like related information. This solution will also expand a user's potential to share their research with others collaboratively.

Deployment Facilities

Libraries of Resources

Libraries will be constructed for access to resources by users. The utility of these features is that users will be able to reuse the work of others, and that others will have a financial incentive to share their work. Libraries include but are not limited to:

- Libraries of Software
- Libraries of Interest Data
- Libraries of Queries
- Libraries of Tours
- Libraries of Mannerisms
- Libraries of Personalities
- Libraries of Filters
- Libraries of Graphical Representations
- Libraries of Decorations
- Libraries of Fxxt Segments
- Library of Result Sets
- A library of result sets will be available for users to import.
- Library of Scripts
- A library of scripts will be available for users to import from.

Analytics Development and Rollout Preparation for Deployment

Entering information into the E-Commerce Component of the Infrastructure.

The E-Commerce Component of the Infrastructure is supported by the Data Structure.

Distribution

CMMSYS information package Distribution is implemented by the Distribution Component of the Infrastructure. Distribution of Framework components may be carried out in a similar manner. The distribution is begun when a new sanction, license, or update occurs.

License Distribution

Licenses and sanction information are established in the database of the Parent Administration Component, and are then deployed to all databases toward the user devices that they affect.

As a result of device registration, the device becomes a member of an information asset-group of sanctioned devices. Licenses for the information asset-group may then be applied to the operation of CMMSYS information packages on the device.

Data Distribution

Base data and the database objects (stored procedures, data structure definitions, etc.) for the Infrastructure are deployed automatically by the Tiered Database Deployment facility of the Infrastructure.

License and Sanction data is distributed by the same facility as Base Data. Information Categorization and Retrieval over the distribution is strict, and is aimed at automatic distribution and 100% correctness of result in all cases. An incremental distribution based upon a differential calculation is used to shorten the timeframe for distribution and to reduce bandwidth. The distribution is carried out between databases directly where possible so that the differential may be computed quickly.

Library Management

Libraries of software and descriptions available for download.

Alert Distribution

Alerts

A service will be offered to alert users to events such as new competition or products that encroach on intellectual property (utility patents). Collaboration Alerts will also be provided to facilitate informed collaboration.

Other users will be incentivized to record into the system any product they find or any tcept they see that seems to infringe upon the intellectual property registered in the system.

Deployment Management

The SOFTWARE DISTRIBUTION ENGINE is responsible for managing all software deployments in an implementation of the SYSTEM. It maintains knowledge of currently deployed components as well as associated version and configuration information with the Component Management facility. Utilizing the DISTRIBUTION SERVICE, it also processes update requests from child systems, and serves updates when requested by those child systems.

Software is stored in the CODE REPOSITORY, which also contains current version and release information for each software component. This information is used to ensure that proper updates are deployed by comparing the version requested against it.

When software is prepared for distribution, the resulting package includes Software and possibly other files that could variably contain Configuration data and Manifest information. The software is encrypted with a key that is used to authenticate and unpack the software component when the component is installed.

When software changes, a list of Controllers affected will be created by the Component Management element which is read by the Download Initiation service which then informs the relevant Event Managers to inform the Controllers to check in for new software and/or configuration information.

Component Deployment and Installation

Using this pull-down approach, software updates propagate down the hierarchy from the root as each child engine asks for updates. At the root of this distribution hierarchy resides a "master" distribution engine where copies of all the software, base data, and licenses for all the Controllers beneath it are stored. Each Infrastructure implementation may have one or more master engines at a customer site that serve this purpose, and additional masters may reside elsewhere.

The last step in distribution is Configuration. The startup of the installed component may not occur until the component manifest is received. Manifest distribution is a special form of configuration and task deployment, described in the following section.

Startup

Customization, Configuration, and Operation

Customization refers to actions taken prior to distribution of code to CMMSYS system components, and may include the final forming of a package of code and data to distribute based upon including, but not limited to: the type of machine(s) to which the code is to be sent, version of framework at that device, other installed components at that device, proper configuration for interoperability with other CMMSYS components, and/or upon other criteria. Customization alters the code being distributed to make it impossible to execute the code on a device/network other than the device/network authorized to utilize it.

Provisioning Architecture

The basic purpose of the Infrastructure is to provide a framework for the effective deployment and operation of CMMSYS information package solutions.

The distributed framework provides, for example:

- A central system consisting of one or more servers
- A CMMDB on one or more central system servers
- Zero or more private CMMDBs on one or more central system servers
- Zero or more mid-tier system servers
- Private CMMDBs on the zero or more mid-tier systems servers
- Zero or more user workstation systems
- Private local CMMDBs on the zero or more user workstation systems
- One or more browser systems
- Software modules on each system
- Networking to provide connection between the above.

Browser versions will store still confidential or unpublishable ttxs on the central system server and, in one embodiment, on the mid-tier system if accessible and authorized.

Workstation versions will store still confidential or unpublishable ttxs on the workstation or, in one embodiment, on the mid-tier system if accessible and authorized, and, in one embodiment, on the central system confidentially, depending upon preference settings.

Mid-tier systems support browser and workstation user versions, but store still confidential or unpublishable ttxs under the access constraints set by the system licensee until the ttxs are released, depending upon preference settings.

Licensing and Access Control Components

Licensing and Access Control Components control the use of the system. Only sanctioned devices may receive the Infrastructure software and only registered devices and users may submit new data to the CMMDB or obtain information from it. Licensing and access control for information storage and retrieval are distributed. Licenses control the authorization of and number of client systems or networks that may be granted access or from which information may be collected. These licenses are established in the E-Commerce component, and are controlled centrally to ensure the collection of revenues. Licenses keys are distributed to CMMSYS components and the CMMSYS components and CMMDBs are identified so that licenses may have effect by controlling use and access. Thus the system is tiered for access control and information storage and retrieval purposes, and the CMMSYS distributes licenses, CMMSYS information packages, CMMDB information, and access rights downward as needed to provide for the operation of customer systems under the licensing and access control regime. Since multiple levels of CMMSYS parent-child relationships can exist, licenses, access control settings, and CMMDB information should be propagated from parent to child so long as the child is properly authorized to receive those updates, until no child needs access to the license or data. Information added to the CMMDB is propagated from child to parent so long as it is authorized for release from the child system licensee, based upon preference settings and specific release commands Components As a general matter, all components of the framework may be in communication with each other. Also, CMMSYS information packages consist of packages of elements where the elements may be installed on different components in the Infrastructure.

Perspective Descriptions.
Toolbar Definitions.
View Definitions.
Visualization Definitions.
Menu Definitions.
DataSourceMenu.
DescriptionMenu.
EditMenu.
ExportMenu.
FileMenu.
FilterMenu.
HelpMenu.
ProjectMenu.
QueryMenu.
ReportMenu.
ResultSetMenu.
SearchMenu.
SettingsMenu.
ShareMenu.
ToolsMenu.
ViewMenu.
VisualizationMenu.
WindowMenu.
Plug-ins
Client Plug-ins
Data Abstraction Plug-ins
Import Plug-ins.
Import Plug-in Module
Link Resolver Plug-ins.
Visualization Plug-ins.
Map Display GUI
Interface Objects.
Dxo Plug-ins.
Relationship Plug-ins.
Association Plug-ins.
Hierarchical Relationship Plug-ins.
Script Command Plug-ins.
Client Side Filtering Plug-ins.
Export Plug-ins.
Report Plug-ins.
Editor Plug-ins.
Client Side Analytics Plug-ins.
Meta-Search Plug-ins.
Managers.
Export Manager Exports will be output into several popular formats so that they can be explored on another platform such as Excel. The form of export will be in the form of a table or a set of relational tables. Both proprietary formats (Excel, Access, etc.) will be used, as well as standard formats (CSV, ASCII Text).

Link Resolution Manager

Manage the process of resolving URLs, File names, or IDs to retrieve information resource data from various types of servers. Rely on the plug-in to obtain the proper data.

Report Manager

There will also be several static and dynamic reports that can be used to communicate findings to non-users. These reports can be static printable snapshots of the data such as tables, charts, or graphs; or can also take the form of dynamic animations that can be delivered as Java applets so that non-users can interact with the data in a way that is easy for them to understand Result Set Manager The Result Set Management component will provide a framework for various operations to be performed on result set data.

User Interface for Result Set Management

Client

Servers.

Analytics Server.

Analytics will be provided to assist the user in further researching the data. These analytics will help organize the data and define relationships in the data that did not previously exist. Several will be provided in the application for tasks such as collocating (to show together the various manifestations of a work by a given author), mapping, clustering, and text mining. The application will have an open architecture in this respect that will allow for the future addition of analytics.

Each time an analytic is used, its usage and result will be stored into the CMMDB through use of APIs. This will allow the user the ability to undo or redo the analytic on the data, and save the results to their project file.

The application will include a framework to allow users to identify previously unknown patterns and relationships among intellectual property data, and to predict trends and behavior of entities in the data. A limited number of standard analyses will provided with the application, and the general Application Programming Interface (API) will allow for custom analytics to be developed for flexibility in processing the result sets. The Analytics API will allow full programmatic access to the Analytics component, and to appropriate elements of the other components. The API will allow for an extendable range of functionality where new Analytics can be easily written, obtained, plugged-in, and used.

Analytics will result in entities or data about entities being added to the application's database or altered within it. In general, the application will be built to accept Analytics that:

1. 1. Get new data about entities (assignee, company, information resource, citing patent, etc.);
2. Get new data about existence and strength of relationships between entities (frequency ranking, sorting, etc.);
3. Form new relationships between existing entities (correlation between assignee/area, co-citations, etc.);
4. Derive new entities from existing entities (based on a ttx associated with existing entity);

Objectives

Enable the prediction of trends and behavior and the identification of previously unknown patterns in intellectual property data;

Design an architecture that encourages the use of analytic procedures that add and/or alter data in the application using both standard and novel algorithms for the analysis of structured and unstructured data;

Provide an API that allows for the simple integration of third party analytic (e.g., enterprise text mining, clustering, co-locating (collocate the various manifestations of a work or all the works by a given author, or to find all the works under a given ttx), chemical structure mapping) solutions which will augment data in the application and enhance users' comprehension data subsets;

Facilitate the integration and use of sophisticated, off-the-shelf analytics within the application;

Improve the logistical facilities for writers of analytics to allow for easier construction and deployment;

Functionality

Analytics may be controlled by parameters. Parameters may be specified by script statements or by result sets;

Analytics will be controllable through templated forms and/or command scripts;

Information in control forms can be saved as scripts, which are reusable;

Parameters will be redisplayed in control forms for each step when a script is rerun, and can be altered individually by step. Scripts can also be run in 'silent mode,' where all parameters are retained;

Analytics may be invoked directly on one or more result sets, which thus serve as parameters for the Analytic;

For parameterized analytics, the parameters used will be stored in the history for each step of the script;

Analytics may act (be invoked/executed) directly upon one or more result sets (or the entire database), or as part of a query, which may include information resources. The operations will result in new data being added to the database, new result sets being formed, or both;

Analytics invoked directly on a result set may be used in a controlled query where the analytic accesses the necessary data;

Analytics that require data not included in the result set may only be invoked if searching parameters can be supplied in a command script;

Lists of data generated by Analytics can be used indirectly in query scripts by using the result set created by the Analytic;

Analytics can be undone;

Analytics may be provided by any supplier that conforms to the API specification;

The ability for 3rd party analytic providers to control permission levels for how their tools are used. Permissions will allow management of the ownership of data generated through analytics, and may include limits on access, sharing, export, etc.;

The system will include secure mechanisms that will self-check ownership rights before allowing actions on analyzed data. This will enforce the ownership rights protected by 3rd party analytic providers;

The system will simplify the creation of compliant analytics by providing plug-in wizards;

Example Types of Analyses Performed by Analytics:

Citation analysis for patents, where cited or citing patents are retrieved by the application;

Co-citation analysis, where an Analytic is used to determine how strongly patents are related;

Citation analysis (title-only) for non-patent information resources, where an Analytic is used to determine and retrieve non-patent information resources associated with a patent based on a tcept or actual citation;

Intensity of interest on a patent, where a variety of metrics (number of documents published, number of citations, number of hits on the Web) are used to determine the level of interest in a patent, tcept, and its value;

In addition, an API for analytic management will be provided so that high-end users will be able to create and integrate their own analytics into the system.

Server Side Analytic Manager

This component is used for invoking analytics in queries, etc. It provides for parameterization and scheduling of the analytic.

Server Side Analytics API

The Server Side Analytics API will allow full programmatic access to the Analytics component, and to appropriate elements of the other components. The API will allow for an extendable range of functionality where new Analytics can be easily written, obtained, plugged-in, and used.

The general Application Programming Interface (API) will allow for custom analytics to be developed for flexibility in processing the result sets.

Server Side Analytics Plug-Ins.

Cross-Citation and Correlation Analytic

Form new relationships between existing entities (correlation between assignee/area, co-citations, etc.).

Expander Analytic

Derive new entities from existing entities (based on a cnxpt associated with existing entity).

Web, File, and Document Crawler Analytic

Crawler analytics gather information resources and fill result sets in crawl result constructs. The crawler obtains data from online repositories or mounted repository export data sets. The CMMDB will be populated from crawling to find, including but not limited to: repository documents, files from file managers, web based research papers, patents, and scraped information regarding products, tpx, etc. Crawler analytics may operate by crawling, searching, scraping, or any combination. For searching, a crawler analytic will gather information resources specifically relevant to a ttx or to a query script specified in the crawling definition. The result sets may be set to be updated and to generate alerts when updates cause a set number of new result set items or useful new analyzed clusters to appear in an automatic update.

In one embodiment, specialized forms of crawling are performed by a crawler analytic. A Related Data Crawl Analytic will search and scrape new data about entities (assignee, company, information resource, citing patent, etc.). A Relationship Crawl Analytic will search and scrape new data about existence and strength of relationships between entities (frequency ranking, sorting, etc.). A File System Crawl Analytic will pick up file creation dates, directory structures, etc. A Document Management System Crawl Analytic will pick up document type, relationships, document creation dates, directory structures, document thumbnails, etc.

In one embodiment, the process of adding new ttxs is based in part upon a process herein called 'ttx hunting'. Herein, 'ttx hunting' occurs when the system, including, but not limited to: crawls and scrapes websites or document management systems; issues survey questions specified sources to collect new potential ttxs; or analyzes submitted information resources, import files, taxonomies, or multimedia.

Application Servers.

HTTP Servers:

Database.

Database Servers:

Library.

File Managers.

Document Managers.

Heterogeneous Repositories.

On-Line Store.

Client and Store Database

The Store database contains the Stock Items, transaction lists as well as the basic account entries, and the client details. All information, including full client details and access information like passwords etc. are only accessible on the Database Server. This is accessible only from the DMZ side of the firewall.

Web Server.

Authentication

All requests are authenticated through the authentication mechanism at the web server.

Framework Administration Components

CMMSYS information packages

The Infrastructure described here provides a distributed framework and process for deployment, update, and administration of the CMM and CMMDB and the devices it is provided through. This framework encompasses the apparatus and process for implementing access, provisioning, and configuration policies, called 'CMMSYS information packages'. A CMMSYS information package is a body of computer program code.

E-Commerce Components

The distribution architecture may include various subcomponents, detailed below. In one embodiment, the distribution architecture includes an E-Commerce Component providing a user Portal to the system providing a graphical user interface for software selection, purchase and deployment. Only authorized, registered users are granted the necessary permissions to perform these functions. When CMMSYS components or DataSets are purchased, the sanctioning process provides for establishing the framework component on a customer device and the retrieving of the CMMSYS components or DataSets to that device from a distribution component. When CMMSYS components are purchased, the licenses for them are deployed to a proper administration and distribution components, allowing for the distribution of the software to a local client system.

Authorization to operate and authorization to submit data to CMMDBs are controlled in a similar license based control facility.

Distribution Components

License Distribution

Licenses and sanction information are established in the database of the Parent Administration Component, and are then deployed to all databases toward the user devices that they affect.

As a result of device registration, the device becomes a member of an information asset-group of sanctioned devices. Licenses for the information asset-group may then be applied to the operation of CMMSYS information packages on the device.

A machine may be 'sanctioned' and licensed for the hosting and operation of zero or more of the CMMSYS information package components, and is counted by the licensing mechanism before it is allowed to operate for each of those components.

SUMMARY

The invention described above thus overcomes the disadvantages of known systems by improving the way that information categorization and retrieval is managed, analyzed, and refined. While this invention has been described in various explanatory embodiments, other embodiments and variations can be effected by a person of ordinary skill in the art without departing from the scope of the invention.

What is claimed is:

1. A computer-implemented method to make available a commonplace of information, comprising:

a. providing a computer storage to hold information added to the commonplace of information comprising a plurality of cnxpts representing concepts and at least one association representing a relationship between concepts represented by cnxpts among the plurality of cnxpts;

b. defining a knowledge model comprising a set of zero or more fxxts based on the information stored regarding the plurality of cnxpts and the at least one association, fulfilling at least one condition selected from the group of: no association is marked with a fxxt, no cnxpt is marked with a fxxt, at least one cnxpt is marked with at least one fxxt, and at least one cnxpt participates in one or more associations marked with at least one fxxt;

c. generating, using a map definition referencing the set of zero or more fxxts, a derived ontology for one or more domains of wisdom by extracting references to zero or more associations and zero or more cnxpts into the derived ontology;

d. generating, using said map definition referencing the set of zero or more fxxts, a skeletal structure for a map instance for said one or more domains of wisdom from the extracted derived ontology wherein the resulting map skeletal structure of said map instance is based upon a manner of analysis selected from the group of: a spanning forest manner, a descendent forest manner, an enhanced descendent forest manner, an ascendant forest manner, an enhanced ascendant forest manner, and a structure comprising a combination thereof;

e. generating, using said map definition referencing the set of zero or more fxxts, one or more organizations of knowledge to structure a map instance for said one or more domains of wisdom from the extracted derived ontology wherein the resulting map structure of said map instance is based upon a manner of map assembly selected from the group of: a spanning forest manner, a hierarchical manner, an enhanced descendent forest manner, an enhanced ascendant forest manner, a vertical manner, a directed graph manner, a graph manner, a horizontal manner, a depth augmented manner, a time augmented manner, a purlieu augmented manner, and a structure comprising a combination thereof; wherein vertical and horizontal are mere duals for labeling in combinations;

and f. providing to the user said one or more domains of wisdom for utilization in a form selected from the group of:

i. providing access to the data contained in said one or more organizations of knowledge for one or more domains of wisdom of said map instance for utilization directed at a solution of a problem the user is considering;

and ii. displaying a visual derivative of said one or more organizations of knowledge for one or more domains of wisdom of said map instance to a user, the displayed visual derivative of said map comprising at least one of: a categorization, a classification, an index tool for accessing indexed information, a dynamically refreshed associative search tool, a personal perspective associative search tool, a compound topic non-classification personal perspective associative search tool, a sub-topic relevance based search tool, a non-indexed dynamically refreshed external information sub-topic relevance based associative search tool with alerting, an ideating tool, an organizer, a planner, a table of information, a book of information, a document authoring tool, a document management and retrieval tool, a budget structure, a personal perspective adaptive dynamic structured report structure manager tool for spreadsheet users, a search memory holder, an organizing tool, a harmonized classification tool, an adaptive dynamic classification index preservation tool, a personal perspective adaptive dynamic classification index preservation tool, a personal perspective adaptive dynamic search-refreshing classification index preserving information access tool, an innovation assistant, a subject-specific communication tool, a subject managing communication tool, a compartmentalized security linked information protection access tool, a tool for managing structures within spreadsheets, a tool for managing idea specific organizational communications, a management tool for idea-centric commercial transactions, a communal tool to foster idea extension, a machine learning supervising tool, a portfolio manager, a personal perspective adaptive dynamic classification index preservation portfolio analysis tool, an ordering, a precedence presentation, a view of a machine learning result, a structured data model, a type to sub-type presentation, a related information associative search tool, a modeling basis, a knowledge map, a predicting basis, an assembly process map, a mapping appropriate to a user application according to a user decision, a mind map, a task plan, a workflow, a project structure, an evaluation map, a decision tree, a Bayesian network, a trait based associative search tool, a causality network, a neuron map, a patent map, a technology map, a product line map, a personal perspective decision analysis presentation, a prospective perspective decision analysis presentation, a dynamic personal perspective audience interest recommender analysis tool, a fact to legal element mapping, an evidence to legal element mapping, a sequence structure, a strategic plan, a curriculum, a futures analysis, a plan, a procedure, a proof structure presenter, a ranking list, a competitive environment presentation, a strategic direction under uncertain competitive pressure and technology uncertainty expected return planning tool, a belief polling tool, an intelligence collection tool, a rapid response supervised collaborative collection uncertain provenance intelligence response effectiveness analysis tool, a data product subscription manager, a technology transfer supervision tool, a patent clearance operations manager, an intellectual property leak detecting loss analysis tool, an ontology manager, a complex organization general ledger, a skills list, a dynamic skills list showing training needs, a language mapping, a patent claim tree, a detailed prior art search manager, a detailed dynamic search prior art search manager, a classification-expansive dynamic prior art enumeration showing prospective prior art for minimally described prospective concepts, a business progress rating presentation, a mapping demarcating what is known from that which is unknown at any point in time, a branching diagram, a logic diagram, a legal case presentation, a computation derivation map, a method map, a product line formation analysis tool, a product feature set manager, a technology product gap finder, a hot investment area finder, a product development coordination tool, a product potential analysis, and a combination tool formed from two or more of the foregoing directed at a solution of a problem the user is considering;

whereby one or more domains of wisdom are formed by collections of references to cnxpts and references to zero or more associations among cnxpts.

2. The method of claim 1, further comprising:

a. accepting a command regarding a definition of a cnxpt from a user selected from the group of: an info-item addition command defining a new cnxpt without parameters stated, an info-item addition command defining a new cnxpt along with stated parameters, an info-item change command refining the cnxpt definition, and an info-item change command refining stated parameters regarding the cnxpt definition;

b. accepting with said command regarding said cnxpt definition a cnxpt identity value of type selected from the group of: a lack of value specifying to use a system generated identity, a parameter value acceptable as an identity, a form fill-in value acceptable as an identity, and a value acceptable as an identity that is acceptable to the user interface;

c. accepting with said command regarding said cnxpt definition an object typing selected from the group of: classless, class, class instance, dynamic class with a defined cnxpt nature as specified by a given match of specified values held in zero or more specified cnxpt properties of an instance to be considered a member of the dynamic class;

d. accepting with said command regarding said cnxpt definition zero or more cnxpt identity values of type;

e. accepting zero or more actions affecting the nature of the cnxpt, the action selected from the group of:

i. assigning to said cnxpt a role on an association;

ii. assigning to said cnxpt a role on an association, the association being newly created in the operation wherein a second cnxpt identity is specified to hold a role on the opposing end of the association;

iii. marking said cnxpt with a fxxt;

iv. assigning to said cnxpt, wherein said cnxpt is a class, zero or more class properties, zero or more behaviors, zero or more roles, and zero or more fxxt markings;

v. assigning a cnxpt class property to a class of which said cnxpt is an instance, said property in said cnxpt given a default value inherited from the cnxpt defining the cnxpt class;

vi. assigning said cnxpt to a cnxpt class, wherein said cnxpt is a class;

vii. assigning to said cnxpt, wherein said cnxpt is a class, zero or more class properties, zero or more behaviors, zero or more roles, and zero or more fxxt markings to the class defined by said cnxpt, said class properties, behaviors, roles, and fxxt markings inheritable by cnxpt instances of the class, wherein properties that are inherited by the instances of the class that are new to the instance would be assigned to the instance and given a default value as stated in said cnxpt, wherein new associations are generated where the role at the opposing end of the association at the class level is copied to the new association but the role of the class cnxpt on the class level association is not copied, the role of the class replaced by said cnxpt on the new association, wherein the new association inherits as initial property values those values of the properties of the association at the class level, said cnxpt remaining an instance of the class if not removed from the class;

viii. assigning to said cnxpt a cnxpt class defined by a class cnxpt, effecting inheritance into said cnxpt as an instance of the cnxpt class, of zero or more class-defined properties, zero or more class-defined behaviors, zero or more class-defined roles, and zero or more markings of fxxt membership of the cnxpt class, wherein properties that are inherited by said cnxpt that are new to said cnxpt would be assigned to said cnxpt and given a default value as stated in the cnxpt defining the class, wherein new associations are generated where the role at the opposing end of the association at the class level is copied to the new association but the role of the class cnxpt on the class level association is not copied, the role of the class replaced by said cnxpt on the new association, wherein the new association inherits as initial property values those values of the properties of the association at the class level, said cnxpt remaining an instance of the class if not removed from the class;

ix. assigning a value to a property of said cnxpt causing said cnxpt to become a member instance of a dynamic class defined by a class cnxpt, effecting inheritance into said cnxpt as an instance of the cnxpt class, of zero or more class-defined properties, zero or more class-defined behaviors, zero or more class-defined roles, and zero or more markings of fxxt membership of the cnxpt class, wherein new associations are generated where the role at the opposing end of the association at the class level is copied to the new association but the role of the class on the class level association is not copied, the role of the class replaced by said cnxpt on the new association, wherein the new association inherits as initial property values those values of the properties of the association at the class level, said cnxpt remaining an instance of the class while said property holds a value conforming to the requirements of the dynamic class;

x. triggering calculation of cnxpt methods of said cnxpt, wherein a value resulting from the calculation is assigned to a property of said cnxpt;

xi. triggering calculation of cnxpt methods of said cnxpt, wherein a value assigned to a property of said cnxpt by the calculation causes conformance of said cnxpt to the membership requirements of a dynamic class defined by a class cnxpt to become a member instance of the dynamic class, effecting inheritance into said cnxpt as an instance of the cnxpt class, of zero or more class-defined properties, zero or more class-defined behaviors, zero or more class-defined roles, and zero or more markings of fxxt membership of the cnxpt class, wherein new associations are generated where the role at the opposing end of the association at the class level is copied to the new association but the role of the class on the class level association is not copied, the role of the class replaced by said cnxpt on the new association, wherein the new association inherits as initial property values those values of the properties of the association at the class level, said cnxpt remaining an instance of the class while said property holds a value conforming to the requirements of the dynamic class;

xii. assigning to said cnxpt a value of a property, wherein the value causes said cnxpt to become a marked member of a fxxt if the value conforms to the requirements of the fxxt, said cnxpt remaining a marked member of the fxxt while said property holds a value conforming to the requirements of the fxxt;

xiii. triggering calculation of cnxpt methods of said cnxpt, wherein a value assigned to a property of said cnxpt by the calculation causes said cnxpt to satisfy the membership requirements of a fxxt if the value causes conformance to the requirements of the fxxt, said cnxpt remaining a marked member of the fxxt while said property holds a value conforming to the requirements of the fxxt;

xiv. assigning a fxxt marking to said cnxpt, wherein said cnxpt is a class, causing said cnxpt and instances of the class defined by said cnxpt to become marked members of the fxxt, said cnxpt and instances of the class defined by said cnxpt remaining marked by the fxxt while said fxxt marking remains on said cnxpt;

xv. altering the membership requirement of a cnxpt dynamic class of which said cnxpt is a class member instance by changing one or more values required to be held by class member instances, said cnxpt considered an instance of the cnxpt dynamic class unless said cnxpt no longer satisfies the membership requirement;

xvi. marking said cnxpt with a fxxt, wherein said cnxpt is a class, wherein all member instance cnxpts of the class become marked by the fxxt while the marking of said cnxpt remains;

xvii. assigning a calculation equation to said cnxpt as a method for obtaining a value for a cnxpt property of said cnxpt, the equation referencing zero or more cnxpt properties of said cnxpt and zero or more cnxpt properties of zero or more other cnxpts;

xviii. triggering calculation of cnxpt methods of said cnxpt, wherein a value resulting from the calculation is utilized in a model;

xix. assigning a modeling variable to said cnxpt as a cnxpt property;

xx. assigning said cnxpt to a fuzzy cnxpt class with a fuzziness given by a probability density function;

xxi. assigning said cnxpt to a fuzzy cnxpt class with a fuzziness given by value of a property of said cnxpt;

xxii. assigning to said cnxpt a value for a property;

xxiii. assigning to said cnxpt a cnxpt property value an existence fuzziness probability density function selected from the group of: the value of a fuzziness probability density function property of said cnxpt, a likely existence start area boundary, a likely existence end area boundary, a likely existence start area boundary under a condition, and a likely existence end area boundary under a condition, a value constant, a value held by a property, a calculated value given by an equation of a method;

xxiv. assigning to said cnxpt an existence fuzziness probability density function selected from the group of: the value of a fuzziness probability density function property of said cnxpt, a likely existence start time frame, a likely existence end time frame, a likely existence start time frame under a condition, and a likely existence end time frame under a condition; said existence fuzziness probability density function as represented by a cnxpt property;

xxv. assigning to said cnxpt a timing selected from the group of: an epoch that the cnxpt represents, a time frame of said cnxpt, a time frame property of said cnxpt, a likely existence time frame, a preferred start time frame, a preferred end time frame, an actual start time frame, an actual end time frame, a time frame of a custom type, a time frame of a purpose represented by a variable property of said cnxpt, a deadline time frame, a patent protection end date, a next milestone time frame, a likely realization time frame, a preferred completion time frame, and a preferred obsolescence time frame;

xxvi. assigning to said cnxpt a location selected from the group of: a location that the cnxpt represents, a purlieu of said cnxpt, a purlieu property of said cnxpt, a likely existence area, a preferred initial reference area, a preferred demise reference area, an actual initial reference area, a actual demise reference area, a location of a custom type, a location of a purpose represented by a variable property of said cnxpt, a destination location, a patent jurisdiction location, a next landmark location, a likely final landmark location, and a preferred completion landmark location;

xxvii. assigning to said cnxpt a workflow state selected from the group of: a workflow status value representing a workflow state, a workflow state represented by a second cnxpt, a workflow state represented by a time frame, a workflow state represented by a epoch, a workflow state represented by a purlieu, a workflow state represented by a boundary, a workflow state represented by a landmark, a workflow state represented by an info-item, and a workflow state resolved upon request by computing a state using a probability density function defined over a range of one or more workflow states as represented by a cnxpt property value stating a domain of workflow states;

xxviii. altering the fxxt marking of an association on which said cnxpt holds a role to add said association to said fxxt wherein said cnxpt has a defined cnxpt nature as specified by a given match of specified values held in zero or more specified properties of said cnxpt to be considered a marked member of the fxxt;

xxix. assigning to said cnxpt one or more knowledge representation natures.

xxx. add information resource to said cnxpt as an occurrence;

xxxi. add reference to ttx from said cnxpt;

xxxii. add reference to ttx entry from said cnxpt;

xxxiii. navigate to said cnxpt;

xxxiv. adding said cnxpt to a result set;

xxxv. adding a result set to said cnxpt in connection with a search;

xxxvi. adding said cnxpt to an area of interest;

xxxvii. moving said cnxpt to appear as a child of a different cnxpt;

xxxviii. causing the adding of a vote for a hierarchical association;

xxxix. removing said cnxpt from a role on an association, the association being deleted in the operation;

xl. replacing a cnxpt having a role on an association by said cnxpt to take over the role on the association;

xli. removing said cnxpt from a cnxpt class, wherein the zero or more class properties inherited from the cnxpt class are removed from said cnxpt if the value in the property was never changed from the default assigned when said cnxpt was made an instance of the cnxpt class, wherein the zero or more class methods inherited from the cnxpt class are removed from said cnxpt if the method definition stored in said cnxpt was never overridden in said cnxpt, wherein the zero or more fxxt markings inherited from the cnxpt class are removed from said cnxpt if said cnxpt never assigned explicitly to the fxxt other than by inheritance, wherein the zero or more roles inherited from the cnxpt class and the association where the role is are removed from said cnxpt if said cnxpt never assigned explicitly to the role other than by inheritance;
xlii. changing a value of a property of said cnxpt causing said cnxpt to be removed as a member instance of a dynamic class;
xliii. changing a value of a property of said cnxpt causing said cnxpt to be removed as a marked member of a fxxt;
xliv. removing said cnxpt from a fxxt;
xlv. removing a cnxpt method from said cnxpt;
xlvi. removing a cnxpt property from said cnxpt;
xlvii. changing the value of a property of said cnxpt;
xlviii. changing the equation of a method of said cnxpt;
xlix. changing the definition of a method of said cnxpt;
l. removing a method from said cnxpt;
li. changing a fuzziness given by a probability density function for determining membership of said cnxpt in a fuzzy cnxpt class;
lii. removing a cnxpt property serving as a modeling variable from said cnxpt;
liii. removing a modeling calculation equation from said cnxpt;
liv. changing a modeling calculation equation of said cnxpt;
lv. changing on said cnxpt a value to an instance variable to serve as an identity resolver of said cnxpt when the identity of the class is provided;
lvi. removing the fxxt marking of an association on which said cnxpt holds a role to remove said association from a fxxt wherein cnxpt instances in the role have a specific cnxpt nature as specified by a given match of specified values held in zero or more specified cnxpt properties;
lvii. vote regarding an occurrence to said cnxpt;
lviii. vote regarding a reference to ttx from said cnxpt;
lix. vote regarding a reference to ttx entry from said cnxpt;
lx. vote regarding the appropriateness of appearance of said cnxpt in a map;
lxi. vote regarding the placement of said cnxpt in a result set;
lxii. culling a result set of said cnxpt;
lxiii. vote regarding the placement of said cnxpt in an area of interest;
lxiv. vote regarding the parentage of said cnxpt by a different cnxpt;
and
lxv. vote regarding the role of said cnxpt in a hierarchical association.

3. The method of claim 2, to include additional knowledge regarding affinity of cnxpts, further including:

a. determining info-item membership in a resultant fxxt by interpreting one or more rules selected from the group of:
i. info-item access and retention rules;
ii. weighting heuristic rules;
iii. ordering heuristic rules;
iv. ontology combination rules;
v. fxxt combination rules;
and
vi. rules allowing consideration of an association when an option of the map is set to a specified value, wherein the association would not be in the map otherwise, wherein the association states an affinitive relationship between two cnxpts in the map, wherein the association is only used for its weighting to show an affinity between said two cnxpts holding roles on the association, wherein the association weight is multiplied by a coefficient stated in the map if the coefficient is set to a value, wherein the resultant value is accumulated for use during roll-up generation.

4. The method of claim 1, to extract a derived ontology subset of the commonplace of information to provide a domain of wisdom basis for a map, further comprising:

a. detailing a map definition;
b. detailing zero or more fxxt specification steps defining a fxxt;
c. registering, regarding said map definition, resolved values for zero or more parameters;
d. determining user identity;
e. accepting from the map definition representing a knowledge model of a domain of wisdom a set of zero or more fxxt instances each fxxt having a coefficient indicating a proportionality of impact of the fxxt on any result of analysis regarding the map selected from the group of: a stated value, a value stated in the map definition, a formula resolving to a value when accessed, and a default value;
f. creating, a new empty named derived ontology to hold references to extracted instances and classes of info-items; the resulting said named derived ontology assigned to the user causing the extraction by requesting the map, and said named derived ontology named by said new resultant fxxt by identity; said named derived ontology assigned to reside in computer storage allocated to store information comprising a domain of wisdom forming the basis of the map; said named derived ontology when filled to be comprised of a plurality of references to info-items, cnxpt instances and association instances among the plurality of cnxpt instances where each association instance states directionality and includes a weight indicating a strength of the association instance of a type selected from the group of: a predefined default value for weights not stated, a value, a placeholder for a value, and an equation; each cnxpt instance including a weight indicating importance of the cnxpt instance of a type selected from the group of: a predefined default value for weights not stated, a value, a placeholder for a value, and an equation, each info-item instance including a weight indicating importance of the info-item instance of a type selected from the group of: a predefined default value for weights not stated, a value, a placeholder for a value, and an equation;
g. interpreting said map definition; further including:

i. accepting for processing a definition of a first map listing zero or more fxxts stating sources of wisdom to be referenced as contents in the map;

ii. resolving values for zero or more parameters for processing of said first map;

iii. accepting for analysis, if said map definition lists any fxxt, a first specification step of a first fxxt instance defining tasks to perform for said first fxxt instance;

iv. resolving, if said map definition lists no fxxt, a null fxxt identity, setting inherited from said map definition, and values present or default values for parameters fxxt-free mode fxxt extraction;

v. resolving, if said map definition lists any fxxt, values for zero or more parameters of said first specification step of said first fxxt instance;

and vi. registering, if said map definition lists any fxxt, for proper later invocation zero or more fxxt specifications;

h. creating a plurality of temporary lists, further including:

i. creating an empty list of classes instantiated during extraction based upon said map definition;

ii. creating one or more empty temporary class lists of cnxpt classes containing tuples referencing one cnxpt class per tuple;

iii. creating one or more empty temporary class lists containing tuples, referencing one association class per tuple, the tuple referencing the cnxpt instance or class in each role;

iv. creating one or more empty temporary mixed lists containing tuples, referencing one association instance per tuple, each association instance with at least one role occupied by a cnxpt class, the tuple referencing the cnxpt instance or class in each role;

v. creating one or more empty temporary class lists containing tuples, referencing one non-cnxpt, non-association info-item class per tuple;

vi. creating one or more empty temporary instance lists containing tuples, referencing one cnxpt instance per tuple;

vii. creating one or more empty temporary instance lists containing tuples, referencing one association instance per tuple, the tuple referencing the cnxpt instance or class in each role;

and viii. creating one or more empty temporary instance lists containing tuples, referencing one non-cnxpt, non-association info-item instance per tuple;

i. creating one or more temporary derived ontologies, setting an accumulated contextual coefficient indicating proportionality of impact for each temporary derived ontology to a default value, further including:

i. defining a new empty temporary derived ontology; said temporary derived ontology assigned a new temporary fxxt identity; said temporary derived ontology assigned to reside in computer storage;

and ii. structuring said temporary derived ontology commonplace to register new references to info-item classes, info-item instances, cnxpt classes, cnxpt instances, association classes, and association instances from said commonplace, wherein each reference to a non-association info-item instance or class states a weight indicating importance of the info-item instance or class of a type selected from the group of: a predefined default value for weights not stated, a value, a placeholder for a value, and an equation;

j. preparing for triggered processing for membership testing for info-items into said named derived ontology of the commonplace of information by interpreting a first specification step of a first fxxt instance listed on said map definition where at least one satisfaction exists of conditions selected from the group consisting of: said map definition states its treat-as-trigger-able setting as affirmative, said first fxxt instance is defined to be trigger-able, said first fxxt specification step is marked as trigger-able, said first fxxt specification step that has been determined to be trigger-able, and said first fxxt specification step that has been determined to be not-easily-determined; further including:

i. accepting for processing said first specification step of said first fxxt instance defining tasks to perform for said first fxxt instance;

ii. resolving values for zero or more parameters of said first specification step of said first fxxt instance;

and iii. registering for proper later invocation zero or more fxxt specifications observed;

k. determining membership of an info-item reference in said named derived ontology of the commonplace of information where there are zero or more first fxxts specified on said map definition, by one or more observations before forest extraction is attempted, by detecting a mode for fxxt specification processing by one or more observations, the observations selected from the group of:

i. that fxxt-free mode is requested in said map definition and at least one first info-item in said commonplace is not marked by any second fxxt, is of a type selected from the group of: cnxpt, association, and type given by info-item type inclusion parameter; further including:

01. calculating an initial value for the accumulated contextual coefficient indicating proportionality of impact based upon a rule;

02. recording into said named derived ontology each info-item reference of said at least one first info-item;

and 03. recording into said named derived ontology each info-item reference of said at least one first info-item class where extract-classes mode is active;

ii. that a second fxxt member of said set of at least one fxxt referenced in said map definition marks, by a method selected from the group of: directly marking due to fxxt specification having no defined specification steps, and interpreting fxxt specification step directly prescribing a marking; zero or more first info-items in a configuration selected from the group of: map definition specifying extract-classes mode and first info-item is a class, map definition specifying extract-classes mode and first info-item is an association instance having a role occupied by a cnxpt class, fxxt specification step specifying extract-classes mode and first info-item is a class, fxxt specification step specifying extract-classes mode and first info-item is an association instance having a role occupied by a cnxpt class, and first info-item is an instance other than an association instance having a role occupied by a cnxpt class or a relation instance having a role occupied by an info-item class; said second fxxt providing a grant to such a user to allow utilization of said first info-item instances or no lockout affecting such a user access, said second fxxt having a coefficient indicating a proportionality of impact of the fxxt on any result of analysis regarding the map selected from the group of: a stated value, a value stated in the map definition, a formula resolving to a value when accessed, and a default value; further including:

01. calculating an initial value for the accumulated contextual coefficient indicating proportionality of impact;

02. recording into instance lists by collecting instances;
and 03. recording into class lists by collecting classes where extract-classes mode is active;

iii. that a first fxxt specification step in the definition of a first fxxt member of said set of at least one fxxt referenced in said map definition prescribes an operation type selected from the group of: a specification step stating an equation yielding upon recursive evaluation the identity of one or more second fxxts having no defined specification steps, a specification step stating a query yielding upon recursive evaluation the identity of one or more second fxxts having no defined specification steps, a specification step stating an equation yielding upon recursive evaluation the identity of one or more second fxxts having a defined specification step directly prescribing a marking, and a specification step stating a query yielding upon recursive evaluation the identity of one or more second fxxts having a defined specification step directly prescribing a marking; said second fxxt providing a grant to such a user to allow utilization of the info-items or no lockout affecting such a user access; said second fxxt having a coefficient indicating a proportionality of impact of the fxxt on any result of analysis regarding the map selected from the group of: a stated value, a value stated in the map definition, a formula resolving to a value when accessed, and a default value; said operation not specifying any fxxt combination operation other than a union by addition of further info-items to the resulting extracted ontology; further including:

01. enqueueing for said first fxxt specification step an entry into a fxxt list the set of all second fxxts found stemming from said first fxxt specification step;
and 02. processing in turn each queued second fxxt found stemming from said first fxxt specification step that marks, by a method selected from the group of: directly marking due to fxxt specification having no defined specification steps, and interpreting fxxt specification step directly prescribing a marking; zero or more first info-items in a configuration selected from the group of: map definition specifying extract-classes mode and first info-item is a class, map definition specifying extract-classes mode and first info-item is an association instance having a role occupied by a cnxpt class, fxxt specification step specifying extract-classes mode and first info-item is a class, fxxt specification step specifying extract-classes mode and first info-item is an association instance having a role occupied by a cnxpt class, first info-item is an instance other than an association instance having a role occupied by a cnxpt class or a relation instance having a role occupied by an info-item class, and specific instances; wherein access to marked info-items is allowed based upon a rule selected from the group of: allowed according to said first fxxt and not locked out by said second fxxt, allowed according to said first fxxt and not locked out by said second fxxt, allowed according to said first fxxt and allowed according to said second fxxt, and not locked out by said second first or said second fxxt; said first fxxt having a coefficient indicating a proportionality of impact of the fxxt on any result of analysis regarding the map selected from the group of: a stated value, a value stated in the map definition, a formula resolving to a value when accessed, and a default value; said second fxxt having a coefficient indicating a proportionality of impact of the fxxt on any result of analysis regarding the map selected from the group of: a stated value, a value stated in the map definition, a formula resolving to a value when accessed, and a default value;

iv. that a first fxxt specification step in the definition of a first fxxt member of said set of at least one fxxt referenced in said map definition prescribes an operation type selected from the group of: a specification step stating an equation yielding upon recursive evaluation a query, a specification step stating a query yielding upon recursive evaluation a query, a specification step stating an equation yielding upon recursive evaluation a query, and a specification step stating a query yielding upon recursive evaluation a query; said second fxxt providing a grant to such a user to allow utilization of the info-items or no lockout affecting such a user access; the search query to result in a list of info-items selected from the group of: info-item classes, info-item instances, cnxpt classes, cnxpt instances, association classes, and association instances; said query stating criteria arguments or resolvable parameters to allow searching of a type selected from the group of: text field, text description, language, name, identity, property value, attribute value, scopx, infxtypx, txo type, weight, info-item type, presence of an attached entity, feature set, state of selection by user, result of assessment by analytic, state of membership in list or set, current or prior position in visualization, trait, occurrence information, association role type, association role fulfillment, relationship role type, relationship role fulfillment, existence in an area, existence in a time frame, membership in indicated list, membership in stated list, inclusion in an indicated map, categorization as stated by an indicated map, value within one or more ranges, membership of property value in a stated list, membership of property value in a named list, fxxt identity list, inverse extension, base fxxt marking, ownership by user, ownership by organization, usage by user, alteration by user, having an approval, satisfying a query in a query language, alteration by organization, creation date, change date, value range of function involving property, status, permission, protection level, status as child in specific relationship type, status as parent in specific relationship type, class membership, relative position in a list, position in an ordering by a property or a time reference attribute, a specific value or a null value for some attribute within a description field, having a workflow status, a level of interest shown, a degree of similarity, satisfying a statistical criteria, passing a custom test, existence of an attribute within a description, a value in an attribute of another info-item meeting a comparison criteria; having a specified rating, satisfying a Boolean test, having a specified combination of properties and infxtypxs, having a specified combination of properties and scopxs, holding a queue position, membership in an ontology, membership in a directory, membership in a taxonomy, passing a cypher test, having a specified combination of attributes, a membership test, a Boolean combination of the foregoing, and a defined combination of the foregoing; wherein when the search query is fully resolved a non-null set of info-items from said commonplace are found, said info-items being treated as if they were marked by said second fxxt and access to the info-items is allowed for such a user based upon a rule selected from the group of: allowed according to said second fxxt and not locked out by said second fxxt, allowed according to said second fxxt and allowed according to every fourth fxxt marking the info-item and not locked out by said second fxxt or any fourth fxxt marking the info-item, allowed according to said second fxxt and not locked out by said second fxxt or any fourth fxxt marking the info-item, and not locked out by any fourth fxxt marking the info-item; said second fxxt having a coefficient indicating a proportionality of impact of the fxxt on any result of analysis regarding the map selected from the group of: a stated value, a value stated in the map definition, a formula resolving to a value when accessed, and a default value; and not specifying any fxxt combination operation other than a union by addition of further info-items to the resulting extracted ontology, further including:

01. calculating an initial value for the accumulated contextual coefficient indicating proportionality of impact;
02. recording into instance lists by collecting instances;
and
03. recording into class lists by collecting classes where extract-classes mode is active;

and v. that a first fxxt specification step in the definition of a first fxxt member of said set of at least one fxxt referenced in said map definition prescribes an operation on a domain;

l. producing into the resulting said named derived ontology by repeating until no classes remain in any temporary instance or class list, the named derived ontology generation process, further including:

i. generating into said first temporary derived ontology a first set of zero or more unique references to cnxpt instances based upon tuples in said first temporary instance list of cnxpt instances;
ii. generating into said first temporary derived ontology a first set of zero or more unique references to association instances based upon tuples in said first temporary instance list of association instances;
iii. generating into said first temporary derived ontology a first set of zero or more unique references to non-cnxpt, non-association info-item instances based upon tuples in said first temporary instance list of non-cnxpt, non-association info-item instances;
iv. instantiating into said first temporary instance list of cnxpt instances a set of second tuples for each first tuple in said first temporary class list of cnxpt classes upon an affirmative of observation regarding extraction mode selected from the group of: extract-classes mode is active and expand-classes mode is active, and extract-classes mode is not active and expand-classes mode is active;
v. instantiating new tuples where the map definition or the fxxt specification step specifies extract-classes mode from tuples in first temporary class list of association classes to tuples in first temporary instance list of association instances upon an affirmative of observation regarding extraction mode selected from the group of: expand-classes mode is active;
vi. instantiating new tuples from tuples in first temporary mixed list of association classes to tuples in first temporary instance list of association instances upon an affirmative of observation regarding extraction mode selected from the group of: expand-classes mode is active;
vii. instantiating into said first temporary instance list of association instances a set of second tuples for each first tuple in said first temporary mixed list of association instances by instantiating to tuples in first temporary instance list of association instances upon an affirmative of observation regarding extraction mode selected from the group of: expand-classes mode is active;
viii. instantiating into said first temporary instance list of non-cnxpt, non-association info-item instances a set of second tuples for each first tuple in said first temporary class list of non-cnxpt, non-association info-item classes upon an affirmative of observation regarding extraction mode selected from the group of: extract-classes mode is active and expand-classes mode is active, and extract-classes mode is not active and expand-classes mode is active;
ix. generating into said first temporary derived ontology a first set of zero or more unique references to cnxpt classes based upon tuples in said first temporary class list of cnxpt classes upon an affirmative observation selected from the group of: expand-classes mode is not active and extract-uninstantiated-classes mode is active;
x. generating into said first temporary derived ontology a first set of zero or more unique references to association instances and into said second temporary derived ontology a first set of zero or more unique references to cnxpt classes based upon tuples in said first temporary mixed list of association instances only where the association instances having a cnxpt class already in a role upon an affirmative observation selected from the group of: expand-classes mode is not active and extract-uninstantiated-classes mode is active;
xi. generating into said first temporary derived ontology a first set of zero or more unique references to association classes and into said second temporary derived ontology a first set of zero or more unique references to cnxpt classes based upon tuples in said first temporary class list of association classes only where the association classes having a cnxpt class already in a role upon an affirmative observation selected from the group of: expand-classes mode is not active and extract-uninstantiated-classes mode is active;

xii. resolving class entries based upon an observation selected from the group of: the map definition specifies that extract-classes mode is active and expand-classes mode is active, the fxxt specification step specifies that extract-classes mode is active and expand-classes mode is active, and the map definition or the fxxt specification step specifies extract-classes mode and the map definition or the fxxt specification step specifies expand-classes mode during extraction; merging into said named derived ontology the set of references to second association instances in said named derived ontology and the set of references to first association instances in said first temporary derived ontology by combining all references to any same association instance into one reference with a weight summed from all of the references to the same association instance, yielding a set of unique weighted references to unique association instances in said named derived ontology; and removing all references to info-items from any temporary derived ontology that were merged into said named derived ontology;

xiii. moving classes to temporary class lists; and xiv. generating into said first temporary derived ontology a first set of zero or more unique references to non-cnxpt, non-association info-item classes based upon tuples in said first temporary class list of non-cnxpt, non-association info-item classes upon an affirmative observation selected from the group of: expand-classes mode is not active and extract-uninstantiated-classes mode is active;

m. merging into said named derived ontology the summarized references in every temporary derived ontology;

n. performing, prior to release of the resulting said named derived ontology to forest extraction and until no changes are made to the resulting said named derived ontology and one or more conditions are satisfied from conditions selected from the group of: said map definition states its treat-as-trigger-able setting as affirmative and a fifth fxxt listed on said map definition has a sixth fxxt specification step, a fifth fxxt listed on said map definition has a sixth fxxt specification step that is marked as trigger-able, a fifth fxxt listed on said map definition has a sixth fxxt specification step that has been determined to be trigger-able, and a fifth fxxt listed on said map definition has a sixth fxxt specification step that has been determined to be not-easily-determined; triggered interpretation of each sixth fxxt specification step of each fifth fxxt to determine, recursively, membership of an info-item in the resulting said named derived ontology;

o. invoking, if one or more conditions are satisfied from conditions selected from the group of: said map definition states its treat-as-trigger-able setting as affirmative and a fifth fxxt listed on said map definition has a sixth fxxt specification step, a fifth fxxt listed on said map definition has a sixth fxxt specification step that is marked as trigger-able, a sixth fxxt specification step of some fifth fxxt is registered for triggering, a fifth fxxt listed on said map definition has a sixth fxxt specification step that has been determined to be trigger-able, and a fifth fxxt listed on said map definition has a sixth fxxt specification step that has been determined to be not-easily-determined; extraction of a forest on the resulting said named derived ontology;

p. annealing by triggering all trigger-able actions, repeatedly until no changes are made in the resulting said named derived ontology during a round of triggering and when one or more triggering conditions occur, the condition selected from the group of: a change in the composition or consensus weighting of one or more associations in the resulting said named derived ontology upon a change made to the forest during forest extraction, a change in the set of or consensus weighting of one or more cnxpts in the resulting said named derived ontology upon a change made to the forest during forest extraction, a change of the forest forming during forest extraction, change of the consensus weighting of an association sufficient to require an altering of the set of associations already used for hierarchical tensor creation during forest extraction where the forest extraction is ordered by weight of association, and completion of a number of edge selections during forest extraction;

q. annealing, upon completion of forest extraction, by triggering all trigger-able actions, repeatedly until no changes are made in the resulting said named derived ontology during a round of triggering and when one or more triggering conditions occur, the condition selected from the group of: a change in the composition or consensus weighting of one or more associations in the resulting said named derived ontology upon a change made to the forest during a necessary repeat of forest extraction, a change in the set of or consensus weighting of one or more cnxpts in the resulting said named derived ontology upon a change made to the forest during a necessary repeat of forest extraction, a change of the forest forming during a necessary repeat of forest extraction, change of the consensus weighting of an association sufficient to require an altering of the set of associations already used for hierarchical tensor creation during a necessary repeat of forest extraction where the forest extraction is ordered by weight of association, and completion of a number of edge selections during a necessary repeat of forest extraction;

r. merging, upon completion of forest extraction and all fxxt specification step interpretations, wherein the map definition has general-association-acceptance-for-affinities mode indicated, the effective affinity strengths of associations between cnxpts, pair-wise, that are not in parent to child or grandparent to child relationships in the map by adding undirected affinitive associations carrying strength weights based upon the total strength weights of all associations found between those cnxpts, by pair in the commonplace, into the resulting said named derived ontology and summarizing associations between unique pairs of cnxpts;

s. merging, where the map definition has explode-able-classes mode indicated, upon completion of forest extraction and all fxxt specification step interpretations, each cnxpt class that has been instantiated during this extraction and that is not already present in the resulting said named derived ontology, into the resulting said named derived ontology, said each cnxpt class marked as explodable rather than only displayable; and t. exposing to the user the fxxt identity of the resulting said named derived ontology, as a data set, holding zero or more objects of types selected from the group of:

cnxpt instances, cnxpt classes, association instances, association classes, info-item instances, info-item classes, custom entities, and tensors; each with weights, sizing and positioning.

5. The method of claim 4 to determine a new extracted resultant derived ontology from an equation stating a boolean composite of two derived ontologies, wherein:

a. identifying a first and a second operand for an operation under consideration of said equation stating a boolean composite of two derived ontologies, in precedence order from highest to lowest, the operation selected from the group of:

i. identifying, for the highest precedence operation of said equation stating a boolean composite of two derived ontologies, the contents of a first derived ontology from a first fxxt extraction serving as a first operand and a second derived ontology from a second fxxt extraction serving as a second operand; and ii. identifying, for each lower precedence operation of said equation stating a boolean composite of two derived ontologies in precedence order, the contents of a first derived ontology from a first fxxt extraction serving as a and a second derived ontology from a second fxxt extraction;

b. determining a resultant derived ontology for the Boolean set operation under consideration, on operands said first derived ontology and said second derived ontology, the set operation considered selected from the group of:

i. performing a union operation, wherein:

01. generating a new first temporary derived ontology comprising a resultant association between a first cnxpt and a second cnxpt if an association between said first cnxpt and said second cnxpt exists in either of said first derived ontology from said first fxxt extraction or said second derived ontology from said second fxxt extraction, where a union Boolean set operation on said first derived ontology from said first fxxt extraction and said second derived ontology from said second fxxt extraction, wherein the resultant strength weight of the association is the sum of its strength weight from said first derived ontology if the association exists there plus its strength weight from said second derived ontology if the association exists there;

02. adding to said first temporary derived ontology a first cnxpt existing in either of said first derived ontology from said first fxxt extraction or said second derived ontology from said second fxxt extraction but where said first cnxpt is not a member of any association in either of said first derived ontology or said second derived ontology, where a union Boolean set operation is specified on said first derived ontology and said second derived ontology, wherein the resultant importance weight of said first cnxpt is the sum of its importance weight from said first derived ontology if said first cnxpt exists there plus its importance weight from said second derived ontology if said first cnxpt exists there;

ii. performing an intersection operation, wherein:

01. generating a new first temporary ontology comprising a resultant association between a first cnxpt and a second cnxpt if an association between said first cnxpt and said second cnxpt exists in both of said first derived ontology from said first fxxt extraction and said second derived ontology from said second fxxt extraction, where an intersection Boolean set operation on said first derived ontology from said first fxxt extraction and said second derived ontology from said second fxxt extraction, wherein the resultant strength weight of the association is the sum of its strength weight from said first derived ontology plus its strength weight from said second derived ontology;

02. adding to said first temporary derived ontology a first cnxpt existing in both said first derived ontology from said first fxxt extraction and said second derived ontology from said second fxxt extraction but where said first cnxpt is not a member of any association in either of said first derived ontology or said second derived ontology, where an intersection Boolean set operation is specified on said first derived ontology and said second derived ontology, wherein the resultant importance weight of said first cnxpt is the sum of its importance weight from said first derived ontology plus its importance weight from said second derived ontology;

iii. performing an exclusive-or operation, wherein:

01. generating a new first temporary derived ontology comprising a resultant association between a first cnxpt and a second cnxpt if an association between said first cnxpt and said second cnxpt exists in either but not both of said first derived ontology from said first fxxt extraction or said second derived ontology from said second fxxt extraction, where an exclusive-or Boolean set operation on said first derived ontology from said first fxxt extraction and said second derived ontology from said second fxxt extraction, wherein the resultant strength weight of the association is the strength weight from the derived ontology from where the association exists;

02. adding to said first temporary derived ontology a first cnxpt existing in either but not both of said first derived ontology from said first fxxt extraction or said second derived ontology from said second fxxt extraction but where said first cnxpt is not a member of any association in either of said first derived ontology or said second derived ontology, where an exclusive-or Boolean set operation is specified on said first derived ontology and said second derived ontology, wherein the resultant importance weight of said first cnxpt is its importance weight from said first derived ontology if said first cnxpt exists there or its importance weight from said second derived ontology if said first cnxpt exists there;

and iv. performing a set-minus operation, wherein:

01. generating a new first temporary derived ontology comprising a resultant association between a first cnxpt and a second cnxpt if an association between said first cnxpt and said second cnxpt exists in said first derived ontology from said first fxxt extraction but not in said second derived ontology from said second fxxt extraction in a set minus operation, wherein the resultant strength weight of the association is its strength weight from said first derived ontology;

02. adding to said first temporary derived ontology a first cnxpt existing in said first derived ontology from said first fxxt extraction but not in said second derived ontology from said second fxxt extraction, wherein said first cnxpt is not a member of any association in said first derived ontology, where a set-minus Boolean set operation is specified on said first derived ontology and said second derived ontology, wherein the resultant importance weight of said first cnxpt is its importance weight from said first derived ontology;

and c. present the result of the operation under consideration for use in the next lower precedence operation;

whereby a set operation generates a new derived ontology with a temporary fxxt name.

6. The method of claim 4 to also provide creation of a fxxt from the votes of a user, further including:

a. defining a new resultant fxxt for marking the results of interpreting the map definition when said user credentials permit, the resultant fxxt with an identity, and assigning to said new resultant fxxt the bundle of access rights to follow in allowing a user to utilize association instances and cnxpt instances;

b. adding zero or more votes regarding zero or more associations to the resultant fxxt by marking the zero or more associations with the resultant fxxt;

c. adding zero or more votes regarding zero or more cnxpts to the resultant fxxt by marking the zero or more cnxpts with the resultant fxxt;

whereby a user may subsequently apply a fxxt they have defined to a map to ensure the subjectivity of the map and to preserve their work.

7. The method of claim 1, further comprising defining an entity to be represented by a cnxpt;

whereby an entity of any nature including as a party to a transaction is made available as a binding point cnxpt; whereby an entity is involved in modeling; and whereby an entity is utilized in categ.orization.

8. The method of claim 1, wherein generating a map further comprises using a coefficient selected from the group of: a default of one, a variable with a numeric value, and an assigned real number, stating the proportionality of impact of a fxxt, to each fxxt within the subset of selected fxxts;

whereby a weight indicating a strength of consideration the associations marked by a fxxt listed in the map definition; whereby generating an organization of knowledge or a visualization from a map utilizes a combination, calculated pairwise by unique cnxpt pair, of the weights of the associations that are marked by fxxts in the set of fxxts listed in the map definition; whereby determining the latent variables positioning the cnxpts of a domain of knowledge into a logically correct 2 to 4 dimensional diagram satisfying the subjective perspective of a user or the objective perspective of a crowd forms a presentation; whereby varying perspectives of the commonplace information is presented to users requesting them.

9. The method of claim 1, wherein the organization of knowledge comprises a graph structure formed of cnxpts and associations represented by hierarchical tensors.

10. The method of claim 1, wherein the skeletal structure of a map comprises a forest structure formed of cnxpts and highest weighted summarized associations represented by hierarchical tensors;

whereby one or more spanning trees are formed from the summarized associations and connected cnxpts.

11. The method of claim 1, wherein the organization of knowledge comprises a forest of trees structure of cnxpts and associations.

12. The method of claim 1, wherein generating the organization of knowledge of a map further comprises computing a precedence directed acyclic graph from the summarized associations;

whereby a graphical representation of a decision tree, critical path analysis, non-iterative workflow or general precedence oriented structuring is produced; whereby generating an organization of knowledge or a visualization from a map utilizes a combination, calculated pairwise by unique cnxpt pair, of the weights of the associations that are marked by fxxts in the set of fxxts listed in the map definition; whereby determining the latent variables positioning the cnxpts of a domain of knowledge into a logically correct 2 to 4 dimensional diagram satisfying the subjective perspective of a user or the objective perspective of a crowd forms a presentation.

13. The method of claim 1, to generate a map combining a precedence graph with a hierarchy forest where at least one cnxpt exists in both precedence and hierarchy, further comprising:

a. generating, based upon a completed precedence graph map, one or more progression lines of precedence each bisecting a segment of a precedence graph, the segment a connected graph containing at least one result cnxpt representing a purpose selected from the group of: result, sink, outcome, effect, assembly, output, terminal step, completion, and endpoint; the progression lines of precedence parallel to the flow from start to completion of the flow of the segment;

i. generating, based upon a completed hierarchy forest map and a completed precedence graph map with at least one defined progression line of precedence, for hierarchical force directed determination, affinitive association based positioning vectors, wherein:

ii. forming a list, from associations resulting from fxxt and forest extraction, comprising all hierarchical association relationships not serving as the basis of hierarchical tensors in the structuring and all affinitive association relationships;

iii. summarizing all affinitive association list items of each cnxpt pair based upon absolute weight;

iv. forming an empty priority queue;

v. enqueueing on said queue an uncle roll-up association queue item and a cousin roll-up association queue item for each listed association having endpoints at different depths in the extracted forest;

vi. adding on said queue, for each first uncle association queue item in order, an additional uncle association queue item with the endpoint having less depth replaced by its parent until the depths of the endpoints of all uncle association queue items are no less than one level different and one uncle association queue item, derived from said first uncle association queue item, has been added having a from endpoint that is a root;

vii. replacing, for each cousin roll-up association queue item, the endpoint having greater depth with its parent until no cousin roll-up association queue item has endpoints having different depths;

viii. replacing, for each cousin roll-up association queue item, each endpoint by its parent for each cousin association queue item in order wherein the endpoint is not already a root and the parents of the endpoints are not the same cnxpt;

ix. generating, for each cousin roll-up association queue item for which each endpoint parent is the same as the parent of the other endpoint, a between-sibling-ring attractor tensor;

x. generating, for each cousin roll-up association queue item for which each endpoint is a root, a between-sibling-ring attractor tensor;

xi. generating, for each uncle roll-up association queue item, a to-uncle attractor tensor;

xii. summarizing all between-sibling-ring attractor tensors for each cnxpt pair;

and xiii. summarizing all to-uncle attractor tensors for each cnxpt pair;

b. rolling up, for precedence aspect force directed position determination, flow associations into flow roll-up precedence tensors to have an effect in positioning of forcing a cnxpt to be in a position relative to a predecessor on a map, wherein:

i. forming a precedence-basis list from associations resulting from fxxt extraction, comprising all hierarchical association relationships with a marking selected from the group of: dependency, process flow, causality, surrogate causality, conditioned-upon, and precedence;

ii. summarizing all precedence-basis list items of each cnxpt pair based upon weight;

iii. adding a list item to the precedence-basis list representing a relationship between a surrogate first cnxpt representing a fixed point of a timing, initiation, completion, or termination constraint or purlieu known for any second cnxpt and said second cnxpt, setting a timing factor for said second cnxpt to reflect a combination of the strength of the constraint and the direction of the constraint where a positive would reflect an initiation point or a termination constraint;

iv. computing, by a performance evaluation and review technique, a timing factor for each precedence relationship endpoint cnxpt, and a plurality of equal length phases delineating a sequence ordering appropriate to the precedence underlying the flow map wherein no more than one cnxpt or surrogate cnxpt of any precedence chain occupy a phase according to timing factor from the calculation of the technique;

v. generating, for each third cnxpt or surrogate cnxpt that is an endpoint of a list item of the precedence-basis list a precedence-aspect flow tensor relating the precedence map relative and phase defined representative fraction positioning in the precedence aspect point in the phase calculated to contain said third cnxpt corresponding to the timing factor from the calculation of the technique as computed for said third cnxpt, to said third cnxpt for precedence aspect positioning in map generation;

vi. forming an empty priority queue;

vii. enqueueing on said queue a flow uncle roll-up association queue item and a flow cousin roll-up association queue item for each listed precedence-basis list item having endpoint cnxpts at different phase sequence depths;

viii. adding on said queue, for each first flow uncle association queue item in order, an additional flow uncle association queue item with the endpoint having less phase sequence depth replaced by its predecessor until the phase sequence depths of the endpoints of all flow uncle association queue items are no less than one level different and one flow uncle association queue item, derived from said first flow uncle association queue item, has been added having a from endpoint that is the earliest listed endpoint cnxpt or earliest predecessor endpoint cnxpt in a chain;

ix. replacing, for each flow cousin roll-up association queue item having endpoints at different phase sequence depths, the endpoint having greater phase sequence depth with its predecessor, until every flow cousin roll-up association queue item either has at its endpoints equal endpoint predecessors or has at each endpoint either the earliest listed endpoint cnxpt or earliest predecessor endpoint cnxpt in a chain;

x. summarizing all flow cousin roll-up association queue item for each cnxpt pair to form one queue item with a summed weight;

xi. generating, for each remaining flow cousin roll-up association queue item for which each endpoint predecessor is the same as the predecessor of the other endpoint, a flow between-sibling-ring attractor tensor;

xii. generating, for each remaining flow cousin roll-up association queue item for which each endpoint is either the earliest listed endpoint cnxpt or earliest predecessor endpoint cnxpt in a chain and for which the endpoint predecessors are not the same, a flow to-uncle attractor tensor where the uncle is the endpoint with the least phase sequence depth;

xiii. generating, for each flow uncle roll-up association queue item, a flow to-uncle attractor tensor where the uncle is the endpoint with the least phase sequence depth;

xiv. summarizing all flow between-sibling-ring attractor tensors for each cnxpt pair;

and xv. summarizing all flow to-uncle attractor tensors for each cnxpt pair;

and c. generating, for map segment force directed position attractor determination, flow tensors based upon previously established map segmentations, wherein:

i. generating a flow tensor for the earliest or senior precedence cnxpt or surrogate cnxpt in the first segment to a flow aspect position according to a predetermined setting of a predetermined value to set a starting point for the flow positioning of the precedence map relative to a precedence map segment position for the start of the progression line of precedence, parallel to the progression line of precedence;

ii. forming a flow-positioning-basis list;

iii. adding to the flow-positioning-basis list associations resulting from fxxt extraction, comprising all hierarchical association relationships with a marking selected from the group of: flow positioning and map segment positioning; made into hierarchical tensors wherein the hierarchical association was a flow, setting a weight on said list item to reflect the relative distance from its identified segment centroid in said defined map segmentation;

iv. adding a list item to the flow-positioning-basis list representing a relationship between a surrogate first cnxpt representing a fixed identified segment centroid in said defined map segmentation known for any second cnxpt and said second cnxpt, setting a weight to the list item to reflect a combination of the strength of the constraint and the direction of the constraint where a positive would reflect an attraction and a negative would reflect a repulsion constraint;

v. adding to the flow-positioning-basis list entries positioning precedence relation endpoint cnxpts utilizing a flow positioning function, wherein if neither the predecessor of a predecessor endpoint cnxpt nor the predecessor endpoint cnxpt has been positioned perpendicular to the process flow line then a flow aspect position relative to a default map edge is assigned to the predecessor;

and vi. generating a flow tensor for each association in the flow-positioning-basis list to a flow aspect position as defined in the list item;

whereby tensors are created to force the ancestors of a cnxpt in a hierarchical presentation to be in positions; whereby tensors are created to force the predecessors of a cnxpt in a directed graph presentation to be in positions; whereby generating a map for a domain of wisdom structured as an organization of knowledge of cnxpts results in one or more forms from: a list, a hierarchical manner, a directed graph manner, or a structure comprising a combination thereof; whereby the form generated is based on information derived from the included cnxpts and the stated relationships among those cnxpts;

whereby positional relationships between cnxpts are determined from associations of one or more of the types: hierarchical, flow, precedence, directed, undirected, and affinitive.

14. The method of claim 1 to also construct a flow map, further including:

a. assigning a cnxpt pair to a flow by relating the cnxpt pair with a directed association, and performing a marking selected from the group of: marking the association as a flow of type, marking the association as a member of a fxxt usable as a source for flow associations in one or more map definitions, marking the cnxpts of the cnxpt pair as usable in a flow of type, and setting one or more trait trxrts for each cnxpt of the cnxpt pair with a meaning that the cnxpt is usable in a flow of type;

b. forming zero or more property values for one or more of said cnxpts in one or more of the cnxpt pairs related by a flow association;

c. forming zero or more time frame epochs for one or more of said cnxpts in one or more of the cnxpt pairs related by a flow association;

d. forming zero or more purlieu purxpts for one or more of said cnxpts in one or more of the cnxpt pairs related by a flow association;

e. detailing a map definition specifying a result to be a flow of type;

f. specifying, for the map, a dimensionality for the map and the elastic surface selected from the group of: two dimensions, three dimensions, and four dimensions;

g. specifying, for the map, a graphing technique to be used for the positioning of map artifacts;

h. specifying, for the map, an elastic surface view and an area on the canvas of the elastic surface view to be occupied by the map;

i. specifying, for the map, a representative fraction structure for the canvas of the elastic surface related to said flow;

j. specifying, for the map, a policy regarding directionality of associations for the purpose of positioning, the policy selected from the group of: utilize the sense of the association as stored in the commonplace, and invert the sense of the association as stored in the commonplace;

k. specifying, for the map, a policy regarding utilization and pruning of hierarchical associations in the flow specific in the forming of the spanning forest skeletal structure during forest extraction for the purpose of positioning, the policies applied to the summarized associations in the flow based derived ontology, the policy selected from the group of: utilize highest summarized strength hierarchical associations first, utilize highest absolute value summarized strength hierarchical associations first, utilize least strength summarized hierarchical associations first, utilize lowest absolute value summarized strength hierarchical associations first, utilize a custom ordering for hierarchical associations and utilize a custom algorithm for ordering of the hierarchical associations;

l. specifying, for the map, the orientation of the map on the elastic surface selected from the group of: vertical for a single forest, horizontal for a single forest, 3D depth wise, and 4D depth wise, a custom orientation, waterfall display, data flow display, PERT, and an orientation defined for a specific domain of wisdom;

m. specifying, for the map, the directional orientation of the map selected from the group of: root first in horizontal, root on top in vertical, root last in horizontal, and root on bottom in vertical;

n. specifying, for the map, a policy for setting a distance between the child cnxpts of a parent cnxpt, the children and parent cnxpts related by flow tensors, the policy selected from the group of: using a constant spacing, using algorithms for spacing children esthetically within the confines of the parent, and using a result of an equation to set spacing involving a factor selected from the group of: the depth of the child, the importance weight of the child, the strength weight of the flow tensor connecting the child to the parent, the prior position of a child cnxpt, the distance separation implied by the properties of the flow tensor, the distance separation implied by the properties of each cnxpt of the pair of cnxpts, a constant to constrain the depth of a level of children cnxpts, and the count of children on a level;

o. specifying, for the map, a policy for setting a distance between the cnxpts of the pair of cnxpts related by a flow tensor, the policy selected from the group of: by time separation specified by the flow tensor, by time separation implied by the properties of the flow tensor, by time separation implied by the properties of each cnxpt of the pair of cnxpts, using algorithms for setting distances esthetically, by the result of an equation having as a factor the existence in a sequence of a cnxpt of the pair of cnxpts related by a flow tensor, by an equidistant spacing, by a default constant, by computing self-organized mapping based upon associations of the initial cnxpt with other cnxpts without parents, and by a set constant, and by the result of an equation having a factor selected from the group of: the prior position of a child cnxpt, the depth of a cnxpt of the pair of cnxpts related by a flow tensor, the distance separation specified by the flow tensor, the distance separation implied by the properties of the flow tensor, the distance separation implied by the properties of each cnxpt of the pair of cnxpts, the strength weight of the flow tensor, the importance weight of a cnxpt, a constant to constrain the breadth of a level of children cnxpts, and the count of children on a level;

p. specifying, for the map, a policy for setting a size for displayed cnxpts in terms of elastic surface representative fractional segments relative to other cnxpts, the policy selected from the group of: using algorithms for setting distances esthetically, and by the result of an equation having as a factor the properties of a cnxpt of the pair of cnxpts related by a flow tensor, by the result of an equation having as a factor the depth of a cnxpt of the pair of cnxpts related by a flow tensor, by a default constant, and by a set constant;

q. selecting a map definition specifying a flow of type;

r. performing fxxt extraction, generating, using said map definition referencing the set of zero or more fxxts, a derived ontology for one or more domains of wisdom by extracting references to one or more associations and two or more cnxpts into the derived ontology;

s. generating, using said map definition referencing the set of zero or more fxxts, a flow specific derived ontology for the one or more domains of wisdom by reprocessing the associations processed during fxxt extraction to summarize only directed associations for the type of flow sought, including directed associations from fxxts designated before or during extraction as for the type of flow sought by the definition of said map, placing references to one or more summarized flow specific associations and two or more cnxpts into the flow specific derived ontology;

t. inverting, for the purpose of positioning cnxpts, depending upon the flow type and the directional orientation policy specified in said map definition, the sense of the association directionality for all hierarchical associations in the flow specific derived ontology;

u. generating, using said map definition policies, from the summarized hierarchical associations in the flow specific derived ontology, hierarchical tensors forming a skeletal structure for a map instance for said one or more domains of wisdom wherein the resulting map skeletal structure of said map instance is based upon map policies regarding the manner of analysis selected from the group of: a spanning forest manner, a descendent forest manner, an enhanced descendent forest manner, an ascendant forest manner, an enhanced ascendant forest manner, and a structure comprising a combination thereof;

v. generating structuring tensors, using said map definition referencing the set of zero or more fxxts, to structure one or more organizations of knowledge for a map instance for said one or more domains of wisdom in the flow specific derived ontology wherein the resulting map structure of said map instance is based upon a manner of map assembly specified by the map definition, the manner selected from the group of: a spanning forest manner, a hierarchical manner, an enhanced descendent forest manner, an enhanced ascendant forest manner, a vertical manner, a directed graph manner, a graph manner, a horizontal manner, a depth augmented manner, a time augmented manner, a purlieu augmented manner, and a structure comprising a combination thereof;

w. determining, for each cnxpt in one or more of the cnxpt pairs related by a flow tensor in the spanning forest, the set of elastic surface representative fractional fragments indicated by the map policies and the properties of said cnxpt, if any, to set the strength weight and length of the flow tensor to indicate the policy driven approximate positioning for said cnxpt to be positioned in a fictitious elastic surface canvas for said flow;

x. determining from the policies of the map definition the basis for calculating roll-up, utilizing re-inverted sense or un-inverted generated hierarchical tensors from tree-extraction to prepare for roll-up to ensure that the root is considered as top and leaves are at the bottom logically;

Y. generating flow roll-up tensors, and summary flow tensors with weights for enforcing the child cnxpt's anchoring location on said elastic surface during positioning on said map by anchoring a parent cnxpt to a representative fractional segment of said fictitious elastic surface canvas based upon said child's anchoring location;

z. generating positioning for domain of wisdom member cnxpts according to process trees for organization of knowledge generation, position determination and final sizing means for calculation, based upon policies stated in the map definition, wherein said positionings of said cnxpts of the cnxpt pairs related by a flow tensor are computed by tree of the forest, the tree placed into a representative fractional segment of said fictitious elastic surface canvas for initial computation only, each tree of said map according to information selected from the group of: the map definition, information associated with each cnxpt by trait or time frame or purlieu or property, and information derived from outside of said cnxpt;

aa. determining, independently for each tree of the spanning forest, the canvas size of the segment of the representative fractional segment of said elastic surface needed to display the tree for each tree of the forest, the dimensionality of the canvas specified in the map definition, the canvas dimensionality selected from the group of:

i. positioning a canvas having two dimensions, wherein:

01. determining the length needed in common for all segments, the length based upon the initial positioning of each tree of the spanning forest structured organization of knowledge for the map instance, the length as a representative fractional segment of said elastic surface canvas in the direction of flow parallel to the process flow line or line of precedence progression and between the latest outcome or outflow as root and the earliest cause or input as leaf, determining the representative fractional segment of said elastic surface canvas required to display the length of flow between that root and leaf, although said root and said leaf may not be in the same tree;

02. determining, for each tree of the spanning forest structured organization of knowledge for the map instance, based upon the initial positioning, the representative fractional segment of said elastic surface canvas perpendicular to the process flow line or line of precedence progression showing direction of flow in each segment for the set of cnxpts occupying each level of the positioned tree structure in the segment, selecting the greatest distance from all levels as the segment breadth for the tree;

03. choosing the placement of segments for assembly breadth wise, each segment length parallel to the direction of flow, the length of the segments all equal, aligning the levels of all trees by time or other marker of the flow to account for start or end delays or similar differences, obtaining an offset for each tree to apply to the initial positioning of each tree to obtain final positions;

ii. positioning a canvas having three or four dimensions, wherein positioning is completed using algorithms for setting distances esthetically between siblings, and parents in a specified graphing technique by the map definition;

01. deriving a position of a root cnxpt instance in an extracted forest of extracted trees of cnxpt instances based on hierarchical tensors created where a cnxpt instance that is not seen on any tensor in a child role is taken to be a root of an extracted tree and one of a set of root cnxpt instances where more than one extracted trees exist in said extracted forest, wherein the empty canvas upon which the forest is to be displayed is divided proportionally to the importance of such roots, the centrality of placement on the empty canvas is selected from the group of:

for hierarchical forests, the root of greatest importance is placed at the center of the canvas;

for hierarchical forests, the root of greatest importance is placed at the center of mass of the canvas based upon the translation of importance of roots to mass for the calculation;

for hierarchical forests, where a plurality of the roots have a trait usable as a depth offset determiner from one base root, the base root is placed at the center of the canvas;

for precedence forests, the root of greatest importance is placed at the center of the canvas;

for precedence forests, the root of greatest importance is placed at the center of mass of the canvas based upon the translation of importance of roots to mass for the calculation;

for precedence forests, where a plurality of the roots have a trait usable as a depth offset determiner from one base root, the base root is placed at the center of the canvas;

for precedence forests, of those dependent cnxpt instances having more than one precedent cnxpt instance in the enhanced descendent forest for the extracted precedence forest and having a first precedent root in a first extracted tree different from a second extracted tree holding a second precedent root for said dependent cnxpt instance, initially select as a dependent second cnxpt instance the dependent cnxpt instance with the greatest difference in depth from said first precedent root and said second precedent root where the depth from said first precedent root is greater, and place said first precedent root at the center of the canvas;

and for precedence forests, of those dependent cnxpt instances having more than one precedent cnxpt instance in the enhanced descendent forest for the extracted precedence forest and having a first precedent root in a first extracted tree different from a second extracted tree holding a second precedent root for said dependent cnxpt instance, initially select as a dependent second cnxpt instance the dependent cnxpt instance with the greatest difference in depth from said first precedent root and said second precedent root where the depth from said first precedent root is greater, finding all such first precedent roots having the greatest depth, and place one such first precedent root at the center of mass of the canvas based upon the translation of importance of all such first precedent roots to mass for the calculation;

02. determining an error from a possible better position based upon factors selected from the group of: out of region distance, cnxpt sizing, cnxpt overlap, Euclidean distance from centroid of a child cnxpt to a prior position, Euclidean distance from centroid of a first sibling cnxpt to centroid of a second sibling cnxpt, Euclidean distance from centroid of an uncle to centroid of a child cnxpt, Euclidean distance from centroid of a parent to centroid of a child cnxpt, Euclidean distance from a parent centroid to an uncle, precedence positioning by Euclidean distance from centroid of a precedent cnxpt to centroid of a successor cnxpt, Euclidean distance from centroid of a cnxpt to centroid of a constraint surrogate cnxpt, Euclidean distance from centroid of a child cnxpt to centroid of a representative fraction of the map visualization canvas where cnxpt belongs, and flow positioning;

03. deriving a position of a child cnxpt in an extracted forest of extracted trees of cnxpts based on tensors of the child cnxpt with cnxpts selected from the group of: parent cnxpt of the child cnxpt, an uncle cnxpt of the child cnxpt, a predecessor cnxpt, a position constraint, a constraint surrogate cnxpt, and a sibling cnxpt of the child cnxpt;

04. modifying the organization of knowledge and the visualized map based on the positioning of the cnxpt;

and 05. updating positions with changes that have the best error reduction effect, until an error metric is reduced to a sufficient level or the descent is limited in its improvement per cycle, or a maximum number of change iterations has occurred;

and bb. providing to the user said one or more domains of wisdom for utilization;

whereby the ability is provided to place objects for a 2D, 3D, or 4D map in a position related to the ordering of said object directly or relative to the positioning of others in a flow; whereby generating an organization of knowledge or a visualization from a map utilizes a combination, calculated pairwise by unique cnxpt pair, of the weights of the associations that are marked by fxxts in the set of fxxts listed in the map definition; whereby determining the latent variables positioning the cnxpts of a domain of knowledge into a logically correct 2 to 4 dimensional diagram satisfying the subjective perspective of a user or the objective perspective of a crowd forms a presentation; whereby a cause independent Bayesian network with mechanisms ordered by strength to effect weak cause elimination may be drawn automatically.

15. The computer-implemented method of claim 14, further comprising:

a. depicting said at least one a priori event as a cnxpt in a precedence flow forest wherein said cnxpt is a root in the forest in the organization of knowledge and is shown on a flattened map visualization depicting a directed graph of Bayesian network, wherein said cnxpt is at an edge of the flattened map visualization if it is the last determinative a priori event resolved at a pre-determined point in time prescribed as being the time shown for consideration of circumstances prior to resolution of the likelihood of an a posteriori event on the visualization of the map.

16. The method of claim 1 to generate a Bayesian belief network, further comprising:

a. generating a flow map from cnxpts and associations from a commonplace, at least one cnxpt representing a cause, at least one cnxpt representing an effect, at least one association representing a mechanism or conditionality between an at least one cnxpt representing a cause and an at least one cnxpt representing an effect, the cnxpts as variable events and inbound associations as indicators of conditional dependencies wherein the weight of an inbound association when normalized provides a relative probability of the conditioned event among the set of inbound associations for the conditioned event; a property of a cnxpt as variable event stating a reward for expectation analysis;

b. making available to the user the map and accompanying data structures;

whereby subject matter indicating a flow is organized into a directed graph for positioning and display, with accompanying spanning forests and directed graph networks to be utilized for developing models and improving understanding.

17. The method of claim 16 to also provide for determining a chain of a priori justifications and a posteriori results to determine a likelihood that a hypothesis is correct by generating a Bayesian network from a commonplace, further comprising:

a. extracting one or more subsets of association instances between cnxpt instances from a commonplace, each subset described by a fxxt, wherein at least one association instance extracted is in a subset defined by a fxxt which states that a first cnxpt instance on a first role of the association instance affects the condition of a second cnxpt instance on the opposite, second role in the association instance in a proportion determinable by the association instance's weight, the presence of the effect on said second cnxpt instance by said first cnxpt instance termed a dependency, said effect termed a surrogate causality, said second cnxpt instance termed an event outcome;

b. determining a conditionality dependency association instance consensus by summarizing the weights of all instances of dependency association instances between each pair of a first cnxpt instance and a second cnxpt instance where said pair exists in the extracted set of association instances, according to utilize collective consensus through vote tallying means;

c. summarizing the weights of all instances of non-dependency association instances between each pair of a first cnxpt instance and a second cnxpt instance where said pair exists in the extracted set of association instances, according to utilize collective consensus through vote tallying means;

d. considering only conditionality dependency association instances, form hierarchical surrogate causality chains based upon most heavily weighted summarized dependency association instances according to fxxt basic descendant spanning tree extraction means;

e. considering only conditionality dependency association instances not used already for tree formation, form secondary hierarchical surrogate causality chains based upon these remaining summarized dependency association instances according to build enhanced descendant spanning trees means;

and f. calculating likelihood of each dependent event outcome;

whereby subject matter organized into Bayesian networks is utilized for developing models.

18. The method of claim 1 to predict a best decision tree choice from a decision tree, further comprising:

a. defining a knowledge model comprising a set of one or more fxxts based on information stored regarding a required decision, the information stored comprising a plurality of cnxpts and a plurality of associations, a plurality of cnxpts and a plurality of associations are marked with at least one fxxt of said set of one or more fxxts based on information stored regarding said required decision;

b. defining a map specifying use of said set of one or more fxxts based on information stored regarding said required decision, the map definition specifying that the map instances generated from it will be of type decision tree and will have organizations of knowledge selected from the group of: a spanning forest manner, a hierarchical manner, an enhanced descendent forest manner, an enhanced ascendant forest manner, a vertical manner, and a horizontal manner;

c. generating, using said map definition, a map instance from the commonplace wherein each node is a cnxpt of a type selected from the group of:

i. a question;

ii. a potential completion of a user decision regarding a question that would be reached if the question was answered in a particular manner, the completion having zero or one reward values, the completion having zero or more outbound associations;

iii. a determination required before a question may be answered, an association between determination and question that would be reached if the determination had a particular result;

iv. an a priori event reached by a user decision regarding a question that would be reached if the question was answered in a particular manner;

v. a termination event reached as a result of any non-terminal node;

and vi. an outcome that is a posteriori event having a calculable expectation value and conditioned on an a priori event;

vii. wherein a potential completion may also be a type of combined node when it also functionally serves as a type selected from the group of: question, determination, an a priori event, and outcome;

viii. wherein a potential completion will be regarded as a combined node when it has a single outbound association to a type selected from the group of: question, determination, an a priori event, and outcome;

ix. wherein transitions are represented by associations, providing a way to progress from one node to another, each transition having a starting role filled by a cnxpt representing a beginning state, a strength weight stating a likelihood that the association will be utilized, and an end role filled by a cnxpt representing a ending state, if a cnxpt has no outgoing associations then attaining that node ending state, the answer will result in the completion of the tree;

x. wherein the outbound associations from any node are strength weighted with a likelihood that a particular result is attained from the node, the likelihood based upon a stated probability density or mass function, the default of the likelihood for all associations leaving the node is (1 minus the sum of all likelihoods for the node with a value)/(the count of likelihood values for the node requiring a default), the sum of all strength weights of associations leaving the node normalized to be 1;

d. providing to the user a chart of expected values based upon the Bayesian or probabilistic ramification of each answer available and each determination outcome and the reward value of an outcome;

e. simulating by a model the Bayesian network from a commonplace to determine expectation values for outcomes, the model based upon determination results and answers previously received at the point of an interaction;

and f. accepting answers to questions, determination results, outcomes of a priori events, and determining the present state of the decision model by determining the potential completion or termination event was reached based upon input;

g. and updating the state and expected rewards available;

whereby a decision tree may be constructed automatically from a commonplace with a defined map definition and a defined fxxt structure; and whereby the decision tree is susceptible to improvement by analytics available to improve the understanding of the decision tree, while the fxxt structure would allow an amalgam of analytic restructuring and original structure for the decision tree.

19. The method of claim 18 to also provide for determining decision tree outcomes, further comprising:

a. extracting a plurality of subsets of associations between cnxpts from a commonplace, each subset described by a fxxt, wherein at least one association extracted defines a decision rule stating that a first cnxpt holding a role on a first end of the decision rule association is a decision point for making alternative choices one of which is the choice of the outcome state defined by the second cnxpt holding a role on the opposite, outbound second end in the decision rule association; said first cnxpt role on the association termed a decision, criteria, cause or source state node role depending upon mode in the map definition; said second cnxpt role termed an answer, case, a specifically valued factor, classification, chance, effect, action, event, or choice outcome state node role depending upon mode in the map definition; said connection between said first cnxpt and said second cnxpt termed a decision rule, a source of decision, a belief from a line of reasoning, mechanism, decision rule, or a choice availability depending upon mode in the map definition; the decision rule association's strength weight providing a value of type selected from the group of: information gain, cost complexity measure, the relative quality of the choice of one second cnxpt versus all other second cnxpts, a delay, a cost, a utility, a relative likelihood of the alternative, or the odds of being chosen as a decision depending upon mode in the map definition;

b. multiplying, for each subset of associations obtained from a fxxt, the strength weight of all associations in the subset by a coefficient indicating a proportionality of impact stated for the fxxt in the map definition, according to apply fxxt specification means;

c. determining a consensus regarding each decision rule by summarizing the strength weights of all instances of decision rule associations between each pair of a first cnxpt and a second cnxpt where said pair exists as having roles in at least one decision rule association in the extracted set of associations, according to utilize collective consensus through vote tallying means;

d. summarizing the strength weights of all instances of non-decision rule associations between each pair of a first cnxpt and a second cnxpt where said pair exists as having roles in at least one non-decision rule association in the extracted set of associations, according to utilize collective consensus through vote tallying means;

e. performing forest extraction, considering only decision rule associations, to form decision rule hierarchical tensors representing decision rule associations from source state to choice outcome state based upon most heavily weighted summarized associations representing decision rules according to fxxt basic descendant spanning tree extraction means;

f. forming, considering only decision rule associations not already causing a decision rule tensor for forest formation, second hierarchical decision rule tensors based upon any remaining summarized decision rule associations from source state to choice outcome state according to build enhanced descendant spanning trees means to provide secondary effect indications if called for in the map definition;

g. normalizing, if called for by the mode in the map definition, the strength weights for all inbound hierarchical decision rule tensors having a second role filled by the same third cnxpt so that the sum of strength weights is one;

h. applying a simplification algorithm if called for in the map definition;

and i. generating a map based upon the forest extraction, the map providing a decision tree formed from a commonplace;

whereby subject matter organized into decision tree networks is utilized for developing models.

20. The method of claim 1, further including:

a. multiplying, for each subset of associations in a map obtained from a first fxxt, the weight of all associations in the subset by a coefficient indicating a proportionality of impact stated for the fxxt in the map definition underlying the map, according to apply fxxt specification means;

whereby quality of a prediction is altered by adjusting the weight of beliefs input.

21. The method of claim 1, to determine relevance of documents by culling, further including:

a. showing a new cnxpt internal to and smaller than an older cnxpt as smaller indicating that said older cnxpt is representing an idea that is actually a context or category, and as said new cnxpt is representing an offshoot idea.

22. The method of claim 1 further comprising:

a. arranging an identified first cnxpt that is a general categorization of one or more specific identified second cnxpts to logically portray containment of each second cnxpt by said first cnxpt;

and b. arranging an identified third cnxpt that represents a concept close in meaning to the concept represented by an identified fourth cnxpt to be located relatively closer to said fourth cnxpt compared to an identified fifth cnxpt representing a concept having a less similar meaning, to logically portray semantic similarity by the structuring of the map, further including:

i. arranging the third cnxpt that represents a concept nearly identical in meaning to the concept represented by the fourth cnxpt according to the structuring of the map shown to be located very close together to said fourth cnxpt compared to the fifth cnxpt;

and ii. arranging the third cnxpt that represents a concept indistinguishable in meaning from the concept represented by the fourth cnxpt according to the structuring of the map shown to be located largely overlapping said fourth cnxpt with an indication to a viewer of the apparent redundancy;

whereby the map indicates recognizable similarities and differences between concepts represented by cnxpts; whereby the appearance of a cnxpt indicates its identity although cnxpts may be made more distinguishable by a display trait such as: color, size, texture, avatar, position, shading, transparency, context membership, or labeling.

23. The method of claim 22 to relate entities of schemas of disparate data sources where entities have no significant differential in meaning in a specific use case, further including:

a. calculate consensus and impute associations, including preparing at least one consensus organization of knowledge of at least said domain of wisdom from said commonplace containing a first disparate data source and a second disparate data source and at least one pair of a first cnxpt representing a first entity from said first disparate data source and a second cnxpt representing a second entity from said second disparate data source wherein said first entity is very similar to said second entity, by calculating the consensus on the associations of said domain of wisdom according to utilize collective consensus through vote tallying means;

b. causing said first cnxpt to appear very near to said second cnxpt in the organization of knowledge according to map generation means;

and c. providing access to said organization of knowledge;

whereby users are assisted in uniting entities that are very similar by receiving an indication of similarity; whereby automation of entity reconciliation and record linkage are enabled; whereby a subset of closely related cnxpts may be represented by a cntexxt represented by a cnxpt; whereby deriving a consensus based harmonization is significantly aided but normally requires interactions with the generated organization of knowledge or visualization by the user.

24. The method of claim 1 to also provide for determining decision tree classifier structures, further comprising:

a. performing a fxxt extraction resulting in an extracted derived ontology;

b. performing a skeletal structuring to form a classifier forest map;

c. defining as a goal form of cnxpt a classification required by stating goal traits for matching to a classification; and d. walking from root to leaf of the skeletal structuring, choosing a branch in the classifier forest map based upon choosing a child having a trait matching a trait of the goal;

whereby a classifier is provided for matching based upon a match of a plurality of traits.

25. The method of claim 1 to compute a metric for satisfaction of need in a competitive scenario, wherein:

a. generating a first map instance having a first modeling forest of a first organization of knowledge for a domain of wisdom having one or more first cnxpts, each first cnxpt representing a first bundle of ways to satisfy a requirement of a second type, each first cnxpt competing with other first cnxpts;

b. generating a second map instance having a second modeling forest of a second organization of knowledge for a domain of wisdom having one or more second cnxpts, each second cnxpt representing a bundle of requirements satisfied by the ways of a first bundle; and c. imputing, via references in an equation in a property of a first cnxpt summing a property in some third set of second cnxpts representing the proportion of requirements of a second type that said first cnxpt may competitively satisfy, the third set formed by a factor selected from the group of: time frame, geographic area, location in space, temperature range, demographic, marketplace, market segment, fuzziness, anticipated, actuals, set membership, veracity, definer, existence probability, custom grouping of requirements, custom classification, age, provenance, and owner;

d. reporting as a property value of each first cnxpt the competitive satisfaction anticipated;

whereby a calculation of values according to the target organization of data of one domain of wisdom is based at least in part upon the values obtained from wisdom of the plurality of a different organization of knowledge; whereby specific types of relationships and specific extractions yield imputable values found in a source cnxpt serving as a computation cell for a first domain of wisdom to a target cnxpt serving as a computation cell; and whereby the availability of a multi-organization of knowledge system provides values otherwise unavailable; whereby the relationships by associations between cnxpts in different domains of wisdom and the appearance of particular cnxpts in each of two or more different domains of wisdom of the commonplace are useful for calculating in models with higher dimensionality and complexity.

26. The method of claim 25 to also form a value estimate of a tcept, further comprising:

a. calculating, by imputation of a summed value from appcepts in the second organization of knowledge that have estimates of value and are related by a satisfaction of need relationship to a tcept in the first organization of knowledge, the total value of a tcept;

whereby prediction by value of applications of technology is imputed to determine competitive values of technologies satisfying the requirements of a set of applications; whereby the competitive value may be based upon any desired breakout or timeframe; and whereby the technologies and applications of technologies need not be from the present or past.

27. The method of claim 1 to perform multi-basis modeling on the basis of a plurality of single organization of knowledge modeling maps, further including:

a. generating a first map instance having a first modeling forest of a first organization of knowledge for a domain of wisdom having a first cnxpt;

b. generating a second map instance having a second modeling forest of a second organization of knowledge for a domain of wisdom having a second cnxpt; and c. imputing, via relationships between cnxpts of said first modeling forest and cnxpts of second modeling forest, values of a property of said first cnxpt into a calculation for a property of said second cnxpt;

whereby a forest based model is augmented to model multiple forests in a manner allowing for imputation of information between perspectives; whereby a calculation of values according to the target organization of data of one domain of wisdom is based at least in part upon the values obtained from another domain of wisdom of the plurality of organizations; whereby specific types of relationships and specific extractions yield imputable values found in a source cnxpt serving as a computation cell for a first domain of wisdom to a target cnxpt serving as a computation cell; and whereby the availability of a multi-organization of knowledge system provides values otherwise unavailable; whereby the relationships by associations between cnxpts in different domains of wisdom and the appearance of particular cnxpts in each of two or more different domains of wisdom of the commonplace are useful for calculating in models with higher dimensionality and complexity.

28. The method of claim 1, to also provide information collection and categorization, further including:

a. creating a hierarchical association between a first cnxpt becoming a category and a second cnxpt becoming a member of the category, wherein said first cnxpt holds a from role on said hierarchical association and said second cnxpt holds a to role on said hierarchical association, wherein the relationship represented by said hierarchical association provides the structure for a categorization in said commonplace, wherein said second cnxpt holds the role on said association info-item defining a locatable sub-category of said first cnxpt; and b. attaching additional information to said second cnxpt becoming a member of the category represented by said first cnxpt;

wherein the additional information is available by access through said second cnxpt;

whereby a catalog is developed and information found is added allowing user to access said information through a categorized cnxpt providing an index of information searchable by association.

29. The method of claim 1, wherein organizing the plurality of contexts comprises:

a. identifying relationships between the cnxpts;

b. mapping cnxpts onto a lower dimensional shape using as shapes the cntexxts represented by cnxpts and generated by map generation techniques placing similar cnxpts in closer proximity than dissimilar cnxpts;

c. forming clusters from cntexxts at one or more depths of the organization of knowledge; and d. highlighting neighboring cnxpts corresponding to the plurality of cntexxts which form a network of clusters;

whereby a subset of closely related cnxpts are represented by a first plurality of avatars corresponding to the subset of information included in at least one cntexxt in the subset of the plurality of cntexxts in the second portion of the display screen and a different subset of more closely related cnxpts are represented by a second plurality of avatars corresponding to a second plurality of a different subset of information included in at least one cntexxt in a different subset of the plurality of cntexxts in the second portion of the display screen having a higher relevance score than a first subset of closely related cnxpts.

30. The method of claim 1 to cause a map revision, further comprising:

a. summarizing the weights, according to utilize collective consensus through vote tallying means, of all association instances between each pair of a first cnxpt and a second cnxpt where said pair exists in the extracted set of association instances in said domain of wisdom;

b. forming said organization of knowledge;

c. accepting a vote of the user intending to modify the organization of knowledge based on a perception of an inaccuracy via a change interaction selected from the group of: change of said organization of knowledge, and change made in said visualization;

d. adding the vote to said commonplace and into said derived ontology; and e. generating a new organization of knowledge comprising a new consensus among the existing said organization of knowledge and said vote interaction, wherein user said vote is considered according to utilize collective consensus through vote tallying means;

whereby improvements to the commonplace stem from consensus and maps are altered after sufficient changes are made through user votes, whereby the vote a user makes to the data of a map is added into the domain of wisdom that is used for displaying the map.

31. The method of claim 1 to also form a data set of values of latent variables giving positioning of cnxpts in a map perspective satisfying to a user, further including:

a. detailing a map definition specifying said organization of knowledge to produce for said domain of wisdom;

b. structuring said commonplace to extract content by marking zero or more associations and zero or more cnxpts of said commonplace with fxxt identities;

c. interpreting said map definition for each referenced fxxt to extract said map from said commonplace by including cnxpts and associations found marked with said each referenced fxxt according to apply fxxt specification means, wherein the interpreting obtains all associations of said domain of wisdom although an association is not directly market by a referenced fxxt, wherein the interpreting obtains all cnxpts of said domain of wisdom although a cnxpt is not directly market by a referenced fxxt;

d. choosing structuring propositional hierarchical associations from the marked associations accumulated of said map to form an organization of knowledge structure by generating hierarchical tensors;

e. determining affinitive tensors by calculating rollups to direct positioning guidance according to calculate bottom up importance metrics for cnxpt categories means;

f. generating map specific organization of knowledge latent position variable values for cnxpts for generating visualization;

g. generating a visualization for display for said map; and h. presenting visualization for utilization;

whereby vectors of point locations with cnxpt radii are generated; whereby classifications are derived from a relevant portion of commonplace data, cnxpts and associations are marked as members of fxxts, an organization of knowledge is formed and cnxpts are positioned onto a visualization according to an organization of knowledge.

32. The method of claim 1, wherein generating the organization of knowledge of a map further comprises boosting by applying the weighting coefficient indicating a proportionality of impact assigned to a fxxt by multiplying the strength weights of the associations within the fxxt by the assigned weighting coefficient for the fxxt and tallying the weights of the associations of each hierarchical association between a first cnxpt and a second cnxpt having roles, the associations garnered from the set of fxxts specified by a map definition, to generate, without retaining differentiation by fxxt, summarized weighted associations into the derived ontology.

33. The method of claim 1, wherein generating the organization of knowledge of a map further comprises boosting by applying the weighting coefficient indicating a proportionality of impact assigned to a fxxt by multiplying the importance weight of a cnxpt within the fxxt by the assigned weighting coefficient for the fxxt garnered from the set of fxxts specified by a map definition, and tallying the calculated importance weights of the cnxpt to generate, without retained fxxt differentiating, summarized weighted cnxpt importance into the derived ontology, to be utilized for the single appearance of the cnxpt in the map.

34. The method of claim 1, wherein generating the organization of knowledge of a map further comprises boosting by applying the weighting coefficient indicating a proportionality of impact assigned to a fxxt by multiplying the strength weights of the associations within the fxxt by the assigned weighting coefficient for the fxxt and tallying the weights of the associations of each non-hierarchical directed association between a first cnxpt and a second cnxpt having roles, the associations garnered from the set of fxxts specified by a map definition, to generate, without retained fxxt differentiating, summarized weighted non-hierarchical directed associations into the derived ontology.

35. The method of claim 1, wherein generating the organization of knowledge of a map further comprises applying the weighting coefficient indicating a proportionality of impact assigned to a fxxt by multiplying the strength weights of the associations within the fxxt by the assigned weighting coefficient for the fxxt and tallying the weights of the associations of each affinitive association between a first cnxpt and a second cnxpt having roles, the associations garnered from the set of fxxts specified by a map definition, to generate, without retained fxxt differentiating, summarized weighted affinitive associations into the derived ontology.

36. The method of claim 1 to form a consensus, further including:

a. forming consensus regarding categorizations based upon association consensus tallying by summarizing strengths, from votes or input, of a plurality of similar relationship info-items to form a single summary relationship info-item according to utilize collective consensus through vote tallying means;
and b. forming consensus regarding properties based upon property consensus tallying summarizing a plurality of values, from votes or input, for a single property of an info-item to form a single summary property with one value for said info-item according to utilize collective consensus through vote tallying means;

whereby a basic level consensus of opinions regarding information in a commonplace is formed.

37. The method of claim 1, to produce a map from a commonplace of information demarcating the collective consensus of a crowd from what has not reached consensus to a predetermined level, further comprising:

a. extracting a resultant derived ontology of cnxpts by fxxt extraction based upon consensus voting where association choice is based upon consensus weighting of similar associations between a cnxpt pair comprising a first cnxpt and a second cnxpt, wherein each first cnxpt in common as having a parent role in all said cnxpt pairs and a set of second cnxpts each having a role as a child in the cnxpt pairs, wherein the consensus is formed to find the summary association between the first cnxpt and one second cnxpt as child has the greatest cumulative weight, wherein the associations have been extracted into a preliminary derived ontology according to a map definition;

b. calculating sample distributions for the sample domains defined to be the votes given regarding associations between said first cnxpt and each second cnxpt, wherein the statistic taken is the association weight of the votes per source of the vote;

c. locating, for the set of second cnxpts, sample distributions having a significant variance indicating a multimodal probability density function for the test of whether a single belief is held by those voting on the association between the first cnxpt and one second cnxpt;
and d. depicting on said structuring an indication that for one or more first cnxpts for which a consensus was sought, a failed praxis was found to show a lack of consensus that a summary association between the first cnxpt and one second cnxpt has a high differential between the votes made by different groups of sources;

whereby an indication of a plurality of different beliefs or positions has been seen in the votes taken for one or more relationships indicated by the associations between the first cnxpt and the second cnxpts according to the extracted cnxpts and associations of the domain of wisdom shown in a map.

38. The computer-implemented method of claim 37 to produce a map from a commonplace of information demarcating the collective belief of a crowd, further comprising:

a. performing fxxt extraction based upon all votes in a domain of wisdom for a map definition;

b. eliminating, prior to structuring, from the derived ontology resulting from fxxt extraction any association for which a failed praxis is found within derived ontology;
and c. extracting a structuring of remaining associations and cnxpts where association choice is based upon highest association weighting;

whereby major disagreements holding back from a consensus are removed in the resulting organization of knowledge for a map definition.

39. The method of claim 38, to produce a map from a commonplace of information demarcating the collective belief of a crowd regarding what outcomes are anticipated at any point in time, further comprising:

a. performing fxxt extraction based upon consensus voting;

b. eliminating, prior to structuring, from the extracted fxxt any cnxpt for which a failed praxis is found;

c. extracting a structuring of cnxpts where a dimension presents a time aspect and at least one cnxpt is an event and at least one cnxpt is an outcome, wherein at least one association weight determinative of outcome is based upon consensus voting, wherein at least one association choice is determinative of outcome, and wherein at least one association choice is based upon at least one consensus weighting;

d. slicing the structuring by a timeline to prepare a flattened aspect of a organization of knowledge where any outcome whose state is not resolvable at the time of the timeline fall to the future side of the timeline and are optionally not shown in a derived visualization; and e. depicting on said structuring, optionally, the cnxpts for which a consensus determination has found a failed praxis.

40. The method of claim 1, wherein generating the hierarchical skeletal structure for a map definition comprises:

a. ordering into a queue the summarized directed associations of the derived ontology resulting from fxxt extraction by summarized directed association weight, highest weight implying least cost, greatest first, wherein as only a convention each directed association has a first role considered to be a from role held by a first cnxpt and a second role considered to be a to role held by a second cnxpt, wherein the directionality would represent a transitive concept relationship generally of a type selected from the group of: child to parent, sub category to category, category to super category, employee to employer, finish state to start state, dependent to independent, end to start point, succeeding to preceding, outcome to cause, sub-assembly to assembly, detail account to summary account, element to law, tactic to strategy, integer to claim, data set to data collection, class member to class, and leaf to root;

b. forming an empty skeletal structure to be filled with hierarchical tensors and singleton cnxpts;

c. filling the skeletal structure with all cnxpts extracted into a derived ontology for the map, as singletons;

d. examining, while the queue is not empty, each current front summarized directed association in the queue, the front association always having a highest weight of those in the queue, wherein:

i. designating said current front summarized directed association for consideration, the designation selected from the group of:

01. considering said current front summarized directed association, wherein the skeletal structure is to hold a least cost spanning forest, wherein the skeletal structure is to hold a spanning forest of hierarchical tensors whose endpoint roles are held by cnxpts, wherein no two tensors may have the same cnxpt in a to role to exclude any but a single first parent appearing for any cnxpt in the skeletal structure, testing whether said current front summarized directed association would be a proper edge in a graph-theoretic spanning forest of the derived ontology resulting from fxxt extraction by connecting a root of a sub-tree to a leaf of a second tree not otherwise connected to the sub-tree;

and 02. considering said current front summarized directed association, wherein prior to consideration for incorporation into the spanning forest the directed associations have all had their sense reversed causing the to role to be occupied by the child, wherein the skeletal structure is to hold a least cost spanning forest of a directed acyclic graph of a precedence flow where the output cnxpt is in a from role, the spanning forest comprising hierarchical tensors whose endpoint roles are held by cnxpts, wherein no two tensors may have the same cnxpt in a from role to exclude any but a single first parent appearing for any cnxpt in the skeletal structure, testing whether said current front summarized directed association would be a proper edge in a graph-theoretic spanning forest of the derived ontology resulting from fxxt extraction, wherein after complete formation of the spanning forest and the derivative positioning of cnxpts the sense of the associations are returned to their original state;

ii. adding, if test is successful, said hierarchical tensor representing said current front summarized directed association to said skeletal structure;

and iii. removing the front summarized association from said queue;

whereby the summarized associations are used to form a spanning forest in either a forest with a single parent per child or a forest with a single child per parent depending upon the purpose of the map.

41. The method of claim 40, wherein generating the organization of knowledge of a map comprises designating each cnxpt as a root cnxpt that is not related by a hierarchical tensor in the skeletal structure of a map to any cnxpt in a child role.

42. The method of claim 1, wherein generating a map further comprises boosting of a first property of each cnxpt of a fxxt by applying a weighting coefficient indicating a proportionality of impact assigned to the fxxt by multiplying the first property of each cnxpt within the fxxt by the assigned weighting coefficient for the fxxt, each cnxpt garnered from the set of fxxts specified by a map definition, to generate, without retaining differentiation by fxxt, a summarized cnxpt with the first property summarized, into the derived ontology;

whereby increasing the importance of a cnxpt by boosting a fxxt more than another fxxt causes an impact to the map produced; whereby the boosting increases the importance of property of a cnxpt of a boosted fxxt relative to the property of a cnxpt of a fxxt not boosted; whereby the boosting will increase the effect of the cnxpts in the map for other calculations relative to those of a fxxt not boosted.

43. The method of claim 1, wherein generating the organization of knowledge of a map further comprises elimination of directed associations from filling a structural role in a resulting map, wherein:

a. ordering into a queue the summarized associations of the derived ontology from fxxt extraction by summarized association weight, greatest first;

b. examining, while the queue is not empty, each current front summarized association in the queue, the front summarization always having a highest weight of those in the queue, the manner of examination selected from the group of:

i. considering said current front summarized directed association, wherein the skeletal structure is to hold a least cost spanning forest, wherein the skeletal structure is to hold a spanning forest of hierarchical tensors whose endpoint roles are held by cnxpts, wherein no two tensors may have the same cnxpt in a to role in the spanning forest to exclude any but a single first parent appearing for any cnxpt in the spanning skeletal structure, wherein considering results in incorporation of a tensor derived from a qualified said current front summarized directed association into the spanning descendent forest, or marking a failing said current front summarized directed association with a designation selected from the group of: useable as secondary child in the enhanced descendent forest, unusable for its direction but usable for showing affinity, and excess;

ii. considering said current front summarized directed association, wherein prior to consideration for incorporation into the spanning forest the directed associations have all had their sense reversed causing the to role to be occupied by the child, wherein the skeletal structure is to hold a least cost spanning forest of a directed acyclic graph of a precedence flow where the output cnxpt is in a from role, the spanning forest comprising hierarchical tensors whose endpoint roles are held by cnxpts, wherein no two tensors may have the same cnxpt in a child role to exclude any but a single first child appearing for any cnxpt in the skeletal structure, wherein considering results in incorporation of a tensor derived from a qualified said current front summarized directed association into the spanning descendent forest, or marking a failing said current front summarized directed association with a designation selected from the group of: useable as secondary child in the enhanced descendent forest, unusable for its direction but usable for showing affinity, and excess;

and iii. considering, by passing, with the context, said current front summarized directed association to a custom algorithm to obtain a decision, wherein considering by the algorithm results in a determination to incorporate a tensor derived from a qualified said current front summarized directed association into the spanning descendent forest, or to mark a failing said current front summarized directed association with a designation selected from the group of: useable as secondary child in the enhanced descendent forest, unusable for its direction but usable for showing affinity, and excess;

and c. removing said current front summarized directed association from said queue;

whereby a map product is formed based upon an extraction of cnxpts and associations marked by zero or more fxxts.

44. The method of claim 1, wherein a property of the summarized hierarchical associations of the derived ontology from fxxt extraction is used as the basis for ordering the queue from which associations are selected to cause derivation of tensors for the spanning descendant tree or otherwise marked.

45. The method of claim 1, wherein generating a map further comprises boosting of a first property of associations of a fxxt by applying a weighting coefficient indicating a proportionality of impact assigned to the fxxt by multiplying the first property of the associations within the fxxt by the assigned weighting coefficient for the fxxt and tallying the first property of each association between a first cnxpt and a second cnxpt having roles while adjusting for the directionality of associations, the associations garnered from the set of fxxts specified by a map definition, to generate, without retaining differentiation by fxxt, summarized weighted associations into the derived ontology;

whereby the boosting increases the chance that an association of a boosted fxxt will be utilized, relative to those of a fxxt not boosted, as a structural tensor in generating a forest for positioning in a map; whereby the boosting will increase the effect of the associations and cnxpts in the map for other calculations relative to those of a fxxt not boosted;

whereby an association boosted may be retained while one not boosted would be eliminated in edge selection algorithms; whereby an association boosted may be relatively more important while one not boosted would be less important depending upon association type, amplifying diversity within a set of associations marked by a fxxt.

46. The method of claim 1, further including:

a. generating a dummy cnxpt as parent for each cnxpt of said descendent tree having no parent cnxpt in domain of wisdom of said map and where said parentless cnxpt is known not to belong at the root level of said descendent tree, and generating one hierarchical tensor and zero or more associations connecting said dummy cnxpt as parent to said parentless cnxpt in said map to direct positioning of said added dummy cnxpt according to dummy cnxpt generation means for tree formation after forming an enhanced descendant forest of said map;

b. generating a dummy cnxpt as parent for each said added dxo or txo info-item anchored to a cnxpt in said descendent forest, and generating one hierarchical tensor and zero or more associations connecting said dummy cnxpt as parent to said added dxo or txo info-item in domain of wisdom of said map and one hierarchical tensor and zero or more associations connecting said dummy cnxpt as child to said anchoring cnxpt of said added dxo or txo info-item in domain of wisdom of said map to direct positioning of said added dummy cnxpt according to dummy cnxpt generation means for tree formation after adding dxo instances or txo instances of domain of wisdom of said map to said enhanced descendant forest;

c. generating a dummy cnxpt as parent for each alias-hyperlink of said descendent forest having no parent cnxpt in domain of wisdom of said map, and generating one hierarchical tensor and zero or more associations connecting said dummy cnxpt as parent to said alias-hyperlink in said map and one or more associations connecting said dummy cnxpt to the base cnxpt of said alias-hyperlink in said map to direct positioning of said added dummy cnxpt according to dummy cnxpt generation means for tree formation after adding alias-hyperlinks to said map to said enhanced descendant forest;

d. adding zero or more unanchored dxo instances and txo instances of domain of wisdom of said map to said enhanced descendant forest at the root level;

and e. generating a dummy cnxpt as parent for each said added unanchored dxo or txo info-item, and generating one hierarchical tensor and zero or more associations connecting said dummy cnxpt as parent to said added unanchored dxo or txo info-item in domain of wisdom of said map to direct positioning of said added dummy cnxpts according to dummy cnxpt generation means for tree formation, and setting the prior position of said dummy cnxpt to be that given for said unanchored dxo or txo where positioning information for said unanchored dxo or txo is obtained from its placement on a prior generation of said map, if any, or from said map definition.

47. The method of claim 1, further including:

a. generating, from all cnxpts and knowledge structuring propositional hierarchical associations of a basic descendant forest, an enhanced descendant forest according to build enhanced descendant spanning trees means for tree formation;

b. adding zero or more alias-hyperlinks to said enhanced descendant forest according to build enhanced descendant spanning trees means for tree formation;

c. generating zero or more cnxpt importance properties with weights for enforcing relative sizing of added alias-hyperlinks in said enhanced descendant forest;

d. generating zero or more hierarchical tensors to said enhanced descendant forest to direct positioning of added alias-hyperlinks of said map according to build enhanced descendant spanning trees means for tree formation;

e. adding zero or more anchored dxo instances, zero or more unanchored dxo instances, and zero or more txo instances to said enhanced descendant forest according to build enhanced descendant spanning trees means;

f. generating, into said enhanced descendant forest, zero or more importance properties with weights for enforcing relative sizing of cnxpts;

and g. generating, into said enhanced descendant forest, zero or more directed tensors to direct positioning of said added dxo and txo instances according to build enhanced descendant spanning trees means;

whereby the ability is provided to place objects for a map in a position related to the closeness of said object to others logically according to a map definition and a structuring derived therefrom.

48. The method of claim 1 to predict the timing of fruition of a subsumed cntexxt in a categorization, further including:

a. identifying known event timings for each of a set of congruent predecessors of a target entity anticipated to fit into a cntexxt subsumed by one or more first predecessor as an offshoot of the first predecessor, a predecessor represented by a predecessor cnxpt, the target entity represented by a target cnxpt, an event timing represented by an association or a trait entry on the target cnxpt, on a prediction basis given by at least one estimation rationale selected from the group of:

i. by when a productized predecessor of the target cnxpt became real;

ii. by when a feature of a productized predecessor, the feature anticipated also to be of the target cnxpt, became real;

iii. by when a product utilizing a predecessor was delivered;

iv. by when a predecessor was used in production;

v. by what the patent status is for a predecessor;

vi. by what the research status is for a predecessor; and vii. by what the rate of innovation has been for the incremental innovations prior to and in the ancestry of the target cnxpt based upon predecessors;

b. identifying anticipated event timings for a target entity, represented by a target cnxpt, on a prediction basis given by at least one estimation rationale selected from the group of:

i. by what the patent status is for the target cnxpt; and ii. by what the research status is for the target cnxpt; and c. generating an expected gestation event timeline assembling the anticipated gestation events of the target represented by the target cnxpt given approximate timings and durations, the timings and durations selected from the group of: one or more of the known gestation events of one or more appropriate predecessors, and one or more of the anticipated gestation events of the target;

whereby the length of time before or time frame when a technology is reasonably anticipated to exist is estimated based upon gestation events of predecessors and how a target would likely become real.

49. The method of claim 1 to predict the distance or depth difference between a subsuming cntexxt and a subsumed cntexxt in a categorization, further including:

a. teasing out predictors of a ttx's depth and summarizing those predictors to a series of probabilities for timeframes, resulting in a prediction of the status of each cnxpt based upon a mass incremental characterization for subsuming cnxpts;

b. calculating for a target cnxpt as a basis, including at least one of: estimating the depth of the subsuming cnxpt; estimating a depth differentiation characteristic of the differentiation between a subsumed cnxpt and its subsuming cnxpt;

and c. adding the depth estimated for the subsuming cnxpt to the depth indicated by the differentiation of the subsumed cnxpt to estimate the depth of the subsumed cnxpt;

whereby the depth of a cnxpt in an extracted categorization forest is estimated.

50. The method of claim 1, wherein generating a map comprises:

a. determining positioning tensors based also on applying coefficient multipliers based upon type of basis association resulting in a tensor;

whereby tensors are created to force the ancestors of a cnxpt to be in positions with the cnxpt itself being positioned inside the ancestor in a categorization map or juxtaposed to the ancestor in a precedence map, as well as being in the defined segment.

51. The method of claim 50, wherein generating a map comprises:

a. performing a roll-up analysis that analyzes, for each cnxpt, a cumulative weight of associations that ascendants of the cnxpt have with other cnxpts within the map;

and b. generating affinitive tensors based upon the cumulative weight of associations according to calculate roll-up association weights to form positioning tensors means;

whereby information in a commonplace is used to assemble strength information needed to position cnxpts based upon relationships beyond what is given in the spanning forests so that the full content of a map definition is utilized to form a perspective rather than merely the positions based only upon direct parentage.

52. The method of claim 1, to generate positioning of the cnxpts of a map, further including:

a. generate, according to calculate roll-up association weights to form positioning tensors means, for each second cnxpt holding an opposing role on one or more associations or association instances connected to a first cnxpt in a descendant extracted forest map skeletal structure for the map, an affinitive tensor with an accumulative weighting selected from the group of:

i. for said second cnxpt an uncle of said first cnxpt the summarized weights of said associations or association instances considering weights inherited from associations or association instances between said first cnxpt and descendants of said second cnxpt and weights inherited from associations or association instances between said second cnxpt and descendants of said first cnxpt;

ii. for said second cnxpt a cousin of said first cnxpt the summarized weights of said associations or association instances considering weights inherited from associations or association instances between said first cnxpt and descendants of said second cnxpt and weights inherited from associations or association instances between said second cnxpt and descendants of said first cnxpt;

and iii. for said second cnxpt a sibling of said first cnxpt the summarized weights of said associations or association instances considering weights inherited from associations or association instances between said first cnxpt and descendants of said second cnxpt and weights inherited from associations or association instances between said second cnxpt and descendants of said first cnxpt;

and b. generating zero or more elements of intermediate information selected from the group of: an affinitive tensor, a sibling roll-up affinitive association, an uncle roll-up affinitive association, a cousin roll-up affinitive association, a strength weight for an affinitive tensor, and an importance weight for a cnxpt; according to calculate roll-up association weights to form positioning tensors means;

whereby information in a commonplace is used to assemble strength and importance information needed to position cnxpts based upon the full content of a hierarchy in a perspective rather than merely the positions based only upon direct parentage; whereby the relationships between cnxpts that are both at the same depth of the forest of trees or between cnxpts that are in adjacent levels are used to improve the positioning of cnxpts in a map.

53. The method of claim 52, wherein generating a map further comprises rolling-up affinities of cnxpts, dxos, and other txo info-items to form tensors for enforcing object spacing and sizing for a map, wherein:

a. forming a roll-ups result ontology to contain the results of roll-ups comprising, initially, all cnxpts, all dxos, all other txos, and all tensors from the enhanced descendant forest ontology of said map, wherein the tensors provide a structure for parentage, cousin determination, uncle determination, and depth determination;

b. forming a list of associations not serving as the basis of hierarchical tensors in the skeletal structuring of forest extraction given by the roll-ups result ontology, the list comprising associations selected from the group of: all affinitive association relationships, all residual hierarchical association relationships, all surrogate associations whose endpoints are not both cnxpts, and other associations resulting from fxxt and forest extraction not serving as the basis of hierarchical tensors;

c. summarizing, for said list of associations, all affinitive association list items of each cnxpt pair based upon absolute weight;

d. forming an empty priority queue;

e. enqueueing on said queue an uncle roll-up association queue item and a cousin roll-up association queue item for each listed association having in roles info-item endpoints at different depths in the roll-ups result ontology;

f. adding on said queue, for each first uncle association queue item in order, an additional uncle association queue item with the endpoint having less depth replaced by its parent until the depths of the endpoints of all uncle association queue items are no less than one level different and one uncle association queue item, derived from said first uncle association queue item, has been added having a from endpoint that is a root;

g. replacing, for each cousin roll-up association queue item, the endpoint having greater depth with its parent until no cousin roll-up association queue item has endpoints having different depths;

h. replacing, for each cousin roll-up association queue item, each endpoint by its parent for each cousin association queue item in order wherein the endpoint is not already a root and the parents of the endpoints are not the same info-item;

i. generating, for each cousin roll-up association queue item for which each endpoint parent is the same as the parent of the other endpoint, a between-sibling-ring attractor tensor into said roll-ups result ontology;

j generating, for each cousin roll-up association queue item for which each endpoint is a root, a between-sibling-ring attractor tensor into said roll-ups result ontology;

k. generating, for each uncle roll-up association queue item, a to-uncle attractor tensor into said roll-ups result ontology;

l. summarizing all between-sibling-ring attractor tensors for each pair of info-items selected from the group of: cnxpts, dxos, and other txos;

m. summarizing all to-uncle attractor tensors for each pair of info-items selected from the group of: cnxpts, dxos, and other txos;

n. generating, for each info-item selected from the group of: cnxpts, dxos, and other txos; wherein said info-item had previously existed in a just prior generated instance of said map, a prior position tensor between said info-item and a fictitious object at the prior position of said info-item in said just prior generated instance of said map, setting the weight of said prior position tensor to a pre-specified tensor weight as an admixture coefficient;

and o. generating, for each info-item selected from the group of: cnxpts, dxos, and other txos; wherein said info-item had a parent in a just prior generated instance of said map, a prior position in parent tensor between said info-item and a fictitious object at the prior position of said info-item in relation to its parent in said just prior generated instance of said map, setting the weight of said prior position in parent tensor to a pre-specified tensor weight as an admixture coefficient;

whereby classifications derived from a relevant portion of said commonplace data serve as the basis for positioning of cnxpts onto a visualization according to the map skeletal structure provided by the enhanced descendent tree forest, the prior positionings by the user for the same map, and for the maps from which the current map is derived; whereby the ability is provided to place objects for a multi-dimensional map in a position related to the closeness of said object to others logically according to a map definition and a structuring derived therefrom, and based to some degree on the positioning by the user of the objects in prior work arranging those objects in a visualization; and whereby the various generated tensors serve as a basis for computing an understandable and associative position of cnxpts into an organization of knowledge from the structure provided by said enhanced descendent tree forest.

54. The method of claim 1, wherein generating a map further comprises:

a. rolling up the directed nature of directed affinitive associations, wherein each summarization involving a directed affinitive association is performed on a 'netting out' basis for the directionality or the association to have the effect in later positioning to force a cnxpt's ancestors to be in a relative position based also upon direction.

55. The method of claim 1, comprising:

a. determining a location of each first cnxpt with respect to one or more other second cnxpt within the organization of knowledge of a map wherein the first cnxpt participates in zero or more first relationships between the first cnxpt with some other second cnxpt indicating a closeness of meaning of the first cnxpt and the second cnxpt;

wherein said first relationship is recorded by zero or more association info-items;

wherein the relationship is formed virtually from the collective information available in the map;

whereby carrying out an obfuscation process on info-item identifiers by translating from unique internal format identifier for an info-item to a unique external identifier according to a key encryption process security procedure.

56. The method of claim 1 to form an associative map, wherein generating a map further comprises:

a. determining positioning error metrics based also on applying admixture coefficient multipliers set to increase the apparent error existing of a specific error type;

b. calculating an overall error metric based upon use of the admixture coefficients multipliers;

c. selecting an error to correct based upon the contribution to the overall error metric of a specific error as adjusted by the admixture coefficient multipliers;

and d. correcting the error based upon the actual error existing of a specific error type without regard to any admixture coefficient multiplier;

whereby error correction is prioritized to make position correction efficient.

57. The method of claim 56, further comprising:

a. deriving a position of an initial root precedent cnxpt without descendants in an extracted structuring of cnxpts based on relationships of the initial cnxpt with other cnxpts without descendants;

and b. deriving a position of a descendant cnxpt in an extracted structuring of cnxpts based on relationships of the descendant cnxpt with cnxpts selected from the group of: precedent cnxpt of the descendant cnxpt, an uncle cnxpt of the descendant cnxpt, and a sibling cnxpt of the descendant cnxpt.

58. The method of claim 1, to position cnxpts on a map being generated, further comprising:

a. deriving a position of an initial cnxpt without descendants in an extracted structuring of cnxpts based on associations of the initial cnxpt with other cnxpts without descendants;

b. deriving a position of a precedent cnxpt in an extracted structuring of cnxpts based on associations of the precedent cnxpt with cnxpts selected from the group of: descendant cnxpt of the precedent cnxpt, a nephew cnxpt of the precedent cnxpt, and a sibling cnxpt of the precedent cnxpt;

and c. modifying the map organization of knowledge based on the positioning of the cnxpt.

whereby bottom up, precedent first, precedent last, and top down organizations of structurings are developed.

59. The method of claim 1, further comprising:

a. deriving a position of an outcome event cnxpt without a posteriori dependent events in an extracted structuring of cnxpts based on relationships of the initial cnxpt with other cnxpts without a posteriori dependent events;

and b. deriving a position of an a priori event cnxpt in an extracted structuring of cnxpts based on relationships of the a priori event cnxpt with cnxpts selected from the group of: dependent a posteriori events cnxpt of the a priori event cnxpt, a nephew dependent event cnxpt of the a priori event cnxpt, and a sibling cnxpt of the a priori event cnxpt.

60. The method of claim 1, further comprising:

a. determining, for each one or more map instance organization of knowledge generated as a forest in forest extraction for said domain of wisdom, an orientation selected from the group of: vertical for the single forest generated, horizontal for the single forest generated, vertical for the first of a plurality of forests generated and horizontal for the second of a plurality of forests generated, horizontal for the first of a plurality of forests generated and vertical for the second of a plurality of forests generated, a custom orientation, and an orientation defined for a specific domain of wisdom;

b. completing, for each one or more skeletal structures for a map instance generated as a forest in forest extraction for said domain of wisdom according to a method selected from the group of:

i. determining a layout orientation according to a method selected from the group of: stated in map definition, defaulted according to predetermined system setting, default for a map type, and stated by user;

ii. determining an area for placement of initial cnxpts according to layout orientation, the area appropriate to the customary or esthetically pleasing layout orientation determined;

iii. deriving a position of a non-root cnxpt in an extracted structuring of cnxpts based upon a method selected from the group of:

01. basing, where non-root cnxpts are to be interpreted substantially of the nature of a type selected from the group of: sub-categories in a categorization, member in a team, participant, stakeholder, components in an assembly, instances in an object structure of a class breakdown, and children in a hierarchy; in a root to leaf build orientation, further including:

deriving a position of an initial cnxpt substantially of the nature of a type selected from the group of: super-categories in a categorization, team, participant, stakeholder, assemblies in an assembly graph, classes in an object structure of a class breakdown, and parents in a hierarchy; without parents in an extracted structuring of cnxpts based upon the area for placement determined and upon a method selected from the group of:
prior position;
default value;
equidistant spacing;
self-organized mapping based upon associations of the initial cnxpt with other cnxpts without parents;
arrangement on a circle;
arrangement on a sphere;
arrangement on an edge of the canvas;
arrangement based upon intersect cnxpts of a dominant map;
arrangement based upon cnxpts of a dominant map causing slicing;
and
arrangement on a line;

deriving the relative position of a child cnxpt based upon one or more factors selected from the group of:
prior position;
default value;
bounds of parent cnxpt relative to the child cnxpt;
logical distance from an uncle cnxpt of the parent cnxpt given strengths of effective relationships with uncles as captured in affinitive tensors due to association strengths in conjunction with accumulated roll-up strengths;
logical distance from an uncle cnxpt of the child cnxpt given strengths of effective relationships with uncles as captured in affinitive tensors due to association strengths in conjunction with accumulated roll-up strengths and relative distances of sibling cnxpts to edge of parent cnxpt;
relative importance of parent cnxpt with respect to siblings of parent cnxpt;
relative importance of child cnxpt with respect to importance of siblings of child cnxpt;
non-overlap rules;
parent edge to child edge protection minimums;
inter-child cnxpt edge protection minimums;
esthetic rules;
adjustments due to purlieu or time frame or depth or precedence synchronizations;
and
logical distance from a sibling cnxpt of the child cnxpt given strengths of effective relationships with siblings as captured in affinitive tensors due to association strengths in conjunction with accumulated roll-up strengths;

and deriving positions of alias indicators of secondary parents in an enhanced forest skeletal structure based upon one or more factors selected from the group of:
prior position;
default value;
non-overlap rules;
esthetic rules;
adjustments due to purlieu or time frame or depth or precedence synchronizations;
and
convenience positioning;

02. basing, where non-initial cnxpts are to be interpreted substantially of the nature of a type selected from the group of: super-categories in a categorization, team, participant, stakeholder, assemblies in an assembly graph, classes in an object structure of a class breakdown, and parents in a hierarchy; in a leaf sub-category to highest category build orientation, further including:

deriving a position of an initial cnxpt substantially of the nature of a type selected from the group of: sub-categories in a categorization, member in a team, participant, stakeholder, components in an assembly, instances in an object structure of a class breakdown, and children in a hierarchy; without children in an extracted structuring of cnxpts based upon the area for placement determined and upon a method selected from the group of:
prior position;
default value;
equidistant spacing;
self-organized mapping based upon associations of the initial cnxpt with other cnxpts without children;
arrangement on a circle;
arrangement on a sphere;
arrangement on the interior of a circle;
arrangement on the interior of a sphere;
arrangement on an edge of the canvas;
arrangement based upon intersect cnxpts of a dominant map;
arrangement based upon cnxpts of a dominant map causing slicing;
arrangement in the center of the canvas;
and
arrangement on a line;

deriving the relative position of a primary parent cnxpt of a positioned child cnxpt based upon one or more factors selected from the group of:
prior position;
default value;
bounds of child cnxpt relative to its immediate parent cnxpt;
logical distance from a nephew cnxpt of the parent cnxpt, the nephew cnxpt a sibling of the child, given strengths of effective relationships with nephews as captured in affinitive tensors due to association strengths in conjunction with accumulated roll-up strengths;
logical distance from a nephew cnxpt of the parent cnxpt given strengths of effective relationships with nephews as captured in affinitive tensors due to association strengths in conjunction with accumulated roll-up strengths and relative distances of sibling cnxpts to the edge of the child cnxpt;
relative importance of child cnxpt with respect to siblings of child cnxpt;
relative importance of parent cnxpt with respect to importance of siblings of the parent cnxpt;
non-overlap rules;
child edge to parent edge protection minimums;
inter-parent cnxpt edge protection minimums;

esthetic rules;
adjustments due to purlieu or time frame or depth or precedence synchronizations;
and
logical distance from a sibling cnxpt of the parent cnxpt given strengths of effective relationships with siblings as captured in affinitive tensors due to association strengths in conjunction with accumulated roll-up strengths;
and
deriving the relative position of an alias for a secondary immediate parent cnxpt of a positioned child cnxpt based upon one or more factors selected from the group of:
prior position;
default value;
non-overlap rules;
esthetic rules;
and
adjustments due to purlieu or time frame or depth or precedence synchronizations;

03. basing, where non-root cnxpts are to be interpreted substantially of the nature of a type selected from the group of: successors in a precedence graph, nodes with an inbound arc in a digraph, precedent components in an assembly; in a predecessor-root to successor build orientation, further including:
deriving a position of an initial cnxpt substantially of the nature of a type selected from the group of: predecessors in a precedence graph, nodes with an outbound arc in a digraph, and completed components in an assembly graph; without predecessors in an extracted structuring of cnxpts based upon the area for placement determined and upon a method selected from the group of:
prior position;
default value;
equidistant spacing;
self-organized mapping based upon associations of the initial cnxpt with other cnxpts without predecessors;
arrangement on a circle;
arrangement on a sphere;
arrangement on an edge of the canvas;
arrangement based upon intersect cnxpts of a dominant map;
arrangement based upon cnxpts of a dominant map causing slicing;
and
arrangement on a line;
deriving the relative position of a successor cnxpt based upon one or more factors selected from the group of:
prior position;
default value;
bounds of predecessor cnxpt relative to the successor cnxpt;
logical distance from an uncle cnxpt of the predecessor cnxpt given strengths of effective relationships with uncles as captured in affinitive tensors due to association strengths in conjunction with accumulated roll-up strengths;
logical distance from an uncle cnxpt of the successor cnxpt given strengths of effective relationships with uncles as captured in affinitive tensors due to association strengths in conjunction with accumulated roll-up strengths and relative distances of sibling cnxpts to edge of predecessor cnxpt;
relative importance of predecessor cnxpt with respect to siblings of predecessor cnxpt;
relative importance of successor cnxpt with respect to importance of siblings of successor cnxpt;
non-overlap rules;
predecessor edge to successor edge protection minimums;
inter-successor cnxpt edge protection minimums;
esthetic rules;
adjustments due to purlieu or time frame or depth or precedence synchronizations;
and
logical distance from a sibling cnxpt of the successor cnxpt given strengths of effective relationships with siblings as captured in affinitive tensors due to association strengths in conjunction with accumulated roll-up strengths;
and
deriving positions of alias indicators of secondary predecessors in an enhanced forest skeletal structure based upon one or more factors selected from the group of:
prior position;
default value;
non-overlap rules;
esthetic rules;
adjustments due to purlieu or time frame or depth or precedence synchronizations;
and
convenience positioning;

04. basing, where non-initial cnxpts are to be interpreted substantially of the nature of a type selected from the group of: predecessors in a precedence graph, nodes with an outbound arc in a digraph, and completed components in an assembly graph; in a successor to predecessor build orientation, further including:
deriving a position of an initial cnxpt substantially of the nature of a type selected from the group of: successors in a precedence graph, nodes with an inbound arc in a digraph, and components in an assembly; without successors in an extracted structuring of cnxpts based upon the area for placement determined and upon a method selected from the group of:
prior position;
default value;
equidistant spacing;
self-organized mapping based upon associations of the initial cnxpt with other cnxpts without successors;
arrangement on a circle;
arrangement on a sphere;
arrangement on the interior of a circle;
arrangement on the interior of a sphere;
arrangement on an edge of the canvas;
arrangement based upon intersect cnxpts of a dominant map;
arrangement based upon cnxpts of a dominant map causing slicing;
arrangement in the center of the canvas;

and
arrangement on a line;

deriving the relative position of a primary predecessor cnxpt of a positioned successor cnxpt based upon one or more factors selected from the group of:
prior position;
default value;
bounds of successor cnxpt relative to the predecessor cnxpt;
logical distance from a nephew cnxpt of the predecessor cnxpt, the nephew cnxpt a sibling of the successor, given strengths of effective relationships with nephews as captured in affinitive tensors due to association strengths in conjunction with accumulated roll-up strengths;
logical distance from a nephew cnxpt of the predecessor cnxpt given strengths of effective relationships with nephews as captured in affinitive tensors due to association strengths in conjunction with accumulated roll-up strengths and relative distances of sibling cnxpts to the edge of the successor cnxpt;
relative importance of successor cnxpt with respect to siblings of successor cnxpt;
relative importance of predecessor cnxpt with respect to importance of siblings of the predecessor cnxpt;
non-overlap rules;
successor edge to predecessor edge protection minimums;
inter-predecessor cnxpt edge protection minimums;
esthetic rules;
adjustments due to purlieu or time frame or depth or precedence synchronizations;
and
logical distance from a sibling cnxpt of the predecessor cnxpt given strengths of effective relationships with siblings as captured in affinitive tensors due to association strengths in conjunction with accumulated roll-up strengths;

and deriving the relative position of an alias for a secondary immediate predecessor cnxpt of a positioned successor cnxpt based upon one or more factors selected from the group of:
prior position;
default value;
non-overlap rules;
esthetic rules;
and
adjustments due to purlieu or time frame or depth or precedence synchronizations;

05. basing, where non-root cnxpts are to be interpreted substantially of the nature selected from the group of: a posteriori, reward, consequent, ending, and completion; event without successors in an a priori to a posteriori build orientation, further including:

deriving a position of an initial a priori event cnxpt substantially of meaning selected from the group of: a posteriori, reward, consequent, ending, and completion event; without predecessors in an extracted structuring of cnxpts based upon the area for placement determined and a method selected from the group of:
prior position of cnxpts representing a priori events without predecessors;
default value;
equidistant spacing of cnxpts representing a priori events without predecessors;
self-organized mapping based upon associations of the initial cnxpts representing a priori events without predecessors with other cnxpts representing a priori events without predecessors;
arrangement on a circle of cnxpts representing a priori events without predecessors;
arrangement on a sphere of cnxpts representing a priori events without predecessors;
arrangement of cnxpts representing a priori events without predecessors on an edge of the canvas;
arrangement based upon intersect cnxpts of a dominant map;
arrangement based upon cnxpts of a dominant map causing slicing;
and arrangement of cnxpts representing a priori events without predecessors on a line;

deriving the relative position of a cnxpt representing an a posteriori event based upon one or more factors selected from the group of:
prior position;
default value;
bounds of the cnxpt representing the immediate a priori event predecessor relative to the a posteriori event cnxpt;
logical distance from an uncle cnxpt of the cnxpt representing the immediate a priori event predecessor given strengths of effective relationships with uncles as captured in affinitive tensors due to association strengths in conjunction with accumulated roll-up strengths;
logical distance from an uncle cnxpt of the a posteriori event cnxpt given strengths of effective relationships with uncles as captured in affinitive tensors due to association strengths in conjunction with accumulated roll-up strengths and relative distances of sibling cnxpts to edge of a priori event cnxpt;
relative importance of the cnxpt representing the immediate a priori event predecessor with respect to siblings of the cnxpt representing the immediate a priori event predecessor;
relative importance of an a posteriori event cnxpt with respect to importance of siblings of an a posteriori event cnxpt;
non-overlap rules;
a priori event predecessor edge to a posteriori event edge protection minimums;
inter-child cnxpt edge protection minimums;
esthetic rules;
adjustments due to purlieu or time frame or depth or precedence synchronizations;
and
logical distance from a sibling cnxpt of the a posteriori event cnxpt given strengths of effective relationships with siblings as captured in affinitive tensors due to association strengths in conjunction with accumulated roll-up strengths;

and deriving positions of alias indicators of secondary predecessors a priori event cnxpts in an enhanced forest skeletal structure based upon one or more factors selected from the group of:
prior position;
default value;
non-overlap rules;
esthetic rules;
adjustments due to purlieu or time frame or depth or precedence synchronizations;
and
convenience positioning;

06. basing, where non-initial cnxpts are to be interpreted substantially of the substantially of the nature selected from the group of: a posteriori, reward, consequent, ending, and completion; event in an end point to start point build orientation, further including:
deriving a position of an initial cnxpt substantially of meaning selected from the group of: a posteriori, reward, consequent, ending, and completion event; without successors in an extracted structuring of cnxpts based upon the area for placement determined and a method selected from the group of:
prior position of initial cnxpts without successors;
default location value for initial cnxpt;
equidistant spacing of initial cnxpts;
self-organized mapping based upon associations of the initial cnxpts with other initial cnxpts;
arrangement on a circle of initial cnxpts;
arrangement on a sphere of initial cnxpts;
arrangement of initial cnxpts on an edge of the canvas;
arrangement based upon initial cnxpts intersecting cnxpts of a dominant map;
arrangement based upon internal cnxpts intersecting cnxpts of a dominant map causing slicing;
and
arrangement of initial cnxpts on a line;
deriving the relative position of a cnxpt representing a primary a priori event of a positioned a posteriori event based upon one or more factors selected from the group of:
prior position;
default value;
bounds of the cnxpt representing the a posteriori event cnxpt relative to the immediate a priori event predecessor;
logical distance from a nephew cnxpt of the cnxpt representing the immediate a priori event, the nephew cnxpt a sibling of the a posteriori event cnxpt, given strengths of effective relationships with nephews as captured in affinitive tensors due to association strengths in conjunction with accumulated roll-up strengths;
logical distance from a nephew cnxpt of the immediate a priori event cnxpt given strengths of effective relationships with nephews as captured in affinitive tensors due to association strengths in conjunction with accumulated roll-up strengths and relative distances of sibling cnxpts to the edge of the a posteriori event cnxpt;
relative importance of the cnxpt representing the a posteriori event with respect to siblings of the cnxpt representing the a posteriori event;
relative importance of an immediate a priori event predecessor with respect to importance of siblings of the a priori event cnxpt;
non-overlap rules;
a posteriori event edge to predecessor a priori event edge protection minimums;
inter-a priori cnxpt edge protection minimums;
esthetic rules;
adjustments due to purlieu or time frame or depth or precedence synchronizations;
and
logical distance between sibling a priori cnxpts of the immediate a priori event cnxpt given strengths of effective relationships with siblings as captured in affinitive tensors due to association strengths in conjunction with accumulated roll-up strengths;
and
deriving the relative position of an alias for a secondary immediate a priori event cnxpt of a positioned a posteriori event cnxpt based upon one or more factors selected from the group of:
prior position;
default value;
non-overlap rules;
esthetic rules;
and
adjustments due to purlieu or time frame or depth or precedence synchronizations;

07. basing, where non-root cnxpts are to be interpreted substantially of the nature of a type selected from the group of: subtasks in a project plan, deliverables in a project plan, work package in a project plan, milestones in a project plan, a team, a requirement, participant, stakeholder, a resource, an event in a timeline, a period in a timeline, a required step, a result of a required step, an achievement, a completion, an end point, derivative effort, successor event, and children in a hierarchy; in a start point to end point build orientation, further including:
deriving a position of an initial cnxpt substantially of the nature of a type selected from the group of: start point, initiation, tasks in a project plan, major deliverables in a project plan, work package in a project plan, milestones in a project plan, a team, a requirement, participant, stakeholder, a resource, an event in a timeline, a period in a timeline, a required step, a result of a required step, an achievement, derivative effort, predecessor event, and parent in a hierarchy; without predecessors in an extracted structuring of cnxpts based upon the area for placement determined and a method selected from the group of:
prior position of initial cnxpt;
default value;
equidistant spacing of initial cnxpts;
self-organized mapping based upon associations of the initial cnxpts with other initial cnxpts;
arrangement on a circle of initial cnxpts;
arrangement on a sphere of initial cnxpts;

arrangement of initial cnxpt on an edge of the canvas;

arrangement based upon intersect cnxpts of a dominant map;

arrangement based upon cnxpts of a dominant map causing slicing;

and arrangement of initial cnxpt on a line;

deriving the relative position of a cnxpt representing a subtask based upon one or more factors selected from the group of:

prior position;

default value;

bounds of the cnxpt representing the immediate starting point predecessor super-task of the subtask cnxpt;

logical distance from a nephew cnxpt of the cnxpt representing the immediate starting point predecessor given strengths of effective relationships with nephews as captured in affinitive tensors due to association strengths in conjunction with accumulated roll-up strengths;

logical distance from an uncle cnxpt of the subtask cnxpt given strengths of effective relationships with uncles as captured in affinitive tensors due to association strengths in conjunction with accumulated roll-up strengths;

relative importance of the cnxpt representing the immediate starting point predecessor with respect to siblings of the cnxpt representing the immediate starting point predecessor;

relative importance of a subtask cnxpt with respect to importance of siblings of a subtask cnxpt;

non-overlap rules;

starting point predecessor edge to subtask edge protection minimums;

inter-child cnxpt edge protection minimums;

esthetic rules;

adjustments due to purlieu or time frame or depth or precedence synchronizations;

and logical distance from a sibling cnxpt of the subtask cnxpt given strengths of effective relationships with siblings as captured in affinitive tensors due to association strengths in conjunction with accumulated roll-up strengths;

and deriving positions of alias indicators of secondary super-tasks or predecessors in an enhanced forest skeletal structure based upon one or more factors selected from the group of:

prior position;

default value;

non-overlap rules;

esthetic rules;

adjustments due to purlieu or time frame or depth or precedence synchronizations;

and convenience positioning;

08. basing, where non-initial cnxpts are to be interpreted substantially of the nature of a type selected from the group of: start point, initiation, tasks in a project plan, major deliverables in a project plan, work package in a project plan, milestones in a project plan, a team, a requirement, participant, stakeholder, a resource, an event in a timeline, a period in a timeline, a required step, a result of a required step, an achievement, derivative effort, predecessor event, and parent in a hierarchy; in an end point to start point build orientation, further including:

deriving a position of an initial cnxpt substantially of meaning selected from the group of: subtasks in a project plan, deliverables in a project plan, work package in a project plan, milestones in a project plan, a team, a requirement, participant, stakeholder, a resource, an event in a timeline, a period in a timeline, a required step, a result of a required step, an achievement, a completion, an end point, derivative effort, successor event, and children in a hierarchy; without successors in an extracted structuring of cnxpts based upon the area for placement determined and a method selected from the group of:

prior position of initial cnxpt;

default location value for initial cnxpt;

equidistant spacing of initial cnxpts;

self-organized mapping based upon associations of the initial cnxpts with other initial cnxpts;

arrangement on a circle of initial cnxpts;

arrangement on a sphere of initial cnxpts;

arrangement of initial cnxpts on an edge of the canvas;

arrangement based upon initial cnxpts intersecting cnxpts of a dominant map;

arrangement based upon internal cnxpts intersecting cnxpts of a dominant map causing slicing;

and arrangement of initial cnxpts on a line;

deriving the relative position of a cnxpt representing a primary super-task of a positioned subtask based upon one or more factors selected from the group of:

prior position;

default value;

bounds of the cnxpt representing the subtask relative to the cnxpt representing the immediate super-task;

logical distance from a nephew cnxpt of the cnxpt representing the immediate super-task, the nephew cnxpt a sibling of the subtask, given strengths of effective relationships with nephews as captured in affinitive tensors due to association strengths in conjunction with accumulated roll-up strengths;

logical distance from a nephew cnxpt of the super-task cnxpt given strengths of effective relationships with nephews as captured in affinitive tensors due to association strengths in conjunction with accumulated roll-up strengths and relative distances of sibling cnxpts to the edge of the subtask cnxpt;

relative importance of the cnxpt representing the subtask with respect to siblings of the cnxpt representing the subtask;

relative importance of an super-task cnxpt with respect to importance of siblings of the super-task cnxpt;

non-overlap rules;

subtask edge to super-task edge protection minimums;

inter-super-task cnxpt edge protection minimums;
esthetic rules;
adjustments due to purlieu or time frame or depth or precedence synchronizations;
and
logical distance between sibling super-task cnxpts of the immediate super-task cnxpt given strengths of effective relationships with siblings as captured in affinitive tensors due to association strengths in conjunction with accumulated roll-up strengths;
and
deriving the relative position of an alias for a secondary super-task cnxpt of a positioned sub-task cnxpt based upon one or more factors selected from the group of:
prior position;
default value;
non-overlap rules;
esthetic rules;
and
adjustments due to purlieu or time frame or depth or precedence synchronizations;

09. basing, where non-root cnxpts are to be interpreted substantially of the nature selected from the group of: possible decision, outcome of option, occurrence, reaction, secondary decision, outcome, then consequent, else consequent, reward, chance node, consequent, end result, end node, classification, and completion; event, termed a consequent node, in start to finish build orientation for a decision tree, further including:
deriving a position of an initial question event cnxpt substantially of meaning selected from the group of: initial decision, initial environment statement, initial state, criterion, prior decision, prior outcome, prior occurrence, problem statement, broadest categorization, and start node; event without predecessors, termed a question node, in an extracted structuring of cnxpts based upon the area for placement determined and a method selected from the group of:
prior position of cnxpts representing question events without predecessors;
default value;
equidistant spacing of cnxpts representing question events without predecessors;
self-organized mapping based upon associations of the initial cnxpts representing question events without predecessors with other cnxpts representing question events without predecessors;
arrangement on a circle of cnxpts representing question events without predecessors;
arrangement on a sphere of cnxpts representing question events without predecessors;
arrangement of cnxpts representing question events without predecessors on an edge of the canvas;
arrangement based upon intersect cnxpts of a dominant map;
arrangement based upon cnxpts of a dominant map causing slicing;
and
arrangement of cnxpts representing question events without predecessors on a line;
deriving the relative position of a cnxpt representing an consequent event based upon one or more factors selected from the group of:
prior position;
default value;
bounds of the cnxpt representing the immediate question event predecessor relative to the consequent event cnxpt;
logical distance from an uncle cnxpt of the cnxpt representing the immediate question event predecessor given strengths of effective relationships with uncles as captured in affinitive tensors due to association strengths in conjunction with accumulated roll-up strengths;
logical distance from an uncle cnxpt of the consequent event cnxpt given strengths of effective relationships with uncles as captured in affinitive tensors due to association strengths in conjunction with accumulated roll-up strengths and relative distances of sibling cnxpts to edge of question event cnxpt;
relative importance of the cnxpt representing the immediate question event predecessor with respect to siblings of the cnxpt representing the immediate question event predecessor;
relative importance of an consequent event cnxpt with respect to importance of siblings of an consequent event cnxpt;
non-overlap rules;
question event predecessor edge to consequent event edge protection minimums;
inter-child cnxpt edge protection minimums;
esthetic rules;
adjustments due to purlieu or time frame or depth or precedence synchronizations;
and
logical distance from a sibling cnxpt of the consequent event cnxpt given strengths of effective relationships with siblings as captured in affinitive tensors due to association strengths in conjunction with accumulated roll-up strengths;
and
deriving positions of alias indicators of secondary predecessors representing question event cnxpts in an enhanced forest skeletal structure based upon one or more factors selected from the group of:
prior position;
default value;
non-overlap rules;
esthetic rules;
adjustments due to purlieu or time frame or depth or precedence synchronizations;
and
convenience positioning;
and 10. basing, where non-initial cnxpts are to be interpreted substantially of the substantially of the nature selected from the group of: initial decision, initial environment statement, initial state, criterion, prior decision, prior outcome, prior occurrence, problem statement, broadest categorization, and start node; event, termed a question node, in a finish to start build orientation for a decision tree, further including:

deriving a position of an initial cnxpt substantially of meaning selected from the group of: possible decision, outcome of option, occurrence, reaction, secondary decision, outcome, then consequent, else consequent, reward, chance node, consequent, end result, end node, classification, and completion; event without successors, termed a consequent node, in an extracted structuring of cnxpts based upon the area for placement determined and a method selected from the group of:

prior position of initial cnxpts without successors;

default location value for initial cnxpt;

equidistant spacing of initial cnxpts;

self-organized mapping based upon associations of the initial cnxpts with other initial cnxpts;

arrangement on a circle of initial cnxpts;

arrangement on a sphere of initial cnxpts;

arrangement of initial cnxpts on an edge of the canvas;

arrangement based upon initial cnxpts intersecting cnxpts of a dominant map;

arrangement based upon internal cnxpts intersecting cnxpts of a dominant map causing slicing;

and arrangement of initial cnxpts on a line;

deriving the relative position of a cnxpt representing a primary question predecessor of a consequent event based upon one or more factors selected from the group of:

prior position;

default value;

bounds of the cnxpt representing the consequent event cnxpt relative to the cnxpt representing the immediate question event predecessor;

logical distance from a nephew cnxpt of the cnxpt representing the immediate question event predecessor given strengths of effective relationships with nephews as captured in affinitive tensors due to association strengths in conjunction with accumulated roll-up strengths;

logical distance from a nephew cnxpt of the immediate question event given strengths of effective relationships with nephews as captured in affinitive tensors due to association strengths in conjunction with accumulated roll-up strengths and relative distances of sibling cnxpts to the edge of the consequent cnxpt;

relative importance of the cnxpt representing the consequent event with respect to siblings of the cnxpt representing the consequent event;

relative importance of a question event cnxpt with respect to importance of siblings of the question event cnxpt;

non-overlap rules;

consequent event predecessor edge to question event edge protection minimums;

inter-question cnxpt edge protection minimums;

esthetic rules;

adjustments due to purlieu or time frame or depth or precedence synchronizations;

and logical distance between sibling question cnxpts of the immediate question event predecessor cnxpt given strengths of effective relationships with siblings as captured in affinitive tensors due to association strengths in conjunction with accumulated roll-up strengths;

and deriving the relative position of an alias for a secondary question event cnxpt of a positioned decision event cnxpt based upon one or more factors selected from the group of:

prior position;

default value;

non-overlap rules;

esthetic rules;

and adjustments due to purlieu or time frame or depth or precedence synchronizations;

and c. modifying the organization of knowledge and the visualized map based on the positioning of the cnxpt.

61. The method of claim 1, further comprising:

a. initializing fxxt specific ttx map data set of cnxpt instance centroid points;

b. deriving a position of a root cnxpt instance in an extracted forest of extracted trees of cnxpt instances based on hierarchical tensors created where a cnxpt instance that is not seen on any tensor in a child role is taken to be a root of an extracted tree and one of a set of root cnxpt instances where more than one extracted trees exist in said extracted forest, wherein the empty canvas upon which the forest is to be displayed is divided proportionally to the importance of such roots, the centrality of placement on the empty canvas is selected from the group of:

i. for hierarchical forests, the root of greatest importance is placed at the center of the canvas;

ii. for hierarchical forests, the root of greatest importance is placed at the center of mass of the canvas based upon the translation of importance of roots to mass for the calculation;

iii. for hierarchical forests, where a plurality of the roots have a trait usable as a depth offset determiner from one base root, the base root is placed at the center of the canvas;

iv. for precedence forests, the root of greatest importance is placed at the center of the canvas;

v. for precedence forests, the root of greatest importance is placed at the center of mass of the canvas based upon the translation of importance of roots to mass for the calculation;

vi. for precedence forests, where a plurality of the roots have a trait usable as a depth offset determiner from one base root, the base root is placed at the center of the canvas;

vii. for precedence forests, of those dependent cnxpt instances having more than one precedent cnxpt instance in the enhanced descendent forest for the extracted precedence forest and having a first precedent root in a first extracted tree different from a second extracted tree holding a second precedent root for said dependent cnxpt instance, initially select as a dependent second cnxpt instance the dependent cnxpt instance with the greatest difference in depth from said first precedent root and said second precedent root where the depth from said first precedent root is greater, and place said first precedent root at the center of the canvas;

and viii. for precedence forests, of those dependent cnxpt instances having more than one precedent cnxpt instance in the enhanced descendent forest for the extracted precedence forest and having a first precedent root in a first extracted tree different from a second extracted tree holding a second precedent root for said dependent cnxpt instance, initially select as a dependent second cnxpt instance the dependent cnxpt instance with the greatest difference in depth from said first precedent root and said second precedent root where the depth from said first precedent root is greater, finding all such first precedent roots having the greatest depth, and place one such first precedent root at the center of mass of the canvas based upon the translation of importance of all such first precedent roots to mass for the calculation;

c. determining an error from a possible better position based upon factors selected from the group of: out of region distance, cnxpt sizing, cnxpt overlap, Euclidean distance from centroid of a child cnxpt to a prior position, Euclidean distance from centroid of a first sibling cnxpt to centroid of a second sibling cnxpt, Euclidean distance from centroid of an uncle to centroid of a child cnxpt, Euclidean distance from centroid of a parent to centroid of a child cnxpt, Euclidean distance from a parent centroid to an uncle, precedence positioning by Euclidean distance from centroid of a precedent cnxpt to centroid of a successor cnxpt, Euclidean distance from centroid of a cnxpt to centroid of a constraint surrogate cnxpt, Euclidean distance from centroid of a child cnxpt to centroid of a representative fraction of the map visualization canvas where cnxpt belongs, and flow positioning;

d. deriving a position of a child cnxpt in an extracted forest of extracted trees of cnxpts based on tensors of the child cnxpt with cnxpts selected from the group of: parent cnxpt of the child cnxpt, an uncle cnxpt of the child cnxpt, a predecessor cnxpt, a position constraint, a constraint surrogate cnxpt, and a sibling cnxpt of the child cnxpt;

e. modifying the organization of knowledge and the visualized map based on the positioning of the cnxpt; and f. updating positions with changes that have the best error reduction effect, until an error metric is reduced to a sufficient level or the descent is limited in its improvement per cycle, or a maximum number of change iterations has occurred;

whereby displayable cnxpt info-items are in positions with a cnxpt positioned inside the ancestor as well as being in the defined segment and relatively closer to the cnxpt's uncles.

62. The method of claim 1 to prepare a co-location organization of knowledge, wherein:

a. constructing an organization of knowledge wherein similar concepts are placed relatively closer to one another to achieve a collocation objective wherein the user may better understand that 'nearly identical' pairs of a first cntexxt defined by a first cnxpt and a second cntexxt defined by a second cnxpt being close together based upon:

i. similarity of one or more identity indicators such as the cnxpt name or cnxpt description as given by a semantic difference between said first cnxpt and said cnxpt;

ii. similarity information from one or more users stating an opinion or offering evidence that said first cnxpt is similar or identical to said second cnxpt;

iii. differentiation information from one or more users stating an opinion or offering evidence of a definable difference that said first cnxpt is not similar or not identical to said second cnxpt;

and iv. information from one or more users stating that said first cnxpt represents a concept subsumed by or subsuming the concept represented by said second cnxpt;

and b. preparing, optionally, a visualization from the organization of knowledge wherein similar concepts visually appear relatively closer to one another to achieve a collocation objective that is readily accessible;

whereby a tool for associative searching is populated for use with a map; whereby a visualization may be created from the organization of knowledge to provide a directly understandable representation of the map content.

63. The method of claim 62 to improve residual familiarity, further including:

a. generating bias tensors with weights according to a previously established positioning for respecting prior dxo positions on said map;

and b. generating positioning for the cnxpts of said map according to process trees for visualization generation, position determination and final sizing means for calculation;

wherein said bias tensors are considered in said determination of positioning of said dxo objects for forming the organization of knowledge and visualization for said map.

64. The method of claim 1, to visualize an organization of knowledge of the domain go wisdom of the commonplace, further comprising:

a. extracting a set of cnxpt instances and association instances based upon fxxt markings of info-items from the commonplace of information, where the map definition prescribed the fxxts to be used;

b. extracting a directed graph of cnxpt instances from said set of cnxpt instances and association instances, generating tensors;

c. generating rollup affinitive tensors;

d. generating positions for cnxpts to form an organization of knowledge from said domain of knowledge;

and e. displaying a visualization of the cnxpt instances of the organization of knowledge in an associative presentation.

65. The method of claim 1 to improve quality of a generated map as described by an exemplar, further comprising:

a. creating a map definition for which an instance will be generated to be tested for quality against an exemplar, the exemplar generated from the same or very similar map definition;

b. generating a map instance for comparison for said map;

c. generating an initial exemplar map by an approach selected from the group of:

accepting a stated normative placement positioning of cnxpts in a map, and accepting a fxxt as a replacement for a specific fxxt of those in the map definition from which to generate an exemplar map instance stating normative placement positioning of cnxpts;

d. computing an error cost value based upon the positions of generated cnxpts in the map instance for comparison relative to the normative placements in the exemplar; and e. determining an alternative set of fxxt weighting coefficients indicating a proportionality of impact wherein a generated alternative map definition based upon the alternative set of fxxt weighting coefficients indicating a proportionality of impact results in an acceptably low value of the error cost value based upon positions of generated map cnxpts relative to the normative placements or the error cost value fails to decrease at an acceptably high rate or a predetermined number of cycles have been performed.

66. The method of claim 1 to improve quality of the generated map as described by an exemplar, to also accept user training, further including:

a. creating a map definition for which an instance will be generated to be tested for quality against an exemplar, the exemplar generated from the same or very similar map definition;

b. generating a map instance for comparison from said map definition;

c. generating an initial exemplar map by an approach selected from the group of: accepting a stated normative placement positioning of cnxpts in a map, and accepting a fxxt as a replacement for a specific fxxt of those in the map definition from which to generate an exemplar map stating normative placement positioning of cnxpts;

d. accepting an initial set of quality metrics to comprise a cost function for determining an error cost value when comparing the map instance for comparison against the exemplar map;

e. accepting repositioning of zero or more cnxpt positions in the exemplar map by a user;

f. accepting a user command to open the map instance for comparison to be compared against the exemplar map;

g. accepting changes to the map instance for comparison to alter the organization of knowledge of the map instance for comparison by altering a visualization of the map instance for comparison by zero or more of a user command selected from the group of:

i. accepting repositioning of zero or more cnxpts in a visualization by a user;

ii. accepting re-categorization of zero or more cnxpts in a visualization by a user;

and iii. accepting manual resolution of zero or more positioning defects in a visualization;

h. recalculating object positions in the organization of knowledge based upon the object locations in the visualization;

i. determining improved map definition from one or more determinations of an improved set of fxxt coefficients indicating a proportionality of impact in the map instance for comparison based upon finding an acceptably near minimum error cost value, the error cost value calculated by the cost function on differences in organization of knowledge from exemplar map to a version of the map instance for comparison after forming the version of the map instance for comparison by fxxt extractions, forest extractions, roll-ups, and positionings, the choice of fxxt coefficients indicating a proportionality of impact used to generate the version of the map instance for comparison based upon calculations selected from the group of:

i. applying one or more sets of algorithmically chosen fxxt coefficients indicating a proportionality of impact, the algorithm determined from a list of one or more algorithms;

ii. accepting manually entered values for fxxt coefficients indicating a proportionality of impact of one or more fxxts from which visualization was derived; and iii. determining values of fxxt coefficients indicating a proportionality of impact based upon analysis of functions for determining an error cost value, the functions derived from inspection of changes in error cost value based upon factors from the definition and formation of the map instance for comparison, the factors selected from the group of: changes in fxxt coefficients indicating a proportionality of impact in the exemplar map, fxxt definitions of the exemplar map, forest extraction algorithm utilized in the exemplar map, roll-up algorithm utilized in the exemplar map, positioning algorithms utilized to generate the locations of cnxpts in the visualization of the organization of knowledge of the exemplar map, changes in fxxt coefficients indicating a proportionality of impact in the map instance for comparison, fxxt definitions of the map instance for comparison, forest extraction algorithm utilized in the map instance for comparison, roll-up algorithm utilized in the map instance for comparison, positioning algorithms utilized to generate the locations of cnxpts in the visualization of the organization of knowledge of the map instance for comparison, individual quality metrics, and the cost function;

j. stopping the recalculation process when the error metric cost value shows little improvement after a predefined number of recalculations, or the error metric cost value reaches an acceptably low value, or the error metric cost value fails to decrease at an acceptably high rate; and k. completing zero or more cycles wherein: accepting an alteration of one or more quality metric to comprise a revised cost function and repeating determining an improved map definition from one or more determinations of an improved set of fxxt coefficients indicating a proportionality of impact in the map instance for comparison based upon finding an acceptably near minimum error cost value from the revised cost function;

whereby user changes regarding an exemplar and repositioning in said visualization as calculated based upon user votes provide a training pattern for fxxt coefficients; whereby alterations in quality metrics are used to tune determinations of cost functions for improved use of exemplars in comparisons; whereby quality improvement of maps, map generation, and the map comparison process are each possible.

67. The method of claim 1 to also provide for providing ontology statistical analysis and modeling, comprising:

a. forming a series of models from an ontology until the rate of improvement decreases to a pre-determined rate, wherein:

i. forming a plurality of set extraction specifications partitioning the contents of an ontology into one or more identified extraction sets, the nodes of the ontology being object classes, the relationships of the ontology being object classes to support node classes, the instances of the nodes of the ontology having storage to hold zero or more values and formulas to determine said zero or more values;

ii. creating a map definition for which an instance will be generated to be tested for quality against an exemplar;

iii. generating a map instance for comparison from said map definition, wherein:

01. accepting a structuring of an ontology as a basis for modeling by specifying a weighting coefficient indicating a proportionality of impact for an extraction set wherein said extraction set is included into a named derived ontology;

02. extracting the extraction sets of ontology components into a named derived ontology, wherein the strength of every relationship instance added to the named derived ontology during extraction becomes the weighting coefficient indicating a proportionality of impact multiplied by the relationship strength in the original ontology, wherein the node importance of every node instance added to the named derived ontology during extraction becomes the weighting coefficient indicating a proportionality of impact multiplied by the node importance in the original ontology; and 03. developing a skeletal structure from the named derived ontology according to fxxt basic descendant spanning tree extraction means, respecting the weighting coefficient indicating a proportionality of impact of said extraction sets as incorporated in the named derived ontology relationships and nodes;

and iv. calculating a model result from the structured named derived ontology by computing the zero or more values of each node instance, respecting the skeletal structure, the model result comprising the zero or more values of each node instance;

and b. improving the model according to an exemplar map, wherein:

i. generating an initial exemplar map by an approach selected from the group of: accepting a stated normative placement positioning of cnxpts in a map, accepting a fxxt as a replacement for a specific fxxt of those in the map definition from which to generate an exemplar map stating normative placement positioning of cnxpts, generating a second copy of the map instance for comparison and accepting into the second copy of the map instance for comparison for use as comparators zero or more normative results anticipated of the modeling, and accepting for use as comparators zero or more normative results anticipated of the modeling the normative results in the form of a map; the normative results stated in the storage held by info-items of the map, each normative result specific to an identifiable model result;

ii. computing an error metric cost function for the differential between the modeling results and the normative results;

iii. adjusting the weighting coefficients indicating a proportionality of impact assigning a weighting variation to the extraction sets to reduce the cost value result of said error metric cost function wherein the model results based upon the weighting variation are nearer to said normative results based upon the cost value result of said error metric cost function;

and iv. accepting said set of newly assigned weighting variation weighting coefficients indicating a proportionality of impact as an acceptable set for a model to achieve a more satisfactory predictive result;

whereby a map provides a structure to aid in both controlling and improving a model based upon a commonplace.

68. The method of claim 1, to calculate quality corrections according to prediction correction mechanism utilizing fxxts, wherein:

a. creating a map definition for which an instance will be generated to be tested for quality against an exemplar, the exemplar generated from the same or very similar map definition;

b. generating a map instance for comparison from said map definition;

c. generating an initial exemplar map by an approach selected from the group of: accepting a stated normative placement positioning of cnxpts in a map, and accepting a fxxt as a replacement for a specific fxxt of those in the map definition from which to generate an exemplar map stating normative placement positioning of cnxpts;

d. repeatedly determining an error cost value based upon distances of the positions of the generated map cnxpts as cntexxt centers in a map for comparison from exemplar cnxpt placements for similar concept giving the normative placements; further including:

i. accepting zero or more repositionings of one or more exemplar positions in the exemplar map by a user;

ii. accepting zero or more repositionings of one or more cnxpts in the map for comparison by a user;

iii. accepting zero or more re-categorizations of one or more cnxpts in the map for comparison by a user;

iv. accepting zero or more manual resolutions of one or more positioning defects in the map for comparison;

v. accepting zero or more manual changes of fxxt weighting coefficients indicating a proportionality of impact of one or more fxxts from which the map for comparison visualization was derived;

vi. recalculating display object positions based upon user changes in the map for comparison visualization;

vii. determining an alternative set of fxxt weighting coefficients indicating a proportionality of impact wherein a generated alternative map for comparison based upon the alternative set of fxxt weighting coefficients results in an acceptably low value of the error cost based upon positions of generated map cnxpts relative to the normative placements in the exemplar map or the error cost value fails to decrease at an acceptably high rate or a predetermined number of cycles have been performed;

viii. re-determining improved fxxt weighting coefficients indicating a proportionality of impact based upon quality error cost value calculations, fxxt extractions, forest extractions, roll-ups, and positionings in an alternative map for comparison;

ix. adjusting weighting coefficients indicating a proportionality of impact for fxxts based upon said alternative set of fxxt weighting coefficients and generating in an alternative map for comparison, and repeating the cycle;

x. re-determining fxxt extraction, forest extraction, and roll-ups based upon quality determinations and user changes affecting the alternative map for comparison;

and xi. stopping the recalculation process when the error metric cost value shows little improvement after a predefined number of recalculations, or the error metric cost value reaches an acceptably low value, or the error metric cost value fails to decrease at an acceptably high rate;

whereby a map exemplar can convey to a map and model system a baseline expectation of the model; whereby the method provides a tool for comparison of: a market's change over time based upon market structure differences, a market's change over time based upon market data differences, a difference of a new production paradigm to an older one, a complex data collection approach versus an original mode of data collection, how the performance of a process might affect a result, whether a complex report from a source is believable given information known by a disparate team, how an econometric mode would need to be altered given a new set of data, whether a thinking pattern of a group affects a modeling result, and how a mindset of one group is different from another or affects a model result; whereby use of votes and consensus computation provides for reapplying corrections where new data is ingested that contains the same error.

69. The method of claim 1 to improve map quality, further comprising modifying at least one item selected from the group of: the subset of fxxts, the weights assigned to the subset of fxxts, the weights of the associations in the fxxts extracted, and the assignment of a cnxpt to a fxxt extracted.

70. The method of claim 1 to also provide protecting against unapproved or unpaid release of private information intended to be protected while held in the commonplace, further comprising:

a. controlling access by the user by identification of user, authentication, granting of access to the commonplace content;

b. performing fee-based usage and usage right granting of for fee functions;

c. controlling the user's adding of information to the commonplace;

d. controlling participation by the user in one or more marketplaces for ideas;

e. controlling participation by the user in one or more marketplaces for data related to specific concepts categorized in the commonplace;

f. controlling access by the user to functions for establishing protection for an idea, granting access to the idea, granting access to project teams involved with applying the idea, and, if novel, to legal protection for the idea;

g. controlling access by the user to tools for ideating, searching, organizing, protecting, commercializing, communicating, and extending an idea in the commonplace;

and h. controlling presentations of results to users and accepting navigation and other user commands for use of said maps, to at least one of registering votes for changes or causing changes to said commonplace content according to alter information through visualization means.

71. The method of claim 1, further comprising:

a. enabling participation around a categorization;

b. managing multi-source collaboration by consensus; and c. incentivizing creation of new or refining of knowledge.

72. The method of claim 1 to also provide forming a profit, further comprising:

a. deriving a chain of events structuring of ownership changes regarding a venture exploiting at least one idea, further comprising:

i. accepting a definition of a consortium showing an intent to exploit at least one cnxpt;

ii. accepting at least one request regarding participation in the consortium;

and iii. providing a value creation protocol for the consortium that comprises a group of at least one related cnxpt, further including:

01. generating at least one first ownership right for the consortium;

02. generating a transactional data stream for communication regarding the consortium;

03. generating a first transaction regarding at least one related cnxpt by encapsulating into the transaction information selected from the group of: information regarding request for a new ownership right in favor of a second user, second user identifying data, second user appropriate origination data related to said new ownership right, and cnxpt identity of said at least one related property cnxpt;

04. adding information regarding a first transaction into the transactional data stream;

05. distributing the transaction through the transactional data stream;

and 06. granting access to said consortium transaction according to said first ownership right.

73. The method of claim 1, to utilize assistance of others or experts when necessary in adaptive resource allocation, further including:

a. engaging zero or more others for work of a nature selected from the group of:

i. in the role of qualified data scientist in the data curation loop to determine questions that need to be answered from the input data and selecting analytics to apply for finding answers and performing automated error detection;

ii. in selecting an analytic to apply wherein sponsoring business articulates the value of running the analytic; and iii. in the role of qualified domain expert to answer data-centric questions regarding input data;

b. establishing zero or more incentives for others selected from the group of:

i. incenting the data creator or owner;

ii. incenting data producing human to curate and integrate data into said commonplace at the source;

iii. incenting data using human to curate and express opinion regarding correctness of data into said commonplace at the point in the process where wrong data causes sufficient frustration to cause responsive actions by knowledgeable users;

iv. incenting openly rather than hiding the operations to generate sense of participation and openness;

v. incenting specialized knowledge is required for data curation by identifying domain where human has expertise and their amount of expertise, from a novice level to enterprise expert;

and vi. incentivizing business experts to assist in making curation decisions with hierarchy of experts inside an enterprise as well as various kinds of expertise externally;

and c. accepting and processing one or more request selected from the group of:

i. registering one or more curating sponsors for data curation and noting compensation they offer for curation of the data they are seeking curation of;

ii. stating task definition and role curators are to fulfill;

iii. determining domain knowledge and skills requirements of curators;

iv. identifying data resources that require curation;

v. finding enterprise data sources;

vi. searching for data needing review wherein the data to be retrieved is within subject matter expertise domain knowledge of searcher, wherein said one or more curating sponsors for data curation have offered a higher level of compensation for the data retrieval than other such data;

vii. phasing of project to perform incremental identification, metadata adjustment, integration, reviewing iterations;

viii. scheduling resources adaptively;

ix. crawling to search a corporate internet to locate relevant data sources;

x. registering data to be curated;

xi. enlisting crowdsourcing labor;

xii. generating a fxxt under which the loaded data will be marked;

xiii. entering detailed provenance information regarding the data source and data segment identity information into said commonplace as an irxt instance marked by said fxxt;

xiv. invoking analytics to apply initial opinions regarding quality of knowledge of data sets by detailed provenance;

xv. establishing a data set segmentation structuring paradigm for the data to be curated as a detailed provenance record set;

xvi. loading data sets on a trial basis;

xvii. ingesting base data info-items for typing and traits while tracking detailed provenance and marking said base data info-items by said fxxt;

xviii. tracking by detailed provenance tasks for trial loading and successive reloads, identifying segments loaded by updating detailed provenance, stating a metric for data set quality after each segment incrementally loaded, and identifying as ready for detailed review iterations each successfully loaded data set segment;

xix. registering as a prioritized task and detailed provenance the necessity of a specific repair of an erroneous data set, based upon opinions recorded and resources available, on an irxt instance for tracking, marking said irxt instance by said fxxt;

xx. applying changes to data set data to fix errors based upon failure to properly load or quality found below a predetermined level of trustworthiness of opinion;

xxi. recording on an irxt instance for each data segment an opinion regarding the quality and veracity of the incrementally loaded data segment by detailed provenance identification based upon trustworthiness of opinion from viewpoint of sponsor and trustworthiness of data specialist involved in curation;

xxii. generating a cnxpt instance for each identifiable concept from a loaded data set segment, relating to said cnxpt instance the irxt instance being used for tracking of the data segment by an occurrence, assigning a default importance weighting for said cnxpt instance, and marking it by said fxxt;

xxiii. generating an association instance for each relationship of a first concept from a loaded data set segment, the first concept represented by a first cnxpt instance, to a second concept represented by a second cnxpt instance possibly of a different data source, assigning a default strength weighting for said association instance, marking the association instance by said fxxt;

xxiv. applying an analytic to obtain machine learning results from one or more algorithms that will generate one or more cnxpt or association instances and set a default weighting automatically on each generated instance;

xxv. iterating, until the curation effort is sufficiently complete, thorough unfinished work tasks, applying changes to weightings on generated association and cnxpt instances as concepts and relationships between cnxpts are better understood;

xxvi. executing modeling to generate a prediction;

and xxvii. calculating quality corrections according to prediction correction mechanism.

74. The method of claim 1 to allow commonplace of information to be utilized in remote commonplaces without loss of control, further including:

a. providing an extracted commonplace separate from the primary controlled commonplace;

b. extracting portions of an individually identified record of information from said controlled commonplace into a partial record;

c. assigning a different unique identifier for said partial record to form an individually identified partial record according to key encryption means;

d. communicating said individually identified partial record into a foreign commonplace;

and e. indexing information of said foreign commonplace to said individually identified partial record by referencing said different unique identifier according to key encryption means.

75. The method of claim 1 to also provide communication sessions earmarked to a cnxpt, further including:

a. providing a controlled communications information repository;

b. providing tools for communicating regarding a ttx on a confidential basis with others on a narrow-chat basis knowing the expertise of the other party merely because of their willingness to communicate on the narrow-chat basis for a specific ttx category with those of similar level of expertise;

and c. establishing on-demand communication between users earmarked to designated ttx when requested with a command accepted through one or more access controlled interfaces.

76. The method of claim 75 to establish communications earmarked to a cnxpt, further comprising:

a. determining, by at least one processor, at least one user display visualization according to map generation means for display to a user from said organization of knowledge of at least one domain of wisdom for initial viewing;

b. displaying to said user a portion of said organization of knowledge of at least one domain of wisdom according to display and delivery means; and c. accepting and processing a user command to request a connection with a person showing interest regarding concepts within a context represented by a cnxpt, the interest selected from the group of: recent expertise, registered subscription, inventorship, investment interest, and a wish shown to purchase.

77. The method of claim 1, wherein distributing the subsets extracted from the commonplace of information comprises distributing immutable subsets among the multiple computer storages wherein each subset is uniquely identifiable by an extraction identifier;

whereby the state of commonplace information is preserved by timeframe.

78. The method of claim 1 to also structure modeling, further including:

a. accepting a model definition for an info-item property to establish a repeatable calculation procedure for generating a value for said property from said commonplace;

b. collecting commonplace of information as base information for said model; and c. accepting zero or more estimates for said info-item property to establish a baseline for detecting problems with said model, for acting in said place of said calculation before it works, and to act as a default value;

whereby a set of calculations is established to obtain values for info-item properties to be applied to each instance of said info-item in a set specified by said model.

79. The method of claim 78 to also form a value estimate of a tcept, further comprising:

a. limiting the calculating by imputation of value from appcepts related by a satisfaction of need relationship by the time frame of availability and non-obsolescence of the tcept;

whereby prediction by space of applications of technology is imputed to determine values of technologies satisfying the requirements of a set of applications.

80. The method of claim 78 to also predict, further including:

a. accepting a prediction definition for a map specification to establish a repeatable procedure for generating a value for said prediction from said commonplace based upon said map;

b. calculating preliminary predictions not depending upon hierarchy according to preliminary prediction calculation means; and c. calculating prediction for each cnxpt at a level by level of a formed map tree taxonomy according to forming predictions means;

whereby a set of calculations is established to obtain values for cnxpt info-item properties to be applied to each instance of a cnxpt in a set specified by said prediction specification.

81. The method of claim 1 to perform modeling wherein the method further comprises:

a. combining into a predictive model at least one form of information selected from the group of: attribute value of structured entity, property of relationship, property of association, property of tensor, property of ttx, property of cnxpt, function of property of group of ttxs, function of property of group of cnxpts, parsing of text into indication of value, parsing of text into indication of relative position, parsing of text into semantic roles, structured text, numerical values, equation, algorithm, unstructured textual value, probability density function definition, statistical sampling, function, data set, probability mass function definition, and a distribution; and b. applying interpretations of predictive model to predict results.

82. The method of claim 81 to also form an estimate of a metric of a cnxpt, further including:

a. calculating the total metric value as the sum of the metric values of the children of the cnxpt in an extracted forest of cnxpts;

whereby prediction utilizes the calculation of metrics of cnxpt children.

83. The method of claim 81 to perform modeling on the basis of a structuring of info-items, further comprising:

a. structuring an organization of knowledge from an extraction of info-items from the commonplace of information; and b. determining a modeling result by interpreting the model;

wherein the structuring involves at least one criterion selected from the group of:

i. modeling is on the basis of a single forest of trees categorization;

ii. modeling is based upon multiple sub-categorizations with roots where at least one of the categorization cnxpts are of a different type or nature;

iii. modeling is based upon multiple sub-categorizations with roots where at least one inter-category association is of a different type in each said sub-categorizations sub-tree;

iv. modeling is based upon multiple forest of trees categorizations where at least one of the cnxpts are of a different type or nature, or at least one root occurs in only one forest, or at least one inter-category association is of a different type in each said forest;

v. modeling is based upon dependency, precedence, causality, or surrogate causality;

vi. modeling is based upon probability density functions for outcomes of a dependency, a precedence, a causality, or a surrogate causality;

vii. modeling is based upon categorization to determine result and result is determined based upon causality or surrogate causality wherein a causal association info-item exists between a parent to child category and a set, voted, probabilistically expected strength of associations between children and their possible parents is determinant;

viii. modeling is based upon a categorization where end products are shown as assemblies of constituent parts or work tasks, each being represented by a category;

ix. modeling is based upon a categorization where organizations are shown as groupings of individuals or functions, each being represented by a category;

x. modeling is based upon a categorization where outcomes are prioritized, tasks are prioritized; tasks are assigned or work completed by category;

xi. modeling is based upon a categorization where prioritization or decisions are made by category;

xii. modeling is based upon a categorization where strategies are subdivided into plan phases or results each being represented by a category;
xiii. modeling is based upon a matching of categories between a plurality of single forest of trees categorizations;
xiv. modeling is based upon a calculation involving a property of an info-item;
xv. modeling is based upon a calculation involving a property of another info-item; and
xvi. modeling is based upon an association occurring between a first category of a first single forest of trees categorization and a second category of a second single forest of trees categorization.

84. The method of claim 1 to also form an estimate of a metric of a cnxpt, further including:
a. calculating total space consumed by the two-dimensional area occupied by a cnxpt taken over all cnxpts shown on a visualization of a map of cnxpts at a given depth of said visualization of the map;
b. calculating by estimate, model, or imputation the total metric for all cnxpts shown on the visualization of the map of cnxpts at the given depth of said visualization of the map; and
c. calculating the metric for the cnxpt based upon proportion of space by dividing the area of the cnxpt by the total space consumed on a visualization of the map of cnxpts at the depth of the cnxpt on the visualization of the map and multiplying the proportion by the total metric;

whereby prediction by space utilizes the calculation of metrics by space consumed on the map of cnxpts up to the horizon shown, or upon, including but not limited to: interest shown, and predictions affecting sizing; whereby the proportion of space allotted to a cnxpt, in specific fxxts serving as the basis, is calculated from the resulting size of the cnxpt.

85. The computer-implemented method of claim 1, further comprising:
a. providing modeling rule interpretation software instructing what if value analysis;
b. providing zero or more modeling tools for what if value analysis tuned to operate on said categorizations produced according to map generation means;
c. accepting zero or more definitions of a condition equation for a result based upon zero or more specific variables attached to zero or more referenced cnxpts;
d. accepting zero or more definitions of an outcome specification stating expected or potential outcomes in terms of modeling conditions that, if met, imply that the outcome will occur;
e. accepting at least one definition of a model;
f. accepting, for said at least one definition of a model, at least one definition of a modeling rule, said modeling rule selected from the group of: calculation modeling rule, constraint modeling rule, and information base modeling rule, said at least one modeling rule specifying at least one equation to attach to at least one cnxpt;
g. accepting zero or more definitions of one or more default values of a type required, said default value type selected from the group of: predetermined analytic control default value, predetermined analytic default result value, modeling variable default value, modeling parameter default value, modeling result default value, prediction parameter default value, and prediction result default value;
h. accepting a command to initiate processing of calculation specifications of a predetermined set of info-items;
i. accepting zero or more commands to initiate a methodology;
j. accepting zero or more definitions of one or more data fault mechanisms for raising an error indication, said data fault mechanism selected from the group of: predetermined analytic data fault mechanism, modeling data fault mechanism, and prediction data fault mechanism;
k. accepting zero or more commands to initiate a workflow;
l. accepting zero or more definitions of one or more what if value analysis scenarios tuned to operate on a predetermined fxxt;
m. accepting zero or more definitions of a commonality determination rule stating an enrolling of a modeling tool for competitive analysis by what if value analysis tuned to operate on said commonplace and said categorizations produced according to map generation means;
n. accepting zero or more commands to initiate what if modeling;
o. accepting zero or more changes to said knowledge model of said commonplace;
p. accepting zero or more commands to initiate processing of different subject matter for generating a predetermined visualization;
q. accepting zero or more definitions of belief distribution functions;
r. accepting zero or more commands to initiate prediction management to manage acceptance of belief votes;
s. accepting zero or more belief votes, said belief votes selected from the group of: subjective opinion votes, estimation votes, and analytic result votes;
t. accepting zero or more definitions of a prediction specification, said prediction specification's type selected from the group of: info-item specific, non-fxxt based prediction, and fxxt specific; and
u. assembling predictions according to forming predictions means to calculate properties of info-items based upon the modeling rules specified for the info-item either by info-item type or for a specific instance of the info-item, without regard to any fxxt based taxonomy according to preliminary prediction calculation means.

86. The method of claim 1 to perform multi-forest modeling on the basis of single forests of trees, further including:
a. executing one or more cnxpt sub-setting operations selected from the group of: a query, a reduction, a derived ontology, a fxxt extraction, a flow extraction, execution of an analytic, selection of a data set, selection of a portfolio, selection of a uniquely identified categorization, selection of a uniquely identified clump extract set, a filter application, or a user ad hoc selection set of cnxpts to obtain a set of cnxpts resulting from each of said sub-setting operations;
b. forming an area of consideration from each said set of cnxpts defining a forest of trees and the relationships extracted according to apply fxxt specification means based upon zero or more fxxt markings for said set of cnxpts;
c. extracting a descendent tree forest from each said area of consideration according to fxxt basic descendant spanning tree extraction means where results of modeling rule formulas are dependent upon tree structure and positioning;

d. interpreting said modeling rule formulas associated with said cnxpts in each said area of consideration where results of said modeling rule formulas are considered in positioning process and said modeling rule formulas do not depend upon positioning of cnxpts or where results of said modeling rule formulas are not considered in positioning process;

e. determining positioning of cnxpts in each said area of consideration on a predetermined visualization where results of said positioning results are to be considered in said modeling rule formulas according to process trees for visualization generation, position determination and final sizing means;

f. interpreting said modeling rule formulas associated with said cnxpts in each said area of consideration where results of said modeling rule formulas depend upon positioning of cnxpts;

g. applying zero or more filters determining inclusion based upon characteristics of cnxpts to eliminate one or more cnxpts of said area of interest;

h. re-interpreting said modeling rule formulas associated with said cnxpts remaining in each said area of consideration;

i. forming a set of intersection identifying tuples wherein each tuple is an ordered tuple of dimensionality set by the number of dimension forests obtained by said sub-setting operations and wherein each tuple is constructed by selecting one cnxpt from each set of cnxpts defining a dimension to hold a tuple position associated with the dimension identified by the order of said position in the tuple;

j. forming a subset of said intersection identifying tuples by extracting relationships according to apply fxxt specification means based upon zero or more fxxt markings wherein only tuples where the cnxpts of the tuple are fully connected by said extracted relationships are in said subset of said intersection identifying tuples;

k. applying zero or more filters determining inclusion based upon characteristics of cnxpts named in a valid intersection tuple to eliminate one or more intersection identifying tuples;

l. generating a plurality of model result tuples each associated with one said intersection identifying tuple and of: values resulting from execution of modeling rule formulas on characteristics of said cnxpts forming a tuple in said subset of said intersection identifying tuples;

and m. generating a model results data package of: the set of said plurality of intersection identifying tuples each with associated model result tuple.

87. The method of claim 1 to perform modeling on the basis of one or more maps and one or more modeling rules, further including:

a. accepting a set of one or more modeling rules;

b. creating an empty first derived ontology;

c. determining the nature of each modeling rule to plan model execution;

d. executing one or more cnxpt sub-setting operation to obtain a set of cnxpts and associations in a first derived ontology resulting from said sub-setting operation;

e. executing all rules that determine whether a cnxpt or an association should or should not be in said first derived ontology;

f. executing all rules that determine a value of a property of a cnxpt or an association that could affect the skeletal structuring of a map being generated from said first derived ontology;

g. extracting a descendent tree forest from said first derived ontology according to fxxt basic descendant spanning tree extraction means while utilizing modeling rules that determine whether an association should or should not be used in the skeletal structure of a map to be generated from said first derived ontology;

h. executing production of enhanced descendent forest, basic ascending forest, and enhanced ascending forest using the descendant spanning forest and said first derived ontology;

i. executing all rules that depend upon results of generating forests but not later steps of map generation;

j. executing all rules that determine a value of a property of a cnxpt or an association that could affect the positioning of a map being generated from said first derived ontology and that must be applied prior to roll-ups;

k. executing roll-ups on the generated forests while executing rules that determine a value of a property of a cnxpt or an association that could affect the positioning of a map being generated from said first derived ontology and that must be applied during roll-ups;

l. executing all rules that determine a value of a property of a cnxpt or an association that could affect the positioning of a map being generated from said first derived ontology and that must be applied after roll-ups;

m. executing positioning on the generated forests after roll-ups, utilizing all rules that could affect the positioning of info-items on a map being generated from said first derived ontology and that must be applied during positioning, according to process trees for visualization generation, position determination and final sizing means;

n. executing all rules that depend upon results of positioning but not later steps in map generation;

o. determining efficient derivation trees from each rule of type;

p. interpreting modeling rules iteratively based upon the derivation trees;

and q. returning control to the supervising process while monitoring for triggering due to a change of data or organization of info-items;

whereby efficient modeling including interpretation of cell-like formulas for properties of cnxpts is performed.

88. The method of claim 1 to also provide for ontology statistical analysis and modeling, further comprising:

a. accepting a structuring of an ontology as a model basis;

b. calculating a model result from said model basis;

c. accepting a normative result anticipated of the modeling;

d. computing an error metric for the differential between the modeling result of the structuring and the normative solution;

e. adjusting the weighting coefficients indicating a proportionality of impact assigning weighting to said set extractions to reduce said error metric wherein a secondary model result is nearer to said normative result; and f. accepting said set of assigned weighting coefficients indicating a proportionality of impact as an acceptable set for a model to achieve a satisfactory predictive result.

89. The method of claim 1, to produce a map from a commonplace of information demarcating what is completed of a process from what is not completed at any point in time, further comprising:

a. extracting a structuring of cnxpts where a dimension presents a time aspect where the oldest cnxpt appears earliest and a cnxpt predicted to be most toward the future appears as latest;

and b. slicing the structuring by a timeline as a plane representing a time horizon to prepare an organization of knowledge where the cnxpts anticipated to be incomplete at the time of the timeline fall to the future side of the timeline and are optionally not shown, and the cnxpts anticipated to be complete at the time of the timeline fall to the more historic side of the timeline and are optionally not shown;

wherein the visualization of the organization of knowledge presents at least one cnxpt or informs the user that all cnxpts are hidden.

90. The method of claim 89 to produce a demarcation on a map from a commonplace of information, further comprising:

a. extracting a forest of cnxpts to position cnxpts in a organization of knowledge having two or more dimensions;

b. dividing the map by positions of cnxpts by drawing a demarcation hyperplane of a type selected from the group of:

i. time, further including:

01. drawing a demarcation hyperplane of a type based upon dimensionality selected from the group of: a line perpendicular to the flow of time in a two-dimensional organization of knowledge, a plane perpendicular to the flow of time in a three-dimensional organization of knowledge, and a hyperplane perpendicular to the flow of time in a dimensionality greater than three but reduced to three for display; the hyperplane representing a time point in the flow of time represented by the positioning of cnxpts in the visualizable organization of knowledge of at least one domain of wisdom derived from the commonplace of information, wherein the time point hyperplane is substantially positioned at a first distance from the oldest root cnxpt and at a second distance from a cnxpt that is predicted to be the most into the future;

02. slicing the forest across on said hyperplane and flattening the organization of knowledge to show root cnxpts and those cnxpts on or more shallow than the hyperplane to prepare a two-dimensional flattened visualization where the cnxpts further than the hyperplane from the earliest root are not shown, the two-dimensional slice representing a time horizon;

and 03. interpreting the demarcation hyperplane to substantially be an indication selected from the group of:

the demarcation separating what is known from that which is unknown at any chosen point in time stated by a time horizon, the substantiality of knowledge high for time horizons earlier than the date of viewing, the substantiality of knowledge predicted for time horizons more futuristic than the date of viewing;

the demarcation separating what is completed of a process from what is not completed at any chosen point in time stated by a time horizon, the substantiality of knowledge high for time horizons earlier than the date of viewing, the substantiality of knowledge predicted for time horizons more futuristic than the date of viewing;

the demarcation separating the time frames of a technology selected from the group of: including where the feasibility of the technology is essentially zero from a time frame where the technology may be formed into a product, the time of the technology reaching a sales goal, the time of the technology reaching a determined point in marketability of a set of features, the time of the technology reaching breakeven on investment, the time of the technology being productized from a time frame where the technology may have captured its maximal market, the time of the technology losing its competitive edge from a time frame where the technology may be a cash cow, and the time of the technology being a cash cow from a time frame where the technology may have become ineffective as a product; the substantiality of knowledge high for time horizons prior to the date of viewing, the substantiality of knowledge predicted for time horizons more futuristic than the date of viewing;

the demarcation separating the time frame phases in a battle plan, the substantiality of knowledge high for time horizons prior to the date of viewing, the substantiality of knowledge predicted for time horizons more futuristic than the date of viewing;

the demarcation separating the time frame phases in a legal case, the substantiality of knowledge high for time horizons prior to the date of viewing, the substantiality of knowledge predicted for time horizons more futuristic than the date of viewing;

the demarcation separating the time frame phases in a logististics or operations management plan, the substantiality of knowledge high for time horizons prior to the date of viewing, the substantiality of knowledge predicted for time horizons more futuristic than the date of viewing;

and the demarcation separating what outcomes have been achieved or are highly likely from what outcomes are merely anticipated at any chosen point in time stated by a time horizon relative to the probabilistic model viewed, the substantiality of knowledge high for time horizons earlier than the presumed state of completion of the probabilistic model, the substantiality of knowledge predicted for time horizons more futuristic than the presumed state of completion of the probabilistic model;

and ii. agreement regarding belief at a time horizon, further including:

01. accepting a cut-off value for consensus proportion from the user, the cut-off regarding the percentage of those agreeing to a belief represented by a cnxpt as determined by the existence and veracity of the association where the cnxpt has a role examined in conjunction with votes regarding the veracity of the cnxpt itself, the cut-off stating acceptability of a cnxpt having an expressed belief level percentage higher than the cut-off in the population of voters reflected in the derived ontology for the map instance; wherein the cut-off to improve the believability that the model stated by the map honorably reflects that beliefs are reflected by such associations and stated votes regarding beliefs represented by cnxpts;

02. re-extracting the forest from the derived ontology of the map wherein only associations that represent time related orderings are considered for use as hierarchical tensors, wherein constrictions are applied on generation of hierarchical tensors as selected from the group of: removing from consideration the associations having a product of association consensus proportion and veracity consensus of the cnxpt in the child role of the association that is below the cut-off, generating hierarchical tensors with consensus weights greater than a cut-off for cnxpt veracity votes to eliminate low veracity cnxpts from roles in associations to cause association elimination from consideration, and generating hierarchical tensors with consensus weights greater than a cut-off for association veracity;

03. drawing a demarcation hyperplane of a type based upon dimensionality selected from the group of: a line perpendicular to the flow of time in a two-dimensional visualization, a plane perpendicular to the flow of time in a three-dimensional visualization, and a hyperplane perpendicular to the flow of time in a dimensionality greater than three but reduced to three for display; the hyperplane represents a time point in the flow of time represented by the positioning of cnxpts in the visualizable domain of wisdom derived from the commonplace of information, wherein the time point hyperplane is substantially positioned at a first distance from the oldest root cnxpt and at a second distance from a cnxpt that is predicted to be the most toward the future;

04. slicing the forest across on said hyperplane and flattening the visualization to show root cnxpts and those cnxpts on or more shallow than the hyperplane to prepare a two-dimensional flattened visualization where the cnxpts further than the hyperplane from the earliest root are not shown, the two-dimensional slice representing a time horizon;

and 05. interpreting the demarcation hyperplane to substantially be an indication selected from the group of:

the demarcation separating what is commonly accepted as known from that which is unknown or not commonly accepted as known at any chosen point in time stated by a time horizon, the substantiality of knowledge high for time horizons earlier than the date of viewing, the substantiality of knowledge predicted for time horizons more futuristic than the date of viewing;

the demarcation separating what is commonly accepted as completed of a process from what is not completed or not commonly accepted as completed at any chosen point in time stated by a time horizon, the substantiality of knowledge high for time horizons earlier than the date of viewing, the substantiality of knowledge predicted for time horizons more futuristic than the date of viewing;

the demarcation separating what outcomes are commonly accepted as having occurred or likely to from what outcomes are merely anticipated by a small group at any chosen point in time stated by a time horizon relative to the probabilistic model viewed, the substantiality of knowledge high for time horizons earlier than the presumed state of completion of the probabilistic model, the substantiality of knowledge predicted for time horizons more futuristic than the presumed state of completion of the probabilistic model;

the demarcation separating what beliefs are likely to be held by a proportion of a population of voters from what beliefs are not yet settled on objectively by the population of voters at any chosen point in time stated by a time horizon relative to the probabilistic model viewed, the substantiality of knowledge high for time horizons earlier than the presumed state of completion of the probabilistic model, the substantiality of knowledge predicted for time horizons more futuristic than the presumed state of completion of the probabilistic model;

and the demarcation separating objective beliefs from subjective beliefs at any chosen point in time stated by a time horizon relative to the probabilistic model viewed, the substantiality of knowledge high for time horizons earlier than the presumed state of completion of the probabilistic model, the substantiality of knowledge predicted for time horizons more futuristic than the presumed state of completion of the probabilistic model.

91. The method of claim 1, to produce a map from a commonplace of information demarcating what outcomes are anticipated from what outcomes are no longer anticipated at any point in time, further comprising:

a. extracting a structuring of cnxpts where a depth dimension presents a time aspect and at least one cnxpt is an event and at least one cnxpt is an outcome;

b. slicing the structuring by a timeline horizon plane where any outcome whose state is not resolvable at the time of the timeline fall to the future side of the timeline plane;

and c. incorporating the timeline plane into a visualization.

92. The method of claim 1 to also provide for ensemble modeling related to concepts represented by cnxpts within a commonplace of information, further comprising:

a. adding to at least one first cnxpt a characteristic to hold zero or more values wherein the first cnxpt has at least one internal construct selected from the group of: an attribute, a property, a method variable, and a method result;

b. adding to zero or more second cnxpts a method to state a computing operation;

c. providing zero or more modeling tools for fuzzy set based model analysis according to map generation means;

d. extracting a derived ontology according to a map definition wherein a said first cnxpt is in the derived ontology, and said second cnxpt is in the derived ontology;

e. executing modeling on said derived ontology by performing operations on copies of cnxpt instances of said commonplace where said copies of cnxpt instances are referenced in said derived ontology, according to map generation means, further including:

f. assigning at least one value to a cnxpt property characteristic according to a referenced value specification of a type selected from the group of:

i. a value primitive;

ii. a null;

iii. a default;

iv. a referenced property characteristic of a cnxpt;

v. a result of a specified cnxpt method; and vi. the result of interpreting an equation specification referencing zero or more exposed constructs selected from the group of: sets of cnxpts, sibling cnxpts, parent cnxpts, cnxpts marked by a fxxt, children cnxpts, ascendant cnxpts, descendant cnxpts, cousin cnxpts, uncle cnxpts, leaf cnxpts, root cnxpts, related cnxpts in other generated structures, map object internal property constructs, model definition internal property constructs, user specified values, and user specified parameters;

and g. utilizing at least one value of at least one cnxpt property characteristic, the utilizing of a type selected from the group of: reporting to user, reporting to an external function, entering a vote into the commonplace stating a value based upon the resulting value of the property, and performing an action based upon the resulting value of the property;

whereby a derived ontology formed on the basis of a map definition holds a cnxpt that participates in said ensemble modeling as a computing object in an object-oriented paradigm.

93. The method of claim 1, to perform fuzzy logic modeling on the basis of categorization, further including:

a. create an empty derived ontology to accept member info-items;

b. preparing, by at least one processor, at least one consensus organization of knowledge of at least one domain of wisdom comprising at least in part a fxxt with a fuzzy marking criterion specified in an fuzziness parameter info-item with at least one fuzziness parameter property object identified by an identity of a property of the info-items that may be members of the fxxt to provide for a multi-factor fuzziness and classification fuzziness, the members added to the derived ontology, the object providing parameters for the fuzzy extraction depending upon the marking criterion, wherein the marking criterion for fuzziness is selected from the group of:

i. a bivalent condition marking to define crisp fuzzy sets wherein the fxxt has a defined fuzziness parameter info-item with one fuzziness parameter property object having a minimum threshold value field, a maximum threshold value field, and an a-cut value between the minimum and maximum, the values in the value fields for normalization of the values of the property with the same property identifier in each info-item considered for membership, wherein the value of the property in an info-item being considered for membership when normalized according to the fuzziness parameter property object is termed the grade of membership, wherein if the value of the property in an info-item being considered for membership is greater than or equal to the value in the maximum threshold value field the info-item is extracted to be in the resulting extraction, wherein if the value of the property in an info-item being considered for membership is less than or equal to the value in the minimum threshold value field the info-item is not extracted to be in the resulting extraction, wherein if any other value is assigned to the value of the property in an info-item being considered for membership the info-item would become a member if the value of the property is greater than or equal to the a-cut value;

ii. a function based bivalent condition marking to define crisp fuzzy sets wherein the fxxt has one or more defined fuzziness parameter info-items with one fuzziness parameter property object having a minimum threshold value field, a maximum threshold value field, a function to compute a membership grade normally from the properties of info-items being considered that match the property objects of the fuzziness parameter info-item, and an a-cut value between 0 and 1, wherein the values in the value fields for normalization of the values of the property with the same property identifier in each info-item considered for membership, wherein the value of zero or more properties in an info-item being considered for membership are normalized according to the fuzziness parameter property object and used in the function as a factor to produce a value termed the grade of membership, wherein if the grade of membership of an info-item being considered for membership is greater than or equal to the value a-cut value field the info-item is extracted to be in the resulting extraction, and otherwise is not extracted to be in the resulting extraction;

iii. a function based l-fuzzy set and neutrosophic fuzzy set marking to define partial membership sets wherein the fxxt has one or more defined fuzziness parameter info-items with one fuzziness parameter property object having a minimum threshold value field, a maximum threshold value field, a degree of membership function whose value is always between 0 and 1, a degree of non-membership function whose value is always between 0 and 1, and a degree of indecisiveness function whose value is always between 0 and 1, wherein the sum of degree of membership and degree of non-membership and degree of indecisiveness is less than or equal to 1 and greater than or equal to 0, wherein the values in the minimum and maximum value fields for normalization of the values of the property with the same property identifier in each info-item considered for membership, wherein for each one or more properties in an info-item being considered for membership where there is a fuzziness parameter property object of the same identity in the defined fuzziness parameter info-item the property is normalized according to the fuzziness parameter property object and used in the functions of the defined fuzziness parameter info-item to determine the degree of membership and degree of non-membership and degree of indecisiveness for each property, wherein the use of the degree of membership and degree of non-membership and degree of indecisiveness results is based upon the property of the info-item, wherein if any of the one or more properties in an info-item meet the criteria for membership then the info-item is made a member of the fuzzy set of the extracted fxxt, the property of a type selected from the group of:

01. univariate wherein if the degree of membership is greater than 0, the degree of membership is multiplied against the property value to reset the property in the info-item and make it a member;
02. bivariate wherein if the degree of membership is greater than 0 or if the degree of non-membership is greater than 0, the degree of membership is multiplied against the first factor variable value of the property and the degree of non-membership is multiplied against the second factor variable value of the property and the info-item with the new values is made a member;
03. univariate with indecisiveness wherein if the degree of membership is greater than 0, the degree of membership is multiplied against the property value to reset the property in the info-item and make it a member while the degree of assuredness is set to 1 minus the result of the degree of indecisiveness function;

and
04. bivariate with indecisiveness wherein if the degree of membership is greater than 0 or if the degree of non-membership is greater than 0, the degree of membership is multiplied against the first factor variable value of the property and the degree of non-membership is multiplied against the second factor variable value of the property and the info-item is made a member while the degree of assuredness is set to 1 minus the result of the degree of indecisiveness function;

iv. a marking wherein the fxxt has a defined threshold value and the marking is selected from real numbers between 0 and 1 where if the value of 1 is assigned to an info-item the info-item is extracted to be in the resulting extraction, wherein if the value of 0 is assigned to an info-item the info-item is never extracted to be in the resulting extraction, wherein if any other value is assigned to an info-item the info-item is extracted to be in the resulting extraction on the basis of the marking being greater than the threshold;

and v. a marking wherein the fxxt has a defined threshold function yielding a value, the input to the function a property of an info-item under consideration for extraction, and the marking is selected from real numbers between 0 and 1 where if the value of 1 is assigned to an info-item the info-item is extracted to be in the resulting extraction, wherein if the value of 0 is assigned to an info-item the info-item is never extracted to be in the resulting extraction, wherein if any other value is assigned to an info-item the info-item is extracted to be in the resulting extraction on the basis of the marking being greater than the value obtained from the threshold function for that info-item;

whereby a fuzzy set is constructed as a fxxt extraction into a derived ontology.

94. The method of claim 1, further including:

a. accepting creation of instances of info-items; and b. accepting creation of relationships between info-items;

whereby txo instances, cnxpts, and other objects are created and commonality relationships, sub-typing relationships, keyword relationships, phrase commonality thesauri, and other relationships created to improve the commonplace data.

95. The method of claim 1, further including:

a. accepting a command regarding a definition of said fxxt from said user selected from the group of: an info-item addition command defining a new fxxt along without parameters stated, an info-item addition command defining said new fxxt along with stated parameters, and an info-item change command refining a fxxt definition along with stated parameters;

b. accepting with said command regarding said fxxt definition a fxxt identity value of type selected from the group of: a lack of value specifying to use a system generated identity, a parameter value acceptable as an identity, a form fill-in value acceptable as an identity, and a value acceptable as an identity that is acceptable to the user interface;

c. accepting with said command regarding said fxxt definition an assignment of zero or more rights policies regarding the organization of knowledge wherein a rights policy assigned to a fxxt specification is applicable to all knowledge marked by the fxxt, wherein the user is enabled to access an info-item within the organization of knowledge with the accumulation of access rights applicable to zero or more applicable rights resolution regimes selected from the group of:

i. a regime based upon identity of a first user;

ii. a regime based upon identity of a first organization, said first organization of a type selected from the group of: entity, consortium, project team, investment pool, social grouping, and work grouping;

iii. a regime based upon a role of a first organization, the role defined in the usage agreement established by system provider with said first organization, said first organization of a type selected from the group of: entity, consortium, project team, investment pool, social grouping, and work grouping;

iv. a regime based upon a user role in a first organization, the role defined in the usage agreement established by system provider with said first organization, said first organization of a type selected from the group of: entity, consortium, project team, investment pool, social grouping, and work grouping;

v. a regime based upon a user role of said first user, the role defined in the usage agreement established by system provider with said first user;

vi. a regime based upon class of said first user;

vii. a regime based upon identity of said first user, and identity of subscription held by said first user;

viii. a regime based upon identity of said first user, identity of a first organization, and identity of a subscriptions held by said first user;

ix. a regime stating explicit custom access rights or policies based upon identity of said first user as defined in the usage agreement established by system provider with an organization granting rights to said first user under the agreement;

x. a regime stating explicit custom access rights or policies based upon role of said first user as defined in the usage agreement established by a first organization granting rights under said role to said first user under the agreement;

xi. a regime stating explicit custom access rights or policies based upon identity of said first user as defined in the usage agreement established by system provider with said first user;

and xii. a regime stating explicit custom access rights or policies based upon identity of said first user as defined in the usage agreement established by system provider with said first organization granting rights to said first user under the agreement;

d. accepting with said command regarding a fxxt definition zero or more fxxt identity values of type;

and e. accepting with said command regarding said fxxt definition one or more fxxt specifications each defining an extraction process for extracting a set of cnxpt instances and association instances from a commonplace, the fxxt specifications of a nature selected from the group of:

i. an extraction based upon marking of one or more association instances;

ii. an extraction based upon marking of one or more cnxpt instances;

iii. an extraction based upon marking of one or more cnxpt instances and association instances;

iv. an extraction based upon solving a set arithmetic fxxt equation;

v. an extraction based upon solving a not 'easily-determined' fxxt specification;

and vi. an extraction based upon a criterion.

96. The method of claim 1 further comprising:

a. defining the fxxt to provide external marking for organizing data;

b. marking an info-item of the commonplace as being a member of the fxxt;

and c. granting access to the fxxt marked data in the commonplace to an automated process for map building;

whereby an external marking structure where nodes of an ontology is marked as having a position in a taxonomy and the position is conveyed to an application process; whereby cell-like calculation equations on the taxonomy cnxpts nodes are available for use by external process.

97. The method of claim 1, wherein generating a map further comprises:

a. determining, by resolving by priority of information selected from the group of: user directives, directives of said set of fxxts, nature of map, map directives, cnxpt class instances in extract, cnxpt instances in extract, association class instances in extract, association instances in extract, a multi-forest comprising a categorical spanning forest and a precedence spanning forest if both categorical and precedence nature hierarchical associations are found, a default of precedence if precedence nature hierarchical associations are found, and a default of simple categorization, the types of each one or more map instance skeletal structures for said domain of wisdom, the types of each one or more map instance organization of knowledge for said domain of wisdom;

and b. determining, by resolving by priority of information selected from the group of: user directives, nature of map, map directives, directives of said set of fxxts, the type of map instance skeleton, cnxpt class instances in extract, cnxpt instances in extract, association class instances in extract, association instances in extract, a multi-forest comprising a horizontal categorical forest and a vertical precedence forest if both categorical and precedence nature hierarchical associations are found, a default of a multi-forest comprising a vertical categorical forest and a horizontal precedence forest if both categorical and precedence nature hierarchical associations are found, a default of precedence if only precedence nature hierarchical associations are found, and a default of simple categorization, the types of each one or more map instance skeletal structures for said domain of wisdom, the types of each one or more map instance organization of knowledge for said domain of wisdom.

98. The method of claim 1 to control the process of ingesting knowledge of a body of data, further including:

a. creating a relationship info-item;

b. filling one role of said relationship info-item with the info-item identifier of an irxt info-item representing a collection of data with a source info-item identifier of a type selected from the group of: a data set identity, a result set identity, a business identity, a universal resource locator, a document identity, a document section identity, a document part identity, a library location identity, a data source identity, a data stream segment identity, an identifier for a body of information, and a version identity;

c. filling a second role of said relationship info-item by an identifier selected from the group of: txo identifier, cnxpt identifier, or result set identifier;

d. marking said irxt info-item by detailed infxtypx to indicate the type of source and zero or more parameters describing the data collection in terms of one or more members of the group of: usability, quality, data currency, purlieu of data, description, identity, segmentation, segment sequence, version, provider reliability, provenance, classification, use restrictions, cost, restrictions on release, factor useful as a basis for a reliability weight, and factor useful as a basis for classification;

e. processing ingested data set batches of citation rich documentation to find new categories of ttxs to become represented by new cnxpts;

and f. creating an irxt for the information resource or internal resource serving as an information resource.

whereby a txo has any number of sources, a relationship info-item has a source role, or in one embodiment, a relationship info-item item identifier fills a role in a source relationship.

99. The method of claim 1, to also provide acceptance of occurrences, further including:

a. locating information possibly relevant to a cnxpt instance and representing it by a txo in said commonplace;

b. accepting from a user one or more requests selected from the group of:

i. to add said information to said cnxpt instance in said commonplace by generating an occurrence instance between said txo instance and said cnxpt instance with a strength stated for the relevance of said information to said cnxpt instance;
and
ii. to add a vote regarding presence or strength of said occurrence relationship info-item between said cnxpt and said information resource or internal resource serving as an information resource by accepting zero or more opinions;
and
c. forming a consensus of the strength of said relevance of said information item to said cnxpt instance;
wherein said strength of relevancy is adjusted based upon said opinions entered to form said consensus.

100. The method of claim 1 to also provide acceptance of an information resource or internal resource serving as an information resource, further including:

a. locating an information resource or internal resource serving as an information resource possibly relevant to a cnxpt and representing it by forming an irxt;
and
b. relating said information resource or internal resource serving as an information resource to said cnxpt in said commonplace by generating an occurrence between said irxt and said cnxpt with a strength stated for said relevance of said information resource or internal resource serving as an information resource to said cnxpt.

101. The method of claim 1, to locate an information resource or internal resource serving as an information resource by analytic, further including:

a. describing a crawling by providing crawl description and parameters;
b. invoking a crawling software tool for scanning one or more heterogeneous repositories to collect information resource or internal resource serving as an information resource metadata and information resource or internal resource serving as an information resource content located therein according to web, file, and document crawler analytic, common mental map initiation process, import taxonomy, import collateral information resource or internal resource serving as an information resource, relevance based relationship info-item building, and enter information resource or internal resource serving as an information resource for a ttx means;
c. forming a crawl result structure and adding said crawling parameters to indicate a crawling instance;
d. adding a result set to said crawl result to hold rsxitems related to irxts each representing one found information resource or internal resource serving as an information resource;
e. obtaining said information resource or internal resource serving as an information resource's metadata from said heterogeneous repository location provided by said locator;
f. forming, for an information resource or internal resource serving as an information resource not already related to an irxt, a new irxt containing properties having said locator and said metadata of said information resource or internal resource serving as an information resource as values according to import collateral information resource or internal resource serving as an information resource and enter information resource or internal resource serving as an information resource for a ttx means;
g. forming an rsxitem for each irxt representing an information resource or internal resource serving as an information resource in said crawl result according to result set processes means and according to create result set means;
and
h. applying mining analytics on said result set to shape categorized groupings from said rsxitems according to new category generation and category relation generation from result set means;
whereby a crawling engine obtains data from online repositories or mounted repository export data set.

102. The method of claim 101 to apply curation rules while preserving raw, original data, further including:

a. saving data sets for all imported data, the source of the data set and its relationships with other data must be stored;
b. performing clustering, cross citation, and other analysis techniques;
c. configuring said processors to operate according to utilize collective consensus through vote tallying means;
d. ingesting said data into said commonplace by converting said data's format to the format of a commonplace info-item of a predetermined type, where each relationship info-item between said data set table row and an identified entity record is translated into a new translated relationship info-item of predetermined type between said ttx instance and the ttx instance stemming from said identified entity record and mark said new translated relationship info-item by the identity of said fxxt;
e. ingesting said data into said commonplace by converting said data's format to the format of a commonplace info-item of a predetermined type, where each attribute of said new translated relationship info-item between said data set table row and said identified entity record is translated into a characteristic of predetermined type on said new translated relationship info-item;
f. integrating said new data entity record into said commonplace by providing a default vote, with an authority level commensurate with the known quality of the data added, regarding the veracity of the meaning of the term defined by said data set table row against said new ttx instance;
g. integrating, by zero or more iterations of processing according to generate commonality relationships means and zero or more iterations of processing according to imputed association generation means, said new data entity record into said commonplace by providing zero or more initial votes, with an authority level commensurate with the known quality of the data added times the predetermined metric for the combined analytic quality, regarding the similarity of meaning of said new term ttx instance to the meaning of an existing term ttx instance of even roughly similar type against a new similarity relationship info-item of predetermined type between said new term ttx instance and said existing term ttx instance;
and
h. integrating said new data entity record into said commonplace by providing a default vote regarding the likelihood of existence of said new translated relationship info-item stating that said likelihood is 100 percent with an authority level commensurate with the known quality of the data added if no characteristic of said new translated relationship info-item states such a likelihood value.

103. The method of claim 102 to apply curation rules while preserving raw, original data, further including:

a. processing ingested data set batches of citation rich documentation to find new categories of ttxs to become represented by new cnxpts;
and b. creating an irxt for the information resource or internal resource serving as an information resource;

whereby information resources or internal resources serving as information resources are associated with the ttxs in the taxonomy data set or other source, and if an irxt is not in the common mental map for any information resource or internal resource serving as an information.

104. The method of claim 1 to allow refreshing of query results, further including:

a. interpreting a query by selecting a query step of a query for reinterpreting to form a new query and result instance by re-executing said original query;

b. interpreting said query step to form a new result instance into a result set;

c. reapplying result set culling to set the relevance of rsxitems to be the same as set in prior culling, to add zero or more new rsxitems and prepare them for culling according to result set processes means and according to create result set means;
and d. reapplying result set evaluation and cnxpt positioning.

105. The method of claim 104 to refresh queries for an information resource or internal resource serving as an information resource, further including:

a. interpreting a query by selecting a query step of a query for reinterpreting to form a new query and result instance by re-executing said original query;

b. interpreting said query step to form a new result instance into a result set, possibly invoking a metasearch interceptor software analytic to catch relevant search results during a user query from a search tool selected from the group of: according to finding, searching, query and retrieval means; and according to goal based searching means; further including for query step invoking a metasearch:

i. obtaining from said user's returned result of said query a locator for an information resource or internal resource serving as an information resource;

ii. obtaining said information resource or internal resource serving as an information resource's metadata from said heterogeneous repository location provided by said locator;
and iii. forming an irxt containing properties having said locator and said metadata of said information resource or internal resource serving as an information resource as values according to import collateral information resource or internal resource serving as an information resource and enter information resource or internal resource serving as an information resource for a ttx means;

c. forming an rsxitem in said result set for said query according to result set means and according to create result set means;

d. reapplying result set culling to set the relevance of information resource or internal resource serving as an information resource rsxitems to be the same as set in prior culling, to add zero or more new rsxitems and prepare them for culling according to result set means and according to create result set means;
and e. reapplying result set evaluation and cnxpt positioning;

whereby a search engine result obtained is semi-automatically refreshed and the effect of said new result alters the placement of said target cnxpt in a categorization of a fxxt.

106. The method of claim 1 to also provide for a machine to learn of a new concept from a user merely conjuring while using a commonplace and without a user burden of description, further comprising:

a. determining, by at least one processor, at least one user display visualization according to map generation means for display to a user from said organization of knowledge of at least one domain of wisdom for initial viewing;

b. displaying to said user a portion of said organization of knowledge of at least one domain of wisdom according to display and delivery means;

c. accepting a request to add or refine said commonplace and effecting change therefrom;

d. accepting one or more user navigation commands to traverse from a first context represented by a first cntexxt represented internally by said first cnxpt on the organization of knowledge and derived visualization of said commonplace to a second, more detailed second context represented by a second cntexxt encompassing concepts each having a specific differentiation from said first context wherein said detailed second concept is more specific in meaning, wherein said navigation command is intended to narrow the set of contexts where said user might find the concept being conjured by said user;

e. accepting a user command indicating that said concept being conjured by said user should be within said first context represented by said first cntexxt said user has navigated to but is not, finalizing a search for information represented only by empty spaces within a context where the concept represented by a space is only within the mind of the user and their wisdom is imparted to the commonplace by their stating that the search has located the information in the empty space, the stating termed staking a claim to said space to encompass that wisdom;
and f. creating a new third cnxpt within said first context represented by said first cntexxt to objectify the concretized conjuring of said concept being conjured by said user by identifying said space.

107. The method of claim 1 to also accept user voting, further including:

a. accepting repositioning of zero or more goals in a visualization by a user;

b. accepting repositioning of zero or more cnxpts in a visualization by a user;

c. accepting re-categorization of zero or more cnxpts in a visualization by a user;

d. accepting manual resolution of zero or more positioning defects in a visualization;
and e. recalculating display object positions based upon user changes in a visualization.

108. The method of claim 1 to also provide for crystalizing meaning of cnxpts with less documentation through reuse of results of prior efforts, further comprising:

a. re-positioning cnxpts in a map as close to where the user last viewed them to improve the consistency of the perceptions of the user;
b. suppressing search result sets to only entries non-common with the context a concept is a member of in an organization of knowledge in a manner that the concept is seen as a differentiation from the context based upon the result set contents in a map; and
c. retaining differentials between actuals, corrected beliefs, and beliefs for inclusion in weighted moving averages of viewpoint metrics.

109. The method of claim 1 to also provide continuous curation, further including:
a. accepting opinions by votes on presented data;
b. updating base data with votes without altering base data;
c. forming consensus by operations prior to and during extractions;
d. extracting, using consensus for fxxt within the extracted results; and
e. summarizing fxxt weightings for fxxt instance into summary by fxxt where possible;

whereby a user may make changes and rearrangements of classifications to have some impact objectively and high impact subjectively.

110. The method of claim 1 to refine a structure for the meanings of ideas, further including:
a. highlighting to indicate high similarity, cnxpts positioned close to each other in the same cntexxt; and
b. suggesting, if a predetermined system setting is set to a predetermined value, the removal of one cnxpt of a pair of cnxpts having high similarity.

111. The method of claim 110 to combine instances of an info-item having no significant differential in meaning in any use case, further including:
a. integrating by semantic meaning of a second ttx instance to a first ttx instance already situated in a categorization by semantic meanings;
b. integrating by value of a characteristic indicating semantic meaning of a second ttx instance to a first ttx instance already situated in a categorization by semantic meanings;
c. integrating by trait indicating semantic meaning of a second ttx instance to a first ttx instance already situated in a categorization by semantic meanings;
d. integrating by Venn overlap of set of information resources found relevant to a second ttx instance relative to the set of information resources found relevant to a second ttx instance to the covering to a first ttx instance already situated in a categorization by semantic meanings; and
e. curating and combining redundancies and duplicate cnxpts.

112. The method of claim 111 to refine a structure for the participant's meanings of related ideas respecting objectivity and subjectivity, further including:
a. accepting a command to reparent a cnxpt;
b. processing said command to reparent a cnxpt as a vote for consideration under consensus; and
c. processing said command to reparent a cnxpt as authoritatively reparented in a subjective view for the user who has voted to reparent the cnxpt;

whereby a user may make rearrangements of classifications to have some impact objectively and high impact subjectively.

113. The method of claim 111 to eliminate redundant information and keep information properly connected, further including:
a. suggesting that a pair of cnxpts comprised of: a first cnxpt and a second cnxpt be transformed into a set of three cnxpts, where a parent cnxpt is formed from the characteristics in the intersection of characteristics equal for both said first cnxpt and said second cnxpt and making both said first cnxpt and said second cnxpt into children of said parent cnxpt.

114. The method of claim 1, to accept results of analytics, further comprising;
a. accepting a relationship between a pair of information resources from an analytic program;
b. imputing a relationship info-item between a first irxt representing the first information resource and a second irxt representing the second information resource from said relationship between a pair of information resources; and
c. imputing an affinitive association relationship info-item between a first cnxpt having as an occurrence the first irxt and a second cnxpt having as an occurrence the second irxt from the imputed relationship info-item between the first irxt and the second irxt;

whereby commonalities of other varieties are accepted by raising imputed relationships found to relationships between cnxpt pairs.

115. The method of claim 1, to curate added information, wherein in no set order:
a. accepting one or more user commands selected from the group of:
i. to add an info-item to said commonplace;
ii. to add a concept represented internally by a cnxpt to said commonplace;
iii. to add an indication of a differentiation of a first concept represented internally by a cnxpt from a second concept wherein said first concept will no longer be equivalent to second concept in said commonplace;
iv. to register a vote stating that said user believes that said commonplace needs to be altered;
v. to add a data set of data to be interpreted as instances of info-items having specified values in said commonplace wherein said info-items are marked with a fxxt describing at least the provenance of the data set; and
vi. to add a concept represented internally by a cnxpt to said commonplace;
b. accepting one or more commands from a user specifying an alteration believed to be needed to refine said commonplace;
c. adding into said commonplace categorizations for concepts from available sources translating each node of said categorization into a cnxpt with category node name as name and marking each said cnxpt with a specified fxxt wherein said categorizations are translated to become relationships indicating cnxpt hierarchy and are marked with said specified fxxt;
d. ingesting published databases of all published patents and patent applications translating each said patent or application into a cnxpt with said patent or application title as cnxpt name and a proper occurrence instance to represent said patent or application document, marking each said cnxpt and occurrence with a specified fxxt wherein citations amongst said patents and applications are translated to become relationships indicating cnxpt prior art hierarchy structure, classifications specified for said patents and applications are translated to become relationships indicating cnxpt relevance to and membership in a grouping of concepts, utilizing metadata of said patents and applications to set characteristics for said cnxpt and occurrence instance, and marking relationships with said specified fxxt;

e. creating a cnxpt for any information resource cited for which no cnxpt was yet created, a proper occurrence, and marking said cnxpts, occurrence instances, and relationships with a specified fxxt;

f. scraping the internet for technical publications having citations, creating a cnxpt for each information resource found for which no cnxpt was yet created, a proper occurrence, and marking said cnxpts, occurrence instances, and relationships with a specified fxxt;

g. creating, for each citation found, a directional relationship info-item between a first occurrence and a second occurrence where said first occurrence is set as a tail endpoint of said relationship info-item wherein said first occurrence is representing a cited information resource and said second occurrence is set as a head endpoint wherein said second occurrence is representing a citing information resource and marking said cnxpts, occurrence instances, and relationships with a specified fxxt;

h. searching meta-search engines using names of cnxpt items as search terms to collect information resource citations and to generate occurrences wherein relevance rankings from said meta-search engines are used as default relevance votes for said occurrences, and marking said cnxpts, occurrence instances, and relationships with a specified fxxt;

i. forming a structure for storing commonalities;

j. determining semantic distances for names of cnxpts and registering said semantic distance as a commonality weight;

k. determining semantic distances for information resource titles and registering said semantic distance as a commonality weight;

l. determining semantic distances for information resource abstracts and registering said semantic distance as a commonality weight;

m. determining commonalities for known information entered as characteristics selected from the group of: people involved, time, institution, funding agency, application, and industry of information resources;

n. determining commonalities for known information entered as characteristics selected from the group of: people involved, time, institution, funding agency, application, and industry of occurrences;

o. determining commonalities for known information entered as characteristics selected from the group of: people involved, time, institution, funding agency, application, and industry of cnxpts;
and p. imputing commonality relationships according to generate commonality relationships means for commonalities determined, marking each relationship info-item by a specified fxxt.

116. The method of claim 1, further comprising stating an opinion regarding at least one item type selected from the group of: the weighting coefficient indicating a proportionality of impact assigned to a fxxt specified in a map definition, the positioning of a cnxpt within the organization of knowledge of a map, the weight of an association, the importance of a cnxpt, the existence of a cnxpt in a time frame, the veracity of a cnxpt, the veracity of a property of a cnxpt, the veracity of information associated with a cnxpt, the existence of an association between two cnxpts within the organization of knowledge of a map, the veracity of a property of an association, the inappropriateness of an association between two cnxpts, the value of a property of a cnxpt, the relevance of information regarding a cnxpt, the similarity of a plurality of cnxpts, a marking of a cnxpt as being a part of a fxxt, the value of a property of an association, and a marking of an association as being a part of a fxxt.

117. The method of claim 1, wherein an indicated fxxt of the set of fxxts from which a map is generated is altered by a cnxpt positioning interaction selected from the group of: changing the parent of a cnxpt; creating a new association between two cnxpts within the map, adding a cnxpt within the map, and modifying a weight of an association within the map.

118. The method of claim 1, wherein the interactions comprise at least one of:

a. traversing the organization of knowledge of a map;

b. conversing with a different party on a channel associated with a cnxpt;

c. starting a consortium associated with one or more cnxpts;

d. investing in a pool associated with one or more cnxpts;

e. advertising for assistance with efforts associated with one or more cnxpts;

f. selling data regarding a cnxpt;

g. seeking investment based upon one or more cnxpts;

h. providing services keyed to a cnxpt;

i. organizing a project on the basis of classifications based upon cnxpts;

j. organizing a project on the basis of classifications based upon a map;

k. viewing industry news specifically according to a cntexxt;

l. setting strategy based upon a projection of future competitive value of something represented by a cnxpt;

m. planning a product line based upon a cnxpt representing a cntexxt;

n. managing a portfolio based upon a map showing one or more cnxpts;

o. filtering a map based upon properties of one or more cnxpts;

p. aligning production with intellectual property represented by a cnxpt;

q. aligning production with product management of products represented by a cntexxt represented by a cnxpt;

r. aligning product strategy with innovation toward future ideas represented by a cnxpt;

s. seeking opportunities for investment at an intellectual property stage where inventors are only willing to state that they have intellectual property in a technology area represented by a cntexxt;

t. managing a project requiring rapid information gathering and resource management and consensus building;

u. harmonizing classifications;

v. managing machine learning projects;

w. managing bio-informational studies;

x. managing data science projects requiring data entity cleanup;

y. managing intelligence projects where information obtained may not be correct;

z. managing legal cases where information stream is complex;

aa. re-positioning the cnxpts within a visualization of a map;

bb. creating a new association between two cnxpts within the map;

cc. adding a cnxpt within the map;

dd. defining a new fxxt;
and ee. modifying a weight of an association within the map.

119. The method of claim 1, further including:

a. accepting culling commands as votes with strength set by expertise of person culling;
and b. forming culling relevance based upon weighted average of culling votes for a result set.

120. The method of claim 1 to also provide for accepting user information, further including:

a. accepting from a user one or more requests selected from the group of:

i. to add an idea into said commonplace by incrementally conjuring and concretizing a subjectively differentiated idea as a cnxpt instance;

ii. to add an idea into said commonplace by concretizing a query goal converting a goal into a cnxpt instance;

iii. to add a vote regarding presence and strength of a hierarchical relationship represented by an association instance between a first cnxpt instance and a new second cnxpt instance by defining a differentiation from said first cnxpt instance in the perspective of a map as stated by the presence of said second cnxpt instance by adding said new second cnxpt instance into the original said first cnxpt instance wherein said first cnxpt instance represents a cntexxt representing a context where the idea represented by said new second cnxpt instance belongs;

iv. to add a vote regarding classification of a first cnxpt instance stating an opinion regarding presence and strength of an association instance relationship between said first cnxpt instance and a second cnxpt instance to serve as a context in a map into which said first cnxpt instance is to be classified, said second cnxpt instance referred to as a category context represented by a cntexxt represented by said second cnxpt instance;

v. to add a vote regarding similarity of ideas in the perspective of a map represented by cnxpt instances stating an opinion regarding presence and strength of an association instance representing a similarity relationship between said cnxpt instances;

vi. to add a vote regarding presence or strength of a relationship info-item between commonplace info-items;

vii. to add an objection vote regarding presence or strength of an association instance;
and viii. to add an objection vote regarding presence or strength of a relationship.

121. The method of claim 1 to allow refreshing of query results, further including:

a. accepting zero or more commands to select a subsequent cntexxt of wisdom within said organization of knowledge to process said zero or more commands by zero or more functional components selected from the group of: according to ideation means; according to finding, searching, query and retrieval means; according to goal based searching means; according to selection set management means; according to focus on information means; and according to alter information through visualization means; wherein said default cntexxt is retained as the subsequent cntexxt if no command of this type is entered before entering a command to specify said zero or more commands to act upon said subsequent cntexxt of wisdom, said zero or more commands to select a subsequent cntexxt of wisdom.

122. The method of claim 1 to also provide for determining decision tree classifier structures, further comprising:

a. performing a fxxt extraction;

b. performing a structuring to form a classifier forest;

c. defining as a goal form of cnxpt a classification required by stating goal traits for matching to a classification;
and d. conducting a walking, the walking controlled by an entity selected from the group of:

i. a user navigating a walk from root to leaf of the structuring, subjectively choosing a branch in the classifier based upon what the user considers at the time to be the best match of child normally preferring the one having the closest matching to the goal;
and ii. an algorithm walking from root to leaf of the structuring, choosing, at each branch in the classifier tree, represented by a cnxpt reached where the cnxpt has children any of which might be chosen as a next visit, a branch in the classifier based upon choosing the best match of child by the one formed by an association with greatest strength weight of all associations connecting to the children from the parent cnxpt as determined by consensus voting and raw association strength weights, by fxxt weighting coefficients indicating a proportionality of impact of one or more fxxts stated by the map definition, and by a determination of semantic associative similarity of a child to the goal;

whereby a classifier is provided for fuzzy matching based upon best match of a plurality of traits.

123. The method of claim 1 to locate a concept more similar to that thought of by a user by sorting of results by appropriateness to the concept sought, further including:

a. providing, for user culling, an area of consideration based upon a search;

b. moving the user's focal point in the visualization to a point near the centroid of the area of consideration;

c. accepting a user culling of the area of consideration;
and d. moving the user's focal point in the visualization to the new centroid of the area of consideration;

whereby a user search goal is pushed to a different location in a visualization.

124. The method of claim 1 to locate a concept more similar to that thought of by a user by appropriateness to the concept sought, further including:

a. providing a result set of at least one query basis selected from the group of: features, time frame, purlieu, locale, attribute values, and property values; for user culling based upon a search;

b. generating an area of consideration based upon the cnxpts having features, time frame, purlieu, locale, attribute values, or property values in said result set;

c. determining which set of at least one cnxpt in the area of consideration have sets of features, time frame, purlieu, attribute values, or property values most similar to the items in said result set, forming an area of interest from the set;

d. moving the user's focal point in the visualization to a point near the centroid of the area of interest defined by the set of cnxpts;

e. accepting a user culling of said result set;

f. generating an area of consideration based upon the cnxpts having features, time frame, purlieu, locale, attribute values, or property values in said result set as culled;

g. determining which set of at least one cnxpt in the area of consideration have sets of features, purlieu, locale, attribute values, and property values most similar to the items in said result set, forming an area of interest from the set;

h. moving the user's focal point in the visualization to a point near the centroid of the area of interest defined by the set of cnxpts;

and i. adjusting the organization of knowledge based upon changes made to the derived visualization;

whereby a user search goal is pushed to a different location in a visualization.

125. The method of claim 1, further including:

a. choosing a next cntexxt on a basis selected from the group of:

i. entry of a find query specification, wherein:

01. accepting a find command comprising a search query for a value of a type selected from the group of: a value of a property of a cnxpt, a pattern of a property of a cnxpt, a value not held by a property of a cnxpt, a pattern not held by a property of a cnxpt, a value of a property of an association, a pattern of a property of an association, a value not held by a property of an association, a pattern not held by a property of an association, a string in an information resource related to a cnxpt, a pattern in an information resource related to a cnxpt;

02. executing said find command, resulting in zero or more matching items;

and 03. moving the focus of the user to the cnxpt selected from the group of: the first cnxpt wherein a match of the stated search query was to an object selected from the group of: the property of a cnxpt, the property of the association for which a cnxpt holds a from role, the property of the association for which a cnxpt holds a to role, and the string in the information resource related to a cnxpt; and the next cnxpt wherein a match of the stated search query was to an object selected from the group of: the property of a cnxpt, the property of the association for which a cnxpt holds a from role, the property of the association for which a cnxpt holds a to role, and the string in the information resource related to a cnxpt;

ii. entry of a search query specification, wherein:

01. accepting a choice from a list of cntexxts an alternative said cntexxt, said list determined by accepting and processing a search query specification according to finding, searching, query and retrieval means resulting in a list of cnxpts to narrow the possibilities to said list of cntexxts, such choice replacing any prior cntexxt as the new first cntexxt presented as the first cntexxt defined by said cnxpt, wherein such list of a type selected from the group of: a result set, members of an area of consideration, members of an area, instances of a cnxpt class, members of a set of cnxpts, members of a subtree of a cnxpt in said map, cnxpts in a bounded area of said map, cnxpts having a trait meeting a criterion, cnxpts to which an info-item has been related wherein the info-item satisfies a criterion, cnxpts to which an information resource has been related wherein the information resource satisfies a criterion, members of a set of cnxpts having a property meeting a criterion, and members of a fuzzy set of cnxpts in said map;

and iii. entry of a goal representing an idea, wherein:

01. accepting a query, comprising one or more query step specifications, to attach to said goal to locate relevant search results according to finding, searching, query and retrieval means;

02. adding said query to said goal according to attach a query to goal means;

03. forming a result set for said query for said goal for holding search results to retain the basis for said goal for reuse, according to create result set means, according to process a query for goal, according to process query step specification, generating result set means, according to execute query and attach result set to goal means, and according to result set processes means;

04. forming an rsxitem to obtain an index to said information, according to result set processes means and according to create result set means and according to process a result set for goal or cnxpt means;

05. presenting said result set items of said result set to user for culling, according to extract and generate ordering for taxonomy from selection set for culling means;

06. accepting zero or more culling commands on said result set rsxitems to obtain a relevant set of result set items according to result set processes means;

07. accepting zero or more assessments of the propriety of said rsxitem to said result set as a measure of the relevance of an rsxitem to said goal, cnxpt, query, or search having said result set;

08. summarizing said result set into query independent result set for goal, setting summarized relevance rankings according to result set conversion to properties, occurrences, and categorizations means;

and 09. determining zero or more cntexxts in said map definition that said search goal should be associated with by comparing said search results with relevant information of existing cnxpts in said map to reposition said goal into the best cntexxt based on said result set according to result set evaluation for positioning means; wherein if no cntexxt is considered by said user to be better than the present cntexxt to act as parent to the goal: granting said user the authority to convert the goal to a cnxpt within the present cntexxt, attaching the result set and other known goal information to the cnxpt, accepting zero or more identifiers for the cnxpt, and granting control over the cnxpt to said user;

whereby movement of a user's focus to a cntexxt represented by a cnxpt is done by jumping to a context rather than navigating via the organization of knowledge.

126. The method of claim 125 to also provide associative searching based upon a stated goal, further including:

a. accepting a choice of map organization of knowledge and the visualized map on which to search;

b. moving the goal to an initial position on the organization of knowledge and the visualized map as determined from prior user query results, if any, or a default positioning for a new query for the goal;

c. setting up an additional query step of said query to retain the repositioning result of the associative search for the map chosen;

d. accepting navigation commands for manually moving said search goal to a cntexxt in said map more strongly related to the ttx in said user's mind according to goal based searching means and goal positioning means; and e. collecting the positioning chosen by said user for the search goal during the navigation to form associations between the cntexxts visited and the search goal according to goal based searching means, wherein the effect of the newly formed associations between the cntexxts are weakened as newer positions are chosen.

127. The method of claim 126 to accept a conjuring of an idea, further including:

a. accepting a command affirming that said idea as represented by said search goal is in a proper cntexxt category cnxpt in the context of said map where said query is performed and is differentiated from said cntexxt category itself and any sibling idea ttx as represented by the sibling cnxpts in said cntexxt category in said map, the differentiation caused by said user;

b. converting said search goal into a cnxpt;

c. associating said cnxpt with said category cnxpt of said cntexxt found by generating an association between said goal's new cnxpt and said category cnxpt in said map;

d. generating, if said search goal has a result set, occurrence relationships between said cnxpt and each relevant result set item information txo or irxt found; and e. informing a user regarding said new cnxpt.

128. The method of claim 127 to also initiate activity regarding an added idea, further including:

a. informing said user of information available to a user entering a new concept represented by a cnxpt, the information selected from the group of:

i. assistance in basic classification of the cnxpt;

ii. assistance in working with cnxpt classes if the user has chosen that type;

iii. information inheritable into the cnxpt from its parent in the perspective of the map being used;

iv. information inheritable into the cnxpt from the user information and affiliation information of the user;

v. information regarding concept ownership and security and choices available given policies in the perspective of the context the cnxpt is placed into;

vi. information inheritable from queries attached to the parent of the cnxpt in the perspective of the map used;

vii. a choice of types optionally with an explanation of what the type can provide to users substantially listing use cases and workflows and social interactions available;

viii. what information will be needed for full description of the cnxpt upon setting the type of cnxpt;

ix. what information will be needed for full description of the concept represented by the cnxpt upon setting the type of cnxpt;

x. what information will be needed if the idea is to be considered for patenting; and xi. how to state a description to show the innovative thought of the idea represented by the cnxpt;

b. providing selected information regarding said cnxpt based upon the nature of the concept it represents as stated by the user, the information selected from the group of:

i. ownership styles regarding the cnxpt and the concept it represents that are available to the user and applicable to the cnxpt;

ii. workflows applicable to the cnxpt;

iii. authorities applicable to the cnxpt;

iv. use cases available to the user and applicable to the cnxpt; and v. social networking facilities available to the user and applicable to the cnxpt;

c. setting access to said new cnxpt according to access management for ttxs means and according to managing ideas means;

d. providing a methodology or workflow for establishing cnxpt protection according to apply for patent means of patent application workflows;

e. providing some portion of ownership of and rights to some degree of control of attached communities based upon said cnxpt in a category based online community system according to socialize means;

f. authorizing access as inventor to a high trust expert networking mechanism based upon said cnxpt to enable narrow chat, confidential negotiations for licensing technology, confidential consortia communications, confidential business plan and concept information repository community tools according to share and commune in innovation and consortium investment means; and g. authorizing access as inventor to confidential consortia communications, confidential business plan and concept information repository, investment pool community tools according to innovation investment pools means and according to consortium investment means.

129. The method of claim 1 to refine a concept sought by attached query, further including:

a. sorting of results of a query by appropriateness to said cnxpt representing a concept sought; and b. retaining said results with said cnxpt representing a concept sought as a result set, the result set serving as a subject identifier.

130. The method of claim 1 to locate a concept more similar to that thought of by a user by culling of results by appropriateness to the concept sought, further including:

a. providing a result set, based upon a search query for criteria selected from the group of: trait values, keywords, subject identifier contents, and occurrences; for user culling, the result set serving as a sought after subject identifier;

and b. accepting, until notice of completion, from the user information selected from the group of:

i. accepting a user culling of said result set, wherein:

01. determining which set of at least one cnxpt having characteristics matching to said result set;

02. moving the user's focal point in the visualization to a point nearer to the cnxpt of said set of at least one cnxpt having the closest set of matching characteristics;

and 03. preparing for additional culling of said result set;

ii. accepting notice that the user is satisfied with the contents of said result set, wherein:

01. placing an indicator of the status of the search onto the visualization;

02. adjusting the organization of knowledge based upon changes made to the derived visualization;

and iii. accepting notice that the user is abandoning the search effort, wherein:

01. placing an indicator of the abandoned search onto the visualization, the indicator retaining said result set;

02. adjusting the organization of knowledge based upon changes made to the derived visualization;

whereby a user search goal is pushed to a different location in a visualization.

131. The method of claim 1 to allow searching for an idea, further including:

a. accepting and carrying out at zero or more user actions selected from the group of:

i. accepting a choice from a list of cntexxts an alternative said cntexxt, said alternative said cntexxt not the present point of focus, said list determined by accepting and processing a search query according to finding, searching, query and retrieval means resulting in a list of cnxpts representing cntexxts to determine priority of the possibilities as a next focal point, said alternative said cntexxt having a highest priority in said list of cntexxts after culling, said alternative said cntexxt becoming the focus point presented to the user;

ii. accepting and processing a search query according to finding, searching, query and retrieval means resulting in a result set list of cnxpts, the position of the cnxpt leading said result set becoming the focus point presented to the user;

iii. accepting and processing a search query according to finding, searching, query and retrieval means resulting in a list of cnxpts representing cntexxts comprising an area of consideration, the center point of the combined positions of the cntexxts of said area of consideration becoming the focus point presented to the user;

iv. accepting user culling, by one or more iterations, a list of cntexxts comprising an area of consideration to derive a list comprising an area of interest, the center point of the combined positions of the cntexxts of said area of interest becoming the focus point presented to the user;

v. accepting user culling, by one or more iterations, a list of cntexxts comprising a first area of interest to derive a list comprising a second area of interest, the center point of the combined positions of the cntexxts of said second area of interest becoming the focus point presented to the user;

vi. accepting a choice, by one or more iterations, a selected result set list of one or more cnxpts, the position of the cnxpt leading said result set becoming the focus point presented to the user;

vii. determining from a list of cntexxts a center point as an alternative point of focus presented to the user, said list determined by accepting and processing a search query according to finding, searching, query and retrieval means resulting in a culled list of cnxpts representing cntexxts;

viii. determining from a list of cntexxts a highest priority cnxpt to serve as a center point as an alternative point of focus presented to the user, said list determined by culling a result set of cnxpts representing cntexxts;

ix. accepting a choice from a list of cntexxts an alternative said cntexxt represented by a cnxpt having priority in said list, said list determined by accepting and processing a search query specification according to finding, searching, query and retrieval means resulting in a result set of cnxpts to alter priority and ordering of the possibilities for focusing by culling to said list of cntexxts, the position of said cnxpt having priority replacing any prior point of focus presented to the user;

x. accepting a command to start a search for an idea in a user's mind and creating a uniquely identifiable search goal info-item;

xi. accepting user navigations to perform a non-associative search for said idea and positioning the goal according to the result;

xii. accepting user navigations to perform associative searching to said user using one or more maps to allow seeking a cntexxt in said one or more maps where said idea topically fits according to goal based searching means;

and xiii. accepting a command to finalize the search, the command selected from the group of:

01. finalize the search by stating that a new ttx was to be concretized and categorized;

and 02. finalize the search by stating that a new ttx did not need to be concretized or categorized.

132. The method of claim 1 to also provide a curatable personal commonplace, further comprising:

a. receiving, from the user, a choice of a context represented by a cntexxt within a map of a domain of wisdom to use as a focus point;

b. managing an addition or refinement, of said domain of wisdom, received from the user by performing at least one of:

i. accepting votes regarding information of said domain of wisdom based upon entered commands and navigation;

ii. tracking strength of associations of said domain of wisdom by tallying of votes according to utilize collective consensus through vote tallying means for said plurality of votes by said user, considering votes of others included in generation of said map;

iii. forming an altered organization of knowledge by performing at least one of:

01. altering weighting coefficients indicating a proportionality of impact of one or more fxxts of said map definition to create a second map definition; and
02. altering said domain of wisdom specified by said map definition to create a second map definition; and
iv. perform cleanup according to data cleanup means;
and
c. accepting and processing a user command and effecting changes therefrom, said user command selected from the group of:
i. to view content of said map of a domain of wisdom;
ii. to add or refine content of said personal commonplace and effect change by entering content change votes;
iii. to navigate around a visualization of said commonplace;
iv. to request a search for wisdom;
v. to traverse from a first context represented by a first cntexxt represented internally by a first cnxpt instance on the visualization of said commonplace to a second, more detailed second context represented by a second cntexxt encompassing concepts represented by cnxpt instances each having a specific differentiation from said first context wherein said detailed second concept has been defined by said user to be more specific in meaning, wherein said navigation command is intended to narrow the set of contexts where said user might find the concept being conjured by said user;
vi. to indicate that said concept represented by a cnxpt being conjured by said user is within said first context represented by said first cntexxt said user has navigated to but is not, to finalize a search for information represented only by empty spaces within a context where the concept represented by a space is only within the mind of the user and their wisdom is imparted to the commonplace by their causing the creating of a new third cnxpt within said first context represented by said first cntexxt to objectify the concretized conjuring of said concept being conjured by said user;
vii. to indicate how said concretized conjuring represented by said third cnxpt is differentiable from said first concept represented by said first cntexxt represented internally by said first cnxpt;
viii. to state that a first concept is a differentiable offshoot of second concept, wherein said second concept represented by a second cnxpt is to be a parent in a parent child association info-item with said first concept represented by a first cnxpt;
ix. to state that a first concept is of a temporally differentiable timeframe occurring after a second concept, wherein said second concept represented by a second cnxpt is to be the parent in a parent child association info-item with said first concept represented by a first cnxpt;
x. to state that a first concept is within a context defined by a second concept, wherein said second concept represented by a second cnxpt is to be the parent in a parent child association info-item with said first concept represented by a first cnxpt where said parent child association info-item indicates context membership;
and
xi. to state that a first concept is dependent in a precedence upon the existence, initiation, or completion of a second concept, wherein said second concept represented by a second cnxpt is to be the predecessor in a predecessor successor association info-item with said first concept represented by a first cnxpt.

133. The method of claim 132, wherein the interactions comprise at least one action selected from the group of: traversing the organization of knowledge of a map, repositioning the cnxpts within the organization of knowledge of a map by altering the visualization of the map, creating a new association between two cnxpts within the organization of knowledge of a map by altering the visualization of the map, adding a cnxpt within the organization of knowledge of a map, defining a new fxxt, marking an association by a fxxt, marking a cnxpt by a fxxt, adding information regarding a cnxpt, searching regarding a cnxpt, causing a change of a position of a cnxpt by altering the information associated with the cnxpt in a map, modifying the importance of a cnxpt, stating a similarity between a plurality of cnxpts, and modifying a weight of an association within the organization of knowledge of a map.

134. The method of claim 1 to accept at least one indication of how a concept being conjured by a user is differentiated from the context within which it has been placed, further comprising:
a. accepting at least one indication of how said concept being conjured by said user, the concept conjured represented by a first cnxpt, is differentiated from said context, said existing context a concept represented by a second cntexxt itself a second cnxpt, said cntexxt wherein said first cnxpt is being added, the indication a first characteristic, the indication selected from the group of:
i. a textual entry stating a differentiation as the first characteristic;
ii. the stating of one or more words describing a differentiation type not listed;
iii. the stating of one or more words describing a differentiation type not listed and setting a differentiated value due to presence of said characteristic;
iv. the stating of one or more words describing a differentiation type not listed and stating a benefit due to presence of said characteristic;
v. the stating of one or more words describing a differentiation type not listed and stating a benefit due to presence of said characteristic and a differentiated value due to presence of said characteristic;
vi. a selection from a list of differentiation types;
vii. a selection from a list of differentiation types and setting a differentiated value due to presence of said characteristic;
viii. a selection from a list of differentiation and stating a benefit due to presence of said characteristic;
ix. a selection from a list of differentiation types and stating a benefit due to presence of said characteristic and a differentiated value due to presence of said characteristic;
x. a selection of list items stating predefined second characteristics to attribute to possible offshoots of said second concept represented by said cntexxt;
xi. a selection of list items stating predefined second characteristics to attribute to possible offshoots of said second concept represented by said cntexxt and setting a differentiated value due to presence of said characteristic;

xii. a selection of list items stating predefined second characteristics to attribute to possible offshoots of said second concept represented by said cntexxt and stating a benefit due to presence of said characteristic;

xiii. a selection of list items stating predefined second characteristics to attribute to possible offshoots of said second concept represented by said cntexxt and stating a benefit due to presence of said characteristic and setting a differentiated value due to presence of said characteristic;

xiv. a selection of a third cnxpt and also selecting an entry from a list of characteristics stating how said third cnxpt is differentiated from the context it is in for use as the description of the differentiation of said concept being conjured by said user from said second concept represented by said second cntexxt;

xv. a selection of a third cnxpt and also selecting an entry from a list of characteristics stating how said third cnxpt is differentiated from the context it is in to use as the description of the differentiation of said concept being conjured by said user from said second concept represented by said second cntexxt and stating a benefit due to presence of said characteristic;

xvi. a selection of a third cnxpt and also selecting an entry from a list of characteristics stating how said third cnxpt is differentiated from the context it is in to use as the description of the differentiation of said concept being conjured by said user from said second concept represented by said second cntexxt and stating a differentiated value due to presence of said characteristic;

xvii. a selection of a third cnxpt and also selecting an entry from a list of characteristics stating how said third cnxpt is differentiated from the context it is in to use as the description of the differentiation of said concept being conjured by said user from said second concept represented by said second cntexxt and stating a benefit due to presence of said characteristic and a differentiated value due to presence of said characteristic;

xviii. the definition of the first characteristic had by said concept being conjured by said user but not by said second concept represented by said second cntexxt;

xix. the definition of the first characteristic had by said concept being conjured by said user but not by said second concept represented by said second cntexxt and stating a benefit due to presence of said characteristic;

xx. the definition of the first characteristic had by said concept being conjured by said user but not by said second concept represented by said second cntexxt and stating a differentiated value due to presence of said characteristic;

xxi. the definition of the first characteristic had by said concept being conjured by said user but not by said second concept represented by said second cntexxt and stating a benefit due to presence of said characteristic and a differentiated value due to presence of said characteristic;

xxii. a citing of an occurrence relevant to said concept being conjured by said user but not relevant to any other context within said second concept represented by said cntexxt, the differentiation stating a first characteristic and optionally stating a benefit due to presence of said characteristic and optionally stating a differentiated value due to presence of said characteristic, the characteristic valid only while said occurrence is considered relevant to said first cnxpt and not relevant to any third cnxpt within the second cntexxt absent another characteristic;

xxiii. a citing of an occurrence not relevant to said concept being conjured by said user but relevant to all other contexts within said second concept represented by said cntexxt or presently considered as relevant to said second concept represented by said cntexxt, the differentiation stating a first characteristic and optionally stating a benefit due to presence of said characteristic and optionally stating a differentiated value due to presence of said characteristic, the characteristic valid only while said occurrence is not considered relevant to said first cnxpt and relevant to all third cnxpts within the second cntexxt absent another characteristic;

xxiv. a vote to establish an association info-item participated in by said concept being conjured wherein the association info-item is not relevant to any other context within said second concept represented by said cntexxt or by said second concept represented by said cntexxt, this indication by association valid only while said association connects to said first cnxpt and not relevant to any third cnxpt within the second cntexxt;

xxv. a vote to exclude said concept being conjured from an association info-item participated in by all other siblings of said concept being conjured;

xxvi. a citing of a trait held by said first cnxpt representing said concept being conjured by said user but not held by any other context within said second concept represented by said cntexxt, the differentiation stating a first characteristic and optionally stating a benefit due to presence of said characteristic and optionally stating a differentiated value due to presence of said characteristic, the characteristic valid only while said trait is held by said first cnxpt and not relevant to any third cnxpt within the second cntexxt absent another characteristic;

xxvii. a citing of a trait not held by said first cnxpt representing said concept being conjured by said user but held by all other fourth cnxpts representing concepts within said second concept represented by said cntexxt or presently considered as held by said second concept represented by said cntexxt, the differentiation stating a first characteristic and optionally stating a benefit due to presence of said characteristic and optionally stating a differentiated value due to presence of said characteristic, the characteristic valid only while said trait is not held by said first cnxpt and is held by all third cnxpts within the second cntexxt absent another characteristic;

xxviii. a citing of a time frame relevant to said concept being conjured by said user or where said concept being conjured by said user was valid for but is not precisely the same time frame of any other context within said second concept represented by said cntexxt or no other said second concept represented by said cntexxt was valid for, the differentiation stating a first characteristic and optionally stating a benefit due to presence of said characteristic and optionally stating a differentiated value due to presence of said characteristic, the characteristic valid only while said time frame is considered relevant to said first cnxpt and not relevant to any third cnxpt within the second cntexxt absent another characteristic;

xxix. a citing of a purlieu relevant to said concept being conjured by said user or where said concept being conjured by said user was valid for but is not precisely the same purlieu of any other context within said second concept represented by said cntexxt or no other said second concept represented by said cntexxt was valid for, the differentiation stating a first characteristic and optionally stating a benefit due to presence of said characteristic and optionally stating a differentiated value due to presence of said characteristic, the characteristic valid only where said purlieu is considered relevant to said first cnxpt and not relevant to any third cnxpt within the second cntexxt absent another characteristic;

xxx. a citing of a time frame that is not relevant to said concept being conjured by said user or during which said concept being conjured by said user was not valid but that is missing from all other contexts within said second concept represented by said cntexxt and not precisely excluded from encompassing the present time frame of said second concept represented by said cntexxt, the differentiation stating a first characteristic and optionally stating a benefit due to presence of said characteristic and optionally stating a differentiated value due to presence of said characteristic, the characteristic valid only while said time frame is considered not relevant to said first cnxpt and is relevant to all third cnxpts within the second cntexxt absent another characteristic; and xxxi. a citing of a purlieu that is not relevant to said concept being conjured by said user or during which said concept being conjured by said user was not valid but that is missing from all other contexts within said second concept represented by said cntexxt and not precisely excluded from encompassing the present purlieu of said second concept represented by said cntexxt, the differentiation stating a first characteristic and optionally stating a benefit due to presence of said characteristic and optionally stating a differentiated value due to presence of said characteristic, the characteristic valid only where said purlieu is considered not relevant to said first cnxpt and is relevant to all third cnxpts within the second cntexxt absent another characteristic;

whereby a description explaining differentiation is provided.

135. The method of claim 1 to search for and obtain wisdom, wherein:

a. searching by a search method to find wisdom to ingest, said search method selected from the group of:

i. searching by background crawling of web pages to obtain results;

ii. searching by background crawling of documents to obtain results;

iii. searching by accessing of databases to synchronize for structure by external marking and to ingest data;

iv. searching by search query specification re-execution to obtain revised results;

v. searching by background crawling of any external commonplace by search query specification re-execution with reapplication of prior culling to obtain results;

vi. searching by background crawling of any external source of wisdom by search query specification re-execution with reapplication of prior culling to obtain results;

vii. searching inside of found source objects to extract information before map generation to isolate elements common to sources and traits at binding points of concepts for differentiating cnxpts representing concepts, said binding point representing any conceptual meaning, said binding point for attachment of features characterizing the who, what, why, how, or how often said conceptual meaning is, do, appear, occur, perform, assembled, fit in, or participate, said binding point for attachment of time frame characterizing the when, attachment of location purlieu characterizing the where, ordering, or duration said conceptual meaning is relevant to, said elements selected from the group of: word, phrase, string, time, purlieu, semantic feature, link, relationships to common target, locations in external categorizations, provenance, authority, element of law, jurisdiction, common context, title, data set name, table name, entity name, attribute name, section title, account, accounts payable item, accounts receivable item, address, agreement, answer, asset, attribute, author, bank, belief, benefits, bookmark, budget item, case, chapter title, character, citation, claim, classification category, communication, communication meta-data property, compensation, concept, concern, concordance entry, contact, context, cost, definition, description, diary entry, docket entry, document characterization, editor, endnote, estimate, event, evidentiary item description, expense, fact, figure, finding, footnote, goods, group, human resource, identity, index entry, informal citation, inventory control, inventory issuance, invoice, issue, journal entry, law, location, logistical detail, managed relationship, meaning, meta-data value, name, object, object meta-data, open question, opinion, orders, organization, originator, owner, page description, page text, participant, party, payroll, performance rating, person, position, precedent, prediction, price, products, project, projection, quality rating, quotation, quote, receipt, relationship description, request for information, request for proposal, requirement, reviewer, role, routing, rule, section text, section title, semantic token, service, shipment, shipping document, skill, statement, story, strategy, table, table of authorities entry, table of contents entry, table of figures entry, task, theory, thing, duration, equation, outcome, prediction, note, problem, reference, ordering, period, color, size, explicit differentiation, usage, proportion, assembly, subassembly, texture, pattern, instruction, placement, time, to do item, descriptive element, topic, type description, type identity, volume title, work effort, work requirement, and other descriptive term;

viii. searching by extraction of a subset of the commonplace having wisdom sought;

ix. searching after display of a visualization to obtain contextualized wisdom;

x. searching for information represented only by empty spaces within a context represented by a cntexxt where the concept represented by a space is only within the mind of the user and their wisdom is imparted to the commonplace by their staking the space to encompass that wisdom;

xi. searching of external sources, from a context represented by a cntexxt represented by a cnxpt from within a visualization of an organization of knowledge from a domain of wisdom formed due to interpretation of a map specification, to impart from said context of said map and a user's acceptance of the relevance of results after culling from within said context of said map to said result of said search the contextualization information from the criteria specifying the map, the context within the organization of knowledge to improve usability for cataloging by utilization by users;

xii. searching of external sources from a context represented by a cntexxt represented by a cnxpt to simplify addition of contextualization information for a search result, improve usability for cataloging, provide cnxpt meaning improvement, and provide goal steering;

xiii. searching of external sources by custom searches;

xiv. searching of external sources by analytic;

xv. searching of previously obtained information by analytic;

xvi. updating a map specification upon extraction or refinement to provide a domain of wisdom as a result of searching with refinement of wisdom from the crowd of other users;

xvii. searching for categorization structure information to improve ability to discriminate between concepts by more specific differentiation by category;

xviii. searching within a domain of wisdom already extracted by navigating to find more specific wisdom;

and xix. searching within a domain of wisdom already extracted by find or findall commands to find potentially relevant wisdom;

b. refining results of searching by refinement method, said refinement method selected from the group of:

i. narrowing results by provenance by fxxt extraction;

ii. narrowing results by fxxt specification interpretation for extraction;

iii. improving results by Boolean combination of fxxts after they are created;

iv. improving results by additional querying where results are added to a fxxt after culling;

v. improving results by additional culling of result set contents, optionally accepting new entries;

vi. narrowing results by applying access right restrictions while forming a fxxt from extraction or search result inclusion;

vii. improving results by additional culling of fxxt contents, optionally accepting new info-items;

viii. navigating to an area of an organization of knowledge to hide information in other areas or less detailed or more detailed that context positioned in;

ix. presenting a result set of concepts represented by cnxpts in the form of an area of consideration for culling to an area of interest to provide information hiding and navigation;

x. presenting a combined hierarchical and flow map of concepts represented by cnxpts in an organization by categorization and model result positioning to provide information hiding and navigation;

and xi. filtering results for information hiding by specifying filter criteria;

c. forming a differentiation between two concepts represented by cnxpts by associating different concepts embodied in results referenced by generation of differing subject identifiers reduced from concepts that are detectably different in results, wherein:

i. forming a differentiation between a concept represented by a cnxpt from its context represented by a second cnxpt by associating different concepts embodied in results referenced;

ii. forming a differentiation between two concepts represented by cnxpts by associating different concepts embodied in results referenced;

and d. using results of a search by a result utilization pattern to cause a benefit for system use, said result utilization pattern selected from the group of:

i. forming a secondary navigable visualization to ease understanding of obtained information to contain conceptual structures as a catalog of topical information;

ii. cataloging information resources after culling;

iii. moving a goal pointer represented by a cnxpt away from its current context to a context closer in meaning to what the references are about as embodied in results referenced;

and iv. find a context represented by a second cnxpt being sought by using a match between said second cnxpt occurrences and concepts embodied in results referenced.

136. The computer-implemented method of claim 135 to produce a map from a commonplace of information demarcating the collective rationale of a crowd, further comprising:

a. including into said structuring at least one consensus belief determinative of an a priori event likelihood wherein an a posteriori event included is conditioned on said a priori event;

whereby users obtain consensus-based knowledge by reusing the results of others participating in a wisdom of crowds sourcing process where concepts are assembled into a commonplace of information having improving depth and quality and the slicing of the categorization shows consensus regarding outcomes.

137. The computer-implemented method of claim 136 to produce a map from a commonplace of information demarcating the collective rationale of a crowd, further comprising:

a. extracting at least one first cnxpt representing, at least as a fiction, an a priori event basis being knowledge acquired prior to subsequent probabilistic deductions, at least one second cnxpt representing an a posteriori event outcome, and at least one association connecting said first cnxpt to said second cnxpt indicative of the conditionality or contingency of the a posteriori event upon the a priori event, by fxxt extraction based upon consensus voting;

and b. depicting an interpretation selected from the group of:

i. of the nature of a deductive semantic tableau proof tree for a deductive proof where the conclusion is true or false, or an inductive proof where the conclusion is merely probable, having at least one a priori event as a first cnxpt in a graph wherein said first cnxpt represents an event determinative of an outcome represented by a second cnxpt, wherein the orientation of the depiction is selected from the group of:

01. the root serves as the first step or given information in a proof, wherein said second cnxpt is structured to be more distant from the root of the spanning tree of the graph than said first cnxpt; and 02. the root serves as the conclusion of the proof, wherein said first cnxpt is structured to be more distant from the root of the spanning tree of the graph than said second cnxpt;

ii. of the nature of a Bayesian belief network spanning forest having at least one a priori event as a first cnxpt in a spanning tree of the graph wherein said first cnxpt represents an event determinative of an outcome represented by a second cnxpt and said first cnxpt is structured to be more distant from the root of the spanning tree of the graph than said second cnxpt;

iii. of the nature of a root cause, problem tree, or part to sub parts breakdown forest having at least one a priori event as a first cnxpt in a spanning tree of the graph wherein said first cnxpt represents an event determinative of an outcome represented by a second cnxpt and said first cnxpt is structured to be more distant from the root of the spanning tree of the graph than said second cnxpt; and iv. of the nature of a claim dependency tree spanning forest having at least one a priori event as a first cnxpt in a spanning tree of the spanning forest wherein said first cnxpt represents an event determinative of an outcome represented by a second cnxpt and said first cnxpt is structured to be more distant from the root of the spanning tree of the spanning forest than said second cnxpt;

whereby users obtain consensus-based knowledge by reusing the results of others participating in a wisdom of crowds sourcing process where concepts are assembled into a commonplace of information having improving depth and quality and the slicing of the categorization shows consensus regarding outcomes and showing the rationale behind the outcomes.

138. The computer-implemented method of claim 137 to produce a map from a commonplace of information demarcating the collective rationale of a crowd in a deep map, further comprising:

a. depicting at least one a priori event as a cnxpt in a directed graph wherein said cnxpt is a root in the tree and is shown on a flattened map depicting a directed graph of Bayesian network, wherein the tree is shown in a third dimension from the flattened map under said cnxpt;

whereby users obtain consensus-based knowledge by reusing the results of others participating in a wisdom of crowds sourcing process where concepts are assembled into a commonplace of information having improving depth and quality and the slicing of the categorization shows consensus regarding outcomes and showing the rationale behind the outcomes.

139. The method of claim 135 to also provide for determining a chain of a priori justifications and a posteriori justifications to determine a likelihood that a hypothesis is correct, comprising:

a. preparing, by at least one processor, an organization of knowledge of a domain of wisdom from a commonplace according to utilize collective consensus through vote tallying means;

b. determining, by at least one processor, at least one chain segment comprising of an a priori justification and an a posteriori justification according to map generation means from said organization of knowledge of at least one domain of wisdom;

c. displaying to the user a portion of said organization of knowledge of at least one domain of wisdom according to display and delivery means; and d. accepting and processing a user command and effecting changes therefrom, said user command selected from the group of:

i. to view content of said commonplace;

ii. to add or refine content of said commonplace and effect changes by voting; and iii. to request searches;

whereby subject matter organized into belief networks is utilized for developing models.

140. The method of claim 1 to also provide culling of the occurrences, further including:

a. locating information by non-associative search query;

b. representing said information as an rsxitem in a result set;

c. presenting said information's description or content to user;

d. accepting zero or more culling commands on said result set rsxitems according to result set processes means for stating opinions regarding relevance to said searches purpose; and e. setting the strength of said occurrence relationship info-item to said information based upon said opinions regarding relevance.

141. The method of claim 1 to update a map, further comprising:

a. re-rendering, dynamically, the display being viewed by said user of a visualization to adapt the displayed depiction to a change made to a cnxpt or association in the commonplace to conform the display to the result of changes made.

142. The method of claim 1 to improve quality of a generated map, further comprising:

a. deriving a consensus based on interactions of the generated validation of map by users; and b. modifying the map based on the derived consensus.

143. The method of claim 1 to also provide an engagement platform in a wisdom of crowds process where concepts are accessed, added, or refined in a commonplace of information, further comprising:

a. defining a cntexxt from a cnxpt instance on a conceptual level wherein said cntexxt is but what appears to be a vessel for the meaning of the cnxpt instance;

b. providing a display rendering of a depiction of a plurality of cntexxts as delineated areas of the depiction;

c. displaying a delineated cntexxt in a shape selected from the group of: a circle, a sphere, a box, a chosen shape, and an avatar;

d. displaying a plurality of cntexxts on the display;

e. displaying a structure generated on a basis selected from the group of: a categorization, a precedence ordering, a process flow, a decision making workflow, a decision tree, a Bayesian network, an ordered list, a directed graph, a random placement, an associative map, and an undirected graph;

f. showing cntexxt membership by depicting the delineated area of the depiction of a first cnxpt instance that is a member of a set represented by a cntexxt as being within and encompassed by said cntexxt;

g. arranging the plurality of cntexxts according to the structure generated selected from the group of:

i. a structure generated according to a categorization, the cnxpt instances within a cntexxt according to the strength of similar of cnxpt instances including the cnxpt instances external to the cntexxt wherein conceptually similar objects are in closer proximity than less similar objects;

ii. a structure generated according to a conditionality, dependence, or other directed graph basis, a first cnxpt instance in a position along an ordering line in a chosen aspect, the ordering implied by the directedness of the graph, with a second cnxpt instance wherein the second cnxpt instance is a subsequent cnxpt instance to the first cnxpt instance in the basis of the structuring;

and iii. a combination of a plurality of structures generated wherein the structures are compounded and depicted as one by making useful interrelationships between the elements of the structurings to combine the aspects presented;

and h. accepting navigation of and other user interaction commands related to the objects of the depictions displayed.

144. The method of claim 1 further comprising:

a. accepting and responding to a command selected from the group of:

i. command to add a definition of an instance of a model stating a calculation specification and rules for its information base;

ii. command to add a definition of a what-if value analysis scenario tuned to operate on a predetermined fxxt;

iii. command to add a definition of a data fault handler mechanism for a predetermined analytic, model, or prediction stating an error indication;

iv. command to define a belief distribution function;

v. command to display a property of an info-item and the current value of the property;

vi. command to display the properties of an info-item and the current calculation specification of a property of the info-item;

vii. command to display the sources of information prescribed by the current calculation specification of a property of an info-item;

viii. command to vote that a calculation specifications of a property is a different specification;

ix. command to add a property of an info-item;

x. command to set defaults for a property of an info-item;

xi. command to vote to remove a property of an info-item;

xii. command to obtain calculation results from a modeling analytic tuned to operate on said commonplace;

xiii. command to initiate processing of calculation specifications of a predetermined set of info-items;

xiv. command to initiate a methodology or workflow; and xv. command to initiate a what if modeling.

145. The method of claim 1 to also provide action workflows to user, further including:

a. providing task management and document management analytics for controlling workflows, and suggesting actions, the management enabled by a map;

b. initiating requests for action, with attached description of action, to a user according to methodology workflow specification step;

c. initiating alerts, with attached description, to a user according to an alert specification generation rule;

d. initiating methodologies according to said methodology templates;

and e. initiating workflows according to said workflow templates.

146. The method of claim 1 to present knowledge in a visualization understandable as a map of concepts by a user, wherein:

a. generating a visualization selected from the group of:

i. map of technologies structured to visually represent that genealogical paradigm of incremental innovation wherein a more modern technology is depicted as an offshoot of an older technology and said more modern technology is thought of as a child of the older technology;

ii. map of technologies structured to visually represent that genealogical paradigm of incremental innovation wherein a more modern technology is depicted as a member of a set of technologies each member being differentiated from a concept seen as a progenitor of said member, said more modern technology also being thought of as a child of said progenitor;

iii. map of technologies structured to visually represent that differentiation paradigm of incremental innovation wherein a more modern technology is depicted as a member of a set of technologies each member being more specifically defined than a cntexxt representing the common features of all the members, said more modern technology also being thought of as a child of said cntexxt representing the common features;

iv. map of concepts structured to visually represent differentiation wherein a more specific concept is depicted as a member of a set of concepts each member being more specifically defined than a cntexxt representing the common attributes of all the members, said more specific concept also being thought of as a child of said cntexxt representing the common attributes;

v. map of legal doctrinal rules structured to visually represent differentiation wherein a more specific legal rule is depicted as a member of a set of rules each member of which being more specific and applying to a fact set of more specific definition than a cnxpt representing the general rule of said doctrine, said more specific rule also being thought of as a child of said cnxpt representing the general rule and said more specific rule being shown in a cntexxt filled by specific rules;

vi. map of legal doctrinal rules structured to visually represent differentiation wherein a more specific legal rule is depicted as a member of a set of rules each member of which being more specific and applying to a fact set of more specific definition than a cnxpt representing the general rule of said doctrine, said more specific rule also being thought of as a child of said cnxpt representing the general rule and said more specific rule being shown in a cntexxt filled by specific rules;

vii. map of legal fact sets structured to visually represent differentiation wherein a more specific fact set is depicted as a member of a set of fact sets each member of which being differentiated from its siblings and from a more general context by at least one legally differentiable fact, said more general context provides a simplified fact set definition generalized from the set of specific fact sets it contains and for which a general rule is stated and wherein the more general context states the set of facts against which the elements of said general rule would be applied and said more specific fact set also being thought of as a child of said more general context;

viii. map of occurrence sets structured to visually represent differentiation wherein a more specific occurrence set is depicted as a member of a set of occurrence sets each member of which being differentiated from its siblings and from a more general context by at least one additional or different occurrence wherein said more general context provides a smaller occurrence set all of which being related to the concept represented by said more general context and all occurrences of said more general context apply to all specific occurrence sets but each more specific occurrence set fails to properly characterize said concept represented by said more general context and each said more specific occurrence set is also to be thought of as a child of said more general context;

and ix. a visualization of a structuring of concepts.

147. The method of claim 1 to also manage files, further including:

a. collecting a reference to an information resource or internal resource serving as an information resource into said commonplace and creating an irxt info-item to represent said information resource;

b. forming occurrence relationships between said irxt info-item and one or more cnxpts;

c. accepting categorizations and changes to categorizations of an information resource or internal resource serving as an information resource by a user administering file management;

and d. providing fxxt specification templates for organizing said cnxpts into categorizations specified by said fxxt specification that thus also organizes said related information resource or internal resource serving as an information resource.

148. The method of claim 1 to manage the growth of knowledge, further comprising:

a. harmonizing categorizations by selecting connective hierarchical associations in forming a skeletal structure, giving priority to those associations whose accumulated weights of votes for use is highest to form an extracted categorization based upon a consensus view regarding the organization of knowledge;

whereby a more easily agreed upon, effective, efficient, or simpler structure is formed according to a collected consensus of opinions.

149. The method of claim 1 to also provide for managing a commonplace of information for research and discovery, further comprising:

a. controlling continuous processing and managing add-in function modules to calculate consensus and impute associations according to utilize collective consensus through vote tallying means;

b. providing coordinated access to analytics selected from the group of:

i. data extraction analytics for carrying out computer database searching, data extraction, transformation, translation, and loading;

ii. document management analytics for controlling, storing, accessing, and displaying electronically stored information resource documents;

and iii. task management and document management analytics for controlling workflows, determining scheduling based upon workflow priorities, and suggesting task assignments;

c. providing an organization of knowledge, the knowledge selected from the group of:

i. regarding a study, within a domain of wisdom in said commonplace for holding and categorizing cnxpts with evolving attached descriptive information, at least one said cnxpt representing a issue;

ii. regarding the study, within a domain of wisdom in said commonplace for holding and categorizing cnxpts with evolving attached descriptive information, at least one said cnxpt representing a topic, concept, or sub-topic;

iii. regarding people and organizations, within a domain of wisdom in said commonplace for holding and categorizing cnxpts with evolving attached descriptive information, zero or more said cnxpts representing a person or an entity;

iv. regarding highly relevant and important information, within a domain of wisdom in said commonplace for holding and categorizing cnxpts with evolving attached descriptive information, zero or more said cnxpts representing desired to indicate a proof of a theory;

v. regarding events, within a domain of wisdom in said commonplace for holding and categorizing cnxpts with evolving attached descriptive information, zero or more said cnxpts representing an event capable of having a timeframe involved;

and vi. regarding locations, within a domain of wisdom in said commonplace for holding and categorizing cnxpts with evolving attached descriptive information, zero or more said cnxpts representing a location;

d. loading of said commonplace with structural information defining a knowledge model;

e. initiating execution of continuous processing functions according to continuous processing means, the functions selected from the group of:

i. extraction of each source object's identity, descriptive information, origination, and provenance meta-data to generate a source info-item with attached descriptive information, said type of source object selected from the group of: an info-item from an external commonplace, a concept represented by a cnxpt from an external commonplace, data set, meta-data, file, information resource, statement, communication, template, decision, docket, story, transcript, and document; said source info-item to be used as the authority control base for said source object and related to a new fxxt by a source relationship, said fxxt termed a source object provenance authority fxxt;

ii. extraction, for each source object that is a structured data set having data set elements, of all data set elements of said source object selected from the group of: table description, entity type description, column description, attribute description, relationship info-item type descriptive information, table procedure description, object method description, and data rule description; to generate, for each, a concept represented by a cnxpt with attached descriptive information from said data set elements, said cnxpt to be used as a curation control base, said cnxpt termed a source data description authority cnxpt, said all instances of said source data description authority cnxpts are assigned a single fxxt related to said source object provenance authority fxxt;

iii. extraction, for each source object that is a structured data set having data set elements, of all data rule descriptions of said source object to generate, for each, a concept represented by a cnxpt with attached descriptive information, said cnxpt to be used as curation reference base, said cnxpt termed a source data rule authority cnxpt;

iv. extraction, for each source object that is unstructured data, of all descriptive elements of said source object selected from the group of: object meta-data, citation, page description, foot or end note, volume title, section title, chapter title, book mark, section text, page text, type description, definition, index entry, part, table of contents entry, author, editor, table, figure, character, precedent, quotation, topic, issue, finding, opinion, test, question, hypothesis, experiment, sample, batch, and description; to generate, for each, a concept represented by a cnxpt with attached descriptive information from said descriptive elements, said cnxpt to be used as a curation control base, said cnxpt termed a source data description authority cnxpt, said all instances of said source data description authority cnxpts are assigned a single fxxt related to said source object provenance authority fxxt;

v. extraction, for each source object that is unstructured data, a cited information resource irxt info-item for any information resource not existing in said commonplace of information;

and vi. extraction of topical elements from said source object, said topical element selected from the group of: term, timeframe, thing, feature, link, status, originator, event, party, participant, person, owner, address, location, organization, reviewer, rule, test run, experiment, object, relationship info-item description, type identity, question, hypothesis, experiment, sample, batch, part, law, citation, claim, belief, strategy, concern, position, document characterization, communication, communication metadata property, fact, missing information, statement, opinion, issue, case, docket entry, story, theory, semantic token, name, statement, precedent, attribute, identity, evidentiary item description, concept, context, classification category, meta-data value, and other description; each said topical element to be used as a base for deriving commonalty and similarity scores for said source object, wherein a cnxpt is created for each unique element extracted, said cnxpt termed a coding key cnxpt, said all instances of said coding key cnxpt of a type are assigned a single fxxt based upon said source object provenance authority fxxt and the type of coding key;

f. ingesting a plurality of source objects;

g. determining zero or more metrics for characterizing a source object, the metric selected from the group of:

i. relevance of said source object to a search objective stated as a search query specification step wherein said source object is a result set item in a search result set;

ii. pertinence of said source object for a domain of wisdom extraction objective stated as a fxxt specification step wherein said source object is an info-item of any type applicable to said fxxt specification step;

iii. pertinence of said source object for a prioritization rule of a methodology workflow specification step wherein said source object is an info-item of any type applicable to said methodology workflow specification step;

and iv. pertinence of said source object for an alert generation rule of an alert specification wherein said source object is an info-item of any type applicable to said alert specification generation rule;

h. executing the means for categorizing said commonplace by performing map generation, wherein a computer performs management of said commonplace, and prepares at least one consensus organization of knowledge of at least one domain of wisdom from said commonplace according to utilize collective consensus through vote tallying means wherein said organization of knowledge of at least one domain of wisdom includes said source object provenance authority fxxt and also includes any additional portion of said commonplace against which categorization or comparison or curation is to occur;

i. building at least one visualization for display to users based upon said organization of knowledge of at least one domain of wisdom to use as an organizing base for initial viewing;

j. initiating zero or more workflow functions selected from the group of:

i. requests for action, with attached description of action, to a user according to methodology workflow specification step;

ii. alerts, with attached description, to a user according to an alert specification generation rule;

iii. methodologies according to said methodology templates;

and iv. workflows according to said workflow templates;

k. providing zero or more template aids selected from the group of:

i. search query procedure templates for searching for source objects to determine relevance;

ii. providing concept and source object information templates for searching for and reviewing source objects to determine relevance;

and iii. providing methodology and workflow templates for project management of searching for and reviewing source obj ects to determine relevance to a stated meaning or issue;

l. providing prediction analytics establishing commonalty and similarity scores for source objects;

m. computing a predicted weighted ranking of a source object likely relevance to a coding key cnxpt as specified;

n. computing a predicted weighted rejection ranking of a source objects according to rules for rejection as irrelevant or privileged;

o. accepting data rule descriptions as concepts represented by cnxpts with attached descriptive information, said cnxpts to be used as curation reference bases, said cnxpts termed source data rule authority cnxpts;

p. accepting culling commands in manual review to categorize source objects according to said concepts and contexts as represented by cnxpts;

q. accepting culling commands in manual review to re-prioritize source objects for further review according to specified workflow rules or to remove them from further review or from collection of source objects in commonplace of information;

and r. accepting and processing a user command and effecting changes therefrom, said user command selected from the group of:

i. to view content of said commonplace;

ii. to add or refine content of said commonplace and effecting change;

iii. to navigate around a visualization of said commonplace;

iv. to request a search for wisdom;

v. to enter a fxxt specification involving extraction by meta-data and search queries to meet criteria for project;

vi. to accept a workflow task;

vii. to specify search query specifications, workflow task assignment and document passing specifics to meet criteria for project;

viii. to initiate operation of data extraction, document management, and prediction analytics;

ix. to initiate continuing retrieval of source objects based on the criteria according to search query specifications;

x. to establish a commonplace of information for the purposes of a specific dispute or study, termed a discovery preparation set;

xi. to ingest into said discovery preparation set commonplace of information a source object set;

xii. to grant access to a source object to a different user for the purposes of a specific dispute or study, the accumulation of said grants termed a discovery production set;

xiii. to categorize source objects into workflow contexts;

xiv. to allocate resources according to specified workflow rules for assignment or workflow rules for task acceptance;

xv. to refine search query specifications, categorizations, and priorities for review;

xvi. to specify relevance prediction weightings;

xvii. to notify a supervisory level regarding a source object's importance;

xviii. to specify details for workflow structure and categorizations by establishing contexts for work tasks represented by cnxpts and workflow transitions represented by relationships to meet criteria for project;

xix. to alter a workflow based upon quality checks produced by workflow and methodology;

xx. to alter a workflow based upon review of metrics produced by workflow and methodology;

xxi. to generate a report or data set of the data set catalog, provenance, production cost, and consensus regarding relevance weights of said discovery preparation set or said discovery production set;

xxii. to generate an extract data set of said discovery preparation set;

and xxiii. to generate an extract data set of said discovery production set;

whereby search retrieval and information organization are applied to the discovery review process.

150. The method of claim 1 to also provide for improving user learning efficiency, comprising:

a. providing to a learner the ability to connect new information with relevant preexisting topics or propositions in the learner's own cognitive structure as provided by a map wherein a learner can assimilate new topics represented by ttxs and propositions implemented as relationship info-items into their existing cognitive structures;

b. empowering serendipitous learning to learn of known topics represented by ttxs that a user had previously not studied or known about individually through browsing within ttx categories or subject areas and increasing the likelihood of discovering resources that are tangentially related to said known topics;

c. empowering incremental explorative browsing alongside other techniques to look for something specific by traversing from a context represented by a first cnxpt to a more detailed context represented by a second cnxpt; and d. providing visual devices to heighten the mental excitement as would occur in game program to keep the speed of learning high.

151. The method of claim 1 to produce lists of prior art in the technology domain, further including:

a. forming a query for parents of a tcept in an organization of knowledge based upon incremental innovations; and b. listing the results of the query;

whereby a roadmap of prior innovations is produced.

152. The method of claim 151 to compute a value for a product or technology, wherein:

a. identifying an association instance between a first cnxpt instance and a second cnxpt instance in a commonplace of information wherein said first cnxpt instance comprises a property stating a characterization of value selected from the group of: a point value, and value distribution; applicable to said second cnxpt instance; and b. summing said property of each first cnxpt instance having a relationship represented by an association with said second cnxpt instance to form a value for said second cnxpt instance according to primary tcept value prediction means by at least one of simple addition, an analytic or other summing algorithm as specified in additional specification;

whereby a value imputed from a forest of cnxpts is used in modeling and to obtain a prediction.

153. The method of claim 152 to compute a value for a product or technology, wherein:

a. forming a timeline by ordering conceptual meanings by a time point associated with said constraint, said time point selected from the group of: initial recognition of constraint, mid-point, point at which said constraint is anticipated to become obsolete, point at which products based upon said constraint are anticipated to be altered or replaced to conform to new constraint, median of distribution, mean of distribution, and any other specified constraint summarizer, wherein the form of said timeline is of the group of: a list, a graphical composite of durations, and other specified visual form wherein conceptual meanings are shown;

b. determining effectiveness of each cnxpt according to said timeline by determining the timeframe between when said cnxpt begins to be viable and when said cnxpt will no longer be viable;

and c. prorating the values imputed from other forests based upon the timeframe of effectiveness of said second cnxpt and each said first cnxpt;

whereby a value imputed from a forest of cnxpts is used in modeling and to obtain a prediction of value under competitive scenarios.

154. The method of claim 1 to also provide a registry for claiming of ownership of ideas, further comprising:

a. locating a cntexxt within which a user believes a cnxpt may properly be created as a subdivision;

b. creating a cnxpt within the cntexxt by stating a differentiation of the cnxpt with respect to the cntexxt;

and c. registering a right to a portion of a cntexxt occupied by the cnxpt, the scope of the right selected from the group of: scope limited to the cnxpt as an innovation with regard to the cntexxt, scope limited to the cnxpt as an innovation with regard to the cntexxt and other cntexxts wherein the same right has been claimed by the same user, and scope limited to the cnxpt as an innovation without regard to the cntexxt.

155. The computer-implemented method of claim 154, further comprising determining a rights policy of that represented by a cnxpt as a function of a rights policy of a cnxpt info-item.

156. The method of claim 155, wherein the ownership right comprises zero or more rights selected from the group of: a creation right, a use right, and a commercial right.

157. The method of claim 1 to also form a value estimate of an appcept, further comprising:

a. calculating total space consumed by the two-dimensional area occupied by an appcept taken over all appcepts shown on a map of appcepts at a given depth of said map;

b. calculating total value of appcepts shown on the map of appcepts at the given depth of said map by adoption of an estimate for the depth, a model, or an imputation;

and c. calculating value of the appcept based upon proportion of space by dividing the area of the appcept by the total space consumed on a map of appcepts at a given depth of said map and multiplying it by the total calculated value for the depth.

158. The method of claim 157 to also form a value estimate of a tcept, further including:

a. calculating total space consumed by the two-dimensional area occupied by a tcept taken over all tcepts shown on a map of tcepts at a given depth of said map;

b. calculating by estimate, model, or imputation the total value of tcepts shown on the map of tcepts at the given depth of said map;

and c. calculating value of a tcept based upon proportion of space by dividing the area of the tcept by the total space consumed on a map of tcepts at the depth of the map and multiplying it by the total calculated value.

159. The method of claim 157 to also form a value estimate of a tcept, further comprising:

a. calculating, by imputation of a summed value from appcepts in the second organization of knowledge that have time-based estimates of value and are related by a satisfaction of need relationship to a tcept in the first organization of knowledge, the total value of a tcept;

whereby prediction by time horizon of applications of technology is imputed to determine values of technologies satisfying the requirements of a set of applications.

160. The method of claim 157 to also form a value estimate of a cnxpt, further comprising:

a. calculating, by imputation of a summed value of the space occupied by appcepts in the second organization of knowledge that are related by a satisfaction of need relationship to a tcept in the first organization of knowledge, the total value of a tcept;

whereby prediction by space of applications of technology is imputed to determine values of technologies satisfying the requirements of a set of applications.

161. The method of claim 1, further including:

a. protecting the description of a novel new idea;

b. providing tools for preparing provisional patent applications describing said novel new idea recently entered into said commonplace;

c. generating text for said patent application describing the context of said idea based upon its position in a categorization of technology ideas and the descriptions of said categories, the metadata regarding said novel new idea, and any description entered for said novel new idea;

and d. providing tools for submission of said provisional patent application.

162. The method of claim 161, further comprising:

a. assisting the owner of a newly entered cnxpt in completing a description of the invention based upon the idea represented by the cnxpt instance by methods selected from the group of:

i. providing the prior art for the innovation taken from the categorization of the new cnxpt in a map where the root of the tree of each tree where the cnxpt instance is placed is the oldest entered technology within each family the inventor has found to be where the new idea should be related as an off-shoot;

ii. providing the user with a form for gathering and recording information needed for a provisional patent in the jurisdiction decided upon;

iii. providing a space on the form for entry of one or more sentences describing the innovation represented by the new cnxpt instance beyond the description provided by the information describing the categories providing the context of the new cnxpt instance;

iv. providing a path to additional assistance by listing resources including at least links to the patent office desired, books, forms, and patent agents;

and v. providing the option for the inventor to submit electronically or by printed forms to the patent office the information collected, and completing the chosen process upon the decision to do so by the inventor.

163. The method of claim 1, further including:

a. providing a marketplace for requesting problem solutions, requesting idea extension, selling rights to ideas, requesting expertise, and offering expertise;

b. providing online communities based upon specific concepts;

and c. providing a communal innovation process allowing others to join to work on ideas in a protected environment on an access controlled basis.

164. The method of claim 72 to also provide for collaboratively developing technologies related to concepts within a commonplace of information, further comprising:

a. providing an interface for users to view, navigate and enter commands to interface with said commonplace;

b. preparing at least one consensus organization of knowledge of at least one domain of wisdom from said commonplace according to utilize collective consensus through vote tallying means;

c. granting or rejecting access to said commonplace for a given type of interaction;

d. offering an agreement with terms for connection and collaboration;

e. forming a connection with a person recently showing knowledge of concepts within a context represented by a cnxpt in one or more phases selected from the group of:

i. selecting an object of wisdom to act upon;

ii. requesting contact with at least one person knowledgable regarding a cnxpt representing a concept within a context, the cnxpt of said domain of wisdom;

iii. requesting making contact with a listed person, project consortia, or organization;

iv. requesting display of a result set for culling;

v. requesting purchase of a listed item;

vi. scheduling specified participation;

vii. requesting investment in a listed project consortia, pool, or organization;

viii. stating an opinion;

ix. stating completion status of a task;

x. stating interest;

xi. offering an incentive;

xii. offering a funding incentive;

xiii. requesting vetting information or access to vetting information;

xiv. requesting consideration for funding;

xv. stating an evaluation;

xvi. requesting consideration for pool graduation;

xvii. stating consortia formation;

xviii. publicizing for consortia participation;

xix. negotiating for consortia participation;

xx. negotiating for deliverable acceptance;

xxi. negotiating for assignment;

xxii. negotiating for investment pool graduation;

xxiii. requesting display of a structural view of cntexxts based upon wisdom found;

and xxiv. requesting the navigating to a cntexxt based upon wisdom found;

and f. accepting and processing a user command and effecting changes therefrom, said user command selected from the group of:

i. to view content of said commonplace;

ii. to add or refine content of said commonplace and effect change;

iii. to navigate around a visualization of said commonplace;

and iv. to request a search for wisdom.

165. The method of claim 164 to also collect commercialization status information, further including:

a. collecting interest information based upon user navigation to cnxpts in a visualization, changing of information related to a cnxpt, or searching where a cnxpt is a result of said search;

b. accepting plug-in methodology or workflow definitions;

and c. accepting answers to survey questions presented to said user as provided for in a methodology or workflow;

wherein said methodologies or workflows both assist a user in their commercialization endeavor by providing step by step information on relevant topics as after the idea education and idea development direction, but also provide team management and commercialization process measurement to collect information to prove up that idea is making progress toward real usefulness.

166. The method of claim 1 to also provide providing tools for competing in innovating, further including:

a. providing tools for commercializing, and analyzing concepts;

b. collecting information regarding the progression of commercialization of a technology concept;

c. collecting vetting information for companies seeking funding;

d. preparing the history of commercialization progress vetting information for release for due diligence by funding sources;

e. obtaining consent of the owner to release said information;

and f. releasing said information to a funding source.

167. The method of claim 166 to also manage investment pools, further including:

a. providing tools for managing said investment pool and participants according to innovation investment pools means;

and b. providing procedures and tools to the parties involved in transactions involving investment pools, the procedures and tools selected from the group of:

i. providing tools for defining an investment pool's legal and operational structure, purpose, entry incentives, termination rules, progress rewards, its entry term sheet criteria and graduation guidelines;

ii. accepting accounting of funds;

iii. providing tools for defining entrant due diligence information requirements as a methodology or workflow;

iv. accepting information from entrant candidates for application for entry and for due diligence;

v. preparing notices offering entry to qualified startups;

vi. providing tool for making a market by negotiating a graduation to sell a held stake to another pool or a funding source according to innovation investment pools means;

vii. enabling an investment pool graduation process between the entities by automatically generating contract terms based on a negotiation between the parties;

viii. enabling a workflow for decision guidance for the negotiation process between two entities wherein decisions made and information provided associated with a decision guidance are taken together to produce a contract term for use in a contract between the parties;

ix. managing multi-sided auction process, the tool to accept and act as match maker based upon statements selected from the group of: offer for acceptance into a pool from interested investment pool, offer for direct investment from interested investor, showing of interest to be added into an investment pool by a consortium, offer for merger from interested consortium or investment pool, showing of interest to be merged into a consortium by a consortium, interest statement providing the criteria an investment pool has set for qualifying a consortium, interest statement providing the criteria an investor has set for qualifying a consortium for investment, interest statement providing the criteria a consortium has set in seeking investment, interest statement providing the criteria a consortium has set in seeking graduation from an investment pool, interest statement providing the criteria an owner has set in seeking buyer for share of ownership, policy constraint on transaction, track record information regarding consortium, track record information regarding investment pool, track record information regarding investor, investigation result, credit report, intellectual property report, financial report, product assessment, competitive intelligence report, recommendation, ownership report, ownership changes, restructuring plans, investigation report, verification report, and conflict of interest information report;

x. defining progress information requirements as a methodology or workflow;

xi. accepting progress reporting information for enrollee startups;

xii. providing tool for evaluating enrollee startups;

xiii. providing tool for preparing startup progress report;

xiv. providing tool for suggesting enrollees for termination;

xv. managing job board matchmaking auction process for enlisting and placement into consortium roles, the tool to accept and act as match maker based upon statements selected from the group of: skill requirement criteria by a consortium, skill and ability and criteria resume by a role candidate, showing of interest to take role in consortium, offer to take role from a consortium, policy constraint on transaction, track record information regarding consortium, track record information regarding consortium, track record information regarding candidate, investigation result, credit report, intellectual property report, financial report, product assessment, competitive intelligence report, recommendation, ownership report, ownership changes, restructuring plans, investigation report, verification report, and conflict of interest information report;

xvi. providing tool for enforcing rules and confidentiality;

xvii. managing the tracking of status in a workflow;

xviii. accounting for the transaction agreed to by the parties;

xix. providing notice of upcoming workflow event;

xx. storing an immutable copy of the transaction data structure in a secured location;

and xxi. summarizing value of said pool and generating reports.

168. The method of claim 1 to also provide for organizing opportunity matching, further including:

a. capturing new concepts;

b. organizing said new concepts into categories;

c. providing a marketplace for wisdom regarding ideas;

d. granting access to said commonplace;

e. providing search facilities for finding said new concepts in said categories;

f. collecting user interest information;

g. providing a marketplace for ideas;

h. providing facilities for organizing participation by a user in collaboration regarding said new concepts in said categories;

and i. providing tools for managing potential and realized valuable results of said collaboration regarding said new concepts in said categories.

169. The method of claim 168 to also provide for obtaining transactions fees on the basis of collecting new concepts into a commonplace, further comprising:

a. capturing new concepts;

b. granting access to commonplace of information;

c. providing a marketplace for wisdom regarding ideas;

d. collecting user interest information;

e. providing a marketplace for ideas;

f. providing a marketplace for data related to specific concepts;

g. collecting fees associated with matching opportunities according to negotiated collaboration terms;

h. providing tools for accessing, ideating, searching, organizing, protecting, commercializing, communicating, and extending ideas;

and i. accepting a request to search for wisdom.

170. The method of claim 1 to enable verifiable and secure transactions regarding ideas, further comprising:

a. providing a value creation structure comprises:

i. generating ownership rights for a set of one or more ideas represented by one or more cnxpts, wherein:

01. encapsulating, for each ownership right, origination data related to the ownership right and the corresponding cnxpt within a transactional data structure, termed a registry;

and 02. accepting stating of a claim of ownership of an idea represented by one or more cnxpts, termed staking;

ii. detecting a first transaction that involves a change in ownership over an idea represented by one or more cnxpts;

iii. adding first transaction data related to the first transaction in the transactional data structure;

and iv. granting access to a user of the one or more cnxpts representing an idea only according to the then-current ownership right where one exists;

whereby purported ownership for specific idea is delineated according to a staked claim.

171. The method of claim 170, further comprising deriving a chain of ownership changes based on the transaction data structure.

172. The method of claim 171, further comprising encapsulating origination data related to the ownership right and the corresponding cnxpt within a transactional data structure that is temper-proof.

173. The method of claim 172, further comprising encrypting data within the transaction data structure before distributing the transactional data structure.

174. The method of claim 172, further comprising accepting a first transaction involving a first entity acquiring from a second entity at least one item selected from the group of: the cnxpt, access to the cnxpt, access to a communication regarding the cnxpt, control over access to the cnxpt, addition of a new member to the cntexxt defined by the cnxpt in a map, and the set of objects represented by the cnxpt.

175. The method of claim 1 to also manage legal information for attorneys, further including:

a. accepting legal information into said commonplace as an information resource or internal resource serving as an information resource;

b. accepting classifications of said legal information into categories stated as cnxpts;

and c. applying a fxxt to rearrange said information for use in preparing for one of one or more litigation purposes.

176. The method of claim 175 to manage a commonplace of legal information, further including:

a. creating a fxxt to establish a domain for legal rules;

b. creating a fxxt to establish a domain for factual situations or fact sets;

c. establishing a cnxpt to represent a fact;

d. establishing a cnxpt to represent an article of evidence, said cnxpt having zero or more occurrences referencing a tangible entity;

e. establishing a cnxpt to represent a rule;

f. establishing a cnxpt to represent an element of a rule having one or more traits stating a traits of an element of a rule;

g. establishing a plurality of associations between cnxpts representing rules and cnxpts representing elements of rules to define the tests needing to be satisfied to apply a law;

h. establishing a characteristic on a cnxpts to represent a fact;

i. establishing a plurality of associations between cnxpts representing facts and cnxpts representing elements of rules to apply facts to law;

j. categorizing precedent and statutes over time by issues as well as citation;

k. searching for pertinent law by a large number of attorneys is an expert level crowd sourcing wisdom of crowds operation already;

l. representing issues by cnxpts;

m. representing legal doctrines by cnxpts;

n. representing specific opinion text by cnxpts;

o. representing opinion texts, court orders, trial documents, statutes, and other documents are represented by information resource info-items. connecting opinion text by cnxpts;

p. establishing a plurality of associations between cnxpts representing fact sets or disputed issues and cnxpts representing opinion text, elements of rules to apply facts to law;

and q. granting access to subsequent users interested in an issue.

177. The method of claim 175 to also provide for finding the case on point in legal research by weighted categorization, further comprising:

a. finding similarities between two concepts selected from a group of:

i. a first fact from a first case and a second fact from a second case where the similarity of said first fact and said second fact causes an extrapolated belief that said first case is related by fact similarity to said second case and thus the legal issues or sub-issues involved in said first case are related to or resemble the legal issues or sub-issues involved in said second case;

ii. a first element or sub-element of a first law and a second element or sub-element from a second law where the similarity of said first element or sub-element and said second element or sub-element causes an extrapolated belief that said first law is related by element or sub-element similarity to said second law and thus the evidentiary and doctrinal legal issues or sub-issues involved in said first law are related to or resemble the evidentiary and doctrinal legal issues or sub-issues involved in said second law;

iii. a first element or sub-element of a first law and a second fact from a second case where the satisfaction of said first element or sub-element by said second fact causes an extrapolated belief that said first law is to some degree applicable at least in part to said second case and also that the evidentiary burden and doctrinal legal issues or sub-issues involved in said first element or sub-element of said first law are relevant to establishing satisfaction of said first element or sub-element by evidence in said second case;

and iv. a first element or sub-element of a first law of a first jurisdiction and a second fact from a second case in said first jurisdiction where the satisfaction of said first element or sub-element by said second fact causes an extrapolated belief that said first law is highly applicable at least in part and to a determinable degree to said second case and also that the evidentiary burden and doctrinal legal issues or sub-issues involved in said first element or sub-element of said first law are relevant to and establish requirements for establishing satisfaction of said first element or sub-element by evidence in said second case under the constraints imposed by evidentiary rules for such an element or sub-element and doctrinal legal precedent found in a prior decision in a third case in said first jurisdiction involving said first law.

178. The method of claim 175 to also provide for evidence discovery and presentation management, further comprising:

a. breaking down law to elements;

b. establishing occurrences to cnxpts representing facts;

c. categorizing elements or sub-elements of laws to be associated with law, a cnxpt representing an element, a cnxpt representing a sub-element, a cnxpt representing a law;

d. categorizing elements of precedent, contract, legal opinion, other elements, or doctrine in one or more hierarchical organizations of cnxpts;

e. establishing associations between facts and elements of a pertinent law to apply facts to law;

f. associating an issue or sub-issue or opinion text cnxpt to categorize said issue or sub-issue by associations between cnxpts by the searching or manual operations as discussed below;

g. making available result sets developed by a first interested user to subsequent user to enable efficient searching to said subsequent user and then also to said first interested user;

and h. accepting associative searching to track issue or sub-issue development.

179. The method of claim 178 to also provide for legal case planning, further comprising:

a. categorizing cnxpts representing legal information selected from the group of: fact, cause, legal theory, statute, precedent, issue, general rule, rule element, and sub-element to obtain a structuring;

b. forming more specific instances of a rule element or sub-element where differentiations have been cited by precedent or legal theory, associating the more specific instance to the more general by hierarchical association;

c. associating incidences of similar legal information to retain understanding of the logical similarity;

and d. connecting a fact represented by a cnxpt to a law element or sub-element represented by a cnxpt by association between fact cnxpt and rule element or sub-element cnxpt.

180. The method of claim 175 to also provide determination of legal clarity, further comprising:

a. generating a commonplace regarding technology concepts, intellectual property, and contracts, each represented by cnxpts;

b. defining one or more fxxts for marking information in the commonplace;

c. generating one or more maps describing technology derivations;

d. generating zero or more maps describing intellectual property transactions;

e. generating zero or more maps describing legal precepts;

f. accepting entry of additions to the content of the commonplace;

g. accepting entry of votes relating beliefs regarding the content of the commonplace;

h. allowing searches relating to the topics of the commonplace;

i. accepting information from a user needed for filing a patent application, and causing the automated filing of the patent application;

j. utilizing the context into which a user classifies their potentially patentable idea to generate a listing of prior art for the idea from a map, and adding the list to a patent application to be filed;

k. accepting classification from a user to contextualize a potentially patentable idea;

l. determining by crowd wisdom a meaning arguably more objective than any single opinion expressing a definition of the meaning of a topic represented by a cnxpt, the consensus determination using a map;

m. detecting divergence of opinions on a topic represented by a cnxpt, by detecting non-consensus to show a failure of praxis;

n. showing sources of information regarding topics and issues represented by cnxpts cataloged by topic or issue;

o. showing topics and issues side by side other similar topics and issues represented by cnxpts;

p. presenting an associative view of cnxpts in each classification map to speed user understanding and search;

q. providing dynamically organized indices for classification to improve efficiency of index maintenance;

r. providing dynamically organized indices for classification of ideas represented by cnxpts based upon collective intelligence to remove costs from index maintenance;

s. providing dynamically organized indices for classification of documents to improve efficiency of document management;

t. providing dynamically organized indices for classification of documents based upon collective intelligence to remove costs from index maintenance;

u. refining a meaning for a topic from the expressing of opinion regarding said meaning by accepting a plurality of user movements of a visual object representing said topic to a different context on a map;

v. predicting the actual meaning of a topic from the expressing of opinion regarding said meaning by a plurality of users;

w. predicting the actual meaning of a topic from the moving a visual object representing said topic to a different context on a map and forming a consensus determination regarding the proper context;

x. retaining and updating the research work of a user by automatically re-querying searches used as subject identifiers;

y. combining the results from several sources to amalgamate an organization of a body of knowledge requested by a user as shown in a map where the information needed for classification is sparse;

z. providing an associative platform for viewing the law based upon resolved precedence and prospective use of precedents and the prior work by others in a plurality of highly coalesced organizations each shown on a map for navigation and eliciting serendipitous recognition of issues, alternative viewpoints, and alternative theories regarding a matter to expand yet organize and summarize what others considered in situations rather than merely on their results in court opinions;

and aa. predicting the strength of an argument based upon the ranking of issues, applicability of precedent, and weights of facts where prior success as shown by positions of parties in prior cases could be assessed for similarity or gauged by an attorney given a similar fact pattern;

whereby a map can decrease an inventor's time to file for patent protection; whereby a map can reduce the cost to file for patent protection; whereby a map showing prior art can reduce the burden on an inventor to explain best mode and the possibility of non-public inventorship; whereby the common understanding of the issues and topics represented by cnxpts as recorded by others in legal matters, research papers, and documents can be improved with a map; whereby the common understanding people have regarding definitions of a topic represented by a cnxpt can be improved by use of subject identifier searching and associative positioning in a map; and whereby providing depersonalized expression of opinions on definitions of a topic represented by a cnxpt and its categorization, by intermediation by a commonplace manager operating on consensus determination and by introduction of one or more maps as the vehicle of communication, removes stress and provides a better evidentiary body.

181. The method of claim 175 to also provide for classification by types of authority in legal research by weighted categorization, further comprising:

a. finding similarities between a first opinion regarding an element or sub-element of a first law of a first jurisdiction and a second opinion regarding a similar second element or sub-element of a second law in a second jurisdiction and imputing a relationship info item with a weight depending upon the degree of similarity of said element, the degree of similarity of said law, and the nature of the authority as mandatory and binding or persuasive and non-binding or not applicable and the level of the courts of said first and said second jurisdictions;

b. accepting a characterization of a first jurisdiction's authority relative to a second jurisdiction's authority as mandatory authority or persuasive authority;

c. accepting a characterization of a first jurisdiction's opinion relative to a second jurisdiction as mandatory or persuasive;

and d. accepting a characterization of a first jurisdiction's opinion relative to a second jurisdiction as followed or not followed but considered, with one or more citations to opinions of said second jurisdiction, said one or more citations to opinions of said second jurisdiction describe the reasoning specifically regarding said first jurisdiction's opinion.

182. The method of claim 1 to also provide tool for competitive innovation analysis and research document management, further including:

a. providing an environmental scanning process workflows for managing the collection of competitive data according to map generation means and according to alter information through visualization means;

b. providing competitive analysis workflows tuned to operate on said commonplace;

c. providing modeling tools for competitive analysis what if value analysis tuned to operate on said commonplace according to map generation means;

d. providing competitive product analysis information repository commonplace standards for managing and sharing competitive information on an access controlled basis;

and e. accepting commands from a user to initiate a map generation and to utilize a map according to alter information through visualization means.

183. The method of claim 182 to also provide assistance in creativity, further including:

a. analyzing gaps in knowledge toward solutions according to generate prediction of innovation gap means;

b. generating suggested matchings between traits according to generate commonality relationships means;

c. generating roadmaps of cnxpts according to assisted creativity means, according to map generation means, and according to forming predictions means;

d. showing state of obsolescence of a cnxpt;

and e. generating suggestions of differentiations of a cnxpt possibly usable form a new cnxpt according to generate TRIZ based candidate suggestions.

184. The method of claim 182, to structure competitive intelligence use of concepts collected into a commonplace, further comprising:

a. determining, by at least one processor, at least one visualization of a map for display to a user from said organization of knowledge of at least one domain of wisdom for initial viewing;

b. displaying to said user a portion of said organization of knowledge of at least one domain of wisdom according to display and delivery means;

c. estimating timings for states of product obsolescence in competitive areas;

d. providing modeling tools for competitive analysis what if value analysis;

e. providing information repository structures for managing and sharing competitive information on an access controlled basis;

f. processing zero or more environmental scanning process methodologies;

g. managing the collection of competitive data;

and h. accepting and processing a command and effecting changes therefrom, said command selected from the group of:

i. to view content of said commonplace;

ii. to add or refine content of said commonplace and effect change;

iii. to navigate around the visualization of said commonplace;

iv. to request a search for wisdom;

v. invoke a crawling task;

vi. to initiate a workflow;

vii. to initiate a methodology;

viii. to define a belief distribution function;

ix. to initiate a what if modeling;

x. to invoke repetitive searching for semi-automatically refreshing;

xi. to specify a liquidity scenario for an investment pool;

xii. to invoke procedures for protecting a cnxpt;

xiii. to invoke procedures for commercializing a cnxpt;

xiv. to show information stemming from predictions regarding an info-item;

xv. to enter a shared information collection and analysis effort;

xvi. to specify a methodology or workflow to train;

xvii. to initiate a collective;

xviii. to initiate collective information controls involving at least one of: business plans, consortium documents, company formation documents, founder profiles, consortium management information, negotiation documents, competitive company profiles, requirements of technology, application requirements, consortium product line plans, investment analysis, development progress, crowdfunding information, and associate compensation agreements;

xix. to initiate a financial transaction;

xx. to define a competitive analysis methodology;

xxi. to define a methodology instance;

xxii. to define a competitive analysis effort;

xxiii. to define a commonality determination rule, and xxiv. to define a commonality determination rule stating an enrolling of a modeling tool for competitive analysis by what if value analysis tuned to operate on said commonplace and said categorizations produced according to map generation means;

whereby a platform for examining existing, competitive products is provided to identify competitor plans, market strategies, alternatives analyses for assessing a feature change or market strategy.

185. The method of claim 1 to also extract data sets, further:

a. structuring said commonplace to extract content;

b. detailing a fxxt specification defining at least one said extraction to perform for said fxxt;

c. defining a map specifying inclusion of at least said fxxt;

d. detailing by said fxxt said commonplace by marking zero or more info-items selected from the group of: cnxpt instance, cnxpt class, association instance, association class, info-item instance, and info-items class; as members of the resulting said named derived ontology of said map;

e. interpreting said map definition to extract fxxts from said commonplace by marking cnxpt instances and association instances as members of said fxxt; and f. packaging the resulting said named derived ontology for said map as a data set.

186. The method of claim 185 to also form a categorization data set, further including:

a. detailing a map specification defining at least one said categorization;

b. generating a map instance based upon said map definition; and c. exporting said map packaged as an extract data set.

187. The method of claim 186, to determine a multi-dimension mining extraction of predetermined set of characteristics of cnxpts into a data package, further comprising:

a. executing one or more cnxpt sub-setting operations selected from the group of: a query, a reduction, a derived ontology, a fxxt extraction, a flow extraction, execution of an analytic, selection of a data set, selection of a portfolio, selection of a uniquely identified categorization, selection of a uniquely identified clump extract set, a filter application, a query in a map resulting in an area, a query in a map resulting in a result set of cnxpts, or a user ad hoc selection set of cnxpts to obtain a set of cnxpts resulting from each of said sub-setting operations wherein each said set of cnxpts defines a cube dimension for extraction into said data package;

b. forming a set of intersection identifying tuples wherein each tuple is an ordered tuple of dimensionality set by the number of dimensions obtained by said sub-setting operations and wherein each tuple is constructed by selecting one cnxpt from each set of cnxpts defining a dimension to hold a tuple position associated with the dimension identified by the order of said position in the tuple;

c. forming a subset of said intersection identifying tuples by extracting associations according to apply fxxt specification means based upon zero or more fxxt markings wherein only tuples where the cnxpts of the tuple are fully connected by said extracted associations are included in said subset of said intersection identifying tuples;

d. applying zero or more filters determining inclusion based upon characteristics of cnxpts named in a valid intersection tuple to eliminate one or more intersection identifying tuples; and e. generating a multi-dimension data package from the mining extraction results in said intersection identifying tuples according to prepare export DataSet means.

188. The method of claim 186 to also provide for providing categorization services to customers, further comprising:

a. managing a commonplace for distributing information content extracted from, and by collecting information to be added to said commonplace to and from a user;

b. initiating execution of application software information management tools forming model layer framework structures and data structures for data set cataloging, tracking provenance, controlling access, and collecting voting on veracity of data added to said commonplace;

c. ingesting a source object of said plurality of source objects into said commonplace;

d. defining at least one source object provenance authority fxxt to identify in the catalog of said commonplace said source object;

e. ingesting a plurality of info-items into said commonplace from said source object;

f. ingesting a plurality of relationships into said commonplace from said source object;

g. initiating execution of the means for categorizing said commonplace by performing map generation, and prepare at least one consensus organization of knowledge of at least one domain of wisdom from said commonplace according to utilize collective consensus through vote tallying means wherein said organization of knowledge of at least one domain of wisdom includes said source object provenance authority fxxt and also includes any additional portion of said commonplace against which categorization or comparison or curation is to occur;

h. updating said data structures for source object access control;

i. updating said data structures for source object cataloging, tracking provenance, by controlling access, by collecting voting on veracity of data;

j. extracting a data set from said commonplace according to a fxxt specification, considering state of said data structures for data set cataloging, tracking provenance, controlling access, and collected voting on veracity of data;

k. presenting extracted data sets as subject matter for other processes; and l. processing commands for controlling user interface functions and performing automated tasks resulting from user actions.

189. The method of claim 1 to ensure consistency of re-imported data, further including:

a. calculating quality corrections according to prediction correction mechanism;

whereby imported data is cross checked by comparison of result maps.

190. The method of claim 1 to also provide export of extracted data sets, further including:

a. marking said data as a part of a data offering selected from the group of: a data snippet according to mark data snippet as part of DD-DataSet, a packaged resultant-DataSet, a packaged TTX-DataSet, and a packaged Interest-DataSet; according to purchase disaggregated data set subscription means;

b. providing default and data fault mechanisms for analytic, modeling, and prediction structures to ensure that users may obtain appropriate results even if said data is unavailable;

c. presenting extracted data sets as subject matter for other application software according to local or distributed processes means;

d. informing users of availability of said granular data when said analytic, model, or prediction attempts to access it, but cannot, allowing said user to purchase said access;

e. accepting purchases of subscriptions to said data offerings according to purchase disaggregated data set subscription means;
and f. accounting for said information access transactions.

191. The method of claim 1 to obtain disaggregated data for subscription, sale, or licensing, further including:

a. accepting submissions of data for a characteristic of a txo info-item, the characteristic selected from the group of:
   i. a property of the txo according to selling value of database means;
   ii. a DD-DataSet according to create a ttx by offering data means;
   iii. a packaged TTX-DataSet according to create a ttx by offering data means;
   iv. a packaged resultant-DataSet according to create a ttx by offering data means;
   v. an Interest-DataSet according to create a ttx by offering data means;
   vi. an access right according to purchase of access right means;
   vii. a registration right according to purchase of access right means;
   viii. a methodology according to data commerce means;
   ix. an analytic according to data commerce means;
   x. a model according to data commerce means;
   xi. an execution of a methodology according to data commerce means;
   xii. an execution of an analytic according to data commerce means;
   xiii. an execution of a model according to data commerce means;
   xiv. a license according to purchase of access right means;
   xv. a subscription according to purchase of access right means;
   xvi. a common mental map system component according to purchase of access right means;
   and
   xvii. a viewing of a list of at least one dataset packages for a selected ttx element or category according to subscribe to dataset means;

b. marking said data as proprietary according to mark data as fee for use means;

c. providing default mechanism and data fault mechanism for analytic, modeling, and prediction structures to ensure that users may obtain appropriate results even if said information is unavailable;

d. controlling access to said granular data marked as fee for use to allow access only to those having purchased said subscription rights for access;

e. informing users of availability of said granular data when said analytic, model, or prediction attempts to access it, but cannot, allowing said user to purchase said access;

f. accepting purchases of subscriptions to said data offerings according to sell packaged DataSets and purchase disaggregated data set subscription means;

g. accounting for said information access and compensation transactions;
and h. providing transaction based compensation to users providing information to said commonplace based upon the accessing of said information by other users;

whereby even very small quantities of very valuable data may be added to the commonplace to be sold when used in modeling, competitive intelligence, valuing an asset, planning projects, and other needs of one or more customers; whereby disaggregated data may be submitted for sale or lease under consignment; and whereby very valuable data obtained from well placed and trusted sources may be charged to many users who share in payment to allow profitability for the source.

192. The method of claim 1 to also provide user interest collection regarding each concept, further including:

a. collecting counts of unique and secondary views of ideas represented by cnxpts and categories of ideas, the categories represented by cntexxts, by a user according to navigation based relevance and interest collection means;

b. preparing interest statistics regarding user interest shown in an idea;

c. offering predictions about the future value of metrics regarding specific concepts;

d. offering for sale said interest information;
and e. delivering said interest information;
   wherein predictions of future value are based in part on said statistics taken regarding interest shown;
   wherein data collected regarding what a user views during querying or navigation of said commonplace is made a business resource.

193. The method of claim 1, to perform operations to manage product strategy, product families, product features, product configuration, and product comparison, further including:

a. providing an organization of knowledge regarding organizations involved in products, within a domain of wisdom in said commonplace for holding and categorizing cnxpts with evolving attached descriptive information, at least one said cnxpt representing a product planning component for an entity;

b. accepting map definitions selected from the group of:
   i. defining a product management map describing the product line as a breakout from management areas;
   ii. defining a market management map describing the geography agnostic market segments as a breakout from management areas;
   iii. defining a market management map describing the geography based market segments as a breakout from management areas;
   and
   iv. defining a market competition map describing the geography agnostic market segments as a breakout from competitors;

c. accepting product related knowledge and map definitions selected from the group of:

i. providing an organization of knowledge regarding product strategies, within a domain of wisdom in said commonplace for holding and categorizing cnxpts with evolving attached descriptive information, at least one said cnxpt representing a product strategy for an entity or a product line objective, including interfaces selected from the group of:
   01. defining a product strategy map describing the components of the product strategy as a breakout from the product strategy;
   and
   02. defining a product strategy flow map describing the timing of solutions for specific applications of planned and existing products for specific market segments;
ii. providing an organization of knowledge regarding underlying technology for products, within a domain of wisdom in said commonplace for holding and categorizing cnxpts with evolving attached descriptive information, at least one said cnxpt representing a technology having zero or more features or a service having zero or more features, including interfaces selected from the group of:
   01. defining a technology strategy map describing the components of the product line as a breakout from the areas of corporate technical expertise;
   and
   02. defining a technology strategy flow map describing the timing of incorporation of technologies for specific planned and existing products;
iii. providing an organization of knowledge regarding products, within a domain of wisdom in said commonplace for holding and categorizing cnxpts with evolving attached descriptive information, at least one said cnxpt representing a product family or a product having zero or more features, including interfaces selected from the group of:
   01. defining a product features map describing the features breakout of each product;
   and
   02. providing a knowledge definition structure for differentiation between products represented by cnxpts, each such product to address an application of technology represented by an appcept, based upon fitness and effectiveness criteria regarding zero or more product features addressing an application requirement, for matching technologies represented by tcepts to appcepts and tcepts to products represented by cnxpts.
   and
iv. providing an organization of knowledge regarding applications of technologies, within a domain of wisdom in said commonplace for holding and categorizing cnxpts with evolving attached descriptive information, at least one said cnxpt representing a market need for application of technologies to solve a problem, each said need having zero or more requirements for technology or services, including interfaces selected from the group of:
   01. providing a knowledge definition structure for differentiation between applications of technologies represented by appcepts based upon requirement criteria;
   02. defining a market strategy map describing the segments of markets defined as a breakout from the areas of the product line;
   03. defining a market strategy flow map describing the timing of products addressing specific applications;
   and
   04. defining a market applications map describing the applications of technology defined as a breakout from the market segments, and the requirements for each application of technology;

d. providing product management tools selected from the group of:
   i. providing knowledge-based configurations selected from the group of:
      01. determining market segments by requirements;
      02. determining inter-company and intra-company product line comparators;
      and
      03. determining market sizes by market segment;
   ii. providing specific commonalities machine learning analytics for determining similarities between cnxpts and commonalities based on the matching of a property of one type of cnxpt to a property of another type, the analytics selected from the group of:
      01. for indicating commonalities and variabilities between concepts represented by cnxpts;
      02. for indicating commonalities and variabilities between products represented by cnxpts;
      03. for indicating commonalities and variabilities between technologies represented by cnxpts;
      and
      04. for indicating commonalities and variabilities between cnxpts representing technologies used in products and product lines for comparison of existing products by technologies used or not used in the implemented product or product line;
   iii. specifying staff work packages for information gathering actions, the work packages selected from the group of:
      01. accepting votes into maps regarding modeling information of a type selected from the group of: development stage of product, completion status, value of market, size of market, investment availability, opportunity window, critical time constraints, competitive constraints, cost of capital, source of capital, priority of development, cost of customer acquisition, cross-effect of development on other strategy elements, cross-effect and competitive effects of products at market, product bundling, externalities of products, market sizes, what-if and probabilistic estimations, constraints, assumptions, decisions made, decisions needed, issues and impacts, analysis patterns to be applied, sensitivity constraints, outcomes, alternative strategies, alternative scenarios for development or market approach, and differentiated treatment for analysis of products;
      02. accepting votes into maps regarding competitive products, competitive technologies, adjunct market opportunities, linkage between a product and technologies for the product, relationships between requirements and technology advantages, relationships between requirements and product advantages, relationships between requirements and other requirements, relationships between technology and technology alternatives, timing of technology availabilities, resource requirements and relationships between resource and technology, competitor strategies, competitor activities, assets of competitor related to strategy, and competitor product plan timing;

03. accepting refinement, by votes into maps, of modeling information and relationships regarding product roadmaps;

04. accepting descriptive information about product and market issues and solution strategies;

05. accepting descriptive information regarding appcept constraints and requirements including form factors, interfacing, quality determinations, customer behavior patterns, required performance envelopes and quality, product behavior accommodation features, and applicable regulations and standards;

06. comparing product features across products, product lines, time frames, strategies, divisions, and competitive entities;

and 07. generating zero or more surveys for obtaining specific information for analyzing product feature acceptance and user requirements;

iv. specifying analysis work packages for planning studies and management actions, the work packages selected from the group of:

01. accepting ideation;

02. accepting product issue modeling information for internal and competitor development and marketing efforts;

03. accepting planning oriented votes showing implementation and evolution of products and product lines where relationship votes indicate product feature changes made to address appcept specific requirements;

04. accepting planning oriented votes showing implementation and evolution of products and product lines where relationship votes changes in product line where feature changes cause altered product concepts and application of different tcepts;

05. accepting votes stating changes to organization of tcepts by managing component;

06. accepting votes stating changes to organization of product strategy element by managing component;

07. accepting votes stating changes to development phasing of products;

08. accepting product road map;

and 09. accepting product production plans;

e. executing continuous processing;

f. executing analytics;

g. generating defined maps;

h. performing modeling calculations to report product, company, and competitor posture against evaluation criteria for competitive strength and weakness determination;

i. calculating value changes and impact for what-if analysis of product candidates;

j. providing data sets for analytic use and reporting regarding products;

and k. generating comparative reports based upon methodologies to assist product line managers, competitive analysts, management, and investors.

194. The method of claim 1 to also provide the ability to find a classification for an idea not well defined, the method further comprising:

a. defining a map to be organized by semantic classification, wherein similar concepts are in closer proximity than dissimilar concepts;

b. generating a map instance for said map;

c. displaying the map on a first portion of the display screen, the plurality of cntexxts of the map as a network display;

d. displaying simultaneously sub-contexts of at least one context in the subset of the plurality of contexts;

e. creating a goal, stating zero or more properties of said goal, the goal representing the concept the user has in their mind or is forming, ideating, or conjuring;

f. accepting one or more user commands causing the goal to be classified into a different context identified by a cntexxt, the intent of the move being to narrow the set of contexts where said user might find the concept being conjured, the movement of the goal caused by a method selected from the group of:

i. executing a search query of said goal, the query defined or redefined by the user, the query causing movement of said goal to the cntexxt closest matching to the query results of the goal query;

and ii. navigating to traverse the goal to a next cntexxt;

g. accepting a user command indicating that the concept being conjured and represented by the goal should be within the context moved to, the meaning of the user command a response to the status of the idea in the context, the command selected from the group of:

i. as the concept is not in the located context but should be, wherein:

01. finalizing said goal by converting said goal to a cnxpt with the same properties;

02. associating said cnxpt hierarchically to the context by a hierarchical association, said cnxpt a differentiable offshoot of the context;

03. accepting a command to stake a claim for the idea the user identified, reified from the goal, and allowed to concretize;

and 04. generating, if said search goal has a result set other than of cnxpts, occurrence relationships between said cnxpt and each relevant result set item information txo or irxt found;

and ii. as the concept is in the located context represented by a cnxpt, abandon the goal, allowing the user to set properties of the found cnxpt according to those on the goal if not conflicting with existing properties in the found cnxpt;

whereby the user is given an ability to locate a context best suited to holding an idea; whereby rather than a decision tree classification the user is given the option of extending decision tree branches by locating an appropriate parent and then creating a new leaf; whereby the new cnxpt can fill white space of the parent; whereby the user is given the option to set properties of the new idea that differentiate it from the context and siblings within the context although the user may be reticent to expose the idea; and whereby the differentiation may be by timeframe where the new cnxpt should be the parent rather than the child.

195. The method of claim 1 to relate instances of an in-common info-item type having no significant differential in meaning in a specific use case, wherein:

a. defining a map to be organized by semantic classification, wherein similar concepts are in closer proximity than dissimilar concepts;

b. generating a map instance for said map;

c. integrating closeness of semantic meaning of a concept represented by a second cnxpt instance to a concept represented by a first cnxpt instance already situated in a categorization by semantic meanings, comprising:

i. accepting a choice of a metric between zero and one to be used as a threshold for combining cnxpts wherein when the threshold value is surpassed by the effective weight of a summary association info-item to be used as a determinant of entity similarity the endpoint cnxpts be considered to be representing the same entity, the summary selected from the group of:

ii. summarizing by a count the associations of one or more stated types between said first cnxpt and said second cnxpt;

iii. summarizing by a count the associations between said first cnxpt and said second cnxpt, each association marked by a default or one or more fxxts matching a parameter;

iv. summarizing weights of associations of one or more stated types between said first cnxpt and said second cnxpt;

v. summarizing weights of associations between said first cnxpt and said second cnxpt, each association marked by a default or one or more stated fxxts matching a parameter;

vi. summarizing, as a coefficient specified for the association type times the value given by a weight attribute of the association or default value, the associations between said first cnxpt and said second cnxpt, each association marked by a default or one or more stated fxxts matching a parameter according to utilize collective consensus through vote tallying means;

vii. summarizing, as a coefficient specified for the matching fxxt times the value given by a weight attribute of the association or default value, the associations between said first cnxpt and said second cnxpt, each association marked by a default or one or more stated fxxts matching a parameter according to utilize collective consensus through vote tallying means;

and viii. determining effective weights for summary associations between cnxpts summarizing all associations to be used as a determinant of entity similarity between said cnxpts of said cnxpt type according to utilize collective consensus through vote tallying means.

196. The method of claim 1, to position a first set of cnxpt instances of a first forest into a first precedence graph map orientation with respect to a second set of cnxpt instances of a second forest into a second categorization hierarchical map orientation where at least one third member cnxpt of said first set of cnxpt instances is also a member of said second set of cnxpt instances, each third member cnxpt termed an intersecting cnxpt, further comprising:

a. defining a map to be organized by semantic classification, wherein similar concepts are in closer proximity than dissimilar concepts;

b. generating a map instance for said map;

c. accepting a choice of slice level to establish a plane across said second forest for slicing said second categorization hierarchical map orientation selected from the group of:

i. no slice selected to slice at the level of the highest root of said second categorization hierarchical map;

ii. slice level selected as stated by a value translatable to an integer indicating the depth of a hierarchy level in the context of said second categorization hierarchical map, such integer is interpreted as a depth from the highest root of said second categorization hierarchical map to slice at the level in the hierarchy given by said depth from the highest root of said second categorization hierarchical map;

and iii. slice level selected for an intersecting cnxpt as stated a value translatable to an integer indicating the depth of a hierarchy level in the context of said second categorization hierarchical map, such integer interpreted as a depth from the intersecting cnxpt as the root of a subtree in said second categorization hierarchical map to establish a plane across said subtree rooted at the intersecting cnxpt in said second forest by level of hierarchy from the intersecting cnxpt;

d. accepting a choice of slice level to establish a plane across said first forest for slicing said first forest of said first precedence graph map orientation selected from the group of:

i. no slice selected to establish a plane across said first forest at the level of the earliest antecedent of said first forest of said first precedence graph map orientation;

ii. slice level selected as stated by a value translatable to an integer indicating, in the context of said first forest, the distance from the earliest antecedent as a precedence graph depth from the earliest antecedent of said first forest of said first precedence graph map orientation to establish a plane across said first forest at the level in the precedence graph given by said depth;

and iii. slice level selected as stated by a value type selected from the group of: a state of completion of a task, a state of completion of an event, a state of completion of a proof, a date, a purlieu, a location, a status, a planning horizon, an indication of a horizon with the domain of wisdom, a border between an a priori and an a posteriori event shown in said first forest, a testing point, a branch point, a time marker, a checkpoint, a serialization point, a commitment point, a dependency point, a claim in a claim tree, a split point defined by a user suitable in a specific domain of wisdom, and a value translatable to a distance from the earliest antecedent; the value a precedence graph depth from the earliest antecedent of said first forest of said first precedence graph map orientation;

e. deriving, for initial positioning only, a position of a root cnxpt in an extracted forest of extracted trees of cnxpts based on relationships of the root cnxpt with other root cnxpts;

f. determining a position for cnxpts at or above the hierarchical forest depth to place the parent of cnxpts having ancestors in the hierarchical map and all siblings of said parent to correspond with said precedence graph map orientation;

and g. determining positions and visibility of the remaining cnxpts in each orientation.

197. The method of claim 1 to also provide multiple representations of relationship structuring, further including:

a. defining a map to be organized from directed associations, wherein similar concepts are in closer proximity than dissimilar concepts;

b. creating at least one hierarchical association stating existence of a relationship between a parent info-item and a child info-item and setting positioning and sizing to connote the relative logical relationship in a map according to said map generation means, the relationship selected from the group of:

i. a first cnxpt instance marked as parent and a second cnxpt instance to indicate a type selected from the group of:

01. the first cnxpt instance as a category and the second cnxpt instance to represent a member of the category in a presentation substantially of the nature of a categorization;

02. the first cnxpt instance as a predecessor and the second cnxpt instance to represent a successor to the first cnxpt instance as representing a predecessor in a presentation substantially of the nature of a graphical network or directed graph or precedence model;

03. the first cnxpt instance as an independent event and the second cnxpt instance to represent a dependent event of the first cnxpt instance as representing an independent event in a presentation substantially of the nature of a dependency model or decision tree or conditionality presentation;

04. the first cnxpt instance as a dependent event and the second cnxpt instance to represent a dependent event of the first cnxpt instance as representing a dependent event in a presentation substantially of the nature of a dependency model or decision tree or conditionality presentation;

05. the first cnxpt instance as a predecessor task and the second cnxpt instance to represent a successor or dependent task in a presentation substantially of the nature of a project model presentation;

06. the first cnxpt instance as an independent claim and the second cnxpt instance to represent a dependent claim of the independent claim in a presentation substantially of the nature of a claim tree presentation;

07. the first cnxpt instance as a dependent claim and the second cnxpt instance to represent a dependent claim of the dependent claim in a presentation substantially of the nature of a claim tree presentation;

08. the first cnxpt instance as an authority or opinion or theory of the case or issue or doctrine or statute or law and the second cnxpt instance to represent a document or statement relying on the concept represented by the first cnxpt instance in a presentation substantially of the nature of a legal analysis;

09. the first cnxpt instance as a technology and the second cnxpt instance to represent a technology derived from the concept represented by the first cnxpt instance in a presentation substantially of the nature of a technological progression;

10. the first cnxpt instance as an application of technology and the second cnxpt instance to represent an application of technology derived from the concept represented by the first cnxpt instance in a presentation substantially of the nature of a technology requirement progression;

11. the first cnxpt instance as an assembly and the second cnxpt instance to represent a part used in the assembly in a presentation substantially of the nature of a parts breakdown or assembly diagram; and 12. the first cnxpt instance as a logical or mathematical equation and the second cnxpt instance to represent a component of the equation in a presentation substantially of the nature of a derivation presentation;

ii. a third cnxpt instance marked as parent and a fourth cnxpt class to indicate a type selected from the group of:

01. the third cnxpt instance as a category and the fourth cnxpt class to represent a member of the category in a presentation substantially of the nature of a categorization, 02. the third cnxpt instance as a category and the fourth cnxpt class to represent a class of members of the category in a presentation substantially of the nature of a categorization, 03. the third cnxpt instance as a predecessor and the fourth cnxpt class to represent a successor to the third cnxpt instance as representing a predecessor in a presentation substantially of the nature of a graphical network or directed graph or precedence model, 04. the third cnxpt instance as a predecessor and the fourth cnxpt class to represent a class of successors to the third cnxpt instance as representing a predecessor in a presentation substantially of the nature of a graphical network or directed graph or precedence model, 05. the third cnxpt instance as an independent event and the fourth cnxpt class to represent a dependent event of the third cnxpt instance as representing an independent event in a presentation substantially of the nature of a dependency model or decision tree or conditionality presentation, 06. the third cnxpt instance as an independent event and the fourth cnxpt class to represent a class of dependent events of the third cnxpt instance as representing an independent event in a presentation substantially of the nature of a dependency model or decision tree or conditionality presentation, 07. the third cnxpt instance as a dependent event and the fourth cnxpt class to represent a dependent event of the third cnxpt instance as representing a dependent event in a presentation substantially of the nature of a dependency model or decision tree or conditionality presentation, 08. the third cnxpt instance as a dependent event and the fourth cnxpt class to represent a class of dependent events of the third cnxpt instance as representing a dependent event in a presentation substantially of the nature of a dependency model or decision tree or conditionality presentation, 09. the third cnxpt instance as a predecessor task and the fourth cnxpt class to represent a successor or dependent task in a presentation substantially of the nature of a project model presentation, 10. the third cnxpt instance as a predecessor task and the fourth cnxpt class to represent a class of successor or dependent tasks in a presentation substantially of the nature of a proj ect model presentation, 11. the third cnxpt instance as an independent claim and the fourth cnxpt class to represent a dependent claim of the independent claim represented by the third cnxpt instance in a presentation substantially of the nature of a claim tree presentation,
12. the third cnxpt instance as an independent claim and the fourth cnxpt class to represent a class of dependent claims of the independent claim represented by the third cnxpt instance in a presentation substantially of the nature of a claim tree presentation,
13. the third cnxpt instance as a dependent claim and the fourth cnxpt class to represent a dependent claim of the dependent claim represented by the third cnxpt instance in a presentation substantially of the nature of a claim tree presentation,
14. the third cnxpt instance as a dependent claim and the fourth cnxpt class to represent a class of dependent claims of the dependent claim represented by the third cnxpt instance in a presentation substantially of the nature of a claim tree presentation,
15. the third cnxpt instance as an authority or opinion or theory of the case or issue or doctrine or statute or law and the fourth cnxpt class to represent a document or statement relying on the concept represented by the third cnxpt instance in a presentation substantially of the nature of a legal analysis,
16. the third cnxpt instance as an authority or opinion or theory of the case or issue or doctrine or statute or law and the fourth cnxpt class to represent a class of documents or statements relying on the concept represented by the third cnxpt instance in a presentation substantially of the nature of a legal analysis,
17. the third cnxpt instance as a technology and the fourth cnxpt class to represent a technology derived from the concept represented by the third cnxpt instance in a presentation substantially of the nature of a technological progression,
18. the third cnxpt instance as a technology and the fourth cnxpt class to represent a class of technologies derived from the concept represented by the third cnxpt instance in a presentation substantially of the nature of a technological progression,
19. the third cnxpt instance as an application of technology and the fourth cnxpt class to represent a technology derived from the concept represented by the third cnxpt instance in a presentation substantially of the nature of a technology requirement progression,
20. the third cnxpt instance as an application of technology and the fourth cnxpt class to represent a class of applications of technology derived from the concept represented by the third cnxpt instance in a presentation substantially of the nature of a technology requirement progression,
21. the third cnxpt instance as an assembly and the fourth cnxpt class to represent a part used in the assembly in a presentation substantially of the nature of a parts breakdown or assembly diagram,
22. the third cnxpt instance as an assembly and the fourth cnxpt class to represent a class of parts used in the assembly in a presentation substantially of the nature of a parts breakdown or assembly diagram,
23. the third cnxpt instance as a logical or mathematical equation and the fourth cnxpt class to represent a component of the equation in a presentation substantially of the nature of a derivation presentation,
24. the third cnxpt instance as a logical or mathematical equation and the fourth cnxpt class to represent a class of components of the equation in a presentation substantially of the nature of a derivation presentation,
25. the third cnxpt instance as a category and the fourth cnxpt class to represent a member of the category in a presentation substantially of the nature of a class-obj ect presentation, and
26. the third cnxpt instance as a category and the fourth cnxpt class to represent a class of members of the category in a presentation substantially of the nature of a class-object presentation;

iii. a fifth cnxpt class marked as parent and a sixth cnxpt instance to indicate a type;

01. the fifth cnxpt class as a category and the sixth cnxpt instance to represent a member of the category in a presentation substantially of the nature of a categorization,
02. the fifth cnxpt class as a set of categories each a member of the context within which the fifth cnxpt class is located and the sixth cnxpt instance to represent a category instance member of the class of the fifth cnxpt class also in the context within which the fifth cnxpt class is located in a presentation substantially of the nature of a categorization,
03. the fifth cnxpt class as a predecessor and the sixth cnxpt instance to represent a successor to the fifth cnxpt class as representing a predecessor in a presentation substantially of the nature of a graphical network or directed graph or precedence model,
04. the fifth cnxpt class as a set of predecessors each a successor to the predecessor represented by the context within which the fifth cnxpt class is located and the sixth cnxpt instance to represent a predecessor member of the class of the fifth cnxpt class and a successor to the predecessor if any represented by the context within which the fifth cnxpt class is located in a presentation substantially of the nature of a graphical network or directed graph or precedence model,
05. the fifth cnxpt class as an independent event and the sixth cnxpt instance to represent a dependent event of the fifth cnxpt class as representing an independent event in a presentation substantially of the nature of a dependency model or decision tree or conditionality presentation,
06. the fifth cnxpt class as a set of independent events each within the context within which the fifth cnxpt class is located and the sixth cnxpt instance to represent an independent event member of the class of the fifth cnxpt class and a dependent event within which the fifth cnxpt class is located in a presentation substantially of the nature of a dependency model or decision tree or conditionality presentation,
07. the fifth cnxpt class as a dependent event and the sixth cnxpt instance to represent a dependent event of the fifth cnxpt class as representing a dependent event in a presentation substantially of the nature of a dependency model or decision tree or conditionality presentation, 08. the fifth cnxpt class as a set of dependent events each a dependent event in the context within which the fifth cnxpt class is located and the sixth cnxpt instance to represent an independent event member of the class of the fifth cnxpt class and a dependent event within which the fifth cnxpt class is located in a presentation substantially of the nature of a dependency model or decision tree or conditionality presentation, 09. the fifth cnxpt class as a predecessor task and the sixth cnxpt instance to represent a successor or dependent task in a presentation substantially of the nature of a project model presentation, 10. the fifth cnxpt class as a set of predecessor tasks each a successor to the predecessor represented by the context within which the fifth cnxpt class is located and the sixth cnxpt instance to represent a predecessor task member of the class of the fifth cnxpt class and a successor task to any predecessor task represented by the context within which the fifth cnxpt class is located in a presentation substantially of the nature of a project model presentation, 11. the fifth cnxpt class as an independent claim and the sixth cnxpt instance to represent a dependent claim of the independent claim represented by the fifth cnxpt class in a presentation substantially of the nature of a claim tree presentation, 12. the fifth cnxpt class as a set of independent claims each in the context within which the fifth cnxpt class is located and the sixth cnxpt instance to represent an independent claim member of the class of the fifth cnxpt class and an independent claim in the context within which the fifth cnxpt class is located in a presentation substantially of the nature of a claim tree presentation, 13. the fifth cnxpt class as a dependent claim and the sixth cnxpt instance to represent a class of dependent claims of the dependent claim in a presentation substantially of the nature of a claim tree presentation, 14. the fifth cnxpt class as a set of dependent claims each in the context within which the fifth cnxpt class is located and the sixth cnxpt instance to represent a dependent claim member of the class of the fifth cnxpt class and a dependent claim in the context within which the fifth cnxpt class is located in a presentation substantially of the nature of a claim tree presentation, 15. the fifth cnxpt class as an authority or opinion or theory of the case or issue or doctrine or statute or law and the sixth cnxpt instance to represent a document or statement relying on the concept represented by the fifth cnxpt class in a presentation substantially of the nature of a legal analysis, 16. the fifth cnxpt class as a set of authorities or opinions or theories of the case or issues or doctrines or statutes or laws each in the context within which the fifth cnxpt class is located and the sixth cnxpt instance to represent a conceptual member of the class of the fifth cnxpt class and a similar typed concept relying upon the authority and within the category represented by the context within which the fifth cnxpt class is located in a presentation substantially of the nature of a legal analysis, 17. the fifth cnxpt class as a technology and the sixth cnxpt instance to represent a technology derived from the concept represented by the fifth cnxpt class in a presentation substantially of the nature of a technological progression, 18. the fifth cnxpt class as a set of technologies each in the context within which the fifth cnxpt class is located and the sixth cnxpt instance to represent a technology member of the class of the fifth cnxpt class and an offshoot of the technology if any represented by the context within which the fifth cnxpt class is located in a presentation substantially of the nature of a technological progression, 19. the fifth cnxpt class as an application of technology and the sixth cnxpt instance to represent an application of technology derived from the concept represented by the fifth cnxpt class in a presentation substantially of the nature of a technology requirement progression, 20. the fifth cnxpt class as a set of applications of technology each in the context within which the fifth cnxpt class is located and the sixth cnxpt instance to represent an application of technology member of the class of the fifth cnxpt class and an offshoot of the application of technology if any represented by the context within which the fifth cnxpt class is located in a presentation substantially of the nature of a technology requirement progression, 21. the fifth cnxpt class as an assembly and the sixth cnxpt instance to represent a part used in the assembly in a presentation substantially of the nature of a parts breakdown or assembly diagram, 22. the fifth cnxpt class as a set of assemblies each in the context within which the fifth cnxpt class is located and the sixth cnxpt instance to represent an assembly member of the class of the fifth cnxpt class and an assembly to the larger assembly if any represented by the context within which the fifth cnxpt class is located in a presentation substantially of the nature of a parts breakdown or assembly diagram, 23. the fifth cnxpt class as a logical or mathematical equation and the sixth cnxpt instance to represent a component of the equation in a presentation substantially of the nature of a derivation presentation, 24. the fifth cnxpt class as a set of logical or mathematical equations each in the context within which the fifth cnxpt class is located and the sixth cnxpt instance to represent an equation member of the class of the fifth cnxpt class and a portion of the equation if any represented by the context within which the fifth cnxpt class is located in a presentation substantially of the nature of a derivation presentation, 25. the fifth cnxpt class as a category and the sixth cnxpt instance to represent a member of the category in a presentation substantially of the nature of a class-object presentation, and 26. the fifth cnxpt class as a set of types each in the context within which the fifth cnxpt class is located and the sixth cnxpt instance to represent a type member of the class of the fifth cnxpt class and a sub-type to the type if any represented by the context within which the fifth cnxpt class is located in a presentation substantially of the nature of a class-object presentation;

and iv. the seventh cnxpt class marked as parent and the eighth cnxpt class to indicate a type selected from the group of:

01. the seventh cnxpt class as parent to indicate a class and the eighth cnxpt class to represent a sub-class in a segment of a presentation the segment substantially of the nature of a class-object presentation, 02. the seventh cnxpt class as a category and the eighth cnxpt class to represent a member of the category in a presentation substantially of the nature of a categorization, 03. the seventh cnxpt class as a set of categories each a member of the context within which the seventh cnxpt class is located and the eighth cnxpt class to represent a category member as instance of the class of the seventh cnxpt class also in the context within which the seventh cnxpt class is located in a presentation substantially of the nature of a categorization, 04. the seventh cnxpt class as a set of categories each a member of the context within which the seventh cnxpt class is located and the eighth cnxpt class to represent a category sub-class of the class of the seventh cnxpt class also in the context within which the seventh cnxpt class is located in a presentation substantially of the nature of a categorization, 05. the seventh cnxpt class as parent to indicate a class that may be considered a category and the eighth cnxpt class to represent a member of the category in a presentation substantially of the nature of a class-obj ect presentation, 06. the seventh cnxpt class as parent to indicate a class as well as a category and the eighth cnxpt class to represent a sub-class and the seventh cnxpt class to represent a member of the category in a segment of a categorization presentation the segment substantially of the nature of a class-object presentation, 07. the seventh cnxpt class as a predecessor and the eighth cnxpt class to represent a successor to the seventh cnxpt class as representing a predecessor in a presentation substantially of the nature of a graphical network or directed graph or precedence model, 08. the seventh cnxpt class as a set of predecessors each a successor to the predecessor represented by the context within which the seventh cnxpt class is located and the eighth cnxpt class to represent a predecessor member of the class of the seventh cnxpt class and a successor to the predecessor if any represented by the context within which the seventh cnxpt class is located in a presentation substantially of the nature of a graphical network or directed graph or precedence model, 09. the seventh cnxpt class as a set of predecessors each a successor to the predecessor represented by the context within which the seventh cnxpt class is located and the eighth cnxpt class to represent a sub-class of the class of the seventh cnxpt class and a successor to the predecessor if any represented by the context within which the seventh cnxpt class is located in a presentation substantially of the nature of a graphical network or directed graph or precedence model, 10. the seventh cnxpt class as a class and the eighth cnxpt class to represent a member of the class of the seventh cnxpt class as representing a predecessor in a presentation substantially of the nature of a class-object presentation, 11. the seventh cnxpt class as parent to indicate a class as well as a predecessor and the eighth cnxpt class to represent a sub-class of the predecessor and the seventh cnxpt class to represent a successor of the predecessor seventh cnxpt class in a segment of a graphical network or precedence presentation the segment substantially of the nature of a class-object presentation, 12. the seventh cnxpt class as an independent event and the eighth cnxpt class to represent a dependent event of the seventh cnxpt class as representing an independent event in a presentation substantially of the nature of a dependency model or decision tree or conditionality presentation, 13. the seventh cnxpt class as a set of independent events each within the context within which the seventh cnxpt class is located and the eighth cnxpt class to represent an independent event member of the class of the seventh cnxpt class and a dependent event within which the seventh cnxpt class is located in a presentation substantially of the nature of a dependency model or decision tree or conditionality presentation, 14. the seventh cnxpt class as a set of independent events each within the context within which the seventh cnxpt class is located and the eighth cnxpt class to represent a sub-class of the class of the seventh cnxpt class and a dependent event within which the seventh cnxpt class is located in a presentation substantially of the nature of a dependency model or decision tree or conditionality presentation, 15. the seventh cnxpt class as parent to indicate a class as well as an independent event node and the eighth cnxpt class to represent a sub-class and the seventh cnxpt class to represent a dependent event node in a segment of a dependence or conditionality presentation the segment substantially of the nature of a class-object presentation, 16. the seventh cnxpt class as a dependent event and the eighth cnxpt class to represent a dependent event of the seventh cnxpt class as representing a dependent event in a presentation substantially of the nature of a dependency model or decision tree or conditionality presentation, 17. the seventh cnxpt class as a set of dependent events each a dependent event in the context within which the seventh cnxpt class is located and the eighth cnxpt class to represent an independent event member of the class of the seventh cnxpt class and a dependent event within which the seventh cnxpt class is located in a presentation substantially of the nature of a dependency model or decision tree or conditionality presentation, 18. the seventh cnxpt class as a set of dependent events each a dependent event in the context within which the seventh cnxpt class is located and the eighth cnxpt class to represent a sub-class of the class of the seventh cnxpt class and a dependent event within which the seventh cnxpt class is located in a presentation substantially of the nature of a dependency model or decision tree or conditionality presentation, 19. the seventh cnxpt class as parent to indicate a class as well as a dependent event node and the eighth cnxpt class to represent a sub-class and the seventh cnxpt class to represent a dependent event node in a segment of a dependence or conditionality presentation the segment substantially of the nature of a class-object presentation, 20. the seventh cnxpt class as a predecessor task and the eighth cnxpt class to represent a successor or dependent task in a presentation substantially of the nature of a project model presentation, 21. the seventh cnxpt class as a set of predecessor tasks each a successor to the predecessor represented by the context within which the seventh cnxpt class is located and the eighth cnxpt class to represent a predecessor task member of the class of the seventh cnxpt class and a successor task to any predecessor task represented by the context within which the seventh cnxpt class is located in a presentation substantially of the nature of a project model presentation, 22. the seventh cnxpt class as a set of predecessor tasks each a successor to the predecessor represented by the context within which the seventh cnxpt class is located and the eighth cnxpt class to represent a sub-class of the class of the seventh cnxpt class and a successor task to any predecessor task represented by the context within which the seventh cnxpt class is located in a presentation substantially of the nature of a project model presentation, 23. the seventh cnxpt class as an independent claim and the eighth cnxpt class to represent a dependent claim of the independent claim represented by the seventh cnxpt class in a presentation substantially of the nature of a claim tree presentation, 24. the seventh cnxpt class as a set of independent claims each in the context within which the seventh cnxpt class is located and the eighth cnxpt class to represent an independent claim member of the class of the seventh cnxpt class and an independent claim in the context within which the seventh cnxpt class is located in a presentation substantially of the nature of a claim tree presentation, 25. the seventh cnxpt class as a set of independent claims each in the context within which the seventh cnxpt class is located and the eighth cnxpt class to represent a sub-class of the class of the seventh cnxpt class and an independent claim in the context within which the seventh cnxpt class is located in a presentation substantially of the nature of a claim tree presentation, 26. the seventh cnxpt class as a dependent claim and the eighth cnxpt class to represent a class of dependent claims of the dependent claim in a presentation substantially of the nature of a claim tree presentation, 27. the seventh cnxpt class as a set of dependent claims each in the context within which the seventh cnxpt class is located and the eighth cnxpt class to represent a dependent claim member of the class of the seventh cnxpt class and a dependent claim in the context within which the seventh cnxpt class is located in a presentation substantially of the nature of a claim tree presentation, 28. the seventh cnxpt class as a set of dependent claims each in the context within which the seventh cnxpt class is located and the eighth cnxpt class to represent a sub-class of the class of the seventh cnxpt class and a dependent claim in the context within which the seventh cnxpt class is located in a presentation substantially of the nature of a claim tree presentation, 29. the seventh cnxpt class as a claim preamble and the eighth cnxpt class to represent an integer of the claim of the dependent claim in a presentation substantially of the nature of a claim tree presentation, 30. the seventh cnxpt class as a Markush clause of an integer of a claim and the eighth cnxpt class to represent a sub-integer of the Markush clause of the claim in a presentation substantially of the nature of a claim tree presentation, 31. the seventh cnxpt class as an authority or opinion or theory of the case or issue or doctrine or statute or law and the eighth cnxpt class to represent a document or statement relying on the concept represented by the seventh cnxpt class in a presentation substantially of the nature of a legal analysis, 32. the seventh cnxpt class as a set of authorities or opinions or theories of the case or issues or doctrines or statutes or laws each in the context within which the seventh cnxpt class is located and the eighth cnxpt class to represent a conceptual member of the class of the seventh cnxpt class and a similar typed concept relying upon the authority and within the category represented by the context within which the seventh cnxpt class is located in a presentation substantially of the nature of a legal analysis, 33. the seventh cnxpt class as a set of authorities or opinions or theories of the case or issues or doctrines or statutes or laws each in the context within which the seventh cnxpt class is located and the eighth cnxpt class to represent a sub-class of the class of the seventh cnxpt class and a similar typed concept relying upon the authority and within the category represented by the context within which the seventh cnxpt class is located in a presentation substantially of the nature of a legal analysis, 34. the seventh cnxpt class as a statute or law and the eighth cnxpt class to represent an element of the statute or law in a presentation substantially of the nature of a legal analysis, 35. the seventh cnxpt class as a technology and the eighth cnxpt class to represent a technology derived from the concept represented by the seventh cnxpt class in a presentation substantially of the nature of a technological progression, 36. the seventh cnxpt class as a set of technologies each in the context within which the seventh cnxpt class is located and the eighth cnxpt class to represent a technology member of the class of the seventh cnxpt class and an offshoot of the technology if any represented by the context within which the seventh cnxpt class is located in a presentation substantially of the nature of a technological progression, 37. the seventh cnxpt class as a set of technologies each in the context within which the seventh cnxpt class is located and the eighth cnxpt class to represent a sub-class of the class of the seventh cnxpt class and an offshoot of the technology if any represented by the context within which the seventh cnxpt class is located in a presentation substantially of the nature of a technological progression, 38. the seventh cnxpt class as an application of technology and the eighth cnxpt class to represent an application of technology derived from the concept represented by the seventh cnxpt class in a presentation substantially of the nature of a technology requirement progression, 39. the seventh cnxpt class as a set of applications of technology each in the context within which the seventh cnxpt class is located and the eighth cnxpt class to represent an application of technology member of the class of the seventh cnxpt class and an offshoot of the application of technology if any represented by the context within which the seventh cnxpt class is located in a presentation substantially of the nature of a technology requirement progression, 40. the seventh cnxpt class as a set of applications of technology each in the context within which the seventh cnxpt class is located and the eighth cnxpt class to represent a sub-class of the class of the seventh cnxpt class and an offshoot of the application of technology if any represented by the context within which the seventh cnxpt class is located in a presentation substantially of the nature of a technology requirement progression, 41. the seventh cnxpt class as an assembly and the eighth cnxpt class to represent a part used in the assembly in a presentation substantially of the nature of a parts breakdown or assembly diagram, 42. the seventh cnxpt class as a set of assemblies each in the context within which the seventh cnxpt class is located and the eighth cnxpt class to represent an assembly member of the class of the seventh cnxpt class and an assembly to the larger assembly if any represented by the context within which the seventh cnxpt class is located in a presentation substantially of the nature of a parts breakdown or assembly diagram, 43. the seventh cnxpt class as a set of assemblies each in the context within which the seventh cnxpt class is located and the eighth cnxpt class to represent a sub-class of the class of the seventh cnxpt class and an assembly to the larger assembly if any represented by the context within which the seventh cnxpt class is located in a presentation substantially of the nature of a parts breakdown or assembly diagram, 44. the seventh cnxpt class as a logical or mathematical equation and the eighth cnxpt class to represent a component of the equation in a presentation substantially of the nature of a derivation presentation, 45. the seventh cnxpt class as a set of logical or mathematical equations each in the context within which the seventh cnxpt class is located and the eighth cnxpt class to represent an equation member of the class of the seventh cnxpt class and a portion of the equation if any represented by the context within which the seventh cnxpt class is located in a presentation substantially of the nature of a derivation presentation, 46. the seventh cnxpt class as a set of logical or mathematical equations each in the context within which the seventh cnxpt class is located and the eighth cnxpt class to represent a sub-class of the class of the seventh cnxpt class and a portion of the equation if any represented by the context within which the seventh cnxpt class is located in a presentation substantially of the nature of a derivation presentation, 47. the seventh cnxpt class as a category and the eighth cnxpt class to represent a member of the category in a presentation substantially of the nature of a class-object presentation, 48. the seventh cnxpt class as a set of types each in the context within which the seventh cnxpt class is located and the eighth cnxpt class to represent a type member of the class of the seventh cnxpt class and a sub-type to the type if any represented by the context within which the seventh cnxpt class is located in a presentation substantially of the nature of a class-object presentation, and 49. the seventh cnxpt class as a set of types each in the context within which the seventh cnxpt class is located and the eighth cnxpt class to represent a sub-class of the class of the seventh cnxpt class and a sub-type to the type if any represented by the context within which the seventh cnxpt class is located in a presentation substantially of the nature of a class-object presentation;

c. accepting navigation in a visualization of said map based upon the presence of a hierarchical association stating belief that a relationship between a parent info-item and a child info-item exists; and d. providing said information relevant to a cnxpt as a member of a category through said cnxpt.

198. The method of claim 1, to position cnxpts on a map visualization being generated, further comprising:

a. deriving a position of an initial cnxpt without children in an extracted structuring of cnxpts based on associations of the initial cnxpt with other cnxpts without children;

b. deriving a position of a parent cnxpt in an extracted structuring of cnxpts based on associations of the parent cnxpt with cnxpts selected from the group of: child cnxpt of the parent cnxpt, a nephew cnxpt of the parent cnxpt, and a sibling cnxpt of the parent cnxpt; and c. modifying the organization of knowledge of the map based on the positioning of the cnxpt.

199. The method of claim 1 to also provide for discussion specific to a narrow context within a commonplace of information, further comprising:

a. receiving a user command to request a connection with a person recently showing knowledge of concepts within a context represented by a cnxpt;

b. forming a connection with a person recently showing knowledge of concepts within a context represented by a cnxpt in one or more phases selected from the group of:

i. connection opportunity offered;
ii. connection requested;
iii. connection requested for survey completion, with optional compensation;
iv. connection fee, if any, being negotiated;
v. connection fee, if any, paid;
vi. connection offered and accepted;
vii. connection scheduled;
viii. connection in progress;
ix. connection in progress with content tracking in effect;
x. connection in progress with content tracking off;
xi. connection in progress and related to contract negotiation with content tracking in effect;
xii. connection in progress and related to contract negotiation with content tracking off;
xiii. connection in progress and being timed with content tracking in effect;
xiv. connection in progress and being timed with content tracking off;
xv. connection for tracked deliverable delivery;
xvi. connection for tracked deliverable acceptance negotiation;
xvii. connection time exhausted;
xviii. connection completed;
xix. connection content delivered; and
xx. connection content retained;

and c. accepting and processing communications related to the connection.

200. The method of claim 1 to also provide a marketplace for data related to specific concepts and sale of disaggregated data, further including:

a. accepting submissions of granular data for a property of a txo info-item according to selling value of database means;
b. marking said data as proprietary according to mark data as fee for use means;
c. marking said data as a part of a data offering according to mark data snippet as part of DD-DataSet means;
d. providing default mechanism and data fault mechanism for analytic, modeling, and prediction structures to ensure that users may obtain results even if said property information is attached to only some txo instances of the same type and so that said user has a proper understanding of the basis where data is unavailable;
e. controlling access to said granular data marked as fee for use to allow access only to those having purchased said subscription rights for access;
f. providing transaction based compensation to users providing information to said commonplace based upon the accessing of said information by other users;
g. accounting for said compensation transactions;
h. informing users of availability of said granular data when said analytic, model, or prediction attempts to access it, but cannot, allowing said user to purchase said access;
i. accepting purchases of subscriptions to said data offerings according to sell packaged TTX-DataSets and purchase disaggregated data set subscription means; and
j. accounting for said information access transactions.

201. The method of claim 1 to also provide adding a new technology innovation including staking a claim to the intellectual property, further including:

a. defining a map to be organized by technology classification, wherein similar concepts are in closer proximity than dissimilar concepts;
b. generating a map instance for said map;
c. accepting the addition of a new technology innovation idea represented by a differentiated cnxpt within the context of an existing prior technology innovation idea as narrowing the scope of the enclosing idea;

and d. accepting a user request selected from the group of:
i. to stake a claim on said new technology innovation idea by stating ownership;
ii. to add provenance information on said differentiated cnxpt;
iii. to withhold release of said differentiated cnxpt existence information;
iv. to withhold release of said differentiated cnxpt descriptive information;
v. to add further description of said new technology innovation idea represented by said differentiated cnxpt;
vi. to publish said new technology innovation idea wherein other users may retrieve information about said new technology innovation idea or view it in context;
vii. to offer said new technology innovation idea for sale;
viii. to offer said new technology innovation idea for collaborative development;
ix. to offer said new technology innovation idea for investment;
x. to seek intellectual property protection on said new technology innovation idea;
xi. to retain negotiation information and status regarding any offer pertaining to said new technology innovation idea;
xii. to retain development plans and status information regarding any efforts pertaining to said new technology innovation idea;
xiii. to constrain access to information pertaining to said new technology innovation idea;
xiv. to constrain access to particular portions of information pertaining to said new technology innovation idea;
xv. to track user interest as shown by retrieving information pertaining to said new technology innovation idea;
xvi. to accept votes regarding characterization of said new technology innovation idea;
xvii. to accept offers regarding said new technology innovation idea;
xviii. to accept information regarding said new technology innovation idea and adding said information to said differentiated cnxpt as a vote regarding said differentiated cnxpt or associated relationships, information resources or internal resources serving as information resources, or traits;
xix. to add modeling equations regarding said differentiated cnxpt;
xx. to provide or constrain access to personal information related to said new technology innovation idea's originator;
xxi. to accept categorization requests from a second user situating said differentiated cnxpt as pertinent to a category of said second user's choice as represented placement of said differentiated cnxpt within the context of the category as represented by a fourth cnxpt;
and
xxii. accepting categorization requests from a second user situating said differentiated cnxpt as pertinent to a category of said second user's choice.

202. The method of claim 1 to also provide establishing control over owned intellectual property, further comprising:
a. providing a value creation structure comprises specifying a right of some nature to one or more cnxpts, the nature selected from the group of:
i. the right of control over changes to a cnxpt;
ii. the right of control over placement changes to a cnxpt;
iii. the right to add a new cnxpt as a derivative or child of the cnxpt in any perspective;
iv. the right to add a new cnxpt as a derivative or child of the cnxpt in a specified perspective;
v. the right to read information regarding a cnxpt;
vi. the right to utilize a method of a cnxpt;
vii. the right to utilize a property of a cnxpt;
viii. the right to originate communications regarding the cnxpt representing any concept;
ix. the right to originate ownership change transactions regarding the cnxpt representing any concept;
x. the right to originate transactions regarding the cnxpt representing any concept;
xi. the right to control release of the existence of the cnxpt representing an idea;
xii. the right to control release of the existence of the cnxpt representing an idea to only those others later stating a similar idea;
xiii. the right to assign a right to the cnxpt;
xiv. the right to create a right for the cnxpt and specify the authorities and access rights of the created right;
xv. the right of ownership of the concept represented by the cnxpt;
and
xvi. the right to control release of information regarding the concept represented by the cnxpt;
b. providing a transaction based facility to track actions and to convey information regarding a valuable cnxpt, further including:
i. generating ownership rights for a first cnxpt;
ii. generating a transaction stream identity to identify a transaction stream related to the first cnxpt and authorized by ownership right granted to a first user requesting the transaction stream wherein the stream may effect communication or logging;
iii. authorizing a second user origination rights for transactions based upon ownership rights granted for the second user for the cnxpt;
iv. adding information regarding the transaction to the first transaction into the transactional data structure;
v. encapsulating for each ownership right and originating second user appropriate origination data related to the ownership right and second user and the corresponding cnxpt identity within any transactional data structure placed into the transactional stream;
and
vi. distributing the transactional data structure through the transaction stream;
and
c. providing for ownership changes regarding a cnxpt by transaction; further including:
i. detecting a second transaction that involves a change in ownership over the first cnxpt affecting a third user and a fourth user where the fourth user may substantially be a new and ill-defined party given an identity as if a user;
ii. altering as required access and transactional rights to said third user for accessing or controlling said first cnxpt and for origination transactions appropriate to the change in ownership and according to the ownership rights authorized by said second user with respect to the cnxpt and the transaction stream holding the first transaction;
and
iii. granting as required access and transactional rights to said fourth user for accessing or controlling said first cnxpt and for origination transactions appropriate to the change in ownership and according to the ownership rights authorized by said second user with respect to the cnxpt and the transaction stream holding the first transaction.

203. The method of claim 202 to also provide for registration of ownership rights, further comprising:
a. providing a value creation structure comprises a right to a cnxpt created within a cntexxt by:
i. generating ownership rights for the cnxpt within the cntexxt;
ii. encapsulating, for each ownership right, origination data related to the ownership right and the corresponding cnxpt within a transactional data structure;
iii. detecting a first transaction that involves a change in ownership over a cnxpt with respect to cntexxt;
iv. adding first transaction data related to the first transaction in the transactional data structure;
v. distributing the transactional data structure;
and
vi. granting access to a user of the cnxpt only according to the then-current ownership right with respect to cntexxt;
whereby ownership for specific use or application is delineated according to a cntexxt of a structuring of knowledge.

204. The method of claim 1 to identify conceptual differentiations, further including:
a. accepting zero or more indications of how said concretized conjuring represented by said third cnxpt is differentiable from said first concept represented by said first cntexxt represented internally by said first cnxpt;
i. accepting at least one indication of how said concept being conjured by said user is differentiable from said first concept represented by said cntexxt, the indication selected from the group of:
01. a textual entry;
02. a selection from a list of differentiation types;
03. a selection of a list of characteristics of said first concept represented by said cntexxt and also setting a differentiated value for said characteristic;
04. a selection of another cnxpt and also selecting an entry from a list of how said another cnxpt describes the differentiation of said concept being conjured by said user from said first concept represented by said cntexxt;
05. the stating of one or more words describing a differentiation type not listed;
06. the definition of a characteristic had by said concept being conjured by said user but not by said first concept represented by said cntexxt and stating a value for said characteristic;

07. citing an occurrence relevant to said concept being conjured by said user but not relevant to any other context within said first concept represented by said cntexxt;
08. citing an occurrence not relevant to said concept being conjured by said user but relevant to all other contexts within said first concept represented by said cntexxt or presently considered as relevant to said first concept represented by said cntexxt;
09. citing a relationship info-item that said concept being conjured by said user should participate in but is not participated in by any other context within said first concept represented by said cntexxt or by said first concept represented by said cntexxt;
10. citing a relationship info-item that said concept being conjured by said user should not participate in but that is participated in by all other contexts within said first concept represented by said cntexxt or presently participated in by said first concept represented by said cntexxt;
11. citing a trait held by said concept being conjured by said user but not held by any other context within said first concept represented by said cntexxt;
12. citing a trait not held by said concept being conjured by said user but held by all other contexts within said first concept represented by said cntexxt or presently considered as held by said first concept represented by said cntexxt;
13. citing a time frame relevant to said concept being conjured by said user or where said concept being conjured by said user was valid for but is not precisely the same time frame of any other context within said first concept represented by said cntexxt or no other said first concept represented by said cntexxt was valid for;
14. citing a location relevant to said concept being conjured by said user or where said concept being conjured by said user was valid for but is not precisely the same location of any other context within said first concept represented by said cntexxt or no other said first concept represented by said cntexxt was valid for;
15. citing a time frame that is not relevant to said concept being conjured by said user or during which said concept being conjured by said user was not valid but that is missing from all other contexts within said first concept represented by said cntexxt and not precisely excluded from encompassing the present time frame of said first concept represented by said cntexxt. and
16. citing a location that is not relevant to said concept being conjured by said user or during which said concept being conjured by said user was not valid but that is missing from all other contexts within said first concept represented by said cntexxt and not precisely excluded from encompassing the present location of said first concept represented by said cntexxt.

205. The method of claim 1 to ingest external wisdom, wherein:

a. providing a user interface capable of empowering a user to find external data by indicating a source given by at least one selection of the group of:
   i. a source of data in record form and a sufficient query;
   ii. a source of data to be crawled and a sufficient scoping of the crawl;
   iii. a query able to produce or refresh a result set of irxts;
   iv. a data batch of citation rich documentation;
b. processing the action requested by the user to find external data;
c. processing any newly found external data, further including:
   i. collecting information into a data set to be compared against, new information is detected and then added to said commonplace;
   ii. cataloging said data set by associating with a new fxxt said source info-item by a source relationship to assign a single fxxt to ingested information for provenance and authority control of ingested information,
   iii. broadening base of knowledge by ingesting as a source object said data set into said commonplace of knowledge;
   iv. ingesting a plurality of info-items into said commonplace;
   v. ingesting a plurality of relationship info-items into said commonplace;
   vi. ingesting a plurality of association info-items into said commonplace;
   vii. ingesting a plurality of occurrence info-items into said commonplace;
   viii. integrating said info-items directly extracted from the information in said data set into said commonplace by generating relationships between said info-items based upon relationships in said data set by connecting ingested wisdom to existing knowledge in said commonplace of knowledge;
   ix. integrating said info-items directly extracted from the information in said data set into said commonplace by generating associations between said info-items that are cnxpts based upon relationships in said data set by connecting ingested wisdom to existing knowledge in said commonplace of knowledge;
   x. cataloging, on a logical typing level, batches of external or internally held information resources or internal resources serving as information resources by said fxxt;
   xi. cataloging, on a logical grouping level, batches of external or internally held information resources or internal resources serving as information resources by irxts;
   xii. creating classification relationships between the generated categories represented by the new cnxpts and the cnxpts in the clusters;
   xiii. accepting a choice of one or more entity types selected from said commonplace or from said data set to be considered as cnxpts;
   xiv. accepting a choice of zero or more relationship info-item types to be used as propositional relationships for determining a categorization represented by hierarchical association instances from the relationship info-item types of those relationships having directionality and relating said entity types to be considered as instances of said cnxpt type either already existing within said commonplace or in said data set to prepare for categorizing and visualizing appropriate to said use case;
   xv. accepting a choice of zero or more relationship info-item types to be used as a determinant of meaning categorization as represented by hierarchical association instances from the relationship info-item types of those relationships having directionality and having one or more of said chosen term ttx instances as endpoints to be considered as instances of term ttx meaning hierarchy relationships for the purpose of similarity illustration within said commonplace;

xvi. accepting a choice of zero or more relationship info-item types to be used as a determinant of meaning categorization as represented by affinitive association instances from the relationship info-item types of those relationships to represent similarity between cnxpts within said commonplace;

xvii. generating a fxxt for the purpose of the instant similarity illustration;

xviii. computing a weighted consensus from opinions according to utilize collective consensus through vote tallying means for controlling continuous processing and managing add-in function modules to calculate consensus and impute associations;

xix. determining weights of said all associations to be used as a determinant of categorization, said relationships already existing within said commonplace are retained and weights of said added source object info-items are calculated as a coefficient specified by the user times the value given in an attribute present for said relationship info-item or a specified default value according to utilize collective consensus through vote tallying means;

xx. determining effective weights and directions for summary relationships between said cnxpts of said cnxpt type summarizing all associations to be used as a determinant of categorization between said cnxpts of said cnxpt type according to utilize collective consensus through vote tallying means;

xxi. extracting a spanning forest of cnxpts and interrelationships where each of said cnxpts of said cnxpt type are taken as categories and arranged based upon said summary relationships according to map generation means;

and xxii. forming said organization of knowledge having at least one domain of wisdom from said added wisdom, wherein any additional portion of said commonplace is included to serve as a base reference in an operation selected from the group of: a prediction, a model differentiation, a categorization, a comparison, and a curation; according to map generation means;

d. building at least one visualization for display to users based upon said organization of knowledge of at least one domain of wisdom to use as an organizing base for initial viewing;

e. learning from users the inconsistencies and redundancies in said ingested wisdom where connected to existing knowledge in said commonplace of knowledge;

f. removing knowledge exactly matching other knowledge by content;

g. accepting culling commands in manual review to categorize said source object according to concepts and contexts as represented by existing cnxpt;

h. accepting culling commands in manual review to re-prioritize said source object for further review according to pre-specified workflow rules or to remove said source object from further review or from a collection of source objects in said commonplace of information;

and i. requesting, accepting, and controlling manual review of ingested information.

206. The method of claim 1, wherein each association between a pair of cnxpts in the commonplace includes a weight indicating a strength of the association between the pair of cnxpts; wherein generating a visualization from a map is based upon combining the weights of the associations between unique cnxpt pairs wherein the associations are obtained by interpreting the definition of the map and any fxxts in the set of fxxts referenced in the map definition, further comprising:

a. accepting a command regarding a map definition from a user selected from the group of: an info-item addition command defining a new map without parameters stated, an info-item addition command defining a new map along with stated parameters, and an info-item change command refining a map definition along with stated parameters;

b. accepting with said command regarding a map definition a map identity value of type selected from the group of: a lack of value specifying to use a system generated identity, a parameter value acceptable as an identity, a form fill-in value acceptable as an identity, and a value acceptable as an identity that is acceptable to the user interface;

c. accepting with said command regarding a map definition a set of zero or more result sets;

d. accepting with said command regarding a map definition a set of zero or more temporary derived ontologies;

e. accepting with said command regarding a map definition zero or more fxxt identity values of type selected from the group of: a lack of value specifying to use a system default identity, a lack of value specifying to use a system generated identity, a lack of value specifying to use a system generated identity for the specific user defining the map, a lack of value specifying to use a system generated identity for the organization of which the user is a part, a lack of value specifying to use a system generated identity for identifying to the map search results passed as a specific parameter to the map upon map invocation, a lack of value specifying to use a system generated identity for identifying to the map search results obtained by a search query associated with a fxxt specification, a lack of value specifying to use an identity earlier specified by a user to be used as a default, a parameter value acceptable as an identity, a form fill-in value acceptable as an identity, and a value acceptable as an identity that is acceptable to the user interface;

f. accepting with said command regarding a map definition, for each fxxt included in the map definition, zero or one fxxt weighting coefficient indicating a proportionality of impact value indicating a strength of consideration of associations that are marked by the fxxt listed in the map definition, each value of type selected from the group of: a lack of value specifying to use a previously set value already displayed, a lack of value specifying to use a system default value of 1, a lack of value specifying to use a system default value other than 1, a parameter value, a form fill-in value acceptable as a coefficient value, and a value acceptable as a coefficient value that is acceptable to the user interface;

g. accepting with said command regarding a map definition, for each fxxt included in the map definition, zero or one fxxt weighting coefficient indicating a proportionality of impact value indicating an importance of consideration of cnxpts that are marked by the fxxt listed in the map definition or serve as endpoints of associations that are marked by the fxxt listed in the map definition, each value of type selected from the group of: a lack of value specifying to use a previously set value already displayed, a lack of value specifying to use a system default value of one, a lack of value specifying to use a system default value other than 1, a parameter value, a form fill-in value acceptable as a coefficient value, and a value acceptable as a coefficient value that is acceptable to the user interface;

h. accepting with said command regarding a map definition zero or more parameters of a type selected from the group of: display name, display title, access rights, mode settings, custom settings, extension settings, comments, general-association-acceptance-for-affinities mode indication, extract-classes mode indication, expand-classes mode indication, extract-uninstantiated-classes mode indication, explode-able-classes mode indication, treat-as-trigger-able indication, info-item type inclusion parameter, trigger-able-during-forest-extraction mode indication, trigger-able-after-forest-extraction mode indication, and fxxt-free mode indication;

whereby a map definition prescribing a set of fxxt specifications used in an extraction process for extracting a set of cnxpt instances and association instances from a commonplace is specified; whereby generating the visualization from the map organization of knowledge utilizes a combination, calculated pairwise by unique cnxpt pair, of the weights of the associations that are marked by fxxts in the set of fxxts listed in the map definition.

207. The method of claim 1 to rationalize terms, further including:

a. accepting a choice of one or more of said new term ttx instances or said existing term ttx instances for meaning similarity illustration;

b. marking said choices of said term ttx instances as cnxpts for the purpose of similarity illustration;

c. marking a plurality of instances of affinity associations and term ttx meaning hierarchical associations having one or more of said chosen term ttx instances as endpoints as having a fxxt for the purpose of the instant similarity illustration;

d. marking a plurality of cnxpts serving as endpoints of affinity associations and term ttx meaning hierarchical associations marked with said fxxt for the purpose of the instant similarity illustration to also belong to said fxxt for the purpose of the instant similarity illustration;

e. broadening the illustration of similarity, to a predetermined degree of association info-item distance by including into said fxxt additional instances of affinity associations and term ttx meaning hierarchical associations having one or more of said marked term cnxpts as endpoints and marking said instances of affinity associations and term ttx meaning hierarchical associations as having said fxxt for the purpose of the instant similarity illustration, and then marking a plurality of cnxpts serving as endpoints of said newly marked associations as also having said fxxt for the purpose of the instant similarity illustration;

f. determining effective weights and directions for summary associations to be used as a determinant of categorization between cnxpts of said cnxpt type according to utilize collective consensus through vote tallying means;

and g. illustrating effective term similarity by positioning of terms.

208. The method of claim 1 to also provide assisted resource serving, further including:

a. defining a map to be organized by semantic classification, wherein similar concepts are in closer proximity than dissimilar concepts;

b. generating a map instance for said map;

c. invoking a metasearch interceptor software analytic to catch relevant search results from one or more search tools during a user query according to finding, searching, query and retrieval means and according to goal based searching means;

d. forming a query for submission to said search tools;

e. forming a goal if said query is a first query toward said goal;

f. adding said query to said goal if query is a continuation of searching of said goal;

g. obtaining from said user's returned result of said query one or more locators for an information resource or internal resource serving as an information resource from one or more heterogeneous repositories;

h. obtaining said information resource or internal resource serving as an information resource's metadata from a heterogeneous repository location provided by said locator;

i. creating, for an information resource or internal resource serving as an information resource not already related to an irxt, a new irxt info-item into said commonplace for each collected information resource or internal resource serving as an information resource and setting its properties to have said locator and said metadata of said information resource or internal resource serving as an information resource as values to indicate the characteristics of said information resource or internal resource serving as an information resource as defined by said information resource or internal resource serving as an information resource's metadata to obtain an index to said information resource or internal resource serving as an information resource according to import collateral information resource means, or internal resource serving as an information resource, or according to enter information resource for a ttx means to enter information resource or internal resource serving as an information resource for a ttx, and according to create irxt means;

j. forming a result set for said query for said goal according to result set processes means and according to create result set means;

k. forming an rsxitem representing said information resource or internal resource serving as an information resource in said result set for said query for said goal according to result set processes means and according to create result set means;

l. accepting a result set as chosen for culling by user by choice of a query, search, goal, cnxpt, or crawl result that formed said result set;

m. generating a visualization of the list of rsxitems of said result set providing a culling perspective according to extract and generate ordering for taxonomy from result set for culling means, using a chosen fxxt if set;

n. presenting said rsxitem's said information resource or internal resource serving as an information resource's content to user by de-referencing said locator;

o. accepting culling commands on said result set rsxitems according to result set processes means to obtain an assessment by user of the propriety of said rsxitem to said result set as a measure of the relevance of an rsxitem primarily to the ttx in his mind and secondarily to said query, or search having said result set;

p. summarizing said result set into query independent result set for goal, setting summarized relevance rankings according to result set conversion to properties, occurrences, and categorizations means;

and q. determining a plurality of cntexxts in said map that said search goal could be associated with by comparing said search results with relevant information of existing cnxpts in said map to reposition said goal according to said result set into the best cntexxt according to result set evaluation for positioning means.

209. The method of claim 1 to also provide characterizations of law by jurisdiction in legal research by weighted categorization, further comprising:

a. accepting at least one characterization selected from the group of:

i. a first jurisdiction's law or opinion relative to a second jurisdiction as good law, with zero or more citations to opinions of said second jurisdiction wherein said zero or more citations to statutory proceedings or legislative history regarding laws or court opinions of said second jurisdiction would have described the reasoning specifically regarding said first jurisdiction's law or opinion if it had been considered because said law or opinion of said second jurisdiction addressed a similar issue or sub-issue as said first jurisdiction's law or opinion;

ii. a case as a cnxpt representing said case as a cntexxt, said cnxpt having zero or more characteristics, properties, purlieu, and traits;

iii. a secondary source as an occurrence of a cnxpt representing the issue or sub-issue for which the source is relevant;

iv. a theory of a case as a cnxpt representing said case's theory as a cntexxt, said cnxpt having zero or more characteristics, properties, purlieu, and traits;

v. a fact as a cnxpt representing said fact as a cntexxt, said cnxpt having zero or more characteristics, properties, purlieu, and traits, said cntexxt a member of the cntexxt representing the fact set of the case;

vi. an element or sub-element of law as a cnxpt representing said element or sub-element of law as a cntexxt, said cnxpt having zero or more characteristics, properties, purlieu, and traits;

vii. evidence available for proving facts as a cnxpt representing said evidence as a concept of a cntexxt, said cnxpt having zero or more characteristics, properties, purlieu, and traits, said cnxpt having occurrences referencing physical objects or files of an electronic nature said objects or said files being actual evidence;

viii. a party as a cnxpt representing said party, said cnxpt having zero or more characteristics, properties, purlieu, and traits;

ix. an involved other person as a cnxpt representing said other person, said cnxpt having zero or more characteristics, properties, purlieu, and traits;

x. a case's status or a docket entry as a cnxpt representing said case's status as a cntexxt, said cnxpt having zero or more characteristics, properties, purlieu, and traits, said cnxpt having occurrences referencing physical objects or files of an electronic nature said objects or said files being presentation material or other objects, children of said cnxpt as representatives, as mere examples said representatives selected from the group of: material for presentation, foundation information, stipulations, theories to be addressed, specific issues, specific precedent, specific testimony, specific persuasive material, objections, specific witnesses, matters to raise, documents to file, negotiation material, discussion material, tactical or strategic plans, statutes, legislative history information, receipts, court procedures and rules, appellate strategies, issues to preserve, pictures, recordings, movies, helpful multimedia, transcripts, indices by issue, citations, citatory results, descriptions of doctrine, treatments of elements or sub-elements of law, treatments of issues or sub-issues of doctrine or the case, notes, electronic files for presentation, status material, responsible team members, accounting information, concerns, deposition preparation, discovery material, prior court opinions, status on law of the case rulings, rebuttal information, rebuttal presentations, police reports, expert opinions, affidavits, probation reports, administrative rulings, helpful documents, helpful material, helpful contact information, helpful collaborative status information, counter-strategies expected of opponent, and variations of orderings of presentation for specific circumstances;

xi. a case issue as a cnxpt representing said case issue as a cntexxt, said cnxpt having zero or more characteristics, properties, purlieu, and traits;

xii. a concept as a cnxpt representing said concept as a cntexxt, said cnxpt having zero or more characteristics, properties, purlieu, and traits, said concept selected from the group of: presentation sections, foundation information groups, stipulation topics, theories to be addressed, specific issues, specific precedent, specific testimony topics, specific persuasive material topics, objections, specific witnesses, matters to raise, document groupings by purpose, filing outlines, negotiation outlines, discussion outlines, tactical or strategic plans, concepts shown by statute, receipt pockets, topics regarding court procedures and rules, appellate strategies by issue, issues to preserve, groupings of pictures, recordings, movies, or other multi-media, xiii. the concept of a set of zero or more documents or physical objects or files of an electronic nature as a cnxpt representing said concept as a cntexxt, said cnxpt having zero or more characteristics, properties, purlieu, and traits, said cnxpt having occurrences referencing objects of the nature of said zero or more documents or physical objects or files of an electronic nature, mere examples of said objects selected from the group of: material for presentation, foundation information, stipulations, documents regarding theories to be addressed, documents regarding specific issues, documents regarding specific precedent, documents regarding specific testimony, specific persuasive material, documents regarding objections, documents regarding specific people or organizations, documents regarding objections, documents regarding specific witnesses, documents regarding matters to raise, documents to file, negotiation material, discussion material, documents regarding tactical or strategic plans, documents regarding statutes, documents regarding legislative history information, receipts, court procedures and rules, documents regarding appellate strategies, documents regarding issues to preserve, pictures, recordings, movies, helpful multi-media, transcripts, indices by issue, citations and digests, citatory results, descriptions of doctrine, documents regarding treatments of elements or sub-elements of law, documents regarding treatments of issues or sub-issues of doctrine or the case, notes, electronic files for presentation, documents regarding status material, documents regarding responsible team members, documents regarding accounting information, documents regarding concerns, deposition preparation materials, discovery material, prior court opinions, documents regarding status on law of the case rulings, documents regarding rebuttal information, rebuttal presentations, police reports, documents regarding expert opinions, affidavits, probation reports, administrative rulings, helpful documents, helpful material, helpful contact information material, helpful collaborative status information material, documents regarding counter-strategies expected of opponent, and documents regarding variations of orderings of presentation for specific circumstances;

xiv. a litigant's objective as a cnxpt representing said litigant's objective as a cntexxt, said cnxpt having zero or more characteristics, properties, purlieu, and traits;

xv. an attorney presentation outline for a case as a cnxpt representing said attorney presentation outline as a cntexxt, said cnxpt having zero or more characteristics, properties, purlieu, and traits;

xvi. the status of a statute or regulation, indicating whether they have been amended or repealed as a cnxpt representing said status of a statute or regulation as a cntexxt, said cnxpt having zero or more characteristics, properties, purlieu, and traits; and xvii. a position based upon any legal issue or sub-issue being researched as a cntexxt, said cnxpt having zero or more characteristics, properties, purlieu, and traits;

and b. generating an organization of knowledge and visualization of map providing cross-indices of at least one item selected from the group of: by issue, citation topics, doctrinal topics, elements or sub-elements of law, issues or sub-issues of doctrine or the case, notes by topic, groupings for files, groupings for statuses, groupings for responsibilities, groupings for files accounting information, concerns, groupings for files depositions, discovery topics, groupings for prior court opinions, groupings for topics regarding status on law of the case rulings, groupings for rebuttal information, groupings for rebuttal presentations, groupings for police reports, expert opinion topics, groupings for affidavits, groupings for probation reports, groupings for administrative rulings, groupings for contact information, groupings for collaborative status information, groupings for counter-strategies expected of opponent, and groupings for orderings of presentation for specific circumstances.

210. The method of claim 1 to also provide a managed commonplace of legal information for research and legal discovery, further comprising:

a. providing an organization of knowledge regarding legal matters, within a domain of wisdom in said commonplace for holding and categorizing cnxpts with evolving attached descriptive information, at least one said cnxpt representing a legal issue;

b. providing an organization of knowledge regarding law, within a domain of wisdom in said commonplace for holding and categorizing cnxpts with evolving attached descriptive information, at least one said cnxpt representing an element or sub-element of a law;

c. providing an organization of knowledge regarding people and organizations, within a domain of wisdom in said commonplace for holding and categorizing cnxpts with evolving attached descriptive information, at least one said cnxpt representing a person or an entity;

d. providing an organization of knowledge regarding purported evidence, within a domain of wisdom in said commonplace for holding and categorizing cnxpts with evolving attached descriptive information, at least one said cnxpt representing a piece of evidence real or desired to prove a theory;

e. providing an organization of knowledge regarding events, within a domain of wisdom in said commonplace for holding and categorizing cnxpts with evolving attached descriptive information, at least one said cnxpt representing an event capable of having a timeframe and a location involved;

f. loading of said commonplace with structural information defining a knowledge model;

g. providing task management and document management analytics for controlling workflows, determining scheduling based upon workflow priorities, and suggesting task assignments;

h. ingesting a plurality of source objects;

i. initiating continuous extraction of each source object's identity, descriptive information, origination, and provenance meta-data to generate a source info-item with attached descriptive information, said type of source object selected from the group of: an info-item from an external commonplace, a concept represented by a cnxpt from an external commonplace, data set, meta-data, file, information resource, statement, communication, template, legal decision, docket, story, transcript, and document; said source info-item to be used as the authority control base for said source obj ect and related to a new fxxt by a source relationship, said fxxt termed a source object provenance authority fxxt;

j initiating continuous extraction, for each source object that is a structured data set having data set elements, of all data set elements of said source object selected from the group of: table description, entity type description, column description, attribute description, relationship info-item type descriptive information, table procedure description, object method description, and data rule description; to generate, for each, a concept represented by a cnxpt with attached descriptive information from said data set elements, said cnxpt to be used as a curation control base, said cnxpt termed a source data description authority cnxpt, wherein all instances of said source data description authority cnxpts are assigned a single fxxt related to said source object provenance authority fxxt;

k. initiating continuous extraction, for each source object that is a structured data set having data set elements, of all data rule descriptions of said source obj ect to generate, for each, a concept represented by a cnxpt with attached descriptive information, said cnxpt to be used as curation reference base, said cnxpt termed a source data rule authority cnxpt;

l. initiating continuous extraction, for each source object that is unstructured data, of all descriptive elements of said source object selected from the group of: object meta-data, citation, page description, foot or end note, volume title, section title, chapter title, bookmark, section text, page text, type description, definition, index entry, table of contents entry, author, editor, table, figure, character, precedent, quotation, topic, issue, finding, opinion, and description; to generate, for each, a concept represented by a cnxpt with attached descriptive information from said descriptive elements, said cnxpt to be used as a curation control base, said cnxpt termed a source data description authority cnxpt, wherein all instances of said source data description authority cnxpts are assigned a single fxxt related to said source object provenance authority fxxt;

m. initiating continuous extraction, for each source object that is unstructured data, a cited information resource irxt info-item for any information resource not existing in said commonplace of information;

n. initiating continuous extraction of topical elements from said source object, said topical element selected from the group of: term, timeframe, thing, feature, link, status, originator, event, party, participant, person, owner, address, location, organization, reviewer, rule, object, relationship info-item description, type identity, law, citation, claim, belief, strategy, concern, position, document characterization, communication, communication meta-data property, law, fact, statement, opinion, issue, case, docket entry, story, theory, semantic token, name, statement, precedent, attribute, identity, evidentiary item description, concept, context, classification category, meta-data value, and other description; each said topical element to be used as a base for deriving commonalty and similarity scores for said source object, wherein a cnxpt is created for each unique element extracted, said cnxpt termed a coding key cnxpt, wherein all instances of said coding key cnxpt of a type are assigned a single fxxt based upon said source object provenance authority fxxt and the type of coding key;

o. determining relevance of said source object to a search objective stated as a search query specification step wherein said source object is a result set item in a search result set;

p. determining pertinence of said source object for a domain of wisdom extraction objective stated as a fxxt specification step wherein said source object is an info-item of any type applicable to said fxxt specification step;

q. determining pertinence of said source object for a prioritization rule of a methodology workflow specification step wherein said source object is an info-item of any type applicable to said methodology workflow specification step;

r. determining pertinence of said source object for an alert generation rule of an alert specification wherein said source object is an info-item of any type applicable to said alert specification generation rule;

s. initiating execution of the means for categorizing said commonplace by performing map generation, wherein a computer performs management of said commonplace, and prepares at least one consensus organization of knowledge of at least one domain of wisdom from said commonplace according to utilize collective consensus through vote tallying means wherein said organization of knowledge of at least one domain of wisdom includes said source object provenance authority fxxt and also includes any additional portion of said commonplace against which categorization or comparison or curation is to occur;

t. building at least one map instance and visualization for display to users based upon said organization of knowledge of at least one domain of wisdom to use as an organizing base for initial viewing;

u. displaying to said user a portion of said commonplace is displayed according to display and delivery means;

v. initiating requests for action, with attached description of action, to a user according to methodology workflow specification step;

w. initiating alerts, with attached description, to a user according to an alert specification generation rule;

x. initiating methodologies according to said methodology templates;

y. initiating workflows according to said workflow templates;

z. providing search query procedure templates for searching for source objects to determine relevance;

aa. providing concept and source object information templates for searching for and reviewing source objects to determine relevance;

bb. providing methodology and workflow templates for project management of searching for and reviewing source objects to determine relevance to a stated meaning or issue;

cc. providing prediction analytics establishing commonalty and similarity scores for source objects;

dd. computing a predicted weighted ranking of a source object likely relevance to a coding key cnxpt as specified;

ee. computing a predicted weighted rejection ranking of a source objects according to rules for rejection as irrelevant or privileged;

ff. accepting data rule descriptions as concepts represented by cnxpts with attached descriptive information, said cnxpts to be used as curation reference bases, said cnxpts termed source data rule authority cnxpts;

gg. accepting culling commands in manual review to categorize source objects according to said concepts and contexts as represented by cnxpts;

hh. accepting culling commands in manual review to re-prioritize source objects for further review according to specified workflow rules or to remove them from further review or from collection of source objects in commonplace of information;

and ii. accepting and processing a user command and effecting changes therefrom, said user command selected from the group of:

i. to view content of said commonplace;

ii. to add or refine content of said commonplace and effecting change;

iii. to navigate around a visualization of said commonplace;

iv. to request a search for wisdom;

v. to enter a fxxt specification involving extraction by meta-data and search queries to meet criteria for project;

vi. to accept a workflow task;

vii. to specify search query specifications, workflow task assignment and document passing specifics to meet criteria for project;

viii. to initiate operation of data extraction, document management, and prediction analytics;

ix. to initiate continuing retrieval of source objects based on the criteria according to search query specifications;

x. to establish a commonplace of information for the purposes of a specific dispute or matter, termed a discovery preparation set;

xi. to ingest into said discovery preparation set commonplace of information a source object set;

xii. to grant access to a source object to a different user for the purposes of a specific dispute or matter, the accumulation of said grants termed a discovery production set;

xiii. to categorize source objects into workflow contexts;

xiv. to allocate resources according to specified workflow rules for assignment or workflow rules for task acceptance;

xv. to refine search query specifications, categorizations, and priorities for review;

xvi. to specify relevance prediction weightings;

xvii. to notify a supervisory level regarding a source object's importance;

xviii. to specify details for workflow structure and categorizations by establishing contexts for work tasks represented by cnxpts and workflow transitions represented by relationships to meet criteria for project;

xix. to alter a workflow based upon quality checks produced by workflow and methodology;

xx. to alter a workflow based upon review of metrics produced by workflow and methodology;

xxi. to generate a report or data set of the data set catalog, provenance, production cost, and consensus regarding relevance weights of said discovery preparation set or said discovery production set;

and xxii. to generate an extract data set of said discovery production set.

211. The method of claim 1 to also provide determining of categorization quality of dissection for ingesting against an exemplar, further including:

a. updating the consensus organization of each comparison categorization from said commonplace augmented by all info-items generated from said plurality of members of a returned set of information each a source object suggesting a meaning according to utilize collective consensus through vote tallying means;

b. determining a proper placement of said dissection cnxpt in each said comparison categorization augmented by all info-items generated from said plurality of members of a returned set of information each a source object suggesting a meaning according to map generation means, wherein if a predetermined system setting is set to a first predetermined value said map generation does not alter the positioning of cnxpts existing before performing a search resulting in plurality of members of a returned set, wherein if a predetermined system setting is set to a second predetermined value said map generation does alter the positioning of cnxpts existing before performing a search resulting in plurality of members of a returned set;

c. determining a normalized relevance score for relevance of said dissection concept represented by a dissection cnxpt to each said basis cnxpt, from a predefined formula to compute a sum across all said comparison categorizations wherein a predetermined coefficient based upon the comparison categorization is multiplied against a factor determined from the distance in said comparison categorization of the placement of said dissection cnxpt against each basis cnxpt in a vicinity of a predetermined size from said dissection cnxpt, said relevance score is attached to said binding point info-item for each said derived source object suggesting a meaning for said dissection concept represented by a dissection cnxpt;

d. determining a cumulative relevance score for each said result set item info-item by summing all said relevance scores attached to said binding point info-items for each said derived source object suggesting a meaning stemming from said dissecting of said source object suggesting a meaning;

e. determining, optionally, a normalized value for each said cumulative relevance score for said result set;

f. assigning the order property of each created result set item info-item in said result set to a value converted from said relevance strength assigned wherein the most relevant rsxitems will be sorted to appear at the top of a result set display for culling;

g. making said result set active for culling by displaying result set in an editable format;

h. defining a map to be organized by a classification, wherein similar concepts are in closer proximity than dissimilar concepts;

i. generating a map instance for said map;

and j. calculating quality corrections according to prediction correction mechanism, wherein:

i. determining, as a first error metric value, the lack of quality of a positioning of cnxpts in a scope of a positioning of at least one of: over all cnxpts, all cnxpts at a level, or all cnxpts within a category by determining the cumulative total of distances for said cnxpts in a scope of a positioning, by centroids, from an exemplar cnxpt positioning for the same cnxpt if both the positioned map and the exemplar contain the same cnxpt;

ii. determining, as an additional error metric value, the lack of quality of fxxt inclusion by the difference between the total number of cnxpts in the exemplar and the number of cnxpts of the map that match cnxpts in the exemplar, divided by the number of cnxpts in the exemplar;

iii. determining, as an additional error metric value, the lack of quality of a positioning of non-cnxpts in a scope of a positioning of at least one of: over all non-cnxpts, all non-cnxpts at a level, or all non-cnxpts within a category by determining the cumulative total of distances for said non-cnxpts in a scope of a positioning, by centroids, from an exemplar non-cnxpt positioning for the same non-cnxpt if both the positioned map and the exemplar contain the same non-cnxpt;

iv. determining, as an additional error metric value, the lack of quality of a structuring of cnxpts by averaging the differences between the total number of cnxpts in the exemplar for the level having depth j from the root and the number of cnxpts of the map at depth j from the root that match cnxpts in the exemplar for depth j from the root, divided by the number of cnxpts in the exemplar for the level at depth j from the root, for all j less than or equal to the greatest depth for which an exemplar is available;

v. determining, as an additional error metric value, the lack of quality of a modeling result against an expected value as stated by an exemplar for that result;

and vi. summing, with predetermined coefficient values for each error metric as a cost function, the error metric values as multiplied by the coefficients, to obtain the amount of correct structure present in the more optimal but lost in the present codebook exemplar data as represented by the totaled cost of the error.

212. The method of claim 1, to determine whether improvement of recommendation scoring is needed based upon the measurement of quality of recommended choices against actual choices by comparison to an exemplar, further including:

a. generating a map instance from a map definition given a domain of wisdom to form a positioned organization of knowledge by the generation, encompassing recommendations regarding the importance to the user of cnxpts organization of knowledge by positioning the principal children centrally in the context defined by the cntexxt represented by the parent cnxpt of the children, by sizing cnxpts by their importance, and by providing other indicators to speed the user's review of the material shown in the map instance;

b. generating, as a pre-viewing exemplar of the map, zero or more recommendation score estimate tuples for each first cnxpt in the map, wherein each recommended action tuple comprises: the action, the identifier of a second cnxpt visited or subject to an action or null, a type descriptor for the second cnxpt or null, the identifier of the first cnxpt, a type descriptor for the first cnxpt, an ordinal number n, and the estimated conditional likelihood that the second cnxpt would be found to be at least tied as the nth best choice of a next destination cnxpt to visit in the map by an intended audience for the recommendation given prior choices leading to the visit of the first cnxpt; wherein the likelihood that such a navigation from the first cnxpt to the second cnxpt would occur in use of the map instance is greater than a pre-set parameter value, the estimated conditional likelihood computed from the recommender algorithm for the map, a type descriptor comprising a tuple of zero or more characteristics for a cnxpt that the recommender is trained to consider, the navigation or action of a type selected from the group of:

i. the first cnxpt a parent of the second cnxpt;

ii. the second cnxpt a parent of the first cnxpt;

iii. the first cnxpt a parent ancestor cnxpt of the second cnxpt;

iv. the second cnxpt a parent ancestor cnxpt of the first cnxpt;

v. the first cnxpt an uncle of the second cnxpt;

vi. the second cnxpt an uncle of the first cnxpt;

vii. the first cnxpt a sibling of the second cnxpt;

viii. the first cnxpt a cousin of the second cnxpt;

ix. the first cnxpt having a type matching, by its properties at the time of the visit to the second cnxpt, a first type descriptor that the recommender is trained to consider and the second cnxpt having a type matching, by its properties at the time of the visit to the second cnxpt a second type descriptor that the recommender is trained to consider, for a pre-established set of scenarios regarding the properties of the first cnxpt and the second cnxpt;

x. an action taken at the first cnxpt that affects the second cnxpt other than navigation to the second cnxpt;

and xi. an action taken at the first cnxpt other than navigation to a second cnxpt;

c. accepting, as post-viewing actuals, during user accessing of the map instance, a plurality of statistical samplings, each sample a choice of a navigation by a user from a first cnxpt to a second cnxpt, the choice with the knowledge that a recommendation was available and indicated for a navigation from the first cnxpt under similar conditions in the organization of knowledge, wherein for convenience the samples as tuples comprising: the identifier of the second cnxpt, the type descriptor of the first cnxpt at the time of the visit to the second cnxpt, the identifier of a first cnxpt, the type descriptor of the second cnxpt at the time of the visit to the second cnxpt, the count of possible next choices at the time that the second cnxpt was chosen, a history with k entries giving the last k cnxpts visited prior to the second cnxpt and their type descriptors at the time of the visit to the second cnxpt, where k is a pre-set parameter value;

d. determining, based upon the data collected, per recommendation and for all recommendations overall, the lack of quality of the set of recommendations of cnxpts by the likelihood that the choices actually made for actions or navigation to next cnxpts under presence of an indication of recommendation were commensurate with the estimated likelihoods of the exemplar, taken over all cnxpts scored, to estimate the amount of error in the recommender calculations in the pre-viewing estimation, the determining based upon combined results of application of multiple tests, the tests applied to data collected of a type selected from the group of:

i. the position of the cnxpt in the positioned organization of knowledge of the map instance to provide an approximate matching by distance;

ii. the extended tracking histories for indicating navigation order from a first cnxpt;

iii. the discrete, recommender defined, pre-tagged characteristics for cnxpts visited;

iv. the important actions taken when visiting a cnxpt; and v. the basic statistics of counts of matches of visiting sequence from a first cnxpt to a second cnxpt;

and e. altering the basis of recommender scoring calculation by a change of a metric, said metric chosen from the list of: a coefficient applied in the calculation of a component structure of said organization of knowledge, a weight applied to a user's or analytic's generated votes, a weight applied to a user's interest shown by navigating or actions taken, a weight applied to the interest shown by similar users by navigating or actions taken, the set of users considered similar to said user, a weight applied to a calculation for determining the set of users considered similar to said user, an authoritativeness weight applied to the rankings of users or analytics voting or showing interest by navigating or taking action, a length or importance metric applied to periods used for calculation based upon navigating or taking action that are based upon time periods or volumes, a coefficient applied to the interest shown metrics for navigating or taking action collected from a fxxt where multiple organizations of knowledge are used for prediction of likelihood of action by cnxpt, a weight applied to a specific commonality term importance in forming the basis for analytic based generation of imputed relationship info-items, a weight applied to a set of commonality terms for importance in forming the basis for analytic based generation of imputed relationship info-items where the terms are grouped by language, locale, dialect, technical field, source, provenance, purpose, or formality, and a weight applied to a type of imputed relationship info-item from said commonality determinations; to improve the quality of recommendations for the organization of knowledge;

whereby the recommendations as embodied in the positioning and sizing of the cnxpts for a map may prove to be wrong based upon one or more users' actual behavior of visiting cnxpts and would not be improved if it was left to the users to proactively change positions or sizing; whereby the user's behavior of visiting cnxpts is used to improve algorithms as well as for generating interest votes; whereby the user's past behavior of visiting cnxpts is compared to similar decisions made by other users; whereby the past behavior of like users visiting cnxpts based upon a series of discrete, pre-tagged characteristics of a cnxpt navigated to given a series of discrete, pre-tagged characteristics of a cnxpt being navigated from is used as a basis to determine quality of recommendations of navigation destinations; whereby the model based technique provides the structure for inclusion of effects of combining knowledge from one or more added domains of knowledge encompassed by other connected maps; and whereby the quality at each level of a hierarchical recommender may be calculated and quality corrections may be made to the prediction correction modeling mechanism.

213. The method of claim 1 to also provide ingesting of relevant information, further comprising:

a. defining a map to be organized by a classification, wherein similar concepts are in closer proximity than dissimilar concepts;
b. generating a map instance for said map;
c. forming at least one organization of knowledge having at least one concept, said concept termed a basis concept represented by a basis cnxpt, said basis cnxpt also representing a cntexxt representing a context;
d. ingesting a first document to be referenced by said commonplace by forming at least one binding point for said first document, each said binding point created as a first cnxpt termed a dissection cnxpt;
e. dissecting said first document into a plurality of parsed parts resulting from one or more analytics, ingesting the plurality of parsed parts by forming at least one binding point for each of the plurality of parsed parts, each said binding point for each of the plurality of parsed parts created as an additional dissection cnxpt;
f. registering text of each of the plurality of parsed parts into the commonalities of said commonplace as a comparator token with a reference connection to said first document, said reference connection given a predetermined weight;
g. imputing association info-items from said commonalities;
h. updating a consensus of the associations connected to one or more dissection cnxpts in said commonplace as augmented by all associations generated from said plurality of documents and said dissection cnxpts, according to utilize collective consensus through vote tallying means;
i. performing map generation for each said at least one organization of knowledge including said augmented info-items to position the plurality of cnxpts based upon the updated said consensus of said commonplace as augmented according to map generation means, each specific member of the set of said at least one organization of knowledge including said augmented info-items termed a comparison map;
j. determining a normalized relevance score for relevance for each loaded document to each second said basis cnxpt, including all documents from prior loadings if any, further including:
   i. determining a disaggregated normalized relevance score for relevance of a third differentiated concept represented by a third dissection cnxpt stemming from a first document in a vicinity of said second basis cnxpt by normalizing the result of a determination from the distance in said comparison map from the center of the placement of said third dissection cnxpt to the center of said second basis cnxpt if the distance is less than a predetermined size based upon the size of the map visualization, normalizing across all such disaggregated normalized relevance scores for relevance of a differentiated concept, each such score termed a new load disaggregated scoring;
   ii. determining a disaggregated normalized relevance score for relevance of each fourth document from any prior loading as reflected in relevance score listed for a result set item indicating said forth document in a result set attached to said second basis cnxpt if any, normalizing across all such scores, each such score termed an old load disaggregated scoring by fourth document;
   iii. determining a combined disaggregated normalized relevance score for relevance of said first documents from a predefined formula to compute a sum across all said comparison maps and said first document in regard to said second basis cnxpt, by summing all fifth old load disaggregated scorings regarding said second basis cnxpt wherein said fifth old load disaggregated scoring involves a dissection cnxpt stemming from said first document, each such score termed a new load aggregated scoring by first document;
   iv. determining a combined aggregated normalized relevance score for relevance of said first and fourth documents from a predefined formula to compute a sum across all said comparison maps and said first and fourth documents in regard said second basis cnxpt, by summing a factor computed by multiplying a predetermined first coefficient for new loads times said new load aggregated scoring by first document for said first document and said second basis cnxpt and adding a factor computed by multiplying a predetermined fourth coefficient for old loads times said old load disaggregated scoring by fourth document for said fourth document and said second basis cnxpt and adding, if said first document is the same as said fourth document, the factors, normalizing all such combined aggregated normalized relevance scores for, if a predetermined system parameter is set to a predetermined value, said second basis cnxpt, or, if said predetermined system parameter is not set to said predetermined value, all such combined aggregated normalized relevance scores, said score termed a normalized document relevance for a document-cnxpt pair;

v. creating, if the normalized document relevance for a document-cnxpt pair involving said first document and said second basis cnxpt is greater than a predetermined value and no result set item exists for said first document and said second basis cnxpt, a result set item in a result set attached to said second basis cnxpt referencing said first document and having a relevance score equal to said combined aggregated normalized relevance score involving said first document and said second basis cnxpt, or assigning, if the normalized document relevance for a document-cnxpt pair involving said first or fourth document and said second basis cnxpt exists and a result set item exists for said first or fourth document and said second basis cnxpt, to the result set item in a result set attached to said second basis cnxpt referencing said first or fourth document a relevance score equal to said combined aggregated normalized relevance score involving said first or fourth document and said second basis cnxpt;

and vi. reordering said result set items of said result set attached to said second basis cnxpt according to said result set item relevance scores;

k. delivering to said user for review a result set for said search associated with said cnxpt of a user's choice listing links to documents listed as result set items potentially satisfying said user's actual intended search requirements;

l. accepting zero or more culling commands from said user wherein one of said documents is viewed, deleted, marked as relevant, or selected for navigation, or reordered in the result set attached to said cnxpt of a user's choice;

and m. assigning a new relevancy score and order for said user of said one of said documents based upon the culling command entered by said user wherein a deletion command causes a value representing not relevant no matter when entered and will override any prior command for said document, a coding of relevant causes a value representing relevant, a viewing causes a value representing possibly relevant, a relevance vote is recorded stating the final relevance values for said user for said cnxpt of a user's choice replacing his prior relevance votes for said cnxpt of a user's choice, a navigation command causes no change in the relevance score but causes a finalization of a relevance vote for said user and said cnxpt of a user's choice.

214. The method of claim 1 to control the process of ingesting knowledge, wherein:

a. accepting a request to discover data source objects existing in or external to an organization of a type selected from the group of:

b. accepting a request to locate and ingest a data source object existing in or external to an organization of a type selected from the group of:

i. structured data from a data base;

ii. structured data from a data set;

iii. unstructured information resource web page from the internet;

iv. unstructured information resource file from a file system;

v. unstructured information resource document from a document store of files containing electronically encoded documents;

vi. structured data of a collection of unstructured data; and vii. unstructured information resource document electronically encoded from a scanning operation;

c. ingesting said source object by an operation selected from the group of:

i. registering said source object provenance, registering definition of structure of structured data in said source object, and ingesting data of said structured data in said source object;

ii. registering said source object provenance, registering definition of structure of structured data in said source object wherein said source object is a collection of information resources, and ingesting information resources of said structured data in said source object;

and iii. registering said source object provenance, and ingesting information resource wherein said source object is an information resources;

d. registering said source object's provenance by extraction of each source object's identity, descriptive information, origination, and provenance meta-data to generate a source info-item in said commonplace with attached provenance cataloging descriptive information; said type of source object selected from the group of: an info-item from an external commonplace, a concept represented by a cnxpt from an external commonplace, data set, meta-data, file, information resource, statement, communication, template, legal decision, docket, story, transcript, physical object, artifact, electronic object, custom object, and document; said source info-item to be used as the authority control base for said source object; said provenance cataloging information stating at least one identifying fact selected from the group of: a unique identification of said source object, where said source object resides, who is responsible for said source object, said source object's purpose, said source object's trustworthiness, custom predefined combination of information regarding source object, and said source object's format; said source info-item termed a source object provenance authority source info-item;

e. creating a fxxt info-item in said commonplace to represent the provenance of the source object, setting its authority, usability, quality, and expertise of originator, said fxxt termed a source object provenance authority fxxt;

f. adding a source relationship info-item from said source object provenance authority fxxt to said source info-item to be used as the authority control base for said source object;

g. generating, if a predetermined system parameter is set to a predetermined value: a first irxt to represent as an information resource said data source obj ect; said first irxt given an identity indicator value from a predetermined combination of said source info-item properties; said first irxt filled with properties selected from the group of: said source object's authority, said source object's usability, said source object's quality, and expertise of originator; said first irxt to reference said source object provenance authority source info-item of said data source object; assigning to said first irxt representing said information resource said source object provenance authority fxxt; said first irxt termed a source object provenance authority irxt;

h. generating, if a predetermined system parameter is set to a predetermined value: a first cnxpt to represent the concept of the data set as defined by the purpose of the source object or the description of said source object; an occurrence attached to said first cnxpt; a relationship info-item of a predetermined weight based between said occurrence and said source object provenance authority irxt; said first cnxpt given at least one identity indicator value resulting from a predetermined formulation of a value from the descriptive information of said source obj ect; said first cnxpt given properties filled by a predetermined set of elements selected from the group of: said source object's authority and descriptive information; said generated occurrence of said first cnxpt related to said first irxt; said cnxpt assigned said source object provenance authority fxxt if said fxxt is not already assigned to said cnxpt; said first cnxpt termed a source object level cnxpt;

i. converting said source object's data format to the format required for ingesting;

j converting said source object's data element's format to the format of a commonplace info-item of a predetermined equivalent type;

k. generating, if said source object contains one or more structured data set tables of the nature of rows of identifiable entity instances with identifiable associated attributes and if a predetermined system parameter is set to a predetermined value, for each table in the set: a second irxt to represent as an information resource said table: said second irxt given an identity indicator value resulting from a predetermined formulation of a value from elements selected from the group of: a name generated from the descriptive information of said source object, and the descriptive information of said table; said second irxt given properties filled by a predetermined set of elements selected from the group of: said table's identity, the descriptive information of said table, said source object's authority, usability, quality, row identity, and expertise of originator, and said source object's descriptive information; each said second irxt to reference said source object provenance authority source info-item, wherein a part-of relationship info-item of a predetermined type and of a predetermined weight is generated between said second irxt and said source object provenance authority irxt if existing, each said second irxt assigned said source object provenance authority fxxt if said fxxt is not already assigned to said second irxt, said second irxt termed a source data table information resource irxt;

l. generating, if said source object contains one or more structured data set tables of the nature of rows of identifiable entity instances with identifiable associated attributes, for each table in the set: a new concept represented by a second cnxpt with attached descriptive information from said table's description; an occurrence attached to said second cnxpt; a relationship info-item of a predetermined type and of a predetermined weight between said occurrence and said source object provenance authority irxt;

wherein: said second cnxpt given an identity indicator value resulting from a predetermined formulation of a value from elements selected from the group of: a name generated from the descriptive information of said table, the descriptive information of said source object, and the descriptive information of said table; said second cnxpt given properties filled by a predetermined set of elements selected from the group of: the descriptive information of said table and said source object's authority and descriptive information; wherein a child to parent relationship info-item of a predetermined type and of a predetermined weight is generated between said second cnxpt and said source object level cnxpt if existing; wherein an additional occurrence is attached to said second cnxpt if said source data table information resource irxt exists for said table and a predetermined system parameter is set to a predetermined value, a relationship info-item of a predetermined weight is also formed between said additional occurrence and said source data table information resource irxt if existing; said second cnxpt assigned said source object provenance authority fxxt if said fxxt is not already assigned to said second cnxpt; said second cnxpt to be used as a curation control base for said table; said second cnxpt termed a source data table description authority cnxpt;

m. generating, if said source object contains one or more structured data set tables for which a second source data table description authority cnxpt was generated and if a predetermined system parameter is set to a predetermined value, for each table and each of said table's columns of the nature of an entity's attributes; a fourth cnxpt to represent the attribute of the entity of said data set table; an occurrence attached to said fourth cnxpt; a relationship info-item of a predetermined weight between said occurrence and said source object provenance authority irxt; said fourth cnxpt given an identity indicator value resulting from a predetermined formulation of a value from elements selected from the group of: a name generated from the descriptive information of said table, the descriptive information of said source object, said table identity indicator and unique identity indicators of said attribute, and the descriptive information of said attribute of the entity of said data set table; said fourth cnxpt given properties filled by a predetermined set of elements selected from the group of: the descriptive information of said table and said source object's authority and descriptive information, the descriptive information of said attribute of the entity of said data set table; wherein a child to parent relationship info-item of a predetermined type and of a predetermined weight based upon the number of references found of said information resource in said table is generated between said fourth cnxpt and said source data table description authority cnxpt if existing, or otherwise to said source object level cnxpt if existing, said relationship info-item of a predetermined weight assigned said source object provenance authority fxxt if said fxxt is not already assigned to said relationship info-item; wherein an additional occurrence is attached to said fourth cnxpt if said source data table information resource irxt exists for said table and a predetermined system parameter is set to a predetermined value, a relationship info-item of a predetermined weight based upon the number of references found of said information resource in said table is also formed between said additional occurrence and said source data table information resource irxt if existing; said fourth cnxpt assigned said source object provenance authority fxxt if said fxxt is not already assigned to said fourth cnxpt; said fourth cnxpt to be used as a curation control base for said attribute of the entity of said data set table; said fourth cnxpt termed a source data table column description authority cnxpt;

n. generating, if said source object contains one or more structured data set tables for which a second source data table description authority cnxpt was generated and if a predetermined system parameter is set to a predetermined value, for each data set table row of the nature of an instance of an entity with attributes; a fifth irxt to represent as an information resource said table row; said fifth irxt given an identity indicator value resulting from a predetermined formulation of a value from elements selected from the group of: a name generated from the descriptive information of said table, the descriptive information of said source object, the descriptive information of said table, said table's identity indicator and unique identity indicators of said data set table row; said fifth irxt given properties filled by a predetermined set of elements selected from the group of: said source object's authority, usability, quality, expertise of originator, row identity, said table identity indicator, and unique identity indicators of said data set table row; each said fifth irxt to reference said source object provenance authority source info-item; wherein a part-of relationship info-item of a predetermined type and of a predetermined weight is generated between said fifth irxt and said source object provenance authority irxt if existing; wherein a part-of relationship info-item of a predetermined type and of a predetermined weight is generated between said fifth irxt and said source data table information resource irxt for said table if existing, said relationship info-item assigned said source object provenance authority fxxt if said fxxt is not already assigned to said relationship info-item; each said fifth irxt assigned said source object provenance authority fxxt if said fxxt is not already assigned to said fifth irxt; said fifth irxt termed a source data table row information resource irxt;

o. generating, if said source object contains one or more structured data set tables for which a second source data table description authority cnxpt was generated, for each table and each of said table's data set table rows of the nature of an instance of an entity with attributes; a fifth cnxpt to represent the instance of the entity of said data set table row; an occurrence attached to said fifth cnxpt; a relationship info-item of a predetermined weight is generated between said occurrence and said source object provenance authority irxt; said fifth cnxpt given an identity indicator value resulting from a predetermined formulation of a value from elements selected from the group of: said table identity indicator and unique identity indicators of said data set table row; said fifth cnxpt given properties filled by a predetermined set of elements selected from the group of: the descriptive information of said table, said source object's authority and descriptive information and the attribute values of said data set table row; wherein a child to parent relationship info-item of a predetermined type and predetermined weight is generated between said fifth cnxpt and said source data table description authority cnxpt if existing, or otherwise to said source object level cnxpt if existing; wherein an additional occurrence is attached to said fifth cnxpt if said source data table information resource irxt exists for said table and a predetermined system parameter is set to a predetermined value, a relationship info-item of a predetermined weight based upon the number of references found of said information resource in said table is also formed between said additional occurrence and said source data table information resource irxt if existing; wherein an additional occurrence is attached to said fifth cnxpt if said source data table row information resource irxt exists for said table row and a predetermined system parameter is set to a predetermined value, a relationship info-item of a predetermined weight based upon the number of references found of said information resource in said table row is also formed between said additional occurrence and said source data table row information resource irxt if existing; wherein each attribute of said data set table row is translated into a characteristic of predetermined type for said fifth cnxpt;

wherein an irxt termed an enclosed information resource irxt is generated for each attribute of said data set table row that is an information resource; forming a part-of relationship info-item of a predetermined type and of a predetermined weight between said enclosed information resource irxt and said source object provenance authority irxt if existing; forming a part-of relationship info-item of a predetermined type and of a predetermined weight based upon the number of references found of said information resource in said table, between said enclosed information resource irxt and said source data table information resource irxt for said table if existing; forming a part-of relationship info-item of a predetermined type and of a predetermined weight based upon the number of references found of said information resource in said table row between said enclosed information resource irxt and said source data table row information resource irxt for said table if existing; marking said enclosed information resource irxt by the identity of said provenance authority fxxt if said fxxt is not already assigned to said enclosed information resource irxt;

wherein all info-items generated from said source object are assigned said source object provenance authority fxxt, and; if a predetermined system parameter is set to a predetermined value, said information resource is stored outside of said commonplace rather than as a property of said fifth cnxpt;

wherein each relationship between said data set table row as identified by an attribute containing a foreign key reference to a different data set table row in the data set is translated into a new relationship info-item of predetermined type and predetermined weight and like directionality between said fifth cnxpt and the cnxpt stemming from said different data set table row replacing any considered relationship of endpoint count greater than two by an equivalent set of relationship info-items having an endpoint count of two, marking said relationship info-item by the identity of said provenance authority fxxt if said fxxt is not already assigned to said relationship info-item, all info-items generated from said source object are assigned said source object provenance authority fxxt;

wherein each citation in said data set table row as identified by an attribute containing an identifiable citation selected from the group of: standard citation, non-standard but identifiable citation, uniform resource locator, case citation, international standard book number, other cross reference, and link identifiable as a citation; wherein a predetermined system parameter is set to a predetermined value and no irxt has been generated for the information resource cited, generate a tenth irxt to represent said information resource cited, said tenth irxt given an identity indicator value resulting from a predetermined formulation of a value from elements selected from the group of: a name generated from the descriptive information of said source object, and the descriptive information of said information resource in said identifiable citation; said tenth irxt given properties filled by a predetermined set of elements selected from the group of: said information resource's identity, said source object's authority, usability, quality, and expertise of originator, said identifiable citation, and said information resource's descriptive information; each said tenth irxt to reference said source object provenance authority source info-item, wherein a citing relationship info-item of a predetermined type of a predetermined weight is generated between said tenth irxt and said source object provenance authority irxt if existing, each said tenth irxt assigned said source object provenance authority fxxt if said fxxt is not already assigned to said tenth irxt, said tenth irxt termed a cited information resource irxt; wherein an additional occurrence is attached to said fifth cnxpt, wherein a relationship info-item of predetermined type and predetermined weight is also formed between said additional occurrence and said cited information resource irxt, marking said relationship info-item by the identity of said provenance authority fxxt if said fxxt is not already assigned to said relationship info-item, all info-items generated from said source object are assigned said source object provenance authority fxxt; said fifth cnxpt assigned said source object provenance authority fxxt if said fxxt is not already assigned to said fifth cnxpt; said fifth cnxpt to be used as a curation control base for said table row; said fifth cnxpt to represent the concept represented by said table row; said fifth cnxpt termed a source data table row description authority cnxpt;

p. generating, if said source object contains one or more structured data set containing name value pairs or a serialized structure of hierarchical name value pairs where names are given by markup and values are in content or tag value pairs, collectively termed name value pairs, for each such name value pair: a seventh cnxpt to represent said name value pair; an occurrence attached to said seventh cnxpt; a relationship info-item between said occurrence and said source object provenance authority irxt; said seventh cnxpt given an identity indicator value resulting from a predetermined formulation of a value from elements selected from the group of: said source object identity indicator and unique identity indicators of said name value pair, accommodating multiple instances of name value pairs having the same name; said seventh cnxpt given properties filled by a predetermined set of elements selected from the group of: the descriptive information of said source object's authority and descriptive information and the value of said name value pair; wherein a child to parent relationship info-item of a predetermined type and predetermined weight is generated between said seventh cnxpt and said source object level cnxpt if existing; wherein each said name value pair value of said source object data set is translated into a characteristic of predetermined type for said seventh cnxpt;
   wherein a irxt termed an enclosed information resource irxt is generated for each value of said name value pair that is an information resource; forming a part-of relationship info-item of a predetermined type and of a predetermined weight between said enclosed information resource irxt and said source object provenance authority irxt if existing; and marking said enclosed information resource irxt by the identity of said provenance authority fxxt if said fxxt is not already assigned to said enclosed information resource irxt;
   wherein all info-items generated from said source object are assigned said source object provenance authority fxxt, and; if a predetermined system parameter is set to a predetermined value, said information resource is stored outside of said commonplace rather than as a property of said cnxpt;
   wherein each relationship between said name value pair as identified by a value containing a foreign key reference to a different name value pair in the data set is translated into a new relationship info-item of predetermined type and predetermined weight and like directionality between said seventh cnxpt and the cnxpt stemming from said different name value pair, marking said relationship info-item by the identity of said provenance authority fxxt if said fxxt is not already assigned to said relationship info-item, all info-items generated from said source object are assigned said source object provenance authority fxxt; said seventh cnxpt assigned said source object provenance authority fxxt if said fxxt is not already assigned to said seventh cnxpt; said seventh cnxpt to be used as a curation control base for said name value pair; said seventh cnxpt to represent the concept represented by said name value pair; said seventh cnxpt termed a source data name value pair description authority cnxpt;

q. generating, if said source object contains one or more unstructured data set elements of the nature of information resource and if a predetermined system parameter is set to a predetermined value, for each information resource in the set for which an eighth irxt to represent said information resource has been generated previously; if a predetermined system parameter is set to a predetermined value, an update of said irxt to note a found source, different location, version, or content difference; each said eighth irxt to additionally reference said source object provenance authority source info-item; wherein a part-of relationship info-item of a predetermined type and of a predetermined weight is generated between said eighth irxt and said source object provenance authority irxt if said source object provenance authority irxt exists and if no such relationship info-item already exists between said eighth irxt and said source object provenance authority irxt; each said eighth irxt assigned said source object provenance authority fxxt if said fxxt is not already assigned to said eighth irxt; said eighth irxt termed an enclosed information resource irxt;

r. generating, if said source object contains one or more unstructured data set elements of the nature of information resource and if a predetermined system parameter is set to a predetermined value, for each information resource in the set for which no irxt has been generated an eighth irxt to represent said information resource said eighth irxt given an identity indicator value resulting from a predetermined formulation of a value from elements selected from the group of: a name generated from the descriptive information of said source object, and the descriptive information of said information resource; said eighth irxt given properties filled by a predetermined set of elements selected from the group of: said information resource's identity, said source object's authority, usability, quality, and expertise of originator, citation, uniform resource locator, international standard book number, and said information resource's descriptive information; each said eighth irxt to reference said source object provenance authority source info-item; wherein a part-of relationship info-item of a predetermined type and of a predetermined weight is generated between said eighth irxt and said source object provenance authority irxt if existing; each said eighth irxt assigned said source object provenance authority fxxt if said fxxt is not already assigned to said eighth irxt; said eighth irxt termed an enclosed information resource irxt;

s. generating, if said source object contains one or more unstructured data information resources for which an enclosed information resource irxt was generated or previously existed, for each such enclosed information resource in the set for which an eighth cnxpt to represent the concept embodied in said enclosed information resource was previously generated an occurrence attached to said eighth cnxpt; a relationship info-item of a predetermined weight between said occurrence and said source object provenance authority irxt; said eighth cnxpt given additional properties filled by a predetermined set of elements from the descriptive information of said source object's authority; wherein, if no such equal relationship info-item exists, a child to parent relationship info-item of a predetermined type and predetermined weight is generated between said eighth cnxpt and said source object level cnxpt if existing; wherein, if no such equal relationship info-item exists and if said enclosed information resource was within a table, a child to parent relationship info-item of a predetermined type and predetermined weight is generated between said eighth cnxpt and said source data table description authority cnxpt if existing; wherein, if no such equal relationship info-item exists and if said enclosed information resource was within a table row, a child to parent relationship info-item of a predetermined type and predetermined weight is generated between said eighth cnxpt and said source data table row description authority cnxpt if existing; said eighth cnxpt assigned said source object provenance authority fxxt if said fxxt is not already assigned to said eighth cnxpt; said eighth cnxpt to be used as a curation control base for said enclosed information resource; said eighth cnxpt to represent the concept represented by said enclosed information resource; said eighth cnxpt termed a source data enclosed information resource description authority cnxpt;

t. generating, if said source object contains one or more unstructured data information resources for which an enclosed information resource irxt was generated or previously existed, for each such enclosed information resource in the set for which no cnxpt has been generated an eighth cnxpt to represent the concept embodied in said enclosed information resource; an occurrence attached to said eighth cnxpt; a relationship info-item of a predetermined weight between said occurrence and said source object provenance authority irxt; an additional occurrence attached to said eighth cnxpt; a relationship info-item of a predetermined weight between said additional occurrence and said enclosed information resource irxt; said eighth cnxpt given an identity indicator value resulting from a predetermined formulation of a value from elements selected from the group of: said source object identity indicator and unique identity indicators of said enclosed information resource, accommodating multiple instances of enclosed information resources having the same name; said eighth cnxpt given properties filled by a predetermined set of elements selected from the group of: the descriptive information of said source object's authority, a citation, and descriptive information of said enclosed information resource; wherein a child to parent relationship info-item of a predetermined type and predetermined weight is generated between said eighth cnxpt and said source object level cnxpt if existing; wherein, if said enclosed information resource was within a table, a child to parent relationship info-item of a predetermined type and predetermined weight is generated between said eighth cnxpt and said source data table description authority cnxpt if existing; wherein, if said enclosed information resource was within a table row, a child to parent relationship info-item of a predetermined type and predetermined weight is generated between said eighth cnxpt and said source data table row description authority cnxpt if existing; said eighth cnxpt assigned said source object provenance authority fxxt if said fxxt is not already assigned to said eighth cnxpt; said eighth cnxpt to be used as a curation control base for said enclosed information resource; said eighth cnxpt to represent the concept represented by said enclosed information resource; said eighth cnxpt termed a source data enclosed information resource description authority cnxpt;

u. generating, if said source object contains one or more structured data set tables of the nature of rows of identifiable entity instances with identifiable associated attributes and if a predetermined system parameter is set to a predetermined value, for each data rule in the set a ninth irxt to represent as an information resource said data rule said ninth irxt given an identity indicator value resulting from a predetermined formulation of a value from elements selected from the group of: a name generated from the descriptive information of said source object, and the descriptive information of said data rule; said ninth irxt given properties filled by a predetermined set of elements selected from the group of: said data rule's identity, the descriptive information of said data rule, said source object's authority, usability, quality, row identity, and expertise of originator, and said source object's descriptive information; each said ninth irxt to reference said source object provenance authority source info-item; wherein a part-of relationship info-item of a predetermined type and of a predetermined weight is generated between said ninth irxt and said source object provenance authority irxt if existing; each said ninth irxt assigned said source object provenance authority fxxt if said fxxt is not already assigned to said ninth irxt; said ninth irxt termed a source data rule information resource irxt;

v. extracting, if said source object is a structured data set having data set elements, all data rule descriptions of said source object to generate, for each a concept represented by a ninth cnxpt to represent said data rule, and an occurrence attached to said ninth cnxpt; a relationship info-item of a predetermined weight between said occurrence and said source object provenance authority irxt; said ninth cnxpt given an identity indicator value resulting from a predetermined formulation of a value from elements selected from the group of: said source object identity indicator and unique identity indicators of said data rule, accommodating multiple instances of data rules having the same name; said ninth cnxpt given properties filled by a predetermined set of elements selected from the group of: the descriptive information of said source object's authority and descriptive information of said data rule; wherein a child to parent relationship info-item of a predetermined type and predetermined weight is generated between said ninth cnxpt and said source object level cnxpt if existing; wherein an additional occurrence is attached to said ninth cnxpt if said source data rule information resource irxt exists for said data rule and a predetermined system parameter is set to a predetermined value, a relationship info-item of a predetermined weight is also formed between said additional occurrence and said source data rule information resource irxt if existing; wherein each said data rule of said source object data set is translated into a characteristic of predetermined type for said ninth cnxpt;

wherein for each entity or table said data rule references a new constraint relationship info-item of predetermined type and predetermined weight is formed between said ninth cnxpt as child and the cnxpt stemming from said entity or table as parent if one exists, marking said relationship info-item by the identity of said provenance authority fxxt if said fxxt is not already assigned to said relationship info-item, all info-items generated from said source object are assigned said source object provenance authority fxxt, termed an enclosed information resource irxt is generated for each value of said data rule that is an information resource;

wherein for each column or attribute said data rule references a new constraint relationship info-item of predetermined type and predetermined weight is formed between said ninth cnxpt as child and the cnxpt stemming from said column or attribute as parent if one exists, marking said relationship info-item by the identity of said provenance authority fxxt if said fxxt is not already assigned to said relationship info-item, all info-items generated from said source object are assigned said source object provenance authority fxxt, termed an enclosed information resource irxt is generated for each value of said data rule that is an information resource; said ninth cnxpt assigned said source object provenance authority fxxt if said fxxt is not already assigned to said ninth cnxpt; said ninth cnxpt to be used as a curation reference base for said data rule; said ninth cnxpt to represent the concept represented by said data rule; said ninth cnxpt termed a source data rule authority cnxpt;

w. generating, if said source object contains one or more unstructured data information resources for which an enclosed information resource irxt was generated or previously existed; for each such enclosed information resource in the set for which an identifiable citation exists that has not been extracted, extracting, for each un-extracted identifiable citation selected from the group of: standard citation, non-standard but identifiable citation, uniform resource locator, case citation, international standard book number, other cross reference, and link identifiable as a citation;

wherein a predetermined system parameter is set to a predetermined value and no irxt has been generated for the information resource cited, generate an eleventh irxt to represent said information resource cited; said eleventh irxt given an identity indicator value resulting from a predetermined formulation of a value from elements selected from the group of: a name generated from the descriptive information of said source object, and the descriptive information of said information resource in said identifiable citation; said eleventh irxt given properties filled by a predetermined set of elements selected from the group of: said information resource's identity, said source object's authority, usability, quality, and expertise of originator, said identifiable citation, and said information resource's descriptive information; each said eleventh irxt to reference said source object provenance authority source info-item; wherein a citing relationship info-item of a predetermined type and of a predetermined weight based upon the number of references found of said element in said information resource is generated between said eleventh irxt and said source object provenance authority irxt if existing; each said eleventh irxt assigned said source object provenance authority fxxt if said fxxt is not already assigned to said eleventh irxt; said eleventh irxt termed a cited information resource irxt;

x. generating a citing irxt-irxt relationship info-item of a predetermined type and of a predetermined weight based upon the number of references found of said element in said information resource between said enclosed information resource irxt and said eleventh irxt, marking said relationship info-item by the identity of said provenance authority fxxt if said fxxt is not already assigned to said relationship info-item;

y. imputing zero or more citing relationship info-items, said citing relationship info-items given a value of one or more types selected from the group of: a predetermined type, a custom type, a selected type, a predetermined weight, a custom weight, a selected weight, a weight based upon the number of references found of said element in said information resource, a directionality between a citing source data enclosed information resource description authority cnxpt and a cited source data enclosed information resource description authority cnxpt according to imputation means, and a marking of said new citation relationship info-item by the identity of said provenance authority fxxt if said fxxt is not already assigned to said new citation relationship info-item;

z. generating, if said source object contains one or more enclosed information resources represented by an enclosed information resource irxt, a twelfth cnxpt to represent the topic for each identifiable topical element from said enclosed information resource, if no such cnxpt exists, or updating an existing twelfth cnxpt for said identifiable topical element; said topical element selected from the group of: word, phrase, string, time, purlieu, location, semantic feature, link, relationships to common target, locations in external categorizations, provenance, authority, element of law, jurisdiction, common context, title, data set name, table name, entity name, attribute name, section title, account, accounts payable item, accounts receivable item, address, agreement, answer, asset, attribute, author, bank, belief, benefits, bookmark, budget item, case, chapter title, character, citation, claim, classification category, communication, communication meta-data property, compensation, concept, concern, concordance entry, contact, context, cost, definition, description, diary entry, docket entry, document characterization, editor, endnote, estimate, event, evidentiary item description, expense, fact, figure, finding, footnote, goods, group, human resource, identity, index entry, informal citation, inventory control, inventory issuance, invoice, issue, journal entry, law, location, logistical detail, managed relationship, meaning, meta-data value, name, object, object meta-data, open question, opinion, orders, organization, originator, owner, page description, page text, participant, party, payroll, performance rating, person, position, precedent, prediction, price, products, project, projection, quality rating, quotation, quote, receipt, relationship description, request for information, request for proposal, requirement, reviewer, role, routing, rule, section text, section title, semantic token, service, shipment, shipping document, skill, statement, story, strategy, table, table of authorities entry, table of contents entry, table of figures entry, task, theory, thing, duration, equation, outcome, prediction, note, problem, reference, ordering, period, color, size, explicit differentiation, usage, proportion, assembly, subassembly, texture, pattern, instruction, placement, time, to do item, descriptive element, topic, type description, type identity, volume title, work effort, work requirement, and other descriptive term; each said topical element to be used as a base for deriving commonalty and similarity scores for said source object; and attaching an occurrence to said twelfth cnxpt, generating a relationship info-item of a predetermined weight between said occurrence and said source object provenance authority irxt of a predetermined weight based upon the number of references found of said element in said information resource; said twelfth cnxpt given an identity indicator value resulting from a predetermined formulation of a value from elements selected from the group of: said element type, said element name, said information resource identity indicator, said source object identity indicator, and said source object descriptive information; said twelfth cnxpt given properties filled by a predetermined set of elements selected from the group of: the descriptive information of said information resource, said source object's authority and descriptive information, the location where the element was first identified in said information resource, and the information associated with the element identified; wherein a child to parent relationship info-item of a predetermined type and of a predetermined weight based upon the number of references found of said element in said information resource is generated between said twelfth cnxpt and the source data enclosed information resource description authority cnxpt, if existing, generated for said information resource, or otherwise to said source object level cnxpt if existing; wherein an additional occurrence is attached to said twelfth cnxpt if a source data table information resource irxt exists having a part-of relationship with said enclosed information resource irxt of said information resource defined in said source object, and a predetermined system parameter is set to a predetermined value, a relationship info-item of a predetermined weight based upon the number of references found of said element in said information resource is also formed between said additional occurrence and said source data table information resource irxt if existing, and if a predetermined system parameter is set to a predetermined value, a relationship info-item of a predetermined weight is also formed between said twelfth cnxpt and the source data table description authority cnxpt, if existing, generated for the table for which said source data table information resource irxt was generated to represent; wherein an additional occurrence is attached to said twelfth cnxpt if a source data table row information resource irxt exists having a part-of relationship with said enclosed information resource irxt of said information resource defined in said source object, and a predetermined system parameter is set to a predetermined value, a relationship info-item of a predetermined weight based upon the number of references found of said element in said information resource is also formed between said additional occurrence and said source data table row information resource irxt if existing, and if a predetermined system parameter is set to a predetermined value, a relationship info-item of a predetermined weight is also formed between said twelfth cnxpt and the source data table row description authority cnxpt, if existing, generated for the table row for which said source data table row information resource irxt was generated to represent; and, if a predetermined system parameter is set to a predetermined value, generating a thesaurus item for said topical element; and, if a predetermined system parameter is set to a predetermined value, generating a concordance item for said topical element in a concordance for said information resource attached to said enclosed information resource irxt;

wherein all instances of said coding key cnxpt of a type are assigned a single fxxt based upon said source object provenance authority fxxt; said twelfth cnxpt termed a coding key cnxpt;

aa. generating, for each identifiable instance of a cnxpt in said source object for which said commonplace holds no matching existing cnxpt, if a predetermined system parameter is set to a predetermined value, a new thirteenth cnxpt as if the information of said cnxpt in said source object had been added to said thirteenth cnxpt as votes from the originator of said source object with predetermined weights based upon authority of originator regarding the cntexxt wherein said thirteenth cnxpt is placed, and adding relationship info-items in said source object connecting to said cnxpt in said source object as relationship info-items in said commonplace, connecting to info-items existing in said commonplace if they match, or generating new thirteenth info-items to match said info-item in said source object as votes from the originator of said source object with predetermined weights based upon authority of originator regarding the context wherein said thirteenth info-item is added;

bb. generating, for each identifiable instance of a cnxpt in said source object for which said commonplace holds a matching existing cnxpt, if a predetermined system parameter is set to a predetermined value, an update of said existing cnxpt to note changes made to said matching existing cnxpt as votes from the originator of said source object with predetermined weights based upon authority of originator regarding said cnxpt;

cc. generating, for each identifiable instance of an info-item in said source object for which said commonplace holds no matching existing info-item, if a predetermined system parameter is set to a predetermined value, a new thirteenth info-item as if the information of said info-item in said source object had been added to said thirteenth info-item as votes from the originator of said source object with predetermined weights based upon authority of originator regarding the context wherein said thirteenth info-item is added, and adding relationship info-items in said source object connecting to said info-item in said source object as relationship info-items in said commonplace, connecting to info-items existing in said commonplace if they match, or generating new info-items to match said info-item in said source object as votes from the originator of said source object with predetermined weights based upon authority of originator regarding the context wherein said thirteenth info-item is added;

dd. generating, for each identifiable instance of an info-item in said source object for which said commonplace holds a matching existing info-item, if a predetermined system parameter is set to a predetermined value, an update of said existing info-item to note changes made to said matching existing info-item as votes from the originator of said source object with predetermined weights based upon authority of originator regarding said info-item;

ee. determining, where said request to locate and ingest a data source object stems from a search query specification step, relevance of said source object to a search objective stated as a search query specification step wherein said source object is a result set item in a search result set;

ff. determining pertinence of said source object for an alert generation rule of an alert specification wherein said source object is of a type applicable to said alert specification generation rule;

gg. initiating alerts, with attached description, wherein said source object is of a type applicable to said alert specification generation rule;

hh. initiating methodologies according to a methodology template wherein said source object is of a type applicable to said methodologies template;

ii. initiating workflows according to a workflow template wherein said source object is of a type applicable to said workflow template;

jj. determining pertinence of said source object for an alert generation rule of an alert specification wherein a cnxpt of a type applicable to said alert specification generation rule is generated from said source object;

kk. initiating alerts, with attached description, wherein a cnxpt of a type applicable to said alert specification generation rule is generated from said source object;

ll. initiating methodologies according to a methodology template wherein a cnxpt of a type applicable to said methodology template is generated from said source object mm. initiating workflows according to said workflow template wherein a cnxpt of a type applicable to said workflow template is generated from said source object nn. determining pertinence of said source object for an alert generation rule of an alert specification wherein a info-item of a type applicable to said alert specification generation rule is generated from said source object;

oo. initiating alerts, with attached description, wherein a info-item of a type applicable to said alert specification generation rule is generated from said source object;

pp. initiating methodologies according to a methodology template wherein a info-item of a type applicable to said methodology template is generated from said source object qq. initiating workflows according to said workflow template wherein a info-item of a type applicable to said workflow template is generated from said source object;

rr. issuing a predetermined type of notice to a user that an information resource has been entered for which a manual work task is appropriate, said type of notice selected from the group of:

i. an attempt to add a source object failed and manual intervention or troubleshooting is necessary, wherein user has registered to receive intervention or troubleshooting tasks, if said user has not yet been alerted or has requested all alerts;

ii. a source object has been added for which manual review is necessary, wherein user has registered to receive review tasks for general source object ingesting, if said user has not yet been alerted or has requested all alerts;

iii. a structured data set source object has been added for which manual review is necessary, wherein user has registered to receive review tasks for structured data set source object ingesting, if said user has not yet been alerted or has requested all alerts;

iv. a status update, wherein user has registered to receive status updates for one or more ingesting tasks, if said user has not yet been alerted;

v. an information resource has been added for which manual review is necessary, wherein user has registered to receive information resource review tasks, if said user has not yet been alerted or has requested all alerts;

vi. to do list item generation for tracking a task needing effort in the system, if no such to do list item exists in any status;

vii. to do list item generation for tracking a task needing effort in the system for review or curation and alerting a responsible user of said to do list item, if no such to do list item exists in any status and if said user has not yet been alerted;

viii. initiation of a workflow and generation of a to do list item for tracking a workflow task needing effort in the system for review or curation, if no such workflow exists and if no such to do list item exists in any status;

ix. initiation of a workflow and a to do list item generation for tracking a workflow task needing effort in the system for review or curation and alerting a responsible user of said to do list item, if no such workflow exists and if no such to do list item exists in any status and if said user has not yet been alerted;

and x. suggestion generation for altering topic subdivisions according to quantitative separation determination based upon interest and link analysis;

and ss. recalculating workflow task effort, resource requirements, resource allocations, and schedule changes.

215. The method of claim 1, to add available data sets to a commonplace of information of improving scope and quality to integrate entities, further comprising:

a. collecting information into a data set to be compared against or added to said commonplace;
b. accepting a choice of one or more entity types selected from said commonplace or from said data set to be considered as cnxpts;
c. collecting all instances of said entity types from said commonplace and said data set to be considered as instances of a cnxpt type and considering them as having a single default fxxt during processing;
d. accepting a choice of one or more association types to be used as propositional associations for determining a categorization from the association info-item types having directionality and relating said entity types to be considered as instances of said cnxpt type either already existing within said commonplace or in said data set to prepare map appropriate to said use case;
e. collecting all associations to be used as a determinant of categorization wherein said associations have directionality and said association info-item already exists within said commonplace between said entity types to be considered as instances of said cnxpt type or is among said associations to be added between said entity types to be considered as instances of said cnxpt type;
f. accepting a choice of one or more association types to be used as positioning associations for determining the positioning of cntexxts representing cnxpts in a map based upon concept similarity from the association info-item types indicating cnxpt similarity to prepare map appropriate to said use case;
g. collecting all associations to be used as a determinant of entity similarity wherein the association info-item already exists within said commonplace between said entity types to be considered as instances of said cnxpt type or is among said associations to be added between said entity types to be considered as instances of said cnxpt type;
h. determining linkages between cnxpts according to integration mapping specifications of the determined fxxt specification basis to force an entity consolidation of said cnxpts for a particular use case;
i. accepting a choice of a metric between zero and one to be used as a threshold for combining cnxpts wherein when the threshold value is surpassed by the effective weight of a summary association info-item of said types to be used as a determinant of entity similarity the endpoint cnxpts will be considered to be the same entity instance;
j. considering said all associations to be used as a determinant of entity similarity to be between said instances of said cnxpt type;
k. considering said all associations to be used as a determinant of entity similarity between cnxpts to have said single default fxxt during processing;
l. determining weights of said all associations to be used as a determinant of entity similarity, wherein said associations already existing within said commonplace are retained and weights of said associations to be added are calculated as a coefficient specified by the user times the value given in an attribute present for said association info-item or a specified default value according to utilize collective consensus through vote tallying means;
m. determining effective weights for summary associations between cnxpts summarizing all associations to be used as a determinant of entity similarity between said cnxpts of said cnxpt type according to utilize collective consensus through vote tallying means;
n. replacing any considered association info-item of endpoint count greater than two to an equivalent set of considered associations having an endpoint count of two;
o. considering said all associations to be used as a determinant of categorization to be between said instances of said cnxpt type;
p. considering said all associations to be used as a determinant of categorization between cnxpts to have said single default fxxt during processing;
q. determining weights of said all associations to be used as a determinant of categorization, wherein said associations already existing within said commonplace are retained and weights of said associations to be added are calculated as a coefficient specified by the user times the value given in an attribute present for said association info-item or a specified default value according to utilize collective consensus through vote tallying means;
r. combining the endpoint cnxpts of said summary associations between cnxpts summarizing all associations to be used as a determinant of entity similarity where said metric between zero and one to be used as a threshold for combining cnxpts is surpassed by the effective weight of said summary association info-item of said types to be used as a determinant of entity similarity between said endpoint cnxpts to yield a set of distinguishable cnxpts wherein the set includes only the cnxpts not combined plus the cnxpts resulting from combination and to yield a revised collection of associations to be used as a determinant of categorization, wherein an endpoint of any said associations having a cnxpt eliminated as a result of combination is replaced by the resulting cnxpt from the combining;
s. determining effective weights and directions for summary associations between said cnxpts of said cnxpt type summarizing all said revised collection of associations to be used as a determinant of categorization between said cnxpts of said cnxpt type according to utilize collective consensus through vote tallying means;
t. extracting a spanning forest of cnxpts and interrelationships where each of said cnxpts of said cnxpt type are taken as categories and arranged based upon said summary associations according to map generation means;
and
u. reporting the structure of said spanning forest of cnxpts and interrelationships.

216. The method of claim 1 to also provide a management tool for document and data set ingesting with workflow assistance, wherein:

a. creating an info-item to represent a data source and assign an identity indicator value to identify said data source;
b. creating an info-item to represent a creator of said data source and assign an identity indicator value to identify said creator;
c. providing search query procedure templates for searching for source objects to determine relevance;

d. providing concept and source object information templates for searching for and reviewing source objects to determine relevance;
e. providing methodology and workflow templates for project management of searching for and reviewing source objects to determine relevance to a stated meaning or issue;
f. providing prediction analytics establishing commonalty and similarity scores for source objects, the prediction selected from the group of:
  i. computing a predicted weighted consensus quality metric from opinions stating quantification of quality metrics selected from the group of: specialized metrics, needed bias adjustment, needed outlier elimination, translation quality, degree of data repairing needed, cost of scripting to encode needed translations, cost of scripting to provide needed business rules, cost of resources necessary to enable needed additional discovery, cost of scripting to enforce by automatic business and quality detection rules, proportion of duplicates, width of diversity of data argument opinions, proportion of business rule violations, proportion of missing values, evaluation results of quality analytic, proportion of misaligned attributes, proportion of un-normalized values, and needed verification by domain experts according to utilize collective consensus through vote tallying means for controlling continuous processing and managing add-in function modules to calculate consensus and impute associations;
  ii. computing a predicted weighted ranking of the likely relevance of said source object to a coding key cnxpt as specified;
  and
  iii. computing a predicted weighted rejection ranking of said source object according to rules for rejection for security rules;
g. defining a map;
h. generating a map instance for said map;
  and
i. accepting and processing a user command and effecting changes therefrom, said user command selected from the group of:
  i. to request a search for wisdom;
  ii. to enter a fxxt specification involving extraction by meta-data and search queries to meet criteria for project;
  iii. to accept a workflow task;
  iv. to specify search query specifications, workflow task assignment and document passing specifics to meet criteria for project;
  v. to initiate operation of data extraction, document management, and prediction analytics;
  vi. to initiate continuing retrieval of source objects based on the criteria according to search query specifications;
  vii. to establish a commonplace of information for purpose of a specific dispute or matter;
  viii. to categorize source objects into workflow contexts;
  ix. to register an opinion with quantification regarding quality metrics;
  x. to register an assessment of whether a source object meets the constraints for a quality metric;
  xi. to allocate resources according to specified workflow rules for assignment or workflow rules for task acceptance;
  xii. to refine search query specifications, categorizations, and priorities for review;
  xiii. to highlight to others a data argument issue due to the conceptual meaning of two or more similar concepts represented by cnxpts;
  xiv. to specify pertinence prediction weightings;
  xv. to notify a supervisory level regarding a data issue importance;
  xvi. to specify details for workflow and categorizations by establishing contexts for work tasks represented by cnxpts and workflow transitions represented by relationships to meet criteria for project;
  xvii. to alter a workflow based upon quality checks produced by workflow and methodology;
  xviii. to alter a workflow based upon review of metrics produced by workflow and methodology;
  xix. to generate a logical view, data set, or data analytics cube utilizing the categorization provided by a generated map and the results of a search query collectively termed a viewpoint, data arguing is resolved to a consensus, said categorization is appropriate to a domain of wisdom for a use case, use of different maps provides correlated categorization structuring of the same raw data, raw data is converted to consensus structured clean data and useful decision structures, various viewpoints form of correlative analysis base;
  and
  xx. to generate a report or data set of the data set catalog, provenance, access cost, consensus regarding data quality, and consensus regarding veracity of data making up said viewpoint.

217. The method of claim 1 to control the process of curation of duplicates and to also remove redundant data from said commonplace to improve operating efficiency, wherein:

a. compiling a set of opinions regarding the usefulness and accuracy of a first info-item;
b. determining whether a first info-item has the same meaning and the same characteristics as a second info-item of the same type in all fxxts or are equivalent to a specified standard;
c. tallying a consensus regarding said usefulness and accuracy of a first info-item;
  and
d. performing an action to automatically or by approval of a user to remove information from said commonplace of information, said action selected from the group of:
  i. combining said first and said second info-items having the same meaning;
  ii. cleaning of data to eliminate information that makes no sense because of errors by users, typos, or nonsense entries by children or others, or is disconnected or unlinked by deletion of info-items found marked for deletion;
  iii. cleaning of data to also eliminate duplicate information, or old, junk, backed up, off-topic, imprecise, or unnecessary data by deletion of info-items found marked for deletion;
  iv. removing permanently zero or more redundant ttx instances, by application of one or more cleanup and summarization analytics, wherein marked fxxt of said redundant ttx instance is added as a marked fxxt on the ttx instance retained of each redundant pair of ttx instances found redundant, and wherein every relationship info-item having said redundant ttx instance as an endpoint is altered to have said ttx instance retained of each redundant pair of ttx instances found redundant as that endpoint;

v. removing permanently, by application of one or more cleanup and summarization analytics, zero or more redundant relationship info-items wherein the endpoints of said redundant relationship info-item match the endpoints of a second relationship info-item and all type and fxxt information of said redundant relationship info-item match all type and fxxt information of said second relationship info-item, combining relationship info-item weights and authority metrics according to a predetermined formula and assigning said metrics to the relationship info-item retained of each redundant pair of said relationship info-items found redundant;

vi. detecting that two siblings in a sibling cnxpt pair are no more distant then the minimal separation according to the between-category repulsor tensor as applied in a cntexxt represented by a cnxpt in a co-location map, wherein the separation between said siblings in a sibling cnxpt pair would be lower than the object distance minimum constraint if said tensor was not applied, wherein the intersection of said siblings in a sibling cnxpt pair is attributed to the parent and the differences defining the child cnxpts in the categorization forming said co-location map, indicates that said sibling cnxpt pair includes two very similar concepts, said map generated according to said application software map generation means;

vii. issuing a predetermined type of notice to a user that a differentiation between a pair of ttx terms, or coding key cnxpts, being examined for similarity illustration is smaller than a metric specified by a predefined system preference setting having a predefined value, the appropriateness of said notice determined by, wherein:

01. accepting zero or more prioritization choices of one or more of term ttx instance pair ttxs for meaning similarity illustration;

02. marking, considering any prioritization choices by a user, a term ttx instance pair for similarity illustration during continuous processing or, if sufficient resources are available and prioritized, immediate processing;

03. marking each ttx of said term ttx instance pair as a cnxpt for the purpose of similarity illustration;

04. mark all instances of similarity associations and term ttx meaning hierarchy associations having one or more of said chosen term ttx instances as endpoints as having said fxxt for the purpose of the instant similarity illustration;

05. mark all cnxpts serving as endpoints of similarity associations and term ttx meaning hierarchy associations marked with said fxxt for the purpose of the instant similarity illustration to also belong to said fxxt for the purpose of the instant similarity illustration;

06. broadening the illustration of similarity, to a predetermined degree of association distance by including into said fxxt additional instances of similarity associations and term ttx meaning hierarchy associations having one or more of said marked term cnxpts as endpoints and marking said instances of similarity associations and term ttx meaning hierarchy associations as having said fxxt for the purpose of the instant similarity illustration, and then marking all cnxpts serving as endpoints of said newly marked associations as also having said fxxt for the purpose of the instant similarity illustration;

and 07. determining effective weights and directions for summary associations between said cnxpts of said cnxpt type summarizing all associations to be used as a determinant of differentiation between said cnxpts of said cnxpt type according to utilize collective consensus through vote tallying means;

viii. issuing a predetermined type of notice to a user that a differentiation between said sibling cnxpt pair cnxpts is appropriate to more clearly define the categorization, said type of notice selected from the group of:

01. ttx match indication to a user viewing said co-location map wherein said siblings in a sibling cnxpt pair are highlighted or otherwise indicated to direct a user's attention to said very similar concepts;

02. ttx match alert generation to a user viewing said co-location map wherein user has registered to receive ttx match alerts, if said user has not yet been alerted or has requested all alerts;

03. to do list item generation for tracking a task needing effort in the system for curation of redundant cnxpts, if no such to do list item exists in any status;

04. to do list item generation for tracking a task needing effort in the system for curation of redundant cnxpts and alerting a responsible user of said to do list item, if no such to do list item exists in any status and if said user has not yet been alerted;

05. initiation of a workflow and generation of a to do list item for tracking a workflow task needing effort in the system for curation of redundant cnxpts, if no such workflow exists and if no such to do list item exists in any status;

06. initiation of a workflow and a to do list item generation for tracking a workflow task needing effort in the system for curation of redundant cnxpts and alerting a responsible user of said to do list item, if no such workflow exists and if no such to do list item exists in any status and if said user has not yet been alerted;

and 07. suggestion generation for altering topic subdivisions according to quantitative separation determination based upon interest and link analysis;

ix. accepting a command selected from the group of:

01. a command from a user expressing a belief that an info-item should be deleted and generating a vote accordingly;

02. a command from a user expressing a belief regarding whether an info-item represents a real world counterpart that will ever be real and generating a vote accordingly;

and 03. a command from a user expressing a belief that an info-item has veracity of a low level and generating a vote accordingly;

and x. locating, according to continuous processing means and a system preference setting, a first info-item meeting a condition selected from the group of:

01. having a value determined by an analytic executed according to consensus determination means because of a system preference setting to trigger action by the analytic to cause the entering of an analytic vote for deletion of said first info-item when a second info-item is determined by said analytic to be identical to a sufficient level according to said value and said second info-item has all characteristics equivalent to all characteristics of said first info-item or is given the characteristics resulting from a combining algorithm of said analytic by action of the analytic;

02. having a value determined by an analytic executed according to consensus determination means because of a system preference setting to trigger action by the analytic to cause the entering of an analytic vote for deletion of said first info-item when said value is below an analytic threshold setting a minimum metric, or a vote for retention when said value is equal to or above said minimum metric;

03. having a relative degree of interest level value determined by an analytic executed according to interest summarization means because of a system preference setting to trigger action by the analytic to cause the entering of an analytic vote for deletion of said first info-item when said interest level value is below an analytic threshold setting a minimum metric, or a vote for retention when said value is equal to or above said minimum metric;

04. having a value determined according to consensus determination means concerning veracity wherein said value is below a threshold setting a minimum metric for which veracity is considered sufficient for an info-item of the type of said first info-item to be retained in said commonplace and performing an action selected from the group of: wherein said system preference is false, not set, or is not implemented, deleting said first info-item; and wherein otherwise, entering a system vote for deletion of said first info-item accordingly;

05. having a value determined according to existence vote summarization means concerning existence wherein said value is below a threshold setting a minimum metric for which existence is considered sufficient for an info-item of the type of said first info-item to be retained in said commonplace and performing an action selected from the group of: wherein said system preference is false, not set, or is not implemented, deleting said first info-item; and wherein otherwise, entering a system vote for deletion of said first info-item accordingly; and 06. having a value determined according to consensus determination means concerning the belief that said first info-item should be deleted wherein said value is above a threshold setting a maximum metric considered sufficient to indicate a generally held belief that an info-item of the type of said first info-item should no longer be retained in said commonplace and deleting said first info-item.

218. The method of claim 1, to extract concepts of imprecise identity with similar meanings into sets based upon categorization fuzziness from a commonplace of information, further comprising:

a. collecting all associations to be used as a determinant of categorization wherein said associations have directionality and said association already exists within said commonplace between said entity types to be considered as instances of said cnxpt type or is among said associations to be added between said entity types to be considered as instances of said cnxpt type, said associations termed hierarchical associations;

b. considering said all associations to be used as a determinant of categorization between said cnxpt type, said associations termed hierarchical associations;

c. considering said all associations to be used as a determinant of categorization between cnxpts to have said single default fxxt during processing, said associations termed hierarchical associations;

d. determining weights of said all associations to be used as a determinant of categorization wherein said associations already existing within said commonplace are retained and weights of said associations to be added are calculated as a coefficient specified by the user times the value given in an attribute present for said association or a specified default value according to utilize collective consensus through vote tallying means;

e. replacing any considered association of endpoint count greater than two to an equivalent set of considered associations having an endpoint count of two;

f. determining effective weights and directions for summary associations between said cnxpts of said cnxpt type summarizing all associations to be used as a determinant of categorization between said cnxpts of said cnxpt type according to utilize collective consensus through vote tallying means;

g. determining weights of said all associations to be used as a determinant of categorization wherein said associations already existing within said commonplace are retained and weights of said associations to be added are calculated as a coefficient specified by the user times the value given in an attribute present for said association or a specified default value according to utilize collective consensus through vote tallying means;

h. combining the endpoint cnxpts of said summary associations between cnxpts summarizing all associations to be used as a determinant of entity similarity where said metric between zero and one to be used as a threshold for combining cnxpts is surpassed by the effective weight of said summary association of said types to be used as a determinant of entity similarity between said endpoint cnxpts to yield a set of distinguishable cnxpts wherein the set includes only the cnxpts not combined plus the cnxpts resulting from combination and to yield a revised collection of associations to be used as a determinant of categorization wherein an endpoint of any said associations having is a cnxpt eliminated as a result of combination is replaced by the resulting cnxpt from the combining;

i. determining effective weights and directions for summary associations between said cnxpts of said cnxpt type summarizing all said revised collection of associations to be used as a determinant of categorization between said cnxpts of said cnxpt type according to utilize collective consensus through vote tallying means;

j determining, by at least one processor, at least one user display visualization according to map generation means for display to a user from said organization of knowledge of at least one domain of wisdom for initial viewing;

k. displaying to said user a portion of said organization of knowledge of at least one domain of wisdom is according to display and delivery means;

l. accepting and processing a user command and effecting changes therefrom, said user command selected from the group of:

i. to view content of said commonplace;

ii. to add or refine content of said commonplace and effect change;

iii. to navigate around an organization of knowledge of said commonplace;

and iv. to request a search for wisdom;

m. comparing exported data sets to ensure the consistency of reloaded data, for the elimination of re-classified records;

n. creating a cnxpt for the ttx which is at the top of the taxonomy;

o. computing a predicted weighted consensus quality metric from opinions stating quantification of quality metrics selected from the group of: specialized metrics, needed bias adjustment, needed outlier elimination, translation quality, degree of data repairing needed, cost of scripting to encode needed translations, cost of scripting to provide needed business rules, cost of resources necessary to enable needed additional discovery, cost of scripting to enforce by automatic business and quality detection rules, proportion of duplicates, width of diversity of data argument opinions, proportion of business rule violations, proportion of missing values, evaluation results of quality analytic, proportion of misaligned attributes, proportion of unnormalized values, and needed verification by domain experts;

p. calculating quality corrections according to a prediction correction mechanism selected from the group of:

i. the way that people think is inherently fuzzy. the way that we perceive the world is continually changing and to categorize by manual culling of said source object according to concepts and contexts as represented by existing cnxpt;

ii. to categorize by manual culling to re-prioritize said source object for further review according to prespecified workflow rules or to remove said source object from further review or from a collection of source objects in said commonplace of information;

iii. to argue constructively about the meaning of a concept represented by a cnxpt by registering zero or more votes stating a suggested textual definition of said concept's meaning in descriptive information or an identity indicator of a cnxpt;

iv. to argue constructively about the meaning of a concept represented by a cnxpt by registering a vote regarding the proper contextual placement of said cnxpt's meaning within a categorization of such meanings;

v. to argue constructively about the meaning of a concept represented by a cnxpt by registering a vote regarding values of characteristics of said cnxpt;

vi. to argue constructively about the meaning of a concept represented by a cnxpt by registering against said cnxpt a ranking stating an opinion regarding the relevance of an information resource or internal resource serving as an information resource to said cnxpt;

vii. to argue constructively about the relatedness of a first concept represented by a first cnxpt to a second concept represented by a second cnxpt by registering a vote that said relatedness should be noted in said commonplace by a predetermined type of association from said first cnxpt to said second cnxpt;

viii. to register a vote that a concept should or should not exist in said commonplace;

ix. to generate a logical view, data set, or data analytics cube utilizing the categorization provided by a generated map and the results of a search query collectively termed a viewpoint, wherein data arguing is resolved to a consensus, wherein said categorization is appropriate to a domain of wisdom for a use case, wherein use of different maps provides correlated categorization structuring of the same raw data, wherein raw data is converted to consensus structured clean data and useful decision structures, wherein various viewpoints form of correlative analysis base;

x. to generate a report or data set of the data set catalog, provenance, access cost, consensus regarding data quality, and consensus regarding veracity of data making up said viewpoint;

xi. to generate a logical view, data set, or data analytics cube utilizing the categorization provided by a generated map and the results of a search query collectively termed a viewpoint, wherein data arguing is resolved to a consensus, wherein said categorization is appropriate to a domain of wisdom for a use case, wherein use of different maps provides correlated categorization structuring of the same raw data, wherein raw data is converted to consensus structured clean data and useful decision structures, wherein various viewpoints form of correlative analysis base;

xii. to generate a report or data set of the data set catalog, provenance, access cost, consensus regarding data quality, and consensus regarding veracity of data making up said viewpoint;

xiii. to highlight to others a data argument issue due to the conceptual meaning of two or more similar concepts represented by cnxpts;

xiv. to specify pertinence prediction weightings;

xv. to notify a supervisory level regarding a data issue importance;

xvi. to specify details for workflow structure and categorizations by establishing contexts for work tasks represented by cnxpts and workflow transitions represented by associations to meet criteria for project;

xvii. to alter a workflow based upon quality checks produced by workflow and methodology;

xviii. to alter a workflow based upon review of metrics produced by workflow and methodology;

and xix. to generate a logical view, data set, or data analytics cube utilizing the categorization provided by a generated map and the results of a search query collectively termed a viewpoint, wherein data arguing is resolved to a consensus, wherein said categorization is appropriate to a domain of wisdom for a use case, wherein use of different maps provides correlated categorization structuring of the same raw data, wherein raw data is converted to consensus structured clean data and useful decision structures, wherein various viewpoints form of correlative analysis base;

q. removing permanently zero or more redundant ttx instances, by application of one or more cleanup and summarization analytics, wherein marked fxxt of said redundant ttx instance is added as a marked fxxt on the ttx instance retained of each redundant pair of ttx instances found redundant, and wherein every association having said redundant ttx instance as an endpoint is altered to have said ttx instance retained of each redundant pair of ttx instances found redundant as that endpoint;

r. removing permanently, by application of one or more cleanup and summarization analytics, zero or more redundant associations wherein the endpoints of said redundant association match the endpoints of a second association and all type and fxxt information of said redundant association match all type and fxxt information of said second association, combining association weights and authority metrics according to a predetermined formula and assigning said metrics to the association retained of each redundant pair of said associations found redundant;

s. detecting that two siblings in a sibling cnxpt pair are no more distant then the minimal separation according to the between-category repulsor tensor as applied in a cntexxt represented by a cnxpt in a co-location map, wherein the separation between said siblings in a sibling cnxpt pair would be lower than the object distance minimum constraint if said tensor was not applied, wherein the intersection of said siblings in a sibling cnxpt pair is attributed to the parent and the differences defining the child cnxpts in the categorization forming said co-location map, indicates that said sibling cnxpt pair includes two very similar concepts, said map generated according to said application software map generation means;

t. issuing a predetermined type of notice to a user that a differentiation between a pair of ttx terms, or coding key cnxpts, being examined for similarity illustration is smaller than a metric specified by a predefined system preference setting having a predefined value, appropriateness of said notice determined, further including:

i. accepting zero or more prioritization choices of one or more of term ttx instance pair ttxs for meaning similarity illustration;

ii. marking, considering any prioritization choices by a user, a term ttx instance pair for similarity illustration during continuous processing or, if sufficient resources are available and prioritized, immediate processing;

iii. marking each ttx of said term ttx instance pair as a cnxpt for the purpose of similarity illustration;

iv. mark all instances of similarity associations and term ttx meaning hierarchy associations having one or more of said chosen term ttx instances as endpoints as having said fxxt for the purpose of the instant similarity illustration;

v. mark all cnxpts serving as endpoints of similarity associations and term ttx meaning hierarchy associations marked with said fxxt for the purpose of the instant similarity illustration to also belong to said fxxt for the purpose of the instant similarity illustration;

vi. broadening the illustration of similarity, to a predetermined degree of association distance by including into said fxxt additional instances of similarity associations and term ttx meaning hierarchy associations having one or more of said marked term cnxpts as endpoints and marking said instances of similarity associations and term ttx meaning hierarchy associations as having said fxxt for the purpose of the instant similarity illustration, and then marking all cnxpts serving as endpoints of said newly marked associations as also having said fxxt for the purpose of the instant similarity illustration;

and vii. determining effective weights and directions for summary associations between said cnxpts of said cnxpt type summarizing all associations to be used as a determinant of differentiation between said cnxpts of said cnxpt type according to utilize collective consensus through vote tallying means;

and u. issuing a predetermined type of notice to a user that a differentiation between said sibling cnxpt pair cnxpts is appropriate to more clearly define the categorization, said type of notice selected from the group of:

i. ttx match indication to a user viewing said co-location map wherein said siblings in a sibling cnxpt pair are highlighted or otherwise indicated to direct a user's attention to said very similar concepts;

and ii. ttx match alert generation to a user viewing said co-location map wherein user has registered to receive ttx match alerts, if said user has not yet been alerted or has requested all alerts.

219. The method of claim 1 to also provide a managed ingestion mechanism with quality improvement, further comprising:

a. providing coordinated access to data extraction analytics for carrying out computer database searching, data extraction, transformation, translation, and loading;

b. providing coordinated access to document management analytics for controlling, storing, accessing, and displaying electronically stored information resource documents;

c. generating a map to prepare at least one consensus organization of knowledge of at least one domain of wisdom including a source object provenance authority fxxt and also includes any additional portion of said commonplace against which categorization or comparison or curation is to occur;

d. displaying to said user a portion of said commonplace according to display and delivery means;

e. providing one or more quality improving functions selected from the group of:

i. providing task management and document management analytics for controlling workflows, determining scheduling based upon workflow priorities, and suggesting task assignments;

ii. ingesting a plurality of source objects;

iii. initiating continuous extraction of each source object's identity, descriptive information, origination, and provenance meta-data to generate a source info-item with attached descriptive information, said type of source object selected from the group of: an info-item from an external commonplace, a concept represented by a cnxpt from an external commonplace, data set, meta-data, file, information resource, statement, communication, template, legal decision, docket, story, transcript, and document; said source info-item to be used as the authority control base for said source object and related to a new fxxt by a source relationship, said fxxt termed a source object provenance authority fxxt;

iv. initiating continuous extraction, for each source object that is a structured data set having data set elements, of all data set elements of said source object selected from the group of: table description, entity type description, column description, attribute description, relationship info-item type descriptive information, table procedure description, object method description, and data rule description; to generate, for each, a concept represented by a cnxpt with attached descriptive information from said data set elements, said cnxpt to be used as a curation control base, said cnxpt termed a source data description authority cnxpt, wherein all instances of said source data description authority cnxpts are assigned a single fxxt related to said source object provenance authority fxxt;

v. initiating continuous extraction, for each source object that is a structured data set having data rules, of all data rule descriptions of said source object to generate, for each, a concept represented by a cnxpt with attached descriptive information, said cnxpt to be used as curation reference base, said cnxpt termed a source data rule authority cnxpt;

vi. initiating continuous extraction, for each source object that is unstructured data, of all descriptive elements of said source object selected from the group of: object meta-data, citation, page description, foot or end note, volume title, section title, chapter title, book mark, section text, page text, type description, definition, index entry, table of contents entry, author, editor, table, figure, character, precedent, quotation, topic, issue, finding, opinion, and description; to generate, for each, a concept represented by a cnxpt with attached descriptive information from said descriptive elements, said cnxpt to be used as a curation control base, said cnxpt termed a source data description authority cnxpt, wherein all instances of said source data description authority cnxpts are assigned a single fxxt related to said source obj ect provenance authority fxxt;

vii. initiating continuous extraction, for each source object that is unstructured data, a cited information resource irxt info-item for any information resource not existing in said commonplace of information;

viii. initiating continuous extraction of topical elements from said source object, said topical element selected from the group of: term, timeframe, thing, feature, link, status, originator, event, party, participant, person, owner, address, location, organization, reviewer, rule, object, relationship info-item description, type identity, law, citation, claim, belief, strategy, concern, position, document characterization, communication, communication meta-data property, law, fact, statement, opinion, issue, theory, semantic token, name, statement, precedent, attribute, identity, evidentiary item description, concept, context, classification category, meta-data value, and other description; each said topical element to be used as a base for deriving commonalty and similarity scores for said source object, wherein a cnxpt is created for each unique element extracted, said cnxpt termed a coding key cnxpt, wherein all instances of said coding key cnxpt of a type are assigned a single fxxt based upon said source object provenance authority fxxt and the type of coding key;

ix. determining relevance of said source object to a search objective stated as a search query specification step wherein said source object is a result set item in a search result set;

x. determining pertinence of said source object for a domain of wisdom extraction objective stated as a fxxt specification step wherein said source object is an info-item of any type applicable to said fxxt specification step;

xi. determining pertinence of said source obj ect for a prioritization rule of a methodology workflow specification step wherein said source object is an info-item of any type applicable to said methodology workflow specification step;

xii. determining pertinence of said source object for an alert generation rule of an alert specification wherein said source object is an info-item of any type applicable to said alert specification generation rule;

xiii. initiating requests for action, with attached description of action, to a user according to methodology workflow specification step;

xiv. initiating alerts, with attached description, to a user according to an alert specification generation rule;

xv. initiating methodologies according to said methodology templates;

xvi. initiating workflows according to said workflow templates;

xvii. providing search query procedure templates for searching for source objects to determine relevance;

xviii. providing concept and source object information templates for searching for and reviewing source objects to determine relevance;

xix. providing methodology and workflow templates for project management of searching for and reviewing source obj ects to determine relevance to a stated meaning or issue;

xx. providing prediction analytics establishing commonalty and similarity scores for source objects;

xxi. computing a predicted weighted consensus quality metric from opinions stating quantification of quality metrics selected from the group of: specialized metrics, needed bias adjustment, needed outlier elimination, translation quality, degree of data repairing needed, cost of scripting to encode needed translations, cost of scripting to provide needed business rules, cost of resources necessary to enable needed additional discovery, cost of scripting to enforce by automatic business and quality detection rules, proportion of duplicates, width of diversity of data argument opinions, proportion of business rule violations, proportion of missing values, evaluation results of quality analytic, proportion of misaligned attributes, proportion of un-normalized values, and needed verification by domain experts;

xxii. computing a predicted weighted ranking of the likely relevance of said source object to a coding key cnxpt as specified;

and xxiii. computing a predicted weighted rejection ranking of said source object according to rules for rejection for security rules;

and f. accepting and processing a user command and effecting changes therefrom, said user command selected from the group of:

i. to view content of said commonplace;

ii. to add or refine content of said commonplace and effecting change;

iii. to collect information into a data set to be compared against or added to said commonplace;

iv. to categorize by manual culling of said source object according to concepts and contexts as represented by existing cnxpt;

v. to categorize by manual culling to re-prioritize said source object for further review according to pre-specified workflow rules or to remove said source object from further review or from a collection of source objects in said commonplace of information;

vi. to argue constructively about the meaning of a concept represented by a cnxpt by registering zero or more votes stating a suggested textual definition of said concept's meaning in descriptive information or an identity indicator of a cnxpt;

vii. to argue constructively about the meaning of a concept represented by a cnxpt by registering a vote regarding the proper contextual placement of said cnxpt's meaning within a categorization of such meanings;

viii. to argue constructively about the meaning of a concept represented by a cnxpt by registering a vote regarding values of characteristics of said cnxpt;

ix. to argue constructively about the meaning of a concept represented by a cnxpt by registering against said cnxpt a ranking stating an opinion regarding the relevance of an information resource or internal resource serving as an information resource to said cnxpt;

x. to argue constructively about the relatedness of a first concept represented by a first cnxpt to a second concept represented by a second cnxpt by registering a vote that said relatedness should be noted in said commonplace by a predetermined type of relationship info-item from said first cnxpt to said second cnxpt;

xi. to register a vote that a concept should or should not exist in said commonplace;

xii. to navigate around a map of said commonplace;

xiii. to request a search for wisdom;

xiv. to enter a fxxt specification involving extraction by meta-data and search queries to meet criteria for project;

xv. to accept a workflow task;

xvi. to specify search query specifications, workflow task assignment and document passing specifics to meet criteria for project;

xvii. to initiate operation of data extraction, document management, and prediction analytics;

xviii. to initiate continuing retrieval of source objects based on the criteria according to search query specifications;

xix. to establish a commonplace of information for purpose of a specific dispute or matter;

xx. to categorize source objects into workflow contexts;

xxi. to register an opinion with quantification regarding quality metrics;

xxii. to register an assessment of whether a source object meets the constraints for a quality metric;

xxiii. to allocate resources according to specified workflow rules for assignment or workflow rules for task acceptance;

xxiv. to refine search query specifications, categorizations, and priorities for review;

xxv. to highlight to others a data argument issue due to the conceptual meaning of two or more similar concepts represented by cnxpts;

xxvi. to specify pertinence prediction weightings;

xxvii. to notify a supervisory level regarding a data issue importance;

xxviii. to specify details for workflow structure and categorizations by establishing contexts for work tasks represented by cnxpts and workflow transitions represented by relationships to meet criteria for project;

xxix. to alter a workflow based upon quality checks produced by workflow and methodology;

xxx. to alter a workflow based upon review of metrics produced by workflow and methodology;

xxxi. to generate a logical view, data set, or data analytics cube utilizing the categorization provided by a generated map and the results of a search query collectively termed a viewpoint, wherein data arguing is resolved to a consensus, wherein said categorization is appropriate to a domain of wisdom for a use case, wherein use of different maps provides correlated categorization structuring of the same raw data, wherein raw data is converted to consensus structured clean data and useful decision structures, wherein various viewpoints form of correlative analysis base;

and xxxii. to generate a report or data set of the data set catalog, provenance, access cost, consensus regarding data quality, and consensus regarding veracity of data making up said viewpoint.

220. The method of claim 1 to also provide for accepting improvements of the knowledge models of said commonplace, further including:

a. accepting at least one improvement to said commonplace, the improvement selected from the group of:

i. adding an info-item instance to broaden the scope of said commonplace by adding objects;

ii. changing an existing info-item instance;

iii. merging a first existing info-item instance and a second existing info-item instance;

iv. deleting an existing info-item instance;

v. adding a relationship info-item instance between a first info-item instance and a second info-item instance;

vi. changing an existing relationship info-item instance;

vii. adding an association between a first cnxpt instance and a second cnxpt instance;

viii. changing an existing association between a first cnxpt instance and a second cnxpt instance;

ix. deleting an existing association between a first cnxpt instance and a second cnxpt instance;

x. adding a fxxt specification instance having zero or more ordered fxxt specification step instances to establish a repeatable procedure for extracting relevant sets of associations between cnxpts for a set purpose according to said fxxt specification;

xi. changing an existing fxxt specification instance;

xii. changing an existing fxxt specification procedure step instance;

xiii. deleting an existing fxxt specification instance;

xiv. deleting an existing fxxt specification procedure step instance;

xv. adding a fxxt marking to an association class;

xvi. changing an existing fxxt marking of an association class;

xvii. adding a fxxt marking to an association instance between a first cnxpt instance and a second cnxpt instance;

xviii. changing an existing fxxt marking of an association between a first cnxpt instance and a second cnxpt instance;

xix. adding a fxxt marking to an existing cnxpt class;

xx. changing an existing fxxt marking of a cnxpt class;

xxi. adding a fxxt marking to an existing cnxpt instance;

xxii. changing an existing fxxt marking of a cnxpt instance;

xxiii. deleting an existing fxxt marking of an association instance;

xxiv. deleting an existing fxxt marking of a cnxpt instance;

xxv. adding a fxxt marking to an existing info-item instance;

xxvi. changing an existing fxxt marking of an info-item instance;

xxvii. deleting an existing fxxt marking of an info-item instance;

xxviii. adding a fxxt reference for a map definition to establish a repeatable procedure for generating said map from, at least, info-item instances marked by said fxxt;

xxix. changing an existing fxxt reference for a map definition to alter a repeatable procedure for generating said map from info-item instances marked by said fxxt;

xxx. deleting an existing fxxt reference for a map definition to alter generation of said map;

xxxi. invoking a map build to generate a map instance according to a map definition;

xxxii. deleting a map instance;

xxxiii. adding a visualization specification for a map definition to establish a repeatable procedure for generating an instance of said visualization from an instance of said map;

xxxiv. changing an existing visualization specification for a map definition to establish a repeatable procedure for generating an instance of said visualization from an instance of said map;

xxxv. invoking a visualization build to generate a visualization instance according to a map instance;

xxxvi. deleting an existing visualization instance;

xxxvii. adding a vote instance regarding an existing info-item instance;

xxxviii. adding a new relationship info-item instance and a vote instance regarding existence of an associative relationship of a type represented by said relationship info-item instance by moving an object representing a first info-item instance into a second info-item instance wherein said first info-item instance and said second info-item instance become holders of roles in said relationship info-item instance;

xxxix. adding a vote instance regarding an existing relationship info-item instance by moving an object in a visualization representing an info-item instance holding a role in said relationship info-item instance in said commonplace, said vote stating a belief regarding a property of said relationship info-item selected from the group of: existence of said relationship, strength of said relationship, direction of said relationship, type of said relationship, an attribute of said relationship, a feature of said relationship, a trait of said relationship, a display characteristic of said relationship, and a property of said relationship;

xl. adding a new association info-item instance and a vote instance regarding the existence of an associative relationship represented by said association info-item instance by moving a displayed object representing said first cnxpt info-item instance into a second cnxpt info-item instance wherein said first cnxpt info-item instance and said second cnxpt info-item instance become holders of roles in said association info-item instance;

xli. adding a vote instance regarding an existing association info-item instance by moving a displayed object representing a cnxpt info-item instance holding a role in said association info-item instance;

xlii. changing, by a first user, a vote instance added by said first user regarding an info-item instance;

xliii. deleting, by a first user, a vote instance added by said first user regarding an info-item instance;

xliv. adding a modeling property to an info-item instance;

xlv. adding a modeling property to become a class property on all cnxpt instances of a defined cnxpt class;

xlvi. changing an existing modeling property;

xlvii. deleting an existing modeling property;

xlviii. adding a modeling equation to an info-item instance;

xlix. adding a modeling equation to be applied as a class method to all cnxpt instances of a defined cnxpt class;

l. changing an existing modeling equation instance;

li. deleting an existing modeling equation instance;

lii. invoking a modeling run to generate modeling results according to a model held in a map instance;

liii. adding a methodology specification info-item instance having zero or more ordered methodology specification step info-item instances to establish guidelines for a procedure offered to users for adoption to accomplish at least one objective;

liv. changing an existing methodology specification info-item instance;

lv. deleting an existing methodology specification info-item instance;

lvi. changing an existing methodology specification procedure step info-item instance;

lvii. deleting an existing methodology specification procedure step info-item instance;

lviii. adding a workflow specification info-item instance having zero or more ordered workflow specification step info-item instances to establish a procedure to carry out, with optional adaptation;

lix. changing an existing workflow specification info-item instance;

lx. changing an existing workflow specification procedure step info-item instance;

lxi. invoking an existing workflow specification info-item instance to build a workflow instance;

lxii. updating an existing workflow instance to bring it current with the live workflow it represents;

lxiii. adding a flow definition info-item instance;

lxiv. changing an existing flow definition info-item instance;

lxv. invoking an existing flow definition info-item instance to instantiate a flow;

lxvi. updating an existing flow instance to bring it into sync with the live flow it represents;

lxvii. adding a definition info-item of a displayable map object;

lxviii. changing an existing map definition info-item instance;

lxix. deleting an existing map definition info-item instance;

lxx. adding an instance of a displayable map object to a visualization of said map;

lxxi. changing a displayable map object instance of visualization of said map;

lxxii. deleting a displayable map object instance;

lxxiii. adding an info-item type definition instance to broaden said scope of said commonplace by adding object types;

lxxiv. changing an existing info-item type definition instance;

lxxv. deleting an existing info-item type definition instance;

lxxvi. adding a commonality relationship definition info-item instance optionally with an enrolling of a heuristic software plug-in to generate relationship instances of such commonality relationships;

lxxvii. changing an existing commonality relationship definition info-item instance;

lxxviii. deleting an existing commonality relationship definition info-item instance;

lxxix. adding a commonality relationship instance;

lxxx. changing an existing commonality relationship instance;

lxxxi. deleting an existing commonality relationship instance;

lxxxii. invoking an existing heuristic software plug-in;

lxxxiii. adding an imputation definition info-item instance optionally with an enrolling of a heuristic software plug-in to perform such imputations;

lxxxiv. changing an existing imputation definition info-item instance;

lxxxv. adding an imputation instance;

lxxxvi. changing an existing imputation instance;

lxxxvii. deleting an existing imputation instance;

lxxxviii. invoking an existing imputation instance;

lxxxix. adding a query definition info-item instance;

xc. changing an existing query definition info-item instance;

xci. deleting an existing query definition info-item instance;

xcii. invoking an existing query definition to obtain a result set;

xciii. performing a culling of a result set produced from invoking an existing query definition;

xciv. refreshing an existing query definition to obtain a refreshed result set;

xcv. refreshing a culling of a result set produced from refreshing an existing query definition;

xcvi. deleting a result set;

xcvii. adding a communication definition instance regarding an info-item instance;

xcviii. changing an existing communication definition instance;

xcix. invoking a transmitting of an existing communication definition instance;

c. receiving a communication definition instance;

ci. deleting a communication definition instance;

cii. adding a consortium specification info-item instance having zero or more role definition instances to establish an organizational design to carry out tasks, with optional adaptation, and having zero or more documentation classes to establish an agreement for participation and set negotiation patterns for obtaining agreement, with optional adaptation;

ciii. changing an existing consortium specification info-item instance;

civ. changing an existing consortium specification role info-item instance;

cv. reporting a change in status for an existing consortium specification info-item instance, the status type selected from the group of: task completion, objective completion, negotiation step completion, negotiation failure, negotiation success, documentation added, valuation change, ownership change, intellectual property status change, announcement, progress made, termination announcement, personnel change, funding status change, disagreement or dispute regarding reported information, agreement reached, advertisement, involvement in dispute, involvement in legal action, acceptance of investment, offer to enter investment pool, request or offer to graduate from investment pool, acceptance of request to graduate from investment pool, and public notice;

cvi. going live with an existing consortium specification info-item instance to initiate build-up of the consortium;

cvii. adding a communication info-item instance having zero or more document instances to establish a negotiation for a role and task plan to carry out work needed as participation, with optional adaptation;

cviii. updating an existing consortium instance to bring it current with the live organization it represents;

cix. adding an investment pool specification info-item instance having zero or more role definition instances to establish an organizational design to carry out tasks, with optional adaptation, and having zero or more documentation classes to establish an agreement for participation and set negotiation patterns for obtaining agreement, with optional adaptation;

cx. changing an existing investment pool specification info-item instance;

cxi. changing an existing investment pool specification role info-item instance;

cxii. reporting a change in status for an existing investment pool specification info-item instance, the status type selected from the group of: funding announcement, negotiation step completion, negotiation failure, negotiation success, documentation added, valuation change, ownership change, intellectual property status change, announcement, progress made, termination announcement, personnel change, funding status change, disagreement or dispute regarding reported information, agreement reached, advertisement, involvement in dispute, involvement in legal action, acceptance of investment, offer made to enter investment pool, request made to graduate from investment pool, portfolio change, acceptance of request to graduate from investment pool, and public notice;

cxiii. going live with an existing investment pool specification info-item instance;

cxiv. adding a communication info-item instance having zero or more document instances to establish a negotiation milestone, with optional adaptation;

cxv. updating an existing investment pool instance to bring it current with the live organization it represents;

cxvi. adding an ingesting definition info-item instance optionally with an enrolling of a heuristic software plug-in to perform such ingesting;

cxvii. changing an existing ingesting definition info-item instance with an enrolling of a heuristic software plug-in to perform such ingesting;

cxviii. invoking an ingesting of information into said commonplace;

cxix. changing a description of an info-item;

cxx. changing a property of an info-item; and cxxi. changing an identifier of an info-item.

221. The method of claim 1 to also provide ability to add or change wisdom, wherein:

a. accepting and processing a request to add or change information by at least one interaction selected from the group of:

i. a non-contextually dependent request to add or change information by a command selected from the group of:

01. marking of information by a fxxt;

02. marking of information to be ingested and marked by a fxxt;

03. alteration of a fxxt;

04. adding or altering a map definition;

05. altering a map definition by adding or removing a fxxt reference;

06. altering a map definition by altering the weighting for a fxxt reference;

07. relating an information resource represented by an irxt instance to a ttx;

08. requesting, by a user, changes to information already in said commonplace of information;

09. requesting to ingest a source of data in record form and a sufficient query;

10. requesting to ingest a source of commonality data;

11. requesting to ingest a classification scheme for concepts;

12. requesting to ingest a source of categorizations of concepts;

13. requesting to ingest, from a source of the nature of machine learning, results of sets of similarities involving one or more types selected from the group of: a set of similar documents, a set of similar media objects, a set of similar concept statements, a set of classified documents, a set of classified media objects, a set of classified concept statements, a set of relationships between documents, a set of relationships between media objects, a set of relationships between concept statements;

14. requesting to ingest a query against a source of objects and the objects found wherein the query states by its contents a concept;

15. requesting to ingest that a source of data to be crawled and a sufficient scoping of the crawl, the results to be ingested;

16. executing a query able to produce or refresh a result set of irxts, the irxts to be constructed to represent information resources located at an indicated source external to said commonplace of information;

17. ingesting a data batch of citation rich documentation;

18. requesting removal of an info-item authoritatively by an approved user anticipating that such a request will be considered immediately after appropriate transaction handling;

19. adding a cnxpt instance from a ttx instance where the ttx instance is believed by a user to represent a concept;

20. entering culling commands in manual review to change by elimination, addition, or reordering the items of a result set not related to a cnxpt; and 21. accepting imputations of commonalities as associations, without contextual review of the associations;

and ii. accepting a request by the user to position to a location in a map of said commonplace of information to set a context for adding or changing information and accepting a contextually dependent request to add or change information by a command selected from the group of:

01. adding or altering information conceived of by said user;

02. adding or altering relationships between ttxs added by said user;

03. adding or altering associations between cnxpt instances added or voted on by said user;

04. voting by said user regarding information in said commonplace of information stating a belief of a type selected from the group of: correctness of information, importance of information, similarity between cnxpts within a perspective, and appropriateness of a description;

05. marking of information by a fxxt;

06. relating an information resource represented by an irxt instance to a ttx;

07. relating an information resource represented by an irxt instance to a cnxpt by creating an occurrence;

08. requesting, by a user, changes to information already in said commonplace of information;

09. requesting to ingest a query against a source of objects and the objects found wherein the query states by its contents a concept, the concept considered by the user to be related to a context represented by a cntexxt itself represented by a cnxpt, the concept to be made a cnxpt related to said cntexxt by a new hierarchical association;

10. executing a query able to produce or refresh a result set of irxts, the irxts to be constructed to represent information resources located at an indicated source external to said commonplace of information, the query related to a cnxpt;

11. voting to remove redundant knowledge of the form of a cnxpt, and anticipating that such a vote will be considered subsequently toward removing the knowledge;

12. voting to remove redundant knowledge of the form of an association, and anticipating that such a vote will be considered subsequently toward removing the knowledge;

13. adding a cnxpt instance from a ttx instance where the ttx instance is believed by a user to represent a concept, the concept considered by the user to be related to a context represented by a cntexxt itself represented by a cnxpt, the concept to be made a cnxpt related to said cntexxt by a new hierarchical association;

14. entering culling commands in manual review to change by elimination, addition, or reordering the items of a result set related to a cnxpt;

15. entering culling commands in manual review to change by elimination, addition, or reordering the items of an area of consideration or area of interest;

16. categorizing cnxpts within a perspective by moving cnxpts on a visualization wherein a vote for a new association between two cnxpts occurs when one is dropped onto or put into another, and a vote for changing an association between two cnxpts occurs when one cnxpt is dragged or taken out of a cnxpt serving as a cntexxt wherein the dragged cnxpt was representing a child or set member of the cntexxt;

and 17. accepting imputations of commonality as an association in the destination context of said association;

b. processing the addition or change request by said user: and c. processing any newly added or altered data to update maps, visualizations, result sets, or other artifacts derived from the newly added or altered data.

222. The method of claim 1, to make available investment opportunities for organizations developing technologies related to concepts within a commonplace of information, further comprising:

a. displaying to said user a portion of said organization of knowledge of at least one domain of wisdom according to display and delivery means;

b. forming a connection with a person recently showing knowledge of concepts within a context represented by a cnxpt in one or more phases selected from the group of:

i. connection opportunity offered;

ii. connection requested;

iii. selecting an object of wisdom to act upon;

iv. requesting display of a result set for culling;

v. requesting making contact with a listed person, project consortia, or organization;

vi. requesting purchase of a listed item;

vii. scheduling participation;

viii. requesting investment in a listed project consortia, pool, or organization;

ix. stating an opinion;

x. stating status of a task;

xi. stating interest;

xii. offering an incentive;

xiii. offering a funding incentive;

xiv. requesting vetting information or access to vetting information;

xv. requesting consideration for funding;

xvi. stating an evaluation;

xvii. requesting consideration for pool graduation;

xviii. stating consortia formation;

xix. publicizing for consortia participation;

xx. negotiating for consortia participation;

xxi. negotiating for deliverable acceptance;

xxii. requesting display of a structural view of cntexxts based upon wisdom found;

and xxiii. requesting the navigating to a cntexxt based upon wisdom found;

and c. accepting and processing a user command and effecting changes therefrom, said user command selected from the group of:

i. to view content of said commonplace;

ii. to add or refine content of said commonplace and effect change;

iii. to navigate around a map of said commonplace;

and iv. to request a search for wisdom.

223. The method of claim 1 to provide for searching in a knowledge tool, further comprising:

a. providing method for substantially loading information into the knowledge tool;

b. providing a method for substantially curating information in the knowledge tool, the method selected from the group of:

i. providing method for progressively curating data in continuous quality improvement process;

ii. empowering a diverse user set to curate according to their own expertise, interest, and knowledge;

iii. empowering a diverse user set to curate according to a plurality of their own perspectives;

iv. empowering a diverse user set to curate based upon data combined in multiple ways to expose issues not otherwise visible;

v. empowering a diverse user set to curate based upon data combined to overcome sparsity from overly small set of sources;

and vi. empowering a diverse user set to curate based upon data combined to overcome sparsity a source;

c. providing a user a method to search for a concept in a circumstance selected from the group of:

i. providing a competitive analyst a method to search for competing technologies and determine their relative attributes;

ii. providing a portfolio tool for utilizing crowdsourced valuation information indexed by a custom categorization by a user of ownership information categorized within said commonplace of information, the categorization index optionally based upon work by another user;

iii. providing a product company a method to search for new product acquisitions;

iv. providing a subsumption learning apparatus to users;

v. providing a user a decision tree to lead through a roughly similar situation another user dealt with and tracked;

vi. providing a user a knowledge tool for rapidly understanding an area of knowledge substantially in the manner of learning;

vii. providing a user a knowledge tool for their learning;

viii. providing a user a method to determine a negotiating position in a phased exchange;

ix. providing a user a method to learn from what another person recently realized about a topic;

x. providing a user a method to obtain details regarding a concept;

xi. providing a user a method to obtain details regarding a technology;

xii. providing a user a method to obtain results of analyses by others regarding a concept;

xiii. providing a user a method to obtain results of analyses by others regarding a specific question and a method of assembly of the analysis toward a more complex issue;

xiv. providing a user a method to obtain results of analyses by others regarding a technology;

xv. providing a user a method to obtain results of analyses by others regarding a valuation of a property;

xvi. providing a user a method to obtain results of analyses by others with a collective assessment of the accuracy of the analysis;

xvii. providing a user a method to obtain the quality improvements made by others in the contents of the knowledge tool;

xviii. providing a user a method to participate in a negotiation to obtain a share of ownership in a property;

xix. providing a user a method to participate in a negotiations toward collaborative work;

xx. providing a user a source of ideas deep enough in detail to ensure comparability with an idea a user has in their mind;

xxi. providing a user a source of ideas organized enough to ensure efficiency in a search for a detailed concept a user has in their mind;

xxii. providing a user a source of ideas to improve innovation depth;

xxiii. providing a user a source of ideas to spur innovation in unconsidered directions;

xxiv. providing a user a source of ideas with enough different paths and detail to ensure comparability by each of a set of attributes of an idea that is multi-faceted or has any complexity;

xxv. providing a user a tool for entering a minimum amount of information to attract a following without exposing enough information to explain the topic by use of categorization;

xxvi. providing a user a workflow template to respond to a other party in a collaboration;

xxvii. providing a user a workflow to adopt roughly appropriate for responding to a situation where another user built one;

xxviii. providing a user with automatically harmonized categorizations;

xxix. providing an analyst a method to search for something exciting to discuss;

xxx. providing an automatic expository organization tool for direct use by learners;

xxxi. providing an individual a method to search for a new venture to participate in;

xxxii. providing an inventor a method to place a technology into an auction where bids could be solicited from interested others in a still un-described invention;

xxxiii. providing an inventor a method to search for a technology patently similar to an idea before the idea is exposed;

xxxiv. providing an inventor a method to search for a technology without substantially describing an invention;

xxxv. providing an inventor a method to search for a technology;

xxxvi. providing an investor a method to learn the history of the organization possibly being formed around an invention;

xxxvii. providing an inventor a method for building a track record online for presentation to investors;

xxxviii. providing an investor a method to search for new opportunities;

xxxix. providing an investor or interested purchaser to participate in an intellectual property auction;

xl. providing crowdsourced valuation information indexed by a custom categorization by a user of other information categorized within said commonplace of information, the categorization index optionally based upon work by another user;

xli. providing indexed information categorized within said commonplace of information;

xlii. providing information indexed by a custom categorization by a user of other information categorized within said commonplace of information, the categorization index based upon work by another user;

xliii. providing information indexed by a custom categorization by a user of other information categorized within said commonplace of information;

xliv. providing valuation information indexed by a custom categorization by a user of ownership information categorized within said commonplace of information;

xlv. providing crowdsourced linkage information at great levels of detail between a technology and a technological application context where the technology would satisfy a requirement of the application, each within said commonplace of information;

xlvi. providing crowdsourced competitive information at great levels of detail between a technology and another technology both able to satisfy the requirements of a technological application, each within said commonplace of information;

xlvii. providing crowdsourced timeframe based competitive valuation information at great levels of detail between a plurality of technologies able to satisfy the requirements of a one or more technological applications;

xlviii. comforting a user hitting roadblocks in use;

xlix. triggering a user to shift to slow thinking for concentrating on an area where interest, by user or others, is high in new analysis of detailed material;

l. inspiring a user during use, buy a method selected from the group of:

01. spurious information display for triggering concept associating;

02. wake-up triggers to reduce over-concentration; and 03. breaking the continuity field of a user;

li. providing a user a knowledge tool for marking a detailed context about being an idea that may be of interest without describing the idea further to obtain an understanding of interest in the idea;

lii. providing a user a knowledge tool for marking a detailed context without describing the idea further as being an idea of interest to attract solutions matching the categorization surrounding the context;

liii. providing a user a knowledge tool for marking a detailed context without describing the idea further as being an idea that would probably be a solution for a technological application of interest to attract solutions matching the categorization surrounding the context and fulfilling requirements of the application;

liv. providing a user a knowledge tool for marking a detailed context in a plurality of categorizations, all said markings referring to the same idea without describing the idea further as being an idea that would probably be a solution for a technological application of interest to attract solutions matching the categorizations surrounding all of the said markings and fulfilling requirements of the application;

lv. providing a user a knowledge tool for marking a detailed context in one or more of a plurality of technical functional categorizations, all said markings referring to the same idea without describing the idea further as being an idea that would probably be a solution for a technological application to state an innovation;

lvi. providing a user a knowledge tool for marking a detailed context in one or more of a plurality of technical functional categorizations, all said markings referring to the same idea without describing the idea further as being an idea that would probably be a solution for a technological application to state an innovation and to form into an application substantially of the nature of a non-provisional patent application the contexts wherein the markings are made plus one sentence stating an innovation not stated as a description in the knowledge tool;

lvii. providing a user a knowledge tool for marking a detailed context in one or more of a plurality of technical functional categorizations, all said markings referring to the same idea without describing the idea further as being an idea that would probably be a solution for a technological application to state an innovation and to identify its prior art without regard to how distant into the future the applicability of the prior art would be before it became pertinent to the idea;

and lviii. triggering a user to shift to fast thinking for increased readiness for creativity;

d. providing a user a method to collaborate in a circumstance selected from the group of:

i. obtaining and categorizing information;

ii. curation of entered information;

iii. indexing of information;

iv. building a model for determining the expectation of profitability timeframe;

v. running causality networks to project where technology was going and how an idea would match requirements of the applications of the future;

vi. predicting whether a business of an inventor could serve as a sufficiently strong development group based upon its collected business progress record;

vii. plan how an invention would be made competitive;

viii. plan how an invention would be integrated into a product line;

ix. forming estimates of cost of functionality;

x. forming estimates of product timing and rollout;

xi. curation of categorizations;

xii. improvement of searches of external sources and subsequent indexing;

xiii. harmonization of categorizations;

xiv. determining if an invention would be a good earner in the portfolio of an investor;

xv. securely and anonymously messaging by linking by a concept to show interest or seek information;

xvi. securely and anonymously negotiating with potential contributors to conduct information exchanges and signing agreements;

xvii. determining if an invention would be a good earner in a product portfolio;

xviii. ingesting patent and research paper files;

and xix. crowdsourced machine learning supervision;

e. providing crowdsourced data of a type selected from the group of:

i. providing crowdsourced valuation information at great levels of detail indexed by a custom categorization of technological application contexts based upon information selected from the group of:

01. interest in the applications of the technology shown in the past;

02. interest shown in the applications of the technology on a projective basis over a large number of years into the future;

03. interest shown by investors;

04. the stages of development of products satisfying the applications;

05. the competitive postures of products satisfying the applications;

06. interest shown by foreign engineers;

07. estimates on precursor applications;

and 08. estimates on precursor technologies;

ii. with categorizations harmonized automatically and dynamically when accessed;

iii. results of machine learning;

iv. results of performing statistical analysis;

v. results of performing econometric analysis;

vi. requests for technology;

vii. collaborative strategic analysis;

viii. requests for intellectual property;

ix. found disclosures of intellectual property;

and x. comments regarding technology on social websites;

and f. providing a method for obtaining data of a type selected from the group of:

i. monitoring offers for sale or assignment of intellectual property;

ii. monitoring product companies offering their technologies for sale;

iii. monitoring open strategic analysis;

iv. monitoring tracking efforts regarding intellectual property by owners;

v. performing econometric analysis;

vi. automated search updates;

vii. crawling the web;

viii. ingesting patent and research documents;

ix. from associations wishing to sell their data for analysis;

x. performing machine learning;

xi. performing statistical analysis;

and xii. monitoring failed searches.

224. The method of claim 1 to allow a user to act upon the information in the commonplace by using a map, further including:

a. accepting and processing zero or more user commands according to low level procedure models for use cases means, said command selected from the group of:

i. to add a category by adding a new context that is more accurate for the focus sought by subdividing the context;
ii. to remove a category;
iii. to create or delete a cnxpt;
iv. to create or delete a community txo occurrence relationship;
v. to create or delete a comxo info-item;
vi. to create or delete a custom affinitive association;
vii. to create or delete a custom hierarchical association;
viii. to create or delete a data set;
ix. to create or delete a direct information resource citation relationship;
x. to create or delete a fxxt;
xi. to create or delete a goal;
xii. to create or delete a map;
xiii. to create or delete a product info-item;
xiv. to create or delete a query info-item;
xv. to create or delete a query step specification;
xvi. to create or delete a register information request;
xvii. to create or delete a result set;
xviii. to create or delete a source;
xix. to create or delete a subject identifier occurrence relationship;
xx. to create or delete a trait relationship info-item occurrence relationship;
xxi. to create or delete a ttx citation association;
xxii. to create or delete a txo from a result set;
xxiii. to create or delete a user interest vote;
xxiv. to create or delete a user satisfaction vote;
xxv. to create or delete a user interest txo occurrence relationship;
xxvi. to create or delete an info-item;
xxvii. to create or delete an information resource citation relationship;
xxviii. to create or delete an irxt;
xxix. to create or delete an occurrence;
xxx. to create or delete an offer;
xxxi. to create or delete and position a cnxpt;
xxxii. to create or delete a visualization;
xxxiii. to create or delete an information item and occurrence;
xxxiv. to add wisdom;
xxxv. to add or change a description to a cnxpt;
xxxvi. to add a result set member to a cnxpt;
xxxvii. to add a result set member to a goal;
xxxviii. to add an information item and occurrence to a cnxpt;
xxxix. to assign an identity indicator to a cnxpt;
xl. to attach or detach a query info-item to a cnxpt;
xli. to attach or detach a query info-item to a goal;
xlii. to attach or detach a query to a cnxpt as children;
xliii. to attach or detach a query to a cnxpt as parents;
xliv. to attach or detach a query to a cnxpt as siblings;
xlv. to attach or detach a query to a goal;
xlvi. to attach or detach a result set info-item to a cnxpt;
xlvii. to attach or detach a result set info-item to a goal;
xlviii. to attach or detach a result set to a cnxpt as children;
xlix. to attach or detach a result set to a cnxpt as parents;
l. to attach or detach a result set to a cnxpt as siblings;
li. to attach or detach a result set to a goal as children;
lii. to attach or detach a result set to a goal as parents;
liii. to attach or detach a result set to a goal as siblings;
liv. to detach two info-items;
lv. to finalize a goal into a cnxpt;
lvi. to finalize a query for a cnxpt;
lvii. to name or rename an info-item;
lviii. to name or rename a visualization;
lix. to connect by a relationship info-item a first and a second cnxpt;
lx. to convert a data set to a result set;
lxi. to convert a result set to an area;
lxii. to convert a search or findall to a query;
lxiii. to convert a selection set to a result set;
lxiv. to convert an area to a result set;
lxv. to position a cnxpt;
lxvi. to alter a category;
lxvii. to categorizing a concept by causing a first cnxpt to become a member of the cntexxt of a second cnxpt;
lxviii. to categorizing a concept by fuzzy categorization by expressing personal indecision while causing a first cnxpt to become a member of the cntexxt of a second cnxpt with a fuzziness;
lxix. to remove a first cnxpt from membership in a cntexxt;
lxx. to specify information regarding an info item;
lxxi. to navigate between cnxpts;
lxxii. to search for wisdom;
lxxiii. to search for a concept represented by a cnxpt shown or not shown in the map;
lxxiv. to focus on a specific concept;
lxxv. to focus on an unspecified different concept;
lxxvi. to search associatively by navigating between cnxpts;
lxxvii. to focus on a specific dxo; and
lxxviii. to request a different organization of knowledge;

wherein any addition, change, or deletion may affect stigmergy and is an addition of wisdom affecting said consensus.

225. The method of claim 1 to empower a user to act upon information in the commonplace by using a map interface to locate a context representing said information, further comprising:

a. accepting a command selected from the group of:
   i. command to initiate display of a map visualization for a predetermined depiction;
   ii. command to initiate display of different subject matter for generating a predetermined depiction;
   iii. command to locate a cntexxt;
   iv. command to locate a cnxpt;
   v. command to locate an association;
   vi. command to select a cntexxt to ready it for an action;
   vii. command to select a cnxpt to ready it for an action;
   viii. command to display information regarding a cntexxt;
   ix. command to display information regarding a cnxpt;
   x. command to change information regarding the cnxpt;
   xi. command to highlight on the display those cnxpts similar to a selected cnxpt in a predetermined measure of similarity;
   xii. command to display a list of information resources relevant to a cnxpt;
   xiii. command to vote that a first cnxpt instance should be a child of a second cnxpt instance in a specific map by voting that an association should exist;
   xiv. command to vote that a first cnxpt instance should not be a child of a second cnxpt instance in a specific map by voting that an association should exist;

xv. command to vote that a first cnxpt instance should be considered more similar to a second cnxpt instance in a specific map by voting that an association should exist but have a higher strength weighting;

xvi. command to vote that a first cnxpt instance should be considered less similar to a second cnxpt instance in a specific map by voting that an association should exist but have a lower strength weighting;

xvii. command to display information regarding the association between a first cnxpt and a second cnxpt; and xviii. command to change information regarding the association between a first cnxpt and a second cnxpt;

b. processing the entered command to focus on the context represented by a located cnxpt;

c. processing the entered command to act on said information of the cntexxt represented by the located cnxpt; and d. returning control to the user.

whereby a command causes a refocusing of a map instance to a context and then operate on information of the context.

226. The method of claim 1, by executing stored instructions that perform mapping operations to cause the computer system to locate wisdom sought, further including:

a. providing at least one invocation procedure to obtain wisdom, of a sequencing selected from the group of:

i. procedure for obtaining wisdom yielding a list of at least one cnxpt into a derived ontology, the procedure then initiating formation of a map from a map definition referencing a set of zero or more fxxts, wherein the procedure is of a type selected from the group of:

01. a search procedure for obtaining content for at least one domain of wisdom by one or more searches yielding a list of at least one cnxpt, the procedure then initiating a map formation procedure for a pre-determined map definition and passing the search results to the map formation procedure, wherein the searches are defined prior to invocation of said procedure for obtaining content, the assignment of formed map definition to search determined prior to invocation of said procedure for obtaining content; and 02. a search procedure for obtaining content for at least two domains of wisdom by two or more searches yielding at least two lists of at least one cnxpt, the procedure then initiating a map formation procedure for each of at least two pre-determined map definitions and passing at least one of said at least two lists of at least one cnxpt as search results to each of the map formation procedures for each of at least two pre-determined map definitions for building said pre-determined map definitions, wherein the searches are defined prior to invocation of said procedure for obtaining content, the assignment of map definition to search determined prior to invocation of said procedure for obtaining content;

ii. auxiliary procedure for obtaining content for zero or more domains of wisdom by performing one or more searches each yielding a list of zero or more cnxpts and zero or more associations, the auxiliary procedure invokable by a map formation procedure, the auxiliary procedure referencing a set of zero or more fxxts, the result of the auxiliary procedure added into a derived ontology;

iii. follow procedure obtaining content for a domain of wisdom having a list of zero or more cnxpts and zero or more associations by invoking a connection to a map already formed to follow activity of that formed map, wherein the activity is of a type selected from the group of:

01. one or more changes are made in a map controlled by one or more other users;

02. one or more opinions are given in a predefined map having accessible comments;

03. a tour is given in a predefined map;

04. an explanation is given in a predefined map having accessible comments, the comments providing descriptions;

05. an accessible dialog is present for viewing in a map created previously;

06. an accessible dialog is present for viewing in a map currently controlled by one or more other users;

07. a story is given in a predefined map having dynamic content, the content augmented by predefined description;

and 08. a story is given in a predefined map having a tour, the tour augmented by predefined description;

iv. interconnect procedure obtaining content for a domain of wisdom having a list of zero or more cnxpts and zero or more associations by performing a connection to a map already formed to interact with that map;

v. research procedure for obtaining related information resources by an interactive request for collection under a topic represented by a parent ttx, the interactive request made to a search tool, the results of a type selected from the group of:

01. a result set attached to the parent ttx, the result set items attached to the ttx as occurrences;

02. a set of child ttxs fitted into the parent ttx, each child ttx representing a cluster for a subtopic of the topic represented by the parent ttx, the clusters determined from a clustering partitioning of a set of information resources automatically generated for grouping the information resources into topical clusters, each information resource in the set clustered associated with only one topical cluster, each information resource member found to be in a first cluster for a first topic represented by a first ttx listed in a result set attached to the first ttx representing the first topic of the first cluster, each information resource listed as a result set item in the first result set attached to the first ttx attached as an occurrence to the first ttx representing the first topic of the first partition;

03. a set of child ttxs fitted into the parent ttx, each child ttx representing a partition for a subclass of the class represented by the parent ttx, the partitions determined from a partitioning of a set of information resources automatically generated for grouping the information resources into class-based partitions, each partition representing a subclass of the class of the parent ttx, each information resource in the set partitioned associated with only one class-based partition, each information resource member found to be in a first partition for a first topic represented by a first ttx listed in a first result set attached to the first ttx representing the first topic of the first partition, each information resource listed as a result set item in the first result set attached to the first ttx attached as an occurrence to the first ttx representing the first topic of the first partition;

04. a set of child ttxs fitted into the parent ttx, each child ttx representing a setoid for a subset of the set represented by the parent ttx, the setoids determined from a partitioning of a set of information resources automatically generated for grouping the information resources into setoids, each setoid representing a subset of the set of the parent ttx, each information resource in the set partitioned associated with at least one setoid, each information resource member found to be in a first setoid for a first class represented by a first ttx listed in a first result set attached to the first ttx representing the first class of the first setoid, each information resource listed as a result set item in the first result set attached to the first ttx attached as an occurrence to the first ttx representing the first class of the first partition, the degree to which the information resource is associated with the first setoid retained with the occurrence;

05. a set of child ttxs fitted into the parent ttx, each child ttx representing a fuzzy cluster for a subtopic of the topic represented by the parent ttx, the fuzzy clusters determined from a fuzzy clustering of a set of information resources automatically generated for grouping the information resources into topical fuzzy clusters, each fuzzy cluster representing a subtopic of the topic of the parent ttx, each information resource in the set fuzzy clustered associated with at least one topical fuzzy cluster, each information resource member found to be in a first fuzzy cluster for a first topic represented by a first ttx listed in a result set attached to the first ttx representing the first topic of the first fuzzy cluster, each information resource listed as a result set item in the first result set attached to the first ttx attached as an occurrence to the first ttx representing the first topic of the first partition, the degree to which the information resource is associated with the first fuzzy cluster retained with the occurrence;

06. a set of child ttxs representing information resource clusters fitted into the parent ttx, the clusters determined from a hierarchical clustering partitioning of a set of information resources automatically generated for grouping the information resources into topical clusters, each deeper hierarchical cluster representing a subtopic of its parent cluster, each information resource in the set clustered associated with only one topical cluster, each root of the hierarchical clustering forest represented by a child ttx fitting directly into the parent ttx and representing the topic of the root and the collection of deeper subtopic clusters included in the tree of the forest under the root, each deeper hierarchical cluster represented by a subtopic ttx fit into the ttx representing the parent topic of the subtopic, each information resource member found to be in a first cluster for a first topic represented by a first ttx listed in a result set attached to the first ttx representing the first topic of the first cluster, each information resource listed as a result set item in the first result set attached to the first ttx attached as an occurrence to the first ttx representing the first topic of the first partition;

07. a set of child ttxs representing information resource partitions fitted into the parent ttx, the partitions determined from a hierarchical partitioning of a set of information resources automatically generated for grouping the information resources into topical partitions, each deeper hierarchical partition representing a subtopic of its parent partition, each information resource in the set partitioned associated with only one topical partition, each root of the hierarchical partitioning forest represented by a child ttx fitting directly into the parent ttx and representing the topic of the root and the collection of deeper subtopic partitions included in the tree of the forest under the root, each deeper hierarchical partition represented by a subtopic ttx fit into the ttx representing the parent topic of the subtopic, each information resource member found to be in a first partition for a first topic represented by a first ttx listed in a first result set attached to the first ttx representing the first topic of the first partition, each information resource listed as a result set item in the first result set attached to the first ttx attached as an occurrence to the first ttx representing the first topic of the first partition;

08. a set of child ttxs representing information resource setoids fitted into the parent ttx, the setoids determined from a hierarchical partitioning of a set of information resources automatically generated for grouping the information resources into class-based setoids, each deeper hierarchical setoid representing a subclass of its parent setoid, each information resource in the set partitioned associated with at least one class-based setoid, each root of the hierarchical partitioning forest represented by a child ttx fitting directly into the parent ttx and representing the class of the root and the collection of deeper subclass setoids included in the tree of the forest under the root, each deeper hierarchical setoid represented by a subclass ttx fit into the ttx representing the parent class of the subclass, each information resource member found to be in a first setoid for a first class represented by a first ttx listed in a first result set attached to the first ttx representing the first class of the first setoid, each information resource listed as a result set item in the first result set attached to the first ttx attached as an occurrence to the first ttx representing the first class of the first partition, the degree to which the information resource is associated with the first setoid retained with the occurrence;

and 09. a set of child ttxs representing information resource fuzzy clusters fitted into the parent ttx, the fuzzy clusters determined from a hierarchical fuzzy clustering of a set of information resources automatically generated for grouping the information resources into class-based fuzzy clusters, each deeper hierarchical fuzzy cluster representing a subclass of its parent fuzzy cluster, each information resource in the set fuzzy clustered associated with at least one class-based fuzzy cluster, each root of the hierarchical fuzzy clustering forest represented by a child ttx fitting directly into the parent ttx and representing the class of the root and the collection of deeper subclass fuzzy clusters included in the tree of the forest under the root, each deeper hierarchical fuzzy cluster represented by a subclass ttx fit into the ttx representing the parent class of the subclass, each information resource member found to be in a first fuzzy cluster for a first topic represented by a first ttx listed in a result set attached to the first ttx representing the first topic of the first fuzzy cluster, each information resource listed as a result set item in the first result set attached to the first ttx attached as an occurrence to the first ttx representing the first topic of the first partition, the degree to which the information resource is associated with the first fuzzy cluster retained with the occurrence;

and vi. fxxt resolution procedure for obtaining content for one domain of wisdom by performing a resolution for one fxxt specification stated in the map definition, the fxxt-resolution procedure yielding derived ontology containing a list of zero or more cnxpts and zero or more associations;

whereby variations of the invocation of maps allow for spawning other maps, expanded collection methods for wisdom, and ability to generate multi-forest and multi-purpose maps.

227. The method of claim 1 to also provide searching after map instantiation to locate wisdom sought, further including:

a. providing at least one procedure to locate wisdom yielding a list of at least one cnxpt into a derived ontology, wherein the procedure may then supply the basis wisdom for the formation of a map from a map definition referencing a set of zero or more fxxts, wherein the formation of the map is initiated after the basis wisdom is collected, wherein the procedure is of a type selected from the group of:

i. using result, where result is not empty, of a search where the criteria is provided by a document's contents for concept mapping and the search by document yields a list of at least one cnxpt to which the document is relevant to a degree greater than a pre-defined number;

ii. using result, where result is not empty, of a search where the criteria is provided by the contents of a set of documents for concept mapping and the search by documents yields a list of at least one cnxpt to which the documents are relevant to a degree greater than a pre-defined number based upon the combined relevance of the set of documents to each cnxpt;

iii. using the set of cnxpts defined to be in a story where story is established from an ordered list of at least one cntexxt represented by one cnxpt, the search for content of the map specified by the story;

iv. using the set of cnxpts defined to be in a directed graph where the directed graph is established from cnxpts representing tasks in a task plan, the search for content of the map specified by the plan;

v. using the set of cnxpts defined to be in a directed graph where the directed graph is established from cnxpts representing nodes in a flow, the search for content of the map specified by the flow;

vi. using the set of cnxpts defined to be in a directed graph where the directed graph is established from cnxpts representing nodes and association relating the cnxpts stating a precedence;

vii. using the result of a search yielding at least one cnxpt, the result passed into the map formation procedure;

viii. using fxxt specification stated in map definition to determine wisdom to be used to form content of a domain of wisdom;

and b. providing zero or more procedures to accept search criteria to locate wisdom;

c. activating zero or more procedures to accept zero or more search criteria to locate wisdom;

d. accepting zero or more search criteria to locate wisdom;

e. specifying at least one procedure to locate wisdom based upon search criteria received;

f. presenting zero or more result sets for culling by the user, wherein the result set as finalized by user and accepted is placed into a derived ontology;

g. activating the at least one procedure to locate wisdom parameterized by the zero or more search criteria to locate wisdom to obtain a first domain of wisdom into a derived ontology;

h. determining zero or more second domains of wisdom by activating a second of the at least one procedure to locate wisdom parameterized by the zero or more search criteria to locate wisdom into a derived ontology;

i. accepting zero or more commands to select a map definition and zero or more stated parameters to further specify a map based upon said map definition, said zero or more commands to select said map definition and zero or more stated parameters for said map termed a map instantiation specification;

and j. forming a map instance from the derived ontology and said map instantiation specification;

whereby one or more domains of knowledge are structured to become useful for a new map; whereby a map definition stating fxxt utilizations serves as a receiving vehicle for one or more domains of knowledge passed to it; whereby a unified search structure is provided so that a user may obtain wisdom into a first map ready for further use, the map depicting a perspective of the wisdom sought.

228. The method of claim 227 to also provide for tuning a map to a subjective perspective of of a user, further including:

a. determining identity of subsets of votes in wisdom located in said first domain of wisdom and said zero or more second domains of wisdom for which subjectivity is to be weighted by forming subsetting definitions formed from division intersection specifications whose elements are selected from the group of: voting user identity, voting user organization identity, aggregation identity assigned to voting user, source identity, fxxt identity, info-item type, info-item attribute, info-item trait, info-item purpose, info-item relevance, time period of data collection from source, info-item creation time period, purlieu, location, info-item time period for a trait, info-item modification time period, membership in aggregate, membership in defined subset of aggregate, membership in organization, membership in defined subset of organization, degree of veracity, degree of presence of trait, descriptive attribute categorical division, and descriptive attribute value range, and zero or one group holding votes not in a defined disjoint sub set;

b. accepting a subjectivity factor coefficient for weighting the votes of the identified disjoint subsets for which subjectivity is to be weighted;

c. accepting a subjectivity factor coefficient for weighting the votes of said zero or one group holding votes not in a defined disjoint subset;

d. forming, prior to map generation, a grouping of all votes found to be considered during map generation, each group identified by the identity of the disjoint subset of votes the group is composed from, or a default identity for said zero or one group holding votes not in a defined disjoint subset;

e. determining, prior to map generation, for each group identity, the pre-determined default factor coefficient vote strengths that would be utilized in the generating of a map instance from said map definition if all votes were being weighted without regard to differentiated subjectivity as given by a value selected from the group of: the value one, said subjectivity factor coefficient for weighting the votes of said zero or one group holding votes not in a defined disjoint subset, and a pre-defined value serving as a default;

f. determining, prior to map generation, for each group identity, according to the pre-determined algorithm for combining the default factor coefficient and the accepted subjectivity factor coefficient, a per group weighting factor coefficient for application to vote strengths for the votes in each group;

g. determining, for all votes in a group, the final per vote strength by multiplying the raw vote strength by the per group weighting factor coefficient for application to vote strengths for the votes in the group for utilization in the generating of a map instance from said map definition;

h. forming a map instance from said map definition;

whereby a map may be personalized to show a subjective perspective of the data in the domain of wisdom; whereby the effect of subjectivity, expertise, or differentiated sources may be set for a map toward examination of a known perspective regarding the domains of wisdom of the map; whereby belief strengths may be increased, decreased, aggregated, or disaggregated voting strengths may be set to allow generation of perspective specific maps by equal consideration, expert aggregation, aggregation by each of a set of disagreeing camps, personal prerogative, departmental consensus, party-line, trusted source specific, un-trusted source specific, time-varying opinion, subjective, and as a default the egalitarian objective perspective maps may be generated for use and inter-comparison.

229. The method of claim 1 to also provide for searching during fxxt extraction to locate wisdom sought, further including:

a. providing at least one auxiliary procedure to locate wisdom wherein the procedure may be invoked by a map formation procedure, the auxiliary procedure specified in the map definition, the map definition referencing a set of zero or more fxxts, the result of the auxiliary procedure placed into a derived ontology, wherein the procedure is of a type selected from the group of:

i. using result, where result is not empty, of a search where the criteria is provided by a document's contents for concept mapping and the search by document yields a list of at least one cnxpt to which the document is relevant greater than a pre-defined degree;

ii. using result, where result is not empty, of a search where the criteria is provided by the contents of a set of documents for concept mapping and the search by documents yields a list of at least one cnxpt to which the documents are relevant to a degree greater than a pre-defined number based upon the combined relevance of the set of documents to each cnxpt;

iii. using the set of cnxpts defined to be in a story where story is established from an ordered list of at least one cntexxt represented by one cnxpt, the story specified in the context search specification of map definition, the search for content of the map specified by the story;

iv. using the set of cnxpts defined to be in a directed graph where the directed graph is established from cnxpts representing tasks in a task plan, the plan specified in the context search specification of map definition, the search for content of the map specified by the plan, the search performed external to map formation procedure, the result used to initiate the map formation procedure;

v. using the set of cnxpts defined to be in a directed graph where the directed graph is established from cnxpts representing tasks in a task plan, the plan specified in the context search specification of map definition, the search for content of the map specified by the plan, the search performed internal to map formation procedure;

vi. using the set of cnxpts defined to be in a directed graph where the directed graph is established from cnxpts representing nodes in a flow, the plan specified in the context search specification of map definition, the search for content of the map specified by the flow, the search performed external to map formation procedure, the result used to initiate the map formation procedure;

vii. using the set of cnxpts defined to be in a directed graph where the directed graph is established from cnxpts representing nodes in a flow, the flow specified in the context search specification of map definition, the search for content of the map specified by the flow, the search performed internal to map formation procedure;

viii. using result of a search yielding at least one cnxpt, the search performed external to map formation procedure, the result passed into the map formation procedure;

ix. using result of a search yielding at least one cnxpt, the search specified in the context search specification of map definition, the search performed internal to map formation procedure;

and x. using fxxt specification stated in map definition to determine wisdom to be used to form content of a domain of wisdom;

b. accepting zero or more commands to select said map definition and zero or more stated parameters to further specify a map based upon said map definition, said zero or more commands to select said map definition and zero or more stated parameters for said map termed a map instantiation specification;

c. forming a map instance from said map instantiation specification;

d. providing zero or more procedures to process search criteria of map instantiation specification to locate wisdom;
e. specifying at least one procedure to locate wisdom;
f. activating zero or more procedures to accept zero or more search criteria to locate wisdom;
g. accepting zero or more search criteria to locate wisdom;
h. activating the at least one procedure to locate wisdom parameterized by the zero or more search criteria to locate wisdom to obtain a first domain of wisdom;
i. determining zero or more second domains of wisdom by activating a second of the at least one procedure to locate wisdom parameterized by the zero or more search criteria to locate wisdom;
j. accepting zero or more commands to select a first domains of wisdom and zero or more second domains of wisdom to form a map definition;
and whereby one or more domains of knowledge are structured to become useful as wisdom available; whereby a map definition stating fxxt utilizations serves as a specification vehicle for defining one or more domains of knowledge; whereby a map definition serves as a holder of a user's search request for generation of a map showing one or more domains of knowledge; whereby the search for information to satisfy the purpose of a map is detailed in a map definition by stating search criteria for a first and possibly subsequent domains of knowledge; whereby a unified search structure is provided so that a user may obtain wisdom into a first map ready for further use, the map depicting a perspective of the wisdom sought.

230. The method of claim 1 to also provide context searching by search specification to locate a context to center presentation on within a map, further including:
a. forming a map instance from a map definition;
b. determining a default first context containing a set of at least one cntexxt of said map instance;
c. providing at least one procedure to utilize context search specification for locating a context in a map instance, of a type selected from the group of:
i. using result, where result is not empty, of a search where the criteria is provided by a document's contents for concept mapping and the search by document yields a list of at least one cnxpt to which the document is relevant greater than a pre-defined number, the search performed external to map formation procedure, the result used to initiate the map formation procedure;
ii. using result, where result is not empty, of a search where the criteria is provided by the contents of a set of documents for concept mapping and the search by documents yields a list of at least one cnxpt to which the documents are relevant to a degree greater than a pre-defined number based upon the combined relevance of the set of documents to each cnxpt, the search performed external to map formation procedure, the result used to initiate the map formation procedure;
iii. using result, where result is not empty, of a search where the criteria is provided by a document's contents for concept mapping and the search by document yields a list of at least one cnxpt to which the document is relevant greater than a pre-defined number, the search specified in the context search specification of map definition, the search performed internal to map formation procedure;
iv. using result, where result is not empty, of a search where the criteria is provided by the contents of a set of documents for concept mapping and the search by documents yields a list of at least one cnxpt to which the documents are relevant to a degree greater than a pre-defined number based upon the combined relevance of the set of documents to each cnxpt, the search specified in the context search specification of map definition, the search performed internal to map formation procedure;
v. using first cntexxt in a story where the story is established from an ordered list of at least one cntexxt, the story specified in the context search specification of map definition, the search for content of the map specified by the story, the search performed internal to map formation procedure, the story initiated at first cntexxt upon map initiation;
vi. using result of a search yielding at least one cnxpt, the search performed external to map formation procedure, the result passed into the map formation procedure, but where result is empty use default context represented by at least one cntexxt;
vii. using result of a search yielding at least one cnxpt, the search specified in the context search specification of map definition, the search performed internal to map formation procedure, but where result is empty use default context represented by at least one cntexxt;
and
viii. using default context represented by at least one cntexxt where context search specification calls for direct use of default context;
d. activating the at least one procedure to utilize context search specification for locating a context in said map instance;
and
e. determining a first context represented by a cntexxt of said map instance for display according to the at least one procedure to utilize context search specification;

whereby a first focusing of a map to a context represented by an area or a cntexxt of a map instance is determined.

231. The method of claim 230 to also provide for changing a context to a requested alternative domain of knowledge, further including:
a. accessing the map specifying an organization of knowledge;
b. accepting a map definition specification request for one or more second organizations of knowledge;
c. generating a map instance containing said one or more second organizations of knowledge;
d. determining, for each of said one or more second organizations of knowledge, a default second cnxpt as the cntexxt to focus on in said map instance containing said one or more second organizations of knowledge;
and
e. presenting for use said map instance containing said one or more second organizations of knowledge;

whereby one or more subsequent maps containing revised perspectives on wisdom sought are made ready for further use.

232. The method of claim 230 to also provide flexible selection of a subsequent context in a map instance, further including:
a. providing at least one procedure to locate a subsequent context in said map instance, of a type selected from the group of:

i. accepting zero or more navigation commands stating a different cnxpt representing an alternative context selection, of a type selected from the group of:

01. using highest ranked result, where result is not empty, of a search where the criteria is provided by a document's contents for concept mapping and the search by document yields a list of at least one cnxpt to which the document is relevant wherein the list of cnxpts is ranked by the degree of relevance, the search performed external to map formation procedure, the result used to initiate the map formation procedure;

02. using highest ranked result, where result is not empty, of a search where the criteria is provided by the contents of a set of documents for concept mapping and the search by documents yields a ranked list of at least one cnxpt based upon the combined relevance of the set of documents to each cnxpt, the search performed external to map formation procedure, the result used to initiate the map formation procedure;

03. using highest ranked result, where result is not empty, of a search where the criteria is provided by a document's contents for concept mapping and the search by document yields a list of at least one cnxpt to which the document is relevant wherein the list of cnxpts is ranked by the degree of relevance, the search specified in the context search specification of map definition, the search performed internal to map formation procedure;

04. using highest ranked result, where result is not empty, of a search where the criteria is provided by the contents of a set of documents for concept mapping and the search by documents yields a ranked list of at least one cnxpt based upon the combined relevance of the set of documents to each cnxpt, the search specified in the context search specification of map definition, the search performed internal to map formation procedure;

05. using next cntexxt in story, where a next cntexxt is given, where story is established from an ordered list of at least one cntexxt, the story specified in the context search specification of map definition, the story progression determined by navigation controls;

and 06. using first cntexxt in story where story is established from an ordered list of at least one cntexxt, the story specified in the context search specification of map definition, the story initiated at first cntexxt upon map visualization initiation;

and ii. accepting search criteria from one or more commands to specify an alternative search strategy for context selection, termed a secondary context search specification, for locating a context in said map instance, of a type selected from the group of:

01. using result, where result is not empty, of a search yielding at least one cnxpt, the search performed external to map formation procedure, the result returned into the map formation procedure;

02. using result, where result is not empty, of a search yielding at least one cnxpt, the search performed external to map formation procedure, the result returned into the map formation procedure;

03. using result, where result is not empty, of a search yielding at least one cnxpt, the search specified in the context search specification of map definition, the search performed internal to map formation procedure;

04. using result, where result is not empty, of a search yielding at least one cnxpt, the search specified in the context search specification of map definition, the search performed internal to map formation procedure;

and 05. using default context represented by at least one cnxpt where context search specification calls for direct use of default context;

b. activating the at least one procedure to locate a subsequent context in said map instance;

and c. determining, from the result given by the at least one procedure to locate a subsequent context in said map instance, a next context represented by a cntexxt for the proper focusing in said map, the scope of specification of the context selected from the group of:

i. an identity of at least one cnxpt of said map instance;

ii. an identity of an area of consideration comprised of at least one cnxpt of said map instance;

iii. an identity of an area of interest comprised of at least one cnxpt of said map instance;

iv. a position from which the objects of the context are to be observed when the visualization is next presented to a user to view the context;

v. zero or more comments to be viewable by a user near the context when the visualization is next presented to a user to view the context;

vi. zero or more sounds to be available to the user for playing when the visualization is next presented to a user to view the context;

vii. zero or more vocalizations to be available for playing to the user when the visualization is next presented to a user to view the context;

viii. zero or more explanations to be viewable by a user near the context when the visualization is next presented to a user to view the context;

ix. zero or more parameters for zero or more viewports to be used to hold the one or more portions of the visualization next presented to a user to view the context or to present additional text, sounds, or other related information;

x. zero or more parameters for zero or more areas of the zero or more viewports to be used to hold the one or more portions of the visualization, the parameters stating the coloration of the one or more portions of the viewports next presented to a user to view the context;

and xi. zero or more parameters for zero or more areas of the zero or more viewports to be used to hold the one or more portions of the visualization, the parameters stating the additional text, sounds, or other related information to be displayed in the one or more portions of the viewports next presented to a user to view the context;

whereby a change of context to show a subsequent frame of reference may be specified by a user.

233. The method of claim 230 to also present a different conceptual context within a map, further including:

a. accepting a definition of a knowledge model comprising a set of zero or more fxxts based on information stored regarding at least the concept relating to the context, the information stored comprising one or more cnxpts and zero or more associations;

b. accepting a map definition specifying use of said set of zero or more fxxts based on information stored regarding at least the concept relating to the context, to create a map instance of type selected from the group of: tree, decision tree, forest, and Bayesian network; or other hierarchical organization of knowledge; and c. generating, using said map definition, a map instance, the map instance having cnxpts in cntexxts representing contexts;

d. accepting from a user an instigation to change the context the map instance is focused on selected from the group of:

i. accepting a navigation by a user from one context represented by a cntexxt in the map to a different cntexxt; and ii. accepting a search query by a user causing a movement from one context represented by a cntexxt in the map to a different cntexxt;

whereby the map shows a context around a concept.

234. The method of claim 1 to also provide a visualization of a map holding wisdom sought, further including:

a. forming a map instance from said map instantiation specification;

b. determining a visualization of said map instance;

c. determining a context of said map instance for centering display; and d. presenting said visualization of said map instance to said user;

whereby a map instance is made into a visible user interface for a user.

235. The method of claim 1 to also provide for changing a context to an alternative context in a map instance, further including:

a. accepting a cnxpt locating command to select a second cnxpt presented as a subsequent cntexxt of wisdom;

b. repositioning, according to said locating command, said organization of knowledge to a second concept represented by said second cnxpt as a result of locating command;

whereby a subsequent focusing of a map to a context represented by an area or a cntexxt of a map instance is determined.

236. The method of claim 1 to also provide flexible selection of a subsequent context in a map instance to present, further including:

a. accepting zero or more cnxpt locating commands to determine the subsequent cntexxt to present, with any stated additional specification, to select a subsequent first cnxpt presented as a subsequent cntexxt of wisdom by operation of a process selected from the group of: according to ideation means, according to finding and searching and query and retrieval means, according to goal based searching means, according to selection set management means, according to focus on information means, and according to alter information through visualization means; said zero or more cnxpt locating commands selected from the group of:

i. selecting by default said default first cnxpt;

ii. stating in a search query specification step specification a first cnxpt;

iii. choosing from a list of cnxpts an alternative first cnxpt;

iv. choosing from a list of cnxpts an alternative first cnxpt by initiating a finding query;

v. choosing from a list of cnxpts an alternative first cnxpt, said list determined by accepting a text string wherein said string is matched against the descriptive information stored for each cnxpt;

vi. choosing from a list of cnxpts an alternative first cnxpt, said list determined by listing all root cnxpts in said domain of wisdom;

vii. navigating to a cntexxt chosen from all said cntexxts in said domain of wisdom according to visualization navigation means to choose a new first cnxpt;

viii. choosing from a list of cnxpts an alternative cnxpt, said list determined by accepting and processing a navigation by relationship info-item request resulting in a list of cnxpts, such choice replacing any prior cnxpt as the new first cnxpt;

ix. choosing from a list of cnxpts an alternative cnxpt, said list determined by accepting and processing a search query according to finding, searching, query and retrieval means resulting in a list of cnxpts;

x. choosing from a list of cnxpts an alternative cnxpt, said list determined by accepting and processing a query according to finding, searching, query and retrieval means resulting in a list of cnxpts;

xi. choosing from a list of cnxpts an alternative cnxpt, said list determined by accepting and processing a goal search query according to goal based searching means resulting in a list of cnxpts;

xii. choosing from a list of cnxpts an alternative cnxpt, said list determined by accepting and processing a query according to finding, searching, query and retrieval means a search query intended to result in a list containing a plurality of cnxpts having a property meeting criteria given by said additional specification and resulting in a list of cnxpts; and xiii. choosing from a list of cnxpts an alternative cnxpt, said list determined by accepting and processing a query according to finding, searching, query and retrieval means a search query intended to result in a list containing a plurality of cnxpts having a property meeting criteria given by said additional specification and resulting in a list of cnxpts;

and b. repositioning the focus on said organization of knowledge to a single cnxpt representing a cntexxt.

237. The method of claim 1 to also provide steering by result set matching for selection of a subsequent context in a map instance, further including:

a. providing at least one procedure to locate a subsequent context in said map instance, of a type selected from the group of:

i. accepting zero or more navigation commands stating a different cnxpt representing an alternative context selection, of type; and ii. accepting search criteria from one or more commands to specify an alternative search strategy for context selection, termed a secondary context search specification, for locating a context in said map instance, of a type selected from the group of:

01. use result, where result is not empty, of a search yielding at least one cnxpt, the search performed external to map formation procedure, the result returned into the map formation procedure;

02. use result, where result is not empty, of a search yielding at least one cnxpt, the search performed external to map formation procedure, the result returned into the map formation procedure;

03. use result, where result is not empty, of a search yielding at least one cnxpt, the search specified in the context search specification of map definition, the search performed internal to map formation procedure;

04. use result, where result is not empty, of a search yielding at least one cnxpt, the search specified in the context search specification of map definition, the search performed internal to map formation procedure;

and 05. use default context represented by at least one cntexxt where context search specification calls for direct use of default context;

b. activating the at least one procedure to locate a subsequent context in said map instance;

and c. determining, from the result given by the at least one procedure to locate a subsequent context in said map instance, a next context represented by a cntexxt of said map instance, the proper focusing for said map;

whereby the map is prepared to accept zero or more second wisdom request commands on the basis of the resulting found context as a subsequent frame of reference.

238. The method of claim 1 to also provide additional parts of a search command beyond a type of wisdom sought, further including:

a. accepting zero or one additional parts of a first or next wisdom request command providing an indication of a type of wisdom sought selected from the group of:

i. a null result;

ii. a result defined by a search analytic;

iii. information from a query, the type of information selected from the group of:

01. alert information;
02. analytic information;
03. associative position information navigation;
04. conceptual interrelationship info-item information;
05. entity similarity information;
06. business decision information;
07. business growth progress information;
08. business transaction information;
09. categorization information;
10. characteristic information;
11. commonality information;
12. competitive product information;
13. concept similarity information;
14. consortium artifact information;
15. consortium information;
16. contract transaction information;
17. crawl result information;
18. data availability;
19. goal information;
20. how-to information about invention;
21. how-to information about invention protection;
22. how-to information about innovative business growth;
23. info-item information;
24. information resource information;
25. interest shown by users;
26. satisfaction shown by users;
27. information about experts;
28. information about participants;
29. investment information;
30. investment opportunity information;
31. investment pool information;
32. investment diligence vetting information;
33. legal case information;
34. legal case strategy information;
35. legal discovery status information;
36. legal discovery relevance information;
37. legal information;
38. legal precedent information;
39. methodology information;
40. communal mind mapping consensus information;
41. model information;
42. negotiation process tracking information;
43. occurrence information;
44. opinion information;
45. outline construction information;
46. patent clearance process information;
47. patent clearance exposure information;
48. plug-in information;
49. portfolio entry information;
50. portfolio information;
51. portfolio transaction information;
52. prediction information;
53. process analysis information;
54. process control information;
55. product design information;
56. product control information;
57. product longevity information;
58. project control information;
59. property information;
60. purlieu information;
61. registration information;
62. relationship info-item information;
63. research study information;
64. result set information;
65. statistical analysis information;
66. subscription and usage information;
67. survey information;
68. template information;
69. trait information;
70. transaction information;

and 71. workflow information;

iv. a single item of a type, the type selected from the group of:

01. a cnxpt info-item;
02. a conceptual meaning;
03. a consortium info-item;
04. a crawl result;
05. a deal made in a consortium transaction;
06. a deal made in a portfolio transaction;
07. a deal made in an investment pool transaction;
08. a decision made in a consortium business decision;
09. a decision made in a portfolio business decision;
10. a decision made in an investment pool business decision;
11. a differentiator;
12. a discovery objective;
13. a fact to rule applicability ordered pair of cnxpt info-items;
14. a law info-item;

15. a legal charge theory of the case info-item;
16. a legal doctrine principle info-item;
17. a legal fact info-item;
18. a legal general rule info-item;
19. a legal jurisdiction info-item;
20. a legal precedent info-item;
21. a legal rule element info-item;
22. a legal rule info-item;
23. a legal theory of the case info-item;
24. a link cited in an attached occurrence;
25. a methodology info-item;
26. a model info-item;
27. a modeling result;
28. a participant info-item in a consortium;
29. a precedent successor dependency ordered pair of cnxpt info-items;
30. a prediction outcome info-item;
31. a prediction outcome value;
32. a prediction;
33. a property of a type of interest shown;
34. a property of a type of interest shown;
35. a property of an info-item;
36. a purlieu;
37. a query;
38. a registration;
39. a relationship info-item meaning;
40. a role of a consortium;
41. a set of matching pairings;
42. a set of applicability pairings;
43. a set of dependency pairings;
44. a specific rule;
45. a step in a fxxt specification info-item;
46. a step of a specification of an info-item having a specification for processing;
47. a study info-item;
48. a study objective;
49. a study result;
50. a subscription;
51. a survey result;
52. a task info-item in a timeline of a workflow;
53. a task info-item of a methodology;
54. a task info-item of a workflow;
55. a competitive constraint info-item;
56. a purlieu constraint info-item;
57. a tracked info-item of a consortium;
58. a trait of an info-item;
59. a transaction result;
60. a type of connected relationship;
61. a type of interest shown;
62. a type of relationship info-item;
63. a vote result;
64. a workflow info-item;
65. an information resource reference info-item;
66. an investment pool info-item;
67. an item of a blog;
68. an item of a commonality;
69. an item of a crawl result;
70. an item of a pool info-item;
71. an item of a portfolio info-item;
72. an item of a subscription;
73. an item of a transaction;
74. an occurrence info-item;
75. an opinion info-item;
76. an event info-item;
77. an evidence info-item;
78. an identifiable product of a task of a methodology;
79. an item of a portfolio;
80. a child in said organization of knowledge;
81. a commonality;
82. a consortium info-item;
83. a crawl result;
84. a crawl specification info-item;
85. a descendant in said organization of knowledge;
86. a descendant leaf in said organization of knowledge;
87. a fxxt info-item;
88. a goal info-item;
89. a methodology info-item;
90. a model info-item;
91. a parent in said organization of knowledge;
92. a participant info-item in a consortium info-item;
93. a plug-in;
94. a pool info-item;
95. a portfolio info-item;
96. a prediction info-item;
97. a query specification info-item;
98. a registration;
99. a result set;
100. a role info-item of a consortium info-item;
101. a sibling in said organization of knowledge;
102. a step in a fxxt specification;
103. a step of a methodology info-item;
104. a step of a model specification info-item;
105. a step of a prediction specification info-item;
106. a step of a query specification info-item;
107. a step of a workflow info-item;
108. a subscription specification;
109. a task info-item in a timeline of a workflow info-item;
110. a task info-item of a methodology info-item;
111. a task info-item of a workflow info-item;
112. a tracked item of a consortium info-item;
113. a transaction info-item;
114. a type of interest shown;
115. a workflow info-item;
116. an alert info-item;
117. an analytic;
118. an ancestor in said organization of knowledge;
119. an ancestor root in said organization of knowledge;
120. an attached occurrence in said organization of knowledge;
121. an avatar info-item;
122. an event info-item in a timeline of a workflow info-item;
123. an info-item connected by relationship info-item in said organization of knowledge;
124. an information resource referenced in an attached occurrence info-item in said organization of knowledge;
125. an item of a blog;
126. an item of a commonality specification;
127. an item of a crawl result;
128. an item of a pool;
129. an item of a result set;
130. an item of a subscription;
131. an item of a transaction;
and
132. an identity indicator value;

v. a list of a type of selected from the group of:

01. a list of alerts;
02. a list of analytics;
03. a list of avatars;

04. a list of property information regarding an info-item;
05. a list of characteristics;
06. a list of cnxpt info-items;
07. a list of commonalities;
08. a list of conceptual meanings;
09. a list of consortium info-items;
10. a list of crawl info-items;
11. a list of crawl results;
12. a list of decisions made;
13. a list of decisions needed;
14. a list of differentiators;
15. a list of fxxt info-items;
16. a list of goal info-items;
17. a list of identity indicators;
18. a list of info-items;
19. a list of information resource reference info-items;
20. a list of information resources;
21. a list of items of a result set;
22. a list of items of a set of crawl results;
23. a list of items of a set of pools;
24. a list of items of a set of portfolios;
25. a list of items of a subscription;
26. a list of items of a transaction;
27. a list of items of blogs;
28. a list of items of commonalities;
29. a list of links;
30. a list of methodology info-items;
31. a list of model info-items;
32. a list of occurrence info-items;
33. a list of outcome info-items;
34. a list of outcomes possible;
35. a list of pairs of cnxpt dependencies;
36. a list of pairs of cnxpts matching by applicability;
37. a list of pairs of cnxpts matching by interest;
38. a list of pairs of cnxpts matching by suitability;
39. a list of pairs of cnxpts matching by a constraint;
40. a list of pairs of cnxpts matching by trait;
41. a list of pairs of cnxpts matching semantically;
42. a list of participant info-items in a list of consortium info-items;
43. a list of plug-ins;
44. a list of pool info-items;
45. a list of portfolio info-items;
46. a list of precedent successor dependency pairs of cnxpts;
47. a list of prediction info-items;
48. a list of properties of types of interest shown;
49. a list of properties;
50. a list of purlieu;
51. a list of queries;
52. a list of registrations;
53. a list of relationships;
54. a list of result sets;
55. a list of roles of consortiums;
56. a list of steps in fxxts;
57. a list of steps of a specification of an info-item having a specification
58. a list of steps of a specification of an info-item having a specification stating actions to be carried out;
59. a list of steps of methodologies;
60. a list of steps of models;
61. a list of steps of predictions;
62. a list of task info-items of a specification of an info-item having a specification stating actions to be taken by a user;
63. a list of tasks in timelines of workflows;
64. a list of tasks of a set of methodologies;
65. a list of tasks of a set of workflows;
66. a list of tracked items of consortiums;
67. a list of traits;
68. a list of transactions;
69. a list of types of interest shown;
70. a list of types of relationships;
and
71. a list of workflows;

vi. a pairing of a type selected from the group of:
01. a pair of cnxpts matching by interest;
02. a pair of cnxpts matching by suitability;
03. a pair of cnxpts matching by a constraint;
04. a pair of cnxpts matching by trait;
05. a pair of cnxpts matching semantically;
06. a metric ordered area of consideration of cnxpts;
07. a metric ordered area of interest of cnxpts;
08. a metric ordered result set;
09. an ordered pair of cnxpts matching by suitability of evidence to discovery objective;
10. an ordered pair of cnxpts matching by suitability of evidence to fact;
11. an ordered pair of cnxpts matching by suitability of fact to rule element;
12. an ordered pair of cnxpts matching by suitability of function to audience;
13. an ordered pair of cnxpts matching by suitability of function to need;
14. an ordered pair of cnxpts matching by suitability rule to jurisdiction;
and
15. an ordered pair of cnxpts matching semantically;

vii. a result set of a type selected from the group of:
01. a result of a fxxt specification;
02. a result of a model specification;
03. a result of a workflow specification;
04. a result set of pairs of cnxpts matching by interest;
05. a result set of pairs of cnxpts matching by suitability;
06. a result set of pairs of cnxpts matching by a constraint;
07. a result set of pairs of cnxpts matching by trait;
08. a result set of pairs of cnxpts matching semantically;
and
09. a result set of precedence dependency pairs of cnxpts;

viii. an event of a type selected from the group of:
01. an action triggered by said search;
02. an action defined by a search analytic triggered by said search;
03. an event triggered by said search;
and
04. an event defined by a search analytic triggered by said search;

ix. a list of cnxpts, the list of a type selected from the group of:
01. a list selected from the group of: immediate children, cntexxt children, and members of the cntexxt of said identified cnxpt in said identified forest;

02. a list of the set of all member cnxpts in a cntexxt identified by one or more cnxpts containing direct descendant cnxpts at all levels of descendancy of said specifically identified one or more cnxpts, said list termed the list of descendants;

03. a list selected from the group of: the set of all member cnxpts in a cntexxt containing a specifically identified cnxpt, said list termed the list of siblings of said specifically identified cnxpt; and 04. a list selected from the set of all member cnxpts of a specifically identified cntexxt represented by a specifically identified cnxpt and a specifically identified descendent forest, said list comprising the set of second cnxpts wherein the second cnxpt is a descendant of said specifically identified cnxpt if the cntexxt represented by said second cnxpt itself is empty having no descendants in said specifically identified descendent forest, said list termed the leaf list of said specifically identified cntexxt in said specifically identified descendent forest, said leaf cnxpt termed a leaf of said specifically identified cntexxt in said specifically identified descendent forest, said leaf cnxpt termed a leaf of said specifically identified descendent forest;

x. a compound list of cnxpts, the list of a type selected from the group of:

01. a forest selected from the set of all member cnxpts of a specifically identified cntexxt represented by a specifically identified cnxpt and a specifically identified descendent forest, said list the set of second cnxpts wherein the second cnxpt is a descendant of said specifically identified cnxpt and said specifically identified cnxpt, and all interconnecting hierarchical relationships from said specifically identified descendent forest, said forest termed the sub-tree of said specifically identified cntexxt in said specifically identified descendent forest;

02. a list selected from the set of all second cnxpts in the leaf list of said specifically identified first cnxpt;

03. a list selected from the set of all second cnxpts in a parent list of the cnxpt representing the cntexxt in said specifically identified descendent forest;

04. a list selected from the group of: the set of all second cnxpts in a specifically identified descendent forest wherein each second cnxpt is a sibling cnxpt of the cnxpt representing the cntexxt of which a specifically identified cnxpt is a member but excluding said cnxpt representing the cntexxt of which said specifically identified cnxpt is a member, said list termed the list of uncles of said specifically identified cnxpt in said specifically identified descendent forest, said list termed the list of uncles of said cntexxt;

05. a list selected from the group of: the set of all second cnxpts of a specifically identified descendent forest wherein said second cnxpt has no parent in said specifically identified descendent forest regardless of whether said second cnxpt has no children in said specifically identified descendent forest, each said second cnxpt termed a root of said specifically identified descendent forest, said list termed the root list of said specifically identified descendent forest;

06. a list selected from the set of all second cnxpts of a specifically identified cntexxt represented by a specifically identified cnxpt and a specifically identified descendent forest, said list containing said specifically identified cnxpt regardless of whether said cntexxt itself is empty wherein said specifically identified cnxpt is a leaf and also containing the parent in said specifically identified descendent forest of any said second cnxpt in said list, said list termed the ascendant list of said specifically identified cntexxt in said specifically identified descendent forest, each said second cnxpt termed an ascendant cnxpt of said specifically identified cntexxt in said specifically identified descendent forest, said list together with the hierarchical relationships connecting said ascendant cnxpts to form said specifically identified descendent forest termed the ascendant path of said specifically identified cntexxt in said specifically identified descendent forest;

07. a list selected from the group of: the set of all second cnxpts in a specifically identified descendent forest wherein each second cnxpt is a sibling cnxpt of the cnxpt representing the cntexxt of which a specifically identified cnxpt is a member in said specifically identified descendent forest plus any root in said specifically identified descendent forest if said cnxpt representing the cntexxt of which a specifically identified cnxpt is a member is also a root, but excluding said cnxpt representing the cntexxt of which said specifically identified cnxpt is a member, said list termed the list of uncles of said specifically identified cnxpt in said specifically identified descendent forest, said list termed the list of forest uncles of said cntexxt of which a specifically identified cnxpt is a member in said specifically identified descendent forest, each item in said list of uncles termed an uncle of each member of said cntexxt of which said specifically identified cnxpt is a member in said specifically identified descendent forest;

08. a list, formed in response to a specification requesting the root list of said specifically identified descendent forest, of the set of all second cnxpts of a specifically identified descendent forest wherein said second cnxpt has no parent in said specifically identified descendent forest regardless of whether said second cnxpt has no children in said specifically identified descendent forest and regardless of whether said specifically identified descendent forest has more than one said second cnxpt, each said second cnxpt termed a root of said specifically identified descendent forest, said list termed the root list of said specifically identified descendent forest, said list alternatively termed the forest root list of said specifically identified descendent forest, said specifically identified descendent forest alternatively termed a forest where only a single said second cnxpt exists in specifically identified descendent forest;

09. a list, formed in response to a specification requesting the list of siblings of said specifically identified root cnxpt in said specifically identified descendent forest, of the set of all second root cnxpts in a specifically identified descendent forest containing a specifically identified root cnxpt, said set of second root cnxpts reduced to eliminate as a set member said specifically identified root cnxpt, wherein said specification also states that said list is to contain the sibling cnxpts of said specifically identified cnxpt in a specifically identified descendent forest, said list termed the list of siblings of said specifically identified root cnxpt in said specifically identified descendent forest;

10. a list, formed in response to a specification requesting the ascendant sub-tree of said specifically identified cntexxt in said specifically identified ascendant forest, of the set of all second cnxpts of a specifically identified cntexxt represented by a specifically identified cnxpt and a specifically identified ascendant forest, said list containing said specifically identified cnxpt regardless of whether said cntexxt itself is empty wherein said specifically identified cnxpt is a leaf and also containing the parent in said specifically identified ascendant forest of any said second cnxpt in said list, said list termed the ascendant list of said specifically identified cntexxt in said specifically identified ascendant forest, each said second cnxpt termed an ascendant cnxpt of said specifically identified cntexxt in said specifically identified ascendant forest, said list together with the set of hierarchical relationships connecting said ascendant cnxpts taken from the list of hierarchical relationships connecting said specifically identified ascendant forest termed the ascendant sub-tree of said specifically identified cntexxt in said specifically identified ascendant forest;

11. a list, formed in response to a specification requesting the primary flow list in said specifically identified forest, of the set of all ordered pairs of cnxpts of the set of a first cnxpt in a first position and a second cnxpt in the second position wherein each said first cnxpt and each said second cnxpt are both in a specifically identified forest selected from the group of: ascendant forest and descendent forest, wherein said first cnxpt is a predecessor in a flow-type directed association to said second cnxpt as successor, said ordered pair termed a primary flow pair in said specifically identified forest, said first cnxpt termed a primary predecessor flow cnxpt of said primary flow pair, said second cnxpt termed a primary successor flow cnxpt of said primary flow pair, said list of ordered pairs termed a primary flow list in said specifically identified forest;

12. a list, formed in response to a specification requesting the same level primary flow list in said specifically identified forest, of the set of all primary flow pairs in a specifically identified forest;

13. a list, formed in response to a specification requesting the different level primary flow list in said specifically identified forest, of the set of all primary flow pairs in a specifically identified forest;

14. a list, formed in response to a specification requesting the same level secondary flow list in said specifically identified forest, of the set of all ordered pairs of cnxpts of the set of a first cnxpt in a first position and a second cnxpt in the second position wherein each said first cnxpt and each said second cnxpt are both in a specifically identified forest;

15. a list, formed in response to a specification requesting the root level flow tensor list in said specifically identified forest;

and 16. a list, formed in response to a specification requesting the same level flow tensor list in said specifically identified forest, of the set of all ordered tuples each of a first cnxpt, a second cnxpt, and a weight from a set of flow pairs in a specifically identified forest;

xi. a listing of the contents of a map performed by a search, the map of a type selected from the group of:

01. a map, formed in response to a specification requesting a co-location map of concepts, of the set of cnxpts within a specifically identified forest selected from the group of: ascendant forest, enhanced ascendant forest, descendant forest, and enhanced descendent forest; with placement on the root level and placement within any parent cnxpt determined by co-location positioning, according to map generation means, said map termed a co-location map of said specifically identified forest;

02. a list comprised of zero or more info-items contained within a precedence map;

and 03. a list comprised of zero or more info-items contained within a flow map;

and xii. an action taken upon completion of a search, the action of a type selected from the group of:

01. a repositioning to a cnxpt within the cntexxt defined by said cnxpt to indicate the likely location of the concept having a meaning best matching said requested search, wherein said organization of knowledge is immediately repositioned to said point in said cntexxt.

239. The method of claim 1 to also provide additional parts of a search command to identify a search base parameter, further including:

a. accepting zero or more additional parts of a first or next wisdom request command each providing a reference to an identified search base to be used as a parameter in said first or next wisdom request.

240. The method of claim 1 to also provide for additional parts of a search command to identify further search parameters, further including:

a. accepting zero or more additional parts of a first or next wisdom request command each providing an additional specification to be used as the criterion in said first or next wisdom request in a priority order;

i. a reference to a search query specification;

ii. an indicator stating whether a weighting is to be applied when combining consensus and said user's opinion;

iii. a weighting specification for combining consensus and said user's opinion;

iv. a relevance coefficient specification for combining consensus and said user's opinion;

v. a pertinence coefficient specification for combining consensus and said user's opinion;

vi. an indicator stating whether a degree of fuzziness is to be applied when combining consensus and said user's opinion;

vii. a value of a degree of fuzziness for combining consensus and said user's opinion;

viii. a value of a per-level inheritance effect dampening coefficient for combining consensus and said user's opinion based upon common ancestry in an organization of knowledge;
ix. an indicator stating whether an ordering is to be applied to said first form of result after completion;
x. a type of ordering to apply to said first form of result after completion;
xi. a type;
xii. an citation type;
xiii. a causality type;
xiv. a probability distribution;
xv. an identity indicator type;
xvi. an identity indicating a result set;
xvii. an identity indicating a result set item;
xviii. an identity indicator indicating an organization of knowledge;
xix. a list combination specification;
xx. a number of characters;
xxi. a position in a string;
xxii. a number of entries;
xxiii. a value of the form of an identity indicator;
xxiv. a value of the form of an info-item property;
xxv. a value of the form of an info-item characteristic;
xxvi. a value of the form of a trait;
xxvii. a value of the form of a purlieu;
xxviii. a value of the form of a keyword;
xxix. a value of the form of an info-item characteristic identifier;
xxx. a value of the form of an info-item property identifier;
xxxi. a value of the form of a data set attribute identifier;
xxxii. a value of the form of a data set attribute;
xxxiii. a value of the form of a data set table identifier;
xxxiv. a position in a list;
xxxv. a number of items;
xxxvi. a position in a result set list;
xxxvii. a collating sequence;
xxxviii. a language;
xxxix. a text string;
xl. a regular expression string;
xli. a string;
xlii. a value of a parameter;
and
xliii. a value of a pre-established preference.

241. The method of claim 1 to also provide for additional parts of a search command to identify further search parameters to state a frame of reference, further including:

a. accepting zero or one additional part of a first or next wisdom request command providing a specification for search to obtain contents for said first form of result to serve as a subsequent frame of reference by selection of said type of wisdom sought, said specification for search selected from the group of:
i. requesting an empty set;
ii. requesting a default set;
iii. requesting a search by analytic;
iv. requesting a set containing a specified Boolean combination of the items in a first said identified search base and the items in a second said identified search base;
v. requesting a set containing a specified subset of the items in a first said identified search base:
vi. requesting a set containing a specified subset of the candidate items in a first said identified search base which to a specified degree of fuzziness each candidate item has a trait that matches a string of text given by a combination of one or more specified matching criteria according to finding, searching, query and retrieval means and attach result set to goal according to goal based searching means;
vii. requesting a set containing a specified subset of the candidate items in a first said identified search base which to a specified degree of fuzziness meets criteria given in said additional specification selected from the group of:
01. has said one or more types of wisdom sought having a non-null value;
02. has said one or more types of wisdom sought having a value matching a value given in a second said identified search base;
03. has said one or more types of wisdom sought having a type value matching a value given in a second said identified search base;
04. has said one or more types of wisdom sought having a fxxt matching a value for a fxxt identity indicator matching a value given in a second said identified search base;
05. is attached to a cnxpt having an identity indicator given in a second said identified search base of cnxpts;
06. is relevant to a cnxpt having an identity indicator given in a second said identified search base of cnxpts;
07. is related to a cnxpt having an identity indicator given in a second said identified search base of cnxpts;
08. is cited by an information resource given by one or more occurrences attached to a cnxpt having an identity indicator given in a second said identified search base of cnxpts;
09. cites an information resource given by one occurrence attached to a cnxpt having an identity indicator given in a second said identified search base of cnxpts;
10. cites an information resource given by one or more occurrences attached to a cnxpt having an identity indicator given in a second said identified search base of cnxpts;
11. has an identity indicator meeting criteria given by said additional specification;
12. has an identity indicator given in a second said identified search base of cnxpts;
13. has an identity indicator meeting criteria given by said additional specification to compare against a value given in a second said identified search base;
14. has a characteristic value meeting criteria given by said additional specification;
15. has a characteristic value given in a second said identified search base of cnxpts;
16. has a characteristic value meeting criteria given by said additional specification to compare against a value given in a second said identified search base;
17. has a trait meeting criteria given by said additional specification;
18. has a trait given in a second said identified search base of cnxpts;
19. has a trait meeting criteria given by said additional specification to compare against a value given in a second said identified search base;

20. has a property meeting criteria given by said additional specification;

21. has a property given in a second said identified search base of cnxpts;

22. has a property meeting criteria given by said additional specification to compare against a value given in a second said identified search base;

23. has a purlieu meeting criteria given by said additional specification;

24. has a purlieu given in a second said identified search base of cnxpts;

25. has a purlieu meeting criteria given by said additional specification to compare against a value given in a second said identified search base;

26. has an attribute meeting criteria given by said additional specification;

27. has an attribute given in a second said identified search base of cnxpts;

28. has an attribute meeting criteria given by said additional specification to compare against a value given in a second said identified search base;

29. has a keyword meeting criteria given by said additional specification;

30. has a keyword given in a second said identified search base of cnxpts;

31. has a keyword meeting criteria given by said additional specification to compare against a value given in a second said identified search base; and 32. has a field, specified by said additional specification, said field selected from the group of: identity indicator, property value, characteristic value, trait, purlieu, attribute, and keyword, meeting criteria given by said additional specification, matching against a specified value given in a second said identified search base;

viii. requesting said one or more types of wisdom sought for a concept represented by an item in the list created from the set of all items in a first said identified search base cnxpt;

ix. requesting information for a concept represented by a set of cnxpts ostensibly belonging in a cntexxt wherein said information is a part of the wisdom available for the cnxpt representing said cntexxt, said cnxpt in the list created from the set of all items in a first said identified search base cnxpt;

x. requesting a list of properties defined for a cnxpt in the list created from the set of all items in a first said identified search base cnxpt;

xi. requesting a value for a characteristic of a cnxpt in the list created from the set of all items in a first said identified search base cnxpt;

xii. requesting a value for a characteristic of an info-item in the list created from the set of all items in a first said identified search base;

xiii. requesting a list of values of characteristics of a specific set of info-items in the list created from the set of all items in a first said identified search base;

xiv. requesting a list of values of characteristics of specific types of info-item listed in the list created from the set of all items in a first said identified search base listing info-item type identifiers;

xv. requesting a result set list for culling list items of info-items connected to a cnxpt to improve said result set list's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said result set list created from the set of all info-items connected to a cnxpt in a first said identified search base, said info-items of a type specified in said additional specification, said result set items ordered by a characteristic or property value wherein said characteristic or property is specified in said additional specification;

xvi. requesting a result set list for culling list items of info-items connected to a cnxpt to improve said result set list's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said result set list created from the set of all info-items connected to a cnxpt in a first said identified search base, said info-items of a type specified in a second said identified search base, said result set items ordered by a characteristic or property value wherein said characteristic or property is specified in said additional specification;

xvii. requesting a list of values of properties of a specific set of info-items in the list created from the set of all items in a first said identified search base;

xviii. requesting characteristic or property information regarding an info-item in the list created from the set of all items in a first said identified search base;

xix. requesting a list of values of properties of specific types of info-item listed in the list created from the set of all items in a first said identified search base listing info-item type identifiers;

xx. requesting a fact or an estimation of a fact represented by a value for a characteristic of an info-item in the list created from the set of all items in a first said identified search base;

xxi. requesting a fact or an estimation of a fact represented by a value for a characteristic of a specific set of info-items in the list created from the set of all items in a first said identified search base;

xxii. requesting a fact or an estimation of a fact represented by a value for a characteristic of specific types of info-item listed in the list created from the set of all items in a first said identified search base listing info-item type identifiers;

xxiii. a fact or an estimation of a fact represented by a value for a characteristic of a specific type for a concept represented by a set of cnxpts ostensibly belonging in a cntexxt wherein said information is a part of the wisdom available for the cnxpt representing said cntexxt, said cnxpt in the list created from the set of all items in a first said identified search base;

xxiv. requesting said one or more types of wisdom sought for an info-item wherein said information is a part of the wisdom available for said info-item, said info-item in the list created from the set of all items in a first said identified search base;

xxv. requesting a list of identity indicators of a set of info-items in the list created from the set of all items in a first said identified search base;

xxvi. requesting a list of identity indicators of info-items connected to a cnxpt in the list created from the set of all items in a first said identified search base;

xxvii. requesting a list of identity indicators of info-items connected to a cnxpt in the list created from the set of all items in a first said identified search base of a type of info-item listed in a second said identified search base listing info-item type identifiers;

xxviii. requesting information for a concept represented by a cnxpt wherein said information is external to said commonplace, but is likely related to said cnxpt in the list created from the set of all items in a first said identified search base;

xxix. requesting characteristic or property information regarding an occurrence in the list created from the set of all items in a first said identified search base where said item is an occurrence info-item;

xxx. requesting a relevance ranking of an information resource relevant to a cnxpt, said information resource likely to contain said wisdom, said cnxpt in the list created from the set of all items in a first said identified search base where said item is a cnxpt;

xxxi. requesting an information resource relevant to a cnxpt, said information resource likely to contain said wisdom, said cnxpt in the list created from the set of all items in a first said identified search base where said item is a cnxpt;

xxxii. requesting a list of identity indicators of relationships in the list created from the set of all items in a first said identified search base where said item is a relationship info-item of a type listed in a second said identified search base listing info-item type identifiers;

xxxiii. requesting a list of identity indicators of relationships in the list created from the set of all items in a first said identified search base where said item is a relationship info-item having a characteristic of a type specified in said additional specification and a value listed in a second said identified search base;

xxxiv. requesting a list of identity indicators of relationships in the list created from the set of all items in a first said identified search base where said item is a relationship info-item having a property of a type specified in said additional specification and a value listed in a second said identified search base;

xxxv. requesting a list of identity indicators of traits attached to cnxpts in the list created from the set of all items in a first said identified search base where said trait has a property with a value specified in said additional specification;

xxxvi. requesting a list of identity indicators of traits attached to cnxpts in the list created from the set of all items in a first said identified search base where said trait has a property of a type specified in said additional specification and a value listed in a second said identified search base;

xxxvii. requesting a list of identity indicators of purlieu attached to cnxpts in the list created from the set of all items in a first said identified search base where said purlieu has a property with a value specified in said additional specification;

xxxviii. requesting a list of identity indicators of purlieu attached to cnxpts in the list created from the set of all items in a first said identified search base where said purlieu has a property of a type specified in said additional specification and a value listed in a second said identified search base;

xxxix. requesting a result set list for culling list items based upon what appears to the user as a good choice of culling action according to said user's own criteria;

xl. requesting a result set list for culling list items of a type to improve said result set list's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said result set created from the set of all items in a first said identified search base;

xli. requesting a result set list for culling list items of a type to improve said result set list's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said result set created from the set of all items in a first said identified search base, said result set items ordered by a characteristic value wherein said characteristic is specified in said additional specification;

xlii. requesting a result set list for culling information resource items based upon what appears to the user as a good choice of culling action according to said user's own criteria;

xliii. requesting a result set list for culling information resource items of a type to improve said result set list's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said result set created from the set of all items in a first said identified search base;

xliv. requesting a result set list for culling information resource items of a type to improve said result set list's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said result set created from the set of all items in a first said identified search base, said result set items ordered by a characteristic value wherein said characteristic is specified in said additional specification;

xlv. requesting a result set list for culling information resource items of a type to improve said result set list's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said result set created from the set of all information resource returned from a search request, said result set items ordered by a characteristic value wherein said characteristic is specified in said additional specification;

xlvi. requesting a result set list for culling information resource items of a type to improve said result set list's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said result set created from the set of all information resources returned from a search request to determine information resources relevant to a cnxpt in the set of all items in a first said identified search base, said result set items ordered by a characteristic value wherein said characteristic is specified in said additional specification;

xlvii. requesting a result set to build a goal by query from a search query, said result set implying a concept sought by said user by searching for said goal;

xlviii. requesting a result set of information resources to build a goal, said result set implying a concept sought by said user by searching for said goal;

xlix. requesting a repositioning for navigation to a best cntexxt of a set of better cntexxts each represented by a cnxpt from the set of all items in a first said identified search base where said items are cnxpts, said best cntexxt represented by a cnxpt having a value for a characteristic wherein said characteristic is specified in said additional specification, said characteristic indicating a quality score for the predetermined purpose of indicating similarity in regard to an indicated goal being sought;

l. requesting a list for picking a selection of what appears to said user as a best cntexxt of a set of better cntexxts listed, each represented by a cnxpt from the set of all items in a first said identified search base where said items are cnxpts, said cnxpts optionally having a value for a characteristic wherein said characteristic is specified in said additional specification, said characteristic indicating a quality score for the predetermined purpose of indicating similarity in regard to an indicated goal being sought;

li. requesting a repositioning for navigation into an area of consideration of better cntexxts each represented by a cnxpt from the set of all items in a first said identified search base where said items are cnxpts, said cntexxts each represented by a cnxpt having a value for a characteristic wherein said characteristic is specified in said additional specification, said characteristic indicating a quality score for the predetermined purpose of indicating similarity in regard to an indicated goal being sought;

lii. requesting a list of cnxpts representing concepts for inclusion in an area of consideration or area of interest for navigating, according to said user's own criteria;

liii. requesting a result from an operation, said result indicating one or more cntexxts represented by one or more second cnxpts, the operation selected from the group of:

01. movement of user focus to a context represented by a second cnxpt, said second cnxpt appearing first in a list of results in an order specified in said additional specification, said second cnxpt representing a second cntexxt;

02. list of identity indicators of a type specified by said additional specification listing, in an order specified in said additional specification, said list for selecting cnxpt items based upon what appears to the user as a good choice according to said user's own criteria, said identity indicator of each second cnxpt representing a second cntexxt;

03. a result set of identity indicators of a type specified by said additional specification listing each identity indicator of a type specified by said additional specification listing, in an order specified in said additional specification or ordered by a characteristic value wherein said characteristic is specified in said additional specification, said result set list for culling cnxpt items based upon what appears to the user as a good choice of culling action according to said user's own criteria to improve said result set list's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, altering an item value, entering an opinion, item addition, and item removal, said identity indicator of each second cnxpt representing a second cntexxt;

04. a timeline listing identity indicators of a type specified by said additional specification listing each identity indicator of a type specified by said additional specification listing, in an order specified in said additional specification or ordered by a characteristic value wherein said characteristic is specified in said additional specification, said identity indicator of each second cnxpt representing a second cntexxt;

05. a list of conceptual meanings listing, in an order specified in said additional specification, said conceptual meaning in a language specified by said additional specification, said conceptual meaning of a second cnxpt representing a second cntexxt;

06. a timeline listing conceptual meanings of a type and language specified by said additional specification listing each identity indicator of a type specified by said additional specification listing, in an order specified in said additional specification or ordered by a characteristic value wherein said characteristic is specified in said additional specification, said identity indicator of each second cnxpt representing a second cntexxt;

07. a co-location map for associative searching, navigation, or a predetermined purpose, said map created from the set of all second cnxpts representing second cntexxts;

08. a flow map for associative searching of a process, navigation, or a predetermined purpose, showing each identity indicator of a type specified by said additional specification listing, in an ordering for flow based upon a specified flow relationship info-item type specified in said additional specification, said identity indicator of each second cnxpt representing a second cntexxt, said map created from the set of all said second cnxpts representing second cntexxts;

09. a co-location map with flow for associative searching, searching of a process, navigation, or a predetermined purpose, showing each identity indicator of a type specified by said additional specification listing, in an ordering for flow based upon a specified flow relationship info-item type specified in said additional specification, said identity indicator of each second cnxpt representing a second cntexxt, said map created from the set of all said second cnxpts representing second cntexxts;

10. a list of values of a characteristic, in an order specified in said additional specification, in a language specified by said additional specification, said value of a characteristic of a second cnxpt representing a second cntexxt;

11. a list of differentiations in conceptual meaning listing, in an order specified in said additional specification, each such differentiation in a language specified by said additional specification, said differentiation of a second cnxpt representing a second cntexxt;

12. a list of differentiations of a characteristic of a specified type specified by said additional specification listing, in an order specified in said additional specification, said characteristic value of each second cnxpt representing a second cntexxt;

13. a timeline listing differentiations of conceptual meanings of a type and language specified by said additional specification listing each identity indicator of a type specified by said additional specification listing, in an order specified in said additional specification or ordered by a characteristic value wherein said characteristic is specified in said additional specification, said identity indicator of each second cnxpt representing a second cntexxt;

14. an area of consideration for culling cnxpt items to improve said area of consideration's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said area of consideration created from the set of all second cnxpts representing second cntexxts;

15. an area of interest for culling cnxpt items to improve said area of interest's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said area of interest created from the set of all second cnxpts representing second cntexxts;

16. a portfolio information table listing values of info-items of types specified by said additional specification, listing one or more values for each of said types as specified by said additional specification listing, in an order specified in said additional specification or ordered by a characteristic value or modeling result value wherein said characteristic or modeling result value is as specified in said additional specification, for reviewing info-items of said types specified to improve said portfolio's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said portfolio created from information related to items in the set of all second cnxpts representing second cntexxts;

17. modeling results of types specified by said additional specification listing one or more result values for each of said types as specified by said additional specification listing, in an order specified in said additional specification or ordered by a characteristic value or modeling result value wherein said characteristic or modeling result value is as specified in said additional specification, said results for each second cnxpt representing a second cntexxt;

18. an estimation of a fact represented by a modeling result of a type specified by said additional specification and a degree of fuzziness specified by said additional specification listing, in an order specified in said additional specification or ordered by a characteristic value or modeling result value wherein said characteristic or modeling result value is as specified in said additional specification, said estimation for each second cnxpt representing a second cntexxt;

19. an estimation of the probability of the existence of a fact represented by a modeling result of a type specified by said additional specification, a degree of fuzziness specified by said additional specification, and a time frame specified by said additional specification listing, in an order specified in said additional specification or ordered by a characteristic value or modeling result value wherein said characteristic or modeling result value is as specified in said additional specification, said estimation for each second cnxpt representing a second cntexxt;

20. a result set of identity indicators of a type specified by said additional specification listing each identity indicator of a type specified by said additional specification listing, in an order specified in said additional specification or ordered by a characteristic value wherein said characteristic is specified in said additional specification, said result set list for reviewing modeling results for cnxpt items based upon what appears to the user as a good choice of adjustment action according to said user's own criteria to improve said result set list's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said second cnxpt meeting criteria based upon a modeling result of a type specified by said additional specification with zero or more satisfaction criterion values specified by said additional specification, said identity indicator of each second cnxpt representing a second cntexxt;

21. a result set of identity indicators of a type specified by said additional specification listing each identity indicator of a type specified by said additional specification listing, in an order specified in said additional specification or ordered by a characteristic value wherein said characteristic is specified in said additional specification, said result set list for reviewing outcomes based upon what appears to the user as a good choice of adjustment action according to said user's own criteria to improve said result set list's quality for a predetermined purpose by an action selected from the group of: a user defined action for a purpose, ranking, scoring, re-prioritizing, rebuilding, item information research, item information collection, initiating contact, prediction acceptance, prediction rejection, ranking, altering an item value, entering an opinion, item addition, and item removal, said outcome meeting criteria based upon a modeling result of a type specified by said additional specification with zero or more satisfaction criterion values specified by said additional specification, based upon one or more second cnxpts each representing a second cntexxt;

22. a result set of identity indicators of a type specified by said additional specification listing each identity indicator of a type specified by said additional specification listing, in an order specified in said additional specification or ordered by a characteristic value wherein said characteristic is specified in said additional specification, said result set list for reviewing subject matter selected from the group of: principle, standard, practice, field, jurisdiction, purlieu, trait, law, author, subject, fact, opinion, doctrine, study, study result, lab test report, evidence item, evidence type, element, documentary evidence, theory, topic, category, entry meaning, entry impact, precedent, entry relevance, rule, a user defined content type, an analytic content type; for cnxpt items based upon what appears to the user as a good choice of adjustment action according to said user's own criteria to improve said result set list's quality for a predetermined purpose by an action selected from the group of: a user defined action for a purpose, ranking, scoring, re-prioritizing, rebuilding, altering an item value, entering an opinion, item information research, item information collection, initiating contact, item addition, and item removal, said second cnxpt meeting criteria of a type specified by said additional specification with zero or more satisfaction criterion values specified by said additional specification, said identity indicator of each second cnxpt representing a second cntexxt;

23. a report of information regarding audience strength based upon interest shown, based upon one or more second cnxpts each representing a second cntexxt;

24. a report of information regarding general audience strength, based upon one or more second cnxpts each representing a second cntexxt;

25. a report of information regarding dependent audience strength based upon a relationship info-item traversal based upon one or more destination second cnxpts, said second cnxpts each representing a second cntexxt;

26. a report of information regarding interest shown, based upon one or more second cnxpts each representing a second cntexxt;

27. a report of information regarding interest shown for a relationship info-item traversal based upon one or more destination second cnxpts, said second cnxpts each representing a second cntexxt;

28. a report of information regarding dependent audience strength based upon a relationship info-item traversal based upon one or more second cnxpts as origins, said second cnxpts each representing a second cntexxt;

29. a report of information regarding normalized interest shown metrics for one or more destination second cnxpts, said second cnxpts each representing a second cntexxt;

30. a report of information regarding normalized interest shown metrics for a relationship info-item traversal based upon one or more destination second cnxpts, said second cnxpts each representing a second cntexxt;

31. a list of tuples of cnxpt identity indicators being pairs of: two cnxpts wherein a first cnxpt matches a second cnxpt according to relationships entered by users or by matching criteria of a type specified in said wisdom request command parts, in an order specified in said additional specification, each second cnxpt representing a second cntexxt; and 32. prediction results of types specified by said additional specification listing one or more prediction values for each of said types as specified by said additional specification listing, in an order specified in said additional specification or ordered by a characteristic value or modeling result value wherein said characteristic or modeling result value is as specified in said additional specification, said prediction results based upon each second cnxpt representing a second cntexxt.

242. The method of claim 1 to also provide for additional parts of a search command to identify further search parameters to state a specification form required, further including:

a. accepting zero or more first or next wisdom request commands, each of one or more parts, with any stated additional specification, initial zero or more parts each providing zero or one indication of the type of a first form of result to serve as a subsequent frame of reference for decision and action when generated, to be generated according to the finding, searching, query and retrieval process means, said initial zero or more parts of said first or next wisdom request command in a specification form selected from the group consisting of:

i. user entered search command;

ii. user entered search query;

iii. user entered request to follow a methodology query;

iv. user entered request to follow a path specified by a user;

v. user entered search recorded macro step;

vi. user request to repeat or refresh a search command or query;

and vii. search query specification step specification;

b. specifying the type of results to be produced, where the search results in no hits, said first form of result selected from the group consisting of:

i. a result set with no result set items;

ii. an indication that the search query resulted in no found items;

iii. an empty set;

and iv. a default set;

c. specifying the type of results to be produced, where the search results in one hit, said first form of result selected from the group consisting of:
i. an avatar;
ii. a commonality;
iii. a conceptual meaning by a repositioning;
iv. a deal made;
v. a decision made;
vi. a directory listing;
vii. a fxxt extraction invocation;
viii. a goal;
ix. a link;
x. a methodology action;
xi. a plug-in;
xii. a portfolio entry;
xiii. a registration made;
xiv. a relationship info-item;
xv. a resolved link;
xvi. a result of a model invocation;
xvii. a result of a prediction;
xviii. a result of a workflow invocation;
xix. a scalar;
xx. a single item result;
xxi. a specification;
xxii. a step in a specification;
xxiii. a taxonomy;
xxiv. a template;
xxv. a transaction;
xxvi. a value of a characteristic of an info-item;
xxvii. a value of a property of an info-item;
xxviii. a vote made;
xxix. a vote;
xxx. an alert;
xxxi. an event;
xxxii. an identity indicator of an info-item;
xxxiii. an info-item;
xxxiv. an information resource;
xxxv. an intermediate or final result of processing a specification of an info-item having a specification for processing;
xxxvi. an invocation of a step of a specification of an info-item having a specification for processing;
xxxvii. an item of a result set;
xxxviii. an outcome defined by the search; and
xxxix. a multi-media information block;

d. specifying the type of results to be produced, where the search results in multiple hits, said first form of result selected from the group consisting of:
i. a collaboration blog list;
ii. a crawl;
iii. a data set;
iv. a list data set, said list optionally visualized;
v. a map data set, said map optionally visualized;
vi. a directed graph;
vii. a directory;
viii. a forest of trees;
ix. a graph;
x. a list for picking a selection of a what appears to the user as a good choice according to said user's own criteria;
xi. a list;
xii. a pair tuple or pairing;
xiii. an ordered pair tuple or pairing;
xiv. a product catalog;
xv. a result set map;
xvi. a portfolio map;
xvii. a portfolio;
xviii. a result of an analytic invocation;
xix. a result set list;
xx. a result set;
xxi. a timeline;
xxii. a timeline ordered area of consideration of cnxpt info-items;
xxiii. a timeline ordered area of interest of cnxpt info-items;
xxiv. a timeline ordered result set;
xxv. a timeline ordered list;
xxvi. a timeline ordered graphical composite of durations;
xxvii. a transaction list;
xxviii. an area of consideration of cnxpt info-items;
xxix. an area of interest of cnxpt info-items;
xxx. a selection set;
xxxi. a set;
xxxii. a sub-tree;
xxxiii. a tracking history of an item of a consortium;
xxxiv. a tree;
xxxv. an ordered list; and
xxxvi. an ordered result set list;

e. specifying the type of results to be produced, where the search results in a building of a structure, said first form of result selected from the group consisting of:
i. a data set comprising a list, said list not a visualization;
ii. a list data set, said list optionally visualized;
iii. a data set comprising a map, said map not a visualization;
iv. a map data set, said map optionally visualized;
v. a descendent tree formed according to fxxt descendent tree extraction process means;
vi. a descendent forest formed according to fxxt descendent tree extraction process means;
vii. an ascendant tree formed according to calculate ascendant trees process means;
viii. an ascendant tree forest formed according to calculate ascendant trees process means;
ix. a result of a fxxt extraction according to fxxt calculation script interpretation process means;
x. a methodology consisting of: at least one part selected from the group consisting of:
01. a theoretical discussion;
02. a discussion of a general process to follow; and
03. a list of methodology steps defined by a methodology according to second level for process, innovation, study or share and commune in innovation, product planning, competitive analysis and environmental scanning, innovation investment planning portfolio analysis data mining, intellectual property valuation and metrics, information services and access sales, patent invention or socialize process means;
xi. a workflow defined according to workflow and alerts process means and processing of workflow task lists by a defined set of task steps managed by the system by a workflow system plugin means;
xii. a list of events, each represented by a cnxpt info-item, each stated with zero or more time points referenced according to either a specified horizon or the current real world frame, each having zero or more statuses based upon its type, each status susceptible to consensus voting, each event having a type selected from the group consisting of:

01. a suggested methodology step task, with status values roughly equivalent to suggested, prioritized, planned, scheduled, assigned, completed;
02. a planned task, with status values roughly equivalent to prioritized, scheduled, assigned, completed;
03. a task not completed, with status value set to a default value equivalent to incomplete;
04. a to-do item, with status values roughly equivalent to scheduled, assigned, completed;
05. a workflow task, with status values roughly equivalent to suggested, prioritized, planned, scheduled, specification completed, implemented, tested, queued, executed once, executing in repetition, assigned, completed;
06. an issue, with status values roughly equivalent to reported, planned, raised, prioritized, rejected, scheduled, assigned, completed, solved, implemented;
07. a trouble report, with status values roughly equivalent to reported, auto response sent, blog started, response sent, response planned, raised internally, prioritized, rejected, scheduled, assigned, completed, solved, implemented;
08. a request, with status values roughly equivalent to planned, raised, prioritized, rejected, scheduled, assigned, completed, solved, implemented;
09. an approval, with status values roughly equivalent to incomplete, approved, rejected, disapproved, funded, assigned, completed;
10. an outcome, with status values roughly equivalent to possible, accepted;
11. a chosen cnxpt representing a chosen path followed based upon a decision, with status values roughly equivalent to recommended, taken;
12. a deal made referencing a deal between parties, with status values roughly equivalent to suggested, prioritized, planned, scheduled, negotiating, specification completed, offer made, accepted, executed;
13. a transaction result event, with status values roughly equivalent to suggested, prioritized, planned, scheduled, negotiating, specification completed, transfer ready, paid;
14. a feature request, with status values roughly equivalent to reported, planned, raised, prioritized, rejected, scheduled, assigned, completed, solved, implemented, tested, alpha, beta, available;
15. a processing function required of a workflow, with status values roughly equivalent to incomplete, scheduled, in process, completed;
16. an acceptance required of a workflow, with status values roughly equivalent to incomplete, approved, rejected, disapproved, funded, assigned, completed;
17. a check-off required in a workflow, with status values roughly equivalent to incomplete, satisfactory, or improper;
18. result sets to cull, with status values roughly equivalent to scheduled, assigned, completed;
19. result set items to review, with status values roughly equivalent to scheduled, assigned, completed;
20. a general event, with status values roughly equivalent to scheduled, completed;
21. a historic event, with status values roughly equivalent to rejected and locked as historic, completed and locked as historic;
and
22. a close out event indication;

xiii. a visualized map based upon positioning of cnxpts within an area formed according to set or area map generation process means;
xiv. a visualized map based upon positioning of cnxpts within an area formed according to fxxt specific ttx map generation process means;
xv. a predictive map formed according to fxxt specific ttx map generation and predictive intelligence process means;
xvi. a workflow task map formed according to fxxt specific ttx map generation process means;
xvii. a process flow map formed according to fxxt specific ttx map generation process means;
xviii. a methodology step map formed according to fxxt specific ttx map generation process means;
xix. a portfolio expected monetary value map formed according to fxxt specific ttx map generation and primary predictions process means;
xx. a timeline event formed according to fxxt specific ttx map generation process means;
xxi. a methodology step map formed according to fxxt specific ttx map generation process means;
and
xxii. a visualized map formed according to fxxt specific ttx map generation process means on the basis of information generated by second level for process, predictive intelligence, primary predictions, or innovation investment planning, portfolio analysis, data mining, and metrics process means;

f. specifying the type of results to be produced, where the search results in the repositioning of at least one info-item in a map, said first form of result selected from the group consisting of:

i. a set of one or more repositionings, termed a general repositioning, each repositioning selected from the group consisting of:
01. a moving of a logical pointer, or data cursor, in a non-displayed logical view of said organization of knowledge, termed a scripted repositioning;
02. a moving of a visible viewing point in a displayed view of said organization of knowledge, termed a visual repositioning;
and
03. a moving of a mechanical point on a physically structured organization of knowledge, termed a physical repositioning;

ii. a general repositioning to a single cnxpt wherein said organization of knowledge is immediately repositioned to a single concept presented as the cntexxt defined by said single cnxpt;
iii. a general repositioning to a single cnxpt wherein said organization of knowledge within an area of consideration of cnxpts is immediately repositioned to a single concept presented as the cntexxt defined by said single cnxpt within said area of consideration;
iv. a general repositioning to a single cnxpt wherein said organization of knowledge within an area of interest of cnxpts is immediately repositioned to a single concept presented as the cntexxt defined by said single cnxpt within said area of interest;

v. a general repositioning to a single cnxpt wherein said organization of knowledge within a timeline of cnxpts is immediately repositioned to a single concept presented as the cntexxt defined by said single cnxpt within said timeline;
vi. a general repositioning to a single cnxpt wherein said organization of knowledge within a timeline ordered area of consideration of cnxpts is immediately repositioned to a single concept presented as the cntexxt defined by said single cnxpt within said area of consideration;
vii. a general repositioning to a single cnxpt wherein said organization of knowledge within a timeline ordered area of interest of cnxpts is immediately repositioned to a single concept presented as the cntexxt defined by said single cnxpt within said area of interest;
viii. a default form of repositioning based upon the type of requested search;
ix. a null repositioning result wherein no change of positions results;
and
x. an output or action, the result defined by a search analytic;

and g. specifying the type of results to be produced, where the search invokes an analytic, the pre-designated form of result of the analytic.

243. The method of claim 1 to also provide for locating an information resource or internal resource serving as an information resource by crawling, further including:

a. using zero or more cnxpts as binding points for crawl results, the bound parts selected from the group of:
i. the crawl identity;
ii. a description;
iii. the plan for information gathering including what to crawl, how to crawl, when to crawl, what to create from the crawl, the result set structures to result, determination of relevance, and other parameters for controlling the process;
iv. zero or more reusable queries, a completed query run modifying a result set;
v. the identity of the crawling instance;
vi. the crawling instance status;
vii. the recorded process of gathering, stating the effect on the resulting organization caused by queries, digesting, or culling, referencing the content, action, and the source;
viii. a list of the locators of information resources found as a result set with rsxitems related to irxt info-items representing information resources found, the information from one or more sources, the sources selected from the group: the internet, a heterogeneous repository, and a document management system;
ix. the dynamic history of work done in gathering and analyzing;
and
x. the overall basis of a crawl to collect and organize a dynamic organization of information relevant to the meaning of the cnxpt;

whereby a crawling engine obtains data from online repositories or mounted repository export data set.

244. The method of claim 1 to also provide for an ordering metric of returned results of a query, further including:

a. accepting zero or more additional parts of a first or next wisdom request command providing zero or more ordering specifications stating an ordering metric to apply to said first form of result after completion of said search if either said form of result, said type of wisdom sought, or said additional specifications indicate that an ordering is to be performed, according to the finding, searching, query and retrieval process means, said ordering by ordering metric to be applied in the order of specification of said additional part, said ordering by said form of result selected from the group consisting of:
b. a result set of identity indicators of a type specified by said additional specification listing each identity indicator of a type specified by said additional specification listing, in an order specified in said additional specification or ordered by a characteristic value wherein said characteristic is specified in said additional specification, said result set list for reviewing subject matter selected from the group consisting of: principle, standard, practice, field, jurisdiction, purlieu, trait, law, author, subject, fact, opinion, doctrine, study, study result, lab test report, evidence item, evidence type, element, documentary evidence, theory, topic, category, entry meaning, entry impact, precedent, entry relevance, rule, a user defined content type, an analytic content type; for cnxpt items based upon what appears to the user as a good choice of adjustment action according to said user's own criteria to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said second cnxpt meeting criteria of a type specified by said additional specification with zero or more satisfaction criterion values specified by said additional specification, said identity indicator of each second cnxpt representing a second cntexxt;
c. obtaining a result set from a search to ready for an action on the result set items of the result set, the type of action and type of result set items in the result set selected from the group of:
i. request display of a particular type of structural view of info-items based upon an entered type, to show the result set items of result set;
ii. request termination of interaction with said first form of result;
iii. narrow area of consideration to area of interest by eliminating dxos, ttxs, txos, or cnxpts from inclusion in area, or adding ttxs, txos, or cnxpts into area, according to narrow area of consideration to area of interest means;
iv. categorize or re-categorize cnxpts according to said organization of knowledge;
v. adjust characteristics or properties of search result info-items such as dxos, ttxs, txos, or cnxpts;
vi. prioritize cnxpts for further review according to specified workflow rules or to remove them from further review or from organization of knowledge, domain of wisdom, or commonplace of information;
vii. make contact with a person, project consortia, or organization associated with a result info-item;
viii. requesting purchase of a product associated with a result info-item;
ix. requesting investment in a project consortia, pool, or organization associated with a result info-item;

x. requesting the navigating to a cntexxt based upon wisdom found;

xi. categorizing source objects listed in a result set into an alternative contexts as represented by a cnxpt, said source object of a type selected from the group of: data sets, meta-data, files, information resources, statements, communications, templates, info-items, legal decisions, docket, story, transcripts, and documents after a query of a prior step has been repeated;

xii. accepting culling commands in manual review to categorize source objects listed in a result set into an alternative contexts as represented by a cnxpt, said source object of a type selected from the group of: data sets, meta-data, files, information resources, statements, communications, templates, info-items, legal decisions, docket, story, transcripts, and documents;

xiii. accepting culling commands in manual review to re-prioritize source objects listed in a result set for further review according to specified workflow rules or to remove them from further review or from collection of source objects in commonplace of information, said source object of a type selected from the group of: data sets, meta-data, files, information resources, statements, communications, templates, info-items, legal decisions, docket, story, transcripts, and documents;

xiv. categorizing rows of a data set listed in a result set into an alternative contexts as represented by a cnxpt after a query of a prior step has been repeated;

xv. accepting culling commands in manual review to categorize rows of a data set listed in a result set into an alternative contexts as represented by a cnxpt; and xvi. accepting culling commands in manual review to re-prioritize rows of a data set listed in a result set for further review according to specified workflow rules or to remove them from further review;

and d. accepting zero or one indications that said user has completed use of said first or next wisdom request command and indicating a resolution status for said command, said status selected from the group of:

i. search result satisfied need of user and resulted in locating the wisdom sought, optionally stating a retention paradigm, optionally stating a retention period;

ii. search result satisfied need of user at this time and search command is to be retained, optionally stating a retention paradigm, optionally stating a retention period;

iii. search result failed to satisfy need of user and should be abandoned as inadequate;

iv. a default indication that user has abandoned said search command for an unknown reason, wherein said search command is to be either retained for a predetermined period or retained for a stated period if said search command was previously marked for retention;

v. search result satisfied need of user but resulted in failing to locate the wisdom sought of a concept being conjured by said user while locating a first cntexxt wherein said user signifies that said wisdom should have been, wherein a new cnxpt should be created within said first cntexxt to objectify the concretized conjuring of said concept being conjured by said user, optionally requesting a differentiation from said user, optionally stating a retention paradigm, optionally stating a retention period;

vi. search result satisfied need of user but resulted in failing to locate the wisdom sought of a concept being conjured by said user and represented by a goal cnxpt while locating a first cntexxt wherein said user signifies that said wisdom should have been, wherein said goal is to be converted into a third cnxpt and located within said first cntexxt to objectify the concretized conjuring of said concept being conjured by said user, optionally stating a retention paradigm, optionally stating a retention period, wherein indications regarding the goal of how said concretized conjuring represented by said goal is differentiable from said first concept represented by said first cntexxt represented internally by said first cnxpt are applied to said third cnxpt, optionally requesting a differentiation from said user;

vii. search result satisfied need of user but resulted in failing to locate the wisdom sought while locating a cntexxt wherein said user signifies that said wisdom should have been, and said search command should be codified as a concept represented by a cnxpt; and viii. search result satisfied need of user but resulted in failing to locate the wisdom sought while locating a cntexxt wherein said user signifies that said wisdom should have been, and said search command should be codified as a concept represented by a cnxpt.

245. The method of claim 1, by executing stored instructions that perform operations to cause the computer system to locate a type of result required, further including:

a. accepting zero or one additional parts of a first or next wisdom request command providing an indication of a type of wisdom sought selected from the group consisting of:

i. accepting zero or one additional parts of a first or next wisdom request command providing an indication of general information types of wisdom sought selected from the group consisting of:

01. alert information;
02. analytic information;
03. associative position information navigation;
04. conceptual interrelationship info-item information;
05. entity similarity information;
06. business decision information;
07. business growth progress information;
08. business transaction information;
09. categorization information;
10. characteristic information;
11. commonality information;
12. competitive product information;
13. concept similarity information;
14. consortium artifact information;
15. consortium information;
16. contract transaction information;
17. crawl result information;
18. data availability and sales information;
19. goal information;
20. how-to information about invention;
21. how-to information about invention protection;
22. how-to information about innovative business growth;
23. info-item information;
24. information resource information;
25. interest shown by users;

26. satisfaction shown by users;
27. information about experts;
28. information about participants;
29. investment information;
30. investment opportunity information;
31. investment pool information;
32. investment diligence and vetting information;
33. legal case information;
34. legal case strategy information;
35. legal discovery status information;
36. legal discovery relevance information;
37. legal information;
38. legal precedent information;
39. methodology information;
40. communal mind mapping consensus information;
41. model information;
42. negotiation process tracking information;
43. occurrence information;
44. opinion information;
45. outline construction information;
46. patent clearance process information;
47. patent clearance exposure information;
48. plug-in information;
49. portfolio entry information;
50. portfolio information;
51. portfolio transaction information;
52. prediction information;
53. process analysis information;
54. process control information;
55. product design information;
56. product control information;
57. product longevity information;
58. project control information;
59. property information;
60. purlieu information;
61. registration information;
62. relationship info-item information;
63. research study information;
64. result set information;
65. statistical analysis information;
66. subscription and usage information;
67. survey information;
68. template information;
69. trait information;
70. transaction information;
and
71. workflow information;

ii. accepting zero or one additional parts of a first or next wisdom request command providing an indication of single item types of wisdom sought selected from the group consisting of:
01. a cnxpt info-item satisfying criteria;
02. a conceptual meaning;
03. a consortium info-item;
04. a crawl result;
05. a deal made in a consortium transaction;
06. a deal made in a portfolio transaction;
07. a deal made in an investment pool transaction;
08. a decision made in a consortium business decision;
09. a decision made in a portfolio business decision;
10. a decision made in an investment pool business decision;
11. a differentiator;
12. a discovery objective;
13. a fact to rule applicability ordered pair of cnxpt info-items;
14. a law info-item;
15. a legal charge theory of the case info-item;
16. a legal doctrine or principle info-item;
17. a legal fact info-item;
18. a legal general rule info-item;
19. a legal jurisdiction info-item;
20. a legal precedent info-item;
21. a legal rule element info-item;
22. a legal rule info-item;
23. a legal theory of the case info-item;
24. a link cited in an attached occurrence in said organization of knowledge;
25. a methodology info-item;
26. a model info-item;
27. a modeling result;
28. a participant info-item in a consortium;
29. a precedent successor dependency ordered pair of cnxpt info-items;
30. a prediction outcome info-item;
31. a prediction outcome value;
32. a prediction;
33. a property of a type of interest shown;
34. a property of a type of interest shown;
35. a property of an info-item;
36. a purlieu;
37. a query;
38. a registration;
39. a relationship info-item meaning;
40. a role of a consortium;
41. a set of matching pairings;
42. a set of applicability pairings;
43. a set of dependency pairings;
44. a specific rule;
45. a step in a fxxt specification info-item;
46. a step of a specification of an info-item having a specification for processing;
47. a study info-item;
48. a study objective;
49. a study result;
50. a subscription;
51. a survey result;
52. a task info-item in a timeline of a workflow;
53. a task info-item of a methodology;
54. a task info-item of a workflow;
55. a competitive constraint info-item;
56. a purlieu constraint info-item;
57. a tracked info-item of a consortium;
58. a trait of an info-item;
59. a transaction result;
60. a type of connected relationship;
61. a type of interest shown;
62. a type of relationship info-item;
63. a vote result;
64. a workflow info-item;
65. an information resource reference info-item;
66. an investment pool info-item;
67. an item of a blog;
68. an item of a commonality;
69. an item of a crawl result;
70. an item of a pool info-item;
71. an item of a portfolio info-item;
72. an item of a subscription;
73. an item of a transaction;
74. an occurrence info-item;
and 75. an opinion info-item;

iii. accepting zero or one additional parts of a first or next wisdom request command providing an indication of item identifier types of wisdom sought selected from the group consisting of:

01. an event info-item in a timeline of a workflow;
02. an evidence info-item;
03. an identifiable product of a task of a methodology;
04. an identity indicator an item of a portfolio;
05. an identity indicator of a child in said organization of knowledge;
06. an identity indicator of a commonality;
07. an identity indicator of a consortium info-item;
08. an identity indicator of a crawl result;
09. an identity indicator of a crawl specification info-item;
10. an identity indicator of a descendant in said organization of knowledge;
11. an identity indicator of a descendant leaf in said organization of knowledge;
12. an identity indicator of a fxxt info-item;
13. an identity indicator of a goal info-item;
14. an identity indicator of a methodology info-item;
15. an identity indicator of a model info-item;
16. an identity indicator of a parent in said organization of knowledge;
17. an identity indicator of a participant info-item in a consortium info-item;
18. an identity indicator of a plug-in;
19. an identity indicator of a pool info-item;
20. an identity indicator of a portfolio info-item;
21. an identity indicator of a prediction info-item;
22. an identity indicator of a query specification info-item;
23. an identity indicator of a registration;
24. an identity indicator of a result set;
25. an identity indicator of a role info-item of a consortium info-item;
26. an identity indicator of a sibling in said organization of knowledge;
27. an identity indicator of a step in a fxxt specification;
28. an identity indicator of a step of a methodology info-item;
29. an identity indicator of a step of a model specification info-item;
30. an identity indicator of a step of a prediction specification info-item;
31. an identity indicator of a step of a query specification info-item;
32. an identity indicator of a step of a workflow info-item;
33. an identity indicator of a subscription specification;
34. an identity indicator of a task info-item in a timeline of a workflow info-item;
35. an identity indicator of a task info-item of a methodology info-item;
36. an identity indicator of a task info-item of a workflow info-item;
37. an identity indicator of a tracked item of a consortium info-item;
38. an identity indicator of a transaction info-item;
39. an identity indicator of a type of interest shown;
40. an identity indicator of a workflow info-item;
41. an identity indicator of an alert info-item;

42. an identity indicator of an analytic;
43. an identity indicator of an ancestor in said organization of knowledge;
44. an identity indicator of an ancestor root in said organization of knowledge;
45. an identity indicator of an attached occurrence in said organization of knowledge;
46. an identity indicator of an avatar info-item;
47. an identity indicator of an event info-item in a timeline of a workflow info-item;
48. an identity indicator of an info-item connected by relationship info-item in said organization of knowledge;
49. an identity indicator of an information resource referenced in an attached occurrence info-item in said organization of knowledge;
50. an identity indicator of an item of a blog;
51. an identity indicator of an item of a commonality specification;
52. an identity indicator of an item of a crawl result;
53. an identity indicator of an item of a pool;
54. an identity indicator of an item of a result set;
55. an identity indicator of an item of a subscription;
56. an identity indicator of an item of a transaction; and
57. an identity indicator value;

iv. accepting zero or one additional parts of a first or next wisdom request command providing an indication of list types of wisdom sought selected from the group consisting of:

01. a list of alerts;
02. a list of analytics;
03. a list of avatars;
04. a list of characteristic or property information regarding an info-item;
05. a list of characteristics;
06. a list of cnxpt info-items;
07. a list of commonalities;
08. a list of conceptual meanings;
09. a list of consortium info-items;
10. a list of crawl info-items;
11. a list of crawl results;
12. a list of decisions made;
13. a list of decisions needed;
14. a list of differentiators;
15. a list of fxxt info-items;
16. a list of goal info-items;
17. a list of identity indicators;
18. a list of info-items;
19. a list of information resource reference info-items;
20. a list of information resources;
21. a list of items of a result set;
22. a list of items of a set of crawl results;
23. a list of items of a set of pools;
24. a list of items of a set of portfolios;
25. a list of items of a subscription;
26. a list of items of a transaction;
27. a list of items of blogs;
28. a list of items of commonalities;
29. a list of links;
30. a list of methodology info-items;
31. a list of model info-items;
32. a list of occurrence info-items;
33. a list of outcome info-items;
34. a list of outcomes possible;
35. a list of pairs of cnxpt dependencies;

36. a list of pairs of cnxpts matching by applicability;
37. a list of pairs of cnxpts matching by interest;
38. a list of pairs of cnxpts matching by suitability;
39. a list of pairs of cnxpts matching by a constraint;
40. a list of pairs of cnxpts matching by trait;
41. a list of pairs of cnxpts matching semantically;
42. a list of participant info-items in a list of consortium info-items;
43. a list of plug-ins;
44. a list of pool info-items;
45. a list of portfolio info-items;
46. a list of precedent successor dependency pairs of cnxpts;
47. a list of prediction info-items;
48. a list of properties of types of interest shown;
49. a list of properties;
50. a list of purlieu;
51. a list of queries;
52. a list of registrations;
53. a list of relationships;
54. a list of result sets;
55. a list of roles of consortiums;
56. a list of steps in fxxts;
57. a list of steps of a specification of an info-item having a specification for processing;
58. a list of steps of a specification of an info-item having a specification stating actions to be taken by a user or to be carried out by a processor;
59. a list of steps of methodologies;
60. a list of steps of models;
61. a list of steps of predictions;
62. a list of task info-items of a specification of an info-item having a specification stating actions to be taken by a user;
63. a list of tasks in timelines of workflows;
64. a list of tasks of a set of methodologies;
65. a list of tasks of a set of workflows;
66. a list of tracked items of consortiums;
67. a list of traits;
68. a list of transactions;
69. a list of types of interest shown;
70. a list of types of relationships;
and
71. a list of workflows;

v. accepting zero or one additional parts of a first or next wisdom request command providing an indication of pair types of wisdom sought selected from the group consisting of:
01. a pair of cnxpts matching by interest;
02. a pair of cnxpts matching by suitability;
03. a pair of cnxpts matching by a constraint;
04. a pair of cnxpts matching by trait;
05. a pair of cnxpts matching semantically;
06. a metric ordered area of consideration of cnxpts;
07. a metric ordered area of interest of cnxpts;
08. a metric ordered result set;
09. an ordered pair of cnxpts matching by suitability of evidence to discovery objective;
10. an ordered pair of cnxpts matching by suitability of evidence to fact;
11. an ordered pair of cnxpts matching by suitability of fact to rule element;
12. an ordered pair of cnxpts matching by suitability of function to audience;
13. an ordered pair of cnxpts matching by suitability of function to need;
14. an ordered pair of cnxpts matching by suitability rule to jurisdiction;
and
15. an ordered pair of cnxpts matching semantically;

vi. accepting zero or one additional parts of a first or next wisdom request command providing an indication of result set types of wisdom sought selected from the group consisting of:
01. a result of a fxxt specification;
02. a result of a model specification;
03. a result of a workflow specification;
04. a result set of pairs of cnxpts matching by interest;
05. a result set of pairs of cnxpts matching by suitability;
06. a result set of pairs of cnxpts matching by a constraint;
07. a result set of pairs of cnxpts matching by trait;
08. a result set of pairs of cnxpts matching semantically;
and
09. a result set of precedence dependency pairs of cnxpts;

vii. accepting zero or one additional parts of a first or next wisdom request command providing an indication of action types of wisdom sought selected from the group consisting of:
01. an action triggered by said search;
02. an action defined by a search analytic triggered by said search;
03. an event triggered by said search;
and
04. an event defined by a search analytic triggered by said search;

viii. accepting zero or one additional parts of a first or next wisdom request command providing an indication of other types of wisdom sought selected from the group consisting of:
01. a general repositioning to a single cnxpt apparently having a meaning best matching, according to a requested search intended by user to indicate the meaning sought as a goal of said user, a point within the cntexxt defined by said single cnxpt to indicate to said user the likely location of the concept defined by said goal, wherein said organization of knowledge is immediately repositioned to said point in said cntexxt;
02. a list, formed in response to a specification requesting the list of immediate children or the cntexxt children or the list of members of said cntexxt of said specifically identified cnxpt in said specifically identified descendent tree, consisting of: the set of all second cnxpts in a cntexxt represented by a specifically identified cnxpt such that each second cnxpt is the child in a parent-child relationship info-item with said specifically identified cnxpt, wherein said specification also states that said list is to contain only the immediate child cnxpts of said specifically identified cnxpt in said specifically identified descendent tree, said list termed the list of immediate children of said cntexxt represented by said specifically identified cnxpt in said specifically identified descendent tree, said list termed the list of members of said cntexxt represented by said specifically identified cnxpt in said specifically identified descendent tree, said list termed the list of children of said cntexxt represented by said specifically identified cnxpt in said specifically identified descendent tree, each item in said list of members termed a member of said cntexxt represented by said specifically identified cnxpt in said specifically identified descendent tree, each item in said list of members termed a child of said specifically identified cnxpt in said specifically identified descendent tree;

03. a list, formed in response to a specification requesting the list of descendants of said specifically identified cnxpt in said specifically identified descendent tree, consisting of: the set of all member cnxpts in a cntexxt represented by a specifically identified cnxpt plus each second cnxpt that is the child in a parent-child relationship info-item with any of said member cnxpts or, iteratively, with any other such second cnxpts, but excluding said specifically identified cnxpt, wherein said specification also states that said list is to contain direct descendant cnxpts at all levels of descendancy of said specifically identified cnxpt in said specifically identified descendent tree, said list termed the list of descendants of said specifically identified cnxpt in said specifically identified descendent tree;

04. a list, formed in response to a specification requesting the list of siblings of said specifically identified cnxpt in said specifically identified descendent tree, consisting of: the set of all member cnxpts in a cntexxt containing a specifically identified cnxpt, said set of member cnxpts reduced to eliminate as a set member said specifically identified cnxpt and the cnxpt representing said cntexxt containing a specifically identified cnxpt, wherein said specification also states that said list is to contain the sibling cnxpts of said specifically identified cnxpt in a specifically identified descendent tree, said list termed the list of siblings of said specifically identified cnxpt in said specifically identified descendent tree;

05. a list, formed in response to a specification requesting the leaf list of said specifically identified cnxpt in said specifically identified descendent tree, consisting of: the set of all member cnxpts of a specifically identified cntexxt represented by a specifically identified cnxpt and a specifically identified descendent tree, said list comprising the set of second cnxpts such that the second cnxpt is a descendant of said specifically identified cnxpt if the cntexxt represented by said second cnxpt itself is empty such that said second cnxpt has no descendants in said specifically identified descendent tree, or said specifically identified cnxpt if said specifically identified cntexxt itself is empty such that said specifically identified cnxpt has no descendants in said specifically identified descendent tree, said list termed the leaf list of said specifically identified cntexxt in said specifically identified descendent tree, said leaf cnxpt termed a leaf of said specifically identified cntexxt in said specifically identified descendent tree, said leaf cnxpt termed a leaf of said specifically identified descendent tree;

06. a tree, formed in response to a specification requesting the sub-tree of said cntexxt of said specifically identified cnxpt in said specifically identified descendent tree, consisting of: the set of all member cnxpts of a specifically identified cntexxt represented by a specifically identified cnxpt and a specifically identified descendent tree, said list comprising the set of second cnxpts such that the second cnxpt is a descendant of said specifically identified cnxpt and said specifically identified cnxpt, and all interconnecting hierarchical relationships from said specifically identified descendent tree, said hierarchical relationships being either between said member cnxpts or between said member cnxpts and said specifically identified cnxpt, said tree termed the sub-tree of said specifically identified cntexxt in said specifically identified descendent tree, said tree termed the sub-tree of said specifically identified cnxpt in said specifically identified descendent tree, said tree termed a sub-tree of said specifically identified descendent tree;

07. a list, formed in response to a specification requesting the leaf list of a specifically identified sub-tree of a specifically identified descendent tree, consisting of: the set of all second cnxpts of a specifically identified sub-tree of a specifically identified descendent tree said sub-tree represented by a specifically identified first cnxpt, said list consisting of: all second cnxpts representing a sub-tree with but one member such that said second cnxpt has no descendants in said specifically identified descendent tree, said list termed the leaf list of said specifically identified first cnxpt in said specifically identified descendent tree, each of said second cnxpts in said leaf list termed a leaf of said specifically identified sub-tree in said specifically identified descendent tree, each of said second cnxpts in said leaf list termed a leaf of said specifically identified descendent tree;

08. a list, formed in response to a specification requesting the parent list of said specifically identified descendent tree, consisting of: the set of all second cnxpts in a specifically identified descendent tree such that each second cnxpt represents a cntexxt in a specifically identified descendent tree, said cntexxt having at least one member other than said second cnxpt representing said cntexxt, said list termed the parent list of said specifically identified descendent tree, each said second cnxpt in said parent list termed a parent cnxpt in said specifically identified descendent tree, each said parent cnxpt termed the parent of the cntexxt represented by said parent cnxpt in said specifically identified descendent tree;

09. a list, formed in response to a specification requesting the list of uncles of said specifically identified cnxpt in said specifically identified descendent tree or the list of uncles of said cntexxt of which a specifically identified cnxpt is a member in said specifically identified descendent tree or an uncle of a member of said cntexxt of which said specifically identified cnxpt is a member in said specifically identified descendent tree, consisting of: the set of all second cnxpts in a specifically identified descendent tree such that each second cnxpt is a sibling cnxpt of the cnxpt representing the cntexxt of which a specifically identified cnxpt is a member in said specifically identified descendent tree but excluding said cnxpt representing the cntexxt of which said specifically identified cnxpt is a member, said list termed the list of uncles of said specifically identified cnxpt in said specifically identified descendent tree, said list termed the list of uncles of said cntexxt of which a specifically identified cnxpt is a member in said specifically identified descendent tree, each item in said list of uncles termed an uncle of each member of said cntexxt of which said specifically identified cnxpt is a member in said specifically identified descendent tree;

10. a list, formed in response to a specification requesting the root list of said specifically identified descendent tree, consisting of: the set of all second cnxpts of a specifically identified descendent tree such that said second cnxpt has no parent in said specifically identified descendent tree regardless of whether said second cnxpt has no children in said specifically identified descendent tree, each said second cnxpt termed a root of said specifically identified descendent tree, said list termed the root list of said specifically identified descendent tree;

11. a list, formed in response to a specification requesting the root list of said specifically identified descendent tree, consisting of: the set of all second cnxpts of a specifically identified cntexxt represented by a specifically identified cnxpt and a specifically identified descendent tree, said list containing said specifically identified cnxpt regardless of whether said cntexxt itself is empty such that said specifically identified cnxpt is a leaf and also containing the parent in said specifically identified descendent tree of any said second cnxpt in said list, said list termed the ascendant list of said specifically identified cntexxt in said specifically identified descendent tree, each said second cnxpt termed an ascendant cnxpt of said specifically identified cntexxt in said specifically identified descendent tree, said list together with the hierarchical relationships connecting said ascendant cnxpts to form said specifically identified descendent tree termed the ascendant path of said specifically identified cntexxt in said specifically identified descendent tree;

12. a list, formed in response to a specification requesting the list of uncles of said specifically identified cnxpt in said specifically identified descendent forest or the list of forest uncles of said cntexxt of which a specifically identified cnxpt is a member in said specifically identified descendent forest, consisting of: the set of all second cnxpts in a specifically identified descendent forest such that each second cnxpt is a sibling cnxpt of the cnxpt representing the cntexxt of which a specifically identified cnxpt is a member in said specifically identified descendent forest plus any root in said specifically identified descendent forest if said cnxpt representing the cntexxt of which a specifically identified cnxpt is a member is also a root, but excluding said cnxpt representing the cntexxt of which said specifically identified cnxpt is a member, said list termed the list of uncles of said specifically identified cnxpt in said specifically identified descendent forest, said list termed the list of forest uncles of said cntexxt of which a specifically identified cnxpt is a member in said specifically identified descendent forest, each item in said list of uncles termed an uncle of each member of said cntexxt of which said specifically identified cnxpt is a member in said specifically identified descendent forest;

13. a list, formed in response to a specification requesting the root list of said specifically identified descendent forest, consisting of: the set of all second cnxpts of a specifically identified descendent forest such that said second cnxpt has no parent in said specifically identified descendent forest regardless of whether said second cnxpt has no children in said specifically identified descendent forest and regardless of whether said specifically identified descendent forest has more than one said second cnxpt, each said second cnxpt termed a root of said specifically identified descendent forest, said list termed the root list of said specifically identified descendent forest, said list alternatively termed the forest root list of said specifically identified descendent forest, said specifically identified descendent forest alternatively termed a tree where only a single said second cnxpt exists in specifically identified descendent forest;

14. a list, formed in response to a specification requesting the list of siblings of said specifically identified root cnxpt in said specifically identified descendent tree, consisting of: the set of all second root cnxpts in a specifically identified descendent forest containing a specifically identified root cnxpt, said set of second root cnxpts reduced to eliminate as a set member said specifically identified root cnxpt, wherein said specification also states that said list is to contain the sibling cnxpts of said specifically identified cnxpt in a specifically identified descendent tree, said list termed the list of siblings of said specifically identified root cnxpt in said specifically identified descendent tree;

15. a list, formed in response to a specification requesting the ascendant sub-tree of said specifically identified cntexxt in said specifically identified ascendant tree, consisting of: the set of all second cnxpts of a specifically identified cntexxt represented by a specifically identified cnxpt and a specifically identified ascendant tree, said list containing said specifically identified cnxpt regardless of whether said cntexxt itself is empty such that said specifically identified cnxpt is a leaf and also containing the parent in said specifically identified ascendant tree of any said second cnxpt in said list, said list termed the ascendant list of said specifically identified cntexxt in said specifically identified ascendant tree, each said second cnxpt termed an ascendant cnxpt of said specifically identified cntexxt in said specifically identified ascendant tree, said list together with the set of hierarchical relationships connecting said ascendant cnxpts taken from the list of hierarchical relationships connecting said specifically identified ascendant tree termed the ascendant sub-tree of said specifically identified cntexxt in said specifically identified ascendant tree;

16. a visualized map, formed in response to a specification requesting the display of a co-location map of concepts, consisting of: the visualization of the set of cnxpts within a specifically identified forest selected from the group consisting of: ascendant forest and descendent forest, with placement on the root level and placement within any parent cnxpt determined by co-location positioning, according to map generation function means, said map termed a co-location map of said specifically identified forest;

17. a list, formed in response to a specification requesting the primary flow list in said specifically identified forest, consisting of: the set of all ordered pairs of cnxpts consisting of: the set of a first cnxpt in a first position and a second cnxpt in the second position such that each said first cnxpt and each said second cnxpt are both in a specifically identified forest selected from the group consisting of: ascendant forest and descendent forest, such that said first cnxpt is a predecessor in a flow-type directed association to said second cnxpt as successor, said ordered pair termed a primary flow pair in said specifically identified forest, said first cnxpt termed a primary predecessor flow cnxpt of said primary flow pair, said second cnxpt termed a primary successor flow cnxpt of said primary flow pair, said list of ordered pairs termed a primary flow list in said specifically identified forest;

18. a list, formed in response to a specification requesting the same level primary flow list in said specifically identified forest, consisting of: the set of all primary flow pairs in a specifically identified forest selected from the group consisting of: ascendant forest and descendent forest, such that the predecessor cnxpt and the successor cnxpt in said primary flow pair are both in the same level as specified from the distance from a root of the forest, said primary flow pair termed a same level primary flow pair, said list of same level primary flow pairs termed a same level primary flow list in said specifically identified forest;

19. a list, formed in response to a specification requesting the different level primary flow list in said specifically identified forest, consisting of: the set of all primary flow pairs in a specifically identified forest selected from the group consisting of: ascendant forest and descendent forest, such that the predecessor cnxpt and the successor cnxpt in said primary flow pair are not in the same level as specified from the distance from a root in the forest, said primary flow pair termed a different level primary flow pair, said list of different level primary flow pairs termed a different level primary flow list in said specifically identified forest;

20. a list, formed in response to a specification requesting the same level secondary flow list in said specifically identified forest, consisting of: the set of all ordered pairs of cnxpts consisting of: the set of a first cnxpt in a first position and a second cnxpt in the second position such that each said first cnxpt and each said second cnxpt are both in a specifically identified forest selected from the group consisting of: ascendant forest and descendent forest, such that said first cnxpt and said second cnxpt are both in the same level as specified from the distance from a root of the forest, such that either an ascendant of said first cnxpt is a predecessor in a primary flow pairs where said second cnxpt is successor or that said first cnxpt is a predecessor in a primary flow pairs where an ascendant of said second cnxpt is successor, said ordered pair termed a same level secondary flow pair in said specifically identified forest, said first cnxpt termed a secondary predecessor flow cnxpt of said same level secondary flow pair if said same level secondary flow pair was added because of an ascendant of said first cnxpt in first position, said second cnxpt termed a secondary successor flow cnxpt of said same level secondary flow pair if said same level secondary flow pair was added because of an ascendant of said second cnxpt in second position, said list of ordered pairs termed a same level secondary flow list in said specifically identified forest;

21. a list, formed in response to a specification requesting the same level flow tensor list in said specifically identified forest, consisting of: the set of all ordered tuples each consisting of: a first cnxpt, a second cnxpt, and a weight from a set of flow pairs in a specifically identified forest selected from the group consisting of: ascendant forest and descendent forest, each flow pair selected from the group consisting of: a same level secondary flow pair and a same level primary flow pair, such that one ordered tuple will exist in the list if any matching flow pair exists wherein said first cnxpt of said ordered tuple is the predecessor cnxpt in a flow pair where said second cnxpt is the successor cnxpt, said ordered tuple forming a weighted summarization of its matching flow pairs such that a weight is computed for said ordered tuple according to the generate flow tensors for enforcing map segment positioning process means, said ordered tuple termed a same level flow tensor, said list of same level flow tensor termed a same level flow tensor list in said specifically identified forest;

22. a list, formed in response to a specification requesting the root level flow tensor list in said specifically identified forest, consisting of: the set of all ordered tuples each consisting of: a first cnxpt, a second cnxpt, and a weight generated from the set of same level flow tensors in a specifically identified forest selected from the group consisting of: ascendant forest and descendent forest, such that one ordered tuple will exist in the list if any matching same level flow tensor exists wherein said first cnxpt of said ordered tuple is the cnxpt in the first position in a same level flow tensor where said second cnxpt is cnxpt in the second position in said same level flow tensor tuple or said first cnxpt of said ordered tuple is the root of the tree containing the cnxpt in the first position in a same level flow tensor where said second cnxpt is the root of the tree containing the cnxpt in the second position in said same level flow tensor tuple, such that said first and said second cnxpts are roots in said forest, said ordered tuple forming a weighted summarization of its basis same level flow tensor tuples such that a weight is computed for said ordered tuple according to the generate flow tensors for enforcing map segment positioning process means, said ordered tuple termed a root level flow tensor, said list of root level flow tensors termed a root level flow tensor list in said specifically identified forest; and 23. a visualized map, formed in response to a specification requesting the display of a flow visualization optionally in conjunction with co-location map of concepts, consisting of: the visualization of the set of cnxpts listed in the ordered tuples of all summarized flow tensors for a specifically identified forest selected from the group consisting of: ascendant forest and descendent forest, with placement on any level primarily determined by said tensor directions and weights and secondarily influenced by co-location positioning, according to map generation function means and generate flow tensors for enforcing map segment positioning process means, said map termed a flow map of said specifically identified forest.

246. The method of claim 1, by executing stored instructions that perform operations to cause the computer system to locate wisdom sought from a particular starting point, further including:

a. accepting zero or more additional parts of a first or next wisdom request command each providing a reference to an identified search base to be used as a parameter in said first or next wisdom request in an order given by the ordering of said additional part in said first or next wisdom request specification, said identified search base selected from the group consisting of:

i. a reference to a search cnxpt base the first defined and identifiable cnxpt selected from the group consisting of:

01. a specifically identified cnxpt as specified by an identity indicator;

02. the first cnxpt in a specifically identified list specified to be generated first;

03. an indicated cnxpt;

04. a cnxpt represented by a cntexxt presently selected in a visualization; and 05. a cnxpt represented by the cntexxt presently being focused upon in a visualization;

ii. a reference to a search cnxpt list base the first defined and identifiable list of cnxpts selected from the group consisting of:

01. a specifically identified result set of cnxpts containing a plurality of identity indicators;

02. a specifically identified list of cnxpts containing a plurality of identity indicators;

03. a list of cnxpts in a specifically identified list being the first form of result of a prior wisdom request command termed herein as an identified list specified to be generated first;

04. an indicated result set of cnxpts containing a plurality of identity indicators;

05. an indicated list of cnxpts containing a plurality of identity indicators;

06. a list consisting of: the set of cnxpts in a cntexxt presently indicated in a visualization and represented by a cnxpt;

07. a list created from the set of all cnxpts selected in a selected grouping;

08. a list consisting of: the set of cnxpts in a cntexxt presently selected in a visualization and represented by a cnxpt; and 09. a list consisting of: the set of cnxpts in a cntexxt presently focused upon in a visualization and represented by a cnxpt;

iii. a reference to a search info-item base the first defined and identifiable info-item selected from the group consisting of:

01. a specifically identified info-item;

02. the first info-item in a specifically identified list specified to be generated first;

03. an indicated info-item; and 04. a info-item presently selected in a visualization;

iv. a reference to a search info-item list base the first defined and identifiable list of info-items selected from the group consisting of:

01. a specifically identified result set of info-items containing a plurality of identity indicators;

02. a specifically identified list of info-items containing a plurality of identity indicators;

03. a list being the first form of result of a prior wisdom request command termed herein as an identified list specified to be generated first;

04. an indicated result set of info-items containing a plurality of identity indicators;

05. an indicated list of info-items containing a plurality of identity indicators;

06. a list consisting of: the set of info-items selected in a visualization; and 07. a list consisting of: the set of info-items presently focused upon in a visualization;

v. a reference to a search relationship info-item base the first defined and identifiable relationship info-item selected from the group consisting of:

01. a specifically identified relationship info-item;

02. the first relationship info-item in a specifically identified list specified to be generated first;

03. an indicated relationship info-item; and 04. a relationship info-item presently selected in a visualization;

vi. a reference to a first search relationship info-item list base the first defined and identifiable list of relationship info-items selected from the group consisting of:

01. a specifically identified result set of relationship info-items containing a plurality of identity indicators;

02. a specifically identified list of relationship info-items containing a plurality of identity indicators;

03. a list created from the set of all relationships connected to a cnxpt representing a cntexxt specifically identified;

04. a list created from the set of all relationships connected to the plurality of cnxpts in the set of cnxpts in a cntexxt specifically identified;

05. a list being the first form of result of a prior wisdom request command termed herein as an identified list specified to be generated first;

06. an indicated result set of relationship info-items containing a plurality of identity indicators;

07. an indicated list of relationship info-items containing a plurality of identity indicators;

08. a list created from the set of all relationships connected to a cnxpt representing a cntexxt presently selected in a visualization; specifically identified in additional;

09. a list created from the set of all relationships connected to a cnxpt representing a cntexxt presently selected in a visualization;
10. a list created from the set of all relationships connected to a cnxpt representing a cntexxt presently selected in a visualization;
11. a list created from the set of all relationships connected to the plurality of cnxpts in the set of cnxpts in a cntexxt presently selected in a visualization and represented by a cnxpt;
12. a list consisting of: the set of relationship info-items selected in a visualization;
13. a list created from the set of all relationships connected to a cnxpt representing a cntexxt presently indicated in a visualization;
14. a list created from the set of all relationships connected to the plurality of cnxpts in the set of cnxpts in a cntexxt presently indicated in a visualization and represented by a cnxpt;
15. a list consisting of: the set of relationship info-items presently focused upon in a visualization;
16. a list created from the set of all relationships connected to a cnxpt representing a cntexxt presently focused upon in a visualization;
and
17. a list created from the set of all relationships connected to the plurality of cnxpts in the set of cnxpts in a cntexxt presently focused upon in a visualization;

vii. a reference to a search value base the first defined and identifiable value selected from the group consisting of:
01. a specifically identified value given in said additional specification;
and
02. the value of the first entry in a specifically identified list specified to be generated first;

viii. a reference to a identified search base the first defined and identifiable list of values selected from the group consisting of:
01. a result set of values, specifically identified in said additional specification, containing a plurality of values;
02. a list of values, specifically identified in said additional specification, containing a plurality of values;
03. a list being the first form of result of a prior wisdom request command termed herein as an identified list specified to be generated first;
04. an indicated result set of values containing a plurality of values;
and
05. an indicated list of values containing a plurality of values;

ix. a reference to a search type identifier base the first defined and identifiable type identifier selected from the group consisting of:
01. a specifically identified type identifier given in said additional specification;
and
02. the type identifier of the first entry in a specifically identified list specified to be generated first;

x. a reference to a identified search base the first defined and identifiable list of type identifiers selected from the group consisting of:
01. a result set of type identifiers, specifically identified in said additional specification, containing a plurality of type identifiers;
02. a list of type identifiers, specifically identified in said additional specification, containing a plurality of type identifiers;
03. a list being the first form of result of a prior wisdom request command termed herein as an identified list specified to be generated first;
04. an indicated result set of type identifiers containing a plurality of type identifiers;
and
05. an indicated list of type identifiers containing a plurality of type identifiers;

xi. a reference to a search data set row of the first defined and identifiable data set selected from the group consisting of:
01. a specifically identified data set and an ordering query equivalent to an SQL select with an order by clause;
02. an indicated data set row;
03. a data set row presently selected in a result set list of data set rows;
and
04. a data set row presently selected in a display list;

xii. a reference to a search data set table of the first defined and identifiable data set selected from the group consisting of:
01. a specifically identified data set and a table identity;
02. a specifically identified data set and a generating query equivalent to an SQL select;
03. an indicated data set table;
04. a data set table formed from the plurality of rows presently selected in a result set list of data set rows;
05. a data set table presently selected in a result set list of data set tables;
06. a data set table presently selected in a display list;
and
07. a data set and a temporary table being the first form of result of a prior wisdom request command termed herein as an identified data set temporary table specified to be generated first;

xiii. a reference to a search goal base the first defined and identifiable goal selected from the group consisting of:
01. a specifically identified goal as specified by an identity indicator;
02. an indicated goal;
03. a goal presently selected in a visualization;
and
04. a goal presently being focused upon in a visualization;

xiv. a reference to a matching, dependency, applicability, or other list of pairings the first defined and identifiable item or list selected from the group consisting of:
01. a specifically identified pairing as specified by an identity indicator;
02. a specifically identified pairing list;
03. a relationship info-item stating a pairing presently indicated in a visualization;
04. a set of relationships stating pairings presently indicated in a visualization;
05. a relationship info-item stating a pairing presently selected in a visualization;

and 06. a set of relationships stating pairings presently selected in a visualization;

xv. a reference to a search result set;

xvi. a reference to a fxxt specification extraction set possibly unresolved;

xvii. a reference to a list of information resources identity indicator values;

xviii. a reference to a search query specification step possibly unresolved;

xix. a reference to a search query specification possibly unresolved;

and xx. a reference to a database search query possibly unresolved.

247. The method of claim 1, by executing stored instructions that perform operations to cause the computer system to locate wisdom sought based upon additional criteria, further including:

a. accepting zero or more additional parts of a first or next wisdom request command each providing an additional specification to be used as a value, weight, parameter, indicator, switch, ordering, type, structure, object, analytic, degree of fuzziness, or other criterion in said first or next wisdom request in a priority order given by the ordering of said additional part in said first or next wisdom request specification such that any subsequent additional specification part of the same type will be utilized, in order, only if its sequence ordinal is less than or equal to the number of such criterion of such type called for in said search request specification of said first or next wisdom request command, said additional specification selected from the group consisting of:

i. a reference to a search query specification based upon which said result set presently existing was last modified, such that a default value of a null list is established if no reference is otherwise specified;

ii. an indicator stating whether a weighting is to be applied when combining consensus and said user's opinion, such that a default value equivalent to indicating that no weighting is to be applied is established if no indicator is otherwise specified;

iii. a weighting specification for combining consensus and said user's opinion, such that a default value of all coefficients being equal to one is to be applied is established if no weighting specification is otherwise specified;

iv. a relevance coefficient specification for combining consensus and said user's opinion, such that a default value of all relevance coefficients being equal to one is to be applied is established if no relevance specification is otherwise specified;

v. a pertinence coefficient specification for combining consensus and said user's opinion, such that a default value of all pertinence coefficients being equal to one is to be applied is established if no pertinence specification is otherwise specified;

vi. an indicator stating whether a degree of fuzziness is to be applied when combining consensus and said user's opinion, such that a default value equivalent to indicating that no fuzziness is to be applied is established if no indicator of use of fuzziness is otherwise specified;

vii. a value of a degree of fuzziness for combining consensus and said user's opinion, such that a default value of no fuzziness is to be applied is established if no fuzziness specification is otherwise specified;

viii. a value of a per-level inheritance effect dampening coefficient for combining consensus and said user's opinion based upon common ancestry in an organization of knowledge, such that a value of said per-level inheritance effect dampening coefficient is specified for a stated number of levels separating two cnxpts in an organization of knowledge, such that a default value of one is to be applied is established if no per-level inheritance effect dampening coefficient specification is otherwise specified;

ix. an indicator stating whether an ordering is to be applied to said first form of result after completion, such that a default value equivalent to indicating that no ordering is to be applied is established if no indicator is otherwise specified;

x. a type of ordering to apply to said first form of result after completion, such that a default for ordering is by said form of result selected from the group consisting of:

01. for modeling result, estimation, and prediction forms of result, a value of null ordering is to be applied if no metric is specified;

02. for timeline forms of result, ordering is by a time, process precedence, event precedence, or other metric, a default type of temporal ordering is to be applied if no type or metric is specified;

03. for co-location and area map forms of result, ordering for co-location is by descendent tree extraction process means based upon results of fxxt extraction process means;

04. for flow maps forms of result, ordering for flow is by a time, process precedence, event precedence, or other metric, a default type of temporal ordering is to be applied if no type or metric is specified;

05. for movement, ordering is by weighted averaging of algorithm scoring utilizing similarity criteria and a default type of least distance to move is to be applied if no ordering specification type is specified;

and 06. for list, portfolio table, report, and result set forms of result, ordering is by weighted averaging of algorithm scoring utilizing similarity criteria and a default type of null or random ordering is to be applied if no ordering specification type is specified;

xi. a type value, such that a default value equivalent to inclusion of all types are to be applied is established if no type specification is otherwise specified;

xii. an citation type value, such that a default value equivalent to a name citation type is established if no citation type specification is otherwise specified;

xiii. a causality type value, such that a default value equivalent to a simple, categorical, direct, precipitating causality type is established if no causality type specification is otherwise specified;

xiv. a probability distribution, such that a default value equivalent to perfect likelihood is established if no distribution specification is otherwise specified, said distribution optionally having a characteristic function or non-linear or non-continuous description;

xv. an identity indicator type value, such that a default value equivalent to a name identity indicator type in a default language is established if no identity indicator type specification is otherwise specified;

xvi. an identity indicator type value indicating a result set item descriptor, such that a default value equivalent to a name identity indicator type in a default language is established if no identity indicator type value indicating a result set item descriptor is otherwise specified;

xvii. an identity indicator type value indicating a result set item unique identity indicator, such that a default value equivalent to null is established if no identity indicator type value indicating a result set item unique identity indicator is otherwise specified;

xviii. an identity indicator indicating an organization of knowledge;

xix. a list combination specification;

xx. a number of characters;

xxi. a position in a string;

xxii. a number of entries;

xxiii. a value of the form of an identity indicator;

xxiv. a value of the form of an info-item property;

xxv. a value of the form of an info-item characteristic;

xxvi. a value of the form of a trait;

xxvii. a value of the form of a purlieu;

xxviii. a value of the form of a keyword;

xxix. a value of the form of an info-item characteristic identifier;

xxx. a value of the form of an info-item property identifier;

xxxi. a value of the form of a data set attribute identifier;

xxxii. a value of the form of a data set attribute;

xxxiii. a value of the form of a data set table identifier;

xxxiv. a position in a list;

xxxv. a number of items;

xxxvi. a position in a result set list;

xxxvii. a collating sequence, such that a default value from a system preference is established if no string specification is otherwise specified;

xxxviii. a language, such that a default value from a system preference is established if no string specification is otherwise specified;

xxxix. a text string, such that a default value of a null string is established if no string specification is otherwise specified;

xl. a regular expression string, such that a default value of a null string is to be applied is established if no string specification is otherwise specified;

xli. a string, such that a default value of a null string is established if no string specification is otherwise specified;

xlii. a value of a parameter;

and xliii. a value of a pre-established preference;

and b. accepting zero or one additional part of a first or next wisdom request command providing a specification for search to obtain contents for said first form of result to serve as a subsequent frame of reference by selection of said type of wisdom sought, considering criterion specified in other said parts of a first or next wisdom request command, said wisdom optionally based upon an optionally weighted combination of consensus and the user's opinion according to said additional specification, said wisdom optionally based upon an optional fuzziness factor according to said additional specification, according to the ideation process means and finding searching query and retrieval process means and selection set management process means and focus on information process means and alter information through visualization process means, said specification for search selected from the group consisting of:

i. requesting an empty set;

ii. requesting a default set;

iii. requesting a search by analytic;

iv. requesting a set containing a specified Boolean combination of the items in a first said identified search base and the items in a second said identified search base;

v. requesting a set containing a specified subset of the items in a first said identified search base, said specified subset selected from the group consisting of:

01. the first item in a first said identified search base in the present ordering of said first identified search base;

02. the last item in a first said identified search base in the present ordering of said first identified search base;

03. the first n items in a first said identified search base with lowest specified identity indicator in a collating sequence specified such that the lowest identity indicator valued item is considered the front of said list, wherein n is zero or a positive whole number such that if n is greater then the number of items in said list then only the items in said list will be included in the specified subset;

04. the last n items in a first said identified search base with lowest specified identity indicator in a collating sequence specified such that the lowest identity indicator valued item is considered the front of said list, wherein n is zero or a positive whole number such that if n is greater then the number of items in said list then only the items in said list will be included in the specified subset;

05. the middle n items, starting at the item m in a first said identified search base with lowest specified identity indicator in a collating sequence specified such that the lowest identity indicator valued item is considered the front of said list, wherein n is zero or a positive whole number such that if n is greater then the number of items in said list then only the items in said list will be included in the specified subset, such that if m is greater than the count of items in the list the subset will have no entries, such that if the number of items in said list is t, then the number of items in the resulting subset will be the minimum oft minus m, or the value n;

06. the items in a first said identified search base having a specified value for a specified property;

07. the items in a first said identified search base having a specified value for a specified characteristic;

and 08. the items in a first said identified search base having a specified value for a specified identity indicator;

vi. requesting a set containing a specified subset of the candidate items in a first said identified search base, such that to a specified degree of fuzziness said one or more types of wisdom sought of said candidate item matches a string of text, optionally wild-carded, given in said additional specification, by a combination of one or more specified matching criteria according to find, findall, result set find, resultset-findall, or findall search and attach result set to goal process means, said matching criteria selected from the group consisting of:

01. begins with;
02. does not begin with;
03. ends with;
04. does not ends with;
05. equals;
06. does not equal;
07. contains;
08. has meaning similar to;
09. does not have meaning similar to;
10. has matches to words specified;
11. matches according to a regular expression;
12. matches according to a Boolean word search; and
13. has a plurality of words in pairwise proximity to one another by one or more distance factors;

vii. requesting a set containing a specified subset of the candidate items in a first said identified search base, such that to a specified degree of fuzziness said one or more types of wisdom sought meets criteria given in said additional specification selected from the group consisting of:

01. has said one or more types of wisdom sought having a non-null value;
02. has said one or more types of wisdom sought having a value matching a value given in a second said identified search base;
03. has said one or more types of wisdom sought having a type value matching a value given in a second said identified search base;
04. has said one or more types of wisdom sought having a fxxt matching a value for a fxxt identity indicator matching a value given in a second said identified search base;
05. is attached to a cnxpt having an identity indicator given in a second said identified search base of cnxpts;
06. is relevant to a cnxpt having an identity indicator given in a second said identified search base of cnxpts;
07. is related to a cnxpt having an identity indicator given in a second said identified search base of cnxpts;
08. is cited by an information resource given by one or more occurrences attached to a cnxpt having an identity indicator given in a second said identified search base of cnxpts;
09. cites an information resource given by one occurrence attached to a cnxpt having an identity indicator given in a second said identified search base of cnxpts;
10. cites an information resource given by one or more occurrences attached to a cnxpt having an identity indicator given in a second said identified search base of cnxpts;
11. has an identity indicator meeting criteria given by said additional specification;
12. has an identity indicator given in a second said identified search base of cnxpts;
13. has an identity indicator meeting criteria given by said additional specification to compare against a value given in a second said identified search base;
14. has a characteristic value meeting criteria given by said additional specification;
15. has a characteristic value given in a second said identified search base of cnxpts;
16. has a characteristic value meeting criteria given by said additional specification to compare against a value given in a second said identified search base;
17. has a trait meeting criteria given by said additional specification;
18. has a trait given in a second said identified search base of cnxpts;
19. has a trait meeting criteria given by said additional specification to compare against a value given in a second said identified search base;
20. has a property meeting criteria given by said additional specification;
21. has a property given in a second said identified search base of cnxpts;
22. has a property meeting criteria given by said additional specification to compare against a value given in a second said identified search base;
23. has a purlieu meeting criteria given by said additional specification;
24. has a purlieu given in a second said identified search base of cnxpts;
25. has a purlieu meeting criteria given by said additional specification to compare against a value given in a second said identified search base;
26. has an attribute meeting criteria given by said additional specification;
27. has an attribute given in a second said identified search base of cnxpts;
28. has an attribute meeting criteria given by said additional specification to compare against a value given in a second said identified search base;
29. has a keyword meeting criteria given by said additional specification;
30. has a keyword given in a second said identified search base of cnxpts;
31. has a keyword meeting criteria given by said additional specification to compare against a value given in a second said identified search base; and
32. has a field, specified by said additional specification, said field selected from the group consisting of: identity indicator, property value, characteristic value, trait, purlieu, attribute, and keyword, meeting criteria given by said additional specification, matching against a specified value given in a second said identified search base;

viii. requesting said one or more types of wisdom sought for a concept represented by an item in the list created from the set of all items in a first said identified search base cnxpt;

ix. requesting information for a concept represented by a set of cnxpts ostensibly belonging in a cntexxt wherein said information is a part of the wisdom available for the cnxpt representing said cntexxt, said cnxpt in the list created from the set of all items in a first said identified search base cnxpt;

x. requesting a list of properties defined for a cnxpt in the list created from the set of all items in a first said identified search base cnxpt;

xi. requesting a value for a characteristic of a cnxpt in the list created from the set of all items in a first said identified search base cnxpt;

xii. requesting a value for a characteristic of an info-item in the list created from the set of all items in a first said identified search base;

xiii. requesting a list of values of characteristics of a specific set of info-items in the list created from the set of all items in a first said identified search base;

xiv. requesting a list of values of characteristics of specific types of info-item listed in the list created from the set of all items in a first said identified search base listing info-item type identifiers;

xv. requesting a result set list for culling list items of info-items connected to a cnxpt to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said result set list created from the set of all info-items connected to a cnxpt in a first said identified search base, said info-items of a type specified in said additional specification, said result set items ordered by a characteristic or property value wherein said characteristic or property is specified in said additional specification;

xvi. requesting a result set list for culling list items of info-items connected to a cnxpt to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said result set list created from the set of all info-items connected to a cnxpt in a first said identified search base, said info-items of a type specified in a second said identified search base, said result set items ordered by a characteristic or property value wherein said characteristic or property is specified in said additional specification;

xvii. requesting a list of values of properties of a specific set of info-items in the list created from the set of all items in a first said identified search base;

xviii. requesting characteristic or property information regarding an info-item in the list created from the set of all items in a first said identified search base;

xix. requesting a list of values of properties of specific types of info-item listed in the list created from the set of all items in a first said identified search base listing info-item type identifiers;

xx. requesting a fact or an estimation of a fact represented by a value for a characteristic of an info-item in the list created from the set of all items in a first said identified search base;

xxi. requesting a fact or an estimation of a fact represented by a value for a characteristic of a specific set of info-items in the list created from the set of all items in a first said identified search base;

xxii. requesting a fact or an estimation of a fact represented by a value for a characteristic of specific types of info-item listed in the list created from the set of all items in a first said identified search base listing info-item type identifiers;

xxiii. a fact or an estimation of a fact represented by a value for a characteristic of a specific type for a concept represented by a set of cnxpts ostensibly belonging in a cntexxt wherein said information is a part of the wisdom available for the cnxpt representing said cntexxt, said cnxpt in the list created from the set of all items in a first said identified search base;

xxiv. requesting said one or more types of wisdom sought for an info-item wherein said information is a part of the wisdom available for said info-item, said info-item in the list created from the set of all items in a first said identified search base;

xxv. requesting a list of identity indicators of a set of info-items in the list created from the set of all items in a first said identified search base;

xxvi. requesting a list of identity indicators of info-items connected to a cnxpt in the list created from the set of all items in a first said identified search base;

xxvii. requesting a list of identity indicators of info-items connected to a cnxpt in the list created from the set of all items in a first said identified search base of a type of info-item listed in a second said identified search base listing info-item type identifiers;

xxviii. requesting information for a concept represented by a cnxpt wherein said information is external to said commonplace, but is likely related to said cnxpt in the list created from the set of all items in a first said identified search base;

xxix. requesting characteristic or property information regarding an occurrence in the list created from the set of all items in a first said identified search base where said item is an occurrence info-item;

xxx. requesting a relevance ranking of an information resource relevant to a cnxpt, said information resource likely to contain said wisdom, said cnxpt in the list created from the set of all items in a first said identified search base where said item is a cnxpt;

xxxi. requesting an information resource relevant to a cnxpt, said information resource likely to contain said wisdom, said cnxpt in the list created from the set of all items in a first said identified search base where said item is a cnxpt;

xxxii. requesting a list of identity indicators of relationships in the list created from the set of all items in a first said identified search base where said item is a relationship info-item of a type listed in a second said identified search base listing info-item type identifiers;

xxxiii. requesting a list of identity indicators of relationships in the list created from the set of all items in a first said identified search base where said item is a relationship info-item having a characteristic of a type specified in said additional specification and a value listed in a second said identified search base;

xxxiv. requesting a list of identity indicators of relationships in the list created from the set of all items in a first said identified search base where said item is a relationship info-item having a property of a type specified in said additional specification and a value listed in a second said identified search base;

xxxv. requesting a list of identity indicators of traits attached to cnxpts in the list created from the set of all items in a first said identified search base where said trait has a property with a value specified in said additional specification;

xxxvi. requesting a list of identity indicators of traits attached to cnxpts in the list created from the set of all items in a first said identified search base where said trait has a property of a type specified in said additional specification and a value listed in a second said identified search base;

xxxvii. requesting a list of identity indicators of purlieu attached to cnxpts in the list created from the set of all items in a first said identified search base where said purlieu has a property with a value specified in said additional specification;

xxxviii. requesting a list of identity indicators of purlieu attached to cnxpts in the list created from the set of all items in a first said identified search base where said purlieu has a property of a type specified in said additional specification and a value listed in a second said identified search base;

xxxix. requesting a result set list for culling list items based upon what appears to the user as a good choice of culling action according to said user's own criteria;

xl. requesting a result set list for culling list items of a type to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said result set created from the set of all items in a first said identified search base;

xli. requesting a result set list for culling list items of a type to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said result set created from the set of all items in a first said identified search base, said result set items ordered by a characteristic value wherein said characteristic is specified in said additional specification;

xlii. requesting a result set list for culling information resource items based upon what appears to the user as a good choice of culling action according to said user's own criteria;

xliii. requesting a result set list for culling information resource items of a type to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said result set created from the set of all items in a first said identified search base;

xliv. requesting a result set list for culling information resource items of a type to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said result set created from the set of all items in a first said identified search base, said result set items ordered by a characteristic value wherein said characteristic is specified in said additional specification;

xlv. requesting a result set list for culling information resource items of a type to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said result set created from the set of all information resource returned from a search request, said result set items ordered by a characteristic value wherein said characteristic is specified in said additional specification;

xlvi. requesting a result set list for culling information resource items of a type to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said result set created from the set of all information resources returned from a search request to determine information resources relevant to a cnxpt in the set of all items in a first said identified search base, said result set items ordered by a characteristic value wherein said characteristic is specified in said additional specification;

xlvii. requesting a result set to build a goal by query from a search query, said result set implying a concept sought by said user by searching for said goal;

xlviii. requesting a result set of information resources to build a goal, said result set implying a concept sought by said user by searching for said goal;

xlix. requesting a repositioning for navigation to a best cntexxt of a set of better cntexxts each represented by a cnxpt from the set of all items in a first said identified search base where said items are cnxpts, said best cntexxt represented by a cnxpt having a value for a characteristic wherein said characteristic is specified in said additional specification, said characteristic indicating a quality score for the predetermined purpose of indicating similarity in regard to an indicated goal being sought;

l. requesting a list for picking a selection of what appears to said user as a best cntexxt of a set of better cntexxts listed, each represented by a cnxpt from the set of all items in a first said identified search base where said items are cnxpts, said cnxpts optionally having a value for a characteristic wherein said characteristic is specified in said additional specification, said characteristic indicating a quality score for the predetermined purpose of indicating similarity in regard to an indicated goal being sought;

li. requesting a repositioning for navigation into an area of consideration of better cntexxts each represented by a cnxpt from the set of all items in a first said identified search base where said items are cnxpts, said cntexxts each represented by a cnxpt having a value for a characteristic wherein said characteristic is specified in said additional specification, said characteristic indicating a quality score for the predetermined purpose of indicating similarity in regard to an indicated goal being sought;

lii. requesting a list of cnxpts representing concepts for inclusion in an area of consideration or area of interest for navigating, according to said user's own criteria;

liii. requesting a result selected from the group consisting of:

01. movement of user focus to a context represented by a second cnxpt, said second cnxpt appearing first in a list of results in an order specified in said additional specification, said second cnxpt representing a second cntexxt;

02. list of identity indicators of a type specified by said additional specification listing, in an order specified in said additional specification, said list for selecting cnxpt items based upon what appears to the user as a good choice according to said user's own criteria, said identity indicator of each second cnxpt representing a second cntexxt;

03. a result set of identity indicators of a type specified by said additional specification listing each identity indicator of a type specified by said additional specification listing, in an order specified in said additional specification or ordered by a characteristic value wherein said characteristic is specified in said additional specification, said result set list for culling cnxpt items based upon what appears to the user as a good choice of culling action according to said user's own criteria to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, altering an item value, entering an opinion, item addition, and item removal, said identity indicator of each second cnxpt representing a second cntexxt;

04. a timeline listing identity indicators of a type specified by said additional specification listing each identity indicator of a type specified by said additional specification listing, in an order specified in said additional specification or ordered by a characteristic value wherein said characteristic is specified in said additional specification, said identity indicator of each second cnxpt representing a second cntexxt;

05. a list of conceptual meanings listing, in an order specified in said additional specification, said conceptual meaning in a language specified by said additional specification, said conceptual meaning of a second cnxpt representing a second cntexxt;

06. a timeline listing conceptual meanings of a type and language specified by said additional specification listing each identity indicator of a type specified by said additional specification listing, in an order specified in said additional specification or ordered by a characteristic value wherein said characteristic is specified in said additional specification, said identity indicator of each second cnxpt representing a second cntexxt;

07. a co-location map for associative searching, navigation, or a predetermined purpose, said map created from the set of all second cnxpts representing second cntexxts;

08. a flow map for associative searching of a process, navigation, or a predetermined purpose, showing each identity indicator of a type specified by said additional specification listing, in an ordering for flow based upon a specified flow relationship info-item type specified in said additional specification, said identity indicator of each second cnxpt representing a second cntexxt, said map created from the set of all said second cnxpts representing second cntexxts;

09. a co-location map with flow for associative searching, searching of a process, navigation, or a predetermined purpose, showing each identity indicator of a type specified by said additional specification listing, in an ordering for flow based upon a specified flow relationship info-item type specified in said additional specification, said identity indicator of each second cnxpt representing a second cntexxt, said map created from the set of all said second cnxpts representing second cntexxts;

10. a list of values of a characteristic, in an order specified in said additional specification, in a language specified by said additional specification, said value of a characteristic of a second cnxpt representing a second cntexxt;

11. a list of differentiations in conceptual meaning listing, in an order specified in said additional specification, each such differentiation in a language specified by said additional specification, said differentiation of a second cnxpt representing a second cntexxt;

12. a list of differentiations of a characteristic of a specified type specified by said additional specification listing, in an order specified in said additional specification, said characteristic value of each second cnxpt representing a second cntexxt;

13. a timeline listing differentiations of conceptual meanings of a type and language specified by said additional specification listing each identity indicator of a type specified by said additional specification listing, in an order specified in said additional specification or ordered by a characteristic value wherein said characteristic is specified in said additional specification, said identity indicator of each second cnxpt representing a second cntexxt;

14. an area of consideration for culling cnxpt items to improve said area of consideration's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said area of consideration created from the set of all second cnxpts representing second cntexxts;

15. an area of interest for culling cnxpt items to improve said area of interest's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said area of interest created from the set of all second cnxpts representing second cntexxts;

16. a portfolio information table listing values of info-items of types specified by said additional specification, listing one or more values for each of said types as specified by said additional specification listing, in an order specified in said additional specification or ordered by a characteristic value or modeling result value wherein said characteristic or modeling result value is as specified in said additional specification, for reviewing info-items of said types specified to improve said portfolio's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said portfolio created from information related to items in the set of all second cnxpts representing second cntexxts;

17. modeling results of types specified by said additional specification listing one or more result values for each of said types as specified by said additional specification listing, in an order specified in said additional specification or ordered by a characteristic value or modeling result value wherein said characteristic or modeling result value is as specified in said additional specification, said results for each second cnxpt representing a second cntexxt;

18. an estimation of a fact represented by a modeling result of a type specified by said additional specification and a degree of fuzziness specified by said additional specification listing, in an order specified in said additional specification or ordered by a characteristic value or modeling result value wherein said characteristic or modeling result value is as specified in said additional specification, said estimation for each second cnxpt representing a second cntexxt;

19. an estimation of the probability of the existence of a fact represented by a modeling result of a type specified by said additional specification, a degree of fuzziness specified by said additional specification, and a time frame specified by said additional specification listing, in an order specified in said additional specification or ordered by a characteristic value or modeling result value wherein said characteristic or modeling result value is as specified in said additional specification, said estimation for each second cnxpt representing a second cntexxt;

20. a result set of identity indicators of a type specified by said additional specification listing each identity indicator of a type specified by said additional specification listing, in an order specified in said additional specification or ordered by a characteristic value wherein said characteristic is specified in said additional specification, said result set list for reviewing modeling results for cnxpt items based upon what appears to the user as a good choice of adjustment action according to said user's own criteria to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said second cnxpt meeting criteria based upon a modeling result of a type specified by said additional specification with zero or more satisfaction criterion values specified by said additional specification, said identity indicator of each second cnxpt representing a second cntexxt;

21. a result set of identity indicators of a type specified by said additional specification listing each identity indicator of a type specified by said additional specification listing, in an order specified in said additional specification or ordered by a characteristic value wherein said characteristic is specified in said additional specification, said result set list for reviewing outcomes based upon what appears to the user as a good choice of adjustment action according to said user's own criteria to improve said result set list's quality for a predetermined purpose by an action selected from the group consisting of: a user defined action for a purpose, ranking, scoring, re-prioritizing, rebuilding, item information research, item information collection, initiating contact, prediction acceptance, prediction rejection, ranking, altering an item value, entering an opinion, item addition, and item removal, said outcome meeting criteria based upon a modeling result of a type specified by said additional specification with zero or more satisfaction criterion values specified by said additional specification, based upon one or more second cnxpts each representing a second cntexxt;

22. a result set of identity indicators of a type specified by said additional specification listing each identity indicator of a type specified by said additional specification listing, in an order specified in said additional specification or ordered by a characteristic value wherein said characteristic is specified in said additional specification, said result set list for reviewing subject matter selected from the group consisting of: principle, standard, practice, field, jurisdiction, purlieu, trait, law, author, subject, fact, opinion, doctrine, study, study result, lab test report, evidence item, evidence type, element, documentary evidence, theory, topic, category, entry meaning, entry impact, precedent, entry relevance, rule, a user defined content type, an analytic content type; for cnxpt items based upon what appears to the user as a good choice of adjustment action according to said user's own criteria to improve said result set list's quality for a predetermined purpose by an action selected from the group consisting of: a user defined action for a purpose, ranking, scoring, re-prioritizing, rebuilding, altering an item value, entering an opinion, item information research, item information collection, initiating contact, item addition, and item removal, said second cnxpt meeting criteria of a type specified by said additional specification with zero or more satisfaction criterion values specified by said additional specification, said identity indicator of each second cnxpt representing a second cntexxt;

23. a report of information regarding audience strength based upon interest shown, based upon one or more second cnxpts each representing a second cntexxt;
24. a report of information regarding general audience strength, based upon one or more second cnxpts each representing a second cntexxt;
25. a report of information regarding dependent audience strength based upon a relationship info-item traversal based upon one or more destination second cnxpts, said second cnxpts each representing a second cntexxt;
26. a report of information regarding interest shown, based upon one or more second cnxpts each representing a second cntexxt;
27. a report of information regarding interest shown for a relationship info-item traversal based upon one or more destination second cnxpts, said second cnxpts each representing a second cntexxt;
28. a report of information regarding dependent audience strength based upon a relationship info-item traversal based upon one or more second cnxpts as origins, said second cnxpts each representing a second cntexxt;
29. a report of information regarding normalized interest shown metrics for one or more destination second cnxpts, said second cnxpts each representing a second cntexxt;
30. a report of information regarding normalized interest shown metrics for a relationship info-item traversal based upon one or more destination second cnxpts, said second cnxpts each representing a second cntexxt;
31. a list of tuples of cnxpt identity indicators being pairs consisting of: two cnxpts such that a first cnxpt matches a second cnxpt according to relationships entered by users or by matching criteria of a type specified in said wisdom request command parts, in an order specified in said additional specification, each second cnxpt representing a second cntexxt;
and
32. prediction results of types specified by said additional specification listing one or more prediction values for each of said types as specified by said additional specification listing, in an order specified in said additional specification or ordered by a characteristic value or modeling result value wherein said characteristic or modeling result value is as specified in said additional specification, said prediction results based upon each second cnxpt representing a second cntexxt;
wherein the specification for the plurality of organizations of knowledge providing a base structure is selected from the group consisting of:
33. the organization of knowledge presently indicated;
34. the organization of knowledge presently selected;
35. the organization of knowledge specified in said additional specification;
36. the set of organizations of knowledge listed in said first identified search base;
37. the organization of knowledge in which the first item in said first identified search base resides;
38. the set of organizations of knowledge in which an item in said first identified search base resides;
39. the set of all organizations of knowledge;
40. a null organization of knowledge;
and
41. a default organization of knowledge;
wherein a set of constraints are applied, said set of constraints selected from the group consisting of:
42. wherein said second cnxpt is in the set of cnxpts in said plurality of organizations of knowledge providing a base structure, said second cnxpt termed a cnxpt residing in said organizations of knowledge;
43. wherein said second cnxpt is in the set of cnxpts in said plurality of organizations of knowledge providing a base structure, said second cnxpt is an encompassing cntexxt of the first item in said first identified search base from as a starting point in the genealogy or a cntexxt encompassing such an encompassing cntexxt of the first item in said first identified search base up to the root of the tree in which said first item in said first identified search base resides, said second cnxpt termed an ancestor cnxpt;
44. wherein said second cnxpt is in the set of cnxpts in said plurality of organizations of knowledge providing a base structure, said second cnxpt is encompassed by the genealogy defined by a subtree of cntexxts wherein a first cnxpt of said first identified search base is the root of said subtree, to an optionally specified depth within the subtree up to including all leaves in the genealogy given, said second cnxpt termed a descendant cnxpt;
45. wherein said second cnxpt is in said plurality of organizations of knowledge providing a base structure, such that said second cnxpt is a root in one or more of the genealogies given by trees in forests of said plurality of organizations of knowledge providing a base structure, said second cnxpt termed an encompassing root cnxpt;
46. wherein said second cnxpt is in said plurality of organizations of knowledge providing a base structure, such that said second cnxpt is a root in one or more of the genealogies in said plurality of organizations of knowledge providing a base structure in which an item in said first identified search base resides, said second cnxpt termed a root cnxpt encompassing a specified cnxpt;
47. wherein said second cnxpt is in said plurality of organizations of knowledge providing a base structure, wherein if said first item in said first identified search base is a cnxpt it is not included in the result set, said second cnxpt termed a domain relative;
48. wherein said second cnxpt is not in said plurality of organizations of knowledge providing a base structure;
49. wherein said second cnxpt is in said second identified search base such that said second cnxpt is not in said plurality of organizations of knowledge providing a base structure;
50. wherein said second cnxpt represents a concept similar in meaning to the meaning given by any item of said first identified search base based upon relationships created by users from their own belief or a score value determined by specified similarity criteria given by said additional specification, said second cnxpt termed a cnxpt similar according to a specific characteristic;

51. wherein said second cnxpt represents a concept similar in meaning to the meaning given by any item of said first identified search base based upon relationships created by users from their own belief or a score value determined by specified similarity criteria given by said additional specification involving a specified weighted averaging of specified similarity criteria given by said additional specification, said second cnxpt termed a cnxpt similar according to a weighted averaging of characteristic similarities;
52. wherein said second cnxpt represents a concept similar in meaning to the meaning given by any item of said first identified search base based upon relationships created by users from their own belief or a score value determined by specified similarity criteria given by said additional specification involving a specified weighted averaging of specified similarity criteria given by said additional specification including a commonality specified by said additional specification, said second cnxpt termed a cnxpt similar according to a stated commonality;
53. wherein said second cnxpt is related to items in said first identified search base by a specified relationship info-item type, said second cntexxt termed related by a specific relationship;
54. wherein said second cnxpt is related by a relationship info-item to one or more items in said first identified search base such that said one or more items in said first identified search base is within the genealogies given by trees in forests of said plurality of organizations of knowledge providing a base structure, said second cnxpt termed a cnxpt related by a specific internal relationship;
55. wherein said second cnxpt is related by a relationship info-item to one or more items in said first identified search base such that said one or more items in said first identified search base is within the genealogies given by trees in forests of said plurality of organizations of knowledge providing a base structure such that said second cntexxt is external to all said genealogies given by said trees in forests of said organization of knowledge, said second cnxpt termed a cnxpt related by a specific relationship info-item external to the genealogies, said second cnxpt termed a cnxpt related by a specific external relationship;
56. wherein a citation relationship info-item exists from said second cnxpt to one or more items in said first identified search base wherein said second cnxpt is the citing object, such that said one or more items in said first identified search base are within the genealogies given by trees in forests of said plurality of organizations of knowledge providing a base structure, such that said second cnxpt is external to all said genealogies given by said trees in forests of said organization of knowledge, said second cnxpt termed a citing cnxpt external to the organization of knowledge, said second cntexxt termed an external citing cnxpt;
57. wherein a citation relationship info-item exists from said second cnxpt to one or more items in said first identified search base wherein said second cnxpt is the citing object, such that said second cnxpt is internal to the genealogies given by trees in forests of said plurality of organizations of knowledge providing a base structure, said second cnxpt termed a citing cnxpt internal to the organization of knowledge, said second cnxpt termed an internal citing cnxpt;
58. wherein a citation relationship info-item exists from said second cnxpt to one or more items in said first identified search base wherein said second cnxpt is the cited object, such that said one or more items in said first identified search base are within the genealogies given by trees in forests of said plurality of organizations of knowledge providing a base structure, such that said second cnxpt is external to all said genealogies given by said trees in forests of said organization of knowledge, said second cnxpt termed a cited cnxpt external to the organization of knowledge, said second cntexxt termed an external cited cnxpt;
59. wherein a citation relationship info-item exists from said second cnxpt to one or more items in said first identified search base wherein said second cnxpt is the cited object, such that said second cnxpt is internal to the genealogies given by trees in forests of said plurality of organizations of knowledge providing a base structure, said second cnxpt termed a cited cnxpt internal to the organization of knowledge; citing cnxpt external to the organization of knowledge, said second cnxpt termed an internal cited cnxpt;
60. wherein a citation relationship info-item exists from an occurrence attached to said second cnxpt to one or more occurrences in or attached to items in said first identified search base wherein said occurrence attached to said second cnxpt is the citing object, such that said one or more items in said first identified search base are within the genealogies given by trees in forests of said plurality of organizations of knowledge providing a base structure, such that said second cnxpt is external to all said genealogies given by said trees in forests of said organization of knowledge, said second cnxpt termed a citing cnxpt external to the organization of knowledge, said second cntexxt termed an external citing cnxpt candidate for an imputed occurrence citing relationship;
61. wherein a citation relationship info-item exists from an occurrence attached to said second cnxpt to one or more occurrences in or attached to items in said first identified search base wherein said occurrence attached to said second cnxpt is the citing object, such that said second cnxpt is internal to the genealogies given by trees in forests of said plurality of organizations of knowledge providing a base structure, said second cnxpt termed a citing cnxpt internal to the organization of knowledge, said second cnxpt termed an internal citing cnxpt candidate for an imputed occurrence citing relationship;
62. wherein a citation relationship info-item exists from an occurrence attached to said second cnxpt to one or more occurrences in or attached to items in said first identified search base wherein said occurrence attached to said second cnxpt is the cited object, such that said one or more items in said first identified search base are within the genealogies given by trees in forests of said plurality of organizations of knowledge providing a base structure, such that said second cnxpt is external to all said genealogies given by said trees in forests of said organization of knowledge, said second cnxpt termed a cited cnxpt external to the organization of knowledge, said second cntexxt termed an external cited cnxpt candidate for an imputed occurrence cited relationship;

63. wherein a citation relationship info-item exists from an occurrence attached to said second cnxpt to one or more occurrences in or attached to items in said first identified search base wherein said occurrence attached to said second cnxpt is the cited object, such that said second cnxpt is internal to the genealogies given by trees in forests of said plurality of organizations of knowledge providing a base structure, said second cnxpt termed a cited cnxpt internal to the organization of knowledge, said second cnxpt termed an internal cited cnxpt candidate for an imputed occurrence cited relationship;

64. wherein a citation relationship info-item exists from a second irxt representing a second information resource to a first irxt representing a first information resource, said second irxt related by a relationship info-item to a second occurrence attached to said second cnxpt, said first irxt in the set of entries selected from the group consisting of: said first irxt in said first identified search base, said first irxt related by an attaching relationship info-item to one or more info-items in said first identified search base, said first irxt related by an attaching relationship info-item to one or more first occurrences attached to a first cnxpt in said first identified search base, and said first irxt related by one or more relevance relationship info-items to one or more first cnxpts in said first identified search base, wherein said second irxt is the citing object, such that said one or more items in said first identified search base are within the genealogies given by trees in forests of said plurality of organizations of knowledge providing a base structure, such that said second cnxpt is external to all said genealogies given by said trees in forests of said organization of knowledge, said second cnxpt termed a citing cnxpt external to the organization of knowledge, said second cntexxt termed an external citing cnxpt candidate for an imputed irxt citing relationship;

65. wherein a citation relationship info-item exists from a second irxt representing a second information resource to a first irxt representing a first information resource, said second irxt related by a relationship info-item to a second occurrence attached to said second cnxpt, said first irxt in the set of entries selected from the group consisting of: said first irxt in said first identified search base, said first irxt related by an attaching relationship info-item to one or more info-items in said first identified search base, said first irxt related by an attaching relationship info-item to one or more first occurrences attached to a first cnxpt in said first identified search base, and said first irxt related by one or more relevance relationship info-items to one or more first cnxpts in said first identified search base; wherein said second irxt is the citing object, such that said second cnxpt is internal to the genealogies given by trees in forests of said plurality of organizations of knowledge providing a base structure, said second cnxpt termed a citing cnxpt internal to the organization of knowledge, said second cnxpt termed an internal citing cnxpt candidate for an imputed irxt citing relationship;

66. wherein a citation relationship info-item exists from a second irxt representing a second information resource to a first irxt representing a first information resource, said second irxt related by a relationship info-item to a second occurrence attached to said second cnxpt, said first irxt in the set of entries selected from the group consisting of: said first irxt in said first identified search base, said first irxt related by an attaching relationship info-item to one or more info-items in said first identified search base, said first irxt related by an attaching relationship info-item to one or more first occurrences attached to a first cnxpt in said first identified search base, and said first irxt related by one or more relevance relationship info-items to one or more first cnxpts in said first identified search base; wherein said second irxt is the cited object, such that said one or more items in said first identified search base are within the genealogies given by trees in forests of said plurality of organizations of knowledge providing a base structure, such that said second cnxpt is external to all said genealogies given by said trees in forests of said organization of knowledge, said second cnxpt termed a cited cnxpt external to the organization of knowledge, said second cntexxt termed an external cited cnxpt candidate for an imputed irxt cited relationship;

67. wherein a citation relationship info-item exists from a second irxt representing a second information resource to a first irxt representing a first information resource, said second irxt related by a relationship info-item to a second occurrence attached to said second cnxpt, said first irxt in the set of entries selected from the group consisting of: said first irxt in said first identified search base, said first irxt related by an attaching relationship info-item to one or more info-items in said first identified search base, said first irxt related by an attaching relationship info-item to one or more first occurrences attached to a first cnxpt in said first identified search base, said first irxt related by one or more relevance relationship info-items to one or more first cnxpts in said first identified search base, wherein said second irxt is the cited object, such that said second cnxpt is internal to the genealogies given by trees in forests of said plurality of organizations of knowledge providing a base structure, said second cnxpt termed a cited cnxpt internal to the organization of knowledge, said second cnxpt termed an internal cited cnxpt candidate for an imputed irxt cited relationship;

68. wherein said second cnxpt represents a concept similar in meaning to the meaning given by any item of said first identified search base based upon relationships created by users from their own belief or a score value determined by a specified weighted averaging of similarity criteria involving occurrences wherein an occurrence is present in both a first cnxpt in said first identified search base, and also in a second cnxpt representing said second cntexxt causes a weight based upon a specified coefficient times the average relevance of said occurrence in said first cnxpt and said second cnxpt to be added into the result and wherein an occurrence present in but one of a first cnxpt in said first identified search base or a second cnxpt representing said second cntexxt causes a weight based upon a specified coefficient times the relevance of said occurrence in the cnxpt where it is present to be subtracted from said result, said second cnxpt termed a cnxpt similar according to a weighted averaging of occurrence similarities;

69. wherein said second cnxpt represents a concept similar in meaning to the meaning given by the first item in said first identified search base based upon relationships created by users from their own belief or a score value determined by a specified weighted averaging algorithm utilizing similarity criteria involving cnxpt citations wherein an overall score is formed by determining a score for a factor from an algorithm and multiplying it by an algorithm result weighting coefficient, said score for a factor added to said overall score, said algorithm specified in said additional specification, said algorithm of a class selected from the group consisting of: bibliographic coupling, co-citation analysis, co-citation proximity analysis, and link based page relevance ranking algorithms, said result weighting coefficient specified in said additional specification, said score normalized for proper comparability, wherein a citation of a citing information resource represented by a citing irxt to a cited information resource represented by a cited irxt is implied to be a citing relationship info-item between any first occurrence to which said citing irxt is relevant and related and any second occurrence to which said cited irxt is relevant and related, such that said first occurrence is termed a citing occurrence, such that said second occurrence is termed a cited occurrence, such that the weight given to the implied citing to cited occurrence relationship info-item is based upon the product of the relevance between said citing irxt and said citing occurrence and the relevance between said cited irxt and said cited occurrence and the weight of the citation relationship info-item between said citing and said cited irxt, wherein a citation of a citing occurrence to a cited occurrence is implied to be a citing relationship info-item between any third cnxpt to which said citing occurrence is attached and any fourth cnxpt to which said cited occurrence is attached, such that said third cnxpt is termed a citing cnxpt, such that said fourth cnxpt is termed a cited cnxpt, such that the weight given to the implied citing to cited cnxpt relationship info-item is based upon the product of the weight of the relationship info-item between said citing occurrence and said citing cnxpt and the weight of the relationship info-item between said cited occurrence and said cited cnxpt and the weight of the citation relationship info-item between said citing and said cited occurrence, said implied citations termed resolved citation relationships, said overall score providing a metric for the similarity of said first and said second cnxpts;

70. wherein said second cnxpt represents a concept similar in meaning to the meaning given by the first item in said first identified search base based upon relationships created by users from their own belief or a score value determined by a specified weighted averaging algorithm utilizing similarity criteria involving cnxpt citations wherein an overall score is formed by determining a score for a factor from an algorithm and multiplying it by an algorithm result weighting coefficient, said score for a factor added to said overall score, said algorithm specified in said additional specification, said algorithm of a class selected from the group consisting of: bibliographic coupling, co-citation analysis, co-citation proximity analysis, and link based page relevance ranking algorithms, said result weighting coefficient specified in said additional specification, said score normalized for proper comparability, wherein a citation of a citing information resource represented by a citing irxt to a cited information resource represented by a cited irxt is implied to be a citing relationship info-item between any first occurrence to which said citing irxt is relevant and related and any second occurrence to which said cited irxt is relevant and related, such that said first occurrence is termed a citing occurrence, such that said second occurrence is termed a cited occurrence, such that the weight given to the implied citing to cited occurrence relationship info-item is based upon the product of the relevance between said citing irxt and said citing occurrence and the relevance between said cited irxt and said cited occurrence and the weight of the citation relationship info-item between said citing and said cited irxt, wherein a citation of a citing occurrence to a cited occurrence is implied to be a citing relationship info-item between any third cnxpt to which said citing occurrence is attached and any fourth cnxpt to which said cited occurrence is attached, such that said third cnxpt is termed a citing cnxpt, such that said fourth cnxpt is termed a cited cnxpt, such that the weight given to the implied citing to cited cnxpt relationship info-item is based upon the product of the weight of the relationship info-item between said citing occurrence and said citing cnxpt and the weight of the relationship info-item between said cited occurrence and said cited cnxpt and the weight of the citation relationship info-item between said citing and said cited occurrence, said implied citations termed resolved citation relationships, said first and said second cnxpts both being in said organization of knowledge, such that citation relationships where said first cnxpt or said second cnxpt cites the same cited object as an ancestor cnxpt in common to both said first cnxpt and said second cnxpt in said organization of knowledge are multiplied by a per-level inheritance effect dampening coefficient from consideration, said overall score providing a metric for the similarity of said first and said second cnxpts based upon commonality of ancestry and level in said organization of knowledge;

71. wherein said second cnxpt represents a concept similar in meaning to the meaning given by the first item in said first identified search base based upon relationships created by users from their own belief or a score value determined by a specified weighted averaging of similarity criteria involving traits wherein a trait is present in both a first cnxpt in said first identified search base, and also in a second cnxpt representing said second cntexxt causes a weight based upon a specified coefficient times the average relevance of said trait in said first cnxpt and said second cnxpt to be added into the result and wherein a trait present in but one of a first cnxpt in said first identified search base or a second cnxpt representing said second cntexxt causes a weight based upon a specified coefficient times the relevance of said trait in the cnxpt where it is present to be subtracted from said result;

72. wherein said second cnxpt represents a concept similar in meaning to the meaning given by the first item in said first identified search base based upon relationships created by users from their own belief or a score value determined by a specified weighted averaging of similarity criteria involving purlieu wherein a purlieu is present in both a first cnxpt in said first identified search base, and also in a second cnxpt representing said second cntexxt causes a weight based upon a specified coefficient times the average relevance of said purlieu in said first cnxpt and said second cnxpt to be added into the result and wherein a purlieu present in but one of a first cnxpt in said first identified search base or a second cnxpt representing said second cntexxt causes a weight based upon a specified coefficient times the relevance of said purlieu in the cnxpt where it is present to be subtracted from said result;

73. wherein said second cnxpt represents a concept similar in meaning to the meaning given by the first item in said first identified search base based upon relationships created by users from their own belief or a score value determined by a specified weighted averaging of similarity criteria involving purlieu, said first and said second cnxpts both being in said organization of knowledge such that gestation timings have been calculated for each possibly based in part on purlieu, purlieu probability distributions for timing determination coupled with a value for a degree of fuzziness specified for gestation calculation resolving gestation of said first cnxpt or said second cnxpt to be clearly inside, clearly outside, or on the fringe of the purlieu, wherein said first cnxpt or said second cnxpt are resolved to be within a purlieu a weight based upon a specified coefficient times the absolute value of the differential of the relevance of said purlieu in said first cnxpt divided by the signed number of standard deviations from the center of said purlieu of said first cnxpt's gestation and the relevance of said purlieu in said second cnxpt divided by the number of standard deviations from the center of said purlieu in said second cnxpt's gestation to be added into the result, said overall score providing a metric for the similarity of said first and said second cnxpts based upon gestation relative to purlieu in said organization of knowledge;

74. wherein said second cnxpt represents a concept similar in meaning to the meaning given by the first item in said first identified search base based upon relationships created by users from their own belief or a score value determined by a specified weighted averaging of similarity criteria involving a constraint time frames wherein a constraint relationship info-item is present for both a first cnxpt in said first identified search base, and also in a second cnxpt representing said second cntexxt causes a weight based upon a specified pertinence coefficient times the average relevance weightings of the constraint relationship to said first cnxpt and said second cnxpt to be added into the result, a constraint relationship info-item is present in but one of a first cnxpt in said first identified search base or a second cnxpt representing said second cntexxt causes a weight based upon a specified pertinence coefficient times the average relevance weightings of the constraint relationships to said first cnxpt and said second cnxpt to be to be subtracted from the result forming said score value;

75. wherein said second cnxpt has a stated purlieu, wherein said timeline is formed by ordering conceptual meanings by a time point associated with said purlieu, said time point selected from the group consisting of: starting, mid-point, end-point, median of distribution, mean of distribution, and any other specified purlieu summarizer, wherein said purlieu is a member of said first identified search base if specified or from the set of all purlieu in said organization of knowledge if no first identified search base is specified;

76. wherein said second cnxpt has a relationship info-item with a stated time point constraint, wherein said timeline is formed by ordering conceptual meanings by said time point constraint, said time point selected from the group consisting of: initial time, mid-point, point at which cnxpt to which said time point constraint pertains is superseded, median of distribution, mean of distribution, and any other specified time point constraint summarizer, wherein said constraint is a member of said first identified search base if specified or from the set of all constraints in said organization of knowledge if no first identified search base is specified;

77. wherein said second cnxpt has a stated purlieu, wherein said timeline is formed by ordering conceptual meanings by a time point associated with said purlieu, said time point selected from the group consisting of: starting, mid-point, end-point, median of distribution, mean of distribution, and any other specified purlieu summarizer, wherein said purlieu is a member of said first identified search base if specified or from the set of all purlieu in said organization of knowledge if no first identified search base is specified;

78. wherein said second cnxpt is of a type having a property stating a characterization of value selected from the group of: a point value, and a calculable value; applicable to the search result sought, said property calculated to form a value for said second cnxpt according to simple addition, a consensus-based upon all votes regarding said property, an averaging of all votes regarding said property, an analytic, or other algorithm as specified in additional specification, said second cnxpt a member of said first identified search base;

79. wherein said second cnxpt is related to an instance of an entity as expressed in one or more row of a data set having an attribute stating a point value applicable to the search result sought as expressed in a resulting property of said second cnxpt, said property calculated from said attribute to form a value for said second cnxpt according to simple addition of said attribute for all rows, an averaging of said attribute for all rows, an analytic, or other algorithm as specified in additional specification, said second cnxpt a member of said first identified search base;
80. wherein said second cnxpt is of a type having relationships with info-items having a property stating a characterization of value selected from the group of: a point value, and value distribution; applicable to said second cnxpt, and when assembled, to the search result sought, said property first resolved to a consensus value based upon all votes regarding said property, said property of each such info-item related to said second cnxpt summed to form a value for said second cnxpt according to primary tcept value prediction process means, simple addition, an analytic, or other summing algorithm as specified in additional specification, said second cnxpt a member of said first identified search base;
81. wherein said second cnxpt is of a type having relationships with info-items having a property stating a characterization of value selected from the group of: a point value, and value distribution; applicable to said second cnxpt, and when assembled, to the search result sought, said property first resolved to a consensus value based upon all votes regarding said property, said property of each such info-item related to said second cnxpt next summed to form a value for said second cnxpt according to primary tcept value prediction process means, simple addition, an analytic, or other summing algorithm as specified in additional specification, wherein said summation must then be distributed across all such third cnxpts of said type having relationships with info-items having a property stating a characterization of value selected from the group of: a point value, and value distribution; applicable to said second cnxpt, said third cnxpt not necessarily a member of said first identified search base, said second cnxpt also one said third cnxpt, said second cnxpt and said third cnxpt in said domain of knowledge, said second cnxpt a member of said first identified search base;
82. wherein said second cnxpt is of a type having relationships with fourth cnxpts having a property stating a characterization of value selected from the group of: a point value, and value distribution; applicable to said second cnxpt, and when assembled, to the search result sought, said property of each fourth cnxpt first resolved to a consensus value based upon all votes regarding said property, said property of each such fourth cnxpt related to said second cnxpt next summed to form a value for said second cnxpt according to primary tcept value prediction process means, simple addition, an analytic, or other summing algorithm as specified in additional specification, wherein said summation must then be distributed across all such third cnxpts of said type having relationships with fourth cnxpts having a property stating a characterization of value selected from the group of: a point value, and value distribution; applicable to said second cnxpt, said third cnxpt not necessarily a member of said first identified search base, said second cnxpt also one said third cnxpt, said second cnxpt and said third cnxpt in said domain of knowledge, no fourth cnxpt in same tree in said organization of knowledge as any third cnxpt, said second cnxpt a member of said first identified search base;
83. wherein said second cnxpt is of a type having relationships with fourth cnxpts having a property stating a characterization of value selected from the group of: a point value, and value distribution; applicable to said second cnxpt, and when assembled, to the search result sought, said property of each fourth cnxpt first resolved to a consensus value based upon all votes regarding said property, said property of each such fourth cnxpt related to said second cnxpt next summed to form a value for said second cnxpt according to primary tcept value prediction process means, simple addition, an analytic, or other summing algorithm as specified in additional specification, wherein said summation must then be distributed across all such third cnxpts of said type having relationships with fourth cnxpts having a property stating a characterization of value selected from the group of: a point value, and value distribution; applicable to said second cnxpt, said third cnxpt not necessarily a member of said first identified search base, said second cnxpt also one said third cnxpt, said second cnxpt and said third cnxpt in said domain of knowledge, all fourth cnxpts in same domain of wisdom, no fourth cnxpt in same domain of wisdom as any third cnxpt, wherein the total value of all cnxpts at any level in the domain of knowledge containing a fourth cnxpt constrained to a value specified for said level in said additional specification so that the value imputed to said second cnxpt is first normalized to conform to such constraint, said second cnxpt a member of said first identified search base;
84. wherein said second cnxpt is of a type having relationships with fourth cnxpts having a property stating a characterization of value selected from the group of: a point value, and value distribution; applicable to said second cnxpt, and when assembled, to the search result sought, said property of each fourth cnxpt first resolved to a consensus value based upon all votes regarding said property, said property of each such fourth cnxpt related to said second cnxpt next summed to form a value for said second cnxpt according to primary tcept value prediction process means, simple addition, an analytic, or other summing algorithm as specified in additional specification, wherein said summation must then be distributed across all such third cnxpts of said type having relationships with fourth cnxpts having a property stating a characterization of value selected from the group of: a point value, and value distribution; applicable to said second cnxpt, said third cnxpt not necessarily a member of said first identified search base, said second cnxpt also one said third cnxpt, said second cnxpt and said third cnxpt in said domain of knowledge, all fourth cnxpts in same domain of wisdom, no fourth cnxpt in same domain of wisdom as any third cnxpt, said domains of knowledge organized by common depth framing based upon a factor such as time wherein the total value of all cnxpts at any depth frame in the domain of knowledge containing a fourth cnxpt is constrained to a value specified for said depth frame in said additional specification so that the value imputed to any said second cnxpt is first normalized to conform to such constraint, said second cnxpt a member of said first identified search base;

85. wherein said second cnxpt is of a type having relationships with fourth cnxpts having a property stating a characterization of value selected from the group of: a point value, and value distribution; applicable to said second cnxpt, and when assembled, to the search result sought, said property of each fourth cnxpt first resolved to a consensus value based upon all votes regarding said property, said property of each such fourth cnxpt related to said second cnxpt next summed to form a value for said second cnxpt according to primary tcept value prediction process means, simple addition, an analytic, or other summing algorithm as specified in additional specification, wherein said summation must then be distributed across all such third cnxpts of said type having relationships with fourth cnxpts having a property stating a characterization of value selected from the group of: a point value, and value distribution; applicable to said second cnxpt, said third cnxpt not necessarily a member of said first identified search base, said second cnxpt also one said third cnxpt, said second cnxpt and said third cnxpt in said domain of knowledge, all fourth cnxpts in same domain of wisdom, no fourth cnxpt in same domain of wisdom as any third cnxpt, said domains of knowledge organized by common depth framing based upon a factor such as time wherein the total value of all cnxpts at any depth frame in the domain of knowledge containing a fourth cnxpt is constrained to a value specified for said depth frame in said additional specification so that the value imputed to any said second cnxpt is first normalized to conform to such constraint, wherein the total value of all cnxpts at any depth frame in the domain of knowledge containing a third cnxpt is constrained to a value specified for said depth frame in said additional specification so that the value imputed to any said second cnxpt is further constrained to conform to such constraint for the total at said depth frame of said domain of knowledge containing a third cnxpt, said second cnxpt a member of said first identified search base;

86. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of types specified in additional specifications;

87. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a fxxt specified in additional specifications;

88. wherein said second cnxpt is matched to a first info-item found in the set of said first identified search base, said matching based upon relationships created by users from their own belief in combination with automated generation, said relationship info-item from said first info-item to said second cnxpt, said relationship info-item of a type specified in additional specifications;

89. wherein said second cnxpt is matched to a first info-item found in the set of said first identified search base, said matching based upon relationships created by users from their own belief in combination with automated generation, said relationship info-item from said first info-item to said second cnxpt, said relationship info-item of a fxxt specified in additional specifications;

90. wherein said second cnxpt is matched to a first info-item found in the set of said first identified search base, said matching based upon relationships created by users from their own belief in combination with automated generation, said relationship info-item from said second cnxpt to said first info-item, said relationship info-item of a type specified in additional specifications;

91. wherein said second cnxpt is matched to a first info-item found in the set of said first identified search base, said matching based upon relationships created by users from their own belief in combination with automated generation, said relationship info-item from said second cnxpt to said first info-item, said relationship info-item of a fxxt specified in additional specifications;

92. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating a temporal ordering, said relationship info-item of a type specified in additional specifications;

93. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating a temporal ordering, said relationship info-item of a fxxt specified in additional specifications;

94. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating a required ordering or dependence of the existence of the concept represented by said second cnxpt before the concept represented by said first cnxpt could logically exist, said relationship info-item of a type specified in additional specifications;

95. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating a required ordering or dependence of the existence of the concept represented by said second cnxpt before the concept represented by said first cnxpt could logically exist, said relationship info-item of a fxxt specified in additional specifications;

96. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating a required ordering, causality, or dependence of the occurrence of the concept represented by said second cnxpt before the concept represented by said first cnxpt could causally occur, an occurrence probability distribution stating the likelihood of said concept represented by said first cnxpt actually occurring, a dependency type stating whether said second cnxpt must end or merely start before said first cnxpt may start or merely end, and a timeframe of occurrence probability distribution stating the likelihood of said concept represented by said first cnxpt actually occurring within a timeframe, said relationship info-item of a type specified in additional specifications, said dependence having a type of causality specified in additional specifications, said occurrence probability distribution specified in additional specifications, said timeframe of occurrence probability distribution specified in additional specifications;

97. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating a required ordering, causality, or dependence of the occurrence of the concept represented by said second cnxpt before the concept represented by said first cnxpt could causally occur, an occurrence probability distribution stating the likelihood of said concept represented by said first cnxpt actually occurring, a dependency type stating whether said second cnxpt must end or merely start before said first cnxpt may start or merely end, and a timeframe of occurrence probability distribution stating the likelihood of said concept represented by said first cnxpt actually occurring within a timeframe, said relationship info-item of a fxxt specified in additional specifications, said dependence having a type of causality specified in additional specifications, said occurrence probability distribution specified in additional specifications, said timeframe of occurrence probability distribution specified in additional specifications;

98. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating a required ordering or dependence of the existence of the concept represented by said second cnxpt before the concept represented by said first cnxpt could be implemented, said relationship info-item of a type specified in additional specifications;

99. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating a required ordering or dependence of the existence of the concept represented by said second cnxpt before the concept represented by said first cnxpt could be implemented, said relationship info-item of a fxxt specified in additional specifications;

100. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating a required ordering or dependence of the proving of the concept represented by said second cnxpt before the concept represented by said first cnxpt could be proven, said relationship info-item of a type specified in additional specifications;

101. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating a required ordering or dependence of the proving of the concept represented by said second cnxpt before the concept represented by said first cnxpt could be proven, said relationship info-item of a fxxt specified in additional specifications;

102. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating prior art, said relationship info-item of a type specified in additional specifications;

103. wherein said second cnxpt is matched to a first cnxpt found in the set of said first identified search base, said matching based upon relationships created by users from their own belief in combination with automated generation, said relationship info-item from said first cnxpt to said second cnxpt, said relationship info-item of a type indicating prior art, said relationship info-item of a fxxt specified in additional specifications;

104. wherein said second cnxpt is matched to a first cnxpt found in the set of said first identified search base, said matching based upon relationships created by users from their own belief in combination with automated analysis by application suitability of function against need based upon one or more function traits of said second cnxpt matching against one or more requirements traits of said first cnxpt, according to generate result set membership commonality relationships, imputed association generation by heuristic, and satisfies requirements generate trxrt to trxrt requirement match relationships process means;

105. wherein said second cnxpt is matched to a first cnxpt found in the set of said first identified search base, said matching based upon relationships created by users from their own belief in combination with automated analysis by trait of a type specified in said additional specification or by any trait if no type is so specified, according to generate cnxpt categorizations and relationships by clustering, execute document clustering analytic, execute document cross-citation analytic, generate result set membership commonality relationships, imputed association generation by heuristic, and generate trxrt to trxrt-cncpttrrt commonality relationships process means;

106. wherein said second cnxpt is matched to a first cnxpt found in the set of said first identified search base, said matching based upon relationships created by users from their own belief in combination with automated analysis by implementation against a constraint in common, according to generate cnxpt categorizations and relationships by clustering, execute document clustering analytic, execute document cross-citation analytic, generate result set membership commonality relationships, imputed association generation by heuristic, matching by conformance to science, and generate trxrt to trxrt conformance match relationships process means;

107. wherein said second cnxpt is matched to a first cnxpt found in the set of said first identified search base, said matching based upon relationships created by users from their own belief in combination with automated analysis by purlieu in common, according to generate cnxpt categorizations and relationships by clustering, execute document clustering analytic, execute document cross-citation analytic, generate result set membership commonality relationships, imputed association generation by heuristic, and generate trxrt to trxrt match relationships process means;

108. wherein said second cnxpt is matched to a first cnxpt found in the set of said first identified search base, said matching based upon relationships created by users from their own belief in combination with automated analysis by interest, according to interest matching, interest path collection, system function usage data capture, collection of user data, create a ttx by registering interest, register user's interest in ttx, natural audience segmentation provided by matching, utilize collective consensus through vote tallying, interest summarization, impute associations from interest shown and navigation, intensity of interest metric analytic, generate cnxpt categorizations and relationships by clustering, execute document clustering analytic, imputed association generation by heuristic, and generate trxrt to trxrt cncpttrrt commonality relationships process means;

109. wherein said second cnxpt is matched to a first cnxpt found in the set of said first identified search base, said matching based upon relationships created by users from their own belief in combination with automated analysis by family relationship info-item of a type specified in said additional specification, according to fxxt basic descendant spanning tree extraction process means, and calculate bottom up importance metrics for cnxpt categories process means;

110. wherein said second cnxpt is matched to a first cnxpt found in the set of said first identified search base, said matching based upon relationships created by users from their own belief in combination with automated analysis by suitability or commonality of a type specified in said additional specification, according to fxxt basic descendant spanning tree extraction process means, and calculate bottom up importance metrics for cnxpt categories process means;

111. wherein said second cnxpt is matched to a first cnxpt found in the set of said first identified search base, said matching based upon relationships created by users from their own belief in combination with automated analysis done semantically, according to generate cnxpt categorizations and relationships by clustering, execute document clustering analytic, execute document cross-citation analytic, generate result set membership commonality relationships, imputed association generation by heuristic, execute trait matching by semantic distance calculation, fxxt basic descendant spanning tree extraction process means, and calculate bottom up importance metrics for cnxpt categories process means;

112. wherein said second cnxpt is dependent on a first cnxpt found in the set of said first identified search base, said dependency type of a type specified in said additional specification or by any trait if no type is so specified;

113. wherein said second cnxpt is a precedent depended upon by a first cnxpt found in the set of said first identified search base, said dependency type of a type specified in said additional specification or by any trait if no type is so specified;

114. wherein said second cnxpt is dependent on a first cnxpt found in the set of said first identified search base by a model equation dependency, said model equation specified in said additional specification or by any model equation if no model equation is so specified;

115. wherein said second cnxpt is a precedent depended upon on a first cnxpt found in the set of said first identified search base by a model equation dependency, said model equation specified in said additional specification or by any model equation if no model equation is so specified.

248. The method of claim 1 to also provide for recommenders for result steering, result relevance efficiency, and review tracking for query results, further including:

a. generating a map from a map definition given a domain of wisdom to form a positioned organization of knowledge, the map, by the generation, encompassing recommendations regarding the importance to the user of cnxpts organization of knowledge by positioning the principal children centrally in the context defined by the cntexxt represented by the parent cnxpt of the children, by sizing cnxpts by their importance, and by providing other indicators to speed the user's review of the material shown in the map;

b. generating as a result of a query a list where the items in the list are ordered based upon a prediction of how much, on a relative basis, a user would appreciate having been given the item to review prior to being given the items later in the list;

c. presenting the list to the user as a tracking device for the review and action to be taken based upon the list, including a tracking device of the nature of a portfolio for recording the results of the culling of the list and the result of the actions;

and d. accepting culling, rearrangement, commands based upon a list item, and other uses of the list;

whereby reliable ordering of the entries on a query result list, reliable strengths of relationships between cnxpts, reliable importance sizing of cnxpts, reliable positioning of cnxpts, appropriate decorations of map objects improve the efficiency of use for a user; and whereby the lack of knowledge while a user is searching for relevant conceptual content is mitigated by the ability of the tool to get the information quickly.

249. The method of claim 1 to also provide for recommenders for result steering, result relevance efficiency, and review tracking for portfolio results, further including:

a. generating a map from a map definition given a domain of wisdom to form a positioned organization of knowledge, the map, by the generation, encompassing recommendations regarding the importance to the user of cnxpts organization of knowledge by positioning the principal children centrally in the context defined by the cntexxt represented by the parent cnxpt of the children, by sizing cnxpts by their importance, and by providing other indicators to speed the user's review of the material shown in the map;

b. generating as a result of a query a list with one or more columns where the items in the list are ordered based upon a prediction of how much, on a relative basis, a user would appreciate having been given the item to review prior to being given the items later in the list for review;

c. including on the portfolio for an item information beyond an identification of the item and its order so that the user is immediately provided with pertinent information to allow greater efficiency in determining a next action to take when the item is reviewed;

d. presenting the list to the user as a tracking device for the review and action to be taken based upon the list in the nature of a portfolio for recording the results of the culling of the list and the result of the actions;

and e. accepting culling, rearrangement, commands based upon a list item, and other uses of the list;

whereby reliable ordering of the entries on a query result list or portfolio, reliable strengths of relationships between cnxpts, reliable importance sizing of cnxpts, reliable positioning of cnxpts, appropriate decorations of map objects improve the efficiency of use for a user. whereby the lack of knowledge while a user is searching for relevant conceptual content is mitigated by the ability of the tool to get the information quickly; whereby the information overload while the user is querying for, finding, and sifting to obtain relevant conceptual content and external information such as web searching and results from modeling is mitigated by the ability of the tool to order and reorder the information, track culling, present sufficiently complete succinctly, track actions taken, to get the information quickly, to rebuild the information as needed, and to save the information between sessions; whereby the gaps in understanding while a user is evaluating modelling results for various scenarios can be mitigated by the tracking capability of a portfolio tool; and whereby the calculation and evaluation requirements while a user is planning, brainstorming, or seeking worthwhile approaches or value based upon conceptual content can be eased by having a tracking and reporting tool such as a portfolio.

250. The method of claim 1 to also provide to a user a recommendation of the most important item to view next in a portfolio by highlighting importance by visual decoration, further including:

a. accepting a definition of a knowledge model comprising a set of zero or more fxxts based on information stored regarding at least one concept relating to an entry in a portfolio, the concept represented by a cnxpt, the information stored comprising one or more cnxpts and zero or more associations;

b. accepting a map definition specifying use of said set of zero or more fxxts based on information stored regarding at least the concept relating to the portfolio, to create a map instance, the map instance associated with a portfolio view of type; the map definition stating the manner of decoration of most important cnxpts in the portfolio;

c. generating, using said map definition, a map instance, the generation causing positioning of concepts represented by cnxpts based upon strongest hierarchical associations and importance of concepts, each context represented by a cntexxt also represented by a cnxpt and positioned;

d. generating, according to said map definition, a portfolio instance, the generation causing determination of the most important portfolio lines, the most important line being decorated in the manner prescribed in the map definition;

and e. accepting navigation by the user of the portfolio, the user being presented with a set of lines on the portfolio, the most important of the lines decorated in a manner different from less important liness in the portfolio;

whereby the map provides a user with a recommendation by attracting the view of the user to lines displayed with a special decoration different from other lesser importance lines.

251. The method of claim 1 to also provide to a user a recommendation stating the most important concept in a context to view next in a conceptual hierarchy by highlighting importance by increased size, further including:

a. accepting a definition of a knowledge model comprising a set of zero or more fxxts based on information stored regarding at least the concept relating to the context, the information stored comprising one or more cnxpts and zero or more associations;

b. accepting a map definition specifying use of said set of zero or more fxxts based on information stored regarding at least the concept relating to the context, to create a map instance of type selected from the group of: tree, decision tree, forest, and Bayesian network; or other hierarchical organization of knowledge;

c. generating, using said map definition, a map instance, the generation causing positioning of concepts represented by cnxpts based upon strongest hierarchical associations and importance of concepts, each context represented by a cntexxt also represented by a cnxpt and positioned;

and d. accepting navigation by the user from the root of the hierarchy, the user being presented with a set of cnxpts when entering a context represented by a cntexxt, the most important of the cnxpts in the context consuming more space of the context and larger than less important cnxpts in the context, the navigation in a mode selected from the group of: data set, and visualization;

whereby the map provides a user with a recommendation of what concept to view in each context around a concept by displaying more important concepts larger than others.

252. The method of claim 1 to also provide to a user a recommendation stating the most important concept in a context to view next in a conceptual hierarchy by highlighting importance by visual decoration, further including:

a. accepting a definition of a knowledge model comprising a set of zero or more fxxts based on information stored regarding at least the concept relating to the context, the information stored comprising one or more cnxpts and zero or more associations;

b. accepting a map definition specifying use of said set of zero or more fxxts based on information stored regarding at least the concept relating to the context, to create a map instance of type selected from the group of: tree, decision tree, forest, and Bayesian network; or other hierarchical organization of knowledge, the map definition stating the manner of decoration of cnxpts by importance in a context;

c. generating, using said map definition, a map instance, the generation causing positioning of concepts represented by cnxpts based upon strongest hierarchical associations and importance of concepts, each context represented by a cntexxt also represented by a cnxpt and positioned, the most important cnxpt in a context being decorated in the manner prescribed in the map definition;

and d. accepting navigation by the user from the root of the hierarchy, the user being presented with a set of cnxpts when entering a context represented by a cntexxt, the most important of the cnxpts in the context consuming more space of the context and decorated in a manner different from less important cnxpts in the context, the navigation in a visualization;

whereby the map provides a user with a recommendation of what concept to view in each context around a concept by displaying more important concepts with a special decoration different from other lesser cnxpts.

253. The method of claim 1, by executing stored instructions that perform operations to cause the computer system to locate wisdom sought, further including:

a. accepting a definition of a knowledge model comprising a set of zero or more fxxts based on information stored regarding at least the concept relating to the context, the information stored comprising one or more cnxpts and zero or more associations;

b. accepting a map definition specifying use of said set of zero or more fxxts based on information stored regarding at least the concept relating to the context, to create a map instance of type selected from the group of: tree, decision tree, forest, and Bayesian network; or other hierarchical organization of knowledge, the map definition stating the mannerism to ascribe to cnxpts of greatest importance in a context;

c. generating, using said map definition, a map instance, the generation causing positioning of concepts represented by cnxpts based upon strongest hierarchical associations and importance of concepts, each context represented by a cntexxt also represented by a cnxpt and positioned, the most important cnxpt in a context given the mannerisms prescribed in the map definition;

and d. accepting navigation by the user from the root of the hierarchy, the user being presented with a set of cnxpts when entering a context represented by a cntexxt, the most important of the cnxpts in the context consuming more space of the context and given attracting mannerisms different from less important cnxpts in the context, the navigation in a visualization;

whereby the map provides a user with a recommendation of what concept to view in each context around a concept by displaying more important concepts with a special attracting mannerism different than other lesser cnxpts.

254. The method of claim 52 to also provide generating cnxpt positions by use of a roll-up function, wherein generating a map further comprises rolling-up affinities of cnxpts, dxos, and other txo info-items to form tensors for enforcing object spacing and sizing for a map, wherein:

a. generating, into said enhanced descendant forest, one or more affinitive tensors and one or more affinitive tensor weights by performing roll-up processing on said enhanced descendant forest according to calculate roll-up association weights to form positioning tensors means for generation of affinitive tensors for enforcing object spacing and sizing for said map;

b. generating sibling, cousin, and uncle roll-up associations, between-sibling-ring attractor, and to-uncle attractor tensors with weights for enforcing distance relationships between objects during positioning on said map according to summary tensor generation means;

c. generating between-category repulsor tensors with weights for enforcing distance between objects during positioning on said map according to summary tensor generation means;

d. generating map specific positions for cnxpts for said map according to process trees for visualization generation, position determination and final sizing means for positioning;

e. generating a visualization for display of said map;

f. generating, for each info-item selected from the group of: cnxpts, dxos, and other txos; wherein said info-item had previously existed in a just prior generated instance of said map, a prior position tensor between said info-item and a fictitious object at the prior position of said info-item in said just prior generated instance of said map, setting the weight of said prior position tensor to a pre-specified tensor weight as an admixture coefficient;

and g. generating, for each info-item selected from the group of: cnxpts, dxos, and other txos; wherein said info-item had a parent in a just prior generated instance of said map, a prior position in parent tensor between said info-item and a fictitious object at the prior position of said info-item in relation to its parent in said just prior generated instance of said map, setting the weight of said prior position in parent tensor to a pre-specified tensor weight as an admixture coefficient;

whereby classifications derived from a relevant portion of said commonplace data serve as the basis for positioning of cnxpts onto a visualization according to the map skeletal structure provided by the enhanced descendent tree forest, the prior positionings by the user for the same map, and for the maps from which the current map is derived; whereby the ability is provided to place objects for a multi-dimensional map in a position related to the closeness of said object to others logically according to a map definition and a structuring derived therefrom, and based to some degree on the positioning by the user of the objects in prior work arranging those objects in a visualization; and whereby the various generated tensors serve as a basis for computing an understandable and associative position of cnxpts into an organization of knowledge from the structure provided by said enhanced descendent tree forest.

255. The method of claim 1, by executing stored instructions that perform operations to cause the computer system to locate wisdom sought, further including:

a. accepting a definition of a knowledge model comprising a set of zero or more fxxts based on information stored regarding at least the concept relating to the context, the information stored comprising one or more cnxpts and zero or more associations;

b. accepting a map definition specifying use of said set of zero or more fxxts based on information stored regarding at least the concept relating to the context, to create a map instance of type selected from the group of: tree, decision tree, forest, and Bayesian network; or other hierarchical organization of knowledge, the map definition stating the avatar, and its mannerisms, to assign to cnxpts of greatest importance in a context;

c. generating, using said map definition, a map instance, the generation causing positioning of concepts represented by cnxpts based upon strongest hierarchical associations and importance of concepts, each context represented by a cntexxt also represented by a cnxpt and positioned, the most important cnxpt in a context being visualized by the avatar prescribed in the map definition;

and d. accepting navigation by the user from the root of the hierarchy, the user being presented with a set of cnxpts when entering a context represented by a cntexxt, the most important of the cnxpts in the context consuming more space of the context and larger than less important cnxpts in the context, and given an attracting avatar different from less important cnxpts in the context, the navigation in a visualization;

whereby the map provides a user with a recommendation of what concept to view in each context around a concept by displaying more important concepts with a special attracting avatar different from other lesser cnxpts.

256. The method of claim 1 to also provide determining of the differential between a set of fxxts with respect to a map, further including:

a. accepting a set of fxxts for comparison;

b. accepting the identity of a first fxxt from the set to be taken as a baseline for the comparison;

c. accepting a specification for a comparison metric to comprise a cost function for determining an error cost value inversely indicative of quality of a compared fxxt utilized in a compared map instance of said map against the baseline fxxt in a baseline map instance of said map;

d. accepting an alignment of the baseline map instance and each compared map instance for consistent calculation of the comparison metric, comprising a choice of rotation of the map around the vector;

e. accepting an admixture coefficient for the compared fxxts of the set as a weighting coefficient indicating a proportionality of impact of a compared fxxt in said map;

f. generating a first instance of said map utilizing the baseline said first fxxt with the specified admixture coefficient as an exemplar instance;

g. determining, for each second fxxt not yet formed of the set of fxxts to be compared, a second map instance of said map to compare against the baseline fxxt in said baseline map instance of said map;

and h. producing a result list of fxxts in the set in order by smallest absolute cost difference from baseline based upon lowest costs determined from comparison of second fxxts to the baseline;

whereby a set of fxxts, often computed by machine learning, may be compared for effectiveness.

257. The method of claim 1 to also provide determining of the differential between a set of fxxts with respect to a map, further including:

a. accepting a set of fxxts for comparison, the set termed a comparison set;

b. accepting the identity of a first fxxt from the comparison set to be taken as a baseline for the comparison;

c. accepting a choice of cnxpts as a basis for alignment of the baseline map instance and each compared map instance for consistent calculation of the comparison metric, comprising a first cnxpt, a second cnxpt, and the vector between said first cnxpt and said second cnxpt; where the vector is of a vector space described in terms of a particular ordered basis; where the map is defined to be drawn in dim dimensions; where the first dim numbers in the ordered list of numbers describing the vector having the initial point at the origin and the terminal point at the center of a cnxpt of the map define the placement position for the cnxpt in the map, further including:

i. setting as a primary default cnxpt a most important root of the baseline map instance having at least one descendant cnxpt that exists as a cnxpt in all of the compared map instances, where said primary default cnxpt exists as a cnxpt in all of the compared map instances;

ii. setting as a secondary default cnxpt a descendant of said primary default cnxpt in the baseline map, where said secondary default cnxpt exists as a most important descendant of said primary default cnxpt among all descendants of said primary default cnxpt that exist as a cnxpt in all of the compared map instances;

iii. accepting a user choice, with said primary default cnxpt as default, of a cnxpt to be said first cnxpt as a basis for alignment;

and iv. accepting a user choice, with said secondary default cnxpt as default, of a cnxpt to be said second cnxpt as a basis for alignment;

d. accepting an alignment of the baseline map instance and each compared map instance for consistent calculation of the comparison metric, comprising a choice of rotation of the map around the vector between said first cnxpt and said second cnxpt, and setting the length of the radius of the circumscribed bounds of the compared map instance by transform of cnxpt positions to the length of the radius of the circumscribed bounds of the baseline map instance; the specification for the alignment selected from the group of:

i. placing, if said first cnxpt is a root of the compared map instance, the center of said first cnxpt at the zero vector in the compared map instance, and rotating the map so that all of the first dim minus one numbers in the ordered list of numbers of the vector having the initial point at the center of said first cnxpt and the terminal point at the center of said second cnxpt are equal to their value most close to zero;

ii. placing, if said first cnxpt is not a root of the compared map instance and said second cnxpt is a descendant of said first cnxpt, said first cnxpt of the compared map instance at the zero vector origin; and rotating the map so that all of the first dim minus one numbers in the ordered list of numbers of the vector having the initial point at the origin and the terminal point at the center of said second cnxpt are equal to their value most close to zero;

iii. placing, if said first cnxpt is not a root of the compared map instance and said second cnxpt is not in the same tree as said first cnxpt, said first cnxpt of the compared map instance at the zero vector origin; and rotating the map so that all of the first dim minus one numbers in the ordered list of numbers of the vector having the initial point at the origin and the terminal point at the center of said second cnxpt are equal to their value most close to zero;

iv. placing, if said first cnxpt is not a root of the compared map instance and said second cnxpt is an ascendant of said first cnxpt, said second cnxpt of the compared map instance at the zero vector origin; and rotating the map so that all of the first dim minus one numbers in the ordered list of numbers of the vector having the initial point at the origin and the terminal point at the center of said first cnxpt are equal to their value most close to zero;

v. accepting a null specification for the alignment wherein the center of a compared map instance is placed coincident with the center of the baseline map instance;

and vi. accepting a user defined specification for the alignment;

e. accepting a specification for a comparison metric for determining a total value inversely indicative of quality of a compared fxxt utilized in a compared map instance of said map against the baseline fxxt in a baseline map instance of said map, the comparison metric termed an error cost function, the comparison metric comprised of the sum of absolute values of specified arguments, the arguments selected from the group of:

i. the difference between a value of a property of a third cnxpt in the compared map instance to the value of said property of said third cnxpt in the baseline map instance, the specification of said property accepted from the user;

ii. the square of the distance from each third cnxpt in the baseline map instance to said third cnxpt in a compared map instance, given the selected alignment, the distance defined to be between the terminal points of two vectors the first constructed by defining dimensions using a value of one or more properties of said third cnxpt in the baseline map instance and the second constructed by defining like dimensions using a value of like said one or more properties of said third cnxpt in the compared map instance, the initial point at the origin of the respective map instance, the specification of said one or more properties accepted from the user;

and iii. the square of the difference between the inter-cnxpt distance of each pair of a third cnxpt and a fourth cnxpt in the baseline map instance and the inter-cnxpt distance of the matching pair of a third cnxpt and a fourth cnxpt in the compared map instance, the distance defined to be from the terminal point of a vector from the origin to the third cnxpt to the terminal point of a vector from the origin to the fourth cnxpt;

wherein the vector is of a vector space described in terms of a particular ordered basis set of properties as rows forming the ordered list of elements; where the map is defined to be drawn in dim dimensions; where the first dim values in the ordered basis set of properties as rows describing the vector having the initial point at the origin and the terminal point at the center of a cnxpt of the map define the placement position for the cnxpt in the map, further including:

iv. constructed by defining dimensions using a value of one or more properties of said third cnxpt in the baseline map instance and the second constructed by defining like dimensions using a value of like said one or more properties of said third cnxpt in the compared map instance, the specification of said one or more properties accepted from the user;

v. two vectors the first constructed by defining dimensions using a value of one or more properties of said third cnxpt in the baseline map instance and the second constructed by defining like dimensions using a value of like said one or more properties of said third cnxpt in the compared map instance, the specification of said one or more properties accepted from the user;

vi. a distance between the terminal points of two vectors the first constructed by defining dimensions using a value of one or more properties of said third cnxpt in the baseline map instance and the second constructed by defining like dimensions using a value of said one or more properties of said third cnxpt in the compared map instance, the specification of said one or more properties accepted from the user;

vii. the two-dimensional distance from a third cnxpt in the compared map instance to said third cnxpt in the baseline map instance;

viii. a distance between the terminal points of two vectors the first constructed by adding dimensions to the two-dimensional location of a third cnxpt in the baseline map instance using a value of one or more properties of said third cnxpt in the baseline map instance and the second constructed by adding like dimensions to the two-dimensional location of said third cnxpt in the compared map instance using a value of said one or more properties of said third cnxpt in the compared map instance, the specification of said one or more properties accepted from the user;

ix. the three-dimensional distance from a third cnxpt in the compared map instance to said third cnxpt in the baseline map instance;

x. a distance between the terminal points of two vectors the first constructed by adding dimensions to the three-dimensional location of a third cnxpt in the baseline map instance using a value of one or more properties of said third cnxpt in the baseline map instance and the second constructed by adding like dimensions to the three-dimensional location of said third cnxpt in the compared map instance using a value of said one or more properties of said third cnxpt in the compared map instance, the specification of said one or more properties accepted from the user;

xi. the dim-dimensional distance from a third cnxpt in the compared map instance to said third cnxpt in the baseline map instance;

xii. a distance between the terminal points of two vectors the first constructed by adding dimensions to the dim-dimensional location of a third cnxpt in the baseline map instance using a value of one or more properties of said third cnxpt in the baseline map instance and the second constructed by adding like dimensions to the dim-dimensional location of said third cnxpt in the compared map instance using a value of said one or more properties of said third cnxpt in the compared map instance, the specification of said one or more properties accepted from the user;

xiii. the two-dimensional distance from a third cnxpt in the compared map instance to said third cnxpt in the baseline map instance, measured by constructing vectors between the origin defined to be at the center of the lowest common ancestor of said third cnxpt in the compared map instance and said third cnxpt in the baseline map instance to the center of said third cnxpt;

xiv. a distance between the terminal points of two vectors the first constructed by adding dimensions to the two-dimensional location of a third cnxpt in the baseline map instance using a value of one or more properties of said third cnxpt in the baseline map instance and the second constructed by adding like dimensions to the two-dimensional location of said third cnxpt in the compared map instance using a value of said one or more properties of said third cnxpt in the compared map instance, the two-dimensional location relative to an origin defined to be at the center of the lowest common ancestor of said third cnxpt in the compared map instance and said third cnxpt in the baseline map instance to the center of said third cnxpt, the specification of said one or more properties accepted from the user;

xv. the three-dimensional distance from a third cnxpt in the compared map instance to said third cnxpt in the baseline map instance, measured by constructing vectors between the origin defined to be at the center of the lowest common ancestor of said third cnxpt in the compared map instance and said third cnxpt in the baseline map instance to the center of said third cnxpt;

xvi. a distance between the terminal points of two vectors the first constructed by adding dimensions to the three-dimensional location of a third cnxpt in the baseline map instance using a value of one or more properties of said third cnxpt in the baseline map instance and the second constructed by adding like dimensions to the three-dimensional location of said third cnxpt in the compared map instance using a value of said one or more properties of said third cnxpt in the compared map instance, the three-dimensional location relative to an origin defined to be at the center of the lowest common ancestor of said third cnxpt in the compared map instance and said third cnxpt in the baseline map instance to the center of said third cnxpt, the specification of said one or more properties accepted from the user;

xvii. the dim-dimensional distance from a third cnxpt in the compared map instance to said third cnxpt in the baseline map instance, measured by constructing vectors between the origin defined to be at the center of the lowest common ancestor of said third cnxpt in the compared map instance and said third cnxpt in the baseline map instance to the center of said third cnxpt;

and xviii. a distance between the terminal points of two vectors the first constructed by adding dimensions to the dim-dimensional location of a third cnxpt in the baseline map instance using a value of one or more properties of said third cnxpt in the baseline map instance and the second constructed by adding like dimensions to the dim-dimensional location of said third cnxpt in the compared map instance using a value of said one or more properties of said third cnxpt in the compared map instance, the dim-dimensional location relative to an origin defined to be at the center of the lowest common ancestor of said third cnxpt in the compared map instance and said third cnxpt in the baseline map instance to the center of said third cnxpt, the specification of said one or more properties accepted from the user;

f. accepting the identity of a first fxxt from the set to be taken as a baseline for the comparison;

g. accepting an admixture coefficient for the compared fxxts of the set as a weighting coefficient indicating a proportionality of impact of a compared fxxt in said map;

h. generating a first instance of said map utilizing the baseline said first fxxt with said specified admixture coefficient as a baseline map instance as an exemplar instance;

i. determining, for each second fxxt of the set of fxxts to be compared, plus said baseline fxxt if a preference setting is set to a predetermined value, a second map instance of said map to compare against the exemplar map instance; determining, for each second fxxt not yet formed of the set of fxxts to be compared, a second map instance of said map to compare against said baseline map instance of said map, wherein:

i. generating said second map instance of said map utilizing the comparison said second fxxt with application of said specified admixture coefficient;

ii. determining a cost-improved map definition from one or more determinations of an improved set of fxxt coefficients indicating a proportionality of impact in said map for comparison based upon finding an acceptably near minimum error cost value, the error cost value calculated by the cost function on differences in organization of knowledge from exemplar map to a version of map for comparison after forming the version of map for comparison by fxxt extractions, forest extractions, roll-ups, and positionings, the choice of fxxt coefficients indicating a proportionality of impact used to generate the version of map for comparison based upon calculations selected from the group of:

iii. comparison metric to comprise a cost function for determining an error cost value when comparing a fxxt in a compared map instance of said map for comparison against the baseline fxxt in a baseline map instance of said map by accumulating the error cost from the distances between each third cnxpt in the baseline map instance to said third cnxpt in a compared map instance, wherein the comparison metric contains arguments selected from the group of:

and iv. computing the degree of multimodality for votes by a plurality of users for a third cnxpt by determining the degree to which the distribution for said votes is other than unimodal;

and j. producing a result list of fxxts in the set and the absolute cost difference from the exemplar based upon lowest costs determined from comparison of second fxxts to the baseline map instance;

whereby a set of fxxts, often computed by machine learning, may be compared for accuracy in analysis.

258. The method of claim 257 to also provide determining of the differential between a set of fxxts with respect to a exemplar map instance improved by a crowd, further including:

a. generating a first instance of said map utilizing the baseline said first fxxt with the specified admixture coefficient as an exemplar map instance;

b. accepting repositioning of zero or more cnxpt positions in the exemplar map instance from the baseline map instance by one or more specified users to correct believed deficiencies in results of use of said baseline fxxt;

c. determining, for each second fxxt of the set of fxxts to be compared, plus said baseline fxxt if a preference setting is set to a predetermined value, a second map instance of said map to compare against the exemplar map instance;

and d. producing a result list of fxxts in the set and the absolute cost difference from the exemplar based upon lowest costs determined from comparison of second fxxts to the exemplar;

whereby a set of fxxts may be compared to a refined baseline where users have made required changes.

259. The method of claim 257 to also provide determining of the differential between a set of fxxts with respect to a baseline map instance, further including:

a. applying a coefficient instance of said map utilizing the baseline said first fxxt with the specified admixture coefficient as an exemplar map instance;

b. accepting repositioning of zero or more cnxpt positions in the exemplar map instance from the baseline map instance by one or more specified users to correct believed deficiencies in results of use of said baseline fxxt;

c. determining, for each second fxxt not yet formed of the set of fxxts to be compared plus said baseline fxxt, a second map instance of said map to compare against the exemplar map instance;

and d. producing a result list of fxxts in the set in order by smallest absolute cost difference from exemplar based upon lowest costs determined from comparison of second fxxts to the exemplar;

whereby a set of fxxts may be compared to a refined baseline where users have made required changes.

260. The method of claim 1 to also provide determining of an emergent property, further including:

a. defining a knowledge model based upon sub-typing comprising a set of zero or more fxxts;

b. generating, using a map definition referencing the set of zero or more fxxts, a derived ontology;

c. generating, using said map definition referencing the set of zero or more fxxts, a skeletal structure for a map instance for said one or more domains of wisdom from the extracted derived ontology wherein the resulting map skeletal structure of said map instance is based upon an enhanced descendent forest manner and an enhanced ascendant forest manner combination structure manner of analysis;

d. generating, using said map definition referencing the set of zero or more fxxts, an organization of knowledge to structure a map instance for said one or more domains of wisdom from the extracted derived ontology wherein the resulting map structure of said map instance is based upon an enhanced descendent forest manner of map assembly, said map based upon sub-typing, wherein a first cnxpt has a plurality of second cnxpts as distinct parents, where each second cnxpt is a super-type of said first cnxpt based upon properties of said first cnxpt;

and e. determining existence of a property in said first cnxpt not appearing in any second cnxpt in said plurality of second cnxpts;

whereby said first property is an emergent property if there is no parent having it and because the map is definitionally the total of all knowledge at the time of viewing, the emergence is definitionally correct at that time.

261. The method of claim 1 to also provide presentation of commonplace changes made according to the source and authority of a vote, further comprising:

a. repositioning of the map in use by said user and consequent re-rendering of any display of the map in use by said user to adapt to a change made to an info-item in the commonplace to conform to the result of changes made, the changes selected from the group of:

i. changes made by vote entered by any user that alter the consensus regarding beliefs encompassed by the commonplace data so substantially that it would cause the data of the map being accessed by said user to be noticeably incorrect, the votes termed objective beliefs;

ii. changes made by vote entered by a third user that alter, when weighted heavily relative to the votes of other users by ascent, the accorded concurrence regarding beliefs encompassed by the commonplace data so substantially that it would cause the data of the map being accessed by said user to be noticeably incorrect, the votes termed expert beliefs of said third user by grant;

iii. changes made by vote entered by a third user that alter, when weighted heavily relative to the votes of other users by agreement, the conformance regarding beliefs encompassed by the commonplace data so substantially that it would cause the data of the map being accessed by said user to be noticeably incorrect, the votes termed ceded authoritative beliefs of said third user by assignment;

iv. changes made by vote entered by an appointed standard setting user that alter, when weighted heavily relative to the votes of each user not a participant of the standards setting body, the concordance regarding beliefs encompassed by the commonplace data so substantially that it would cause the data of the map being accessed by said user to be noticeably incorrect, the votes termed standardized beliefs of a standards authority;

v. changes made by vote entered by an appointed authority that alter, when weighted to respect the authority over the votes of each user not an authorized participant of the harmonization effort, the concordance information encompassed by the commonplace data so substantially that it would cause the data of the map being accessed by said user to be noticeably incorrect, the votes termed harmonization policy information of the participant authorities;

vi. changes made by vote entered by said user that overpower the consensus regarding beliefs encompassed by the commonplace data so substantially that it would cause the data of the map being accessed by said user to be noticeably incorrect, the overweighted votes termed subjective beliefs, the weighting assigned by said user;

and vii. changes made by vote entered by said user that disregard the consensus regarding beliefs encompassed by the commonplace data, the votes termed user set beliefs;

whereby a user may control the status of what they see in a map according to their own voting; whereby standards setting bodies may set standards and participate in harmonization; whereby experts and authorities may be given greater control of topics based upon granted authority.

262. The method of claim 1 to also provide differentiated methods for searching for content during map generation, further including:

a. providing at least one invocation procedure to obtain wisdom, of a sequencing selected from the group of:

i. procedure for obtaining wisdom yielding a list of at least one cnxpt into a derived ontology, the procedure then initiating formation of a map from a map definition referencing a set of zero or more fxxts, wherein the procedure is of a type selected from the group of:

01. a search procedure for obtaining content for at least one domain of wisdom by one or more searches yielding a list of at least one cnxpt, the procedure then initiating a map formation procedure for a pre-determined map definition and passing the search results to the map formation procedure, wherein the searches are defined prior to invocation of said procedure for obtaining content, the assignment of formed map definition to search determined prior to invocation of said procedure for obtaining content;

and 02. a search procedure for obtaining content for at least two domains of wisdom by two or more searches yielding at least two lists of at least one cnxpt, the procedure then initiating a map formation procedure for each of at least two pre-determined map definitions and passing at least one of said at least two lists of at least one cnxpt as search results to each of the map formation procedures for each of at least two pre-determined map definitions for building said pre-determined map definitions, wherein the searches are defined prior to invocation of said procedure for obtaining content, the assignment of map definition to search determined prior to invocation of said procedure for obtaining content;

and ii. auxiliary procedure for obtaining wisdom invoked by a map formation procedure, the auxiliary procedure specified in the map definition referencing a set of zero or more fxxts, the result of the auxiliary procedure added into a derived ontology, wherein the procedure is of a type selected from the group of:

01. an auxiliary procedure obtaining content for a domain of wisdom by performing a search yielding a list of at least one cnxpt and zero or more associations, the search specified in the map definition;

02. an auxiliary procedure obtaining content for zero or more domains of wisdom by performing one or more searches each yielding a list of zero or more cnxpts and zero or more associations, wherein each search is specified in the map definition;

and 03. a fxxt-resolution procedure for obtaining content for one domain of wisdom by performing a resolution for one fxxt specification stated in the map definition, the fxxt-resolution procedure yielding derived ontology containing a list of zero or more cnxpts and zero or more associations;

whereby variations of the invocation of maps allow for spawning other maps, expanded collection methods for wisdom, and ability to generate multi-forest and multi-purpose maps.

263. The method of claim 1 to also provide the ability to find a classification for a technical invention not well defined, the method further comprising:

a. defining a technology derivation map describing the historic, contemporary, and possible future technologies showing the genealogy of technologies wherein similar technological concepts are in closer proximity than dissimilar technological concepts;

b. generating the technology derivation map;

c. displaying the technology derivation map on a first portion of the display screen, the plurality of cntexxts of the technology derivation map as a network display;

d. displaying simultaneously sub-contexts of at least one context in the subset of the plurality of contexts;

e. creating a goal, stating zero or more properties of said goal, the goal representing the concept the user has in their mind or is forming, ideating, or conjuring;

f. accepting one or more user commands causing the goal to be classified into a different context identified by a cntexxt, the intent of the move being to narrow the set of contexts where said user might find the technology concept being conjured, the movement of the goal caused by a method selected from the group of:

i. executing a search query of said goal, the query defined or redefined by the user, the query causing movement of said goal to the cntexxt closest matching to the query results of the goal query;

and ii. navigating to traverse the goal to a next cntexxt; and g. accepting a user command indicating that the concept being conjured and represented by the goal should be within the context moved to, the meaning of the user command a response to the status of the idea in the context, the command selected from the group of:

i. as the inventive technology is not in the located context but should be, wherein:

01. finalizing said goal by converting said goal to a cnxpt with the same properties;

02. associating said cnxpt hierarchically to the context by a hierarchical association, said cnxpt a differentiable offshoot of the context;

03. accepting a command to stake a claim for the idea the user identified, reified from the goal, and allowed to concretize; and 04. generating, if said search goal has a result set other than of cnxpts, occurrence relationships between said cnxpt and each relevant result set item information txo or irxt found; and ii. as the concept is in the located context represented by a cnxpt, abandon the goal, allowing the user to set properties of the found cnxpt according to those on the goal if not conflicting with existing properties in the found cnxpt;

whereby the user is given an ability to locate a context best suited to holding an idea; whereby rather than a decision tree classification the user is given the option of extending decision tree branches by locating an appropriate parent and then creating a new leaf; whereby the new cnxpt can fill white space of the parent; whereby the user is given the option to set properties of the new idea that differentiate it from the context and siblings within the context although the user may be reticent to expose the idea; and whereby the differentiation may be by timeframe where the new cnxpt should be the parent rather than the child.

264. The method of claim 1 to also provide forming a structure for results from a query, further comprising:

a. organizing into a structure the set of ttxs found by the query, wherein:

i. obtaining results from the operation of the query, the set of ttxs resulting from executing a ttx sub-setting operation selected from the group of:

01. a find query resulting in a list of cnxpts;

02. a query result comprising a set of ttxs;

03. a query result comprising a set of cnxpts and zero or more related ttxs and zero or more associations;

04. a reduction result comprising a set of cnxpts and structural information;

05. a derived ontology defined over a set of cnxpts;

06. a fxxt extraction comprising a set of cnxpts and associations;

07. a flow extraction comprising a set of cnxpts and associations;

08. output of an execution of an analytic comprising a set of ttxs;

09. output of an execution of an analytic comprising a set of cnxpts and zero or more related ttxs and zero or more associations;

10. result of selection from a data set comprising a set of ttxs;

11. result of selection from a data set comprising a set of cnxpts and zero or more related ttxs and zero or more associations;

12. result of selection from a portfolio comprising a set of ttxs;

13. result of selection from a portfolio comprising a set of cnxpts and zero or more related ttxs and zero or more associations;

14. selection of a uniquely identified categorization comprising a set of cnxpts and zero or more related ttxs and zero or more associations;

15. selection of a uniquely identified clump extract set comprising a set of cnxpts with positions and zero or more related ttxs with positions and zero or more hierarchical tensors;

16. output of a filter application comprising a set of ttxs;

17. output of a filter application comprising a set of cnxpts and zero or more related ttxs and zero or more tensors;

18. a user ad hoc selection set of ttxs; and 19. a user ad hoc selection set of cnxpts;

ii. creating a structure based upon the nature of the result of the ttx sub-setting operation, the structuring of the result of a type selected from the group of:

01. forming, for the result of the ttx sub-setting operation being a list of ttxs not in a result set, wherein:

creating a ttx result set with a ttx result set item for each ttx in the query result list;

performing tallying and ordering of the ttx result set specific to the type of ttx result set; and setting, as the model for the result set, the properties of the ttx result set items as a simple list otherwise devoid of structure, including zero or more identified summaries of properties, to generate a query result specific surrogate model snapshot updatable upon change in list;

forming, for the result of a query returning an area of consideration, creation of the area;

forming, for the result of a selection of a portfolio, creation of a partial portfolio;

forming, for the result of a filter application a structuring like that of the domain of the search;

02. forming, for a list of cnxpts result of the ttx sub-setting operation, the operation performed in a basis map, all of the listed cnxpts appearing within the basis map, wherein:

creating a result set with a result set item for each cnxpt in the query result list;

performing tallying and ordering of the cnxpt result set;

creating an area of consideration from the set of cnxpts according to form area of consideration from results means;

generating a named derived ontology from the cnxpts in the result set and from all tensors directly connecting any two cnxpts in the result set, converting the tensors to be weighted associations in the named derived ontology;

generating a temporary map from the skeletal structure formed for the basis map a temporary compressed skeletal structure for the area of consideration by collapsing the hierarchy of the skeletal structure of the basis map where the set of cnxpts of the area of consideration do not include cnxpts in the skeletal structure of the map, wherein the positions of the set of cnxpts of the area of consideration are not recomputed;

performing positioning for the temporary map to generate a temporary organization of knowledge;

and executing the model stated by the cnxpt definitions of the temporary organization of knowledge in the temporary map, to generate a query result specific model snapshot updatable upon change in temporary organization of knowledge;

03. forming, for the result of the ttx sub-setting operation being a list of cnxpts in the nature of a reduction, the results additionally comprising the calculations, associations, and tensors needed to determine how the cnxpts will participate in a skeletal structure and where the cnxpts will be positioned, although the structure not having been completed, the cnxpts not necessarily in the basis map, wherein:

creating a named derived ontology from the set of cnxpts in the query result list, and provided calculations, associations, and tensors;

creating a new temporary map having the named derived ontology as a basis;

generating a skeletal structure for the temporary map according to fxxt basic descendant spanning tree extraction means;

extracting an enhanced forest from the skeletal structure formed for the temporary map;

performing roll-ups for the temporary map;

performing positioning for the temporary map to generate a temporary organization of knowledge;

and executing the model of the temporary organization of knowledge in the temporary map, to generate a query result specific model snapshot updatable upon change in temporary organization of knowledge;

04. forming, for a derived ontology result of the ttx sub-setting operation, wherein:

creating a new temporary map having the named derived ontology as a basis;

generating a skeletal structure for the temporary map according to fxxt basic descendant spanning tree extraction means;

extracting an enhanced forest from the skeletal structure formed for the temporary map;

performing roll-ups for the temporary map;

performing positioning for the temporary map to generate a temporary organization of knowledge;

and executing the model of the temporary organization of knowledge in the temporary map, to generate a query result specific model snapshot updatable upon change in temporary organization of knowledge;

05. forming, for the result of the ttx sub-setting operation being a list of cnxpts not in a result set, the list in the setting of a basis map, none of the cnxpts of the list appearing in the basis map, wherein:

creating a list with a list item for each cnxpt in the query result list;

and executing the model embodied in cnxpts of the list as if all cnxpts were roots of a map otherwise devoid of structure, to generate a query result specific model snapshot updatable upon change in list;

06. forming, for the result of the ttx sub-setting operation being a list of cnxpts not in a result set in the setting of a basis map, one or more of the cnxpts of the list appearing in the basis map, wherein:

generating a named derived ontology from the cnxpts in the query result list and from all tensors directly connecting any two cnxpts in the query result list, converting the tensors to be weighted associations in the named derived ontology;

adding to the named derived ontology a summarized tensor between each two cnxpts of the query result list having between them a hierarchical structure in the basis map by collapsing the set of hierarchical tensors of said hierarchical structure into said summarized tensor, wherein as no tensors connect cnxpts of the query result list not in the basis map those cnxpts become roots of the skeletal structure of the temporary map;

creating a new temporary map having the named derived ontology as a basis;

generating a skeletal structure for the temporary map according to fxxt basic descendant spanning tree extraction means;

extracting an enhanced forest from the skeletal structure formed for the temporary map;

performing roll-ups for the temporary map;

performing positioning for the temporary map to generate a temporary organization of knowledge;

and executing the model embodied in cnxpts of the query result list as if all cnxpts not in the basis map were roots of the skeletal structure of the basis map, to generate a query result specific model snapshot updatable upon change in temporary organization of knowledge;

07. forming, for list of cnxpts result of the ttx sub-setting operation, the operation performed in a basis map, all of the listed cnxpts appearing within the basis map, wherein:

creating a result set with a result set item for each cnxpt in the query result list;

performing tallying and ordering of the cnxpt result set;

creating an area of consideration from the set of cnxpts according to form area of consideration from results means;

generating a named derived ontology from the cnxpts in the result set and from all tensors directly connecting any two cnxpts in the result set, converting the tensors to be weighted associations in the named derived ontology;

generating a new temporary map from the skeletal structure formed for the basis map a temporary compressed skeletal structure for the area of consideration by collapsing the hierarchy of the skeletal structure of the basis map where the set of cnxpts of the area of consideration do not include cnxpts in the skeletal structure of the map, wherein the positions of the set of cnxpts of the area of consideration are not recomputed;

performing positioning for the temporary map to generate a temporary organization of knowledge;

and executing the model of the temporary organization of knowledge in the temporary map, to generate a query result specific model snapshot updatable upon change in temporary organization of knowledge;

and 08. forming, for the result of the ttx sub-setting operation being a list of cnxpts in a result set in the setting of a basis map, one or more of the cnxpts of the list appearing in the basis map, wherein:

creating a result set with a result set item for each cnxpt in the query result list;

performing tallying and ordering of the cnxpt result set;

generating a named derived ontology from the cnxpts in the result set and from all tensors of the basis map directly connecting any two cnxpts in the result set, converting the tensors to be weighted associations in the named derived ontology;

adding to the named derived ontology a summarized tensor between each two cnxpts of the result set having between them a hierarchical structure in the basis map by collapsing the set of hierarchical tensors of said hierarchical structure into said summarized tensor, wherein as no tensors connect cnxpts of the result set not in the basis map those cnxpts become roots of the skeletal structure of the temporary map;

creating a new temporary map having the named derived ontology as a basis;

generating a skeletal structure for the temporary map according to fxxt basic descendant spanning tree extraction means;

extracting an enhanced forest from the skeletal structure formed for the temporary map;

performing roll-ups for the temporary map;

performing positioning for the temporary map to generate a temporary organization of knowledge;

and executing the model embodied in cnxpts of the result set as if all cnxpts not in the basis map were roots of the skeletal structure of the basis map, to generate a query result specific model snapshot updatable upon change in temporary organization of knowledge;

whereby a query resulting in a list of ttxs is structured; whereby a query resulting in a list of ttxs is summarized; whereby a query resulting in a list of cnxpts provides the model the cnxpts carry; whereby a model is executed or a surrogate model is generated to provide a snapshot changeable as changes are made to the list of ttxs or to the structure.

265. The method of claim 264, to extract a predetermined set of characteristics of cnxpts into a data package, further comprising:

a. retrieving a query result from a query producing a set of cnxpts the query result including a specific model snapshot updatable upon change in a temporary organization of knowledge;

b. applying zero or more filters determining inclusion based upon characteristics of cnxpts to eliminate one or more cnxpts of said query result;

c. extracting a plurality of value tuples of predetermined characteristics of said cnxpts in said set of cnxpts; and d. generating said data package of the set of said plurality of value tuples.

266. The method of claim 264 to also provide visualization of results of query for ttxs, further comprising:

a. generating a visualization of the set of cnxpts resulting from executing a ttx sub-setting operation, by the organization of the resulting set of ttxs selected from the group of:

i. generating an ordered list with zero or more summarization tallies the result set of ttxs resulting from executing a ttx sub-setting operation;

ii. generating an unordered list with zero or more summarization tallies the list of ttxs resulting from executing a ttx sub-setting operation;

iii. generating as a secondary map visualization the temporary map resulting from executing a ttx sub-setting operation;

iv. generating as a overlay visualization of the basis map the area of consideration of cnxpts resulting from executing a ttx sub-setting operation;

v. generating an ordered result set list with zero or more summarization tallies the result set of cnxpts resulting from executing a ttx sub-setting operation; and vi. generating an unordered list with zero or more summarization tallies the list of cnxpts resulting from executing a ttx sub-setting operation;

b. presenting the visualization to the user; and c. accepting a request to alter the visualization to affect the underlying ttx information.

267. The method of claim 1 to also provide forming a model from a map, comprising:

a. forming a model from an ontology, wherein:

i. forming a plurality of set extraction specifications partitioning the contents of an ontology into one or more identified extraction sets, the nodes of the ontology being object classes, the relationships of the ontology being object classes to support node classes, the instances of the nodes of the ontology having storage to hold zero or more values and formulas to determine said zero or more values;

ii. accepting a structuring of an ontology as a basis for modeling by specifying a weighting coefficient indicating a proportionality of impact for an extraction set wherein said extraction set is included into a named derived ontology;

iii. extracting the extraction sets of ontology components into a named derived ontology, wherein the strength of every relationship instance added to the named derived ontology during extraction becomes the weighting coefficient indicating a proportionality of impact multiplied by the relationship strength in the original ontology, wherein the node importance of every node instance added to the named derived ontology during extraction becomes the weighting coefficient indicating a proportionality of impact multiplied by the node importance in the original ontology;

iv. developing a skeletal structure from the named derived ontology according to fxxt basic descendant spanning tree extraction means, respecting the weighting coefficient indicating a proportionality of impact of said extraction sets as incorporated in the named derived ontology relationships and nodes; and v. calculating a model result from the structured named derived ontology by computing the zero or more values of each node instance, respecting the skeletal structure, the model result comprising the zero or more values of each node instance;

whereby a commonplace becomes a resource for controlling a model.

268. The method of claim 1 to also provide improving a model by exemplar, comprising:

a. improving a model according to user perceptions, wherein:

i. accepting for use as comparators zero or more normative results anticipated of the modeling, each normative result specific to an identifiable model result;

ii. computing an error metric cost function for the differential between the modeling results and the normative results;

iii. adjusting the weighting coefficients indicating a proportionality of impact assigning a weighting variation to the extraction sets to reduce the cost value result of said error metric cost function wherein the model results based upon the weighting variation are nearer to said normative results based upon the cost value result of said error metric cost function; and iv. accepting said set of newly assigned weighting variation weighting coefficients indicating a proportionality of impact as an acceptable set for a model to achieve a more satisfactory predictive result;

whereby a map becomes a tool for improvement of a model over time based upon the expectations established by a user.

269. The method of claim 1 to also provide retaining of thoughts of a user in a structure, wherein:

a. initiating, wherein said user begins a session of use of a map with a prior condition selected from the group of:

i. at the start of the session a goal object exists and has not been deleted or converted to a cnxpt, wherein:

01. requesting from said user generating a hidden goal object to serve as a goal; and ii. at the start of the session no goal object exists that has not been deleted or converted to a cnxpt, wherein:

01. generating a hidden goal object to serve as a goal;

b. adding information collected from searching process to the goal, comprising choices made during navigation, jump searching; and c. accepting a goal from said user;

whereby the goal serves to collect all of the searching and querying that occurs to attain the goal, and then encapsulates the result into a cnxpt that represents the ttx actually resulting after the user resolves his thoughts; whereby a goal serves as a learning device to retain information either about a specific topic a user is seeking even if novel, or about the purpose for use of the system when in a particular map or particular sitting; whereby information regarding navigation is attached to the goal to retain the interest the user had regarding topics when in a setting having a purpose as cast by the goal; whereby navigation is converted to relationship information to show the connection of the goal to topics viewed in the session; whereby for some period of its existence, the ttx represented by the cnxpt begun as a goal may appear to be poorly defined, but over time, the representative, as the collection point for information regarding the ttx, will likely become more and more well defined; whereby goals declare the existence of an abstract concept without the user knowing that he has done so; whereby a goal may hold a query script and the result sets resulting from the query, navigation tours, user indications from a navigation, a name, a description, and other information; whereby information resources accessed during the life of the goal are retained with the goal as occurrences to show the relevance of the information resource to the goal.

270. The method of claim 1, by executing stored instructions that perform operations to cause the computer system to locate wisdom sought in a map instance, further including:

a. define a search specification, requesting a result selected from the group of:

i. charge theories from a list of pairs of cnxpts in rule to charge theory applicability pairings in said first identified search base;

ii. evidence items from a list of pairs of cnxpts in evidence to case issue applicability pairings in said first identified search base;

iii. evidence items from a list of pairs of cnxpts in evidence items against fact pairings in said first identified search base;

iv. fact items from a list of pairs of cnxpts in fact to theory of the case applicability pairings in said first identified search base;

v. facts from a list of pairs of cnxpts in evidence items against fact pairings in said first identified search base;

vi. facts from a list of pairs of cnxpts in facts against rule element pairings in said first identified search base;

vii. general precedents from a list of pairs of cnxpts in precedent to rule applicability pairings in said first identified search base;

viii. general rules from a list of pairs of cnxpts in rule to doctrine applicability pairings in said first identified search base;

ix. general rules from a list of pairs of cnxpts in specific rule to general rule applicability pairings in said first identified search base;

x. jurisdictions from a list of pairs of cnxpts in specific rule to jurisdiction's law applicability pairings in said first identified search base;

xi. precedents from a list of pairs of cnxpts in precedent to rule applicability pairings in said first identified search base;

xii. rule items from a list of pairs of cnxpts in rule to charge theory applicability pairings in said first identified search base;

xiii. rules from a list of pairs of cnxpts in element to rule applicability pairings in said first identified search base;

xiv. rules from a list of pairs of cnxpts in rule to doctrine applicability pairings in said first identified search base;

xv. specific rule elements from a list of pairs of cnxpts in element to rule applicability pairings in said first identified search base;

xvi. specific rule elements from a list of pairs of cnxpts in facts against rule element pairings in said first identified search base;

xvii. specific rule elements from a list of pairs of cnxpts in specific rule to general rule dependency pairings in said first identified search base;

xviii. specific rules from a list of pairs of cnxpts in specific rule to general rule applicability pairings in said first identified search base;

xix. specific rules from a list of pairs of cnxpts in specific rule to jurisdiction's law applicability pairings in said first identified search base;

xx. theories of the case from a list of pairs of cnxpts in fact to theory of the case applicability pairings in said first identified search base;

xxi. model equations from a list of pairs of cnxpts in model equation dependency pairings in said first identified search base;

xxii. dependent elements from a list of pairs of cnxpts in dependency pairings in said first identified search base;

and xxiii. precedent elements from a list of pairs of cnxpts in dependency pairings in said first identified search base;

b. accepting zero or more additional parts of a first or next wisdom request command providing zero or more ordering specifications stating an ordering metric to apply to said first form of result after completion of said search if either said form of result, said type of wisdom sought, or said additional specifications indicate that an ordering is to be performed, according to finding, searching, query and retrieval means, said ordering by ordering metric to be applied in the order of specification of said additional part;

c. accepting zero or more additional parts of said first or next wisdom request command providing, in each part, an action to apply to said first form of result after completion of said specification for search, according to finding, searching, query and retrieval means, said action to apply selected from the group of:

i. navigating to a cntexxt based upon in a displayed view of said first form of result;

ii. presenting a list, area, portfolio, result set or other display of said first form of result holding identity indicators found in said search;

iii. allowing user to interact with said first form of result presented;

iv. submission of said first form of result to an analytic for invocation;

v. exporting said first form of result;

vi. storing said first form of result;

and vii. altering said co-location, flow, or other map to show said first form of result;

d. accepting, wherein user is allowed to interact with said first form of result presented in combination with indication to refine a search result by culling, zero or more additional parts of said first or next wisdom request command providing, in each part, an action to apply to said first form of result after completion of said search, according to finding, searching, query and retrieval means.

271. The method of claim 1 to also provide searching by executing stored instructions that perform operations to cause the computer system to locate wisdom sought, further including:

a. accepting a user search query during a phase of system use selected from the group:

i. during selection of a map definition to generate a map instance for use to select information selected from the group of:

01. a domain of wisdom;

02. output from a machine learning algorithm;

and 03. data of a certain security classification;

ii. during map definition by supplying fxxt specifications in the map definition to select information selected from the group of:

01. a domain of wisdom;

02. a version of data;

03. a specific version of output from a machine learning algorithm;

04. exemplar data;

05. data entered by a specific user demographic;

06. a subjective perspective;

and 07. a recommendation;

and iii. during use of a map instance to select information selected from the group of:

01. zero or more info-items;

02. zero or more external information resources;

03. zero or more cnxpts;

04. a knowledge gap at a time horizon of nine months;

05. a product gap at a time horizon of three years ;

06. tcepts available at a time horizon;

07. market segment value at a time horizon;

08. a non-existent concept a user has been thinking about;

09. a non-existent concept an investor wishes to invest in;

10. the competitive value of a product at a time horizon years into the future in terms of sales anticipated in a selected set of market segments given that the product will have specific features which satisfy the market segment requirements that may also be satisfied by competing products;

11. the relevant and admissible evidence of public corruption involved in a lawsuit, shone in the order useful to a defense presentation in an opening statement;

12. the product changes suggested to resolve TRIZ contradictions for a product planned for next year;

13. the set of historic concepts that a scholar should know well in a field of study including those concepts that are not yet resolved but will potentially change the nature of the field in many years into the future;

14. the answer to a set of symptoms for an obscure and model specific technical issue on a three year old computer that is of a product line that has been named the same for 30 years but has had a new design every six months;

15. the limit of knowledge regarding a sub-field of microbiology involved in a product liability lawsuit where a question regarding what the defendant was capable of considering at the time of the purported issue with the product that should have caused a recall;

16. the most recent and effective solutions to a home improvement issue;

17. products available to solve a home improvement issue properly;
18. the current portfolio value of a set of investments in technology by my venture capital group;
19. the 13 year future horizon projection of portfolio value of a set of investments in technology by my venture capital group given competitive pressures and changes in market requirements given new technologies;
20. how well a particular machine learning algorithm performs on a given set of data compared to seven other good performers and crowd wisdom;
21. what information coming in is planted misinformation; what are the disagreements currently in the crowd;
22. how does my opinion vary from others regarding the completion date of a project given my beliefs regarding requirements causing unplanned changes;
23. what is the collective opinion of the four law firm teams regarding the best order for presenting evidence during the trial given the responses by the defense;
24. how should are agency harmonize our classifications for tariffs with our trading partners in the area of automotive plastics to ensure that we aid the effort in responding to climate change;
25. how will our department do in product development in the next twenty years given the competitive strategy of the 37 regional competitors if we adopt this set of non-carbon releasing techniques;
26. how should our departments be set up to improve these product lines given the effectiveness of these team leads;
27. where am i in learning about the field of topology;
28. what is possible for altering this product over the next fifteen years given the changes in technologies just now being studied;
29. how different is my organization of my research compared to other doctoral students;
30. what are the seminal texts in this field and what are their teachings;
31. what are the apparent causes of this new malady given our data, suggestions, intuitions, beliefs, and wild guesses and how far away from the objective opinion is my perspective;
32. where are the inventors in this field going toward innovations that will lead to break-out products;
33. what are the success factors for the inventors in our company according to past developments and market acceptance;
and
34. what patents do we have that are competitive and what are their lineage and future directions;

whereby a large number of searches are available according to the degree of interaction and data collection available for the commonplace.

272. The method of claim 1 to also provide an understanding of where the understanding of each segment of a field of knowledge will cross over the line to become sheer science fiction and plain lack of knowledge, further including:

a. accepting a definition of a knowledge model comprising a set of one or more fxxts based on information stored regarding the field of knowledge, the information stored comprising a plurality of cnxpts and a plurality of associations, a plurality of cnxpts and a plurality of associations are marked with at least one fxxt of said set of one or more fxxts based on information stored regarding the field of knowledge;
b. accepting a map definition specifying use of said set of one or more fxxts based on information stored regarding the field of knowledge, the map definition specifying how the map instances generated from it will be organized, the organizing to be time ordered where a root of a tree in the forest of knowledge will have existed as a new understanding of those in the field at a point in the past and the leaves of the forest will be un-firm beliefs and showing no actual understanding, the root connected at each level to the leaves by apparent derivations to conceptual understandings within the fabric of the overall understanding of the field each having an estimate of the origination of the conceptual understanding;
c. generating, using said map definition, a map instance; and
d. accepting navigation toward the leaves of the forest, a wall displayed at a point selected from the group of:
   i. between the known and unknown displayed just beyond the concepts having no credence as actually being known and certainly not understood;
   ii. between information considered to be useful and information thought to be useless;
   iii. between information developed to a stated phase and information thought to be less developed than the requirements of the stated phase, the phase selected from the group of:
      01. patent issued;
      02. research paper published;
      03. research paper peer reviewed;
      04. topic discussed only as speculative;
      05. product planned using the concept;
      06. consensus opinion that the concept is valid;
      07. discussions of topic marked top secret compartmentalized;
      08. discussions of topic de-classified;
      09. technique reviewed but not allowed for use except in cases of last hope;
      and
      10. techniques fully accepted as standard practices;
   and
   iv. between information considered to be useful at a point in time and information for which an understanding by anyone did not occur until a point after the point in time;

whereby a definitive wall between the completeness of understanding at a level versus a lack of knowledge can be determined and presented to a user; and whereby a user can see what is in the box when told to think outside of the box regarding a field of understanding.

273. The method of claim 1 to present a map for associative searching, further including:

a. accepting a map definition wherein at least one hierarchical association between at least two cnxpts states a topic to sub-topic relationship between said at least two cnxpts causing an organization of a resulting map instance by subject matter;
b. forming a map instance from said map definition;
c. determining a first context in said map instance, the context represented by a first cnxpt;
d. presenting the positioned map instance to said user;
e. accepting a command to select, by navigation, a subsequent context based upon intent to access subject matter dissimilar to current subject matter, the subsequent context represented by a second cnxpt defined to represent the subject matter dissimilar to current subject matter;

wherein said similarity is defined according to the purpose of the map;

wherein the degree of dissimilarity is roughly proportional to the accumulated distance covered by the navigation from the current context to each subsequent context, each subsequent context an uncle, cousin, or sibling of the current context;

and f. focusing on the area of the map instance containing the context represented by the second cnxpt;

whereby a map representing a domain of wisdom may be used for associative searching wherein the conceptual content is co-located by its meaning.

274. The method of claim 1 to also provide for collaboratively working within a commonplace of information, further comprising:

a. establishing a commonplace and loading structural information defining a knowledge model for a domain of wisdom into computer storage;
b. providing an interface for users to view, navigate and enter commands to interface with said commonplace;
c. preparing, by at least one processor, at least one consensus organization of knowledge of said domain of wisdom from said commonplace according to utilize collective consensus through vote tallying means;
d. granting or rejecting access to said commonplace for a given type of interaction;
e. displaying a map instance to a user for initial viewing;
f. forming a connection with a person recently showing knowledge of concepts within a context represented by a cnxpt on a map instance, in one or more phases selected from the group of:
   i. connection opportunity offered;
   ii. connection requested;
   iii. selecting an object of wisdom to act upon;
   iv. requesting display of a result set for culling;
   v. requesting making contact with a listed person, project consortia, or organization;
   vi. requesting contact with at least one person knowledgable regarding a cnxpt representing a concept within a context represented, the cnxpt of said domain of wisdom;
   vii. scheduling participation;
   viii. stating an opinion;
   ix. stating that a connection between two cnxpts should exist;
   x. stating status of a task;
   xi. stating interest;
   xii. offering an incentive;
   xiii. offering a funding incentive;
   xiv. negotiating for deliverable acceptance;
   xv. negotiating for assignment;
   xvi. requesting display of a structural view of cntexxts based upon wisdom found;
   and
   xvii. requesting the navigating to a cntexxt based upon wisdom found;
   and
g. accepting and processing a user command and effecting changes therefrom, said user command selected from the group of:
   i. to view content of said commonplace;
   ii. to add or refine content of said commonplace and effect change;
   iii. to navigate around a visualization of said commonplace;
   and
   iv. to request a search for wisdom;

whereby said commonplace becomes a resource with a purpose suitable to said user based on the best available data at a time point as ideas are collected and an authorized user is able to see what is in said commonplace, adjust said commonplace data, and add to said commonplace new ideas.

275. The method of claim 1, to extract a derived ontology subset of the commonplace of information to provide a domain of wisdom basis for a map, further comprising:

a. detailing a map definition;
b. detailing zero or more fxxt specification steps defining a fxxt;
c. accepting from the map definition representing a knowledge model of a domain of wisdom a set of zero or more fxxt instances each fxxt having a coefficient indicating a proportionality of impact of the fxxt on any result of analysis regarding the map;
d. creating, a new empty named derived ontology to hold references to extracted instances and classes of info-item; said named derived ontology named by said new resultant fxxt by identity; said named derived ontology when filled to be comprised of a plurality of references to info-items, cnxpt instances and association instances among the plurality of cnxpt instances where each association includes a weight indicating a strength of the association instance, where each info-item instance including a weight indicating importance of the info-item instance of a type;
e. interpreting said map definition; further including:
   i. accepting for processing a definition of a first map listing zero or more fxxts stating sources of wisdom to be referenced as contents in the map;
   ii. resolving values for zero or more parameters for processing of said first map;
   iii. accepting for analysis, if said map definition lists any fxxt, a first specification step of a first fxxt instance defining tasks to perform for said first fxxt instance;
   iv. resolving, if said map definition lists no fxxt, a null fxxt identity;
   v. resolving, if said map definition lists any fxxt, values for zero or more parameters of said first specification step of said first fxxt instance;
   and
   vi. registering, if said map definition lists any fxxt, for proper later invocation zero or more fxxt specifications;
f. creating zero or more temporary derived ontologies, setting an accumulated contextual coefficient indicating proportionality of impact for each temporary derived ontology to a default value;
g. preparing for triggered processing for membership testing for info-items into said named derived ontology of the commonplace of information by interpreting a first specification step of a first fxxt instance listed on said map definition requires trigger-ability;
h. determining membership of an info-item reference in said named derived ontology of the commonplace of information where there are zero or more first fxxts specified on said map definition, by one or more observations before forest extraction is attempted, by detecting zero or more modes for fxxt specification processing by one or more observations;

i. producing into the resulting said named derived ontology by repeating until no classes remain in any temporary instance or class list, zero or more instances of classes of info-items of type;

j. merging into said named derived ontology the summarized references in every temporary derived ontology;

k. performing, prior to release of the resulting said named derived ontology to forest extraction and until no changes are made to the resulting said named derived ontology and a fxxt specification step of a fxxt listed on said map definition requires trigger-ability, triggered interpretation of each fxxt specification step of each such fxxt to determine, recursively, membership of an info-item in the resulting said named derived ontology;

l. invoking, if a fxxt specification step of a fxxt listed on said map definition requires trigger-ability, extraction of a forest on the resulting said named derived ontology;

m. annealing by triggering all trigger-able actions, repeatedly until no changes are made in the resulting said named derived ontology during a round of triggering;

n. annealing, upon completion of forest extraction, by triggering all trigger-able actions, repeatedly until no changes are made in the resulting said named derived ontology during a round of triggering;

and o. exposing the resulting said named derived ontology, as a data set.

276. The method of claim 1 to also provide generation of a map combining a precedence graph with a hierarchy forest where at least one cnxpt exists in both precedence and hierarchy, further comprising:

a. generating, for hierarchical force directed determination, affinitive association based positioning vectors;

b. rolling up, for precedence aspect force directed position determination, flow associations into flow roll-up precedence tensors to have an effect in positioning of forcing a cnxpt to be in a position relative to a predecessor on a map;

and c. generating, for map segment force directed position attractor determination, flow tensors based upon previously established map segmentations;

whereby tensors are created to force the ancestors of a cnxpt in a hierarchical presentation to be in positions; whereby tensors are created to force the predecessors of a cnxpt in a directed graph presentation to be in positions; whereby generating a map for a domain of wisdom structured as an organization of knowledge of cnxpts results in one or more forms from: a list, a hierarchical manner, a directed graph manner, or a structure comprising a combination thereof; whereby the form generated is based on information derived from the included cnxpts and the stated relationships among those cnxpts; whereby positional relationships between cnxpts are determined from associations of one or more of the types: hierarchical, flow, precedence, directed, undirected, and affinitive.

277. The method of claim 1 to also provide forest extraction for a map structure, wherein generating the hierarchical skeletal structure for a map definition comprises:

a. ordering into a queue the summarized directed associations of the derived ontology resulting from fxxt extraction by summarized directed association weight, highest weight implying least cost, greatest first, wherein each directed association has a first role considered to be a from role held by a first cnxpt and a second role considered to be a to role held by a second cnxpt, wherein the to role to from role directionality would represent a transitive concept relationship generally of a type selected from the group of: child to parent, sub category to super category, employee to employer, finish state to start state, dependent to independent, end to start point, succeeding to preceding, outcome to cause, sub-assembly to assembly, detail account to summary account, element to law, tactic to strategy, integer to claim, data set to data collection, class member to class, and leaf to root;

b. forming an empty skeletal structure to be filled with hierarchical tensors and singleton cnxpts;

c. filling the skeletal structure with all cnxpts extracted into a derived ontology for the map, as singletons;

d. examining, while the queue is not empty, each current front summarized directed association in the queue, the front association always having a highest weight of those in the queue, to utilize the highest weight associations in priority order in a minimal cost spanning forest algorithm, wherein;

i. designating the current front summarized directed association for consideration;

ii. adding, if the minimal cost spanning forest algorithm would utilize the current front summarized directed association as an edge in the spanning forest, a hierarchical tensor representing the current front summarized directed association into said skeletal structure;

and iii. removing the front summarized association from said queue;

whereby the summarized associations are used to form a spanning forest composed of hierarchical tensors between cnxpts.

278. The method of claim 1 to also provide determining of categorization quality of dissection for ingesting, further including:

a. updating the consensus organization of each comparison categorization from said commonplace augmented by all info-items generated from said plurality of members of a returned set of information each a source object suggesting a meaning according to utilize collective consensus through vote tallying means;

b. determining a proper placement of said dissection cnxpt in each said comparison categorization augmented by all info-items generated from said plurality of members of a returned set of information each a source object suggesting a meaning according to map generation means, wherein if a predetermined system setting is set to a first predetermined value said map generation does not alter the positioning of cnxpts existing before performing a search resulting in plurality of members of a returned set, wherein if a predetermined system setting is set to a second predetermined value said map generation does alter the positioning of cnxpts existing before performing a search resulting in plurality of members of a returned set;

c. determining a normalized relevance score for relevance of said dissection concept represented by a dissection cnxpt to each said basis cnxpt, from a predefined formula to compute a sum across all said comparison categorizations wherein a predetermined coefficient based upon the comparison categorization is multiplied against a factor determined from the distance in said comparison categorization of the placement of said dissection cnxpt against each basis cnxpt in a vicinity of a predetermined size from said dissection cnxpt, said relevance score is attached to said binding point info-item for each said derived source object suggesting a meaning for said dissection concept represented by a dissection cnxpt;

d. determining a cumulative relevance score for each said result set item info-item by summing all said relevance scores attached to said binding point info-items for each said derived source object suggesting a meaning stemming from said dissecting of said source object suggesting a meaning;

e. determining, optionally, a normalized value for each said cumulative relevance score for said result set;

f. assigning the order property of each created result set item info-item in said result set to a value converted from said relevance strength assigned wherein the most relevant rsxitems will be sorted to appear at the top of a result set display for culling;

g. making said result set active for culling by displaying result set in an editable format;

h. defining a map to be organized by a classification, wherein similar concepts are in closer proximity than dissimilar concepts;

i. generating a map instance for said map; and j. calculating quality corrections according to prediction correction mechanism.

279. The method of claim 1 to also provide constructing of a flow map, further including:

a. assigning a cnxpt pair to a flow by relating the cnxpt pair with a directed association, and performing a marking selected from the group of: marking the association as a flow of type, marking the association as a member of a fxxt usable as a source for flow associations in one or more map definitions, marking the cnxpts of the cnxpt pair as usable in a flow of type, and setting one or more trait trxrts for each cnxpt of the cnxpt pair with a meaning that the cnxpt is usable in a flow of type;

b. detailing a map definition specifying a resulting map to be a flow of type;

c. performing fxxt extraction, generating, using said map definition referencing the set of zero or more fxxts, a derived ontology for one or more domains of wisdom by extracting references to one or more associations and two or more cnxpts into the derived ontology;

d. generating, using said map definition, a flow specific derived ontology for the one or more domains of wisdom by reprocessing the associations processed during fxxt extraction to summarize only directed associations for the type of flow sought, including directed associations from fxxts designated before or during extraction as for the type of flow sought by the definition of said map, placing references to one or more summarized flow specific associations and two or more cnxpts into the flow specific derived ontology;

e. inverting, for the purpose of positioning cnxpts, depending upon the flow type and the directional orientation policy specified in said map definition, the sense of the association directionality for all hierarchical associations in the flow specific derived ontology;

f. generating structuring tensors, using said map definition policies, from the summarized hierarchical associations in the flow specific derived ontology, hierarchical tensors forming a skeletal structure for one or more organizations of knowledge for said one or more domains of wisdom wherein the resulting map skeletal structure of said map instance is organized into a descendant spanning forest and zero or more resulting structures selected from the group of: an enhanced descendent forest, an enhanced descendent forest with augmentation, an ascendant spanning forest, an enhanced ascendant forest, an enhanced ascendant forest with augmentation, a directed graph, and a graph;

g. determining, for each cnxpt in one or more of the cnxpt pairs related by a flow tensor in the spanning forest, the set of elastic surface representative fractional fragments indicated by the map policies and the properties of said cnxpt, if any, to set the strength weight and length of the flow tensor to indicate the policy driven approximate positioning for said cnxpt to be positioned in a fictitious elastic surface canvas for said flow;

h. determining from the policies of the map definition the basis for calculating roll-up, utilizing re-inverted sense or un-inverted generated hierarchical tensors from tree-extraction to prepare for roll-up to ensure that the root is considered as top and leaves are at the bottom logically;

i. generating flow roll-up tensors, and summary flow tensors with weights for enforcing the child cnxpt's anchoring location on said elastic surface of a fictitious elastic surface canvas during positioning on said map by anchoring a parent cnxpt to a representative fractional fragment of said fictitious elastic surface canvas based upon said child's anchoring location;

j generating positioning for domain of wisdom member cnxpts according to process trees for organization of knowledge generation, position determination and final sizing means for calculation, based upon policies stated in the map definition, wherein said positionings of said cnxpts of the cnxpt pairs related by a flow tensor are computed by tree of the forest, the tree placed into a representative fractional segment of said fictitious elastic surface canvas for initial computation only, each tree of said map according to information selected from the group of: the map definition, information associated with each cnxpt by trait or time frame or purlieu or property, and information derived from outside of said cnxpt;

k. determining, independently for each tree of the spanning forest, the canvas size of the segment of the representative fractional segment of said elastic surface needed to display the tree for each tree of the forest, the dimensionality of the canvas specified in the map definition, and assembling the segments; and l. providing to the user said one or more domains of wisdom for utilization;

whereby the ability is provided to place objects for a 2D, 3D, or 4D map in a position related to the ordering of said object directly or relative to the positioning of others in a flow; whereby generating an organization of knowledge or a visualization from a map utilizes a combination, calculated pairwise by unique cnxpt pair, of the weights of the associations that are marked by fxxts in the set of fxxts listed in the map definition; whereby determining the latent variables positioning the cnxpts of a domain of knowledge into a logically correct 2 to 4 dimensional diagram satisfying the subjective perspective of a user or the objective perspective of a crowd forms a presentation; whereby a cause independent Bayesian network with mechanisms ordered by strength to effect weak cause elimination may be drawn automatically.

280. The computer-implemented method of claim 279, further comprising:

a. extracting at least one cnxpt representing a state from which a decision determinative of a task initiation, at least one cnxpt representing a predecessor task, at least one cnxpt representing a successor task, and at least one association connecting said cnxpt representing a decision to said cnxpt representing said a predecessor task, and at least one association connecting said cnxpt representing said predecessor task to said cnxpt representing said successor task indicative of the conditional completion of the successor task, by fxxt extraction based upon consensus voting;
and b. depicting at least one predecessor task as a cnxpt in a flow graph organization of knowledge wherein said cnxpt is determinative of the completion of a successor task and the flow graph organization of knowledge is structured to place said predecessor task cnxpt earlier in the time aspect of the organization of knowledge of the map than said successor task cnxpt.

281. The method of claim 1 to also provide modeling on the basis of one or more maps and one or more modeling rules, further including:

a. accepting a set of one or more modeling rules;

b. creating an empty first derived ontology;

c. determining the nature of each modeling rule to plan model execution, the nature selected from the group of:

i. rules that determine whether a cnxpt or an association should or should not be in said first derived ontology;

ii. rules that invoke an algorithm or analytic;

iii. rules that are held in a property of a cnxpt and are intended to be interpreted before or during map generation;

iv. rules that determine a value of a property of a cnxpt or an association that could affect the skeletal structuring of a map being generated from said first derived ontology;

v. rules that determine whether an association should or should not be used in the skeletal structure of a map to be generated from said first derived ontology;

vi. rules that depend upon results of generating forests but not later steps of map generation;

vii. rules that determine a value of a property of a cnxpt or an association that could affect the positioning of a map being generated from said first derived ontology and that must be applied prior to roll-ups;

viii. rules that determine a value of a property of a cnxpt or an association that could affect the positioning of a map being generated from said first derived ontology and that must be applied during roll-ups;

ix. rules that determine a value of a property of a cnxpt or an association that could affect the positioning of a map being generated from said first derived ontology and that must be applied after roll-ups;

x. rules that could affect the positioning of info-items on a map being generated from said first derived ontology and that must be applied during positioning;

xi. rules that depend upon results of positioning but not later steps in map generation;

xii. rules that affect positioning after map completion;

xiii. rules that affect a value of a property of a cnxpt or an association but do not depend upon positioning of cnxpts;

xiv. rules not considered in positioning process;

xv. rules associated with a cnxpt depending upon its display positioning;

xvi. rules associated with an association depending upon its display positioning;

xvii. rules affecting a target cnxpt depending upon the logical positioning of the target cnxpt relative to a base cnxpt, the position of the target cnxpt relative to the base cnxpt selected from the group of: sibling, uncle, parent, child, neighbor, first child, last child, all children, all parents, all siblings, all children of primary parent, all children of particular parent, all other children of primary parent, all other children of particular parent, all neighbors within a particular distance sub-tree, ancestor, descendant, in-bound adjacent neighbor, out-bound adjacent neighbor, in-flow adjacent neighbor, out-flow adjacent neighbor, root, leaf of particular subtree, cousin, secondary parent, root of different tree, senior root of forest, just prior cnxpt in breadth-first walk, next cnxpt in breadth-first walk, just prior cnxpt in level-order walk, next cnxpt in level-order walk, just prior cnxpt in pre-order walk, next cnxpt in pre-order walk, just prior cnxpt in post-order walk, next cnxpt in post-order walk, just prior cnxpt in in-order walk, next cnxpt in in-order walk, just prior cnxpt in depth-first walk, next cnxpt in depth-first walk, member of identified area, member of area occupied by base but not including base, member of identified area other than base, same cnxpt present in different tree, same cnxpt present in different map, different cnxpt present in same tree and directly related by association, different cnxpt present in different tree but directly related by association, different cnxpt present in different map but directly related by association;

xviii. rules affecting a target association depending upon the logical positioning of the target association relative to a base cnxpt;

xix. rules calculating a value of a property of a cnxpt;

xx. cell rules defined for all members of a cnxpt class calculating a value of a property of a cnxpt instance based upon a formula specified for the property in the cnxpt class that the cnxpt is an instance of;

xxi. cell rules defined for a cnxpt instance calculating a value of a property of the cnxpt instance based upon a formula specified for the property in the cnxpt instance;

xxii. rules calculating a value of a property of an association;

xxiii. cell rules defined for all members of an association class calculating a value of a property of an association instance based upon a formula specified for the property in an association class that the association is an instance of;

xxiv. cell rules defined for an association instance calculating a value of a property of the association instance based upon a formula specified for the property in the association instance;

xxv. rules for determining an area comprising zero or more cnxpts and zero or more associations having one or more of said zero or more cnxpts in a role, where specified further rules are to be applied;

xxvi. rules determining inclusion of a cnxpt into an area based upon a characteristic of the cnxpt;

xxvii. rules affecting a cnxpt in an area;

xxviii. rules determining exclusion of a cnxpt from an area based upon a characteristic of the cnxpt;

xxix. rules controlling a filter determining visibility of a cnxpt from an area based upon a characteristic of the cnxpt;

xxx. rules controlling a filter determining visibility of a cnxpt based upon a characteristic of the cnxpt;

xxxi. rules that are held in a property of a cnxpt and are intended to be interpreted after map generation; and xxxii. rules that affect display of an info-item;

d. executing one or more cnxpt sub-setting operation selected from the group of: a query yielding a result set of zero or more cnxpts, a query yielding a result set of zero or more associations and the cnxpts having roles on the zero or more associations, a map holding a result set of zero or more cnxpts and zero or more associations, a reduction, an existing derived ontology, a fxxt extraction, a flow extraction, execution of an analytic, a result set of zero or more cnxpts, an area having zero or more cnxpts, a result set of zero or more associations and the cnxpts having roles on the zero or more associations, selection of a data set, selection of a portfolio, selection of a uniquely identified categorization, selection of a uniquely identified clump extract set, a filter application, a user ad hoc selection set of zero or more associations and the cnxpts having roles on the zero or more associations, and a user ad hoc selection set of zero or more cnxpts; to obtain a set of cnxpts and associations in a first derived ontology resulting from said sub-setting operation;

e. executing all rules that determine whether a cnxpt or an association should or should not be in said first derived ontology;

f. executing all rules that determine a value of a property of a cnxpt or an association that could affect the skeletal structuring of a map being generated from said first derived ontology;

g. extracting a descendent tree forest from said first derived ontology according to fxxt basic descendant spanning tree extraction means while utilizing modeling rules that determine whether an association should or should not be used in the skeletal structure of a map to be generated from said first derived ontology;

h. executing production of enhanced descendent forest, basic ascending forest, and enhanced ascending forest using the descendant spanning forest and said first derived ontology;

i. executing all rules that depend upon results of generating forests but not later steps of map generation;

j. executing all rules that determine a value of a property of a cnxpt or an association that could affect the positioning of a map being generated from said first derived ontology and that must be applied prior to roll-ups;

k. executing roll-ups on the generated forests while executing rules that determine a value of a property of a cnxpt or an association that could affect the positioning of a map being generated from said first derived ontology and that must be applied during roll-ups;

l. executing all rules that determine a value of a property of a cnxpt or an association that could affect the positioning of a map being generated from said first derived ontology and that must be applied after roll-ups;

m. executing positioning on the generated forests after roll-ups, utilizing all rules that could affect the positioning of info-items on a map being generated from said first derived ontology and that must be applied during positioning, according to process trees for visualization generation, position determination and final sizing means;

n. executing all rules that depend upon results of positioning but not later steps in map generation;

o. determining efficient derivation trees from each rule of a type selected from the group of: the set of modeling rules that are defined for the model, the properties defined by formulas of each cnxpt class, and the properties defined by formulas of each cnxpt instance; to trigger activation of a rule when an event of type occurs, the event type selected from the group of: a rule input changes, an input of a property formula changes, the object set to which a rule would apply changes, an event that would cause the output of a rule to change, an iterative loop cycle begins, a termination condition on an iterative loop has occurred, and a termination of rule activation occurs because no rule should be triggered;

p. interpreting modeling rules iteratively based upon the derivation trees, the modeling rules selected from the group of:

i. rules that invoke an algorithm or analytic;

ii. rules that affect positioning after map completion;

iii. rules that affect a value of a property of a cnxpt or an association but do not depend upon positioning of cnxpts;

iv. rules not considered in positioning process;

v. rules associated with a cnxpt depending upon its display positioning;

vi. rules associated with an association depending upon its display positioning;

vii. rules affecting a target cnxpt depending upon the logical positioning of the target cnxpt relative to a base cnxpt, the position of the target cnxpt relative to the base cnxpt selected from the group of: sibling, uncle, parent, child, neighbor, first child, last child, all children, all parents, all siblings, all children of primary parent, all children of particular parent, all other children of primary parent, all other children of particular parent, all neighbors within a particular distance sub-tree, ancestor, descendant, in-bound adjacent neighbor, out-bound adjacent neighbor, in-flow adjacent neighbor, out-flow adjacent neighbor, root, leaf of particular subtree, cousin, secondary parent, root of different tree, senior root of forest, just prior cnxpt in breadth-first walk, next cnxpt in breadth-first walk, just prior cnxpt in level-order walk, next cnxpt in level-order walk, just prior cnxpt in pre-order walk, next cnxpt in pre-order walk, just prior cnxpt in post-order walk, next cnxpt in post-order walk, just prior cnxpt in in-order walk, next cnxpt in in-order walk, just prior cnxpt in depth-first walk, next cnxpt in depth-first walk, member of identified area, member of area occupied by base but not including base, member of identified area other than base, same cnxpt present in different tree, same cnxpt present in different map, different cnxpt present in same tree and directly related by association, different cnxpt present in different tree but directly related by association, different cnxpt present in different map but directly related by association;

viii. rules affecting a target association depending upon the logical positioning of the target association relative to a base cnxpt;

ix. rules calculating a value of a property of a cnxpt;

x. cell rules defined for all members of a cnxpt class calculating a value of a property of a cnxpt instance based upon a formula specified for the property in the cnxpt class that the cnxpt is an instance of;

xi. cell rules defined for a cnxpt instance calculating a value of a property of the cnxpt instance based upon a formula specified for the property in the cnxpt instance;

xii. rules calculating a value of a property of an association;

xiii. cell rules defined for all members of an association class calculating a value of a property of an association instance based upon a formula specified for the property in an association class that the association is an instance of;

xiv. cell rules defined for an association instance calculating a value of a property of the association instance based upon a formula specified for the property in the association instance;

xv. rules for determining an area comprising zero or more cnxpts and zero or more associations having one or more of said zero or more cnxpts in a role, where specified further rules are to be applied;

xvi. rules determining inclusion of a cnxpt into an area based upon a characteristic of the cnxpt;

xvii. rules affecting a cnxpt in an area;

xviii. rules determining exclusion of a cnxpt from an area based upon a characteristic of the cnxpt;

xix. rules controlling a filter determining visibility of a cnxpt from an area based upon a characteristic of the cnxpt;

xx. rules controlling a filter determining visibility of a cnxpt based upon a characteristic of the cnxpt;

xxi. rules that are held in a property of a cnxpt and are intended to be interpreted after map generation; and xxii. rules that affect display of an info-item; and q. returning control to the supervising process while monitoring for triggering due to a change of data or organization of info-items;

whereby efficient modeling including interpretation of cell-like formulas for properties of cnxpts is performed.

282. The method of claim 1 to also provide for crystalizing meaning of cnxpts with scant documentation, further comprising:

a. distilling by suppressing overlapping information regarding a first cnxpt to automatically crystalize the essence of the concept represented by the first cnxpt in a generated map wherein the first cnxpt is classified as a sub-type of an ancestor concept represented by a second cnxpt, wherein:

i. acting on subject identifiers of the first cnxpt where the identifier contents overlap the contents of an identifier of the ancestor concept represented by a second cnxpt and the overlap is identifiable and separable, by trimming the identifiable overlapping information by suppressing it for the map, the subject identifiers selected from the group of:

01. subject identifier occurrence relationships from the first cnxpt to a txo indicating that the topic represented by the txo is relevant to and somewhat identifies the subject represented by the referencing first cnxpt and also a subject identifier occurrence relationship of the same sign exists from the second cnxpt to the same txo indicating that the topic represented by the txo is relevant to and somewhat identifies the subject represented by the referencing second cnxpt in the map;

02. subject identifier occurrence relationships from the first cnxpt to a txo indicating that the topic represented by the txo is relevant to and identifies the subject represented by the referencing first cnxpt to a positive degree less than the degree of a subject identifier occurrence relationship existing from the second cnxpt to the same txo indicating that the topic represented by the txo is relevant to and somewhat identifies the subject represented by the referencing second cnxpt in the map;

03. subject identifier occurrence relationships from the first cnxpt to a txo indicating that the topic represented by the txo is clearly not relevant to and distinguishes the subject represented by the referencing first cnxpt as shown by a negative degree and the degree is less negative than that of a subject identifier occurrence relationship existing from the second cnxpt to the same txo indicating that the topic represented by the txo is clearly not relevant to and distinguishes the subject represented by the referencing second cnxpt in the map;

04. associations from the first cnxpt to a txo indicating that the topic represented by the txo is relevant to and somewhat identifies the subject represented by the referencing first cnxpt and also an association of the same direction exists from the second cnxpt to the same txo indicating that the topic represented by the txo is relevant to and somewhat identifies the subject represented by the referencing second cnxpt in the map;

05. associations from the first cnxpt to the second cnxpt identified after the final stage of map generation as they have been replaced by the tensors used for forming the skeletal structure, but only suppressing them where the association is to be utilized as all or a part of a subject identifier in the map;

06. a result set item entry in a result set used as a subject identifier of the first cnxpt, whether from a query or a result of culling, the result set item also appearing in a result set used as a subject identifier of the ancestor concept represented by the second cnxpt in the map;

07. a first descriptive phrase of the subject description of the first cnxpt where the phrase is the same as a descriptive phrase of the subject description of the ancestor concept represented by a second cnxpt, by suppressing the use of the descriptive phrase in the subject description of the first cnxpt in the map;

08. a search query used as a subject identifier of the first cnxpt, the query having a scope that would sweep up the same results as a search query used as a subject identifier of the ancestor concept represented by the second cnxpt, by suppressing the results produced in common with the query of the second cnxpt in the map; and 09. a keyword associated with the first cnxpt and also with the second cnxpt indicating that the topic represented by the keyword is relevant to and somewhat identifies the subject represented by the first cnxpt and the second cnxpt in the map;

and ii. determining that there is information of a comparable form that is associated with the first cnxpt that is also associated with a second cnxpt, the information of a comparable form selected from the group of:

01. a first trait of the first cnxpt, the trait having a first value, where the first trait value is close to the trait value of the same trait of the ancestor concept represented by a second cnxpt, by suppressing the use of the first trait of the first cnxpt where it is utilized as all or a part of a subject identifier in the map;

02. a first element trait of the first cnxpt, the element trait stating an element of a rule of applicability or one of a set of facts that must all be proven, where the first element trait value is the same as an element trait of the ancestor concept represented by a second cnxpt, by suppressing the use of the first element trait of the first cnxpt where it is utilized as all or a part of a subject identifier in the map;

03. a first TRIZ principle challenge trait value of the first cnxpt, the TRIZ principle challenge trait stating as a value one specific contradiction found applicable to the first cnxpt within a pattern of observed technical contradictions in design, where the first TRIZ principle challenge trait value is the same as a TRIZ principle challenge trait value of the ancestor concept represented by a second cnxpt, by suppressing the use of the first TRIZ principle challenge trait value of the first cnxpt where it is utilized as all or a part of a subject identifier in the map;

04. a first TRIZ principle trait value of the first cnxpt, the TRIZ principle trait stating as a value one desired answer to an observed technical contradiction in design seen applicable to the first cnxpt, where the first TRIZ principle trait value is the same as a TRIZ principle trait value of the ancestor concept represented by a second cnxpt, by suppressing the use of the first TRIZ principle trait value of the first cnxpt where it is utilized as all or a part of a subject identifier in the map;

05. a first product feature trait of the first cnxpt, the product feature trait having a first value, where the first product feature trait value is very similar to the product feature trait value of the same product feature trait of the ancestor concept represented by a second cnxpt, by suppressing the use of the first product feature trait of the first cnxpt where it is utilized as all or a part of a subject identifier in the map;

06. a first market area trait of the first cnxpt, the market area trait having a first value, where the first market area trait value is very similar to the market area trait value of the same market area trait of the ancestor concept represented by a second cnxpt, by suppressing the use of the first market area trait of the first cnxpt where it is utilized as all or a part of a subject identifier in the map;

and 07. a first vote agreeing generally to the subject of the first cnxpt where the first vote states as scope of agreement to the subject essentially the same scope as given in a vote agreeing to the subject of the ancestor concept represented by a second cnxpt, by suppressing the use of the first vote for the first cnxpt where the vote is utilized as all or a part of a subject identifier in the map;

whereby a cnxpt may be seen more readily as differentiated from its ancestors.

283. The method of claim 1 to also provide generation of a map combining a precedence graph with a hierarchy forest where at least one cnxpt exists in both precedence and hierarchy, further comprising:

a. generating, for hierarchical force directed determination, affinitive association based positioning vectors from all rolled up summarized affinitive associations having endpoints at different depths in the extracted spanning forest, the rolled up associations selected from the group of: uncle roll-up associations, and cousin roll-up associations; to yield zero or more tensors selected from the group of: to-uncle attractor tensors, and between-sibling-ring attractor tensors;

b. rolling up, for precedence aspect force directed position determination, precedence-basis flow indicating hierarchical association relationships with a marking selected from the group of: dependency, process flow, causality, surrogate causality, conditioned-upon, precedence, and surrogate associations each between a surrogate first cnxpt representing a fixed point of a timing precedence constraint to a second cnxpt; into flow roll-up precedence tensors to have an effect in positioning of forcing a cnxpt to be in a position relative to a predecessor on a map, the flow roll-up precedence tensors selected from the group of: flow between-sibling-ring attractor tensors, and flow to-uncle attractor tensors;

and c. generating, for map segment force directed position attractor determination, zero or more flow tensors each from a cnxpt to a flow aspect position, the flow tensor based upon a constraint selected from the group of: a previously established map segmentation, a map segment centroid position, a process flow line, a map edge, a position established for a senior precedence cnxpt or surrogate cnxpt, a hierarchical flow tensor for an earliest or senior precedence cnxpt or surrogate cnxpt;

whereby tensors are created to force the ancestors of a cnxpt in a hierarchical presentation to be in positions; whereby tensors are created to force the predecessors of a cnxpt in a directed graph presentation to be in positions; whereby generating a map for a domain of wisdom structured as an organization of knowledge of cnxpts results in one or more forms from: a list, a hierarchical manner, a directed graph manner, or a structure comprising a combination thereof; whereby the form generated is based on information derived from the included cnxpts and the stated relationships among those cnxpts;

whereby positional relationships between cnxpts are determined from associations of one or more of the types: hierarchical, flow, precedence, directed, undirected, and affinitive.

284. The method of claim 1 to also provide ensembling of machine learning results, with tuning by comparison to exemplar, further including:

a. combining relationships found between conceptual objects by a plurality of machine learning algorithms into a map generation utilizing fxxt marking to encapsulate the machine learning results, wherein:
i. define a map to utilize the set of fxxts;
ii. assigning to each first fxxt a weighting coefficient indicating a proportionality of impact of said first fxxt to allow for prioritization of the information in one fxxt over another;
iii. marking the results of each machine learning algorithm with a different fxxt identity;
iv. assigning as admixture coefficients a weighting coefficient indicating a proportionality of impact to each machine learning result fxxt in the map definition;
and
v. summing the information in various fxxts as adjusted by the weighting coefficient indicating a proportionality of impact for each fxxt so that, for any hierarchical association between the same two cnxpts a single representative hierarchical association is obtained, and so that, after map structuring, for any association between the same two cnxpts a single representative affinitive association is obtained and a single value of each property of each cnxpt is obtained;
b. performing a comparison a regression to determine the best admixture weighting by comparing for best quality against an exemplar, the exemplar source selected from the group of: crafted by hand, obtained from a reliable method, determined from a harmonization of crowd beliefs, and obtained by adversarial testing;

whereby a unified ensembling structure is provided for combining machine learning results using admixture coefficients to generate maps.

285. The method of claim 1 to also provide to a user a recommendation stating the most important concept in a context to view next in a conceptual hierarchy by highlighting strength of recommendation by increased size, the recommendation updated, further including:
a. accepting a definition of a knowledge model comprising a set of one or more fxxts based on information stored regarding at least the concept relating to the context, the information stored comprising one or more cnxpts and zero or more associations, the information in at least one fxxt stemming from votes of users;
b. accepting a map definition specifying use of said set of zero or more fxxts based on information stored regarding at least the concept relating to the context, to create a map instance of type selected from the group of: tree, decision tree, forest, and Bayesian network; or other hierarchical organization of knowledge;
c. generating, using said map definition, a map instance, the generation causing positioning of concepts represented by cnxpts based upon strongest hierarchical associations and importance of concepts, the importance calculation based upon the strength of recommendation, each context represented by a cntexxt also represented by a cnxpt and positioned;
d. accepting navigation by the user from the root of the hierarchy, the user being presented with a set of cnxpts when entering a context represented by a cntexxt, the highest strength recommendation of the cnxpts in the context consuming more space of the context and larger than less strongly recommended cnxpts in the context, the navigation in a mode selected from the group of: data set, and visualization;
e. accepting user interaction and voting on the map instance, the interest shone and the voting stored into the commonplace and accessible through a fxxt referenced in the map definition;
and
f. generating a new map instance from the map definition upon demand;

whereby the map provides a user with a recommendation of what concept to view in each context around a concept by displaying more strongly recommended concepts larger than others.

286. The method of claim 1 to also provide to a user a recommendation stating the most important concept in a context to view next in a conceptual hierarchy by highlighting strength of recommendation by increased size, the recommendation updated, further including:
a. accepting a definition of a knowledge model comprising a set of one or more fxxts based on information stored regarding at least the concept relating to the context, the information stored comprising one or more cnxpts and zero or more associations, the information in at least one more heavily weighted fxxt stemming from interest shone and votes of the user;
b. accepting a map definition specifying use of said set of zero or more fxxts based on information stored regarding at least the concept relating to the context, to create a map instance of type selected from the group of: tree, decision tree, forest, and Bayesian network; or other hierarchical organization of knowledge;
c. generating, using said map definition, a map instance, the generation causing positioning of concepts represented by cnxpts based upon strongest hierarchical associations and importance of concepts, the importance calculation based upon the strength of recommendation, each context represented by a cntexxt also represented by a cnxpt and positioned;
d. accepting navigation by the user from the root of the hierarchy, the user being presented with a set of cnxpts when entering a context represented by a cntexxt, the highest strength recommendation of the cnxpts in the context consuming more space of the context and larger than less strongly recommended cnxpts in the context, the navigation in a mode selected from the group of: data set, and visualization;
e. accepting user interaction and voting from the user on the map instance, the interest shone by the user and the voting by the user stored into the commonplace and accessible through a fxxt referenced in the map definition;
and
f. generating a new map instance from the map definition upon demand;

whereby the map provides a user with a recommendation of what concept to view in each context around a concept by displaying more strongly recommended concepts larger than others, where the interest shone and voting by the user are taken into consideration more strongly than that of other users.

287. The method of claim 1, to ensemble machine learning results with crowd sourced information, further including:
a. combining relationships found between conceptual objects by a plurality of machine learning algorithms as well as by a crowd into a map definition utilizing fxxt marking to encapsulate the results by source, wherein:
i. define a map to utilize the set of fxxts;

ii. marking the data from user votes or other sources with distinct fxxt identities;

iii. marking the results of each machine learning algorithm with a different, distinct fxxt identity;

iv. assigning as admixture coefficients a weighting coefficient indicating a proportionality of impact to each fxxt in the map definition to allow for prioritization of the information in one fxxt over another;

v. summing the information in various fxxts as adjusted by the weighting coefficient indicating a proportionality of impact for each fxxt so that, for any hierarchical association between the same two cnxpts a single representative hierarchical association is obtained, and so that, after map structuring, for any association between the same two cnxpts a single representative affinitive association is obtained and a single value of each property of each cnxpt is obtained;

vi. generating a map instance from the map definition;

vii. accepting additional user voting;

viii. storing user votes;

and ix. utilizing user votes upon later instantiation of said map;

whereby a unified ensembling structure is provided for combining machine learning results and crowd wisdom using admixture coefficients to generate maps.

288. The method of claim 1 to also provide controlled combination of sparse data of various qualities and sources to obtain modeling results by use of fxxts in ensemble, further including:

a. combining relationships found between conceptual objects by a plurality of sources selected from the group of: machine learning algorithms, a crowd, public sources, private sources, and historic data; into a map definition utilizing fxxt marking to encapsulate the results by source, the types of relationships represented by associations which are to some degree correlated to a needed relationship in a model, using some relationships that would be discarded if better information was available, wherein:

i. define a map to utilize the set of fxxts;

ii. marking the data from different batches and sources with distinct fxxt identities;

iii. marking each batch of results of each machine learning algorithm with a different, distinct fxxt identity;

iv. assigning as admixture coefficients a weighting coefficient indicating a proportionality of impact to each fxxt in the map definition to allow for prioritization of the information in one fxxt over another;

v. summing the information in various fxxts as adjusted by the weighting coefficient indicating a proportionality of impact for each fxxt so that, for any hierarchical association between the same two cnxpts a single representative hierarchical association is obtained, and so that, after map structuring, for any association between the same two cnxpts a single representative affinitive association is obtained and a single value of each property of each cnxpt is obtained;

vi. generating a map instance from the map definition;

vii. obtaining modeling results based upon the map;

viii. accepting and storing additional user voting;

ix. accepting and storing additional data from other sources, replacing superseded data;

and x. utilizing improved data upon later instantiation of said map;

whereby the technique improves the norm where decisions regarding the future are based upon wild guesses; whereby the technique allows use of assumptions to improve the norm where any guess is better than no guess for priors in a Bayesian model; whereby sparse data causes an inability to connect the dots, resulting in disjointed forests of trees if just the assured relationships are used; whereby the technique improves the norm where available input numbers are often sparse due to the cost, time lost, poor modeling, and fear that more data is needed that slow obtainment; whereby use of a surrogate relationship between concepts that runs roughly like a needed relationship that is sparse will give better results than no data; whereby use of a surrogate relationship, that is itself sparse, between concepts that runs roughly like a needed relationship that is also sparse will give better results than no data; whereby data is sparse for new concepts, but in most cases the new concept is a little like an older concept which can serve its analogous data to fill in what is needed for the new concept; whereby for data anticipated to be of high-dimensionality sparse data may have lower dimensionality; whereby a market segment may be well defined and its sub-segments known, so that the requirements of each market would be known for the present and past horizons, but the segments and requirements for a future of 50 years would be difficult to obtain, yet the use of the present numbers as a well understood surrogate for the 20 year horizon would be considered reasonable, yet sparse; whereby projecting into the future requires the reliance on sparse data, but over time that sparse data will be filled out and the same modeling equations will produce better results, such that a prediction of a ten year horizon will improve when re-predicted in five years because the five years will see the improvement in the sparse data used;

whereby intelligence makes use of these sorts of meta-facts because the veracity of their information is always suspect; and whereby use of sparse data encapsulated by a fxxt can more effectively be managed.

289. The method of claim 1 to also provide controlled combinations of replacement information to fill in for data elements that are missing or deficient to obtain modeling results by use of fxxts in ensemble, with improvement, further including:

a. incorporating surrogate data into a map, wherein:

i. marking by zero or more first surrogate fxxts a set of first surrogate relationships represented by first surrogate associations between cnxpts, the cnxpts referenced by the roles of the first surrogate associations, the surrogate relationships merely of a similar nature to relationship data seen as the appropriate data needed for a map, the appropriate data in a set of first base fxxts, the appropriate data deficient for one or more reasons selected from the group of: missing, sparse, partially available, noisy, of low veracity, preliminary estimates, only wildly guessed, available for only an incomplete range of a demographic, available for only an incomplete range of type, and available for only an incomplete dimensionality;

ii. marking by zero or more second surrogate fxxts a set of concepts represented by first surrogate cnxpts, the surrogate cnxpts merely of a similar nature to concept data seen as the appropriate data needed for a map, the appropriate data in a set of second base fxxts, the appropriate data deficient for one or more reasons selected from the group of: missing, sparse, partially available, noisy, of low veracity, preliminary estimates, only wildly guessed, available for only an incomplete range of a demographic, and available for only an incomplete range of type;

iii. marking by zero or more third surrogate fxxts a set of surrogate info-items, the surrogate info-items merely of a similar nature to data seen as the appropriate data needed for a map, the appropriate data in a set of third base fxxts, the appropriate data deficient for one or more reasons selected from the group of: missing, sparse, partially available, noisy, of low veracity, preliminary estimates, only wildly guessed, available for only an incomplete range of a demographic, and available for only an incomplete range of type;

iv. marking by zero or more fourth surrogate fxxts a set of surrogate values, the surrogate values merely of a similar nature to data seen as the appropriate data needed for a map, the appropriate data in a set of fourth base fxxts, the appropriate data deficient for one or more reasons selected from the group of: missing, sparse, partially available, noisy, of low veracity, preliminary estimates, only wildly guessed, available for only an incomplete range of a demographic, available for only an incomplete range of type, and available for only an incomplete dimensionality;

v. marking each batch of results of each machine learning algorithm with a different, distinct fxxt identity;

and vi. accepting a map definition combining relationships found between conceptual objects by a plurality of sources selected from the group of: surrogate fxxts, base fxxts, machine learning algorithms, a crowd, votes of the user, public sources, private sources, and historic data; into a map definition utilizing fxxt marking to encapsulate the results by source, using surrogate data that would be discarded if better information was available, the map definition referencing said first surrogate fxxts, said second surrogate fxxts, said third surrogate fxxts, said fourth surrogate fxxts, said first base fxxts, said second base fxxts, said third base fxxts, and said fourth base fxxts, and assigning as admixture coefficients a weighting coefficient indicating a proportionality of impact to each fxxt in the map definition to allow for prioritization of the information in one fxxt over another, assigning to each surrogate fxxt a coefficient indicating a proportionality of impact of the fxxt on any result of analysis, the surrogate coefficient indicating a proportionality of impact of the fxxt on any result of analysis less than the coefficient indicating a proportionality of impact of the fxxt on any result of analysis of the corresponding base fxxt, the difference in coefficients greater where the base data is of better quality, and lower where the base data has more deficiencies;

b. generating a map instance from the map definition; wherein:

i. performing fxxt extraction, forming a union of the information in various fxxts and then summarizing the information as adjusted by the weighting coefficient indicating a proportionality of impact for each fxxt so that, for any hierarchical association between the same two cnxpts a single representative hierarchical association is obtained, and so that, after map structuring, for any association between the same two cnxpts a single representative affinitive association is obtained and a single value of each property of each cnxpt is obtained; generating, using said map definition referencing the set of zero or more fxxts, a derived ontology for one or more domains of wisdom by extracting references to one or more associations and two or more cnxpts into the derived ontology;

ii. generating structuring tensors, using said map definition policies, from the summarized hierarchical associations in the derived ontology, hierarchical tensors forming a skeletal structure for one or more organizations of knowledge for said one or more domains of wisdom wherein the resulting map skeletal structure of said map instance is organized into a descendant spanning forest and zero or more resulting structures selected from the group of: an enhanced descendent forest, an enhanced descendent forest with augmentation, an ascendant spanning forest, an enhanced ascendant forest, an enhanced ascendant forest with augmentation, a directed graph, and a graph;

iii. determining, the policy driven approximate positioning for cnxpts;

iv. determining from the policies of the map definition the basis for calculating roll-ups;

v. generating roll-up tensors, and summary tensors;

vi. generating positioning for domain of wisdom member cnxpts according to process trees for organization of knowledge generation, position determination and final sizing means for calculation, based upon policies stated in the map definition;

vii. determining canvas sizes based upon the map definition, and assembling the segments;

c. obtaining modeling results based upon the map;

d. providing to the user said one or more domains of wisdom for utilization;

e. accepting and storing additional user voting;

f. accepting and storing additional data from other sources, replacing superseded and unneeded surrogate data, changing fxxt specifications of the map definition as needed;

and g. utilizing improved data upon later instantiation of the map definition;

whereby the technique improves the work flow of generating and updating models, allowing the user to use surrogate data in place of final data, to control use of versions of data, to retain supervision votes in a controlled, versioned manner, to ensemble data from various sources in an admixture structure, and using wild guesses regarding the future;

whereby the technique improves the norm where decisions regarding the future are based upon wild guesses; whereby the technique allows use of assumptions to improve the norm where any guess is better than no guess for priors in a Bayesian model; whereby sparse data causes an inability to connect the dots, resulting in disjointed forests of trees if just the assured relationships are used; whereby the technique improves the norm where available input numbers are often sparse due to the cost, time lost, poor modeling, and fear that more data is needed that slow obtainment; whereby use of a surrogate relationship between concepts that runs roughly like a needed relationship that is sparse will give better results than no data; whereby use of a surrogate relationship, that is itself sparse, between concepts that runs roughly like a needed relationship that is also sparse will give better results than no data; whereby data is sparse for new concepts, but in most cases the new concept is a little like an older concept which can serve its analogous data to fill in what is needed for the new concept; whereby for data anticipated to be of high-dimensionality sparse data may have lower dimensionality; whereby a market segment may be well defined and its sub-segments known, so that the requirements of each market would be known for the present and past horizons, but the segments and requirements for a future of 50 years would be difficult to obtain, yet the use of the present numbers as a well understood surrogate for the 20 year horizon would be considered reasonable, yet sparse; whereby projecting into the future requires the reliance on sparse data, but over time that sparse data will be filled out and the same modeling equations will produce better results, such that a prediction of a ten year horizon will improve when re-predicted in five years because the five years will see the improvement in the sparse data used; whereby intelligence makes use of these sorts of meta-facts because the veracity of their information is always suspect; and whereby use of sparse data encapsulated by a fxxt can more effectively be managed.

290. The method of claim 1 to also find values of positioning latent variables of meaning in subjective perspective in multi-concept organization in a specific use case, further including:

a. accepting a map definition from a user including specifying at least one fxxt holding votes entered by said user, said fxxt given a non-zero weighting coefficient indicating a proportionality of impact sufficient to cause the votes of the user to be influential on the resulting positions of at least one info-item;

b. generating a map instance from said map definition according to map generation means, wherein:

i. extracting at least one consensus organization of knowledge of at least one domain of wisdom from said commonplace according to utilize collective consensus through vote tallying means, wherein said organization of knowledge of at least one domain of wisdom includes information from said at least one fxxt holding votes entered by said user;

ii. generating, using said map definition specifying at least one fxxt holding votes entered by said user, a skeletal structure for a map instance for said one or more domains of wisdom from the extracted derived ontology wherein the resulting map skeletal structure of said map instance is based upon a manner of analysis selected from the group of: a spanning forest manner, a descendent forest manner, an enhanced descendent forest manner, an ascendant forest manner, an enhanced ascendant forest manner, and a structure comprising a combination thereof;

iii. generating, using said map definition specifying at least one fxxt holding votes entered by said user, one or more organizations of knowledge to structure a map instance for said one or more domains of wisdom from the extracted derived ontology wherein the resulting map structure of said map instance is based upon a manner of map assembly selected from the group of: a spanning forest manner, a hierarchical manner, an enhanced descendent forest manner, an enhanced ascendant forest manner, a vertical manner, a directed graph manner, a graph manner, a horizontal manner, a depth augmented manner, a time augmented manner, a purlieu augmented manner, and a structure comprising a combination thereof; wherein vertical and horizontal are mere duals for labeling in combinations;

iv. determining from the policies of the map definition the basis for calculating roll-ups, utilizing re-inverted sense or un-inverted generated hierarchical tensors from tree-extraction to prepare for roll-up to ensure that the root is considered as top and leaves are at the bottom logically;

v. generating roll-up tensors;

vi. determining from the policies of the map definition the basis for positioning;

and vii. generating positioning for domain of wisdom member cnxpts according to process trees for organization of knowledge generation, position determination and final sizing means for calculation, based upon policies stated in the map definition, wherein said positionings of said cnxpts are computed;

c. providing to the user said one or more domains of wisdom for utilization in a form selected from the group of:

i. providing access to the data contained in said one or more organizations of knowledge for one or more domains of wisdom of said map instance for utilization directed at a solution of a problem the user is considering;

and ii. displaying a visual derivative of said one or more organizations of knowledge for one or more domains of wisdom of said map instance to said user;

and d. accepting user commands for adding and refining said commonplace;

whereby the positions generated for cnxpts express an organization of knowledge entirely based upon the purpose of the map, that being often a categorization or a precedence;

whereby the solutions for the positions express a solution of a set of unknowns that have not been observed although the data underlying the positions may have been entered as supervision by users; whereby the the solutions for the positions are inferred from observed values comprising inputs from data collections, modeling, a crowd, or especially from a specific user, but are often not directly determinable; whereby the the solutions for the positions are often inferred from unobserved values comprising inputs from random factors, surrogate relationships and commonalities; sketchy modeling data, sketchy or low veracity crowd perceptions, or wild guesses from a specific user, these inputs useful where other inputs are lacking; and whereby the positions express the subjective perceptions of the user.

291. The method of claim 1 to also find values of positioning latent variables of meaning in objective perspective in multi-concept organization in a specific use case, further including:

a. accepting a map definition from a user specifying, if at all, a fxxt holding votes entered by said user if said fxxt is given a weighting coefficient indicating a proportionality of impact sufficiently low so to cause the votes of the user to be no more influential than would be a vote by any other user if any other user had entered a vote on the resulting position of that info-item;

b. generating a map instance from said map definition according to map generation means, wherein:

i. extracting at least one consensus organization of knowledge of at least one domain of wisdom from said commonplace according to utilize collective consensus through vote tallying means;

ii. generating, using said map definition, a skeletal structure for a map instance;

iii. generating, using said map definition, one or more organizations of knowledge to structure a map instance for said one or more domains of wisdom from the extracted derived ontology wherein the resulting map structure of said map instance is based upon a manner of map assembly selected from the group of: a spanning forest manner, a hierarchical manner, an enhanced descendent forest manner, an enhanced ascendant forest manner, a vertical manner, a directed graph manner, a graph manner, a horizontal manner, a depth augmented manner, a time augmented manner, a purlieu augmented manner, and a structure comprising a combination thereof; wherein vertical and horizontal are mere duals for labeling in combinations;

iv. determining from the policies of the map definition the basis for calculating roll-ups, utilizing re-inverted sense or un-inverted generated hierarchical tensors from tree-extraction to prepare for roll-up to ensure that the root is considered as top and leaves are at the bottom logically;

v. generating roll-up tensors;

vi. determining from the policies of the map definition the basis for positioning;

and vii. generating positioning for domain of wisdom member cnxpts according to process trees for organization of knowledge generation, position determination and final sizing means for calculation, based upon policies stated in the map definition, wherein said positionings of said cnxpts are computed;

c. providing to the user said one or more domains of wisdom for utilization in a form selected from the group of:

i. providing access to the data contained in said one or more organizations of knowledge for one or more domains of wisdom of said map instance for utilization directed at a solution of a problem the user is considering;

and ii. displaying a visual derivative of said one or more organizations of knowledge for one or more domains of wisdom of said map instance to said user;

and d. accepting user commands for adding and refining said commonplace;

whereby the positions generated for cnxpts express an organization of knowledge entirely based upon the purpose of the map, that being often a categorization or a precedence;

whereby the solutions for the positions express a solution of a set of unknowns that have not been observed although the data underlying the positions may have been entered as supervision by users; whereby the the solutions for the positions are inferred from observed values comprising inputs from data collections, modeling, a crowd, or from a specific user, but are often not directly determinable; whereby the the solutions for the positions are often inferred from unobserved values comprising inputs from random factors, surrogate relationships and commonalities; sketchy modeling data, sketchy or low veracity crowd perceptions, or wild guesses from users, these inputs useful where other inputs are lacking; whereby the positions express the objective truth; and whereby the positions express latent variable values possibly limited in dimensionality by the map definition.

292. The method of claim 1, to predict in models where basis information is sparse, further including:

a. combining types of concepts represented by surrogate cnxpts and relationships represented by surrogate associations, each of which are to a less than complete degree correlated to a probative relationship in a model, even though some of the surrogate concepts and relationships would not be used in the map in a situation where the better probative information was available, wherein:

i. accepting a definition of a knowledge model comprising a set of one or more fxxts based on information stored that is probative to a purpose, the information stored comprising a plurality of cnxpts and a plurality of associations, a plurality of cnxpts and a plurality of associations marked with at least one fxxt of said set of one or more fxxts based on probative information stored;

ii. accepting an augmentation of the definition of the knowledge model comprising surrogate information, the surrogate information thought to be correlated to the probative information of one or more fxxts; the probative information missing, unreliable, or sparse, and the surrogate information a stopgap until the probative knowledge model becomes sufficiently complete, the surrogate information comprising an additional surrogate set of one or more fxxts, the information stored comprising zero or more cnxpts and zero or more associations, the surrogate information selected from the group of:

01. surrogate associations that are not probative but are thought to be correlated to probative associations of one or more fxxts, each association relating a total of two cnxpts comprising zero to two probative final cnxpts and zero to two surrogate placeholders substituting for a probative final cnxpt, each association analogous to a temporary bridge constructed to allow traffic between one side of a river to the other even if not connected at the substantial abutments where the permanent bridge would be;

02. surrogate cnxpts that are each a placeholder for a final statement object explaining a concept, the surrogate cnxpt as placeholder believed to be incomplete in description or modeling specification, the existence of the surrogate cnxpt as placeholder dubious although the existence as a representative of a different cnxpt sustainable just as a spare tire is known not to be appropriate for long term use but is still a tire that will work, the modeling structure of the surrogate cnxpt believed to be a close fit to that of the cnxpt for which it is a placeholder;

iii. accepting a map definition specifying use of said a set of one or more fxxts based on information stored that is probative to a purpose and the surrogate set of one or more fxxts;

iv. assigning to each first fxxt of the set of one or more fxxts based on information stored that is probative a weighting coefficient indicating a proportionality of impact prioritizing their use higher than the corresponding fxxt of the additional surrogate set of one or more fxxts;

v. generating, using a map definition referencing the set of zero or more fxxts, a derived ontology for one or more domains of wisdom by extracting references to zero or more associations and zero or more cnxpts into the derived ontology, summing the information in various fxxts as adjusted by the weighting coefficient indicating a proportionality of impact for each fxxt so that, for any hierarchical association between the same two cnxpts a single representative hierarchical association is obtained, and so that, after map structuring, for any association between the same two cnxpts a single representative affinitive association is obtained and a single value of each property of each cnxpt is obtained;

vi. generating, using said map definition referencing the set of zero or more fxxts, a skeletal structure for a map instance for said one or more domains of wisdom from the extracted derived ontology wherein the resulting map skeletal structure of said map instance is based upon choices of hierarchical associations based upon their summed weight, choosing a probative association over a surrogate for structuring the skeleton as soon as enough evidence appears that the probative association is usable, the comparison of hierarchical associations not necessarily regarding a comparison of a probative association and its stopgap replacement so that in analogue the comparison is like enabling a new road from a detour so that as a new section of the new road is completed a slower detour route is abandoned in each different leg of a new road being built as different projects;

generating, using said map referencing the set of zero or more fxxts, one or more organizations of knowledge to structure a map instance for said one or more domains of wisdom from the extracted derived ontology wherein the resulting map structure of said map instance is based upon a manner of map assembly; and i. providing to the user said one or more domains of wisdom for utilization.

293. The method of claim 1 to also provide referencing of values of cnxpt properties in a map from another map for modeling, further including:

a. accepting a map definition for a first map, said first map involving at least one first cnxpt class or first cnxpt instance;

b. accepting a map definition for a second map, said second map involving at least one second cnxpt class or second cnxpt instance;

c. defining a cnxpt equation in a first property of said first cnxpt class or said first cnxpt instance in said first map, the equation referencing a value from a property of one or more said second cnxpts in one or more said second maps to determine a value for said first property of an instance of said first cnxpt class or said first property of said first cnxpt instance;

d. generating said first map;

e. generating said second map;

f. resolving the equations of said first property of said first cnxpt class or said first cnxpt instance in said first map;

whereby modeling of a map having cnxpts referencing cnxpts in a second map may impute values from the current condition of the second map for use in determining results in the first map.

294. The method of claim 293, to predict the value of a technology, further including:

a. performing value analysis for a first tcept in a first map based upon the competitive share of value computed for each zero or more second appcept representing a market in a second map, wherein a competitive share is based upon the probable satisfying of the market represented by said second appcept by said first tcept.

295. The method of claim 1, to generate a list of investment opportunities due to market gaps, further including:

a. generating a list of technology function cntexxts each represented by a first cnxpt having a set of zero or more offshoot second tcepts representing a newer function than said first cnxpt where the predicted market value for said cntexxt represented by a first cnxpt is greater than the sum of the competitive values imputed to said set of zero or more offshoot second tcepts for a given target time horizon.

296. The method of claim 1, to generate a list of possible technologies not as yet defined, further including:

a. applying an automatic technique for analysis and ingesting of external information sources, wherein:

i. accepting a definition of a knowledge model comprising a set of one or more fxxts based on information stored regarding technologies and markets, the information stored comprising a plurality of cnxpts and a plurality of associations;

ii. accepting a map definition specifying use of said set of one or more fxxts based on information stored regarding techniques and markets, the map definition specifying that the map instances generated from it will be one forest of technologies and a second forest of application of technologies, each of a hierarchical manner and each of a time augmented manner; and iii. generating, using said map definition, a map instance;

and b. generating a list of technology function cntexxts each represented by a first cnxpt having a set of zero or more offshoot second tcepts each representing a newer function than the encompassing said first cnxpt representing a cntexxt where the predicted market value for said cntexxt represented by a first cnxpt is greater than or equal to the sum of the competitive values imputed to said set of zero or more offshoot second tcepts for a given target time horizon;

whereby a list of technology definitions is created automatically for review.

297. The method of claim 1 to also link a prediction to a transaction, further including:

a. linking a prediction value to a first property of a cnxpt representing value of a a consortium to use in structuring consortium transaction and establishing a cnxpt property with an equation to sum the first property values of each investment, by investment percentage, to a property of a cnxpt representing a consortium owner to show rights during negotiation.

298. The method of claim 1, to determine the irrationality of a user regarding a set of similar beliefs, further including:

a. detecting a multimodal distribution for the distribution of votes over time of a single user regarding the veracity of a set of cnxpts that represent similar beliefs, wherein:

i. computing the degree of multimodality for votes by a first user for each second cnxpt in a cntexxt represented by a first cnxpt by determining the degree to which the distribution for said votes is other than unimodal;

and ii. determining if said degree of multimodality is greater than a pre-specified value.

299. The method of claim 1, to determine the level of disagreement between users regarding a belief, further including:

a. detecting a multimodal distribution for the distribution of votes over time of a set of users regarding the veracity of a set of cnxpts that represent similar beliefs, wherein:

i. computing the degree of multimodality for votes by a plurality of users for a first cnxpt by determining the degree to which the distribution for said votes is other than unimodal;

and ii. determining if said degree of multimodality is greater than a pre-specified value.

300. The method of claim 1 to also provide hierarchical admixture model for topic modeling, further including:

a. accepting a definition of a map with multiple fxxts and cnxpts having modeling cells;

b. specifying an admixture coefficient for each fxxt as a weighting coefficient indicating a proportionality of impact of a fxxt in the map instance;

c. generating a map instance having a model from the map definition;

and d. computing the model results;

whereby the map instance generated presents cnxpts serving as binding points and class instances having structure useful for modeling, the structure established based upon the contents of the fxxts and influenced strongly or weakly by the admixture ensemble coefficients.

301. The method of claim 1 to also provide ensembling of evidence, further including:

a. accepting a definition of a map with multiple fxxts, wherein evidence is an occurrence of one or more cnxpts referenced in one or more fxxts; wherein one or more fxxts stem from a situation selected from the group of:

i. fxxt formed to indicate associations relating cnxpt pairs with evidence connected in common to the cnxpt pair members;

ii. fxxt formed to indicate associations relating cnxpt pairs where evidence connected to the first cnxpt pair member and evidence connected to the second cnxpt pair member show a reason to believe that the two members are related;

iii. fxxt formed by machine learning showing relationship between two or more cnxpts;

iv. fxxt formed by machine learning showing importance of one or more cnxpts;

v. fxxt formed to indicate cnxpts whose veracity is high based upon the evidence connected to the cnxpt;

and vi. fxxt formed to indicate importance of a cnxpt based upon relevance of evidence connected to the cnxpt;

b. specifying an admixture coefficient for each fxxt as a weighting coefficient indicating a proportionality of impact of a fxxt in the map;

and c. generating the map instance having evidence as an occurrence of one or more cnxpts;

whereby the map generated presents cnxpts supported by varying strengths of evidence such that modeling can assemble evidence based upon the structure of the map instance.

302. the method of claim 1 to also provide document import, further including:

a. generating into said commonplace info-items representing documents from external sources, the info-items indicating details of documents as source objects according to import collateral information resource means;

b. updating said commonplace by generating information from source objects according to enter information resource for a ttx, and execute document cross-citation analytic means;

c. ingesting the information from each source object for determining ttx information for generation of derived source objects represented by zero or more new ttx info-items into said commonplace according to relevance based relationship building, result set collateral information resource import, and retrieve import from analytic and convert means;

d. dissecting the imported document derived source objects to obtain concepts form each derived source object suggesting a meaning more clarified from said ingesting;

e. adding from each said derived source object suggesting a meaning a new cnxpt as a binding point info-item;

f. determining relevance of each concept of said derived source object represented by a cnxpt according to utilize collective consensus through vote tallying means to obtain result set items for create unstructured data query script step means during result set processes means where a query was used to spur the import and ingesting of said derived source object according to perform query means, execute hit importance ranking analytic, generate scanning hit review queue entry, and result set conversion to properties, occurrences, and categorizations means;

whereby document information is imported into the commonplace.

* * * * *